US012254427B2

(12) United States Patent
Cella

(10) Patent No.: US 12,254,427 B2
(45) **Date of Patent: *Mar. 18, 2025**

(54) SYSTEMS AND METHODS FOR FORWARD MARKET PURCHASE OF MACHINE RESOURCES

(71) Applicant: Strong Force TX Portfolio 2018, LLC, Ft. Lauderdale, FL (US)

(72) Inventor: Charles Howard Cella, Pembroke, MA (US)

(73) Assignee: Strong Force TX Portfolio 2018, LLC, Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/203,725

(22) Filed: May 31, 2023

(65) Prior Publication Data

US 2023/0306319 A1 Sep. 28, 2023

Related U.S. Application Data

(63) Continuation of application No. 16/696,457, filed on Nov. 26, 2019, now Pat. No. 11,741,402, which is a (Continued)

(51) Int. Cl.
*G06Q 10/04* (2023.01)
*G05B 19/00* (2006.01)
(Continued)

(52) U.S. Cl.
CPC ............. *G06Q 10/04* (2013.01); *G05B 19/00* (2013.01); *G05B 19/41865* (2013.01);
(Continued)

(58) Field of Classification Search
CPC .......................................... G06Q 10/00–90/00
See application file for complete search history.

(56) References Cited

U.S. PATENT DOCUMENTS

| | | | |
|---|---|---|---|
| 5,126,028 | A | 6/1992 | Hurwitt et al. |
| 5,561,741 | A | 10/1996 | Wasserman |

(Continued)

FOREIGN PATENT DOCUMENTS

| | | | |
|---|---|---|---|
| AU | 2017352545 | A1 | 8/2018 |
| CA | 3064604 | A1 | 12/2018 |

(Continued)

OTHER PUBLICATIONS

Neural Networks for Data Processing, Ecole Superieure de Physique et Chimie Industrielles de la Ville, https://cordis.europa.eu/project/id/ST2*0422 (accessed on Feb. 1, 2021), Oct. 2, 1990, 3 pages.

(Continued)

*Primary Examiner* — Arif Ullah
(74) *Attorney, Agent, or Firm* — GTC Law Group PC & Affiliates

(57) ABSTRACT

Systems and methods for automatically soliciting the purchase of a first or second machine-related resource in a forward market, wherein the first resource and the second resource are distinct instances of the same type of resource, are described. A sample system may include a fleet of machines, each having a resource requirement comprising at least two of: a compute resource, a spectrum resource, or a network bandwidth resource. The system may include an circuits to aggregate data corresponding to the machine-related resources from at least a behavioral data source, to determine a substitution cost of a second resource; to determine a machine-related resource acquisition value; and to automatically solicit a purchase, in a forward market, of one of the first resource or the second resource in response to the determined substitution cost of the second resource.

20 Claims, 72 Drawing Sheets

Related U.S. Application Data continuation of application No. 16/457,890, filed on Jun. 28, 2019, now abandoned, which is a continuation of application No. PCT/US2019/030934, filed on May 6, 2019.

(60) Provisional application No. 62/787,206, filed on Dec. 31, 2018, provisional application No. 62/751,713, filed on Oct. 29, 2018, provisional application No. 62/667,550, filed on May 6, 2018.

(51) Int. Cl.

| | |
|---|---|
| ***G05B 19/418*** | (2006.01) |
| ***G06F 9/38*** | (2018.01) |
| ***G06F 9/46*** | (2006.01) |
| ***G06F 9/48*** | (2006.01) |
| ***G06F 9/50*** | (2006.01) |
| ***G06F 9/54*** | (2006.01) |
| ***G06F 16/18*** | (2019.01) |
| ***G06F 16/182*** | (2019.01) |
| ***G06F 16/23*** | (2019.01) |
| ***G06F 16/24*** | (2019.01) |
| ***G06F 16/27*** | (2019.01) |
| ***G06F 16/951*** | (2019.01) |
| ***G06F 18/214*** | (2023.01) |
| ***G06F 21/10*** | (2013.01) |
| ***G06F 30/27*** | (2020.01) |
| ***G06N 3/02*** | (2006.01) |
| ***G06N 3/04*** | (2023.01) |
| ***G06N 3/08*** | (2023.01) |
| ***G06N 5/04*** | (2023.01) |
| ***G06N 20/00*** | (2019.01) |
| ***G06Q 10/0631*** | (2023.01) |
| ***G06Q 10/067*** | (2023.01) |
| ***G06Q 20/06*** | (2012.01) |
| ***G06Q 20/22*** | (2012.01) |
| ***G06Q 20/36*** | (2012.01) |
| ***G06Q 20/38*** | (2012.01) |
| ***G06Q 20/40*** | (2012.01) |
| ***G06Q 30/0201*** | (2023.01) |
| ***G06Q 30/0202*** | (2023.01) |
| ***G06Q 30/0204*** | (2023.01) |
| ***G06Q 30/0241*** | (2023.01) |
| ***G06Q 30/0273*** | (2023.01) |
| ***G06Q 30/06*** | (2023.01) |
| ***G06Q 40/04*** | (2012.01) |
| ***G06Q 40/10*** | (2023.01) |
| ***G06Q 50/04*** | (2012.01) |
| ***G06Q 50/06*** | (2012.01) |
| ***G06Q 50/18*** | (2012.01) |
| ***H02J 3/00*** | (2006.01) |
| ***H02J 3/14*** | (2006.01) |
| ***H02J 3/28*** | (2006.01) |
| ***H02J 3/38*** | (2006.01) |
| ***H04L 9/00*** | (2022.01) |
| ***H04L 12/14*** | (2006.01) |
| ***H04L 47/78*** | (2022.01) |
| ***H04L 47/783*** | (2022.01) |
| ***H04L 47/83*** | (2022.01) |
| *G06F 16/2457* | (2019.01) |
| *G06N 3/044* | (2023.01) |
| *G06N 3/047* | (2023.01) |
| *G06Q 30/0251* | (2023.01) |
| *G06Q 50/00* | (2012.01) |
| *H04L 9/06* | (2006.01) |
| *H04L 67/12* | (2022.01) |

(52) U.S. Cl.

CPC ....... *G05B 19/4188* (2013.01); *G06F 9/3836* (2013.01); *G06F 9/3891* (2013.01); *G06F 9/466* (2013.01); *G06F 9/4806* (2013.01); *G06F 9/4881* (2013.01); *G06F 9/50* (2013.01); *G06F 9/5005* (2013.01); *G06F 9/5016* (2013.01); *G06F 9/5027* (2013.01); *G06F 9/5072* (2013.01); *G06F 9/541* (2013.01); *G06F 16/182* (2019.01); *G06F 16/1865* (2019.01); *G06F 16/23* (2019.01); *G06F 16/2365* (2019.01); *G06F 16/2379* (2019.01); *G06F 16/24* (2019.01); *G06F 16/27* (2019.01); *G06F 16/951* (2019.01); *G06F 18/2148* (2023.01); *G06F 18/2155* (2023.01); *G06F 21/105* (2013.01); *G06F 30/27* (2020.01); *G06N 3/02* (2013.01); *G06N 3/04* (2013.01); *G06N 3/08* (2013.01); *G06N 5/04* (2013.01); *G06N 20/00* (2019.01); *G06Q 10/0631* (2013.01); *G06Q 10/06314* (2013.01); *G06Q 10/06315* (2013.01); *G06Q 10/067* (2013.01); *G06Q 20/06* (2013.01); *G06Q 20/065* (2013.01); *G06Q 20/0655* (2013.01); *G06Q 20/29* (2013.01); *G06Q 20/367* (2013.01); *G06Q 20/38215* (2013.01); *G06Q 20/389* (2013.01); *G06Q 20/4016* (2013.01); *G06Q 20/405* (2013.01); *G06Q 30/0201* (2013.01); *G06Q 30/0202* (2013.01); *G06Q 30/0205* (2013.01); *G06Q 30/0206* (2013.01); *G06Q 30/0247* (2013.01); *G06Q 30/0273* (2013.01); *G06Q 30/06* (2013.01); *G06Q 40/04* (2013.01); *G06Q 40/10* (2013.01); *G06Q 50/04* (2013.01); *G06Q 50/06* (2013.01); *G06Q 50/184* (2013.01); *H02J 3/008* (2013.01); *H02J 3/14* (2013.01); *H02J 3/28* (2013.01); *H02J 3/388* (2020.01); *H04L 9/50* (2022.05); *H04L 12/14* (2013.01); *H04L 47/783* (2013.01); *H04L 47/788* (2013.01); *H04L 47/83* (2022.05); *G05B 2219/36542* (2013.01); *G06F 9/3838* (2013.01); *G06F 16/2457* (2019.01); *G06N 3/0418* (2013.01); *G06N 3/044* (2023.01); *G06N 3/047* (2023.01); *G06Q 20/4015* (2020.05); *G06Q 30/0254* (2013.01); *G06Q 30/0276* (2013.01); *G06Q 50/01* (2013.01); *G06Q 2220/00* (2013.01); *G06Q 2220/12* (2013.01); *G06Q 2220/18* (2013.01); *H02J 3/003* (2020.01); *H04L 9/0643* (2013.01); *H04L 67/12* (2013.01)

(56) References Cited

U.S. PATENT DOCUMENTS

| | | | |
|---|---|---|---|
| 5,764,905 | A | 6/1998 | Catozzi et al. |
| 5,812,422 | A | 9/1998 | Lyons |
| 6,289,488 | B1 | 9/2001 | Dave et al. |
| 6,519,574 | B1 | 2/2003 | Wilton et al. |
| 6,589,447 | B1 | 7/2003 | Ishizaki et al. |
| 6,785,592 | B1 | 8/2004 | Smith et al. |
| 6,810,817 | B1 | 11/2004 | James |
| 7,162,444 | B1 | 1/2007 | Machado, Jr. et al. |
| 7,272,572 | B1 | 9/2007 | Pienkos |
| 7,289,965 | B1 | 10/2007 | Bradley et al. |
| 7,343,360 | B1 | 3/2008 | Ristanovic et al. |
| 7,447,659 | B2 | 11/2008 | Parthasarathy |
| 7,653,551 | B2 | 1/2010 | Poltorak |
| 7,752,124 | B2 | 7/2010 | Green et al. |
| 7,797,217 | B2 | 9/2010 | Rosen et al. |
| 7,856,141 | B2 | 12/2010 | Li |

(56) References Cited

U.S. PATENT DOCUMENTS

| | | | |
|---|---|---|---|
| 7,856,414 | B2 | 12/2010 | Zee |
| 7,860,767 | B1 | 12/2010 | Vinci et al. |
| 7,904,381 | B1 | 3/2011 | Tatang et al. |
| 7,970,640 | B2 * | 6/2011 | Eder .................. G06Q 10/0635 705/7.28 |
| 8,024,262 | B2 | 9/2011 | Tai et al. |
| 8,156,022 | B2 | 4/2012 | Fell et al. |
| 8,160,952 | B1 | 4/2012 | Fell et al. |
| 8,199,768 | B1 | 6/2012 | Gossett et al. |
| 8,412,613 | B2 | 4/2013 | Prager et al. |
| 8,472,447 | B2 | 6/2013 | Humphries |
| 8,489,499 | B2 | 7/2013 | Yan et al. |
| 8,504,463 | B2 | 8/2013 | Johnson et al. |
| 8,538,848 | B1 | 9/2013 | Jung et al. |
| 8,600,571 | B2 | 12/2013 | Dillon et al. |
| 8,639,392 | B2 | 1/2014 | Chassin |
| 8,660,943 | B1 | 2/2014 | Chirehdast |
| 8,762,246 | B2 | 6/2014 | Blank et al. |
| 8,775,300 | B2 | 7/2014 | Showalter |
| 8,788,439 | B2 | 7/2014 | Martinez et al. |
| 8,848,640 | B2 | 9/2014 | Reznik et al. |
| 9,240,026 | B2 | 1/2016 | Chassin et al. |
| 9,367,825 | B2 | 6/2016 | Steven et al. |
| 9,425,620 | B2 | 8/2016 | Chassin et al. |
| 9,454,646 | B2 | 9/2016 | Siefert |
| 9,465,398 | B2 | 10/2016 | Forbes, Jr. |
| 9,589,297 | B2 | 3/2017 | Fuller et al. |
| 9,595,070 | B2 | 3/2017 | Matsuoka et al. |
| 9,697,544 | B1 | 7/2017 | Bayer et al. |
| 9,762,060 | B2 | 9/2017 | Kalsi et al. |
| 9,800,052 | B2 | 10/2017 | Li et al. |
| 9,811,847 | B2 | 11/2017 | Berger et al. |
| 9,983,670 | B2 | 5/2018 | Coleman et al. |
| 10,013,654 | B1 | 7/2018 | Levy et al. |
| 10,025,941 | B1 | 7/2018 | Griffin et al. |
| 10,075,987 | B2 | 9/2018 | Teyeb et al. |
| 10,157,407 | B2 | 12/2018 | Jung et al. |
| 10,168,675 | B2 | 1/2019 | Hashimoto et al. |
| 10,234,835 | B2 | 3/2019 | Liu et al. |
| 10,243,743 | B1 | 3/2019 | Madisetti et al. |
| 10,311,371 | B1 | 6/2019 | Hotchkies et al. |
| 10,318,896 | B1 | 6/2019 | Sarkar et al. |
| 10,320,569 | B1 | 6/2019 | Wentz et al. |
| 10,324,457 | B2 | 6/2019 | Neelakandan et al. |
| 10,353,745 | B1 | 7/2019 | Sait |
| 10,396,919 | B1 | 8/2019 | O'shea et al. |
| 10,503,627 | B2 | 12/2019 | Radhakrishnan et al. |
| 10,521,780 | B1 | 12/2019 | Hopkins, III et al. |
| 10,545,491 | B2 | 1/2020 | Kingston et al. |
| 10,606,687 | B2 | 3/2020 | Purushothaman |
| 10,642,967 | B2 | 5/2020 | Balaraman et al. |
| 10,657,457 | B1 | 5/2020 | Jeffery et al. |
| 10,719,586 | B2 | 7/2020 | Lenchner et al. |
| 10,762,506 | B1 | 9/2020 | Cash et al. |
| 10,783,579 | B1 | 9/2020 | Blackwell et al. |
| 10,824,759 | B1 | 11/2020 | Magerkurth et al. |
| 10,824,959 | B1 | 11/2020 | Chatterjee et al. |
| 10,841,236 | B1 | 11/2020 | Jin et al. |
| 10,861,112 | B2 | 12/2020 | Forbes, Jr. et al. |
| 10,880,313 | B2 | 12/2020 | Manna et al. |
| 10,884,810 | B1 | 1/2021 | Verma et al. |
| 10,937,004 | B2 | 3/2021 | Comerford et al. |
| 10,938,674 | B1 | 3/2021 | Natanzon et al. |
| 10,949,777 | B2 | 3/2021 | Elbsat et al. |
| 10,958,436 | B2 | 3/2021 | Zhou et al. |
| 10,963,231 | B1 | 3/2021 | Singh |
| 10,970,742 | B1 | 4/2021 | Knijnik et al. |
| 11,042,410 | B2 | 6/2021 | Jin et al. |
| 11,068,978 | B1 | 7/2021 | Ferreira |
| 11,074,648 | B1 | 7/2021 | Duccini et al. |
| 11,080,665 | B1 | 8/2021 | Poelstra et al. |
| 11,164,165 | B1 | 11/2021 | Andreev et al. |
| 11,320,796 | B1 | 5/2022 | Eltayeb et al. |
| 11,327,826 | B1 | 5/2022 | Shama et al. |
| 11,348,120 | B2 | 5/2022 | Berti et al. |
| 11,397,919 | B1 | 7/2022 | Thiagrajan et al. |
| 11,410,073 | B1 | 8/2022 | Narsky et al. |
| 11,501,365 | B1 | 11/2022 | Awasthy |
| 11,514,448 | B1 | 11/2022 | Liberman |
| 11,550,299 | B2 | 1/2023 | Cella et al. |
| 11,574,268 | B2 | 2/2023 | Irazabal et al. |
| 11,610,261 | B2 | 3/2023 | Cella |
| 11,669,914 | B2 | 6/2023 | Cella |
| 11,676,098 | B2 | 6/2023 | Berti et al. |
| 11,715,164 | B2 | 8/2023 | Cella |
| 2001/0027949 | A1 | 10/2001 | Safir et al. |
| 2001/0034701 | A1 | 10/2001 | Fox et al. |
| 2001/0044766 | A1 | 11/2001 | Keyes |
| 2002/0019758 | A1 | 2/2002 | Scarpelli |
| 2002/0019802 | A1 | 2/2002 | Malme et al. |
| 2002/0038279 | A1 | 3/2002 | Samuelson et al. |
| 2002/0087234 | A1 | 7/2002 | Lof et al. |
| 2002/0103745 | A1 | 8/2002 | Lof et al. |
| 2002/0144255 | A1 | 10/2002 | Anderson |
| 2002/0147670 | A1 | 10/2002 | Lange |
| 2002/0161624 | A1 | 10/2002 | Bradlee |
| 2002/0198805 | A1 | 12/2002 | Burkhardt |
| 2003/0033242 | A1 | 2/2003 | Lynch et al. |
| 2003/0055677 | A1 | 3/2003 | Brown et al. |
| 2003/0055776 | A1 | 3/2003 | Samuelson |
| 2003/0061133 | A1 | 3/2003 | Nutter et al. |
| 2003/0069830 | A1 | 4/2003 | Morano et al. |
| 2003/0101123 | A1 | 5/2003 | Alvarado et al. |
| 2003/0182250 | A1 | 9/2003 | Shihidehpour et al. |
| 2003/0212572 | A1 | 11/2003 | Poltorak |
| 2003/0212643 | A1 | 11/2003 | Steele et al. |
| 2003/0225653 | A1 | 12/2003 | Pullman |
| 2003/0229582 | A1 | 12/2003 | Sherman et al. |
| 2003/0233278 | A1 | 12/2003 | Marshall |
| 2004/0044442 | A1 | 3/2004 | Bayoumi et al. |
| 2004/0230512 | A1 | 11/2004 | Gulati |
| 2005/0004858 | A1 | 1/2005 | Foster et al. |
| 2005/0004862 | A1 | 1/2005 | Kirkland et al. |
| 2005/0065871 | A1 | 3/2005 | Gerhart et al. |
| 2005/0125329 | A1 | 6/2005 | Gerhart et al. |
| 2005/0125701 | A1 | 6/2005 | Hensbergen et al. |
| 2005/0149401 | A1 | 7/2005 | Ratcliffe et al. |
| 2005/0149420 | A1 | 7/2005 | Hagelin |
| 2005/0192826 | A1 | 9/2005 | Kanefsky |
| 2005/0246220 | A1 | 11/2005 | Thomson et al. |
| 2005/0257079 | A1 | 11/2005 | Arcangeli |
| 2005/0267837 | A1 | 12/2005 | White |
| 2006/0020526 | A1 | 1/2006 | Viner |
| 2006/0036530 | A1 | 2/2006 | Shkedy |
| 2006/0069640 | A1 | 3/2006 | Fitzgerald et al. |
| 2006/0069786 | A1 | 3/2006 | Mogul et al. |
| 2006/0143111 | A1 | 6/2006 | Mylet |
| 2006/0155423 | A1 | 7/2006 | Budike |
| 2006/0178918 | A1 | 8/2006 | Mikurak |
| 2006/0195715 | A1 | 8/2006 | Herington |
| 2006/0235788 | A1 | 10/2006 | Guyton |
| 2006/0250959 | A1 | 11/2006 | Porat |
| 2006/0293985 | A1 | 12/2006 | Lederman et al. |
| 2007/0011080 | A1 | 1/2007 | Jain et al. |
| 2007/0011083 | A1 | 1/2007 | Bird et al. |
| 2007/0016518 | A1 | 1/2007 | Atkinson et al. |
| 2007/0022044 | A1 | 1/2007 | Takeshita |
| 2007/0050286 | A1 | 3/2007 | Abrahams et al. |
| 2007/0055579 | A1 | 3/2007 | Ha |
| 2007/0073625 | A1 | 3/2007 | Shelton |
| 2007/0179855 | A1 | 8/2007 | Rueda et al. |
| 2007/0226139 | A1 | 9/2007 | Crumbach et al. |
| 2007/0299683 | A1 | 12/2007 | Elliott |
| 2008/0046378 | A1 | 2/2008 | Harrison et al. |
| 2008/0075406 | A1 | 3/2008 | Kadomi et al. |
| 2008/0103895 | A1 | 5/2008 | Burdick et al. |
| 2008/0121690 | A1 | 5/2008 | Carani et al. |
| 2008/0133402 | A1 | 6/2008 | Kurian et al. |
| 2008/0154784 | A1 | 6/2008 | Veeraraghavan |
| 2008/0177423 | A1 | 7/2008 | Brickfield et al. |
| 2008/0221951 | A1 | 9/2008 | Stanforth et al. |
| 2008/0222021 | A1 | 9/2008 | Stanforth et al. |
| 2008/0228518 | A1 | 9/2008 | Braziel et al. |
| 2008/0262892 | A1 | 10/2008 | Prager et al. |

(56) References Cited

U.S. PATENT DOCUMENTS

2008/0275746 A1 11/2008 Musier et al.
2008/0319893 A1 12/2008 Mashinsky et al.
2009/0048901 A1 2/2009 Richard et al.
2009/0049443 A1 2/2009 Powers et al.
2009/0055270 A1 2/2009 Magdon-ismail et al.
2009/0070273 A1 3/2009 Moryto
2009/0106070 A1 4/2009 Konar
2009/0119172 A1 5/2009 Soloff
2009/0171842 A1 7/2009 Blythe
2009/0240380 A1 9/2009 Shah et al.
2009/0254410 A1 10/2009 Chang et al.
2010/0042534 A1 2/2010 Moran
2010/0050172 A1 2/2010 Ferris
2010/0057582 A1 3/2010 Arfin et al.
2010/0063644 A1 3/2010 Kansal et al.
2010/0076615 A1 3/2010 Daniel et al.
2010/0106332 A1 4/2010 Chassin et al.
2010/0114387 A1 5/2010 Chassin
2010/0153960 A1 6/2010 Youn et al.
2010/0179704 A1 7/2010 Ozog
2010/0179911 A1 7/2010 Gorina et al.
2010/0198743 A1 8/2010 Plunket
2010/0217550 A1 8/2010 Crabtree et al.
2010/0217642 A1 8/2010 Crubtree et al.
2010/0217651 A1 8/2010 Crabtree et al.
2010/0218108 A1 8/2010 Crabtree et al.
2010/0228598 A1 9/2010 Seuken et al.
2010/0262530 A1 10/2010 Malackowski et al.
2010/0332262 A1 12/2010 Horvitz et al.
2010/0332373 A1 12/2010 Crabtree et al.
2011/0004575 A1 1/2011 Yang et al.
2011/0022548 A1 1/2011 Shahaf et al.
2011/0040632 A1 2/2011 Margasahayam et al.
2011/0040666 A1 2/2011 Crabtree et al.
2011/0047056 A1 2/2011 Overman et al.
2011/0071882 A1 3/2011 Jakagnanam et al.
2011/0071934 A1 3/2011 Brown et al.
2011/0087531 A1* 4/2011 Winters ................ G06Q 20/40
705/14.1
2011/0093382 A1 4/2011 Coltrell et al.
2011/0106277 A1 5/2011 Sayyar-Rodsari et al.
2011/0125671 A1 5/2011 Zhang et al.
2011/0178915 A1 7/2011 Vinokour et al.
2011/0191216 A1 8/2011 Foster
2011/0231028 A1 9/2011 Ozog
2011/0270779 A1 11/2011 Showalter
2011/0313578 A1 12/2011 Jones et al.
2011/0320342 A1 12/2011 Kremen
2012/0010757 A1 1/2012 Francino et al.
2012/0016721 A1 1/2012 Weinman
2012/0023007 A1 1/2012 Bachann
2012/0130556 A1 5/2012 Marhoefer
2012/0131591 A1 5/2012 Moorthi et al.
2012/0150679 A1 6/2012 Lazaris
2012/0158568 A1 6/2012 Ford et al.
2012/0173020 A1 7/2012 Seth et al.
2012/0191594 A1 7/2012 Welch et al.
2012/0245752 A1 9/2012 Borrett et al.
2012/0246037 A1 9/2012 Wilmes et al.
2012/0250938 A1 10/2012 Dehart
2012/0278220 A1 11/2012 Chassin et al.
2012/0283005 A1 11/2012 Van Luchene
2012/0284207 A1 11/2012 Eder
2012/0296845 A1 11/2012 Andrews et al.
2012/0303558 A1 11/2012 Jaiswal
2012/0310847 A1 12/2012 Tadayon et al.
2012/0316688 A1 12/2012 Boardman et al.
2012/0322387 A1 12/2012 Nicoara et al.
2012/0323758 A1 12/2012 Henning
2012/0323760 A1 12/2012 Lee et al.
2013/0006844 A1 1/2013 Kremen
2013/0006845 A1 1/2013 Kremen
2013/0013520 A1 1/2013 Lee
2013/0035992 A1 2/2013 Silverman
2013/0054036 A1 2/2013 Cherian
2013/0054863 A1 2/2013 Imes et al.
2013/0067074 A1 3/2013 Allen et al.
2013/0072775 A1 3/2013 Rogers et al.
2013/0085614 A1 4/2013 Wenzel et al.
2013/0117156 A1 5/2013 Azmi et al.
2013/0151383 A1 6/2013 Gancarz et al.
2013/0159163 A1 6/2013 Kayanuma et al.
2013/0159165 A1 6/2013 Marlowe-noren
2013/0159832 A1 6/2013 Ingargiola et al.
2013/0185722 A1 7/2013 Kruglick
2013/0211946 A1 8/2013 Montgomery
2013/0218743 A1 8/2013 Chassin et al.
2013/0297489 A1 11/2013 Showalter
2013/0304758 A1 11/2013 Gruber et al.
2013/0311925 A1 11/2013 Denker et al.
2013/0325878 A1 12/2013 De Lichana
2013/0332327 A1 12/2013 Sgouridis et al.
2013/0345884 A1 12/2013 Forbes, Jr.
2013/0345888 A1 12/2013 Forbes, Jr.
2013/0346139 A1 12/2013 Steven et al.
2013/0346284 A1 12/2013 Stubbs et al.
2013/0346285 A1 12/2013 Louis
2014/0006329 A1 1/2014 Hu et al.
2014/0012650 A1 1/2014 Patro
2014/0018969 A1 1/2014 Forbes, Jr.
2014/0039710 A1 2/2014 Carter et al.
2014/0046819 A1 2/2014 Hendrix
2014/0067650 A1 3/2014 Gardiner et al.
2014/0067740 A1 3/2014 Solari
2014/0089163 A1 3/2014 Parsons et al.
2014/0136264 A1 5/2014 Kinsey
2014/0156577 A1 6/2014 Eliasmith et al.
2014/0164262 A1 6/2014 Graham
2014/0171018 A1 6/2014 Elrefaey et al.
2014/0171136 A1 6/2014 Elrefaey et al.
2014/0172679 A1 6/2014 Shimko
2014/0180907 A1 6/2014 Blank et al.
2014/0201118 A1 7/2014 Cleve et al.
2014/0229394 A1 8/2014 Slutsker et al.
2014/0266669 A1 9/2014 Fadell et al.
2014/0270494 A1 9/2014 Sawhney et al.
2014/0277797 A1 9/2014 Mokhtari et al.
2014/0297515 A1 10/2014 Fish et al.
2014/0304025 A1 10/2014 Steven et al.
2014/0310072 A1 10/2014 Wojciechowski
2014/0310155 A1 10/2014 Postrel
2014/0310199 A1 10/2014 Hardman et al.
2014/0315560 A1 10/2014 Smith et al.
2014/0316838 A1 10/2014 Zhou et al.
2014/0331235 A1 11/2014 Lee
2014/0336960 A1 11/2014 Haghighat-Kashani et al.
2014/0344018 A1 11/2014 Thalken
2014/0344019 A1 11/2014 Thalken
2014/0344189 A1 11/2014 Ienaga et al.
2014/0372150 A1 12/2014 Karle et al.
2015/0019342 A1 1/2015 Gupta
2015/0026035 A1 1/2015 Showalter
2015/0045688 A1 2/2015 Nardi
2015/0079578 A1 3/2015 Nardi
2015/0094968 A1 4/2015 Jia et al.
2015/0127515 A1 5/2015 Studnitzer et al.
2015/0149249 A1 5/2015 Mansfield
2015/0156030 A1 6/2015 Fadell et al.
2015/0161736 A1 6/2015 Thomas
2015/0170080 A1 6/2015 Kaushik
2015/0186904 A1 7/2015 Guha et al.
2015/0199774 A1 7/2015 Gottesman et al.
2015/0221053 A1 8/2015 Tapley et al.
2015/0242747 A1 8/2015 Packes et al.
2015/0242946 A1 8/2015 Powell et al.
2015/0248510 A1 9/2015 Meagher et al.
2015/0254566 A1 9/2015 Chandramouli et al.
2015/0269669 A1 9/2015 Gil et al.
2015/0276238 A1 10/2015 Matsuoka et al.
2015/0302303 A1 10/2015 Hakim
2015/0310470 A1 10/2015 Mathew et al.
2015/0317558 A1 11/2015 Adachi et al.
2015/0339765 A1 11/2015 Dubey et al.
2015/0339769 A1 11/2015 Deoliveira et al.

(56) References Cited

U.S. PATENT DOCUMENTS

2015/0348166 A1 12/2015 Trivedi et al.
2015/0363851 A1 12/2015 Stella et al.
2015/0373554 A1 12/2015 Freda et al.
2015/0379439 A1 12/2015 Klein et al.
2016/0033986 A1 2/2016 Kamel et al.
2016/0050168 A1 2/2016 Zutphen
2016/0055455 A1 2/2016 Hill et al.
2016/0055507 A1 2/2016 Patil et al.
2016/0055553 A1 2/2016 Hill et al.
2016/0063626 A1 3/2016 Axelrod et al.
2016/0092208 A1 3/2016 Nicol et al.
2016/0098770 A1 4/2016 Chang et al.
2016/0109916 A1 4/2016 Li et al.
2016/0117657 A1 4/2016 Forbes, Jr. et al.
2016/0140521 A1 5/2016 Trivedi et al.
2016/0180907 A1 6/2016 Friedman et al.
2016/0247129 A1 8/2016 Song et al.
2016/0253677 A1 9/2016 Azmi et al.
2016/0256690 A1 9/2016 Cecchi et al.
2016/0267587 A1 9/2016 Woltsovitch et al.
2016/0283933 A1 9/2016 Orlando et al.
2016/0292680 A1 10/2016 Wilson et al.
2016/0300135 A1 10/2016 Moudy et al.
2016/0300234 A1 10/2016 Moss-Pultz et al.
2016/0307272 A1 10/2016 Thalken
2016/0308783 A1 10/2016 Bookman et al.
2016/0314545 A1 10/2016 Jessen
2016/0321115 A1 11/2016 Thorpe et al.
2016/0322835 A1 11/2016 Carlson et al.
2016/0330027 A1 11/2016 Ebrahimi
2016/0350671 A1 12/2016 Morris, II et al.
2016/0358099 A1 12/2016 Sturlaugson et al.
2016/0364767 A1 12/2016 Maugans, III
2016/0364796 A1 12/2016 Rosen et al.
2016/0379165 A1 12/2016 Moakley
2016/0380886 A1 12/2016 Blair et al.
2016/0380911 A1 12/2016 Bhandaru et al.
2017/0004407 A1 1/2017 Benson et al.
2017/0005515 A1 1/2017 Sanders et al.
2017/0019496 A1 1/2017 Orbach
2017/0019817 A1 1/2017 Senarath et al.
2017/0048216 A1 2/2017 Chow et al.
2017/0053552 A1 2/2017 Zhong et al.
2017/0054608 A1 2/2017 Caputo, II et al.
2017/0061535 A1 3/2017 Williams
2017/0085545 A1 3/2017 Lohe et al.
2017/0091791 A1 3/2017 Srinivasan et al.
2017/0098291 A1 4/2017 Code et al.
2017/0103385 A1 4/2017 Wilson, Jr. et al.
2017/0103456 A1 4/2017 Parsells et al.
2017/0111233 A1 4/2017 Kokkula et al.
2017/0124668 A1 5/2017 Okamoto et al.
2017/0132615 A1 5/2017 Castinado et al.
2017/0132625 A1 5/2017 Kennedy
2017/0140405 A1 5/2017 Gottemukkala et al.
2017/0154374 A1 6/2017 Iglesias et al.
2017/0169331 A1 6/2017 Garner
2017/0193619 A1 7/2017 Rollins et al.
2017/0200260 A1 7/2017 Bhaskar et al.
2017/0206604 A1 7/2017 Al-masoud
2017/0214522 A1 7/2017 Code et al.
2017/0221029 A1 8/2017 Lund et al.
2017/0232300 A1 8/2017 Tran et al.
2017/0236094 A1 8/2017 Shah
2017/0236136 A1 8/2017 He et al.
2017/0236143 A1 8/2017 Code et al.
2017/0236222 A1 8/2017 Chen et al.
2017/0243025 A1 8/2017 Kurian et al.
2017/0243209 A1 8/2017 Johnsrud et al.
2017/0243290 A1 8/2017 Brown
2017/0250751 A1 8/2017 Kargieman et al.
2017/0262614 A1 9/2017 Vishnubhatla et al.
2017/0262761 A1 9/2017 Yan et al.
2017/0272441 A1 9/2017 Mcclintock et al.
2017/0284691 A1 10/2017 Sinha et al.
2017/0286086 A1 10/2017 Narasimhan et al.
2017/0286572 A1 10/2017 Hershey et al.
2017/0287090 A1 10/2017 Hunn et al.
2017/0288399 A1 10/2017 Fife
2017/0289111 A1 10/2017 Voell et al.
2017/0308802 A1 10/2017 Ramsøy et al.
2017/0308976 A1 10/2017 Eidelman et al.
2017/0322579 A1 11/2017 Goparaju et al.
2017/0325041 A1 11/2017 Kulavik
2017/0330058 A1 11/2017 Silberman et al.
2017/0333058 A1 11/2017 Cabot
2017/0338967 A1 11/2017 Lewison et al.
2017/0352041 A1 12/2017 Ramamurthy et al.
2017/0357984 A1 12/2017 Takamatsu et al.
2017/0358041 A1 12/2017 Forbes, Jr. et al.
2017/0372472 A1 12/2017 Takahashi et al.
2018/0004948 A1 1/2018 Martin et al.
2018/0018196 A1 1/2018 Dean et al.
2018/0018582 A1 1/2018 Unsal et al.
2018/0018723 A1 1/2018 Nagla et al.
2018/0025442 A1 1/2018 Isaacson et al.
2018/0032944 A1 2/2018 Sarvana et al.
2018/0039249 A1 2/2018 Johnson et al.
2018/0039962 A1 2/2018 Ren et al.
2018/0040007 A1 2/2018 Lane et al.
2018/0047111 A1 2/2018 Vieira et al.
2018/0063021 A1 3/2018 Beveridge et al.
2018/0063235 A1 3/2018 Beveridge et al.
2018/0068130 A1 3/2018 Chan et al.
2018/0075371 A1 3/2018 Lobachev et al.
2018/0075385 A1 3/2018 Condon et al.
2018/0075421 A1 3/2018 Serrano et al.
2018/0075527 A1 3/2018 Nagla et al.
2018/0089758 A1 3/2018 Stradling et al.
2018/0089760 A1 3/2018 Stradling et al.
2018/0091524 A1 3/2018 Setty et al.
2018/0096175 A1 4/2018 Schmeling et al.
2018/0096362 A1 4/2018 Kwan
2018/0101448 A1 4/2018 Ventura et al.
2018/0101842 A1 4/2018 Ventura et al.
2018/0113742 A1 4/2018 Chung et al.
2018/0114167 A1 4/2018 Bharti et al.
2018/0114205 A1 4/2018 Thomas et al.
2018/0114267 A1 4/2018 Khatami
2018/0120813 A1 5/2018 Coffman et al.
2018/0121829 A1 5/2018 Chowdhary et al.
2018/0123391 A1 5/2018 Lakamp et al.
2018/0129961 A1 5/2018 Kailas et al.
2018/0136633 A1 5/2018 Small et al.
2018/0137503 A1 5/2018 High et al.
2018/0139042 A1 5/2018 Binning et al.
2018/0144355 A1 5/2018 Holman et al.
2018/0144403 A1 5/2018 Heimowitz
2018/0165585 A1 6/2018 Saxena et al.
2018/0165611 A1 6/2018 Saxena et al.
2018/0167198 A1 6/2018 Muller et al.
2018/0173203 A1 6/2018 Freer et al.
2018/0174231 A1 6/2018 Chenard et al.
2018/0174255 A1 6/2018 Hunn et al.
2018/0176229 A1 6/2018 Bathen et al.
2018/0181979 A1 6/2018 Frank et al.
2018/0182052 A1 6/2018 Panagos
2018/0183606 A1 6/2018 High et al.
2018/0189753 A1 7/2018 Konda et al.
2018/0204111 A1* 7/2018 Zadeh .................. G06V 10/764
2018/0204213 A1 7/2018 Zappier et al.
2018/0205555 A1 7/2018 Watanabe et al.
2018/0211115 A1 7/2018 Klein
2018/0211313 A1 7/2018 Narahari
2018/0216946 A1 8/2018 Gueye
2018/0218027 A1 8/2018 Cronie et al.
2018/0218069 A1 8/2018 Rege et al.
2018/0218176 A1 8/2018 Voorhees et al.
2018/0225653 A1 8/2018 Vokes et al.
2018/0232804 A1 8/2018 Mack
2018/0240187 A1 8/2018 Lee et al.
2018/0241573 A1 8/2018 Ramathal et al.
2018/0246883 A1 8/2018 Wang
2018/0247191 A1 8/2018 Katz et al.

(56) References Cited

U.S. PATENT DOCUMENTS

| | | | |
|---|---|---|---|
| 2018/0247320 | A1 | 8/2018 | Gauld |
| 2018/0253451 | A1 | 9/2018 | Callan et al. |
| 2018/0257306 | A1 | 9/2018 | Mattingly et al. |
| 2018/0260872 | A1 | 9/2018 | Ali |
| 2018/0267832 | A1 | 9/2018 | Biener et al. |
| 2018/0268152 | A1 | 9/2018 | Cuomo et al. |
| 2018/0268337 | A1 | 9/2018 | Miller et al. |
| 2018/0276625 | A1 | 9/2018 | Saye et al. |
| 2018/0284741 | A1 | 10/2018 | Cella et al. |
| 2018/0285810 | A1 | 10/2018 | Ramachandran et al. |
| 2018/0285839 | A1 | 10/2018 | Yang et al. |
| 2018/0285971 | A1 | 10/2018 | Rosenoer |
| 2018/0285996 | A1 | 10/2018 | Ma |
| 2018/0288637 | A1 | 10/2018 | Laselva et al. |
| 2018/0308184 | A1 | 10/2018 | Pankanti et al. |
| 2018/0313798 | A1 | 11/2018 | Chokshi et al. |
| 2018/0314809 | A1 | 11/2018 | Mintz et al. |
| 2018/0315056 | A1 | 11/2018 | Klavins |
| 2018/0322587 | A1 | 11/2018 | Linne |
| 2018/0322588 | A1 | 11/2018 | Linne |
| 2018/0322597 | A1 | 11/2018 | Sher |
| 2018/0325482 | A1 | 11/2018 | Williams |
| 2018/0329399 | A1 | 11/2018 | Neelakandan et al. |
| 2018/0337820 | A1 | 11/2018 | Chen et al. |
| 2018/0342171 | A1 | 11/2018 | Darnell et al. |
| 2018/0356800 | A1 | 12/2018 | Chao et al. |
| 2018/0357162 | A1 | 12/2018 | Khandka et al. |
| 2018/0365764 | A1 | 12/2018 | Nelson |
| 2019/0005469 | A1 | 1/2019 | Dhupkar et al. |
| 2019/0005595 | A1 | 1/2019 | Tautenhan et al. |
| 2019/0013932 | A1 | 1/2019 | Maino et al. |
| 2019/0018399 | A1 | 1/2019 | Shah et al. |
| 2019/0019249 | A1 | 1/2019 | Bhattacharjee et al. |
| 2019/0028278 | A1 | 1/2019 | Gilson |
| 2019/0036932 | A1 | 1/2019 | Bathen et al. |
| 2019/0057362 | A1 | 2/2019 | Wright et al. |
| 2019/0080404 | A1 | 3/2019 | Molinari et al. |
| 2019/0081789 | A1 | 3/2019 | Madisetti et al. |
| 2019/0086891 | A1 | 3/2019 | Kawamoto et al. |
| 2019/0087893 | A1 | 3/2019 | Pellew |
| 2019/0096001 | A1 | 3/2019 | Kamrava |
| 2019/0096210 | A1 | 3/2019 | Jarvis et al. |
| 2019/0101896 | A1 | 4/2019 | Cantrell et al. |
| 2019/0101985 | A1 | 4/2019 | Sajda et al. |
| 2019/0102511 | A1 | 4/2019 | Murray et al. |
| 2019/0102835 | A1 | 4/2019 | Bjonerud et al. |
| 2019/0108227 | A1 | 4/2019 | Ikezoye et al. |
| 2019/0114706 | A1 | 4/2019 | Bell et al. |
| 2019/0123561 | A1 | 4/2019 | Kudo |
| 2019/0124100 | A1 | 4/2019 | Shannon et al. |
| 2019/0129824 | A1 | 5/2019 | Radhakrishnan et al. |
| 2019/0130094 | A1 | 5/2019 | Votaw et al. |
| 2019/0130399 | A1 | 5/2019 | Wright et al. |
| 2019/0138333 | A1 | 5/2019 | Deutsch et al. |
| 2019/0138662 | A1 | 5/2019 | Deutsch et al. |
| 2019/0139159 | A1 | 5/2019 | Sarker et al. |
| 2019/0141596 | A1 | 5/2019 | Gay et al. |
| 2019/0147174 | A1 | 5/2019 | Narasimhan et al. |
| 2019/0147551 | A1 | 5/2019 | Sun et al. |
| 2019/0155225 | A1 | 5/2019 | Kothandaraman et al. |
| 2019/0155997 | A1 | 5/2019 | Vos et al. |
| 2019/0156304 | A1 | 5/2019 | Hudson et al. |
| 2019/0156336 | A1 | 5/2019 | Kasthuri |
| 2019/0163896 | A1 | 5/2019 | Balaraman et al. |
| 2019/0164136 | A1 | 5/2019 | Gray |
| 2019/0164221 | A1 | 5/2019 | Hill et al. |
| 2019/0165577 | A1 | 5/2019 | Carr et al. |
| 2019/0165931 | A1 | 5/2019 | Bharti et al. |
| 2019/0171438 | A1 | 6/2019 | Franchitti |
| 2019/0173884 | A1 | 6/2019 | Vincent |
| 2019/0175763 | A1 | 6/2019 | Shapiro et al. |
| 2019/0180266 | A1 | 6/2019 | Sidhu et al. |
| 2019/0180358 | A1 | 6/2019 | Nandan et al. |
| 2019/0188046 | A1 | 6/2019 | Florissi et al. |
| 2019/0188697 | A1 | 6/2019 | Wu et al. |
| 2019/0197180 | A1 | 6/2019 | Jersin et al. |
| 2019/0197404 | A1 | 6/2019 | Wang et al. |
| 2019/0197551 | A1 | 6/2019 | Dickinson et al. |
| 2019/0197635 | A1 | 6/2019 | Kim |
| 2019/0228351 | A1 | 7/2019 | Simpson et al. |
| 2019/0228409 | A1 | 7/2019 | Madisetti et al. |
| 2019/0228495 | A1 | 7/2019 | Tremblay et al. |
| 2019/0229890 | A1 | 7/2019 | Brehmer et al. |
| 2019/0230046 | A1 | 7/2019 | Djukic et al. |
| 2019/0236489 | A1 | 8/2019 | Koudal et al. |
| 2019/0237169 | A1 | 8/2019 | Culver et al. |
| 2019/0238486 | A1 | 8/2019 | Zizka |
| 2019/0238525 | A1 | 8/2019 | Padmanabhan et al. |
| 2019/0243631 | A1 | 8/2019 | Sharma et al. |
| 2019/0244227 | A1 | 8/2019 | Inoue |
| 2019/0244287 | A1 | 8/2019 | Prasad Datta et al. |
| 2019/0247662 | A1 | 8/2019 | Poltroak |
| 2019/0251199 | A1 | 8/2019 | Klianev |
| 2019/0251295 | A1 | 8/2019 | Vieyra |
| 2019/0251489 | A1 | 8/2019 | Berti et al. |
| 2019/0251575 | A1 | 8/2019 | Berti et al. |
| 2019/0252880 | A1 | 8/2019 | Watanabe et al. |
| 2019/0272591 | A1 | 9/2019 | Leonard et al. |
| 2019/0278950 | A1 | 9/2019 | Iuzifovich et al. |
| 2019/0287079 | A1 | 9/2019 | Shiraishi et al. |
| 2019/0287168 | A1 | 9/2019 | Williams, III et al. |
| 2019/0287195 | A1 | 9/2019 | Lee et al. |
| 2019/0287283 | A1 | 9/2019 | Lin et al. |
| 2019/0289454 | A1 | 9/2019 | Inoue |
| 2019/0295163 | A1 | 9/2019 | Zurick et al. |
| 2019/0303893 | A1 | 10/2019 | Ramasamy et al. |
| 2019/0303926 | A1 | 10/2019 | Yantis et al. |
| 2019/0304595 | A1 | 10/2019 | Bergman et al. |
| 2019/0305957 | A1 | 10/2019 | Reddy et al. |
| 2019/0311428 | A1 | 10/2019 | Adjaoute |
| 2019/0317935 | A1 | 10/2019 | Berti et al. |
| 2019/0319968 | A1 | 10/2019 | Mehta |
| 2019/0324781 | A1 | 10/2019 | Ramamurthy et al. |
| 2019/0325044 | A1 | 10/2019 | Gray |
| 2019/0332508 | A1 | 10/2019 | Goyal et al. |
| 2019/0333142 | A1 | 10/2019 | Thomas |
| 2019/0340586 | A1 | 11/2019 | Sheng et al. |
| 2019/0340715 | A1 | 11/2019 | Cella |
| 2019/0342078 | A1 | 11/2019 | Li |
| 2019/0342182 | A1 | 11/2019 | Dhanabalan et al. |
| 2019/0354922 | A1 | 11/2019 | Berti et al. |
| 2019/0356473 | A1 | 11/2019 | Rosenoer et al. |
| 2019/0370601 | A1 | 12/2019 | Anil Kumar et al. |
| 2019/0372345 | A1 | 12/2019 | Bain et al. |
| 2019/0378051 | A1 | 12/2019 | Widmann et al. |
| 2019/0384408 | A1 | 12/2019 | Iyer et al. |
| 2019/0384870 | A1 | 12/2019 | Shiraishi et al. |
| 2020/0026560 | A1 | 1/2020 | Singh et al. |
| 2020/0027016 | A1 | 1/2020 | Rouhani et al. |
| 2020/0027157 | A1 | 1/2020 | Xu et al. |
| 2020/0027159 | A1 | 1/2020 | Blank et al. |
| 2020/0029884 | A1 | 1/2020 | Arai et al. |
| 2020/0030608 | A1 | 1/2020 | Halpern |
| 2020/0034197 | A1 | 1/2020 | Nagpal et al. |
| 2020/0058081 | A1 | 2/2020 | Saneyoshi et al. |
| 2020/0059097 | A1 | 2/2020 | Bangalore et al. |
| 2020/0059510 | A1 | 2/2020 | Russom et al. |
| 2020/0082735 | A1 | 3/2020 | Nel et al. |
| 2020/0086127 | A1 | 3/2020 | Intrator |
| 2020/0111158 | A1 | 4/2020 | Collins et al. |
| 2020/0145210 | A1 | 5/2020 | Thekadath et al. |
| 2020/0160465 | A1 | 5/2020 | Spangenberg et al. |
| 2020/0179810 | A1 | 6/2020 | Cunningham et al. |
| 2020/0184556 | A1 | 6/2020 | Cella |
| 2020/0186355 | A1 | 6/2020 | Davies |
| 2020/0202038 | A1 | 6/2020 | Zhang et al. |
| 2020/0211104 | A1 | 7/2020 | Mack |
| 2020/0211109 | A1 | 7/2020 | Bean et al. |
| 2020/0218767 | A1 | 7/2020 | Ritchey et al. |
| 2020/0219093 | A1 | 7/2020 | Malhotra et al. |
| 2020/0234605 | A1 | 7/2020 | Shuart |
| 2020/0250683 | A1 | 8/2020 | Padmanabhan et al. |
| 2020/0250776 | A1 | 8/2020 | Spangenberg et al. |
| 2020/0302523 | A1 | 9/2020 | Cella |

(56) References Cited

U.S. PATENT DOCUMENTS

| | | | |
|---|---|---|---|
| 2020/0320057 | A1 | 10/2020 | Yan |
| 2020/0379537 | A1 | 12/2020 | Henson et al. |
| 2020/0380889 | A1 | 12/2020 | Fitzpatrick et al. |
| 2020/0394708 | A1 | 12/2020 | Cella |
| 2020/0412731 | A1 | 12/2020 | Gulbrandsen |
| 2021/0004720 | A1 | 1/2021 | Henri et al. |
| 2021/0004923 | A1 | 1/2021 | Mackenzie et al. |
| 2021/0082033 | A1 | 3/2021 | Yao |
| 2021/0103984 | A1 | 4/2021 | Leonard et al. |
| 2021/0118067 | A1 | 4/2021 | Muenz et al. |
| 2021/0176638 | A1 | 6/2021 | Heldt-Sheller et al. |
| 2021/0192412 | A1 | 6/2021 | Krishnaswamy |
| 2021/0224903 | A1 | 7/2021 | Mathiesen-Ohman et al. |
| 2021/0248514 | A1 | 8/2021 | Cella et al. |
| 2021/0272179 | A1 | 9/2021 | Sanjeevaiah Krishnaiah |
| 2021/0294791 | A1 | 9/2021 | Narayanaswamy et al. |
| 2021/0312291 | A1 | 10/2021 | Katz et al. |
| 2021/0342836 | A1 | 11/2021 | Cella et al. |
| 2021/0358032 | A1 | 11/2021 | Cella et al. |
| 2022/0137585 | A1 | 5/2022 | Turan et al. |
| 2022/0366494 | A1 | 11/2022 | Cella et al. |
| 2024/0070236 | A1 | 2/2024 | Cella |

FOREIGN PATENT DOCUMENTS

| | | | |
|---|---|---|---|
| CN | 107609848 | A | 1/2018 |
| CN | 108667618 | A | 10/2018 |
| JP | 2002233053 | A | 8/2002 |
| JP | 2018007311 | A | 1/2018 |
| JP | 6363254 | B1 | 7/2018 |
| JP | 2018525729 | A | 9/2018 |
| WO | 9746929 | A2 | 12/1997 |
| WO | 2001061579 | | 8/2001 |
| WO | 02103879 | A1 | 12/2002 |
| WO | 03012573 | A2 | 2/2003 |
| WO | 2008109641 | A2 | 9/2008 |
| WO | 2009039500 | A1 | 3/2009 |
| WO | 2010081165 | A2 | 7/2010 |
| WO | 2010083334 | A1 | 7/2010 |
| WO | 2011057173 | A2 | 5/2011 |
| WO | 2012027478 | A1 | 3/2012 |
| WO | 2013001392 | A1 | 1/2013 |
| WO | 2014098796 | A1 | 6/2014 |
| WO | 2015178609 | A1 | 11/2015 |
| WO | 2017007692 | A1 | 1/2017 |
| WO | 2017059866 | A2 | 4/2017 |
| WO | 2017115141 | A1 | 7/2017 |
| WO | 2017163090 | A1 | 9/2017 |
| WO | 2017187397 | A1 | 11/2017 |
| WO | 2018014123 | A1 | 1/2018 |
| WO | 2018039722 | A1 | 3/2018 |
| WO | 2018148732 | A2 | 8/2018 |
| WO | 2018152519 | A1 | 8/2018 |
| WO | 2018165155 | A1 | 9/2018 |
| WO | 2018213630 | A1 | 11/2018 |
| WO | 2019021311 | A1 | 1/2019 |
| WO | 2019067801 | A1 | 4/2019 |
| WO | 2019083974 | A1 | 5/2019 |
| WO | 2019122977 | A1 | 6/2019 |
| WO | 2019175837 | A1 | 9/2019 |
| WO | 2019217323 | A1 | 11/2019 |
| WO | 2019223373 | A1 | 11/2019 |
| WO | 2020006639 | A1 | 1/2020 |
| WO | 2020091746 | A1 | 5/2020 |
| WO | 2020092426 | A2 | 5/2020 |
| WO | 2020092446 | A2 | 5/2020 |
| WO | 2020092426 | A3 | 8/2020 |
| WO | 2020092446 | A3 | 8/2020 |
| WO | 2020178752 | A1 | 9/2020 |
| WO | 2021158702 | A1 | 8/2021 |
| WO | 2022016102 | A1 | 1/2022 |
| WO | 2022133210 | A2 | 6/2022 |
| WO | 2022133210 | A3 | 8/2022 |
| WO | 2022204425 | A1 | 9/2022 |

OTHER PUBLICATIONS

"Amazon EMR pricing" [online], available at: < https://web.archive.Org/web/20170717162329/https:// aws.amazon.com/emr/pricing/ >, Jul. 17, 2017, 5 pages.

"Making sense of IoT", (Internet of Things)—the IoT business guide, May 27, 2015, 61 pages.

"Scikit-Learn: Machine Learning in Python", from Wayback Machine, http://web.archive.org/web/20210525051513/https://scikit-learn.org/stable/, retrieved from the internet on Jun. 1, 2021, May 25, 2021, 2 pages.

"Scikit-learn: machine learning in Python", from Wayback Machine, http://web.archive.org/web/20190228205841/https://scikit-learn.org/stable/, retrieved from the internet on Aug. 11, 2021, Feb. 28, 2019, 3 pages.

11202010731V, , "Singapore Application Serial No. 11202010731V, Written Opinion mailed Aug. 11, 2022", Strong Force TX Portfolio 2018, LLC, 8 pages.

11202104329S, , "Singapore Application No. 11202104329S, Search Report mailed Mar. 6, 2023", Strong Force TX Portfolio 2018, LLC, 9 page.

11202104330X, , "Singapore Application No. 11202104330X, Written Opinion mailed Apr. 4, 2023", Strong Force TX Portfolio 2018, LLC, 12 pages.

19799943.6, , "European Application Serial No. 19799943.6, Extended European Search Report mailed Apr. 25, 2022", Strong Force TX Portfolio 2018, LLC, 13 pages.

19799943.6, , "European Application Serial No. 19799943.6, Partial Supplementary Search Report, Communication Pursuant to Rule 164(1) EPC mailed Jan. 21, 2022", Strong Force TX Portfolio 2018, LLC, 13 pages.

19878940.6, , "European Application Serial No. 19878940.6, Extended European Search Report mailed Jun. 14, 2022", Strong Force TX Portfolio 2018, LLC, 7 pages.

19880153.2, , "European Application Serial No. 19880153.2, Extended European Search Report mailed May 17, 2022", 10 pages.

Abji, N. et al., "An auction-based approach to spectrum allocation using multi-agent reinforcement learning", 21st Annual IEEE International Symposium on Personal, Indoor and Mobile Radio Communications, Istanbul, Turkey, https://ieeexplore.ieee.org/document/5671682., 2010, pp. 2233-2238.

Anagnoste, Sorin , "The road to intelligent automation in the energy sector", Management Dynamics in the Knowledge Economy 6.3, 2018, pp. 489-502.

Ausubel, Lawrence M. et al., "Using forward markets to improve electricity market design", Utilities Policy 18.4, 6 pages.

Baltaoglu, Sevi et al., "Algorithmic Bidding for Virtual Trading in Electricity Markets", IEEE Journal of Latex Class Files vol. 14 No. 8, Aug. 2015, 12 pages.

Bashir, Imran , "Mastering Blockchain", Packt Publishing, XP055872144JSBN: 978-1-78712-544-5pages ToC, 16-29,358-368, Mar. 17, 2017, 51 pages.

Bashir, Imran , "Mastering Blockchain", Packt Publishing, XP055393678, Isbn: 978-1-78712-544-5, Mar. 17, 2017, 531 pages.

Batra, Gaurav et al., "Improving the semiconductor industry through advanced analytics", [online] McKinsey and Company, available at: < https://www.mckinsey.com/industries/semiconductors/our-insights/improving-the-semiconductor-industry-through-advanced-analytics, Mar. 11, 2016, 18 pages.

Berka, P. , "Using The LISp-Miner System For Credit Risk Assessment", Neural Network World 26.5: Czech Technical University, Prague., 2016, 22 pages.

Bernard, Marr , "What is Digital Twin Technology, and why is it so important?", Forbes.com [online], available at: < https://www.forbes.com/sites/bernardmarr/2017/03/06/what-is-digital-twin-technology-and- why-is-it-so-important/?sh=54de02dd2e2a >, Mar. 6, 2017, 5 pages.

Berry, David , "The market for tradable renewable energy credits", Ecological Economics, vol. 42, Issue 3 ISSN 0921-8009, (https://www.sciencedirect.com/science/article/pii/S0921800902001283), 2002, pp. 369-379.

(56) References Cited

OTHER PUBLICATIONS

Bessembinder, Hendrik et al., "Equilibrium Pricing and Optimal Hedging in Electricity Forward Markets", The Journal of Finance, vol. LVII, No. 3,, Jun. 2002, 37 pages.
Bird, et al., "Distributed (green) data centers: A new concept for energy, computing, and telecommunications", 2013 International Energy Initiative published by Elsevier Inc., 2013, pp. 83-91.
Bis, , "What is distributed ledger technology", available at: < https://www.bis.org/publ/qtrpdf/r_qt1709y.htm, Sep. 2017, 3 pages.
Bitcointaxesapi, , "Integrate BitcoinTaxes into wallets or exchanges", available at: < https://web.archive.Org/web/20170618155341/https://bitcoin.tax/api >, Jun. 18, 2017, 8 pages.
Cain, Collin et al., "A Common Sense Guide to Wholesale Electric Markets", [online] Published Apr. 2007, available at: < https://www.bateswhite.com/media/publication/55_media.741 .pdf >, 2017, 42 pages.
Cant, Bart et al., "Smart Contracts in Financial Services: Getting from Hype to Reality", Capgemini Consulting, 2016, 25 pages.
Capgemini Report, , "Smart Contracts in Financial Services: getting from Hype to Reality", 2016, pp. 1-25.
Chance, C. , "Are Smart Contracts Contracts? Talking Tech looks at the Concepts and Realities of Smart Contracts", 2017, 9 pages.
Cheng, Meng et al., "Benefits of using virtual energy storage system for power system frequency response", Applied Energy 194, pp. 376-385.
Chinthalapati, V.L. Raju et al., "A Simultaneous Deterministic Pertubation Actor-Critic Algorithm with an Application to Optimal Mortgage Refinancing,", 45th IEEE Conference on Decision & Control, Dec. 2006, pp. 4151-4156.
Clark, Birgit , "Blockchain and IP Law: A Match Made in Crypto Heaven", [online], WIPO Magazine, published Feb. 2018, available at: < https://www.wipo.int/wipo_magazine/en/2018/01/article_0005.html >, 2018, 6 pages.
CME Group, , "Trading the Curve in Energies", [online] CME Group, published on Jul. 10, 2017, available at: < https:// www.cmegroup.com/education/whitepapers/trading-the-curve-in-energies.html >, Jul. 10, 2017, 4 pages.
Crozter, Daniel V. , "Energy Storage Myths", Fractal [online], available at: < https://www.energystorageconsultants.com/energy-storage-arbitrage/, Jun. 17, 2016, 6 pages.
Dieterich, Vincent et al., "Application of Blockchain Technology in the Manufacturing Industry", Frankfurt School Blockchain Center, Germany, Nov. 30, 2017, pp. 1-23.
Dineshreddy, Vemula et al., "Towards on "Internet of Things" Framework for Financial Services Sector", IEEE Xplore, 3rd International Conference on Recent Advances in Information Technology(RAIT-2016)., Jul. 9, 2016, 5 pages.
Dineshreddy, Vemula et al., "Towards on "Internet of Things" Framework for Financial Services Sector", IEEE Xplore, 3rd International Conference on Recent Advances in Information Technology, Mar. 3-5, 2016, 5 pages.
Eckenrode, Jim , "The derivative effect: How financial services can make IoT technology pay off", Deloitte Insights, Oct. 2015, 12 pages.
Fagan, Mark et al., "The Use of Petroleum Futures Markets as a Hedge Tool in Procurement of Railroad Fuel", Transportation Research Forum, 24th Annual Meeting, vol. 24, No. 1, 1983, 12 pages.
Fan, Sizheng et al., "Hybrid blockchain-based resource trading system for federated learning in edge computing", IEEE Internet of Things Journal, 8(4), 2020, 2252-2264.
Fang, Xuewei et al., "Study on Metal Deposit in the Fused-coating Based Additive Manufacturing", Procedia Cirp, vol. 55, XP055872287,NL ISSN: 2212-8271, DOI: 10.1016/j.procir.2016.08.034Retrieved from the Internets RL:https://www.sciencedirect.com/science/article/pii/S2212827116309234, Oct. 6, 2016, pp. 115-121.
Forbes, Alex , "Time to Befriend the Digital Twins", available at: < https://www.ge.com/power/transform/article.transform.articles.2017.oct.time-to-befriend-the-digital-t >, Oct. 30, 2017, 5 pages.
Fujiwara, Ikki et al., "Applying double-sided combinational auctions to resource allocation in cloud computing", 10th IEEE/IPSJ International Symposium on Applications and the Internet. IEEE,, 2010, 8 pages.
Gupta, Yachna et al., "A software for insurance consultancy", 2013 International Conference on Advances in Computing, Communications and Informatics (ICACCI), Aug. 22-25, 2013, pp. 1288-1292.
Heap, Imogen , "Blockchain could help musicians make money again", https://hbr.org/2017/06/blockchain-could-help-musicians-make-money-again, 2017, 7 pages.
Holliday, Joanne et al., "Epidemic algorithms for replicated databases", IEEE Transactions on Knowledge and Data Engineering (vol. 15 Issue 5), Sep./Oct. 2003, pp. 1218-1238.
Infosys Whitepaper, , "Robotic Process Automation (RPA) To Accelerate Mortgage Processing", 2018, pp. 1-8.
Isaja, Mauro et al., "Distributed ledger technology for decentralization of manufacturing processes", IEEE Industrial Cyber-Physical Systems (ICPS), May 15-18, 2018, pp. 696-701.
Janiesch, Christian et al., "The Internet-of-Things Meets Business Process Management: Mutual Benefits and Challenges", retrieved from internet, https://arxiv.org/abs/1709.03628., Sep. 11, 2017, 9 pages.
Javed, Barkha et al., "Cloud Market Maker: An automated dynamic pricing marketplace for cloud users", Future Generation Computer Systems, vol. 54 https://www.sciencedirect.com/science/article/pii/S0167739X15002058., 2016, 16 pages.
Jin, Yu et al., "A Data-Driven Approach to Predict Default Risk of Loan for Online Peer-to-Peer (P2P) Lending", 2015 Fifth International Conference on Communication Systems and Network Technologies, Apr. 4-6, 2015, pp. 609-613.
Kelly-Detwiler, Peter , "Stem Adding Artifical Intelligence to Storage and Branching out to New Markets", Forbes.com [online], available at: < https://www.forbes.com/sites/peterdetwiler/2018/01/08/stem-adding-artificial-intelligence-to-storage-and-branching-out-to-new-markets/ (Year: 2018), Jan. 8, 2018, 7 pages.
Krishnamurthy, Dheepak et al., "Energy Storage Arbitrage Under Day-Ahead and Real-Time Price Uncertainty", IEEE Transactions on Power Systems, vol. 33, No. 1, Jan. 2008, 10 pages.
Kumar, S.F.P. et al., "Robotic Process Automation (RPA) to Accelerate Mortgage Processing", Infosys Limited, Bengaluru, India, 2018, 8 pages.
Kuo, Ping-Huan et al., "An electricity price forecasting model by hybrid structured deep neural networks", Sustainability 10.4, Apr. 21, 2018, 17 pages.
Lacity, Mary et al., "Robotic process automation: mature capabilities in the energy sector", 2015, 19 Pages.
Leber, Jessica , "Can a Credit Score be Crowdsourced ?", MIT Technology Review, Jun. 7, 2012, 4 pages.
Lee, et al., "Blockchain-based secure firmware update for embedded devices in an Internet of Things environment", 2017, pp. 1152-1167.
Leonhard, Robert D. et al., "Developing Renewable Energy Credits as Cryptocurrencies on Ethereum's Blockchain", Social Science Research Network, 2016, pp. 1-15.
Lu, Yuan et al., "ZebraLancer: Private and Anonymous Crowdsourcing System atop Open Blockchain", New Jersey Institute of Technology, arXiv:1803.01256v1, Mar. 3, 2018, 16 pages.
Luo, Liang et al., "A resource scheduling algorithm of cloud computing based on energy efficient optimization methods", 2012 International Green Computing Conference (IGCC). IEEE, 2012, 6 pages.
Malini, A. et al., "Technological innovations in the banking sector in India: An analysis", 2017 International Conference on Technological Advancements in Power and Energy (TAP Energy), 2017, pp. 1-5.
Memos, Dimitris , "Shaking up the Maritime Industry through Open Data and Crowdsourcing", International Journal of Digital Business, vol. 2017, Issue 1, Apr. 2017, pp. 1-16.
Min, Zaw et al., "Facilities management added value in closing the energy performance gap", International Journal of Sustainable Built Environment, 2016, 23 pages.
Namvar, Anahita et al., "Credit risk prediction in an imbalanced social lending environment", retrieved from the internet, https://doi.org/10.48550/arXiv.1805.00801, 2018, pp. 1-11.

(56) References Cited

OTHER PUBLICATIONS

O'Donovan, Caroline , "What If You Could Crowdsource A Loan", Buzzfeed News, Apr. 17, 2015, 5 pages.
Ogiela, Marek R. et al., "Security of Distributed Ledger Solutions Based on Blockchain Technologies", IEEE 32nd International Conference on Advanced Information Networking and Applications (AINA), May 2018, pp. 1089-1095.
PCT/US19/58647, , "International Application Serial No. PCT/US19/58647, International Preliminary Report on Patentability mailed May 14, 2021", Strong Force TX Portfolio 2018, LLC, 21 pages.
PCT/US19/58647, , "International Application Serial No. PCT/US19/58647, International Search Report and Written Opinion mailed Jul. 7, 2020", Strong Force TX Portfolio 2018, LLC, 27 pages.
PCT/US19/58647, , "International Application Serial No. PCT/US19/58647, Invitation to Pay Additional Fees and, Where Applicable, Protest Fee mailed Apr. 24, 2020", Strong Force TX Portfolio 2018, LLC, 7 pages.
PCT/US19/58671, , "International Application Serial No. PCT/US19/58671, International Preliminary Report on Patentability mailed May 14, 2021", Strong Force TX Portfolio 2018, LLC, 15 pages.
PCT/US19/58671, , "International Application Serial No. PCT/US19/58671, International Search Report and Written Opinion mailed Jul. 7, 2020", Strong Force TX Portfolio 2018, LLC, 21 pages.
PCT/US19/58671, , "International Application Serial No. PCT/US19/58671, Invitation to Pay Additional Fees and, Where Applicable, Protest Fee mailed Apr. 24, 2020", 7 pages.
PCT/US2019/030934, , "International Application Serial No. PCT/US2019/030934, International Preliminary Report on Patentability mailed Nov. 10, 2020", Strong Force TX Portfolio 2018, LLC, 77 pages.
PCT/US2019/030934, , "International Application Serial No. PCT/US2019/030934, International Search Report and Written Opinion mailed Oct. 11, 2019", Strong Force TX Portfolio 2018, LLC, 89 pages.
PCT/US2019/030934, , "International Application Serial No. PCT/US2019/030934, Invitation to Pay Additional Fees mailed Jul. 30, 2019", Strong Force TX Portfolio 2018, LLC, 8 pages.
PCT/US2021/016473, , "International Application Serial No. PCT/US2021/016473, International Preliminary Report on Patentability mailed Aug. 18, 2022", Strong Force TX Portfolio 2018, LLC, 13 pages.
PCT/US2021/016473, , "International Application Serial No. PCT/US2021/016473, International Search Report and Written Opinion mailed May 24, 2021", Strong Force TX Portfolio 2018, LLC, 18 pages.
PCT/US2021/016473, , "International Application Serial No. PCT/US2021/016473, Invitation to Pay Additional Fees mailed Mar. 18, 2021", Strong Force TX Portfolio 2018, LLC, 3 pages.
PCT/US2021/042050, , "International Application Serial No. PCT/US2021/042050, International Preliminary Report on Patentability mailed Jan. 26, 2023", Strong Force TX Portfolio 2018, LLC, 12 pages.
PCT/US2021/042050, , "International Application Serial No. PCT/US2021/042050, International Search Report and Written Opinion mailed Sep. 24, 2021", Strong Force TX Portfolio 2018, LLC, 18 pages.
PCT/US2021/064029, , "International Application Serial No. PCT/US2021/064029, International Preliminary Report on Patentability mailed Jun. 13, 2023", Strong Force TX Portfolio 2018, LLC, 23 pages.
PCT/US2021/064029, , "International Application Serial No. PCT/US2021/064029, International Search Report and Written Opinion mailed Jul. 1, 2022", Strong Force TX Portfolio 2018, LLC, 36 pages.
PCT/US2021/064029, , "International Application Serial No. PCT/US2021/064029, Invitation to Pay Additional Fees and, Where Applicable, Protest Fee mailed Mar. 16, 2022", Strong Force TX Portfolio 2018, LLC, 3 pages.
PCT/US2022/021783, , "International Application Serial No. PCT/US2022/021783, International Search Report and Written Opinion mailed Jul. 7, 2022", Strong Force TX Portfolio 2018, LLC, 13 pages.
Pon, Bruce , "Blockchain will usher in the era of decentralised computing", LSE Business Review, 2016, pp. 1-5.
Raza, Muhammad Q. et al., "A review on artificial intelligence based load demand forecasting techniques for smart grid and buildings", Renewable and Sustainable Energy Reviews 50, Jun. 2015, pp. 1352-1372.
Reddy, Y.B et al., "Hybrid Approach for Spectrum Bidding in Wireless Communications for Maximizing the Profit", Fifth International Conference on Information Technology: New Generations, https://ieeexplore.ieee.org/document/4492503., 2008, pp. 341-341.
Ren, et al., "Carbon-Aware Energy Capacity Planning for Datacenters", IEEE; (Ren_2012.pdf;, 2012, pp. 391-400.
Ren, Qilei et al., "Intelligent design and implementation of blockchain and Internet of things-based traffic system", International Journal of Distributed Sensor Networks, 15(8), 1550147719870653., 2019, 12 pages.
Rooney, Kate , "Your Guide to Cryptocurrency Regulations Around the World and Where They are Headed", CNBC.com, Mar. 27, 2018, pp. 1-13.
Sandner, Philipp et al., "Application of Blockchain Technology in the Manufacturing Industry", Frankfurt School Blockchain Center Internet Article, XP055872401 .Retrieved from the Internet:URL:http://explore-ip.com/2017_Blockchain-Technology-in-Manufacturing.pdf [retrieved on Dec. 13, 2021], Nov. 18, 2017, 23 pages.
Saraf, Chinmay et al., "Blockchain platforms: A compendium", IEEE International Conference on Innovative Research and Development (ICIRD), 2018, pp. 1-6.
Shah, Agam , "The Chain Gang", XP055872061 Retrieved from the Internets RL:https://asmedigitalcollection.asme.org/memagazineselect/article/140/05/30/369470/The-Chain-GangManufacturing-supply-chains-aremore [retrieved on Dec. 13, 2021], May 1, 2018, 13 pages.
Shakhatreh, Hazim et al., "Unmanned Aerial Vehicles: A Survey on Civil Applications and Key Research Challenges", arxiv.org, Cornell University Library, 201 Olin Library Cornell University Ithaca, NY 14853, Apr. 19, 2018, 58 pages.
Shields, Ronan , "Media futures trading is one step closer as NIYIAX raises $5.6M", The Drum, [retrieved from the internet on Dec. 19, 2020 <URL:https://www.thedrum.com/news/2017/10/19/media-futures trading-one-step-closer-nyiax-raises-56m> (Year: 2017), Oct. 19, 2017, 6 pages.
Spector, Julian , "Selling Energy Storage when the Economics Don't Work", [online], available at: < https://www.greentechmedia.com/articles/read/how-to-sell-energystorage-when-the-economics-dont-work >, Sep. 14, 2016, 4 pages.
spencepc.com, , "Four Types of Intellectual Property for Business", viewed at https://www.spencepc.com/intellectual-property-basics/four-types-of-intellectual-property-for-businesses/, Apr. 4, 2016, 3 pages.
Stocker, Carsten et al., "Erfahrungsbericht Genesis of Things Project Ansätze und Herausforderungen bei der Integration von Blockchain in der additiven Fertigung und Geschäftsmodelle", www.digitaletechnologien.deINTERNET ARTICLE, XP055872377, Retrieved from the Internet URL:https://www.digitaletechnologien.de/DT/Redaktion/DE/Downloads/2018-paice-hmiworkshop-vortrag-Blechschmidt-St°/0C3%B6ckert.pdf? blob=publicationFile&v=2, Apr. 24, 2018, 11 pages.
Subramanian, A et al., "Real-Time Scheduling of Deferrable Electric Loads", 2012 American Control Conference. Jun. 27-29, 2012, 8 pages.
Szabo, Nick et al., "Smart Contracts: 12 Use Cases for Business & Beyond", Chamber of Digital Commerce, Dec. 2016, 56 pages.
Tatsubori, Michiaki et al., "Opportunistic Adversaries: On Imminent Threats to Learning-Based Business Automation", 2012 Annual SRII Global Conference, San Jose, CA, USA, 2012, pp. 120-129.
Taylor, Patrick , "The Robots are coming to Corporate Finance", Forbes Technology Council, May 1, 2018, pp. 1-5.
Trouton, Stuart et al., "3D opportunity for blockchain", DeloitteInternet Article, XP055539847, Retrieved from the InternetsRL:https://

(56) References Cited

OTHER PUBLICATIONS www2.deloitte.com/content/dam/insights/US/articles/3255_3Dopportunity_blockchain/DUP_3D-opportunity_blockchain.pdf [retrieved on Jan. 9, 2019], Nov. 17, 2016, 20 pages.
Tso, Fung P. et al., "Network and server resource management strategies for data centre infrastructures", A survey, Computer Networks, vol. 106, https://www.sciencedirect.com/science/article/pii/S1389128616302298., 2019, pp. 209-222.
Ullah, Qazi Z. et al., "Adaptive resource utilization prediction system for infrastructure as a service cloud", Computational intelligence and neuroscience 2017, Jul. 25, 2017, 13 pages.
Vagropoulos, Stylianos et al., "Optimal Bidding Strategy for Electric Vehicle Aggregators in Electricity Markets", IEEE Transactions on Power Systems. vol. 28, No. 4, Nov. 4, 2013, 11 pages.
Valk, "A Taxonomy of Digital Twins", May 8, 2020, pp. 1-10.
Wang, Qing et al., "Dynamic Spectrum Allocation under Cognitive Cell Network for M2M Applications", 2012 Conference Record of the Forty Sixth Asilomar Conference on Signals, Systems and Computers (Asilomar), doi: 10.1109/ACSSC.2012.6489076., 2012, pp. 596-600.
Wang, Yibai et al., "Loan Chain: A Blockchain-Based Framework for Smart Credit Lending.", In Proceedings of the 2022 4th Blockchain and Internet of Things Conference, 2022, pp. 11-15.
Will, Christian et al., "Defining a day-ahead spot market for unbundled time-specific renewable energy certificates", 14th International Conference on the European Energy Market (EEM), Dresden, Germany, 2017, pp. 1-6.
Zeng, Yaxiong et al., "Distributed solar renewable generation: Option contracts with renewable energy credit uncertainty", Energy Economics, vol. 48, https://www.sciencedirect.com/science/article/pii/S0140988314003302, 2015, pp. 295-305.
Zhao, D. et al., "Pricing-based energy storage sharing and virtual capacity allocation", IEEE International Conference on Communications (ICC), Paris, France, https://ieeexplore.ieee.org/document/7997120., 2017, pp. 1-6.
"Wikipedia definition Cryptographic Splitting", https://en.wikipedia.Org/wiki/Cryptographic_splitting#cite_note-patent-1, 2023, 2 pages.
11202010731V , "Singapore Application Serial No. 11202010731V, Written Opinion; date mailed Jan. 23, 2024", Strong Force TX Portfolio 2018, LLC, 7 pages.
11202104329S , "Singapore Application Serial No. 11202104329S, Second Written Opinion; date mailed Jun. 24, 2024", Strong Force TX Portfolio 2018, LLC, 7 pages.
21750846.4 , "European Application Serial No. 21750846.4, Extended European Search Report mailed Feb. 21, 2024", Strong Force TX Portfolio 2018, LLC, 7 pages.
Freshfields Bruckhaus Deringer , "What's in a Smart Contract", Lexology, URL: < https://www.lexology.com/library/detail.aspx?g=bac0889f-b321-444b-8227-7d3a904a83d2>, Feb. 5, 2018, 3 pages.
Gupta, Prashant , "Regularization in Machine Learning", available at: < https://towardsdatascience.com/regularization-in-machine-learning-76441ddcf99a >, 2017, 12 pages.
Liang, Chengwu , et al., "Multi-Modal Human Action Recognition With Sub-Action Exploiting and Class-Privacy Preserved Collaborative Representation Learning", IEEE Access, vol. 8, 2020, pp. 39920-39933.
Malaty, Elsa , "3D Printing and IP law", WIPO Magazine [online], available at: <https://www.wipo.int/ wipo_magazine/en/2017/01/article_0006.html > (Year: 2017), Jan. 2017, 6 pages.
Oustry, Francois , "Blockchain based Solutions for Intellectual Property Management", medium.com [online] available at: <https://medium.com/@foustry/blockchain-based-solutions-for-intellectual-property-management-2ba14b51d5f6 >, May 21, 2017.
PCT/US2022/021783 , "International Application Serial No. PCT/US2022/021783, International Preliminary Report on Patentability mailed Oct. 5, 2023", Strong Force TX Portfolio 2018, LLC, 9 pages.
Wong, Steve , et al., "Blockchain & the Hollywood Supply Chain", SMPTE 2017 Annual Technical Conference and Exhibition, Hollywood & Highland, Los Angeles, CA, USA, 2017, pp. 1-5.
Xu, R. , et al., "Design of Network Media's Digital Rights Management Scheme Based on Blockchain Technology", 2017 IEEE 13th International Symposium on Autonomous Decentralized System (ISADS), Bangkok, Thailand, 2017, pp. 128-133.
21841333.4 , "European Application Serial No. 21841333.4, Extended European Search Report mailed Aug. 30, 2024", Strong Force TX Portfolio 2018, LLC, 12 pages.
Oliveira, Hugo Miguel Lopes , "Development, Programming and Start-Up of an Interchangeable 3D-Printing Module", ProQuest Dissertations & Theses, 2017, 75 pages.

* cited by examiner

5100

5200

SYSTEMS AND METHODS FOR FORWARD MARKET PURCHASE OF MACHINE RESOURCES

CROSS REFERENCE TO RELATED APPLICATIONS

This application is a continuation of U.S. patent application Ser. No. 16/696,457 filed Nov. 26, 2019, entitled "SYSTEMS AND METHODS FOR FORWARD MARKET PURCHASE OF MACHINE RESOURCES," now published as U.S Patent Publication No. 2020-0098059.

U.S. patent application Ser. No. 16/696,457 is a continuation of U.S. patent application Ser. No. 16/457,890, filed Jun. 28, 2019, entitled "TRANSACTION-ENABLING SYSTEMS AND METHODS FOR USING A SMART CONTRACT WRAPPER TO ACCESS EMBEDDED CONTRACT TERMS," published as U.S. Patent Publication No. 2019-0340715.

U.S. patent application Ser. No. 16/457,890 is a bypass continuation of International Application Serial No. PCT/US2019/030934 (SFTX-0004-WO), filed May 6, 2019, entitled "METHODS AND SYSTEMS FOR IMPROVING MACHINES THAT AUTOMATE EXECUTION OF DISTRIBUTED LEDGER AND OTHER TRANSACTIONS IN SPOT AND FORWARD MARKETS FOR ENERGY, COMPUTE, STORAGE AND OTHER RESOURCES," WIPO publication 2019/217323.

International Application Serial No. PCT/US2019/030934 (SFTX-0004-WO) claims the benefit of priority to the following U.S. Provisional Patent Applications: Ser. No. 62/787,206, filed Dec. 31, 2018, entitled "METHODS AND SYSTEMS FOR IMPROVING MACHINES AND SYSTEMS THAT AUTOMATE EXECUTION OF DISTRIBUTED LEDGER AND OTHER TRANSACTIONS IN SPOT AND FORWARD MARKETS FOR ENERGY, COMPUTE, STORAGE AND OTHER RESOURCES"; Ser. No. 62/667,550, filed May 6, 2018, entitled "METHODS AND SYSTEMS FOR IMPROVING MACHINES AND SYSTEMS THAT AUTOMATE EXECUTION OF DISTRIBUTED LEDGER AND OTHER TRANSACTIONS IN SPOT AND FORWARD MARKETS FOR ENERGY, COMPUTE, STORAGE AND OTHER RESOURCES"; and Ser. No. 62/751,713, filed Oct. 29, 2018, entitled "METHODS AND SYSTEMS FOR IMPROVING MACHINES AND SYSTEMS THAT AUTOMATE EXECUTION OF DISTRIBUTED LEDGER AND OTHER TRANSACTIONS IN SPOT AND FORWARD MARKETS FOR ENERGY, COMPUTE, STORAGE AND OTHER RESOURCES."

Each of the foregoing applications is incorporated herein by reference in its entirety.

BACKGROUND

Machines and automated agents are increasingly involved in market activities, including for data collection, forecasting, planning, transaction execution, and other activities. This includes increasingly high-performance systems, such as used in high-speed trading. A need exists for methods and systems that improve the machines that enable markets, including for increased efficiency, speed, reliability, and the like for participants in such markets.

Many markets are increasingly distributed, rather than centralized, with distributed ledgers like Blockchain, peer-to-peer interaction models, and micro-transactions replacing or complementing traditional models that involve centralized authorities or intermediaries. A need exists for improved machines that enable distributed transactions to occur at scale among large numbers of participants, including human participants and automated agents.

Operations on blockchains, such as ones using cryptocurrency, increasingly require energy-intensive computing operations, such as calculating very large hash functions on growing chains of blocks. Systems using proof-of-work, proof-of-stake, and the like have led to "mining" operations by which computer processing power is applied at a large scale in order to perform calculations that support collective trust in transactions that are recorded in blockchains.

Many applications of artificial intelligence also require energy-intensive computing operations, such as where very large neural networks, with very large numbers of interconnections, perform operations on large numbers of inputs to produce one or more outputs, such as a prediction, classification, optimization, control output, or the like.

The growth of the Internet of Things and cloud computing platforms have also led to the proliferation of devices, applications, and connections among them, such that data centers, housing servers and other IT components, consume a significant fraction of the energy consumption of the United States and other developed countries.

As a result of these and other trends, energy consumption has become a major factor in utilization of computing resources, such that energy resources and computing resources (or simply "energy and compute") have begun to converge from various standpoints, such as requisitioning, purchasing, provisioning, configuration, and management of inputs, activities, outputs, and the like. Projects have been undertaken, for example, to place large scale computing resource facilities, such as Bitcoin™ or other cryptocurrency mining operations, in close proximity to large-scale hydropower sources, such as Niagara Falls.

A major challenge for facility owners and operators is the uncertainty involved in optimizing a facility, such as resulting from volatility in the cost and availability of inputs (in particular where less stable renewable resources are involved), variability in the cost and availability of computing and networking resources (such as where network performance varies), and volatility and uncertainty in various end markets to which energy and compute resources can be applied (such as volatility in cryptocurrencies, volatility in energy markets, volatility in pricing in various other markets, and uncertainty in the utility of artificial intelligence in a wide range of applications), among other factors.

A need exists for a flexible, intelligent energy and compute facility that adjust in response to uncertainty and volatility, as well as for an intelligent energy and compute resource management system, such as one that includes capabilities for data collection, storage and processing, automated configuration of inputs, resources and outputs, and learning on a training set of facility outcomes, facility parameters, and data collected from data sources to train an artificial intelligence/machine learning system to optimize various relevant parameters for such a facility.

SUMMARY

Systems for forward market purchase of machine resources are disclosed. An example transaction-enabling system may include a fleet of machines, each one of the fleet of machines having a resource requirement comprising at least one of a plurality of machine-related resources and a controller. The controller may include an intelligent agent circuit to aggregate data for the plurality of machine-related resources from at least one data source comprising an external data source or an internal data source; an expert system circuit to configure a purchase of at least one of the plurality of machine-related resources; and a machine resource acquisition circuit to automatically solicit the configured purchase of the at least one of the plurality of machine-related resources in a forward market for at least one resource of the plurality of machine-related resources.

Certain further aspects of an example system are described following, any one or more of which may be present in certain embodiments. An example system may include wherein the expert system circuit is further configured to identify a timing of the configured purchase, wherein the timing is based at least in part on the aggregated data.

An example system may include wherein the machine resource acquisition circuit is further structured to automatically solicit the configured purchase in response to the identified timing.

An example system may include wherein the intelligent agent circuit comprises a system selected from a group consisting of: a simple reflex system, a model-based reflex system, a goal-based system, a utility-based system, a learning system, an embodied system, a fuzzy system, or a data mining system.

An example system may include wherein the at least one data source comprises the external data source, and wherein the external data source is selected from a list consisting of a market condition data source, a behavioral data source, an agent data source, and a historical outcome data source.

An example system may include wherein the expert system circuit is further structured to determine a machine-related resource acquisition value, and to configure the purchase in response to the machine-related resource acquisition value.

An example system may include wherein the determination of the machine-related resource acquisition value is based in part on a datum selected from the list consisting of: an expected cost range, a cost parameter of a machine resource, an effectiveness parameter of a machine resource, or a future predicted cost of one of the machine related resource.

An example system may include wherein the expert system circuit is further structured to determine the machine-related resource acquisition value in response to a comparison of a first cost of the machine-related resource on a spot market of the machine-related resource with a cost parameter of the machine-related resource.

An example system may include wherein the expert system circuit is further structured to improve a future purchase configuration or timing identification based on a data set comprising outcomes resulting from purchases made under historical input conditions.

An example system may include wherein the at least one data source comprises the external data source, and wherein the external data source is selected from a list consisting of a bot, a crawler, and a dialog manager.

Methods for forward market purchase of machine resources are disclosed. An example method may include interpreting a resource requirement for a fleet of machines, wherein each machine of the fleet of machines comprises a requirement of at least one of a plurality of machine-related resources; aggregating data from a data source comprising at least one of an external data source or an internal data source, wherein the aggregated data comprises data related to at least one of the plurality of machine-related resources; operating an intelligent agent to configure a purchase of at least one of the plurality of machine-related resources in response to the resource requirement and the aggregated data; and soliciting the configured purchase of the at least one of the machine-related resources on a forward market for the at least one of the plurality of machine-related resources.

Certain further aspects of an example method are described following, any one or more of which may be present in certain embodiments. An example method may further include identifying a timing of the configured purchase.

An example method may include wherein soliciting the configured purchase comprises soliciting in response to the identified timing.

An example method may include identifying the timing of the configured purchase comprises determining a supply of and a demand for the machine-related resource, based at least in part on the aggregated data.

An example method may further include determining a machine-related resource acquisition value, and configuring the purchase further in response to the machine-related resource acquisition value.

An example method may include wherein determining the machine-related resource acquisition value comprises comparing a first cost of the machine-related resource on a spot market for the resource with a cost parameter of the machine-related resource.

An example method may further include performing a machine-related resource transaction in response to the machine-related resource acquisition value.

An example method may include wherein performing the machine-related resource transaction comprises an operation selected from a list of operations consisting of purchasing the machine-related resource, selling the machine-related resource, making an offer to sell the machine-related resource, and making an offer to purchase the machine-related resource.

An example method may include wherein determining the machine-related resource acquisition value is based in part on a datum selected from a list consisting of: an expected cost range, a cost parameter of a machine-related resource, an effectiveness parameter of a machine-related resource, and a future predicted cost of at least one of the plurality of machine-related resources.

An example method may further include improving the configuring the purchase based on a data set comprising outcomes resulting from purchases made under historical input conditions.

Machine learning potentially enables machines that enable or interact with automated markets to develop understanding, such as based on IoT data, social network data, and other non-traditional data sources, and execute transactions based on predictions, such as by participating in forward markets for energy, compute, advertising, and the like. Blockchain and cryptocurrencies may support a variety of automated transactions, and the intersection of blockchain and AI potentially enables radically different transaction infrastructure. As energy is increasingly used for computation, machines that efficiently allocate available energy sources among storage, compute, and base tasks become possible. These and other concepts are addressed by the methods and systems disclosed herein.

The present disclosure describes a transaction-enabling system including a smart contract wrapper, the contract wrapper according to one disclosed non-limiting embodiment of the present disclosure may be configured to access a distributed ledger including a plurality of embedded contract terms and a plurality of data values, interpret an access request value for the plurality of data values, and, in response to the access request value, provide access to at least a portion of the plurality of data values, and commit an entity providing the access request value to at least one of the plurality of embedded contract terms.

A further embodiment of any of the foregoing embodiments of the present disclosure may include situations wherein the plurality of data values includes intellectual property (IP) data corresponding to a plurality of IP assets, and wherein the plurality of embedded contract terms includes a plurality of intellectual property (IP) licensing terms for the corresponding plurality of IP assets.

A further embodiment of any of the foregoing embodiments of the present disclosure may include situations wherein the smart contract wrapper is further configured to commit the entity providing the access request value to corresponding IP licensing terms for accessed ones of the plurality of IP assets.

A further embodiment of any of the foregoing embodiments of the present disclosure may include situations wherein the smart contract wrapper is further configured to interpret an IP description value and an IP addition request, and to add additional IP data to the plurality of data values in response to the IP description value and the IP addition request, wherein the additional IP data includes IP data corresponding to an additional IP asset.

A further embodiment of any of the foregoing embodiments of the present disclosure may include situations wherein the plurality of data values further includes a plurality of owning entities corresponding to the plurality of IP assets, and wherein the smart contract wrapper is further configured to apportion royalties from the plurality of IP assets to the plurality of owning entities in response to the corresponding IP licensing terms.

A further embodiment of any of the foregoing embodiments of the present disclosure may include situations wherein the smart contract wrapper is further configured to: interpret an IP description value, an IP addition request, and an IP addition entity, add additional IP data to the plurality of data values in response to the IP description value and the IP addition request, commit the IP addition entity to the IP licensing terms, and further apportion royalties from the plurality of IP assets to the plurality of owning entities in response to the additional IP data and the IP addition entity.

A method for executing a smart contract wrapper for a distributed ledger may include accessing a distributed ledger including a plurality of embedded contract terms and a plurality of data values, interpreting an access request value for the plurality of data values, and, in response to the access request value, providing access to at least a portion of the plurality of data values, and committing an entity providing the access request value to at least one of the plurality of embedded contract terms.

A further embodiment of any of the foregoing embodiments of the present disclosure may further include including providing the entity providing the access request value with a user interface including a contract acceptance input, and wherein the providing access and committing the entity is in response to a user input on the user interface.

A further embodiment of any of the foregoing embodiments of the present disclosure may further include including providing an access option to the user interface, and adjusting at least one of the providing access and the committed contract terms in response to a user input on the user interface responsive to the access option.

A further embodiment of any of the foregoing embodiments of the present disclosure may include situations wherein the plurality of data values includes intellectual property (IP) data corresponding to a plurality of IP assets, and wherein the plurality of embedded contract terms includes a plurality of intellectual property (IP) licensing terms for the corresponding plurality of IP assets.

A further embodiment of any of the foregoing embodiments of the present disclosure may further include committing the entity providing the access request value to corresponding IP licensing terms for accessed ones of the plurality of IP assets.

A further embodiment of any of the foregoing embodiments of the present disclosure may further include interpreting an IP description value and an IP addition request, and adding additional IP data to the plurality of data values in response to the IP description value and the IP addition request, wherein the additional IP data includes IP data corresponding to an additional IP asset.

A further embodiment of any of the foregoing embodiments of the present disclosure may include situations wherein the plurality of data values further includes a plurality of owning entities corresponding to the plurality of IP assets, the method further including apportioning royalties from the plurality of IP assets to the plurality of owning entities in response to the corresponding IP licensing terms.

A further embodiment of any of the foregoing embodiments of the present disclosure may further include interpreting an IP description value, an IP addition request, and an IP addition entity, adding additional IP data to the plurality of data values in response to the IP description value and the IP addition request, committing the IP addition entity to the IP licensing terms, and further apportioning royalties from the plurality of IP assets to the plurality of owning entities in response to the additional IP data and the IP addition entity.

A further embodiment of any of the foregoing embodiments of the present disclosure may further include updating a valuation for at least one of the plurality of IP assets, and updating the apportioning royalties from the plurality of IP assets in response to the updated valuation for the at least one of the plurality of IP assets.

A further embodiment of any of the foregoing embodiments of the present disclosure may further include determining that at least one of the plurality of IP assets has expired, and updating the apportioning royalties from the plurality of IP assets in response to the determining that the at least one of the plurality of IP assets has expired.

A further embodiment of any of the foregoing embodiments of the present disclosure may further include determining that an owning entity corresponding to at least one of the plurality of IP assets has changed, and updating the apportioning royalties from the plurality of IP assets in response to the change of the owning entity.

A further embodiment of any of the foregoing embodiments of the present disclosure may further include providing a user interface to a new owning entity of the at least one of the plurality of IP assets where an ownership has changed, and committing the new owning entity to the IP licensing terms in response to a user input on the user interface.

The present disclosure describes a transaction-enabling system including a smart contract wrapper, the smart contract wrapper according to one disclosed non-limiting embodiment of the present disclosure may be configured to access a distributed ledger including a plurality of intellectual property (IP) licensing terms corresponding to a plurality of IP assets, wherein the plurality of IP assets include an aggregate stack of IP, interpret an IP description value and an IP addition request, and, in response to the IP addition request and the IP description value, to add an IP asset to the aggregate stack of IP.

A further embodiment of any of the foregoing embodiments of the present disclosure may include situations wherein the smart contract wrapper is further configured to interpret an IP licensing value corresponding to the IP description value, and to add the IP licensing value to the plurality of IP licensing terms in response to the IP description value and the IP addition request.

A further embodiment of any of the foregoing embodiments of the present disclosure may include situations wherein the smart contract wrapper is further configured to associate at least one of the plurality of IP licensing terms to an added IP asset.

A further embodiment of any of the foregoing embodiments of the present disclosure may further include a data store having a copy of at least one of the IP assets stored thereon, and wherein the aggregate stack of IP further includes a reference to the data store for the at least one of the IP assets.

A method according to one disclosed non-limiting embodiment of the present disclosure may include accessing a distributed ledger including a plurality of intellectual property (IP) licensing terms corresponding to a plurality of IP assets, wherein the plurality of IP assets include an aggregate stack of IP, interpreting an IP description value and an IP addition request, and, in response to the IP addition request and the IP description value, adding an IP asset to the aggregate stack of IP.

A further embodiment of any of the foregoing embodiments of the present disclosure may further include interpreting an IP licensing value corresponding to the IP description value, and adding the IP licensing value to the plurality of IP licensing terms in response to the IP description value and the IP addition request.

A further embodiment of any of the foregoing embodiments of the present disclosure may further include associating at least one of the plurality of IP licensing terms to the added IP asset.

A further embodiment of any of the foregoing embodiments of the present disclosure may further include storing at least one of the IP assets on a data store, and wherein the aggregate stack of IP includes a reference to the stored at least one of the IP assets on the data store.

A further embodiment of any of the foregoing embodiments of the present disclosure may further include apportioning royalties from the plurality of IP assets to a plurality of owning entities corresponding to the aggregate stack of IP in response to the corresponding IP licensing terms.

A further embodiment of any of the foregoing embodiments of the present disclosure may further include interpreting an IP addition entity corresponding to the IP addition request and the IP description value, and committing the IP addition entity to the IP licensing terms.

A further embodiment of any of the foregoing embodiments of the present disclosure may further include apportioning royalties from the plurality of IP assets to the plurality of owning entities in response to the IP addition entity.

A further embodiment of any of the foregoing embodiments of the present disclosure may further include updating a valuation for at least one of the plurality of IP assets, and updating the apportioning royalties from the plurality of IP assets in response to the updated valuation for the at least one of the plurality of IP assets.

A further embodiment of any of the foregoing embodiments of the present disclosure may further include determining that at least one of the plurality of IP assets has expired, and updating the apportioning royalties from the plurality of IP assets in response to the determining that the at least one of the plurality of IP assets has expired.

A further embodiment of any of the foregoing embodiments of the present disclosure may further include determining that an owning entity corresponding to at least one of the plurality of IP assets has changed, and updating the apportioning royalties from the plurality of IP assets in response to the change of the owning entity.

A further embodiment of any of the foregoing embodiments of the present disclosure may further include providing a user interface to a new owning entity of the at least one of the plurality of IP assets where an ownership has changed, and committing the new owning entity to the IP licensing terms in response to a user input on the user interface.

The present disclosure describes a transaction-enabling system including a controller, the controller according to one disclosed non-limiting embodiment of the present disclosure may be configured to: access a distributed ledger including an instruction set, tokenize the instruction set, interpret an instruction set access request, and, in response to the instruction set access request, provide a provable access to the instruction set.

A further embodiment of any of the foregoing embodiments of the present disclosure may include situations wherein the instruction set includes an instruction set for a coating process.

A further embodiment of any of the foregoing embodiments of the present disclosure may include situations wherein the instruction set includes an instruction set for a 3D printer operation.

A further embodiment of any of the foregoing embodiments of the present disclosure may include situations wherein the instruction set includes and instruction set for a semiconductor fabrication process.

A further embodiment of any of the foregoing embodiments of the present disclosure may include situations wherein the instruction set includes a field programmable gate array (FPGA) instruction set.

A further embodiment of any of the foregoing embodiments of the present disclosure may include situations wherein the instruction set includes a food preparation instruction set.

A further embodiment of any of the foregoing embodiments of the present disclosure may include situations wherein the instruction set includes a polymer production instruction set.

A further embodiment of any of the foregoing embodiments of the present disclosure may include situations wherein the instruction set includes a chemical synthesis instruction set.

A further embodiment of any of the foregoing embodiments of the present disclosure may include situations wherein the instruction set includes a biological production instruction set.

A further embodiment of any of the foregoing embodiments of the present disclosure may include situations wherein the instruction set includes an instruction set for a crystal fabrication system.

A further embodiment of any of the foregoing embodiments of the present disclosure may include situations wherein the controller is further configured to interpret an execution operation of the instruction set, and to record a transaction on the distributed ledger in response to the execution operation.

A method may include accessing a distributed ledger including an instruction set, tokenizing the instruction set, interpreting an instruction set access request, and, in response to the instruction set access request, providing a provable access to the instruction set.

A further embodiment of any of the foregoing embodiments of the present disclosure may include situations wherein the instruction set includes an instruction set for a coating process.

A further embodiment of any of the foregoing embodiments of the present disclosure may further include providing commands to a production tool of the coating process in response to the instruction set access request.

A further embodiment of any of the foregoing embodiments of the present disclosure may further include recording a transaction on the distributed ledger in response to the providing commands to the production tool.

A further embodiment of any of the foregoing embodiments of the present disclosure may include situations wherein the instruction set includes an instruction set for a 3D printing process.

A further embodiment of any of the foregoing embodiments of the present disclosure may further include providing commands to a production tool of the 3D printing process in response to the instruction set access request.

A further embodiment of any of the foregoing embodiments of the present disclosure may further include recording a transaction on the distributed ledger in response to the providing commands to the production tool.

A further embodiment of any of the foregoing embodiments of the present disclosure may include situations wherein the instruction set includes an instruction set for a semiconductor fabrication process.

A further embodiment of any of the foregoing embodiments of the present disclosure may further include providing commands to a production tool of the semiconductor fabrication process in response to the instruction set access request.

A further embodiment of any of the foregoing embodiments of the present disclosure may further include recording a transaction on the distributed ledger in response to the providing commands to the production tool.

A further embodiment of any of the foregoing embodiments of the present disclosure may include situations wherein the instruction set includes field programmable gate array (FPGA) instruction set.

A further embodiment of any of the foregoing embodiments of the present disclosure may further include interpreting an execution operation of the FPGA instruction set, and recording a transaction on the distributed ledger in response to the execution operation.

A further embodiment of any of the foregoing embodiments of the present disclosure may include situations wherein the instruction set includes an instruction set for a food preparation process.

A further embodiment of any of the foregoing embodiments of the present disclosure may further include providing commands to a production tool of the food preparation process in response to the instruction set access request.

A further embodiment of any of the foregoing embodiments of the present disclosure may further include recording a transaction on the distributed ledger in response to the providing commands to the production tool.

A further embodiment of any of the foregoing embodiments of the present disclosure may include situations wherein the instruction set includes an instruction set for a polymer production process.

A further embodiment of any of the foregoing embodiments of the present disclosure may further include providing commands to a production tool of the polymer production process in response to the instruction set access request.

A further embodiment of any of the foregoing embodiments of the present disclosure may further include recording a transaction on the distributed ledger in response to the providing commands to the production tool.

A further embodiment of any of the foregoing embodiments of the present disclosure may include situations wherein the instruction set includes an instruction set for a chemical synthesis process.

A further embodiment of any of the foregoing embodiments of the present disclosure may further include providing commands to a production tool of the chemical synthesis process in response to the instruction set access request.

A further embodiment of any of the foregoing embodiments of the present disclosure may further include recording a transaction on the distributed ledger in response to the providing commands to the production tool.

A further embodiment of any of the foregoing embodiments of the present disclosure may include situations wherein the instruction set includes an instruction set for a biological production process.

A further embodiment of any of the foregoing embodiments of the present disclosure may further include providing commands to a production tool of the biological production process in response to the instruction set access request.

A further embodiment of any of the foregoing embodiments of the present disclosure may further include recording a transaction on the distributed ledger in response to the providing commands to the production tool.

A further embodiment of any of the foregoing embodiments of the present disclosure may include situations wherein the instruction set includes an instruction set for a crystal fabrication process.

A further embodiment of any of the foregoing embodiments of the present disclosure may further include providing commands to a production tool of the crystal fabrication process in response to the instruction set access request.

A further embodiment of any of the foregoing embodiments of the present disclosure may further include recording a transaction on the distributed ledger in response to the providing commands to the production tool.

A further embodiment of any of the foregoing embodiments of the present disclosure may further include interpreting an execution operation of the instruction set, and recording a transaction on the distributed ledger in response to the execution operation.

The present disclosure describes a transaction-enabling system including a controller, the controller according to one disclosed non-limiting embodiment of the present disclosure may be configured to access a distributed ledger including executable algorithmic logic, tokenize the executable algorithmic logic, interpret an access request for the executable algorithmic logic, and, in response to the access request, provide a provable access to the executable algorithmic logic.

A further embodiment of any of the foregoing embodiments of the present disclosure may include situations wherein the controller is further configured to provide the executable algorithmic logic as a black box, and wherein the instruction set further includes an interface description for the executable algorithmic logic.

A further embodiment of any of the foregoing embodiments of the present disclosure may include situations wherein the controller is further configured to interpret an execution operation of the executable algorithmic logic, and to record a transaction on the distributed ledger in response to the execution operation.

A further embodiment of any of the foregoing embodiments of the present disclosure may include situations wherein the executable algorithmic logic further includes an application programming interface (API) for the executable algorithmic logic.

The present disclosure describes a method, the method according to one disclosed non-limiting embodiment of the present disclosure may include accessing a distributed ledger including executable algorithmic logic, tokenizing the executable algorithmic logic, interpreting an access request for the executable algorithmic logic, and, in response to the access request, providing a provable access to the executable algorithmic logic.

A further embodiment of any of the foregoing embodiments of the present disclosure may further include providing an interface description for the executable algorithmic logic.

A further embodiment of any of the foregoing embodiments of the present disclosure may further include providing an application programming interface (API) for the executable algorithmic logic.

A further embodiment of any of the foregoing embodiments of the present disclosure may further include interpreting an execution operation of the executable algorithmic logic, and recording a transaction on the distributed ledger in response to the execution operation.

The present disclosure describes a transaction-enabling system including a controller, the controller according to one disclosed non-limiting embodiment of the present disclosure may be configured to access a distributed ledger including a firmware data value, tokenize the firmware data value, interpret an access request for the firmware data value, and, in response to the access request, provide a provable access to a firmware corresponding to the firmware data value.

A further embodiment of any of the foregoing embodiments of the present disclosure may include situations wherein the controller is further configured to provide a notification to an accessor of the firmware data value in response to an update of the firmware data value.

A further embodiment of any of the foregoing embodiments of the present disclosure may include situations wherein the controller is further configured to interpret one of a download operation or an install operation of a firmware asset corresponding to the firmware data value, and to record a transaction on the distributed ledger in response to the one of the download operation or the install operation.

A further embodiment of any of the foregoing embodiments of the present disclosure may include situations wherein the firmware data value includes firmware for a component of a production process.

A further embodiment of any of the foregoing embodiments of the present disclosure may include situations wherein the component of the production process includes a production tool.

A further embodiment of any of the foregoing embodiments of the present disclosure may include situations wherein the production tool includes a production tool for a process selected from the processes consisting of: a coating process, a 3D printing process, a semiconductor fabrication process, a food preparation process, a polymer production process, a chemical synthesis process, a biological production process, and a crystal fabrication process.

A further embodiment of any of the foregoing embodiments of the present disclosure may include situations wherein the firmware data value includes firmware for one of a compute resource and a networking resource.

The present disclosure describes a method, the method according to one disclosed non-limiting embodiment of the present disclosure may include accessing a distributed ledger including a firmware data value, tokenizing the firmware data value, interpreting an access request for the firmware data value, and, in response to the access request, providing a provable access to the firmware corresponding to the firmware data value.

A further embodiment of any of the foregoing embodiments of the present disclosure may further include providing a notification to an accessor of the firmware data value in response to an update of the firmware data value.

A further embodiment of any of the foregoing embodiments of the present disclosure may further include interpreting a download operation of a firmware asset corresponding to the firmware data value, and recording a transaction on the distributed ledger in response to the download operation.

A further embodiment of any of the foregoing embodiments of the present disclosure may further include interpreting an install operation of a firmware asset corresponding to the firmware data value, and recording a transaction on the distributed ledger in response to the install operation.

The present disclosure describes a transaction-enabling system including a controller, the controller according to one disclosed non-limiting embodiment of the present disclosure may be configured to access a distributed ledger including serverless code logic, tokenize the serverless code logic, interpret an access request for the serverless code logic, and, in response to the access request, provide a provable access to the serverless code logic.

A further embodiment of any of the foregoing embodiments of the present disclosure may include situations wherein the controller is further configured to provide the serverless code logic as a black box, and wherein the serverless code logic further includes an interface description for the serverless code logic.

A further embodiment of any of the foregoing embodiments of the present disclosure may include situations wherein the controller is further configured to interpret an execution operation of the serverless code logic, and to record a transaction on the distributed ledger in response to the execution operation.

A further embodiment of any of the foregoing embodiments of the present disclosure may include situations wherein the controller is further configured to interpret an execution operation of the serverless code logic, and to record a transaction on the distributed ledger in response to the execution operation.

A further embodiment of any of the foregoing embodiments of the present disclosure may include situations wherein the instruction set further includes an application programming interface (API) for the serverless code logic.

The present disclosure describes a method, the method according to one disclosed non-limiting embodiment of the present disclosure may include accessing a distributed ledger including serverless code logic, tokenizing the serverless code logic, interpreting an access request for the serverless code logic, and in response to the access request, providing a provable access to the serverless code logic.

A further embodiment of any of the foregoing embodiments of the present disclosure may further include providing an interface description for the serverless code logic.

A further embodiment of any of the foregoing embodiments of the present disclosure may further include providing an application programming interface (API) for the serverless code logic.

A further embodiment of any of the foregoing embodiments of the present disclosure may further include interpreting an execution operation of the serverless code logic, and recording a transaction on the distributed ledger in response to the execution operation.

The present disclosure describes a transaction-enabling system including a controller, the controller according to one disclosed non-limiting embodiment of the present disclosure may be configured to access a distributed ledger including an aggregated data set, interpret an access request for the aggregated data set, and, in response to the access request, provide a provable access to the aggregated data set, wherein the provable access includes at least one of which parties have accessed the aggregated data set and how many parties have accessed the aggregated data set.

A further embodiment of any of the foregoing embodiments of the present disclosure may include situations wherein the distributed ledger includes a block chain, and wherein the aggregated data set includes one of a trade secret and proprietary information.

A further embodiment of any of the foregoing embodiments of the present disclosure may further include an expert wrapper for the distributed ledger, wherein the expert wrapper is configured to tokenize the aggregated data set and to validate the one of the trade secret and the proprietary information.

A further embodiment of any of the foregoing embodiments of the present disclosure may include situations wherein the distributed ledger includes a set of instructions, and wherein the controller is further configured to interpret an instruction update value, and to update the set of instructions in response to the access request and the instruction update value.

A further embodiment of any of the foregoing embodiments of the present disclosure may further include a smart wrapper for the distributed ledger, wherein the smart wrapper is configured to allocate a plurality of sub-sets of instructions to the distributed ledger as the aggregated data set, and manage access to the plurality of sub-sets of instructions in response to the access request.

A further embodiment of any of the foregoing embodiments of the present disclosure may include situations wherein the controller is further configured to interpret an access of one of the plurality of sub-sets of instructions, and to record a transaction on the distributed ledger in response to the access.

A further embodiment of any of the foregoing embodiments of the present disclosure may include situations wherein the controller is further configured to interpret an execution operation of one of the plurality of sub-sets of instructions, and to record a transaction on the distributed ledger in response to the access.

The present disclosure describes a method, the method according to one disclosed non-limiting embodiment of the present disclosure may include accessing a distributed ledger including an aggregated data set, interpreting an access request for the aggregated data set, and, in response to the access request, providing a provable access to the aggregated data set, wherein the provable access includes at least one of which parties have accessed the aggregated data set and how many parties have accessed the aggregated data set.

A further embodiment of any of the foregoing embodiments of the present disclosure may further include operating an expert wrapper for the distributed ledger, wherein the expert wrapper is configured to tokenize the aggregated data set and to validate at least one of trade secret or proprietary information of the aggregated data set.

A further embodiment of any of the foregoing embodiments of the present disclosure may include situations wherein the distributed ledger further includes a set of instructions, the method further including interpreting an instruction update value, and updating the set of instructions in response to the access request and the instruction update value.

A further embodiment of any of the foregoing embodiments of the present disclosure may further include allocating a plurality of sub-sets of instructions to the distributed ledger as the aggregated data set, and managing access to the plurality of sub-sets of instructions in response to the access request.

A further embodiment of any of the foregoing embodiments of the present disclosure may further include interpreting an access of one of the plurality of sub-sets of instructions, and recording a transaction on the distributed ledger in response to the access.

A further embodiment of any of the foregoing embodiments of the present disclosure may further include interpreting an execution operation of one of the plurality of sub-sets of instructions, and recording a transaction on the distributed ledger in response to the access.

The present disclosure describes a transaction-enabling system including a controller, the controller according to one disclosed non-limiting embodiment of the present disclosure may access a distributed ledger including a plurality of intellectual property (IP) data corresponding to a plurality of IP assets, wherein the plurality of IP assets include an aggregate stack of IP, tokenize the IP data, interpret a distributed ledger operation corresponding to at least one of the plurality of IP assets, determine an analytic result value in response to the distributed ledger operation and the tokenized IP data, and provide a report of the analytic result value.

A further embodiment of any of the foregoing embodiments of the present disclosure may include situations wherein the distributed ledger operation includes at least one operation selected from the operations consisting of accessing IP data corresponding to one of the plurality of IP assets, executing a process utilizing IP data corresponding to one of the plurality of IP assets, adding IP data corresponding to an additional IP asset to the aggregate stack of IP, and removing IP data corresponding to one of the plurality of IP assets.

A further embodiment of any of the foregoing embodiments of the present disclosure may include situations wherein the analytic result value includes at least one result value selected from the result values consisting of a number of access events corresponding to at least one of the plurality of IP assets, statistical information corresponding to access events for a plurality of IP assets, a distribution of the plurality of IP assets according to access event rates, one of access times or processing times corresponding to at least one of the plurality of IP assets, and unique entity access events corresponding to at least one of the plurality of IP assets.

The present disclosure describes a method, the method according to one disclosed non-limiting embodiment of the present disclosure may include accessing a distributed ledger including a plurality of IP data corresponding to a plurality of IP assets, wherein the plurality of IP assets include an aggregate stack of IP, tokenizing the IP data, interpreting a distributed ledger operation corresponding to at least one of the plurality of IP assets, determining an analytic result value in response to the distributed ledger operation and the tokenized IP data, and providing a report of the analytic result value.

A further embodiment of any of the foregoing embodiments of the present disclosure may include situations wherein determining the analytic result value includes determining a number of access events corresponding to at least one of the plurality of IP assets.

A further embodiment of any of the foregoing embodiments of the present disclosure may include situations wherein determining the analytic result value includes determining one of an access time or a processing time corresponding to at least one of the plurality of IP assets.

A further embodiment of any of the foregoing embodiments of the present disclosure may include situations wherein determining the analytic result value includes determining a number of unique entity access events corresponding to at least one of the plurality of IP assets.

The present disclosure describes a transaction-enabling system including a controller, the controller according to one disclosed non-limiting embodiment of the present disclosure can be configured to interpret a resource utilization requirement for a task system having at least one of a compute task, a network task, or a core task; interpret a plurality of external data sources, wherein the plurality of external data sources includes at least one data source outside of the task system; operate an expert system to predict a forward market price for a resource in response to the resource utilization requirement and the plurality of external data sources; and execute a transaction on a resource market in response to the predicted forward market price.

A further embodiment of any of the foregoing embodiments of the present disclosure may include situations wherein the plurality of external data sources includes an internet-of-things (IoT) data source.

A further embodiment of any of the foregoing embodiments of the present disclosure may include situations wherein the forward market price includes a forward market price for a network bandwidth resource.

A further embodiment of any of the foregoing embodiments of the present disclosure may include situations wherein the forward market price includes a forward market price for a spectrum resource.

A further embodiment of any of the foregoing embodiments of the present disclosure may include situations wherein the plurality of external data sources includes a social media data source.

A further embodiment of any of the foregoing embodiments of the present disclosure may include situations wherein the forward market price includes a forward market price for a network bandwidth resource.

A further embodiment of any of the foregoing embodiments of the present disclosure may include situations wherein the forward market price includes a forward market price for a spectrum resource.

A further embodiment of any of the foregoing embodiments of the present disclosure may include situations wherein the resource utilization requirement includes a first resource, and wherein the resource of the forward market price includes at least one of: the first resource, and a second resource that can be substituted for the first resource.

A further embodiment of any of the foregoing embodiments of the present disclosure may include situations wherein the controller is further configured to operate the expert system to determine a substitution cost of the second resource, and to execute the transaction on the resource market further in response to the substitution cost of the second resource.

A further embodiment of any of the foregoing embodiments of the present disclosure may include situations wherein the expert system is further configured to determine at least a portion of the substitution cost of the second resource as an operational change cost for the task system.

A further embodiment of any of the foregoing embodiments of the present disclosure may include situations wherein the resource utilization requirement includes at least one resource selected from the resources consisting of: a compute resource, a network bandwidth resource, a spectrum resource, a data storage resource, an energy resource, and an energy credit resource.

The present disclosure describes a method, the method according to one disclosed non-limiting embodiment of the present disclosure can include interpreting a resource utilization requirement for a task system having at least one of a compute task, a network task, or a core task; interpreting a plurality of external data sources, wherein the plurality of external data sources includes at least one data source outside of the task system; operating an expert system to predict a forward market price for a resource in response to the resource utilization requirement and the plurality of external data sources; and executing a transaction on a resource market in response to the predicted forward market price.

A further embodiment of any of the foregoing embodiments of the present disclosure may include situations wherein the plurality of external data sources includes an internet-of-things (IoT) data source.

A further embodiment of any of the foregoing embodiments of the present disclosure may include situations wherein the forward market price includes a forward market price for a network bandwidth resource.

A further embodiment of any of the foregoing embodiments of the present disclosure may include situations wherein the forward market price includes a forward market price for a spectrum resource.

A further embodiment of any of the foregoing embodiments of the present disclosure may include situations wherein the plurality of external data sources includes a social media data source.

A further embodiment of any of the foregoing embodiments of the present disclosure may include situations wherein the forward market price includes a forward market price for a network bandwidth resource.

A further embodiment of any of the foregoing embodiments of the present disclosure may include situations wherein the forward market price includes a forward market price for a spectrum resource.

A further embodiment of any of the foregoing embodiments of the present disclosure may include situations wherein the resource utilization requirement includes a first resource, and wherein the resource of the forward market price includes at least one of: the first resource, and a second resource that can be substituted for the first resource.

A further embodiment of any of the foregoing embodiments of the present disclosure may further include operating the expert system to determine a substitution cost of the second resource, and executing the transaction on the resource market further in response to the substitution cost of the second resource.

A further embodiment of any of the foregoing embodiments of the present disclosure may further include determining at least a portion of the substitution cost of the second resource as an operational change cost for the task system.

A further embodiment of any of the foregoing embodiments of the present disclosure may include situations wherein the resource utilization requirement includes at least one resource selected from the resources consisting of: a compute resource, a network bandwidth resource, a spectrum resource, a data storage resource, an energy resource, and an energy credit resource.

The present disclosure describes a transaction-enabling system including a controller, the controller according to one disclosed non-limiting embodiment of the present disclosure can be configured to interpret a resource utilization requirement for a task system having at least one of a compute task, a network task, or a core task; interpret a behavioral data source; operate a machine to forecast a forward market value for a resource in response to the resource utilization requirement and the behavioral data source; and perform one of adjusting an operation of the task system or executing a transaction in response to the forecast of the forward market value for the resource.

A further embodiment of any of the foregoing embodiments of the present disclosure may include situations wherein the forward market value for the resource includes a forward market for energy prices.

A further embodiment of any of the foregoing embodiments of the present disclosure may include situations wherein the behavioral data source includes an automated agent behavioral data source.

A further embodiment of any of the foregoing embodiments of the present disclosure may include situations wherein the behavioral data source includes a human behavioral data source.

A further embodiment of any of the foregoing embodiments of the present disclosure may include situations wherein the behavioral data source includes a business entity behavioral data source.

A further embodiment of any of the foregoing embodiments of the present disclosure may include situations wherein the forward market value for the resource includes a forward market for a spectrum resource.

A further embodiment of any of the foregoing embodiments of the present disclosure may include situations wherein the behavioral data source includes an automated agent behavioral data source.

A further embodiment of any of the foregoing embodiments of the present disclosure may include situations wherein the behavioral data source includes a human behavioral data source.

A further embodiment of any of the foregoing embodiments of the present disclosure may include situations wherein the behavioral data source includes a business entity behavioral data source.

A further embodiment of any of the foregoing embodiments of the present disclosure may include situations wherein the forward market value for the resource includes a forward market for a compute resource.

A further embodiment of any of the foregoing embodiments of the present disclosure may include situations wherein the behavioral data source includes an automated agent behavioral data source.

A further embodiment of any of the foregoing embodiments of the present disclosure may include situations wherein the behavioral data source includes a human behavioral data source.

A further embodiment of any of the foregoing embodiments of the present disclosure may include situations wherein the behavioral data source includes a business entity behavioral data source.

A further embodiment of any of the foregoing embodiments of the present disclosure may include situations wherein the forward market value for the resource includes a forward market for an energy credit resource.

A further embodiment of any of the foregoing embodiments of the present disclosure may include situations wherein the behavioral data source includes an automated agent behavioral data source.

A further embodiment of any of the foregoing embodiments of the present disclosure may include situations wherein the behavioral data source includes a human behavioral data source.

A further embodiment of any of the foregoing embodiments of the present disclosure may include situations wherein the behavioral data source includes a business entity behavioral data source.

A further embodiment of any of the foregoing embodiments of the present disclosure may include situations wherein the resource utilization requirement includes a first resource, and wherein the resource of the forward market value includes at least one of: the first resource, and a second resource that can be substituted for the first resource.

A further embodiment of any of the foregoing embodiments of the present disclosure may include situations wherein the controller is further configured to operate the machine to determine a substitution cost of the second resource, and to perform the one of adjusting the operation of the task system or executing the transaction further in response to the substitution cost of the second resource.

A further embodiment of any of the foregoing embodiments of the present disclosure may include situations wherein the machine is further configured to determine at least a portion of the substitution cost of the second resource as an operational change cost for the task system.

A further embodiment of any of the foregoing embodiments of the present disclosure may include situations wherein the performing includes executing the transaction, wherein the transaction includes one of purchasing or selling one of the first resource or the second resource on a market for at least one of the first resource or the second resource.

A further embodiment of any of the foregoing embodiments of the present disclosure may include situations wherein the resource utilization requirement includes at least one resource selected from the resources consisting of: a compute resource, a network bandwidth resource, a spectrum resource, a data storage resource, an energy resource, and an energy credit resource.

A further embodiment of any of the foregoing embodiments of the present disclosure may include situations wherein the performing includes adjusting the operation of the task system, and wherein the adjusting further includes at least one operation selected from the operations consisting of: adjusting operations of the task system to increase or reduce the resource utilization requirement, adjusting operations of the task system to time shift at least a portion of the resource utilization requirement, adjusting operations of the task system to substitute utilization of a first resource for utilization of a second resource, and accessing an external provider to provide at least a portion of at least one of the compute task, the network task, or the core task.

A further embodiment of any of the foregoing embodiments of the present disclosure may include situations wherein the performing includes executing the transaction, wherein the transaction includes one of purchasing or selling the resource on a market for the resource.

A further embodiment of any of the foregoing embodiments of the present disclosure may include situations wherein the market for the resource includes a forward market for the resource.

A further embodiment of any of the foregoing embodiments of the present disclosure may include situations wherein the market for the resource includes a spot market for the resource.

The present disclosure describes a method, the method according to one disclosed non-limiting embodiment of the present disclosure can include interpreting a resource utilization requirement for a task system having at least one of a compute task, a network task, or a core task; interpreting a behavioral data source; operating a machine to forecast a forward market value for a resource in response to the resource utilization requirement and the behavioral data source; and performing one of adjusting an operation of the task system or executing a transaction in response to the forecast of the forward market value for the resource.

A further embodiment of any of the foregoing embodiments of the present disclosure may include situations wherein the forward market value for the resource includes a forward market for energy prices.

A further embodiment of any of the foregoing embodiments of the present disclosure may include situations wherein the behavioral data source includes an automated agent behavioral data source.

A further embodiment of any of the foregoing embodiments of the present disclosure may include situations wherein the behavioral data source includes a human behavioral data source.

A further embodiment of any of the foregoing embodiments of the present disclosure may include situations wherein the behavioral data source includes a business entity behavioral data source.

A further embodiment of any of the foregoing embodiments of the present disclosure may include situations wherein the forward market value for the resource includes a forward market for a spectrum resource.

A further embodiment of any of the foregoing embodiments of the present disclosure may include situations wherein the behavioral data source includes an automated agent behavioral data source.

A further embodiment of any of the foregoing embodiments of the present disclosure may include situations wherein the behavioral data source includes a human behavioral data source.

A further embodiment of any of the foregoing embodiments of the present disclosure may include situations wherein the behavioral data source includes a business entity behavioral data source.

A further embodiment of any of the foregoing embodiments of the present disclosure may include situations wherein the forward market value for the resource includes a forward market for a compute resource.

A further embodiment of any of the foregoing embodiments of the present disclosure may include situations wherein the behavioral data source includes an automated agent behavioral data source.

A further embodiment of any of the foregoing embodiments of the present disclosure may include situations wherein the behavioral data source includes a human behavioral data source.

A further embodiment of any of the foregoing embodiments of the present disclosure may include situations wherein the behavioral data source includes a business entity behavioral data source.

A further embodiment of any of the foregoing embodiments of the present disclosure may include situations wherein the forward market value for the resource includes a forward market for an energy credit resource.

A further embodiment of any of the foregoing embodiments of the present disclosure may include situations wherein the behavioral data source includes an automated agent behavioral data source.

A further embodiment of any of the foregoing embodiments of the present disclosure may include situations wherein the behavioral data source includes a human behavioral data source.

A further embodiment of any of the foregoing embodiments of the present disclosure may include situations wherein the behavioral data source includes a business entity behavioral data source.

A further embodiment of any of the foregoing embodiments of the present disclosure may include situations wherein the resource utilization requirement includes a first resource, and wherein the resource of the forward market value includes at least one of: the first resource, and a second resource that can be substituted for the first resource.

A further embodiment of any of the foregoing embodiments of the present disclosure may further include operating the machine to determine a substitution cost of the second resource, and performing the one of adjusting the operation of the task system or executing the transaction further in response to the substitution cost of the second resource.

A further embodiment of any of the foregoing embodiments of the present disclosure may further include determining at least a portion of the substitution cost of the second resource as an operational change cost for the task system.

A further embodiment of any of the foregoing embodiments of the present disclosure may include situations wherein the performing includes executing the transaction, wherein the transaction includes one of purchasing or selling one of the first resource or the second resource on a market for at least one of the first resource or the second resource.

A further embodiment of any of the foregoing embodiments of the present disclosure may include situations wherein the resource utilization requirement includes at least one resource selected from the resources consisting of: a compute resource, a network bandwidth resource, a spectrum resource, a data storage resource, an energy resource, and an energy credit resource.

A further embodiment of any of the foregoing embodiments of the present disclosure may include situations wherein the performing includes adjusting the operation of the task system, and wherein the adjusting further includes at least one operation selected from the operations consisting of: adjusting operations of the task system to increase or reduce the resource utilization requirement, adjusting operations of the task system to time shift at least a portion of the resource utilization requirement, adjusting operations of the task system to substitute utilization of a first resource for utilization of a second resource, and accessing an external provider to provide at least a portion of at least one of the compute task, the network task, or the core task.

A further embodiment of any of the foregoing embodiments of the present disclosure may include situations wherein the performing includes executing the transaction, wherein the transaction includes one of purchasing or selling the resource on a market for the resource.

A further embodiment of any of the foregoing embodiments of the present disclosure may include situations wherein the market for the resource includes a forward market for the resource.

A further embodiment of any of the foregoing embodiments of the present disclosure may include situations wherein the market for the resource includes a spot market for the resource.

The present disclosure describes a transaction-enabling system including a controller, the controller according to one disclosed non-limiting embodiment of the present disclosure can be configured to interpret a resource utilization requirement for a task system having at least one of a compute task, a network task, or a core task; interpret a plurality of external data sources, wherein the plurality of external data sources includes at least one data source outside of the task system; operate an expert system to predict a forward market price for a resource in response to the resource utilization requirement and the plurality of external data sources; and execute a cryptocurrency transaction on a resource market in response to the predicted forward market price.

A further embodiment of any of the foregoing embodiments of the present disclosure may include situations wherein the plurality of external data sources includes an internet-of-things (IoT) data source.

A further embodiment of any of the foregoing embodiments of the present disclosure may include situations wherein the forward market price includes a forward market price for a network bandwidth resource.

A further embodiment of any of the foregoing embodiments of the present disclosure may include situations wherein the forward market price includes a forward market price for a spectrum resource.

A further embodiment of any of the foregoing embodiments of the present disclosure may include situations wherein the plurality of external data sources includes a social media data source.

A further embodiment of any of the foregoing embodiments of the present disclosure may include situations wherein the forward market price includes a forward market price for a network bandwidth resource.

A further embodiment of any of the foregoing embodiments of the present disclosure may include situations wherein the forward market price includes a forward market price for a spectrum resource.

A further embodiment of any of the foregoing embodiments of the present disclosure may include situations wherein the resource utilization requirement includes a first resource, and wherein the resource of the forward market price includes at least one of: the first resource, and a second resource that can be substituted for the first resource.

A further embodiment of any of the foregoing embodiments of the present disclosure may include situations wherein the controller is further configured to operate the expert system to determine a substitution cost of the second resource, and to execute the cryptocurrency transaction on the resource market further in response to the substitution cost of the second resource.

A further embodiment of any of the foregoing embodiments of the present disclosure may include situations wherein the expert system is further configured to determine at least a portion of the substitution cost of the second resource as an operational change cost for the task system.

A further embodiment of any of the foregoing embodiments of the present disclosure may include situations wherein the resource utilization requirement includes at least one resource selected from the resources consisting of: a compute resource, a network bandwidth resource, a spectrum resource, a data storage resource, an energy resource, and an energy credit resource.

The present disclosure describes a method, the method according to one disclosed non-limiting embodiment of the present disclosure can include interpreting a resource utilization requirement for a task system having at least one of a compute task, a network task, or a core task; interpreting a plurality of external data sources, wherein the plurality of external data sources includes at least one data source outside of the task system; operating an expert system to predict a forward market price for a resource in response to the resource utilization requirement and the plurality of external data sources; and executing a cryptocurrency transaction on a resource market in response to the predicted forward market price.

A further embodiment of any of the foregoing embodiments of the present disclosure may include situations wherein the plurality of external data sources includes an internet-of-things (IoT) data source.

A further embodiment of any of the foregoing embodiments of the present disclosure may include situations wherein the forward market price includes a forward market price for a network bandwidth resource.

A further embodiment of any of the foregoing embodiments of the present disclosure may include situations wherein the forward market price includes a forward market price for a spectrum resource.

A further embodiment of any of the foregoing embodiments of the present disclosure may include situations wherein the plurality of external data sources includes a social media data source.

A further embodiment of any of the foregoing embodiments of the present disclosure may include situations wherein the forward market price includes a forward market price for a network bandwidth resource.

A further embodiment of any of the foregoing embodiments of the present disclosure may include situations wherein the forward market price includes a forward market price for a spectrum resource.

A further embodiment of any of the foregoing embodiments of the present disclosure may include situations wherein the resource utilization requirement includes a first resource, and wherein the resource of the forward market price includes at least one of: the first resource, and a second resource that can be substituted for the first resource.

A further embodiment of any of the foregoing embodiments of the present disclosure may further include operating the expert system to determine a substitution cost of the second resource, and executing the cryptocurrency transaction on the resource market further in response to the substitution cost of the second resource.

A further embodiment of any of the foregoing embodiments of the present disclosure may further include determining at least a portion of the substitution cost of the second resource as an operational change cost for the task system.

A further embodiment of any of the foregoing embodiments of the present disclosure may include situations wherein the resource utilization requirement includes at least one resource selected from the resources consisting of: a compute resource, a network bandwidth resource, a spectrum resource, a data storage resource, an energy resource, and an energy credit resource.

A further embodiment of any of the foregoing embodiments of the present disclosure may further include operating the expert system to predict a forward market price for a plurality of forward market time frames.

A further embodiment of any of the foregoing embodiments of the present disclosure may include situations wherein the executing a cryptocurrency transaction on a resource market in response to the predicted forward market price includes providing for an improved cost of operation of the task system.

A further embodiment of any of the foregoing embodiments of the present disclosure may include situations wherein the resource utilization requirement includes a first resource, and wherein the method further includes: determining a second resource that can be substituted for the first resource, wherein operating the expert system to predict the forward market price for the plurality of forward market time frames further includes predicting the forward market price for both of the first resource and the second resource.

A further embodiment of any of the foregoing embodiments of the present disclosure may include situations wherein the executing the cryptocurrency transaction on the resource market in response to the predicted forward market price includes providing for an improved cost of operation of the task system.

A further embodiment of any of the foregoing embodiments of the present disclosure may include situations wherein the providing for an improved cost of operation of the task system further includes determining a resource utilization profile, wherein the resource utilization profile includes a utilization of each of the first resource and the second resource.

The present disclosure describes a transaction-enabling system, the system according to one disclosed non-limiting embodiment of the present disclosure can include a machine having at least one of a compute task requirement, a networking task requirement, and an energy consumption task requirement; and a controller, comprising: a resource requirement circuit structured to determine an amount of a resource for the machine to service at least one of the compute task requirement, the networking task requirement, and the energy consumption task requirement; a forward resource market circuit structured to access a forward resource market; a resource market circuit structured to access a resource market; and a resource distribution circuit structured to execute a transaction of the resource on at least one of the resource market or the forward resource market in response to the determined amount of the resource.

A further embodiment of any of the foregoing embodiments of the present disclosure may include situations wherein the resource distribution circuit is further structured to adaptively improve at least one of an output of the machine or a resource utilization of the machine.

A further embodiment of any of the foregoing embodiments of the present disclosure may include situations wherein the resource distribution circuit further comprises at least one of a machine learning component, an artificial intelligence component, or a neural network component.

A further embodiment of any of the foregoing embodiments of the present disclosure may include situations wherein the resource comprises a compute resource.

A further embodiment of any of the foregoing embodiments of the present disclosure may include situations wherein the resource comprises an energy resource.

A further embodiment of any of the foregoing embodiments of the present disclosure may include situations wherein the resource comprises an energy credit resource.

A further embodiment of any of the foregoing embodiments of the present disclosure may further include situations wherein the resource requirement circuit is further structured to determine a second amount of a second resource for the machine to service at least one of the compute task requirement, the networking task requirement, and the energy consumption task requirement; and wherein the resource distribution circuit is further structured to execute a first transaction of the first resource on one of the resource market or the forward resource market, and to execute a second transaction of the second resource on the other of the one of the resource market or the forward resource market.

A further embodiment of any of the foregoing embodiments of the present disclosure may include situations wherein the second resource comprises a substitute resource for the first resource during at least a portion of an operating condition for the machine.

A further embodiment of any of the foregoing embodiments of the present disclosure may include situations wherein the forward resource market comprises a futures market for the resource at a first time scale, and wherein the resource market comprises one of: a spot market for the resource, or a futures market for the resource at a second time scale.

A further embodiment of any of the foregoing embodiments of the present disclosure may include situations wherein the transaction comprises at least one transaction type selected from the transaction types consisting of: a sale of the resource; a purchase of the resource; a short sale of the resource; a call option for the resource; a put option for the resource; and any of the foregoing with regard to at least one of a substitute resource or a correlated resource.

A further embodiment of any of the foregoing embodiments of the present disclosure may include situations wherein the resource distribution circuit is further structured to determine at least one of a substitute resource or a correlated resource, and to further execute at least one transaction of the at least one of the substitute resource or the correlated resource.

A further embodiment of any of the foregoing embodiments of the present disclosure may include situations wherein the resource distribution circuit is further structured to execute the at least one transaction of the at least one of the substitute resource or the correlated resource as a replacement for the transaction of the resource.

A further embodiment of any of the foregoing embodiments of the present disclosure may include situations wherein the resource distribution circuit is further structured to execute the at least one transaction of the at least one of the substitute resource or the correlated resource in concert with the transaction of the resource.

The present disclosure describes a method, the method according to one disclosed non-limiting embodiment of the present disclosure can include determining an amount of a first resource for a machine to service at least one of a compute task requirement, a networking task requirement, and an energy consumption task requirement; accessing a forward resource market; accessing a resource market; and executing a transaction of the first resource on at least one of the resource market or the forward resource market in response to the determined amount of the first resource.

A further embodiment of any of the foregoing embodiments of the present disclosure may further include determining a second amount of a second resource for the machine to service at least one of the compute task requirement, the networking task requirement, and the energy consumption task requirement; and executing a first transaction of the first resource on one of the resource market or the forward resource market, and executing a second transaction of the second resource on the other of the at least one of the resource market or the forward resource market.

A further embodiment of any of the foregoing embodiments of the present disclosure may further include determining at least one of a substitute resource or a correlated resource, and executing at least one transaction of the at least one of the substitute resource or the correlated resource.

A further embodiment of any of the foregoing embodiments of the present disclosure may further include executing the at least one transaction of the at least one of the substitute resource or the correlated resource as a replacement for the transaction of the resource.

A further embodiment of any of the foregoing embodiments of the present disclosure may further include executing the at least one transaction of the at least one of the substitute resource or the correlated resource in concert with the transaction of the resource.

A further embodiment of any of the foregoing embodiments of the present disclosure may include situations wherein determining the correlated resource comprises at least one operation selected from the operations consisting of determining the correlated resource for the machine as a resource to service alternate tasks that provide acceptable functionality for the machine; determining the correlated resource as a resource that is expected to be correlated with the resource in regard to at least one of a price or an availability; and determining the correlated resource as a resource that is expected to have a corresponding price change with the resource, such that a subsequent sale of the correlated resource combined with a spot market purchase of the resource provides for a planned economic outcome.

The present disclosure describes a transaction-enabling system, the system according to one disclosed non-limiting embodiment of the present disclosure can include a transaction detection circuit structured to interpret a transaction request value, wherein the transaction request value includes a transaction description for one of a proposed or an imminent transaction, and wherein the transaction description includes a cryptocurrency type value and a transaction amount value, a transaction locator circuit structured to determine a transaction location parameter in response to the transaction request value, wherein the transaction location parameter includes at least one of a transaction geographic value or a transaction jurisdiction value, and a transaction execution circuit structured to provide a transaction implementation command in response to the transaction location parameter.

A further embodiment of any of the foregoing embodiments of the present disclosure may include situations wherein the transaction locator circuit is further structured to determine the transaction location parameter based on a tax treatment of the one of the proposed or imminent transaction.

A further embodiment of any of the foregoing embodiments of the present disclosure may include situations wherein the transaction locator circuit is further structured to select the one of the transaction geographic value or the transaction jurisdiction value from a plurality of available geographic values or jurisdiction values that provides an improved tax treatment relative to a nominal one of the plurality of available geographic values or jurisdiction values.

A further embodiment of any of the foregoing embodiments of the present disclosure may include situations wherein the transaction locator circuit is further structured to determine the transaction location parameter in response to a tax treatment of at least one of the cryptocurrency type value or a type of the one of the proposed or imminent transaction.

A further embodiment of any of the foregoing embodiments of the present disclosure may include situations wherein the transaction request value further includes a transaction location value, and wherein the transaction locator circuit is further structured to provide the transaction location parameter as the transaction location value in response to determining that a tax treatment of the one of the proposed or imminent transaction meets a threshold tax treatment value.

A further embodiment of any of the foregoing embodiments of the present disclosure may include situations wherein the transaction locator circuit is further structured to operate an expert system configured to use machine learning to continuously improve the determination of the transaction location parameter relative to a tax treatment of transactions processed by the controller.

A further embodiment of any of the foregoing embodiments of the present disclosure may include situations wherein the transaction locator circuit is further structured to operate an expert system, wherein the expert system is configured to aggregate regulatory information for cryptocurrency transactions from a plurality of jurisdictions, and to continuously improve the determination of the transaction location parameter based on the aggregated regulatory information.

A further embodiment of any of the foregoing embodiments of the present disclosure may include situations wherein the expert system is further configured to use machine learning to continuously improve the determination of the transaction location parameter relative to secondary jurisdictional costs related to the cryptocurrency transactions.

A further embodiment of any of the foregoing embodiments of the present disclosure may include situations wherein the expert system is further configured to use machine learning to continuously improve the determination of the transaction location parameter relative to a transaction speed for the cryptocurrency transactions.

A further embodiment of any of the foregoing embodiments of the present disclosure may include situations wherein the expert system is further configured to use machine learning to continuously improve the determination of the transaction location parameter relative to a tax treatment for the cryptocurrency transactions.

A further embodiment of any of the foregoing embodiments of the present disclosure may include situations wherein the expert system is further configured to use machine learning to continuously improve the determination of the transaction location parameter relative to a favorability of contractual terms related to the cryptocurrency transactions.

A further embodiment of any of the foregoing embodiments of the present disclosure may include situations wherein the expert system is further configured to use machine learning to continuously improve the determination of the transaction location parameter relative to a compliance of the cryptocurrency transactions within the aggregated regulatory information.

A further embodiment of any of the foregoing embodiments of the present disclosure may further include a transaction engine responsive to the transaction implementation command.

The present disclosure describes a method, the method according to one disclosed non-limiting embodiment of the present disclosure can include interpreting a transaction request value, wherein the transaction request value includes a transaction description for one of a proposed or an imminent transaction, and wherein the transaction description includes a cryptocurrency type value and a transaction amount value, determining a transaction location parameter in response to the transaction request value, wherein the transaction location parameter includes at least one of a transaction geographic value or a transaction jurisdiction value, and providing a transaction implementation command in response to the transaction location parameter.

A further embodiment of any of the foregoing embodiments of the present disclosure may further include determining the transaction location parameter based on a tax treatment of the one of the proposed or imminent transaction.

A further embodiment of any of the foregoing embodiments of the present disclosure may further include selecting at least one of the transaction geographic value or the transaction jurisdiction value from a plurality of available geographic values or jurisdiction values that provides an improved tax treatment relative to a nominal one of the plurality of available geographic values or jurisdiction values.

A further embodiment of any of the foregoing embodiments of the present disclosure may further include determining the transaction location parameter in response to a tax treatment of at least one of the cryptocurrency type value or a type of the one of the proposed or imminent transaction.

A further embodiment of any of the foregoing embodiments of the present disclosure may include situations wherein the transaction request value further includes a transaction location value, the method further including providing the transaction location parameter as the transaction location value in response to determining that a tax treatment of the one of the proposed or imminent transaction meets a threshold tax treatment value.

A further embodiment of any of the foregoing embodiments of the present disclosure may further include aggregating regulatory information for cryptocurrency transactions from a plurality of jurisdictions, and continuously improving the determination of the transaction location parameter based on the aggregated regulatory information.

A further embodiment of any of the foregoing embodiments of the present disclosure may further include applying machine learning to continuously improve the determination of the transaction location parameter relative to at least one parameter selected from the parameters consisting of: secondary jurisdictional costs related to the transactions, a transaction speed for the transactions, a tax treatment for the transactions, a favorability of contractual terms related to the transactions, and a compliance of the transactions within the aggregated regulatory information.

The present disclosure describes a method, the method according to one disclosed non-limiting embodiment of the present disclosure can include interpreting a transaction request value, wherein the transaction request value includes a transaction description for one of a proposed or an imminent transaction, and wherein the transaction description includes a cryptocurrency type value and a transaction amount value, determining a transaction location parameter in response to the transaction request value, wherein the transaction location parameter includes at least one of a transaction geographic value or a transaction jurisdiction value, and executing a transaction in response to the transaction location parameter.

A further embodiment of any of the foregoing embodiments of the present disclosure may further include determining the transaction location parameter based on a tax treatment of the one of the proposed or imminent transaction.

A further embodiment of any of the foregoing embodiments of the present disclosure may further include selecting the one of the transaction geographic value or the transaction jurisdiction value from a plurality of available geographic values or jurisdiction values that provides an improved tax treatment relative to a nominal one of the plurality of available geographic values or jurisdiction values.

A further embodiment of any of the foregoing embodiments of the present disclosure may further include aggregating regulatory information for cryptocurrency transactions from a plurality of jurisdictions, and continuously improving the determination of the transaction location parameter based on the aggregated regulatory information.

A further embodiment of any of the foregoing embodiments of the present disclosure may further include applying machine learning to continuously improve the determination of the transaction location parameter relative to at least one parameter selected from the parameters consisting of: secondary jurisdictional costs related to the transactions, a transaction speed for the transactions, a tax treatment for the transactions, a favorability of contractual terms related to the transactions, and a compliance of the transactions within the aggregated regulatory information.

The present disclosure describes a transaction-enabling system, the system according to one disclosed non-limiting embodiment of the present disclosure can include a controller. The controller including a smart wrapper structured to interpret a transaction request value from a user, wherein the transaction request value includes a transaction description for an incoming transaction, and wherein the transaction description includes a transaction amount value and at least one of a cryptocurrency type value and a transaction location value, a transaction locator circuit structured to determine a transaction location parameter in response to the transaction request value and further in response to a plurality of tax treatment values corresponding to a plurality of transaction locations, wherein the transaction location parameter includes at least one of a transaction geographic value or a transaction jurisdiction value, and wherein the smart wrapper is further structured to direct an execution of the incoming transaction in response to the transaction location parameter.

A further embodiment of any of the foregoing embodiments of the present disclosure may include situations wherein the transaction locator circuit is further structured to select an available one of the plurality of transaction locations having a favorable tax treatment value.

A further embodiment of any of the foregoing embodiments of the present disclosure may include situations wherein the transaction location value includes at least one location value corresponding to: a location of a purchaser of the transaction, a location of a seller of the transaction, a location of a delivery of a product or service of the transaction, a location of a supplier of a product or service of the transaction, a residence location of one of the purchaser, seller, or supplier of the transaction, and a legally available location for the transaction.

The present disclosure describes a method, the method according to one disclosed non-limiting embodiment of the present disclosure can include interpreting a transaction request value from a user, wherein the transaction request value includes a transaction description for an incoming transaction, and wherein the transaction description includes a transaction amount value and at least one of a cryptocurrency type value and a transaction location value, determining a transaction location parameter in response to the transaction request value and further in response to a plurality of tax treatment values corresponding to a plurality of transaction locations, wherein the transaction location parameter includes at least one of a transaction geographic value or a transaction jurisdiction value, and directing an execution of the incoming transaction in response to the location parameter.

A further embodiment of any of the foregoing embodiments of the present disclosure may further include selecting an available one of the plurality of transaction locations having a favorable tax treatment value.

A further embodiment of any of the foregoing embodiments of the present disclosure may include situations wherein determining the transaction location value includes selecting the transaction location value from a list of locations consisting of: a location of a purchaser of the transaction, a location of a seller of the transaction, a location of a delivery of a product or service of the transaction, a location of a supplier of a product or service of the transaction, a residence location of one of the purchaser, seller, or supplier of the transaction, and a legally available location for the transaction.

The present disclosure describes a transaction-enabling system, the system according to one disclosed non-limiting embodiment of the present disclosure can include a controller. The controller according to one disclosed non-limiting embodiment of the present disclosure can include a transaction detection circuit structured to interpret a plurality of transaction request values, wherein each transaction request value includes a transaction description for one of a proposed or an imminent transaction, and wherein the transaction description includes a cryptocurrency type value and a transaction amount value, a transaction support circuit structured to interpret a support resource description including at least one supporting resource for the plurality of transactions, a support utilization circuit structured to operate an expert system, wherein the expert system is configured to use machine learning to continuously improve at least one execution parameter for the plurality of transactions relative to the support resource description, and a transaction execution circuit structured to command execution of the plurality of transactions in response to the improved at least one execution parameter.

A further embodiment of any of the foregoing embodiments of the present disclosure may include situations wherein the support resource description includes an energy price description for an energy source available to power the execution of the plurality of transactions.

A further embodiment of any of the foregoing embodiments of the present disclosure may include situations wherein the energy price description includes at least one of a forward price prediction and a spot price for the energy source.

A further embodiment of any of the foregoing embodiments of the present disclosure may include situations wherein the support resource description includes a plurality of energy sources available to power the execution of the plurality of transactions.

A further embodiment of any of the foregoing embodiments of the present disclosure may include situations wherein the support resource description includes at least one of a state of charge and a charge cycle cost description for an energy storage source available to power the execution of the plurality of transactions.

A further embodiment of any of the foregoing embodiments of the present disclosure may include situations wherein the energy storage source includes a battery, and wherein the expert system is further configured to user machine learning to improve at least one parameter selected from the parameters consisting of: a battery energy transfer efficiency value, a battery life value, and a battery lifetime utilization cost value.

The present disclosure describes a method, the method according to one disclosed non-limiting embodiment of the present disclosure can include interpreting a plurality of transaction request values, wherein each transaction request value includes a transaction description for one of a proposed or an imminent transaction, and wherein the transaction description includes a cryptocurrency type value and a transaction amount value, interpreting a support resource description including at least one supporting resource for the plurality of transactions, operating an expert system, wherein the expert system is configured to use machine learning to continuously improve at least one execution parameter for the plurality of transactions relative to the support resource description, and commanding execution of the plurality of transactions in response to the improved at least one execution parameter.

A further embodiment of any of the foregoing embodiments of the present disclosure may include situations wherein the commanding execution includes utilizing the continuously improved at least one execution parameter.

A further embodiment of any of the foregoing embodiments of the present disclosure may further include commanding execution of a first transaction in response to the at least one execution parameter, wherein the continuously improving the at least one execution parameter includes updating the at least one execution parameter, the method further including commanding execution of a second transaction using the updated at least one execution parameter.

A further embodiment of any of the foregoing embodiments of the present disclosure may include situations wherein the support resource description includes an energy price description for an energy source available to power the execution of the plurality of transactions.

A further embodiment of any of the foregoing embodiments of the present disclosure may include situations wherein the energy price description includes at least one of a forward price prediction and a spot price for the energy source.

The present disclosure describes a transaction-enabling system, the system according to one disclosed non-limiting embodiment of the present disclosure can include a controller. The controller according to one disclosed non-limiting embodiment of the present disclosure can include an attention market access circuit structured to interpret a plurality of attention-related resources available on an attention market, an intelligent agent circuit structured to determine an attention-related resource acquisition value based on a cost parameter of at least one of the plurality of attention-related resources, and an attention acquisition circuit structured to solicit an attention-related resource in response to the attention-related resource acquisition value.

A further embodiment of any of the foregoing embodiments of the present disclosure may include situations wherein the attention acquisition circuit is further structured to perform the soliciting the attention-related resource by performing at least one operation selected from the operations consisting of purchasing the attention-related resource from the attention market, selling the attention-related resource to the attention market, making an offer to sell the attention-related resource to a second intelligent agent, and making an offer to purchase the attention-related resource to the second intelligent agent.

A further embodiment of any of the foregoing embodiments of the present disclosure may include situations wherein the plurality of attention-related resources includes at least one resource selected from a list consisting of an advertising placement, a search listing, a keyword listing, a banner advertisement, a video advertisement, an embedded video advertisement, a panel activity participation, a survey activity participation, a trial activity participation, and a pilot activity placement or participation.

A further embodiment of any of the foregoing embodiments of the present disclosure may include situations wherein the attention market includes a spot market for at least one of the plurality of attention-related resources.

A further embodiment of any of the foregoing embodiments of the present disclosure may include situations wherein the cost parameter of at least one of the plurality of attention-related resources includes a future predicted cost of the at least one of the plurality of attention-related resources, and wherein the intelligent agent circuit is further structured to determine the attention-related resource acquisition value in response to a comparison of a first cost on the spot market with the cost parameter.

A further embodiment of any of the foregoing embodiments of the present disclosure may include situations wherein the attention market includes a forward market for at least one of the plurality of attention-related resources, and wherein the cost parameter of the at least one of the plurality of attention-related resources includes a predicted future cost.

A further embodiment of any of the foregoing embodiments of the present disclosure may include situations wherein the cost parameter of at least one of the plurality of attention-related resources includes a future predicted cost of the at least one of the plurality of attention-related resources, and wherein the intelligent agent circuit is further structured to determine the attention-related resource acquisition value in response to a comparison of a first cost on the forward market with the cost parameter.

A further embodiment of any of the foregoing embodiments of the present disclosure may include situations wherein the intelligent agent circuit is further structured to determine the attention-related resource acquisition value in response to the cost parameter of the at least one of the plurality of attention-related resources having a value that is outside of an expected cost range for the at least one of the plurality of attention-related resources.

A further embodiment of any of the foregoing embodiments of the present disclosure may include situations wherein the intelligent agent circuit is further structured to determine the attention-related resource acquisition value in response to a function of the cost parameter of the at least one of the plurality of attention-related resources, and an effectiveness parameter of the at least one of the plurality of attention-related resources.

A further embodiment of any of the foregoing embodiments of the present disclosure may include situations wherein the controller further includes an external data circuit structured to interpret a social media data source, and wherein the intelligent agent circuit is further structured to determine, in response to the social media data source, at least one of a future predicted cost of the at least one of the plurality of attention-related resources, and to utilize the future predicted cost as the cost parameter, and the effectiveness parameter of the at least one of the plurality of attention-related resources.

The present disclosure describes a system, the system according to one disclosed non-limiting embodiment of the present disclosure can include a fleet of machines, each one of the fleet of machines including a task system having a core task and at least one of a compute task or a network task, a controller, including an attention market access circuit structured to interpret a plurality of attention-related resources available on an attention market, and an intelligent agent circuit structured to determine an attention-related resource acquisition value based on a cost parameter of at least one of the plurality of attention-related resources, and further based on the core task for a corresponding machine of the fleet of machines, an attention purchase aggregating circuit structured to determine an aggregate attention-related resource purchase value in response to the plurality of attention-related resource acquisition values from each intelligent agent circuit corresponding to each machine of the fleet of the machines, and an attention acquisition circuit structured to purchase an attention-related resource in response to the aggregate attention-related resource purchase value.

A further embodiment of any of the foregoing embodiments of the present disclosure may include situations wherein the attention purchase aggregating circuit is positioned at a location selected from the locations consisting of at least partially distributed on a plurality of the controllers corresponding to machines of the fleet of machines, on a selected controller corresponding to one of the machines of the fleet of machines, and on a system controller communicatively coupled to the plurality of the controllers corresponding to machines of the fleet of machines.

A further embodiment of any of the foregoing embodiments of the present disclosure may include situations wherein the attention purchase acquisition circuit is positioned at a location selected from the locations consisting of at least partially distributed on a plurality of the controllers corresponding to machines of the fleet of machines, on a selected controller corresponding to one of the machines of the fleet of machines, and on a system controller communicatively coupled to the plurality of the controllers corresponding to machines of the fleet of machines.

The present disclosure describes a method, the method according to one disclosed non-limiting embodiment of the present disclosure can include interpreting a plurality of attention-related resources available on an attention market, determining an attention-related resource acquisition value based on a cost parameter of at least one of the plurality of attention-related resources, soliciting an attention-related resource in response to the attention-related resource acquisition value.

A further embodiment of any of the foregoing embodiments of the present disclosure may further include performing the soliciting the attention-related resource by performing at least one operation selected from the operations consisting of purchasing the attention-related resource from the attention market, selling the attention-related resource to the attention market, making an offer to sell the attention-related resource to a second intelligent agent, and making an offer to purchase the attention-related resource to the second intelligent agent.

A further embodiment of any of the foregoing embodiments of the present disclosure may include situations wherein the cost parameter of at least one of the plurality of attention-related resources includes a future predicted cost of the at least one of the plurality of attention-related resources, the method further including determining the attention-related resource acquisition value in response to a comparison of a first cost on the attention market with the cost parameter.

A further embodiment of any of the foregoing embodiments of the present disclosure may further include interpreting a social media data source and determining, in response to the social media data source, at least one of a future predicted cost of the at least one of the plurality of attention-related resources, and to utilize the future predicted cost as the cost parameter, and an effectiveness parameter of the at least one of the plurality of attention-related resources, and wherein the determining the attention-related resource acquisition value is further based on the at least one of the future predicted cost or the effectiveness parameter.

The present disclosure describes a method, the method according to one disclosed non-limiting embodiment of the present disclosure can include interpreting a plurality of attention-related resources available on an attention market, determining an attention-related resource acquisition value for each machine of a fleet of machines based on a cost parameter of at least one of the plurality of attention-related resources, and further based on a core task for each of a corresponding machine of the fleet of machines, determining an aggregate attention-related resource purchase value in response to the plurality of attention-related resource acquisition values corresponding to each machine of the fleet of the machines, and an attention acquisition circuit structured to purchase an attention-related resource in response to the aggregate attention-related resource purchase value.

A further embodiment of any of the foregoing embodiments of the present disclosure may include situations wherein the cost parameter of at least one of the plurality of attention-related resources includes a future predicted cost of the at least one of the plurality of attention-related resources, the method further including determining each attention-related resource acquisition value in response to a comparison of a first cost on a spot market for attention-related resources with the cost parameter.

A further embodiment of any of the foregoing embodiments of the present disclosure may further include interpreting a social media data source and determining, in response to the social media data source, at least one of a future predicted cost of the at least one of the plurality of attention-related resources, and to utilize the future predicted cost as the cost parameter, and an effectiveness parameter of the at least one of the plurality of attention-related resources, and wherein the determining the attention-related resource acquisition value is further based on the at least one of the future predicted cost or the effectiveness parameter.

The present disclosure describes a transaction-enabling system, the system according to one disclosed non-limiting embodiment of the present disclosure can include a production facility including a core task, wherein the core task includes a production task; a controller, including: a facility description circuit structured to interpret a plurality of historical facility parameter values and a corresponding plurality of historical facility outcome values; a facility prediction circuit structured to operate an adaptive learning system, wherein the adaptive learning system is configured to train a facility production predictor in response to the plurality of historical facility parameter values and the corresponding plurality of historical facility outcome values; wherein the facility description circuit is further structured to interpret a plurality of present state facility parameter values; and wherein the facility prediction circuit is further structured to operate the adaptive learning system to predict a present state facility outcome value in response to the plurality of present state facility parameter values.

A further embodiment of any of the foregoing embodiments of the present disclosure may include situations wherein the present state facility outcome value includes a facility production outcome.

A further embodiment of any of the foregoing embodiments of the present disclosure may include situations wherein the present state facility outcome value includes a facility production outcome probability distribution.

A further embodiment of any of the foregoing embodiments of the present disclosure may include situations wherein the present state facility outcome value includes at least one value selected from the values consisting of: a production volume description of the production task; a production quality description of the production task; a facility resource utilization description; an input resource utilization description; and a production timing description of the production task.

A further embodiment of any of the foregoing embodiments of the present disclosure may include situations wherein the facility description circuit is further structured to interpret historical external data from at least one external data source, and wherein the adaptive learning system is further configured to train the facility production predictor in response to the historical external data.

A further embodiment of any of the foregoing embodiments of the present disclosure may include situations wherein the at least one external data source includes at least one data source selected from the data sources consisting of: a social media data source; a behavioral data source; a spot market price for an energy source; and a forward market price for an energy source.

A further embodiment of any of the foregoing embodiments of the present disclosure may include situations wherein the facility description circuit is further structured to interpret present external data from the at least one external data source, and wherein the adaptive learning system is further configured to predict the present state facility outcome value in response to the present external data.

The present disclosure describes a method, the method according to one disclosed non-limiting embodiment of the present disclosure can include interpreting a plurality of historical facility parameter values and a corresponding plurality of historical facility outcome values; operating an adaptive learning system, thereby training a facility production predictor in response to the plurality of historical facility parameter values and the corresponding plurality of historical facility outcome values; interpreting a plurality of present state facility parameter values; and operating the adaptive learning system to predict a present state facility outcome value in response to the plurality of present state facility parameter values.

A further embodiment of any of the foregoing embodiments of the present disclosure may include situations wherein the present state facility outcome value includes a facility production outcome.

A further embodiment of any of the foregoing embodiments of the present disclosure may include situations wherein the present state facility outcome value includes a facility production outcome probability distribution.

A further embodiment of any of the foregoing embodiments of the present disclosure may include situations wherein the present state facility outcome value includes at least one value selected from the values consisting of: a production volume description of a production task; a production quality description of a production task; a facility resource utilization description; an input resource utilization description; and a production timing description of a production task.

A further embodiment of any of the foregoing embodiments of the present disclosure may further include interpreting historical external data from at least one external data source, and operating the adaptive learning system to further train the facility production predictor in response to the historical external data.

A further embodiment of any of the foregoing embodiments of the present disclosure may include situations wherein the at least one external data source includes at least one data source selected from the data sources consisting of: a social media data source; a behavioral data source; a spot market price for an energy source; and a forward market price for an energy source.

A further embodiment of any of the foregoing embodiments of the present disclosure may further include interpreting present external data from the at least one external data source, and operating the adaptive learning system to predict the present state facility outcome value further in response to the present external data.

The present disclosure describes a transaction-enabling system, the system according to one disclosed non-limiting embodiment of the present disclosure can include a facility including a core task; a controller, including: a facility description circuit structured to interpret a plurality of historical facility parameter values and a corresponding plurality of historical facility outcome values; a facility prediction circuit structured to operate an adaptive learning system, wherein the adaptive learning system is configured to train a facility resource allocation circuit in response to the plurality of historical facility parameter values and the corresponding plurality of historical facility outcome values; wherein the facility description circuit is further structured to interpret a plurality of present state facility parameter values; and wherein the trained facility resource allocation circuit is further structured to adjust, in response to the plurality of present state facility parameter values, a plurality of facility resource values.

A further embodiment of any of the foregoing embodiments of the present disclosure may include situations wherein the plurality of facility resource values include: a provisioning and an allocation of facility energy resources; and a provisioning and an allocation of facility compute resources.

A further embodiment of any of the foregoing embodiments of the present disclosure may include situations wherein the trained facility resource allocation circuit is further structured to adjust the plurality of facility resource values by one of producing or selecting a favorable facility resource utilization profile from among a set of available facility resource utilization profiles.

A further embodiment of any of the foregoing embodiments of the present disclosure may include situations wherein the trained facility resource allocation circuit is further structured to adjust the plurality of facility resource values by one of producing or selecting a favorable facility resource output selection from among a set of available facility resource output values.

A further embodiment of any of the foregoing embodiments of the present disclosure may include situations wherein the trained facility resource allocation circuit is further structured to adjust the plurality of facility resource values by one of producing or selecting a favorable facility resource input profile from among a set of available facility resource input profiles.

A further embodiment of any of the foregoing embodiments of the present disclosure may include situations wherein the trained facility resource allocation circuit is further structured to adjust the plurality of facility resource values by one of producing or selecting a favorable facility resource configuration profile from among a set of available facility resource configuration profiles.

A further embodiment of any of the foregoing embodiments of the present disclosure may include situations wherein the facility description circuit is further structured to interpret historical external data from at least one external data source, and wherein the adaptive learning system is further configured to train the facility resource allocation circuit in response to the historical external data.

A further embodiment of any of the foregoing embodiments of the present disclosure may include situations wherein the at least one external data source includes at least one data source selected from the data sources consisting of: a social media data source; a behavioral data source; a spot market price for an energy source; and a forward market price for an energy source.

A further embodiment of any of the foregoing embodiments of the present disclosure may include situations wherein the facility description circuit is further structured to interpret present external data from the at least one external data source, and wherein the trained facility resource allocation circuit is further structured to adjust the plurality of facility resource values in response to the present external data.

The present disclosure describes a method, the method according to one disclosed non-limiting embodiment of the present disclosure can include interpreting a plurality of historical facility parameter values and a corresponding plurality of historical facility outcome values; operating an adaptive learning system, thereby training a facility resource allocation circuit in response to the plurality of historical facility parameter values and the corresponding plurality of historical facility outcome values; interpreting a plurality of present state facility parameter values; and adjusting, in response to the plurality of present state facility parameter values, a plurality of facility resource values.

A further embodiment of any of the foregoing embodiments of the present disclosure may include situations wherein the plurality of facility resource values include: a provisioning and an allocation of facility energy resources; and a provisioning and an allocation of facility compute resources.

A further embodiment of any of the foregoing embodiments of the present disclosure may further include adjusting the plurality of facility resource values by selecting a favorable facility resource utilization profile from among a set of available facility resource utilization profiles.

A further embodiment of any of the foregoing embodiments of the present disclosure may further include adjusting the plurality of facility resource values by producing a favorable facility resource utilization profile relative to a set of available facility resource utilization profiles.

A further embodiment of any of the foregoing embodiments of the present disclosure may further include updating the set of available facility resource utilization profiles in response to the plurality of facility resource values.

A further embodiment of any of the foregoing embodiments of the present disclosure may further include adjusting the plurality of facility resource values by selecting a favorable facility resource output selection from among a set of available facility resource output values.

A further embodiment of any of the foregoing embodiments of the present disclosure may further include adjusting the plurality of facility resource values by producing a facility resource output selection relative to a set of available facility resource output values.

A further embodiment of any of the foregoing embodiments of the present disclosure may further include updating the set of available facility resource output values in response to the plurality of facility resource values.

A further embodiment of any of the foregoing embodiments of the present disclosure may further include adjusting the plurality of facility resource values by selecting a favorable facility resource input profile from among a set of available facility resource input profiles.

A further embodiment of any of the foregoing embodiments of the present disclosure may further include adjusting the plurality of facility resource values by producing a facility resource input profile relative to a set of available facility resource input profiles.

A further embodiment of any of the foregoing embodiments of the present disclosure may further include updating the set of available facility resource input profiles in response to the plurality of facility resource values.

A further embodiment of any of the foregoing embodiments of the present disclosure may further include adjusting the plurality of facility resource values by selecting a favorable facility resource configuration profile from among a set of available facility resource configuration profiles.

A further embodiment of any of the foregoing embodiments of the present disclosure may further include adjusting the plurality of facility resource values by producing a facility resource configuration profile relative to a set of available facility resource configuration profiles.

A further embodiment of any of the foregoing embodiments of the present disclosure may further include updating the set of available facility resource configuration profiles in response to the plurality of facility resource values.

A further embodiment of any of the foregoing embodiments of the present disclosure may further include interpreting historical external data from at least one external data source, and operating the adaptive learning system to further train the facility resource allocation circuit in response to the historical external data.

A further embodiment of any of the foregoing embodiments of the present disclosure may include situations wherein the at least one external data source includes at least one data source selected from the data sources consisting of: a social media data source; a behavioral data source; a spot market price for an energy source; and a forward market price for an energy source.

A further embodiment of any of the foregoing embodiments of the present disclosure may further include interpreting present external data from the at least one external data source, and further adjusting the plurality of facility resource values in response to the present external data.

The present disclosure describes a transaction-enabling system, the system according to one disclosed non-limiting embodiment of the present disclosure can include a facility including a core task, wherein the core task includes a customer relevant output; a controller, including: a facility description circuit structured to interpret a plurality of historical facility parameter values and a corresponding plurality of historical facility outcome values; a facility prediction circuit structured to operate an adaptive learning system, wherein the adaptive learning system is configured to train a facility production predictor in response to the plurality of historical facility parameter values and the corresponding plurality of historical facility outcome values; wherein the facility description circuit is further structured to interpret a plurality of present state facility parameter values; wherein the trained facility production predictor is configured to determine a customer contact indicator in response to the plurality of present state facility parameter values; and a customer notification circuit structured to provide a notification to a customer in response to the customer contact indicator.

A further embodiment of any of the foregoing embodiments of the present disclosure may include situations wherein the customer includes one of a current customer and a prospective customer.

A further embodiment of any of the foregoing embodiments of the present disclosure may include situations wherein determining the customer contact indicator includes performing at least one operation selected from the operations consisting of: determining whether the customer relevant output will meet a volume request from the customer; determining whether the customer relevant output will meet a quality request from the customer; determining whether the customer relevant output will meet a timing request from the customer; and determining whether the customer relevant output will meet an optional request from the customer.

A further embodiment of any of the foregoing embodiments of the present disclosure may include situations wherein the facility description circuit is further structured to interpret historical external data from at least one external data source, and wherein the adaptive learning system is further configured to train the facility production predictor in response to the historical external data.

A further embodiment of any of the foregoing embodiments of the present disclosure may include situations wherein the at least one external data source includes at least one data source selected from the data sources consisting of: a social media data source; a behavioral data source; a spot market price for an energy source; and a forward market price for an energy source.

A further embodiment of any of the foregoing embodiments of the present disclosure may include situations wherein the facility description circuit is further structured to interpret present external data from the at least one external data source, and wherein the trained facility production predictor is further configured to determine the customer contact indicator in response to the present external data.

The present disclosure describes a method, the method according to one disclosed non-limiting embodiment of the present disclosure can include interpreting a plurality of historical facility parameter values and a corresponding plurality of historical facility outcome values; operating an adaptive learning system, thereby training a facility production predictor in response to the plurality of historical facility parameter values and the corresponding plurality of historical facility outcome values; interpreting a plurality of present state facility parameter values; operating the trained facility production predictor to determine a customer contact indicator in response to the plurality of present state facility parameter values; and providing a notification to a customer in response to the customer contact indicator.

A further embodiment of any of the foregoing embodiments of the present disclosure may include situations wherein the customer includes one of a current customer and a prospective customer.

A further embodiment of any of the foregoing embodiments of the present disclosure may include situations wherein determining the customer contact indicator includes determining whether a customer relevant output will meet a volume request from the customer.

A further embodiment of any of the foregoing embodiments of the present disclosure may include situations wherein determining the customer contact indicator includes determining whether a customer relevant output will meet a quality request from the customer.

A further embodiment of any of the foregoing embodiments of the present disclosure may include situations wherein determining the customer contact indicator determining whether a customer relevant output will meet a timing request from the customer.

A further embodiment of any of the foregoing embodiments of the present disclosure may include situations wherein determining the customer contact indicator includes determining whether a customer relevant output will meet an optional request from the customer.

A further embodiment of any of the foregoing embodiments of the present disclosure may further include including interpreting historical external data from at least one external data source, and operating the adaptive learning system to further train the facility production predictor in response to the historical external data.

A further embodiment of any of the foregoing embodiments of the present disclosure may include situations wherein the at least one external data source includes at least one data source selected from the data sources consisting of: a social media data source; a behavioral data source; a spot market price for an energy source; and a forward market price for an energy source.

A further embodiment of any of the foregoing embodiments of the present disclosure may further include interpreting present external data from the at least one external data source, and operating the trained facility production predictor to further determine the customer contact indicator in response to the present external data.

The present disclosure describes a transaction-enabling system, the system according to one disclosed non-limiting embodiment of the present disclosure can include a facility including a core task, wherein the core task includes a customer relevant output; a controller, including: a facility description circuit structured to interpret a plurality of historical facility parameter values and a corresponding plurality of historical facility outcome values; a facility prediction circuit structured to operate an adaptive learning system, wherein the adaptive learning system is configured to train a facility production predictor in response to the plurality of historical facility parameter values and the corresponding plurality of historical facility outcome values; wherein the facility description circuit is further structured to interpret a plurality of present state facility parameter values; wherein the trained facility production predictor is configured to determine a customer contact indicator in response to the plurality of present state facility parameter values; and a customer notification circuit structured to provide a notification to a customer in response to the customer contact indicator.

A further embodiment of any of the foregoing embodiments of the present disclosure may include situations wherein the customer includes one of a current customer and a prospective customer.

A further embodiment of any of the foregoing embodiments of the present disclosure may include situations wherein determining the customer contact indicator includes performing at least one operation selected from the operations consisting of: determining whether the customer relevant output will meet a volume request from the customer; determining whether the customer relevant output will meet a quality request from the customer; determining whether the customer relevant output will meet a timing request from the customer; and determining whether the customer relevant output will meet an optional request from the customer.

A further embodiment of any of the foregoing embodiments of the present disclosure may include situations wherein the facility description circuit is further structured to interpret historical external data from at least one external data source, and wherein the adaptive learning system is further configured to train the facility production predictor in response to the historical external data.

A further embodiment of any of the foregoing embodiments of the present disclosure may include situations wherein the at least one external data source includes at least one data source selected from the data sources consisting of: a social media data source; a behavioral data source; a spot market price for an energy source; and a forward market price for an energy source.

A further embodiment of any of the foregoing embodiments of the present disclosure may include situations wherein the facility description circuit is further structured to interpret present external data from the at least one external data source, and wherein the trained facility production predictor is further configured to determine the customer contact indicator in response to the present external data.

The present disclosure describes a method, the method according to one disclosed non-limiting embodiment of the present disclosure can include interpreting a plurality of historical facility parameter values and a corresponding plurality of historical facility outcome values; operating an adaptive learning system, thereby training a facility production predictor in response to the plurality of historical facility parameter values and the corresponding plurality of historical facility outcome values; interpreting a plurality of present state facility parameter values; operating the trained facility production predictor to determine a customer contact indicator in response to the plurality of present state facility parameter values; and providing a notification to a customer in response to the customer contact indicator.

A further embodiment of any of the foregoing embodiments of the present disclosure may include situations wherein the customer includes one of a current customer and a prospective customer.

A further embodiment of any of the foregoing embodiments of the present disclosure may include situations wherein determining the customer contact indicator includes determining whether a customer relevant output will meet a volume request from the customer.

A further embodiment of any of the foregoing embodiments of the present disclosure may include situations wherein determining the customer contact indicator includes determining whether a customer relevant output will meet a quality request from the customer.

A further embodiment of any of the foregoing embodiments of the present disclosure may include situations wherein determining the customer contact indicator determining whether a customer relevant output will meet a timing request from the customer.

A further embodiment of any of the foregoing embodiments of the present disclosure may include situations wherein determining the customer contact indicator includes determining whether a customer relevant output will meet an optional request from the customer.

A further embodiment of any of the foregoing embodiments of the present disclosure may further include including interpreting historical external data from at least one external data source, and operating the adaptive learning system to further train the facility production predictor in response to the historical external data.

A further embodiment of any of the foregoing embodiments of the present disclosure may include situations wherein the at least one external data source includes at least one data source selected from the data sources consisting of: a social media data source; a behavioral data source; a spot market price for an energy source; and a forward market price for an energy source.

A further embodiment of any of the foregoing embodiments of the present disclosure may further include interpreting present external data from the at least one external data source, and operating the trained facility production predictor to further determine the customer contact indicator in response to the present external data.

The present disclosure describes a transaction-enabling system, the system according to one disclosed non-limiting embodiment of the present disclosure can include an energy and compute facility including: at least one of a compute task or a compute resource; and at least one of an energy source or an energy utilization requirement; and a controller, including: a facility description circuit structured to interpret detected conditions, wherein the detected conditions include at least one condition selected from the conditions consisting of an input resource for the facility; a facility resource; an output parameter for the facility; and an external condition related to an output of the facility; and a facility configuration circuit structured to operate an adaptive learning system, wherein the adaptive learning system is configured to adjust a facility configuration based on the detected conditions.

A further embodiment of any of the foregoing embodiments of the present disclosure may include situations wherein the adaptive learning system includes at least one of a machine learning system and an artificial intelligence (AI) system.

A further embodiment of any of the foregoing embodiments of the present disclosure may include situations wherein adjusting the facility configuration further includes at least one operation selected from the operations consisting of: performing a purchase or sale transaction on one of an energy spot market or an energy forward market; performing a purchase or sale transaction on one of a compute resource spot market or a compute resource forward market; and performing a purchase or sale transaction on one of an energy credit spot market or an energy credit forward market.

A further embodiment of any of the foregoing embodiments of the present disclosure may include situations wherein the facility further includes a networking task, and wherein adjusting the facility configuration further includes at least one operation selected from the operations consisting of: performing a purchase or sale transaction on one of a network bandwidth spot market or a network bandwidth forward market; and performing a purchase or sale transaction on one of a spectrum spot market or a spectrum forward market.

A further embodiment of any of the foregoing embodiments of the present disclosure may include situations wherein the adjusting the facility configuration further includes adjusting at least one task of the facility to reduce the energy utilization requirement.

The present disclosure describes a method, the method according to one disclosed non-limiting embodiment of the present disclosure can include interpreting detected conditions relative to a facility, wherein the detected conditions include at least one condition selected from the conditions consisting of: an input resource for the facility; a facility resource; an output parameter for the facility; and an external condition related to an output of the facility; and operating an adaptive learning system, thereby adjusting a facility configuration based on the detected conditions.

A further embodiment of any of the foregoing embodiments of the present disclosure may include situations wherein adjusting the facility configuration further includes performing a purchase or sale transaction on one of an energy spot market or an energy forward market.

A further embodiment of any of the foregoing embodiments of the present disclosure may include situations wherein adjusting the facility configuration further includes performing a purchase or sale transaction on one of a compute resource spot market or a compute resource forward market.

A further embodiment of any of the foregoing embodiments of the present disclosure may include situations wherein adjusting the facility configuration further includes performing a purchase or sale transaction on one of an energy credit spot market or an energy credit forward market.

A further embodiment of any of the foregoing embodiments of the present disclosure may include situations wherein adjusting the facility configuration further includes performing a purchase or sale transaction on one of a network bandwidth spot market or a network bandwidth forward market.

A further embodiment of any of the foregoing embodiments of the present disclosure may include situations wherein adjusting the facility configuration further includes performing a purchase or sale transaction on one of a spectrum spot market or a spectrum forward market.

The present disclosure describes a transaction-enabling system, the system according to one disclosed non-limiting embodiment of the present disclosure can include an energy and compute facility including: at least one of a compute task or a compute resource; and at least one of an energy source or an energy utilization requirement; and a controller, including: a facility description circuit structured to interpret detected conditions, wherein the detected conditions relate to a set of input resources for the facility; and a facility configuration circuit structured to operate an adaptive learning system, wherein the adaptive learning system is configured to adjust a facility configuration based on the detected conditions.

A further embodiment of any of the foregoing embodiments of the present disclosure may include situations wherein the adaptive learning system includes at least one of a machine learning system and an artificial intelligence (AI) system.

A further embodiment of any of the foregoing embodiments of the present disclosure may include situations wherein adjusting the facility configuration further includes at least one operation selected from the operations consisting of performing a purchase or sale transaction on one of an energy spot market or an energy forward market; performing a purchase or sale transaction on one of a compute resource spot market or a compute resource forward market; and performing a purchase or sale transaction on one of an energy credit spot market or an energy credit forward market.

A further embodiment of any of the foregoing embodiments of the present disclosure may include situations wherein the facility further includes a networking task, and wherein adjusting the facility configuration further includes at least one operation selected from the operations consisting of: performing a purchase or sale transaction on one of a network bandwidth spot market or a network bandwidth forward market; and performing a purchase or sale transaction on one of a spectrum spot market or a spectrum forward market.

A further embodiment of any of the foregoing embodiments of the present disclosure may include situations wherein the adjusting the facility configuration further includes adjusting at least one task or configuration of a resource of the facility to change an input resource requirement for the facility.

The present disclosure describes a method, the method according to one disclosed non-limiting embodiment of the present disclosure can include interpreting detected conditions relative to a facility, wherein the detected conditions relate to a set of input resources for the facility; and operating an adaptive learning system, thereby adjusting a facility configuration based on the detected conditions.

A further embodiment of any of the foregoing embodiments of the present disclosure may include situations wherein the adjusting includes performing a purchase or sale transaction on one of an energy spot market or an energy forward market.

A further embodiment of any of the foregoing embodiments of the present disclosure may include situations wherein the adjusting includes performing a purchase or sale transaction on one of a compute resource spot market or a compute resource forward market.

A further embodiment of any of the foregoing embodiments of the present disclosure may include situations wherein the adjusting includes performing a purchase or sale transaction on one of an energy credit spot market or an energy credit forward market.

A further embodiment of any of the foregoing embodiments of the present disclosure may include situations wherein the adjusting includes performing a purchase or sale transaction on one of a network bandwidth spot market or a network bandwidth forward market.

A further embodiment of any of the foregoing embodiments of the present disclosure may include situations wherein the adjusting includes performing a purchase or sale transaction on one of a spectrum spot market or a spectrum forward market.

The present disclosure describes a transaction-enabling system, the system according to one disclosed non-limiting embodiment of the present disclosure can include an energy and compute facility including: at least one of a compute task or a compute resource; and at least one of an energy source or an energy utilization requirement; and a controller, including: a facility description circuit structured to interpret detected conditions, wherein the detected conditions relate to at least one resource of the facility; and a facility configuration circuit structured to operate an adaptive learning system, wherein the adaptive learning system is configured to adjust a facility configuration based on the detected conditions.

A further embodiment of any of the foregoing embodiments of the present disclosure may include situations wherein the adaptive learning system includes at least one of a machine learning system and an artificial intelligence (AI) system.

A further embodiment of any of the foregoing embodiments of the present disclosure may include situations wherein adjusting the facility configuration further includes at least one operation selected from the operations consisting of: performing a purchase or sale transaction on one of an energy spot market or an energy forward market; performing a purchase or sale transaction on one of a compute resource spot market or a compute resource forward market; and performing a purchase or sale transaction on one of an energy credit spot market or an energy credit forward market.

A further embodiment of any of the foregoing embodiments of the present disclosure may include situations wherein the facility further includes a networking task, and wherein adjusting the facility configuration further includes at least one operation selected from the operations consisting of: performing a purchase or sale transaction on one of a network bandwidth spot market or a network bandwidth forward market; and performing a purchase or sale transaction on one of a spectrum spot market or a spectrum forward market.

A further embodiment of any of the foregoing embodiments of the present disclosure may include situations wherein the facility further includes at least one additional facility resource; wherein the adjusting the facility configuration further includes adjusting a utilization of the compute resource and the at least one additional facility resource; and wherein the at least one additional facility resource includes at least one of a network resource, a data storage resource, or a spectrum resource.

The present disclosure describes a method, the method according to one disclosed non-limiting embodiment of the present disclosure can include interpreting detected conditions relative to a facility, wherein the detected conditions relate to at least one resource of the facility; and operating an adaptive learning system, thereby adjusting a facility configuration based on the detected conditions.

A further embodiment of any of the foregoing embodiments of the present disclosure may include situations wherein the adjusting the facility configuration includes performing a purchase or sale transaction on one of an energy spot market or an energy forward market.

A further embodiment of any of the foregoing embodiments of the present disclosure may include situations wherein the adjusting the facility configuration includes performing a purchase or sale transaction on one of a spectrum spot market or a spectrum forward market.

A further embodiment of any of the foregoing embodiments of the present disclosure may include situations wherein the adjusting the facility configuration includes performing a purchase or sale transaction on one of a compute resource spot market or a compute resource forward market.

A further embodiment of any of the foregoing embodiments of the present disclosure may include situations wherein the adjusting the facility configuration includes performing a purchase or sale transaction on one of an energy credit spot market or an energy credit forward market.

The present disclosure describes a transaction-enabling system, the system according to one disclosed non-limiting embodiment of the present disclosure can include an energy and compute facility including: at least one of a compute task or a compute resource; and at least one of an energy source or an energy utilization requirement; and a controller, including: a facility description circuit structured to interpret detected conditions, wherein the detected conditions include an output parameter for the facility; and a facility configuration circuit structured to operate an adaptive learning system, wherein the adaptive learning system is configured to adjust a facility configuration based on the detected conditions.

A further embodiment of any of the foregoing embodiments of the present disclosure may include situations wherein the adaptive learning system includes at least one of a machine learning system and an artificial intelligence (AI) system.

A further embodiment of any of the foregoing embodiments of the present disclosure may include situations wherein adjusting the facility configuration further includes at least one operation selected from the operations consisting of performing a purchase or sale transaction on one of an energy spot market or an energy forward market; performing a purchase or sale transaction on one of a compute resource spot market or a compute resource forward market; and performing a purchase or sale transaction on one of an energy credit spot market or an energy credit forward market.

A further embodiment of any of the foregoing embodiments of the present disclosure may include situations wherein the facility further includes a networking task, and wherein adjusting the facility configuration further includes at least one operation selected from the operations consisting of: performing a purchase or sale transaction on one of a network bandwidth spot market or a network bandwidth forward market; and performing a purchase or sale transaction on one of a spectrum spot market or a spectrum forward market.

A further embodiment of any of the foregoing embodiments of the present disclosure may include situations wherein the adjusting the facility configuration further includes adjust one task of the facility to provide at least one of: an increased facility output volume, an increased facility quality value, or an adjusted facility output time value.

The present disclosure describes a method, the method according to one disclosed non-limiting embodiment of the present disclosure can include interpreting detected conditions relative to a facility, wherein the detected conditions include an output parameter for the facility; and operating an adaptive learning system thereby adjusting a facility configuration based on the detected conditions.

A further embodiment of any of the foregoing embodiments of the present disclosure may include situations wherein the adjusting the facility configuration includes performing a purchase or sale transaction on one of an energy spot market or an energy forward market.

A further embodiment of any of the foregoing embodiments of the present disclosure may include situations wherein the adjusting the facility configuration includes performing a purchase or sale transaction on one of a spectrum spot market or a spectrum forward market.

A further embodiment of any of the foregoing embodiments of the present disclosure may include situations wherein the adjusting the facility configuration includes performing a purchase or sale transaction on one of a compute resource spot market or a compute resource forward market.

A further embodiment of any of the foregoing embodiments of the present disclosure may include situations wherein the adjusting the facility configuration includes performing a purchase or sale transaction on one of an energy credit spot market or an energy credit forward market.

The present disclosure describes a transaction-enabling system, the system according to one disclosed non-limiting embodiment of the present disclosure can include an energy and compute facility including: at least one of a compute task or a compute resource; and at least one of an energy source or an energy utilization requirement; and a controller, including: a facility description circuit structured to interpret detected conditions, wherein the detected conditions include a utilization parameter for an output of the facility; and a facility configuration circuit structured to operate an adaptive learning system, wherein the adaptive learning system is configured to adjust a facility configuration based on the detected conditions.

A further embodiment of any of the foregoing embodiments of the present disclosure may include situations wherein the adaptive learning system includes at least one of a machine learning system and an artificial intelligence (AI) system.

A further embodiment of any of the foregoing embodiments of the present disclosure may include situations wherein adjusting the facility configuration further includes at least one operation selected from the operations consisting of performing a purchase or sale transaction on one of an energy spot market or an energy forward market; performing a purchase or sale transaction on one of a compute resource spot market or a compute resource forward market; and performing a purchase or sale transaction on one of an energy credit spot market or an energy credit forward market.

A further embodiment of any of the foregoing embodiments of the present disclosure may include situations wherein the facility further includes a networking task, and wherein adjusting the facility configuration further includes at least one operation selected from the operations consisting of: performing a purchase or sale transaction on one of a network bandwidth spot market or a network bandwidth forward market; and performing a purchase or sale transaction on one of a spectrum spot market or a spectrum forward market.

A further embodiment of any of the foregoing embodiments of the present disclosure may include situations wherein the adjusting the facility configuration further includes adjusting at least one task of the facility to reduce the utilization parameter for the facility.

The present disclosure describes a method, the method according to one disclosed non-limiting embodiment of the present disclosure can include interpreting detected conditions relative to a facility, wherein the detected conditions include a utilization parameter for an output of the facility;

and operating an adaptive learning system, thereby adjusting a facility configuration based on the detected conditions.

A further embodiment of any of the foregoing embodiments of the present disclosure may include situations wherein the adjusting the facility configuration includes performing a purchase or sale transaction on one of an energy spot market or an energy forward market.

A further embodiment of any of the foregoing embodiments of the present disclosure may include situations wherein the adjusting the facility configuration includes performing a purchase or sale transaction on one of a spectrum spot market or a spectrum forward market.

A further embodiment of any of the foregoing embodiments of the present disclosure may include situations wherein the adjusting the facility configuration includes performing a purchase or sale transaction on one of a compute resource spot market or a compute resource forward market.

A further embodiment of any of the foregoing embodiments of the present disclosure may include situations wherein the adjusting the facility configuration includes performing a purchase or sale transaction on one of an energy credit spot market or an energy credit forward market.

The present disclosure describes a transaction-enabling system, the system according to one disclosed non-limiting embodiment of the present disclosure can include an energy and compute facility including: at least one of a compute task or a compute resource; and at least one of an energy source or an energy utilization requirement; and a controller, including: a facility model circuit structured to operate a digital twin for the facility; a facility description circuit structured to interpret a set of parameters from the digital twin for the facility; and a facility configuration circuit structured to operate an adaptive learning system, wherein the adaptive learning system is configured to adjust a facility configuration based on the set of parameters from the digital twin for the facility.

A further embodiment of any of the foregoing embodiments of the present disclosure may include situations wherein the adaptive learning system includes at least one of a machine learning system and an artificial intelligence (AI) system.

A further embodiment of any of the foregoing embodiments of the present disclosure may include situations wherein adjusting the facility configuration further includes at least one operation selected from the operations consisting of performing a purchase or sale transaction on one of an energy spot market or an energy forward market; performing a purchase or sale transaction on one of a compute resource spot market or a compute resource forward market; and performing a purchase or sale transaction on one of an energy credit spot market or an energy credit forward market.

A further embodiment of any of the foregoing embodiments of the present disclosure may include situations wherein the facility further includes a networking task, and wherein adjusting the facility configuration further includes at least one operation selected from the operations consisting of: performing a purchase or sale transaction on one of a network bandwidth spot market or a network bandwidth forward market; and performing a purchase or sale transaction on one of a spectrum spot market or a spectrum forward market.

A further embodiment of any of the foregoing embodiments of the present disclosure may include situations wherein the facility description circuit is further structured to interpret detected conditions, wherein the detected conditions include at least one condition selected from the conditions consisting of: an input resource for the facility; a facility resource; an output parameter for the facility; and an external condition related to an output of the facility; and wherein the facility model circuit is further structured to update the digital twin for the facility in response to the detected conditions.

The present disclosure describes a method, the method according to one disclosed non-limiting embodiment of the present disclosure can include operating a model including a digital twin for a facility interpreting a set of parameters from the digital twin for the facility operating an adaptive learning system, thereby adjusting a facility configuration based on the set of parameters from the digital twin for the facility.

A further embodiment of any of the foregoing embodiments of the present disclosure may include situations wherein the adjusting the facility configuration includes performing a purchase or sale transaction on one of an energy spot market or an energy forward market.

A further embodiment of any of the foregoing embodiments of the present disclosure may include situations wherein the adjusting the facility configuration includes performing a purchase or sale transaction on one of a spectrum spot market or a spectrum forward market.

A further embodiment of any of the foregoing embodiments of the present disclosure may include situations wherein the adjusting the facility configuration includes performing a purchase or sale transaction on one of a compute resource spot market or a compute resource forward market.

A further embodiment of any of the foregoing embodiments of the present disclosure may include situations wherein the adjusting the facility configuration includes performing a purchase or sale transaction on one of an energy credit spot market or an energy credit forward market.

A further embodiment of any of the foregoing embodiments of the present disclosure may include situations wherein the adjusting the facility configuration includes performing a purchase or sale transaction on one of a network bandwidth spot market or a network bandwidth forward market.

A further embodiment of any of the foregoing embodiments of the present disclosure may further include interpreting detected conditions relative to the facility, wherein the detected conditions include at least one condition selected from the conditions consisting of an input resource for the facility; a facility resource; an output parameter for the facility; and an external condition related to an output of the facility; and operating the adaptive learning system, thereby updating the digital twin for the facility in response to the detected conditions.

The present disclosure describes a transaction-enabling system, the system according to one disclosed non-limiting embodiment of the present disclosure can include a machine having an associated regenerative energy facility, the machine having a requirement for at least one of a compute task, a networking task, and an energy consumption task; and a controller, comprising: an energy requirement circuit structured to determine an amount of energy for the machine to service the at least one of the compute task, the networking task, and the energy consumption task in response to the requirement for the at least one of the compute task, the networking task, and the energy consumption task; and an energy distribution circuit structured to adaptively improve an energy delivery of energy produced by the associated regenerative energy facility between the at least one of the compute task, the networking task, and the energy consumption task.

A further embodiment of any of the foregoing embodiments of the present disclosure may include situations wherein the energy consumption task comprises a core task.

A further embodiment of any of the foregoing embodiments of the present disclosure may include situations wherein the controller further comprises an energy market circuit structured to access an energy market, and wherein the energy distribution circuit is further structured to adaptively improve the energy delivery of the energy produced by the associated regenerative energy facility between the compute task, the networking task, the energy consumption task, and a sale of the energy produced on the energy market.

A further embodiment of any of the foregoing embodiments of the present disclosure may include situations wherein the energy market comprises at least one of a spot market or a forward market.

A further embodiment of any of the foregoing embodiments of the present disclosure may include situations wherein the energy distribution circuit further comprises at least one of a machine learning component, an artificial intelligence component, or a neural network component.

The present disclosure describes a method, the method according to one disclosed non-limiting embodiment of the present disclosure can include determining an amount of energy for a machine to service at least one of a compute task, a networking task, or an energy consumption task in response to a compute task requirement, a networking task requirement, and an energy consumption task requirement; adaptively improving an energy delivery between: the compute task, the networking task, and the energy consumption task; wherein the energy delivery is of energy produced by a regenerative energy facility of the machine.

A further embodiment of any of the foregoing embodiments of the present disclosure may further include accessing an energy market, and adaptively improving the energy delivery of the energy produced by the regenerative energy facility between: the compute task, the networking task, the energy consumption task, and a sale of the energy produced on the energy market.

The present disclosure describes a transaction-enabling system, the system according to one disclosed non-limiting embodiment of the present disclosure can include a machine having at least one of a compute task requirement, a networking task requirement, and an energy consumption task requirement; and a controller, comprising: a resource requirement circuit structured to determine an amount of a resource for the machine to service at least one of the compute task requirement, the networking task requirement, and the energy consumption task requirement; a forward resource market circuit structured to access a forward resource market; and a resource distribution circuit structured to execute a transaction of the resource on the forward resource market in response to the determined amount of the resource.

A further embodiment of any of the foregoing embodiments of the present disclosure may include situations wherein the resource comprises a compute resource, and wherein the forward resource market comprises a forward market for compute resources.

A further embodiment of any of the foregoing embodiments of the present disclosure may include situations wherein the resource comprises a spectrum allocation resource, and wherein the forward resource market comprises a forward market for spectrum allocation.

A further embodiment of any of the foregoing embodiments of the present disclosure may include situations wherein the resource comprises an energy credit resource, and wherein the forward resource market comprises a forward market for energy credits.

A further embodiment of any of the foregoing embodiments of the present disclosure may include situations wherein the resource comprises an energy resource, and wherein the forward resource market comprises a forward market for energy.

A further embodiment of any of the foregoing embodiments of the present disclosure may include situations wherein the resource comprises a data storage resource, and wherein the forward resource market comprises a forward market for data storage capacity.

A further embodiment of any of the foregoing embodiments of the present disclosure may include situations wherein the resource comprises an energy storage resource, and wherein the forward resource market comprises a forward market for energy storage capacity.

A further embodiment of any of the foregoing embodiments of the present disclosure may include situations wherein the resource comprises a network bandwidth resource, and wherein the forward resource market comprises a forward market for network bandwidth.

A further embodiment of any of the foregoing embodiments of the present disclosure may include situations wherein the transaction of the resource on the forward resource market comprises one of buying or selling the resource.

A further embodiment of any of the foregoing embodiments of the present disclosure may include situations wherein the resource distribution circuit is further structured to adaptively improve one of an output value of the machine or a cost of operation of the machine using executed transactions on the forward resource market.

A further embodiment of any of the foregoing embodiments of the present disclosure may include situations wherein the resource distribution circuit further comprises at least one of a machine learning component, an artificial intelligence component, or a neural network component.

The present disclosure describes a method, the method according to one disclosed non-limiting embodiment of the present disclosure can include determining an amount of a resource for a machine to service at least one of a compute task requirement, a networking task requirement, and an energy consumption task requirement of a machine; accessing a forward resource market; and executing a transaction of the resource on the forward resource market in response to the determined amount of the resource.

A further embodiment of any of the foregoing embodiments of the present disclosure may include situations wherein the resource comprises a compute resource, and wherein the forward resource market comprises a forward market for compute resources.

A further embodiment of any of the foregoing embodiments of the present disclosure may include situations wherein the resource comprises a spectrum allocation resource, and wherein the forward resource market comprises a forward market for spectrum allocation.

A further embodiment of any of the foregoing embodiments of the present disclosure may include situations wherein the resource comprises an energy credit resource, and wherein the forward resource market comprises a forward market for energy credits.

A further embodiment of any of the foregoing embodiments of the present disclosure may include situations wherein the resource comprises an energy resource, and wherein the forward resource market comprises a forward market for energy.

A further embodiment of any of the foregoing embodiments of the present disclosure may include situations wherein the resource comprises a data storage resource, and wherein the forward resource market comprises a forward market for data storage capacity.

A further embodiment of any of the foregoing embodiments of the present disclosure may include situations wherein the resource comprises an energy storage resource, and wherein the forward resource market comprises a forward market for energy storage capacity.

A further embodiment of any of the foregoing embodiments of the present disclosure may include situations wherein the resource comprises a network bandwidth resource, and wherein the forward resource market comprises a forward market for network bandwidth.

A further embodiment of any of the foregoing embodiments of the present disclosure may include situations wherein executing the transaction of the resource on the forward resource market comprises one of buying or selling the resource.

A further embodiment of any of the foregoing embodiments of the present disclosure may further include adaptively improving improve one of an output value of the machine or a cost of operation of the machine using executed transactions on the forward resource market.

The present disclosure describes a transaction-enabling system, the system according to one disclosed non-limiting embodiment of the present disclosure can include a fleet of machines each having at least one of a compute task requirement, a networking task requirement, and an energy consumption task requirement; and a controller, comprising: a resource requirement circuit structured to determine an amount of a resource for each of the machines to service at least one of the compute task requirement, the networking task requirement, and the energy consumption task requirement for each corresponding machine; a forward resource market circuit structured to access a forward resource market; and a resource distribution circuit structured to execute an aggregated transaction of the resource on the forward resource market in response to the determined amount of the resource for each of the machines.

A further embodiment of any of the foregoing embodiments of the present disclosure may include situations wherein the resource comprises a compute resource, and wherein the forward resource market comprises a forward market for compute resources.

A further embodiment of any of the foregoing embodiments of the present disclosure may include situations wherein the resource comprises a spectrum allocation resource, and wherein the forward resource market comprises a forward market for spectrum allocation.

A further embodiment of any of the foregoing embodiments of the present disclosure may include situations wherein the resource comprises an energy credit resource, and wherein the forward resource market comprises a forward market for energy credits.

A further embodiment of any of the foregoing embodiments of the present disclosure may include situations wherein the resource comprises an energy resource, and wherein the forward resource market comprises a forward market for energy.

A further embodiment of any of the foregoing embodiments of the present disclosure may include situations wherein the resource comprises a data storage resource, and wherein the forward resource market comprises a forward market for data storage capacity.

A further embodiment of any of the foregoing embodiments of the present disclosure may include situations wherein the resource comprises an energy storage resource, and wherein the forward resource market comprises a forward market for energy storage capacity.

A further embodiment of any of the foregoing embodiments of the present disclosure may include situations wherein the resource comprises a network bandwidth resource, and wherein the forward resource market comprises a forward market for network bandwidth.

A further embodiment of any of the foregoing embodiments of the present disclosure may include situations wherein the aggregated transaction of the resource on the forward resource market comprises one of buying or selling the resource.

A further embodiment of any of the foregoing embodiments of the present disclosure may include situations wherein the resource distribution circuit is further structured to adaptively improve one of an aggregate output value of the fleet of machines or a cost of operation of the fleet of machines using executed aggregated transactions on the forward resource market.

A further embodiment of any of the foregoing embodiments of the present disclosure may include situations wherein the resource distribution circuit further comprises at least one of a machine learning component, an artificial intelligence component, or a neural network component.

The present disclosure describes a method, the method according to one disclosed non-limiting embodiment of the present disclosure can include determining an amount of a resource, for each of machine of a fleet of machines, to service at least one of a compute task requirement, a networking task requirement, and an energy consumption task requirement for each corresponding machine; accessing a forward resource market executing an aggregated transaction of the resource on the forward resource market in response to the determined amount of the resource for each of the machines.

A further embodiment of any of the foregoing embodiments of the present disclosure may include situations wherein the resource comprises a compute resource, and wherein the forward resource market comprises a forward market for compute resources.

A further embodiment of any of the foregoing embodiments of the present disclosure may include situations wherein the resource comprises a spectrum allocation resource, and wherein the forward resource market comprises a forward market for spectrum allocation.

A further embodiment of any of the foregoing embodiments of the present disclosure may include situations wherein the resource comprises an energy credit resource, and wherein the forward resource market comprises a forward market for energy credits.

A further embodiment of any of the foregoing embodiments of the present disclosure may include situations wherein the resource comprises an energy resource, and wherein the forward resource market comprises a forward market for energy.

A further embodiment of any of the foregoing embodiments of the present disclosure may include situations wherein the resource comprises a data storage resource, and wherein the forward resource market comprises a forward market for data storage capacity.

A further embodiment of any of the foregoing embodiments of the present disclosure may include situations wherein the resource comprises an energy storage resource, and wherein the forward resource market comprises a forward market for energy storage capacity.

A further embodiment of any of the foregoing embodiments of the present disclosure may include situations wherein the resource comprises a network bandwidth resource, and wherein the forward resource market comprises a forward market for network bandwidth.

A further embodiment of any of the foregoing embodiments of the present disclosure may include situations wherein executing the aggregated transaction of the resource on the forward resource market comprises one of buying or selling the resource.

A further embodiment of any of the foregoing embodiments of the present disclosure may further include adaptively improving one of an aggregate output value of the fleet of machines or a cost of operation of the fleet of machines using executed aggregated transactions on the forward resource market.

The present disclosure describes a transaction-enabling system, the system according to one disclosed non-limiting embodiment of the present disclosure can include a fleet of machines each having a requirement for at least one of a compute task, a networking task, and an energy consumption task; and a controller, comprising: a resource requirement circuit structured to determine an amount of a resource for each of the machines to service the requirement for the at least one of the compute task, the networking task, and the energy consumption task for each corresponding machine; and a resource distribution circuit structured to adaptively improve a resource utilization of the resource for each of the machines between the compute task, the networking task, and the energy consumption task for each corresponding machine.

A further embodiment of any of the foregoing embodiments of the present disclosure may include situations wherein the resource comprises a compute resource.

A further embodiment of any of the foregoing embodiments of the present disclosure may include situations wherein the resource comprises a spectrum allocation resource.

A further embodiment of any of the foregoing embodiments of the present disclosure may include situations wherein the resource comprises an energy credit resource.

A further embodiment of any of the foregoing embodiments of the present disclosure may include situations wherein the resource comprises an energy resource.

A further embodiment of any of the foregoing embodiments of the present disclosure may include situations wherein the resource comprises a data storage resource.

A further embodiment of any of the foregoing embodiments of the present disclosure may include situations wherein the resource comprises an energy storage resource.

A further embodiment of any of the foregoing embodiments of the present disclosure may include situations wherein the resource comprises a network bandwidth resource.

A further embodiment of any of the foregoing embodiments of the present disclosure may include situations wherein the resource distribution circuit further comprises at least one of a machine learning component, an artificial intelligence component, or a neural network component.

The present disclosure describes a method, the method according to one disclosed non-limiting embodiment of the present disclosure can include determining an amount of a resource, for each of machine of a fleet of machines, to service a requirement of at least one of a compute task, a networking task, and an energy consumption task for each corresponding machine; and adaptively improving a resource utilization of the resource for each of the machines between the compute task, the networking task, and the energy consumption task for each corresponding machine.

A further embodiment of any of the foregoing embodiments of the present disclosure may include situations wherein the resource comprises a compute resource.

A further embodiment of any of the foregoing embodiments of the present disclosure may include situations wherein the resource comprises a spectrum allocation resource.

A further embodiment of any of the foregoing embodiments of the present disclosure may include situations wherein the resource comprises an energy credit resource.

A further embodiment of any of the foregoing embodiments of the present disclosure may include situations wherein the resource comprises an energy resource.

A further embodiment of any of the foregoing embodiments of the present disclosure may include situations wherein the resource comprises a data storage resource.

A further embodiment of any of the foregoing embodiments of the present disclosure may include situations wherein the resource comprises an energy storage resource.

A further embodiment of any of the foregoing embodiments of the present disclosure may include situations wherein the resource comprises a network bandwidth resource.

The present disclosure describes a transaction-enabling system, the system according to one disclosed non-limiting embodiment of the present disclosure can include a machine having at least one of a compute task requirement, a networking task requirement, and an energy consumption task requirement; and a controller, comprising: a resource requirement circuit structured to determine an amount of a resource for the machine to service at least one of the compute task requirement, the networking task requirement, and the energy consumption task requirement; a resource market circuit structured to access a resource market; and a resource distribution circuit structured to execute a transaction of the resource on the resource market in response to the determined amount of the resource.

A further embodiment of any of the foregoing embodiments of the present disclosure may include situations wherein the resource comprises an energy resource, and wherein the resource market comprises a spot market for energy.

A further embodiment of any of the foregoing embodiments of the present disclosure may include situations wherein the resource comprises an energy credit resource, and wherein the resource market comprises a spot market for energy credits.

A further embodiment of any of the foregoing embodiments of the present disclosure may include situations wherein the resource comprises a spectrum allocation resource, and wherein the resource market comprises a spot market for spectrum allocation.

A further embodiment of any of the foregoing embodiments of the present disclosure may include situations wherein the resource distribution circuit is further structured to adaptively improve one of an output value of the machine or a cost of operation of the machine using executed transactions on the resource market.

A further embodiment of any of the foregoing embodiments of the present disclosure may include situations wherein the resource distribution circuit further comprises at least one of a machine learning component, an artificial intelligence component, or a neural network component.

The present disclosure describes a method, the method according to one disclosed non-limiting embodiment of the present disclosure can include determining an amount of a resource for a machine to service at least one of a compute task requirement, a networking task requirement, and an energy consumption task requirement; accessing a resource market; and executing a transaction of the resource on the resource market in response to the determined amount of the resource.

A further embodiment of any of the foregoing embodiments of the present disclosure may include situations wherein the resource comprises an energy resource, and wherein the resource market comprises a spot market for energy.

A further embodiment of any of the foregoing embodiments of the present disclosure may include situations wherein the resource comprises an energy credit resource, and wherein the resource market comprises a spot market for energy credits.

A further embodiment of any of the foregoing embodiments of the present disclosure may include situations wherein the resource comprises a spectrum allocation resource, and wherein the resource market comprises a spot market for spectrum allocation.

A further embodiment of any of the foregoing embodiments of the present disclosure may further include adaptively improving one of an output value of the machine or a cost of operation of the machine using executed transactions on the resource market.

The present disclosure describes a transaction-enabling system, the system according to one disclosed non-limiting embodiment of the present disclosure can include a fleet of machines each having at least one of a compute task requirement, a networking task requirement, and an energy consumption task requirement; and a controller, comprising: a resource requirement circuit structured to determine an amount of a resource for each of the machines to service at least one of the compute task requirement, the networking task requirement, and the energy consumption task requirement for each corresponding machine; a resource market circuit structured to access a resource market; and a resource distribution circuit structured to execute an aggregated transaction of the resource on the resource market in response to the determined amount of the resource for each of the machines.

A further embodiment of any of the foregoing embodiments of the present disclosure may include situations wherein the resource comprises an energy resource, and wherein the resource market comprises a spot market for energy.

A further embodiment of any of the foregoing embodiments of the present disclosure may include situations wherein the resource comprises an energy credit resource, and wherein the resource market comprises a spot market for energy credits.

A further embodiment of any of the foregoing embodiments of the present disclosure may include situations wherein the resource comprises a spectrum allocation resource, and wherein the resource market comprises a spot market for spectrum allocation.

A further embodiment of any of the foregoing embodiments of the present disclosure may include situations wherein the resource distribution circuit is further structured to adaptively improve one of an aggregate output value of the fleet of machines or a cost of operation of the fleet of machines using executed transactions on the resource market.

A further embodiment of any of the foregoing embodiments of the present disclosure may include situations wherein the resource distribution circuit further comprises at least one of a machine learning component, an artificial intelligence component, or a neural network component.

The present disclosure describes a method, the method according to one disclosed non-limiting embodiment of the present disclosure can include determining an amount of a resource, for each of machine of a fleet of machines, to service at least one of a compute task requirement, a networking task requirement, and an energy consumption task requirement for each corresponding machine; accessing a resource market; and executing an aggregated transaction of the resource on the resource market in response to the determined amount of the resource for each of the machines.

A further embodiment of any of the foregoing embodiments of the present disclosure may include situations wherein the resource comprises an energy resource, and wherein the resource market comprises a spot market for energy.

A further embodiment of any of the foregoing embodiments of the present disclosure may include situations wherein the resource comprises an energy credit resource, and wherein the resource market comprises a spot market for energy credits.

A further embodiment of any of the foregoing embodiments of the present disclosure may include situations wherein the resource comprises a spectrum allocation resource, and wherein the resource market comprises a spot market for spectrum allocation.

A further embodiment of any of the foregoing embodiments of the present disclosure may further include adaptively improving one of an aggregate output value of the fleet of machines or a cost of operation of the fleet of machines using executed transactions on the resource market.

The present disclosure describes a transaction-enabling system, the system according to one disclosed non-limiting embodiment of the present disclosure can include a machine having at least one of a compute task requirement, a networking task requirement, and an energy consumption task requirement; and a controller, comprising: a resource requirement circuit structured to determine an amount of a resource for the machine to service at least one of the compute task requirement, the networking task requirement, and the energy consumption task requirement; a social media data circuit structured to interpret data from a plurality of social media data sources; a forward resource market circuit structured to access a forward resource market; a market forecasting circuit structured to predict a forward market price of the resource on the forward resource market in response to the plurality of social media data sources; and a resource distribution circuit structured to execute a transaction of the resource on the forward resource market in response to the determined amount of the resource and the predicted forward market price of the resource.

A further embodiment of any of the foregoing embodiments of the present disclosure may include situations wherein the resource comprises a spectrum allocation resource, and wherein the forward resource market comprises a forward market for spectrum allocation.

A further embodiment of any of the foregoing embodiments of the present disclosure may include situations wherein the resource comprises an energy credit resource, and wherein the forward resource market comprises a forward market for energy credits.

A further embodiment of any of the foregoing embodiments of the present disclosure may include situations wherein the resource comprises an energy resource, and wherein the forward resource market comprises a forward market for energy.

A further embodiment of any of the foregoing embodiments of the present disclosure may include situations wherein the transaction of the resource on the forward resource market comprises one of buying or selling the resource.

A further embodiment of any of the foregoing embodiments of the present disclosure may include situations wherein the market forecasting circuit further comprises at least one of a machine learning component, an artificial intelligence component, or a neural network component.

A further embodiment of any of the foregoing embodiments of the present disclosure may include situations wherein the resource distribution circuit is further structured to adaptively improve one of an output value of the machine or a cost of operation of the machine using executed transactions on the forward resource market.

A further embodiment of any of the foregoing embodiments of the present disclosure may include situations wherein the resource distribution circuit further comprises at least one of a machine learning component, an artificial intelligence component, or a neural network component.

The present disclosure describes a method, the method according to one disclosed non-limiting embodiment of the present disclosure can include determining an amount of a resource for a machine to service at least one of a compute task requirement, a networking task requirement, and an energy consumption task requirement; interpreting data from a plurality of social media data sources; accessing a forward resource market; predicting a forward market price of the resource on the forward resource market in response to the plurality of social media data sources; and executing a transaction of the resource on the forward resource market in response to the determined amount of the resource and the predicted forward market price of the resource.

A further embodiment of any of the foregoing embodiments of the present disclosure may include situations wherein the resource comprises a spectrum allocation resource, and wherein the forward resource market comprises a forward market for spectrum allocation.

A further embodiment of any of the foregoing embodiments of the present disclosure may include situations wherein the resource comprises an energy credit resource, and wherein the forward resource market comprises a forward market for energy credits.

A further embodiment of any of the foregoing embodiments of the present disclosure may include situations wherein the resource comprises an energy resource, and wherein the forward resource market comprises a forward market for energy.

A further embodiment of any of the foregoing embodiments of the present disclosure may include situations wherein executing the transaction of the resource on the forward resource market comprises one of buying or selling the resource.

A further embodiment of any of the foregoing embodiments of the present disclosure may further include adaptively improving one of an output value of the machine or a cost of operation of the machine using executed transactions on the forward resource market.

The present disclosure describes a transaction-enabling system, the system according to one disclosed non-limiting embodiment of the present disclosure can include a machine having at least one of a compute task requirement, a networking task requirement, and an energy consumption task requirement; and a controller. The controller including a resource requirement circuit structured to determine an amount of a resource for the machine to service at least one of the compute task requirement, the networking task requirement, and the energy consumption task requirement; a resource market circuit structured to access a resource market; a market testing circuit structured to execute a first transaction of the resource on the resource market in response to the determined amount of the resource; and an arbitrage execution circuit structured to execute a second transaction of the resource on the resource market in response to the determined amount of the resource and further in response to an outcome of the execution of the first transaction, wherein the second transaction comprises a larger transaction than the first transaction.

A further embodiment of any of the foregoing embodiments of the present disclosure may include situations wherein the resource comprises a compute resource.

A further embodiment of any of the foregoing embodiments of the present disclosure may include situations wherein the resource comprises a spectrum allocation resource.

A further embodiment of any of the foregoing embodiments of the present disclosure may include situations wherein the resource comprises an energy credit resource.

A further embodiment of any of the foregoing embodiments of the present disclosure may include situations wherein the resource comprises an energy resource.

A further embodiment of any of the foregoing embodiments of the present disclosure may include situations wherein the resource comprises a data storage resource.

A further embodiment of any of the foregoing embodiments of the present disclosure may include situations wherein the resource comprises an energy storage resource.

A further embodiment of any of the foregoing embodiments of the present disclosure may include situations wherein the resource comprises a network bandwidth resource.

A further embodiment of any of the foregoing embodiments of the present disclosure may include situations wherein the arbitrage execution circuit is further structured to adaptively improve an arbitrage parameter by adjusting a relative size of the first transaction and the second transaction.

A further embodiment of any of the foregoing embodiments of the present disclosure may include situations wherein the arbitrage parameter comprises at least one parameter selected from the parameters consisting of: a similarity value in a market response of the first transaction and the second transaction; a confidence value of the first transaction to provide test information for the second transaction; and a market effect of the first transaction.

A further embodiment of any of the foregoing embodiments of the present disclosure may include situations wherein the arbitrage execution circuit further comprises at least one of a machine learning component, an artificial intelligence component, or a neural network component.

The present disclosure describes a method, the method according to one disclosed non-limiting embodiment of the present disclosure can include determining an amount of a resource for a machine to service at least one of a compute task requirement, a networking task requirement, and an energy consumption task requirement; accessing a resource market; executing a first transaction of the resource on the resource market in response to the determined amount of the resource; and executing a second transaction of the resource on the resource market in response to the determined amount of the resource and further in response to an outcome of the execution of the first transaction, wherein the second transaction comprises a larger transaction than the first transaction.

A further embodiment of any of the foregoing embodiments of the present disclosure may include situations wherein the resource comprises a compute resource.

A further embodiment of any of the foregoing embodiments of the present disclosure may include situations wherein the resource comprises a spectrum allocation resource.

A further embodiment of any of the foregoing embodiments of the present disclosure may include situations wherein the resource comprises an energy credit resource.

A further embodiment of any of the foregoing embodiments of the present disclosure may include situations wherein the resource comprises an energy resource.

A further embodiment of any of the foregoing embodiments of the present disclosure may include situations wherein the resource comprises a data storage resource.

A further embodiment of any of the foregoing embodiments of the present disclosure may include situations wherein the resource comprises an energy storage resource.

A further embodiment of any of the foregoing embodiments of the present disclosure may include situations wherein the resource comprises a network bandwidth resource.

A further embodiment of any of the foregoing embodiments of the present disclosure may further include adaptively improving an arbitrage parameter by adjusting a relative size of the first transaction and the second transaction.

A further embodiment of any of the foregoing embodiments of the present disclosure may include situations wherein the arbitrage parameter comprises at least one parameter selected from the parameters consisting of: a similarity value in a market response of the first transaction and the second transaction; a confidence value of the first transaction to provide test information for the second transaction; and a market effect of the first transaction.

The present disclosure describes an apparatus, the apparatus according to one disclosed non-limiting embodiment of the present disclosure can include a resource requirement circuit structured to determine an amount of a resource for a machine to service at least one of a compute task requirement, a networking task requirement, and an energy consumption task requirement; a resource market circuit structured to access a resource market; a market testing circuit structured to execute a first transaction of the resource on the resource market in response to the determined amount of the resource; and an arbitrage execution circuit structured to execute a second transaction of the resource on the resource market in response to the determined amount of the resource and further in response to an outcome of the execution of the first transaction, wherein the second transaction comprises a larger transaction than the first transaction.

A further embodiment of any of the foregoing embodiments of the present disclosure may include situations wherein the resource comprises at least one resource selected from the resources consisting of: a compute resource; a spectrum allocation resources; an energy credit resource; an energy resource; a data storage resource; an energy storage resource; and a network bandwidth resource.

A further embodiment of any of the foregoing embodiments of the present disclosure may include situations wherein the arbitrage execution circuit is further structured to adaptively improve an arbitrage parameter by adjusting a relative size of the first transaction and the second transaction.

A further embodiment of any of the foregoing embodiments of the present disclosure may include situations wherein the arbitrage parameter comprises a similarity value in a market response of the first transaction and the second transaction.

A further embodiment of any of the foregoing embodiments of the present disclosure may include situations wherein the arbitrage parameter further comprises a market effect of the first transaction.

A further embodiment of any of the foregoing embodiments of the present disclosure may include situations wherein the arbitrage parameter comprises a confidence value of the first transaction to provide test information for the second transaction.

A further embodiment of any of the foregoing embodiments of the present disclosure may include situations wherein the arbitrage parameter further comprises a market effect of the first transaction.

A further embodiment of any of the foregoing embodiments of the present disclosure may include situations wherein the arbitrage execution circuit further comprises at least one of a machine learning component, an artificial intelligence component, or a neural network component.

The present disclosure describes a transaction-enabling system, the system according to one disclosed non-limiting embodiment of the present disclosure can include a machine having an associated resource capacity for a resource, the machine having a requirement for at least one of a core task, a compute task, an energy storage task, a data storage task, and a networking task; and a controller, comprising: a resource requirement circuit structured to determine an amount of the resource to service the requirement of the at least one of the core task, the compute task, the energy storage task, the data storage task, and the networking task in response to the requirement of the at least one of the core task, the compute task, the energy storage task, the data storage task, and the networking task; and a resource distribution circuit structured to adaptively improve, in response to the associated resource capacity, a resource delivery of the resource between the core task, the compute task, the energy storage task, the data storage task, and the networking task.

A further embodiment of any of the foregoing embodiments of the present disclosure may include situations wherein the associated resource capacity comprises a compute capacity for a compute resource.

A further embodiment of any of the foregoing embodiments of the present disclosure may include situations wherein the associated resource capacity comprises an energy capacity for an energy resource.

A further embodiment of any of the foregoing embodiments of the present disclosure may include situations wherein the associated resource capacity comprises a network bandwidth capacity for a networking resource.

A further embodiment of any of the foregoing embodiments of the present disclosure may include situations wherein the associated resource capacity comprises an energy storage capacity for an energy storage resource.

A further embodiment of any of the foregoing embodiments of the present disclosure may include situations wherein the resource distribution circuit is further structured to adaptively improve the resource delivery in response to one of a quality and an output associated with the core task.

A further embodiment of any of the foregoing embodiments of the present disclosure may include situations wherein the resource distribution circuit is further structured to adaptively improve the resource delivery in response to a cost of operation of the machine.

A further embodiment of any of the foregoing embodiments of the present disclosure may include situations wherein the resource distribution circuit further comprises at least one of a machine learning component, an artificial intelligence component, or a neural network component.

The present disclosure describes a method, the method according to one disclosed non-limiting embodiment of the present disclosure can include determining an amount of a resource to service a core task, a compute task, an energy storage task, a data storage task, and a networking task of a machine, in response to at least one of a core task requirement, a compute task requirement, an energy storage task requirement, a data storage task requirement, and a networking task requirement of the machine; and adaptively improving, in response to an associated resource capacity of the machine, a resource delivery of the resource between the core task, the compute task, the energy storage task, the data storage task, and the networking task.

A further embodiment of any of the foregoing embodiments of the present disclosure may include situations wherein the associated resource capacity comprises a compute capacity for a compute resource.

A further embodiment of any of the foregoing embodiments of the present disclosure may include situations wherein the associated resource capacity comprises an energy capacity for an energy resource.

A further embodiment of any of the foregoing embodiments of the present disclosure may include situations wherein the associated resource capacity comprises a network bandwidth capacity for a networking resource.

A further embodiment of any of the foregoing embodiments of the present disclosure may include situations wherein the associated resource capacity comprises an energy storage capacity for an energy storage resource.

A further embodiment of any of the foregoing embodiments of the present disclosure may further include adaptively improving the resource delivery in response to one of a quality and an output associated with the core task of the machine.

A further embodiment of any of the foregoing embodiments of the present disclosure may further include adaptively improving the resource delivery in response to a cost of operation of the machine.

The present disclosure describes a transaction-enabling system, the system according to one disclosed non-limiting embodiment of the present disclosure can include a fleet of machines each having an associated resource capacity for a resource, and each machine of the fleet of machines further having a requirement for at least one of a core task, a compute task, an energy storage task, a data storage task, and a networking task; and a controller. The controller including a resource requirement circuit structured to determine an aggregated amount of the resource to service the at least one of the core task, the compute task, the energy storage task, the data storage task, and the networking task for each of the fleet of machines in response to the requirement of the at least one of the core task, the compute task, the energy storage task, the data storage task, and the networking task for each one of the fleet of machines; and a resource distribution circuit structured to adaptively improve, in response to an aggregated associated resource capacity, an aggregated resource delivery of the resource between the core task, the compute task, the energy storage task, the data storage task, and the networking task for each machine of the fleet of machines.

A further embodiment of any of the foregoing embodiments of the present disclosure may include situations wherein the aggregated associated resource capacity comprises a compute capacity for a compute resource.

A further embodiment of any of the foregoing embodiments of the present disclosure may include situations wherein the aggregated associated resource capacity comprises an energy capacity for an energy resource.

A further embodiment of any of the foregoing embodiments of the present disclosure may include situations wherein the aggregated associated resource capacity comprises a network bandwidth capacity for a networking resource.

A further embodiment of any of the foregoing embodiments of the present disclosure may include situations wherein the aggregated associated resource capacity comprises an energy storage capacity for an energy storage resource.

A further embodiment of any of the foregoing embodiments of the present disclosure may include situations wherein the resource distribution circuit is further structured to adaptively improve the aggregated resource delivery in response to one of a quality and an output associated with the core task for each machine of the fleet of machines.

A further embodiment of any of the foregoing embodiments of the present disclosure may include situations wherein the resource distribution circuit is further structured to adaptively improve the aggregated resource delivery in response to an aggregated one of a quality and an output associated with the core task for the fleet of machines.

A further embodiment of any of the foregoing embodiments of the present disclosure may include situations wherein the resource distribution circuit is further structured to interpret a resource transferability value between at least two machines of the fleet of machines, and to adaptively improve the aggregated resource delivery further in response to the resource transferability value.

A further embodiment of any of the foregoing embodiments of the present disclosure may include situations wherein the resource distribution circuit is further structured to adaptively improve the aggregated resource delivery in response to a cost of operation of each machine of the fleet of machines.

A further embodiment of any of the foregoing embodiments of the present disclosure may include situations wherein the resource distribution circuit is further structured to adaptively improve the aggregated resource delivery in response to an aggregated cost of operation of the fleet of machines.

A further embodiment of any of the foregoing embodiments of the present disclosure may include situations wherein the resource distribution circuit further comprises at least one of a machine learning component, an artificial intelligence component, or a neural network component.

The present disclosure describes a method, the method according to one disclosed non-limiting embodiment of the present disclosure can include determining an aggregated amount of a resource to service a core task, a compute task, an energy storage task, a data storage task, and a networking task for each machine of a fleet of machines, in response to at least one of a core task requirement, a compute task requirement, an energy storage task requirement, a data storage task requirement, and a networking task requirement for each machine of the fleet of machines; and adaptively improving, in response to an aggregated associated resource capacity of the fleet of machines, an aggregated resource delivery of the resource between the core task, the compute task, the energy storage task, the data storage task, and the networking task for each machine of the fleet of machines.

A further embodiment of any of the foregoing embodiments of the present disclosure may further include adaptively improving the aggregated resource delivery in response to one of a quality and an output associated with the core task for each machine of the fleet of machines.

A further embodiment of any of the foregoing embodiments of the present disclosure may further include adaptively improving the aggregated resource delivery in response to an aggregated one of a quality and an output associated with the core task for each machine of the fleet of machines.

A further embodiment of any of the foregoing embodiments of the present disclosure may further include interpreting a resource transferability value between at least two machines of the fleet of machines, and adaptively improving the aggregated resource delivery further in response to the resource transferability value.

A further embodiment of any of the foregoing embodiments of the present disclosure may further include adaptively improving the aggregated resource delivery in response to a cost of operation of each machine of the fleet of machines.

A further embodiment of any of the foregoing embodiments of the present disclosure may further include adaptively improving the aggregated resource delivery in response to an aggregated cost of operation of the fleet of machines.

The present disclosure describes an apparatus, the apparatus according to one disclosed non-limiting embodiment of the present disclosure can include a resource requirement circuit structured to determine an aggregated amount of a resource to service a core task, a compute task, an energy storage task, a data storage task, and a networking task for each machine of a fleet of machines in response to at least one of a core task requirement, a compute task requirement, an energy storage task requirement, a data storage task requirement, and a networking task requirement for each machine of the fleet of machines; and a resource distribution circuit structured to adaptively improve, in response to an aggregated associated resource capacity of the fleet of machines, an aggregated resource delivery of the resource between the core task, the compute task, the energy storage task, the data storage task, and the networking task for each machine of the fleet of machines.

A further embodiment of any of the foregoing embodiments of the present disclosure may include situations wherein the aggregated associated resource capacity comprises a compute capacity for a compute resource.

A further embodiment of any of the foregoing embodiments of the present disclosure may include situations wherein the aggregated associated resource capacity comprises an energy capacity for an energy resource.

A further embodiment of any of the foregoing embodiments of the present disclosure may include situations wherein the aggregated associated resource capacity comprises a network bandwidth capacity for a networking resource.

A further embodiment of any of the foregoing embodiments of the present disclosure may include situations wherein the aggregated associated resource capacity comprises an energy storage capacity for an energy storage resource.

A further embodiment of any of the foregoing embodiments of the present disclosure may include situations wherein the resource distribution circuit is further structured to adaptively improve the aggregated resource delivery in response to a quality associated with the core task for each machine of the fleet of machines.

A further embodiment of any of the foregoing embodiments of the present disclosure may include situations wherein the resource distribution circuit is further structured to adaptively improve the aggregated resource delivery in response to an output associated with the core task for each machine of the fleet of machines.

A further embodiment of any of the foregoing embodiments of the present disclosure may include situations wherein the resource distribution circuit is further structured to adaptively improve the aggregated resource delivery in response to an aggregated quality associated with the core task for the fleet of machines.

A further embodiment of any of the foregoing embodiments of the present disclosure may include situations wherein the resource distribution circuit is further structured to adaptively improve the aggregated resource delivery in response to an aggregated output associated with the core task for the fleet of machines.

A further embodiment of any of the foregoing embodiments of the present disclosure may include situations wherein the resource distribution circuit is further structured to interpret a resource transferability value between at least two machines of the fleet of machines, and to adaptively improve the aggregated resource delivery further in response to the resource transferability value.

A further embodiment of any of the foregoing embodiments of the present disclosure may include situations wherein the resource distribution circuit is further structured to adaptively improve the aggregated resource delivery in response to a cost of operation of each machine of the fleet of machines.

A further embodiment of any of the foregoing embodiments of the present disclosure may include situations wherein the resource distribution circuit is further structured to adaptively improve the aggregated resource delivery in response to an aggregated cost of operation of the fleet of machines.

A further embodiment of any of the foregoing embodiments of the present disclosure may include situations wherein the resource distribution circuit further comprises at least one of a machine learning component, an artificial intelligence component, or a neural network component.

Provided herein are methods and systems that improve the machines that enable markets, including for increased efficiency, speed, reliability, and the like for participants in such markets.

Provided herein are improved machines that enable distributed transactions to occur at scale among large numbers of participants, including human participants and automated agents.

Certain systems and operations are described herein for improving or optimizing energy utilization and/or acquisition for compute, networking, and/or other tasks.

In embodiments, a platform for enabling transactions is provided having a machine with a regenerative energy facility that optimizes allocation of delivery of energy produced among compute tasks, networking tasks and energy consumption tasks.

In embodiments, a platform for enabling transactions is provided having a machine that automatically purchases its energy in a forward market for energy.

In embodiments, a platform for enabling transactions is provided having a machine that automatically purchases energy credits in a forward market.

In embodiments, a platform for enabling transactions is provided having a fleet of machines that automatically aggregate purchasing in a forward market for energy.

In embodiments, a platform for enabling transactions is provided having a fleet of machines that automatically aggregate purchasing energy credits in a forward market.

In embodiments, a platform for enabling transactions is provided having a machine that automatically purchases spectrum allocation in a forward market for network spectrum.

In embodiments, a platform for enabling transactions is provided having a machine that automatically sells its compute capacity on a forward market for compute capacity.

In embodiments, a platform for enabling transactions is provided having a machine that automatically sells its compute storage capacity on a forward market for storage capacity.

In embodiments, a platform for enabling transactions is provided having a machine that automatically sells its energy storage capacity on a forward market for energy storage capacity.

In embodiments, a platform for enabling transactions is provided having a machine that automatically sells its network bandwidth on a forward market for network capacity.

In embodiments, a platform for enabling transactions is provided having a fleet of machines that automatically purchase spectrum allocation in a forward market for network spectrum.

In embodiments, a platform for enabling transactions is provided having a fleet of machines that automatically optimize energy utilization for compute task allocation (e.g., bitcoin mining).

In embodiments, a platform for enabling transactions is provided having a fleet of machines that automatically aggregate data on collective optimization of forward market purchases of energy.

In embodiments, a platform for enabling transactions is provided having a fleet of machines that automatically aggregate data on collective optimization of forward market purchases of energy credits.

In embodiments, a platform for enabling transactions is provided having a fleet of machines that automatically aggregate data on collective optimization of forward market purchases of network spectrum.

In embodiments, a platform for enabling transactions is provided having a fleet of machines that automatically aggregate data on collective optimization of forward market sales of compute capacity.

In embodiments, a platform for enabling transactions is provided having a machine that automatically purchases its energy in a spot market for energy.

In embodiments, a platform for enabling transactions is provided having a machine that automatically purchases energy credits in a spot market.

In embodiments, a platform for enabling transactions is provided having a fleet of machines that automatically aggregate purchasing in a spot market for energy.

In embodiments, a platform for enabling transactions is provided having a fleet of machines that automatically aggregate purchasing energy credits in a spot market.

In embodiments, a platform for enabling transactions is provided having a machine that automatically purchases spectrum allocation in a spot market for network spectrum.

In embodiments, a platform for enabling transactions is provided having a fleet of machines that automatically purchase spectrum allocation in a spot market for network spectrum.

In embodiments, a platform for enabling transactions is provided having a fleet of machines that automatically optimize energy utilization for compute task allocation (e.g., bitcoin mining).

In embodiments, a platform for enabling transactions is provided having a fleet of machines that automatically aggregate data on collective optimization of spot market purchases of energy.

In embodiments, a platform for enabling transactions is provided having a fleet of machines that automatically aggregate data on collective optimization of spot market purchases of energy credits.

In embodiments, a platform for enabling transactions is provided having a fleet of machines that automatically aggregate data on collective optimization of spot market purchases of network spectrum.

In embodiments, a platform for enabling transactions is provided having a fleet of machines that automatically sell their aggregate compute capacity on a forward market for compute capacity.

In embodiments, a platform for enabling transactions is provided having a fleet of machines that automatically sell their aggregate compute storage capacity on a forward market for storage capacity.

In embodiments, a platform for enabling transactions is provided having a fleet of machines that automatically sell their aggregate energy storage capacity on a forward market for energy storage capacity.

In embodiments, a platform for enabling transactions is provided having a fleet of machines that automatically sell their aggregate network bandwidth on a forward market for network capacity.

In embodiments, a platform for enabling transactions is provided having a machine that automatically forecasts forward market pricing of energy prices based on information collected from social media data sources.

In embodiments, a platform for enabling transactions is provided having a machine that automatically forecasts forward market pricing of network spectrum based on information collected from social media data sources.

In embodiments, a platform for enabling transactions is provided having a machine that automatically forecasts forward market pricing of energy credits based on information collected from social media data sources.

In embodiments, a platform for enabling transactions is provided having a machine that automatically forecasts forward market value of compute capability based on information collected from social media data sources.

In embodiments, a platform for enabling transactions is provided having a machine that automatically executes an arbitrage strategy for purchase or sale of compute capacity by testing a spot market for compute capacity with a small transaction and rapidly executing a larger transaction based on the outcome of the small transaction.

In embodiments, a platform for enabling transactions is provided having a machine that automatically executes an arbitrage strategy for purchase or sale of energy storage capacity by testing a spot market for compute capacity with a small transaction and rapidly executing a larger transaction based on the outcome of the small transaction.

In embodiments, a platform for enabling transactions is provided having a machine that automatically executes an arbitrage strategy for purchase or sale of network spectrum or bandwidth by testing a spot market for compute capacity with a small transaction and rapidly executing a larger transaction based on the outcome of the small transaction.

In embodiments, a platform for enabling transactions is provided having a machine that automatically executes an arbitrage strategy for purchase or sale of energy by testing a spot market for compute capacity with a small transaction and rapidly executing a larger transaction based on the outcome of the small transaction.

In embodiments, a platform for enabling transactions is provided having a machine that automatically executes an arbitrage strategy for purchase or sale of energy credits by testing a spot market for compute capacity with a small transaction and rapidly executing a larger transaction based on the outcome of the small transaction.

In embodiments, a platform for enabling transactions is provided having a machine that automatically allocates its energy capacity among a core task, a compute task, an energy storage task, a data storage task, and a networking task.

In embodiments, a platform for enabling transactions is provided having a machine that automatically allocates its compute capacity among a core task, a compute task, an energy storage task, a data storage task, and a networking task.

In embodiments, a platform for enabling transactions is provided having a machine that automatically allocates its networking capacity among a core task, a compute task, an energy storage task, a data storage task, and a networking task.

In embodiments, a platform for enabling transactions is provided having a fleet of machines that automatically allocate collective energy capacity among a core task, a compute task, an energy storage task, a data storage task, and a networking task.

In embodiments, a platform for enabling transactions is provided having a fleet of machines that automatically allocate collective compute capacity among a core task, a compute task, an energy storage task, a data storage task, and a networking task.

In embodiments, a platform for enabling transactions is provided having a fleet of machines that automatically allocate collective networking capacity among a core task, a compute task, an energy storage task, a data storage task, and a networking task.

Certain systems and/or operations for utilizing a blockchain for knowledge to enable transactions are described herein.

In embodiments, a platform for enabling transactions is provided having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms.

In embodiments, a platform for enabling transactions is provided having a distributed ledger for aggregating intellectual property licensing terms, wherein a smart contract wrapper on the distributed ledger allows an operation on the ledger to add intellectual property to an aggregate stack of intellectual property.

In embodiments, a platform for enabling transactions is provided having a distributed ledger for aggregating intellectual property licensing terms, wherein a smart contract wrapper on the distributed ledger allows an operation on the ledger to add intellectual property to agree to an apportionment of royalties among the parties in the ledger.

In embodiments, a platform for enabling transactions is provided having a distributed ledger for aggregating intellectual property licensing terms, wherein a smart contract wrapper on the distributed ledger allows an operation on the ledger to add intellectual property to an aggregate stack of intellectual property.

In embodiments, a platform for enabling transactions is provided having a distributed ledger for aggregating intellectual property licensing terms, wherein a smart contract wrapper on the distributed ledger allows an operation on the ledger to commit a party to a contract term.

In embodiments, a platform for enabling transactions is provided having a distributed ledger that tokenizes an instruction set, such that operation on the distributed ledger provides provable access to the instruction set.

In embodiments, a platform for enabling transactions is provided having a distributed ledger that tokenizes executable algorithmic logic, such that operation on the distributed ledger provides provable access to the executable algorithmic logic.

In embodiments, a platform for enabling transactions is provided having a distributed ledger that tokenizes a 3D printer instruction set, such that operation on the distributed ledger provides provable access to the instruction set.

In embodiments, a platform for enabling transactions is provided having a distributed ledger that tokenizes an instruction set for a coating process, such that operation on the distributed ledger provides provable access to the instruction set.

In embodiments, a platform for enabling transactions is provided having a distributed ledger that tokenizes an instruction set for a semiconductor fabrication process, such that operation on the distributed ledger provides provable access to the fabrication process.

In embodiments, a platform for enabling transactions is provided having a distributed ledger that tokenizes a firmware program, such that operation on the distributed ledger provides provable access to the firmware program.

In embodiments, a platform for enabling transactions is provided having a distributed ledger that tokenizes an instruction set for an FPGA, such that operation on the distributed ledger provides provable access to the FPGA.

In embodiments, a platform for enabling transactions is provided having a distributed ledger that tokenizes serverless code logic, such that operation on the distributed ledger provides provable access to the serverless code logic.

In embodiments, a platform for enabling transactions is provided having a distributed ledger that tokenizes an instruction set for a crystal fabrication system, such that operation on the distributed ledger provides provable access to the instruction set.

In embodiments, a platform for enabling transactions is provided having a distributed ledger that tokenizes an instruction set for a food preparation process, such that operation on the distributed ledger provides provable access to the instruction set.

In embodiments, a platform for enabling transactions is provided having a distributed ledger that tokenizes an instruction set for a polymer production process, such that operation on the distributed ledger provides provable access to the instruction set.

In embodiments, a platform for enabling transactions is provided having a distributed ledger that tokenizes an instruction set for chemical synthesis process, such that operation on the distributed ledger provides provable access to the instruction set.

In embodiments, a platform for enabling transactions is provided having a distributed ledger that tokenizes an instruction set for a biological production process, such that operation on the distributed ledger provides provable access to the instruction set.

In embodiments, a platform for enabling transactions is provided having a distributed ledger that tokenizes a trade secret with an expert wrapper, such that operation on the distributed ledger provides provable access to the trade secret and the wrapper provides validation of the trade secret by the expert.

In embodiments, a platform for enabling transactions is provided having a distributed ledger that aggregates views of a trade secret into a chain that proves which and how many parties have viewed the trade secret.

In embodiments, a platform for enabling transactions is provided having a distributed ledger that tokenizes an instruction set, such that operation on the distributed ledger provides provable access to the instruction set and execution of the instruction set on a system results in recording a transaction in the distributed ledger.

In embodiments, a platform for enabling transactions is provided having a distributed ledger that tokenizes an item of intellectual property and a reporting system that reports an analytic result based on the operations performed on the distributed ledger or the intellectual property.

In embodiments, a platform for enabling transactions is provided having a distributed ledger that aggregates a set of instructions, where an operation on the distributed ledger adds at least one instruction to a pre-existing set of instructions to provide a modified set of instructions.

Certain systems and/or operations for utilizing and/or executing transactions with an intelligent cryptocurrency or cryptocurrency transaction manager are described herein.

In embodiments, a platform for enabling transactions is provided having a smart wrapper for a cryptocurrency coin that directs execution of a transaction involving the coin to a geographic location based on tax treatment of at least one of the coin and the transaction in the geographic location.

In embodiments, a platform for enabling transactions is provided having a smart wrapper for a cryptocurrency coin that directs execution of a transaction involving the coin to a geographic location based on tax treatment of at least one of the coin and the transaction in the geographic location.

In embodiments, a platform for enabling transactions is provided having a self-executing cryptocurrency coin that commits a transaction upon recognizing a location-based parameter that provides favorable tax treatment.

In embodiments, a platform for enabling transactions is provided having an expert system that uses machine learning to optimize the execution of cryptocurrency transactions based on tax status.

In embodiments, a platform for enabling transactions is provided having an expert system that aggregates regulatory information covering cryptocurrency transactions and automatically selects a jurisdiction for an operation based on the regulatory information.

In embodiments, a platform for enabling transactions is provided having an expert system that uses machine learning to optimize the execution of a cryptocurrency transaction based on real time energy price information for an available energy source.

In embodiments, a platform for enabling transactions is provided having an expert system that uses machine learning to optimize the execution of a cryptocurrency transaction based on an understanding of available energy sources to power computing resources to execute the transaction.

In embodiments, a platform for enabling transactions is provided having an expert system that uses machine learning to optimize charging and recharging cycle of a rechargeable battery system to provide energy for execution of a cryptocurrency transaction.

Certain systems and operations for making forward market predictions, and/or enabling transactions utilizing forward market predictions are described herein. In certain embodiments, forward market predictions described herein include non-traditional data, and/or include data for forward market predictions that are not utilized in previously known systems.

In embodiments, a platform for enabling transactions is provided having an expert system that predicts a forward market price in a market based on an understanding obtained by analyzing Internet of Things data sources and executes a transaction based on the forward market prediction.

In embodiments, a platform for enabling transactions is provided having an expert system that predicts a forward market price in a market based on an understanding obtained by analyzing social network data sources and executes a transaction based on the forward market prediction.

In embodiments, a platform for enabling transactions is provided having an expert system that predicts a forward market price in a market based on an understanding obtained by analyzing Internet of Things data sources and executes a cryptocurrency transaction based on the forward market prediction.

In embodiments, a platform for enabling transactions is provided having an expert system that predicts a forward market price in a market based on an understanding obtained by analyzing social network data sources and executes a cryptocurrency transaction based on the forward market prediction.

In embodiments, a platform for enabling transactions is provided having an expert system that predicts a forward market price in an energy market based on an understanding obtained by analyzing Internet of Things data sources and executes a transaction based on the forward market prediction.

In embodiments, a platform for enabling transactions is provided having an expert system that predicts a forward market price in an energy market based on an understanding obtained by analyzing social network data sources and executes a transaction based on the forward market prediction.

In embodiments, a platform for enabling transactions is provided having an expert system that predicts a forward market price in a market for computing resources based on an understanding obtained by analyzing Internet of Things data sources and executes a transaction based on the forward market prediction.

In embodiments, a platform for enabling transactions is provided having an expert system that predicts a forward market price in a market for spectrum or network bandwidth based on an understanding obtained by analyzing Internet of Things data sources and executes a transaction based on the forward market prediction.

In embodiments, a platform for enabling transactions is provided having an expert system that predicts a forward market price in a market for computing resources based on an understanding obtained by analyzing social network data sources and executes a transaction based on the forward market prediction.

In embodiments, a platform for enabling transactions is provided having an expert system that predicts a forward market price in a market for advertising based on an understanding obtained by analyzing Internet of Things data sources and executes a transaction based on the forward market prediction.

In embodiments, a platform for enabling transactions is provided having an expert system that predicts a forward market price in a market for advertising based on an understanding obtained by analyzing social network data sources and executes a transaction based on the forward market prediction.

In embodiments, a platform for enabling transactions is provided having a machine that automatically forecasts forward market pricing of energy prices based on information collected from automated agent behavioral data sources.

In embodiments, a platform for enabling transactions is provided having a machine that automatically forecasts forward market pricing of network spectrum based on information collected from automated agent behavioral data sources.

In embodiments, a platform for enabling transactions is provided having a machine that automatically forecasts forward market pricing of energy credits based on information collected from automated agent behavioral data sources.

In embodiments, a platform for enabling transactions is provided having a machine that automatically forecasts forward market value of compute capability based on information collected from automated agent behavioral data sources.

In embodiments, a platform for enabling transactions is provided having a machine that automatically forecasts forward market pricing of energy prices based on information collected from business entity behavioral data sources.

In embodiments, a platform for enabling transactions is provided having a machine that automatically forecasts forward market pricing of network spectrum based on information collected from business entity behavioral data sources.

In embodiments, a platform for enabling transactions is provided having a machine that automatically forecasts forward market pricing of energy credits based on information collected from business entity behavioral data sources.

In embodiments, a platform for enabling transactions is provided having a machine that automatically forecasts forward market value of compute capability based on information collected from business entity behavioral data sources.

In embodiments, a platform for enabling transactions is provided having a machine that automatically forecasts forward market pricing of energy prices based on information collected from human behavioral data sources.

In embodiments, a platform for enabling transactions is provided having a machine that automatically forecasts forward market pricing of network spectrum based on information collected from human behavioral data sources.

In embodiments, a platform for enabling transactions is provided having a machine that automatically forecasts forward market pricing of energy credits based on information collected from human behavioral data sources.

In embodiments, a platform for enabling transactions is provided having a machine that automatically forecasts forward market value of compute capability based on information collected from human behavioral data sources.

In embodiments, a platform for enabling transactions is provided having an expert system that predicts a forward market price in a market for spectrum or network bandwidth based on an understanding obtained by analyzing social data sources and executes a transaction based on the forward market prediction.

In embodiments, a platform for enabling transactions is provided having an intelligent agent that is configured to solicit the attention resources of another external intelligent agent.

In embodiments, a platform for enabling transactions is provided having a machine that automatically purchases attention resources in a forward market for attention.

In embodiments, a platform for enabling transactions is provided having a fleet of machines that automatically aggregate purchasing in a forward market for attention.

Provided herein are a flexible, intelligent energy and compute facility, as well as an intelligent energy and compute facility resource management system, including components, systems, services, modules, programs, processes and other enabling elements, such as capabilities for data collection, storage and processing, automated configuration of inputs, resources and outputs, and learning on a training set of facility outcomes, facility parameters, and data collected from data sources to train an artificial intelligence/machine learning system to optimize parameters relevant to such a facility.

In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome.

In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome.

In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles.

In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs.

In embodiments, provided herein is an information technology system for providing data to an intelligent energy and compute facility resource management system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles.

In embodiments, provided herein is an information technology system for providing data to an intelligent energy and compute facility resource management system having a system for learning on a training set of facility outcomes, facility parameters, and data collected from data sources to train an artificial intelligence/machine learning system to optimize configuration of available energy and compute resources to produce a favorable facility resource configuration profile among a set of available profiles.

In embodiments, provided herein is an information technology system for providing data to an intelligent energy and compute facility resource management system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations.

In embodiments, provided herein is an information technology system for providing data to an intelligent energy and compute facility resource management system having a system for learning on a training set of facility outcomes, facility parameters, and data collected from data sources to train an artificial intelligence/machine learning system to generate an indication that a current or prospective customer should be contacted about an output that can be provided by the facility.

In embodiments, provided herein is a system having an intelligent, flexible energy and compute facility whereby an artificial intelligence/machine learning system configures the facility among a set of available configurations based on a set of detected conditions. relating to at least one of an input resource, a facility resource, an output parameter, and an external condition related to the output of the facility.

In embodiments, provided herein is a system having an intelligent, flexible energy and compute facility whereby an artificial intelligence/machine learning system configures the facility among a set of available configurations based on a set of detected conditions relating to a set of input resources.

In embodiments, provided herein is a system having an intelligent, flexible energy and compute facility whereby an artificial intelligence/machine learning system configures the facility among a set of available configurations based on a set of detected conditions relating to a set of facility resources.

In embodiments, provided herein is a system having an intelligent, flexible energy and compute facility whereby an artificial intelligence/machine learning system configures the facility among a set of available configurations based on a set of detected conditions relating to an output parameter.

In embodiments, provided herein is a system having an intelligent, flexible energy and compute facility whereby an artificial intelligence/machine learning system configures the facility among a set of available configurations based on a set of detected conditions relating to a utilization parameter for the output of the facility.

In embodiments, provided herein is a system having an intelligent, flexible energy and compute facility whereby an artificial intelligence/machine learning system configures the facility among a set of available configurations based on a set of parameters received from a digital twin for the facility.

An example transaction-enabling system includes a controller having: an attention market access circuit structured to interpret a number of attention-related resources available on an attention market, an intelligent agent circuit structured to determine an attention-related resource acquisition value based on a cost parameter of at least one of the number of attention-related resources, and an attention acquisition circuit structured to solicit an attention-related resource in response to the attention-related resource acquisition value.

Certain further aspects of an example system are described following, any one or more of which may be present in certain embodiments. An example system includes where the attention acquisition circuit is further structured to perform the soliciting the attention-related resource by performing at least one operation selected from the operations consisting of purchasing the attention-related resource from the attention market; selling the attention-related resource to the attention market; making an offer to sell the attention-related resource to a second intelligent agent; and making an offer to purchase the attention-related resource to the second intelligent agent. An example system includes where the number of attention-related resources includes at least one resource selected from the list consisting of an advertising placement; a search listing; a keyword listing; a banner advertisements; a video advertisement; an embedded video advertisement; a panel activity participation; a survey activity participation; a trial activity participation; and a pilot activity placement or participation. An example system includes one or more of: where the attention market includes a spot market for at least one of the number of attention-related resources; where the cost parameter of at least one of the number of attention-related resources includes a future predicted cost of the at least one of the number of attention-related resources, and where the intelligent agent circuit is further structured to determine the attention-related resource acquisition value in response to a comparison of a first cost on the spot market with the cost parameter; where the attention market includes a forward market for at least one of the number of attention-related resources, and where the cost parameter of the at least one of the number of attention-related resources includes a predicted future cost; and/or where the cost parameter of at least one of the number of attention-related resources includes a future predicted cost of the at least one of the number of attention-related resources, and where the intelligent agent circuit is further structured to determine the attention-related resource acquisition value in response to a comparison of a first cost on the forward market with the cost parameter. An example system includes the intelligent agent circuit further structured to determine the attention-related resource acquisition value in response to the cost parameter of the at least one of the number of attention-related resources having a value that is outside of an expected cost range for the at least one of the number of attention-related resources. An example system includes the intelligent agent circuit is further structured to determine the attention-related resource acquisition value in response to a function of: the cost parameter of the at least one of the number of attention-related resources, and/or an effectiveness parameter of the at least one of the number of attention-related resources. In certain further embodiments, an example controller further includes an external data circuit structured to interpret a social media data source, and where the intelligent agent circuit is further structured to determine, in response to the social media data source, at least one of a future predicted cost of the at least one of the number of attention-related resources, and to utilize the future predicted cost as the cost parameter and/or the effectiveness parameter of the at least one of the number of attention-related resources.

An example system includes a fleet of machines, where each machine includes a task system having a core task and further at least one of a compute task or a network task. The system includes a controller having: an attention market access circuit structured to interpret a number of attention-related resources available on an attention market; an intelligent agent circuit structured to determine an attention-related resource acquisition value based on a cost parameter of at least one of the number of attention-related resources, and further based on the core task for the corresponding machine of the fleet of machines; an attention purchase aggregating circuit structured to determine an aggregate attention-related resource purchase value in response to the number of attention-related resource acquisition values from each intelligent agent circuit corresponding to each machine of the fleet of the machines; and an attention acquisition circuit structured to purchase an attention-related resource in response to the aggregate attention-related resource purchase value.

Certain further aspects of an example system are described following, any one or more of which may be present in certain embodiments. An example system includes where the attention purchase aggregating circuit is positioned at a location selected from the locations consisting of: at least partially distributed on a number of the controllers corresponding to machines of the fleet of machines; on a selected controller corresponding to one of the machines of the fleet of machines; and on a system controller communicatively coupled to the number of the controllers corresponding to machines of the fleet of machines. An example system includes where the attention purchase acquisition circuit is positioned at a location selected from the locations consisting of: at least partially distributed on a number of the controllers corresponding to machines of the fleet of machines; on a selected controller corresponding to one of the machines of the fleet of machines; and on a system controller communicatively coupled to the number of the controllers corresponding to machines of the fleet of machines.

An example procedure includes an operation to interpret a number of attention-related resources available on an attention market, an operation to determine an attention-related resource acquisition value based on a cost parameter of at least one of the number of attention-related resources, and an operation to solicit an attention-related resource in response to the attention-related resource acquisition value.

Certain further aspects of an example procedure are described following, any one or more of which may be present in certain embodiments. An example procedure further includes the operation to perform the soliciting the attention-related resource by performing at least one operation selected from the operations consisting of: purchasing the attention-related resource from the attention market; selling the attention-related resource to the attention market; making an offer to sell the attention-related resource to a second intelligent agent; and making an offer to purchase the attention-related resource to the second intelligent agent. An example procedure further includes where the cost parameter of at least one of the number of attention-related resources includes a future predicted cost of the at least one of the number of attention-related resources, the method further including determining the attention-related resource acquisition value in response to a comparison of a first cost on a spot market with the cost parameter. An example procedure further includes an operation to interpret a social media data source and an operation to determine, in response to the social media data source: a future predicted cost of the at least one of the number of attention-related resources, and to utilize the future predicted cost as the cost parameter; and/or an effectiveness parameter of the at least one of the number of attention-related resources. An example procedure further includes where the operation to determine the attention-related resource acquisition value is further based on the at least one of the future predicted cost or the effectiveness parameter.

An example procedure includes an operation to interpret a number of attention-related resources available on an attention market, an operation to determine an attention-related resource acquisition value for each machine of a fleet of machines based on a cost parameter of at least one of the number of attention-related resources, and further based on a core task for each of a corresponding machine of the fleet of machines, an operation to determine an aggregate attention-related resource purchase value in response to the number of attention-related resource acquisition values corresponding to each machine of the fleet of the machines, and an operation to purchase an attention-related resource in response to the aggregate attention-related resource purchase value.

Certain further aspects of an example procedure are described following, any one or more of which may be present in certain embodiments. An example procedure includes where the cost parameter of at least one of the number of attention-related resources includes a future predicted cost of the at least one of the number of attention-related resources, and where the procedure further includes an operation to determine each attention-related resource acquisition value in response to a comparison of a first cost on a spot market for attention-related resources with the cost parameter. An example procedure further includes an operation to interpret a social media data source and an operation to determine, in response to the social media data source: a future predicted cost of the at least one of the number of attention-related resources, and to utilize the future predicted cost as the cost parameter; and/or an effectiveness parameter of the at least one of the number of attention-related resources. An example procedure further includes the operation to determine the attention-related resource acquisition value further based on the future predicted cost and/or the effectiveness parameter.

DETAILED DESCRIPTION

Figure 1:
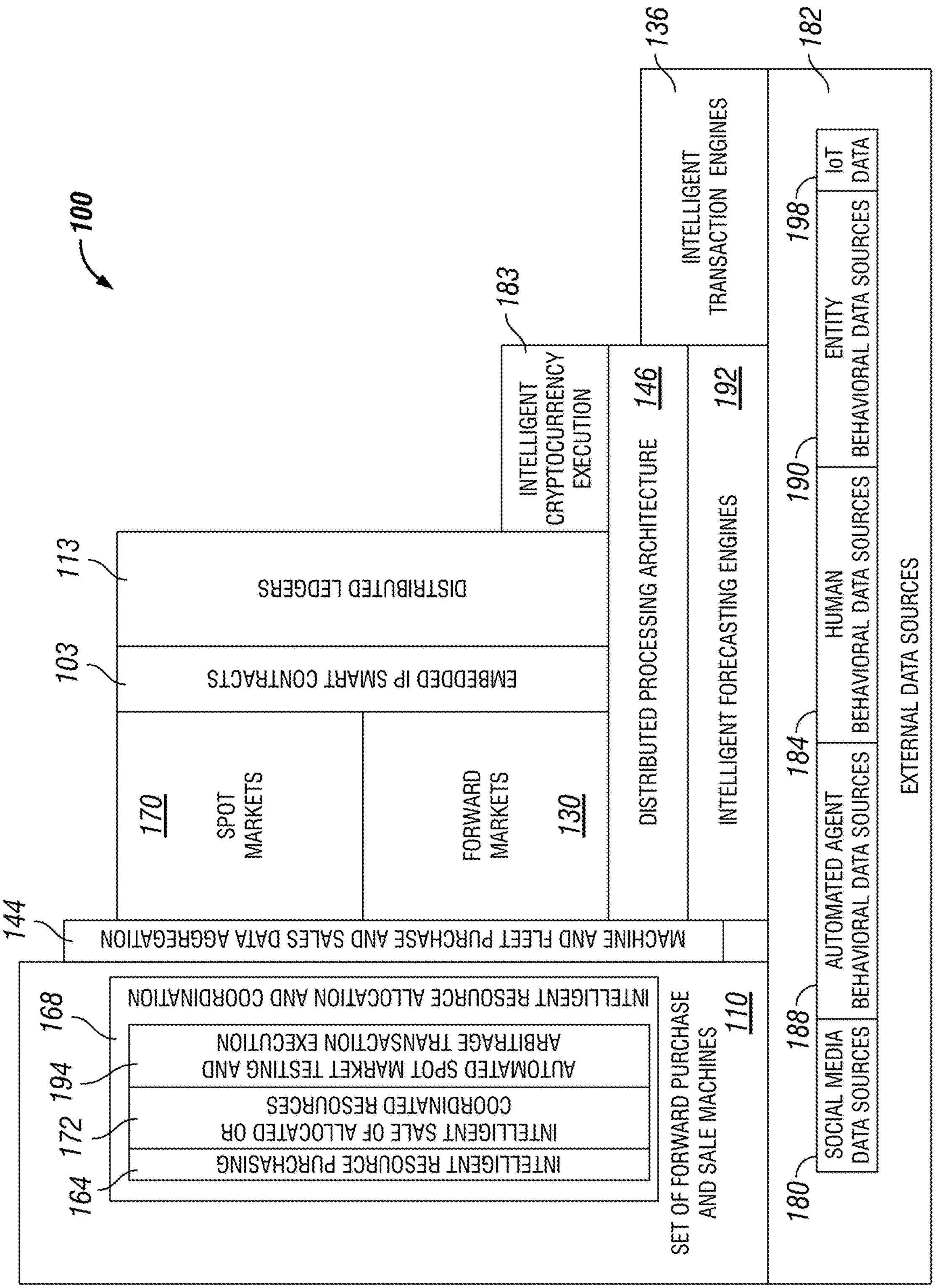
FIG. 1 is a schematic diagram of components of a platform for enabling intelligent transactions in accordance with embodiments of the present disclosure.

Referring to FIG. 1, a set of systems, methods, components, modules, machines, articles, blocks, circuits, services, programs, applications, hardware, software, and other elements are provided, collectively referred to herein interchangeably as the system 100 or the platform 100. The platform 100 enables a wide range of improvements of and for various machines, systems, and other components that enable transactions involving the exchange of value (such as using currency, cryptocurrency, tokens, rewards or the like, as well as a wide range of in-kind and other resources) in various markets, including current or spot markets 170, forward markets 130 and the like, for various goods, services, and resources. As used herein, "currency" should be understood to encompass fiat currency issued or regulated by governments, cryptocurrencies, tokens of value, tickets, loyalty points, rewards points, coupons, credits (e.g., regulatory, emissions, and/or industry recognized exchangeable units of credit), abstracted versions of these (e.g., an arbitrary value index between parties understood to be usable in a future transaction or the like), deliverables (e.g., service up-time, contractual delivery of goods or services including time values utilized for averaging or other measures of delivery which may then be exchanged between parties or utilized to offset other exchanged value), and other elements that represent or may be exchanged for value. Resources, such as ones that may be exchanged for value in a marketplace, should be understood to encompass goods, services, natural resources, energy resources, computing resources, energy storage resources, data storage resources, network bandwidth resources, processing resources and the like, including resources for which value is exchanged and resources that enable a transaction to occur (such as necessary computing and processing resources, storage resources, network resources, and energy resources that enable a transaction). Any currency and/or resources may be abstracted to a uniform and/or normalized value scale, and may additionally or alternatively include a time aspect (e.g., calendar date, seasonal correction, and/or appropriate circumstances relevant to the value of the currency and/or resources at the time of a transaction) and/or an exchange rate aspect (e.g., accounting for the value of a currency or resource relative to another similar unit, such as currency exchange rates between countries, discounting of a good or service relative to a most desired or requested configuration of the good or service, etc.).

The platform 100 may include a set of forward purchase and sale machines 110, each of which may be configured as an expert system or automated intelligent agent for interaction with one or more of the set of spot markets 170 (e.g., reference FIG. 2A) and forward markets 130. Enabling the set of forward purchase and sale machines 110 are an intelligent resource purchasing system 164 having a set of intelligent agents for purchasing resources in spot and forward markets; an intelligent resource allocation and coordination engine 168 for the intelligent sale of allocated or coordinated resources, such as compute resources, energy resources, and other resources involved in or enabling a transaction; an intelligent sale engine 172 for intelligent coordination of a sale of allocated resources in spot and futures markets; and an automated spot market testing and arbitrage transaction execution engine 194 for performing spot testing of spot and forward markets, such as with micro-transactions and, where conditions indicate favorable arbitrage conditions, automatically executing transactions in resources that take advantage of the favorable conditions. Each of the engines may use model-based or rule-based expert systems, such as based on rules or heuristics, as well as deep learning systems by which rules or heuristics may be learned over trials involving a large set of inputs. The engines may use any of the expert systems and artificial intelligence capabilities described throughout this disclosure. Interactions within the platform 100, including of all platform components, and of interactions among them and with various markets, may be tracked and collected, such as by a data aggregation system 144, such as for aggregating data on purchases and sales in various marketplaces by the set of machines described herein. Aggregated data may include tracking and outcome data that may be fed to artificial intelligence and machine learning systems, such as to train or supervise the same.

Operations to aggregate information as referenced throughout the present disclosure should be understood broadly. Example operations to aggregate information (e.g., data, purchasing, regulatory information, or any other parameters) include, without limitation: summaries, averages of data values, selected binning of data, derivative information about data (e.g., rates of change, areas under a curve, changes in an indicated state based on the data, exceedance or conformance with a threshold value, etc.), changes in the data (e.g., arrival of new information or a new type of information, information accrued in a defined or selected time period, etc.), and/or categorical descriptions about the data or other information related to the data). It will be understood that the expression of aggregated information can be as desired, including at least as graphical information, a report, stored raw data for utilization in generating displays and/or further use by an artificial intelligence and/or machine learning system, tables, and/or a data stream. In certain embodiments, aggregated data may be utilized by an expert system, an artificial intelligence, and/or a machine learning system to perform various operations described throughout the present disclosure. Additionally or alternatively, expert systems, artificial intelligence, and/or machine learning systems may interact with the aggregated data, including determining which parameters are to be aggregated and/or the aggregation criteria to be utilized. For example, a machine learning system for a system utilizing a forward energy purchasing market may be configured to aggregate purchasing for the system. In the example, the machine learning system may be configured to determine the signal effective parameters to incrementally improve and/or optimize purchasing decisions, and may additionally or alternatively change the aggregation parameters—for example binning criteria for various components of a system (e.g., components that respond in a similar manner from the perspective of energy requirements), determining the time frame of aggregation (e.g., weekly, monthly, seasonal, etc.), and/or changing a type of average, a reference rate for a rate of change of values in the system, or the like. The provided examples are provided for illustration, and are not limiting to any systems or operations described throughout the present disclosure.

The various engines may operate on a range of data sources, including aggregated data from marketplace transactions, tracking data regarding the behavior of each of the engines, and a set of external data sources 182, which may include social media data sources 180 (such as social networking sites like Facebook™ and Twitter™), Internet of Things (IoT) data sources (including from sensors, cameras, data collectors, appliances, personal devices, and/or instrumented machines and systems), such as IoT sources that provide information about machines and systems that enable transactions and machines and systems that are involved in production and consumption of resources. External data sources 182 may include behavioral data sources, such as automated agent behavioral data sources 188 (such as tracking and reporting on behavior of automated agents that are used for conversation and dialog management, agents used for control functions for machines and systems, agents used for purchasing and sales, agents used for data collection, agents used for advertising, and others), human behavioral data sources (such as data sources tracking online behavior, mobility behavior, energy consumption behavior, energy production behavior, network utilization behavior, compute and processing behavior, resource consumption behavior, resource production behavior, purchasing behavior, attention behavior, social behavior, and others), and entity behavioral data sources 190 (such as behavior of business organizations and other entities, such as purchasing behavior, consumption behavior, production behavior, market activity, merger and acquisition behavior, transaction behavior, location behavior, and others). The IoT, social and behavioral data from and about sensors, machines, humans, entities, and automated agents may collectively be used to populate expert systems, machine learning systems, and other intelligent systems and engines described throughout this disclosure, such as being provided as inputs to deep learning systems and being provided as feedback or outcomes for purposes of training, supervision, and iterative improvement of systems for prediction, forecasting, classification, automation and control. The data may be organized as a stream of events. The data may be stored in a distributed ledger or other distributed system. The data may be stored in a knowledge graph where nodes represent entities and links represent relationships. The external data sources may be queried via various database query functions. The external data sources 182 may be accessed via APIs, brokers, connectors, protocols like REST and SOAP, and other data ingestion and extraction techniques. Data may be enriched with metadata and may be subject to transformation and loading into suitable forms for consumption by the engines, such as by cleansing, normalization, de-duplication, and the like.

The platform 100 may include a set of intelligent forecasting engines 192 for forecasting events, activities, variables, and parameters of spot markets 170, forward markets 130, resources that are traded in such markets, resources that enable such markets, behaviors (such as any of those tracked in the external data sources 182), transactions, and the like. The intelligent forecasting engines 192 may operate on data from the data aggregation system 144 about elements of the platform 100 and on data from the external data sources 182. The platform may include a set of intelligent transaction engines 136 for automatically executing transactions in spot markets 170 and forward markets 130. This may include executing intelligent cryptocurrency transactions with an intelligent cryptocurrency execution engine 183 as described in more detail below. The platform 100 may make use of asset of improved distributed ledgers 113 and improved smart contracts 103, including ones that embed and operate on proprietary information, instruction sets and the like that enable complex transactions to occur among individuals with reduced (or without) reliance on intermediaries. In certain embodiments, the platform 100 may include a distributed processing architecture 146—for example distributing processing or compute tasks across multiple processing devices, clusters, servers, and/or third-party service devices or cloud devices. These and other components are described in more detail throughout this disclosure. In certain embodiments, one or more aspects of any of the platforms referenced in FIGS. 1 to 3 may be performed by any systems, apparatuses, controllers, or circuits as described throughout the present disclosure. In certain embodiments, one or more aspects of any of the platforms referenced in FIGS. 1 to 3 may include any procedures, methods, or operations described throughout the present disclosure. The example platforms depicted in FIGS. 1 to 3 are illustrative, and any aspects may be omitted or altered while still providing one or more benefits as described throughout the present disclosure.

Figure 2A:
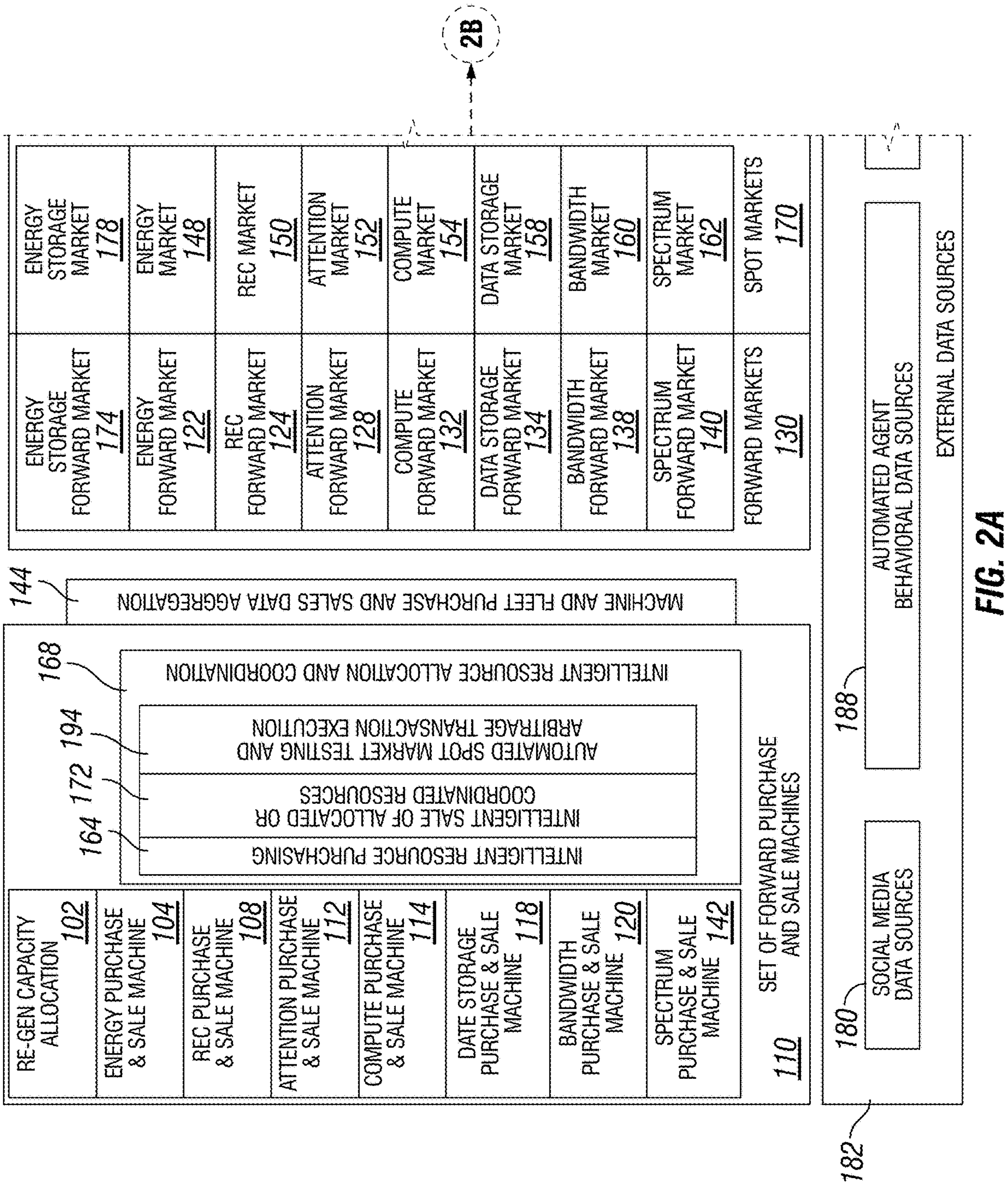
FIGS. 2A-2B is a schematic diagram of additional components of a platform for enabling intelligent transactions in accordance with embodiments of the present disclosure.
Figure 2B:
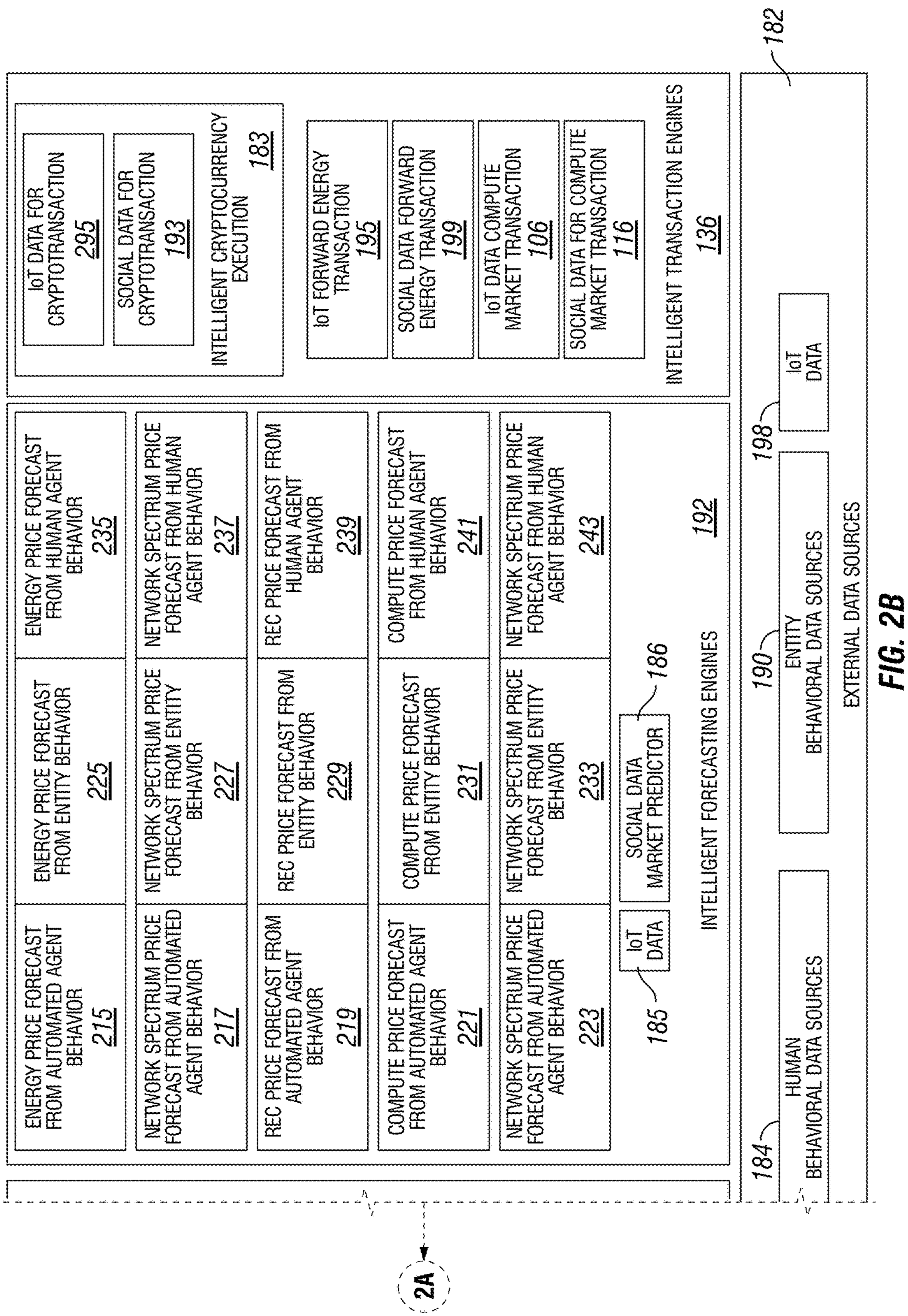
Figure 3:
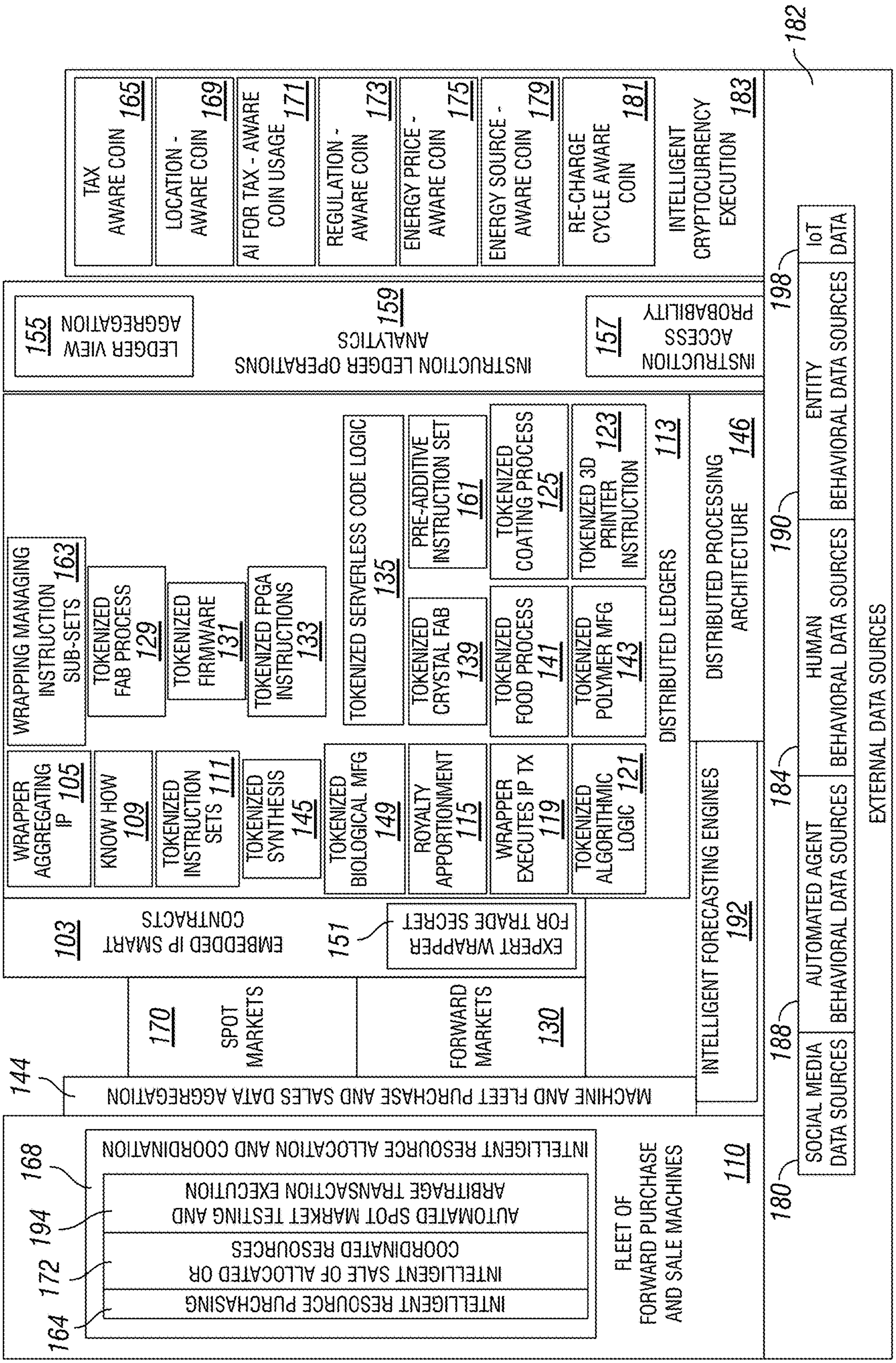
FIG. 3 is a schematic diagram of additional components of a platform for enabling intelligent transactions in accordance with embodiments of the present disclosure.

Referring to the block diagrams of FIGS. 2A-2B, further details and additional components of the platform 100 and interactions among them are depicted. The set of forward purchase and sale machines 110 may include a regeneration capacity allocation engine 102 (such as for allocating energy generation or regeneration capacity, such as within a hybrid vehicle or system that includes energy generation or regeneration capacity, a renewable energy system that has energy storage, or other energy storage system, where energy is allocated for one or more of sale on a forward market 130, sale in a spot market 170, use in completing a transaction (e.g., mining for cryptocurrency), or other purposes. For example, the regeneration capacity allocation engine 102 may explore available options for use of stored energy, such as sale in current and forward energy markets (e.g., energy forward market 122, energy market 148, energy storage forward market 174, and/or energy storage market 178) that accept energy from producers, keeping the energy in storage for future use, or using the energy for work (which may include processing work, such as processing activities of the platform like data collection or processing, or processing work for executing transactions, including mining activities for cryptocurrencies). In certain embodiments, the regeneration capacity allocation engine 102 includes a time value of stored energy, for example accounting for energy leakage (e.g., losses over time when stored), future useful work activities that are expected to arise, competing factors that may affect the stored energy (e.g., a release of reservoir water that is expected to occur at a future time for a non-energy purpose), and/or future energy regeneration that can be predicted that may affect the stored energy value proposition (e.g., energy storage will be exceeded if the energy is retained, and/or the value of available useful work activities will change in a relevant time horizon). In certain embodiments, the regeneration capacity allocation engine 102 includes a rate value of stored energy, for example accounting for the incremental cost or benefit of utilizing stored energy rapidly (e.g., a low utilization of energy at the present time is cost effective, but a high utilization of energy at the present time is not cost effective). In certain embodiments, the regeneration capacity allocation engine 102 considers externalities that are outside of the economic considerations of the immediate system. For example, effects on a reservoir or downstream river bed due to energy utilization, grid capacity and/or grid dynamics effects of providing or not providing energy from the energy storage, and/or system effects from providing or not providing energy (e.g., ramping up server utilization with inexpensive energy immediately before a long holiday that may result in overtime pay for service and maintenance personnel), may affect the economic effectiveness of accepting, storing, or utilizing energy). The provided examples are provided for illustration, and are not limiting to any systems or operations described throughout the present disclosure.

The set of forward purchase and sale machines 110 may include an energy purchase and sale machine 104 for purchasing or selling energy, such as in an energy spot market 148 or an energy forward market 122. The energy purchase and sale machine 104 may use an expert system, neural network or other intelligence to determine timing of purchases, such as based on current and anticipated state information with respect to pricing and availability of energy and based on current and anticipated state information with respect to needs for energy, including needs for energy to perform computing tasks, cryptocurrency mining, data collection actions, and other work, such as work done by automated agents and systems and work required for humans or entities based on their behavior. For example, the energy purchase machine may recognize, by machine learning, that a business is likely to require a block of energy in order to perform an increased level of manufacturing based on an increase in orders or market demand and may purchase the energy at a favorable price on a futures market, based on a combination of energy market data and entity behavioral data. Continuing the example, market demand may be understood by machine learning, such as by processing human behavioral data sources 184, such as social media posts, e-commerce data and the like that indicate increasing demand. The energy purchase and sale machine 104 may sell energy in the energy spot market 148 or the energy forward market 122. Sale may also be conducted by an expert system operating on the various data sources described herein, including with training on outcomes and human supervision.

The set of forward purchase and sale machines 110 may include a renewable energy credit (REC) purchase and sale machine 108, which may purchase renewable energy credits, pollution credits, and other environmental or regulatory credits in a spot market 170 or forward market 124 for such credits. Purchasing may be configured and managed by an expert system operating on any of the external data sources 182 or on data aggregated by the set of data aggregation systems 144 for the platform. Renewable energy credits and other credits may be purchased by an automated system using an expert system, including machine learning or other artificial intelligence, such as where credits are purchased with favorable timing based on an understanding of supply and demand that is determined by processing inputs from the data sources. The expert system may be trained on a data set of outcomes from purchases under historical input conditions. The expert system may be trained on a data set of human purchase decisions and/or may be supervised by one or more human operators. The renewable energy credit (REC) purchase and sale machine 108 may also sell renewable energy credits, pollution credits, and other environmental or regulatory credits in a spot market 170 or forward market 124 for such credits. Sale may also be conducted by an expert system operating on the various data sources described herein, including with training on outcomes and human supervision.

The set of forward purchase and sale machines 110 may include an attention purchase and sale machine 112, which may purchase one or more attention-related resources, such as advertising space, search listing, keyword listing, banner advertisements, participation in a panel or survey activity, participation in a trial or pilot, or the like in a spot market for attention 152 or a forward market for attention 128. Attention resources may include the attention of automated agents, such as bots, crawlers, dialog managers, and the like that are used for searching, shopping, and purchasing. Purchasing of attention resources may be configured and managed by an expert system operating on any of the external data sources 182 or on data aggregated by the set of data aggregation systems 144 for the platform. Attention resources may be purchased by an automated system using an expert system, including machine learning or other artificial intelligence, such as where resources are purchased with favorable timing, such as based on an understanding of supply and demand, that is determined by processing inputs from the various data sources. For example, the attention purchase and sale machine 112 may purchase advertising space in a forward market for advertising based on learning from a wide range of inputs about market conditions, behavior data, and data regarding activities of agent and systems within the platform 100. The expert system may be trained on a data set of outcomes from purchases under historical input conditions. The expert system may be trained on a data set of human purchase decisions and/or may be supervised by one or more human operators. The attention purchase and sale machine 112 may also sell one or more attention-related resources, such as advertising space, search listing, keyword listing, banner advertisements, participation in a panel or survey activity, participation in a trial or pilot, or the like in a spot market for attention 152 or a forward market for attention 128, which may include offering or selling access to, or attention or, one or more automated agents of the platform 100. Sale may also be conducted by an expert system operating on the various data sources described herein, including with training on outcomes and human supervision.

The set of forward purchase and sale machines 110 may include a compute purchase and sale machine 114, which may purchase one or more computation-related resources, such as processing resources, database resources, computation resources, server resources, disk resources, input/output resources, temporary storage resources, memory resources, virtual machine resources, container resources, and others in a spot market for compute 154 or a forward market for compute 132. Purchasing of compute resources may be configured and managed by an expert system operating on any of the external data sources 182 or on data aggregated by the set of data aggregation systems 144 for the platform. Compute resources may be purchased by an automated system using an expert system, including machine learning or other artificial intelligence, such as where resources are purchased with favorable timing, such as based on an understanding of supply and demand, that is determined by processing inputs from the various data sources. For example, the compute purchase and sale machine 114 may purchase or reserve compute resources on a cloud platform in a forward market for computer resources based on learning from a wide range of inputs about market conditions, behavior data, and data regarding activities of agent and systems within the platform 100, such as to obtain such resources at favorable prices during surge periods of demand for computing. The expert system may be trained on a data set of outcomes from purchases under historical input conditions. The expert system may be trained on a data set of human purchase decisions and/or may be supervised by one or more human operators. The compute purchase and sale machine 114 may also sell one or more computation-related resources that are connected to, part of, or managed by the platform 100, such as processing resources, database resources, computation resources, server resources, disk resources, input/output resources, temporary storage resources, memory resources, virtual machine resources, container resources, and others in a spot market for compute 154 or a forward market for compute 132. Sale may also be conducted by an expert system operating on the various data sources described herein, including with training on outcomes and human supervision.

The set of forward purchase and sale machines 110 may include a data storage purchase and sale machine 118, which may purchase one or more data-related resources, such as database resources, disk resources, server resources, memory resources, RAM resources, network attached storage resources, storage attached network (SAN) resources, tape resources, time-based data access resources, virtual machine resources, container resources, and others in a spot market for data storage 158 or a forward market for data storage 134. Purchasing of data storage resources may be configured and managed by an expert system operating on any of the external data sources 182 or on data aggregated by the set of data aggregation systems 144 for the platform. Data storage resources may be purchased by an automated system using an expert system, including machine learning or other artificial intelligence, such as where resources are purchased with favorable timing, such as based on an understanding of supply and demand, that is determined by processing inputs from the various data sources. For example, the compute purchase and sale machine 114 may purchase or reserve compute resources on a cloud platform in a forward market for compute resources based on learning from a wide range of inputs about market conditions, behavior data, and data regarding activities of agent and systems within the platform 100, such as to obtain such resources at favorable prices during surge periods of demand for storage. The expert system may be trained on a data set of outcomes from purchases under historical input conditions. The expert system may be trained on a data set of human purchase decisions and/or may be supervised by one or more human operators. The data storage purchase and sale machine 118 may also sell one or more data storage-related resources that are connected to, part of, or managed by the platform 100 in a spot market for data storage 158 or a forward market for data storage 134. Sale may also be conducted by an expert system operating on the various data sources described herein, including with training on outcomes and human supervision.

The set of forward purchase and sale machines 110 may include a bandwidth purchase and sale machine 120, which may purchase one or more bandwidth-related resources, such as cellular bandwidth, Wifi bandwidth, radio bandwidth, access point bandwidth, beacon bandwidth, local area network bandwidth, wide area network bandwidth, enterprise network bandwidth, server bandwidth, storage input/output bandwidth, advertising network bandwidth, market bandwidth, or other bandwidth, in a spot market for bandwidth 160 or a forward market for bandwidth 138. Purchasing of bandwidth resources may be configured and managed by an expert system operating on any of the external data sources 182 or on data aggregated by the set of data aggregation systems 144 for the platform. Bandwidth resources may be purchased by an automated system using an expert system, including machine learning or other artificial intelligence, such as where resources are purchased with favorable timing, such as based on an understanding of supply and demand, that is determined by processing inputs from the various data sources. For example, the bandwidth purchase and sale machine 120 may purchase or reserve bandwidth on a network resource for a future networking activity managed by the platform based on learning from a wide range of inputs about market conditions, behavior data, and data regarding activities of agent and systems within the platform 100, such as to obtain such resources at favorable prices during surge periods of demand for bandwidth. The expert system may be trained on a data set of outcomes from purchases under historical input conditions. The expert system may be trained on a data set of human purchase decisions and/or may be supervised by one or more human operators. The bandwidth purchase and sale machine 120 may also sell one or more bandwidth-related resources that are connected to, part of, or managed by the platform 100 in a spot market for bandwidth 160 or a forward market for bandwidth 138. Sale may also be conducted by an expert system operating on the various data sources described herein, including with training on outcomes and human supervision.

The set of forward purchase and sale machines 110 may include a spectrum purchase and sale machine 142, which may purchase one or more spectrum-related resources, such as cellular spectrum, 3G spectrum, 4G spectrum, LTE spectrum, 5G spectrum, cognitive radio spectrum, peer-to-peer network spectrum, emergency responder spectrum and the like in a spot market for spectrum 162 or a forward market for spectrum 140. In certain embodiments, a spectrum related resource may relate to a non-wireless communication protocol, such as frequency stacking on a hard line (e.g., a copper wire or optical fiber). Purchasing of spectrum resources may be configured and managed by an expert system operating on any of the external data sources 182 or on data aggregated by the set of data aggregation systems 144 for the platform. Spectrum resources may be purchased by an automated system using an expert system, including machine learning or other artificial intelligence, such as where resources are purchased with favorable timing, such as based on an understanding of supply and demand, that is determined by processing inputs from the various data sources. For example, the spectrum purchase and sale machine 142 may purchase or reserve spectrum on a network resource for a future networking activity managed by the platform based on learning from a wide range of inputs about market conditions, behavior data, and data regarding activities of agent and systems within the platform 100, such as to obtain such resources at favorable prices during surge periods of demand for spectrum. The expert system may be trained on a data set of outcomes from purchases under historical input conditions. The expert system may be trained on a data set of human purchase decisions and/or may be supervised by one or more human operators. The spectrum purchase and sale machine 142 may also sell one or more spectrum-related resources that are connected to, part of, or managed by the platform 100 in a spot market for spectrum 162 or a forward market for spectrum 140. Sale may also be conducted by an expert system operating on the various data sources described herein, including with training on outcomes and human supervision.

In embodiments, the intelligent resource allocation and coordination engine 168, including the intelligent resource purchasing system 164, the intelligent sale engine 172 and the automated spot market testing and arbitrage transaction execution engine 194, may provide coordinated and automated allocation of resources and coordinated execution of transactions across the various forward markets 130 and spot markets 170 by coordinating the various purchase and sale machines, such as by an expert system, such as a machine learning system (which may model-based or a deep learning system, and which may be trained on outcomes and/or supervised by humans). For example, the allocation and coordination engine 168 may coordinate purchasing of resources for a set of assets and coordinated sale of resources available from a set of assets, such as a fleet of vehicles, a data center of processing and data storage resources, an information technology network (on premises, cloud, or hybrids), a fleet of energy production systems (renewable or non-renewable), a smart home or building (including appliances, machines, infrastructure components and systems, and the like thereof that consume or produce resources), and the like.

The platform 100 may incrementally improve or optimize allocation of resource purchasing, sale and utilization based on data aggregated in the platform, such as by tracking activities of various engines and agents, as well as by taking inputs from external data sources 182. In embodiments, outcomes may be provided as feedback for training the intelligent resource allocation and coordination engine 168, such as outcomes based on yield, profitability, optimization of resources, optimization of business objectives, satisfaction of goals, satisfaction of users or operators, or the like. For example, as the energy for computational tasks becomes a significant fraction of an enterprise's energy usage, the platform 100 may learn to optimize how a set of machines that have energy storage capacity allocate that capacity among computing tasks (such as for cryptocurrency mining, application of neural networks, computation on data and the like), other useful tasks (that may yield profits or other benefits), storage for future use, or sale to the provider of an energy grid. The platform 100 may be used by fleet operators, enterprises, governments, municipalities, military units, first responder units, manufacturers, energy producers, cloud platform providers, and other enterprises and operators that own or operate resources that consume or provide energy, computation, data storage, bandwidth, or spectrum. The platform 100 may also be used in connection with markets for attention, such as to use available capacity of resources to support attention-based exchanges of value, such as in advertising markets, micro-transaction markets, and others.

Operations to optimize, as used throughout the present disclosure, should be understood broadly. In certain embodiments, operations to optimize include operations to improve outcomes, including incremental and/or iterative improvements. In certain embodiments, optimization can include operations to improve outcomes until a threshold improvement level is reached (e.g., a success criteria are met, further improvements are below a threshold level of improvement, a particular outcome is improved by a threshold amount, etc.). In certain embodiments, optimization may be performed utilizing a cost and benefit analysis, where cost is in actual currency, a normalized cost value, a cost index configured to describe the resources, time, and/or lost opportunity of a particular action, or any other cost description. In certain embodiments, benefits may be in actual currency, a normalized benefit value, a benefit index, or any other measure or description of the benefit of a particular action. In certain embodiments, other parameters such as the time value and/or time trajectory of costs or benefits may be included in the optimization—for example as a limiting value (e.g., optimization is the best value after 5 minutes of computations) and/or as a factor (e.g., a growing cost or shrinking benefit is applied as optimization analyses progress) in the optimization process. Any operations utilizing artificial intelligence, expert systems, machine learning, and/or any other systems or operations described throughout the present disclosure that incrementally improve, iteratively improve, and/or formally optimize parameters are understood as examples of optimization and/or improvement herein. One of skill in the art, having the benefit of the present disclosure and information ordinarily available when contemplating a particular system, can readily determine parameters and criteria for optimization for a particular system. Certain considerations that may be relevant to a particular system include, without limitation: the cost of resource utilization including time values and/or time trajectories of those costs; the benefits of the action goals (e.g., selling resources, completing calculations, providing bandwidth, etc.) including time values and/or time trajectories of those benefits; seasonal, periodic, and/or episodic effects on the availability of resources and/or the demand for resources; costs of capitalization for a system and/or for a servicing system (e.g., costs to add computing resources, and/or costs for a service provider to add computing resources); operating costs for utilization of resources, including time values, time trajectories, and externalities such as personnel, maintenance, and incremental utilization of service life for resources; capacity of resource providers and/or cost curves for resource utilization; diminishing return curves and/or other external effects for benefit provisions (e.g., the $100^{th}$ unit of computation may pay less than the $50^{th}$ unit of computation for a particular system, and/or the ability to provide 100 units of computation may open other markets and/or allow for servicing of a different customer base than the ability to provide only 50 units of computation); and/or risk factors related to resource utilization (e.g., increasing data storage at a single location may increase risk over distributed data; increasing throughput of a system may change the risks, such as increased traffic, higher operating points for systems, increased risk of regulatory violations, or the like).

Referring still to FIGS. 2A-2B, the platform 100 may include a set of intelligent forecasting engines 192 that forecast one or more attributes, parameters, variables, or other factors, such as for use as inputs by the set of forward purchase and sale machines, the intelligent transaction engines 136 (such as for intelligent cryptocurrency execution) or for other purposes. Each of the set of intelligent forecasting engines 192 may use data that is tracked, aggregated, processed, or handled within the platform 100, such as by the data aggregation system 144, as well as input data from external data sources 182, such as social media data sources 180, automated agent behavioral data sources 188, human behavioral data sources 184, entity behavioral data sources 190 and IoT data sources 198. These collective inputs may be used to forecast attributes, such as using a model (e.g., Bayesian, regression, or other statistical model), a rule, or an expert system, such as a machine learning system that has one or more classifiers, pattern recognizers, and predictors, such as any of the expert systems described throughout this disclosure. In embodiments, the set of intelligent forecasting engines 192 may include one or more specialized engines that forecast market attributes, such as capacity, demand, supply, and prices, using particular data sources for particular markets. These may include an energy price forecasting engine 215 that bases its forecast on behavior of an automated agent, a network spectrum price forecasting engine 217 that bases its forecast on behavior of an automated agent, a REC price forecasting engine 219 that bases its forecast on behavior of an automated agent, a compute price forecasting engine 221 that bases its forecast on behavior of an automated agent, a network spectrum price forecasting engine 223 that bases its forecast on behavior of an automated agent. In each case, observations regarding the behavior of automated agents, such as ones used for conversation, for dialog management, for managing electronic commerce, for managing advertising and others may be provided as inputs for forecasting to the engines. The intelligent forecasting engines 192 may also include a range of engines that provide forecasts at least in part based on entity behavior, such as behavior of business and other organizations, such as marketing behavior, sales behavior, product offering behavior, advertising behavior, purchasing behavior, transactional behavior, merger and acquisition behavior, and other entity behavior. These may include an energy price forecasting engine 225 using entity behavior, a network spectrum price forecasting engine 227 using entity behavior, a REC price forecasting engine 229 using entity behavior, a compute price forecasting engine 231 using entity behavior, and a network spectrum price forecasting engine 233 using entity behavior.

The intelligent forecasting engines 192 may also include a range of engines that provide forecasts at least in part based on human behavior, such as behavior of consumers and users, such as purchasing behavior, shopping behavior, sales behavior, product interaction behavior, energy utilization behavior, mobility behavior, activity level behavior, activity type behavior, transactional behavior, and other human behavior. These may include an energy price forecasting engine 235 using human behavior, a network spectrum price forecasting engine 237 using human behavior, a REC price forecasting engine 239 using human behavior, a compute price forecasting engine 241 using human behavior, and a network spectrum price forecasting engine 243 using human behavior.

Referring still to FIGS. 2A-2B, the platform 100 may include a set of intelligent transaction engines 136 that automate execution of transactions in forward markets 130 and/or spot markets 170 based on determination that favorable conditions exist, such as by the intelligent resource allocation and coordination engine 168 and/or with use of forecasts form the intelligent forecasting engines 192. The intelligent transaction engines 136 may be configured to automatically execute transactions, using available market interfaces, such as APIs, connectors, ports, network interfaces, and the like, in each of the markets noted above. In embodiments, the intelligent transaction engines may execute transactions based on event streams that come from external data sources 182, such as IoT data sources 198 and social media data sources 180. The engines may include, for example, an IoT forward energy transaction engine 195 and/or an IoT compute market transaction engine 106, either or both of which may use data 185 from the Internet of Things (IoT) to determine timing and other attributes for market transaction in a market for one or more of the resources described herein, such as an energy market transaction, a compute resource transaction or other resource transaction. IoT data 185 may include instrumentation and controls data for one or more machines (optionally coordinated as a fleet) that use or produce energy or that use or have compute resources, weather data that influences energy prices or consumption (such as wind data influencing production of wind energy), sensor data from energy production environments, sensor data from points of use for energy or compute resources (such as vehicle traffic data, network traffic data, IT network utilization data, Internet utilization and traffic data, camera data from work sites, smart building data, smart home data, and the like), and other data collected by or transferred within the Internet of Things, including data stored in IoT platforms and of cloud services providers like Amazon, IBM, and others. The intelligent transaction engines 136 may include engines that use social data to determine timing of other attributes for a market transaction in one or more of the resources described herein, such as a social data forward energy transaction engine 199 and/or a social data for compute market transaction engine 116. Social data may include data from social networking sites (e.g., Facebook™, YouTube™, Twitter™, Snapchat™, Instagram™, and others), data from websites, data from e-commerce sites, and data from other sites that contain information that may be relevant to determining or forecasting behavior of users or entities, such as data indicating interest or attention to particular topics, goods or services, data indicating activity types and levels, such as may be observed by machine processing of image data showing individuals engaged in activities, including travel, work activities, leisure activities, and the like. Social data may be supplied to machine learning, such as for learning user behavior or entity behavior, and/or as an input to an expert system, a model, or the like, such as one for determining, based on the social data, the parameters for a transaction. For example, an event or set of events in a social data stream may indicate the likelihood of a surge of interest in an online resource, a product, or a service, and compute resources, bandwidth, storage, or like may be purchased in advance (avoiding surge pricing) to accommodate the increased interest reflected by the social data market predictor 186.

Referring to FIG. 3, the platform 100 may include capabilities for transaction execution that involve one or more distributed ledgers 113 and one or more smart contracts 103, where the distributed ledgers 113 and smart contracts 103 are configured to enable specialized transaction features for specific transaction domains. One such domain is intellectual property, which transactions are highly complex, involving licensing terms and conditions that are somewhat difficult to manage, as compared to more straightforward sales of goods or services. In embodiments, a smart contract wrapper, such as wrapper aggregating intellectual property 105, is provided, using a distributed ledger, wherein the smart contract embeds IP licensing terms for intellectual property that is embedded in the distributed ledger and wherein executing an operation on the distributed ledger provides access to the intellectual property and commits the executing party to the IP licensing terms. Licensing terms for a wide range of goods and services, including digital goods like video, audio, video game, video game element, music, electronic book, and other digital goods may be managed by tracking transactions involving them on a distributed ledger, whereby publishers may verify a chain of licensing and sublicensing. The distributed ledger may be configured to add each licensee to the ledger, and the ledger may be retrieved at the point of use of a digital item, such as in a streaming platform, to validate that licensing has occurred.

In embodiments, an improved distributed ledger is provided with the smart contract wrapper, such as an IP wrapper 105, container, smart contract, or similar mechanism for aggregating intellectual property licensing terms, wherein a smart contract wrapper on the distributed ledger allows an operation on the ledger to add intellectual property to an aggregate stack of intellectual property. In many cases, intellectual property builds on other intellectual property, such as where software code is derived from other code, where trade secrets or know-how 109 for elements of a process are combined to enable a larger process, where patents covering sub-components of a system or steps in a process are pooled, where elements of a video game include sub-component assets from different creators, where a book contains contributions from multiple authors, and the like. In embodiments, a smart IP wrapper aggregates licensing terms for different intellectual property items (including digital goods, including ones embodying different types of intellectual property rights, and transaction data involving the item), as well as optionally one or more portions of the item corresponding to the transaction data, are stored in a distributed ledger that is configured to enable validation of agreement to the licensing terms (such as at a point of use) and/or access control to the item. In certain embodiments, a smart IP wrapper may include sub-licenses, dependent licenses, verification of ownership and chain of title, and/or any other features that ensure that a license is valid and is able to be used. In embodiments, a royalty apportionment wrapper 115 may be provided in a system having a distributed ledger for aggregating intellectual property licensing terms, wherein a smart contract wrapper on the distributed ledger allows an operation on the ledger to add intellectual property and to agree to an apportionment of royalties among the parties in the ledger. Thus, a ledger may accumulate contributions to the ledger along with evidence of agreement to the apportionment of any royalties among the contributors of the IP that is embedded in and/or controlled by the ledger. The ledger may record licensing terms and automatically vary them as new contributions are made, such as by one or more rules. For example, contributors may be given a share of a royalty stack according to a rule, such as based on a fractional contribution, such as based on lines of code contributed, a number and/or value of effective operations contributed from a set of operations performed by one or more computer programs, a valuation contribution from a particular IP element into a larger good or service provided under the license or license group, lines of authorship, contribution to components of a system, and the like. In embodiments, a distributed ledger may be forked into versions that represent varying combinations of sub-components of IP, such as to allow users to select combinations that are of most use, thereby allowing contributors who have contributed the most value to be rewarded. Variation and outcome tracking may be iteratively improved, such as by machine learning. In certain embodiments, operations on a distributed ledger may include updating the licensing terms, valuations, and/or royalty shares according to external data, such as litigation and/or administrative decisions (e.g., from a patent or trademark office) that may affect intellectual property assets (e.g., increasing a validity estimate, determining an asset is invalid or unenforceable, and/or creating a determined valuation for the asset), changes of ownership, expiration and/or aging of assets, and/or changing of asset status (e.g., a patent application issuing as a patent).

In embodiments, a distributed ledger is provided for aggregating intellectual property licensing terms, wherein a smart contract wrapper on the distributed ledger allows an operation on the ledger to add intellectual property to an aggregate stack of intellectual property and/or to determine the relationship of the contributed intellectual property to the aggregate stack and to royalty generating elements related to the aggregate stack such as goods or services sold using the licensing terms. In certain embodiments, operations on the ledger update the relationships of various elements of intellectual property in the aggregate stack in response to additions to the stack—for example where a newly contributed element of intellectual property replaces an older one for certain goods or services, and/or changes the value proposition for intellectual property elements already in the aggregate stack.

In embodiments, the platform 100 may have an improved distributed ledger for aggregating intellectual property licensing terms, wherein a smart contract wrapper on the distributed ledger allows an operation on the ledger to commit a party to a contract term via an IP transaction wrapper 119 of the ledger. This may include operations involving cryptocurrencies, tokens, or other operations, as well as conventional payments and in-kind transfers, such as of various resources described herein. The ledger may accumulate evidence of commitments to IP transactions by parties, such as entering into royalty terms, revenue sharing terms, IP ownership terms, warranty and liability terms, license permissions and restrictions, field of use terms, and many others. In certain embodiments, the ledger may accumulate transactional data between parties which may include costs and/or payments in any form, including abstract or indexed valuations that may be converted to currency and/or traded goods or services at a later time. In certain embodiments, the ledger may additionally or alternatively include geographic information (e.g., where a transaction occurred, where contractual acceptance is deemed to have occurred, where goods or services were performed/delivered, and/or where related data is stored), entity information (e.g., which entities, sub-entities, and/or affiliates are involved in licenses and transactions), and/or time information (e.g., when acceptance occurs, when licensing and updates occur, when goods and services are ordered, when contractual terms or payments are committed, and/or when contractual terms or payments are delivered). It can be seen that the use of improved distributed ledgers throughout the disclosure supports numerous improvements over previously known systems, including at least improved management of licensing agreements, tax management, contract management, data security, regulatory compliance, confidence that the agreed terms are correct on the merits, and confidence that the agreed terms are implemented properly.

In embodiments, improved distributed ledgers may include ones having a tokenized instruction set, such that operation on the distributed ledger provides provable access to the instruction set. A party wishing to share permission to know how, a trade secret or other valuable instructions may thus share the instruction set via a distributed ledger that captures and stores evidence of an action on the ledger by a third party, thereby evidencing access and agreement to terms and conditions of access. In embodiments, the platform 100 may have a distributed ledger that tokenizes executable algorithmic logic 121, such that operation on the distributed ledger provides provable access to the executable algorithmic logic. A variety of instruction sets may be stored by a distributed ledger, such as to verify access and verify agreement to terms (such as smart contract terms). In embodiments, instruction sets that embody trade secrets may be separated into sub-components, so that operations must occur on multiple ledgers to get (provable) access to a trade secret. This may permit parties wishing to share secrets, such as with multiple sub-contractors or vendors, to maintain provable access control, while separating components among different vendors to avoid sharing an entire set with a single party. Various kinds of executable instruction sets may be stored on specialized distributed ledgers that may include smart wrappers for specific types of instruction sets, such that provable access control, validation of terms, and tracking of utilization may be performed by operations on the distributed ledger (which may include triggering access controls within a content management system or other systems upon validation of actions taken in a smart contract on the ledger. In embodiments, the platform 100 may have a distributed ledger that tokenizes a 3D printer instruction set 123, such that operation on the distributed ledger provides provable access to the instruction set.

In embodiments, the platform 100 may have a distributed ledger that tokenizes an instruction set for a coating process 125, such that operation on the distributed ledger provides provable access to the instruction set.

In embodiments, the platform 100 may have a distributed ledger that tokenizes an instruction set for a semiconductor fabrication process 129, such that operation on the distributed ledger provides provable access to the fabrication process.

In embodiments, the platform 100 may have a distributed ledger that tokenizes a firmware program 131, such that operation on the distributed ledger provides provable access to the firmware program.

In embodiments, the platform 100 may have a distributed ledger that tokenizes an instruction set for an FPGA 133, such that operation on the distributed ledger provides provable access to the FPGA.

In embodiments, the platform 100 may have a distributed ledger that tokenizes serverless code logic 135, such that operation on the distributed ledger provides provable access to the serverless code logic.

In embodiments, the platform 100 may have a distributed ledger that tokenizes an instruction set for a crystal fabrication system 139, such that operation on the distributed ledger provides provable access to the instruction set.

In embodiments, the platform 100 may have a distributed ledger that tokenizes an instruction set for a food preparation process 141, such that operation on the distributed ledger provides provable access to the instruction set.

In embodiments, the platform 100 may have a distributed ledger that tokenizes an instruction set for a polymer production process 143, such that operation on the distributed ledger provides provable access to the instruction set.

In embodiments, the platform 100 may have a distributed ledger that tokenizes an instruction set for chemical synthesis process 145, such that operation on the distributed ledger provides provable access to the instruction set.

In embodiments, the platform 100 may have a distributed ledger that tokenizes an instruction set for a biological production process 149, such that operation on the distributed ledger provides provable access to the instruction set.

In embodiments, the platform 100 may have a distributed ledger that tokenizes a trade secret with an expert wrapper 151, such that operation on the distributed ledger provides provable access to the trade secret and the wrapper provides validation of the trade secret by the expert. An interface may be provided by which an expert accesses the trade secret on the ledger and verifies that the information is accurate and sufficient to allow a third party to use the secret.

In embodiments, the platform 100 may have a distributed ledger that includes instruction ledger operation analytics 159, for example providing aggregate views 155 of a trade secret into a chain that proves which and how many parties have viewed the trade secret. Views may be used to allocate value to creators of the trade secret, to operators of the platform 100, or the like. In embodiments, the platform 100 may have a distributed ledger that determines an instruction access probability 157, such as a chance that an instruction set or other IP element has been accessed, will be accessed, and/or will be accessed in a given time frame (e.g., the next day, next week, next month, etc.).

In embodiments, the platform 100 may have a distributed ledger that tokenizes an instruction set 111, such that operation on the distributed ledger provides provable access (e.g., presented as views 155) to the instruction set 111 and execution of the instruction set 161 on a system results in recording a transaction in the distributed ledger.

In embodiments, the platform 100 may have a distributed ledger that tokenizes an item of intellectual property and a reporting system that reports an analytic result based on the operations performed on the distributed ledger or the intellectual property, for example using the instruction ledger operations analytics. In certain embodiments, analytics may additionally or alternatively be provided for any distributed ledger and data stored thereon, such as IP, algorithmic logic, or any other distributed ledger operations described throughout the present disclosure.

In embodiments, the platform 100 may have a distributed ledger that aggregates a set of instructions, where an operation on the distributed ledger adds at least one instruction to a pre-existing set of instructions 161 to provide a modified set of instructions.

Referring still to FIG. 3, an intelligent cryptocurrency execution engine 183 may provide intelligence for the timing, location, and other attributes of a cryptocurrency transaction, such as a mining transaction, an exchange transaction, a storage transaction, a retrieval transaction, or the like. Cryptocurrencies like Bitcoin™ are increasingly widespread, with specialized coins having emerged for a wide variety of purposes, such as exchanging value in various specialized market domains. Initial offerings of such coins, or ICOs, are increasingly subject to regulations, such as securities regulations, and in some cases to taxation. Thus, while cryptocurrency transactions typically occur within computer networks, jurisdictional factors may be important in determining where, when, and how to execute a transaction, store a cryptocurrency, exchange it for value. In embodiments, intelligent cryptocurrency execution engine 183 may use features embedded in or wrapped around the digital object representing a coin, such as features that cause the execution of transactions in the coin to be undertaken with awareness of various conditions, including geographic conditions, regulatory conditions, tax conditions, market conditions, IoT data for cryptotransaction 295 and social data for cryptotransaction 193, and the like.

In embodiments, the platform 100 may include a tax aware coin 165 or smart wrapper for a cryptocurrency coin that directs execution of a transaction involving the coin to a geographic location based on tax treatment of at least one of the coin and the transaction in the geographic location.

In embodiments, the platform 100 may include a location-aware coin 169 or smart wrapper that enables a self-executing cryptocurrency coin that commits a transaction upon recognizing a location-based parameter that provides favorable tax treatment.

In embodiments, the platform 100 may include an expert system or AI agent for tax-aware coin usage 171 that uses machine learning to optimize the execution of cryptocurrency transactions based on tax status. Machine learning may use one or more models or heuristics, such as populated with relevant jurisdictional tax data, may be trained on a training set of human trading operations, may be supervised by human supervisors, and/or may use a deep learning technique based on outcomes over time, such as when operating on a wide range of internal system data and external data sources 182 as described throughout this disclosure.

In embodiments, the platform 100 may include regulation aware coin 173 having a coin, a smart wrapper, and/or an expert system that aggregates regulatory information covering cryptocurrency transactions and automatically selects a jurisdiction for an operation based on the regulatory information. Machine learning may use one or more models or heuristics, such as populated with relevant jurisdictional regulatory data, may be trained on a training set of human trading operations, may be supervised by human supervisors, and/or may use a deep learning technique based on outcomes over time, such as when operating on a wide range of internal system data and external data sources 182 as described throughout this disclosure.

In embodiments, the platform 100 may include an energy price-aware coin 175, wrapper, or expert system that uses machine learning to optimize the execution of a cryptocurrency transaction based on real time energy price information for an available energy source. Cryptocurrency transactions, such as coin mining and blockchain operations, may be highly energy intensive. An energy price-aware coin may be configured to time such operations based on energy price forecasts, such as with one or more of the intelligent forecasting engines 192 described throughout this disclosure.

In embodiments, the platform 100 may include an energy source aware coin 179, wrapper, or expert system that uses machine learning to optimize the execution of a cryptocurrency transaction based on an understanding of available energy sources to power computing resources to execute the transaction. For example, coin mining may be performed only when renewable energy sources are available. Machine learning for optimization of a transaction may use one or more models or heuristics, such as populated with relevant energy source data (such as may be captured in a knowledge graph, which may contain energy source information by type, location and operating parameters), may be trained on a training set of input-output data for human-initiated transactions, may be supervised by human supervisors, and/or may use a deep learning technique based on outcomes over time, such as when operating on a wide range of internal system data and external data sources 182 as described throughout this disclosure.

In embodiments, the platform 100 may include a charging cycle aware coin 181, wrapper, or an expert system that uses machine learning to optimize charging and recharging cycle of a rechargeable battery system to provide energy for execution of a cryptocurrency transaction. For example, a battery may be discharged for a cryptocurrency transaction only if a minimum threshold of battery charge is maintained for other operational use, if re-charging resources are known to be readily available, or the like. Machine learning for optimization of charging and recharging may use one or more models or heuristics, such as populated with relevant battery data (such as may be captured in a knowledge graph, which may contain energy source information by type, location and operating parameters), may be trained on a training set of human operations, may be supervised by human supervisors, and/or may use a deep learning technique based on outcomes over time, such as when operating on a wide range of internal system data and external data sources 182 as described throughout this disclosure.

Optimization of various intelligent coin operations may occur with machine learning that is trained on outcomes, such as financial profitability. Any of the machine learning systems described throughout this disclosure may be used for optimization of intelligent cryptocurrency transaction management.

In embodiments, compute resources, such as those mentioned throughout this disclosure, may be allocated to perform a range of computing tasks, both for operations that occur within the platform 100, ones that are managed by the platform, and ones that involve the activities, workflows and processes of various assets that may be owned, operated or managed in conjunction with the platform, such as sets or fleets of assets that have or use computing resources. Examples of compute tasks include, without limitation, cryptocurrency mining, distributed ledger calculations and storage, forecasting tasks, transaction execution tasks, spot market testing tasks, internal data collection tasks, external data collection, machine learning tasks, and others. As noted above, energy, compute resources, bandwidth, spectrum, and other resources may be coordinated, such as by machine learning, for these tasks. Outcome and feedback information may be provided for the machine learning, such as outcomes for any of the individual tasks and overall outcomes, such as yield and profitability for business or other operations involving the tasks.

In embodiments, networking resources, such as those mentioned throughout this disclosure, may be allocated to perform a range of networking tasks, both for operations that occur within the platform 100, ones that are managed by the platform, and ones that involve the activities, workflows and processes of various assets that may be owned, operated or managed in conjunction with the platform, such as sets or fleets of assets that have or use networking resources. Examples of networking tasks include cognitive network coordination, network coding, peer bandwidth sharing (including, for example cost-based routing, value-based routing, outcome-based routing, and the like), distributed transaction execution, spot market testing, randomization (e.g., using genetic programming with outcome feedback to vary network configurations and transmission paths), internal data collection and external data collection. As noted above, energy, compute resources, bandwidth, spectrum, and other resources may be coordinated, such as by machine learning, for these networking tasks. Outcome and feedback information may be provided for the machine learning, such as outcomes for any of the individual tasks and overall outcomes, such as yield and profitability for business or other operations involving the tasks.

In embodiments, data storage resources, such as those mentioned throughout this disclosure, may be allocated to perform a range of data storage tasks, both for operations that occur within the platform 100, ones that are managed by the platform, and ones that involve the activities, workflows and processes of various assets that may be owned, operated or managed in conjunction with the platform, such as sets or fleets of assets that have or use networking resources. Examples of data storage tasks include distributed ledger storage, storage of internal data (such as operational data with the platform), cryptocurrency storage, smart wrapper storage, storage of external data, storage of feedback and outcome data, and others. As noted above, data storage, energy, compute resources, bandwidth, spectrum, and other resources may be coordinated, such as by machine learning, for these data storage tasks. Outcome and feedback information may be provided for the machine learning, such as outcomes for any of the individual tasks and overall outcomes, such as yield and profitability for business or other operations involving the tasks.

In embodiments, smart contracts, such as ones embodying terms relating to intellectual property, trade secrets, know how, instruction sets, algorithmic logic, and the like may embody or include contract terms, which may include terms and conditions for options, royalty stacking terms, field exclusivity, partial exclusivity, pooling of intellectual property, standards terms (such as relating to essential and non-essential patent usage), technology transfer terms, consulting service terms, update terms, support terms, maintenance terms, derivative works terms, copying terms, and performance-related rights or metrics, among many others.

In embodiments where an instruction set is embodied in digital form, such as contained in or managed by a distributed ledger transactions system, various systems may be configured with interfaces that allow them to access and use the instruction sets. In embodiments, such systems may include access control features that validate proper licensing by inspection of a distributed ledger, a key, a token, or the like that indicates the presence of access rights to an instruction set. Such systems that execute distributed instruction sets may include systems for 3D printing, crystal fabrication, semiconductor fabrication, coating items, producing polymers, chemical synthesis, and biological production, among others.

Networking capabilities and network resources should be understood to include a wide range of networking systems, components and capabilities, including infrastructure elements for 3G, 4G, LTE, 5G and other cellular network types, access points, routers, and other WiFi elements, cognitive networking systems and components, mobile networking systems and components, physical layer, MAC layer and application layer systems and components, cognitive networking components and capabilities, peer-to-peer networking components and capabilities, optical networking components and capabilities, and others.

Referring to FIG. 4 through FIG. 31, embodiments of the present disclosure, including ones involving expert systems, self-organization, machine learning, artificial intelligence, and the like, may benefit from the use of a neural net, such as a neural net trained for pattern recognition, for classification of one or more parameters, characteristics, or phenomena, for support of autonomous control, and other purposes. References to a neural net throughout this disclosure should be understood to encompass a wide range of different types of neural networks, machine learning systems, artificial intelligence systems, and the like, such as feed forward neural networks, radial basis function neural networks, self-organizing neural networks (e.g., Kohonen self-organizing neural networks), recurrent neural networks, modular neural networks, artificial neural networks, physical neural networks, multi-layered neural networks, convolutional neural networks, hybrids of neural networks with other expert systems (e.g., hybrid fuzzy logic—neural network systems), Autoencoder neural networks, probabilistic neural networks, time delay neural networks, convolutional neural networks, regulatory feedback neural networks, radial basis function neural networks, recurrent neural networks, Hopfield neural networks, Boltzmann machine neural networks, self-organizing map (SOM) neural networks, learning vector quantization (LVQ) neural networks, fully recurrent neural networks, simple recurrent neural networks, echo state neural networks, long short-term memory neural networks, bi-directional neural networks, hierarchical neural networks, stochastic neural networks, genetic scale RNN neural networks, committee of machines neural networks, associative neural networks, physical neural networks, instantaneously trained neural networks, spiking neural networks, neocognitron neural networks, dynamic neural networks, cascading neural networks, neuro-fuzzy neural networks, compositional pattern-producing neural networks, memory neural networks, hierarchical temporal memory neural networks, deep feed forward neural networks, gated recurrent unit (GRU) neural networks, auto encoder neural networks, variational auto encoder neural networks, denoising auto encoder neural networks, sparse auto-encoder neural networks, Markov chain neural networks, restricted Boltzmann machine neural networks, deep belief neural networks, deep convolutional neural networks, deconvolutional neural networks, deep convolutional inverse graphics neural networks, generative adversarial neural networks, liquid state machine neural networks, extreme learning machine neural networks, echo state neural networks, deep residual neural networks, support vector machine neural networks, neural Turing machine neural networks, and/or holographic associative memory neural networks, or hybrids or combinations of the foregoing, or combinations with other expert systems, such as rule-based systems, model-based systems (including ones based on physical models, statistical models, flow-based models, biological models, biomimetic models, and the like).

Figure 4:
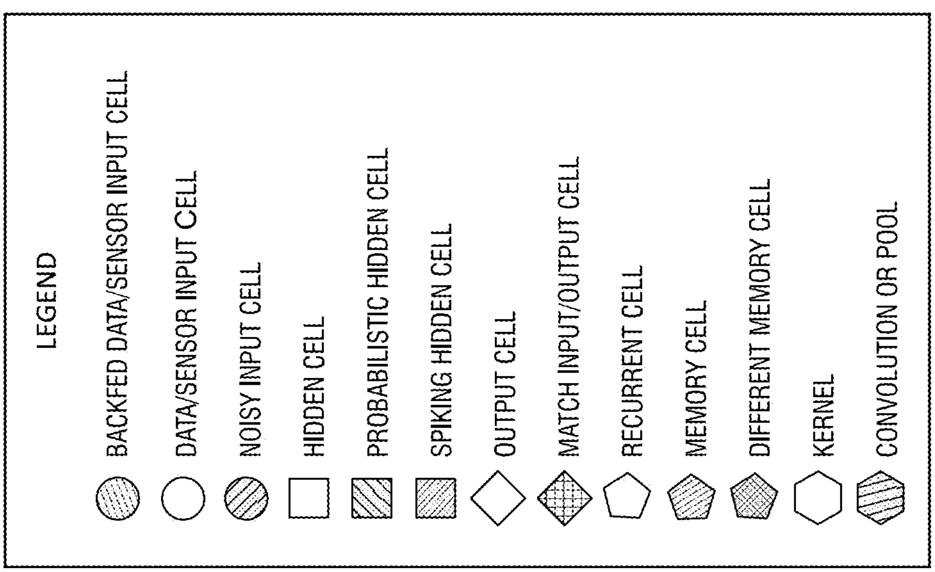
FIG. 4 to FIG. 31 are schematic diagrams of embodiments of neural net systems that may connect to, be integrated in, and be accessible by the platform for enabling intelligent transactions including ones involving expert systems, self-organization, machine learning, artificial intelligence and including neural net systems trained for pattern recognition, for classification of one or more parameters, characteristics, or phenomena, for support of autonomous control, and other purposes in accordance with embodiments of the present disclosure.

In embodiments, FIGS. 5 through 31 depict exemplary neural networks and FIG. 4 depicts a legend showing the various components of the neural networks depicted throughout FIGS. 5 to 31. FIG. 4 depicts various neural net components depicted in cells that are assigned functions and requirements. In embodiments, the various neural net examples may include (from top to bottom in the example of FIG. 4): back fed data/sensor input cells, data/sensor input cells, noisy input cells, and hidden cells. The neural net components also include probabilistic hidden cells, spiking hidden cells, output cells, match input/output cells, recurrent cells, memory cells, different memory cells, kernels, and convolution or pool cells.

Figure 5:
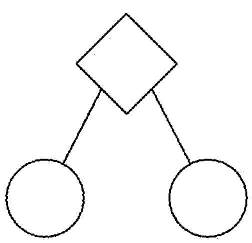
Figure 6:
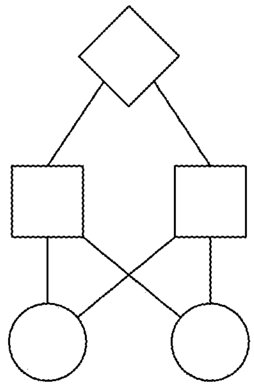
Figure 7:
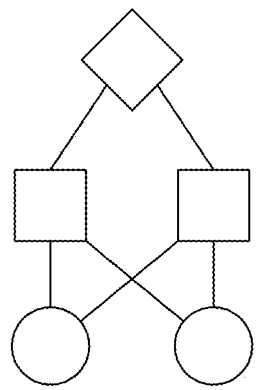
Figure 8:
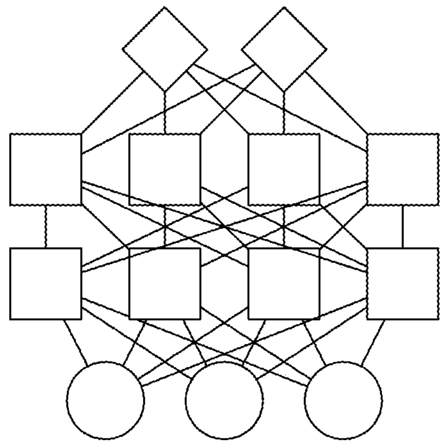
Figure 9:
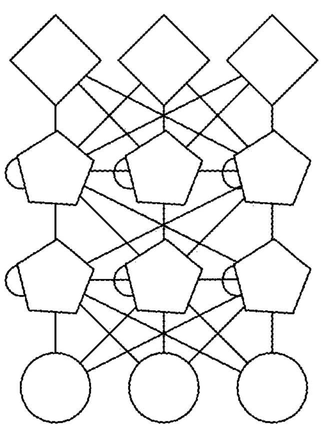
Figure 10:
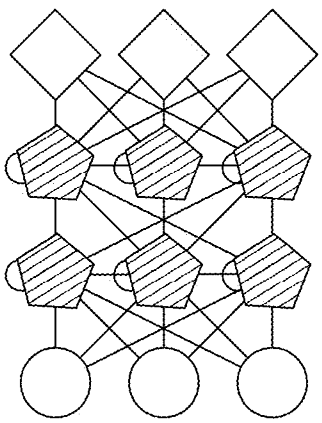
Figure 11:
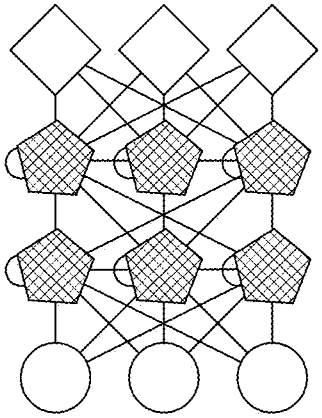
Figure 12:
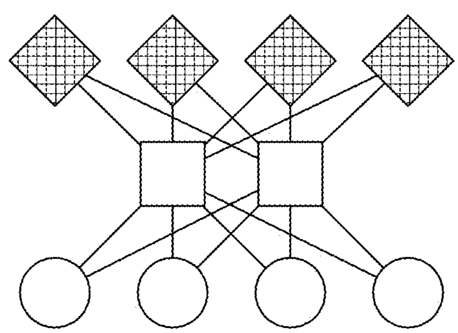
Figure 13:
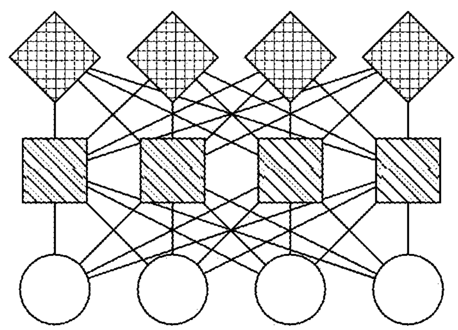
Figure 14:
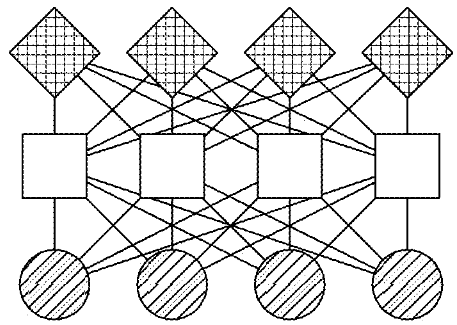
Figure 15:
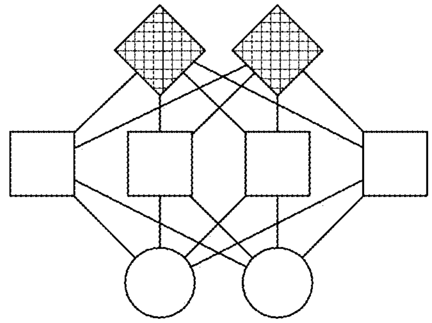
Figure 18:
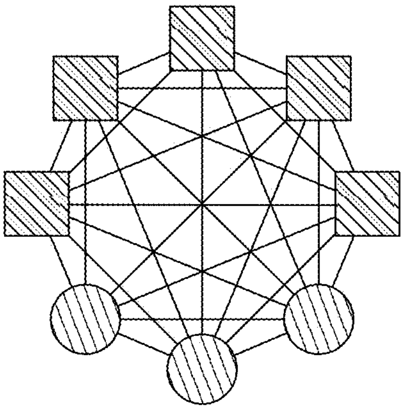
Figure 17:
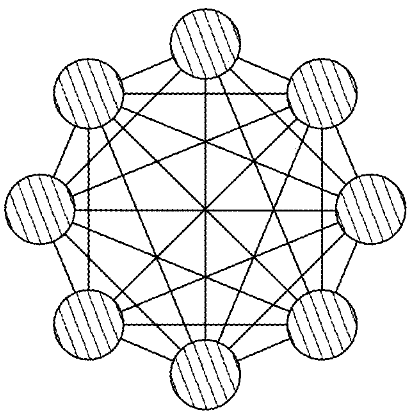
Figure 16:
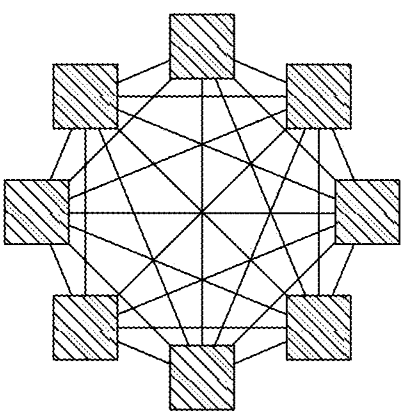
Figure 20:
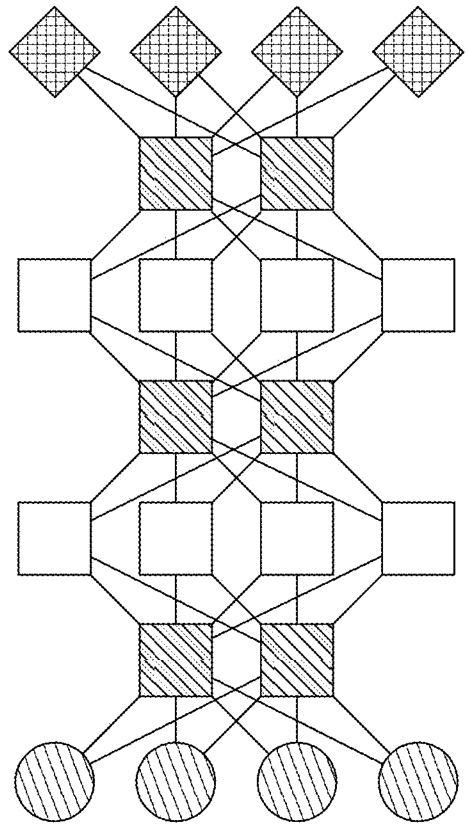
Figure 19:
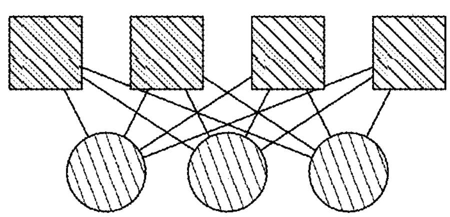
Figure 22:
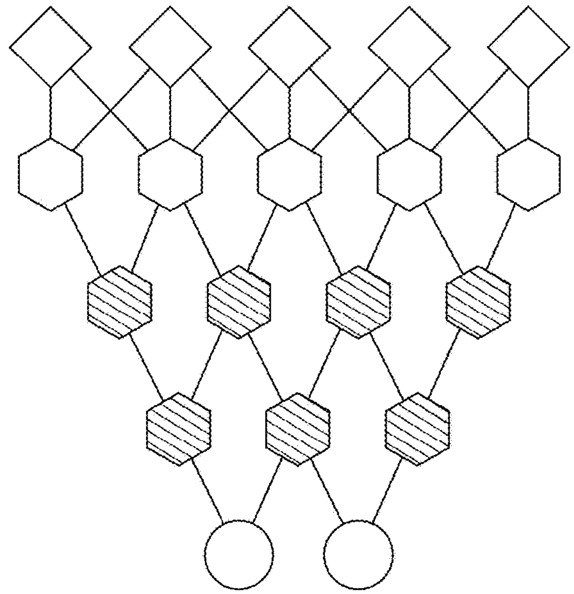
Figure 21:
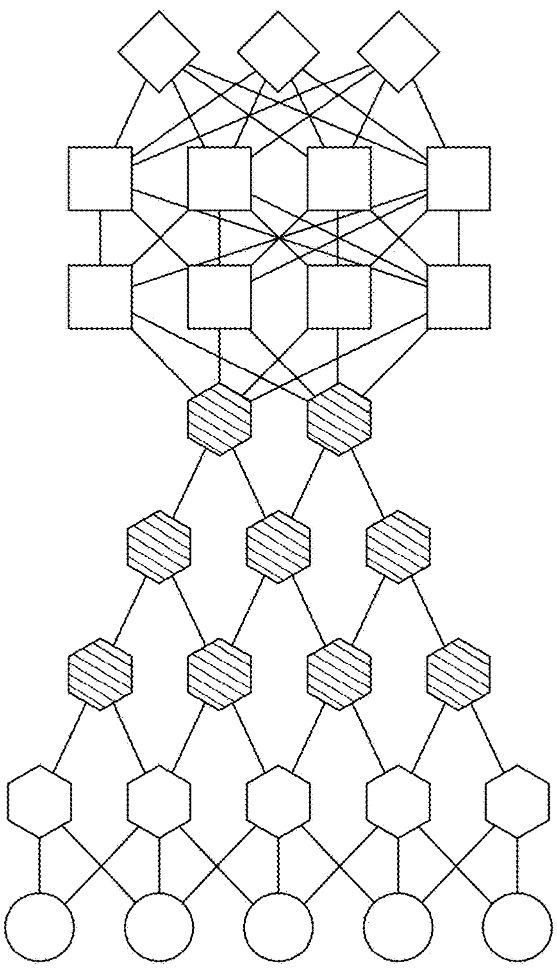
Figure 23:
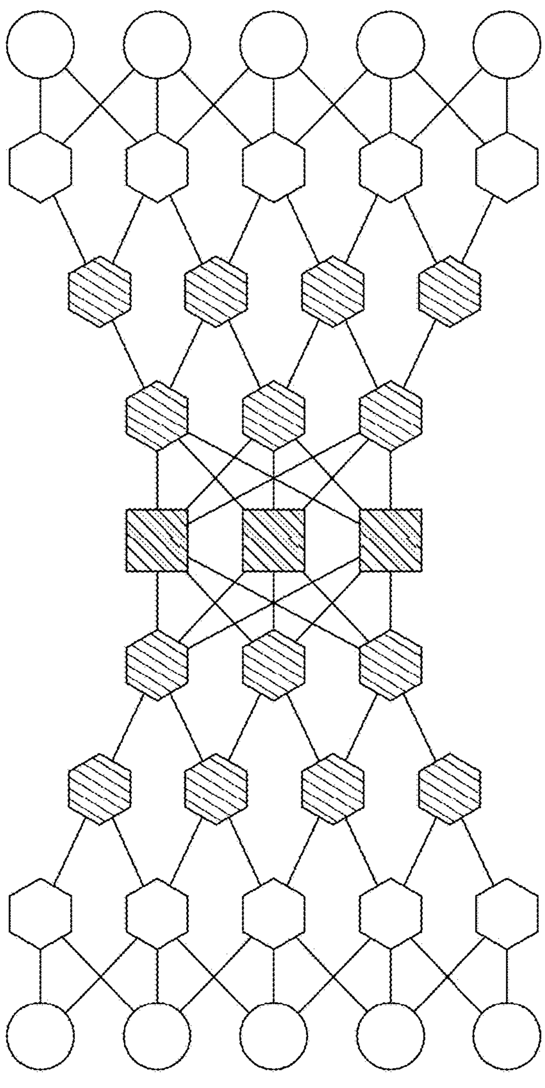
Figure 24:
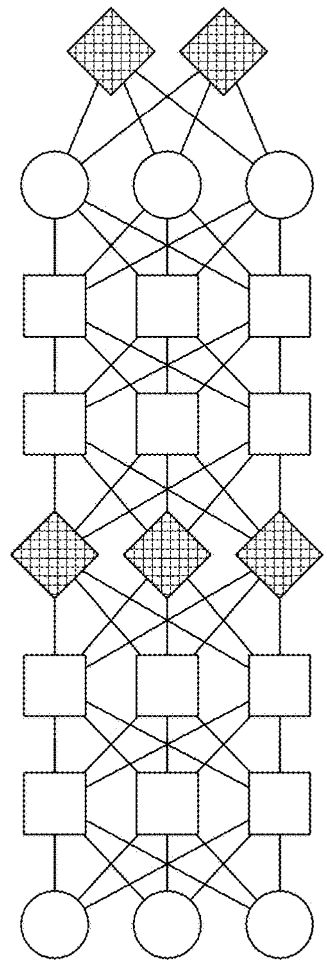
Figure 26:
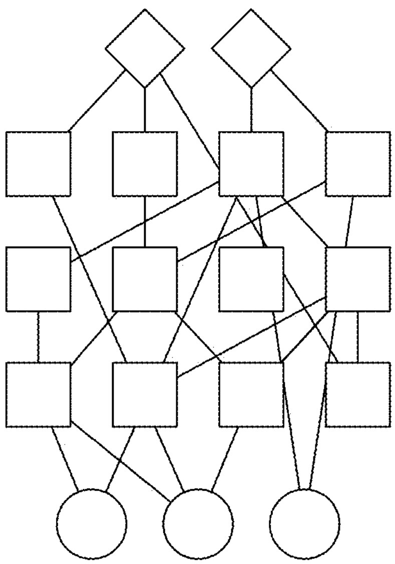
Figure 28:
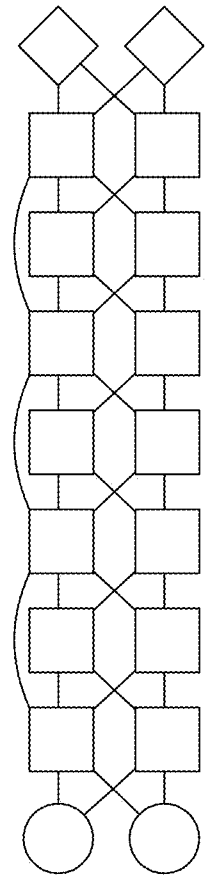
Figure 25:
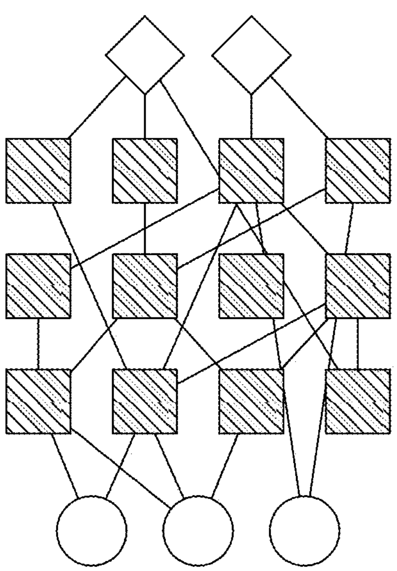
Figure 27:
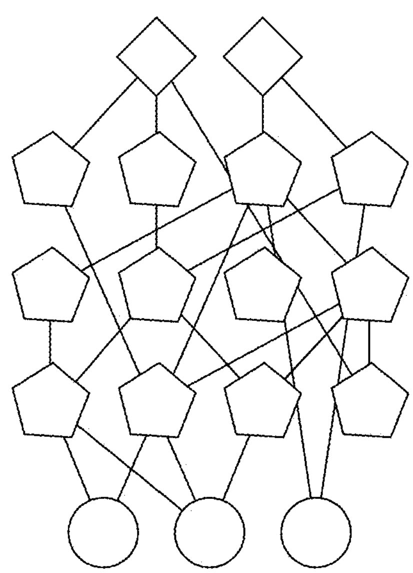
Figure 29:
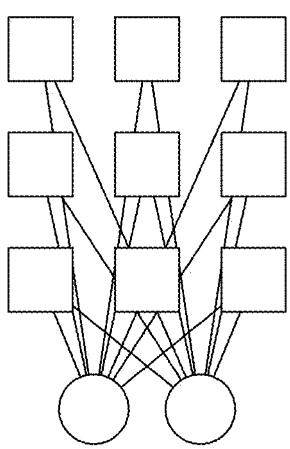
Figure 30:
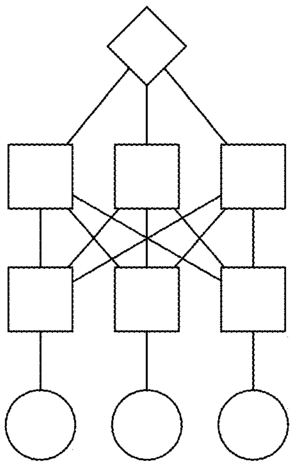
Figure 31:
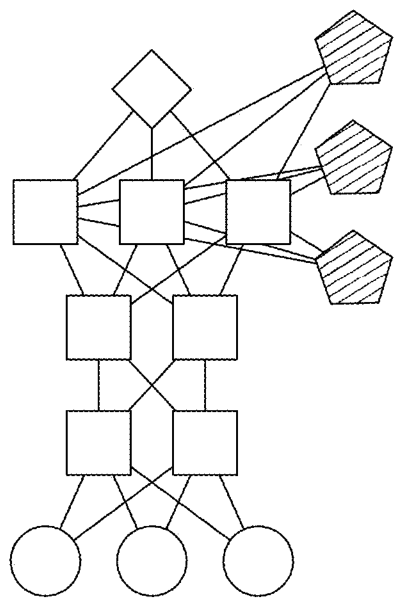

In embodiments, FIG. 5 depicts an exemplary perceptron neural network that may connect to, integrate with, or interface with the platform 100. The platform may also be associated with further neural net systems such as a feed forward neural network (FIG. 6), a radial basis neural network (FIG. 7), a deep feed forward neural network (FIG. 8), a recurrent neural network (FIG. 9), a long/short term neural network (FIG. 10), and a gated recurrent neural network (FIG. 11). The platform may also be associated with further neural net systems such as an auto encoder neural network (FIG. 12), a variational neural network (FIG. 13), a denoising neural network (FIG. 14), a sparse neural network (FIG. 15), a Markov chain neural network (FIG. 16), and a Hopfield network neural network (FIG. 17). The platform may further be associated with additional neural net systems such as a Boltzmann machine neural network (FIG. 18), a restricted BM neural network (FIG. 19), a deep belief neural network (FIG. 20), a deep convolutional neural network (FIG. 21), a deconvolutional neural network (FIG. 22), and a deep convolutional inverse graphics neural network (FIG. 23). The platform may also be associated with further neural net systems such as a generative adversarial neural network (FIG. 24), a liquid state machine neural network (FIG. 25), an extreme learning machine neural network (FIG. 26), an echo state neural network (FIG. 27), a deep residual neural network (FIG. 28), a Kohonen neural network (FIG. 29), a support vector machine neural network (FIG. 30), and a neural Turing machine neural network (FIG. 31).

The foregoing neural networks may have a variety of nodes or neurons, which may perform a variety of functions on inputs, such as inputs received from sensors or other data sources, including other nodes. Functions may involve weights, features, feature vectors, and the like. Neurons may include perceptrons, neurons that mimic biological functions (such as of the human senses of touch, vision, taste, hearing, and smell), and the like. Continuous neurons, such as with sigmoidal activation, may be used in the context of various forms of neural net, such as where back propagation is involved.

In many embodiments, an expert system or neural network may be trained, such as by a human operator or supervisor, or based on a data set, model, or the like. Training may include presenting the neural network with one or more training data sets that represent values, such as sensor data, event data, parameter data, and other types of data (including the many types described throughout this disclosure), as well as one or more indicators of an outcome, such as an outcome of a process, an outcome of a calculation, an outcome of an event, an outcome of an activity, or the like. Training may include training in optimization, such as training a neural network to optimize one or more systems based on one or more optimization approaches, such as Bayesian approaches, parametric Bayes classifier approaches, k-nearest-neighbor classifier approaches, iterative approaches, interpolation approaches, Pareto optimization approaches, algorithmic approaches, and the like. Feedback may be provided in a process of variation and selection, such as with a genetic algorithm that evolves one or more solutions based on feedback through a series of rounds.

In embodiments, a plurality of neural networks may be deployed in a cloud platform that receives data streams and other inputs collected (such as by mobile data collectors) in one or more transactional environments and transmitted to the cloud platform over one or more networks, including using network coding to provide efficient transmission. In the cloud platform, optionally using massively parallel computational capability, a plurality of different neural networks of various types (including modular forms, structure-adaptive forms, hybrids, and the like) may be used to undertake prediction, classification, control functions, and provide other outputs as described in connection with expert systems disclosed throughout this disclosure. The different neural networks may be structured to compete with each other (optionally including use evolutionary algorithms, genetic algorithms, or the like), such that an appropriate type of neural network, with appropriate input sets, weights, node types and functions, and the like, may be selected, such as by an expert system, for a specific task involved in a given context, workflow, environment process, system, or the like.

In embodiments, methods and systems described herein that involve an expert system or self-organization capability may use a feed forward neural network, which moves information in one direction, such as from a data input, like a data source related to at least one resource or parameter related to a transactional environment, such as any of the data sources mentioned throughout this disclosure, through a series of neurons or nodes, to an output. Data may move from the input nodes to the output nodes, optionally passing through one or more hidden nodes, without loops. In embodiments, feed forward neural networks may be constructed with various types of units, such as binary McCulloch-Pitts neurons, the simplest of which is a perceptron.

In embodiments, methods and systems described herein that involve an expert system or self-organization capability may use a capsule neural network, such as for prediction, classification, or control functions with respect to a transactional environment, such as relating to one or more of the machines and automated systems described throughout this disclosure.

In embodiments, methods and systems described herein that involve an expert system or self-organization capability may use a radial basis function (RBF) neural network, which may be preferred in some situations involving interpolation in a multi-dimensional space (such as where interpolation is helpful in optimizing a multi-dimensional function, such as for optimizing a data marketplace as described here, optimizing the efficiency or output of a power generation system, a factory system, or the like, or other situation involving multiple dimensions. In embodiments, each neuron in the RBF neural network stores an example from a training set as a "prototype." Linearity involved in the functioning of this neural network offers RBF the advantage of not typically suffering from problems with local minima or maxima.

In embodiments, methods and systems described herein that involve an expert system or self-organization capability may use a radial basis function (RBF) neural network, such as one that employs a distance criterion with respect to a center (e.g., a Gaussian function). A radial basis function may be applied as a replacement for a hidden layer, such as a sigmoidal hidden layer transfer, in a multi-layer perceptron. An RBF network may have two layers, such as where an input is mapped onto each RBF in a hidden layer. In embodiments, an output layer may comprise a linear combination of hidden layer values representing, for example, a mean predicted output. The output layer value may provide an output that is the same as or similar to that of a regression model in statistics. In classification problems, the output layer may be a sigmoid function of a linear combination of hidden layer values, representing a posterior probability. Performance in both cases is often improved by shrinkage techniques, such as ridge regression in classical statistics. This corresponds to a prior belief in small parameter values (and therefore smooth output functions) in a Bayesian framework. RBF networks may avoid local minima, because the only parameters that are adjusted in the learning process are the linear mapping from hidden layer to output layer. Linearity ensures that the error surface is quadratic and therefore has a single minimum. In regression problems, this may be found in one matrix operation. In classification problems, the fixed non-linearity introduced by the sigmoid output function may be handled using an iteratively re-weighted least squares function or the like. RBF networks may use kernel methods such as support vector machines (SVM) and Gaussian processes (where the RBF is the kernel function). A non-linear kernel function may be used to project the input data into a space where the learning problem may be solved using a linear model.

In embodiments, an RBF neural network may include an input layer, a hidden layer, and a summation layer. In the input layer, one neuron appears in the input layer for each predictor variable. In the case of categorical variables, N−1 neurons are used, where N is the number of categories. The input neurons may, in embodiments, standardize the value ranges by subtracting the median and dividing by the interquartile range. The input neurons may then feed the values to each of the neurons in the hidden layer. In the hidden layer, a variable number of neurons may be used (determined by the training process). Each neuron may consist of a radial basis function that is centered on a point with as many dimensions as a number of predictor variables. The spread (e.g., radius) of the RBF function may be different for each dimension. The centers and spreads may be determined by training. When presented with the vector of input values from the input layer, a hidden neuron may compute a Euclidean distance of the test case from the neuron's center point and then apply the RBF kernel function to this distance, such as using the spread values. The resulting value may then be passed to the summation layer. In the summation layer, the value coming out of a neuron in the hidden layer may be multiplied by a weight associated with the neuron and may add to the weighted values of other neurons. This sum becomes the output. For classification problems, one output is produced (with a separate set of weights and summation units) for each target category. The value output for a category is the probability that the case being evaluated has that category. In training of an RBF, various parameters may be determined, such as the number of neurons in a hidden layer, the coordinates of the center of each hidden-layer function, the spread of each function in each dimension, and the weights applied to outputs as they pass to the summation layer. Training may be used by clustering algorithms (such as k-means clustering), by evolutionary approaches, and the like.

In embodiments, a recurrent neural network may have a time-varying, real-valued (more than just zero or one) activation (output). Each connection may have a modifiable real-valued weight. Some of the nodes are called labeled nodes, some output nodes, and others hidden nodes. For supervised learning in discrete time settings, training sequences of real-valued input vectors may become sequences of activations of the input nodes, one input vector at a time. At each time step, each non-input unit may compute its current activation as a nonlinear function of the weighted sum of the activations of all units from which it receives connections. The system may explicitly activate (independent of incoming signals) some output units at certain time steps.

In embodiments, methods and systems described herein that involve an expert system or self-organization capability may use a self-organizing neural network, such as a Kohonen self-organizing neural network, such as for visualization of views of data, such as low-dimensional views of high-dimensional data. The self-organizing neural network may apply competitive learning to a set of input data, such as from one or more sensors or other data inputs from or associated with a transactional environment, including any machine or component that relates to the transactional environment. In embodiments, the self-organizing neural network may be used to identify structures in data, such as unlabeled data, such as in data sensed from a range of data sources about or sensors in or about in a transactional environment, where sources of the data are unknown (such as where events may be coming from any of a range of unknown sources). The self-organizing neural network may organize structures or patterns in the data, such that they may be recognized, analyzed, and labeled, such as identifying market behavior structures as corresponding to other events and signals.

In embodiments, methods and systems described herein that involve an expert system or self-organization capability may use a recurrent neural network, which may allow for a bi-directional flow of data, such as where connected units (e.g., neurons or nodes) form a directed cycle. Such a network may be used to model or exhibit dynamic temporal behavior, such as involved in dynamic systems, such as a wide variety of the automation systems, machines and devices described throughout this disclosure, such as an automated agent interacting with a marketplace for purposes of collecting data, testing spot market transactions, execution transactions, and the like, where dynamic system behavior involves complex interactions that a user may desire to understand, predict, control and/or optimize. For example, the recurrent neural network may be used to anticipate the state of a market, such as one involving a dynamic process or action, such as a change in state of a resource that is traded in or that enables a marketplace of transactional environment. In embodiments, the recurrent neural network may use internal memory to process a sequence of inputs, such as from other nodes and/or from sensors and other data inputs from or about the transactional environment, of the various types described herein. In embodiments, the recurrent neural network may also be used for pattern recognition, such as for recognizing a machine, component, agent, or other item based on a behavioral signature, a profile, a set of feature vectors (such as in an audio file or image), or the like. In a non-limiting example, a recurrent neural network may recognize a shift in an operational mode of a marketplace or machine by learning to classify the shift from a training data set consisting of a stream of data from one or more data sources of sensors applied to or about one or more resources.

In embodiments, methods and systems described herein that involve an expert system or self-organization capability may use a modular neural network, which may comprise a series of independent neural networks (such as ones of various types described herein) that are moderated by an intermediary. Each of the independent neural networks in the modular neural network may work with separate inputs, accomplishing subtasks that make up the task the modular network as whole is intended to perform. For example, a modular neural network may comprise a recurrent neural network for pattern recognition, such as to recognize what type of machine or system is being sensed by one or more sensors that are provided as input channels to the modular network and an RBF neural network for optimizing the behavior of the machine or system once understood. The intermediary may accept inputs of each of the individual neural networks, process them, and create output for the modular neural network, such an appropriate control parameter, a prediction of state, or the like.

Combinations among any of the pairs, triplets, or larger combinations, of the various neural network types described herein, are encompassed by the present disclosure. This may include combinations where an expert system uses one neural network for recognizing a pattern (e.g., a pattern indicating a problem or fault condition) and a different neural network for self-organizing an activity or work flow based on the recognized pattern (such as providing an output governing autonomous control of a system in response to the recognized condition or pattern). This may also include combinations where an expert system uses one neural network for classifying an item (e.g., identifying a machine, a component, or an operational mode) and a different neural network for predicting a state of the item (e.g., a fault state, an operational state, an anticipated state, a maintenance state, or the like). Modular neural networks may also include situations where an expert system uses one neural network for determining a state or context (such as a state of a machine, a process, a work flow, a marketplace, a storage system, a network, a data collector, or the like) and a different neural network for self-organizing a process involving the state or context (e.g., a data storage process, a network coding process, a network selection process, a data marketplace process, a power generation process, a manufacturing process, a refining process, a digging process, a boring process, or other process described herein).

In embodiments, methods and systems described herein that involve an expert system or self-organization capability may use a physical neural network where one or more hardware elements is used to perform or simulate neural behavior. In embodiments, one or more hardware neurons may be configured to stream voltage values, current values, or the like that represent sensor data, such as to calculate information from analog sensor inputs representing energy consumption, energy production, or the like, such as by one or more machines providing energy or consuming energy for one or more transactions. One or more hardware nodes may be configured to stream output data resulting from the activity of the neural net. Hardware nodes, which may comprise one or more chips, microprocessors, integrated circuits, programmable logic controllers, application-specific integrated circuits, field-programmable gate arrays, or the like, may be provided to optimize the machine that is producing or consuming energy, or to optimize another parameter of some part of a neural net of any of the types described herein. Hardware nodes may include hardware for acceleration of calculations (such as dedicated processors for performing basic or more sophisticated calculations on input data to provide outputs, dedicated processors for filtering or compressing data, dedicated processors for decompressing data, dedicated processors for compression of specific file or data types (e.g., for handling image data, video streams, acoustic signals, thermal images, heat maps, or the like), and the like. A physical neural network may be embodied in a data collector, including one that may be reconfigured by switching or routing inputs in varying configurations, such as to provide different neural net configurations within the data collector for handling different types of inputs (with the switching and configuration optionally under control of an expert system, which may include a software-based neural net located on the data collector or remotely). A physical, or at least partially physical, neural network may include physical hardware nodes located in a storage system, such as for storing data within a machine, a data storage system, a distributed ledger, a mobile device, a server, a cloud resource, or in a transactional environment, such as for accelerating input/output functions to one or more storage elements that supply data to or take data from the neural net. A physical, or at least partially physical, neural network may include physical hardware nodes located in a network, such as for transmitting data within, to or from an industrial environment, such as for accelerating input/output functions to one or more network nodes in the net, accelerating relay functions, or the like. In embodiments of a physical neural network, an electrically adjustable resistance material may be used for emulating the function of a neural synapse. In embodiments, the physical hardware emulates the neurons, and software emulates the neural network between the neurons. In embodiments, neural networks complement conventional algorithmic computers. They are versatile and may be trained to perform appropriate functions without the need for any instructions, such as classification functions, optimization functions, pattern recognition functions, control functions, selection functions, evolution functions, and others.

In embodiments, methods and systems described herein that involve an expert system or self-organization capability may use a multilayered feed forward neural network, such as for complex pattern classification of one or more items, phenomena, modes, states, or the like. In embodiments, a multilayered feed forward neural network may be trained by an optimization technique, such as a genetic algorithm, such as to explore a large and complex space of options to find an optimum, or near-optimum, global solution. For example, one or more genetic algorithms may be used to train a multilayered feed forward neural network to classify complex phenomena, such as to recognize complex operational modes of machines, such as modes involving complex interactions among machines (including interference effects, resonance effects, and the like), modes involving non-linear phenomena, modes involving critical faults, such as where multiple, simultaneous faults occur, making root cause analysis difficult, and others. In embodiments, a multilayered feed forward neural network may be used to classify results from monitoring of a marketplace, such as monitoring systems, such as automated agents, that operate within the marketplace, as well as monitoring resources that enable the marketplace, such as computing, networking, energy, data storage, energy storage, and other resources.

In embodiments, methods and systems described herein that involve an expert system or self-organization capability may use a feed-forward, back-propagation multi-layer perceptron (MLP) neural network, such as for handling one or more remote sensing applications, such as for taking inputs from sensors distributed throughout various transactional environments. In embodiments, the MLP neural network may be used for classification of transactional environments and resource environments, such as spot markets, forward markets, energy markets, renewable energy credit (REC) markets, networking markets, advertising markets, spectrum markets, ticketing markets, rewards markets, compute markets, and others mentioned throughout this disclosure, as well as physical resources and environments that produce them, such as energy resources (including renewable energy environments, mining environments, exploration environments, drilling environments, and the like, including classification of geological structures (including underground features and above ground features), classification of materials (including fluids, minerals, metals, and the like), and other problems. This may include fuzzy classification.

In embodiments, methods and systems described herein that involve an expert system or self-organization capability may use a structure-adaptive neural network, where the structure of a neural network is adapted, such as based on a rule, a sensed condition, a contextual parameter, or the like. For example, if a neural network does not converge on a solution, such as classifying an item or arriving at a prediction, when acting on a set of inputs after some amount of training, the neural network may be modified, such as from a feed forward neural network to a recurrent neural network, such as by switching data paths between some subset of nodes from unidirectional to bi-directional data paths. The structure adaptation may occur under control of an expert system, such as to trigger adaptation upon occurrence of a trigger, rule or event, such as recognizing occurrence of a threshold (such as an absence of a convergence to a solution within a given amount of time) or recognizing a phenomenon as requiring different or additional structure (such as recognizing that a system is varying dynamically or in a non-linear fashion). In one non-limiting example, an expert system may switch from a simple neural network structure like a feed forward neural network to a more complex neural network structure like a recurrent neural network, a convolutional neural network, or the like upon receiving an indication that a continuously variable transmission is being used to drive a generator, turbine, or the like in a system being analyzed.

In embodiments, methods and systems described herein that involve an expert system or self-organization capability may use an autoencoder, autoassociator or Diabolo neural network, which may be similar to a multilayer perceptron (MLP) neural network, such as where there may be an input layer, an output layer and one or more hidden layers connecting them. However, the output layer in the auto-encoder may have the same number of units as the input layer, where the purpose of the MLP neural network is to reconstruct its own inputs (rather than just emitting a target value). Therefore, the auto encoders may operate as an unsupervised learning model. An auto encoder may be used, for example, for unsupervised learning of efficient codings, such as for dimensionality reduction, for learning generative models of data, and the like. In embodiments, an auto-encoding neural network may be used to self-learn an efficient network coding for transmission of analog sensor data from a machine over one or more networks or of digital data from one or more data sources. In embodiments, an auto-encoding neural network may be used to self-learn an efficient storage approach for storage of streams of data.

In embodiments, methods and systems described herein that involve an expert system or self-organization capability may use a probabilistic neural network (PNN), which, in embodiments, may comprise a multi-layer (e.g., four-layer) feed forward neural network, where layers may include input layers, hidden layers, pattern/summation layers and an output layer. In an embodiment of a PNN algorithm, a parent probability distribution function (PDF) of each class may be approximated, such as by a Parzen window and/or a non-parametric function. Then, using the PDF of each class, the class probability of a new input is estimated, and Bayes' rule may be employed, such as to allocate it to the class with the highest posterior probability. A PNN may embody a Bayesian network and may use a statistical algorithm or analytic technique, such as Kernel Fisher discriminant analysis technique. The PNN may be used for classification and pattern recognition in any of a wide range of embodiments disclosed herein. In one non-limiting example, a probabilistic neural network may be used to predict a fault condition of an engine based on collection of data inputs from sensors and instruments for the engine.

In embodiments, methods and systems described herein that involve an expert system or self-organization capability may use a time delay neural network (TDNN), which may comprise a feed forward architecture for sequential data that recognizes features independent of sequence position. In embodiments, to account for time shifts in data, delays are added to one or more inputs, or between one or more nodes, so that multiple data points (from distinct points in time) are analyzed together. A time delay neural network may form part of a larger pattern recognition system, such as using a perceptron network. In embodiments, a TDNN may be trained with supervised learning, such as where connection weights are trained with back propagation or under feedback. In embodiments, a TDNN may be used to process sensor data from distinct streams, such as a stream of velocity data, a stream of acceleration data, a stream of temperature data, a stream of pressure data, and the like, where time delays are used to align the data streams in time, such as to help understand patterns that involve understanding of the various streams (e.g., changes in price patterns in spot or forward markets).

In embodiments, methods and systems described herein that involve an expert system or self-organization capability may use a convolutional neural network (referred to in some cases as a CNN, a ConvNet, a shift invariant neural network, or a space invariant neural network), wherein the units are connected in a pattern similar to the visual cortex of the human brain. Neurons may respond to stimuli in a restricted region of space, referred to as a receptive field. Receptive fields may partially overlap, such that they collectively cover the entire (e.g., visual) field. Node responses may be calculated mathematically, such as by a convolution operation, such as using multilayer perceptrons that use minimal preprocessing. A convolutional neural network may be used for recognition within images and video streams, such as for recognizing a type of machine in a large environment using a camera system disposed on a mobile data collector, such as on a drone or mobile robot. In embodiments, a convolutional neural network may be used to provide a recommendation based on data inputs, including sensor inputs and other contextual information, such as recommending a route for a mobile data collector. In embodiments, a convolutional neural network may be used for processing inputs, such as for natural language processing of instructions provided by one or more parties involved in a workflow in an environment. In embodiments, a convolutional neural network may be deployed with a large number of neurons (e.g., 100,000, 500,000 or more), with multiple (e.g., 4, 5, 6 or more) layers, and with many (e.g., millions) of parameters. A convolutional neural net may use one or more convolutional nets.

In embodiments, methods and systems described herein that involve an expert system or self-organization capability may use a regulatory feedback network, such as for recognizing emergent phenomena (such as new types of behavior not previously understood in a transactional environment).

In embodiments, methods and systems described herein that involve an expert system or self-organization capability may use a self-organizing map (SOM), involving unsupervised learning. A set of neurons may learn to map points in an input space to coordinates in an output space. The input space may have different dimensions and topology from the output space, and the SOM may preserve these while mapping phenomena into groups.

In embodiments, methods and systems described herein that involve an expert system or self-organization capability may use a learning vector quantization neural net (LVQ). Prototypical representatives of the classes may parameterize, together with an appropriate distance measure, in a distance-based classification scheme.

In embodiments, methods and systems described herein that involve an expert system or self-organization capability may use an echo state network (ESN), which may comprise a recurrent neural network with a sparsely connected, random hidden layer. The weights of output neurons may be changed (e.g., the weights may be trained based on feedback). In embodiments, an ESN may be used to handle time series patterns, such as, in an example, recognizing a pattern of events associated with a market, such as the pattern of price changes in response to stimuli.

In embodiments, methods and systems described herein that involve an expert system or self-organization capability may use a Bi-directional, recurrent neural network (BRNN), such as using a finite sequence of values (e.g., voltage values from a sensor) to predict or label each element of the sequence based on both the past and the future context of the element. This may be done by adding the outputs of two RNNs, such as one processing the sequence from left to right, the other one from right to left. The combined outputs are the predictions of target signals, such as ones provided by a teacher or supervisor. A bi-directional RNN may be combined with a long short-term memory RNN.

In embodiments, methods and systems described herein that involve an expert system or self-organization capability may use a hierarchical RNN that connects elements in various ways to decompose hierarchical behavior, such as into useful subprograms. In embodiments, a hierarchical RNN may be used to manage one or more hierarchical templates for data collection in a transactional environment.

In embodiments, methods and systems described herein that involve an expert system or self-organization capability may use a stochastic neural network, which may introduce random variations into the network. Such random variations may be viewed as a form of statistical sampling, such as Monte Carlo sampling.

In embodiments, methods and systems described herein that involve an expert system or self-organization capability may use a genetic scale recurrent neural network. In such embodiments, an RNN (often an LS™) is used where a series is decomposed into a number of scales where every scale informs the primary length between two consecutive points. A first order scale consists of a normal RNN, a second order consists of all points separated by two indices and so on. The Nth order RNN connects the first and last node. The outputs from all the various scales may be treated as a committee of members, and the associated scores may be used genetically for the next iteration.

In embodiments, methods and systems described herein that involve an expert system or self-organization capability may use a committee of machines (CoM), comprising a collection of different neural networks that together "vote" on a given example. Because neural networks may suffer from local minima, starting with the same architecture and training, but using randomly different initial weights often gives different results. A CoM tends to stabilize the result.

In embodiments, methods and systems described herein that involve an expert system or self-organization capability may use an associative neural network (ASNN), such as involving an extension of a committee of machines that combines multiple feed forward neural networks and a k-nearest neighbor technique. It may use the correlation between ensemble responses as a measure of distance amid the analyzed cases for the kNN. This corrects the bias of the neural network ensemble. An associative neural network may have a memory that may coincide with a training set. If new data become available, the network instantly improves its predictive ability and provides data approximation (self-learns) without retraining. Another important feature of ASNN is the possibility to interpret neural network results by analysis of correlations between data cases in the space of models.

In embodiments, methods and systems described herein that involve an expert system or self-organization capability may use an instantaneously trained neural network (ITNN), where the weights of the hidden and the output layers are mapped directly from training vector data.

In embodiments, methods and systems described herein that involve an expert system or self-organization capability may use a spiking neural network, which may explicitly consider the timing of inputs. The network input and output may be represented as a series of spikes (such as a delta function or more complex shapes). SNNs may process information in the time domain (e.g., signals that vary over time, such as signals involving dynamic behavior of markets or transactional environments). They are often implemented as recurrent networks.

In embodiments, methods and systems described herein that involve an expert system or self-organization capability may use a dynamic neural network that addresses nonlinear multivariate behavior and includes learning of time-dependent behavior, such as transient phenomena and delay effects. Transients may include behavior of shifting market variables, such as prices, available quantities, available counterparties, and the like.

In embodiments, cascade correlation may be used as an architecture and supervised learning algorithm, supplementing adjustment of the weights in a network of fixed topology. Cascade-correlation may begin with a minimal network, then automatically trains, and add new hidden units one by one, creating a multi-layer structure. Once a new hidden unit has been added to the network, its input-side weights may be frozen. This unit then becomes a permanent feature-detector in the network, available for producing outputs or for creating other, more complex feature detectors. The cascade-correlation architecture may learn quickly, determine its own size and topology, and retain the structures it has built even if the training set changes and requires no back-propagation.

In embodiments, methods and systems described herein that involve an expert system or self-organization capability may use a neuro-fuzzy network, such as involving a fuzzy inference system in the body of an artificial neural network. Depending on the type, several layers may simulate the processes involved in a fuzzy inference, such as fuzzification, inference, aggregation and defuzzification. Embedding a fuzzy system in a general structure of a neural net as the benefit of using available training methods to find the parameters of a fuzzy system.

In embodiments, methods and systems described herein that involve an expert system or self-organization capability may use a compositional pattern-producing network (CPPN), such as a variation of an associative neural network (ANN) that differs the set of activation functions and how they are applied. While typical ANNs often contain only sigmoid functions (and sometimes Gaussian functions), CPPNs may include both types of functions and many others. Furthermore, CPPNs may be applied across the entire space of possible inputs, so that they may represent a complete image. Since they are compositions of functions, CPPNs in effect encode images at infinite resolution and may be sampled for a particular display at whatever resolution is optimal.

This type of network may add new patterns without re-training. In embodiments, methods and systems described herein that involve an expert system or self-organization capability may use a one-shot associative memory network, such as by creating a specific memory structure, which assigns each new pattern to an orthogonal plane using adjacently connected hierarchical arrays.

In embodiments, methods and systems described herein that involve an expert system or self-organization capability may use a hierarchical temporal memory (HTM) neural network, such as involving the structural and algorithmic properties of the neocortex. HTM may use a biomimetic model based on memory-prediction theory. HTM may be used to discover and infer the high-level causes of observed input patterns and sequences.

In embodiments, methods and systems described herein that involve an expert system or self-organization capability may use a holographic associative memory (HAM) neural network, which may comprise an analog, correlation-based, associative, stimulus-response system. Information may be mapped onto the phase orientation of complex numbers. The memory is effective for associative memory tasks, generalization and pattern recognition with changeable attention.

In embodiments, various embodiments involving network coding may be used to code transmission data among network nodes in a neural net, such as where nodes are located in one or more data collectors or machines in a transactional environment.

In embodiments, one or more of the controllers, circuits, systems, data collectors, storage systems, network elements, or the like as described throughout this disclosure may be embodied in or on an integrated circuit, such as an analog, digital, or mixed signal circuit, such as a microprocessor, a programmable logic controller, an application-specific integrated circuit, a field programmable gate array, or other circuit, such as embodied on one or more chips disposed on one or more circuit boards, such as to provide in hardware (with potentially accelerated speed, energy performance, input-output performance, or the like) one or more of the functions described herein. This may include setting up circuits with up to billions of logic gates, flip-flops, multiplexers, and other circuits in a small space, facilitating high-speed processing, low power dissipation, and reduced manufacturing cost compared with board-level integration. In embodiments, a digital IC, typically a microprocessor, digital signal processor, microcontroller, or the like may use Boolean algebra to process digital signals to embody complex logic, such as involved in the circuits, controllers, and other systems described herein. In embodiments, a data collector, an expert system, a storage system, or the like may be embodied as a digital integrated circuit, such as a logic IC, memory chip, interface IC (e.g., a level shifter, a serializer, a deserializer, and the like), a power management IC and/or a programmable device; an analog integrated circuit, such as a linear IC, RF IC, or the like, or a mixed signal IC, such as a data acquisition IC (including A/D converters, D/A converter, digital potentiometers) and/or a clock/timing IC.

Figure 32:
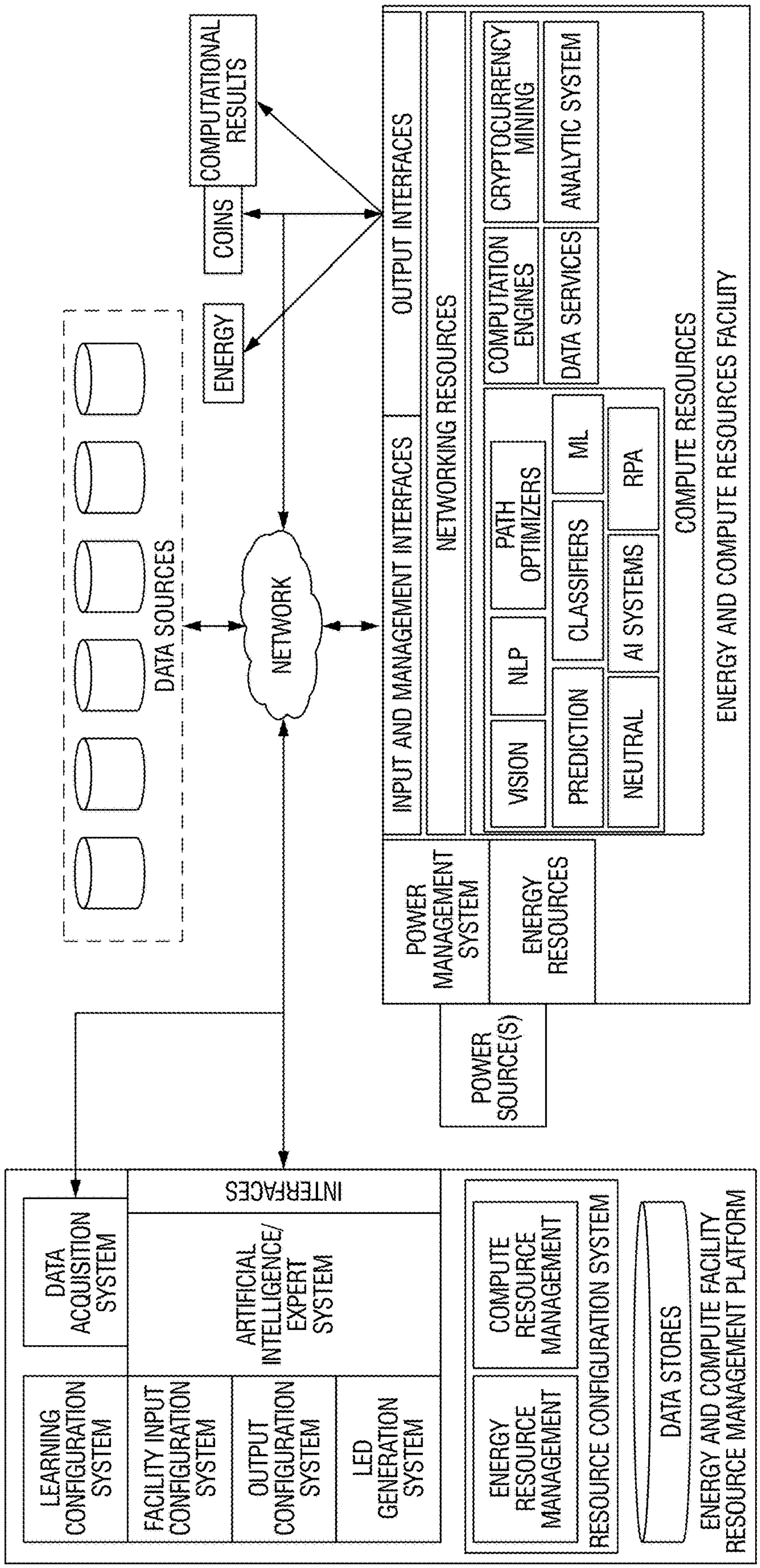
FIG. 32 is a schematic diagram of components of an environment including an intelligent energy and compute facility, a host intelligent energy and compute facility resource management platform, a set of data sources, a set of expert systems, interfaces to a set of market platforms and external resources, and a set of user or client systems and devices in accordance with embodiments of the present disclosure.

With reference to FIG. 32, the environment includes an intelligent energy and compute facility (such as a large scale facility hosting many compute resources and having access to a large energy source, such as a hydropower source), as well as a host intelligent energy and compute facility resource management platform, referred to in some cases for convenience as the energy and information technology platform (with networking, data storage, data processing and other resources as described herein), a set of data sources, a set of expert systems, interfaces to a set of market platforms and external resources, and a set of user (or client) systems and devices.

A facility may be configured to access an inexpensive (at least during some time periods) power source (such as a hydropower dam, a wind farm, a solar array, a nuclear power plant, or a grid), to contain a large set of networked information technology resources, including processing units, servers, and the like that are capable of flexible utilization (such as by switching inputs, switching configurations, switching programming and the like), and to provide a range of outputs that can also be flexibly configured (such as passing through power to a smart grid, providing computational results (such as for cryptocurrency mining, artificial intelligence, or analytics). A facility may include a power storage system, such as for large scale storage of available power.

Example features and operations of an intelligent energy and compute facility resource management platform are described herein. In operation, a user can access the energy and information technology platform to initiate and manage a set of activities that involve optimizing energy and computing resources among a diverse set of available tasks. Energy resources may include hydropower, nuclear power, wind power, solar power, grid power and the like, as well as energy storage resources, such as batteries, gravity power, kinetic energy storage, pressurized fluids, and storage using chemical and/or thermal techniques, such as energy storage in molten salts. Computing resources may include GPUs, FPGAs, servers, chips, ASICs, processors, data storage media, networking resources, and many others. Available tasks may include cryptocurrency hash processing, expert system processing, computer vision processing, NLP, path optimization, applications of models such as for analytics, etc.

In embodiments, the platform may include various subsystems that may be implemented as micro services, such that other subsystems of the system access the functionality of a subsystem providing a micro service via application programming interface API. In some embodiments, the various services that are provided by the subsystems may be deployed in bundles that are integrated, such as by a set of APIs. Examples of the subsystems are described in greater detail with respect to FIG. 33.

The External Data Sources can include any system or device that can provide data to the platform. Examples of external data sources can include market data sources (e.g., for financial markets, commercial markets (including e-commerce), advertising markets, energy markets, telecommunication markets, and many others), government or regulatory data sources, industry specific data sources, subscription based services accessing proprietary or public information, and/or news data sources. The energy and computing resource platform accesses external data sources via a network (e.g., the Internet) in any suitable manner (e.g., crawlers, extract-transform-load (ETL) systems, gateways, brokers, application programming interfaces (APIs), spiders, distributed database queries, and the like).

A facility, in the present example, is a facility that has an energy resource (e.g., a hydro power resource) and a set of compute resources (e.g., a set of flexible computing resources that can be provisioned and managed to perform computing tasks, such as GPUs, FPGAs and many others, a set of flexible networking resources that can similarly be provisioned and managed, such as by adjusting network coding protocols and parameters), and the like.

User and client systems and devices can include any system or device that may consume one or more computing or energy resource made available by the energy and computing resource platform. Examples include cryptocurrency systems (e.g., for Bitcoin and other cryptocurrency mining operations), expert and artificial intelligence systems (such as neural networks and other systems, such as for computer vision, natural language processing, path determination and optimization, pattern recognition, deep learning, supervised learning, decision support, and many others), energy management systems (such as smart grid systems), and many others. User and client systems may include user devices, such as smartphones, tablet computer devices, laptop computing devices, personal computing devices, smart televisions, gaming consoles, and the like.

Figure 33:
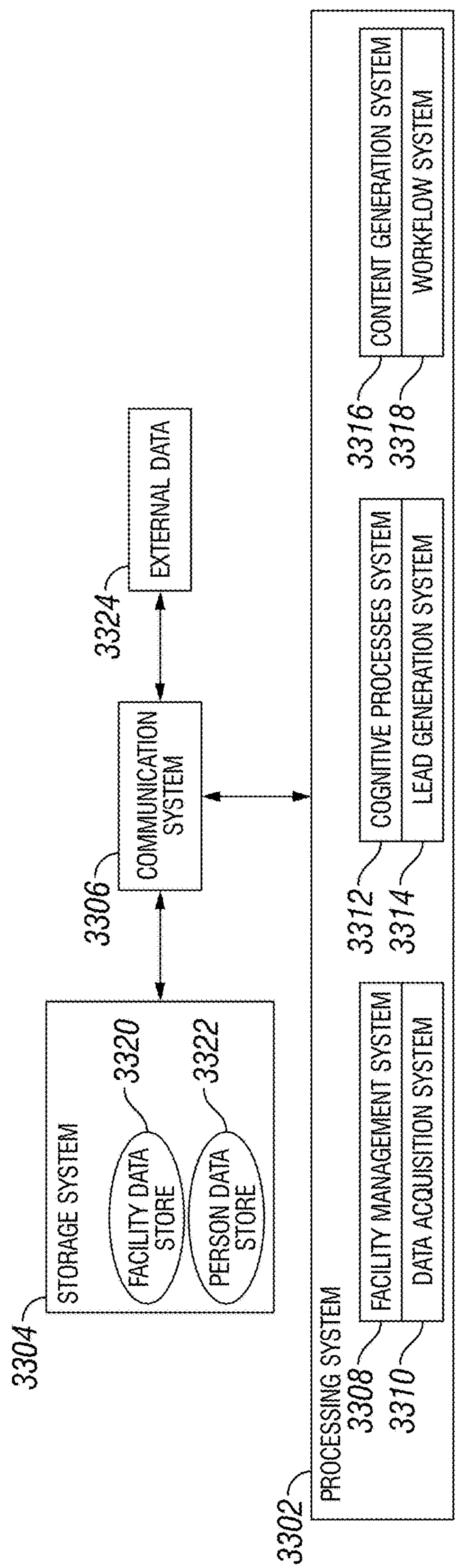
FIG. 33 is a schematic diagram of an energy and computing resource platform in accordance with embodiments of the present disclosure.

FIG. 33 illustrates an example energy and computing resource platform according to some embodiments of the present disclosure. In embodiments, the energy and computing resource platform may include a processing system 3302, a storage system 3304, and a communication system 3306.

The processing system 3302 may include one or more processors and memory. The processors may operate in an individual or distributed manner. The processors may be in the same physical device or in separate devices, which may or may not be located in the same facility. The memory may store computer-executable instructions that are executed by the one or more processors. In embodiments, the processing system 3302 may execute the facility management system 3308, the data acquisition system 3310, the cognitive processing system 3312, the lead generation system 3314, the content generation system 3316, and the workflow system 3318.

The storage system 3304 may include one or more computer-readable storage mediums. The computer-readable storage mediums may be located in the same physical device or in separate devices, which may or may not be located in the same facility, which may or may not be located in the same facility. The computer-readable storage mediums may include flash devices, solid-state memory devices, hard disk drives, and the like. In embodiments, the storage system 3304 stores one or more of a facility data store 3320, a person data store 3322, and/or include data stores for any other type of data. The data stores are depicted separately for clarity of the description, but may be stored in the same or a distinct physical location or device, and/or a given data store may be distributed across physical locations or devices.

The communication system 3306 may include one or more transceivers and/or network devices that are configured to effectuate wireless or wired communication with one or more external devices, including user devices and/or servers, via a network (e.g., the Internet and/or a cellular network). In certain embodiments, the communication system 3306 provides access to external data 3324, the internet, web-based resources, a LAN, a WAN, and/or other systems or devices. The communication system 3306 may implement any suitable communication protocol. For example, the communication system 3306 may implement an IEEE 801.11 wireless communication protocol and/or any suitable cellular communication protocol to effectuate wireless communication with external devices via a wireless network.

Figure 34:
FIGS. 34 and 35 are illustrative depictions of data record schema in accordance with embodiments of the present disclosure.

An example energy and computing resource management platform discovers, provisions, manages and optimizes energy and compute resources using artificial intelligence and expert systems with sensitivity to market and other conditions by learning on a set of outcomes. An example energy and computer resource management platform discovers and facilitates cataloging of resources, optionally by user entry and/or automated detection (including peer detection). In certain embodiments, an energy and computing resource management platform implements a graphical user interface to receive relevant information regarding the energy and compute resources that are available. For example, a "digital twin" may be created of an energy and compute facility that allows modeling, prediction, and the like. In certain embodiments, an energy and computing resource management platform generates a set of data records that define the facility or a set of facilities under common ownership or operation by a host. The data records may have any suitable schema. In some embodiments (e.g., FIG. 34), the facility data records may include a facility identifier (e.g., a unique identifier that corresponds to the facility), a facility type (e.g., energy system and capabilities, compute systems and capabilities, networking systems and capabilities), facility attributes (e.g., name of the facility, name of the facility initiator, description of the facility, keywords of the facility, goals of the facility, timing elements, schedules, and the like), participants/potential participants in the facility (e.g., identifiers of owners, operators, hosts, service providers, consumers, clients, users, workers, and others), and any suitable metadata (e.g., creation date, launch date, scheduled requirements and the like). An example energy and computer resource management platform generates content, such as a document, message, alert, report, webpage and/or application page based on the contents of the data record. For example, an example energy and computer resource management platform obtains the data record of the facility and populates a webpage template with the data (or selected portions of the data) contained therein. In addition, an energy and computer resource management platform can implement management of existing facilities, update the data record of a facility, determine, predict, and/or estimate outcomes (e.g., energy produced, compute tasks completed, processing outcomes achieved, financial outcomes achieved, service levels met and many others), and send of information (e.g., updates, alerts, requests, instructions, and the like) to individuals and systems.

Data Acquisition Systems can acquire various types of data from different data sources and organize that data into one or more data structures. In embodiments, the data acquisition system receives data from users via a user interface (e.g., user types in profile information). In embodiments, the data acquisition system can retrieve data from passive electronic sources and/or external data. In embodiments, the data acquisition system can implement crawlers to crawl different websites or applications. In embodiments, the data acquisition system can implement an API to retrieve data from external data sources or user devices (e.g., various contact lists from user's phone or email account). In embodiments, the data acquisition system can structure the obtained data into appropriate data structures. In embodiments, the data acquisition system generates and maintains person records based on data collected regarding individuals. In embodiments, a person datastore stores person records. In some of these embodiments, the person datastore may include one or more databases, indexes, tables, and the like. Each person record may correspond to a respective individual and may be organized according to any suitable schema.

Figure 35:
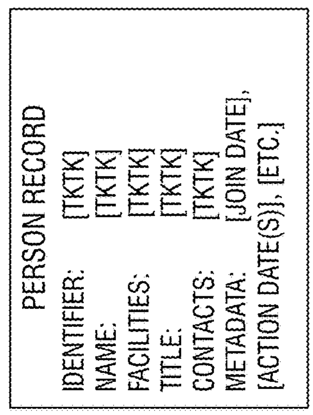

FIG. 35 illustrates an example schema of a person record. In the example, each person record may include a unique person identifier (e.g., username or value), and may define all data relating to a person, including a person's name, facilities they are a part of or associated with (e.g., a list of facility identifiers), attributes of the person (age, location, job, company, role, skills, competencies, capabilities, education history, job history, and the like), a list of contacts or relationships of the person (e.g., in a role hierarchy or graph), and any suitable metadata (e.g., date joined, dates actions were taken, dates input was received, and the like).

In embodiments, the data acquisition system generates and maintains one or more graphs based on the retrieved data. In some embodiments, a graph datastore may store the one or more graphs. The graph may be specific to a facility or may be a global graph. The graph may be used in many different applications (e.g., identifying a set of roles, such as for authentication, for approvals, and the like for persons, or identifying system configurations, capabilities, or the like, such as hierarchies of energy producing, computing, networking, or other systems, subsystems and/or resources).

In embodiments, a graph may be stored in a graph database, where data is stored in a collection of nodes and edges. In some embodiments, a graph has nodes representing entities and edges representing relationships, each node may have a node type (also referred to as an entity type) and an entity value, each edge may have a relationship type and may define a relationship between two entities. For example, a person node may include a person ID that identifies the individual represented by the node and a company node may include a company identifier that identifies a company. A "works for" edge that is directed from a person node to a company node may denote that the person represented by the edge node works for the company represented by the company node. In another example, a person node may include a person ID that identifies the individual represented by the node and a facility node may include a facility identifier that identifies a facility. A "manages" edge that is directed from a person node to a facility node may denote that the person represented by the person node is a manager of the facility represented by the facility node. Furthermore in embodiments, an edge or node may contain or reference additional data. For example, a "manages" edge may include a function that indicates a specific function within a facility that is managed by a person. The graph(s) can be used in a number of different applications, which are discussed with respect to the cognitive processing system.

In embodiments, validated Identity information may be imported from one or more identity information providers, as well as data from LinkedIn™ and other social network sources regarding data acquisition and structuring data. In embodiments, the data acquisition system may include an identity management system (not shown in FIGS.) of the platform may manage identity stitching, identity resolution, identity normalization, and the like, such as determining where an individual represented across different social networking sites and email contacts is in fact the same person. In embodiments, the data acquisition system may include a profile aggregation system (not shown in FIGS.) that finds and aggregates disparate pieces of information to generate a comprehensive profile for a person. The profile aggregation system may also deduplicate individuals.

Figure 36:
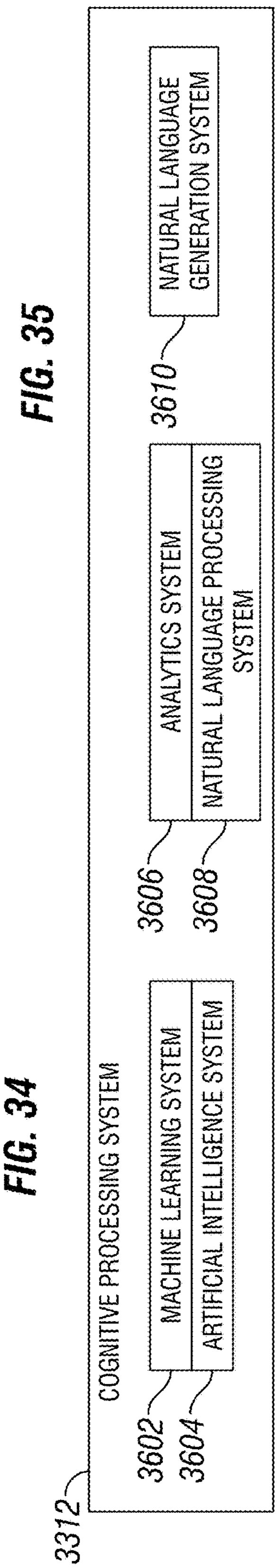
FIG. 36 is a schematic diagram of a cognitive processing system in accordance with embodiments of the present disclosure.

The cognitive processing system may implement one or more of machine learning processes, artificial intelligence processes, analytics processes, natural language processing processes, and natural language generation processes. FIG. 36 illustrates an example cognitive processing system 3312 according to some embodiments of the present disclosure. In this example, the cognitive processing system may include a machine learning system 3602, an artificial intelligence (AI) system 3604, an analytics system 3606, a natural language processing system 3608, and a natural language generation system 3610.

In embodiments, the machine learning system 3602 may train models, such as predictive models (e.g., various types of neural networks, regression based models, and other machine-learned models). In embodiments, training can be supervised, semi-supervised, or unsupervised. In embodiments, training can be done using training data, which may be collected or generated for training purposes.

An example machine learning system 3602 trains a facility output model. A facility output model (or prediction model) may be a model that receive facility attributes and outputs one or more predictions regarding the production or other output of a facility. Examples of predictions may be the amount of energy a facility will produce, the amount of processing the facility will undertake, the amount of data a network will be able to transfer, the amount of data that can be stored, the price of a component, service or the like (such as supplied to or provided by a facility), a profit generated by accomplishing a given tasks, the cost entailed in performing an action, and the like. In each case, the machine learning system optionally trains a model based on training data. In embodiments, the machine learning system may receive vectors containing facility attributes (e.g., facility type, facility capability, objectives sought, constraints or rules that apply to utilization of resources or the facility, or the like), person attributes (e.g., role, components managed, and the like), and outcomes (e.g., energy produced, computing tasks completed, and financial results, among many others). Each vector corresponds to a respective outcome and the attributes of the respective facility and respective actions that led to the outcome. The machine learning system takes in the vectors and generates predictive model based thereon. In embodiments, the machine learning system may store the predictive models in the model datastore.

In embodiments, training can also be done based on feedback received by the system, which is also referred to as "reinforcement learning." In embodiments, the machine learning system may receive a set of circumstances that led to a prediction (e.g., attributes of facility, attributes of a model, and the like) and an outcome related to the facility and may update the model according to the feedback.

In embodiments, training may be provided from a training data set that is created by observing actions of a set of humans, such as facility managers managing facilities that have various capabilities and that are involved in various contexts and situations. This may include use of robotic process automation to learn on a training data set of interactions of humans with interfaces, such as graphical user interfaces, of one or more computer programs, such as dashboards, control systems, and other systems that are used to manage an energy and compute management facility.

In embodiments, an artificial intelligence (AI) system leverages predictive models to make predictions regarding facilities. Examples of predictions include ones related to inputs to a facility (e.g., available energy, cost of energy, cost of compute resources, networking capacity and the like, as well as various market information, such as pricing information for end use markets), ones related to components or systems of a facility (including performance predictions, maintenance predictions, uptime/downtime predictions, capacity predictions and the like), ones related to functions or workflows of the facility (such as ones that involved conditions or states that may result in following one or more distinct possible paths within a workflow, a process, or the like), ones related to outputs of the facility, and others. In embodiments, the AI system receives a facility identifier. In response to the facility identifier, the AI system may retrieve attributes corresponding to the facility. In some embodiments, the AI system may obtain the facility attributes from a graph. Additionally or alternatively, the AI system may obtain the facility attributes from a facility record corresponding to the facility identifier, and the person attributes from a person record corresponding to the person identifier.

Examples of additional attributes that can be used to make predictions about a facility or a related process of system include: related facility information; owner goals (including financial goals); client goals; and many more additional or alternative attributes. In embodiments, the AI system may output scores for each possible prediction, where each prediction corresponds to a possible outcome. For example, in using a prediction model used to determine a likelihood that a hydroelectric source for a facility will produce 5 MW of power, the prediction model can output a score for a "will produce" outcome and a score for a "will not produce" outcome. The AI system may then select the outcome with the highest score as the prediction. Alternatively, the AI system may output the respective scores to a requesting system.

In embodiments, a clustering system clusters records or entities based on attributes contained herein. For example, similar facilities, resources, people, clients, or the like may be clustered. The clustering system may implement any suitable clustering algorithm. For example, when clustering people records to identify a list of customer leads corresponding to resources that can be sold by a facility, the clustering system may implement k-nearest neighbors clustering, whereby the clustering system identifies k people records that most closely relate to the attributes defined for the facility. In another example, the clustering system may implement k-means clustering, such that the clustering system identifies k different clusters of people records, whereby the clustering system or another system selects items from the cluster.

In embodiments, an analytics system may perform analytics relating to various aspects of the energy and computing resource platform. The analytics system may analyze certain communications to determine which configurations of a facility produce the greatest yield, what conditions tend to indicate potential faults or problems, and the like.

Figure 37:
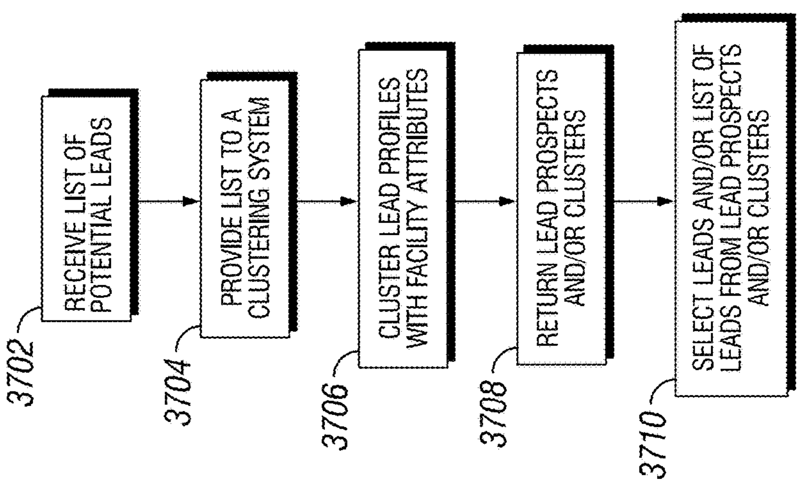
FIG. 37 is a schematic flow diagram of a procedure for selecting leads in accordance with embodiments of the present disclosure.

FIG. 37 depicts example operations of a lead generation system 3314 to generate a lead list. Lead generation system 3314 receives 3702 a list of potential leads (such as for consumers of available products or resources). The lead generation system 3314 may provide 3704 the list of leads to the clustering system. The clustering system clusters 3706 the profile of the lead with the clusters of facility attributes to identify one or more clusters. In embodiments, the clustering system returns 3708 a list of lead prospects. In other embodiments, the clustering system returns 3708 the clusters, and the lead generation system selects 3710 the list of leads from the cluster to which a prospect belongs.

Figure 38:
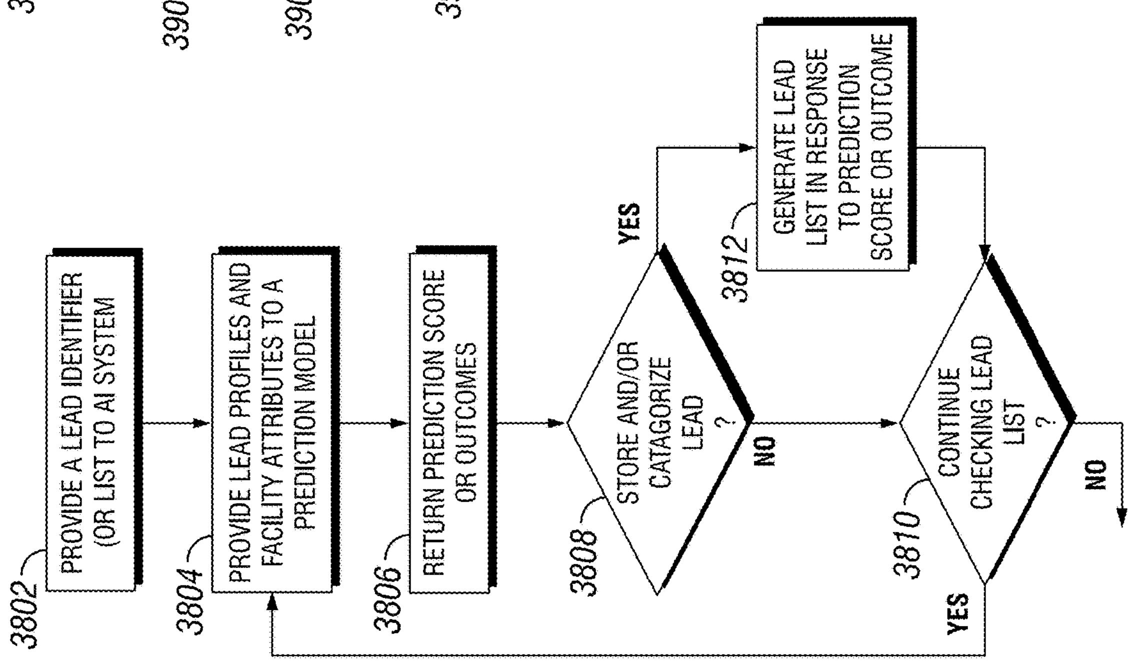
FIG. 38 is a schematic flow diagram of a procedure for generating a lead list in accordance with embodiments of the present disclosure.

FIG. 38 depicts example operations of a lead generation system 3314 to determine facility outputs for leads identified in the list of leads. In embodiments, the lead generation system 3314 provides 3802 a lead identifier of a respective lead to the AI system 3604. The AI system may then obtain the lead attributes of the lead and facility attributes of the facility and may feed 3804 the respective attributes into a prediction model. The prediction model returns 3806 a prediction, which may be scores associated with each possible outcome, or a single predicted outcome that was selected based on its respective score (e.g., the outcome having the highest score). Based on the prediction score or outcome, the lead may be stored and/or categorized (e.g. operation 3808). The lead generation system may iterate (e.g., operation 3810) in this manner for each lead in the lead list. For example, the lead generation system may generate leads (e.g., operation 3812) that are consumers of compute capabilities, energy capabilities, predictions and forecasts, optimization results, and others.

In embodiments the lead generation system provides the facility operator or host of the systems with an indicator of the reason why a lead may be willing to engage the facility, such as, for example, that the lead is an intensive user of computing resources, such as to forecast behavior of a complex, multi-variable market, or to mine for cryptocurrency.

In embodiments, a content generation system of the platform generates content for a contact event, such as an email, text message, or a post to a network, or a machine-to-machine message, such as communicating via an API or a peer-to-peer system. In embodiments, the content is customized using artificial intelligence based on the attributes of the facility, attributes of a recipient (e.g., based on the profile of a person, the role of a person, or the like), and/or relating to the project or activity to which the facility relates. The content generation system may be seeded with a set of templates, which may be customized, such as by training the content generation system on a training set of data created by human writers, and which may be further trained by feedback based on outcomes tracked by the platform, such as outcomes indicating success of particular forms of communication in generating donations to a facility, as well as other indicators as noted throughout this disclosure. The content generation system may customize content based on attributes of the facility, a project, and/or one or more people, and the like. For example, a facility manager may receive short messages about events related to facility operations, including codes, acronyms, and jargon, while an outside consumer of outputs from the facility may receive a more formal report relating to the same event.

Figure 39:
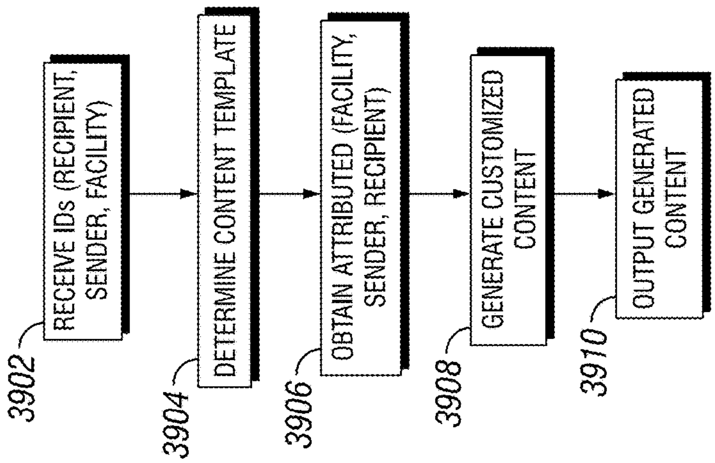
FIG. 39 is a schematic flow diagram of a procedure for generating customized facility attributes in accordance with embodiments of the present disclosure.

FIG. 39 depicts example operations of a content generation system 3316 to generate personalized content. The content generation system receives 3902 a recipient id, a sender id (which may be a person or a system, among others), and a facility id. The content generation system may determine 3904 the appropriate content template to use based on the relationships among the recipient, sender, and facility and/or based on other considerations (e.g., a recipient who is a busy manager is more likely to respond to less formal messages or more formal messages). The content generation system may provide the template (or an identifier thereof) to the natural language generation system, along with the recipient id, the sender id, and the facility id. The natural language generation system may obtain 3906 facility attributes based on the facility id, and person attributes corresponding to the recipient or sender based on their identities. The natural language generation system may then generate 3908 the personalized or customized content based on the selected template, the facility parameters, and/or other attributes of the various types described herein. The natural language generation system may output 3910 the generated content to the content generation system.

In embodiments, a person, such as a facility manager, may approve the generated content provided by the content generation system and/or make edits to the generated content, then send the content, such as via email and/or other channels. In embodiments, the platform tracks the contact event.

In embodiments, the workflow management system may support various workflows associated with a facility, such as including interfaces of the platform by which a facility manager may review various analytic results, status information, and the like. In embodiments, the workflow management system tracks the operation of a post-action follow-up module to ensure that the correct follow-up messages are automatically, or under control of a facility agent using the platform, sent to appropriate individuals, systems and/or services.

In the various embodiments, various elements are included for a workflow for each of an energy project, a compute project (e.g., cryptocurrency and/or AI) and hybrids.

Transactions, as described herein, may include financial transactions using various forms of currency, including fiat currencies supported by governments, cryptocurrencies, tokens, or points (such as loyalty points and rewards points offered by airlines, hospitality providers, and many other businesses), and the like. Transactions may also be understood to encompass a wide range of other transactions involving exchanges of value, including in-kind transactions that involve the exchange of resources. Transactions may include exchanges of currencies of various types, including exchanges between currencies and in-kind resources. Resources exchanged may include goods, services, compute resources, energy resources, network bandwidth resources, natural resources, and the like. Transactions may also include ones involving attention resources, such as by prospective counterparties in transactions, such as consumers of goods, services and other, who may be humans or, in some situations, may be other consumers, such as intelligent (e.g., AI-based agents).

Certain features of the present disclosure are referenced as a compute task herein. The term compute task should be understood broadly. In certain embodiments, and without limitation to any other aspect of the present disclosure, a compute task includes any one or more of: execution of one or more computer readable instructions by a processor; intermediate storage of commands for execution (e.g., in a cache or buffer); operations to store, communicate, or perform calculations on data; and/or processing of data for error checking, formatting, compression, decompression, configuring packets, or the like. In certain embodiments, and without limitation to any other aspect of the present disclosure, a compute task includes any one or more of: cryptocurrency mining operations, distributed ledger calculations, transaction execution operations, internal/external data collection operations, and/or digital transformation of data elements, models, or the like. In certain embodiments, compute resources include any device configured to support compute tasks at least during certain operating conditions of a system, including, without limitation: processor(s), co-processor(s), memory caches, random access memory (RAM), buses. In certain embodiments, compute resources may be provided by a single device and/or distributed across multiple devices. In certain embodiments, compute resources for a system may be an aggregate of devices, potentially distributed and in communication within a single hardware system, through a network (e.g., a LAN, WAN, Wi-Fi, or other communicative coupling system), through an intranet, and/or through the internet.

Certain features of the present disclosure are referenced as a network task herein. The term network task should be understood broadly. In certain embodiments, and without limitation to any other aspect of the present disclosure, a network task includes any one or more of: communicating an element of data to a network device (e.g., a packet, data for a packet, and/or metadata or other information about the data); configuring data for a network communication (e.g., compiling into one or more packets; structuring, dividing, compressing, or combining the data for network communication); caching, buffering, or otherwise storing data related to network operations; transmitting data from one device to another device (e.g., using a wired or wireless transmitting/receiving device and a communication protocol); and/or performing operations to register or unregister a device from a group of devices (e.g., in a mesh network, peer-to-peer network, or other network configuration). In certain embodiments, and without limitation to any other aspect of the present disclosure, a network task includes any one or more of: cognitive coordination of network assets; peer bandwidth sharing; transaction execution; spot market testing; internal/external data collection; advanced analytics (e.g., of data access, stored data, user or accessor interactions, etc.); smart contract operations; connected insurance operations; and/or distributed ledger storage. In certain embodiments, any operations performed by a network device, and/or performed to support network communications by a network device, are contemplated as network tasks herein. In certain embodiments, network resources include any device configured to support network tasks at least during certain operating conditions of a system, including, without limitation: networking adapters; networking processors or sub-processors; memory caches or buffers; communication links (e.g., ports, connectors, wires, transmitters, and/or receivers); network infrastructure such as routers, repeaters, hardware comprising a LAN, WAN, intranet, and/or internet; and/or aggregated or abstracted aspects of a network such as bandwidth or availability of any communication system or communication channel.

It can be seen that, in certain embodiments, a task may be considered a compute task for one system or purpose, and/or a network task for another system or purpose. Further, a given device may be considered a compute resource for one system or purpose, and/or a network resource for another system or purpose. In certain embodiments, a given device on a system may be considered a compute resource under certain operating conditions and/or for certain considerations, and the given device on the system may be considered a compute resource under other operating conditions and/or for certain other considerations. For example, a given processor may be configured to perform operations to execute computer readable instructions, and therefore be available as a computing resource for determinations made by platform 100 in a first context, and the same processor may be configured to support network communications (e.g., packaging data, performing network coding, or other network support operations), and therefore also be available as a network resource for the platform 100 in a second context. In another example, a platform 100 may be performing operations to improve and/or optimize computing and/or network resource consumption for a system having multiple processors in communication over a network. In the example, the platform 100 may consider the various processors separately from the network resources—for example distributing the computing tasks across processors, and calculating the incurred network resource consumption separately. Additionally or alternatively, in the example, the platform 100 may abstract the network resource consumption associated with distributing computing tasks across processors as processor resource consumption, thereby assigning the associated networking resources that support distribution of processing as processing resources.

One of skill in the art, having the benefit of the present disclosure and information ordinarily available when contemplating a particular system, can readily determine which tasks are compute tasks, which tasks are network tasks, which resources are compute resources, and which resources are network resources for the particular system and at which operating conditions of the system. In certain embodiments, for example where improvement or optimization operations are considering both compute and network resource optimizations, a particular system may allow the operations of the platform 100 to determine, or to adjust, which tasks are compute and network tasks, and/or which resources are compute and network resources. Certain considerations for determining which tasks/resources are compute/network tasks/resources include, without limitation: the limiting aspects of the particular system, including the limiting aspect of the system with time and/or operating condition; the system parameters to be improved or optimized; the desired authority to be given to AI, machine learning, expert system, or other adaptive devices in the system; the cost drivers in the system for various devices or features (e.g., infrastructure; support; additional communication paths; upgrades to operating systems, protocols, or firmware, etc.); the priorities for system improvement between capital investment, operating costs, energy consumption, etc.; and/or the capacity limitations in the system, including present and future capacity, and/or capacities based on time and/or operating condition.

Certain features of the present disclosure are referenced as a data storage task herein. The term data storage task should be understood broadly. In certain embodiments, without limitation to any other aspect of the present disclosure, a data storage task is a task associated with the storage of data for access at a later time, and/or to support the ability to access the data at a later time. Data storage tasks can include, without limitation: operations to communicate data to a storage device; operations to retrieve stored data from a storage device; operations to store data on the storage device; operations to config. the data for storage or retrieval (e.g., setting or verifying authorizations, performing compression or decompression, formatting the data, and/or summarizing or simplifying the data); operations to move data from one storage to another (e.g., moving data between short-term, intermediate term, and long-term storage; and/or transferring data from one data storage location to another to support improvements or optimizations, such as moving less accessed data to a lower cost storage location, etc.); and/or operations to delete stored data. Example and non-limiting data storage resources include: data storage devices of any type and storage medium; and/or communication devices and/or processing to support data storage devices. It can be seen that, in certain embodiments, a task may be considered a compute task for one system or purpose, a network task for another system or purpose, and/or a data storage task for another system or purpose. Further, a given device may be considered a compute resource for one system or purpose, a network resource for another system or purpose, and/or a data storage resource for another system or purpose.

Certain features of the present disclosure are referenced as a core task herein. The term core task should be understood broadly. In certain embodiments, without limitation to any other aspect of the present disclosure, a core task is a task associated with a system or facility that relates to the function or purpose of that system or facility. A few examples include, without limitation: a core task for a manufacturing facility relates to the manufacturing operations of the facility; a core task for a chemical production plant relates to the chemical production operations of the facility; a core task for an autonomous vehicle relates to the operations of the vehicle; and/or a core task for an insurance provider relates to the provision and service of insurance products of the provider. In certain embodiments, a core task includes any related tasks for the facility, which may or may not be critical or primary tasks for the facility. For example, a manufacturing facility may operate a system to track recycling operations, manage parking, and/or tracking the schedules for an intra-company softball league for the manufacturing facility. In certain embodiments, a core task is any task performed for the merits of the underlying facility, where some increment of data associated to the task is available, or becomes available, to a platform 100 for consideration in supporting one or more aspects of the task. In certain embodiments, a task may be a core task for certain systems and/or operating conditions, and another type of task (e.g., a compute task, a network task, and/or a data storage task) for other systems and/or other operating conditions. For example, communication of employee e-mails may be a core task for supporting a manufacturing facility, and may additionally or alternatively be a network task, compute task, and/or data storage task. In a further example, communication of employee e-mails may be a core task during certain operating periods (e.g., during working hours, for each employee during that employee's shift period, etc.), and may be a network task, compute task, and/or data storage task during other operating periods (e.g., during off-hours archiving periods).

Certain features of the present disclosure are referenced as forward markets herein. The term forward market should be understood broadly, and includes any market that provides for trading of any type of resource scheduled for future delivery of the resource. A forward market contemplates formal markets, such as energy trading, commodity trading, compute resource trading, data storage trading, network bandwidth trading, and/or spectrum trading markets whereby parties can access the markets and purchase or sell resources (e.g., in a set quantity for a set delivery time). Additionally or alternatively, a forward market contemplates an informal market, where parties set forth a mechanism to trade or commit resources that are to be delivered at a later time. Trading may be performed in any currency, or based on in-kind contributions, and a forward market may be a mechanism for actual delivery of resources as scheduled, or a mechanism for trading on the future value of resources without actual delivery being contemplated (e.g., with some other mechanism that tends to bring the future price in to the spot price as the time for each forward looking period approaches). In certain embodiments, a forward market may be privately operated, and/or operated as a service where a platform 100 sets up the market, or communicates with the market. In certain embodiments, as described throughout the present disclosure, transactions on the forward market may be captured in a distributed ledger.

Certain features of the present disclosure are referenced as spot markets herein. The term spot market should be understood broadly, and includes any market that provides for trading of any type of resource at a price based on the current trading price of the resource for immediate delivery. A spot market contemplates formal markets and/or informal markets. Trading on a spot market may be performed in any currency, or based on in-kind contributions. In certain embodiments, a spot market may be privately operated, and/or operated as a service where a platform 100 sets up the market, or communicates with the market. In certain embodiments, as described throughout the present disclosure, transactions on the spot market may be captured in a distributed ledger.

Certain features of the present disclosure are referenced as purchasing or sale of one or more resources, including at least: energy, energy credits, network bandwidth (e.g., communication capacity), spectrum and/or spectrum allocation (e.g., certain frequency bandwidths, including potentially transmission rates, transmission power, and/or geographical limitations); compute resources (or capacity); network resources (or capacity); data storage resources (or capacity); and/or energy storage resources (or capacity). A purchase or sale, as utilized herein, includes any transaction wherein an amount of a resource or other commitment (e.g., an element of intellectual property (IP), an IP license, a service, etc.) is traded for a unit of currency of any type and/or an amount of another resource or commitment. In certain embodiments, a purchase or sale may be of the same type of resource or commitment, for example where energy for one time period (e.g., immediate delivery, or a first future time period) is traded for energy at another time period (e.g., a second future time period, which is distinct from the immediate delivery or the first future time period). In certain embodiments, one side of the purchase or sale includes a currency of any type, including at least a sovereign currency, a cryptocurrency, and/or an arbitrary agreed upon currency (e.g., specific to a private market or the like).

Certain features of the present disclosure are referenced as a machine herein. The term machine, as utilized herein, should be understood broadly. In certain embodiments, a machine includes any component related to a facility having at least one associated task, which may be a core task, a compute task, a network task, a data storage task, and/or an energy storage task. In certain embodiments, a machine includes any component related to a facility that utilizes at least one resource, which may be an energy resource, a compute resource, a network resource, and/or a data storage resource. In certain embodiments, a machine includes any one or more aspects of any controller, AI implementing device, machine learning implementing device, deep learning implementing device, neural network implementing device, distributed ledger implementing or accessing device, intelligent agent, a circuit configured to perform any operations described throughout the present disclosure, and/or a market (forward and/or spot) implementing or accessing device as described throughout the present disclosure. In certain embodiments, a machine is operatively and/or communicatively coupled to one or more facility components, market(s), distributed ledger(s), external data, internal data, resources (of any type), and/or one or more other machines within a system. In certain embodiments, two or more machines be provided with at least one aspect of cooperation between the machines, forming a fleet of machines. In certain embodiments, two machines may cooperate for certain aspects of a system or in certain operating conditions of the system, and thereby form a fleet of machines for those aspects or operating conditions, but may be separate individually operating machines for other aspects or operating conditions. In certain embodiments, machines forming a part of a fleet of machines may be associated with (e.g., positioned at, communicatively coupled to, and/or operatively coupled to) the same facility, or distinct facilities. In certain embodiments, a machine may be associated with more than one facility, and/or associated with different facilities at different times or operating conditions.

Certain aspects of the present disclosure are referenced as energy credits herein. The term energy credits, as utilized herein, should be understood broadly. In certain embodiments, an energy credit is a regulatory, industry agreed, or other indicia of energy utilization that is tracked for a particular purpose, such as $CO_2$ emissions, greenhouse gas emissions, and/or any other emissions measure. In certain embodiments, an energy credit may be "negative" (e.g., relating to increased emissions) or "positive" (e.g., relating to reduced emissions). In certain embodiments, energy credits may relate to particular components (e.g., automobiles of a certain power rating or application, computing related energy utilization, etc.) and/or generic energy utilization (e.g., without regard to the specific application utilizing the energy). In certain embodiments, energy credits may relate to taxation schemes, emissions control schemes, industry agreement schemes, and/or certification schemes (e.g., voluntary, involuntary, standards-related, or the like). In certain embodiments, an energy credit includes any indicia of energy utilization where verified tracking (e.g., for reporting purposes) of that indicia can be utilized to increment or decrement value for a facility, facility owner, or facility operator. Non-limiting examples include: an entity subject to a regulatory requirement for reporting emissions; and/or an entity reporting emissions performance in a public format (e.g., an annual report).

Certain aspects of the present disclosure are referenced as collective optimization. Collective optimization, as used herein, includes the improvement and/or optimization of multiple aspects of a system (e.g., multiple machines, multiple components of a facility, multiple facilities, etc.) together as an optimized or improved system. It will be understood that collective optimization may occur within more than one dimension—for example a collectively optimized or improved system may have a higher overall energy consumption than before operations to collectively optimize or improve, but have improvement in some other aspect (e.g., utilization of energy credits, lower cost of operation, superior product or outcome delivery, lower network utilization, lower compute resource usage, lower data storage usage, etc.).

Certain aspects of the present disclosure are referenced as social media data sources. Social media data sources include, without limitation: information publicly available on any social media site or other mass media platform (e.g., from comments sections of news articles; review sections of an online retailer; publicly available aspects of profiles, comments, and/or reactions of entities on social media sites; etc.); proprietary information properly obtained from any social media site or other mass media platform (e.g., purchased information, information available through an accepted terms of use, etc.); and the like. In certain embodiments, social media data sources include cross-referenced and/or otherwise aligned data from multiple sources—for example where a comment from one site is matched with a profile from another site, data is matched with a member list from a professional group membership, data is matched from a company website, etc. In certain embodiments, social media data sources include cross-referenced and/or otherwise aligned data from other data sources, such as IoT data sources, automated agent behavioral data sources, business entity data sources, human behavioral data sources, and/or any other data source accessible to a machine, platform 100, or other device described throughout the present disclosure.

Certain aspects of the present disclosure reference determining (and/or optimizing, improving, reducing, etc.) the utilization or consumption of energy or resources. Determining the utilization or consumption of energy or resources should be understood broadly, and may include consideration of a time value of the consumption, and/or an event-related value of the consumption (e.g., calendar events such as holidays or weekends, and/or specific real-time events such as news related events, industry related events, events related to specific geographical areas, and the like). In certain embodiments, the utilization or consumption of energy or resources may include consideration of the type of energy or resource (e.g., coal-generated electricity versus wind-generated electricity), the source of the energy or resource (e.g., the geographical origin of the energy available, the entity providing a compute resource, etc.), the total capacity of the energy or resource (e.g., within a facility or group of facilities, from a third-party, etc.), and/or non-linear considerations of the cost of the energy or resource (e.g., exceeding certain thresholds, the likely cost behavior in a market responsive to a purchase event, etc.).

Certain aspects of the present disclosure reference performing operations to implement an arbitrage strategy. An arbitrage strategy as utilized herein should be understood broadly. An arbitrage strategy includes any strategy structured to favorably utilize a differential between a present value of a resource and a predicted future value of the resource. In certain embodiments, implementing an arbitrage strategy includes a determination that a given value (either a present value on a spot market, or a future value for at least one time frame) of the resource is abnormally low or high relative to an expected or anticipated value, and to execute operations to either purchase or sell the resource and benefit from the abnormal value. In certain embodiments, an arbitrage strategy is implemented as a portion of an overall optimization or improvement operation. For example, in certain embodiments implementing the arbitrage strategy may push the overall system away from the otherwise optimum value (e.g., buying or selling more of a resource than the improved or optimized system would otherwise perform), and the benefits of the implementation of the arbitrage strategy are considered within the value of the entire system. In certain embodiments, an arbitrage strategy is implemented as a standalone transaction (e.g., for a system that is not presently operating any core tasks, and/or a system where implementing an arbitrage strategy is the core task), and the arbitrage strategy is implemented as the primary, or the only, system level improvement or optimization.

Certain aspects of the present disclosure are referenced as a small transaction, and/or a rapidly executed transaction. A small transaction as utilized herein references a transaction that is small enough to limit the risk of the transaction to a threshold level, where the threshold level is either a level that is below an accepted cost of the transaction, or below a disturbance level (e.g., a financial disturbance, an operational disturbance, etc.) for the system. For example, wherein an implementation of an arbitrage strategy includes a small transaction for an energy resource, the small transaction may be selected to be small enough such that the amount of energy bought or sold does not change the basic operational equilibrium of the system under current operating conditions, and/or such that the amount of potential loss from the transaction is below a threshold value (e.g., an arbitrage fund, an operating cash amount, or the like). In certain embodiments, the small transaction is selected to be large enough to test the arbitrage opportunity determination—for example a large enough transaction that the execution of the transaction will occur in a similar manner (e.g., not likely to be absorbed by a broker, having an expected similarity in execution speed, and/or having an expected similarity in successful execution likelihood) to a planned larger trade to be performed. It will be understood that more than one small transaction, potentially of increasing size, may be performed before a larger transaction is performed, and/or that a larger transaction may be divided into one or more portions. A rapidly executed transaction includes any transaction that is expected to have a rapid time constant with regard to the expected time frame of the arbitrage opportunity. For example, where a price anomaly is expected to persist for one hour, a rapidly executed transaction may be a transaction expected to clear in much less than one hour (e.g., less than half of the hour, to provide time to execute the larger transaction). In another example, where a price anomaly is expected to persist for 10 minutes, a rapidly executed transaction may be a transaction expected to clear in much less than 10 minutes. It will be understood that any machine, AI component, machine learning component, deep learning component, expert system, controller, and/or any other adaptive component described throughout the present disclosure may adaptively improve the size, timing, and/or number of small transactions and large transactions as a part of improving or optimizing an implementation of an arbitrage strategy. Additionally or alternatively, any parameters of the arbitrage determination, such as the expected value of the arbitrage opportunity and/or the expected persistence time of the arbitrage opportunity, may be adaptively improved.

Certain aspects of the present disclosure are referenced as a token, and/or certain operations of the present disclosure are referenced as tokenizing one or more aspects of data or other parameters. Tokens, and/or operations to tokenize, should be understood broadly, and include operations and/or data utilized to abstract underlying data and/or to provide confirmable or provable access to the underlying data. Without limitation to any other aspect of the present disclosure, tokens include wrapper data that corresponds to underlying data values, hashes or hashing operations, surrogate values, and/or compartmentalized data. Tokenization operations may include hashing, wrapping, or other data separation and/or compartmentalization operations, and may further include authorization operations such as verification of a user or other interacting party, including verification checks based on IP addresses, login interfaces, and/or verifications based on characteristics of the user or other interacting party that are accessible to the tokenizing system. In certain embodiments, a token may include certain aspects of the underlying or tokenized data (e.g., headers, titles, publicly available information, and/or metadata), and/or a token may be entirely abstracted from the underlying or tokenized data. In certain embodiments, tokens may be utilized to provide access to encrypted or isolated data, and/or to confirm that access to the encrypted or isolated data has been provided, or that the data has been accessed.

Certain aspects of the present disclosure reference provable access (e.g., to data, instruction sets, and/or IP assets). Provable access, as utilized herein, should be understood broadly. In certain embodiments, provable access includes a recordation of actual access to the data, for example recording a data value demonstrating the data was accessed, and may further include user or accessor information such as usernames, e-mail addresses, IP addresses, geographic locations, time stamps, and/or which portions of the data were accessed. In certain embodiments, provable access includes a recordation of the availability of the data to a user or potential accessor, and may further include user or accessor information such as usemames, e-mail addresses, IP addresses, geographic locations, time frames or stamps, and/or which portions of the data were available for access. In certain embodiments, provable access includes storing the recordation on a system (e.g., on a distributed ledger, and/or in a memory location available to any controller, machine, or other intelligent operating entity as described throughout the present disclosure). In certain embodiments, provable access includes providing the user or accessor of the data with a data value such that the user or accessor is able to demonstrate the access or access availability. In certain embodiments, a data value and/or distributed ledger entry forming a portion of the provable access may be encrypted, tokenized, or otherwise stored in a manner whereby the provable access can be verified, but may require an encryption key, login information, or other operation to determine the access or access availability from the data value or distributed ledger entry.

Certain aspects of the present disclosure are referenced as an instruction set and/or as executable algorithmic logic. An instruction set and/or executable algorithmic logic as referenced herein should be understood broadly. In certain embodiments, an instruction set or executable algorithmic logic includes descriptions of certain operations (e.g., flow charts, recipes, pseudo-code, and/or formulas) to perform the underlying operations—for example an instruction set for a process may include a description of the process that may be performed to implement the process. In certain embodiments, an instruction set, or executable algorithmic logic includes portions of certain operations, for example proprietary, trade secret, calibration values, and/or critical aspects of a process, where the remainder of the process may be generally known, publicly available, or provided separately from the portions of the process provided as an instruction set or executable algorithmic logic. In certain embodiments, an instruction set or executable algorithmic logic may be provided as a black box, whereby the user or accessor of the instruction set or executable algorithmic logic may not have access to the actual steps or descriptions, but may otherwise have enough information to implement the instruction set or executable algorithmic logic. For example, and without limitation, a black box instruction set or executable algorithmic logic may have a description of the inputs and outputs of the process, enabling the user or accessor to include the instruction set or executable algorithmic logic into a process (e.g., as a module of executable instructions stored in a computer readable medium, and/or as an input to a machine responsive to the black box operations) without having access to the actual operations performed in the instruction set or the executable algorithmic logic.

Certain aspects of the present disclosure are referenced as a distributed ledger. A distributed ledger, as referenced herein, should be understood broadly. Without limiting any other aspect of the present disclosure, a distributed ledger includes any data values that are provided in a manner to be stored in distributed locations (e.g., stored in multiple memory locations across a number of systems or devices), such that individual members of the distributed system can add data values to the set of data values, and where the distributed system is configured to verify that the added data values are consistent with the entire set of data values, and then to update the entire set of data values thereby updating the distributed ledger. A block chain is an example implementation of a distributed ledger, where a critical mass (e.g., more than half) of the distributed memory locations create agreement on the data values in the distributed ledger, thereby creating an updated version of the distributed ledger.

In certain embodiments, a distributed ledger may include a recordation of transactions, stored data, stored licensing terms, stored contract terms and/or obligations, stored access rights and/or access events to data on the ledger, and/or stored instruction sets, access rights, and/or access events to the instruction sets. In certain embodiments, aspects of the data on a distributed ledger may be stored in a separate location, for example with the distributed ledger including a pointer or other identifying location to the underlying data (e.g., an instruction set stored separately from the distributed ledger). In certain embodiments, an update to the separately stored data on the distributed ledger may include an update to the separately stored data, and an update to the pointer or other identifying location on the distributed ledger, thereby updating the separately stored data as referenced by the distributed ledger. In certain embodiments, a wrapper or other interface object with the distributed ledger may facilitate updates to data in the distributed ledger or referenced by the distributed ledger, for example where a party submits an updated instruction set, and where the wrapper stores the updated instruction set separately from the distributed ledger, and updates the pointer or identifying location on the distributed ledger to access the updated instruction set, thereby creating a modified instruction set (or other data).

Certain aspects of the present disclosure are referenced as a wrapper, expert wrapper, a smart wrapper, and/or a smart contract wrapper. A wrapper, as referenced herein, should be understood broadly. Without limitation to any other aspect of the present disclosure, a wrapper references any interfacing system, circuit, and/or computer executable instructions providing an interface between the wrapped object (e.g., data values and/or a distributed ledger) and any system, circuit, machine, user, and/or accessor of the wrapped object. A wrapper, in certain embodiments, provides additional functionality for the wrapped object, user interfaces, API, and/or any other capabilities to implement operations described herein. In certain embodiments, a wrapper can provide for access authorization, access confirmation, data formatting, execution of agreement terms, updating of agreement terms, data storage, data updating, creation and/or control of metadata, and/or any other operations as described throughout the present disclosure. In certain embodiments, parameters of the wrapper (e.g., authorized users, data in a stack of data, creation of new data stacks, adjustments to contract terms, policies, limitations to total numbers of users or data values, etc.) may be configurable by a super user, an authorized user, an owner, and/or an administrator of the wrapper, and/or parameters of the wrapper may be accessible within the wrapped object (e.g., as data values stored in a distributed ledger which, when updated, change certain parameters of the wrapper). An expert wrapper or a smart wrapper includes, without limitation, any wrapper that includes or interacts with an expert system, an AI system, a ML system, and/or an adaptive system.

Certain aspects of the present disclosure are referenced as IP licensing terms and/or contract terms herein. IP licensing terms, as used herein, should be understood broadly. Without limitation to any other aspect of the present disclosure, IP licensing terms include permissions to access and/or utilize any element of IP. For example, and IP licensing term may include an identification of the IP element (e.g., a trade secret; a patent and/or claims of a patent; an image, media element, written description, or other copyrighted data element; and/or proprietary information), a description of the access or usage terms (e.g., how the IP element may be utilized by the accessor), a description of the scope of the utilization (e.g., time frames, fields of use, volume or other quantitative limits, etc.), a description of rights relating to the IP element (e.g., derivative works, improvements, etc.), and/or a description of sub-licensing rights (e.g., provisions for suppliers, customers, affiliates, or other third parties that may interact with the user or accessor in a manner related to the IP element). In certain embodiments, IP licensing terms may include a description of the exclusivity or non-exclusivity provided in relation to an IP element. In certain embodiments, IP licensing terms may relate to open source terms, educational use, non-commercial use, or other IP utilization terms that may or may not relate to a commercial transaction or an exchange of monetary/currency value, but may nevertheless provide for limitations to the use of the IP element for the user or accessor. Without limitation to any other aspect of the present disclosure, contract terms include any one or more of: options (e.g., short and/or put options relating to any transaction, security, or other tradeable assets); field exclusivity; royalty stacking (e.g., distribution of royalties between a group of owners and/or beneficiaries); partial exclusivity (e.g., by fields-of-use, geographic regions, and/or transaction types); pools (e.g., shared or aggregated IP stacks, data pools, and/or resource pools); standard terms; technology transfer terms; performance-related rights or metrics; updates to any of the foregoing; and/or user selections (e.g., which may include further obligations to the user and/or costs to the user) of any of the foregoing.

Certain aspects herein are described as a task system. A task system includes any component, device, and/or group of components or devices that performs a task (or a portion of a task) of any kind described throughout the present disclosure, including without limitation any type of task described for a machine. The task may have one or more associated resource requirements, such as energy consumption, energy storage, data storage, compute requirements, networking requirements, and/or consumption of associated credits or currency (e.g., energy credits, emissions credits, etc.). In certain embodiments, the resource utilization of the task may be negative (e.g. consumption of the resource) or positive (e.g., regeneration of energy, deletion of data, etc.), and may further include intermediate values or time trajectories of the resource utilization (e.g., data storage requirements that vary over an operating period for the task, energy storage requirements that may fill or deplete over an operating period, etc.). The determination of any resource requirement for a task herein should be understood broadly, and may be determined according to published information from the task system (e.g., according to a current load, energy consumption, etc.), determined according to a scheduled or defined value (e.g., entered by an operator, administrator, and/or provided as a communication by a controller associated with the task system), and/or may be determined over time, such as by observing operating histories of the task system. In certain embodiments, expert systems and/or machine learning components may be applied to determine resource requirements for a task system—for example determining relationships between any available data inputs and the resource requirements for upcoming tasks, which allows for continuous improvement of resource requirement determinations, and further allows for training of the system to determine which data sources are likely to be predictive of resource requirements (e.g., calendar date, periodic cycles, customer orders or other business indicators, related industry indicators, social media events and/or other current events that tend to drive resource requirements for a particular task, etc.).

Figure 40:
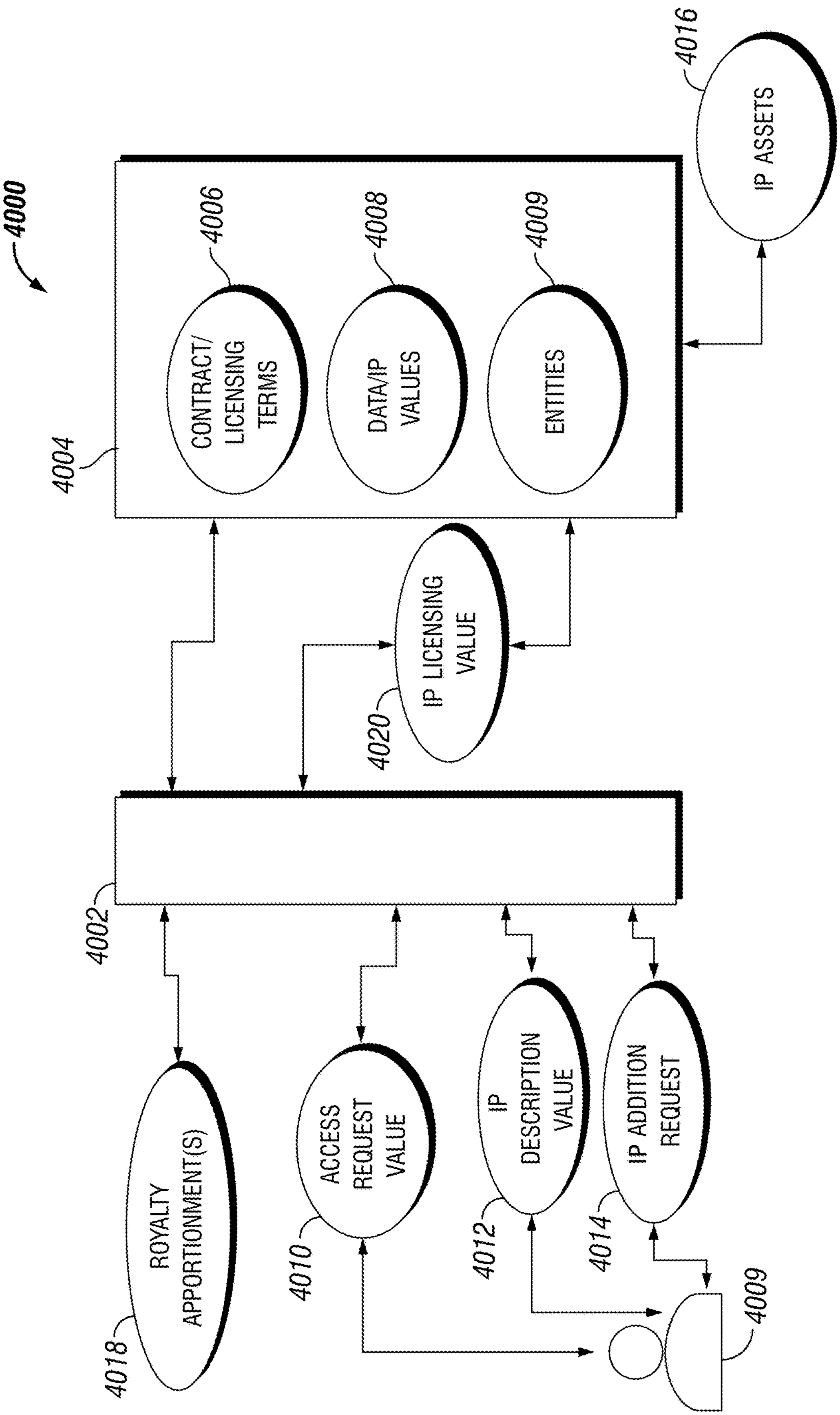
FIG. 40 is a schematic diagram of a system including a smart contract wrapper.

Referencing FIG. 40, an example system 4000 is a transaction-enabling system including a smart contract wrapper 4002. The contract wrapper 4002 may be configured to access a distributed ledger 4004 including a number of embedded contract and/or IP licensing terms 4006 and a number of data values 4008, and to interpret an access request value 4010 for the data values 4008. In response to the access request value 4010, the contract wrapper provides access to at least a portion of the data values 4008, and commits an entity 4009 (e.g., a subscribing user, a customer, and/or a prospective customer for the data) providing the access request value 4010 to at least one of the embedded contract and/or IP licensing terms 4006. The contract wrapper 4002 may be embodied as computer readable instructions that provide a user interface between a user and the distributed ledger, and may further be implemented as a web interface, an API, a computer program product, or the like. The contract wrapper 4002 is operationally positioned between one or more users 4009 and the distributed ledger 4004 and data values 4008, but the contract wrapper 4002 may be stored and function in a separate physical location from the distributed ledger 4004, data values 4008, and/or the users 4009. Additionally or alternatively, the contract wrapper 4002 may be distributed across multiple devices and/or locations.

An example embodiment includes the data values 4008 including intellectual property (IP) data corresponding to a plurality of IP assets 4016, such as a listing, description, and/or summary information for patents, trade secrets, or other proprietary information, and the embedded contract and/or IP licensing terms 4006 include a number of intellectual property (IP) licensing terms (e.g., usage rights, fields of use, limitations, time frames, royalty rates, and the like) for the corresponding IP assets. In certain embodiments, the data values 4008 may include the IP assets 4016 (e.g., proprietary information, recipes, instructions, or the like), and/or the data values 4008 may correlate to IP assets 4016 stored elsewhere, and may further include sufficient information for a user to understand what is represented in the IP assets 4016. The example contract wrapper 4002 may further commit the entity 4009 providing the access request value 4010 to corresponding contract and/or IP licensing terms 4006 for accessed ones of the IP assets 4016—for example only committing the user to terms for assets 4016 that are agreed upon, accessed, and/or utilized (e.g. committed contract terms).

An example contract wrapper 4002 is further configured to interpret an IP description value 4012 and an IP addition request 4014, and to add additional IP data to the data values 4008 in response to the IP description value 4012 and the IP addition request 4014, where the additional IP data includes IP data corresponding to an additional IP asset. For example, the contract wrapper 4002 may accept an IP description value 4012 from a user (e.g., a document, reference number, or the like), and respond to the IP addition request 4014 to add information to the data values 4008 consistent with the IP description value 4012, thereby adding one or more IP assets 4016 to the data values 4008. In certain embodiments, the contract wrapper 4002 may further provide a user interface to interact with the user 4009 or other entity adding the IP asset, which may include determining permissions to add an asset, and/or consent or approval from the user or other parties. In certain embodiments, consent or approval may be performed through rules, an intelligent system, or the like, for example to ensure that IP assets being added are of a selected type, quality, valuation, or other have other selected characteristics.

An example contract wrapper 4002 accesses a number of owning entities corresponding to the IP assets of the data values 4008. The example contract wrapper 4002 apportions royalties 4018 generated from the IP assets corresponding to the data values 4008 in response to the corresponding IP license terms 4006, such as apportionment based on asset valuations, asset counts, and/or any agreed upon apportionment parameters. In certain embodiments, the contract wrapper 4002 adds an IP asset to an aggregate stack of IP assets based on an IP addition request 4014, and updates the apportionment of royalties 4018 based upon the owning entities 4009 and IP assets 4016 for the aggregate stack after the addition of the IP asset. In certain embodiments, the contract wrapper 4002 is configured to commit the entity adding the IP asset to the IP licensing terms 4006, and/or the IP licensing terms 4006 as amended with the addition of the new IP assets.

An example transaction-enabling system 4000 including a smart contract wrapper 4002, the smart contract wrapper according to one disclosed non-limiting embodiment of the present disclosure may be configured to access a distributed ledger includes a plurality of intellectual property (IP) licensing terms 4006 corresponding to a plurality of IP assets 4016, wherein the plurality of IP assets 4016 include an aggregate stack of IP, and to interpret an IP description value 4012 and an IP addition request 4014, and, in response to the IP addition request 4014 and the IP description value 4012, to add an IP asset to the aggregate stack of IP. An example smart contract wrapper 4002 interprets an IP licensing value 4020 corresponding to the IP description value 4012, and to add the IP licensing value 4020 to the plurality of IP licensing terms 4006 in response to the IP description value and the IP addition request. The IP licensing value 4020 may be determined from input by the user 4009, automated or machine learning improved operations performed on indicia of the added IP asset (e.g., according to valuation algorithms such as markets affected by the IP asset, value contributions of the IP asset, participation of the IP asset into industry standard systems or operations, references to the IP asset by other IP assets, and the like), and/or may further depend upon the role or permissions of the user 4009. In certain embodiments, a first user 4009 adds the IP asset to the IP assets 4016, and a second user 4009 provides additional data utilized to determine the IP licensing value 4020. An example smart contract wrapper 4002 further associates one or more contract and/or IP licensing terms 4006 to the added IP asset. In certain embodiments, one or more IP assets are stored within the data values 4008, and/or are referenced to a separate data store having the IP assets 4016. An example aggregate stack of IP further includes a reference to the data store for one or more IP assets 4016.

Figure 41:
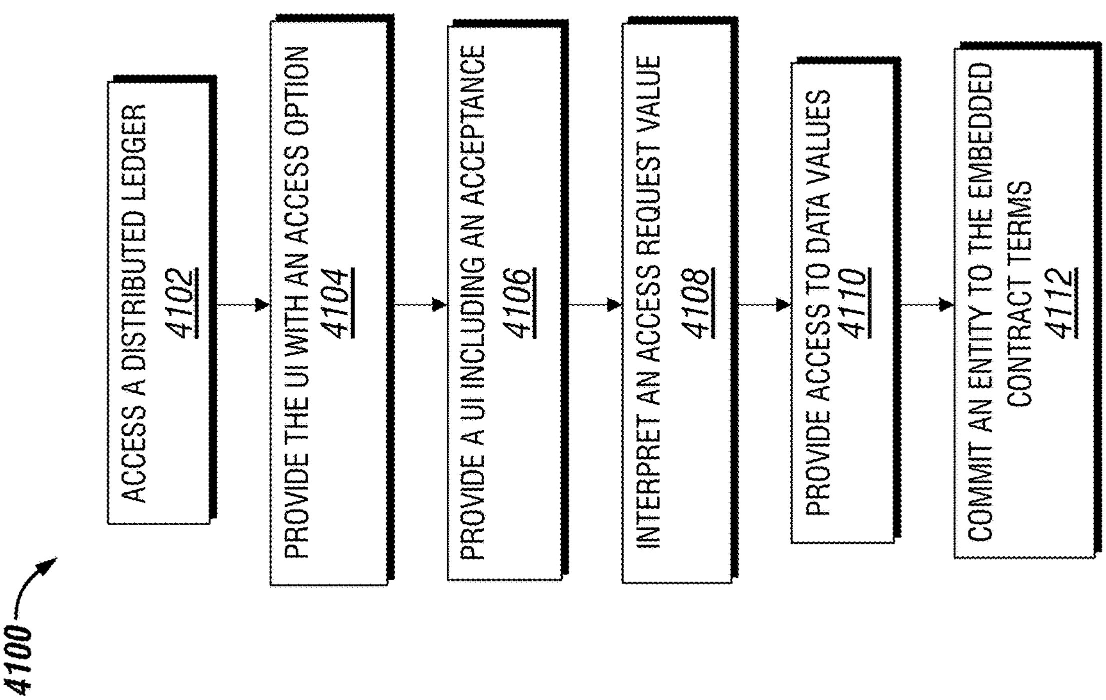
FIG. 41 is a schematic flow diagram of a method for executing a smart contract wrapper.

Referencing FIG. 41, an example procedure 4100 to execute a smart contract wrapper is depicted. The procedure 4100 includes an operation 4102 to access a distributed ledger including a number of embedded contract terms and a number of data values, an operation 4104 to provide a user interface (UI) including an access option, an operation 4106 to provide a user interface including acceptance input portion, and an operation 4108 to interpret an access request value for the data values. The example procedure 4100 further includes an operation 4110 to provide access to at least a portion of the plurality of data values, and an operation 4112 to commit an entity providing the access request value to at least one of the plurality of embedded contract terms.

An example procedure may include providing the entity providing the access request value with a user interface including a contract acceptance input, and where the providing access and committing the entity is in response to a user input on the user interface. An example procedure may include the data values including IP data (e.g., IP elements, or information corresponding to IP elements), where the embedded contract terms include IP licensing terms for the corresponding IP assets. An example procedure further includes the operation 4112 to commit an entity providing the access request value to corresponding IP licensing terms for accessed IP assets.

Figure 42:
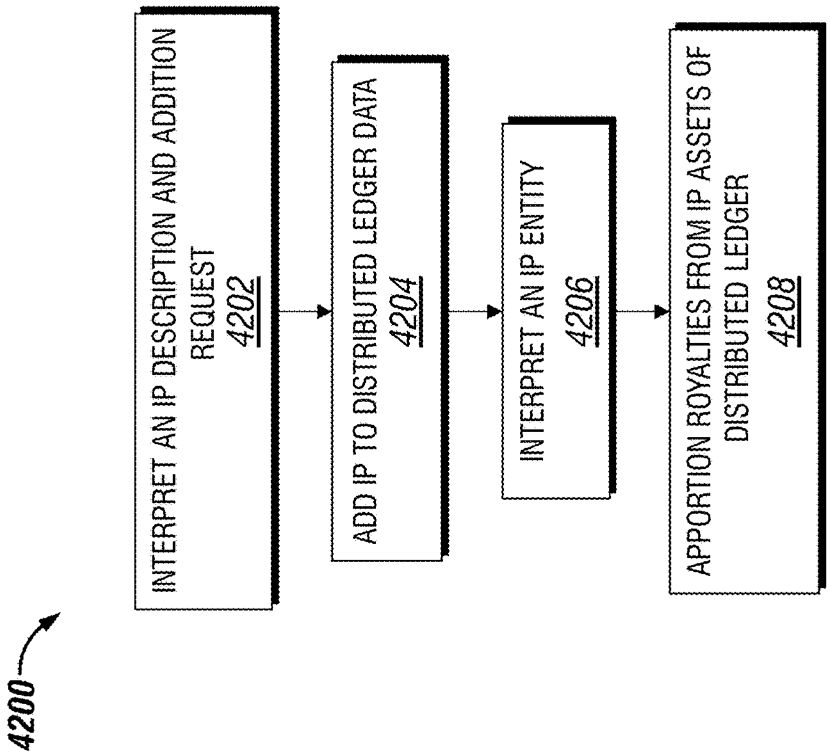
FIG. 42 is a schematic flow diagram of a method for updating an aggregate IP stack.

Referencing FIG. 42, an example procedure 4200 includes an operation 4202 to interpret an IP description value and an IP addition request, and an operation 4204 to add additional IP data to a plurality of data values on a distributed ledger in response to the IP description value and the IP addition request, wherein the additional IP data includes IP data corresponding to an additional IP asset. An example procedure 4200 further includes an operation 4206 to further interpret an IP addition entity (e.g., the entity adding the IP data, and/or an entity designated as an owner of the additional IP asset by the entity adding the IP data), and an operation 4208 to apportion royalties from the plurality of IP assets to the plurality of owning entities in response to the corresponding IP licensing terms, and/or further in response to the additional data and the IP addition entity.

Figure 43:
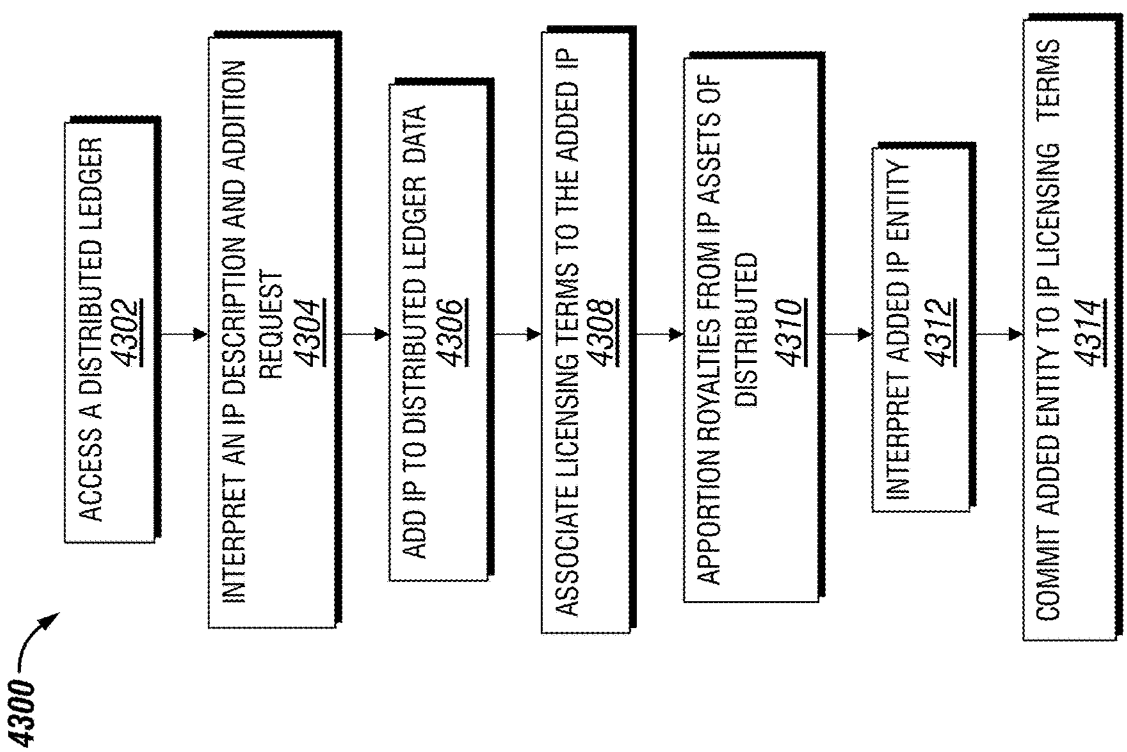
FIG. 43 is a schematic flow diagram of a method for adding assets and entities.

Referencing FIG. 43, an example procedure 4300 includes an operation 4302 to access a distributed ledger, an operation 4304 to interpret an IP description and an IP addition request, an operation 4306 to add IP asset(s) to the distributed ledger in response to the IP description and the IP addition request, an operation 4308 to associate one or more licensing terms to the added IP, and an operation 4310 to apportion royalties from IP assets of the distributed ledger to owning entities of the IP assets. An example procedure 4300 further includes an operation 4312 to interpret an added IP entity (e.g., as a change to an existing IP asset, and/or an entity owning an added IP asset), and an operation 4314 to commit the added IP entity to one or more of the IP licensing terms.

Figure 44:
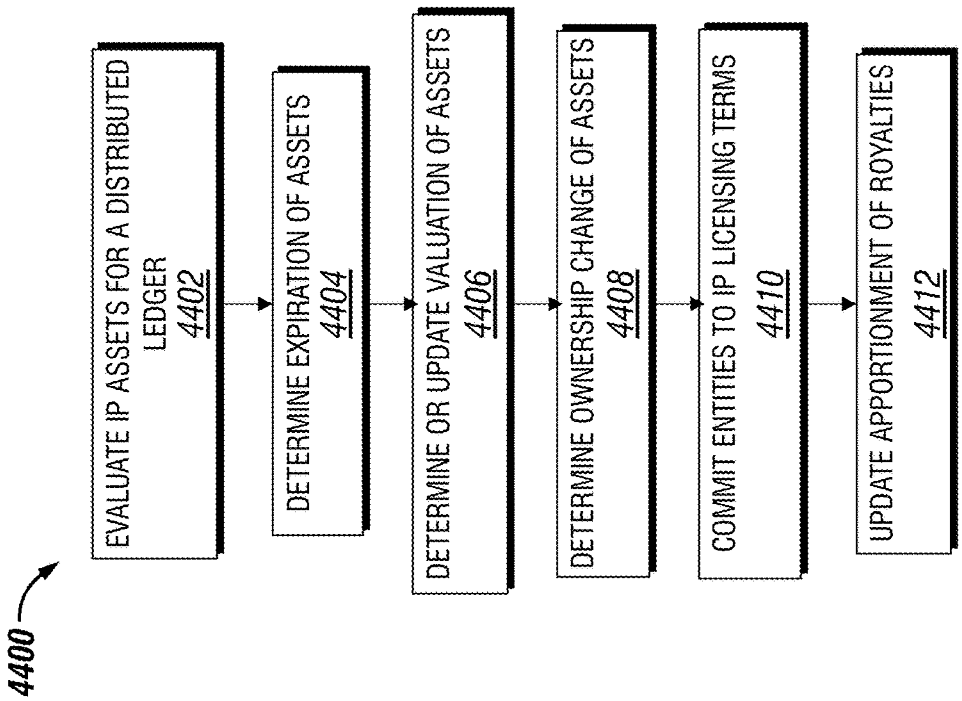
FIG. 44 is a schematic flow diagram of a method for updating an aggregate IP stack.

Referencing FIG. 44, an example procedure 4400 includes an operation 4402 to evaluate IP assets for a distributed ledger, an operation 4404 to determine that one or more assets have expired (e.g., according to the terms of the licensing agreements, according to a date defined with the IP asset, and/or according to external data such as a database updated in response to a court ruling or other decision about the asset). The example procedure 4400 further includes an operation 4406 to determine or update a valuation of the IP assets, an operation 4408 to determine whether an ownership change has occurred for one or more of the IP assets, an operation 4410 to commit updated entities to the IP licensing terms, and/or an operation 4412 to update apportionment of royalties to owning entities in response to an asset expiration, asset valuation change, and/or a change in an owning entity for one or more IP assets. In certain embodiments, an example procedure 4400 includes an operation to provide a user interface to a new owning entity of at least one of the IP assets, and an operation to commit a new owning entity to one or more of the IP licensing terms in response to a user input on the user interface.

In certain embodiments, IP assets described herein include a listing of IP assets, an aggregated stack of IP assets, and/or any other organization of IP assets. In certain embodiments, IP assets may be grouped, sub-grouped, clustered, or organized in any other manner, and licensing terms may be associated, in whole or part, with the groups, sub-groups, and/or clusters of IP assets. In certain embodiments, a number of IP assets may be within a first aggregate stack for a first purpose (e.g., a particular field of use, type of accessing entity, etc.), but within separate aggregated stacks for a second purpose (e.g., a different field of use, type of accessing entity, etc.).

Figure 45:
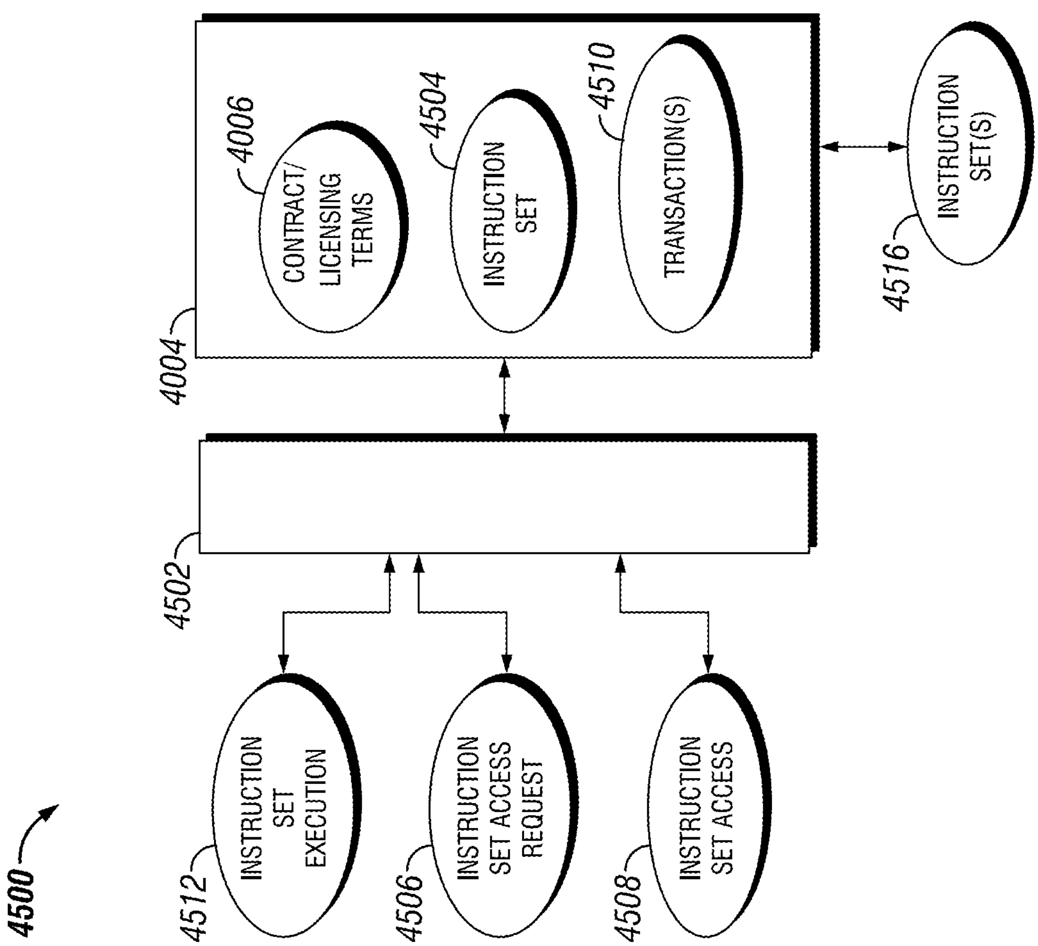
FIG. 45 is a schematic diagram of a system for providing verifiable access to an instruction set.

Referencing FIG. 45, an example transaction-enabling system 4500 includes a controller 4502, the controller 4502 according to one disclosed non-limiting embodiment of the present disclosure may be configured to: access a distributed ledger 4004 including an instruction set 4504, tokenize the instruction set, interpret an instruction set access request 4506, and, in response to the instruction set access request 4506, provide a provable access 4508 to the instruction set. In certain embodiments, the controller 4502 provides provable access 4508 by recording a value on the distributed ledger 4004, providing a user 4009 with a token demonstrating access, and/or records a transaction 4510 on the distributed ledger 4004 indicating the access. In certain embodiments, the instruction set 4504 may include an instruction set for any one or more of the following: a coating process, a 3D printer (e.g., a build file, diagram, and/or operational instructions), a semiconductor fabrication process, a field programmable gate array (FPGA) instruction set, a food preparation instruction set (e.g., an industrial process, a formula, a recipe, etc.), a polymer production instruction set, a chemical synthesis instruction set, a biological production process instruction set, and/or a crystal fabrication system.

An example controller 4502 further interprets an execution operation 4512 of the instruction set, and records a transaction 4510 on the distributed ledger 4004 in response to the execution operation 4512. In certain embodiments, interpreting an execution operation 4512 includes determining that a user has accessed the instruction set 4504 sufficiently to determine a process described in the instruction set 4504, determining that a user, the controller, or another aspect of the system 4500 has provided instructions to a device responsive to the instruction set 4504, and//or receiving a confirmation, data value, or other communication indicating that the instruction set 4504 has been executed. In certain embodiments, one or more instruction sets 4504 stored on the distributed ledger 4004 may be at least partially stored in a separate data store of instructions 4516, where the distributed ledger 4004 may store references, partial instructions, summaries, or the like, and access the separate data store of instructions 4516 as needed. In certain embodiments, one or more instruction sets 4504 may be stored on the distributed ledger 4004. In certain embodiments, access to the instruction set(s) 4504 may be provided in accordance with one or more contract terms 4006, and/or may be provided in response to committing a user or accessing entity to the one or more contract terms 4006.

Figure 46:
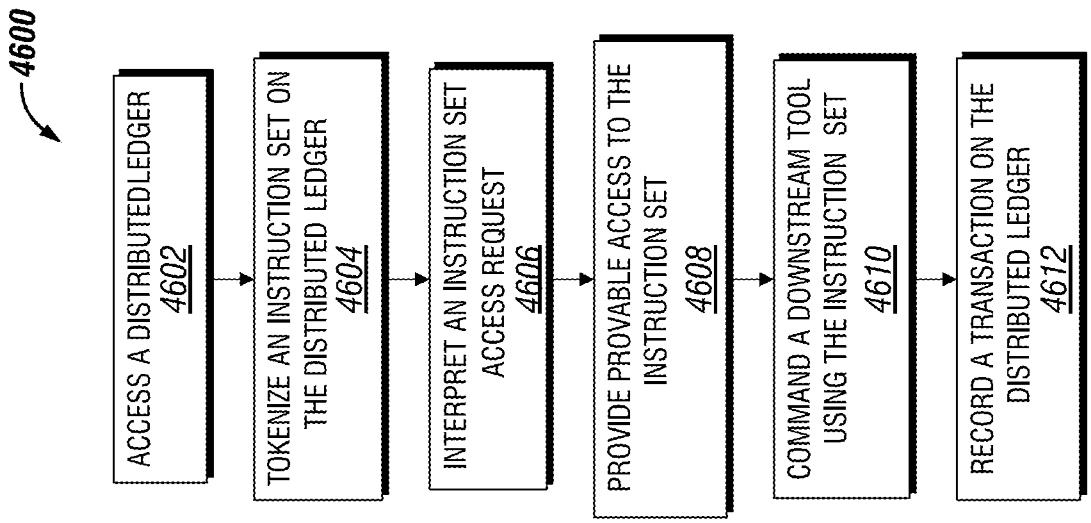
FIG. 46 is a schematic flow diagram of a method for providing verifiable access to an instruction set.

Referencing FIG. 46, an example procedure 4600 includes an operation 4602 to access a distributed ledger including an instruction set, an operation 4604 to tokenize the instruction set, and an operation 4606 to interpret an instruction set access request. The example procedure 4600 includes, in response to the instruction set access request, an operation 4608 to provide provable access to the instruction set. In certain embodiments, the instruction set may include an instruction set for any one or more of the following: a coating process, a 3D printer (e.g., a build file, diagram, and/or operational instructions), a semiconductor fabrication process, a field programmable gate array (FPGA) instruction set, a food preparation instruction set (e.g., an industrial process, a formula, a recipe, etc.), a polymer production instruction set, a chemical synthesis instruction set, a biological production process instruction set, and/or a crystal fabrication system. An example procedure 4600 further includes an operation 4610 to command a downstream tool (e.g., a production tool for a process, an industrial machine, a controller for an industrial process, a 3D printing machine, etc.) using the instruction set. In certain embodiments, the instruction set includes an FPGA instruction set. In certain embodiments, the procedure 4600 includes an operation to determine that an execution operation related to the instruction set has occurred, and/or an operation 4612 to record a transaction on the distributed ledger in response to an access of the instruction set, operation 4610 to command a downstream tool using the instruction set, and/or an execution operation related to the instruction set.

Figure 47:
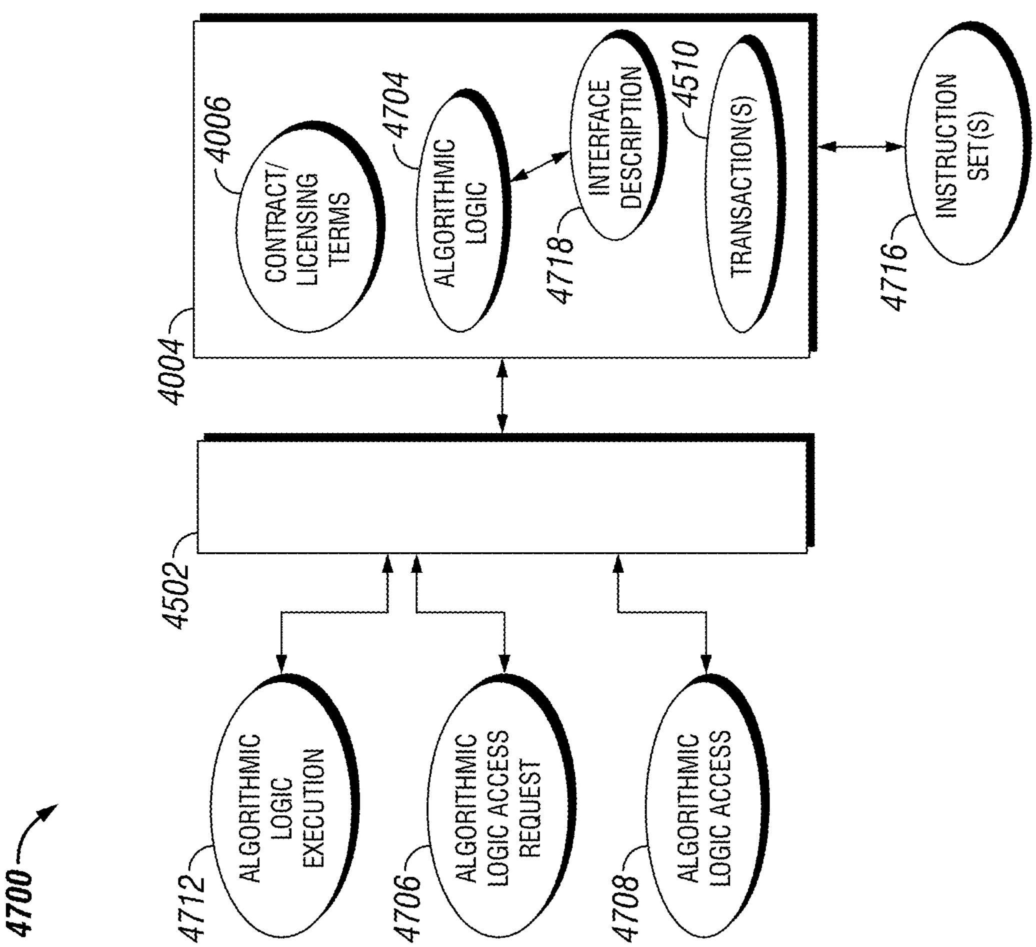
FIG. 47 is a schematic diagram of a system for providing verifiable access to algorithmic logic.

Referencing FIG. 47, an example transaction-enabling system 4700 includes a controller 4502, the controller 4502 according to one disclosed non-limiting embodiment of the present disclosure may be configured to: access a distributed ledger 4004 including executable algorithmic logic 4704, tokenize the executable algorithmic logic, interpret an executable algorithmic logic access request 4706, and, in response to the executable algorithmic logic access request 4706, provide a provable access 4708 to the executable algorithmic logic. In certain embodiments, the controller 4502 provides provable access 4708 by recording a value on the distributed ledger 4004, providing a user 4009 with a token demonstrating access, and/or records a transaction 4510 on the distributed ledger 4004 indicating the access. In certain embodiments, the executable algorithmic logic 4704 may include logical descriptions, computer readable and executable code in any form including source code and/or assembly language, a black box executable code or function (e.g., having an API, embedded code, and/or a code block for a specified program such as Matlab™, Simulink™, LabView™, Java™, or the like). In certain embodiments, the algorithmic logic 4704 further includes, and/or is communicated with, an interface description 4718 (e.g., providing input and output values, ranges, and/or formats; time values such as sampling rates, time constants, or the like; and/or parameter descriptions including required values, optional values, flags or enable/disable settings for features, and/or may further include or be communicated with documentation, instructions, or the like for the algorithmic logic 4704. In certain embodiments, the interface description 4718 may be provided as an API to the algorithmic logic 4704, and/or may be provided to support an API implementation to access the algorithmic logic.

An example controller 4502 further interprets an execution operation 4712 of the algorithmic logic, and records a transaction 4510 on the distributed ledger 4004 in response to the execution operation 4712. In certain embodiments, interpreting an execution operation 4712 includes determining that a user has accessed the algorithmic logic 4704 sufficiently to determine a process described in the algorithmic logic 4704, determining that a user, the controller, or another aspect of the system 4700 has provided execution instructions to a device responsive to the algorithmic logic 4704, and//or receiving a confirmation, data value, or other communication indicating that the algorithmic logic 4704 has been executed, downloaded, and/or copied. In certain embodiments, one or more algorithmic logic elements stored on the distributed ledger 4004 may be at least partially stored in a separate data store 4716, where the distributed ledger 4004 may store references, partial instructions, documentation, interface descriptions 4718, summaries, or the like, and access the separate data store 4716 of algorithmic logic elements as needed. In certain embodiments, one or more algorithmic logic 4704 elements may be stored on the distributed ledger 4004. In certain embodiments, access to the algorithmic logic 4704 elements may be provided in accordance with one or more contract terms 4006, and/or may be provided in response to committing a user or accessing entity to the one or more contract terms 4006.

Figure 48:
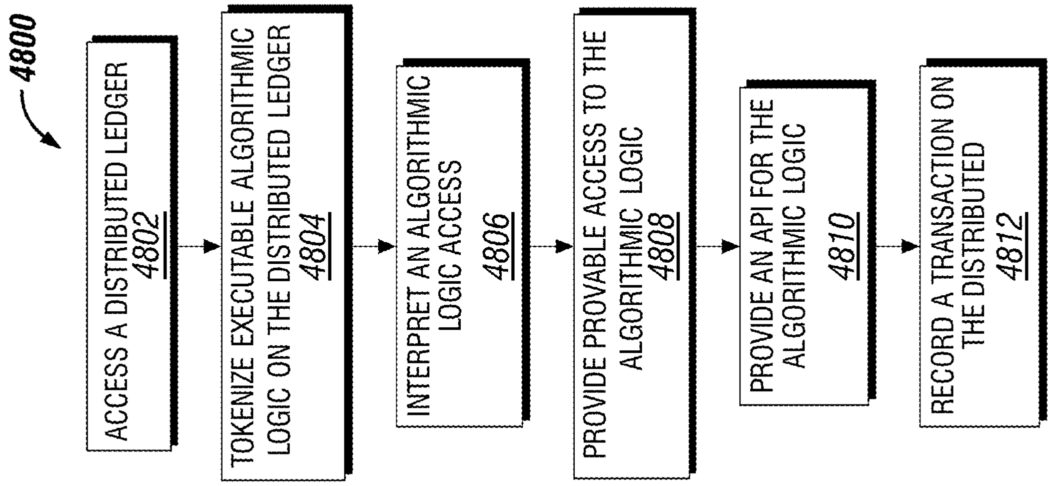
FIG. 48 is a schematic flow diagram of a method for providing verifiable access to executable algorithmic logic.

Referencing FIG. 48, an example procedure 4800 includes an operation 4802 to access a distributed ledger including executable algorithmic logic, an operation 4804 to tokenize the executable algorithmic logic, and an operation 4806 to interpret an access request for the executable algorithmic logic. An example procedure 4800 further includes, in response to the access request, an operation 4808 to provide provable access to the executable algorithmic logic. In certain embodiments, the procedure 4800 includes an operation 4810 to provide an interface for the algorithmic logic (e.g., as an API, and/or any other interface description provided throughout the present disclosure). An example procedure 4800 includes an operation to interpret an execution operation of the executable algorithmic logic, and/or an operation 4812 to record a transaction on the distributed ledger in response to the execution operation.

Figure 49:
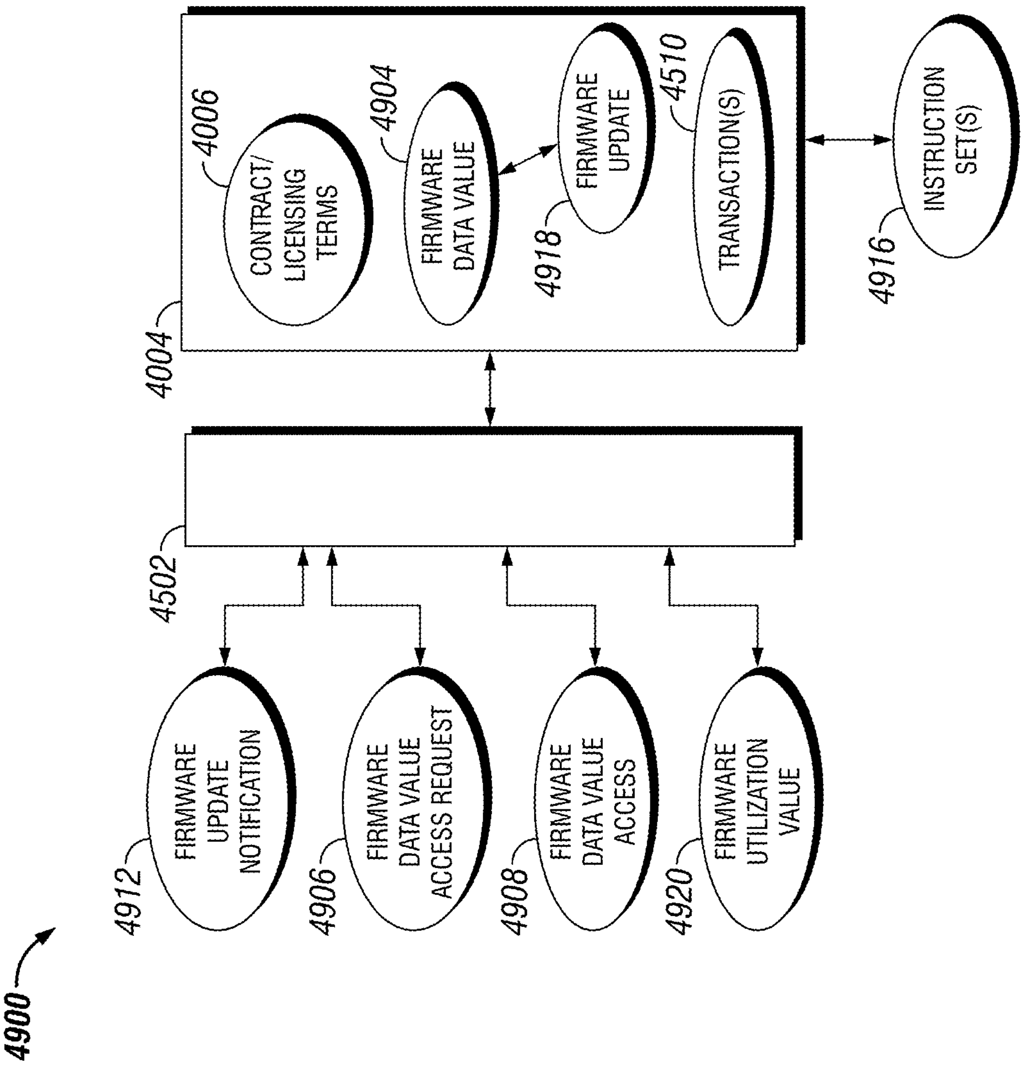
FIG. 49 is a schematic diagram of a system for providing verifiable access to firmware.

Referencing FIG. 49, an example transaction-enabling system 4900 includes a controller 4502, where the controller may be configured to access a distributed ledger 4004 including a firmware data value 4904, to tokenize the firmware data value, and to interpret an access request 4906 for the firmware data value. The example controller 4502 may be further configured to, in response to the access request 4906, provide a provable access 4908 to a firmware corresponding to the firmware data value 4904. In certain embodiments, the controller 4502 provides provable access 4908 by recording a value on the distributed ledger 4004, providing a user 4009 with a token demonstrating access, and/or records a transaction 4510 on the distributed ledger 4004 indicating the access. In certain embodiments, the firmware data value 4904 may include the corresponding firmware (e.g., as stored code, an installation package, etc.), and/or may include a reference to the firmware and/or related metadata (e.g., dates, versions, size of the firmware, applicable components, etc.). In certain embodiments, one or more aspects of the firmware or the firmware data value(s) 4904 may be stored in a separate data store 4916 accessible to the controller 4502 and/or the distributed ledger 4004.

An example controller 4502 is further configured to determine that a firmware update 4918 has occurred for a firmware data value 4904, and to provide an update notification 4912 to an accessor of the firmware data value 4904 in response to the firmware update 4918—for example to ensure that a current user or accessor receives (or chooses not to receive) the updated firmware data value 4904, and/or to notify a previous user or accessor that an update of the firmware data value 4904 has occurred. An example controller 4502 is further configured to interpret a firmware utilization value 4920 (e.g., a download operation, installation operation, and/or execution operation of the firmware data value 4904), and/or may further record a transaction 4510 on the distributed ledger 4004 in response to the firmware utilization value 4920. In certain embodiments, the firmware data value 4904 may include firmware for a component of a production process, and/or firmware for a production tool. Example and non-limiting production tools include tools for a process such as: a coating process, a 3D printing process, a semiconductor fabrication process, a food preparation process, a polymer production process, a chemical synthesis process, a biological production process, and/or a crystal fabrication process. In certain embodiments, the firmware data value 4904 may include firmware for a compute resource and/or firmware for a networking resource.

Figure 50:
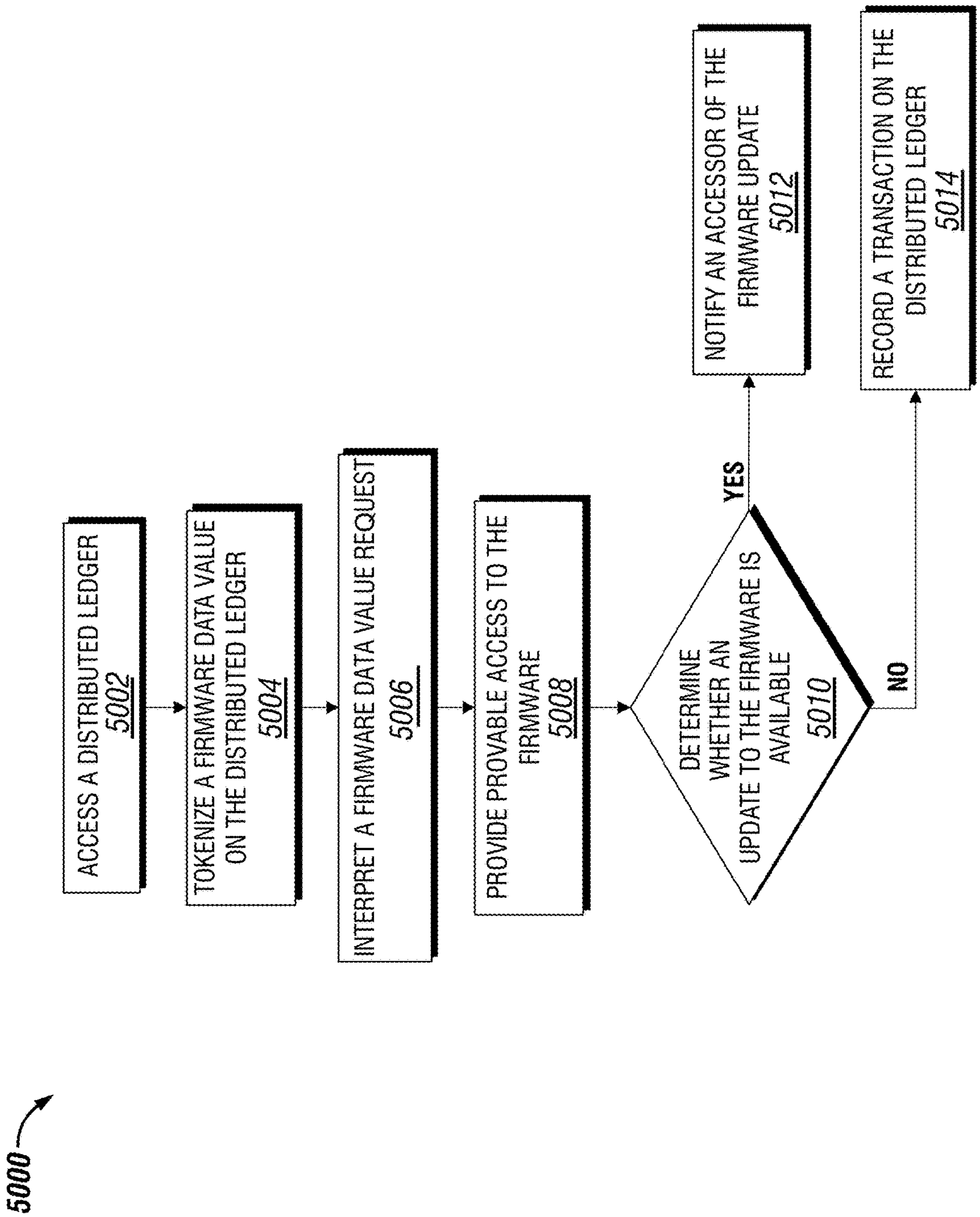
FIG. 50 is a schematic flow diagram of a method for providing verifiable access to firmware.

Referencing FIG. 50, an example procedure 5000 includes an operation 5002 to access a distributed ledger including a firmware data value, an operation 5004 to tokenize the firmware data value on the distributed ledger, an operation 5006 to interpret an access request for the firmware data value, and, in response to the access request, an operation 5008 to provide a provable access to the firmware corresponding to the firmware data value. The example procedure 5000 further includes an operation 5010 to determine whether an update to the firmware is available. In response to the operation 5010 determining "YES", the procedure 5000 includes an operation 5012 to notify an accessor of the firmware update. In response to the operation 5010 determining "NO", and/or following the notification operation 5012, the example procedure 5000 includes an operation 5014 to record a transaction on the distributed ledger. The operation 5014 may be responsive to access, downloading, executing, updating, and/or installing of the firmware and/or a firmware asset.

Figure 51:
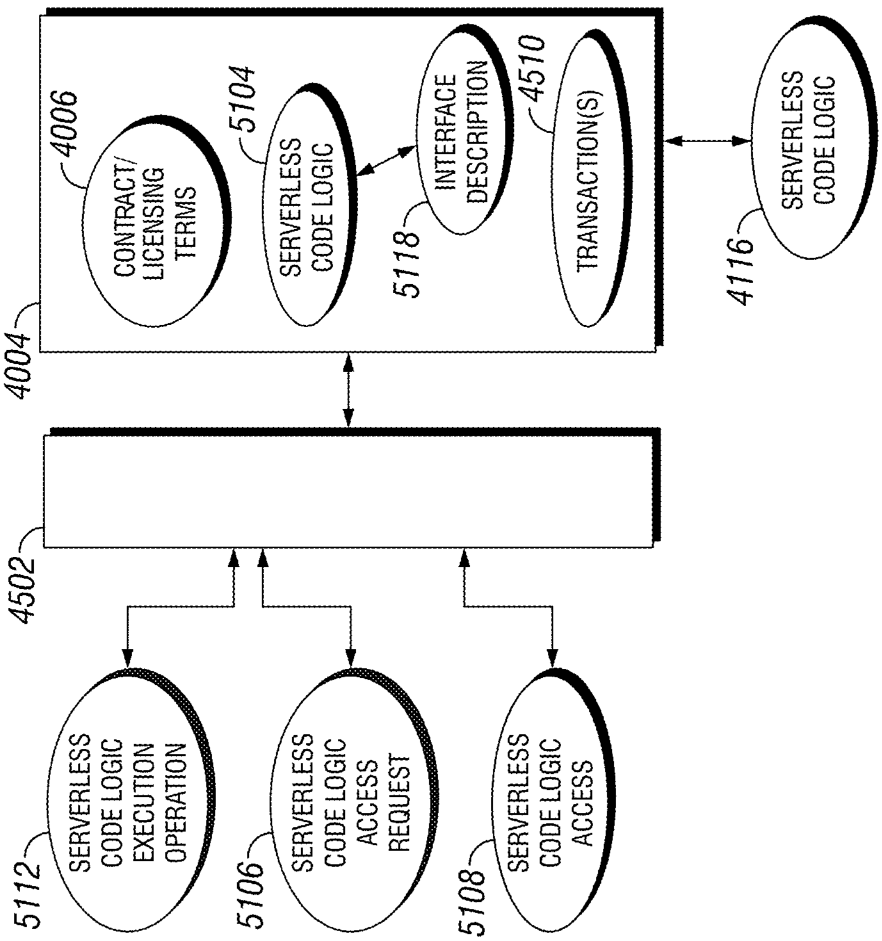
FIG. 51 is a schematic diagram of a system for providing verifiable access to serverless code logic.

Referencing FIG. 51, an example transaction-enabling system 5100 includes a controller 4502, which may be configured to access a distributed ledger 4004 including serverless code logic 5104, to tokenize the serverless code logic, and to interpret an access request 5106 for the serverless code logic. The example controller 4502 is further configured to, in response to the access request 5106, provide a provable access 5108 to the serverless code logic. In certain embodiments, the controller 4502 provides provable access 5108 by recording a value on the distributed ledger 4004, providing a user 4009 with a token demonstrating access, and/or records a transaction 4510 on the distributed ledger 4004 indicating the access. In certain embodiments, the serverless code logic 5104 may include logical descriptions, computer readable and executable code in any form including source code and/or assembly language, and/or a black box executable code embodying the serverless code logic. In certain embodiments, the serverless code logic 5104 further includes, and/or is communicated with, an interface description 5118 (e.g., providing interface parameters; formatting; and/or parameter descriptions including required values, optional values, flags, or enable/disable settings for features, and/or may further include or be communicated with documentation, instructions, or the like for the serverless code logic 5104. In certain embodiments, the interface description 5118 may be provided as an API to the serverless code logic 5104, and/or may be provided to support an API implementation to access the serverless code logic 5104.

An example controller 4502 further interprets an execution operation 5112 of the serverless code logic 5104, and records a transaction 4510 on the distributed ledger 4004 in response to the execution operation 5112. In certain embodiments, interpreting an execution operation 5112 of the serverless code logic includes determining that a user has accessed the serverless code logic 5104, determining that a user, the controller, or another aspect of the transaction-enabling system 5100 has provided execution instructions to a device responsive to the serverless code logic 5104, and/or receiving a confirmation, data value, or other communication indicating that the serverless code logic 5104 has been executed, downloaded, and/or copied. In certain embodiments, one or more serverless code logic elements stored on the distributed ledger 4004 may be at least partially stored in a separate data store 5116, where the distributed ledger 4004 may store references, partial instructions, documentation, interface descriptions 5118, summaries, or the like, and access the separate data store 5116 of serverless code logic elements as needed. In certain embodiments, one or more serverless code logic 5104 elements may be stored on the distributed ledger 4004. In certain embodiments, access to the serverless code logic 5104 elements may be provided in accordance with one or more contract terms 4006, and/or may be provided in response to committing a user or accessing entity to the one or more contract terms 4006.

Figure 52:
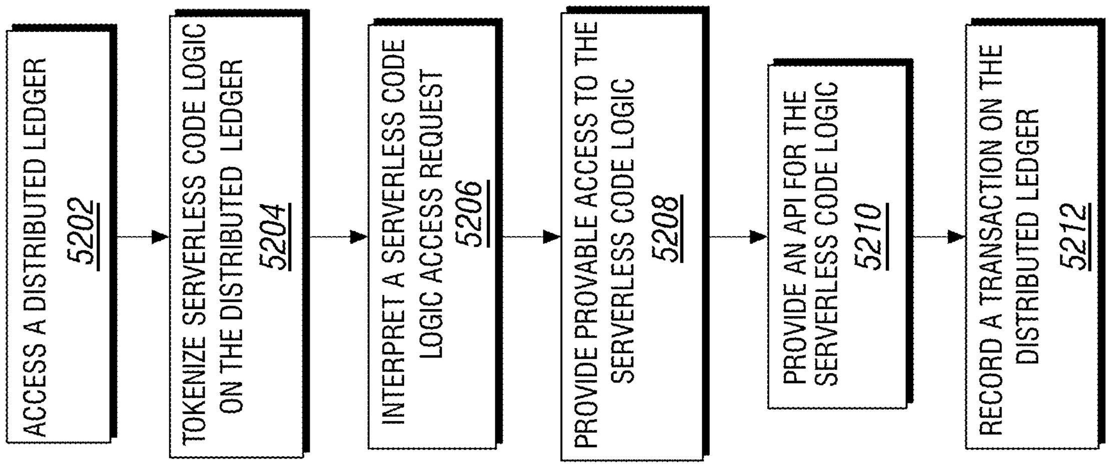
FIG. 52 is a schematic flow diagram of a method for providing verifiable access to serverless code logic.

Referencing FIG. 52, an example procedure 5200 includes an operation 5202 to access a distributed ledger, an operation 5204 to tokenize serverless code logic on the distributed ledger, and an operation 5206 to interpret an access request for the serverless code logic. The example procedure 5200 includes an operation 5208, in response to the access request, to provide a provable access to the serverless code logic. An example procedure 5200 further includes an operation 5210 to provide an API for the serverless code logic, and/or an operation 5212 to record a transaction on the distributed ledger in response to an access operation and/or an execution operation of the serverless code logic.

Figure 53:
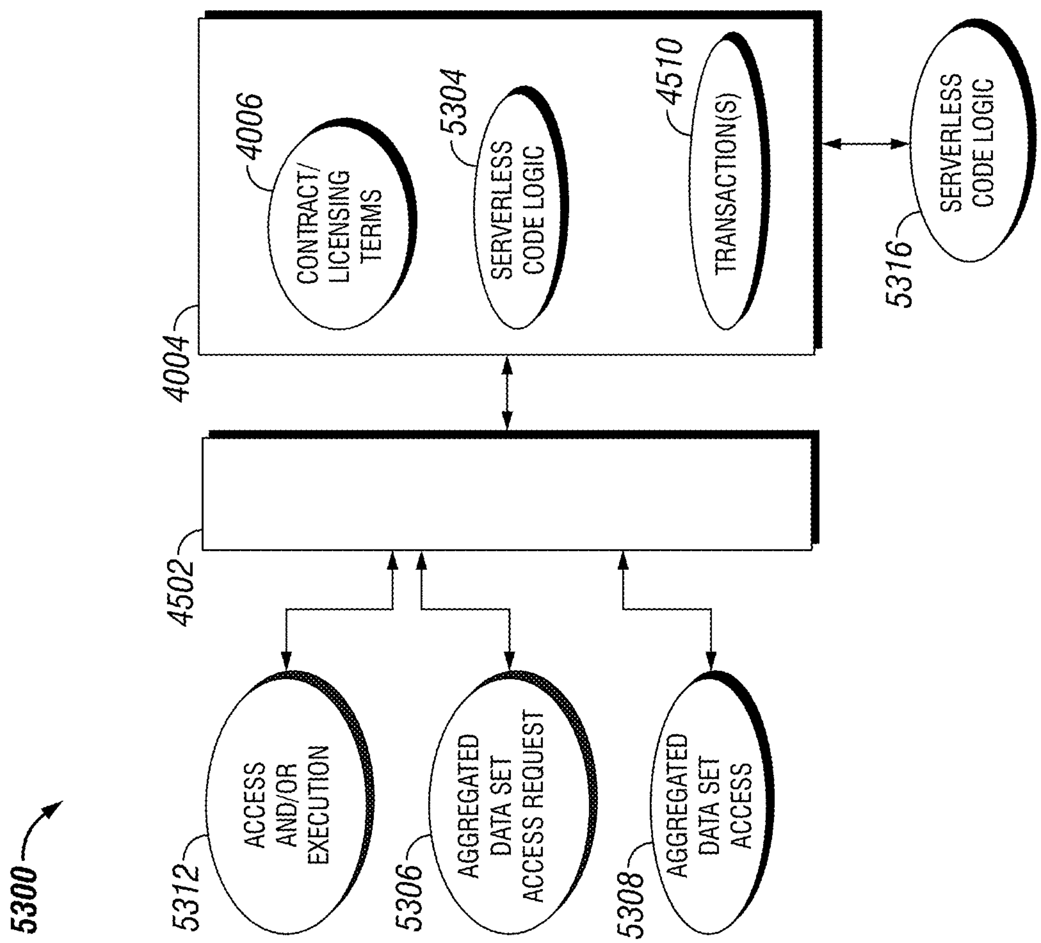
FIG. 53 is a schematic diagram of a system for providing verifiable access to an aggregated data set.

Referencing FIG. 53, an example transaction-enabling system 5300 includes a controller 4502, where the controller 4502 is configured to access a distributed ledger 4004 including an aggregated data set 5304, to interpret an access request 5306 for the aggregated data set, and, in response to the access request 5306, to provide a provable access 5308 to the aggregated data set 5304. In certain embodiments, the provable access 5308 includes which parties have accessed the aggregated data set, how many parties have accessed the aggregated data set 5304, how many times each party has accessed the aggregated data set 5304, and/or which portions of the aggregated data set 5304 have been accessed. The aggregated data set 5304 may be stored fully or partially on the distributed ledger 4004, and/or may reference all or a portion of the aggregated data set 5304 on a separate data store 5316.

In certain embodiments, the distributed ledger 4004 includes a block chain, and in certain further embodiments the aggregated data set 5304 includes a trade secret and/or proprietary information. In certain embodiments, the system 5300 includes an expert wrapper (e.g., operated by controller 4502) for the distributed ledger 4004, where the expert wrapper tokenizes the aggregated data set 5304 and/or validates a trade secret and/or proprietary information of the aggregated data set 5304. In certain embodiments, the distributed ledger 4004 includes a set of instructions (e.g., as part of the aggregated data set 5304, and/or as a separate data store on or in communication with the distributed ledger 4004), and the controller 4502 is further configured to interpret an instruction update value, and to update the set of instructions in response to the access request 5306 and/or the instruction update value. In certain embodiments, the updated set of instructions are updated on the distributed ledger 4004, and/or further updated by pushing the updated instruction set to a user or previous accessor of the instruction set(s). In certain embodiments, the system 5300 further includes a smart wrapper for the distributed ledger (e.g., operated by the controller 4502), where the smart wrapper is configured to allocate a number of sub-sets of instructions to the distributed ledger 4004 as the aggregated data set 5304, and to manage access to the number of sub-sets of instructions in response to the access request 5306. In certain further embodiments, the controller 4502 is further configured to interpret an access 5312 (e.g., by receiving and/or responding to the access request 5306), and to record a transaction 4510 on the distributed ledger 4004 in response to the access. In certain embodiments, the controller 4502 is configured to interpret an execution 5312 of one of the number of sub-sets of instructions (e.g., by determining executable instructions have been accessed, by providing a command to a production tool or industrial component in response to the access request 5306, and/or via any other execution determinations described throughout the present disclosure). In certain further embodiments, the controller 4502 is further configured to record a transaction 4510 on the distributed ledger 4004 in response to the execution 5312 of the one of the number of sub-sets of instructions.

Figure 54:
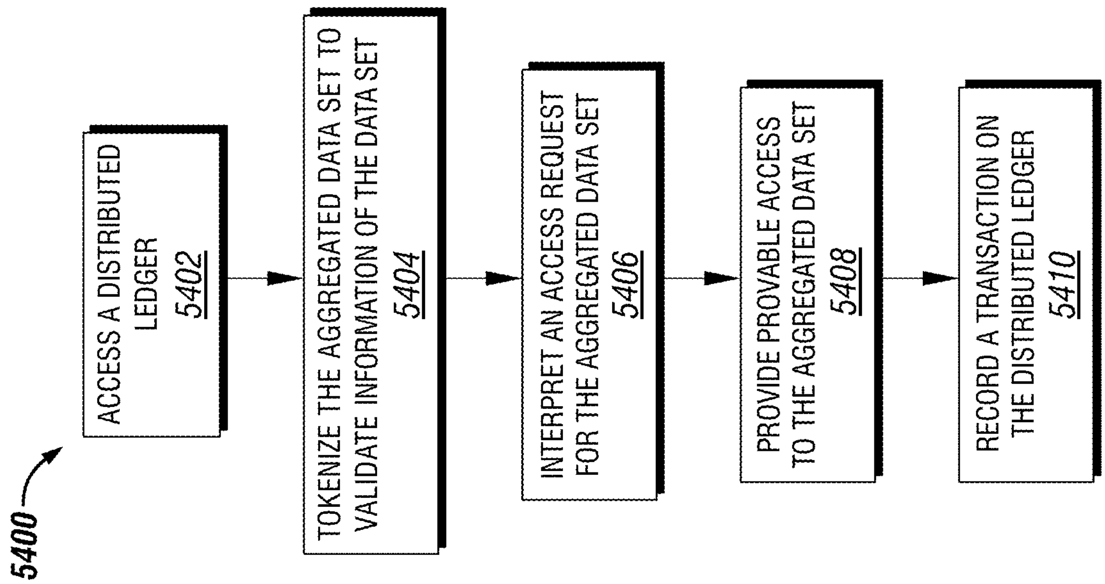
FIG. 54 is a schematic flow diagram of a method for providing verifiable access to an aggregated data set.

Referencing FIG. 54, an example procedure 5400 includes an operation 5402 to access a distributed ledger including an aggregated data set, an operation 5404 to tokenize the aggregated data set to validate information (e.g., trade secret or proprietary information) of the aggregated data set, and an operation 5406 to interpret an access request for the aggregated data set. The example procedure 5400 further includes an operation 5408 to provide provable access to the aggregated data set. In certain embodiments, operation 5408 to provide provable access to the aggregated data set includes determining which parties have accessed the aggregated data set, how many parties have accessed the aggregated data set, how many times specific parties have accessed the aggregated data set, and/or combinations of these with portions of the aggregated data set. In certain embodiments, the aggregated data set may include a number of sub-sets of instructions, and the procedure 5400 may further include interpreting an update to one of the sub-sets of instructions, updating the aggregated data set in response to the update(s), and/or pushing an update to a user and/or a previous accessor of the instructions. In certain embodiments, the procedure 5400 includes operating an expert wrapper to tokenize the aggregated data set and to validate the data of the aggregated data set. In certain embodiments, the procedure 5400 includes operating a smart wrapper to manage access to the aggregated data set. In certain embodiments, the procedure 5400 includes an operation 5410 to record a transaction on the distributed ledger in response to an access of the aggregated data set, an execution operation of at least a portion of the aggregated data set, and/or an update operation related to the aggregated data set.

Figure 55:
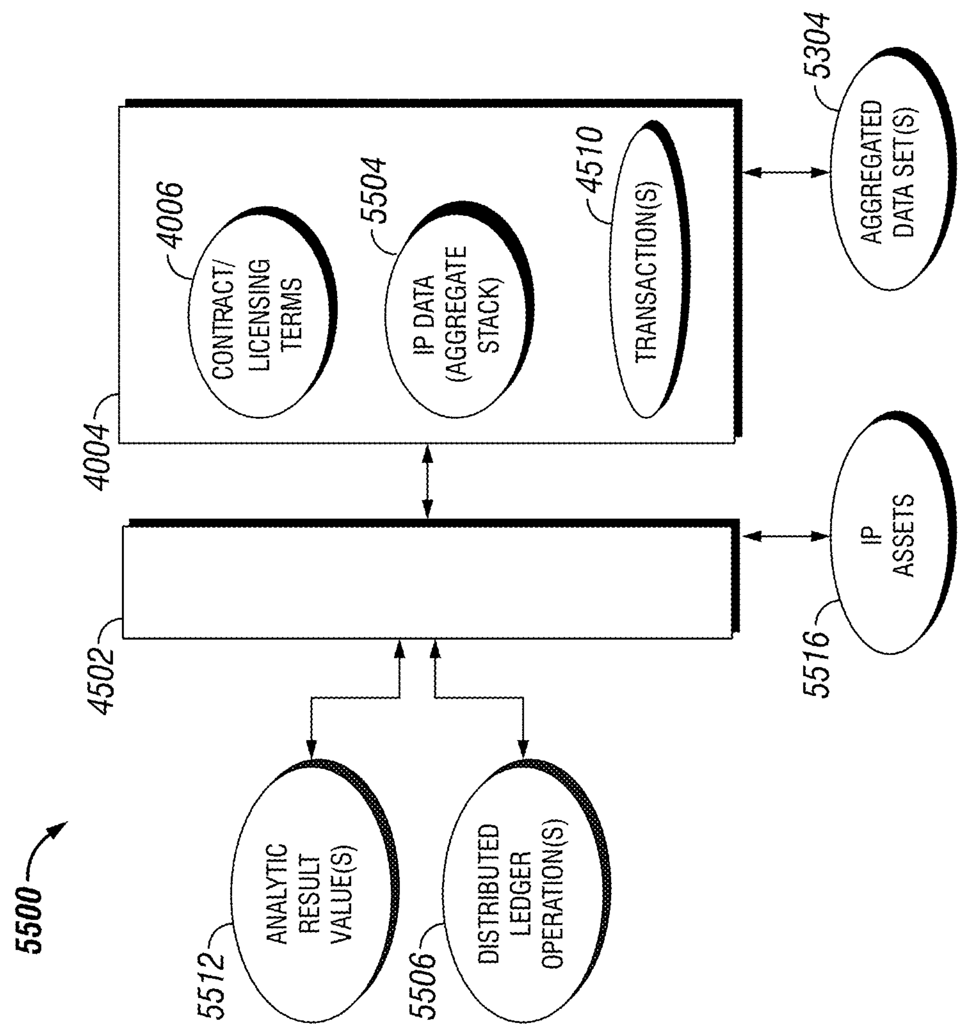
FIG. 55 is a schematic diagram of a system for analyzing and reporting on an aggregate stack of IP.

Referencing FIG. 55, an example transaction-enabling system 5500 includes a controller 4502, where the controller 4502 is configured to access a distributed ledger 4004 including intellectual property (IP) data 5504 corresponding to a number of IP assets 5516, where the number of IP assets include an aggregate stack of IP data 5504. The controller 4502 is further configured to tokenize the IP data, to interpret a distributed ledger operation 5506 corresponding to at least one of the number of IP assets 5516, and to determine an analytic result value 5512 in response to the distributed ledger operation 5506 and the tokenized IP data, and provide a report of the analytic result value 5512. In certain embodiments, the IP assets 5516 are the aggregate stack of IP, and in certain embodiments, the IP data 5504 include a list defining the aggregate stack of IP. In certain embodiments, one or more IP assets 5516 may be stored within the IP data 5504, and/or may be referenced within the IP data 5504 and stored separately (within the distributed ledger 4004 or on an IP asset 5516 data store in communication with the distributed ledger 4004 and/or a wrapper for the distributed ledger 4004).

Example and non-limiting distributed ledger operations 5506 include operations such as: accessing IP data 5504; executing a process utilizing IP data 5504; adding IP data 5504 corresponding to an additional IP asset to the aggregate stack of IP; and/or removing IP data 5504 corresponding from the aggregate stack of IP. In certain further embodiments, distributed ledger operations 5506 include one or more operations such as: changing an owner of an IP asset 5516; installing or executing firmware or executable logic corresponding to IP data 5504; and/or discontinuing access to the IP data.

Example and non-limiting analytic result values 5512 include result values such as: a number of access events corresponding to at least one of the plurality of IP assets 5516; statistical information corresponding to access events for one or more IP assets 5516; a distribution, frequency, or other description of access events for the IP assets 5516; a distribution, frequency, or other description of installation or execution events for the IP assets; access times and/or processing times corresponding to one or more of the IP assets; and/or unique entity access, execution, or installation events for one or more of the IP assets. In certain embodiments, analytic result values 5512 include summaries, statistical analyses (e.g., averages, groupings, determination of outliers, etc.), ordering (e.g., high-to-low volume access rates, revenue values, etc.), timing (e.g., time since a most recent access, installation, execution, or update), bucketing descriptions (e.g., monthly, weekly, by volume or revenue category, etc.) of any of the foregoing, and/or trending descriptions of any of the foregoing.

Figure 56:
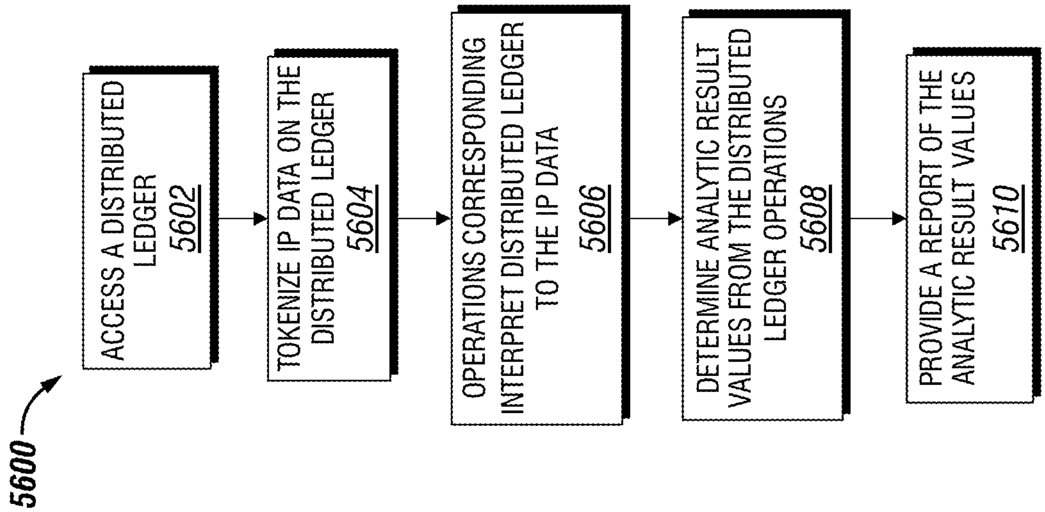
FIG. 56 is a schematic flow diagram of a method for analyzing and reporting on an aggregate stack of IP.

Referencing FIG. 56, an example procedure 5600 includes an operation 5602 to access a distributed ledger including a number of IP data corresponding to a number of IP assets, wherein the number of IP assets include an aggregate stack of IP, an operation 5604 to tokenize the IP data, and an operation 5606 to interpret distributed ledger operation(s) corresponding to at least one of the plurality of IP assets. The example procedure 5600 further includes an operation 5608 to determine an analytic result value in response to the distributed ledger operation(s) and the tokenized IP data, and an operation 5610 to provide a report of the analytic result value. In certain embodiments, the operation 5610 includes providing the report to a user, an entity owning at least one of the IP assets, an entity considering a purchase of access to at least one of the IP assets, an operator or administrator for a controller 4502 (and/or a smart wrapper for the distributed ledger) and/or the distributed ledger, and/or a support professional related to the controller 4502, the distributed ledger, or the IP assets (e.g., an accounting professional, a tax professional, an IT support professional, a server administrator, an IP portfolio manager, a regulatory officer, etc.). The information within the report, the type of report available, and/or the underlying set of distributed ledger operations and/or related IP assets utilized to inform the report may be restricted and/or may default to certain parameters depending upon the target entity for the report and/or the entity requesting the report. In certain embodiments, the procedure 5600 may further include recording a transaction on the distributed ledger in response to the operation 5610 to provide the report—for example to record the instance of the report occurring and/or the related parameters for the report, to provide a provable record that the report was provided, and/or to provide for a transaction and/or payment for the report (e.g., providing additional information to a customer, potential customer, and/or asset owner).

In embodiments, provided herein is a transaction-enabling system having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. Certain further aspects of the example transaction-enabling system are described following, any one or more of which may be present in certain embodiments: the system having a distributed ledger for aggregating intellectual property licensing terms, wherein a smart contract wrapper on the distributed ledger allows an operation on the ledger to add intellectual property to an aggregate stack of intellectual property; and the system having a distributed ledger for aggregating intellectual property licensing terms, wherein a smart contract wrapper on the distributed ledger allows an operation on the ledger to add intellectual property to agree to an apportionment of royalties among the parties in the ledger; and the system having a distributed ledger for aggregating intellectual property licensing terms, wherein a smart contract wrapper on the distributed ledger allows an operation on the ledger to add intellectual property to an aggregate stack of intellectual property; and the system having a distributed ledger for aggregating intellectual property licensing terms, wherein a smart contract wrapper on the distributed ledger allows an operation on the ledger to commit a party to a contract term; and the system having a distributed ledger that tokenizes an instruction set, such that operation on the distributed ledger provides provable access to the instruction set; and the system having a distributed ledger that tokenizes executable algorithmic logic, such that operation on the distributed ledger provides provable access to the executable algorithmic logic; and the system having a distributed ledger that tokenizes a 3D printer instruction set, such that operation on the distributed ledger provides provable access to the instruction set; and the system having a distributed ledger that tokenizes an instruction set for a coating process, such that operation on the distributed ledger provides provable access to the instruction set; and the system having a distributed ledger that tokenizes an instruction set for a semiconductor fabrication process, such that operation on the distributed ledger provides provable access to the fabrication process; and the system having a distributed ledger that tokenizes a firmware program, such that operation on the distributed ledger provides provable access to the firmware program; the system having a distributed ledger that tokenizes an instruction set for an FPGA, such that operation on the distributed ledger provides provable access to the FPGA; the system having a distributed ledger that tokenizes serverless code logic, such that operation on the distributed ledger provides provable access to the serverless code logic; the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to improve and/or optimize the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize and/or improve the execution of a cryptocurrency transaction based on real time energy price information for an available energy source; the system having an expert system that uses machine learning to optimize and/or improve the execution of a cryptocurrency transaction based on an understanding of available energy sources to power computing resources to execute the transaction; the system having an expert system that uses machine learning to optimize and/or improve charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize and/or improve provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; and/or the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property. Certain further aspects of the example transaction-enabling system are described following, any one or more of which may be present in certain embodiments: the system having a distributed ledger for aggregating intellectual property licensing terms, wherein a smart contract wrapper on the distributed ledger allows an operation on the ledger to add intellectual property to agree to an apportionment of royalties among the parties in the ledger; the system having a distributed ledger for aggregating intellectual property licensing terms, wherein a smart contract wrapper on the distributed ledger allows an operation on the ledger to add intellectual property to an aggregate stack of intellectual property; the system having a distributed ledger for aggregating intellectual property licensing terms, wherein a smart contract wrapper on the distributed ledger allows an operation on the ledger to commit a party to a contract term; the system having a distributed ledger that tokenizes an instruction set, such that operation on the distributed ledger provides provable access to the instruction set; the system having a distributed ledger that tokenizes executable algorithmic logic, such that operation on the distributed ledger provides provable access to the executable algorithmic logic; the system having a distributed ledger that tokenizes a 3D printer instruction set, such that operation on the distributed ledger provides provable access to the instruction set; the system having a distributed ledger that tokenizes an instruction set for a coating process, such that operation on the distributed ledger provides provable access to the instruction set; the system having a distributed ledger that tokenizes an instruction set for a semiconductor fabrication process, such that operation on the distributed ledger provides provable access to the fabrication process; the system having a distributed ledger that tokenizes a firmware program, such that operation on the distributed ledger provides provable access to the firmware program; the system having a distributed ledger that tokenizes an instruction set for an FPGA, such that operation on the distributed ledger provides provable access to the FPGA; the system having a distributed ledger that tokenizes serverless code logic, such that operation on the distributed ledger provides provable access to the serverless code logic; the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize and/or improve the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize and/or improve the execution of a cryptocurrency transaction based on real time energy price information for an available energy source; the system having an expert system that uses machine learning to optimize and/or improve the execution of a cryptocurrency transaction based on an understanding of available energy sources to power computing resources to execute the transaction; the system having an expert system that uses machine learning to optimize and/or improve charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources. In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property and having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize and/or improve provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize and/or improve provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize and/or improve requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize and/or improve configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize and/or improve selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; and/or the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger for aggregating intellectual property licensing terms, wherein a smart contract wrapper on the distributed ledger allows an operation on the ledger to add intellectual property to agree to an apportionment of royalties among the parties in the ledger. Certain further aspects of the example transaction-enabling system are described following, any one or more of which may be present in certain embodiments: the system having a distributed ledger for aggregating intellectual property licensing terms, wherein a smart contract wrapper on the distributed ledger allows an operation on the ledger to add intellectual property to an aggregate stack of intellectual property; the system having a distributed ledger for aggregating intellectual property licensing terms, wherein a smart contract wrapper on the distributed ledger allows an operation on the ledger to commit a party to a contract term; the system having a distributed ledger that tokenizes an instruction set, such that operation on the distributed ledger provides provable access to the instruction set; the system having a distributed ledger that tokenizes executable algorithmic logic, such that operation on the distributed ledger provides provable access to the executable algorithmic logic; the system having a distributed ledger that tokenizes a 3D printer instruction set, such that operation on the distributed ledger provides provable access to the instruction set; the system having a distributed ledger that tokenizes an instruction set for a coating process, such that operation on the distributed ledger provides provable access to the instruction set; the system having a distributed ledger that tokenizes an instruction set for a semiconductor fabrication process, such that operation on the distributed ledger provides provable access to the fabrication process; the system having a distributed ledger that tokenizes a firmware program, such that operation on the distributed ledger provides provable access to the firmware program; the system having a distributed ledger that tokenizes an instruction set for an FPGA, such that operation on the distributed ledger provides provable access to the FPGA; the system having a distributed ledger that tokenizes serverless code logic, such that operation on the distributed ledger provides provable access to the serverless code logic; the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize and/or improve the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize and/or improve the execution of a cryptocurrency transaction based on real time energy price information for an available energy source; the system having an expert system that uses machine learning to optimize and/or improve the execution of a cryptocurrency transaction based on an understanding of available energy sources to power computing resources to execute the transaction; the system having an expert system that uses machine learning to optimize and/or improve charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize and/or improve provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize and/or improve provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize and/or improve requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize and/or improve configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize and/or improve selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; and/or the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger for aggregating intellectual property licensing terms, wherein a smart contract wrapper on the distributed ledger allows an operation on the ledger to add intellectual property to an aggregate stack of intellectual property. Certain further aspects of the example transaction-enabling system are described following, any one or more of which may be present in certain embodiments: the system having a distributed ledger for aggregating intellectual property licensing terms, wherein a smart contract wrapper on the distributed ledger allows an operation on the ledger to commit a party to a contract term; the system having a distributed ledger that tokenizes an instruction set, such that operation on the distributed ledger provides provable access to the instruction set; the system having a distributed ledger that tokenizes executable algorithmic logic, such that operation on the distributed ledger provides provable access to the executable algorithmic logic; the system having a distributed ledger that tokenizes a 3D printer instruction set, such that operation on the distributed ledger provides provable access to the instruction set; the system having a distributed ledger that tokenizes an instruction set for a coating process, such that operation on the distributed ledger provides provable access to the instruction set; the system having a distributed ledger that tokenizes an instruction set for a semiconductor fabrication process, such that operation on the distributed ledger provides provable access to the fabrication process; the system having a distributed ledger that tokenizes a firmware program, such that operation on the distributed ledger provides provable access to the firmware program; the system having a distributed ledger that tokenizes an instruction set for an FPGA, such that operation on the distributed ledger provides provable access to the FPGA; the system having a distributed ledger that tokenizes serverless code logic, such that operation on the distributed ledger provides provable access to the serverless code logic; the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize and/or improve the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize and/or improve the execution of a cryptocurrency transaction based on real time energy price information for an available energy source; the system having an expert system that uses machine learning to optimize and/or improve the execution of a cryptocurrency transaction based on an understanding of available energy sources to power computing resources to execute the transaction; the system having an expert system that uses machine learning to optimize and/or improve charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize and/or improve provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize and/or improve provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize and/or improve requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize and/or improve configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize and/or improve selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; and/or the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger for aggregating intellectual property licensing terms, wherein a smart contract wrapper on the distributed ledger allows an operation on the ledger to commit a party to a contract term. In embodiments, provided herein is a transaction-enabling system having a distributed ledger for aggregating intellectual property licensing terms, wherein a smart contract wrapper on the distributed ledger allows an operation on the ledger to commit a party to a contract term and having a distributed ledger that tokenizes an instruction set, such that operation on the distributed ledger provides provable access to the instruction set; the system having a distributed ledger that tokenizes executable algorithmic logic, such that operation on the distributed ledger provides provable access to the executable algorithmic logic; the system having a distributed ledger that tokenizes a 3D printer instruction set, such that operation on the distributed ledger provides provable access to the instruction set; the system having a distributed ledger that tokenizes an instruction set for a coating process, such that operation on the distributed ledger provides provable access to the instruction set; the system having a distributed ledger that tokenizes an instruction set for a semiconductor fabrication process, such that operation on the distributed ledger provides provable access to the fabrication process; the system having a distributed ledger that tokenizes a firmware program, such that operation on the distributed ledger provides provable access to the firmware program; the system having a distributed ledger that tokenizes an instruction set for an FPGA, such that operation on the distributed ledger provides provable access to the FPGA; the system having a distributed ledger that tokenizes serverless code logic, such that operation on the distributed ledger provides provable access to the serverless code logic; the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize and/or improve the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize and/or improve the execution of a cryptocurrency transaction based on real time energy price information for an available energy source; the system having an expert system that uses machine learning to optimize and/or improve the execution of a cryptocurrency transaction based on an understanding of available energy sources to power computing resources to execute the transaction; the system having an expert system that uses machine learning to optimize and/or improve charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize and/or improve provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize and/or improve provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize and/or improve requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize and/or improve configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize and/or improve selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; and/or the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes an instruction set, such that operation on the distributed ledger provides provable access to the instruction set. Certain further aspects of the example transaction-enabling system are described following, any one or more of which may be present in certain embodiments: the system having a distributed ledger that tokenizes executable algorithmic logic, such that operation on the distributed ledger provides provable access to the executable algorithmic logic; the system having a distributed ledger that tokenizes a 3D printer instruction set, such that operation on the distributed ledger provides provable access to the instruction set; the system having a distributed ledger that tokenizes an instruction set for a coating process, such that operation on the distributed ledger provides provable access to the instruction set; the system having a distributed ledger that tokenizes an instruction set for a semiconductor fabrication process, such that operation on the distributed ledger provides provable access to the fabrication process; the system having a distributed ledger that tokenizes a firmware program, such that operation on the distributed ledger provides provable access to the firmware program; the system having a distributed ledger that tokenizes an instruction set for an FPGA, such that operation on the distributed ledger provides provable access to the FPGA; the system having a distributed ledger that tokenizes serverless code logic, such that operation on the distributed ledger provides provable access to the serverless code logic; the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize and/or improve the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize and/or improve the execution of a cryptocurrency transaction based on real time energy price information for an available energy source; the system having an expert system that uses machine learning to optimize and/or improve the execution of a cryptocurrency transaction based on an understanding of available energy sources to power computing resources to execute the transaction; the system having an expert system that uses machine learning to optimize and/or improve charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a distributed ledger that tokenizes an instruction set, such that operation on the distributed ledger provides provable access to the instruction set and having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize and/or improve provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize and/or improve provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize and/or improve requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize and/or improve configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize and/or improve selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; and/or the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes executable algorithmic logic, such that operation on the distributed ledger provides provable access to the executable algorithmic logic. Certain further aspects of the example transaction-enabling system are described following, any one or more of which may be present in certain embodiments: the system having a distributed ledger that tokenizes a 3D printer instruction set, such that operation on the distributed ledger provides provable access to the instruction set; the system having a distributed ledger that tokenizes an instruction set for a coating process, such that operation on the distributed ledger provides provable access to the instruction set; the system having a distributed ledger that tokenizes an instruction set for a semiconductor fabrication process, such that operation on the distributed ledger provides provable access to the fabrication process; the system having a distributed ledger that tokenizes a firmware program, such that operation on the distributed ledger provides provable access to the firmware program; the system having a distributed ledger that tokenizes an instruction set for an FPGA, such that operation on the distributed ledger provides provable access to the FPGA; the system having a distributed ledger that tokenizes serverless code logic, such that operation on the distributed ledger provides provable access to the serverless code logic; the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize and/or improve the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize and/or improve the execution of a cryptocurrency transaction based on real time energy price information for an available energy source; the system having an expert system that uses machine learning to optimize and/or improve the execution of a cryptocurrency transaction based on an understanding of available energy sources to power computing resources to execute the transaction; the system having an expert system that uses machine learning to optimize and/or improve charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize and/or improve provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize and/or improve provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize and/or improve requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize and/or improve configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize and/or improve selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; and/or the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes a 3D printer instruction set, such that operation on the distributed ledger provides provable access to the instruction set. Certain further aspects of the example transaction-enabling system are described following, any one or more of which may be present in certain embodiments: the system having a distributed ledger that tokenizes an instruction set for a coating process, such that operation on the distributed ledger provides provable access to the instruction set; the system having a distributed ledger that tokenizes an instruction set for a semiconductor fabrication process, such that operation on the distributed ledger provides provable access to the fabrication process; the system having a distributed ledger that tokenizes a firmware program, such that operation on the distributed ledger provides provable access to the firmware program; the system having a distributed ledger that tokenizes an instruction set for an FPGA, such that operation on the distributed ledger provides provable access to the FPGA; the system having a distributed ledger that tokenizes serverless code logic, such that operation on the distributed ledger provides provable access to the serverless code logic; the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize the execution of a cryptocurrency transaction based on real time energy price information for an available energy source; the system having an expert system that uses machine learning to optimize the execution of a cryptocurrency transaction based on an understanding of available energy sources to power computing resources to execute the transaction; the system having an expert system that uses machine learning to optimize charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; and/or the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes an instruction set for a coating process, such that operation on the distributed ledger provides provable access to the instruction set. Certain further aspects of the example transaction-enabling system are described following, any one or more of which may be present in certain embodiments: the system having a distributed ledger that tokenizes an instruction set for a semiconductor fabrication process, such that operation on the distributed ledger provides provable access to the fabrication process; the system having a distributed ledger that tokenizes a firmware program, such that operation on the distributed ledger provides provable access to the firmware program; the system having a distributed ledger that tokenizes an instruction set for an FPGA, such that operation on the distributed ledger provides provable access to the FPGA; the system having a distributed ledger that tokenizes serverless code logic, such that operation on the distributed ledger provides provable access to the serverless code logic; the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize the execution of a cryptocurrency transaction based on real time energy price information for an available energy source; the system having an expert system that uses machine learning to optimize the execution of a cryptocurrency transaction based on an understanding of available energy sources to power computing resources to execute the transaction; the system having an expert system that uses machine learning to optimize charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; and/or the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes an instruction set for a semiconductor fabrication process, such that operation on the distributed ledger provides provable access to the fabrication process. Certain further aspects of the example transaction-enabling system are described following, any one or more of which may be present in certain embodiments: the system having a distributed ledger that tokenizes a firmware program, such that operation on the distributed ledger provides provable access to the firmware program; the system having a distributed ledger that tokenizes an instruction set for an FPGA, such that operation on the distributed ledger provides provable access to the FPGA; the system having a distributed ledger that tokenizes serverless code logic, such that operation on the distributed ledger provides provable access to the serverless code logic; the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize the execution of a cryptocurrency transaction based on real time energy price information for an available energy source; the system having an expert system that uses machine learning to optimize the execution of a cryptocurrency transaction based on an understanding of available energy sources to power computing resources to execute the transaction; the system having an expert system that uses machine learning to optimize charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes a firmware program, such that operation on the distributed ledger provides provable access to the firmware program. Certain further aspects of the example transaction-enabling system are described following, any one or more of which may be present in certain embodiments: In embodiments, provided herein is a transaction-enabling system having a distributed ledger that tokenizes a firmware program, such that operation on the distributed ledger provides provable access to the firmware program and having a distributed ledger that tokenizes an instruction set for an FPGA, such that operation on the distributed ledger provides provable access to the FPGA. In embodiments, provided herein is a transaction-enabling system having a distributed ledger that tokenizes a firmware program, such that operation on the distributed ledger provides provable access to the firmware program and having a distributed ledger that tokenizes serverless code logic, such that operation on the distributed ledger provides provable access to the serverless code logic. In embodiments, provided herein is a transaction-enabling system having a distributed ledger that tokenizes a firmware program, such that operation on the distributed ledger provides provable access to the firmware program and having a distributed ledger that tokenizes an instruction set for a crystal fabrication system, such that operation on the distributed ledger provides provable access to the instruction set. In embodiments, provided herein is a transaction-enabling system having a distributed ledger that tokenizes a firmware program, such that operation on the distributed ledger provides provable access to the firmware program and having a distributed ledger that tokenizes an instruction set for a food preparation process, such that operation on the distributed ledger provides provable access to the instruction set. In embodiments, provided herein is a transaction-enabling system having a distributed ledger that tokenizes a firmware program, such that operation on the distributed ledger provides provable access to the firmware program and having a distributed ledger that tokenizes an instruction set for a polymer production process, such that operation on the distributed ledger provides provable access to the instruction set. In embodiments, provided herein is a transaction-enabling system having a distributed ledger that tokenizes a firmware program, such that operation on the distributed ledger provides provable access to the firmware program and having a distributed ledger that tokenizes an instruction set for chemical synthesis process, such that operation on the distributed ledger provides provable access to the instruction set. In embodiments, provided herein is a transaction-enabling system having a distributed ledger that tokenizes a firmware program, such that operation on the distributed ledger provides provable access to the firmware program and having a distributed ledger that tokenizes an instruction set for a biological production process, such that operation on the distributed ledger provides provable access to the instruction set. In embodiments, provided herein is a transaction-enabling system having a distributed ledger that tokenizes a firmware program, such that operation on the distributed ledger provides provable access to the firmware program and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes a firmware program, such that operation on the distributed ledger provides provable access to the firmware program and having a distributed ledger that aggregates views of a trade secret into a chain that proves which and how many parties have viewed the trade secret. In embodiments, provided herein is a transaction-enabling system having a distributed ledger that tokenizes a firmware program, such that operation on the distributed ledger provides provable access to the firmware program and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes a firmware program, such that operation on the distributed ledger provides provable access to the firmware program and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes a firmware program, such that operation on the distributed ledger provides provable access to the firmware program and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes a firmware program, such that operation on the distributed ledger provides provable access to the firmware program and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a distributed ledger that tokenizes a firmware program, such that operation on the distributed ledger provides provable access to the firmware program and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a distributed ledger that tokenizes a firmware program, such that operation on the distributed ledger provides provable access to the firmware program and having a self-executing cryptocurrency coin that commits a transaction upon recognizing a location-based parameter that provides favorable tax treatment. In embodiments, provided herein is a transaction-enabling system having a distributed ledger that tokenizes a firmware program, such that operation on the distributed ledger provides provable access to the firmware program and having an expert system that uses machine learning to optimize the execution of cryptocurrency transactions based on tax status. In embodiments, provided herein is a transaction-enabling system having a distributed ledger that tokenizes a firmware program, such that operation on the distributed ledger provides provable access to the firmware program and having an expert system that aggregates regulatory information covering cryptocurrency transactions and automatically selects a jurisdiction for an operation based on the regulatory information. In embodiments, provided herein is a transaction-enabling system having a distributed ledger that tokenizes a firmware program, such that operation on the distributed ledger provides provable access to the firmware program and having an expert system that uses machine learning to optimize the execution of a cryptocurrency transaction based on real time energy price information for an available energy source. In embodiments, provided herein is a transaction-enabling system having a distributed ledger that tokenizes a firmware program, such that operation on the distributed ledger provides provable access to the firmware program and having an expert system that uses machine learning to optimize the execution of a cryptocurrency transaction based on an understanding of available energy sources to power computing resources to execute the transaction. In embodiments, provided herein is a transaction-enabling system having a distributed ledger that tokenizes a firmware program, such that operation on the distributed ledger provides provable access to the firmware program and having an expert system that uses machine learning to optimize charging and recharging cycle of a rechargeable battery system to provide energy for execution of a cryptocurrency transaction. In embodiments, provided herein is a transaction-enabling system having a distributed ledger that tokenizes a firmware program, such that operation on the distributed ledger provides provable access to the firmware program and having an expert system that predicts a forward market price in a market based on an understanding obtained by analyzing Internet of Things data sources and executes a transaction based on the forward market prediction. In embodiments, provided herein is a transaction-enabling system having a distributed ledger that tokenizes a firmware program, such that operation on the distributed ledger provides provable access to the firmware program and having an expert system that predicts a forward market price in a market based on an understanding obtained by analyzing social network data sources and executes a transaction based on the forward market prediction. In embodiments, provided herein is a transaction-enabling system having a distributed ledger that tokenizes a firmware program, such that operation on the distributed ledger provides provable access to the firmware program and having an expert system that predicts a forward market price in a market based on an understanding obtained by analyzing Internet of Things data sources and executes a cryptocurrency transaction based on the forward market prediction. In embodiments, provided herein is a transaction-enabling system having a distributed ledger that tokenizes a firmware program, such that operation on the distributed ledger provides provable access to the firmware program and having an expert system that predicts a forward market price in a market based on an understanding obtained by analyzing social network data sources and executes a cryptocurrency transaction based on the forward market prediction. In embodiments, provided herein is a transaction-enabling system having a distributed ledger that tokenizes a firmware program, such that operation on the distributed ledger provides provable access to the firmware program and having an expert system that predicts a forward market price in an energy market based on an understanding obtained by analyzing Internet of Things data sources and executes a transaction based on the forward market prediction. In embodiments, provided herein is a transaction-enabling system having a distributed ledger that tokenizes a firmware program, such that operation on the distributed ledger provides provable access to the firmware program and having an expert system that predicts a forward market price in an energy market based on an understanding obtained by analyzing social network data sources and executes a transaction based on the forward market prediction. In embodiments, provided herein is a transaction-enabling system having a distributed ledger that tokenizes a firmware program, such that operation on the distributed ledger provides provable access to the firmware program and having an expert system that predicts a forward market price in a market for computing resources based on an understanding obtained by analyzing Internet of Things data sources and executes a transaction based on the forward market prediction. In embodiments, provided herein is a transaction-enabling system having a distributed ledger that tokenizes a firmware program, such that operation on the distributed ledger provides provable access to the firmware program and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a distributed ledger that tokenizes a firmware program, such that operation on the distributed ledger provides provable access to the firmware program and having an expert system that predicts a forward market price in a market for computing resources based on an understanding obtained by analyzing social network data sources and executes a transaction based on the forward market prediction. In embodiments, provided herein is a transaction-enabling system having a distributed ledger that tokenizes a firmware program, such that operation on the distributed ledger provides provable access to the firmware program and having an expert system that predicts a forward market price in a market for advertising based on an understanding obtained by analyzing Internet of Things data sources and executes a transaction based on the forward market prediction. In embodiments, provided herein is a transaction-enabling system having a distributed ledger that tokenizes a firmware program, such that operation on the distributed ledger provides provable access to the firmware program and having an expert system that predicts a forward market price in a market for advertising based on an understanding obtained by analyzing social network data sources and executes a transaction based on the forward market prediction. In embodiments, provided herein is a transaction-enabling system having a distributed ledger that tokenizes a firmware program, such that operation on the distributed ledger provides provable access to the firmware program and having a machine that automatically forecasts forward market pricing of energy prices based on information collected from automated agent behavioral data sources. In embodiments, provided herein is a transaction-enabling system having a distributed ledger that tokenizes a firmware program, such that operation on the distributed ledger provides provable access to the firmware program and having a machine that automatically forecasts forward market pricing of network spectrum based on information collected from automated agent behavioral data sources. In embodiments, provided herein is a transaction-enabling system having a distributed ledger that tokenizes a firmware program, such that operation on the distributed ledger provides provable access to the firmware program and having a machine that automatically forecasts forward market pricing of energy credits based on information collected from automated agent behavioral data sources. In embodiments, provided herein is a transaction-enabling system having a distributed ledger that tokenizes a firmware program, such that operation on the distributed ledger provides provable access to the firmware program and having a machine that automatically forecasts forward market value of compute capability based on information collected from automated agent behavioral data sources. In embodiments, provided herein is a transaction-enabling system having a distributed ledger that tokenizes a firmware program, such that operation on the distributed ledger provides provable access to the firmware program and having a machine that automatically forecasts forward market pricing of energy prices based on information collected from business entity behavioral data sources. In embodiments, provided herein is a transaction-enabling system having a distributed ledger that tokenizes a firmware program, such that operation on the distributed ledger provides provable access to the firmware program and having a machine that automatically forecasts forward market pricing of network spectrum based on information collected from business entity behavioral data sources. In embodiments, provided herein is a transaction-enabling system having a distributed ledger that tokenizes a firmware program, such that operation on the distributed ledger provides provable access to the firmware program and having a machine that automatically forecasts forward market pricing of energy credits based on information collected from business entity behavioral data sources. In embodiments, provided herein is a transaction-enabling system having a distributed ledger that tokenizes a firmware program, such that operation on the distributed ledger provides provable access to the firmware program and having a machine that automatically forecasts forward market value of compute capability based on information collected from business entity behavioral data sources. In embodiments, provided herein is a transaction-enabling system having a distributed ledger that tokenizes a firmware program, such that operation on the distributed ledger provides provable access to the firmware program and having a machine that automatically forecasts forward market pricing of energy prices based on information collected from human behavioral data sources. In embodiments, provided herein is a transaction-enabling system having a distributed ledger that tokenizes a firmware program, such that operation on the distributed ledger provides provable access to the firmware program and having a machine that automatically forecasts forward market pricing of network spectrum based on information collected from human behavioral data sources. In embodiments, provided herein is a transaction-enabling system having a distributed ledger that tokenizes a firmware program, such that operation on the distributed ledger provides provable access to the firmware program and having a machine that automatically forecasts forward market pricing of energy credits based on information collected from human behavioral data sources. In embodiments, provided herein is a transaction-enabling system having a distributed ledger that tokenizes a firmware program, such that operation on the distributed ledger provides provable access to the firmware program and having a machine that automatically forecasts forward market value of compute capability based on information collected from human behavioral data sources. In embodiments, provided herein is a transaction-enabling system having a distributed ledger that tokenizes a firmware program, such that operation on the distributed ledger provides provable access to the firmware program and having an expert system that predicts a forward market price in a market for spectrum or network bandwidth based on an understanding obtained by analyzing social data sources and executes a transaction based on the forward market prediction. In embodiments, provided herein is a transaction-enabling system having a distributed ledger that tokenizes a firmware program, such that operation on the distributed ledger provides provable access to the firmware program and having an intelligent agent that is configured to solicit the attention resources of another external intelligent agent. In embodiments, provided herein is a transaction-enabling system having a distributed ledger that tokenizes a firmware program, such that operation on the distributed ledger provides provable access to the firmware program and having a machine that automatically purchases attention resources in a forward market for attention. In embodiments, provided herein is a transaction-enabling system having a distributed ledger that tokenizes a firmware program, such that operation on the distributed ledger provides provable access to the firmware program and having a fleet of machines that automatically aggregate purchasing in a forward market for attention. In embodiments, provided herein is a transaction-enabling system having a distributed ledger that tokenizes a firmware program, such that operation on the distributed ledger provides provable access to the firmware program and having a system for learning on a training set of facility outcomes, facility parameters, and data collected from data sources to train an artificial intelligence/machine learning system to predict a likelihood of a facility production outcome. In embodiments, provided herein is a transaction-enabling system having a distributed ledger that tokenizes a firmware program, such that operation on the distributed ledger provides provable access to the firmware program and having a system for learning on a training set of facility outcomes, facility parameters, and data collected from data sources to train an artificial intelligence/machine learning system to predict a facility production outcome. In embodiments, provided herein is a transaction-enabling system having a distributed ledger that tokenizes a firmware program, such that operation on the distributed ledger provides provable access to the firmware program and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a distributed ledger that tokenizes a firmware program, such that operation on the distributed ledger provides provable access to the firmware program and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a distributed ledger that tokenizes a firmware program, such that operation on the distributed ledger provides provable access to the firmware program and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a distributed ledger that tokenizes a firmware program, such that operation on the distributed ledger provides provable access to the firmware program and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a distributed ledger that tokenizes a firmware program, such that operation on the distributed ledger provides provable access to the firmware program and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a distributed ledger that tokenizes a firmware program, such that operation on the distributed ledger provides provable access to the firmware program and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a distributed ledger that tokenizes a firmware program, such that operation on the distributed ledger provides provable access to the firmware program and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a distributed ledger that tokenizes a firmware program, such that operation on the distributed ledger provides provable access to the firmware program and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a distributed ledger that tokenizes a firmware program, such that operation on the distributed ledger provides provable access to the firmware program and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a distributed ledger that tokenizes a firmware program, such that operation on the distributed ledger provides provable access to the firmware program and having an intelligent, flexible energy and compute facility whereby an artificial intelligence/machine learning system configures the facility among a set of available configurations based on a set of detected conditions relating to an output parameter. In embodiments, provided herein is a transaction-enabling system having a distributed ledger that tokenizes a firmware program, such that operation on the distributed ledger provides provable access to the firmware program and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a distributed ledger that tokenizes a firmware program, such that operation on the distributed ledger provides provable access to the firmware program and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes an instruction set for an FPGA, such that operation on the distributed ledger provides provable access to the FPGA. Certain further aspects of the example transaction-enabling system are described following, any one or more of which may be present in certain embodiments: the system having a distributed ledger that tokenizes serverless code logic, such that operation on the distributed ledger provides provable access to the serverless code logic; the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize the execution of a cryptocurrency transaction based on real time energy price information for an available energy source; the system having an expert system that uses machine learning to optimize the execution of a cryptocurrency transaction based on an understanding of available energy sources to power computing resources to execute the transaction; the system having an expert system that uses machine learning to optimize charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; and/or the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes serverless code logic, such that operation on the distributed ledger provides provable access to the serverless code logic. Certain further aspects of the example transaction-enabling system are described following, any one or more of which may be present in certain embodiments: the system having a distributed ledger that tokenizes an instruction set for a crystal fabrication system, such that operation on the distributed ledger provides provable access to the instruction set; the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize the execution of a cryptocurrency transaction based on real time energy price information for an available energy source; the system having an expert system that uses machine learning to optimize the execution of a cryptocurrency transaction based on an understanding of available energy sources to power computing resources to execute the transaction; the system having an expert system that uses machine learning to optimize charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes an instruction set for a crystal fabrication system, such that operation on the distributed ledger provides provable access to the instruction set. Certain further aspects of the example transaction-enabling system are described following, any one or more of which may be present in certain embodiments: the system having a distributed ledger that tokenizes an instruction set for a food preparation process, such that operation on the distributed ledger provides provable access to the instruction set; the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction; execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize the execution of a cryptocurrency transaction based on real time energy price information for an available energy source; the system having an expert system that uses machine learning to optimize the execution of a cryptocurrency transaction based on an understanding of available energy sources to power computing resources to execute the transaction; the system having an expert system that uses machine learning to optimize charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes an instruction set for a food preparation process, such that operation on the distributed ledger provides provable access to the instruction set. Certain further aspects of the example transaction-enabling system are described following, any one or more of which may be present in certain embodiments: the system having a distributed ledger that tokenizes an instruction set for a polymer production process, such that operation on the distributed ledger provides provable access to the instruction set; the system having a distributed ledger that tokenizes an instruction set for chemical synthesis process, such that operation on the distributed ledger provides provable access to the instruction set; the system having a distributed ledger that tokenizes an instruction set for a biological production process, such that operation on the distributed ledger provides provable access to the instruction set; the system having a distributed ledger that tokenizes a trade secret with an expert wrapper, such that operation on the distributed ledger provides provable access to the trade secret and the wrapper provides validation of the trade secret by the expert; the system having a distributed ledger that aggregates views of a trade secret into a chain that proves which and how many parties have viewed the trade secret; the system having a distributed ledger that tokenizes an instruction set, such that operation on the distributed ledger provides provable access to the instruction set and execution of the instruction set on a system results in recording a transaction in the distributed ledger; the system having a distributed ledger that tokenizes an item of intellectual property and a reporting system that reports an analytic result based on the operations performed on the distributed ledger or the intellectual property; the system having a distributed ledger that aggregates a set of instructions, where an operation on the distributed ledger adds at least one instruction to a pre-existing set of instructions to provide a modified set of instructions; the system having a smart wrapper for management of a distributed ledger that aggregates sets of instructions, where the smart wrapper manages allocation of instruction sub-sets to the distributed ledger and access to the instruction sub-sets; the system having a smart wrapper for a cryptocurrency coin that directs execution of a transaction involving the coin to a geographic location based on tax treatment of at least one of the coin and the transaction in the geographic location; the system having a self-executing cryptocurrency coin that commits a transaction upon recognizing a location-based parameter that provides favorable tax treatment; the system having an expert system that uses machine learning to optimize the execution of cryptocurrency transactions based on tax status; the system having an expert system that aggregates regulatory information covering cryptocurrency transactions and automatically selects a jurisdiction for an operation based on the regulatory information; the system having an expert system that uses machine learning to optimize the execution of a cryptocurrency transaction based on real time energy price information for an available energy source; the system having an expert system that uses machine learning to optimize the execution of a cryptocurrency transaction based on an understanding of available energy sources to power computing resources to execute the transaction; the system having an expert system that uses machine learning to optimize charging and recharging cycle of a rechargeable battery system to provide energy for execution of a cryptocurrency transaction; the system having an expert system that predicts a forward market price in a market based on an understanding obtained by analyzing Internet of Things data sources and executes a transaction based on the forward market prediction; the system having an expert system that predicts a forward market price in a market based on an understanding obtained by analyzing social network data sources and executes a transaction based on the forward market prediction; the system having an expert system that predicts a forward market price in a market based on an understanding obtained by analyzing Internet of Things data sources and executes a cryptocurrency transaction based on the forward market prediction; the system having an expert system that predicts a forward market price in a market based on an understanding obtained by analyzing social network data sources and executes a cryptocurrency transaction based on the forward market prediction; the system having an expert system that predicts a forward market price in an energy market based on an understanding obtained by analyzing Internet of Things data sources and executes a transaction based on the forward market prediction; the system having an expert system that predicts a forward market price in an energy market based on an understanding obtained by analyzing social network data sources and executes a transaction based on the forward market prediction; the system having an expert system that predicts a forward market price in a market for computing resources based on an understanding obtained by analyzing Internet of Things data sources and executes a transaction based on the forward market prediction; the system having an expert system that predicts a forward market price in a market for spectrum or network bandwidth based on an understanding obtained by analyzing Internet of Things data sources and executes a transaction based on the forward market prediction; the system having an expert system that predicts a forward market price in a market for computing resources based on an understanding obtained by analyzing social network data sources and executes a transaction based on the forward market prediction; the system having an expert system that predicts a forward market price in a market for advertising based on an understanding obtained by analyzing Internet of Things data sources and executes a transaction based on the forward market prediction; the system having an expert system that predicts a forward market price in a market for advertising based on an understanding obtained by analyzing social network data sources and executes a transaction based on the forward market prediction; the system having a machine that automatically forecasts forward market pricing of energy prices based on information collected from automated agent behavioral data sources; the system having a machine that automatically forecasts forward market pricing of network spectrum based on information collected from automated agent behavioral data sources; the system having a machine that automatically forecasts forward market pricing of energy credits based on information collected from automated agent behavioral data sources; the system having a machine that automatically forecasts forward market value of compute capability based on information collected from automated agent behavioral data sources; the system having a machine that automatically forecasts forward market pricing of energy prices based on information collected from business entity behavioral data sources; the system having a machine that automatically forecasts forward market pricing of network spectrum based on information collected from business entity behavioral data sources; the system having a machine that automatically forecasts forward market pricing of energy credits based on information collected from business entity behavioral data sources; the system having a machine that automatically forecasts forward market value of compute capability based on information collected from business entity behavioral data sources; the system having a machine that automatically forecasts forward market pricing of energy prices based on information collected from human behavioral data sources; the system having a machine that automatically forecasts forward market pricing of network spectrum based on information collected from human behavioral data sources; the system having a machine that automatically forecasts forward market pricing of energy credits based on information collected from human behavioral data sources; the system having a machine that automatically forecasts forward market value of compute capability based on information collected from human behavioral data sources; the system having an expert system that predicts a forward market price in a market for spectrum or network bandwidth based on an understanding obtained by analyzing social data sources and executes a transaction based on the forward market prediction; the system having an intelligent agent that is configured to solicit the attention resources of another external intelligent agent; the system having a machine that automatically purchases attention resources in a forward market for attention; the system having a fleet of machines that automatically aggregate purchasing in a forward market for attention; the system having a system for learning on a training set of facility outcomes, facility parameters, and data collected from data sources to train an artificial intelligence/machine learning system to predict a likelihood of a facility production outcome; the system having a system for learning on a training set of facility outcomes, facility parameters, and data collected from data sources to train an artificial intelligence/machine learning system to predict a facility production outcome; the system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles; the system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs; the system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles; the system having a system for learning on a training set of facility outcomes, facility parameters, and data collected from data sources to train an artificial intelligence/machine learning system to optimize configuration of available energy and compute resources to produce a favorable facility resource configuration profile among a set of available profiles; the system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations; the system having a system for learning on a training set of facility outcomes, facility parameters, and data collected from data sources to train an artificial intelligence/machine learning system to generate an indication that a current or prospective customer should be contacted about an output that can be provided by the facility; the system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility; the system having an intelligent, flexible energy and compute facility whereby an artificial intelligence/machine learning system configures the facility among a set of available configurations based on a set of detected conditions relating to a set of input resources; the system having an intelligent, flexible energy and compute facility whereby an artificial intelligence/machine learning system configures the facility among a set of available configurations based on a set of detected conditions relating to a set of facility resources; the system having an intelligent, flexible energy and compute facility whereby an artificial intelligence/machine learning system configures the facility among a set of available configurations based on a set of detected conditions relating to an output parameter; the system having an intelligent, flexible energy and compute facility whereby an artificial intelligence/machine learning system configures the facility among a set of available configurations based on a set of detected conditions relating to a utilization parameter for the output of the facility; the system having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes an instruction set for a polymer production process, such that operation on the distributed ledger provides provable access to the instruction set. In embodiments, provided herein is a transaction-enabling system having a distributed ledger that tokenizes an instruction set for a polymer production process, such that operation on the distributed ledger provides provable access to the instruction set and having a distributed ledger that tokenizes an instruction set for chemical synthesis process, such that operation on the distributed ledger provides provable access to the instruction set. In embodiments, provided herein is a transaction-enabling system having a distributed ledger that tokenizes an instruction set for a polymer production process, such that operation on the distributed ledger provides provable access to the instruction set and having a distributed ledger that tokenizes an instruction set for a biological production process, such that operation on the distributed ledger provides provable access to the instruction set. In embodiments, provided herein is a transaction-enabling system having a distributed ledger that tokenizes an instruction set for a polymer production process, such that operation on the distributed ledger provides provable access to the instruction set and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set for a polymer production process, such that operation on the distributed ledger provides provable access to the instruction set and having a distributed ledger that aggregates views of a trade secret into a chain that proves which and how many parties have viewed the trade secret. In embodiments, provided herein is a transaction-enabling system having a distributed ledger that tokenizes an instruction set for a polymer production process, such that operation on the distributed ledger provides provable access to the instruction set and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set for a polymer production process, such that operation on the distributed ledger provides provable access to the instruction set and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set for a polymer production process, such that operation on the distributed ledger provides provable access to the instruction set and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set for a polymer production process, such that operation on the distributed ledger provides provable access to the instruction set and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a distributed ledger that tokenizes an instruction set for a polymer production process, such that operation on the distributed ledger provides provable access to the instruction set and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a distributed ledger that tokenizes an instruction set for a polymer production process, such that operation on the distributed ledger provides provable access to the instruction set and having a self-executing cryptocurrency coin that commits a transaction upon recognizing a location-based parameter that provides favorable tax treatment. In embodiments, provided herein is a transaction-enabling system having a distributed ledger that tokenizes an instruction set for a polymer production process, such that operation on the distributed ledger provides provable access to the instruction set and having an expert system that uses machine learning to optimize the execution of cryptocurrency transactions based on tax status. In embodiments, provided herein is a transaction-enabling system having a distributed ledger that tokenizes an instruction set for a polymer production process, such that operation on the distributed ledger provides provable access to the instruction set and having an expert system that aggregates regulatory information covering cryptocurrency transactions and automatically selects a jurisdiction for an operation based on the regulatory information. In embodiments, provided herein is a transaction-enabling system having a distributed ledger that tokenizes an instruction set for a polymer production process, such that operation on the distributed ledger provides provable access to the instruction set and having an expert system that uses machine learning to optimize the execution of a cryptocurrency transaction based on real time energy price information for an available energy source. In embodiments, provided herein is a transaction-enabling system having a distributed ledger that tokenizes an instruction set for a polymer production process, such that operation on the distributed ledger provides provable access to the instruction set and having an expert system that uses machine learning to optimize the execution of a cryptocurrency transaction based on an understanding of available energy sources to power computing resources to execute the transaction. In embodiments, provided herein is a transaction-enabling system having a distributed ledger that tokenizes an instruction set for a polymer production process, such that operation on the distributed ledger provides provable access to the instruction set and having an expert system that uses machine learning to optimize charging and recharging cycle of a rechargeable battery system to provide energy for execution of a cryptocurrency transaction. In embodiments, provided herein is a transaction-enabling system having a distributed ledger that tokenizes an instruction set for a polymer production process, such that operation on the distributed ledger provides provable access to the instruction set and having an expert system that predicts a forward market price in a market based on an understanding obtained by analyzing Internet of Things data sources and executes a transaction based on the forward market prediction. In embodiments, provided herein is a transaction-enabling system having a distributed ledger that tokenizes an instruction set for a polymer production process, such that operation on the distributed ledger provides provable access to the instruction set and having an expert system that predicts a forward market price in a market based on an understanding obtained by analyzing social network data sources and executes a transaction based on the forward market prediction. In embodiments, provided herein is a transaction-enabling system having a distributed ledger that tokenizes an instruction set for a polymer production process, such that operation on the distributed ledger provides provable access to the instruction set and having an expert system that predicts a forward market price in a market based on an understanding obtained by analyzing Internet of Things data sources and executes a cryptocurrency transaction based on the forward market prediction. In embodiments, provided herein is a transaction-enabling system having a distributed ledger that tokenizes an instruction set for a polymer production process, such that operation on the distributed ledger provides provable access to the instruction set and having an expert system that predicts a forward market price in a market based on an understanding obtained by analyzing social network data sources and executes a cryptocurrency transaction based on the forward market prediction. In embodiments, provided herein is a transaction-enabling system having a distributed ledger that tokenizes an instruction set for a polymer production process, such that operation on the distributed ledger provides provable access to the instruction set and having an expert system that predicts a forward market price in an energy market based on an understanding obtained by analyzing Internet of Things data sources and executes a transaction based on the forward market prediction. In embodiments, provided herein is a transaction-enabling system having a distributed ledger that tokenizes an instruction set for a polymer production process, such that operation on the distributed ledger provides provable access to the instruction set and having an expert system that predicts a forward market price in an energy market based on an understanding obtained by analyzing social network data sources and executes a transaction based on the forward market prediction. In embodiments, provided herein is a transaction-enabling system having a distributed ledger that tokenizes an instruction set for a polymer production process, such that operation on the distributed ledger provides provable access to the instruction set and having an expert system that predicts a forward market price in a market for computing resources based on an understanding obtained by analyzing Internet of Things data sources and executes a transaction based on the forward market prediction. In embodiments, provided herein is a transaction-enabling system having a distributed ledger that tokenizes an instruction set for a polymer production process, such that operation on the distributed ledger provides provable access to the instruction set and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a distributed ledger that tokenizes an instruction set for a polymer production process, such that operation on the distributed ledger provides provable access to the instruction set and having an expert system that predicts a forward market price in a market for computing resources based on an understanding obtained by analyzing social network data sources and executes a transaction based on the forward market prediction. In embodiments, provided herein is a transaction-enabling system having a distributed ledger that tokenizes an instruction set for a polymer production process, such that operation on the distributed ledger provides provable access to the instruction set and having an expert system that predicts a forward market price in a market for advertising based on an understanding obtained by analyzing Internet of Things data sources and executes a transaction based on the forward market prediction. In embodiments, provided herein is a transaction-enabling system having a distributed ledger that tokenizes an instruction set for a polymer production process, such that operation on the distributed ledger provides provable access to the instruction set and having an expert system that predicts a forward market price in a market for advertising based on an understanding obtained by analyzing social network data sources and executes a transaction based on the forward market prediction. In embodiments, provided herein is a transaction-enabling system having a distributed ledger that tokenizes an instruction set for a polymer production process, such that operation on the distributed ledger provides provable access to the instruction set and having a machine that automatically forecasts forward market pricing of energy prices based on information collected from automated agent behavioral data sources. In embodiments, provided herein is a transaction-enabling system having a distributed ledger that tokenizes an instruction set for a polymer production process, such that operation on the distributed ledger provides provable access to the instruction set and having a machine that automatically forecasts forward market pricing of network spectrum based on information collected from automated agent behavioral data sources. In embodiments, provided herein is a transaction-enabling system having a distributed ledger that tokenizes an instruction set for a polymer production process, such that operation on the distributed ledger provides provable access to the instruction set and having a machine that automatically forecasts forward market pricing of energy credits based on information collected from automated agent behavioral data sources. In embodiments, provided herein is a transaction-enabling system having a distributed ledger that tokenizes an instruction set for a polymer production process, such that operation on the distributed ledger provides provable access to the instruction set and having a machine that automatically forecasts forward market value of compute capability based on information collected from automated agent behavioral data sources. In embodiments, provided herein is a transaction-enabling system having a distributed ledger that tokenizes an instruction set for a polymer production process, such that operation on the distributed ledger provides provable access to the instruction set and having a machine that automatically forecasts forward market pricing of energy prices based on information collected from business entity behavioral data sources. In embodiments, provided herein is a transaction-enabling system having a distributed ledger that tokenizes an instruction set for a polymer production process, such that operation on the distributed ledger provides provable access to the instruction set and having a machine that automatically forecasts forward market pricing of network spectrum based on information collected from business entity behavioral data sources. In embodiments, provided herein is a transaction-enabling system having a distributed ledger that tokenizes an instruction set for a polymer production process, such that operation on the distributed ledger provides provable access to the instruction set and having a machine that automatically forecasts forward market pricing of energy credits based on information collected from business entity behavioral data sources. In embodiments, provided herein is a transaction-enabling system having a distributed ledger that tokenizes an instruction set for a polymer production process, such that operation on the distributed ledger provides provable access to the instruction set and having a machine that automatically forecasts forward market value of compute capability based on information collected from business entity behavioral data sources. In embodiments, provided herein is a transaction-enabling system having a distributed ledger that tokenizes an instruction set for a polymer production process, such that operation on the distributed ledger provides provable access to the instruction set and having a machine that automatically forecasts forward market pricing of energy prices based on information collected from human behavioral data sources. In embodiments, provided herein is a transaction-enabling system having a distributed ledger that tokenizes an instruction set for a polymer production process, such that operation on the distributed ledger provides provable access to the instruction set and having a machine that automatically forecasts forward market pricing of network spectrum based on information collected from human behavioral data sources. In embodiments, provided herein is a transaction-enabling system having a distributed ledger that tokenizes an instruction set for a polymer production process, such that operation on the distributed ledger provides provable access to the instruction set and having a machine that automatically forecasts forward market pricing of energy credits based on information collected from human behavioral data sources. In embodiments, provided herein is a transaction-enabling system having a distributed ledger that tokenizes an instruction set for a polymer production process, such that operation on the distributed ledger provides provable access to the instruction set and having a machine that automatically forecasts forward market value of compute capability based on information collected from human behavioral data sources. In embodiments, provided herein is a transaction-enabling system having a distributed ledger that tokenizes an instruction set for a polymer production process, such that operation on the distributed ledger provides provable access to the instruction set and having an expert system that predicts a forward market price in a market for spectrum or network bandwidth based on an understanding obtained by analyzing social data sources and executes a transaction based on the forward market prediction. In embodiments, provided herein is a transaction-enabling system having a distributed ledger that tokenizes an instruction set for a polymer production process, such that operation on the distributed ledger provides provable access to the instruction set and having an intelligent agent that is configured to solicit the attention resources of another external intelligent agent. In embodiments, provided herein is a transaction-enabling system having a distributed ledger that tokenizes an instruction set for a polymer production process, such that operation on the distributed ledger provides provable access to the instruction set and having a machine that automatically purchases attention resources in a forward market for attention. In embodiments, provided herein is a transaction-enabling system having a distributed ledger that tokenizes an instruction set for a polymer production process, such that operation on the distributed ledger provides provable access to the instruction set and having a fleet of machines that automatically aggregate purchasing in a forward market for attention. In embodiments, provided herein is a transaction-enabling system having a distributed ledger that tokenizes an instruction set for a polymer production process, such that operation on the distributed ledger provides provable access to the instruction set and having a system for learning on a training set of facility outcomes, facility parameters, and data collected from data sources to train an artificial intelligence/machine learning system to predict a likelihood of a facility production outcome. In embodiments, provided herein is a transaction-enabling system having a distributed ledger that tokenizes an instruction set for a polymer production process, such that operation on the distributed ledger provides provable access to the instruction set and having a system for learning on a training set of facility outcomes, facility parameters, and data collected from data sources to train an artificial intelligence/machine learning system to predict a facility production outcome. In embodiments, provided herein is a transaction-enabling system having a distributed ledger that tokenizes an instruction set for a polymer production process, such that operation on the distributed ledger provides provable access to the instruction set and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a distributed ledger that tokenizes an instruction set for a polymer production process, such that operation on the distributed ledger provides provable access to the instruction set and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a distributed ledger that tokenizes an instruction set for a polymer production process, such that operation on the distributed ledger provides provable access to the instruction set and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a distributed ledger that tokenizes an instruction set for a polymer production process, such that operation on the distributed ledger provides provable access to the instruction set and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a distributed ledger that tokenizes an instruction set for a polymer production process, such that operation on the distributed ledger provides provable access to the instruction set and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a distributed ledger that tokenizes an instruction set for a polymer production process, such that operation on the distributed ledger provides provable access to the instruction set and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a distributed ledger that tokenizes an instruction set for a polymer production process, such that operation on the distributed ledger provides provable access to the instruction set and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a distributed ledger that tokenizes an instruction set for a polymer production process, such that operation on the distributed ledger provides provable access to the instruction set and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a distributed ledger that tokenizes an instruction set for a polymer production process, such that operation on the distributed ledger provides provable access to the instruction set and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a distributed ledger that tokenizes an instruction set for a polymer production process, such that operation on the distributed ledger provides provable access to the instruction set and having an intelligent, flexible energy and compute facility whereby an artificial intelligence/machine learning system configures the facility among a set of available configurations based on a set of detected conditions relating to an output parameter. In embodiments, provided herein is a transaction-enabling system having a distributed ledger that tokenizes an instruction set for a polymer production process, such that operation on the distributed ledger provides provable access to the instruction set and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a distributed ledger that tokenizes an instruction set for a polymer production process, such that operation on the distributed ledger provides provable access to the instruction set and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes an instruction set for chemical synthesis process, such that operation on the distributed ledger provides provable access to the instruction set. In embodiments, provided herein is a transaction-enabling system having a distributed ledger that tokenizes an instruction set for chemical synthesis process, such that operation on the distributed ledger provides provable access to the instruction set and having a distributed ledger that tokenizes an instruction set for a biological production process, such that operation on the distributed ledger provides provable access to the instruction set. In embodiments, provided herein is a transaction-enabling system having a distributed ledger that tokenizes an instruction set for chemical synthesis process, such that operation on the distributed ledger provides provable access to the instruction set and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set for chemical synthesis process, such that operation on the distributed ledger provides provable access to the instruction set and having a distributed ledger that aggregates views of a trade secret into a chain that proves which and how many parties have viewed the trade secret. In embodiments, provided herein is a transaction-enabling system having a distributed ledger that tokenizes an instruction set for chemical synthesis process, such that operation on the distributed ledger provides provable access to the instruction set and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set for chemical synthesis process, such that operation on the distributed ledger provides provable access to the instruction set and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set for chemical synthesis process, such that operation on the distributed ledger provides provable access to the instruction set and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set for chemical synthesis process, such that operation on the distributed ledger provides provable access to the instruction set and having a smart wrapper for management of a distributed ledger that aggregates sets of instructions, where the smart wrapper manages allocation of instruction sub-sets to the distributed ledger and access to the instruction subsets. In embodiments, provided herein is a transaction-enabling system having a distributed ledger that tokenizes an instruction set for chemical synthesis process, such that operation on the distributed ledger provides provable access to the instruction set and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a distributed ledger that tokenizes an instruction set for chemical synthesis process, such that operation on the distributed ledger provides provable access to the instruction set and having a self-executing cryptocurrency coin that commits a transaction upon recognizing a location-based parameter that provides favorable tax treatment. In embodiments, provided herein is a transaction-enabling system having a distributed ledger that tokenizes an instruction set for chemical synthesis process, such that operation on the distributed ledger provides provable access to the instruction set and having an expert system that uses machine learning to optimize the execution of cryptocurrency transactions based on tax status. In embodiments, provided herein is a transaction-enabling system having a distributed ledger that tokenizes an instruction set for chemical synthesis process, such that operation on the distributed ledger provides provable access to the instruction set and having an expert system that aggregates regulatory information covering cryptocurrency transactions and automatically selects a jurisdiction for an operation based on the regulatory information. In embodiments, provided herein is a transaction-enabling system having a distributed ledger that tokenizes an instruction set for chemical synthesis process, such that operation on the distributed ledger provides provable access to the instruction set and having an expert system that uses machine learning to optimize the execution of a cryptocurrency transaction based on real time energy price information for an available energy source. In embodiments, provided herein is a transaction-enabling system having a distributed ledger that tokenizes an instruction set for chemical synthesis process, such that operation on the distributed ledger provides provable access to the instruction set and having an expert system that uses machine learning to optimize the execution of a cryptocurrency transaction based on an understanding of available energy sources to power computing resources to execute the transaction. In embodiments, provided herein is a transaction-enabling system having a distributed ledger that tokenizes an instruction set for chemical synthesis process, such that operation on the distributed ledger provides provable access to the instruction set and having an expert system that uses machine learning to optimize charging and recharging cycle of a rechargeable battery system to provide energy for execution of a cryptocurrency transaction. In embodiments, provided herein is a transaction-enabling system having a distributed ledger that tokenizes an instruction set for chemical synthesis process, such that operation on the distributed ledger provides provable access to the instruction set and having an expert system that predicts a forward market price in a market based on an understanding obtained by analyzing Internet of Things data sources and executes a transaction based on the forward market prediction. In embodiments, provided herein is a transaction-enabling system having a distributed ledger that tokenizes an instruction set for chemical synthesis process, such that operation on the distributed ledger provides provable access to the instruction set and having an expert system that predicts a forward market price in a market based on an understanding obtained by analyzing social network data sources and executes a transaction based on the forward market prediction. In embodiments, provided herein is a transaction-enabling system having a distributed ledger that tokenizes an instruction set for chemical synthesis process, such that operation on the distributed ledger provides provable access to the instruction set and having an expert system that predicts a forward market price in a market based on an understanding obtained by analyzing Internet of Things data sources and executes a cryptocurrency transaction based on the forward market prediction. In embodiments, provided herein is a transaction-enabling system having a distributed ledger that tokenizes an instruction set for chemical synthesis process, such that operation on the distributed ledger provides provable access to the instruction set and having an expert system that predicts a forward market price in a market based on an understanding obtained by analyzing social network data sources and executes a cryptocurrency transaction based on the forward market prediction. In embodiments, provided herein is a transaction-enabling system having a distributed ledger that tokenizes an instruction set for chemical synthesis process, such that operation on the distributed ledger provides provable access to the instruction set and having an expert system that predicts a forward market price in an energy market based on an understanding obtained by analyzing Internet of Things data sources and executes a transaction based on the forward market prediction. In embodiments, provided herein is a transaction-enabling system having a distributed ledger that tokenizes an instruction set for chemical synthesis process, such that operation on the distributed ledger provides provable access to the instruction set and having an expert system that predicts a forward market price in an energy market based on an understanding obtained by analyzing social network data sources and executes a transaction based on the forward market prediction. In embodiments, provided herein is a transaction-enabling system having a distributed ledger that tokenizes an instruction set for chemical synthesis process, such that operation on the distributed ledger provides provable access to the instruction set and having an expert system that predicts a forward market price in a market for computing resources based on an understanding obtained by analyzing Internet of Things data sources and executes a transaction based on the forward market prediction. In embodiments, provided herein is a transaction-enabling system having a distributed ledger that tokenizes an instruction set for chemical synthesis process, such that operation on the distributed ledger provides provable access to the instruction set and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a distributed ledger that tokenizes an instruction set for chemical synthesis process, such that operation on the distributed ledger provides provable access to the instruction set and having an expert system that predicts a forward market price in a market for computing resources based on an understanding obtained by analyzing social network data sources and executes a transaction based on the forward market prediction. In embodiments, provided herein is a transaction-enabling system having a distributed ledger that tokenizes an instruction set for chemical synthesis process, such that operation on the distributed ledger provides provable access to the instruction set and having an expert system that predicts a forward market price in a market for advertising based on an understanding obtained by analyzing Internet of Things data sources and executes a transaction based on the forward market prediction. In embodiments, provided herein is a transaction-enabling system having a distributed ledger that tokenizes an instruction set for chemical synthesis process, such that operation on the distributed ledger provides provable access to the instruction set and having an expert system that predicts a forward market price in a market for advertising based on an understanding obtained by analyzing social network data sources and executes a transaction based on the forward market prediction. In embodiments, provided herein is a transaction-enabling system having a distributed ledger that tokenizes an instruction set for chemical synthesis process, such that operation on the distributed ledger provides provable access to the instruction set and having a machine that automatically forecasts forward market pricing of energy prices based on information collected from automated agent behavioral data sources. In embodiments, provided herein is a transaction-enabling system having a distributed ledger that tokenizes an instruction set for chemical synthesis process, such that operation on the distributed ledger provides provable access to the instruction set and having a machine that automatically forecasts forward market pricing of network spectrum based on information collected from automated agent behavioral data sources. In embodiments, provided herein is a transaction-enabling system having a distributed ledger that tokenizes an instruction set for chemical synthesis process, such that operation on the distributed ledger provides provable access to the instruction set and having a machine that automatically forecasts forward market pricing of energy credits based on information collected from automated agent behavioral data sources. In embodiments, provided herein is a transaction-enabling system having a distributed ledger that tokenizes an instruction set for chemical synthesis process, such that operation on the distributed ledger provides provable access to the instruction set and having a machine that automatically forecasts forward market value of compute capability based on information collected from automated agent behavioral data sources. In embodiments, provided herein is a transaction-enabling system having a distributed ledger that tokenizes an instruction set for chemical synthesis process, such that operation on the distributed ledger provides provable access to the instruction set and having a machine that automatically forecasts forward market pricing of energy prices based on information collected from business entity behavioral data sources. In embodiments, provided herein is a transaction-enabling system having a distributed ledger that tokenizes an instruction set for chemical synthesis process, such that operation on the distributed ledger provides provable access to the instruction set and having a machine that automatically forecasts forward market pricing of network spectrum based on information collected from business entity behavioral data sources. In embodiments, provided herein is a transaction-enabling system having a distributed ledger that tokenizes an instruction set for chemical synthesis process, such that operation on the distributed ledger provides provable access to the instruction set and having a machine that automatically forecasts forward market pricing of energy credits based on information collected from business entity behavioral data sources. In embodiments, provided herein is a transaction-enabling system having a distributed ledger that tokenizes an instruction set for chemical synthesis process, such that operation on the distributed ledger provides provable access to the instruction set and having a machine that automatically forecasts forward market value of compute capability based on information collected from business entity behavioral data sources.

In embodiments, provided herein is a transaction-enabling system having a distributed ledger that tokenizes an instruction set for chemical synthesis process, such that operation on the distributed ledger provides provable access to the instruction set and having a machine that automatically forecasts forward market pricing of energy prices based on information collected from human behavioral data sources. In embodiments, provided herein is a transaction-enabling system having a distributed ledger that tokenizes an instruction set for chemical synthesis process, such that operation on the distributed ledger provides provable access to the instruction set and having a machine that automatically forecasts forward market pricing of network spectrum based on information collected from human behavioral data sources. In embodiments, provided herein is a transaction-enabling system having a distributed ledger that tokenizes an instruction set for chemical synthesis process, such that operation on the distributed ledger provides provable access to the instruction set and having a machine that automatically forecasts forward market pricing of energy credits based on information collected from human behavioral data sources. In embodiments, provided herein is a transaction-enabling system having a distributed ledger that tokenizes an instruction set for chemical synthesis process, such that operation on the distributed ledger provides provable access to the instruction set and having a machine that automatically forecasts forward market value of compute capability based on information collected from human behavioral data sources. In embodiments, provided herein is a transaction-enabling system having a distributed ledger that tokenizes an instruction set for chemical synthesis process, such that operation on the distributed ledger provides provable access to the instruction set and having an expert system that predicts a forward market price in a market for spectrum or network bandwidth based on an understanding obtained by analyzing social data sources and executes a transaction based on the forward market prediction. In embodiments, provided herein is a transaction-enabling system having a distributed ledger that tokenizes an instruction set for chemical synthesis process, such that operation on the distributed ledger provides provable access to the instruction set and having an intelligent agent that is configured to solicit the attention resources of another external intelligent agent. In embodiments, provided herein is a transaction-enabling system having a distributed ledger that tokenizes an instruction set for chemical synthesis process, such that operation on the distributed ledger provides provable access to the instruction set and having a machine that automatically purchases attention resources in a forward market for attention. In embodiments, provided herein is a transaction-enabling system having a distributed ledger that tokenizes an instruction set for chemical synthesis process, such that operation on the distributed ledger provides provable access to the instruction set and having a fleet of machines that automatically aggregate purchasing in a forward market for attention. In embodiments, provided herein is a transaction-enabling system having a distributed ledger that tokenizes an instruction set for chemical synthesis process, such that operation on the distributed ledger provides provable access to the instruction set and having a system for learning on a training set of facility outcomes, facility parameters, and data collected from data sources to train an artificial intelligence/machine learning system to predict a likelihood of a facility production outcome. In embodiments, provided herein is a transaction-enabling system having a distributed ledger that tokenizes an instruction set for chemical synthesis process, such that operation on the distributed ledger provides provable access to the instruction set and having a system for learning on a training set of facility outcomes, facility parameters, and data collected from data sources to train an artificial intelligence/machine learning system to predict a facility production outcome. In embodiments, provided herein is a transaction-enabling system having a distributed ledger that tokenizes an instruction set for chemical synthesis process, such that operation on the distributed ledger provides provable access to the instruction set and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a distributed ledger that tokenizes an instruction set for chemical synthesis process, such that operation on the distributed ledger provides provable access to the instruction set and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a distributed ledger that tokenizes an instruction set for chemical synthesis process, such that operation on the distributed ledger provides provable access to the instruction set and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a distributed ledger that tokenizes an instruction set for chemical synthesis process, such that operation on the distributed ledger provides provable access to the instruction set and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a distributed ledger that tokenizes an instruction set for chemical synthesis process, such that operation on the distributed ledger provides provable access to the instruction set and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a distributed ledger that tokenizes an instruction set for chemical synthesis process, such that operation on the distributed ledger provides provable access to the instruction set and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a distributed ledger that tokenizes an instruction set for chemical synthesis process, such that operation on the distributed ledger provides provable access to the instruction set and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a distributed ledger that tokenizes an instruction set for chemical synthesis process, such that operation on the distributed ledger provides provable access to the instruction set and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a distributed ledger that tokenizes an instruction set for chemical synthesis process, such that operation on the distributed ledger provides provable access to the instruction set and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a distributed ledger that tokenizes an instruction set for chemical synthesis process, such that operation on the distributed ledger provides provable access to the instruction set and having an intelligent, flexible energy and compute facility whereby an artificial intelligence/machine learning system configures the facility among a set of available configurations based on a set of detected conditions relating to an output parameter. In embodiments, provided herein is a transaction-enabling system having a distributed ledger that tokenizes an instruction set for chemical synthesis process, such that operation on the distributed ledger provides provable access to the instruction set and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a distributed ledger that tokenizes an instruction set for chemical synthesis process, such that operation on the distributed ledger provides provable access to the instruction set and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes an instruction set for a biological production process, such that operation on the distributed ledger provides provable access to the instruction set. In embodiments, provided herein is a transaction-enabling system having a distributed ledger that tokenizes an instruction set for a biological production process, such that operation on the distributed ledger provides provable access to the instruction set and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes an instruction set for a biological production process, such that operation on the distributed ledger provides provable access to the instruction set and having a distributed ledger that aggregates views of a trade secret into a chain that proves which and how many parties have viewed the trade secret. In embodiments, provided herein is a transaction-enabling system having a distributed ledger that tokenizes an instruction set for a biological production process, such that operation on the distributed ledger provides provable access to the instruction set and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set for a biological production process, such that operation on the distributed ledger provides provable access to the instruction set and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set for a biological production process, such that operation on the distributed ledger provides provable access to the instruction set and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set for a biological production process, such that operation on the distributed ledger provides provable access to the instruction set and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a distributed ledger that tokenizes an instruction set for a biological production process, such that operation on the distributed ledger provides provable access to the instruction set and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a distributed ledger that tokenizes an instruction set for a biological production process, such that operation on the distributed ledger provides provable access to the instruction set and having a self-executing cryptocurrency coin that commits a transaction upon recognizing a location-based parameter that provides favorable tax treatment. In embodiments, provided herein is a transaction-enabling system having a distributed ledger that tokenizes an instruction set for a biological production process, such that operation on the distributed ledger provides provable access to the instruction set and having an expert system that uses machine learning to optimize the execution of cryptocurrency transactions based on tax status. In embodiments, provided herein is a transaction-enabling system having a distributed ledger that tokenizes an instruction set for a biological production process, such that operation on the distributed ledger provides provable access to the instruction set and having an expert system that aggregates regulatory information covering cryptocurrency transactions and automatically selects a jurisdiction for an operation based on the regulatory information. In embodiments, provided herein is a transaction-enabling system having a distributed ledger that tokenizes an instruction set for a biological production process, such that operation on the distributed ledger provides provable access to the instruction set and having an expert system that uses machine learning to optimize the execution of a cryptocurrency transaction based on real time energy price information for an available energy source. In embodiments, provided herein is a transaction-enabling system having a distributed ledger that tokenizes an instruction set for a biological production process, such that operation on the distributed ledger provides provable access to the instruction set and having an expert system that uses machine learning to optimize the execution of a cryptocurrency transaction based on an understanding of available energy sources to power computing resources to execute the transaction. In embodiments, provided herein is a transaction-enabling system having a distributed ledger that tokenizes an instruction set for a biological production process, such that operation on the distributed ledger provides provable access to the instruction set and having an expert system that uses machine learning to optimize charging and recharging cycle of a rechargeable battery system to provide energy for execution of a cryptocurrency transaction. In embodiments, provided herein is a transaction-enabling system having a distributed ledger that tokenizes an instruction set for a biological production process, such that operation on the distributed ledger provides provable access to the instruction set and having an expert system that predicts a forward market price in a market based on an understanding obtained by analyzing Internet of Things data sources and executes a transaction based on the forward market prediction. In embodiments, provided herein is a transaction-enabling system having a distributed ledger that tokenizes an instruction set for a biological production process, such that operation on the distributed ledger provides provable access to the instruction set and having an expert system that predicts a forward market price in a market based on an understanding obtained by analyzing social network data sources and executes a transaction based on the forward market prediction. In embodiments, provided herein is a transaction-enabling system having a distributed ledger that tokenizes an instruction set for a biological production process, such that operation on the distributed ledger provides provable access to the instruction set and having an expert system that predicts a forward market price in a market based on an understanding obtained by analyzing Internet of Things data sources and executes a cryptocurrency transaction based on the forward market prediction. In embodiments, provided herein is a transaction-enabling system having a distributed ledger that tokenizes an instruction set for a biological production process, such that operation on the distributed ledger provides provable access to the instruction set and having an expert system that predicts a forward market price in a market based on an understanding obtained by analyzing social network data sources and executes a cryptocurrency transaction based on the forward market prediction. In embodiments, provided herein is a transaction-enabling system having a distributed ledger that tokenizes an instruction set for a biological production process, such that operation on the distributed ledger provides provable access to the instruction set and having an expert system that predicts a forward market price in an energy market based on an understanding obtained by analyzing Internet of Things data sources and executes a transaction based on the forward market prediction. In embodiments, provided herein is a transaction-enabling system having a distributed ledger that tokenizes an instruction set for a biological production process, such that operation on the distributed ledger provides provable access to the instruction set and having an expert system that predicts a forward market price in an energy market based on an understanding obtained by analyzing social network data sources and executes a transaction based on the forward market prediction. In embodiments, provided herein is a transaction-enabling system having a distributed ledger that tokenizes an instruction set for a biological production process, such that operation on the distributed ledger provides provable access to the instruction set and having an expert system that predicts a forward market price in a market for computing resources based on an understanding obtained by analyzing Internet of Things data sources and executes a transaction based on the forward market prediction. In embodiments, provided herein is a transaction-enabling system having a distributed ledger that tokenizes an instruction set for a biological production process, such that operation on the distributed ledger provides provable access to the instruction set and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a distributed ledger that tokenizes an instruction set for a biological production process, such that operation on the distributed ledger provides provable access to the instruction set and having an expert system that predicts a forward market price in a market for computing resources based on an understanding obtained by analyzing social network data sources and executes a transaction based on the forward market prediction. In embodiments, provided herein is a transaction-enabling system having a distributed ledger that tokenizes an instruction set for a biological production process, such that operation on the distributed ledger provides provable access to the instruction set and having an expert system that predicts a forward market price in a market for advertising based on an understanding obtained by analyzing Internet of Things data sources and executes a transaction based on the forward market prediction. In embodiments, provided herein is a transaction-enabling system having a distributed ledger that tokenizes an instruction set for a biological production process, such that operation on the distributed ledger provides provable access to the instruction set and having an expert system that predicts a forward market price in a market for advertising based on an understanding obtained by analyzing social network data sources and executes a transaction based on the forward market prediction. In embodiments, provided herein is a transaction-enabling system having a distributed ledger that tokenizes an instruction set for a biological production process, such that operation on the distributed ledger provides provable access to the instruction set and having a machine that automatically forecasts forward market pricing of energy prices based on information collected from automated agent behavioral data sources. In embodiments, provided herein is a transaction-enabling system having a distributed ledger that tokenizes an instruction set for a biological production process, such that operation on the distributed ledger provides provable access to the instruction set and having a machine that automatically forecasts forward market pricing of network spectrum based on information collected from automated agent behavioral data sources. In embodiments, provided herein is a transaction-enabling system having a distributed ledger that tokenizes an instruction set for a biological production process, such that operation on the distributed ledger provides provable access to the instruction set and having a machine that automatically forecasts forward market pricing of energy credits based on information collected from automated agent behavioral data sources. In embodiments, provided herein is a transaction-enabling system having a distributed ledger that tokenizes an instruction set for a biological production process, such that operation on the distributed ledger provides provable access to the instruction set and having a machine that automatically forecasts forward market value of compute capability based on information collected from automated agent behavioral data sources. In embodiments, provided herein is a transaction-enabling system having a distributed ledger that tokenizes an instruction set for a biological production process, such that operation on the distributed ledger provides provable access to the instruction set and having a machine that automatically forecasts forward market pricing of energy prices based on information collected from business entity behavioral data sources. In embodiments, provided herein is a transaction-enabling system having a distributed ledger that tokenizes an instruction set for a biological production process, such that operation on the distributed ledger provides provable access to the instruction set and having a machine that automatically forecasts forward market pricing of network spectrum based on information collected from business entity behavioral data sources. In embodiments, provided herein is a transaction-enabling system having a distributed ledger that tokenizes an instruction set for a biological production process, such that operation on the distributed ledger provides provable access to the instruction set and having a machine that automatically forecasts forward market pricing of energy credits based on information collected from business entity behavioral data sources. In embodiments, provided herein is a transaction-enabling system having a distributed ledger that tokenizes an instruction set for a biological production process, such that operation on the distributed ledger provides provable access to the instruction set and having a machine that automatically forecasts forward market value of compute capability based on information collected from business entity behavioral data sources. In embodiments, provided herein is a transaction-enabling system having a distributed ledger that tokenizes an instruction set for a biological production process, such that operation on the distributed ledger provides provable access to the instruction set and having a machine that automatically forecasts forward market pricing of energy prices based on information collected from human behavioral data sources. In embodiments, provided herein is a transaction-enabling system having a distributed ledger that tokenizes an instruction set for a biological production process, such that operation on the distributed ledger provides provable access to the instruction set and having a machine that automatically forecasts forward market pricing of network spectrum based on information collected from human behavioral data sources. In embodiments, provided herein is a transaction-enabling system having a distributed ledger that tokenizes an instruction set for a biological production process, such that operation on the distributed ledger provides provable access to the instruction set and having a machine that automatically forecasts forward market pricing of energy credits based on information collected from human behavioral data sources. In embodiments, provided herein is a transaction-enabling system having a distributed ledger that tokenizes an instruction set for a biological production process, such that operation on the distributed ledger provides provable access to the instruction set and having a machine that automatically forecasts forward market value of compute capability based on information collected from human behavioral data sources. In embodiments, provided herein is a transaction-enabling system having a distributed ledger that tokenizes an instruction set for a biological production process, such that operation on the distributed ledger provides provable access to the instruction set and having an expert system that predicts a forward market price in a market for spectrum or network bandwidth based on an understanding obtained by analyzing social data sources and executes a transaction based on the forward market prediction. In embodiments, provided herein is a transaction-enabling system having a distributed ledger that tokenizes an instruction set for a biological production process, such that operation on the distributed ledger provides provable access to the instruction set and having an intelligent agent that is configured to solicit the attention resources of another external intelligent agent. In embodiments, provided herein is a transaction-enabling system having a distributed ledger that tokenizes an instruction set for a biological production process, such that operation on the distributed ledger provides provable access to the instruction set and having a machine that automatically purchases attention resources in a forward market for attention. In embodiments, provided herein is a transaction-enabling system having a distributed ledger that tokenizes an instruction set for a biological production process, such that operation on the distributed ledger provides provable access to the instruction set and having a fleet of machines that automatically aggregate purchasing in a forward market for attention. In embodiments, provided herein is a transaction-enabling system having a distributed ledger that tokenizes an instruction set for a biological production process, such that operation on the distributed ledger provides provable access to the instruction set and having a system for learning on a training set of facility outcomes, facility parameters, and data collected from data sources to train an artificial intelligence/machine learning system to predict a likelihood of a facility production outcome. In embodiments, provided herein is a transaction-enabling system having a distributed ledger that tokenizes an instruction set for a biological production process, such that operation on the distributed ledger provides provable access to the instruction set and having a system for learning on a training set of facility outcomes, facility parameters, and data collected from data sources to train an artificial intelligence/machine learning system to predict a facility production outcome. In embodiments, provided herein is a transaction-enabling system having a distributed ledger that tokenizes an instruction set for a biological production process, such that operation on the distributed ledger provides provable access to the instruction set and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a distributed ledger that tokenizes an instruction set for a biological production process, such that operation on the distributed ledger provides provable access to the instruction set and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a distributed ledger that tokenizes an instruction set for a biological production process, such that operation on the distributed ledger provides provable access to the instruction set and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a distributed ledger that tokenizes an instruction set for a biological production process, such that operation on the distributed ledger provides provable access to the instruction set and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a distributed ledger that tokenizes an instruction set for a biological production process, such that operation on the distributed ledger provides provable access to the instruction set and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a distributed ledger that tokenizes an instruction set for a biological production process, such that operation on the distributed ledger provides provable access to the instruction set and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a distributed ledger that tokenizes an instruction set for a biological production process, such that operation on the distributed ledger provides provable access to the instruction set and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a distributed ledger that tokenizes an instruction set for a biological production process, such that operation on the distributed ledger provides provable access to the instruction set and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a distributed ledger that tokenizes an instruction set for a biological production process, such that operation on the distributed ledger provides provable access to the instruction set and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a distributed ledger that tokenizes an instruction set for a biological production process, such that operation on the distributed ledger provides provable access to the instruction set and having an intelligent, flexible energy and compute facility whereby an artificial intelligence/machine learning system configures the facility among a set of available configurations based on a set of detected conditions relating to an output parameter. In embodiments, provided herein is a transaction-enabling system having a distributed ledger that tokenizes an instruction set for a biological production process, such that operation on the distributed ledger provides provable access to the instruction set and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a distributed ledger that tokenizes an instruction set for a biological production process, such that operation on the distributed ledger provides provable access to the instruction set and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a distributed ledger that aggregates views of a trade secret into a chain that proves which and how many parties have viewed the trade secret. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a self-executing cryptocurrency coin that commits a transaction upon recognizing a location-based parameter that provides favorable tax treatment. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that uses machine learning to optimize the execution of cryptocurrency transactions based on tax status. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that aggregates regulatory information covering cryptocurrency transactions and automatically selects a jurisdiction for an operation based on the regulatory information. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that uses machine learning to optimize the execution of a cryptocurrency transaction based on real time energy price information for an available energy source. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that uses machine learning to optimize the execution of a cryptocurrency transaction based on an understanding of available energy sources to power computing resources to execute the transaction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that uses machine learning to optimize charging and recharging cycle of a rechargeable battery system to provide energy for execution of a cryptocurrency transaction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in a market based on an understanding obtained by analyzing Internet of Things data sources and executes a transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in a market based on an understanding obtained by analyzing social network data sources and executes a transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in a market based on an understanding obtained by analyzing Internet of Things data sources and executes a cryptocurrency transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in a market based on an understanding obtained by analyzing social network data sources and executes a cryptocurrency transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in an energy market based on an understanding obtained by analyzing Internet of Things data sources and executes a transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in an energy market based on an understanding obtained by analyzing social network data sources and executes a transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in a market for computing resources based on an understanding obtained by analyzing Internet of Things data sources and executes a transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in a market for computing resources based on an understanding obtained by analyzing social network data sources and executes a transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in a market for advertising based on an understanding obtained by analyzing Internet of Things data sources and executes a transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in a market for advertising based on an understanding obtained by analyzing social network data sources and executes a transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market pricing of energy prices based on information collected from automated agent behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market pricing of network spectrum based on information collected from automated agent behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market pricing of energy credits based on information collected from automated agent behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market value of compute capability based on information collected from automated agent behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market pricing of energy prices based on information collected from business entity behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market pricing of network spectrum based on information collected from business entity behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market pricing of energy credits based on information collected from business entity behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market value of compute capability based on information collected from business entity behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market pricing of energy prices based on information collected from human behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market pricing of network spectrum based on information collected from human behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market pricing of energy credits based on information collected from human behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically forecasts forward market value of compute capability based on information collected from human behavioral data sources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an expert system that predicts a forward market price in a market for spectrum or network bandwidth based on an understanding obtained by analyzing social data sources and executes a transaction based on the forward market prediction. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an intelligent agent that is configured to solicit the attention resources of another external intelligent agent. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a machine that automatically purchases attention resources in a forward market for attention. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a fleet of machines that automatically aggregate purchasing in a forward market for attention. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a system for learning on a training set of facility outcomes, facility parameters, and data collected from data sources to train an artificial intelligence/machine learning system to predict a likelihood of a facility production outcome. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a system for learning on a training set of facility outcomes, facility parameters, and data collected from data sources to train an artificial intelligence/machine learning system to predict a facility production outcome. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an intelligent, flexible energy and compute facility whereby an artificial intelligence/machine learning system configures the facility among a set of available configurations based on a set of detected conditions relating to an output parameter. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a distributed ledger that tokenizes a trade secret with an expert wrapper, such that operation on the distributed ledger provides provable access to the trade secret and the wrapper provides validation of the trade secret by the expert and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that aggregates views of a trade secret into a chain that proves which and how many parties have viewed the trade secret. In embodiments, provided herein is a transaction-enabling system having a distributed ledger that aggregates views of a trade secret into a chain that proves which and how many parties have viewed the trade secret and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that aggregates views of a trade secret into a chain that proves which and how many parties have viewed the trade secret and having a distributed ledger that tokenizes an item of intellectual property and a reporting system that reports an analytic result based on the operations performed on the distributed ledger or the intellectual property. In embodiments, provided herein is a transaction-enabling system having a distributed ledger that aggregates views of a trade secret into a chain that proves which and how many parties have viewed the trade secret and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that aggregates views of a trade secret into a chain that proves which and how many parties have viewed the trade secret and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a distributed ledger that aggregates views of a trade secret into a chain that proves which and how many parties have viewed the trade secret and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a distributed ledger that aggregates views of a trade secret into a chain that proves which and how many parties have viewed the trade secret and having a self-executing cryptocurrency coin that commits a transaction upon recognizing a location-based parameter that provides favorable tax treatment. In embodiments, provided herein is a transaction-enabling system having a distributed ledger that aggregates views of a trade secret into a chain that proves which and how many parties have viewed the trade secret and having an expert system that uses machine learning to optimize the execution of cryptocurrency transactions based on tax status. In embodiments, provided herein is a transaction-enabling system having a distributed ledger that aggregates views of a trade secret into a chain that proves which and how many parties have viewed the trade secret and having an expert system that aggregates regulatory information covering cryptocurrency transactions and automatically selects a jurisdiction for an operation based on the regulatory information. In embodiments, provided herein is a transaction-enabling system having a distributed ledger that aggregates views of a trade secret into a chain that proves which and how many parties have viewed the trade secret and having an expert system that uses machine learning to optimize the execution of a cryptocurrency transaction based on real time energy price information for an available energy source. In embodiments, provided herein is a transaction-enabling system having a distributed ledger that aggregates views of a trade secret into a chain that proves which and how many parties have viewed the trade secret and having an expert system that uses machine learning to optimize the execution of a cryptocurrency transaction based on an understanding of available energy sources to power computing resources to execute the transaction. In embodiments, provided herein is a transaction-enabling system having a distributed ledger that aggregates views of a trade secret into a chain that proves which and how many parties have viewed the trade secret and having an expert system that uses machine learning to optimize charging and recharging cycle of a rechargeable battery system to provide energy for execution of a cryptocurrency transaction. In embodiments, provided herein is a transaction-enabling system having a distributed ledger that aggregates views of a trade secret into a chain that proves which and how many parties have viewed the trade secret and having an expert system that predicts a forward market price in a market based on an understanding obtained by analyzing Internet of Things data sources and executes a transaction based on the forward market prediction. In embodiments, provided herein is a transaction-enabling system having a distributed ledger that aggregates views of a trade secret into a chain that proves which and how many parties have viewed the trade secret and having an expert system that predicts a forward market price in a market based on an understanding obtained by analyzing social network data sources and executes a transaction based on the forward market prediction. In embodiments, provided herein is a transaction-enabling system having a distributed ledger that aggregates views of a trade secret into a chain that proves which and how many parties have viewed the trade secret and having an expert system that predicts a forward market price in a market based on an understanding obtained by analyzing Internet of Things data sources and executes a cryptocurrency transaction based on the forward market prediction. In embodiments, provided herein is a transaction-enabling system having a distributed ledger that aggregates views of a trade secret into a chain that proves which and how many parties have viewed the trade secret and having an expert system that predicts a forward market price in a market based on an understanding obtained by analyzing social network data sources and executes a cryptocurrency transaction based on the forward market prediction. In embodiments, provided herein is a transaction-enabling system having a distributed ledger that aggregates views of a trade secret into a chain that proves which and how many parties have viewed the trade secret and having an expert system that predicts a forward market price in an energy market based on an understanding obtained by analyzing Internet of Things data sources and executes a transaction based on the forward market prediction. In embodiments, provided herein is a transaction-enabling system having a distributed ledger that aggregates views of a trade secret into a chain that proves which and how many parties have viewed the trade secret and having an expert system that predicts a forward market price in an energy market based on an understanding obtained by analyzing social network data sources and executes a transaction based on the forward market prediction. In embodiments, provided herein is a transaction-enabling system having a distributed ledger that aggregates views of a trade secret into a chain that proves which and how many parties have viewed the trade secret and having an expert system that predicts a forward market price in a market for computing resources based on an understanding obtained by analyzing Internet of Things data sources and executes a transaction based on the forward market prediction. In embodiments, provided herein is a transaction-enabling system having a distributed ledger that aggregates views of a trade secret into a chain that proves which and how many parties have viewed the trade secret and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a distributed ledger that aggregates views of a trade secret into a chain that proves which and how many parties have viewed the trade secret and having an expert system that predicts a forward market price in a market for computing resources based on an understanding obtained by analyzing social network data sources and executes a transaction based on the forward market prediction. In embodiments, provided herein is a transaction-enabling system having a distributed ledger that aggregates views of a trade secret into a chain that proves which and how many parties have viewed the trade secret and having an expert system that predicts a forward market price in a market for advertising based on an understanding obtained by analyzing Internet of Things data sources and executes a transaction based on the forward market prediction. In embodiments, provided herein is a transaction-enabling system having a distributed ledger that aggregates views of a trade secret into a chain that proves which and how many parties have viewed the trade secret and having an expert system that predicts a forward market price in a market for advertising based on an understanding obtained by analyzing social network data sources and executes a transaction based on the forward market prediction. In embodiments, provided herein is a transaction-enabling system having a distributed ledger that aggregates views of a trade secret into a chain that proves which and how many parties have viewed the trade secret and having a machine that automatically forecasts forward market pricing of energy prices based on information collected from automated agent behavioral data sources. In embodiments, provided herein is a transaction-enabling system having a distributed ledger that aggregates views of a trade secret into a chain that proves which and how many parties have viewed the trade secret and having a machine that automatically forecasts forward market pricing of network spectrum based on information collected from automated agent behavioral data sources. In embodiments, provided herein is a transaction-enabling system having a distributed ledger that aggregates views of a trade secret into a chain that proves which and how many parties have viewed the trade secret and having a machine that automatically forecasts forward market pricing of energy credits based on information collected from automated agent behavioral data sources. In embodiments, provided herein is a transaction-enabling system having a distributed ledger that aggregates views of a trade secret into a chain that proves which and how many parties have viewed the trade secret and having a machine that automatically forecasts forward market value of compute capability based on information collected from automated agent behavioral data sources. In embodiments, provided herein is a transaction-enabling system having a distributed ledger that aggregates views of a trade secret into a chain that proves which and how many parties have viewed the trade secret and having a machine that automatically forecasts forward market pricing of energy prices based on information collected from business entity behavioral data sources. In embodiments, provided herein is a transaction-enabling system having a distributed ledger that aggregates views of a trade secret into a chain that proves which and how many parties have viewed the trade secret and having a machine that automatically forecasts forward market pricing of network spectrum based on information collected from business entity behavioral data sources. In embodiments, provided herein is a transaction-enabling system having a distributed ledger that aggregates views of a trade secret into a chain that proves which and how many parties have viewed the trade secret and having a machine that automatically forecasts forward market pricing of energy credits based on information collected from business entity behavioral data sources. In embodiments, provided herein is a transaction-enabling system having a distributed ledger that aggregates views of a trade secret into a chain that proves which and how many parties have viewed the trade secret and having a machine that automatically forecasts forward market value of compute capability based on information collected from business entity behavioral data sources. In embodiments, provided herein is a transaction-enabling system having a distributed ledger that aggregates views of a trade secret into a chain that proves which and how many parties have viewed the trade secret and having a machine that automatically forecasts forward market pricing of energy prices based on information collected from human behavioral data sources. In embodiments, provided herein is a transaction-enabling system having a distributed ledger that aggregates views of a trade secret into a chain that proves which and how many parties have viewed the trade secret and having a machine that automatically forecasts forward market pricing of network spectrum based on information collected from human behavioral data sources. In embodiments, provided herein is a transaction-enabling system having a distributed ledger that aggregates views of a trade secret into a chain that proves which and how many parties have viewed the trade secret and having a machine that automatically forecasts forward market pricing of energy credits based on information collected from human behavioral data sources. In embodiments, provided herein is a transaction-enabling system having a distributed ledger that aggregates views of a trade secret into a chain that proves which and how many parties have viewed the trade secret and having a machine that automatically forecasts forward market value of compute capability based on information collected from human behavioral data sources. In embodiments, provided herein is a transaction-enabling system having a distributed ledger that aggregates views of a trade secret into a chain that proves which and how many parties have viewed the trade secret and having an expert system that predicts a forward market price in a market for spectrum or network bandwidth based on an understanding obtained by analyzing social data sources and executes a transaction based on the forward market prediction. In embodiments, provided herein is a transaction-enabling system having a distributed ledger that aggregates views of a trade secret into a chain that proves which and how many parties have viewed the trade secret and having an intelligent agent that is configured to solicit the attention resources of another external intelligent agent. In embodiments, provided herein is a transaction-enabling system having a distributed ledger that aggregates views of a trade secret into a chain that proves which and how many parties have viewed the trade secret and having a machine that automatically purchases attention resources in a forward market for attention. In embodiments, provided herein is a transaction-enabling system having a distributed ledger that aggregates views of a trade secret into a chain that proves which and how many parties have viewed the trade secret and having a fleet of machines that automatically aggregate purchasing in a forward market for attention. In embodiments, provided herein is a transaction-enabling system having a distributed ledger that aggregates views of a trade secret into a chain that proves which and how many parties have viewed the trade secret and having a system for learning on a training set of facility outcomes, facility parameters, and data collected from data sources to train an artificial intelligence/machine learning system to predict a likelihood of a facility production outcome. In embodiments, provided herein is a transaction-enabling system having a distributed ledger that aggregates views of a trade secret into a chain that proves which and how many parties have viewed the trade secret and having a system for learning on a training set of facility outcomes, facility parameters, and data collected from data sources to train an artificial intelligence/machine learning system to predict a facility production outcome. In embodiments, provided herein is a transaction-enabling system having a distributed ledger that aggregates views of a trade secret into a chain that proves which and how many parties have viewed the trade secret and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a distributed ledger that aggregates views of a trade secret into a chain that proves which and how many parties have viewed the trade secret and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a distributed ledger that aggregates views of a trade secret into a chain that proves which and how many parties have viewed the trade secret and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a distributed ledger that aggregates views of a trade secret into a chain that proves which and how many parties have viewed the trade secret and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a distributed ledger that aggregates views of a trade secret into a chain that proves which and how many parties have viewed the trade secret and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a distributed ledger that aggregates views of a trade secret into a chain that proves which and how many parties have viewed the trade secret and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a distributed ledger that aggregates views of a trade secret into a chain that proves which and how many parties have viewed the trade secret and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a distributed ledger that aggregates views of a trade secret into a chain that proves which and how many parties have viewed the trade secret and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a distributed ledger that aggregates views of a trade secret into a chain that proves which and how many parties have viewed the trade secret and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a distributed ledger that aggregates views of a trade secret into a chain that proves which and how many parties have viewed the trade secret and having an intelligent, flexible energy and compute facility whereby an artificial intelligence/machine learning system configures the facility among a set of available configurations based on a set of detected conditions relating to an output parameter. In embodiments, provided herein is a transaction-enabling system having a distributed ledger that aggregates views of a trade secret into a chain that proves which and how many parties have viewed the trade secret and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a distributed ledger that aggregates views of a trade secret into a chain that proves which and how many parties have viewed the trade secret and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a self-executing cryptocurrency coin that commits a transaction upon recognizing a location-based parameter that provides favorable tax treatment. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that uses machine learning to optimize the execution of cryptocurrency transactions based on tax status. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that aggregates regulatory information covering cryptocurrency transactions and automatically selects a jurisdiction for an operation based on the regulatory information. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that uses machine learning to optimize the execution of a cryptocurrency transaction based on real time energy price information for an available energy source. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that uses machine learning to optimize the execution of a cryptocurrency transaction based on an understanding of available energy sources to power computing resources to execute the transaction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that uses machine learning to optimize charging and recharging cycle of a rechargeable battery system to provide energy for execution of a cryptocurrency transaction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in a market based on an understanding obtained by analyzing Internet of Things data sources and executes a transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in a market based on an understanding obtained by analyzing social network data sources and executes a transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in a market based on an understanding obtained by analyzing Internet of Things data sources and executes a cryptocurrency transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in a market based on an understanding obtained by analyzing social network data sources and executes a cryptocurrency transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in an energy market based on an understanding obtained by analyzing Internet of Things data sources and executes a transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in an energy market based on an understanding obtained by analyzing social network data sources and executes a transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in a market for computing resources based on an understanding obtained by analyzing Internet of Things data sources and executes a transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in a market for computing resources based on an understanding obtained by analyzing social network data sources and executes a transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in a market for advertising based on an understanding obtained by analyzing Internet of Things data sources and executes a transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in a market for advertising based on an understanding obtained by analyzing social network data sources and executes a transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market pricing of energy prices based on information collected from automated agent behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market pricing of network spectrum based on information collected from automated agent behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market pricing of energy credits based on information collected from automated agent behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market value of compute capability based on information collected from automated agent behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market pricing of energy prices based on information collected from business entity behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market pricing of network spectrum based on information collected from business entity behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market pricing of energy credits based on information collected from business entity behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market value of compute capability based on information collected from business entity behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market pricing of energy prices based on information collected from human behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market pricing of network spectrum based on information collected from human behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market pricing of energy credits based on information collected from human behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically forecasts forward market value of compute capability based on information collected from human behavioral data sources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an expert system that predicts a forward market price in a market for spectrum or network bandwidth based on an understanding obtained by analyzing social data sources and executes a transaction based on the forward market prediction. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an intelligent agent that is configured to solicit the attention resources of another external intelligent agent. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a machine that automatically purchases attention resources in a forward market for attention. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a fleet of machines that automatically aggregate purchasing in a forward market for attention. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a system for learning on a training set of facility outcomes, facility parameters, and data collected from data sources to train an artificial intelligence/machine learning system to predict a likelihood of a facility production outcome. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a system for learning on a training set of facility outcomes, facility parameters, and data collected from data sources to train an artificial intelligence/machine learning system to predict a facility production outcome. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an intelligent, flexible energy and compute facility whereby an artificial intelligence/machine learning system configures the facility among a set of available configurations based on a set of detected conditions relating to an output parameter. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a distributed ledger that tokenizes an instruction set, such that operation on the distributed ledger provides provable access to the instruction set and execution of the instruction set on a system results in recording a transaction in the distributed ledger and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that tokenizes an item of intellectual property and a reporting system that reports an analytic result based on the operations performed on the distributed ledger or the intellectual property. In embodiments, provided herein is a transaction-enabling system having a distributed ledger that tokenizes an item of intellectual property and a reporting system that reports an analytic result based on the operations performed on the distributed ledger or the intellectual property and having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that tokenizes an item of intellectual property and a reporting system that reports an analytic result based on the operations performed on the distributed ledger or the intellectual property and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a distributed ledger that tokenizes an item of intellectual property and a reporting system that reports an analytic result based on the operations performed on the distributed ledger or the intellectual property and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a distributed ledger that tokenizes an item of intellectual property and a reporting system that reports an analytic result based on the operations performed on the distributed ledger or the intellectual property and having a self-executing cryptocurrency coin that commits a transaction upon recognizing a location-based parameter that provides favorable tax treatment. In embodiments, provided herein is a transaction-enabling system having a distributed ledger that tokenizes an item of intellectual property and a reporting system that reports an analytic result based on the operations performed on the distributed ledger or the intellectual property and having an expert system that uses machine learning to optimize the execution of cryptocurrency transactions based on tax status. In embodiments, provided herein is a transaction-enabling system having a distributed ledger that tokenizes an item of intellectual property and a reporting system that reports an analytic result based on the operations performed on the distributed ledger or the intellectual property and having an expert system that aggregates regulatory information covering cryptocurrency transactions and automatically selects a jurisdiction for an operation based on the regulatory information. In embodiments, provided herein is a transaction-enabling system having a distributed ledger that tokenizes an item of intellectual property and a reporting system that reports an analytic result based on the operations performed on the distributed ledger or the intellectual property and having an expert system that uses machine learning to optimize the execution of a cryptocurrency transaction based on real time energy price information for an available energy source. In embodiments, provided herein is a transaction-enabling system having a distributed ledger that tokenizes an item of intellectual property and a reporting system that reports an analytic result based on the operations performed on the distributed ledger or the intellectual property and having an expert system that uses machine learning to optimize the execution of a cryptocurrency transaction based on an understanding of available energy sources to power computing resources to execute the transaction. In embodiments, provided herein is a transaction-enabling system having a distributed ledger that tokenizes an item of intellectual property and a reporting system that reports an analytic result based on the operations performed on the distributed ledger or the intellectual property and having an expert system that uses machine learning to optimize charging and recharging cycle of a rechargeable battery system to provide energy for execution of a cryptocurrency transaction. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in a market based on an understanding obtained by analyzing Internet of Things data sources and executes a transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in a market based on an understanding obtained by analyzing social network data sources and executes a transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in a market based on an understanding obtained by analyzing Internet of Things data sources and executes a cryptocurrency transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in a market based on an understanding obtained by analyzing social network data sources and executes a cryptocurrency transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in an energy market based on an understanding obtained by analyzing Internet of Things data sources and executes a transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in an energy market based on an understanding obtained by analyzing social network data sources and executes a transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in a market for computing resources based on an understanding obtained by analyzing Internet of Things data sources and executes a transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in a market for computing resources based on an understanding obtained by analyzing social network data sources and executes a transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in a market for advertising based on an understanding obtained by analyzing Internet of Things data sources and executes a transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in a market for advertising based on an understanding obtained by analyzing social network data sources and executes a transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market pricing of energy prices based on information collected from automated agent behavioral data sources. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market pricing of network spectrum based on information collected from automated agent behavioral data sources. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market pricing of energy credits based on information collected from automated agent behavioral data sources. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market value of compute capability based on information collected from automated agent behavioral data sources. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market pricing of energy prices based on information collected from business entity behavioral data sources. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market pricing of network spectrum based on information collected from business entity behavioral data sources. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market pricing of energy credits based on information collected from business entity behavioral data sources. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market value of compute capability based on information collected from business entity behavioral data sources. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market pricing of energy prices based on information collected from human behavioral data sources. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market pricing of network spectrum based on information collected from human behavioral data sources. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market pricing of energy credits based on information collected from human behavioral data sources. In embodiments, provided herein is a transaction-enabling system having a distributed ledger that tokenizes an item of intellectual property and a reporting system that reports an analytic result based on the operations performed on the distributed ledger or the intellectual property and having a machine that automatically forecasts forward market value of compute capability based on information collected from human behavioral data sources. In embodiments, provided herein is a transaction-enabling system having a distributed ledger that tokenizes an item of intellectual property and a reporting system that reports an analytic result based on the operations performed on the distributed ledger or the intellectual property and having an expert system that predicts a forward market price in a market for spectrum or network bandwidth based on an understanding obtained by analyzing social data sources and executes a transaction based on the forward market prediction. In embodiments, provided herein is a transaction-enabling system having a distributed ledger that tokenizes an item of intellectual property and a reporting system that reports an analytic result based on the operations performed on the distributed ledger or the intellectual property and having an intelligent agent that is configured to solicit the attention resources of another external intelligent agent. In embodiments, provided herein is a transaction-enabling system having a distributed ledger that tokenizes an item of intellectual property and a reporting system that reports an analytic result based on the operations performed on the distributed ledger or the intellectual property and having a machine that automatically purchases attention resources in a forward market for attention. In embodiments, provided herein is a transaction-enabling system having a distributed ledger that tokenizes an item of intellectual property and a reporting system that reports an analytic result based on the operations performed on the distributed ledger or the intellectual property and having a fleet of machines that automatically aggregate purchasing in a forward market for attention. In embodiments, provided herein is a transaction-enabling system having a distributed ledger that tokenizes an item of intellectual property and a reporting system that reports an analytic result based on the operations performed on the distributed ledger or the intellectual property and having a system for learning on a training set of facility outcomes, facility parameters, and data collected from data sources to train an artificial intelligence/machine learning system to predict a likelihood of a facility production outcome. In embodiments, provided herein is a transaction-enabling system having a distributed ledger that tokenizes an item of intellectual property and a reporting system that reports an analytic result based on the operations performed on the distributed ledger or the intellectual property and having a system for learning on a training set of facility outcomes, facility parameters, and data collected from data sources to train an artificial intelligence/machine learning system to predict a facility production outcome. In embodiments, provided herein is a transaction-enabling system having a distributed ledger that tokenizes an item of intellectual property and a reporting system that reports an analytic result based on the operations performed on the distributed ledger or the intellectual property and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a distributed ledger that tokenizes an item of intellectual property and a reporting system that reports an analytic result based on the operations performed on the distributed ledger or the intellectual property and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a distributed ledger that tokenizes an item of intellectual property and a reporting system that reports an analytic result based on the operations performed on the distributed ledger or the intellectual property and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a distributed ledger that tokenizes an item of intellectual property and a reporting system that reports an analytic result based on the operations performed on the distributed ledger or the intellectual property and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a distributed ledger that tokenizes an item of intellectual property and a reporting system that reports an analytic result based on the operations performed on the distributed ledger or the intellectual property and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a distributed ledger that tokenizes an item of intellectual property and a reporting system that reports an analytic result based on the operations performed on the distributed ledger or the intellectual property and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a distributed ledger that tokenizes an item of intellectual property and a reporting system that reports an analytic result based on the operations performed on the distributed ledger or the intellectual property and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a distributed ledger that tokenizes an item of intellectual property and a reporting system that reports an analytic result based on the operations performed on the distributed ledger or the intellectual property and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a distributed ledger that tokenizes an item of intellectual property and a reporting system that reports an analytic result based on the operations performed on the distributed ledger or the intellectual property and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a distributed ledger that tokenizes an item of intellectual property and a reporting system that reports an analytic result based on the operations performed on the distributed ledger or the intellectual property and having an intelligent, flexible energy and compute facility whereby an artificial intelligence/machine learning system configures the facility among a set of available configurations based on a set of detected conditions relating to an output parameter. In embodiments, provided herein is a transaction-enabling system having a distributed ledger that tokenizes an item of intellectual property and a reporting system that reports an analytic result based on the operations performed on the distributed ledger or the intellectual property and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a distributed ledger that tokenizes an item of intellectual property and a reporting system that reports an analytic result based on the operations performed on the distributed ledger or the intellectual property and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a distributed ledger that aggregates a set of instructions, where an operation on the distributed ledger adds at least one instruction to a pre-existing set of instructions to provide a modified set of instructions. In embodiments, provided herein is a transaction-enabling system having a distributed ledger that aggregates a set of instructions, where an operation on the distributed ledger adds at least one instruction to a pre-existing set of instructions to provide a modified set of instructions and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a distributed ledger that aggregates a set of instructions, where an operation on the distributed ledger adds at least one instruction to a pre-existing set of instructions to provide a modified set of instructions and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a distributed ledger that aggregates a set of instructions, where an operation on the distributed ledger adds at least one instruction to a pre-existing set of instructions to provide a modified set of instructions and having a self-executing cryptocurrency coin that commits a transaction upon recognizing a location-based parameter that provides favorable tax treatment. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that uses machine learning to optimize the execution of cryptocurrency transactions based on tax status. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that aggregates regulatory information covering cryptocurrency transactions and automatically selects a jurisdiction for an operation based on the regulatory information. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that uses machine learning to optimize the execution of a cryptocurrency transaction based on real time energy price information for an available energy source. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that uses machine learning to optimize the execution of a cryptocurrency transaction based on an understanding of available energy sources to power computing resources to execute the transaction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that uses machine learning to optimize charging and recharging cycle of a rechargeable battery system to provide energy for execution of a cryptocurrency transaction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in a market based on an understanding obtained by analyzing Internet of Things data sources and executes a transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in a market based on an understanding obtained by analyzing social network data sources and executes a transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in a market based on an understanding obtained by analyzing Internet of Things data sources and executes a cryptocurrency transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in a market based on an understanding obtained by analyzing social network data sources and executes a cryptocurrency transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in an energy market based on an understanding obtained by analyzing Internet of Things data sources and executes a transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in an energy market based on an understanding obtained by analyzing social network data sources and executes a transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in a market for computing resources based on an understanding obtained by analyzing Internet of Things data sources and executes a transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in a market for computing resources based on an understanding obtained by analyzing social network data sources and executes a transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in a market for advertising based on an understanding obtained by analyzing Internet of Things data sources and executes a transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in a market for advertising based on an understanding obtained by analyzing social network data sources and executes a transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market pricing of energy prices based on information collected from automated agent behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market pricing of network spectrum based on information collected from automated agent behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market pricing of energy credits based on information collected from automated agent behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market value of compute capability based on information collected from automated agent behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market pricing of energy prices based on information collected from business entity behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market pricing of network spectrum based on information collected from business entity behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market pricing of energy credits based on information collected from business entity behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market value of compute capability based on information collected from business entity behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market pricing of energy prices based on information collected from human behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market pricing of network spectrum based on information collected from human behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market pricing of energy credits based on information collected from human behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically forecasts forward market value of compute capability based on information collected from human behavioral data sources. In embodiments, provided herein is a transaction-enabling system having a distributed ledger that aggregates a set of instructions, where an operation on the distributed ledger adds at least one instruction to a pre-existing set of instructions to provide a modified set of instructions and having an expert system that predicts a forward market price in a market for spectrum or network bandwidth based on an understanding obtained by analyzing social data sources and executes a transaction based on the forward market prediction. In embodiments, provided herein is a transaction-enabling system having a distributed ledger that aggregates a set of instructions, where an operation on the distributed ledger adds at least one instruction to a pre-existing set of instructions to provide a modified set of instructions and having an intelligent agent that is configured to solicit the attention resources of another external intelligent agent. In embodiments, provided herein is a transaction-enabling system having a distributed ledger that aggregates a set of instructions, where an operation on the distributed ledger adds at least one instruction to a pre-existing set of instructions to provide a modified set of instructions and having a machine that automatically purchases attention resources in a forward market for attention. In embodiments, provided herein is a transaction-enabling system having a distributed ledger that aggregates a set of instructions, where an operation on the distributed ledger adds at least one instruction to a pre-existing set of instructions to provide a modified set of instructions and having a fleet of machines that automatically aggregate purchasing in a forward market for attention. In embodiments, provided herein is a transaction-enabling system having a distributed ledger that aggregates a set of instructions, where an operation on the distributed ledger adds at least one instruction to a pre-existing set of instructions to provide a modified set of instructions and having a system for learning on a training set of facility outcomes, facility parameters, and data collected from data sources to train an artificial intelligence/machine learning system to predict a likelihood of a facility production outcome. In embodiments, provided herein is a transaction-enabling system having a distributed ledger that aggregates a set of instructions, where an operation on the distributed ledger adds at least one instruction to a pre-existing set of instructions to provide a modified set of instructions and having a system for learning on a training set of facility outcomes, facility parameters, and data collected from data sources to train an artificial intelligence/machine learning system to predict a facility production outcome. In embodiments, provided herein is a transaction-enabling system having a distributed ledger that aggregates a set of instructions, where an operation on the distributed ledger adds at least one instruction to a pre-existing set of instructions to provide a modified set of instructions and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a distributed ledger that aggregates a set of instructions, where an operation on the distributed ledger adds at least one instruction to a pre-existing set of instructions to provide a modified set of instructions and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a distributed ledger that aggregates a set of instructions, where an operation on the distributed ledger adds at least one instruction to a pre-existing set of instructions to provide a modified set of instructions and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a distributed ledger that aggregates a set of instructions, where an operation on the distributed ledger adds at least one instruction to a pre-existing set of instructions to provide a modified set of instructions and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a distributed ledger that aggregates a set of instructions, where an operation on the distributed ledger adds at least one instruction to a pre-existing set of instructions to provide a modified set of instructions and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a distributed ledger that aggregates a set of instructions, where an operation on the distributed ledger adds at least one instruction to a pre-existing set of instructions to provide a modified set of instructions and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a distributed ledger that aggregates a set of instructions, where an operation on the distributed ledger adds at least one instruction to a pre-existing set of instructions to provide a modified set of instructions and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a distributed ledger that aggregates a set of instructions, where an operation on the distributed ledger adds at least one instruction to a pre-existing set of instructions to provide a modified set of instructions and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a distributed ledger that aggregates a set of instructions, where an operation on the distributed ledger adds at least one instruction to a pre-existing set of instructions to provide a modified set of instructions and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a distributed ledger that aggregates a set of instructions, where an operation on the distributed ledger adds at least one instruction to a pre-existing set of instructions to provide a modified set of instructions and having an intelligent, flexible energy and compute facility whereby an artificial intelligence/machine learning system configures the facility among a set of available configurations based on a set of detected conditions relating to an output parameter. In embodiments, provided herein is a transaction-enabling system having a distributed ledger that aggregates a set of instructions, where an operation on the distributed ledger adds at least one instruction to a pre-existing set of instructions to provide a modified set of instructions and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a distributed ledger that aggregates a set of instructions, where an operation on the distributed ledger adds at least one instruction to a pre-existing set of instructions to provide a modified set of instructions and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a self-executing cryptocurrency coin that commits a transaction upon recognizing a location-based parameter that provides favorable tax treatment. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that uses machine learning to optimize the execution of cryptocurrency transactions based on tax status. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that aggregates regulatory information covering cryptocurrency transactions and automatically selects a jurisdiction for an operation based on the regulatory information. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that uses machine learning to optimize the execution of a cryptocurrency transaction based on real time energy price information for an available energy source. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that uses machine learning to optimize the execution of a cryptocurrency transaction based on an understanding of available energy sources to power computing resources to execute the transaction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that uses machine learning to optimize charging and recharging cycle of a rechargeable battery system to provide energy for execution of a cryptocurrency transaction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in a market based on an understanding obtained by analyzing Internet of Things data sources and executes a transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in a market based on an understanding obtained by analyzing social network data sources and executes a transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in a market based on an understanding obtained by analyzing Internet of Things data sources and executes a cryptocurrency transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in a market based on an understanding obtained by analyzing social network data sources and executes a cryptocurrency transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in an energy market based on an understanding obtained by analyzing Internet of Things data sources and executes a transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in an energy market based on an understanding obtained by analyzing social network data sources and executes a transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in a market for computing resources based on an understanding obtained by analyzing Internet of Things data sources and executes a transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in a market for computing resources based on an understanding obtained by analyzing social network data sources and executes a transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in a market for advertising based on an understanding obtained by analyzing Internet of Things data sources and executes a transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in a market for advertising based on an understanding obtained by analyzing social network data sources and executes a transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market pricing of energy prices based on information collected from automated agent behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market pricing of network spectrum based on information collected from automated agent behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market pricing of energy credits based on information collected from automated agent behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market value of compute capability based on information collected from automated agent behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market pricing of energy prices based on information collected from business entity behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market pricing of network spectrum based on information collected from business entity behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market pricing of energy credits based on information collected from business entity behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market value of compute capability based on information collected from business entity behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market pricing of energy prices based on information collected from human behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market pricing of network spectrum based on information collected from human behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market pricing of energy credits based on information collected from human behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically forecasts forward market value of compute capability based on information collected from human behavioral data sources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an expert system that predicts a forward market price in a market for spectrum or network bandwidth based on an understanding obtained by analyzing social data sources and executes a transaction based on the forward market prediction. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an intelligent agent that is configured to solicit the attention resources of another external intelligent agent. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a machine that automatically purchases attention resources in a forward market for attention. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a fleet of machines that automatically aggregate purchasing in a forward market for attention. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a system for learning on a training set of facility outcomes, facility parameters, and data collected from data sources to train an artificial intelligence/machine learning system to predict a likelihood of a facility production outcome. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a system for learning on a training set of facility outcomes, facility parameters, and data collected from data sources to train an artificial intelligence/machine learning system to predict a facility production outcome. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an intelligent, flexible energy and compute facility whereby an artificial intelligence/machine learning system configures the facility among a set of available configurations based on a set of detected conditions relating to an output parameter. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a smart wrapper for management of a distributed ledger that aggregates sets of instructions, where the smart wrapper manages allocation of instruction sub-sets to the distributed ledger and access to the instruction sub-sets and having an intelligent, flexible energy and compute facility whereby an artificial intelligence/machine learning system configures the facility among a set of available configurations based on a set of parameters received from a digital twin for the facility.

Figure 57:
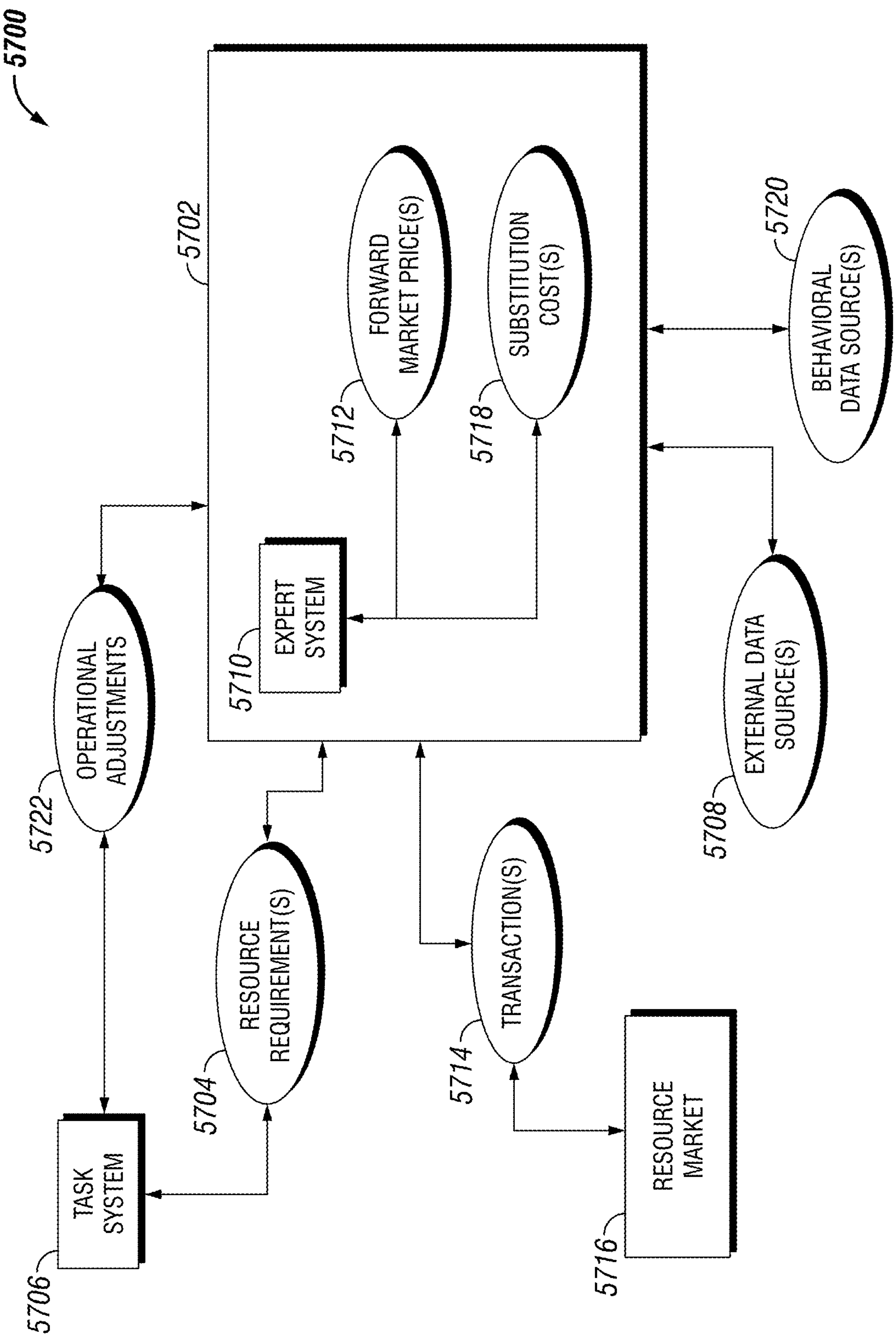
FIG. 57 is a schematic diagram of a system for improving resource utilization for a task system.

Referencing FIG. 57, an example transaction-enabling system 5700 includes a controller 5702 configured to interpret a resource utilization requirement 5704 for a task system 5706 having at least one task, such as a compute task, a network task, or a core task. The example controller 5702 is further configured to interpret a number of external data sources 5708, where the external data sources 5708 include at least one data source outside of the task system 5706. The example controller 5702 operates an expert system 5710 that predicts a forward market price 5712 in response to the resource utilization requirement 5704 and the external data sources 5708, and that executes a transaction 5714 on a resource market 5716 in response to the predicted forward market price 5712. Example and non-limiting external data sources 5708 include one or more sources such as IoT data sources and social media data sources. Example and non-limiting operations to predict the forward market price include determining indicators on social media that relate to forward market prices (e.g., conversation types, keyword occurrences, sharing topic indicators, and/or event indicators such as cultural, sporting, or internet events), determining external data indicators that relate to forward market prices (e.g., data from industrial systems that participate in a market that may affect resource prices, news events that may affect resource prices, published or proprietary data such as orders, economic indicators, demographic indicators, or the like that may affect resource prices). All examples for external data described herein are non-limiting examples to illustrate certain principles of the present disclosure.

In certain embodiments, the resource requirement(s) 5704 relate to a compute resource, a network bandwidth resource, a spectrum resource, a data storage resource, an energy resource, and/or an energy credit resource. In certain embodiments, the resource market 5716 may be a forward market and/or a spot market for a resource. In certain embodiments, the transactions 5714 may be on a forward market and/or a spot market. In certain embodiments, the transactions 5714 may include a purchase or a sale of the resource, and may further include combinations (e.g., a purchase on a spot market and a sale on a forward market).

An example system 5700 includes the resource utilization requirement 5704 including a requirement for a first resource, and where the forward market price 5712 is a forward price prediction for the first resource, for a second resource, and/or for both resources. For example, the second resource may be a resource that can be substituted for the first resource. The substitution may be direct, such as where multiple types of fuel available to power a system, or where multiple task delivery components are available that consume distinct types of resources. Additionally or alternatively, the substitution may be indirect, such as where operational changes can trade out one type of resource utilization for another—e.g., trading compute resources for network resources (e.g., outsourcing compute tasks, effectively making them network tasks for the task system), changing a process to reduce a type of resource (e.g., operating a less efficient algorithm that results in increased data storage but reduced computing; operating a process at a lower rate or temperature, reducing energy usage for the direct operation, but increasing energy usage due to the increased time of operating a facility performing the process, and further where the energy usage for the direct operation and for operating the facility may be distinct types of energy). The examples of the first resource and second resource are non-limiting and provided for illustration. An example system 5700 further includes the controller 5702 configured to operate the expert system 5710 to determine a substitution cost 5718 of the second resource, and to execute the transaction 5714 in response to the substitution cost 5718—which may include purchasing or selling the first resource and/or the second resource, or both, and/or varying the transactions 5714 over time. In certain embodiments, the substitution cost 5718 is determined from the forward market price(s) 5712 of the first and second resource, the spot market price(s) of the first and second resource, and/or from other system costs or effects that may result from utilization changes between the first and second resource, such as operational change costs to the task system 5706 (e.g., time to complete tasks; facility changes such as personnel and/or equipment changes due to operating with either the first or second resources; and/or secondary effects such as consumption of energy credits, exceedance of a capacity of a component of the task system, and/or changes to a quality of products or services provided by the task system 5706).

Figure 58:
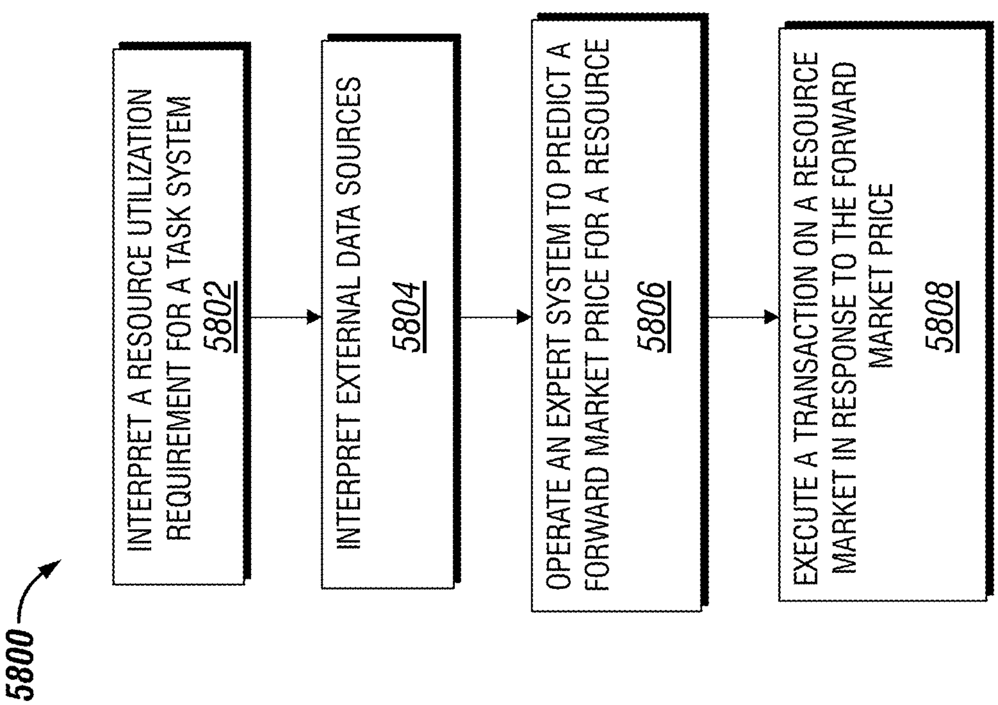
FIG. 58 is a schematic flow diagram of a method for improving resource utilization for a task system.

Referencing FIG. 58, an example procedure 5800 includes an operation 5802 to interpret a resource utilization requirement for a task system having at least one of a compute task, a network task, or a core task; an operation 5804 to interpret a number of external data sources, where the number of external data sources include at least one data source outside of the task system. The example procedure 5800 further includes an operation 5806 to operate an expert system (and/or AI or machine learning system) to predict a forward market price for a resource in response to the resource utilization requirement and the number of external data sources; and an operation 5808 to execute a transaction on a resource market in response to the predicted forward market price.

Figure 59:
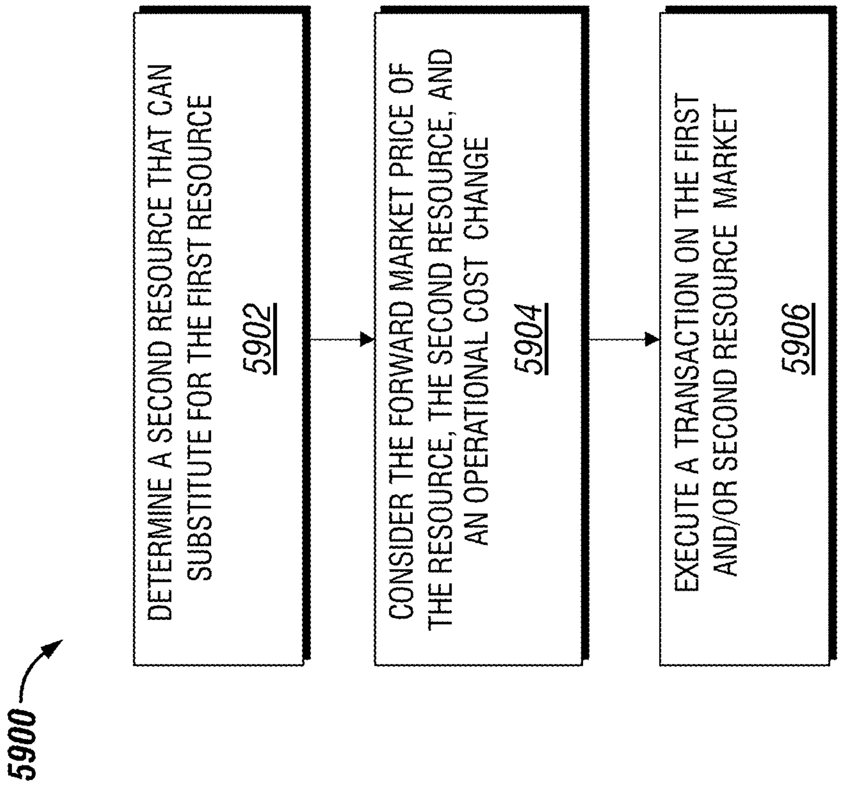
FIG. 59 is a schematic flow diagram of a method for improving resource utilization with a substitute resource.

Referencing FIG. 59, an example procedure 5900 includes an operation 5902 to determine a second resource that can substitute for the first resource, an operation 5904 to consider the forward market price of one or more resources, and/or to further consider the operational cost change between the first and second resources, and an operation 5906 to execute a transaction on a resource market of the first resource or the second resource in response to the substitution cost and/or operational cost change between the first and second resources.

With further reference to FIG. 57, the example system 5700 includes the controller 5702 configured to interpret a resource utilization requirement 5704 for a task system 5706, and to interpret a behavioral data source 5720; to operate a machine (e.g., an expert system 5710, and/or an AI or machine learning component) to forecast a forward market price 5712 for a resource in response to the resource utilization requirement 5704 and the behavioral data source 5720, and to perform one of adjusting an operation of the task system (e.g., providing operational adjustments 5722) or executing a transaction 5714 in response to the forecast of the forward market price 5712 for the resource. Example and non-limiting behavioral data sources 5720 include data sources such as: an automated agent behavioral data source, a human behavioral data source, and/or a business entity behavioral data source. In certain embodiments, the controller 5702 is further configured to operation the machine to provide operational adjustments 5722 such as: adjusting operations of the task system 5706 to increase or reduce the resource utilization requirement 5704; adjusting operations of the task system 5706 to time shift at least a portion of the resource utilization requirement 5704; adjusting operations of the task system 5706 to substitute utilization of a first resource for utilization of a second resource; and/or accessing an external provider to provide at least a portion of at least one of the compute task, the network task, or the core task.

Figure 60:
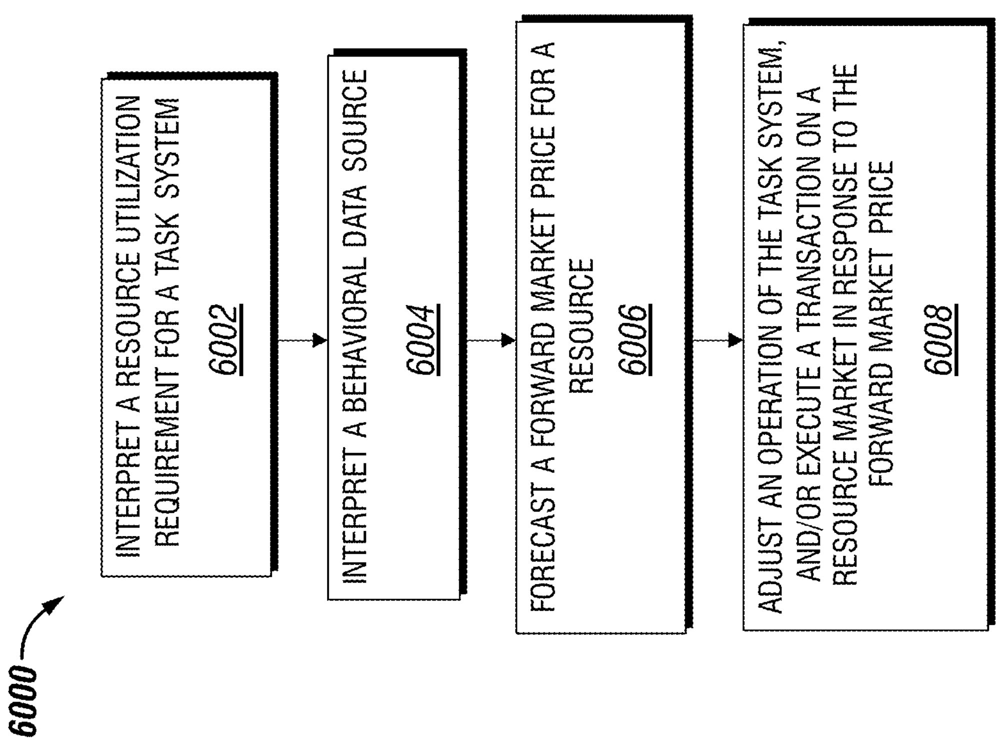
FIG. 60 is a schematic flow diagram of a method for improving resource utilization with behavioral data.

Referencing FIG. 60, an example procedure 6000 includes an operation 6002 to interpret a resource utilization requirement for a task system, an operation 6004 to interpret a behavioral data source, an operation 6006 to operate a machine to forecast a forward market value for a resource in response to the resource utilization requirement and the behavioral data source, and an operation 6008 to adjust an operation of the task system and/or to execute a transaction in response to the forecast of the forward market value for the resource. In certain embodiments, procedure 6000 further includes operations such as those described in reference to FIG. 59 to further consider substitution costs for a first and second resource, and to perform operations 6008 further in response to the substitution costs for the first and second resource and adjust an operation of the task system and/or execute a transaction in response to the forward market price.

With further reference to FIG. 57, an example system 5700 includes the controller 5702 configured to interpret a resource utilization requirement 5704 for a task system 5706, to interpret a number of external data sources 5708, to operate an expert system 5710 to predict a forward market price 5712 for a resource in response to the resource utilization requirement 5704 and the number of external data sources, and to execute a cryptocurrency transaction (e.g., transaction 5714) on a resource market 5716 in response to the predicted forward market price.

Figure 61:
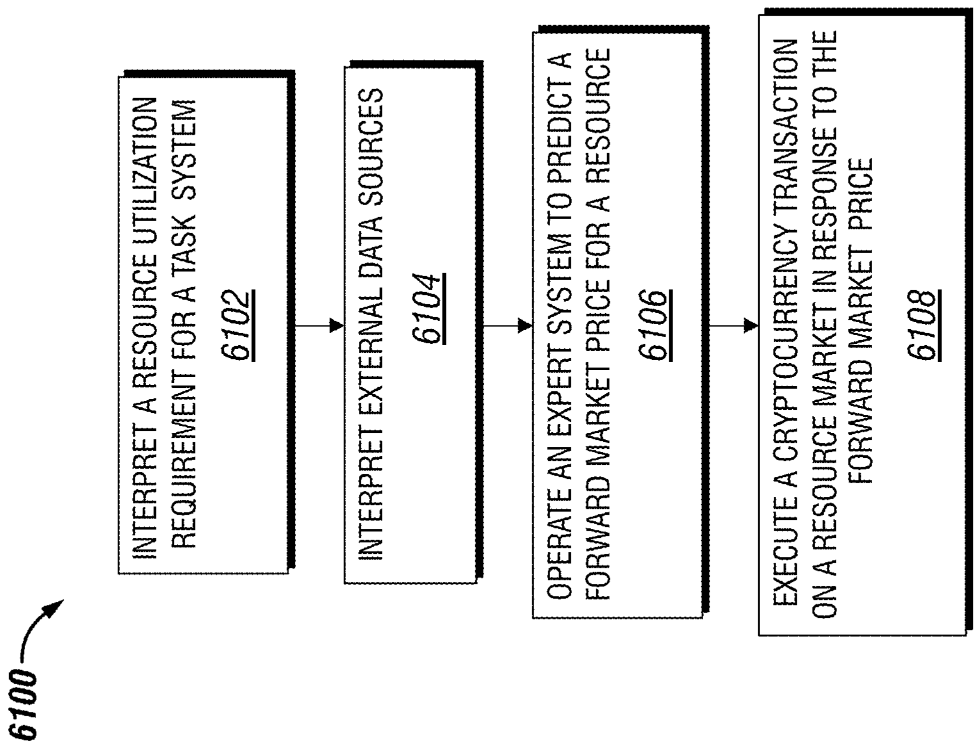
FIG. 61 is a schematic flow diagram of a method for improving resource utilization for a task system.

With reference to FIG. 61, an example procedure 6100 includes an operation 6102 to interpret a resource utilization requirement for a task system, an operation 6104 to interpret a number of external data sources, an operation 6106 to operate an expert system to predict a forward market price for a resource in response to the resource utilization requirement and the number of external data sources, and an operation 6108 to execute a cryptocurrency transaction on a resource market in response to the predicted forward market price. Operations of the procedure 6100, and further for operations of any systems or procedures throughout the present disclosure that determine a forward market price for a resource may additionally or alternatively include determining a forward market price for a number of forward market time frames, including a predicted price for a spot market at one or more future time values. Operations of the procedure 6100, and further for operations of any system or procedures throughout the present disclosure that perform one or more transactions or operational adjustments in response to a forward market price include operations provide for an improved cost of operation of a task system, and/or to provide for an increased capability (e.g., quality, volume, and/or completion time) of a task system. In certain embodiments, procedure 6100 further includes operations such as those described in reference to FIG. 59 to further consider substitution costs for a first and second resource, and to perform operations 6108 further in response to the substitution costs for the first and second resource.

In embodiments, provided herein is a transaction-enabling system having an expert system that predicts a forward market price in a market based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having an expert system that predicts a forward market price in a market based on an understanding obtained by analyzing social network data sources and executes a transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having an expert system that predicts a forward market price in a market based on an understanding obtained by analyzing Internet of Things data sources and executes a cryptocurrency transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having an expert system that predicts a forward market price in a market based on an understanding obtained by analyzing social network data sources and executes a cryptocurrency transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having an expert system that predicts a forward market price in an energy market based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having an expert system that predicts a forward market price in an energy market based on an understanding obtained by analyzing social network data sources and executes a transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having an expert system that predicts a forward market price in a market for computing resources based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having an expert system that predicts a forward market price in a market for computing resources based on an understanding obtained by analyzing social network data sources and executes a transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having an expert system that predicts a forward market price in a market for advertising based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having an expert system that predicts a forward market price in a market for advertising based on an understanding obtained by analyzing social network data sources and executes a transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market pricing of energy prices based on information collected from automated agent behavioral data sources. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market pricing of network spectrum based on information collected from automated agent behavioral data sources. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market pricing of energy credits based on information collected from automated agent behavioral data sources. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market value of compute capability based on information collected from automated agent behavioral data sources. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market pricing of energy prices based on information collected from business entity behavioral data sources. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market pricing of network spectrum based on information collected from business entity behavioral data sources. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market pricing of energy credits based on information collected from business entity behavioral data sources. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market value of compute capability based on information collected from business entity behavioral data sources. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market pricing of energy prices based on information collected from human behavioral data sources. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market pricing of network spectrum based on information collected from human behavioral data sources. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market pricing of energy credits based on information collected from human behavioral data sources. In embodiments, provided herein is a transaction-enabling system having an expert system that predicts a forward market price in a market based on an understanding obtained by analyzing Internet of Things data sources and executes a transaction based on the forward market prediction and having a machine that automatically forecasts forward market value of compute capability based on information collected from human behavioral data sources. In embodiments, provided herein is a transaction-enabling system having an expert system that predicts a forward market price in a market based on an understanding obtained by analyzing Internet of Things data sources and executes a transaction based on the forward market prediction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in a market based on an understanding obtained by analyzing Internet of Things data sources and executes a transaction based on the forward market prediction and having an intelligent agent that is configured to solicit the attention resources of another external intelligent agent. In embodiments, provided herein is a transaction-enabling system having an expert system that predicts a forward market price in a market based on an understanding obtained by analyzing Internet of Things data sources and executes a transaction based on the forward market prediction and having a machine that automatically purchases attention resources in a forward market for attention. In embodiments, provided herein is a transaction-enabling system having an expert system that predicts a forward market price in a market based on an understanding obtained by analyzing Internet of Things data sources and executes a transaction based on the forward market prediction and having a fleet of machines that automatically aggregate purchasing in a forward market for attention. In embodiments, provided herein is a transaction-enabling system having an expert system that predicts a forward market price in a market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in a market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in a market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in a market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that predicts a forward market price in a market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in a market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in a market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in a market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in a market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in a market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in a market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in a market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in a market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in a market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that predicts a forward market price in a market based on an understanding obtained by analyzing social network data sources and executes a transaction based on the forward market prediction. In embodiments, provided herein is a transaction-enabling system having an expert system that predicts a forward market price in a market based on an understanding obtained by analyzing social network data sources and executes a transaction based on the forward market prediction and having an expert system that predicts a forward market price in a market based on an understanding obtained by analyzing Internet of Things data sources and executes a cryptocurrency transaction based on the forward market prediction. In embodiments, provided herein is a transaction-enabling system having an expert system that predicts a forward market price in a market based on an understanding obtained by analyzing social network data sources and executes a transaction based on the forward market prediction and having an expert system that predicts a forward market price in a market based on an understanding obtained by analyzing social network data sources and executes a cryptocurrency transaction based on the forward market prediction. In embodiments, provided herein is a transaction-enabling system having an expert system that predicts a forward market price in a market based on an understanding obtained by analyzing social network data sources and executes a transaction based on the forward market prediction and having an expert system that predicts a forward market price in an energy market based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing social network data sources and executes a transaction based on the forward market prediction and having an expert system that predicts a forward market price in an energy market based on an understanding obtained by analyzing social network data sources and executes a transaction based on the forward market prediction. In embodiments, provided herein is a transaction-enabling system having an expert system that predicts a forward market price in a market based on an understanding obtained by analyzing social network data sources and executes a transaction based on the forward market prediction and having an expert system that predicts a forward market price in a market for computing resources based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing social network data sources and executes a transaction based on the forward market prediction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing social network data sources and executes a transaction based on the forward market prediction and having an expert system that predicts a forward market price in a market for computing resources based on an understanding obtained by analyzing social network data sources and executes a transaction based on the forward market prediction. In embodiments, provided herein is a transaction-enabling system having an expert system that predicts a forward market price in a market based on an understanding obtained by analyzing social network data sources and executes a transaction based on the forward market prediction and having an expert system that predicts a forward market price in a market for advertising based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing social network data sources and executes a transaction based on the forward market prediction and having an expert system that predicts a forward market price in a market for advertising based on an understanding obtained by analyzing social network data sources and executes a transaction based on the forward market prediction. In embodiments, provided herein is a transaction-enabling system having an expert system that predicts a forward market price in a market based on an understanding obtained by analyzing social network data sources and executes a transaction based on the forward market prediction and having a machine that automatically forecasts forward market pricing of energy prices based on information collected from automated agent behavioral data sources. In embodiments, provided herein is a transaction-enabling system having an expert system that predicts a forward market price in a market based on an understanding obtained by analyzing social network data sources and executes a transaction based on the forward market prediction and having a machine that automatically forecasts forward market pricing of network spectrum based on information collected from automated agent behavioral data sources. In embodiments, provided herein is a transaction-enabling system having an expert system that predicts a forward market price in a market based on an understanding obtained by analyzing social network data sources and executes a transaction based on the forward market prediction and having a machine that automatically forecasts forward market pricing of energy credits based on information collected from automated agent behavioral data sources. In embodiments, provided herein is a transaction-enabling system having an expert system that predicts a forward market price in a market based on an understanding obtained by analyzing social network data sources and executes a transaction based on the forward market prediction and having a machine that automatically forecasts forward market value of compute capability based on information collected from automated agent behavioral data sources. In embodiments, provided herein is a transaction-enabling system having an expert system that predicts a forward market price in a market based on an understanding obtained by analyzing social network data sources and executes a transaction based on the forward market prediction and having a machine that automatically forecasts forward market pricing of energy prices based on information collected from business entity behavioral data sources. In embodiments, provided herein is a transaction-enabling system having an expert system that predicts a forward market price in a market based on an understanding obtained by analyzing social network data sources and executes a transaction based on the forward market prediction and having a machine that automatically forecasts forward market pricing of network spectrum based on information collected from business entity behavioral data sources. In embodiments, provided herein is a transaction-enabling system having an expert system that predicts a forward market price in a market based on an understanding obtained by analyzing social network data sources and executes a transaction based on the forward market prediction and having a machine that automatically forecasts forward market pricing of energy credits based on information collected from business entity behavioral data sources. In embodiments, provided herein is a transaction-enabling system having an expert system that predicts a forward market price in a market based on an understanding obtained by analyzing social network data sources and executes a transaction based on the forward market prediction and having a machine that automatically forecasts forward market value of compute capability based on information collected from business entity behavioral data sources. In embodiments, provided herein is a transaction-enabling system having an expert system that predicts a forward market price in a market based on an understanding obtained by analyzing social network data sources and executes a transaction based on the forward market prediction and having a machine that automatically forecasts forward market pricing of energy prices based on information collected from human behavioral data sources. In embodiments, provided herein is a transaction-enabling system having an expert system that predicts a forward market price in a market based on an understanding obtained by analyzing social network data sources and executes a transaction based on the forward market prediction and having a machine that automatically forecasts forward market pricing of network spectrum based on information collected from human behavioral data sources. In embodiments, provided herein is a transaction-enabling system having an expert system that predicts a forward market price in a market based on an understanding obtained by analyzing social network data sources and executes a transaction based on the forward market prediction and having a machine that automatically forecasts forward market pricing of energy credits based on information collected from human behavioral data sources. In embodiments, provided herein is a transaction-enabling system having an expert system that predicts a forward market price in a market based on an understanding obtained by analyzing social network data sources and executes a transaction based on the forward market prediction and having a machine that automatically forecasts forward market value of compute capability based on information collected from human behavioral data sources. In embodiments, provided herein is a transaction-enabling system having an expert system that predicts a forward market price in a market based on an understanding obtained by analyzing social network data sources and executes a transaction based on the forward market prediction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in a market based on an understanding obtained by analyzing social network data sources and executes a transaction based on the forward market prediction and having an intelligent agent that is configured to solicit the attention resources of another external intelligent agent. In embodiments, provided herein is a transaction-enabling system having an expert system that predicts a forward market price in a market based on an understanding obtained by analyzing social network data sources and executes a transaction based on the forward market prediction and having a machine that automatically purchases attention resources in a forward market for attention. In embodiments, provided herein is a transaction-enabling system having an expert system that predicts a forward market price in a market based on an understanding obtained by analyzing social network data sources and executes a transaction based on the forward market prediction and having a fleet of machines that automatically aggregate purchasing in a forward market for attention. In embodiments, provided herein is a transaction-enabling system having an expert system that predicts a forward market price in a market based on an understanding obtained by analyzing social network data sources and executes a transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in a market based on an understanding obtained by analyzing social network data sources and executes a transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in a market based on an understanding obtained by analyzing social network data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in a market based on an understanding obtained by analyzing social network data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that predicts a forward market price in a market based on an understanding obtained by analyzing social network data sources and executes a transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in a market based on an understanding obtained by analyzing social network data sources and executes a transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in a market based on an understanding obtained by analyzing social network data sources and executes a transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in a market based on an understanding obtained by analyzing social network data sources and executes a transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in a market based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in a market based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in a market based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in a market based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in a market based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in a market based on an understanding obtained by analyzing social network data sources and executes a transaction based on the forward market prediction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that predicts a forward market price in a market based on an understanding obtained by analyzing Internet of Things data sources and executes a cryptocurrency transaction based on the forward market prediction. In embodiments, provided herein is a transaction-enabling system having an expert system that predicts a forward market price in a market based on an understanding obtained by analyzing Internet of Things data sources and executes a cryptocurrency transaction based on the forward market prediction and having an expert system that predicts a forward market price in a market based on an understanding obtained by analyzing social network data sources and executes a cryptocurrency transaction based on the forward market prediction. In embodiments, provided herein is a transaction-enabling system having an expert system that predicts a forward market price in a market based on an understanding obtained by analyzing Internet of Things data sources and executes a cryptocurrency transaction based on the forward market prediction and having an expert system that predicts a forward market price in an energy market based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing Internet of Things data sources and executes a cryptocurrency transaction based on the forward market prediction and having an expert system that predicts a forward market price in an energy market based on an understanding obtained by analyzing social network data sources and executes a transaction based on the forward market prediction. In embodiments, provided herein is a transaction-enabling system having an expert system that predicts a forward market price in a market based on an understanding obtained by analyzing Internet of Things data sources and executes a cryptocurrency transaction based on the forward market prediction and having an expert system that predicts a forward market price in a market for computing resources based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing Internet of Things data sources and executes a cryptocurrency transaction based on the forward market prediction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing Internet of Things data sources and executes a cryptocurrency transaction based on the forward market prediction and having an expert system that predicts a forward market price in a market for computing resources based on an understanding obtained by analyzing social network data sources and executes a transaction based on the forward market prediction. In embodiments, provided herein is a transaction-enabling system having an expert system that predicts a forward market price in a market based on an understanding obtained by analyzing Internet of Things data sources and executes a cryptocurrency transaction based on the forward market prediction and having an expert system that predicts a forward market price in a market for advertising based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing Internet of Things data sources and executes a cryptocurrency transaction based on the forward market prediction and having an expert system that predicts a forward market price in a market for advertising based on an understanding obtained by analyzing social network data sources and executes a transaction based on the forward market prediction. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market pricing of energy prices based on information collected from automated agent behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market pricing of network spectrum based on information collected from automated agent behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market pricing of energy credits based on information collected from automated agent behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market value of compute capability based on information collected from automated agent behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market pricing of energy prices based on information collected from business entity behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market pricing of network spectrum based on information collected from business entity behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market pricing of energy credits based on information collected from business entity behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market value of compute capability based on information collected from business entity behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market pricing of energy prices based on information collected from human behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market pricing of network spectrum based on information collected from human behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market pricing of energy credits based on information collected from human behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically forecasts forward market value of compute capability based on information collected from human behavioral data sources. In embodiments, provided herein is a transaction-enabling system having an expert system that predicts a forward market price in a market based on an understanding obtained by analyzing Internet of Things data sources and executes a cryptocurrency transaction based on the forward market prediction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in a market based on an understanding obtained by analyzing Internet of Things data sources and executes a cryptocurrency transaction based on the forward market prediction and having an intelligent agent that is configured to solicit the attention resources of another external intelligent agent. In embodiments, provided herein is a transaction-enabling system having an expert system that predicts a forward market price in a market based on an understanding obtained by analyzing Internet of Things data sources and executes a cryptocurrency transaction based on the forward market prediction and having a machine that automatically purchases attention resources in a forward market for attention. In embodiments, provided herein is a transaction-enabling system having an expert system that predicts a forward market price in a market based on an understanding obtained by analyzing Internet of Things data sources and executes a cryptocurrency transaction based on the forward market prediction and having a fleet of machines that automatically aggregate purchasing in a forward market for attention. In embodiments, provided herein is a transaction-enabling system having an expert system that predicts a forward market price in a market based on an understanding obtained by analyzing Internet of Things data sources and executes a cryptocurrency transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in a market based on an understanding obtained by analyzing Internet of Things data sources and executes a cryptocurrency transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in a market based on an understanding obtained by analyzing Internet of Things data sources and executes a cryptocurrency transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in a market based on an understanding obtained by analyzing Internet of Things data sources and executes a cryptocurrency transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that predicts a forward market price in a market based on an understanding obtained by analyzing Internet of Things data sources and executes a cryptocurrency transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in a market based on an understanding obtained by analyzing Internet of Things data sources and executes a cryptocurrency transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in a market based on an understanding obtained by analyzing Internet of Things data sources and executes a cryptocurrency transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in a market based on an understanding obtained by analyzing Internet of Things data sources and executes a cryptocurrency transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in a market based on an understanding obtained by analyzing Internet of Things data sources and executes a cryptocurrency transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in a market based on an understanding obtained by analyzing Internet of Things data sources and executes a cryptocurrency transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in a market based on an understanding obtained by analyzing Internet of Things data sources and executes a cryptocurrency transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in a market based on an understanding obtained by analyzing Internet of Things data sources and executes a cryptocurrency transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in a market based on an understanding obtained by analyzing Internet of Things data sources and executes a cryptocurrency transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in a market based on an understanding obtained by analyzing Internet of Things data sources and executes a cryptocurrency transaction based on the forward market prediction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that predicts a forward market price in a market based on an understanding obtained by analyzing social network data sources and executes a cryptocurrency transaction based on the forward market prediction. In embodiments, provided herein is a transaction-enabling system having an expert system that predicts a forward market price in a market based on an understanding obtained by analyzing social network data sources and executes a cryptocurrency transaction based on the forward market prediction and having an expert system that predicts a forward market price in an energy market based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing social network data sources and executes a cryptocurrency transaction based on the forward market prediction and having an expert system that predicts a forward market price in an energy market based on an understanding obtained by analyzing social network data sources and executes a transaction based on the forward market prediction. In embodiments, provided herein is a transaction-enabling system having an expert system that predicts a forward market price in a market based on an understanding obtained by analyzing social network data sources and executes a cryptocurrency transaction based on the forward market prediction and having an expert system that predicts a forward market price in a market for computing resources based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing social network data sources and executes a cryptocurrency transaction based on the forward market prediction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing social network data sources and executes a cryptocurrency transaction based on the forward market prediction and having an expert system that predicts a forward market price in a market for computing resources based on an understanding obtained by analyzing social network data sources and executes a transaction based on the forward market prediction. In embodiments, provided herein is a transaction-enabling system having an expert system that predicts a forward market price in a market based on an understanding obtained by analyzing social network data sources and executes a cryptocurrency transaction based on the forward market prediction and having an expert system that predicts a forward market price in a market for advertising based on an understanding obtained by analyzing Internet of Things data sources and executes a transaction based on the forward market prediction. In embodiments, provided herein is a transaction-enabling system having an expert system that predicts a forward market price in a market based on an understanding obtained by analyzing social network data sources and executes a cryptocurrency transaction based on the forward market prediction and having an expert system that predicts a forward market price in a market for advertising based on an understanding obtained by analyzing social network data sources and executes a transaction based on the forward market prediction. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market pricing of energy prices based on information collected from automated agent behavioral data sources. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market pricing of network spectrum based on information collected from automated agent behavioral data sources. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market pricing of energy credits based on information collected from automated agent behavioral data sources. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market value of compute capability based on information collected from automated agent behavioral data sources. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market pricing of energy prices based on information collected from business entity behavioral data sources. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market pricing of network spectrum based on information collected from business entity behavioral data sources. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market pricing of energy credits based on information collected from business entity behavioral data sources. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market value of compute capability based on information collected from business entity behavioral data sources. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market pricing of energy prices based on information collected from human behavioral data sources. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market pricing of network spectrum based on information collected from human behavioral data sources. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market pricing of energy credits based on information collected from human behavioral data sources. In embodiments, provided herein is a transaction-enabling system having an expert system that predicts a forward market price in a market based on an understanding obtained by analyzing social network data sources and executes a cryptocurrency transaction based on the forward market prediction and having a machine that automatically forecasts forward market value of compute capability based on information collected from human behavioral data sources. In embodiments, provided herein is a transaction-enabling system having an expert system that predicts a forward market price in a market based on an understanding obtained by analyzing social network data sources and executes a cryptocurrency transaction based on the forward market prediction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in a market based on an understanding obtained by analyzing social network data sources and executes a cryptocurrency transaction based on the forward market prediction and having an intelligent agent that is configured to solicit the attention resources of another external intelligent agent. In embodiments, provided herein is a transaction-enabling system having an expert system that predicts a forward market price in a market based on an understanding obtained by analyzing social network data sources and executes a cryptocurrency transaction based on the forward market prediction and having a machine that automatically purchases attention resources in a forward market for attention. In embodiments, provided herein is a transaction-enabling system having an expert system that predicts a forward market price in a market based on an understanding obtained by analyzing social network data sources and executes a cryptocurrency transaction based on the forward market prediction and having a fleet of machines that automatically aggregate purchasing in a forward market for attention. In embodiments, provided herein is a transaction-enabling system having an expert system that predicts a forward market price in a market based on an understanding obtained by analyzing social network data sources and executes a cryptocurrency transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in a market based on an understanding obtained by analyzing social network data sources and executes a cryptocurrency transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in a market based on an understanding obtained by analyzing social network data sources and executes a cryptocurrency transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in a market based on an understanding obtained by analyzing social network data sources and executes a cryptocurrency transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that predicts a forward market price in a market based on an understanding obtained by analyzing social network data sources and executes a cryptocurrency transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in a market based on an understanding obtained by analyzing social network data sources and executes a cryptocurrency transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in a market based on an understanding obtained by analyzing social network data sources and executes a cryptocurrency transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in a market based on an understanding obtained by analyzing social network data sources and executes a cryptocurrency transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in a market based on an understanding obtained by analyzing social network data sources and executes a cryptocurrency transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in a market based on an understanding obtained by analyzing social network data sources and executes a cryptocurrency transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in a market based on an understanding obtained by analyzing social network data sources and executes a cryptocurrency transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in a market based on an understanding obtained by analyzing social network data sources and executes a cryptocurrency transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in a market based on an understanding obtained by analyzing social network data sources and executes a cryptocurrency transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in a market based on an understanding obtained by analyzing social network data sources and executes a cryptocurrency transaction based on the forward market prediction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that predicts a forward market price in an energy market based on an understanding obtained by analyzing Internet of Things data sources and executes a transaction based on the forward market prediction. In embodiments, provided herein is a transaction-enabling system having an expert system that predicts a forward market price in an energy market based on an understanding obtained by analyzing Internet of Things data sources and executes a transaction based on the forward market prediction and having an expert system that predicts a forward market price in an energy market based on an understanding obtained by analyzing social network data sources and executes a transaction based on the forward market prediction. In embodiments, provided herein is a transaction-enabling system having an expert system that predicts a forward market price in an energy market based on an understanding obtained by analyzing Internet of Things data sources and executes a transaction based on the forward market prediction and having an expert system that predicts a forward market price in a market for computing resources based on an understanding obtained by analyzing Internet of Things data sources and executes a transaction based on the forward market prediction. In embodiments, provided herein is a transaction-enabling system having an expert system that predicts a forward market price in an energy market based on an understanding obtained by analyzing Internet of Things data sources and executes a transaction based on the forward market prediction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that predicts a forward market price in an energy market based on an understanding obtained by analyzing Internet of Things data sources and executes a transaction based on the forward market prediction and having an expert system that predicts a forward market price in a market for computing resources based on an understanding obtained by analyzing social network data sources and executes a transaction based on the forward market prediction. In embodiments, provided herein is a transaction-enabling system having an expert system that predicts a forward market price in an energy market based on an understanding obtained by analyzing Internet of Things data sources and executes a transaction based on the forward market prediction and having an expert system that predicts a forward market price in a market for advertising based on an understanding obtained by analyzing Internet of Things data sources and executes a transaction based on the forward market prediction. In embodiments, provided herein is a transaction-enabling system having an expert system that predicts a forward market price in an energy market based on an understanding obtained by analyzing Internet of Things data sources and executes a transaction based on the forward market prediction and having an expert system that predicts a forward market price in a market for advertising based on an understanding obtained by analyzing social network data sources and executes a transaction based on the forward market prediction. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market pricing of energy prices based on information collected from automated agent behavioral data sources. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market pricing of network spectrum based on information collected from automated agent behavioral data sources. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market pricing of energy credits based on information collected from automated agent behavioral data sources. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market value of compute capability based on information collected from automated agent behavioral data sources. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market pricing of energy prices based on information collected from business entity behavioral data sources. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market pricing of network spectrum based on information collected from business entity behavioral data sources. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market pricing of energy credits based on information collected from business entity behavioral data sources. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market value of compute capability based on information collected from business entity behavioral data sources. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market pricing of energy prices based on information collected from human behavioral data sources. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market pricing of network spectrum based on information collected from human behavioral data sources. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market pricing of energy credits based on information collected from human behavioral data sources. In embodiments, provided herein is a transaction-enabling system having an expert system that predicts a forward market price in an energy market based on an understanding obtained by analyzing Internet of Things data sources and executes a transaction based on the forward market prediction and having a machine that automatically forecasts forward market value of compute capability based on information collected from human behavioral data sources. In embodiments, provided herein is a transaction-enabling system having an expert system that predicts a forward market price in an energy market based on an understanding obtained by analyzing Internet of Things data sources and executes a transaction based on the forward market prediction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in an energy market based on an understanding obtained by analyzing Internet of Things data sources and executes a transaction based on the forward market prediction and having an intelligent agent that is configured to solicit the attention resources of another external intelligent agent. In embodiments, provided herein is a transaction-enabling system having an expert system that predicts a forward market price in an energy market based on an understanding obtained by analyzing Internet of Things data sources and executes a transaction based on the forward market prediction and having a machine that automatically purchases attention resources in a forward market for attention. In embodiments, provided herein is a transaction-enabling system having an expert system that predicts a forward market price in an energy market based on an understanding obtained by analyzing Internet of Things data sources and executes a transaction based on the forward market prediction and having a fleet of machines that automatically aggregate purchasing in a forward market for attention. In embodiments, provided herein is a transaction-enabling system having an expert system that predicts a forward market price in an energy market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in an energy market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in an energy market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in an energy market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that predicts a forward market price in an energy market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in an energy market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in an energy market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in an energy market based on an understanding obtained by analyzing Internet of Things data sources and executes a transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in an energy market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in an energy market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in an energy market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in an energy market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in an energy market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in an energy market based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that predicts a forward market price in an energy market based on an understanding obtained by analyzing social network data sources and executes a transaction based on the forward market prediction. In embodiments, provided herein is a transaction-enabling system having an expert system that predicts a forward market price in an energy market based on an understanding obtained by analyzing social network data sources and executes a transaction based on the forward market prediction and having an expert system that predicts a forward market price in a market for computing resources based on an understanding obtained by analyzing Internet of Things data sources and executes a transaction based on the forward market prediction. In embodiments, provided herein is a transaction-enabling system having an expert system that predicts a forward market price in an energy market based on an understanding obtained by analyzing social network data sources and executes a transaction based on the forward market prediction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that predicts a forward market price in an energy market based on an understanding obtained by analyzing social network data sources and executes a transaction based on the forward market prediction and having an expert system that predicts a forward market price in a market for computing resources based on an understanding obtained by analyzing social network data sources and executes a transaction based on the forward market prediction. In embodiments, provided herein is a transaction-enabling system having an expert system that predicts a forward market price in an energy market based on an understanding obtained by analyzing social network data sources and executes a transaction based on the forward market prediction and having an expert system that predicts a forward market price in a market for advertising based on an understanding obtained by analyzing Internet of Things data sources and executes a transaction based on the forward market prediction. In embodiments, provided herein is a transaction-enabling system having an expert system that predicts a forward market price in an energy market based on an understanding obtained by analyzing social network data sources and executes a transaction based on the forward market prediction and having an expert system that predicts a forward market price in a market for advertising based on an understanding obtained by analyzing social network data sources and executes a transaction based on the forward market prediction. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market pricing of energy prices based on information collected from automated agent behavioral data sources. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market pricing of network spectrum based on information collected from automated agent behavioral data sources. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market pricing of energy credits based on information collected from automated agent behavioral data sources. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market value of compute capability based on information collected from automated agent behavioral data sources. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market pricing of energy prices based on information collected from business entity behavioral data sources. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market pricing of network spectrum based on information collected from business entity behavioral data sources. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market pricing of energy credits based on information collected from business entity behavioral data sources. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market value of compute capability based on information collected from business entity behavioral data sources. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market pricing of energy prices based on information collected from human behavioral data sources. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market pricing of network spectrum based on information collected from human behavioral data sources. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market pricing of energy credits based on information collected from human behavioral data sources. In embodiments, provided herein is a transaction-enabling system having an expert system that predicts a forward market price in an energy market based on an understanding obtained by analyzing social network data sources and executes a transaction based on the forward market prediction and having a machine that automatically forecasts forward market value of compute capability based on information collected from human behavioral data sources. In embodiments, provided herein is a transaction-enabling system having an expert system that predicts a forward market price in an energy market based on an understanding obtained by analyzing social network data sources and executes a transaction based on the forward market prediction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in an energy market based on an understanding obtained by analyzing social network data sources and executes a transaction based on the forward market prediction and having an intelligent agent that is configured to solicit the attention resources of another external intelligent agent. In embodiments, provided herein is a transaction-enabling system having an expert system that predicts a forward market price in an energy market based on an understanding obtained by analyzing social network data sources and executes a transaction based on the forward market prediction and having a machine that automatically purchases attention resources in a forward market for attention. In embodiments, provided herein is a transaction-enabling system having an expert system that predicts a forward market price in an energy market based on an understanding obtained by analyzing social network data sources and executes a transaction based on the forward market prediction and having a fleet of machines that automatically aggregate purchasing in a forward market for attention. In embodiments, provided herein is a transaction-enabling system having an expert system that predicts a forward market price in an energy market based on an understanding obtained by analyzing social network data sources and executes a transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in an energy market based on an understanding obtained by analyzing social network data sources and executes a transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in an energy market based on an understanding obtained by analyzing social network data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in an energy market based on an understanding obtained by analyzing social network data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that predicts a forward market price in an energy market based on an understanding obtained by analyzing social network data sources and executes a transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in an energy market based on an understanding obtained by analyzing social network data sources and executes a transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in an energy market based on an understanding obtained by analyzing social network data sources and executes a transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in an energy market based on an understanding obtained by analyzing social network data sources and executes a transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in an energy market based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in an energy market based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in an energy market based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in an energy market based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in an energy market based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in an energy market based on an understanding obtained by analyzing social network data sources and executes a transaction based on the forward market prediction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that predicts a forward market price in a market for computing resources based on an understanding obtained by analyzing Internet of Things data sources and executes a transaction based on the forward market prediction. In embodiments, provided herein is a transaction-enabling system having an expert system that predicts a forward market price in a market for computing resources based on an understanding obtained by analyzing Internet of Things data sources and executes a transaction based on the forward market prediction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that predicts a forward market price in a market for computing resources based on an understanding obtained by analyzing Internet of Things data sources and executes a transaction based on the forward market prediction and having an expert system that predicts a forward market price in a market for computing resources based on an understanding obtained by analyzing social network data sources and executes a transaction based on the forward market prediction. In embodiments, provided herein is a transaction-enabling system having an expert system that predicts a forward market price in a market for computing resources based on an understanding obtained by analyzing Internet of Things data sources and executes a transaction based on the forward market prediction and having an expert system that predicts a forward market price in a market for advertising based on an understanding obtained by analyzing Internet of Things data sources and executes a transaction based on the forward market prediction. In embodiments, provided herein is a transaction-enabling system having an expert system that predicts a forward market price in a market for computing resources based on an understanding obtained by analyzing Internet of Things data sources and executes a transaction based on the forward market prediction and having an expert system that predicts a forward market price in a market for advertising based on an understanding obtained by analyzing social network data sources and executes a transaction based on the forward market prediction. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market pricing of energy prices based on information collected from automated agent behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market pricing of network spectrum based on information collected from automated agent behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market pricing of energy credits based on information collected from automated agent behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market value of compute capability based on information collected from automated agent behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market pricing of energy prices based on information collected from business entity behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market pricing of network spectrum based on information collected from business entity behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market pricing of energy credits based on information collected from business entity behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market value of compute capability based on information collected from business entity behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market pricing of energy prices based on information collected from human behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market pricing of network spectrum based on information collected from human behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market pricing of energy credits based on information collected from human behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically forecasts forward market value of compute capability based on information collected from human behavioral data sources. In embodiments, provided herein is a transaction-enabling system having an expert system that predicts a forward market price in a market for computing resources based on an understanding obtained by analyzing Internet of Things data sources and executes a transaction based on the forward market prediction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in a market for computing resources based on an understanding obtained by analyzing Internet of Things data sources and executes a transaction based on the forward market prediction and having an intelligent agent that is configured to solicit the attention resources of another external intelligent agent. In embodiments, provided herein is a transaction-enabling system having an expert system that predicts a forward market price in a market for computing resources based on an understanding obtained by analyzing Internet of Things data sources and executes a transaction based on the forward market prediction and having a machine that automatically purchases attention resources in a forward market for attention. In embodiments, provided herein is a transaction-enabling system having an expert system that predicts a forward market price in a market for computing resources based on an understanding obtained by analyzing Internet of Things data sources and executes a transaction based on the forward market prediction and having a fleet of machines that automatically aggregate purchasing in a forward market for attention. In embodiments, provided herein is a transaction-enabling system having an expert system that predicts a forward market price in a market for computing resources based on an understanding obtained by analyzing Internet of Things data sources and executes a transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in a market for computing resources based on an understanding obtained by analyzing Internet of Things data sources and executes a transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in a market for computing resources based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in a market for computing resources based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that predicts a forward market price in a market for computing resources based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in a market for computing resources based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in a market for computing resources based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in a market for computing resources based on an understanding obtained by analyzing Internet of Things data sources and executes a transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in a market for computing resources based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in a market for computing resources based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in a market for computing resources based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in a market for computing resources based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in a market for computing resources based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in a market for computing resources based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having an expert system that predicts a forward market price in a market for computing resources based on an understanding obtained by analyzing social network data sources and executes a transaction based on the forward market prediction. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having an expert system that predicts a forward market price in a market for advertising based on an understanding obtained by analyzing Internet of Things data sources and executes a transaction based on the forward market prediction. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having an expert system that predicts a forward market price in a market for advertising based on an understanding obtained by analyzing social network data sources and executes a transaction based on the forward market prediction. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market pricing of energy prices based on information collected from automated agent behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market pricing of network spectrum based on information collected from automated agent behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market pricing of energy credits based on information collected from automated agent behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market value of compute capability based on information collected from automated agent behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market pricing of energy prices based on information collected from business entity behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market pricing of network spectrum based on information collected from business entity behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market pricing of energy credits based on information collected from business entity behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market value of compute capability based on information collected from business entity behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market pricing of energy prices based on information collected from human behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market pricing of network spectrum based on information collected from human behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market pricing of energy credits based on information collected from human behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically forecasts forward market value of compute capability based on information collected from human behavioral data sources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having an intelligent agent that is configured to solicit the attention resources of another external intelligent agent. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a machine that automatically purchases attention resources in a forward market for attention. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a fleet of machines that automatically aggregate purchasing in a forward market for attention. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in a market for spectrum or network bandwidth based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that predicts a forward market price in a market for computing resources based on an understanding obtained by analyzing social network data sources and executes a transaction based on the forward market prediction. In embodiments, provided herein is a transaction-enabling system having an expert system that predicts a forward market price in a market for computing resources based on an understanding obtained by analyzing social network data sources and executes a transaction based on the forward market prediction and having an expert system that predicts a forward market price in a market for advertising based on an understanding obtained by analyzing Internet of Things data sources and executes a transaction based on the forward market prediction. In embodiments, provided herein is a transaction-enabling system having an expert system that predicts a forward market price in a market for computing resources based on an understanding obtained by analyzing social network data sources and executes a transaction based on the forward market prediction and having an expert system that predicts a forward market price in a market for advertising based on an understanding obtained by analyzing social network data sources and executes a transaction based on the forward market prediction. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market pricing of energy prices based on information collected from automated agent behavioral data sources. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market pricing of network spectrum based on information collected from automated agent behavioral data sources. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market pricing of energy credits based on information collected from automated agent behavioral data sources. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market value of compute capability based on information collected from automated agent behavioral data sources. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market pricing of energy prices based on information collected from business entity behavioral data sources. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market pricing of network spectrum based on information collected from business entity behavioral data sources. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market pricing of energy credits based on information collected from business entity behavioral data sources. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market value of compute capability based on information collected from business entity behavioral data sources. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market pricing of energy prices based on information collected from human behavioral data sources. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market pricing of network spectrum based on information collected from human behavioral data sources. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market pricing of energy credits based on information collected from human behavioral data sources. In embodiments, provided herein is a transaction-enabling system having an expert system that predicts a forward market price in a market for computing resources based on an understanding obtained by analyzing social network data sources and executes a transaction based on the forward market prediction and having a machine that automatically forecasts forward market value of compute capability based on information collected from human behavioral data sources. In embodiments, provided herein is a transaction-enabling system having an expert system that predicts a forward market price in a market for computing resources based on an understanding obtained by analyzing social network data sources and executes a transaction based on the forward market prediction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in a market for computing resources based on an understanding obtained by analyzing social network data sources and executes a transaction based on the forward market prediction and having an intelligent agent that is configured to solicit the attention resources of another external intelligent agent. In embodiments, provided herein is a transaction-enabling system having an expert system that predicts a forward market price in a market for computing resources based on an understanding obtained by analyzing social network data sources and executes a transaction based on the forward market prediction and having a machine that automatically purchases attention resources in a forward market for attention. In embodiments, provided herein is a transaction-enabling system having an expert system that predicts a forward market price in a market for computing resources based on an understanding obtained by analyzing social network data sources and executes a transaction based on the forward market prediction and having a fleet of machines that automatically aggregate purchasing in a forward market for attention. In embodiments, provided herein is a transaction-enabling system having an expert system that predicts a forward market price in a market for computing resources based on an understanding obtained by analyzing social network data sources and executes a transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in a market for computing resources based on an understanding obtained by analyzing social network data sources and executes a transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in a market for computing resources based on an understanding obtained by analyzing social network data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in a market for computing resources based on an understanding obtained by analyzing social network data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that predicts a forward market price in a market for computing resources based on an understanding obtained by analyzing social network data sources and executes a transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in a market for computing resources based on an understanding obtained by analyzing social network data sources and executes a transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in a market for computing resources based on an understanding obtained by analyzing social network data sources and executes a transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in a market for computing resources based on an understanding obtained by analyzing social network data sources and executes a transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in a market for computing resources based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in a market for computing resources based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in a market for computing resources based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in a market for computing resources based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in a market for computing resources based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in a market for computing resources based on an understanding obtained by analyzing social network data sources and executes a transaction based on the forward market prediction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that predicts a forward market price in a market for advertising based on an understanding obtained by analyzing Internet of Things data sources and executes a transaction based on the forward market prediction. In embodiments, provided herein is a transaction-enabling system having an expert system that predicts a forward market price in a market for advertising based on an understanding obtained by analyzing Internet of Things data sources and executes a transaction based on the forward market prediction and having an expert system that predicts a forward market price in a market for advertising based on an understanding obtained by analyzing social network data sources and executes a transaction based on the forward market prediction. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market pricing of energy prices based on information collected from automated agent behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market pricing of network spectrum based on information collected from automated agent behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market pricing of energy credits based on information collected from automated agent behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market value of compute capability based on information collected from automated agent behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market pricing of energy prices based on information collected from business entity behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market pricing of network spectrum based on information collected from business entity behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market pricing of energy credits based on information collected from business entity behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market value of compute capability based on information collected from business entity behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market pricing of energy prices based on information collected from human behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market pricing of network spectrum based on information collected from human behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market pricing of energy credits based on information collected from human behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically forecasts forward market value of compute capability based on information collected from human behavioral data sources. In embodiments, provided herein is a transaction-enabling system having an expert system that predicts a forward market price in a market for advertising based on an understanding obtained by analyzing Internet of Things data sources and executes a transaction based on the forward market prediction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in a market for advertising based on an understanding obtained by analyzing Internet of Things data sources and executes a transaction based on the forward market prediction and having an intelligent agent that is configured to solicit the attention resources of another external intelligent agent. In embodiments, provided herein is a transaction-enabling system having an expert system that predicts a forward market price in a market for advertising based on an understanding obtained by analyzing Internet of Things data sources and executes a transaction based on the forward market prediction and having a machine that automatically purchases attention resources in a forward market for attention. In embodiments, provided herein is a transaction-enabling system having an expert system that predicts a forward market price in a market for advertising based on an understanding obtained by analyzing Internet of Things data sources and executes a transaction based on the forward market prediction and having a fleet of machines that automatically aggregate purchasing in a forward market for attention. In embodiments, provided herein is a transaction-enabling system having an expert system that predicts a forward market price in a market for advertising based on an understanding obtained by analyzing Internet of Things data sources and executes a transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in a market for advertising based on an understanding obtained by analyzing Internet of Things data sources and executes a transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in a market for advertising based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in a market for advertising based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that predicts a forward market price in a market for advertising based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in a market for advertising based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in a market for advertising based on an understanding obtained by analyzing Internet of Things data sources and executes a transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in a market for advertising based on an understanding obtained by analyzing Internet of Things data sources and executes a transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in a market for advertising based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in a market for advertising based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in a market for advertising based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in a market for advertising based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in a market for advertising based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in a market for advertising based on an understanding obtained by analyzing Internet of Things data sources and executes a transaction based on the forward market prediction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that predicts a forward market price in a market for advertising based on an understanding obtained by analyzing social network data sources and executes a transaction based on the forward market prediction. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market pricing of energy prices based on information collected from automated agent behavioral data sources. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market pricing of network spectrum based on information collected from automated agent behavioral data sources. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market pricing of energy credits based on information collected from automated agent behavioral data sources. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market value of compute capability based on information collected from automated agent behavioral data sources. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market pricing of energy prices based on information collected from business entity behavioral data sources. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market pricing of network spectrum based on information collected from business entity behavioral data sources. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market pricing of energy credits based on information collected from business entity behavioral data sources. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market value of compute capability based on information collected from business entity behavioral data sources. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market pricing of energy prices based on information collected from human behavioral data sources. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market pricing of network spectrum based on information collected from human behavioral data sources. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market pricing of energy credits based on information collected from human behavioral data sources. In embodiments, provided herein is a transaction-enabling system having an expert system that predicts a forward market price in a market for advertising based on an understanding obtained by analyzing social network data sources and executes a transaction based on the forward market prediction and having a machine that automatically forecasts forward market value of compute capability based on information collected from human behavioral data sources. In embodiments, provided herein is a transaction-enabling system having an expert system that predicts a forward market price in a market for advertising based on an understanding obtained by analyzing social network data sources and executes a transaction based on the forward market prediction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in a market for advertising based on an understanding obtained by analyzing social network data sources and executes a transaction based on the forward market prediction and having an intelligent agent that is configured to solicit the attention resources of another external intelligent agent. In embodiments, provided herein is a transaction-enabling system having an expert system that predicts a forward market price in a market for advertising based on an understanding obtained by analyzing social network data sources and executes a transaction based on the forward market prediction and having a machine that automatically purchases attention resources in a forward market for attention. In embodiments, provided herein is a transaction-enabling system having an expert system that predicts a forward market price in a market for advertising based on an understanding obtained by analyzing social network data sources and executes a transaction based on the forward market prediction and having a fleet of machines that automatically aggregate purchasing in a forward market for attention. In embodiments, provided herein is a transaction-enabling system having an expert system that predicts a forward market price in a market for advertising based on an understanding obtained by analyzing social network data sources and executes a transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in a market for advertising based on an understanding obtained by analyzing social network data sources and executes a transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in a market for advertising based on an understanding obtained by analyzing social network data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in a market for advertising based on an understanding obtained by analyzing social network data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs.

In embodiments, provided herein is a transaction-enabling system having an expert system that predicts a forward market price in a market for advertising based on an understanding obtained by analyzing social network data sources and executes a transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in a market for advertising based on an understanding obtained by analyzing social network data sources and executes a transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in a market for advertising based on an understanding obtained by analyzing social network data sources and executes a transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in a market for advertising based on an understanding obtained by analyzing social network data sources and executes a transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in a market for advertising based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in a market for advertising based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in a market for advertising based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in a market for advertising based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in a market for advertising based on an understanding obtained by analyzing social network data sources and executes a transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in a market for advertising based on an understanding obtained by analyzing social network data sources and executes a transaction based on the forward market prediction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of energy prices based on information collected from automated agent behavioral data sources. In embodiments, provided herein is a transaction-enabling system having a machine that automatically forecasts forward market pricing of energy prices based on information collected from automated agent behavioral data sources and having a machine that automatically forecasts forward market pricing of network spectrum based on information collected from automated agent behavioral data sources. In embodiments, provided herein is a transaction-enabling system having a machine that automatically forecasts forward market pricing of energy prices based on information collected from automated agent behavioral data sources and having a machine that automatically forecasts forward market pricing of energy credits based on information collected from automated agent behavioral data sources. In embodiments, provided herein is a transaction-enabling system having a machine that automatically forecasts forward market pricing of energy prices based on information collected from automated agent behavioral data sources and having a machine that automatically forecasts forward market value of compute capability based on information collected from automated agent behavioral data sources. In embodiments, provided herein is a transaction-enabling system having a machine that automatically forecasts forward market pricing of energy prices based on information collected from automated agent behavioral data sources and having a machine that automatically forecasts forward market pricing of energy prices based on information collected from business entity behavioral data sources. In embodiments, provided herein is a transaction-enabling system having a machine that automatically forecasts forward market pricing of energy prices based on information collected from automated agent behavioral data sources and having a machine that automatically forecasts forward market pricing of network spectrum based on information collected from business entity behavioral data sources. In embodiments, provided herein is a transaction-enabling system having a machine that automatically forecasts forward market pricing of energy prices based on information collected from automated agent behavioral data sources and having a machine that automatically forecasts forward market pricing of energy credits based on information collected from business entity behavioral data sources. In embodiments, provided herein is a transaction-enabling system having a machine that automatically forecasts forward market pricing of energy prices based on information collected from automated agent behavioral data sources and having a machine that automatically forecasts forward market value of compute capability based on information collected from business entity behavioral data sources. In embodiments, provided herein is a transaction-enabling system having a machine that automatically forecasts forward market pricing of energy prices based on information collected from automated agent behavioral data sources and having a machine that automatically forecasts forward market pricing of energy prices based on information collected from human behavioral data sources. In embodiments, provided herein is a transaction-enabling system having a machine that automatically forecasts forward market pricing of energy prices based on information collected from automated agent behavioral data sources and having a machine that automatically forecasts forward market pricing of network spectrum based on information collected from human behavioral data sources. In embodiments, provided herein is a transaction-enabling system having a machine that automatically forecasts forward market pricing of energy prices based on information collected from automated agent behavioral data sources and having a machine that automatically forecasts forward market pricing of energy credits based on information collected from human behavioral data sources. In embodiments, provided herein is a transaction-enabling system having a machine that automatically forecasts forward market pricing of energy prices based on information collected from automated agent behavioral data sources and having a machine that automatically forecasts forward market value of compute capability based on information collected from human behavioral data sources. In embodiments, provided herein is a transaction-enabling system having a machine that automatically forecasts forward market pricing of energy prices based on information collected from automated agent behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of energy prices based on information collected from automated agent behavioral data sources and having an intelligent agent that is configured to solicit the attention resources of another external intelligent agent. In embodiments, provided herein is a transaction-enabling system having a machine that automatically forecasts forward market pricing of energy prices based on information collected from automated agent behavioral data sources and having a machine that automatically purchases attention resources in a forward market for attention. In embodiments, provided herein is a transaction-enabling system having a machine that automatically forecasts forward market pricing of energy prices based on information collected from automated agent behavioral data sources and having a fleet of machines that automatically aggregate purchasing in a forward market for attention. In embodiments, provided herein is a transaction-enabling system having a machine that automatically forecasts forward market pricing of energy prices based on information collected from automated agent behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of energy prices based on information collected from automated agent behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of energy prices based on information collected from automated agent behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of energy prices based on information collected from automated agent behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of energy prices based on information collected from automated agent behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of energy prices based on information collected from automated agent behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of energy prices based on information collected from automated agent behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of energy prices based on information collected from automated agent behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of energy prices based on information collected from automated agent behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of energy prices based on information collected from automated agent behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of energy prices based on information collected from automated agent behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of energy prices based on information collected from automated agent behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of energy prices based on information collected from automated agent behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of energy prices based on information collected from automated agent behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of network spectrum based on information collected from automated agent behavioral data sources. In embodiments, provided herein is a transaction-enabling system having a machine that automatically forecasts forward market pricing of network spectrum based on information collected from automated agent behavioral data sources and having a machine that automatically forecasts forward market pricing of energy credits based on information collected from automated agent behavioral data sources. In embodiments, provided herein is a transaction-enabling system having a machine that automatically forecasts forward market pricing of network spectrum based on information collected from automated agent behavioral data sources and having a machine that automatically forecasts forward market value of compute capability based on information collected from automated agent behavioral data sources. In embodiments, provided herein is a transaction-enabling system having a machine that automatically forecasts forward market pricing of network spectrum based on information collected from automated agent behavioral data sources and having a machine that automatically forecasts forward market pricing of energy prices based on information collected from business entity behavioral data sources. In embodiments, provided herein is a transaction-enabling system having a machine that automatically forecasts forward market pricing of network spectrum based on information collected from automated agent behavioral data sources and having a machine that automatically forecasts forward market pricing of network spectrum based on information collected from business entity behavioral data sources. In embodiments, provided herein is a transaction-enabling system having a machine that automatically forecasts forward market pricing of network spectrum based on information collected from automated agent behavioral data sources and having a machine that automatically forecasts forward market pricing of energy credits based on information collected from business entity behavioral data sources. In embodiments, provided herein is a transaction-enabling system having a machine that automatically forecasts forward market pricing of network spectrum based on information collected from automated agent behavioral data sources and having a machine that automatically forecasts forward market value of compute capability based on information collected from business entity behavioral data sources. In embodiments, provided herein is a transaction-enabling system having a machine that automatically forecasts forward market pricing of network spectrum based on information collected from automated agent behavioral data sources and having a machine that automatically forecasts forward market pricing of energy prices based on information collected from human behavioral data sources. In embodiments, provided herein is a transaction-enabling system having a machine that automatically forecasts forward market pricing of network spectrum based on information collected from automated agent behavioral data sources and having a machine that automatically forecasts forward market pricing of network spectrum based on information collected from human behavioral data sources. In embodiments, provided herein is a transaction-enabling system having a machine that automatically forecasts forward market pricing of network spectrum based on information collected from automated agent behavioral data sources and having a machine that automatically forecasts forward market pricing of energy credits based on information collected from human behavioral data sources. In embodiments, provided herein is a transaction-enabling system having a machine that automatically forecasts forward market pricing of network spectrum based on information collected from automated agent behavioral data sources and having a machine that automatically forecasts forward market value of compute capability based on information collected from human behavioral data sources. In embodiments, provided herein is a transaction-enabling system having a machine that automatically forecasts forward market pricing of network spectrum based on information collected from automated agent behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of network spectrum based on information collected from automated agent behavioral data sources and having an intelligent agent that is configured to solicit the attention resources of another external intelligent agent. In embodiments, provided herein is a transaction-enabling system having a machine that automatically forecasts forward market pricing of network spectrum based on information collected from automated agent behavioral data sources and having a machine that automatically purchases attention resources in a forward market for attention. In embodiments, provided herein is a transaction-enabling system having a machine that automatically forecasts forward market pricing of network spectrum based on information collected from automated agent behavioral data sources and having a fleet of machines that automatically aggregate purchasing in a forward market for attention. In embodiments, provided herein is a transaction-enabling system having a machine that automatically forecasts forward market pricing of network spectrum based on information collected from automated agent behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of network spectrum based on information collected from automated agent behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of network spectrum based on information collected from automated agent behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of network spectrum based on information collected from automated agent behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of network spectrum based on information collected from automated agent behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of network spectrum based on information collected from automated agent behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of network spectrum based on information collected from automated agent behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of network spectrum based on information collected from automated agent behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of network spectrum based on information collected from automated agent behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of network spectrum based on information collected from automated agent behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of network spectrum based on information collected from automated agent behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of network spectrum based on information collected from automated agent behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of network spectrum based on information collected from automated agent behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of network spectrum based on information collected from automated agent behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of energy credits based on information collected from automated agent behavioral data sources. In embodiments, provided herein is a transaction-enabling system having a machine that automatically forecasts forward market pricing of energy credits based on information collected from automated agent behavioral data sources and having a machine that automatically forecasts forward market value of compute capability based on information collected from automated agent behavioral data sources. In embodiments, provided herein is a transaction-enabling system having a machine that automatically forecasts forward market pricing of energy credits based on information collected from automated agent behavioral data sources and having a machine that automatically forecasts forward market pricing of energy prices based on information collected from business entity behavioral data sources. In embodiments, provided herein is a transaction-enabling system having a machine that automatically forecasts forward market pricing of energy credits based on information collected from automated agent behavioral data sources and having a machine that automatically forecasts forward market pricing of network spectrum based on information collected from business entity behavioral data sources. In embodiments, provided herein is a transaction-enabling system having a machine that automatically forecasts forward market pricing of energy credits based on information collected from automated agent behavioral data sources and having a machine that automatically forecasts forward market pricing of energy credits based on information collected from business entity behavioral data sources. In embodiments, provided herein is a transaction-enabling system having a machine that automatically forecasts forward market pricing of energy credits based on information collected from automated agent behavioral data sources and having a machine that automatically forecasts forward market value of compute capability based on information collected from business entity behavioral data sources. In embodiments, provided herein is a transaction-enabling system having a machine that automatically forecasts forward market pricing of energy credits based on information collected from automated agent behavioral data sources and having a machine that automatically forecasts forward market pricing of energy prices based on information collected from human behavioral data sources. In embodiments, provided herein is a transaction-enabling system having a machine that automatically forecasts forward market pricing of energy credits based on information collected from automated agent behavioral data sources and having a machine that automatically forecasts forward market pricing of network spectrum based on information collected from human behavioral data sources. In embodiments, provided herein is a transaction-enabling system having a machine that automatically forecasts forward market pricing of energy credits based on information collected from automated agent behavioral data sources and having a machine that automatically forecasts forward market pricing of energy credits based on information collected from human behavioral data sources. In embodiments, provided herein is a transaction-enabling system having a machine that automatically forecasts forward market pricing of energy credits based on information collected from automated agent behavioral data sources and having a machine that automatically forecasts forward market value of compute capability based on information collected from human behavioral data sources. In embodiments, provided herein is a transaction-enabling system having a machine that automatically forecasts forward market pricing of energy credits based on information collected from automated agent behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of energy credits based on information collected from automated agent behavioral data sources and having an intelligent agent that is configured to solicit the attention resources of another external intelligent agent. In embodiments, provided herein is a transaction-enabling system having a machine that automatically forecasts forward market pricing of energy credits based on information collected from automated agent behavioral data sources and having a machine that automatically purchases attention resources in a forward market for attention. In embodiments, provided herein is a transaction-enabling system having a machine that automatically forecasts forward market pricing of energy credits based on information collected from automated agent behavioral data sources and having a fleet of machines that automatically aggregate purchasing in a forward market for attention. In embodiments, provided herein is a transaction-enabling system having a machine that automatically forecasts forward market pricing of energy credits based on information collected from automated agent behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of energy credits based on information collected from automated agent behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of energy credits based on information collected from automated agent behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of energy credits based on information collected from automated agent behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of energy credits based on information collected from automated agent behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of energy credits based on information collected from automated agent behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of energy credits based on information collected from automated agent behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of energy credits based on information collected from automated agent behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of energy credits based on information collected from automated agent behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of energy credits based on information collected from automated agent behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of energy credits based on information collected from automated agent behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of energy credits based on information collected from automated agent behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of energy credits based on information collected from automated agent behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of energy credits based on information collected from automated agent behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market value of compute capability based on information collected from automated agent behavioral data sources. In embodiments, provided herein is a transaction-enabling system having a machine that automatically forecasts forward market value of compute capability based on information collected from automated agent behavioral data sources and having a machine that automatically forecasts forward market pricing of energy prices based on information collected from business entity behavioral data sources. In embodiments, provided herein is a transaction-enabling system having a machine that automatically forecasts forward market value of compute capability based on information collected from automated agent behavioral data sources and having a machine that automatically forecasts forward market pricing of network spectrum based on information collected from business entity behavioral data sources. In embodiments, provided herein is a transaction-enabling system having a machine that automatically forecasts forward market value of compute capability based on information collected from automated agent behavioral data sources and having a machine that automatically forecasts forward market pricing of energy credits based on information collected from business entity behavioral data sources. In embodiments, provided herein is a transaction-enabling system having a machine that automatically forecasts forward market value of compute capability based on information collected from automated agent behavioral data sources and having a machine that automatically forecasts forward market value of compute capability based on information collected from business entity behavioral data sources. In embodiments, provided herein is a transaction-enabling system having a machine that automatically forecasts forward market value of compute capability based on information collected from automated agent behavioral data sources and having a machine that automatically forecasts forward market pricing of energy prices based on information collected from human behavioral data sources. In embodiments, provided herein is a transaction-enabling system having a machine that automatically forecasts forward market value of compute capability based on information collected from automated agent behavioral data sources and having a machine that automatically forecasts forward market pricing of network spectrum based on information collected from human behavioral data sources. In embodiments, provided herein is a transaction-enabling system having a machine that automatically forecasts forward market value of compute capability based on information collected from automated agent behavioral data sources and having a machine that automatically forecasts forward market pricing of energy credits based on information collected from human behavioral data sources. In embodiments, provided herein is a transaction-enabling system having a machine that automatically forecasts forward market value of compute capability based on information collected from automated agent behavioral data sources and having a machine that automatically forecasts forward market value of compute capability based on information collected from human behavioral data sources. In embodiments, provided herein is a transaction-enabling system having a machine that automatically forecasts forward market value of compute capability based on information collected from automated agent behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market value of compute capability based on information collected from automated agent behavioral data sources and having an intelligent agent that is configured to solicit the attention resources of another external intelligent agent. In embodiments, provided herein is a transaction-enabling system having a machine that automatically forecasts forward market value of compute capability based on information collected from automated agent behavioral data sources and having a machine that automatically purchases attention resources in a forward market for attention. In embodiments, provided herein is a transaction-enabling system having a machine that automatically forecasts forward market value of compute capability based on information collected from automated agent behavioral data sources and having a fleet of machines that automatically aggregate purchasing in a forward market for attention. In embodiments, provided herein is a transaction-enabling system having a machine that automatically forecasts forward market value of compute capability based on information collected from automated agent behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market value of compute capability based on information collected from automated agent behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market value of compute capability based on information collected from automated agent behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market value of compute capability based on information collected from automated agent behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market value of compute capability based on information collected from automated agent behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market value of compute capability based on information collected from automated agent behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market value of compute capability based on information collected from automated agent behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market value of compute capability based on information collected from automated agent behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market value of compute capability based on information collected from automated agent behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market value of compute capability based on information collected from automated agent behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market value of compute capability based on information collected from automated agent behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market value of compute capability based on information collected from automated agent behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market value of compute capability based on information collected from automated agent behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market value of compute capability based on information collected from automated agent behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of energy prices based on information collected from business entity behavioral data sources. In embodiments, provided herein is a transaction-enabling system having a machine that automatically forecasts forward market pricing of energy prices based on information collected from business entity behavioral data sources and having a machine that automatically forecasts forward market pricing of network spectrum based on information collected from business entity behavioral data sources. In embodiments, provided herein is a transaction-enabling system having a machine that automatically forecasts forward market pricing of energy prices based on information collected from business entity behavioral data sources and having a machine that automatically forecasts forward market pricing of energy credits based on information collected from business entity behavioral data sources. In embodiments, provided herein is a transaction-enabling system having a machine that automatically forecasts forward market pricing of energy prices based on information collected from business entity behavioral data sources and having a machine that automatically forecasts forward market value of compute capability based on information collected from business entity behavioral data sources. In embodiments, provided herein is a transaction-enabling system having a machine that automatically forecasts forward market pricing of energy prices based on information collected from business entity behavioral data sources and having a machine that automatically forecasts forward market pricing of energy prices based on information collected from human behavioral data sources. In embodiments, provided herein is a transaction-enabling system having a machine that automatically forecasts forward market pricing of energy prices based on information collected from business entity behavioral data sources and having a machine that automatically forecasts forward market pricing of network spectrum based on information collected from human behavioral data sources. In embodiments, provided herein is a transaction-enabling system having a machine that automatically forecasts forward market pricing of energy prices based on information collected from business entity behavioral data sources and having a machine that automatically forecasts forward market pricing of energy credits based on information collected from human behavioral data sources. In embodiments, provided herein is a transaction-enabling system having a machine that automatically forecasts forward market pricing of energy prices based on information collected from business entity behavioral data sources and having a machine that automatically forecasts forward market value of compute capability based on information collected from human behavioral data sources. In embodiments, provided herein is a transaction-enabling system having a machine that automatically forecasts forward market pricing of energy prices based on information collected from business entity behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of energy prices based on information collected from business entity behavioral data sources and having an intelligent agent that is configured to solicit the attention resources of another external intelligent agent. In embodiments, provided herein is a transaction-enabling system having a machine that automatically forecasts forward market pricing of energy prices based on information collected from business entity behavioral data sources and having a machine that automatically purchases attention resources in a forward market for attention. In embodiments, provided herein is a transaction-enabling system having a machine that automatically forecasts forward market pricing of energy prices based on information collected from business entity behavioral data sources and having a fleet of machines that automatically aggregate purchasing in a forward market for attention. In embodiments, provided herein is a transaction-enabling system having a machine that automatically forecasts forward market pricing of energy prices based on information collected from business entity behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of energy prices based on information collected from business entity behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of energy prices based on information collected from business entity behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of energy prices based on information collected from business entity behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of energy prices based on information collected from business entity behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of energy prices based on information collected from business entity behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of energy prices based on information collected from business entity behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of energy prices based on information collected from business entity behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of energy prices based on information collected from business entity behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of energy prices based on information collected from business entity behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of energy prices based on information collected from business entity behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of energy prices based on information collected from business entity behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of energy prices based on information collected from business entity behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of energy prices based on information collected from business entity behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of network spectrum based on information collected from business entity behavioral data sources. In embodiments, provided herein is a transaction-enabling system having a machine that automatically forecasts forward market pricing of network spectrum based on information collected from business entity behavioral data sources and having a machine that automatically forecasts forward market pricing of energy credits based on information collected from business entity behavioral data sources. In embodiments, provided herein is a transaction-enabling system having a machine that automatically forecasts forward market pricing of network spectrum based on information collected from business entity behavioral data sources and having a machine that automatically forecasts forward market value of compute capability based on information collected from business entity behavioral data sources. In embodiments, provided herein is a transaction-enabling system having a machine that automatically forecasts forward market pricing of network spectrum based on information collected from business entity behavioral data sources and having a machine that automatically forecasts forward market pricing of energy prices based on information collected from human behavioral data sources. In embodiments, provided herein is a transaction-enabling system having a machine that automatically forecasts forward market pricing of network spectrum based on information collected from business entity behavioral data sources and having a machine that automatically forecasts forward market pricing of network spectrum based on information collected from human behavioral data sources. In embodiments, provided herein is a transaction-enabling system having a machine that automatically forecasts forward market pricing of network spectrum based on information collected from business entity behavioral data sources and having a machine that automatically forecasts forward market pricing of energy credits based on information collected from human behavioral data sources. In embodiments, provided herein is a transaction-enabling system having a machine that automatically forecasts forward market pricing of network spectrum based on information collected from business entity behavioral data sources and having a machine that automatically forecasts forward market value of compute capability based on information collected from human behavioral data sources. In embodiments, provided herein is a transaction-enabling system having a machine that automatically forecasts forward market pricing of network spectrum based on information collected from business entity behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of network spectrum based on information collected from business entity behavioral data sources and having an intelligent agent that is configured to solicit the attention resources of another external intelligent agent. In embodiments, provided herein is a transaction-enabling system having a machine that automatically forecasts forward market pricing of network spectrum based on information collected from business entity behavioral data sources and having a machine that automatically purchases attention resources in a forward market for attention. In embodiments, provided herein is a transaction-enabling system having a machine that automatically forecasts forward market pricing of network spectrum based on information collected from business entity behavioral data sources and having a fleet of machines that automatically aggregate purchasing in a forward market for attention. In embodiments, provided herein is a transaction-enabling system having a machine that automatically forecasts forward market pricing of network spectrum based on information collected from business entity behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of network spectrum based on information collected from business entity behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of network spectrum based on information collected from business entity behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of network spectrum based on information collected from business entity behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of network spectrum based on information collected from business entity behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of network spectrum based on information collected from business entity behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of network spectrum based on information collected from business entity behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of network spectrum based on information collected from business entity behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of network spectrum based on information collected from business entity behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of network spectrum based on information collected from business entity behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of network spectrum based on information collected from business entity behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of network spectrum based on information collected from business entity behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of network spectrum based on information collected from business entity behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of network spectrum based on information collected from business entity behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of energy credits based on information collected from business entity behavioral data sources. In embodiments, provided herein is a transaction-enabling system having a machine that automatically forecasts forward market pricing of energy credits based on information collected from business entity behavioral data sources and having a machine that automatically forecasts forward market value of compute capability based on information collected from business entity behavioral data sources. In embodiments, provided herein is a transaction-enabling system having a machine that automatically forecasts forward market pricing of energy credits based on information collected from business entity behavioral data sources and having a machine that automatically forecasts forward market pricing of energy prices based on information collected from human behavioral data sources. In embodiments, provided herein is a transaction-enabling system having a machine that automatically forecasts forward market pricing of energy credits based on information collected from business entity behavioral data sources and having a machine that automatically forecasts forward market pricing of network spectrum based on information collected from human behavioral data sources. In embodiments, provided herein is a transaction-enabling system having a machine that automatically forecasts forward market pricing of energy credits based on information collected from business entity behavioral data sources and having a machine that automatically forecasts forward market pricing of energy credits based on information collected from human behavioral data sources. In embodiments, provided herein is a transaction-enabling system having a machine that automatically forecasts forward market pricing of energy credits based on information collected from business entity behavioral data sources and having a machine that automatically forecasts forward market value of compute capability based on information collected from human behavioral data sources. In embodiments, provided herein is a transaction-enabling system having a machine that automatically forecasts forward market pricing of energy credits based on information collected from business entity behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of energy credits based on information collected from business entity behavioral data sources and having an intelligent agent that is configured to solicit the attention resources of another external intelligent agent. In embodiments, provided herein is a transaction-enabling system having a machine that automatically forecasts forward market pricing of energy credits based on information collected from business entity behavioral data sources and having a machine that automatically purchases attention resources in a forward market for attention. In embodiments, provided herein is a transaction-enabling system having a machine that automatically forecasts forward market pricing of energy credits based on information collected from business entity behavioral data sources and having a fleet of machines that automatically aggregate purchasing in a forward market for attention. In embodiments, provided herein is a transaction-enabling system having a machine that automatically forecasts forward market pricing of energy credits based on information collected from business entity behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of energy credits based on information collected from business entity behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of energy credits based on information collected from business entity behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of energy credits based on information collected from business entity behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of energy credits based on information collected from business entity behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of energy credits based on information collected from business entity behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of energy credits based on information collected from business entity behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of energy credits based on information collected from business entity behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of energy credits based on information collected from business entity behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of energy credits based on information collected from business entity behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of energy credits based on information collected from business entity behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of energy credits based on information collected from business entity behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of energy credits based on information collected from business entity behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of energy credits based on information collected from business entity behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market value of compute capability based on information collected from business entity behavioral data sources. In embodiments, provided herein is a transaction-enabling system having a machine that automatically forecasts forward market value of compute capability based on information collected from business entity behavioral data sources and having a machine that automatically forecasts forward market pricing of energy prices based on information collected from human behavioral data sources. In embodiments, provided herein is a transaction-enabling system having a machine that automatically forecasts forward market value of compute capability based on information collected from business entity behavioral data sources and having a machine that automatically forecasts forward market pricing of network spectrum based on information collected from human behavioral data sources. In embodiments, provided herein is a transaction-enabling system having a machine that automatically forecasts forward market value of compute capability based on information collected from business entity behavioral data sources and having a machine that automatically forecasts forward market pricing of energy credits based on information collected from human behavioral data sources. In embodiments, provided herein is a transaction-enabling system having a machine that automatically forecasts forward market value of compute capability based on information collected from business entity behavioral data sources and having a machine that automatically forecasts forward market value of compute capability based on information collected from human behavioral data sources. In embodiments, provided herein is a transaction-enabling system having a machine that automatically forecasts forward market value of compute capability based on information collected from business entity behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market value of compute capability based on information collected from business entity behavioral data sources and having an intelligent agent that is configured to solicit the attention resources of another external intelligent agent. In embodiments, provided herein is a transaction-enabling system having a machine that automatically forecasts forward market value of compute capability based on information collected from business entity behavioral data sources and having a machine that automatically purchases attention resources in a forward market for attention. In embodiments, provided herein is a transaction-enabling system having a machine that automatically forecasts forward market value of compute capability based on information collected from business entity behavioral data sources and having a fleet of machines that automatically aggregate purchasing in a forward market for attention. In embodiments, provided herein is a transaction-enabling system having a machine that automatically forecasts forward market value of compute capability based on information collected from business entity behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market value of compute capability based on information collected from business entity behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market value of compute capability based on information collected from business entity behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market value of compute capability based on information collected from business entity behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market value of compute capability based on information collected from business entity behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market value of compute capability based on information collected from business entity behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market value of compute capability based on information collected from business entity behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market value of compute capability based on information collected from business entity behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market value of compute capability based on information collected from business entity behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market value of compute capability based on information collected from business entity behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market value of compute capability based on information collected from business entity behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market value of compute capability based on information collected from business entity behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market value of compute capability based on information collected from business entity behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market value of compute capability based on information collected from business entity behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of energy prices based on information collected from human behavioral data sources. In embodiments, provided herein is a transaction-enabling system having a machine that automatically forecasts forward market pricing of energy prices based on information collected from human behavioral data sources and having a machine that automatically forecasts forward market pricing of network spectrum based on information collected from human behavioral data sources. In embodiments, provided herein is a transaction-enabling system having a machine that automatically forecasts forward market pricing of energy prices based on information collected from human behavioral data sources and having a machine that automatically forecasts forward market pricing of energy credits based on information collected from human behavioral data sources. In embodiments, provided herein is a transaction-enabling system having a machine that automatically forecasts forward market pricing of energy prices based on information collected from human behavioral data sources and having a machine that automatically forecasts forward market value of compute capability based on information collected from human behavioral data sources. In embodiments, provided herein is a transaction-enabling system having a machine that automatically forecasts forward market pricing of energy prices based on information collected from human behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of energy prices based on information collected from human behavioral data sources and having an intelligent agent that is configured to solicit the attention resources of another external intelligent agent. In embodiments, provided herein is a transaction-enabling system having a machine that automatically forecasts forward market pricing of energy prices based on information collected from human behavioral data sources and having a machine that automatically purchases attention resources in a forward market for attention. In embodiments, provided herein is a transaction-enabling system having a machine that automatically forecasts forward market pricing of energy prices based on information collected from human behavioral data sources and having a fleet of machines that automatically aggregate purchasing in a forward market for attention. In embodiments, provided herein is a transaction-enabling system having a machine that automatically forecasts forward market pricing of energy prices based on information collected from human behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of energy prices based on information collected from human behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of energy prices based on information collected from human behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of energy prices based on information collected from human behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of energy prices based on information collected from human behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of energy prices based on information collected from human behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of energy prices based on information collected from human behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of energy prices based on information collected from human behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of energy prices based on information collected from human behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of energy prices based on information collected from human behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of energy prices based on information collected from human behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of energy prices based on information collected from human behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of energy prices based on information collected from human behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of energy prices based on information collected from human behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of network spectrum based on information collected from human behavioral data sources. In embodiments, provided herein is a transaction-enabling system having a machine that automatically forecasts forward market pricing of network spectrum based on information collected from human behavioral data sources and having a machine that automatically forecasts forward market pricing of energy credits based on information collected from human behavioral data sources. In embodiments, provided herein is a transaction-enabling system having a machine that automatically forecasts forward market pricing of network spectrum based on information collected from human behavioral data sources and having a machine that automatically forecasts forward market value of compute capability based on information collected from human behavioral data sources. In embodiments, provided herein is a transaction-enabling system having a machine that automatically forecasts forward market pricing of network spectrum based on information collected from human behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of network spectrum based on information collected from human behavioral data sources and having an intelligent agent that is configured to solicit the attention resources of another external intelligent agent. In embodiments, provided herein is a transaction-enabling system having a machine that automatically forecasts forward market pricing of network spectrum based on information collected from human behavioral data sources and having a machine that automatically purchases attention resources in a forward market for attention. In embodiments, provided herein is a transaction-enabling system having a machine that automatically forecasts forward market pricing of network spectrum based on information collected from human behavioral data sources and having a fleet of machines that automatically aggregate purchasing in a forward market for attention. In embodiments, provided herein is a transaction-enabling system having a machine that automatically forecasts forward market pricing of network spectrum based on information collected from human behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of network spectrum based on information collected from human behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of network spectrum based on information collected from human behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of network spectrum based on information collected from human behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of network spectrum based on information collected from human behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of network spectrum based on information collected from human behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of network spectrum based on information collected from human behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of network spectrum based on information collected from human behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of network spectrum based on information collected from human behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of network spectrum based on information collected from human behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of network spectrum based on information collected from human behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of network spectrum based on information collected from human behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of network spectrum based on information collected from human behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of network spectrum based on information collected from human behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of energy credits based on information collected from human behavioral data sources. In embodiments, provided herein is a transaction-enabling system having a machine that automatically forecasts forward market pricing of energy credits based on information collected from human behavioral data sources and having a machine that automatically forecasts forward market value of compute capability based on information collected from human behavioral data sources. In embodiments, provided herein is a transaction-enabling system having a machine that automatically forecasts forward market pricing of energy credits based on information collected from human behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of energy credits based on information collected from human behavioral data sources and having an intelligent agent that is configured to solicit the attention resources of another external intelligent agent. In embodiments, provided herein is a transaction-enabling system having a machine that automatically forecasts forward market pricing of energy credits based on information collected from human behavioral data sources and having a machine that automatically purchases attention resources in a forward market for attention. In embodiments, provided herein is a transaction-enabling system having a machine that automatically forecasts forward market pricing of energy credits based on information collected from human behavioral data sources and having a fleet of machines that automatically aggregate purchasing in a forward market for attention. In embodiments, provided herein is a transaction-enabling system having a machine that automatically forecasts forward market pricing of energy credits based on information collected from human behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of energy credits based on information collected from human behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of energy credits based on information collected from human behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of energy credits based on information collected from human behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of energy credits based on information collected from human behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of energy credits based on information collected from human behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of energy credits based on information collected from human behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of energy credits based on information collected from human behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of energy credits based on information collected from human behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of energy credits based on information collected from human behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of energy credits based on information collected from human behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of energy credits based on information collected from human behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of energy credits based on information collected from human behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of energy credits based on information collected from human behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market value of compute capability based on information collected from human behavioral data sources. In embodiments, provided herein is a transaction-enabling system having a machine that automatically forecasts forward market value of compute capability based on information collected from human behavioral data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market value of compute capability based on information collected from human behavioral data sources and having an intelligent agent that is configured to solicit the attention resources of another external intelligent agent. In embodiments, provided herein is a transaction-enabling system having a machine that automatically forecasts forward market value of compute capability based on information collected from human behavioral data sources and having a machine that automatically purchases attention resources in a forward market for attention. In embodiments, provided herein is a transaction-enabling system having a machine that automatically forecasts forward market value of compute capability based on information collected from human behavioral data sources and having a fleet of machines that automatically aggregate purchasing in a forward market for attention. In embodiments, provided herein is a transaction-enabling system having a machine that automatically forecasts forward market value of compute capability based on information collected from human behavioral data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market value of compute capability based on information collected from human behavioral data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market value of compute capability based on information collected from human behavioral data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market value of compute capability based on information collected from human behavioral data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market value of compute capability based on information collected from human behavioral data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market value of compute capability based on information collected from human behavioral data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market value of compute capability based on information collected from human behavioral data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market value of compute capability based on information collected from human behavioral data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market value of compute capability based on information collected from human behavioral data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market value of compute capability based on information collected from human behavioral data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market value of compute capability based on information collected from human behavioral data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market value of compute capability based on information collected from human behavioral data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market value of compute capability based on information collected from human behavioral data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market value of compute capability based on information collected from human behavioral data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that predicts a forward market price in a market for spectrum or network bandwidth based on an understanding obtained by analyzing social data sources and executes a transaction based on the forward market prediction and having an intelligent agent that is configured to solicit the attention resources of another external intelligent agent. In embodiments, provided herein is a transaction-enabling system having an expert system that predicts a forward market price in a market for spectrum or network bandwidth based on an understanding obtained by analyzing social data sources and executes a transaction based on the forward market prediction and having a machine that automatically purchases attention resources in a forward market for attention. In embodiments, provided herein is a transaction-enabling system having an expert system that predicts a forward market price in a market for spectrum or network bandwidth based on an understanding obtained by analyzing social data sources and executes a transaction based on the forward market prediction and having a fleet of machines that automatically aggregate purchasing in a forward market for attention. In embodiments, provided herein is a transaction-enabling system having an expert system that predicts a forward market price in a market for spectrum or network bandwidth based on an understanding obtained by analyzing social data sources and executes a transaction based on the forward market prediction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that predicts a forward market price in a market for spectrum or network bandwidth based on an understanding obtained by analyzing social data sources and executes a transaction based on the forward market prediction and having a system for learning on a training set of facility outcomes, facility parameters, and data collected from data sources to train an artificial intelligence/machine learning system to predict a facility production outcome. In embodiments, provided herein is a transaction-enabling system having an expert system that predicts a forward market price in a market for spectrum or network bandwidth based on an understanding obtained by analyzing social data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that predicts a forward market price in a market for spectrum or network bandwidth based on an understanding obtained by analyzing social data sources and executes a transaction based on the forward market prediction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that predicts a forward market price in a market for spectrum or network bandwidth based on an understanding obtained by analyzing social data sources and executes a transaction based on the forward market prediction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that predicts a forward market price in a market for spectrum or network bandwidth based on an understanding obtained by analyzing social data sources and executes a transaction based on the forward market prediction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that predicts a forward market price in a market for spectrum or network bandwidth based on an understanding obtained by analyzing social data sources and executes a transaction based on the forward market prediction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that predicts a forward market price in a market for spectrum or network bandwidth based on an understanding obtained by analyzing social data sources and executes a transaction based on the forward market prediction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that predicts a forward market price in a market for spectrum or network bandwidth based on an understanding obtained by analyzing social data sources and executes a transaction based on the forward market prediction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that predicts a forward market price in a market for spectrum or network bandwidth based on an understanding obtained by analyzing social data sources and executes a transaction based on the forward market prediction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that predicts a forward market price in a market for spectrum or network bandwidth based on an understanding obtained by analyzing social data sources and executes a transaction based on the forward market prediction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that predicts a forward market price in a market for spectrum or network bandwidth based on an understanding obtained by analyzing social data sources and executes a transaction based on the forward market prediction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that predicts a forward market price in a market for spectrum or network bandwidth based on an understanding obtained by analyzing social data sources and executes a transaction based on the forward market prediction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that predicts a forward market price in a market for spectrum or network bandwidth based on an understanding obtained by analyzing social data sources and executes a transaction based on the forward market prediction and having an intelligent, flexible energy and compute facility whereby an artificial intelligence/machine learning system configures the facility among a set of available configurations based on a set of parameters received from a digital twin for the facility.

Figure 62:
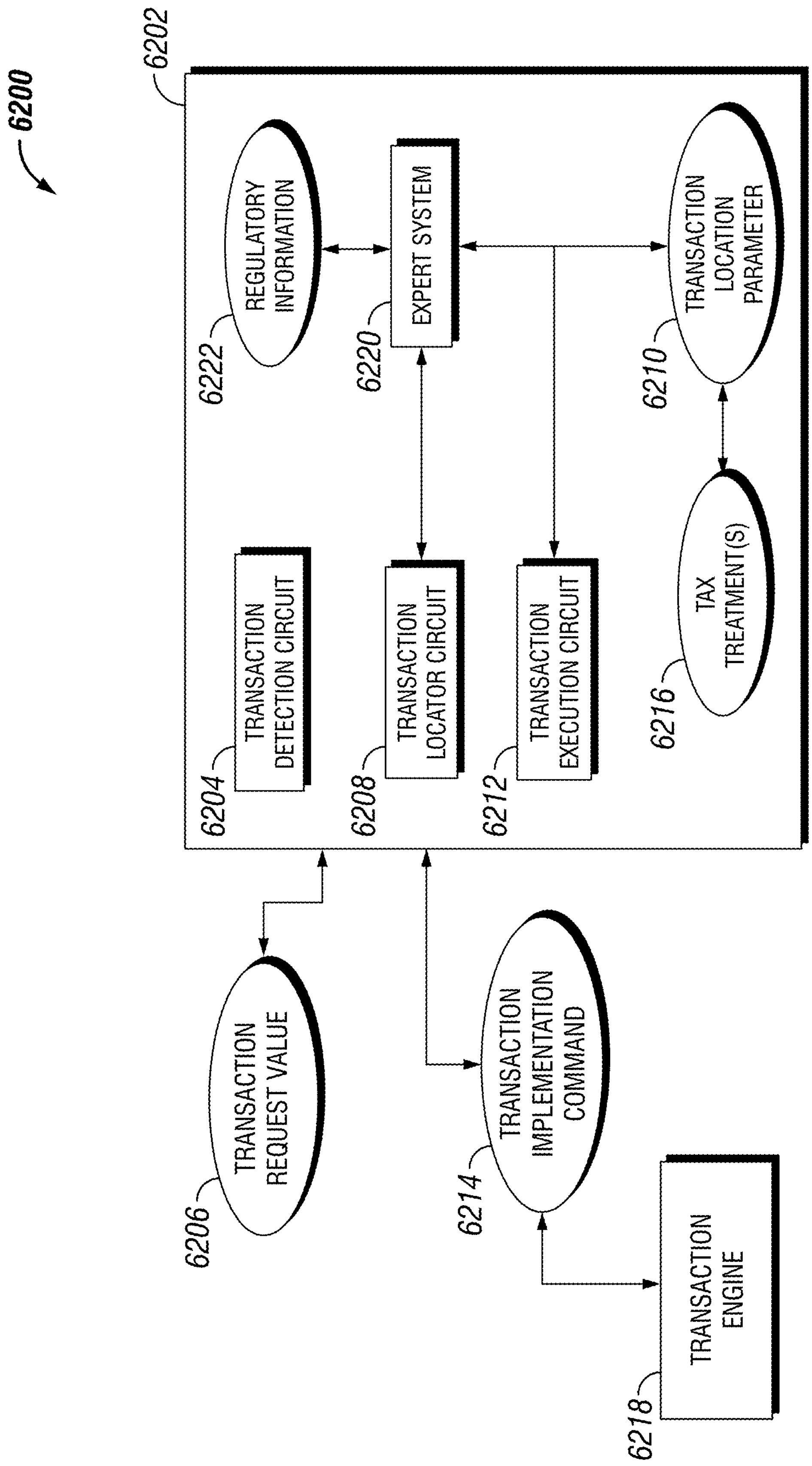
FIG. 62 is a schematic diagram of a system for improving a cryptocurrency transaction request outcome.

Referencing FIG. 62, an example transaction-enabling system 6200 includes a controller 6202 having a transaction detection circuit 6204 structured to interpret a transaction request value 6206, wherein the transaction request value 6206 includes a transaction description for one of a proposed or an imminent transaction (e.g., as provided by a user, subscriber to the transaction-enabling system 6200, application or service utilizing the transaction-enabling system 6200, etc.), and wherein the transaction description includes a cryptocurrency type value (e.g., one or more cryptocurrency types for the transaction) and a transaction amount value. The controller 6202 further includes a transaction locator circuit 6208 that determines a transaction location parameter 6210 in response to the transaction request value 6206, where the transaction location parameter 6210 includes at least one of a transaction geographic value (e.g., a physical location where the transaction will be executed, which may be adjusted, for example using server selections, third party transactions, or other methods) and/or a transaction jurisdiction value (e.g., a jurisdictional entity where the laws governing the transaction will be applicable, such as a country, state, province, regional jurisdiction, and/or a governing scheme that is inter-national or trans-national; which may be adjusted, for example using server selections, third party transactions, control of the transaction type or category invoking one of a number of jurisdictions applicable to a particular geographical region, etc.), and a transaction execution circuit 6212 structured to provide a transaction implementation command 6214 in response to the transaction location parameter 6210.

In certain embodiments, the transaction locator circuit 6208 is further structured to determine the transaction location parameter 6210 based on a tax treatment 6216 of the one of the proposed or imminent transaction, for example selecting a geographical and/or jurisdictional location from a number of available locations that will receive a favorable tax treatment for the transaction. Certain considerations to determine a favorable tax treatment include tax laws and incentives in available jurisdictions according to the type of transaction, specific characteristics of the transacting party including where income, sales, and other aspects related to the transaction will be deemed to occur and the resulting effect on the tax treatment of the transaction, and/or the availability of losses or other offsets to income from a transaction that are applicable to entities involved in the transaction according to the available jurisdictions and/or geographic regions available.

An example transaction-enabling system 6200 further includes the transaction locator circuit 6208 further structured to select the one of the transaction geographic value or the transaction jurisdiction value from a number of available geographic values or jurisdiction values that provides an improved tax treatment 6216 relative to a nominal one of the number of available geographic values or jurisdiction values. For example, an improvement to an execution of a transaction may include determining a nominal tax treatment 6216 (e.g., for a simplest jurisdiction such as a location of a buyer, seller, or delivery location of a purchased item or service), and determining that an alternate available geography or jurisdiction is available. Improvement of a tax treatment should be understood broadly, and can include at least one or more of: reducing a taxable amount on a purchase; achieving a target loss value for a transaction to offset a profit value in a particular geography or jurisdiction for the transaction; achieving a tax paid target for a jurisdiction, such as to meet a minimum tax threshold as measured separately for an entity from the transaction, and/or to pay taxes to meet a public perception goal or tax payment target; and/or paying taxes in a first category (e.g., sales tax) relative to a second category (e.g., a short term capital gain). Accordingly, in certain embodiments, operations of the transaction locator circuit 6208 may operate to continuously improve or optimize tax treatment of transactions, but may additionally or alternatively find an improved tax treatment location without continuing to optimize a tax treatment for a particular transaction—for example to improve the speed of execution of transactions. In certain embodiments, operations of the transaction locator circuit 6208 may operate to improve a tax treatment of a transaction until a threshold tax treatment value is reached—for example an improvement amount from a nominal transaction location, and/or a target tax treatment amount for the transaction.

An example transaction-enabling system 6200 further includes the transaction locator circuit 6208 further structured to determining the transaction location parameter 6210 in response to a tax treatment 6216 of at least one of the cryptocurrency type value (e.g., where the type of cryptocurrency may affect the tax treatment of the transaction—e.g., according to a country of origin of the currency, a favored currency such as one issued by a government or municipality, a sanctioned currency that may receive unfavorable tax treatment, etc.), or a type of the one of the proposed or imminent transaction (e.g., where the transaction type may lead to variable tax treatment depending upon the jurisdiction, such as a purchase of a clean energy vehicle in a country having an incentive for such a purchase, etc.). A proposed or imminent transaction, as set forth herein, can include a requested transaction (e.g., the requesting entity is attempting to make a transaction) and/or a speculative transaction (e.g., a requesting entity is trying to determine what transaction outcomes are available for the transaction location, tax consequences, and/or total cost of the transaction).

An example transaction locator circuit 6208 operates an expert system 6220 (and/or an AI or machine learning component) configured to use machine learning to continuously improve the determination of the transaction location parameter 6210 relative to a tax treatment 6216 of transactions processed by the controller. Operations to continuously improve the determination of the transaction location parameter 6210 may be performed over a number of transactions, including transactions relating to the same entity or relating to a number of entities, where a given transaction utilizes a transaction location parameter 6210 that is made according to the state of the expert system 6220 at the time of the transaction request value 6206, and/or wherein the expert system 6220 improves an outcome for the particular transaction such as an improved tax treatment 6216 relative to a nominal, a tax treatment 6216 that is greater than a threshold tax treatment value, and/or a transaction location parameter 6210 that is determined after an optimization period expires (e.g., a time value threshold, which may be fixed or variable) and/or after the expert system 6220 meets convergence criteria (e.g., further improvements appear to be lower than a threshold amount, etc.) while the transaction request value 6206 is pending. An example expert system 6220 is configured to aggregate regulatory information 6222 for cryptocurrency transactions from a number of jurisdictions, and to continuously improve the determination of the transaction location parameter 6210 based on the aggregated regulatory information 6222. The aggregated regulatory information 6222 may be updated, refreshed, and/or added to over time. An example expert system 6220 utilizes machine learning to continuously improve the determination of the transaction location parameter 6210 relative to secondary jurisdiction costs related to the cryptocurrency transaction. For example, various regulatory schemes may affect compliance, reporting requirements, privacy considerations (e.g., for data), penalty schemes for particular transaction types, export control or sanctions-related transaction considerations, and/or the desirability or undesirability to execute transactions that occur across jurisdictional boundaries (e.g., invoking customs, treaties, international legal considerations, and/or intra-country considerations such as state or provisional law versus federal or national law). An example expert system 6220 utilizes machine learning to continuously improve the transaction speed for cryptocurrency transactions. An example expert system 6220 utilizes machine learning to continuously improve a favorability of contractual terms related to the cryptocurrency transaction (e.g., meeting purchasing targets in a region, meeting transaction type targets in a region, meeting transaction cost obligations, etc.). An example expert system 6220 utilizes machine learning to continuously improve a compliance of cryptocurrency transactions within the aggregated regulatory information 6222. An example transaction-enabling system 6200 further includes a transaction engine 6218 that is responsive to the transaction implementation command 6214, for example to execute the cryptocurrency transaction in accordance with the transaction location parameter 6210 and/or according to a cryptocurrency type provided as a part of the transaction implementation command 6214.

Figure 63:
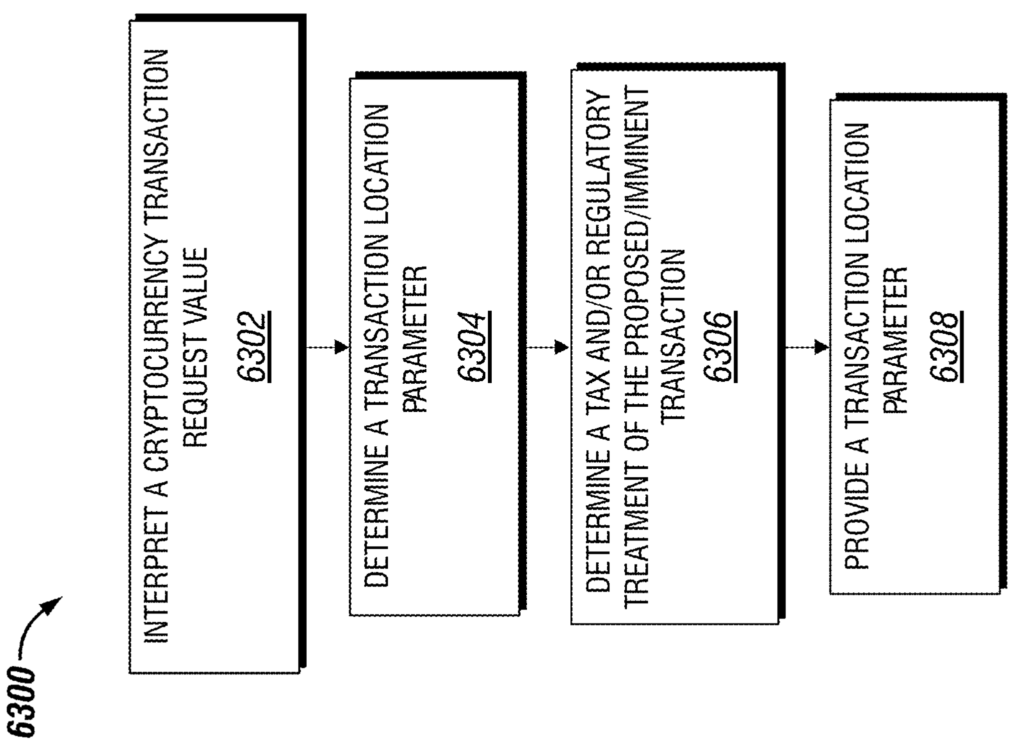
FIG. 63 is a schematic flow diagram of a method for improving a cryptocurrency transaction request outcome.

Referencing FIG. 63, an example procedure 6300 includes an operation 6302 to interpret a cryptocurrency transaction request value, where the transaction request value includes a transaction description for one of a proposed or an imminent transaction, and where the transaction description includes a cryptocurrency type value and a transaction amount value. The example procedure 6300 includes an operation 6304 to determine a transaction location parameter. The example procedure 6300 further includes an operation 6308 to provide a transaction location parameter in response to the transaction request value, where the transaction location parameter includes at least one of a transaction geographic value or a transaction jurisdiction value. In certain embodiments, the example procedure 6300 further includes an operation to provide a transaction implementation command in response to the transaction location parameter. In certain embodiments, an example procedure 6300 includes an operation 6306 to determine a tax treatment and/or a regulatory treatment of the transaction, and to provide 6308 the transaction location parameter in response to the tax and/or regulatory treatment of the transaction.

Figure 64:
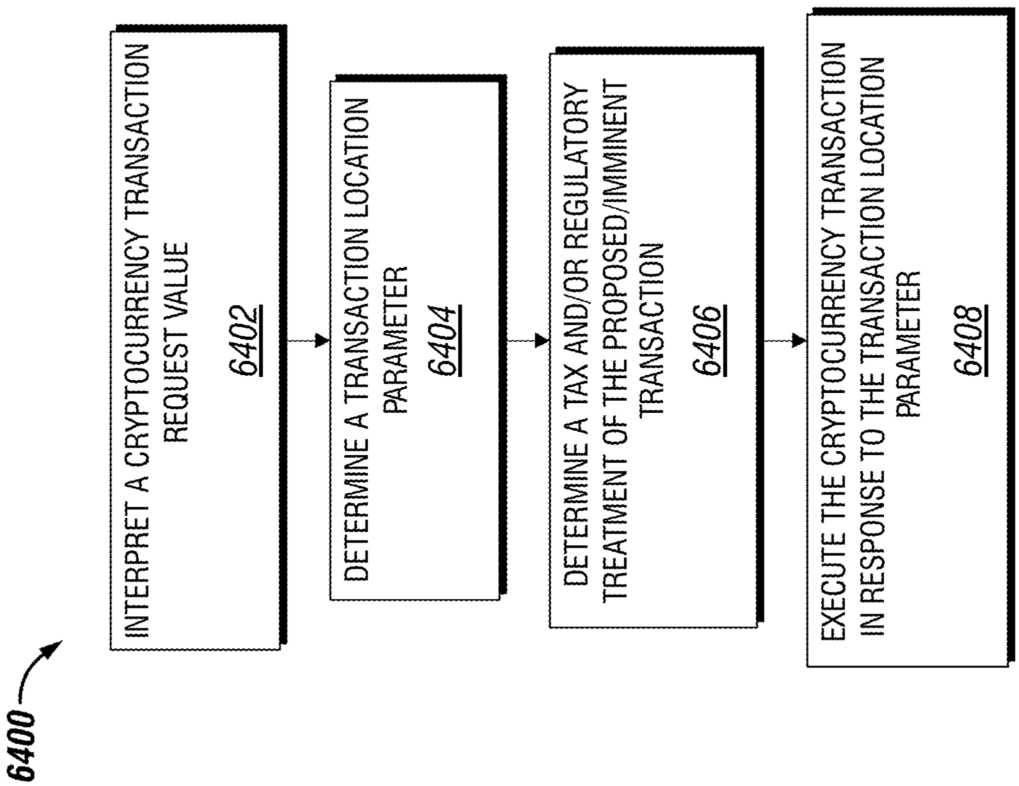
FIG. 64 is a schematic flow diagram of a method for improving a cryptocurrency transaction request outcome.

Referencing FIG. 64, an example procedure 6400 includes an operation 6402 to interpret a cryptocurrency transaction request value, where the transaction request value includes a transaction description for one of a proposed or an imminent transaction, and where the transaction description includes a cryptocurrency type value and a transaction amount value. The example procedure 6400 includes an operation 6404 to determine a transaction location parameter, where the transaction location parameter includes at least one of a transaction geographic value or a transaction jurisdiction value, and an operation 6408 to execute a transaction in response to the transaction location parameter. In certain embodiments, the procedure 6400 further includes an operation 6406 to determine a tax and/or regulatory treatment of the transaction, and to adjust the transaction location parameter in response to the tax and/or regulatory treatment of the transaction before the operation 6408 to execute the transaction.

Figure 65:
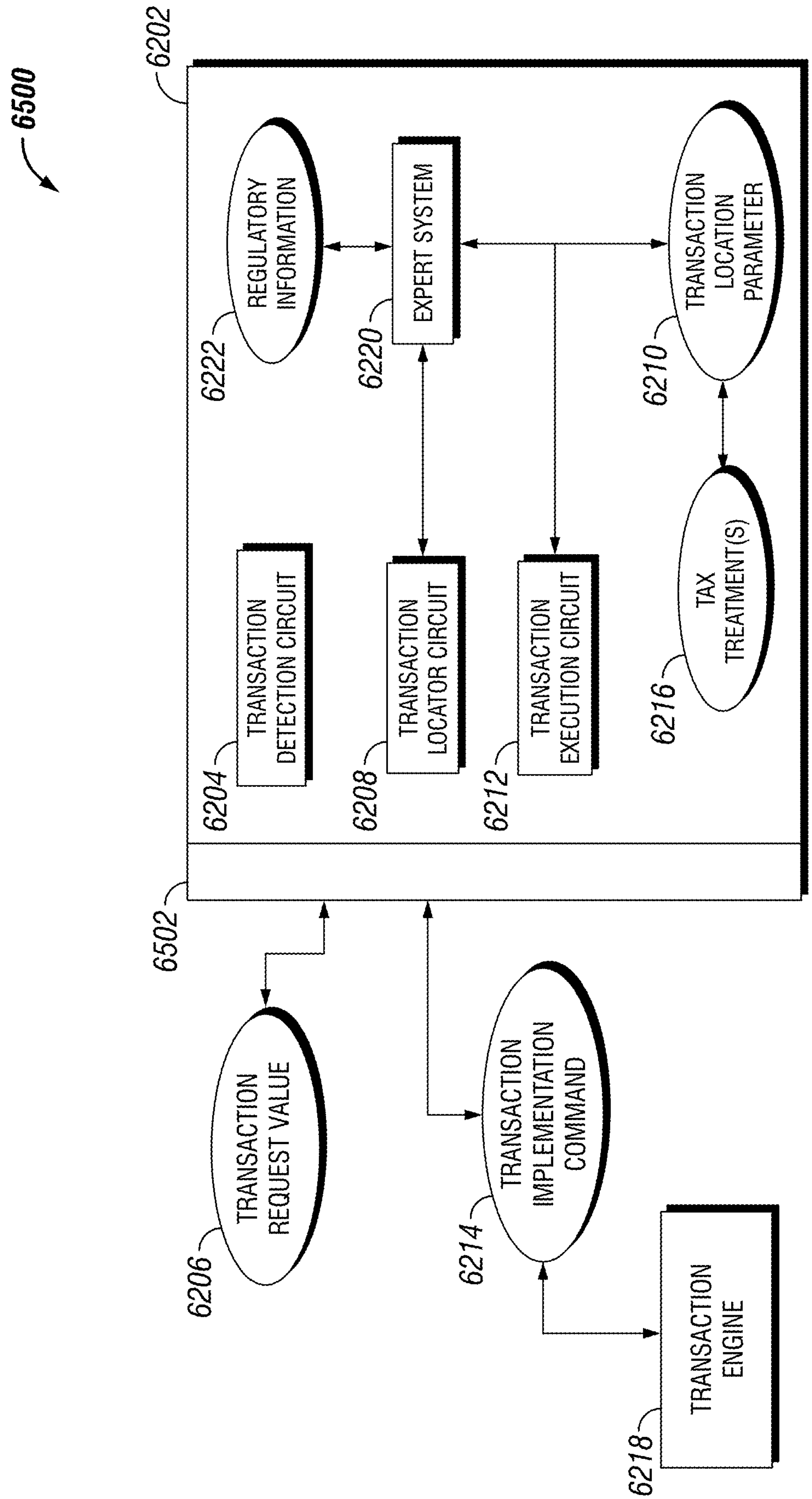
FIG. 65 is a schematic diagram of a system for improving a cryptocurrency transaction request outcome.

Referencing FIG. 65, an example system 6500 includes a controller 6202 having a smart wrapper 6502 that interprets a transaction request value 6206 from a user, wherein the transaction request value includes a transaction description for an incoming transaction, and wherein the transaction description includes a transaction amount value and at least one of a cryptocurrency type value and a transaction location value. The controller 6202 includes a transaction locator circuit 6208 that determines a transaction location parameter 6210 in response to the transaction request value 6206 and further in response to a plurality of tax treatment 6216 values corresponding to a plurality of transaction location parameters 6210, where the transaction location parameter 6210 includes at least one of a transaction geographic value or a transaction jurisdiction value, and wherein the smart wrapper 6502 further directs an execution of the incoming transaction in response to the transaction location parameter 6210—for example by providing a transaction implementation command 6214 to a transaction engine 6218. In certain embodiments, the smart wrapper 6502 can provide for enhanced speed of transaction execution—for example by storing transaction location parameter 6210 values according to transaction types, amounts, and/or requesting entity characteristics, and thereby provide transaction implementation commands 6214 more quickly than the expert system 6220 provides updated transaction location parameters 6210, while still providing the benefit of the expert system 6220 operations over time as transaction location parameter 6210 values are updated. Additionally or alternatively, operations of the smart wrapper 6502 provide for a consistent and/or selected user interface to the user for accepting transaction request values 6206, and/or to the transaction engine 6218 for sending transaction implementation commands 6214, and allowing for changes in the controller 6202 to remain invisible to the user and/or transaction engine 6218.

Figure 66:
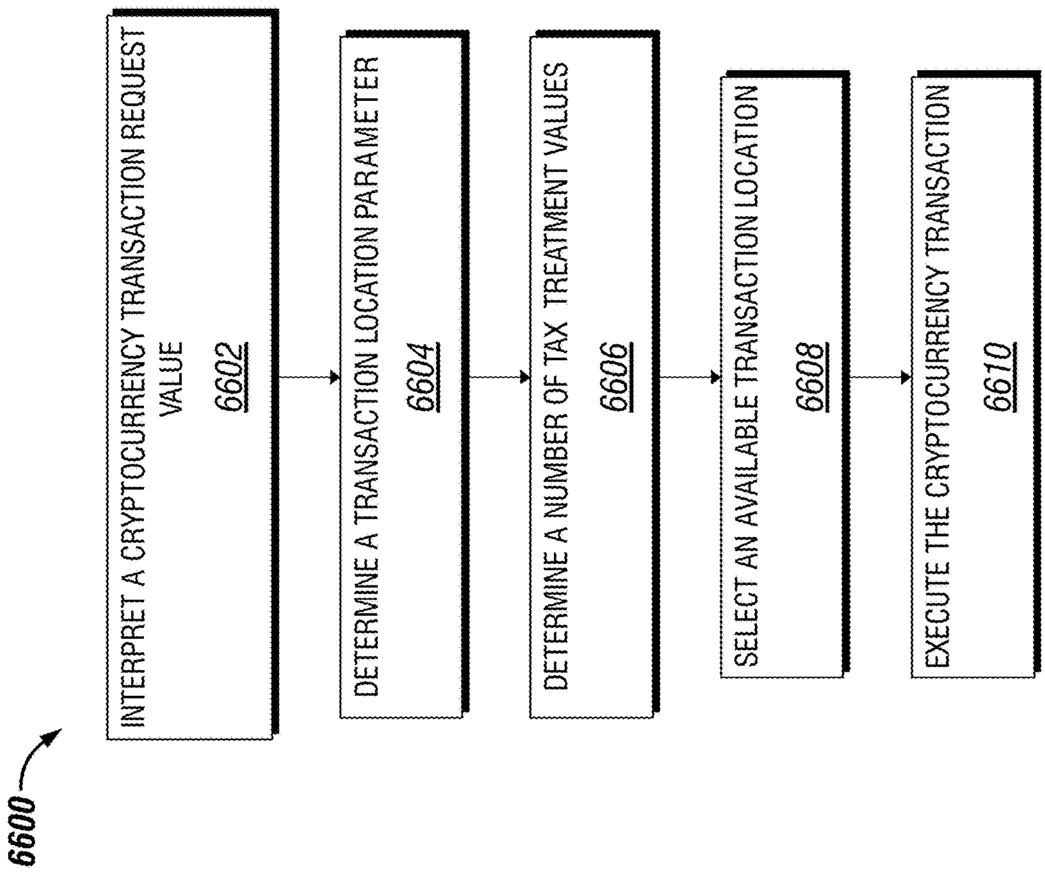
FIG. 66 is a schematic flow diagram of a method for improving a cryptocurrency transaction request outcome.

Referencing FIG. 66, an example procedure 6600 includes an operation 6602 to interpret a cryptocurrency transaction request value from a user, wherein the transaction request value includes a transaction description for an incoming transaction, and wherein the transaction description includes a transaction amount value and at least one of a cryptocurrency type value and a transaction location value, an operation 6604 to determine a transaction location parameter, an operation 6606 to determine a number of tax treatment values corresponding to a number of available transaction locations, and an operation 6608 to select an available transaction location as the transaction location parameter in response to the number of tax treatment values. The procedure 6600 further includes an operation 6610 to execute a cryptocurrency transaction in response to the selected available transaction location parameter. In certain embodiments, operation 6608 includes selecting an available transaction location as a location having a favorable and/or improved tax treatment, for example relative to a nominal or default transaction location. Example and non-limiting transaction location values for operation 6608 include: a location of a purchaser of the transaction; a location of a seller of the transaction; a location of a delivery of a product or service of the transaction; a location of a supplier of a product or service of the transaction; a residence location of one of the purchaser, seller, or supplier of the transaction; and/or a legally available location for the transaction.

Figure 67:
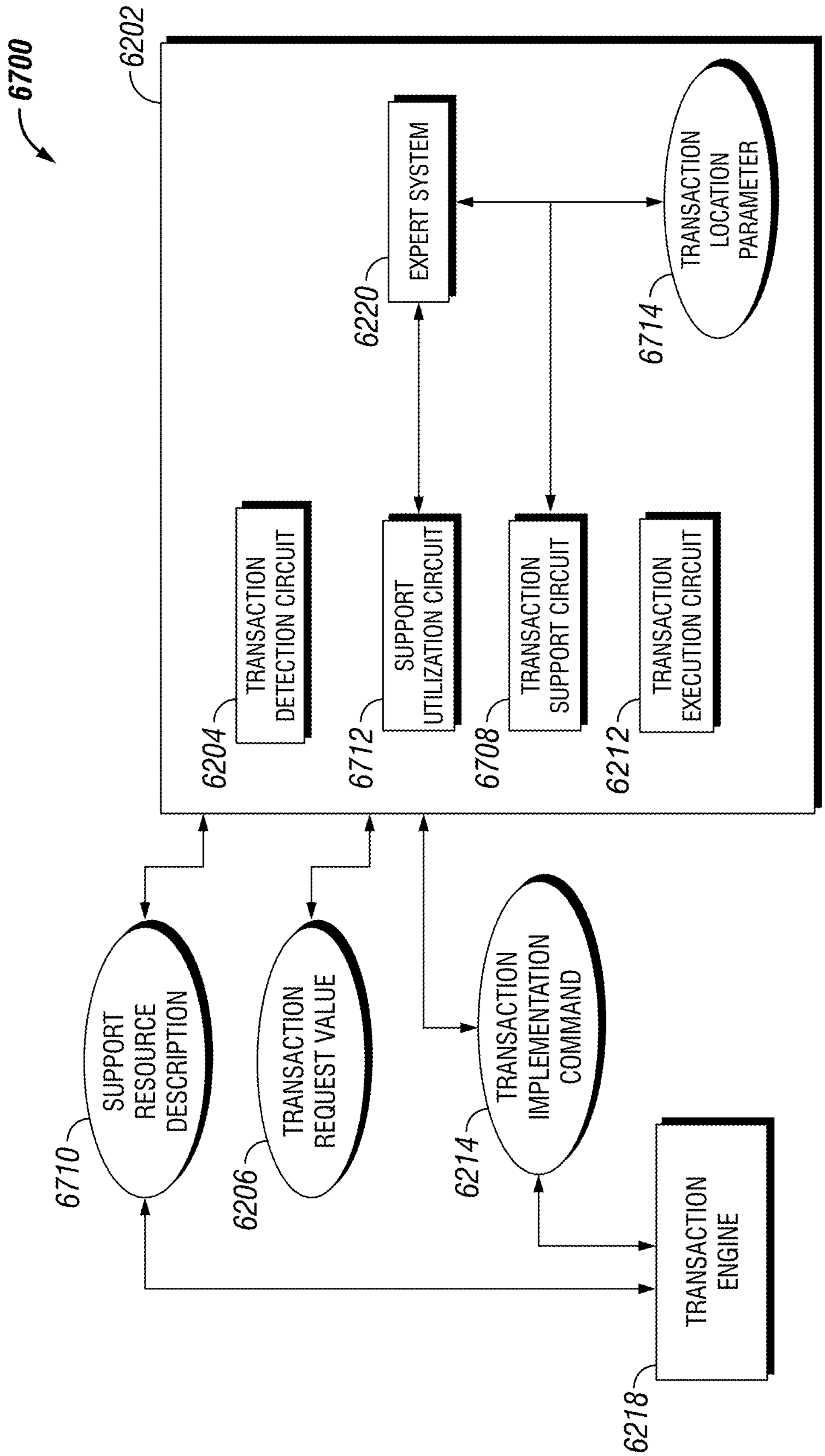
FIG. 67 is a schematic diagram of a system for improving execution of cryptocurrency transactions.

Referencing FIG. 67, an example transaction-enabling system 6700 includes a controller 6202 having a transaction detection circuit 6204 structured to interpret a plurality of transaction request values 6206, wherein each transaction request value 6206 includes a transaction description for one of a proposed or an imminent transaction, and wherein the transaction description includes a cryptocurrency type value and a transaction amount value. The example controller 6202 further includes a transaction support circuit 6708 structured to interpret a support resource description 6710 including at least one supporting resource for the plurality of transactions, a support utilization circuit 6712 structured to operate an expert system 6220, wherein the expert system 6220 is configured to use machine learning to continuously improve at least one execution parameter 6714 for the plurality of transactions relative to the support resource description 6710, and a transaction execution circuit 6212 structured to command execution of the plurality of transactions (e.g., as transaction implementation commands 6214) in response to the improved at least one execution parameter. In the example of FIG. 67, a support resource is depicted as the transaction engine 6218, although a support resource may be any resource utilized to support the transaction, including at least a mining server, a transaction verification server, an accounting circuit, or tax calculation circuit associated with an entity that is providing the transaction request value 6206, and the like. In certain embodiments, the support resource description 6710 includes an energy price, and/or may further include an energy resource consumption to support the transaction or a group of transactions. An example energy price description includes a forward price prediction, a spot price, and/or a forward market price for the energy source. An example energy price description includes one or more energy source selections available to power the execution of the transaction or a group of transactions. An example support resource description 6710 includes a state of charge for an energy source available to power the execution of the transaction or a group of transactions, and/or a charge cost cycle description for an energy storage source available to power the execution of the transaction or a group of transactions. An example system 6700 includes an energy storage source having a battery as a supporting device, and where the expert system 6220 is further configured to use machine learning to improve one or more of: a battery energy transfer efficiency value, a battery life value, and a battery lifetime utilization cost value.

Figure 68:
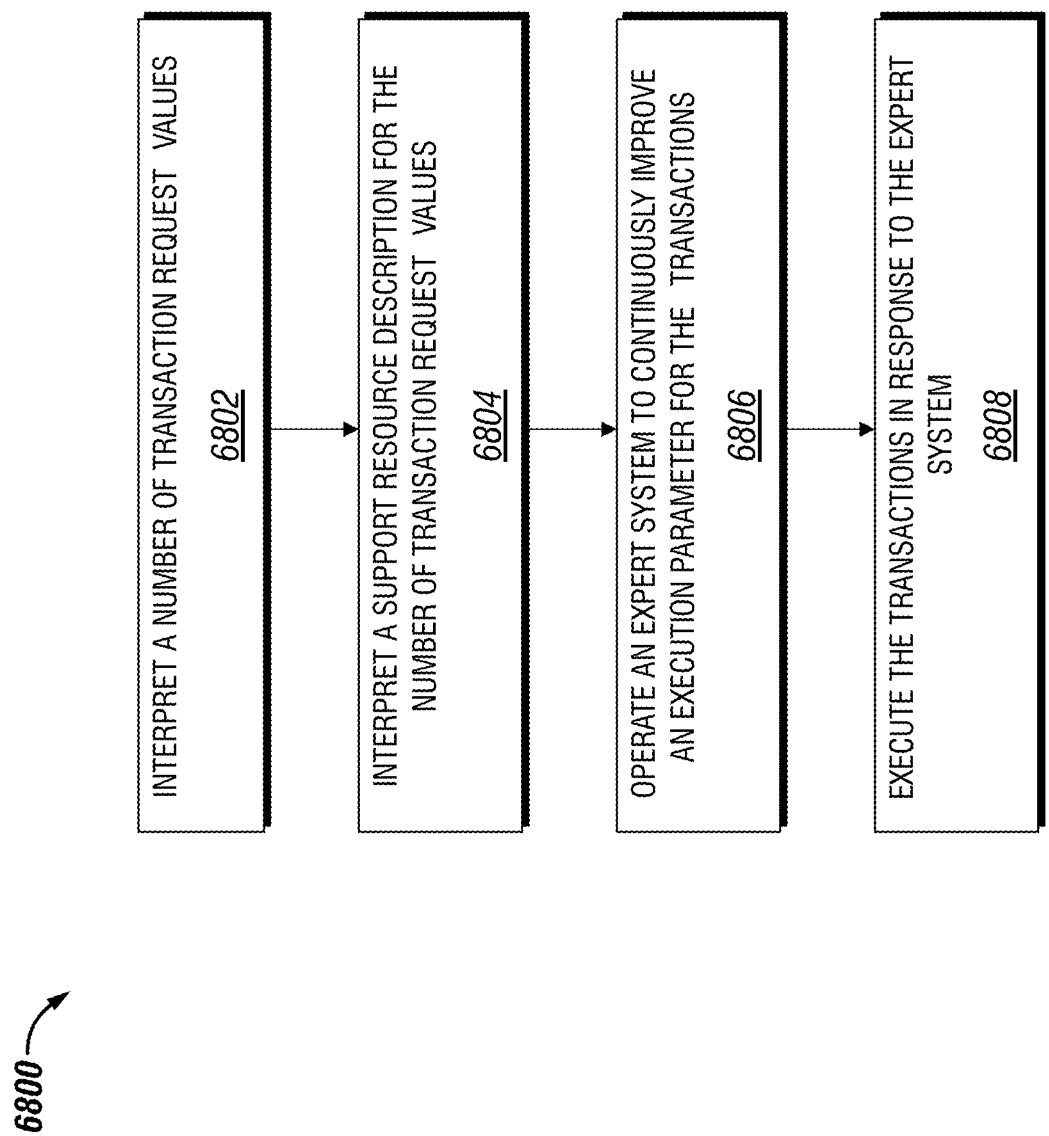
FIG. 68 is a schematic flow diagram of a method for improving execution of cryptocurrency transactions.

Referencing FIG. 68, an example procedure 6800 includes an operation 6802 to interpret a number of transaction request values, where each transaction request value includes a transaction description for one of a proposed or an imminent transaction, and wherein the transaction description includes a cryptocurrency type value and a transaction amount value. The example procedure 6800 further includes an operation 6804 to interpret a support resource description including at least one supporting resource for the number of transactions, and an operation 6806 to operate an expert system, where the expert system is configured to use machine learning to continuously improve at least one execution parameter for the number of transactions relative to the support resource description. The example procedure 6800 further includes an operation 6808 to command execution of the number of transactions in response to the improved execution parameter(s).

In embodiments, provided herein is a transaction-enabling system having a smart wrapper for a cryptocurrency coin that directs execution of a transaction involving the coin to a geographic location based on tax treatment of at least one of the coin and the transaction in the geographic location. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a self-executing cryptocurrency coin that commits a transaction upon recognizing a location-based parameter that provides favorable tax treatment. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that uses machine learning to optimize the execution of cryptocurrency transactions based on tax status. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that aggregates regulatory information covering cryptocurrency transactions and automatically selects a jurisdiction for an operation based on the regulatory information. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that uses machine learning to optimize the execution of a cryptocurrency transaction based on real time energy price information for an available energy source. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that uses machine learning to optimize the execution of a cryptocurrency transaction based on an understanding of available energy sources to power computing resources to execute the transaction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that uses machine learning to optimize charging and recharging cycle of a rechargeable battery system to provide energy for execution of a cryptocurrency transaction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in a market based on an understanding obtained by analyzing Internet of Things data sources and executes a transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in a market based on an understanding obtained by analyzing social network data sources and executes a transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in a market based on an understanding obtained by analyzing Internet of Things data sources and executes a cryptocurrency transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in a market based on an understanding obtained by analyzing social network data sources and executes a cryptocurrency transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in an energy market based on an understanding obtained by analyzing Internet of Things data sources and executes a transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in an energy market based on an understanding obtained by analyzing social network data sources and executes a transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in a market for computing resources based on an understanding obtained by analyzing Internet of Things data sources and executes a transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in a market for computing resources based on an understanding obtained by analyzing social network data sources and executes a transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in a market for advertising based on an understanding obtained by analyzing Internet of Things data sources and executes a transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in a market for advertising based on an understanding obtained by analyzing social network data sources and executes a transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market pricing of energy prices based on information collected from automated agent behavioral data sources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market pricing of network spectrum based on information collected from automated agent behavioral data sources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market pricing of energy credits based on information collected from automated agent behavioral data sources.

In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market value of compute capability based on information collected from automated agent behavioral data sources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market pricing of energy prices based on information collected from business entity behavioral data sources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market pricing of network spectrum based on information collected from business entity behavioral data sources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market pricing of energy credits based on information collected from business entity behavioral data sources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market value of compute capability based on information collected from business entity behavioral data sources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market pricing of energy prices based on information collected from human behavioral data sources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market pricing of network spectrum based on information collected from human behavioral data sources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market pricing of energy credits based on information collected from human behavioral data sources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically forecasts forward market value of compute capability based on information collected from human behavioral data sources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an expert system that predicts a forward market price in a market for spectrum or network bandwidth based on an understanding obtained by analyzing social data sources and executes a transaction based on the forward market prediction. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an intelligent agent that is configured to solicit the attention resources of another external intelligent agent. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a machine that automatically purchases attention resources in a forward market for attention. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a fleet of machines that automatically aggregate purchasing in a forward market for attention. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a system for learning on a training set of facility outcomes, facility parameters, and data collected from data sources to train an artificial intelligence/machine learning system to predict a likelihood of a facility production outcome. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a system for learning on a training set of facility outcomes, facility parameters, and data collected from data sources to train an artificial intelligence/machine learning system to predict a facility production outcome. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a smart wrapper for a cryptocurrency coin that directs execution of a transaction involving the coin to a geographic location based on tax treatment of at least one of the coin and the transaction in the geographic location and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an intelligent, flexible energy and compute facility whereby an artificial intelligence/machine learning system configures the facility among a set of available configurations based on a set of detected conditions relating to an output parameter. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a smart wrapper for a cryptocurrency coin that directs execution of a transaction involving the coin to a geographic location based on tax treatment of at least one of the coin and the transaction in the geographic location and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a self-executing cryptocurrency coin that commits a transaction upon recognizing a location-based parameter that provides favorable tax treatment. In embodiments, provided herein is a transaction-enabling system having a self-executing cryptocurrency coin that commits a transaction upon recognizing a location-based parameter that provides favorable tax treatment and having an expert system that uses machine learning to optimize the execution of cryptocurrency transactions based on tax status. In embodiments, provided herein is a transaction-enabling system having a self-executing cryptocurrency coin that commits a transaction upon recognizing a location-based parameter that provides favorable tax treatment and having an expert system that aggregates regulatory information covering cryptocurrency transactions and automatically selects a jurisdiction for an operation based on the regulatory information. In embodiments, provided herein is a transaction-enabling system having a self-executing cryptocurrency coin that commits a transaction upon recognizing a location-based parameter that provides favorable tax treatment and having an expert system that uses machine learning to optimize the execution of a cryptocurrency transaction based on real time energy price information for an available energy source. In embodiments, provided herein is a transaction-enabling system having a self-executing cryptocurrency coin that commits a transaction upon recognizing a location-based parameter that provides favorable tax treatment and having an expert system that uses machine learning to optimize the execution of a cryptocurrency transaction based on an understanding of available energy sources to power computing resources to execute the transaction. In embodiments, provided herein is a transaction-enabling system having a self-executing cryptocurrency coin that commits a transaction upon recognizing a location-based parameter that provides favorable tax treatment and having an expert system that uses machine learning to optimize charging and recharging cycle of a rechargeable battery system to provide energy for execution of a cryptocurrency transaction. In embodiments, provided herein is a transaction-enabling system having a self-executing cryptocurrency coin that commits a transaction upon recognizing a location-based parameter that provides favorable tax treatment and having an expert system that predicts a forward market price in a market based on an understanding obtained by analyzing Internet of Things data sources and executes a transaction based on the forward market prediction. In embodiments, provided herein is a transaction-enabling system having a self-executing cryptocurrency coin that commits a transaction upon recognizing a location-based parameter that provides favorable tax treatment and having an expert system that predicts a forward market price in a market based on an understanding obtained by analyzing social network data sources and executes a transaction based on the forward market prediction. In embodiments, provided herein is a transaction-enabling system having a self-executing cryptocurrency coin that commits a transaction upon recognizing a location-based parameter that provides favorable tax treatment and having an expert system that predicts a forward market price in a market based on an understanding obtained by analyzing Internet of Things data sources and executes a cryptocurrency transaction based on the forward market prediction. In embodiments, provided herein is a transaction-enabling system having a self-executing cryptocurrency coin that commits a transaction upon recognizing a location-based parameter that provides favorable tax treatment and having an expert system that predicts a forward market price in a market based on an understanding obtained by analyzing social network data sources and executes a cryptocurrency transaction based on the forward market prediction. In embodiments, provided herein is a transaction-enabling system having a self-executing cryptocurrency coin that commits a transaction upon recognizing a location-based parameter that provides favorable tax treatment and having an expert system that predicts a forward market price in an energy market based on an understanding obtained by analyzing Internet of Things data sources and executes a transaction based on the forward market prediction. In embodiments, provided herein is a transaction-enabling system having a self-executing cryptocurrency coin that commits a transaction upon recognizing a location-based parameter that provides favorable tax treatment and having an expert system that predicts a forward market price in an energy market based on an understanding obtained by analyzing social network data sources and executes a transaction based on the forward market prediction. In embodiments, provided herein is a transaction-enabling system having a self-executing cryptocurrency coin that commits a transaction upon recognizing a location-based parameter that provides favorable tax treatment and having an expert system that predicts a forward market price in a market for computing resources based on an understanding obtained by analyzing Internet of Things data sources and executes a transaction based on the forward market prediction. In embodiments, provided herein is a transaction-enabling system having a self-executing cryptocurrency coin that commits a transaction upon recognizing a location-based parameter that provides favorable tax treatment and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a self-executing cryptocurrency coin that commits a transaction upon recognizing a location-based parameter that provides favorable tax treatment and having an expert system that predicts a forward market price in a market for computing resources based on an understanding obtained by analyzing social network data sources and executes a transaction based on the forward market prediction. In embodiments, provided herein is a transaction-enabling system having a self-executing cryptocurrency coin that commits a transaction upon recognizing a location-based parameter that provides favorable tax treatment and having an expert system that predicts a forward market price in a market for advertising based on an understanding obtained by analyzing Internet of Things data sources and executes a transaction based on the forward market prediction. In embodiments, provided herein is a transaction-enabling system having a self-executing cryptocurrency coin that commits a transaction upon recognizing a location-based parameter that provides favorable tax treatment and having an expert system that predicts a forward market price in a market for advertising based on an understanding obtained by analyzing social network data sources and executes a transaction based on the forward market prediction. In embodiments, provided herein is a transaction-enabling system having a self-executing cryptocurrency coin that commits a transaction upon recognizing a location-based parameter that provides favorable tax treatment and having a machine that automatically forecasts forward market pricing of energy prices based on information collected from automated agent behavioral data sources. In embodiments, provided herein is a transaction-enabling system having a self-executing cryptocurrency coin that commits a transaction upon recognizing a location-based parameter that provides favorable tax treatment and having a machine that automatically forecasts forward market pricing of network spectrum based on information collected from automated agent behavioral data sources. In embodiments, provided herein is a transaction-enabling system having a self-executing cryptocurrency coin that commits a transaction upon recognizing a location-based parameter that provides favorable tax treatment and having a machine that automatically forecasts forward market pricing of energy credits based on information collected from automated agent behavioral data sources. In embodiments, provided herein is a transaction-enabling system having a self-executing cryptocurrency coin that commits a transaction upon recognizing a location-based parameter that provides favorable tax treatment and having a machine that automatically forecasts forward market value of compute capability based on information collected from automated agent behavioral data sources. In embodiments, provided herein is a transaction-enabling system having a self-executing cryptocurrency coin that commits a transaction upon recognizing a location-based parameter that provides favorable tax treatment and having a machine that automatically forecasts forward market pricing of energy prices based on information collected from business entity behavioral data sources. In embodiments, provided herein is a transaction-enabling system having a self-executing cryptocurrency coin that commits a transaction upon recognizing a location-based parameter that provides favorable tax treatment and having a machine that automatically forecasts forward market pricing of network spectrum based on information collected from business entity behavioral data sources. In embodiments, provided herein is a transaction-enabling system having a self-executing cryptocurrency coin that commits a transaction upon recognizing a location-based parameter that provides favorable tax treatment and having a machine that automatically forecasts forward market pricing of energy credits based on information collected from business entity behavioral data sources. In embodiments, provided herein is a transaction-enabling system having a self-executing cryptocurrency coin that commits a transaction upon recognizing a location-based parameter that provides favorable tax treatment and having a machine that automatically forecasts forward market value of compute capability based on information collected from business entity behavioral data sources. In embodiments, provided herein is a transaction-enabling system having a self-executing cryptocurrency coin that commits a transaction upon recognizing a location-based parameter that provides favorable tax treatment and having a machine that automatically forecasts forward market pricing of energy prices based on information collected from human behavioral data sources. In embodiments, provided herein is a transaction-enabling system having a self-executing cryptocurrency coin that commits a transaction upon recognizing a location-based parameter that provides favorable tax treatment and having a machine that automatically forecasts forward market pricing of network spectrum based on information collected from human behavioral data sources. In embodiments, provided herein is a transaction-enabling system having a self-executing cryptocurrency coin that commits a transaction upon recognizing a location-based parameter that provides favorable tax treatment and having a machine that automatically forecasts forward market pricing of energy credits based on information collected from human behavioral data sources. In embodiments, provided herein is a transaction-enabling system having a self-executing cryptocurrency coin that commits a transaction upon recognizing a location-based parameter that provides favorable tax treatment and having a machine that automatically forecasts forward market value of compute capability based on information collected from human behavioral data sources. In embodiments, provided herein is a transaction-enabling system having a self-executing cryptocurrency coin that commits a transaction upon recognizing a location-based parameter that provides favorable tax treatment and having an expert system that predicts a forward market price in a market for spectrum or network bandwidth based on an understanding obtained by analyzing social data sources and executes a transaction based on the forward market prediction. In embodiments, provided herein is a transaction-enabling system having a self-executing cryptocurrency coin that commits a transaction upon recognizing a location-based parameter that provides favorable tax treatment and having an intelligent agent that is configured to solicit the attention resources of another external intelligent agent. In embodiments, provided herein is a transaction-enabling system having a self-executing cryptocurrency coin that commits a transaction upon recognizing a location-based parameter that provides favorable tax treatment and having a machine that automatically purchases attention resources in a forward market for attention. In embodiments, provided herein is a transaction-enabling system having a self-executing cryptocurrency coin that commits a transaction upon recognizing a location-based parameter that provides favorable tax treatment and having a fleet of machines that automatically aggregate purchasing in a forward market for attention. In embodiments, provided herein is a transaction-enabling system having a self-executing cryptocurrency coin that commits a transaction upon recognizing a location-based parameter that provides favorable tax treatment and having a system for learning on a training set of facility outcomes, facility parameters, and data collected from data sources to train an artificial intelligence/machine learning system to predict a likelihood of a facility production outcome. In embodiments, provided herein is a transaction-enabling system having a self-executing cryptocurrency coin that commits a transaction upon recognizing a location-based parameter that provides favorable tax treatment and having a system for learning on a training set of facility outcomes, facility parameters, and data collected from data sources to train an artificial intelligence/machine learning system to predict a facility production outcome. In embodiments, provided herein is a transaction-enabling system having a self-executing cryptocurrency coin that commits a transaction upon recognizing a location-based parameter that provides favorable tax treatment and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a self-executing cryptocurrency coin that commits a transaction upon recognizing a location-based parameter that provides favorable tax treatment and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a self-executing cryptocurrency coin that commits a transaction upon recognizing a location-based parameter that provides favorable tax treatment and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a self-executing cryptocurrency coin that commits a transaction upon recognizing a location-based parameter that provides favorable tax treatment and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a self-executing cryptocurrency coin that commits a transaction upon recognizing a location-based parameter that provides favorable tax treatment and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a self-executing cryptocurrency coin that commits a transaction upon recognizing a location-based parameter that provides favorable tax treatment and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a self-executing cryptocurrency coin that commits a transaction upon recognizing a location-based parameter that provides favorable tax treatment and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a self-executing cryptocurrency coin that commits a transaction upon recognizing a location-based parameter that provides favorable tax treatment and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a self-executing cryptocurrency coin that commits a transaction upon recognizing a location-based parameter that provides favorable tax treatment and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a self-executing cryptocurrency coin that commits a transaction upon recognizing a location-based parameter that provides favorable tax treatment and having an intelligent, flexible energy and compute facility whereby an artificial intelligence/machine learning system configures the facility among a set of available configurations based on a set of detected conditions relating to an output parameter. In embodiments, provided herein is a transaction-enabling system having a self-executing cryptocurrency coin that commits a transaction upon recognizing a location-based parameter that provides favorable tax treatment and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a self-executing cryptocurrency coin that commits a transaction upon recognizing a location-based parameter that provides favorable tax treatment and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that uses machine learning to optimize the execution of cryptocurrency transactions based on tax status. In embodiments, provided herein is a transaction-enabling system having an expert system that uses machine learning to optimize the execution of cryptocurrency transactions based on tax status and having an expert system that aggregates regulatory information covering cryptocurrency transactions and automatically selects a jurisdiction for an operation based on the regulatory information. In embodiments, provided herein is a transaction-enabling system having an expert system that uses machine learning to optimize the execution of cryptocurrency transactions based on tax status and having an expert system that uses machine learning to optimize the execution of a cryptocurrency transaction based on real time energy price information for an available energy source. In embodiments, provided herein is a transaction-enabling system having an expert system that uses machine learning to optimize the execution of cryptocurrency transactions based on tax status and having an expert system that uses machine learning to optimize the execution of a cryptocurrency transaction based on an understanding of available energy sources to power computing resources to execute the transaction. In embodiments, provided herein is a transaction-enabling system having an expert system that uses machine learning to optimize the execution of cryptocurrency transactions based on tax status and having an expert system that uses machine learning to optimize charging and recharging cycle of a rechargeable battery system to provide energy for execution of a cryptocurrency transaction. In embodiments, provided herein is a transaction-enabling system having an expert system that uses machine learning to optimize the execution of cryptocurrency transactions based on tax status and having an expert system that predicts a forward market price in a market based on an understanding obtained by analyzing Internet of Things data sources and executes a transaction based on the forward market prediction. In embodiments, provided herein is a transaction-enabling system having an expert system that uses machine learning to optimize the execution of cryptocurrency transactions based on tax status and having an expert system that predicts a forward market price in a market based on an understanding obtained by analyzing social network data sources and executes a transaction based on the forward market prediction. In embodiments, provided herein is a transaction-enabling system having an expert system that uses machine learning to optimize the execution of cryptocurrency transactions based on tax status and having an expert system that predicts a forward market price in a market based on an understanding obtained by analyzing Internet of Things data sources and executes a cryptocurrency transaction based on the forward market prediction. In embodiments, provided herein is a transaction-enabling system having an expert system that uses machine learning to optimize the execution of cryptocurrency transactions based on tax status and having an expert system that predicts a forward market price in a market based on an understanding obtained by analyzing social network data sources and executes a cryptocurrency transaction based on the forward market prediction. In embodiments, provided herein is a transaction-enabling system having an expert system that uses machine learning to optimize the execution of cryptocurrency transactions based on tax status and having an expert system that predicts a forward market price in an energy market based on an understanding obtained by analyzing Internet of Things data sources and executes a transaction based on the forward market prediction. In embodiments, provided herein is a transaction-enabling system having an expert system that uses machine learning to optimize the execution of cryptocurrency transactions based on tax status and having an expert system that predicts a forward market price in an energy market based on an understanding obtained by analyzing social network data sources and executes a transaction based on the forward market prediction. In embodiments, provided herein is a transaction-enabling system having an expert system that uses machine learning to optimize the execution of cryptocurrency transactions based on tax status and having an expert system that predicts a forward market price in a market for computing resources based on an understanding obtained by analyzing Internet of Things data sources and executes a transaction based on the forward market prediction. In embodiments, provided herein is a transaction-enabling system having an expert system that uses machine learning to optimize the execution of cryptocurrency transactions based on tax status and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that uses machine learning to optimize the execution of cryptocurrency transactions based on tax status and having an expert system that predicts a forward market price in a market for computing resources based on an understanding obtained by analyzing social network data sources and executes a transaction based on the forward market prediction. In embodiments, provided herein is a transaction-enabling system having an expert system that uses machine learning to optimize the execution of cryptocurrency transactions based on tax status and having an expert system that predicts a forward market price in a market for advertising based on an understanding obtained by analyzing Internet of Things data sources and executes a transaction based on the forward market prediction. In embodiments, provided herein is a transaction-enabling system having an expert system that uses machine learning to optimize the execution of cryptocurrency transactions based on tax status and having an expert system that predicts a forward market price in a market for advertising based on an understanding obtained by analyzing social network data sources and executes a transaction based on the forward market prediction. In embodiments, provided herein is a transaction-enabling system having an expert system that uses machine learning to optimize the execution of cryptocurrency transactions based on tax status and having a machine that automatically forecasts forward market pricing of energy prices based on information collected from automated agent behavioral data sources. In embodiments, provided herein is a transaction-enabling system having an expert system that uses machine learning to optimize the execution of cryptocurrency transactions based on tax status and having a machine that automatically forecasts forward market pricing of network spectrum based on information collected from automated agent behavioral data sources. In embodiments, provided herein is a transaction-enabling system having an expert system that uses machine learning to optimize the execution of cryptocurrency transactions based on tax status and having a machine that automatically forecasts forward market pricing of energy credits based on information collected from automated agent behavioral data sources. In embodiments, provided herein is a transaction-enabling system having an expert system that uses machine learning to optimize the execution of cryptocurrency transactions based on tax status and having a machine that automatically forecasts forward market value of compute capability based on information collected from automated agent behavioral data sources. In embodiments, provided herein is a transaction-enabling system having an expert system that uses machine learning to optimize the execution of cryptocurrency transactions based on tax status and having a machine that automatically forecasts forward market pricing of energy prices based on information collected from business entity behavioral data sources. In embodiments, provided herein is a transaction-enabling system having an expert system that uses machine learning to optimize the execution of cryptocurrency transactions based on tax status and having a machine that automatically forecasts forward market pricing of network spectrum based on information collected from business entity behavioral data sources. In embodiments, provided herein is a transaction-enabling system having an expert system that uses machine learning to optimize the execution of cryptocurrency transactions based on tax status and having a machine that automatically forecasts forward market pricing of energy credits based on information collected from business entity behavioral data sources. In embodiments, provided herein is a transaction-enabling system having an expert system that uses machine learning to optimize the execution of cryptocurrency transactions based on tax status and having a machine that automatically forecasts forward market value of compute capability based on information collected from business entity behavioral data sources. In embodiments, provided herein is a transaction-enabling system having an expert system that uses machine learning to optimize the execution of cryptocurrency transactions based on tax status and having a machine that automatically forecasts forward market pricing of energy prices based on information collected from human behavioral data sources. In embodiments, provided herein is a transaction-enabling system having an expert system that uses machine learning to optimize the execution of cryptocurrency transactions based on tax status and having a machine that automatically forecasts forward market pricing of network spectrum based on information collected from human behavioral data sources. In embodiments, provided herein is a transaction-enabling system having an expert system that uses machine learning to optimize the execution of cryptocurrency transactions based on tax status and having a machine that automatically forecasts forward market pricing of energy credits based on information collected from human behavioral data sources. In embodiments, provided herein is a transaction-enabling system having an expert system that uses machine learning to optimize the execution of cryptocurrency transactions based on tax status and having a machine that automatically forecasts forward market value of compute capability based on information collected from human behavioral data sources. In embodiments, provided herein is a transaction-enabling system having an expert system that uses machine learning to optimize the execution of cryptocurrency transactions based on tax status and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that uses machine learning to optimize the execution of cryptocurrency transactions based on tax status and having an intelligent agent that is configured to solicit the attention resources of another external intelligent agent.

In embodiments, provided herein is a transaction-enabling system having an expert system that uses machine learning to optimize the execution of cryptocurrency transactions based on tax status and having a machine that automatically purchases attention resources in a forward market for attention. In embodiments, provided herein is a transaction-enabling system having an expert system that uses machine learning to optimize the execution of cryptocurrency transactions based on tax status and having a fleet of machines that automatically aggregate purchasing in a forward market for attention. In embodiments, provided herein is a transaction-enabling system having an expert system that uses machine learning to optimize the execution of cryptocurrency transactions based on tax status and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that uses machine learning to optimize the execution of cryptocurrency transactions based on tax status and having a system for learning on a training set of facility outcomes, facility parameters, and data collected from data sources to train an artificial intelligence/machine learning system to predict a facility production outcome. In embodiments, provided herein is a transaction-enabling system having an expert system that uses machine learning to optimize the execution of cryptocurrency transactions based on tax status and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that uses machine learning to optimize the execution of cryptocurrency transactions based on tax status and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that uses machine learning to optimize the execution of cryptocurrency transactions based on tax status and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that uses machine learning to optimize the execution of cryptocurrency transactions based on tax status and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that uses machine learning to optimize the execution of cryptocurrency transactions based on tax status and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that uses machine learning to optimize the execution of cryptocurrency transactions based on tax status and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that uses machine learning to optimize the execution of cryptocurrency transactions based on tax status and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that uses machine learning to optimize the execution of cryptocurrency transactions based on tax status and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that uses machine learning to optimize the execution of cryptocurrency transactions based on tax status and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that uses machine learning to optimize the execution of cryptocurrency transactions based on tax status and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that uses machine learning to optimize the execution of cryptocurrency transactions based on tax status and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that uses machine learning to optimize the execution of cryptocurrency transactions based on tax status and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that aggregates regulatory information covering cryptocurrency transactions and automatically selects a jurisdiction for an operation based on the regulatory information. In embodiments, provided herein is a transaction-enabling system having an expert system that aggregates regulatory information covering cryptocurrency transactions and automatically selects a jurisdiction for an operation based on the regulatory information and having an expert system that uses machine learning to optimize the execution of a cryptocurrency transaction based on real time energy price information for an available energy source. In embodiments, provided herein is a transaction-enabling system having an expert system that aggregates regulatory information covering cryptocurrency transactions and automatically selects a jurisdiction for an operation based on the regulatory information and having an expert system that uses machine learning to optimize the execution of a cryptocurrency transaction based on an understanding of available energy sources to power computing resources to execute the transaction. In embodiments, provided herein is a transaction-enabling system having an expert system that aggregates regulatory information covering cryptocurrency transactions and automatically selects a jurisdiction for an operation based on the regulatory information and having an expert system that uses machine learning to optimize charging and recharging cycle of a rechargeable battery system to provide energy for execution of a cryptocurrency transaction. In embodiments, provided herein is a transaction-enabling system having an expert system that aggregates regulatory information covering cryptocurrency transactions and automatically selects a jurisdiction for an operation based on the regulatory information and having an expert system that predicts a forward market price in a market based on an understanding obtained by analyzing Internet of Things data sources and executes a transaction based on the forward market prediction. In embodiments, provided herein is a transaction-enabling system having an expert system that aggregates regulatory information covering cryptocurrency transactions and automatically selects a jurisdiction for an operation based on the regulatory information and having an expert system that predicts a forward market price in a market based on an understanding obtained by analyzing social network data sources and executes a transaction based on the forward market prediction. In embodiments, provided herein is a transaction-enabling system having an expert system that aggregates regulatory information covering cryptocurrency transactions and automatically selects a jurisdiction for an operation based on the regulatory information and having an expert system that predicts a forward market price in a market based on an understanding obtained by analyzing Internet of Things data sources and executes a cryptocurrency transaction based on the forward market prediction. In embodiments, provided herein is a transaction-enabling system having an expert system that aggregates regulatory information covering cryptocurrency transactions and automatically selects a jurisdiction for an operation based on the regulatory information and having an expert system that predicts a forward market price in a market based on an understanding obtained by analyzing social network data sources and executes a cryptocurrency transaction based on the forward market prediction. In embodiments, provided herein is a transaction-enabling system having an expert system that aggregates regulatory information covering cryptocurrency transactions and automatically selects a jurisdiction for an operation based on the regulatory information and having an expert system that predicts a forward market price in an energy market based on an understanding obtained by analyzing Internet of Things data sources and executes a transaction based on the forward market prediction. In embodiments, provided herein is a transaction-enabling system having an expert system that aggregates regulatory information covering cryptocurrency transactions and automatically selects a jurisdiction for an operation based on the regulatory information and having an expert system that predicts a forward market price in an energy market based on an understanding obtained by analyzing social network data sources and executes a transaction based on the forward market prediction. In embodiments, provided herein is a transaction-enabling system having an expert system that aggregates regulatory information covering cryptocurrency transactions and automatically selects a jurisdiction for an operation based on the regulatory information and having an expert system that predicts a forward market price in a market for computing resources based on an understanding obtained by analyzing Internet of Things data sources and executes a transaction based on the forward market prediction. In embodiments, provided herein is a transaction-enabling system having an expert system that aggregates regulatory information covering cryptocurrency transactions and automatically selects a jurisdiction for an operation based on the regulatory information and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that aggregates regulatory information covering cryptocurrency transactions and automatically selects a jurisdiction for an operation based on the regulatory information and having an expert system that predicts a forward market price in a market for computing resources based on an understanding obtained by analyzing social network data sources and executes a transaction based on the forward market prediction. In embodiments, provided herein is a transaction-enabling system having an expert system that aggregates regulatory information covering cryptocurrency transactions and automatically selects a jurisdiction for an operation based on the regulatory information and having an expert system that predicts a forward market price in a market for advertising based on an understanding obtained by analyzing Internet of Things data sources and executes a transaction based on the forward market prediction. In embodiments, provided herein is a transaction-enabling system having an expert system that aggregates regulatory information covering cryptocurrency transactions and automatically selects a jurisdiction for an operation based on the regulatory information and having an expert system that predicts a forward market price in a market for advertising based on an understanding obtained by analyzing social network data sources and executes a transaction based on the forward market prediction. In embodiments, provided herein is a transaction-enabling system having an expert system that aggregates regulatory information covering cryptocurrency transactions and automatically selects a jurisdiction for an operation based on the regulatory information and having a machine that automatically forecasts forward market pricing of energy prices based on information collected from automated agent behavioral data sources. In embodiments, provided herein is a transaction-enabling system having an expert system that aggregates regulatory information covering cryptocurrency transactions and automatically selects a jurisdiction for an operation based on the regulatory information and having a machine that automatically forecasts forward market pricing of network spectrum based on information collected from automated agent behavioral data sources. In embodiments, provided herein is a transaction-enabling system having an expert system that aggregates regulatory information covering cryptocurrency transactions and automatically selects a jurisdiction for an operation based on the regulatory information and having a machine that automatically forecasts forward market pricing of energy credits based on information collected from automated agent behavioral data sources. In embodiments, provided herein is a transaction-enabling system having an expert system that aggregates regulatory information covering cryptocurrency transactions and automatically selects a jurisdiction for an operation based on the regulatory information and having a machine that automatically forecasts forward market value of compute capability based on information collected from automated agent behavioral data sources. In embodiments, provided herein is a transaction-enabling system having an expert system that aggregates regulatory information covering cryptocurrency transactions and automatically selects a jurisdiction for an operation based on the regulatory information and having a machine that automatically forecasts forward market pricing of energy prices based on information collected from business entity behavioral data sources. In embodiments, provided herein is a transaction-enabling system having an expert system that aggregates regulatory information covering cryptocurrency transactions and automatically selects a jurisdiction for an operation based on the regulatory information and having a machine that automatically forecasts forward market pricing of network spectrum based on information collected from business entity behavioral data sources. In embodiments, provided herein is a transaction-enabling system having an expert system that aggregates regulatory information covering cryptocurrency transactions and automatically selects a jurisdiction for an operation based on the regulatory information and having a machine that automatically forecasts forward market pricing of energy credits based on information collected from business entity behavioral data sources. In embodiments, provided herein is a transaction-enabling system having an expert system that aggregates regulatory information covering cryptocurrency transactions and automatically selects a jurisdiction for an operation based on the regulatory information and having a machine that automatically forecasts forward market value of compute capability based on information collected from business entity behavioral data sources. In embodiments, provided herein is a transaction-enabling system having an expert system that aggregates regulatory information covering cryptocurrency transactions and automatically selects a jurisdiction for an operation based on the regulatory information and having a machine that automatically forecasts forward market pricing of energy prices based on information collected from human behavioral data sources. In embodiments, provided herein is a transaction-enabling system having an expert system that aggregates regulatory information covering cryptocurrency transactions and automatically selects a jurisdiction for an operation based on the regulatory information and having a machine that automatically forecasts forward market pricing of network spectrum based on information collected from human behavioral data sources. In embodiments, provided herein is a transaction-enabling system having an expert system that aggregates regulatory information covering cryptocurrency transactions and automatically selects a jurisdiction for an operation based on the regulatory information and having a machine that automatically forecasts forward market pricing of energy credits based on information collected from human behavioral data sources. In embodiments, provided herein is a transaction-enabling system having an expert system that aggregates regulatory information covering cryptocurrency transactions and automatically selects a jurisdiction for an operation based on the regulatory information and having a machine that automatically forecasts forward market value of compute capability based on information collected from human behavioral data sources. In embodiments, provided herein is a transaction-enabling system having an expert system that aggregates regulatory information covering cryptocurrency transactions and automatically selects a jurisdiction for an operation based on the regulatory information and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that aggregates regulatory information covering cryptocurrency transactions and automatically selects a jurisdiction for an operation based on the regulatory information and having an intelligent agent that is configured to solicit the attention resources of another external intelligent agent. In embodiments, provided herein is a transaction-enabling system having an expert system that aggregates regulatory information covering cryptocurrency transactions and automatically selects a jurisdiction for an operation based on the regulatory information and having a machine that automatically purchases attention resources in a forward market for attention. In embodiments, provided herein is a transaction-enabling system having an expert system that aggregates regulatory information covering cryptocurrency transactions and automatically selects a jurisdiction for an operation based on the regulatory information and having a fleet of machines that automatically aggregate purchasing in a forward market for attention. In embodiments, provided herein is a transaction-enabling system having an expert system that aggregates regulatory information covering cryptocurrency transactions and automatically selects a jurisdiction for an operation based on the regulatory information and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that aggregates regulatory information covering cryptocurrency transactions and automatically selects a jurisdiction for an operation based on the regulatory information and having a system for learning on a training set of facility outcomes, facility parameters, and data collected from data sources to train an artificial intelligence/machine learning system to predict a facility production outcome. In embodiments, provided herein is a transaction-enabling system having an expert system that aggregates regulatory information covering cryptocurrency transactions and automatically selects a jurisdiction for an operation based on the regulatory information and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that aggregates regulatory information covering cryptocurrency transactions and automatically selects a jurisdiction for an operation based on the regulatory information and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that aggregates regulatory information covering cryptocurrency transactions and automatically selects a jurisdiction for an operation based on the regulatory information and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that aggregates regulatory information covering cryptocurrency transactions and automatically selects a jurisdiction for an operation based on the regulatory information and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that aggregates regulatory information covering cryptocurrency transactions and automatically selects a jurisdiction for an operation based on the regulatory information and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that aggregates regulatory information covering cryptocurrency transactions and automatically selects a jurisdiction for an operation based on the regulatory information and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that aggregates regulatory information covering cryptocurrency transactions and automatically selects a jurisdiction for an operation based on the regulatory information and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that aggregates regulatory information covering cryptocurrency transactions and automatically selects a jurisdiction for an operation based on the regulatory information and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that aggregates regulatory information covering cryptocurrency transactions and automatically selects a jurisdiction for an operation based on the regulatory information and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that aggregates regulatory information covering cryptocurrency transactions and automatically selects a jurisdiction for an operation based on the regulatory information and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that aggregates regulatory information covering cryptocurrency transactions and automatically selects a jurisdiction for an operation based on the regulatory information and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that aggregates regulatory information covering cryptocurrency transactions and automatically selects a jurisdiction for an operation based on the regulatory information and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that uses machine learning to optimize the execution of a cryptocurrency transaction based on real time energy price information for an available energy source. In embodiments, provided herein is a transaction-enabling system having an expert system that uses machine learning to optimize the execution of a cryptocurrency transaction based on real time energy price information for an available energy source and having an expert system that uses machine learning to optimize the execution of a cryptocurrency transaction based on an understanding of available energy sources to power computing resources to execute the transaction. In embodiments, provided herein is a transaction-enabling system having an expert system that uses machine learning to optimize the execution of a cryptocurrency transaction based on real time energy price information for an available energy source and having an expert system that uses machine learning to optimize charging and recharging cycle of a rechargeable battery system to provide energy for execution of a cryptocurrency transaction. In embodiments, provided herein is a transaction-enabling system having an expert system that uses machine learning to optimize the execution of a cryptocurrency transaction based on real time energy price information for an available energy source and having an expert system that predicts a forward market price in a market based on an understanding obtained by analyzing Internet of Things data sources and executes a transaction based on the forward market prediction. In embodiments, provided herein is a transaction-enabling system having an expert system that uses machine learning to optimize the execution of a cryptocurrency transaction based on real time energy price information for an available energy source and having an expert system that predicts a forward market price in a market based on an understanding obtained by analyzing social network data sources and executes a transaction based on the forward market prediction. In embodiments, provided herein is a transaction-enabling system having an expert system that uses machine learning to optimize the execution of a cryptocurrency transaction based on real time energy price information for an available energy source and having an expert system that predicts a forward market price in a market based on an understanding obtained by analyzing Internet of Things data sources and executes a cryptocurrency transaction based on the forward market prediction. In embodiments, provided herein is a transaction-enabling system having an expert system that uses machine learning to optimize the execution of a cryptocurrency transaction based on real time energy price information for an available energy source and having an expert system that predicts a forward market price in a market based on an understanding obtained by analyzing social network data sources and executes a cryptocurrency transaction based on the forward market prediction. In embodiments, provided herein is a transaction-enabling system having an expert system that uses machine learning to optimize the execution of a cryptocurrency transaction based on real time energy price information for an available energy source and having an expert system that predicts a forward market price in an energy market based on an understanding obtained by analyzing Internet of Things data sources and executes a transaction based on the forward market prediction. In embodiments, provided herein is a transaction-enabling system having an expert system that uses machine learning to optimize the execution of a cryptocurrency transaction based on real time energy price information for an available energy source and having an expert system that predicts a forward market price in an energy market based on an understanding obtained by analyzing social network data sources and executes a transaction based on the forward market prediction. In embodiments, provided herein is a transaction-enabling system having an expert system that uses machine learning to optimize the execution of a cryptocurrency transaction based on real time energy price information for an available energy source and having an expert system that predicts a forward market price in a market for computing resources based on an understanding obtained by analyzing Internet of Things data sources and executes a transaction based on the forward market prediction. In embodiments, provided herein is a transaction-enabling system having an expert system that uses machine learning to optimize the execution of a cryptocurrency transaction based on real time energy price information for an available energy source and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that uses machine learning to optimize the execution of a cryptocurrency transaction based on real time energy price information for an available energy source and having an expert system that predicts a forward market price in a market for computing resources based on an understanding obtained by analyzing social network data sources and executes a transaction based on the forward market prediction. In embodiments, provided herein is a transaction-enabling system having an expert system that uses machine learning to optimize the execution of a cryptocurrency transaction based on real time energy price information for an available energy source and having an expert system that predicts a forward market price in a market for advertising based on an understanding obtained by analyzing Internet of Things data sources and executes a transaction based on the forward market prediction. In embodiments, provided herein is a transaction-enabling system having an expert system that uses machine learning to optimize the execution of a cryptocurrency transaction based on real time energy price information for an available energy source and having an expert system that predicts a forward market price in a market for advertising based on an understanding obtained by analyzing social network data sources and executes a transaction based on the forward market prediction. In embodiments, provided herein is a transaction-enabling system having an expert system that uses machine learning to optimize the execution of a cryptocurrency transaction based on real time energy price information for an available energy source and having a machine that automatically forecasts forward market pricing of energy prices based on information collected from automated agent behavioral data sources. In embodiments, provided herein is a transaction-enabling system having an expert system that uses machine learning to optimize the execution of a cryptocurrency transaction based on real time energy price information for an available energy source and having a machine that automatically forecasts forward market pricing of network spectrum based on information collected from automated agent behavioral data sources. In embodiments, provided herein is a transaction-enabling system having an expert system that uses machine learning to optimize the execution of a cryptocurrency transaction based on real time energy price information for an available energy source and having a machine that automatically forecasts forward market pricing of energy credits based on information collected from automated agent behavioral data sources. In embodiments, provided herein is a transaction-enabling system having an expert system that uses machine learning to optimize the execution of a cryptocurrency transaction based on real time energy price information for an available energy source and having a machine that automatically forecasts forward market value of compute capability based on information collected from automated agent behavioral data sources. In embodiments, provided herein is a transaction-enabling system having an expert system that uses machine learning to optimize the execution of a cryptocurrency transaction based on real time energy price information for an available energy source and having a machine that automatically forecasts forward market pricing of energy prices based on information collected from business entity behavioral data sources. In embodiments, provided herein is a transaction-enabling system having an expert system that uses machine learning to optimize the execution of a cryptocurrency transaction based on real time energy price information for an available energy source and having a machine that automatically forecasts forward market pricing of network spectrum based on information collected from business entity behavioral data sources. In embodiments, provided herein is a transaction-enabling system having an expert system that uses machine learning to optimize the execution of a cryptocurrency transaction based on real time energy price information for an available energy source and having a machine that automatically forecasts forward market pricing of energy credits based on information collected from business entity behavioral data sources. In embodiments, provided herein is a transaction-enabling system having an expert system that uses machine learning to optimize the execution of a cryptocurrency transaction based on real time energy price information for an available energy source and having a machine that automatically forecasts forward market value of compute capability based on information collected from business entity behavioral data sources. In embodiments, provided herein is a transaction-enabling system having an expert system that uses machine learning to optimize the execution of a cryptocurrency transaction based on real time energy price information for an available energy source and having a machine that automatically forecasts forward market pricing of energy prices based on information collected from human behavioral data sources. In embodiments, provided herein is a transaction-enabling system having an expert system that uses machine learning to optimize the execution of a cryptocurrency transaction based on real time energy price information for an available energy source and having a machine that automatically forecasts forward market pricing of network spectrum based on information collected from human behavioral data sources. In embodiments, provided herein is a transaction-enabling system having an expert system that uses machine learning to optimize the execution of a cryptocurrency transaction based on real time energy price information for an available energy source and having a machine that automatically forecasts forward market pricing of energy credits based on information collected from human behavioral data sources. In embodiments, provided herein is a transaction-enabling system having an expert system that uses machine learning to optimize the execution of a cryptocurrency transaction based on real time energy price information for an available energy source and having a machine that automatically forecasts forward market value of compute capability based on information collected from human behavioral data sources. In embodiments, provided herein is a transaction-enabling system having an expert system that uses machine learning to optimize the execution of a cryptocurrency transaction based on real time energy price information for an available energy source and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that uses machine learning to optimize the execution of a cryptocurrency transaction based on real time energy price information for an available energy source and having an intelligent agent that is configured to solicit the attention resources of another external intelligent agent. In embodiments, provided herein is a transaction-enabling system having an expert system that uses machine learning to optimize the execution of a cryptocurrency transaction based on real time energy price information for an available energy source and having a machine that automatically purchases attention resources in a forward market for attention. In embodiments, provided herein is a transaction-enabling system having an expert system that uses machine learning to optimize the execution of a cryptocurrency transaction based on real time energy price information for an available energy source and having a fleet of machines that automatically aggregate purchasing in a forward market for attention. In embodiments, provided herein is a transaction-enabling system having an expert system that uses machine learning to optimize the execution of a cryptocurrency transaction based on real time energy price information for an available energy source and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that uses machine learning to optimize the execution of a cryptocurrency transaction based on real time energy price information for an available energy source and having a system for learning on a training set of facility outcomes, facility parameters, and data collected from data sources to train an artificial intelligence/machine learning system to predict a facility production outcome. In embodiments, provided herein is a transaction-enabling system having an expert system that uses machine learning to optimize the execution of a cryptocurrency transaction based on real time energy price information for an available energy source and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that uses machine learning to optimize the execution of a cryptocurrency transaction based on real time energy price information for an available energy source and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that uses machine learning to optimize the execution of a cryptocurrency transaction based on real time energy price information for an available energy source and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that uses machine learning to optimize the execution of a cryptocurrency transaction based on real time energy price information for an available energy source and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that uses machine learning to optimize the execution of a cryptocurrency transaction based on real time energy price information for an available energy source and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that uses machine learning to optimize the execution of a cryptocurrency transaction based on real time energy price information for an available energy source and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that uses machine learning to optimize the execution of a cryptocurrency transaction based on real time energy price information for an available energy source and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that uses machine learning to optimize the execution of a cryptocurrency transaction based on real time energy price information for an available energy source and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that uses machine learning to optimize the execution of a cryptocurrency transaction based on real time energy price information for an available energy source and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that uses machine learning to optimize the execution of a cryptocurrency transaction based on real time energy price information for an available energy source and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that uses machine learning to optimize the execution of a cryptocurrency transaction based on real time energy price information for an available energy source and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that uses machine learning to optimize the execution of a cryptocurrency transaction based on real time energy price information for an available energy source and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that uses machine learning to optimize the execution of a cryptocurrency transaction based on an understanding of available energy sources to power computing resources to execute the transaction. In embodiments, provided herein is a transaction-enabling system having an expert system that uses machine learning to optimize the execution of a cryptocurrency transaction based on an understanding of available energy sources to power computing resources to execute the transaction and having an expert system that uses machine learning to optimize charging and recharging cycle of a rechargeable battery system to provide energy for execution of a cryptocurrency transaction. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in a market based on an understanding obtained by analyzing Internet of Things data sources and executes a transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in a market based on an understanding obtained by analyzing social network data sources and executes a transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in a market based on an understanding obtained by analyzing Internet of Things data sources and executes a cryptocurrency transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in a market based on an understanding obtained by analyzing social network data sources and executes a cryptocurrency transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in an energy market based on an understanding obtained by analyzing Internet of Things data sources and executes a transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in an energy market based on an understanding obtained by analyzing social network data sources and executes a transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in a market for computing resources based on an understanding obtained by analyzing Internet of Things data sources and executes a transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in a market for computing resources based on an understanding obtained by analyzing social network data sources and executes a transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in a market for advertising based on an understanding obtained by analyzing Internet of Things data sources and executes a transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in a market for advertising based on an understanding obtained by analyzing social network data sources and executes a transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market pricing of energy prices based on information collected from automated agent behavioral data sources. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market pricing of network spectrum based on information collected from automated agent behavioral data sources. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market pricing of energy credits based on information collected from automated agent behavioral data sources. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market value of compute capability based on information collected from automated agent behavioral data sources. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market pricing of energy prices based on information collected from business entity behavioral data sources. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market pricing of network spectrum based on information collected from business entity behavioral data sources. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market pricing of energy credits based on information collected from business entity behavioral data sources. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market value of compute capability based on information collected from business entity behavioral data sources. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market pricing of energy prices based on information collected from human behavioral data sources. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market pricing of network spectrum based on information collected from human behavioral data sources. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market pricing of energy credits based on information collected from human behavioral data sources. In embodiments, provided herein is a transaction-enabling system having an expert system that uses machine learning to optimize the execution of a cryptocurrency transaction based on an understanding of available energy sources to power computing resources to execute the transaction and having a machine that automatically forecasts forward market value of compute capability based on information collected from human behavioral data sources. In embodiments, provided herein is a transaction-enabling system having an expert system that uses machine learning to optimize the execution of a cryptocurrency transaction based on an understanding of available energy sources to power computing resources to execute the transaction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that uses machine learning to optimize the execution of a cryptocurrency transaction based on an understanding of available energy sources to power computing resources to execute the transaction and having an intelligent agent that is configured to solicit the attention resources of another external intelligent agent. In embodiments, provided herein is a transaction-enabling system having an expert system that uses machine learning to optimize the execution of a cryptocurrency transaction based on an understanding of available energy sources to power computing resources to execute the transaction and having a machine that automatically purchases attention resources in a forward market for attention. In embodiments, provided herein is a transaction-enabling system having an expert system that uses machine learning to optimize the execution of a cryptocurrency transaction based on an understanding of available energy sources to power computing resources to execute the transaction and having a fleet of machines that automatically aggregate purchasing in a forward market for attention. In embodiments, provided herein is a transaction-enabling system having an expert system that uses machine learning to optimize the execution of a cryptocurrency transaction based on an understanding of available energy sources to power computing resources to execute the transaction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that uses machine learning to optimize the execution of a cryptocurrency transaction based on an understanding of available energy sources to power computing resources to execute the transaction and having a system for learning on a training set of facility outcomes, facility parameters, and data collected from data sources to train an artificial intelligence/machine learning system to predict a facility production outcome. In embodiments, provided herein is a transaction-enabling system having an expert system that uses machine learning to optimize the execution of a cryptocurrency transaction based on an understanding of available energy sources to power computing resources to execute the transaction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that uses machine learning to optimize the execution of a cryptocurrency transaction based on an understanding of available energy sources to power computing resources to execute the transaction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that uses machine learning to optimize the execution of a cryptocurrency transaction based on an understanding of available energy sources to power computing resources to execute the transaction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that uses machine learning to optimize the execution of a cryptocurrency transaction based on an understanding of available energy sources to power computing resources to execute the transaction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that uses machine learning to optimize the execution of a cryptocurrency transaction based on an understanding of available energy sources to power computing resources to execute the transaction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that uses machine learning to optimize the execution of a cryptocurrency transaction based on an understanding of available energy sources to power computing resources to execute the transaction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that uses machine learning to optimize the execution of a cryptocurrency transaction based on an understanding of available energy sources to power computing resources to execute the transaction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that uses machine learning to optimize the execution of a cryptocurrency transaction based on an understanding of available energy sources to power computing resources to execute the transaction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that uses machine learning to optimize the execution of a cryptocurrency transaction based on an understanding of available energy sources to power computing resources to execute the transaction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that uses machine learning to optimize the execution of a cryptocurrency transaction based on an understanding of available energy sources to power computing resources to execute the transaction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that uses machine learning to optimize the execution of a cryptocurrency transaction based on an understanding of available energy sources to power computing resources to execute the transaction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that uses machine learning to optimize the execution of a cryptocurrency transaction based on an understanding of available energy sources to power computing resources to execute the transaction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having an expert system that uses machine learning to optimize charging and recharging cycle of a rechargeable battery system to provide energy for execution of a cryptocurrency transaction. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in a market based on an understanding obtained by analyzing Internet of Things data sources and executes a transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in a market based on an understanding obtained by analyzing social network data sources and executes a transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in a market based on an understanding obtained by analyzing Internet of Things data sources and executes a cryptocurrency transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in a market based on an understanding obtained by analyzing social network data sources and executes a cryptocurrency transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in an energy market based on an understanding obtained by analyzing Internet of Things data sources and executes a transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in an energy market based on an understanding obtained by analyzing social network data sources and executes a transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in a market for computing resources based on an understanding obtained by analyzing Internet of Things data sources and executes a transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in a market for computing resources based on an understanding obtained by analyzing social network data sources and executes a transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in a market for advertising based on an understanding obtained by analyzing Internet of Things data sources and executes a transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in a market for advertising based on an understanding obtained by analyzing social network data sources and executes a transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market pricing of energy prices based on information collected from automated agent behavioral data sources. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market pricing of network spectrum based on information collected from automated agent behavioral data sources. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market pricing of energy credits based on information collected from automated agent behavioral data sources. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market value of compute capability based on information collected from automated agent behavioral data sources. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market pricing of energy prices based on information collected from business entity behavioral data sources. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market pricing of network spectrum based on information collected from business entity behavioral data sources. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market pricing of energy credits based on information collected from business entity behavioral data sources. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market value of compute capability based on information collected from business entity behavioral data sources. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market pricing of energy prices based on information collected from human behavioral data sources. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market pricing of network spectrum based on information collected from human behavioral data sources. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market pricing of energy credits based on information collected from human behavioral data sources. In embodiments, provided herein is a transaction-enabling system having an expert system that uses machine learning to optimize charging and recharging cycle of a rechargeable battery system to provide energy for execution of a cryptocurrency transaction and having a machine that automatically forecasts forward market value of compute capability based on information collected from human behavioral data sources. In embodiments, provided herein is a transaction-enabling system having an expert system that uses machine learning to optimize charging and recharging cycle of a rechargeable battery system to provide energy for execution of a cryptocurrency transaction and having an expert system that predicts a forward market price in a market for spectrum or network bandwidth based on an understanding obtained by analyzing social data sources and executes a transaction based on the forward market prediction. In embodiments, provided herein is a transaction-enabling system having an expert system that uses machine learning to optimize charging and recharging cycle of a rechargeable battery system to provide energy for execution of a cryptocurrency transaction and having an intelligent agent that is configured to solicit the attention resources of another external intelligent agent. In embodiments, provided herein is a transaction-enabling system having an expert system that uses machine learning to optimize charging and recharging cycle of a rechargeable battery system to provide energy for execution of a cryptocurrency transaction and having a machine that automatically purchases attention resources in a forward market for attention. In embodiments, provided herein is a transaction-enabling system having an expert system that uses machine learning to optimize charging and recharging cycle of a rechargeable battery system to provide energy for execution of a cryptocurrency transaction and having a fleet of machines that automatically aggregate purchasing in a forward market for attention. In embodiments, provided herein is a transaction-enabling system having an expert system that uses machine learning to optimize charging and recharging cycle of a rechargeable battery system to provide energy for execution of a cryptocurrency transaction and having a system for learning on a training set of facility outcomes, facility parameters, and data collected from data sources to train an artificial intelligence/machine learning system to predict a likelihood of a facility production outcome. In embodiments, provided herein is a transaction-enabling system having an expert system that uses machine learning to optimize charging and recharging cycle of a rechargeable battery system to provide energy for execution of a cryptocurrency transaction and having a system for learning on a training set of facility outcomes, facility parameters, and data collected from data sources to train an artificial intelligence/machine learning system to predict a facility production outcome. In embodiments, provided herein is a transaction-enabling system having an expert system that uses machine learning to optimize charging and recharging cycle of a rechargeable battery system to provide energy for execution of a cryptocurrency transaction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an expert system that uses machine learning to optimize charging and recharging cycle of a rechargeable battery system to provide energy for execution of a cryptocurrency transaction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an expert system that uses machine learning to optimize charging and recharging cycle of a rechargeable battery system to provide energy for execution of a cryptocurrency transaction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an expert system that uses machine learning to optimize charging and recharging cycle of a rechargeable battery system to provide energy for execution of a cryptocurrency transaction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an expert system that uses machine learning to optimize charging and recharging cycle of a rechargeable battery system to provide energy for execution of a cryptocurrency transaction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an expert system that uses machine learning to optimize charging and recharging cycle of a rechargeable battery system to provide energy for execution of a cryptocurrency transaction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an expert system that uses machine learning to optimize charging and recharging cycle of a rechargeable battery system to provide energy for execution of a cryptocurrency transaction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an expert system that uses machine learning to optimize charging and recharging cycle of a rechargeable battery system to provide energy for execution of a cryptocurrency transaction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an expert system that uses machine learning to optimize charging and recharging cycle of a rechargeable battery system to provide energy for execution of a cryptocurrency transaction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an expert system that uses machine learning to optimize charging and recharging cycle of a rechargeable battery system to provide energy for execution of a cryptocurrency transaction and having an intelligent, flexible energy and compute facility whereby an artificial intelligence/machine learning system configures the facility among a set of available configurations based on a set of detected conditions relating to an output parameter. In embodiments, provided herein is a transaction-enabling system having an expert system that uses machine learning to optimize charging and recharging cycle of a rechargeable battery system to provide energy for execution of a cryptocurrency transaction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an expert system that uses machine learning to optimize charging and recharging cycle of a rechargeable battery system to provide energy for execution of a cryptocurrency transaction and having an intelligent, flexible energy and compute facility whereby an artificial intelligence/machine learning system configures the facility among a set of available configurations based on a set of parameters received from a digital twin for the facility.

Figure 69:
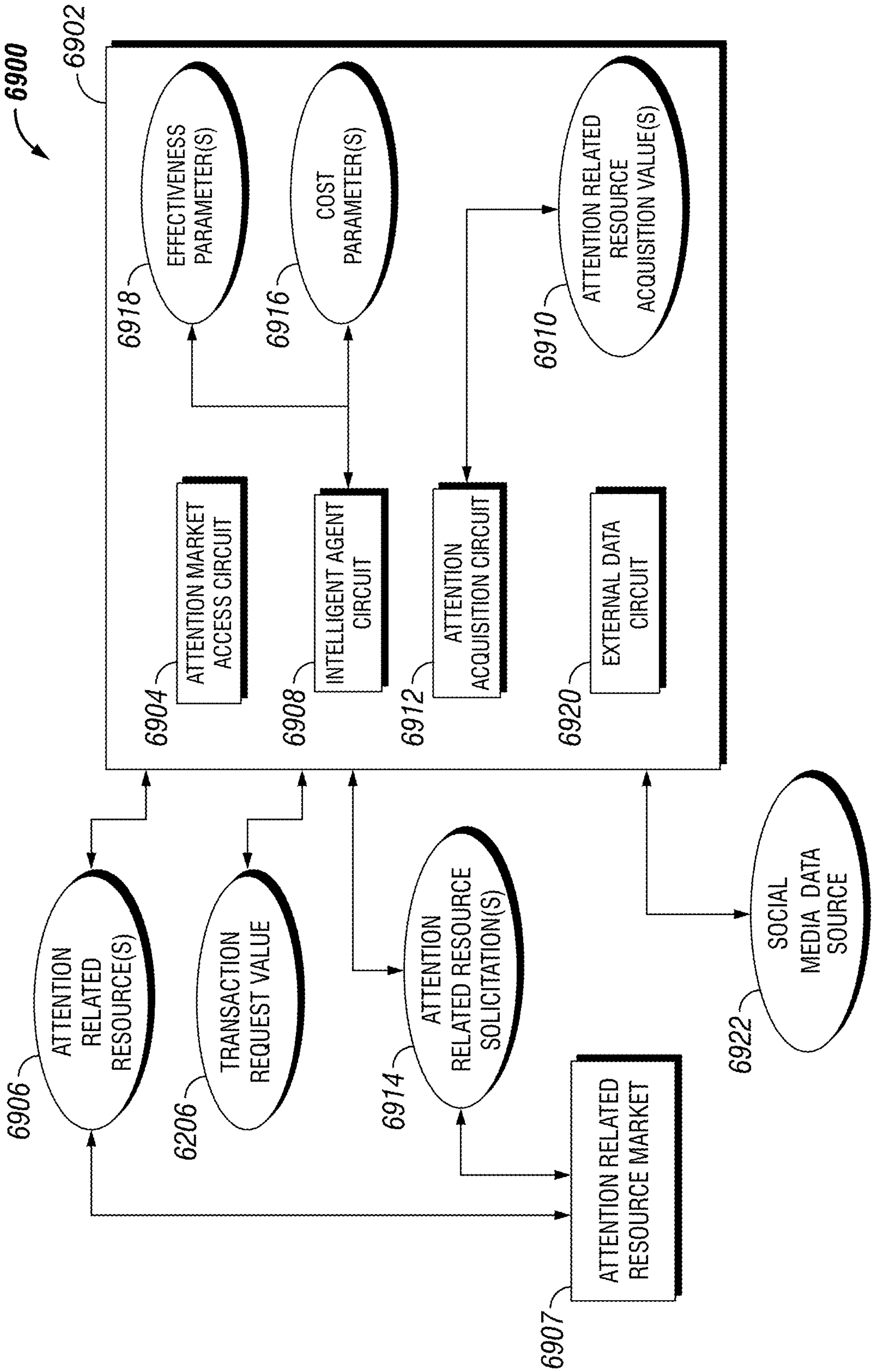
FIG. 69 is a schematic diagram of a system for improving attention market transaction operations.

Referencing FIG. 69, an example transaction-enabling system 6900 includes a controller 6902 having: an attention market access circuit 6904 structured to interpret a number of attention-related resources 6906 available on an attention related resource market 6907, an intelligent agent circuit 6908 that determines an attention-related resource acquisition value 6910 based on a cost parameter 6916 of at least one of the number of attention-related resources 6906, and an attention acquisition circuit 6912 structured to solicit an attention-related resource 6906 (e.g., by providing an attention-related resource solicitation 6914 to the attention-related resource market 6907) in response to the attention-related resource acquisition value 6910. In certain embodiments, an attention-related resource 6906 may be available for purchase or sale on the attention-related resource market 6907, and/or in certain embodiments an attention-related resource 6906 may be provided by and/or accessible to the controller 6902 for sale on the attention-related resource market 6907.

An example system 6900 includes where the attention acquisition circuit 6912 is further structured to solicit the attention-related resource 6906 by performing an operation such as: purchasing the attention-related resource 6906 from the attention related resource market 6907; selling the attention-related resource 6906 to the attention related resource market 6907; making an offer to sell the attention-related resource 6906 to a second intelligent agent (not shown); and/or making an offer to purchase the attention-related resource from the second intelligent agent. An example system 6900 includes where the number of attention-related resources 6906 include resources such as: an advertising placement; a search listing; a keyword listing; a banner advertisement; a video advertisement; an embedded video advertisement; a panel activity participation; a survey activity participation; a trial activity participation; and/or a pilot activity placement or participation.

An example system 6900 includes one or more of: where the attention related resource market 6907 includes a spot market for at least one of the number of attention-related resources 6906; where the cost parameter 6916 of at least one of the number of attention-related resources 6906 includes a future predicted cost of the at least one of the number of attention-related resources, and where the intelligent agent circuit 6908 is further structured to determine the attention-related resource acquisition value 6910 in response to a comparison of a first cost on the spot market with the cost parameter 6916; where the attention related resource market 6907 includes a forward market for at least one of the number of attention-related resources 6906, and where the cost parameter 6916 of the at least one of the number of attention-related resources 6906 includes a predicted future cost; and/or where the cost parameter 6916 of at least one of the number of attention-related resources 6906 includes a future predicted cost of the at least one of the number of attention-related resources 6906, and where the intelligent agent circuit 6908 is further structured to determine the attention-related resource acquisition value 6910 in response to a comparison of a first cost on the forward market with the cost parameter 6916. An example system includes the intelligent agent circuit 6908 further structured to determine the attention-related resource acquisition value 6910 in response to the cost parameter 6916 of the at least one of the number of attention-related resources having a value that is outside of an expected cost range for the at least one of the number of attention-related resources 6906. An example system includes the intelligent agent circuit 6908 is further structured to determine the attention-related resource acquisition value 6910 in response to a function of: the cost parameter 6916 of the at least one of the number of attention-related resources, and/or an effectiveness parameter 6918 of the at least one of the number of attention-related resources 6906. In certain further embodiments, an example controller 6902 further includes an external data circuit 6920 structured to interpret a social media data source 6922, and where the intelligent agent circuit 6908 is further structured to determine, in response to the social media data source 6922, at least one of a future predicted cost of the at least one of the number of attention-related resources 6906, and to utilize the future predicted cost as the cost parameter 6916 and/or the effectiveness parameter 6918 of the at least one of the number of attention-related resources 6906.

Figure 71:
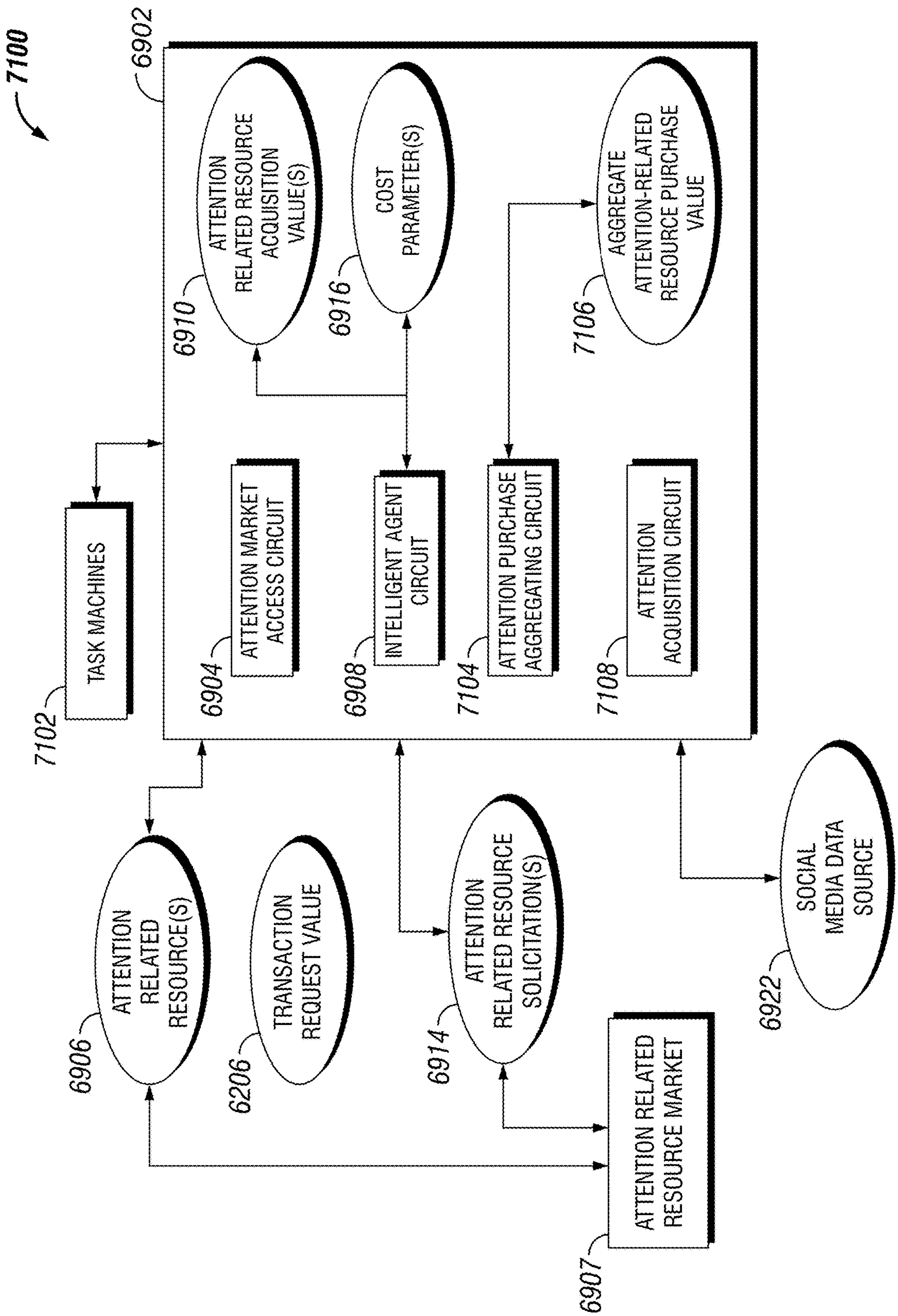
FIG. 71 is a schematic diagram of a system for aggregating attention resource acquisition for a fleet.

Referencing FIG. 71, an example system 7100 includes a fleet of machines, where each machine includes a task system having a core task and further at least one of a compute task or a network task (e.g., task machines 7102). The system 7100 includes a controller 6902 having: an attention market access circuit 6904 structured to interpret a number of attention-related resources 6906 available on an attention related resource market 6907; an intelligent agent circuit 6908 structured to determine a number of attention-related resource acquisition value 6910 based on a cost parameter 6916 of at least one of the number of attention-related resources 6906, and further based on the core task for the corresponding machine of the fleet of machines 7102. The example system 7100 further includes an attention purchase aggregating circuit 7104 structured to determine an aggregate attention-related resource purchase value 7106 in response to the number of attention-related resource acquisition values 6910 from the intelligent agent circuit corresponding to each machine of the fleet of the machines 7102; and an attention acquisition circuit 7108 structured to purchase an attention-related resource 6906 in response to the aggregate attention-related resource purchase value 7106.

An example system 7100 includes where the attention purchase aggregating circuit 7104 is positioned at a location selected from the locations consisting of: at least partially distributed on a number of the controllers corresponding to machines of the fleet of machines 7102; on a selected controller corresponding to one of the machines of the fleet of machines 7102; and on a system controller 6902 communicatively coupled to the number of the controllers corresponding to machines of the fleet of machines 7102 (e.g., consistent with the depiction of FIG. 71). An example system 7100 includes where the attention acquisition circuit 7108 is positioned at a location selected from the locations consisting of: at least partially distributed on a number of the controllers corresponding to machines of the fleet of machines 7102; on a selected controller corresponding to one of the machines of the fleet of machines 7102; and on a system controller 6902 communicatively coupled to the number of the controllers corresponding to machines of the fleet of machines 7102 (e.g., consistent with the depiction of FIG. 71).

Figure 70:
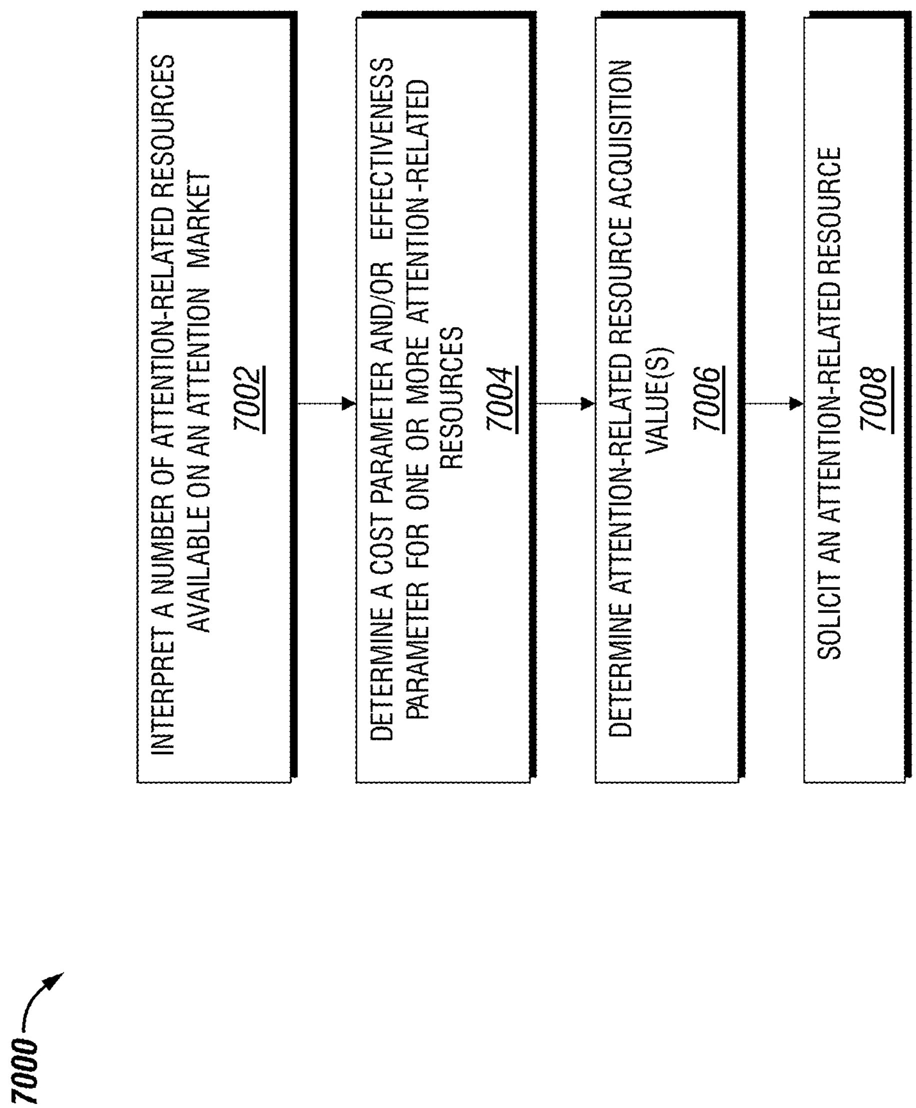
FIG. 70 is a schematic flow diagram of a method for improving attention market transaction operations.

Referencing FIG. 70, an example procedure 7000 includes an operation 7002 to interpret a number of attention-related resources available on an attention market, an operation 7006 to determine an attention-related resource acquisition value based on a cost parameter of at least one of the number of attention-related resources, and an operation 7008 to solicit an attention-related resource in response to the attention-related resource acquisition value. In certain embodiments, the example procedure 7000 further includes an operation 7004 to determine a cost parameter and/or an effectiveness parameter for one or more of the attention-relate resources, and to determine the attention-related resource acquisition value further in response to the cost parameter and/or the effectiveness parameter.

An example procedure 7000 further includes the operation 7008 to perform the soliciting the attention-related resource by performing an operation such as: purchasing the attention-related resource from the attention market; selling the attention-related resource to the attention market; making an offer to sell the attention-related resource to a second intelligent agent; and/or making an offer to purchase the attention-related resource to the second intelligent agent. An example procedure 7000 further includes where the cost parameter of at least one of the number of attention-related resources includes a future predicted cost of the at least one of the number of attention-related resources, where the procedure 7000 further includes determining the attention-related resource acquisition value in response to a comparison of a first cost on a spot market with the cost parameter. An example procedure 7000 further includes an operation to interpret a social media data source and an operation to determine, in response to the social media data source: a future predicted cost of the at least one of the number of attention-related resources, and to utilize the future predicted cost as the cost parameter; and/or an effectiveness parameter of the at least one of the number of attention-related resources. An example procedure 7000 further includes where the operation 7006 to determine the attention-related resource acquisition value is further based on the at least one of the future predicted cost or the effectiveness parameter determined in response to the social media data source.

Figure 72:
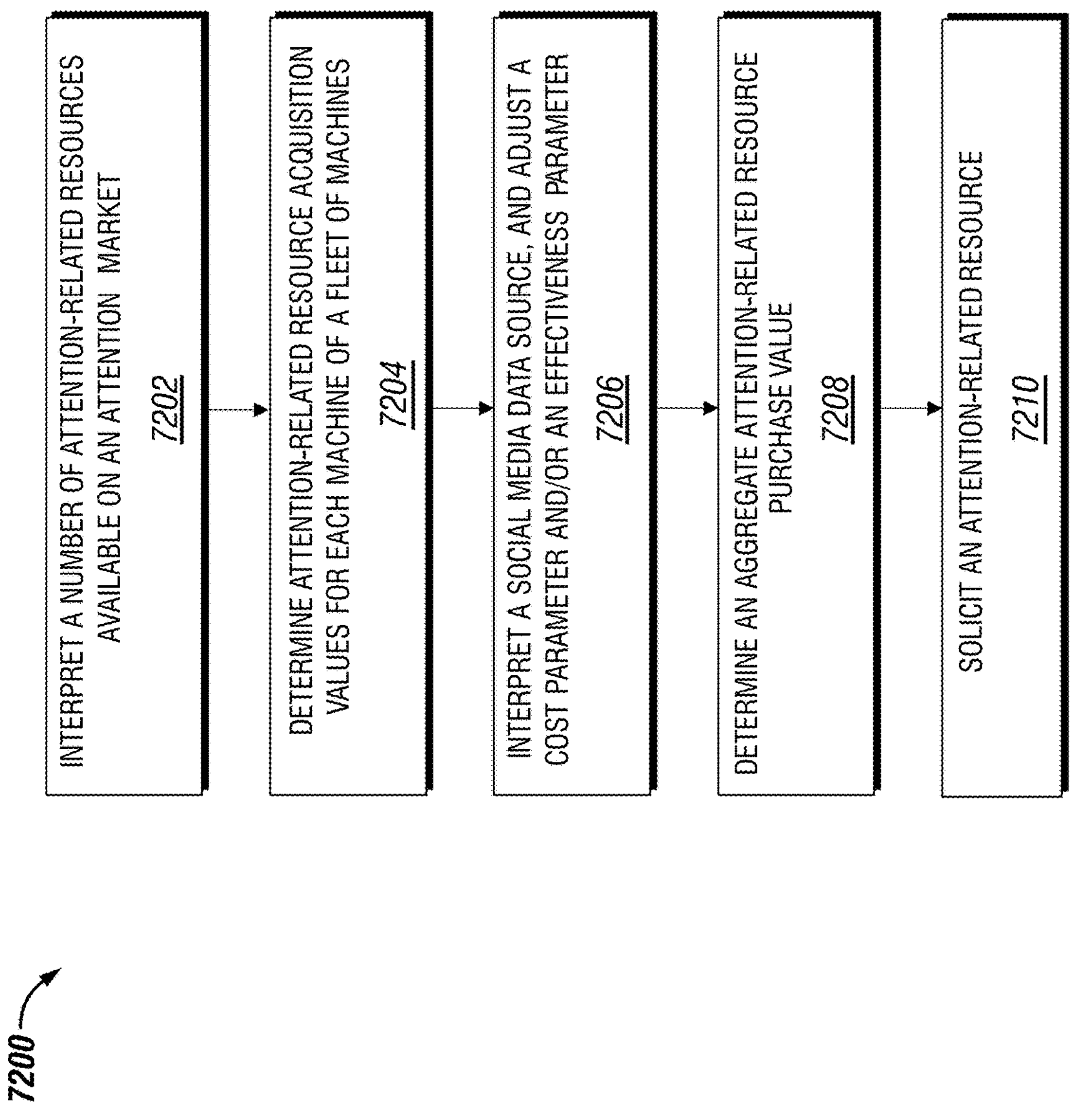
FIG. 72 is a schematic flow diagram of a method for aggregating attention resource acquisition for a fleet.

Referencing FIG. 72, an example procedure 7200 includes an operation 7202 to interpret a number of attention-related resources available on an attention market, an operation 7204 to determine an attention-related resource acquisition value for each machine of a fleet of machines based on a cost parameter of at least one of the number of attention-related resources, and further based on a core task for each of a corresponding machine of the fleet of machines. The example procedure 7200 further includes an operation 7208 to determine an aggregate attention-related resource purchase value in response to the number of attention-related resource acquisition values corresponding to each machine of the fleet of the machines, and an operation 7210 to solicit an attention-related resource in response to the aggregate attention-related resource purchase value.

Certain further aspects of an example procedure 7200 are described following, any one or more of which may be present in certain embodiments. An example procedure 7200 includes where the cost parameter of at least one of the number of attention-related resources includes a future predicted cost of the at least one of the number of attention-related resources, and where the procedure further includes an operation to determine each attention-related resource acquisition value in response to a comparison of a first cost on a spot market for attention-related resources with the cost parameter. An example procedure 7200 further includes an operation 7206 to interpret a social media data source to determine, in response to the social media data source, an adjustment for the cost parameter and/or the effectiveness parameter, and to utilize the adjusted cost parameter and/or effectiveness parameter to determine the aggregate attention-related resource purchase value.

In embodiments, provided herein is a transaction-enabling system having an intelligent agent that is configured to solicit the attention resources of another external intelligent agent. In embodiments, provided herein is a transaction-enabling system having an intelligent agent that is configured to solicit the attention resources of another external intelligent agent and having a machine that automatically purchases attention resources in a forward market for attention. In embodiments, provided herein is a transaction-enabling system having an intelligent agent that is configured to solicit the attention resources of another external intelligent agent and having a fleet of machines that automatically aggregate purchasing in a forward market for attention. In embodiments, provided herein is a transaction-enabling system having an intelligent agent that is configured to solicit the attention resources of another external intelligent agent and having a system for learning on a training set of facility outcomes, facility parameters, and data collected from data sources to train an artificial intelligence/machine learning system to predict a likelihood of a facility production outcome. In embodiments, provided herein is a transaction-enabling system having an intelligent agent that is configured to solicit the attention resources of another external intelligent agent and having a system for learning on a training set of facility outcomes, facility parameters, and data collected from data sources to train an artificial intelligence/machine learning system to predict a facility production outcome. In embodiments, provided herein is a transaction-enabling system having an intelligent agent that is configured to solicit the attention resources of another external intelligent agent and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having an intelligent agent that is configured to solicit the attention resources of another external intelligent agent and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having an intelligent agent that is configured to solicit the attention resources of another external intelligent agent and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having an intelligent agent that is configured to solicit the attention resources of another external intelligent agent and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having an intelligent agent that is configured to solicit the attention resources of another external intelligent agent and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having an intelligent agent that is configured to solicit the attention resources of another external intelligent agent and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having an intelligent agent that is configured to solicit the attention resources of another external intelligent agent and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having an intelligent agent that is configured to solicit the attention resources of another external intelligent agent and having an intelligent, flexible energy and compute facility whereby an artificial intelligence/machine learning system configures the facility among a set of available configurations based on a set of detected conditions relating to a set of input resources. In embodiments, provided herein is a transaction-enabling system having an intelligent agent that is configured to solicit the attention resources of another external intelligent agent and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having an intelligent agent that is configured to solicit the attention resources of another external intelligent agent and having an intelligent, flexible energy and compute facility whereby an artificial intelligence/machine learning system configures the facility among a set of available configurations based on a set of detected conditions relating to an output parameter. In embodiments, provided herein is a transaction-enabling system having an intelligent agent that is configured to solicit the attention resources of another external intelligent agent and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having an intelligent agent that is configured to solicit the attention resources of another external intelligent agent and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically purchases attention resources in a forward market for attention. In embodiments, provided herein is a transaction-enabling system having a machine that automatically purchases attention resources in a forward market for attention and having a fleet of machines that automatically aggregate purchasing in a forward market for attention. In embodiments, provided herein is a transaction-enabling system having a machine that automatically purchases attention resources in a forward market for attention and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically purchases attention resources in a forward market for attention and having a system for learning on a training set of facility outcomes, facility parameters, and data collected from data sources to train an artificial intelligence/machine learning system to predict a facility production outcome. In embodiments, provided herein is a transaction-enabling system having a machine that automatically purchases attention resources in a forward market for attention and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically purchases attention resources in a forward market for attention and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically purchases attention resources in a forward market for attention and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically purchases attention resources in a forward market for attention and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically purchases attention resources in a forward market for attention and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically purchases attention resources in a forward market for attention and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically purchases attention resources in a forward market for attention and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically purchases attention resources in a forward market for attention and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically purchases attention resources in a forward market for attention and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically purchases attention resources in a forward market for attention and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically purchases attention resources in a forward market for attention and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically purchases attention resources in a forward market for attention and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate purchasing in a forward market for attention. In embodiments, provided herein is a transaction-enabling system having a fleet of machines that automatically aggregate purchasing in a forward market for attention and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate purchasing in a forward market for attention and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate purchasing in a forward market for attention and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate purchasing in a forward market for attention and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate purchasing in a forward market for attention and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate purchasing in a forward market for attention and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate purchasing in a forward market for attention and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate purchasing in a forward market for attention and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate purchasing in a forward market for attention and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate purchasing in a forward market for attention and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate purchasing in a forward market for attention and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate purchasing in a forward market for attention and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate purchasing in a forward market for attention and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate purchasing in a forward market for attention and having an intelligent, flexible energy and compute facility whereby an artificial intelligence/machine learning system configures the facility among a set of available configurations based on a set of parameters received from a digital twin for the facility.

Figure 73:
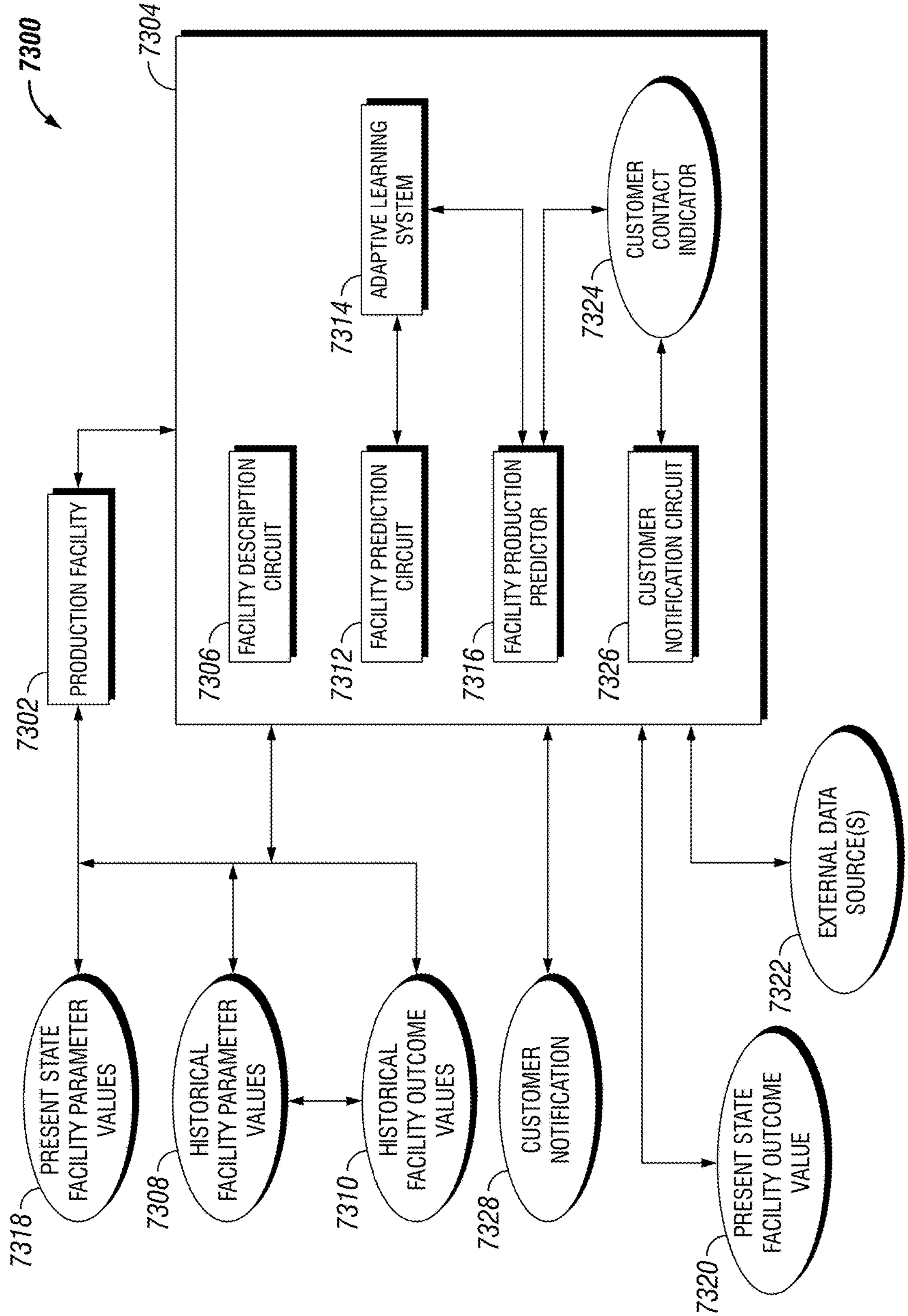
FIG. 73 is a schematic diagram of a system to improve production facility outcome predictions.

Referencing FIG. 73, an example transaction-enabling system 7300 includes a production facility 7302 including a core task, where the core task includes a production task. The system 7300 further includes a controller 7304 including a facility description circuit 7306 structured to interpret a plurality of historical facility parameter values 7308 and a corresponding plurality of historical facility outcome values 7310, and a facility prediction circuit 7312 structured to operate an adaptive learning system 7314, wherein the adaptive learning system 7314 is configured to train a facility production predictor 7316 in response to the plurality of historical facility parameter values 7308 and the corresponding plurality of historical facility outcome values 7310. The example facility description circuit 7306 is further structured to interpret a plurality of present state facility parameter values 7318; and wherein the facility prediction circuit 7312 is further structured to operate the adaptive learning system 7314 to predict a present state facility outcome value 7320 in response to the number of present state facility parameter values 7318. An example and non-limiting facility production predictor 7316 includes a facility model providing for a prediction of a facility outcome value (e.g., a timing, volume, and/or quality parameter) in response to parameters of the facility. In certain embodiments, the adaptive learning system 7314 utilizes machine learning, an expert system, and/or AI operations to determine input values that are related to the outcome values, to add or remove input values that are found to be more consistently or less consistently predictive of facility outcomes, and/or to add relationships (e.g., equations, functions, cut-off values, thresholds, etc.) between the input values and the outcome values. The adaptive learning system 7314 allows for improvement of the predicted outcome values over time, and further allows for the connection of parameters as predictive of the outcome values that may not ordinarily be included within a standard model that might be built—for example in a particular facility, the date of delivery of materials may be relevant to predicting outcomes for the production facility 7302, where a standard model may focus solely on production parameters due to constraints in the thinking and experience of personnel that build and tune the model. Additionally, standard models are expensive and difficult to adapt to changing conditions at the production facility 7302, such as aging of equipment, changing of personnel, and/or changing of production processes, volumes, and products.

In certain embodiments, the present state facility outcome value 7320 includes a facility production outcome, such as a volume, time of completion, and/or a quality parameter. Any other aspect of the production facility 7302 may additionally or alternatively be a present state facility outcome value 7320, including without limitation values such as downtime predictions, equipment or process fault or failure predictions, overtime predictions, waste material generation predictions, and the like. In certain embodiments, the present state facility outcome value 7320 includes a facility production outcome probability distribution, such as a confidence interval, high and low range targets, and/or a mean and standard deviation (or other statistical description, such as a curve, or a non-normal distribution) for an outcome value. In certain embodiments, the present state facility outcome value 7320 may further include information such as: which present state facility parameter values 7318 have the greatest effect on the predicted outcome values 7320, which present state facility parameter values 7318 have driven recent change in the predicted present state facility outcome values 7320, and/or which input sources drive the greatest uncertainty within a range of present state facility outcome values 7320. An example present state facility outcome value 7320 includes at least one value such as: a production volume description of the production task; a production quality description of the production task; a facility resource utilization description; an input resource utilization description; and a production timing description of the production task. Example and non-limiting production volume descriptions include a total production volume, a production volume relative to a target value, and/or a specific production volume such as the volume produced per unit of resource input, personnel time utilized, production tooling life utilization, or the like. Example and non-limiting quality descriptions include: a description of products having acceptable quality (e.g., fit for purpose); a description of a scrap or waste rate in products; a distribution of a product parameter such as a test value, tolerance, and/or measurement; and/or a description of a qualitative or categorical distribution of the products. Example and non-limiting facility resource utilization descriptions include: a description of energy consumption for the production facility; a description of personnel utilization of the facility; a description of consumption of a secondary resource for the facility (e.g., recycling, waste production, parking utilization, and/or consumption or production of energy credits); a description of production tooling or other facility asset consumption; trends in any of the foregoing; and/or changes in any of the foregoing. Example and non-limiting input resource utilization descriptions include: a description of a raw resource or input product utilization; a description of capital investment for the production facility; and/or a description of operating costs for the production facility. The examples herein are not limiting to any other aspect of the present disclosure, and are provided only for illustration.

An example facility description circuit 7306 further interprets historical external data from at least one external data source 7322 (e.g., a prior existing production facility and/or an offset production facility), where the adaptive learning system 7314 is further configured to train the facility production predictor 7316 in response to the historical external data. Example and non-limiting external data sources include: a social media data source; a behavioral data source; a spot market price for an energy source; and/or a forward market price for an energy source. An example facility description circuit 7306 further interprets present external data from at least one external data source, where the adaptive learning system 7314 is further configured to predict the present state facility outcome value 7320 further in response to the present external data.

Figure 74:
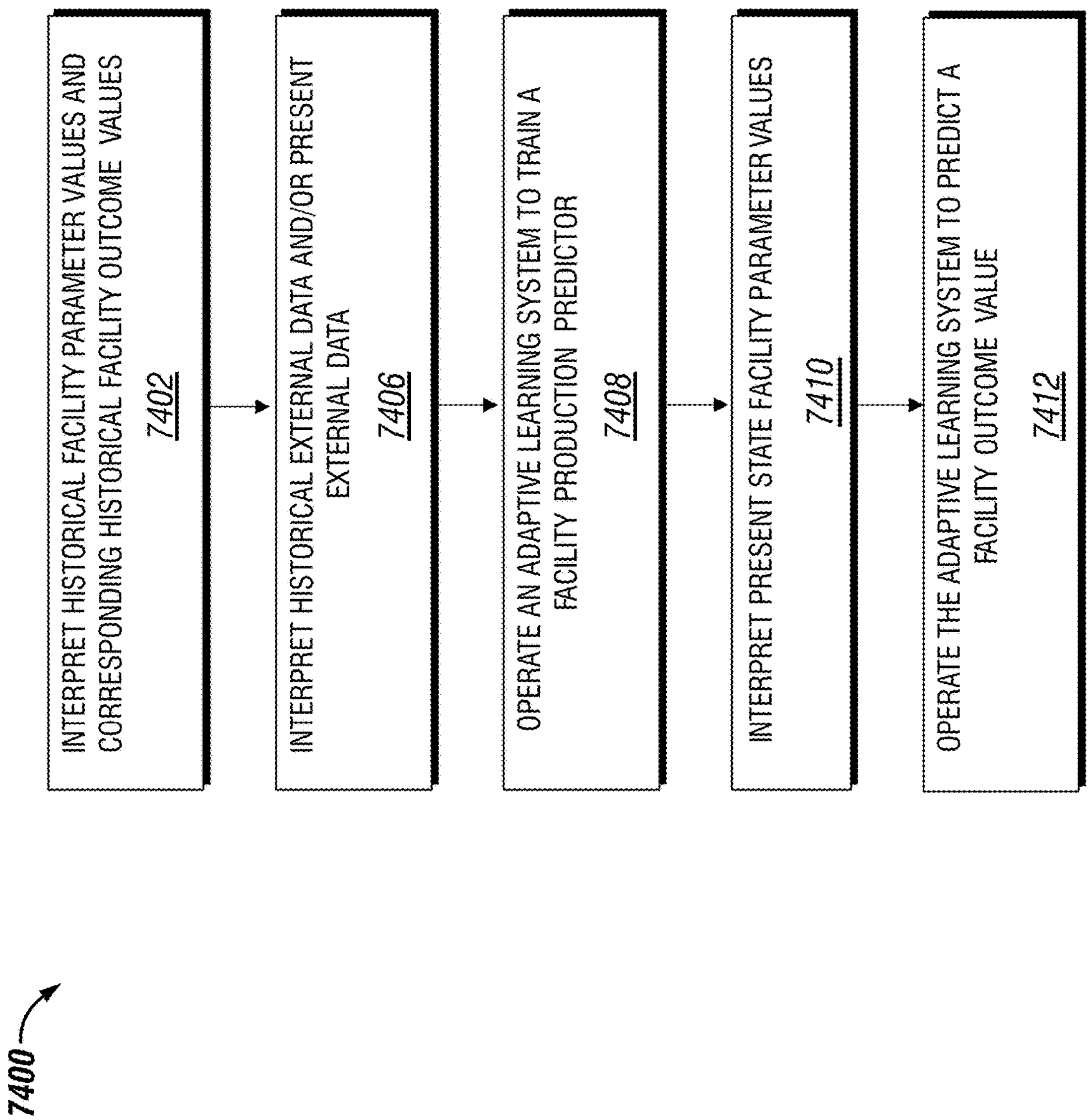
FIG. 74 is a schematic flow diagram of a method to improve production facility outcome predictions.

Referencing FIG. 74, an example procedure 7400 includes an operation 7402 to interpret a plurality of historical facility parameter values and a corresponding plurality of historical facility outcome values; an operation 7408 to operate an adaptive learning system, thereby training a facility production predictor in response to the plurality of historical facility parameter values and the corresponding plurality of historical facility outcome values; an operation 7410 to interpret a number of present state facility parameter values; and an operation 7412 to operate the adaptive learning system to predict a present state facility outcome value in response to the plurality of present state facility parameter values.

An example procedure 7400 further includes an operation 7406 to interpret historical external data from at least one external data source, and to operate the adaptive learning system to further train the facility production predictor in response to the historical external data. An example procedure 7400 includes the operation 7406 to interpret present external data from the at least one data source, and operating the adaptive learning system to predict the present state facility outcome value further in response to the present external data.

Figure 75:
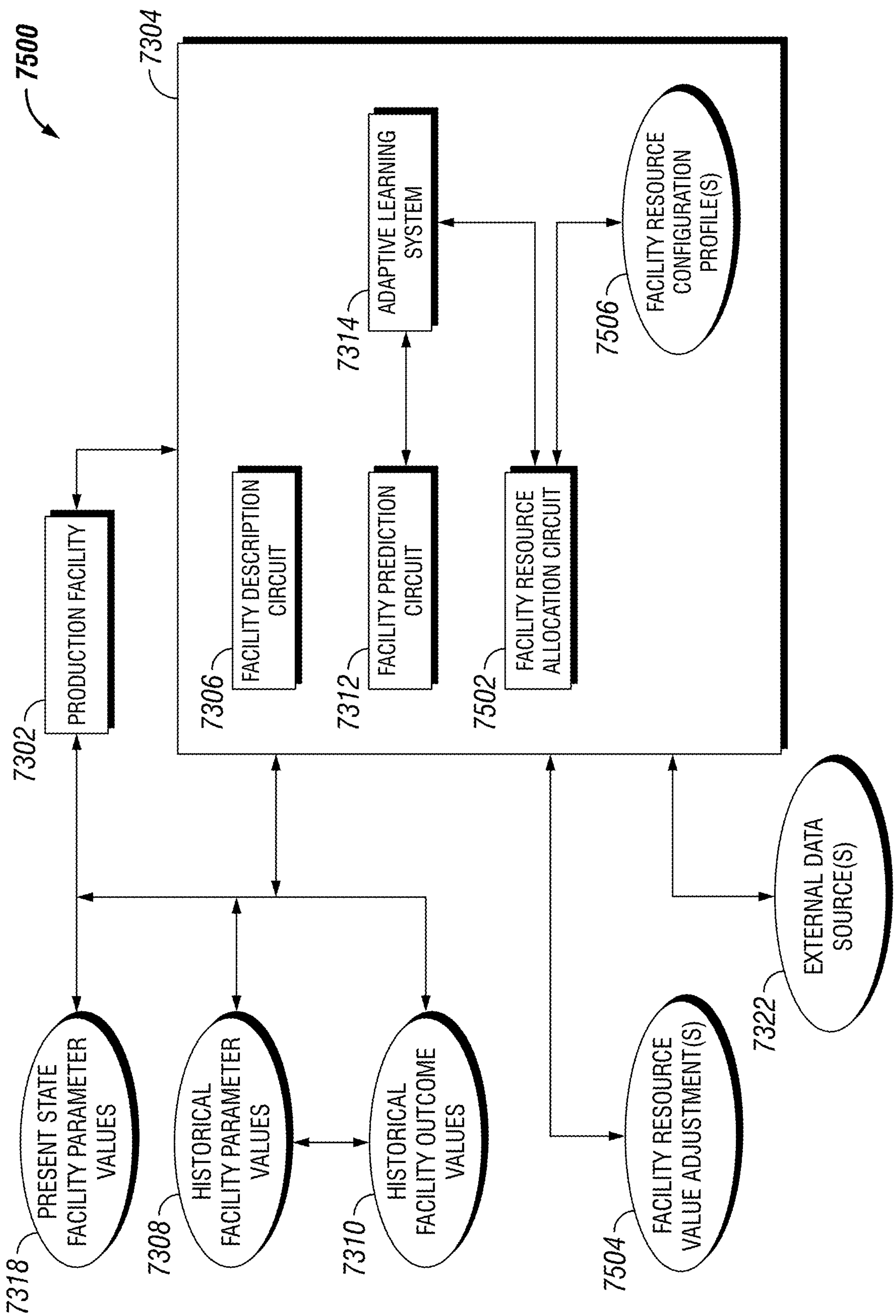
FIG. 75 is a schematic diagram of a system to improve a facility resource parameter.

Referencing FIG. 75, an example transaction-enabling system 7500 includes a production facility 7302 including a core task, and a controller 7304, including: a facility description circuit 7306 structured to interpret a plurality of historical facility parameter values 7308 and a corresponding plurality of historical facility outcome values 7310; a facility prediction circuit 7312 structured to operate an adaptive learning system 7314, wherein the adaptive learning system is configured to train a facility resource allocation circuit 7502 in response to the plurality of historical facility parameter values 7308 and the corresponding plurality of historical facility outcome values 7310; wherein the facility description circuit 7306 is further structured to interpret a plurality of present state facility parameter values 7318; and where the trained facility resource allocation circuit 7502 is further structured to adjust, in response to the plurality of present state facility parameter values 7318, a plurality of facility resource values (e.g., by providing adjustments to the facility resource values 7504).

Example and non-limiting facility resource values include: a provisioning and an allocation of facility energy resources; and/or a provisioning and an allocation of facility compute resources. An example trained facility resource allocation circuit 7502 further adjusts the plurality of facility resource values by producing and/or selecting a favorable facility resource utilization profile from among a set of available facility resource configuration profiles 7506. An example trained facility resource allocation circuit 7502 is further structured to adjust the plurality of facility resource values 7504 by one of producing or selecting a favorable facility resource output selection from among a set of available facility resource output values. An example trained facility resource allocation circuit 7502 is further structured to adjust the plurality of facility resource values 7504 by producing and/or selecting a favorable facility resource input profile from among a set of available facility resource input profiles. An example trained facility resource allocation circuit 7502 is further structured to adjust the plurality of facility resource values 7504 by producing or selecting a favorable facility resource configuration profile 7506 from among a set of available facility resource configuration profiles.

An example facility description circuit 7306 is further structured to interpret historical external data from at least one external data source 7322, and wherein the adaptive learning system 7314 is further configured to train the facility resource allocation circuit 7502 in response to the historical external data. Example and non-limiting external data source(s) include at least one data source such as: a social media data source; a behavioral data source; a spot market price for an energy source; and/or a forward market price for an energy source. An example facility description circuit 7306 further interprets present external data from the at least one external data source 7322, and wherein the trained facility resource allocation circuit 7502 is further structured to adjust the plurality of facility resource values 7504 in response to the present external data.

Figure 76:
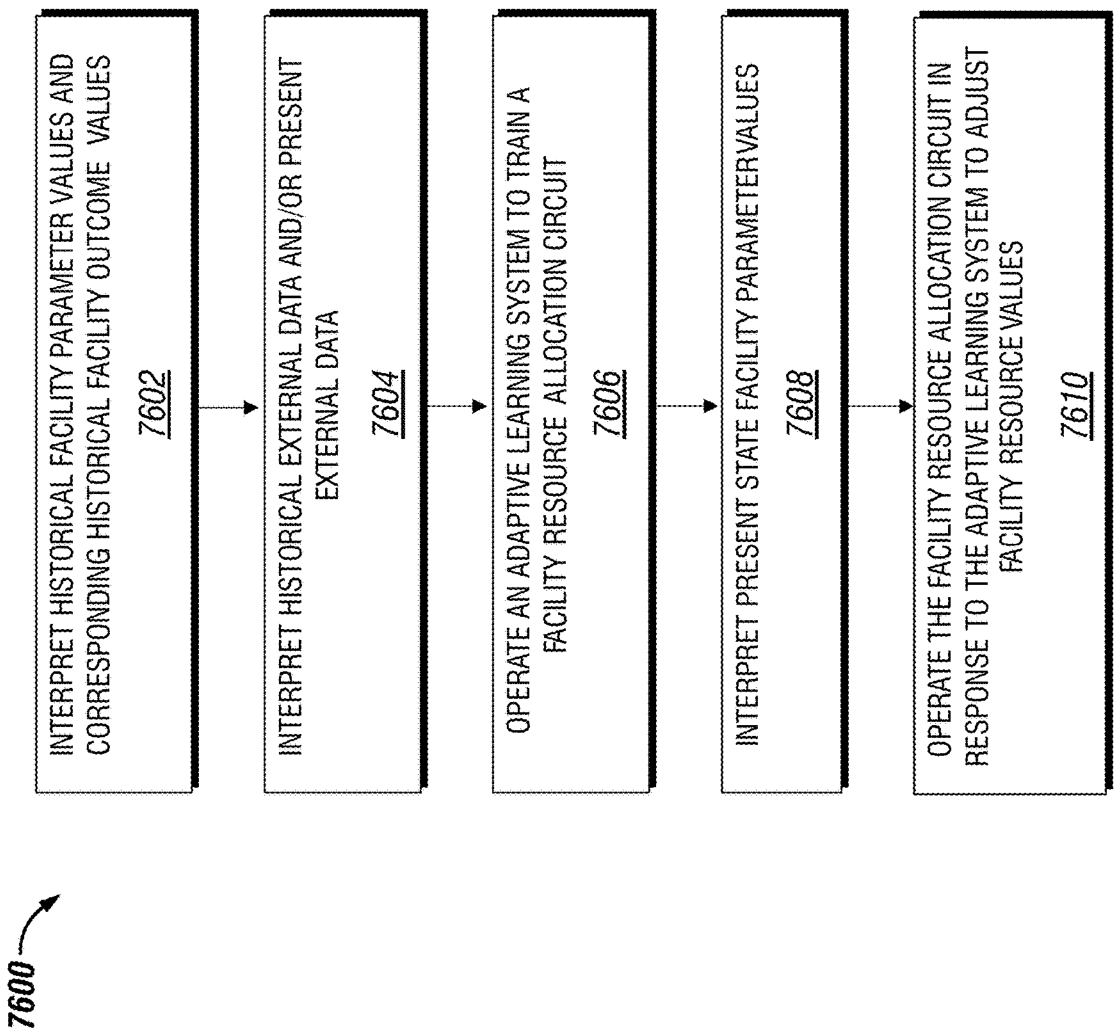
FIG. 76 is a schematic flow diagram of a method to improve a facility resource parameter.

Referencing FIG. 76, an example procedure 7600 includes an operation 7602 to interpret a plurality of historical facility parameter values and a corresponding plurality of historical facility outcome values; an operation 7606 to operate an adaptive learning system, thereby training a facility resource allocation circuit in response to the plurality of historical facility parameter values and the corresponding plurality of historical facility outcome values; and an operation 7608 to interpret a plurality of present state facility parameter values. The example procedure 7600 further includes an operation 7610 to adjust, in response to the plurality of present state facility parameter values, a plurality of facility resource values. In certain embodiments, for example where the operations 7610 to adjust the facility resource values by selecting among available profiles for the facility, an example procedure 7600 further includes operations to update the set of available facility resource profiles, for example by removing an ineffective, unused, or lightly used facility resource profile, and/or by adding a new facility resource profile to the set of available facility resource profiles. An example procedure 7600 further includes an operation 7604 to interpret historical external data and/or present external data, where the operation 7606 further includes training the facility resource allocation circuit in response to the historical external data and/or present external data.

Figure 77:
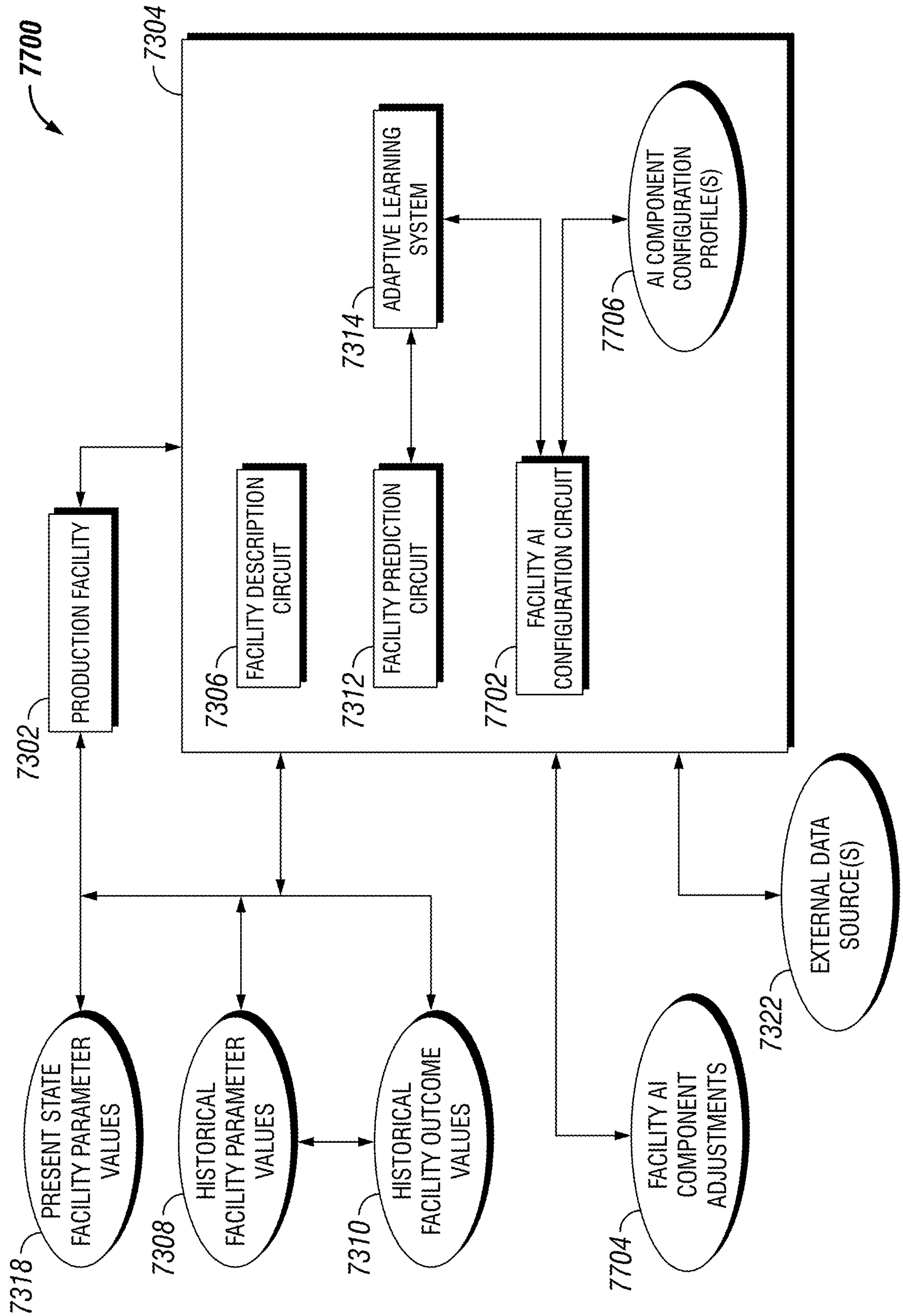
FIG. 77 is a schematic diagram of a system to improve a facility output value.

Referencing FIG. 77, an example transaction-enabling system 7700 includes a production facility 7302 including a core task; a controller 7304, including: a facility description circuit 7306 structured to interpret a plurality of historical facility parameter values 7308 and a corresponding plurality of historical facility outcome values 7310; a facility prediction circuit 7312 structured to operate an adaptive learning system 7314, wherein the adaptive learning system 7314 is configured to train a facility artificial intelligence (AI) configuration circuit 7702 in response to the plurality of historical facility parameter values 7308 and the corresponding plurality of historical facility outcome values 7310; where the facility description circuit 7306 is further structured to interpret a plurality of present state facility parameter values 7318. The example system 7700 includes where the trained facility AI configuration circuit 7702 is further structured to adjust, in response to the plurality of present state facility parameter values, a configuration of a facility AI component 7704 to produce a favorable facility output value. A favorable facility output value includes, without limitation, an improvement and/or optimization of any facility output described in the present disclosure, including at least a production related output and/or a resource utilization output.

An example trained facility AI configuration circuit 7702 further adjusts the configuration of the facility AI component by one of producing or selecting a favorable facility AI component configuration profile 7706 from among a set of available facility AI component configuration profiles. An example favorable facility output value includes, without limitation, an output value such as: a production volume description of the core task; a production quality description of the core task; a facility resource utilization description; an input resource utilization description; and/or a production timing description of the core task. An example facility description circuit 7306 is further structured to interpret historical external data from at least one external data source 7322, and wherein the adaptive learning system 7314 is further configured to train the facility AI configuration circuit 7702 in response to the historical external data. An example system 7700 includes where the external data source includes at least one data source such as: a social media data source; a behavioral data source; a spot market price for an energy source; and/or a forward market price for an energy source. An example facility description circuit 7306 further interprets present external data from the at least one external data source 7322, and wherein the trained facility AI configuration circuit 7702 is further structured to adjust the configuration of the facility AI component 7704 in response to the present external data.

Figure 78:
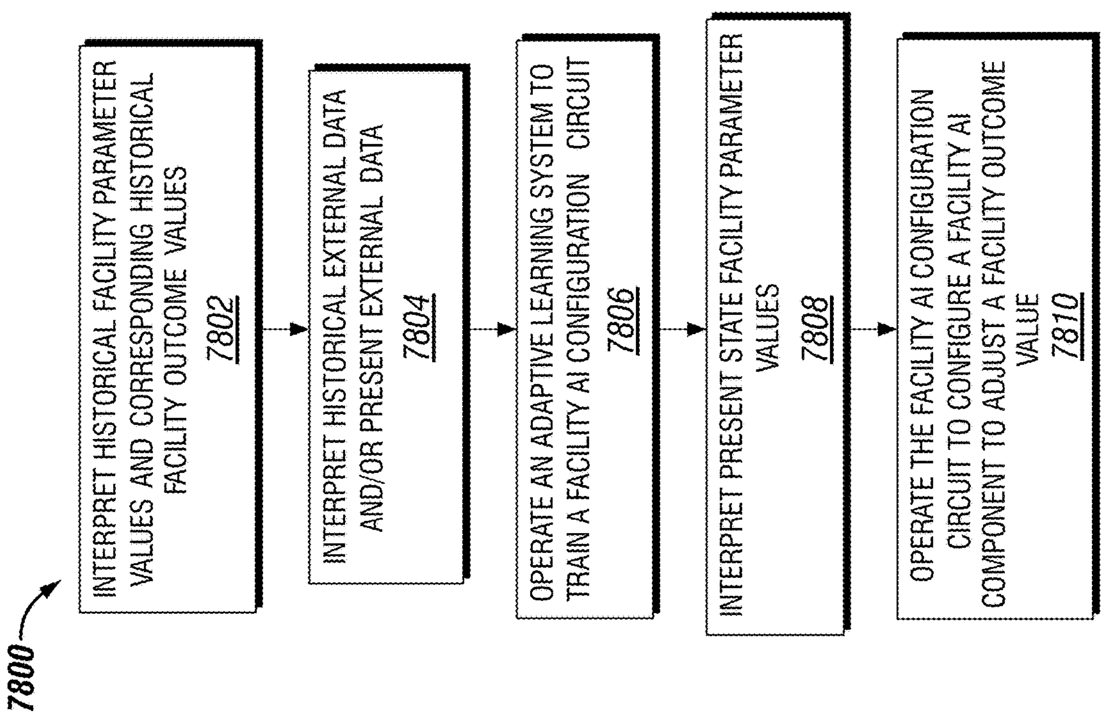
FIG. 78 is a schematic flow diagram of a method to improve a facility output value.

Referencing FIG. 78, an example procedure 7800 includes an operation 7802 to interpret a plurality of historical facility parameter values and a corresponding plurality of historical facility outcome values; an operation 7806 to operate an adaptive learning system, thereby training a facility artificial intelligence (AI) configuration circuit in response to the plurality of historical facility parameter values and the corresponding plurality of historical facility outcome values; an operation 7808 to interpret a plurality of present state facility parameter values; and an operation 7810 to operate the trained facility AI configuration circuit to adjust, in response to the plurality of present state facility parameter values, a configuration of a facility AI component to produce a favorable facility output value. An example procedure 7800 further includes an operation 7804 to interpret historical external data and/or present external data from at least one data source, wherein the operation 7806 to operate the trained facility AI configuration circuit is configure the AI facility component is further in response to the historical external data and/or the present external data.

Further referencing FIG. 73, an example system includes wherein the core task includes a customer relevant output; and the trained facility production predictor 7316 is configured to determine a customer contact indicator 7324 in response to the plurality of present state facility parameter values 7318; and wherein the controller 7304 further includes a customer notification circuit 7326 structured to provide a notification 7328 to a customer in response to the customer contact indicator 7324. In certain embodiments, the customer includes one of a current customer and/or a prospective customer. In certain embodiments, determining the customer contact indicator includes performing at least one operation such as: determining whether the customer relevant output will meet a volume request from the customer; determining whether the customer relevant output will meet a quality request from the customer; determining whether the customer relevant output will meet a timing request from the customer; and/or determining whether the customer relevant output will meet an optional request from the customer.

Figure 79:
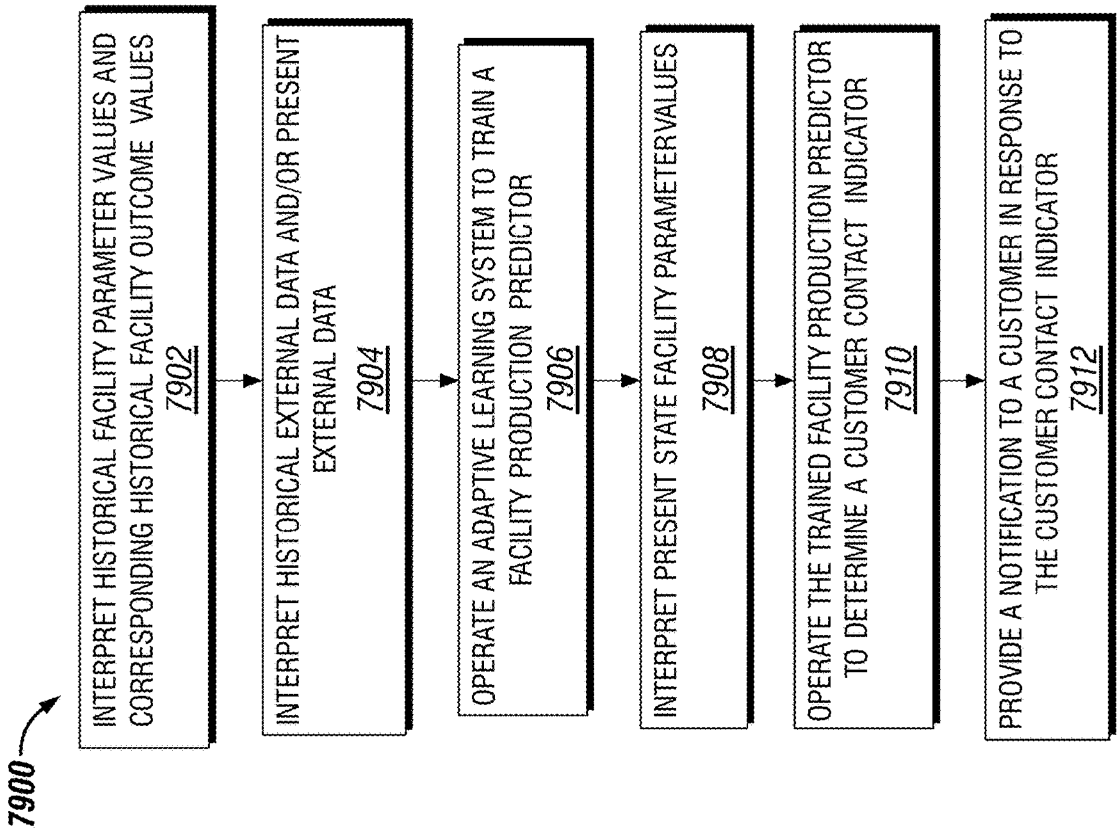
FIG. 79 is a schematic flow diagram of a method to improve a facility production prediction.

Referencing FIG. 79, an example procedure 7900 an operation 7902 to interpret a number of historical facility parameter values and a corresponding plurality of historical facility outcome values; an operations 7906 to operate an adaptive learning system, thereby training a facility production predictor in response to the plurality of historical facility parameter values and the corresponding plurality of historical facility outcome values; an operation 7908 to interpret a number of present state facility parameter values; an operation 7910 to operate the trained facility production predictor to determine a customer contact indicator in response to the plurality of present state facility parameter values; and an operation 7912 to provide a notification to a customer in response to the customer contact indicator. An example procedure 7900 further includes an operation 7904 to interpret historical external data and/or present external data from at least one external data source, wherein the operation 7910 to operate the trained facility AI configuration circuit includes further configure the AI facility component in response to the historical external data and/or the present external data.

Figure 80:
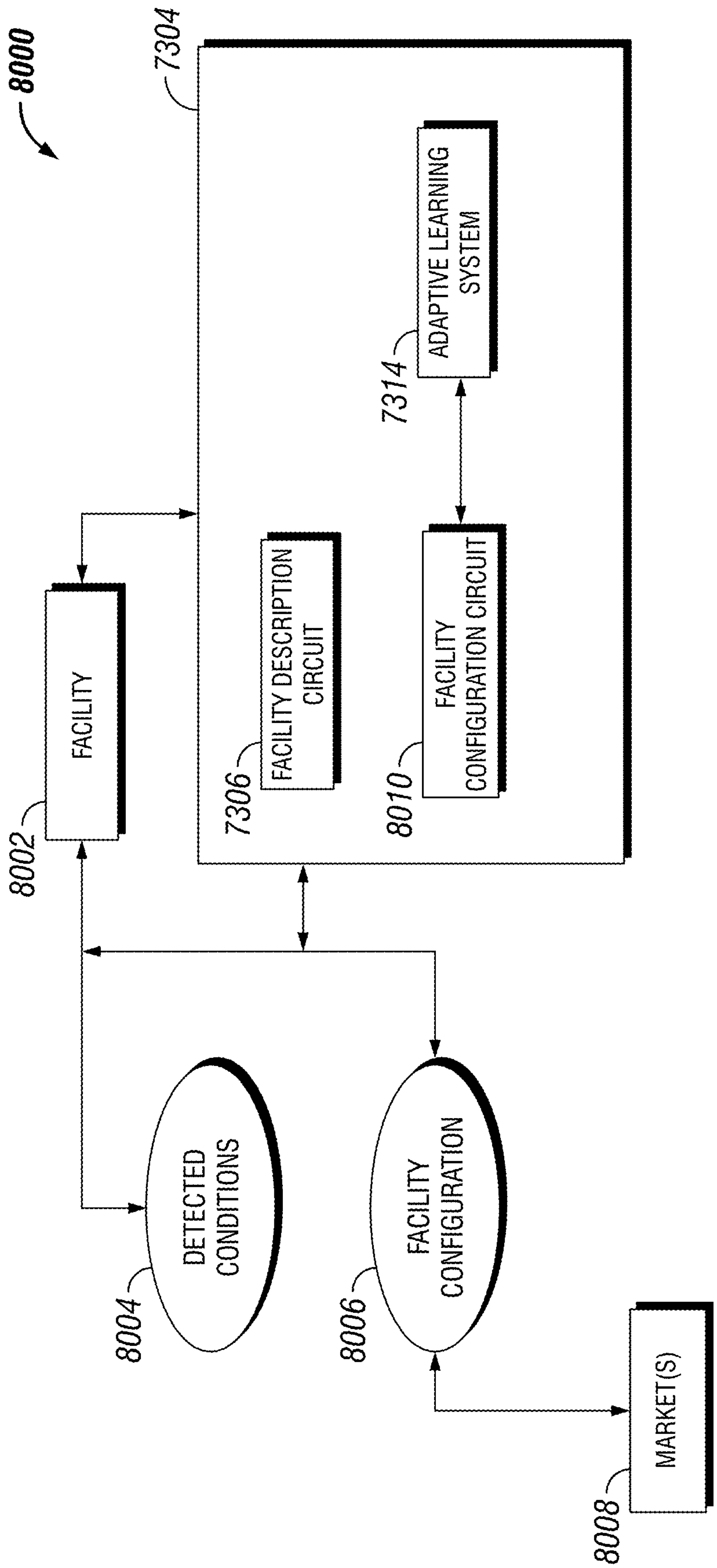
FIG. 80 is a schematic diagram of a system to improve facility resource utilization.

Referencing FIG. 80, an example transaction-enabling system 8000 includes a facility 8002 having an energy source and/or an energy utilization requirement, and a compute resource and/or compute task. An example facility 8002 is an energy and compute facility—for example a server, computing cluster, or the like, that may be paired with an energy source, and/or have an energy utilization requirement for operations of the facility 8002. The example system 8000 includes a controller 7304 having a facility description circuit 7306 structured to interpret detected conditions 8004, wherein the detected conditions 8004 include at least one condition such as: an input resource for the facility; a facility resource; an output parameter for the facility; and/or an external condition related to an output of the facility 8002. The example controller 7304 further includes a facility configuration circuit 8010 structured to operate an adaptive learning system 7314, wherein the adaptive learning system 7314 is configured to adjust a facility configuration 8006 based on the detected conditions 8004. An example adaptive learning system 7314 includes at least one of a machine learning system and/or an artificial intelligence (AI) system. An example adaptive learning system 7314 adjusts the facility configuration 8006 by performing a purchase and/or sale transaction on a market 8008, such as: performing a purchase or sale transaction on one of an energy spot market or an energy forward market; performing a purchase or sale transaction on one of a compute resource spot market or a compute resource forward market; and performing a purchase or sale transaction on one of an energy credit spot market or an energy credit forward market. An example facility 8002 further includes a networking task, and wherein the adaptive learning system 7314 adjusts the facility configuration 8006 by performing a purchase and/or sale transaction on a market 8008, such as: performing a purchase or sale transaction on one of a network bandwidth spot market or a network bandwidth forward market; and/or performing a purchase or sale transaction on one of a spectrum spot market or a spectrum forward market. An example adaptive learning system 7314 adjusts the facility configuration 8006 by adjusting at least one task of the facility 8002 to reduce the energy utilization requirement of the facility.

Figure 81:
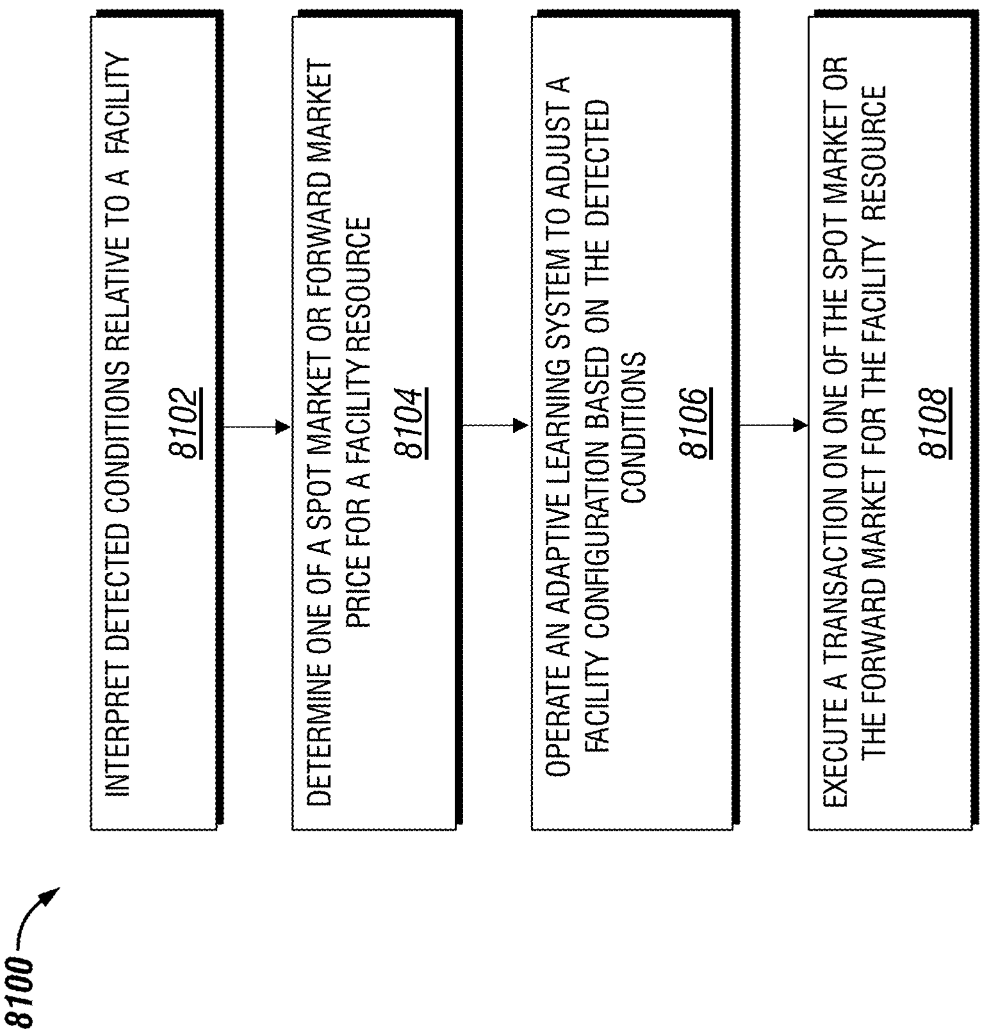
FIG. 81 is a schematic flow diagram of a method to improve facility resource utilization.

Referencing FIG. 81, an example procedure 8100 includes an operation 8102 to interpret detected conditions relative to a facility, where the detected conditions include at least one condition such as: an input resource for the facility; a facility resource; an output parameter for the facility; and/or an external condition related to an output of the facility. In certain embodiments, operation 8102 includes interpreting detected conditions relating to a set of input resources for the facility. In certain embodiments, the detected conditions relate to at least one resource of the facility. In certain embodiments, the detected conditions relate to an output parameter for the facility. In certain embodiments, the detected conditions relate to a utilization parameter for an output of the facility. The example procedure 8100 further includes an operation 8104 to determine one of a spot market or forward market price for a facility resource. The example procedure 8100 further includes an operation 8106 to operate an adaptive learning system to adjust a facility configuration based on the detected conditions. An example procedure 8100 further includes an operation 8108 to adjust the facility configuration by executing a transaction on a spot market and/or a forward market for a facility resource. In certain embodiments, the facility resource includes one or more of: an energy resource, a compute resource, an energy credit resource, and/or a network bandwidth resource. In certain embodiments, the facility resource includes a spectrum resource.

Figure 82:
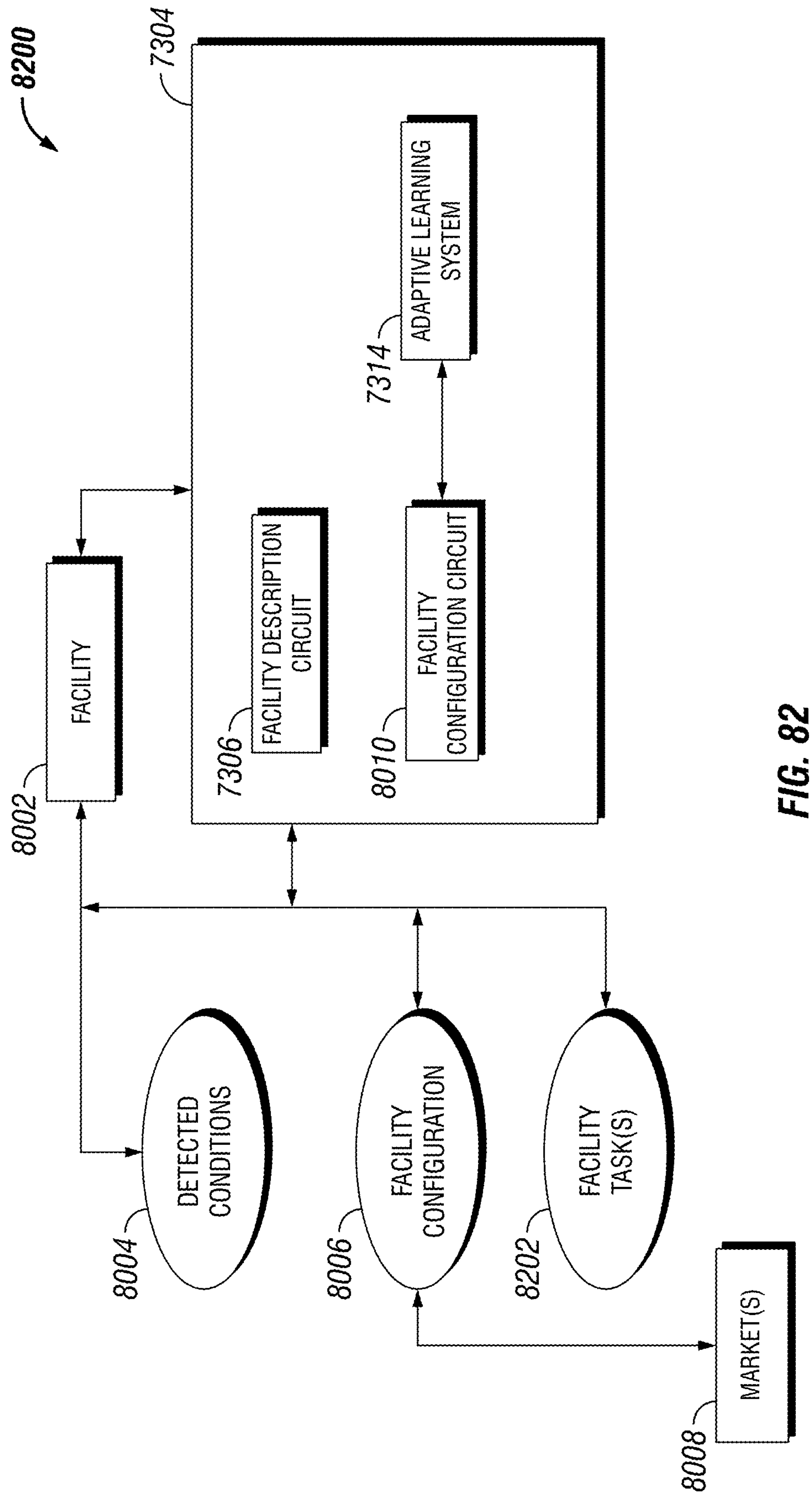
FIG. 82 is a schematic diagram of a system to improve facility resource outcomes by adjusting a facility configuration.

Referencing FIG. 82, an example transaction-enabling system 8200 includes a facility 8002 having at least one of an energy source or an energy utilization requirement. An example facility 8002 is an energy and compute facility. The example transaction-enabling system 8200 includes a controller 7304 having a facility description circuit 7306 structured to interpret detected conditions 8004, wherein the detected conditions relate to a set of input resources for the facility 8002. The example controller 7304 further includes a facility configuration circuit 8010 structured to operate an adaptive learning system 7314, wherein the adaptive learning system is configured to adjust a facility configuration 8006 based on the detected conditions. An example transaction-enabling system 8200 further includes the adaptive learning system 7314 having at least one of a machine learning system and/or an AI system. An example adaptive learning system 7314 adjusts the facility configuration 8006 by performing a purchase and/or a sale transaction on a market 8008, such as a spot market and/or a forward market for a facility resource. Example and non-limiting facility resources include: an energy resource; a compute resource; an energy credit resource; a network bandwidth resource; and/or a spectrum resource. In certain embodiments, the facility 8002 further includes a networking task. In certain embodiments, the adaptive learning system 7314 further adjusts at least one facility task 8202 to change an input resource requirement for the facility 8002, and/or adjusts at least one facility configuration 8006 to change the input resource requirement for the facility 8002. In certain embodiments, the facility 8002 further includes at least one additional facility resource; where the adaptive learning system 7314 adjusts the facility configuration 8006 by adjusting the compute resource, and further adjusting at the at least one additional facility resource. Example and non-limiting additional facility resources include a network resource, a data storage resource, and/or a spectrum resource.

In certain embodiments, the detected conditions 8004 include an output parameter for the facility 8002. In certain further embodiments, the adaptive learning system 7314 adjusts the facility configuration 8006 and/or the facility tasks 8202 to provide at least one of: an increased facility output volume, an increased facility quality value, and/or an adjusted facility output time value.

In certain embodiments, the detected conditions 8004 include a utilization parameter for an output of the facility 8002. In certain further embodiments, the adaptive learning system 7314 adjusts the facility configuration 8006 and/or the facility tasks 8202 to adjust at least one task of the facility 8002 to reduce the utilization parameter for output of the facility 8002.

Figure 83:
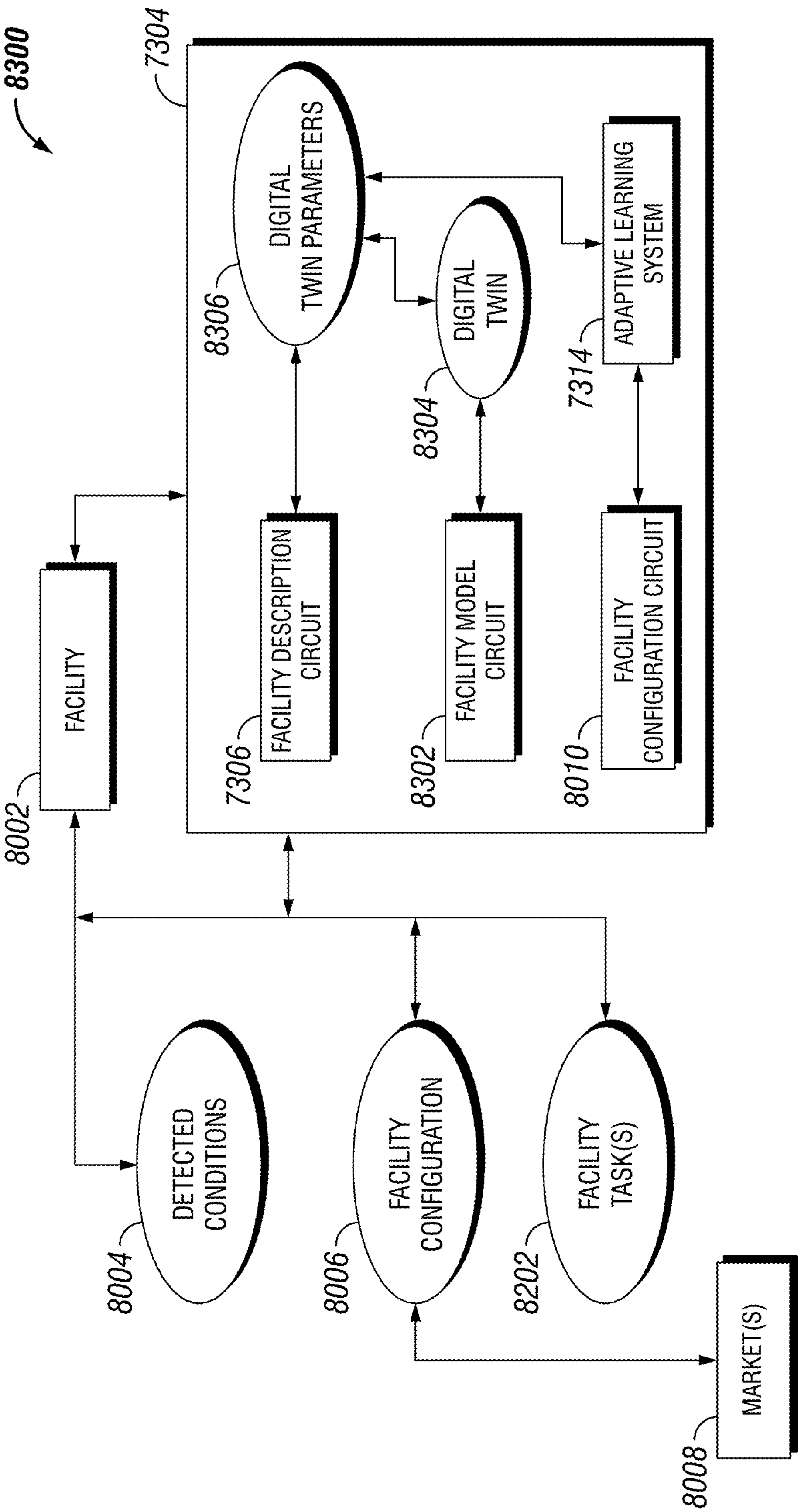
FIG. 83 is a schematic diagram of a system for improving facility resource outcomes using a digital twin.

Referencing FIG. 83, an example transaction-enabling system 8300 includes an energy and compute facility 8002 including: at least one of a compute task or a compute resource; and at least one of an energy source or an energy utilization requirement. The example transaction-enabling system 8300 further includes a controller 7304 having a facility model circuit 8302 that operates a digital twin 8304 for the facility 8002, a facility description circuit 7306 that interprets a set of parameters 8306 from the digital twin for the facility; and a facility configuration circuit 8010 structured to operate an adaptive learning system 7314, where the adaptive learning system 7314 is configured to adjust a facility configuration 8006 based on the set of parameters 8306 from the digital twin for the facility 8002. An example adaptive learning system 7314 includes a machine learning system and/or an AI system. An example adaptive learning system 7314 adjusts the facility configuration 8006 by performing a purchase transaction and/or a sale transaction of a resource on a market 8008. Example and non-limiting markets 8008 include a spot market and/or a forward market for a resource. Example and non-limiting resources include an energy resource, a networking resource, a network bandwidth resource, an energy credit resource, and/or a spectrum resource. An example facility 8002 further includes a networking task.

An example system further includes the facility description circuit 7306 interpreting the detected conditions 8004, where the detected conditions 8004 include one or more of: an input resource for the facility 8002, a facility resource, an output parameter for the facility 8002, and/or an external condition related to an output of the facility. An example facility model circuit 8302 is further structured to update the digital twin 8304 in response to the detected conditions 8004.

Figure 84:
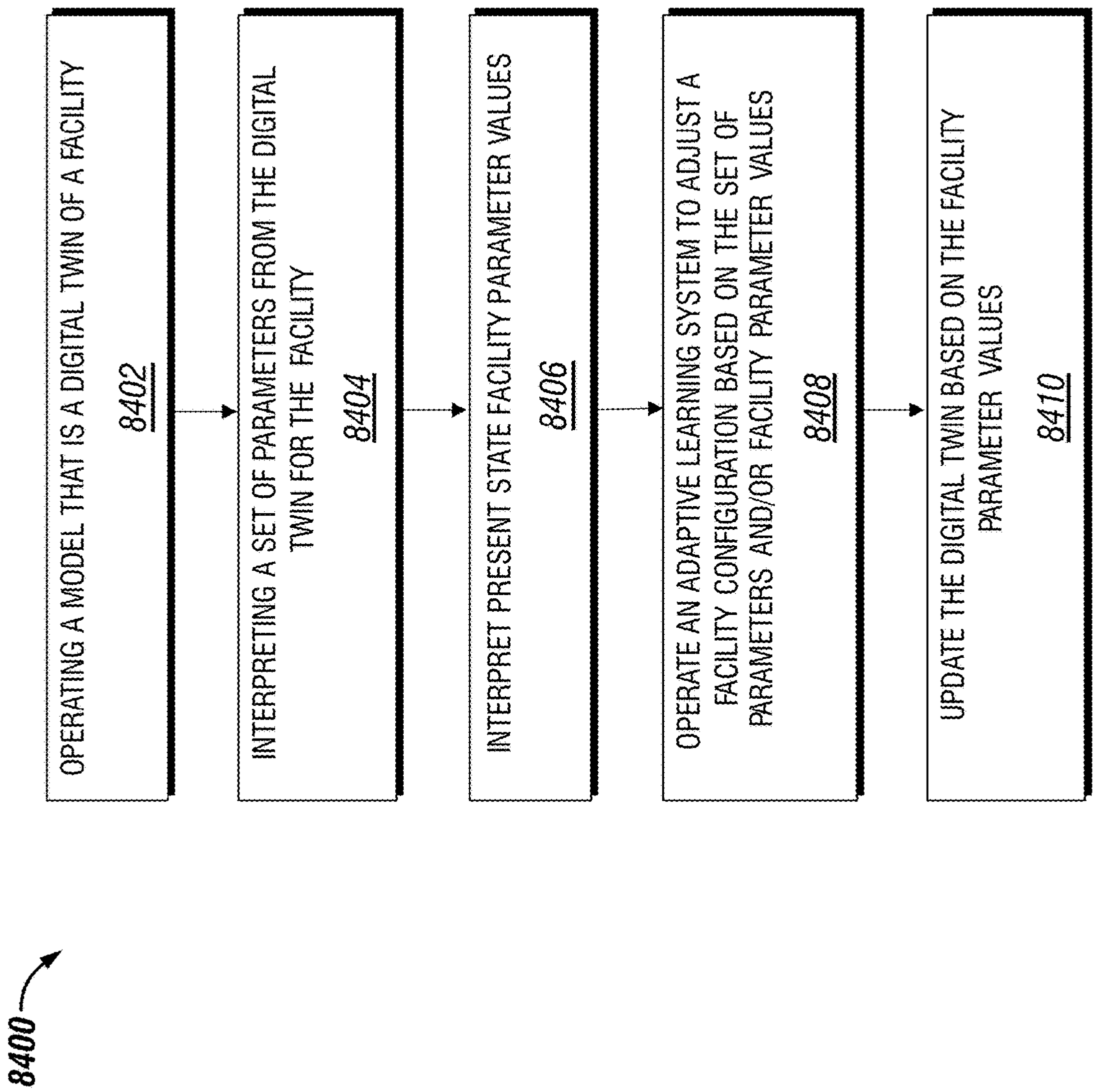
FIG. 84 is a schematic flow diagram of a method for improving facility resource outcomes using a digital twin.

Referencing FIG. 84, an example procedure 8400 includes an operation 8402 to operate a model that is, or that acts as, a digital twin of a facility. An example facility includes an energy resource and/or an energy utilization requirement, a compute resource and/or a compute task, and/or a network resource and/or a network task. The example procedure 8400 further includes an operation 8404 to interpret a set of parameters from the digital twin for the facility, an operation to interpret present state facility parameters/values 8406 and an operation 8408 to operate an adaptive learning system to adjust a facility configuration and/or a facility task based on the set of parameters for the digital twin, and/or based on facility parameter values as detected conditions for the facility. An example procedure 8400 includes an operation 8410 to update the digital twin based on the facility parameter values. Example and non-limiting facility parameter values include values such as: an input resource for the facility; a facility resource; an output parameter for the facility; and/or an external condition related to an output of the facility.

In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having a system for learning on a training set of facility outcomes, facility parameters, and data collected from data sources to train an artificial intelligence/machine learning system to predict a facility production outcome. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having an intelligent, flexible energy and compute facility whereby an artificial intelligence/machine learning system configures the facility among a set of available configurations based on a set of detected conditions relating to a set of input resources. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having an intelligent, flexible energy and compute facility whereby an artificial intelligence/machine learning system configures the facility among a set of available configurations based on a set of detected conditions relating to a set of facility resources. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having an intelligent, flexible energy and compute facility whereby an artificial intelligence/machine learning system configures the facility among a set of available configurations based on a set of detected conditions relating to an output parameter. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having an intelligent, flexible energy and compute facility whereby an artificial intelligence/machine learning system configures the facility among a set of available configurations based on a set of detected conditions relating to a utilization parameter for the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a likelihood of a facility production outcome and having an intelligent, flexible energy and compute facility whereby an artificial intelligence/machine learning system configures the facility among a set of available configurations based on a set of parameters received from a digital twin for the facility.

In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having an intelligent, flexible energy and compute facility whereby an artificial intelligence/machine learning system configures the facility among a set of available configurations based on a set of detected conditions relating to a set of input resources. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having an intelligent, flexible energy and compute facility whereby an artificial intelligence/machine learning system configures the facility among a set of available configurations based on a set of detected conditions relating to a set of facility resources. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having an intelligent, flexible energy and compute facility whereby an artificial intelligence/machine learning system configures the facility among a set of available configurations based on a set of detected conditions relating to an output parameter. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having an intelligent, flexible energy and compute facility whereby an artificial intelligence/machine learning system configures the facility among a set of available configurations based on a set of detected conditions relating to a utilization parameter for the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to predict a facility production outcome and having an intelligent, flexible energy and compute facility whereby an artificial intelligence/machine learning system configures the facility among a set of available configurations based on a set of parameters received from a digital twin for the facility.

In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles and having an intelligent, flexible energy and compute facility whereby an artificial intelligence/machine learning system configures the facility among a set of available configurations based on a set of detected conditions relating to a set of input resources. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles and having an intelligent, flexible energy and compute facility whereby an artificial intelligence/machine learning system configures the facility among a set of available configurations based on a set of detected conditions relating to a set of facility resources. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles and having an intelligent, flexible energy and compute facility whereby an artificial intelligence/machine learning system configures the facility among a set of available configurations based on a set of detected conditions relating to an output parameter. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles and having an intelligent, flexible energy and compute facility whereby an artificial intelligence/machine learning system configures the facility among a set of available configurations based on a set of detected conditions relating to a utilization parameter for the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles and having an intelligent, flexible energy and compute facility whereby an artificial intelligence/machine learning system configures the facility among a set of available configurations based on a set of parameters received from a digital twin for the facility.

In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs and having an intelligent, flexible energy and compute facility whereby an artificial intelligence/machine learning system configures the facility among a set of available configurations based on a set of detected conditions relating to a set of input resources. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs and having an intelligent, flexible energy and compute facility whereby an artificial intelligence/machine learning system configures the facility among a set of available configurations based on a set of detected conditions relating to a set of facility resources. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs and having an intelligent, flexible energy and compute facility whereby an artificial intelligence/machine learning system configures the facility among a set of available configurations based on a set of detected conditions relating to an output parameter. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs and having an intelligent, flexible energy and compute facility whereby an artificial intelligence/machine learning system configures the facility among a set of available configurations based on a set of detected conditions relating to a utilization parameter for the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs and having an intelligent, flexible energy and compute facility whereby an artificial intelligence/machine learning system configures the facility among a set of available configurations based on a set of parameters received from a digital twin for the facility.

In embodiments, provided herein is an information technology system for providing data to an intelligent energy and compute facility resource management system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles and having an intelligent, flexible energy and compute facility whereby an artificial intelligence/machine learning system configures the facility among a set of available configurations based on a set of detected conditions relating to a set of input resources. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles and having an intelligent, flexible energy and compute facility whereby an artificial intelligence/machine learning system configures the facility among a set of available configurations based on a set of detected conditions relating to a set of facility resources. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles and having an intelligent, flexible energy and compute facility whereby an artificial intelligence/machine learning system configures the facility among a set of available configurations based on a set of detected conditions relating to an output parameter. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles and having an intelligent, flexible energy and compute facility whereby an artificial intelligence/machine learning system configures the facility among a set of available configurations based on a set of detected conditions relating to a utilization parameter for the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles and having an intelligent, flexible energy and compute facility whereby an artificial intelligence/machine learning system configures the facility among a set of available configurations based on a set of parameters received from a digital twin for the facility.

In embodiments, provided herein is an information technology system for providing data to an intelligent energy and compute facility resource management system having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize configuration of available energy and compute resources to produce a favorable facility resource configuration profile among a set of available profiles and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize configuration of available energy and compute resources to produce a favorable facility resource configuration profile among a set of available profiles and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize configuration of available energy and compute resources to produce a favorable facility resource configuration profile among a set of available profiles and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize configuration of available energy and compute resources to produce a favorable facility resource configuration profile among a set of available profiles and having an intelligent, flexible energy and compute facility whereby an artificial intelligence/machine learning system configures the facility among a set of available configurations based on a set of detected conditions relating to a set of input resources. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize configuration of available energy and compute resources to produce a favorable facility resource configuration profile among a set of available profiles and having an intelligent, flexible energy and compute facility whereby an artificial intelligence/machine learning system configures the facility among a set of available configurations based on a set of detected conditions relating to a set of facility resources. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize configuration of available energy and compute resources to produce a favorable facility resource configuration profile among a set of available profiles and having an intelligent, flexible energy and compute facility whereby an artificial intelligence/machine learning system configures the facility among a set of available configurations based on a set of detected conditions relating to an output parameter. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize configuration of available energy and compute resources to produce a favorable facility resource configuration profile among a set of available profiles and having an intelligent, flexible energy and compute facility whereby an artificial intelligence/machine learning system configures the facility among a set of available configurations based on a set of detected conditions relating to a utilization parameter for the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize configuration of available energy and compute resources to produce a favorable facility resource configuration profile among a set of available profiles and having an intelligent, flexible energy and compute facility whereby an artificial intelligence/machine learning system configures the facility among a set of available configurations based on a set of parameters received from a digital twin for the facility.

In embodiments, provided herein is an information technology system for providing data to an intelligent energy and compute facility resource management system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations and having an intelligent, flexible energy and compute facility whereby an artificial intelligence/machine learning system configures the facility among a set of available configurations based on a set of detected conditions relating to a set of input resources. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations and having an intelligent, flexible energy and compute facility whereby an artificial intelligence/machine learning system configures the facility among a set of available configurations based on a set of detected conditions relating to a set of facility resources. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations and having an intelligent, flexible energy and compute facility whereby an artificial intelligence/machine learning system configures the facility among a set of available configurations based on a set of detected conditions relating to an output parameter. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations and having an intelligent, flexible energy and compute facility whereby an artificial intelligence/machine learning system configures the facility among a set of available configurations based on a set of detected conditions relating to a utilization parameter for the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations and having an intelligent, flexible energy and compute facility whereby an artificial intelligence/machine learning system configures the facility among a set of available configurations based on a set of parameters received from a digital twin for the facility.

In embodiments, provided herein is an information technology system for providing data to an intelligent energy and compute facility resource management system having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to generate an indication that a current or prospective customer should be contacted about an output that can be provided by the facility and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to generate an indication that a current or prospective customer should be contacted about an output that can be provided by the facility and having an intelligent, flexible energy and compute facility whereby an artificial intelligence/machine learning system configures the facility among a set of available configurations based on a set of detected conditions relating to a set of input resources. In embodiments, provided herein is an information technology system for providing data to an intelligent energy and compute facility resource management system having a system for learning on a training set of facility outcomes, facility parameters, and data collected from data sources to train an artificial intelligence/machine learning system to generate an indication that a current or prospective customer should be contacted about an output that can be provided by the facility and having an intelligent, flexible energy and compute facility whereby an artificial intelligence/machine learning system configures the facility among a set of available configurations based on a set of detected conditions relating to a set of facility resources. In embodiments, provided herein is an information technology system for providing data to an intelligent energy and compute facility resource management system having a system for learning on a training set of facility outcomes, facility parameters, and data collected from data sources to train an artificial intelligence/machine learning system to generate an indication that a current or prospective customer should be contacted about an output that can be provided by the facility and having an intelligent, flexible energy and compute facility whereby an artificial intelligence/machine learning system configures the facility among a set of available configurations based on a set of detected conditions relating to an output parameter. In embodiments, provided herein is an information technology system for providing data to an intelligent energy and compute facility resource management system having a system for learning on a training set of facility outcomes, facility parameters, and data collected from data sources to train an artificial intelligence/machine learning system to generate an indication that a current or prospective customer should be contacted about an output that can be provided by the facility and having an intelligent, flexible energy and compute facility whereby an artificial intelligence/machine learning system configures the facility among a set of available configurations based on a set of detected conditions relating to a utilization parameter for the output of the facility. In embodiments, provided herein is an information technology system for providing data to an intelligent energy and compute facility resource management system having a system for learning on a training set of facility outcomes, facility parameters, and data collected from data sources to train an artificial intelligence/machine learning system to generate an indication that a current or prospective customer should be contacted about an output that can be provided by the facility and having an intelligent, flexible energy and compute facility whereby an artificial intelligence/machine learning system configures the facility among a set of available configurations based on a set of parameters received from a digital twin for the facility.

In embodiments, provided herein is a system having an intelligent, flexible energy and compute facility whereby an artificial intelligence/machine learning system configures the facility among a set of available configurations based on a set of detected conditions relating to at least one of an input resource, a facility resource, an output parameter, and an external condition related to the output of the facility. In embodiments, provided herein is a system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility and having an intelligent, flexible energy and compute facility whereby an artificial intelligence/machine learning system configures the facility among a set of available configurations based on a set of detected conditions relating to a set of input resources. In embodiments, provided herein is a system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility and having an intelligent, flexible energy and compute facility whereby an artificial intelligence/machine learning system configures the facility among a set of available configurations based on a set of detected conditions relating to a set of facility resources. In embodiments, provided herein is a system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility and having an intelligent, flexible energy and compute facility whereby an artificial intelligence/machine learning system configures the facility among a set of available configurations based on a set of detected conditions relating to an output parameter. In embodiments, provided herein is a system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility and having an intelligent, flexible energy and compute facility whereby an artificial intelligence/machine learning system configures the facility among a set of available configurations based on a set of detected conditions relating to a utilization parameter for the output of the facility. In embodiments, provided herein is a system having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility and having an intelligent, flexible energy and compute facility whereby an artificial intelligence/machine learning system configures the facility among a set of available configurations based on a set of parameters received from a digital twin for the facility.

In embodiments, provided herein is a system having an intelligent, flexible energy and compute facility whereby an artificial intelligence/machine learning system configures the facility among a set of available configurations based on a set of detected conditions relating to a set of input resources. In embodiments, provided herein is a system having an intelligent, flexible energy and compute facility whereby an artificial intelligence/machine learning system configures the facility among a set of available configurations based on a set of detected conditions relating to a set of input resources and having an intelligent, flexible energy and compute facility whereby an artificial intelligence/machine learning system configures the facility among a set of available configurations based on a set of detected conditions relating to a set of facility resources. In embodiments, provided herein is a system having an intelligent, flexible energy and compute facility whereby an artificial intelligence/machine learning system configures the facility among a set of available configurations based on a set of detected conditions relating to a set of input resources and having an intelligent, flexible energy and compute facility whereby an artificial intelligence/machine learning system configures the facility among a set of available configurations based on a set of detected conditions relating to an output parameter. In embodiments, provided herein is a system having an intelligent, flexible energy and compute facility whereby an artificial intelligence/machine learning system configures the facility among a set of available configurations based on a set of detected conditions relating to a set of input resources and having an intelligent, flexible energy and compute facility whereby an artificial intelligence/machine learning system configures the facility among a set of available configurations based on a set of detected conditions relating to a utilization parameter for the output of the facility. In embodiments, provided herein is a system having an intelligent, flexible energy and compute facility whereby an artificial intelligence/machine learning system configures the facility among a set of available configurations based on a set of detected conditions relating to a set of input resources and having an intelligent, flexible energy and compute facility whereby an artificial intelligence/machine learning system configures the facility among a set of available configurations based on a set of parameters received from a digital twin for the facility.

In embodiments, provided herein is a system having an intelligent, flexible energy and compute facility whereby an artificial intelligence/machine learning system configures the facility among a set of available configurations based on a set of detected conditions relating to a set of facility resources. In embodiments, provided herein is a system having an intelligent, flexible energy and compute facility whereby an artificial intelligence/machine learning system configures the facility among a set of available configurations based on a set of detected conditions relating to a set of facility resources and having an intelligent, flexible energy and compute facility whereby an artificial intelligence/machine learning system configures the facility among a set of available configurations based on a set of detected conditions relating to an output parameter. In embodiments, provided herein is a system having an intelligent, flexible energy and compute facility whereby an artificial intelligence/machine learning system configures the facility among a set of available configurations based on a set of detected conditions relating to a set of facility resources and having an intelligent, flexible energy and compute facility whereby an artificial intelligence/machine learning system configures the facility among a set of available configurations based on a set of detected conditions relating to a utilization parameter for the output of the facility. In embodiments, provided herein is a system having an intelligent, flexible energy and compute facility whereby an artificial intelligence/machine learning system configures the facility among a set of available configurations based on a set of detected conditions relating to a set of facility resources and having an intelligent, flexible energy and compute facility whereby an artificial intelligence/machine learning system configures the facility among a set of available configurations based on a set of parameters received from a digital twin for the facility.

In embodiments, provided herein is a system having an intelligent, flexible energy and compute facility whereby an artificial intelligence/machine learning system configures the facility among a set of available configurations based on a set of detected conditions relating to an output parameter. In embodiments, provided herein is a system having an intelligent, flexible energy and compute facility whereby an artificial intelligence/machine learning system configures the facility among a set of available configurations based on a set of detected conditions relating to an output parameter and having an intelligent, flexible energy and compute facility whereby an artificial intelligence/machine learning system configures the facility among a set of available configurations based on a set of detected conditions relating to a utilization parameter for the output of the facility. In embodiments, provided herein is a system having an intelligent, flexible energy and compute facility whereby an artificial intelligence/machine learning system configures the facility among a set of available configurations based on a set of detected conditions relating to an output parameter and having an intelligent, flexible energy and compute facility whereby an artificial intelligence/machine learning system configures the facility among a set of available configurations based on a set of parameters received from a digital twin for the facility.

In embodiments, provided herein is a system having an intelligent, flexible energy and compute facility whereby an artificial intelligence/machine learning system configures the facility among a set of available configurations based on a set of detected conditions relating to a utilization parameter for the output of the facility. In embodiments, provided herein is a system having an intelligent, flexible energy and compute facility whereby an artificial intelligence/machine learning system configures the facility among a set of available configurations based on a set of detected conditions relating to a utilization parameter for the output of the facility and having an intelligent, flexible energy and compute facility whereby an artificial intelligence/machine learning system configures the facility among a set of available configurations based on a set of parameters received from a digital twin for the facility.

In embodiments, provided herein is a system having an intelligent, flexible energy and compute facility whereby an artificial intelligence/machine learning system configures the facility among a set of available configurations based on a set of parameters received from a digital twin for the facility.

Figure 85:
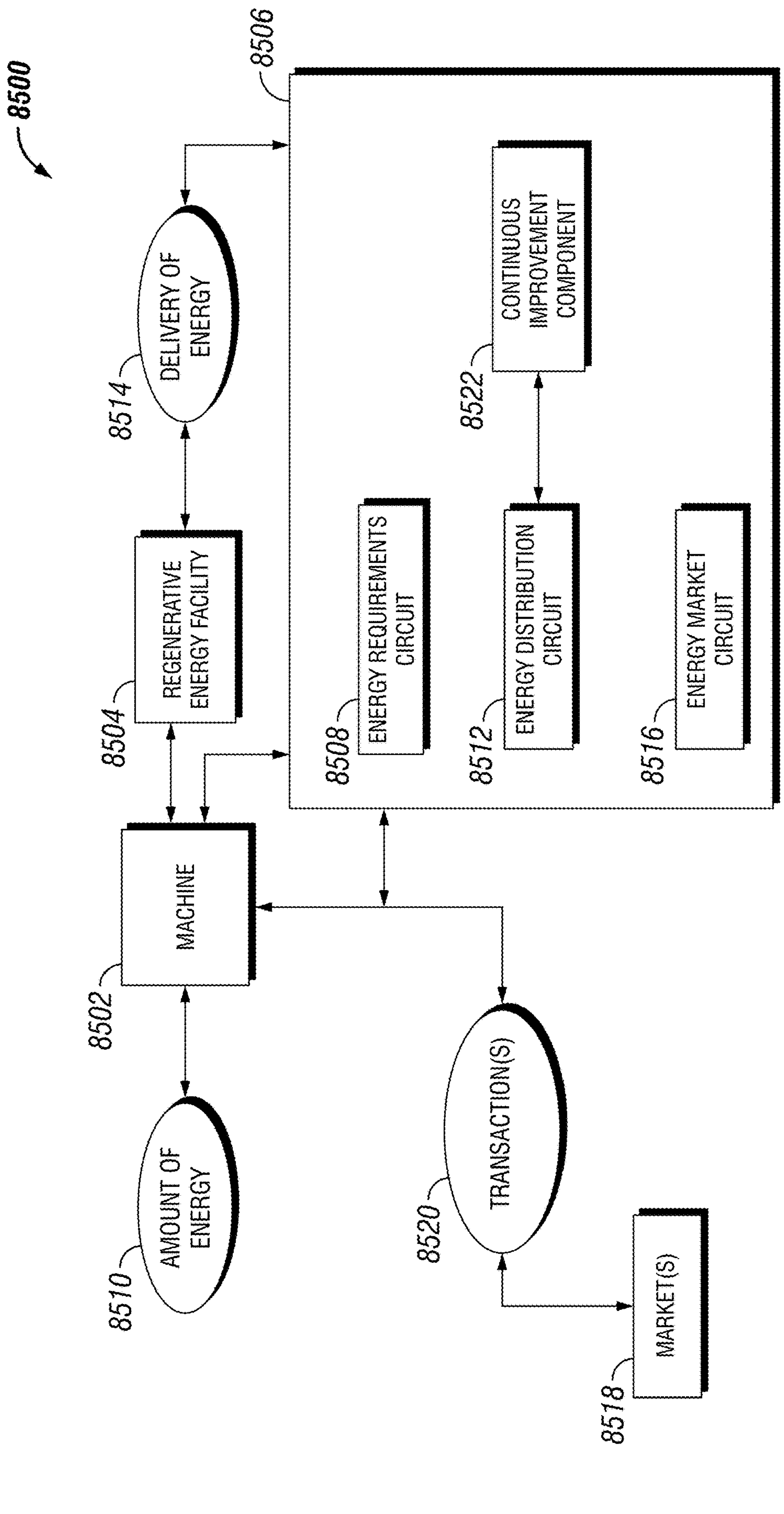
FIG. 85 is a schematic diagram of a system for improving regenerative energy delivery for a facility.

Referencing FIG. 85, an example transaction-enabling system 8500 includes a machine 8502 having an associated regenerative energy facility 8504, the machine 8502 having a requirement for at least one of a compute task, a networking task, and/or an energy consumption task. The example system 8500 further includes a controller 8506 including: an energy requirement circuit 8508 structured to determine an amount of energy 8510 for the machine to service the at least one of the compute task, the networking task, and/or the energy consumption task in response to the requirement for the at least one of the compute task, the networking task, and/or the energy consumption task. The example controller 8506 further includes an energy distribution circuit 8512 structured to adaptively improve an energy delivery of energy 8514 produced by the associated regenerative energy facility 8504 between the at least one of the compute task, the networking task, and/or the energy consumption task.

An example system 8500 includes the energy consumption task comprises as a core task, e.g. of the machine 8502. An example controller 8506 further includes an energy market circuit 8516 structured to access an energy market 8518, and wherein the energy distribution circuit 8516 is further structured to adaptively improve the energy delivery of the energy 8514 produced by the associated regenerative energy facility 8504 between the compute task, the networking task, the energy consumption task, and/or a sale (e.g., via a transaction 8520) of the energy produced by the associated regenerative energy facility 8504 on the energy market 8518. An example energy market 8518 comprises at least one of a spot market or a forward market. An example controller 8506 further includes where the energy distribution circuit further 8516 comprises at least one of a machine learning component, an artificial intelligence component, or a neural network component (e.g., as a continuous improvement component 8522).

Figure 86:
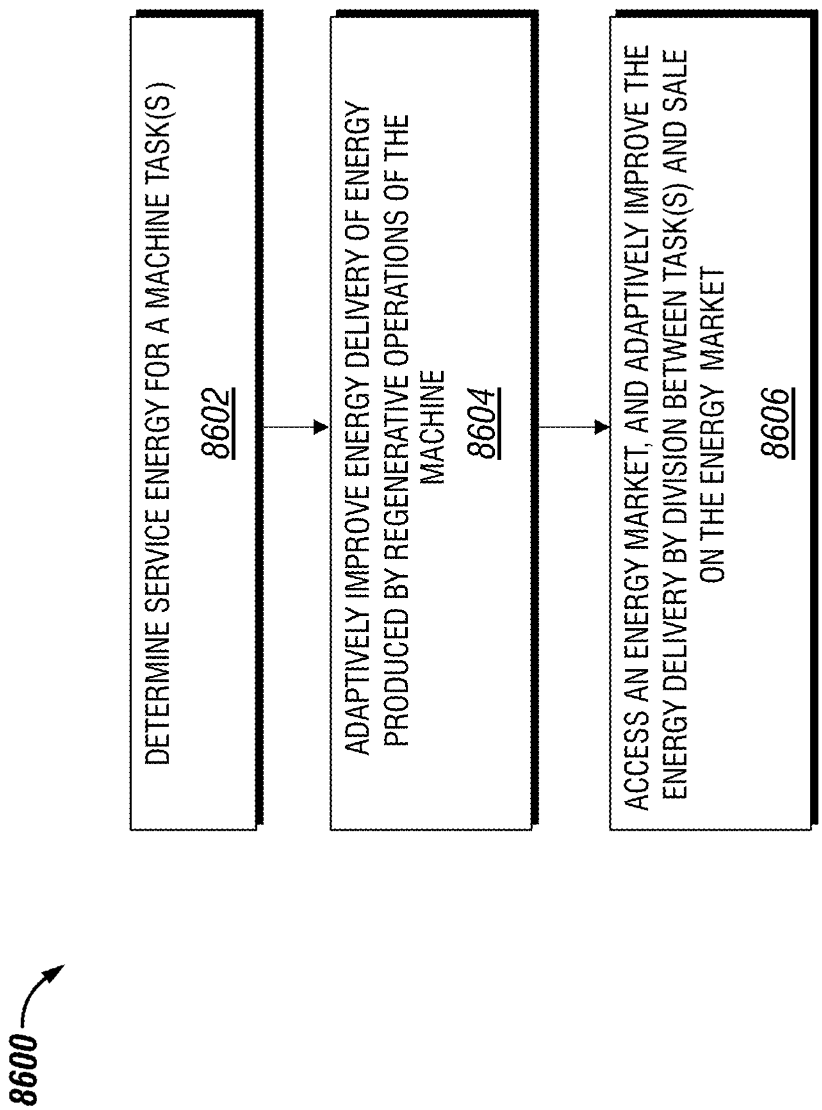
FIG. 86 is a schematic flow diagram of a method for improving regenerative energy delivery for a facility.

Referencing FIG. 86, an example procedure 8600 includes an operation 8602 to determine an amount of energy for a machine to service at least one of a compute task, a networking task, and/or an energy consumption task in response to a compute task requirement, a networking task requirement, and/or an energy consumption task requirement. The example procedure 8600 further includes an operation 8604 to adaptively improve an energy delivery between the compute task, the networking task, and/or the energy consumption task, where the improved energy deliver is of energy produced by a regenerative energy facility of the machine. In certain embodiments, the procedure 8600 further includes an operation 8606 to access an energy market, and adaptively improving the energy delivery of the energy produced by the regenerative energy facility between: the compute task, the networking task, the energy consumption task, and a sale of the energy produced by the regenerative energy facility on the energy market.

Figure 87:
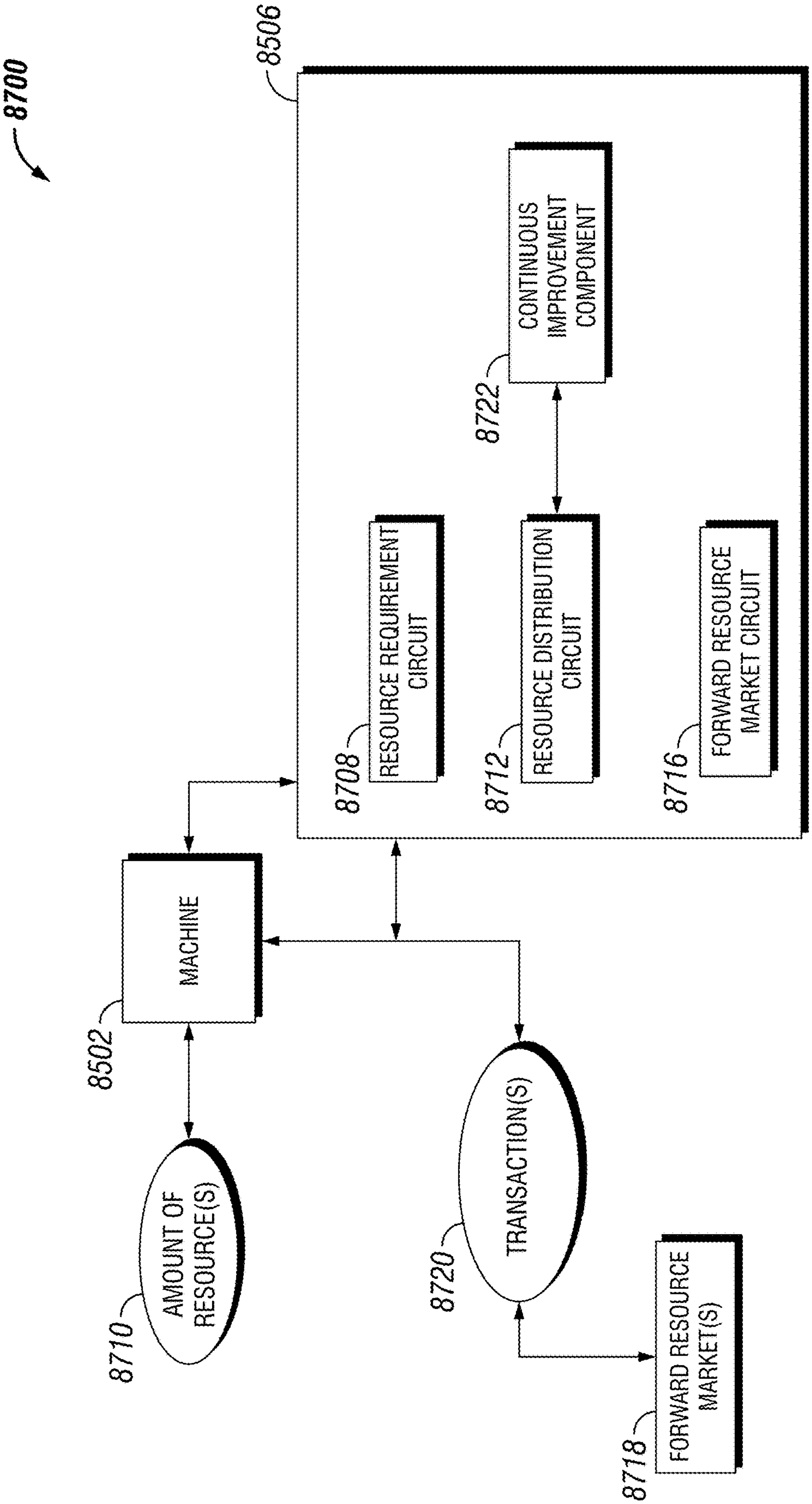
FIG. 87 is a schematic diagram of a system for improving resource acquisition for a facility.

Referencing FIG. 87, an example transaction-enabling system 8700 includes a machine 8502 having at least one of a compute task requirement, a networking task requirement, and/or an energy consumption task requirement; and a controller 8506 including a resource requirement circuit 8708 structured to determine an amount of a resource 8710 for the machine to service at least one of the compute task requirement, the networking task requirement, and/or the energy consumption task requirement, and a forward resource market circuit 8716 structured to access a forward resource market 8718. The example controller 8506 further includes a resource distribution circuit 8712 structured to execute a transaction 8720 of the resource on the forward resource market 8718 in response to the determined amount of the resource 8710. An example system 8700 includes the resource being any one or more of a compute resource, a spectrum allocation resource, an energy credit resource, an energy resource, a data storage resource, an energy storage resource, and/or a network bandwidth resource. An example system 8700 includes the forward resource market 8718 being a forward market for any one or more of the example resources. An example embodiment includes where the transaction(s) 8720 include buying and/or selling the resource. An example resource distribution circuit 8712 is further structured to adaptively improve one of an output value of the machine 8502 or a cost of operation of the machine 8502 using executed transactions 8720 on the forward resource market 8718. An example resource distribution circuit 8712 further includes at least one of a machine learning component, an artificial intelligence component, and/or a neural network component (e.g., as a continuous improvement component 8722).

Figure 88:
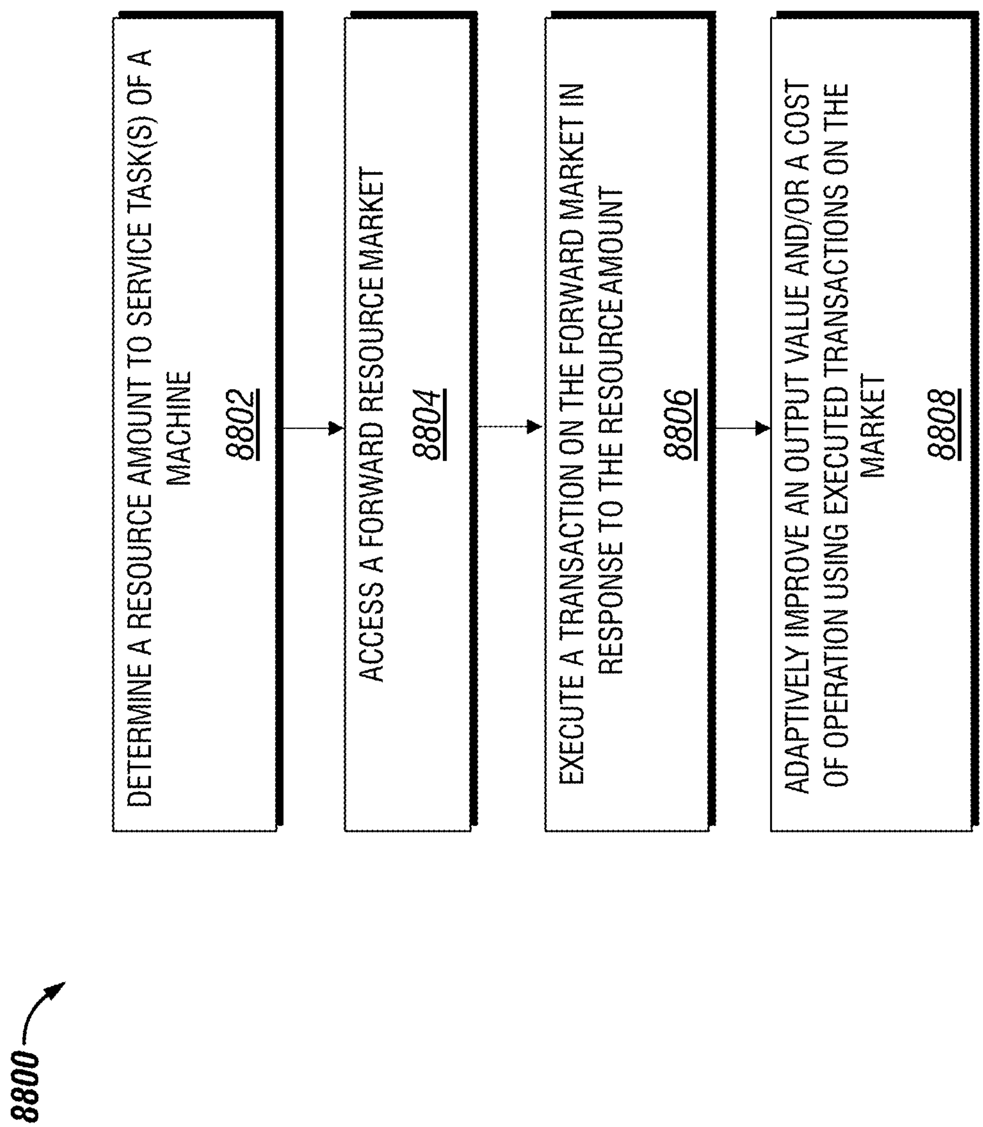
FIG. 88 is a schematic flow diagram of a method for improving resource acquisition for a facility.

Referencing FIG. 88, an example procedure 8800 includes an operation 8802 to determine an amount of a resource for a machine to service at least one of a compute task requirement, a networking task requirement, and/or an energy consumption task requirement of the machine, and an operation 8804 to access a forward resource market. The example procedure 8800 further includes an operation 8806 to execute a transaction of the resource on the forward resource market in response to the determined amount of the resource. In certain embodiments, the procedure 8800 further includes an operation 8808 to adaptively improve an output value of the machine and/or a cost of operation of the machine using executed transactions on the forward resource market.

Figure 89:
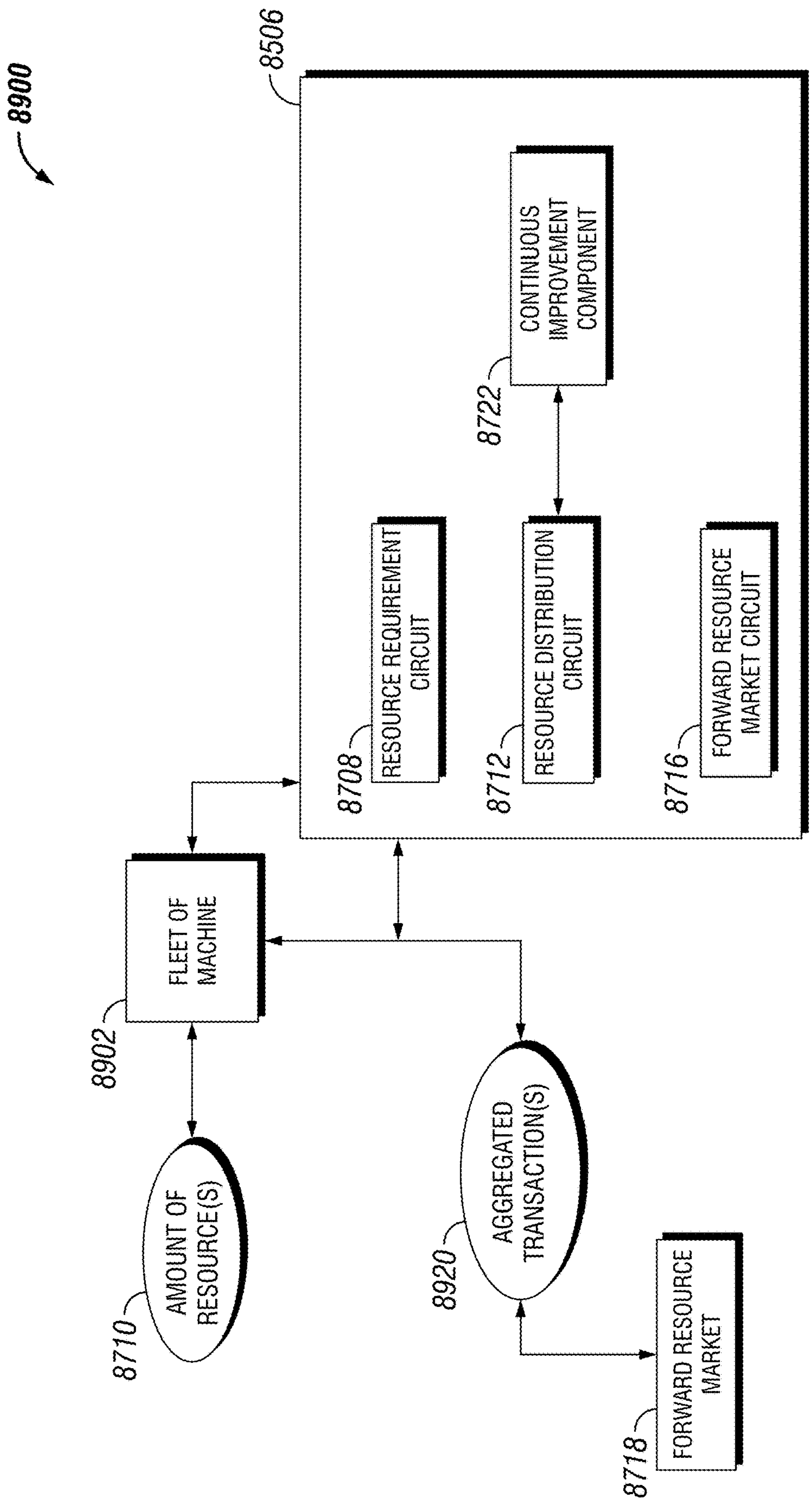
FIG. 89 is a schematic diagram of a system for improving resource acquisition for a fleet of machines.

Referencing FIG. 89, an example transaction-enabling system 8900 includes a fleet of machines 8902 each having at least one of a compute task requirement, a networking task requirement, and/or an energy consumption task requirement. The example system 8900 includes a controller 8506 including a resource requirement circuit 8708 structured to determine an amount of a resource 8710 for each of the machines to service the compute task requirements, the networking task requirements, and/or the energy consumption task requirements for each corresponding machine of the fleet of machines 8902. The example controller 8506 further includes a forward resource market circuit 8716 structured to access a forward resource market 8718; and a resource distribution circuit 8712 structured to execute an aggregated transaction 8920 of the resource on the forward resource market 8718 in response to the determined amount of the resource 8710 for each of the machines. An example system 8900 includes the resource being any one or more of a compute resource, a spectrum allocation resource, an energy credit resource, an energy resource, a data storage resource, an energy storage resource, and/or a network bandwidth resource. An example system 8900 includes the forward resource market 8718 being a forward market for any one or more of the example resources. An example embodiment includes where the transaction(s) 8920 include buying and/or selling the resource. An example resource distribution circuit 8712 is further structured to adaptively improve one of an aggregate output value of the fleet of machines or a cost of operation of the fleet of machines using executed aggregated transactions 8920 on the forward resource market 8718. In certain embodiments, a resource distribution circuit 8712 includes a machine learning component, an artificial intelligence component, and/or a neural network component (e.g., as a continuous improvement circuit 8722).

Figure 90:
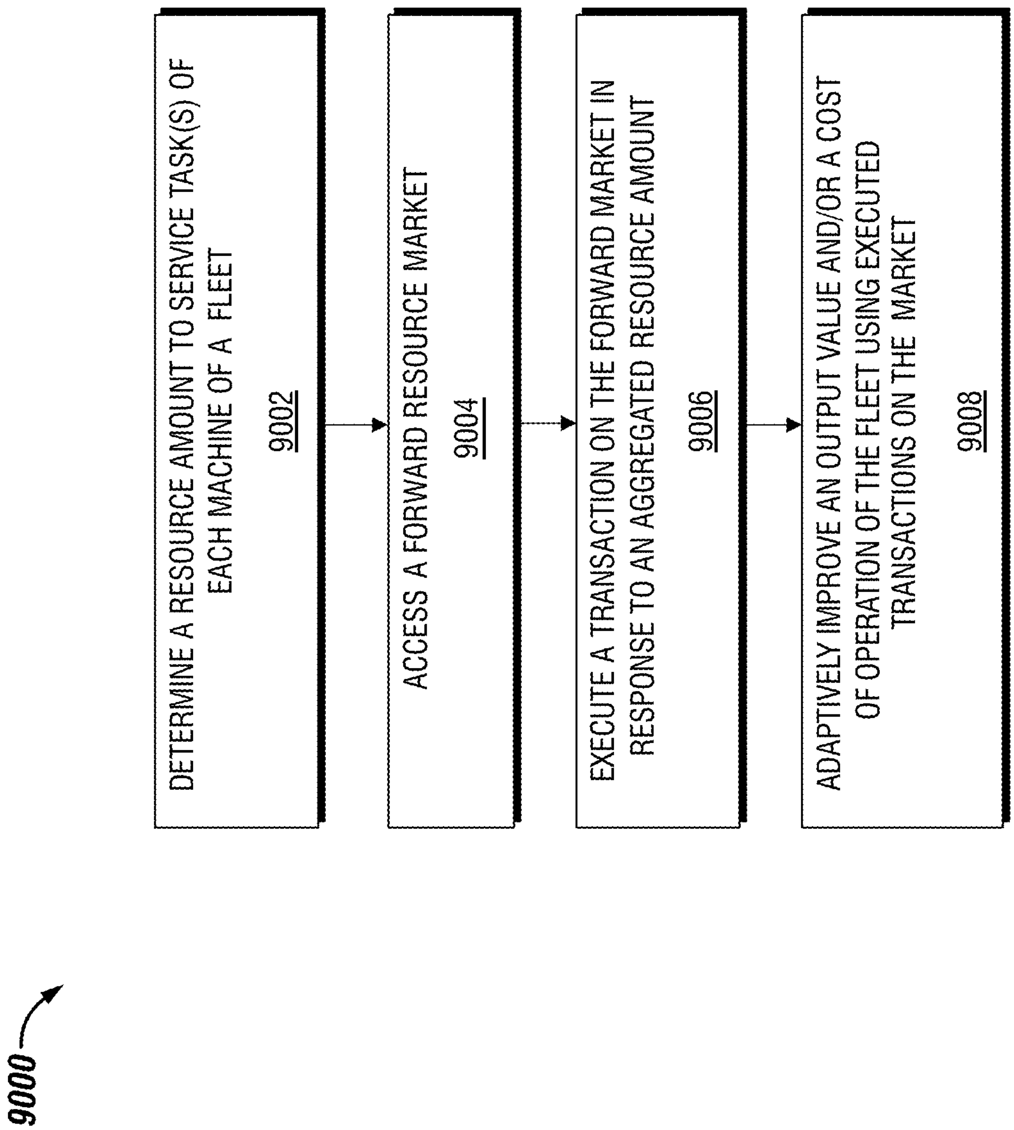
FIG. 90 is a schematic flow diagram of a method for improving resource acquisition for a fleet of machines.

Referencing FIG. 90, an example procedure 9000 includes an operation 9002 to determine an amount of a resource, for each of machine of a fleet of machines, to service at least one of a compute task requirement, a networking task requirement, and/or an energy consumption task requirement for each corresponding machine of the fleet of machines. The example procedure 9000 further includes an operation 9004 to access a forward resource market and an operation 9006 to execute an aggregated transaction of the resource on the forward resource market in response to the determined amount of the resource for each of the machines. In certain embodiments, an example procedure 9000 includes an operation 9008 to adaptively improve an aggregate output value of the fleet of machines and/or a cost of operation of the fleet of machines using executed aggregated transactions on the forward resource market.

Figure 91:
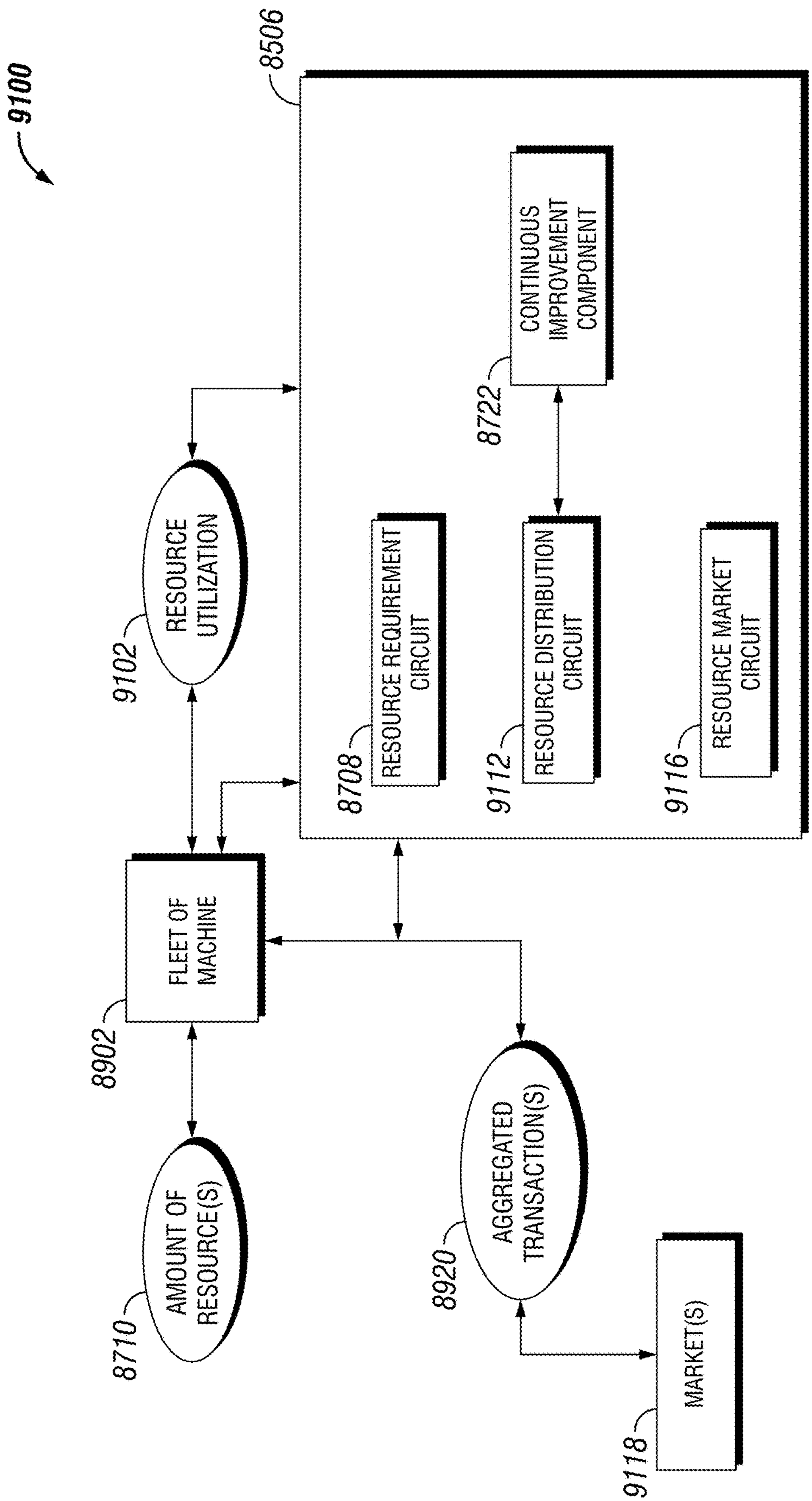
FIG. 91 is a schematic diagram of a system for improving resource utilization for a fleet of machines.

Referencing FIG. 91, an example transaction-enabling system 9100, the system according to one disclosed non-limiting embodiment of the present disclosure can include a fleet of machines 8902 each having a requirement for at least one of a compute task, a networking task, and/or an energy consumption task. The example system 9100 further includes a controller 8506 having a resource requirement circuit 8708 structured to determine an amount of a resource 8710 for each of the machines to service the requirement for the compute task, the networking task, and/or the energy consumption task for each corresponding machine of the fleet of machines 8902. The example controller 8506 further includes a resource distribution circuit 9112 structured to adaptively improve a resource utilization 9102 of the resource for each of the machines between the compute task, the networking task, and/or the energy consumption task for each corresponding machine. Example and non-limiting resource(s) 8710 include a compute resource, a spectrum allocation resource, an energy credit resource, an energy resource, a data storage resource, an energy storage resource, and/or a network bandwidth resource. An example resource distribution circuit 9112 includes a machine learning component, an artificial intelligence component, and/or a neural network component (e.g., continuous improvement component 8722). In certain embodiments, the controller 8506 includes a resource market circuit 9116 structured to access a market 9118 for one or more resources, and where the resource distribution circuit 9112 improves the resource utilization 9102 by executing one or more transactions 8920 on a market 9118 for the one or more resources to improve the resource utilization 9102. In certain embodiments, the market 9118 may be spot market and/or a forward market for the one or more resources. In certain embodiments, a transaction 8920 includes a purchase and/or a sale of a resource.

Figure 92:
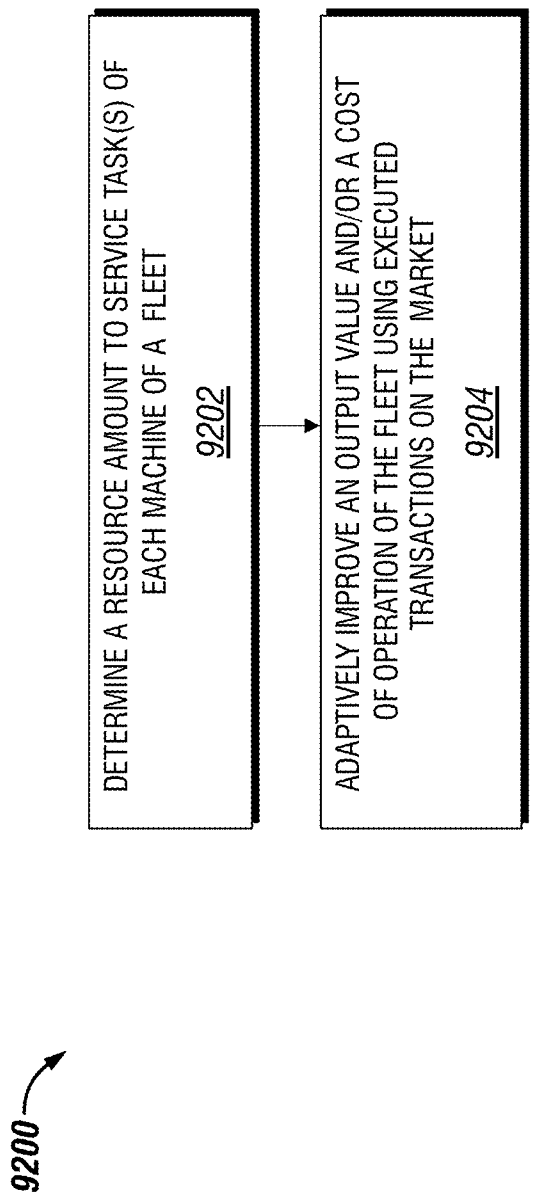
FIG. 92 is a schematic flow diagram of a method for improving resource utilization for a fleet of machines.

Referencing FIG. 92, an example procedure 9200 includes an operation 9202 to determine an amount of a resource, for each of machine of a fleet of machines, to service a requirement of at least one of a compute task, a networking task, and/or an energy consumption task for each corresponding machine. The procedure 9200 further includes an operation 9204 to adaptively improve a resource utilization of the resource for each of the machines between the compute task, the networking task, and/or the energy consumption task for each corresponding machine. Example and non-limiting operations 9204 include adaptively improving an output value of the fleet of machines, and/or a cost of operation of the fleet of machines. Example and non-limiting operations 9204 to adaptively improve the resource utilization include adjusting workloads for tasks between machines of the fleet of machines, executing one or more transactions for a resource on a forward market and/or a spot market for a resource, and/or adjusting one or more tasks of a machine of the fleet of machines to adjust a total (or aggregate) resource utilization of the fleet of machines. Example and non-limiting operations 9204 to adaptively improve the resource utilization include reducing a total resource utilization, reducing a resource utilization for a particular type of resource, and/or time-shifting resource utilization from a less efficient (e.g., based on cost, capacity, availability, and/or impact of the resource utilization) time frame to a more efficient time frame for the resource utilization. Example and non-limiting operations 9204 include improving the resource utilization by adjusting a consumed resource of one type to a consumed resource of another type by the machine(s), for example by substituting a second resource for a first resource, and/or by substituting a second task for a first task, thereby substituting a second resource for a first resource. Example and non-limiting operations 9204 include executing a transaction related to a second resource in response to a utilization of a first resource, for example where the second resource can be substituted for the first resource, and/or where the second resource provides an economic offset for the first resource.

Figure 93:
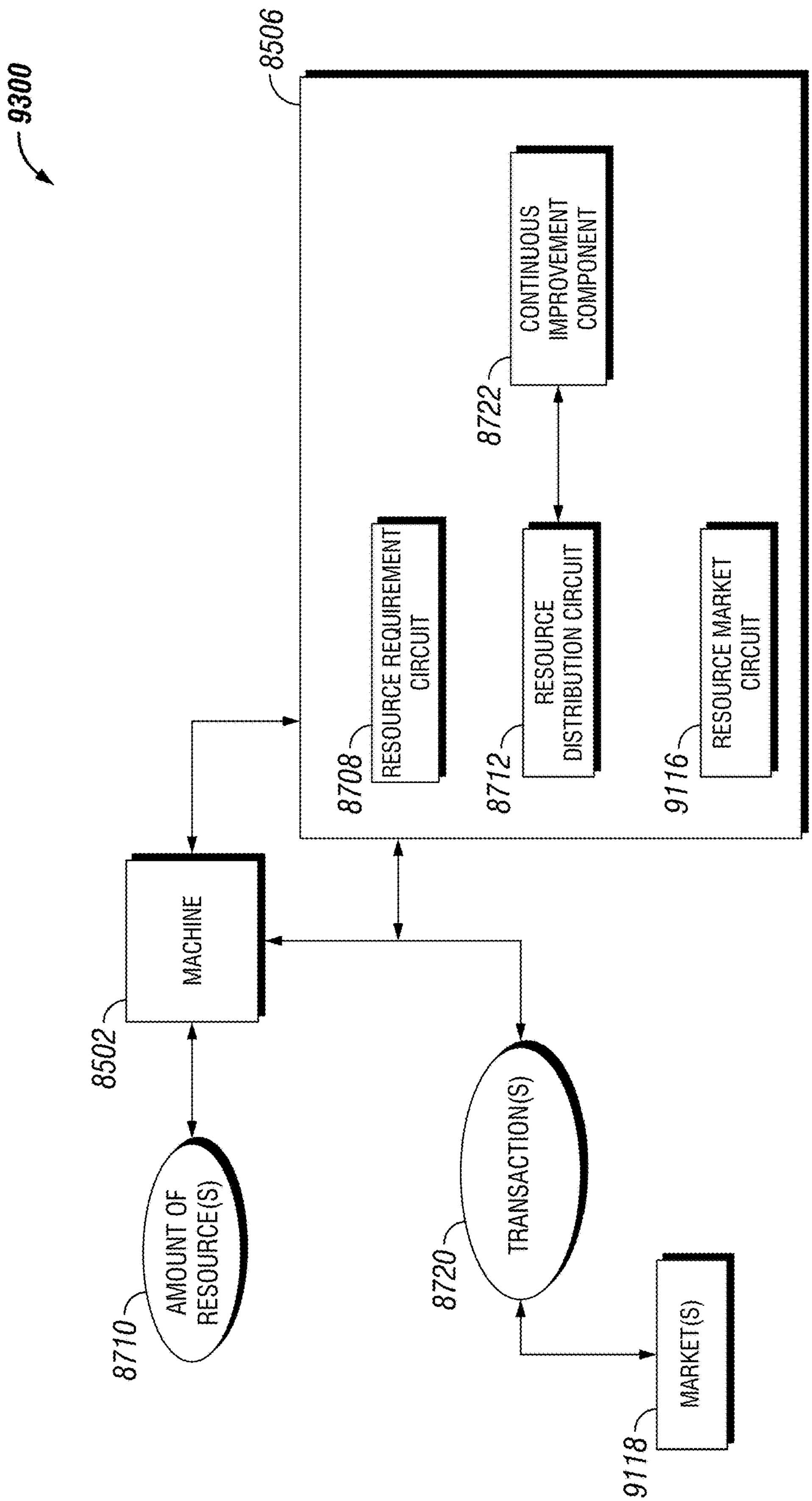
FIG. 93 is a schematic diagram of system for improving resource utilization of a machine.

Referencing FIG. 93, an example transaction-enabling system 9300 includes a machine 8502 having at least one of a compute task requirement, a networking task requirement, and/or an energy consumption task requirement. The example system 9300 further includes a controller 8506 having a resource requirement circuit 8708 structured to determine an amount of a resource 8710 for the machine to service at least one of the compute task requirement, the networking task requirement, and/or the energy consumption task requirement. The example controller 8506 further includes a resource market circuit 9116 structured to access a resource market 9118, and a resource distribution circuit 8712 structured to execute a transaction 8720 of the resource on the resource market 9118 in response to the determined amount of the resource 8710. In certain embodiments, the resource distribution circuit 8712 is further structured to adaptively improve an output value of the machine, a cost of operation of the machine, and/or a resource utilization of the machine using executed transactions 8720 on the resource market 9118. Example and non-limiting resources include an energy resource, an energy credit resource, and/or a spectrum allocation resource. An example resource market 9118 includes a spot market and/or a forward market for one or more resources. Example and non-limiting operations of the resource distribution circuit 8712 to adaptively improve the output value, cost of operation, and/or resource utilization of the machine 8502 include: increasing an output volume, quantity, and/or quality; improving an output delivery time (e.g., an earlier delivery and/or a synchronized delivery with some other process of the system); reducing a total resource utilization; reducing a resource utilization for a particular type of resource; reducing a resource consumed per output element produced of the machine; and/or time-shifting resource consumption from a less efficient (e.g., based on cost, capacity, availability, and/or impact of the resource utilization) time frame to a more efficient time frame for the resource consumption. Example and non-limiting operations of the resource distribution circuit 8712 include adjusting a consumed resource of one type to a consumed resource of another type by the machine(s), for example by substituting a second resource for a first resource, and/or by substituting a second task for a first task, thereby substituting a second resource for a first resource. Example and non-limiting operations of the resource distribution circuit 8712 include executing a transaction 8720 related to a second resource in response to a utilization of a first resource, for example where the second resource can be substituted for the first resource, and/or where the second resource provides an economic offset for the first resource. An example resource distribution circuit 8712 includes a machine learning component, an artificial intelligence component, and/or a neural network component (e.g., as a continuous improvement component 8722).

Figure 94:
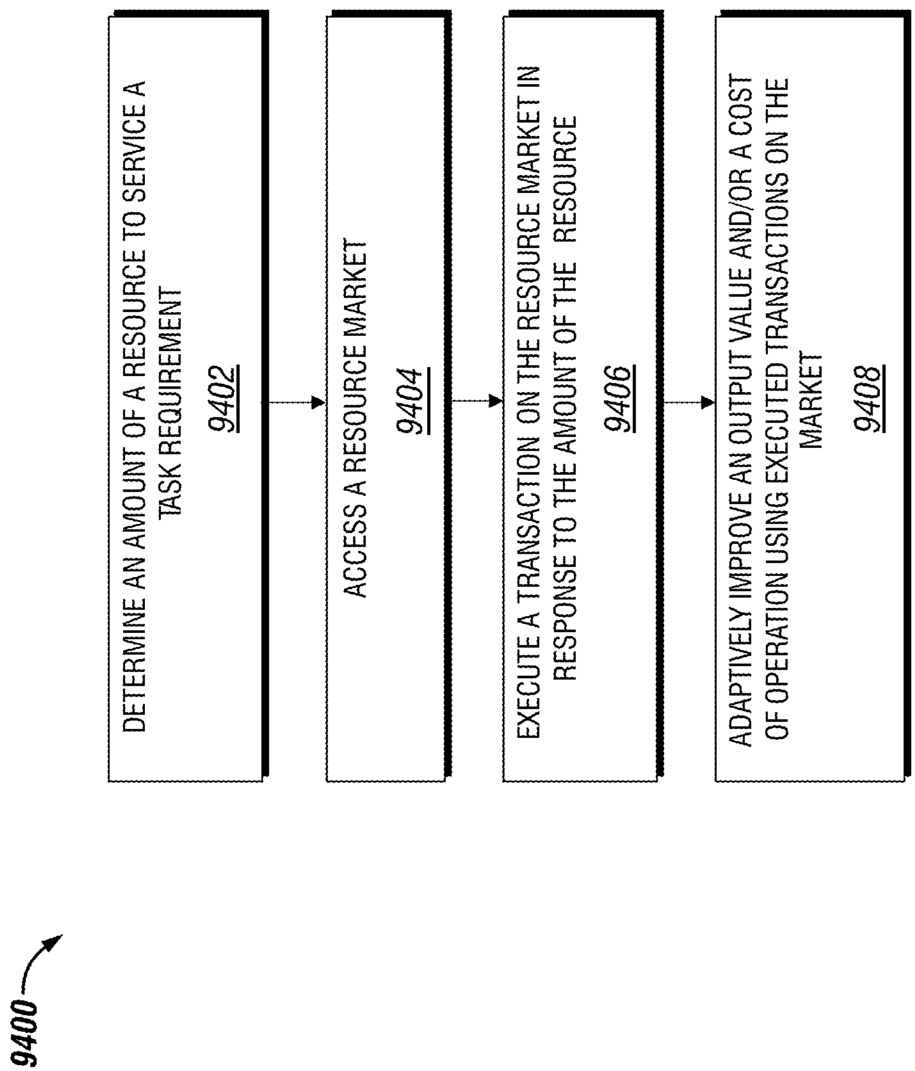
FIG. 94 is a schematic flow diagram of a method for improving resource utilization of a machine.

Referencing FIG. 94, an example procedure 9400 includes an operation 9402 to determine an amount of a resource for a machine to service at least one of a compute task requirement, a networking task requirement, and/or an energy consumption task requirement; an operation 9404 to access a resource market; and an operation 9406 to execute a transaction on the resource market in response to the amount of the resource. In certain embodiments, an example procedure 9400 further includes an operation 9408 to adaptively improve an output value, a cost of operation, and/or a resource utilization of the machine utilizing the executed transactions on the resource market.

Figure 95:
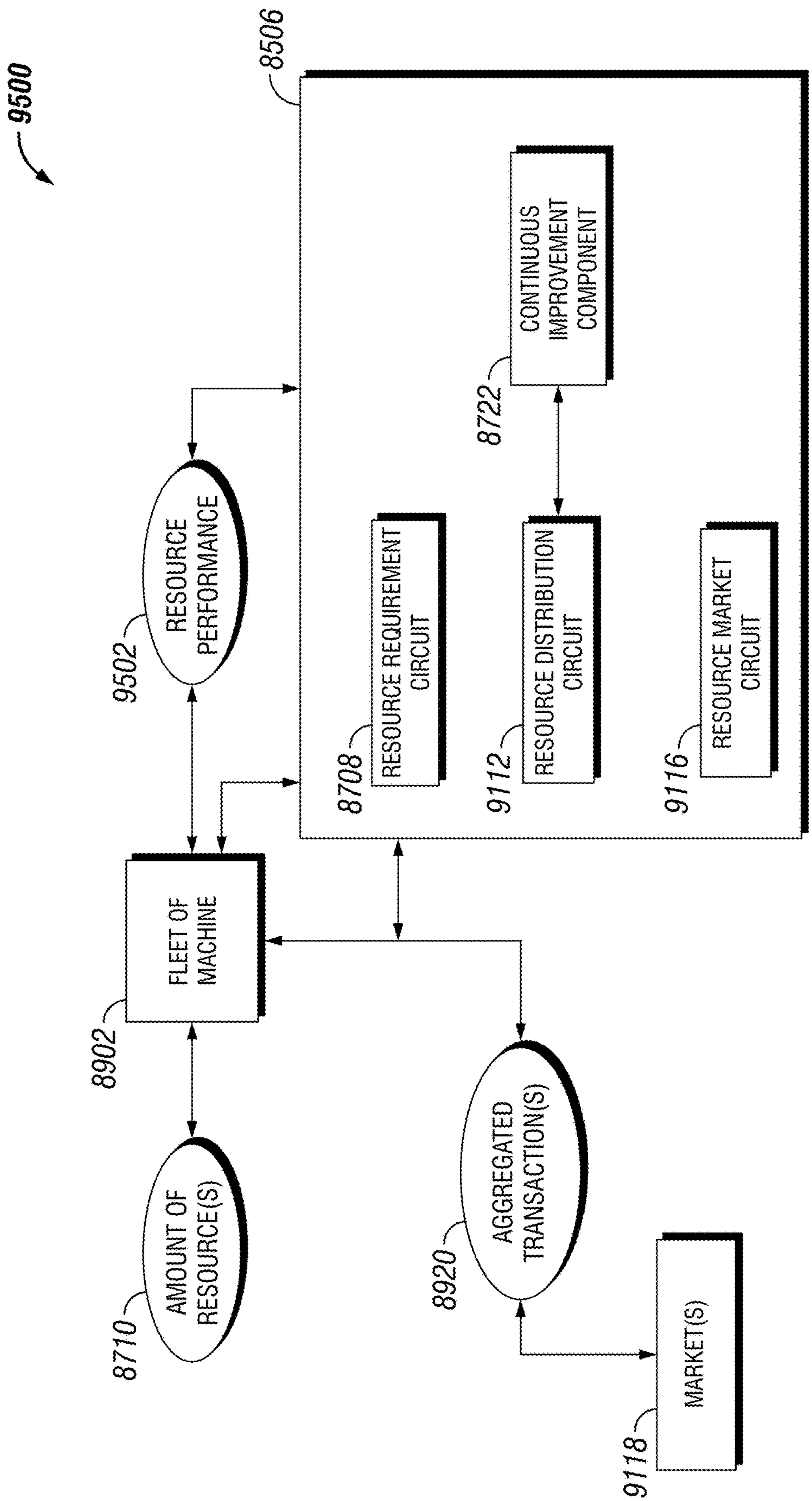
FIG. 95 is a schematic diagram of a system for improving resource utilization for a fleet of machines.

Referencing FIG. 95, an example transaction-enabling system 9500 includes a fleet of machines 8902 each having at least one of a compute task requirement, a networking task requirement, and/or an energy consumption task requirement. The example system 9500 further includes a controller 8506 having a resource requirement circuit 8708 structured to determine an amount of a resource 8710 for each of the machines of the fleet of machines 8902 to service at least one of the compute task requirement, the networking task requirement, and/or the energy consumption task requirement for each corresponding machine. The example system 9500 further includes a resource market circuit 9116 structured to access a resource market 9118, and a resource distribution circuit 9112 structured to execute an aggregated transaction 8920 of the resource on the resource market 9118 in response to the determined amount of the resource 8710 for each of the machines. The example resource market 9118 may include a spot market and/or a forward market for one or more of the resources. The example system 9500 includes the resource distribution circuit 9112 executing the aggregated transaction(s) 8920 to improve a resource performance 9502 of the fleet of machines 8902, where the resource performance 9502 includes one or more of: a total consumption of one or more resources, a cost of operation of the fleet of machines 8902, and/or an aggregate output value of the fleet of machines 8902 (e.g., including an output volume, quantity, and/or quality for a given amount of resources utilized, and/or an output volume, quantity, and/or quality per amount of resources utilized). An example resource distribution circuit 9112 is further structured to adaptively improve the resource performance 9502 of the fleet of machines 8902, and may further include a machine learning component, an artificial intelligence component, and/or a neural network component (e.g., as a continuous improvement component 8722).

Figure 96:
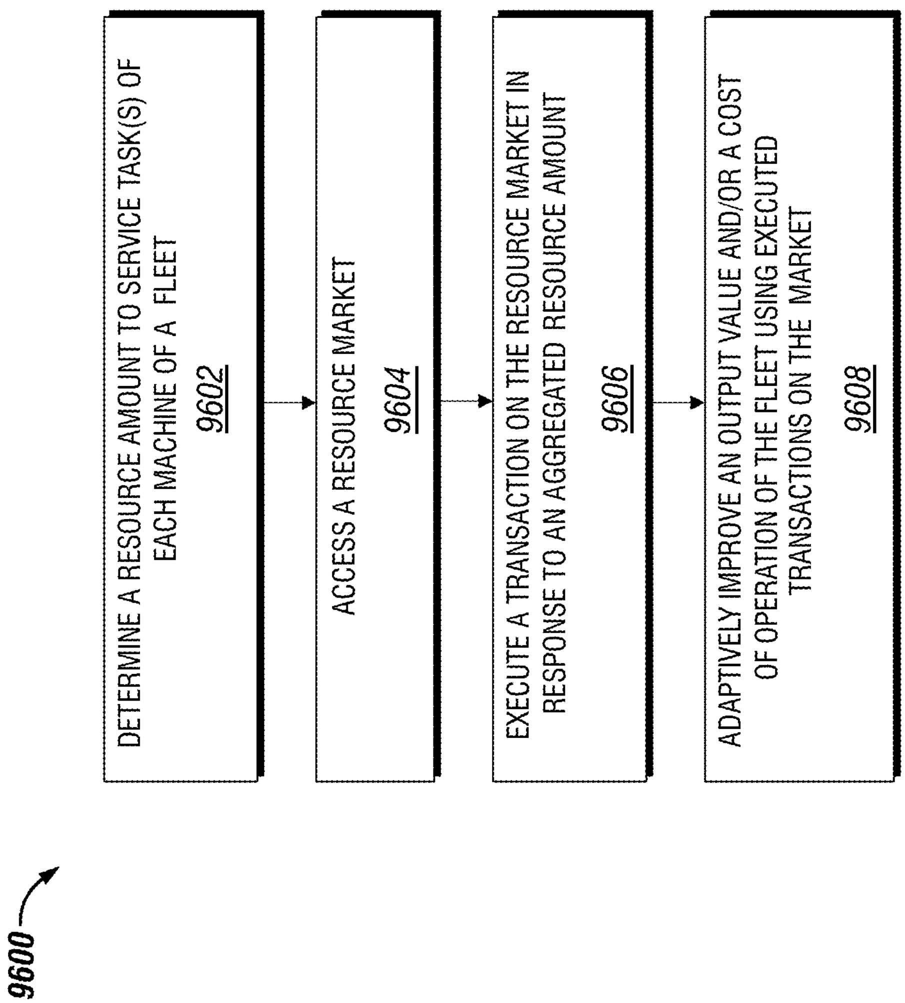
FIG. 96 is a schematic flow diagram of a method for improving resource utilization for a fleet of machines.

Referencing FIG. 96, an example procedure 9600 includes an operation 9602 to determine an amount of a resource, for each of machine of a fleet of machines, to service at least one of a compute task requirement, a networking task requirement, and/or an energy consumption task requirement for each corresponding machine. The example procedure 9600 further includes an operation 9604 to access a resource market, and an operation 9606 to execute a transaction on the resource market in response to an aggregated resource amount for the task requirements of each machine of the fleet of machines. In certain embodiments, the procedure 9600 further includes an operation 9608 to adaptively improve an output value, a cost of operation, a resource utilization, and/or a resource performance of the fleet of machines, using executed transactions on the market.

Figure 97:
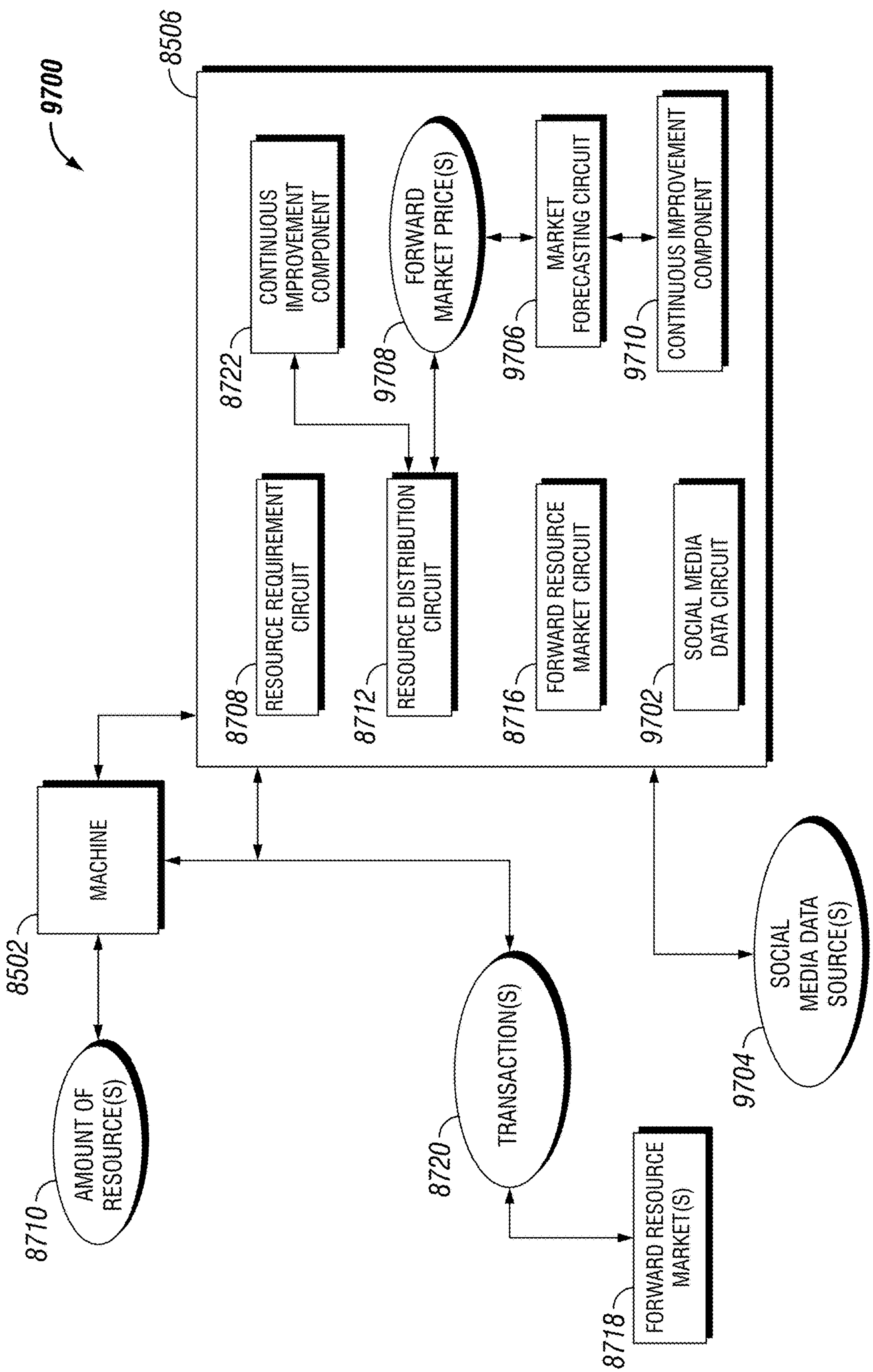
FIG. 97 is a schematic diagram of a system for improving resource utilization for a machine using social media data and a forward resource market.

Referencing FIG. 97, an example transaction-enabling system 9700 includes a machine 8502 having at least one of a compute task requirement, a networking task requirement, and/or an energy consumption task requirement. The example system 9700 further includes a controller 8506 having a resource requirement circuit 8708 structured to determine an amount of a resource for the machine 8502 to service at least one of the compute task requirement, the networking task requirement, and/or the energy consumption task requirement. The example controller 8506 further includes a social media data circuit 9702 structured to interpret data from a plurality of social media data sources 9704; a forward resource market circuit 8716 structured to access a forward resource market 8718; a market forecasting circuit 9706 structured to predict a forward market price 9708 of the resource on the forward resource market 8718 in response to the plurality of social media data sources 9704; and a resource distribution circuit 8712 structured to execute a transaction 8720 of the resource on the forward resource market 8718 in response to the determined amount of the resource 8710 and the predicted forward market price 9708 of the resource. Example and non-limiting resources include a spectrum allocation resource, an energy resource, and/or an energy credit resource. Example and non-limiting transactions 8720 include buying and/or selling one or more of the resources. An example market forecasting circuit 9706 adaptively improves the forward market price 9708 prediction, for example utilizing a machine learning component, an artificial intelligence component, and/or a neural network component (e.g., as a continuous improvement component 9710). An example resource distribution circuit 8712 is further structured to adaptively improve an operating aspect of the machine 8502, for example output value of the machine, a cost of operation of the machine, a resource utilization of the machine, and/or a resource performance of the machine using executed transactions 8720 on the forward resource market 8718. In a further example, the resource distribution circuit 8712 further includes a machine learning component, an artificial intelligence component, and/or a neural network component (e.g., as a continuous improvement component 8722).

Figure 98:
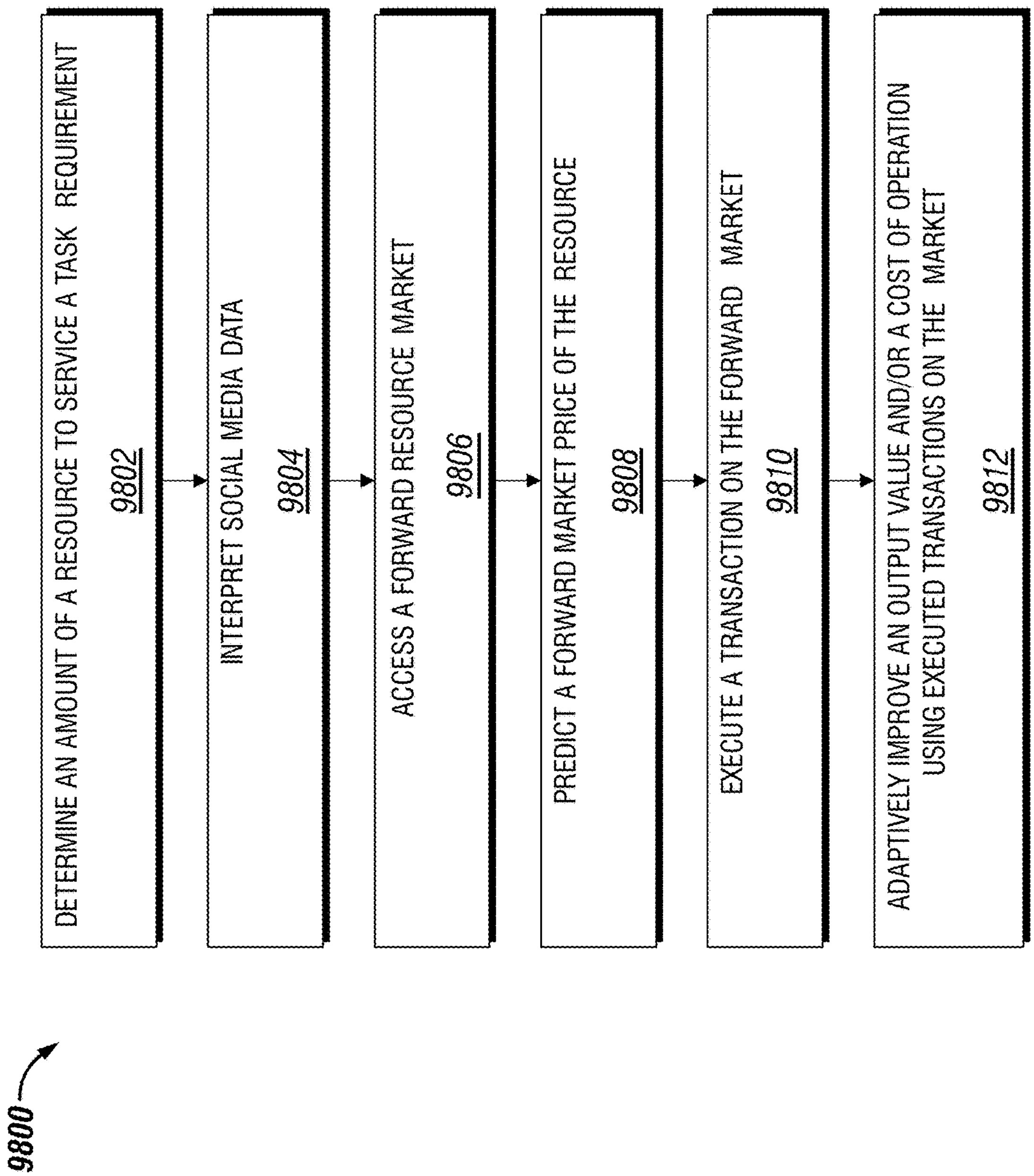
FIG. 98 is a schematic flow diagram of a method for improving resource utilization for a machine using social media data and a forward resource market.

Referencing FIG. 98, an example procedure 9800 includes an operation 9802 to determine an amount of a resource for a machine to service at least one of a compute task requirement, a networking task requirement, and/or an energy consumption task requirement; an operation 9804 to interpret data from a plurality of social media data sources; an operation 9806 to access a forward resource market; an operation 9808 to predict a forward market price of the resource on the forward resource market in response to the plurality of social media data sources; and an operation 9810 to execute a transaction of the resource on the forward resource market in response to the determined amount of the resource and the predicted forward market price of the resource. An example procedure 9800 further includes an operation 9812 to adaptively improve an output value and/or a cost of operation of the machine using executed transactions on the market. In certain embodiments, the procedure 9600 further includes an operation to adaptively improve the operation 9808 to predict the forward market price of the resource. In certain embodiments, the operation 9812 includes an operation to adaptively improve a resource utilization and/or a resource performance of the machine using the executed transactions on the market.

Figure 99:
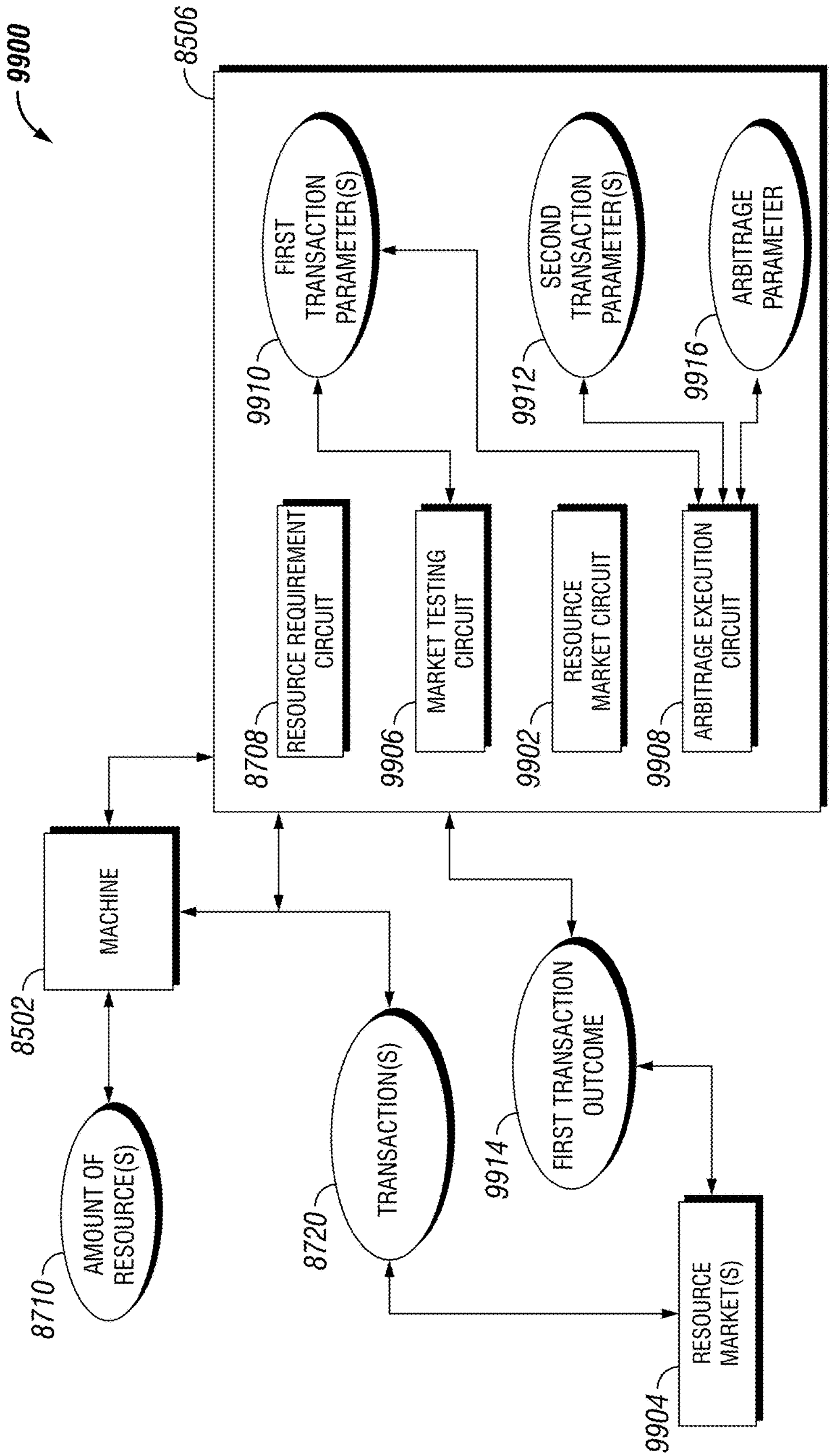
FIG. 99 is a schematic diagram of a system for improving resource utilization using an arbitrage operation.

Referencing FIG. 99, an example transaction-enabling system 9900 includes a machine 8502 having at least one of a compute task requirement, a networking task requirement, and/or an energy consumption task requirement. The example system 9900 further includes a controller 8506 having a resource requirement circuit 8708 structured to determine an amount of a resource 8710 for the machine 8502 to service at least one of the compute task requirement, the networking task requirement, and/or the energy consumption task requirement, and a resource market circuit 9902 structured to access a resource market 9904. The example controller 8506 further includes a market testing circuit 9906 structured to execute a first transaction 8720 of the resource on the resource market 9904 in response to the determined amount of the resource 8710; and an arbitrage execution circuit 9908 structured to execute a second transaction 8720 of the resource on the resource market 9904 in response to the determined amount of the resource and further in response to an outcome 9914 of the execution of the first transaction, wherein the second transaction comprises a larger transaction than the first transaction (e.g., according to the first transaction parameters 9910 defining a lower transaction volume, amount, or cost than the second transaction parameters 9912). The resource may be any type of resource as set forth throughout the present disclosure. An example arbitrage execution circuit 9908 is further structured to adaptively improve an arbitrage parameter 9916 by adjusting the first transaction parameter 9910 and/or the second transaction parameter 9912. Example and non-limiting adjustments to the transaction parameters 9910, 9912 include adjustments such as: adjusting a relative size of the first transaction and the second transaction; adjusting a resource type of the first transaction and the second transaction; adjusting a selected resource market 9904 of the first transaction and/or the second transaction; adjusting a forward market time-frame and/or a spot market selection of the first transaction parameter 9910 and/or the second transaction parameter 9912; adjusting a timing between the first transaction and the second transaction; adjusting a time to initiate the first transaction (e.g., a time of day; a calendar date; a relative date to a week beginning, holiday, economic data report, etc.); and/or changing a number of transactions such as a third, fourth, or fifth transactions, including determining transaction parameters 9910, 9912 for each transaction, a trajectory of volumes and timing for each transaction, and further determining or adjusting parameters for each subsequent transaction based on the transaction outcome of each preceding transaction (or a subset of the preceding transactions, or all of the preceding transactions). In certain embodiments, the arbitrage execution circuit 9908 may include a continuous improvement component, such as a machine learning component, an artificial intelligence component, and/or a neural network component. In certain embodiments, the arbitrage parameter 9916 may include one or more parameters such as: a similarity value in a market response of the first transaction and the second transaction; a confidence value of the first transaction to provide test information for the second transaction; and/or a market effect of the first transaction.

Figure 100:
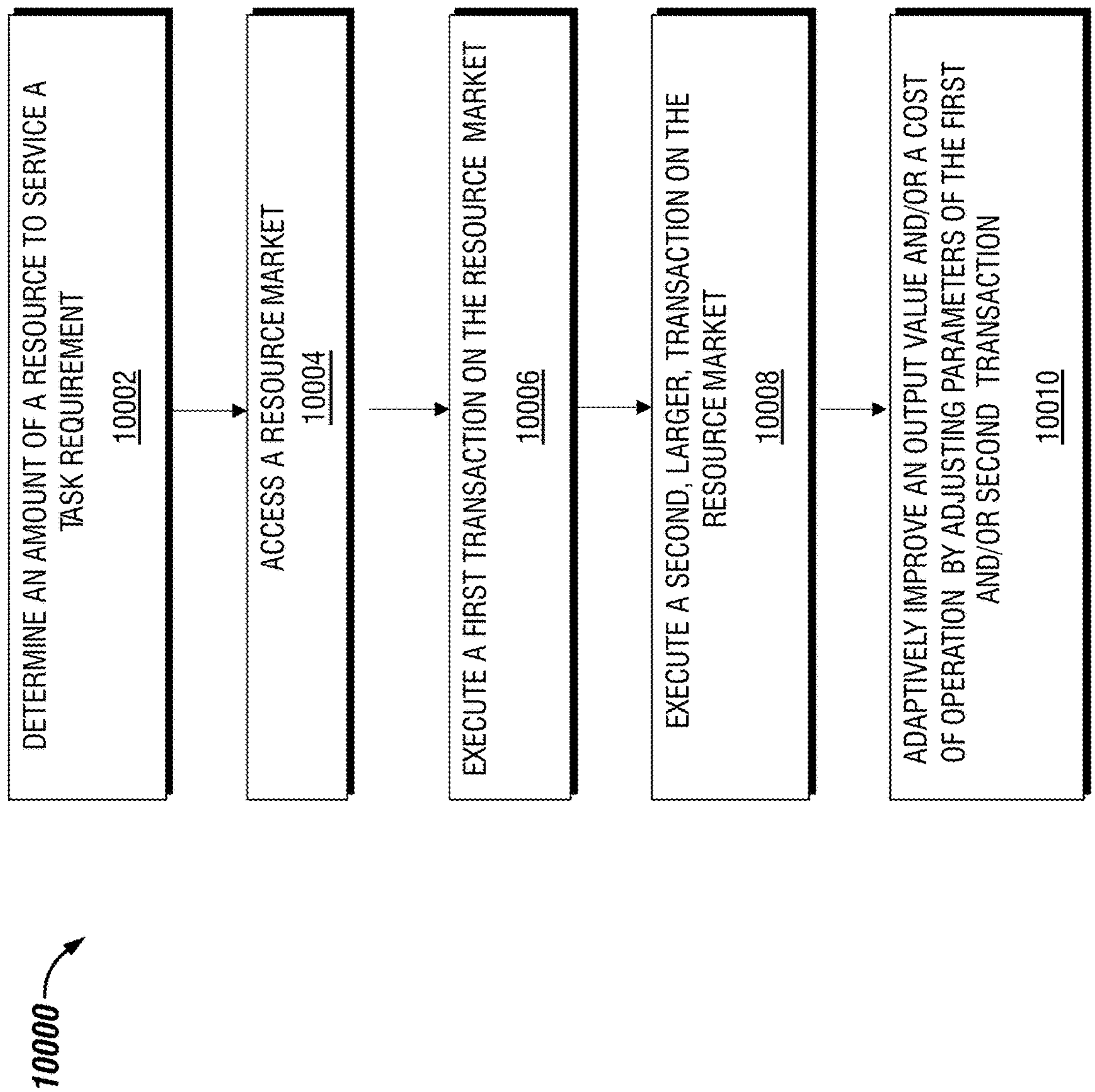
FIG. 100 is a schematic flow diagram of a method for improving resource utilization using an arbitrage operation.

Referencing FIG. 100, an example procedure 10000 includes an operation 10002 to determine an amount of a resource to service a task requirement of a machine, an operation 10004 to access a resource market, an operation 10006 to execute a first transaction on the resource market, and an operation 10008 to execute a second, larger transaction on the resource market. In certain embodiments, the procedure 10000 further includes an operation 10010 to adaptively improve one of an output value, a cost of operation, a resource utilization, and/or a resource performance of the machine by adjusting parameters of the first and/or second transaction.

Figure 101:
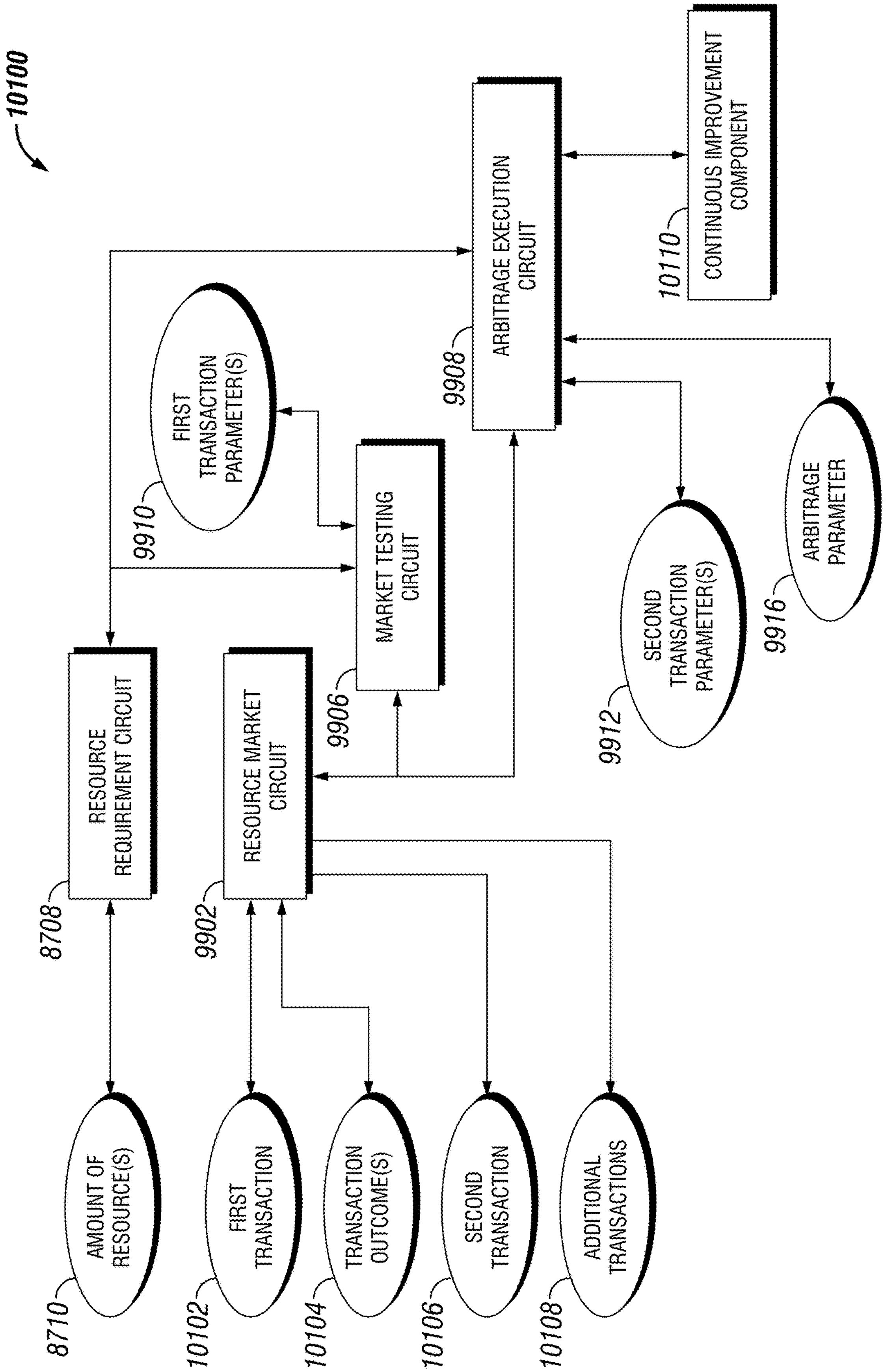
FIG. 101 is a schematic diagram of an apparatus for improving resource utilization using an arbitrage operation.

Referencing FIG. 101, an example apparatus 10100 includes a resource requirement circuit 8708 structured to determine an amount of a resource 8710 for a machine to service at least one of a compute task requirement, a networking task requirement, and/or an energy consumption task requirement. The example apparatus 10100 further includes a resource market circuit 9902 structured to access a resource market, for example to establish communications with and/or to communicate transaction parameters (buying, selling, amounts, prices, types of pricing limits, etc.) with the market(s) for the resource(s). The example apparatus 10100 further includes a market testing circuit 9906 structured to execute a first transaction 10102 of the resource on the resource market 9904 in response to the determined amount of the resource 8710; and an arbitrage execution circuit 9908 structured to execute a second transaction 10106 of the resource on the resource market 9904 in response to the determined amount of the resource and further in response to an outcome 10104 of the execution of the first transaction, wherein the second transaction 10106 comprises a larger transaction than the first transaction 10102 (e.g., according to the first transaction parameters 9910 defining a lower transaction volume, amount, or cost than the second transaction parameters 9912). The resource may be any type of resource as set forth throughout the present disclosure. An example arbitrage execution circuit 9908 is further structured to adaptively improve an arbitrage parameter 9916 by adjusting the first transaction parameter 9910 and/or the second transaction parameter 9912. In certain embodiments, the arbitrage execution circuit 9908 may include and/or communicate with a continuous improvement component 10110, such as a machine learning component, an AI component, and/or a neural network component. Example and non-limiting adjustments to the transaction parameters 9910, 9912 include adjustments such as: adjusting a relative size of the first transaction 10102 and the second transaction 10106; adjusting a resource type of the first transaction 10102 and the second transaction 10106; adjusting a selected market of the first transaction 10102 and/or the second transaction 10106 (e.g., where more than one market is available); adjusting a forward market timeframe and/or a spot market selection of the first transaction parameter 9910 and/or the second transaction parameter 9912; adjusting a timing between the first transaction 10102 and the second transaction 10106; adjusting a time to initiate the first transaction 10102 (e.g., a time of day; a calendar date; a relative date to a week beginning, holiday, economic data report, etc.); and/or changing a number of transactions such as a third, fourth, or fifth transactions (e.g., additional transactions 10108), including determining parameters 9910, 9912 for each transaction, a trajectory of volumes and timing for each transaction, and further determining or adjusting parameters for each subsequent transaction based on the transaction outcome of each preceding transaction (or a subset of the preceding transactions, or all of the preceding transactions). In certain embodiments, the arbitrage parameter 9916 may include one or more parameters such as: a similarity value in a market response of the first transaction and the second transaction; a confidence value of the first transaction to provide test information for the second transaction; and/or a market effect of the first transaction.

Figure 102:
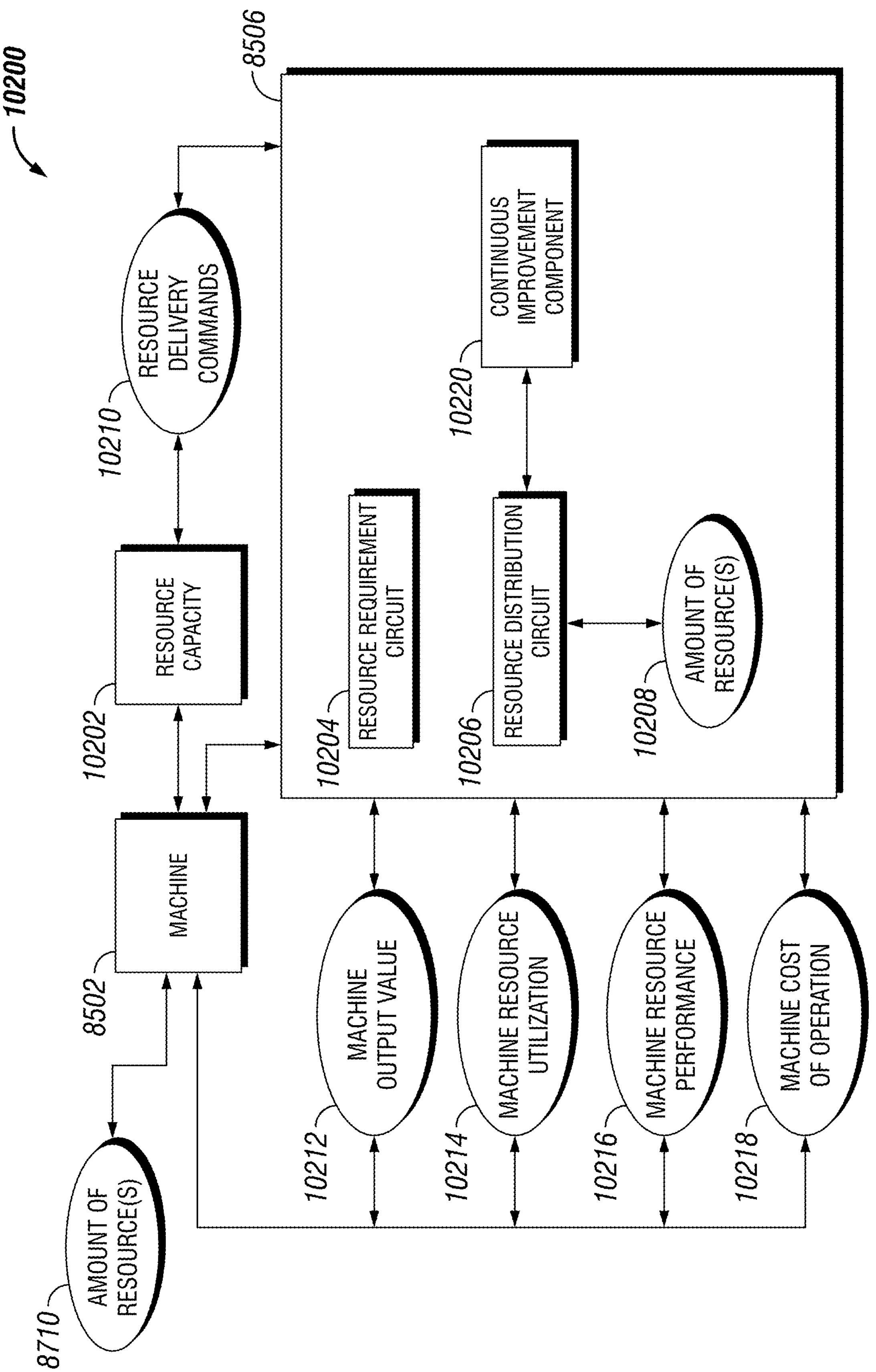
FIG. 102 is a schematic diagram of a system for improving resource distribution for a machine.

Referencing FIG. 102, an example transaction-enabling system 10200 includes a machine 8502 having an associated resource capacity 10202 for a resource, the machine 8502 having a requirement for at least one of a core task, a compute task, an energy storage task, a data storage task, and/or a networking task. The example system 10200 further includes a controller 8506 having a resource requirement circuit 10204 structured to determine an amount of the resource 8710 to service the requirement of the at least one of the core task, the compute task, the energy storage task, the data storage task, and/or the networking task in response to the requirement of the at least one of the core task, the compute task, the energy storage task, the data storage task, and/or the networking task. The example controller 8506 further includes a resource distribution circuit 10206 structured to adaptively improve, in response to the associated resource capacity 10202, a resource delivery 10208 of the resource between the core task, the compute task, the energy storage task, the data storage task, and/or the networking task. An example associated resource capacity 10202 includes one or more of: a compute capacity for a compute resource; an energy capacity for an energy resource (including at least power, storage, regeneration, torque, and/or credits); a network bandwidth capacity for a networking resource; and/or a data storage capacity for a data storage resource. In certain embodiments, the resource distribution circuit 10206 provides commands to the machine 8502, and/or provides resource delivery commands 10210 to the associated resource capacity 10202 to implement the determination and/or improvement of the resource delivery 10208. In certain embodiments, the controller 8506 determines one or more of a machine output value 10212, a machine resource utilization 10214, a machine resource performance 10216, and/or a machine cost of operation 10218, and the resource distribution circuit 10206 further adaptively improves the resource delivery 10208 in response to one or more of these. An example resource distribution circuit 10206 includes a continuous improvement circuit 10220, which may include one or more of a machine learning component, an AI component, and/or a neural network component.

Figure 103:
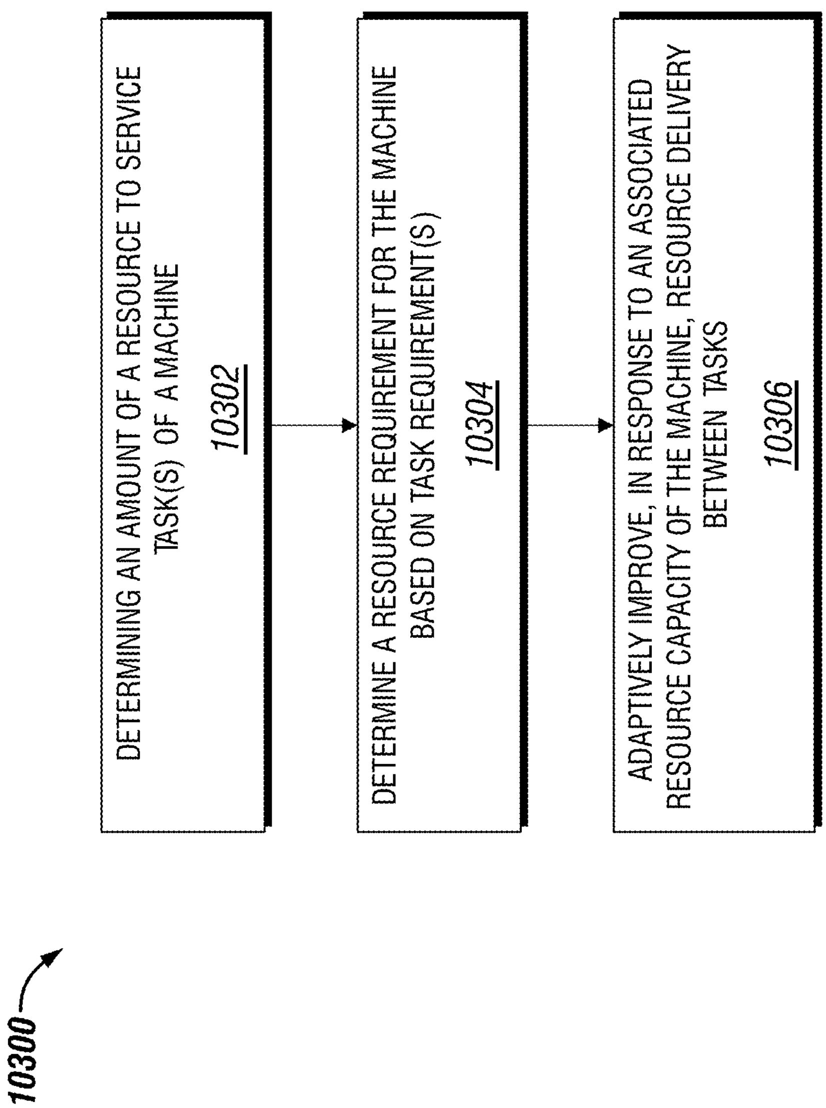
FIG. 103 is a schematic flow diagram of a system for improving resource distribution for a machine.

Referencing FIG. 103, an example procedure 10300 includes an operation 10302 to determine an amount of a resource to service one or more tasks of a machine, an operation 10304 to determine a resource requirement for the machine based on the amount of the resource to service the one or more tasks, and an operation 10306 to adaptively improve, in response to an associated resource capacity of the machine, a resource delivery between the tasks of the machine.

Figure 104:
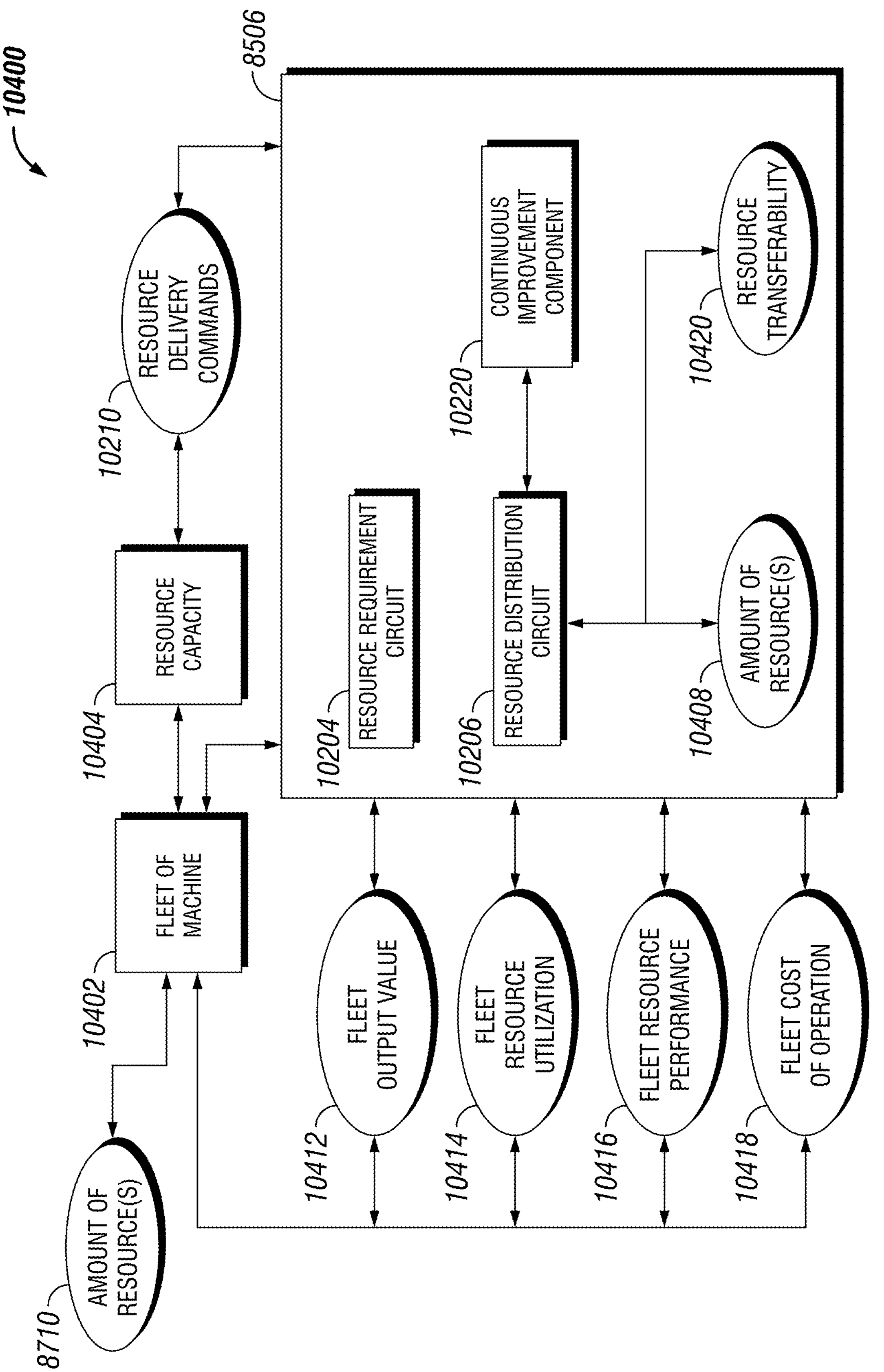
FIG. 104 is a schematic diagram of a system for improving aggregated resource delivery for a fleet of machines.

Referencing FIG. 104, an example transaction-enabling system 10400 includes a fleet of machines 10402 each having an associated resource capacity 10404 for a resource, and each machine of the fleet of machines 10402 further having a requirement for at least one of a core task, a compute task, an energy storage task, a data storage task, and a networking task. The example system 10400 further includes a controller 8506 having a resource requirement circuit 10204 structured to determine an amount of the resource 8710 to service the requirement of the at least one of the core task, the compute task, the energy storage task, the data storage task, and/or the networking task for each machine of the fleet of machines 10402 in response to the requirement of the at least one of the core task, the compute task, the energy storage task, the data storage task, and/or the networking task. The example controller 8506 further includes a resource distribution circuit 10206 structured to adaptively improve, in response to the associated resource capacity 10404, an aggregated resource delivery 10408 of the resource between the core task, the compute task, the energy storage task, the data storage task, and/or the networking task. An example associated resource capacity 10404 includes one or more of: a compute capacity for a compute resource; an energy capacity for an energy resource (including at least power, storage, regeneration, torque, and/or credits); a network bandwidth capacity for a networking resource; and/or a data storage capacity for a data storage resource. In certain embodiments, the resource distribution circuit 10206 provides commands to the fleet of machines 10402, and/or provides resource delivery commands 10210 to the associated resource capacity 10404 to implement the determination and/or improvement of the aggregated resource delivery 10408. In certain embodiments, the controller 8506 determines one or more of a fleet output value 10412, a fleet resource utilization 10414, a fleet resource performance 10416, and/or a fleet cost of operation 10418, and the resource distribution circuit 10206 further adaptively improves the aggregated resource delivery 10408 in response to one or more of these. An example resource distribution circuit 10206 includes a continuous improvement circuit 10220, which may include one or more of a machine learning component, an AI component, and/or a neural network component.

An example resource distribution circuit 10206 is further structured to interpret a resource transferability value 10420 between at least two machines of the fleet of machines, and to adaptively improve the aggregated resource delivery 10408 further in response to the resource transferability value 10420. Example and non-limiting resource transferability values 10420 include one or more of: an ability to substitute or distribute tasks at least partially between machines of the fleet of machines 10402; an ability to transfer resources from the associated resource capacities between machines of the fleet of machines 10402; and/or an ability to substitute a first resource for a second resource within a machine or between machines of the fleet of machines 10402. A substitution of resources may further include consideration of a rate of resource substitution (e.g., resource consumption per unit time), a capacity of a resource, positive and negative resource flows (e.g., consumption, regeneration, or acquisition of a resource), and/or time frames for the resource substitution (e.g., transferring a resource from a first machine to a second machine at a first time, and transferring from the second machine to the first machine or another machine at a second time).

Figure 105:
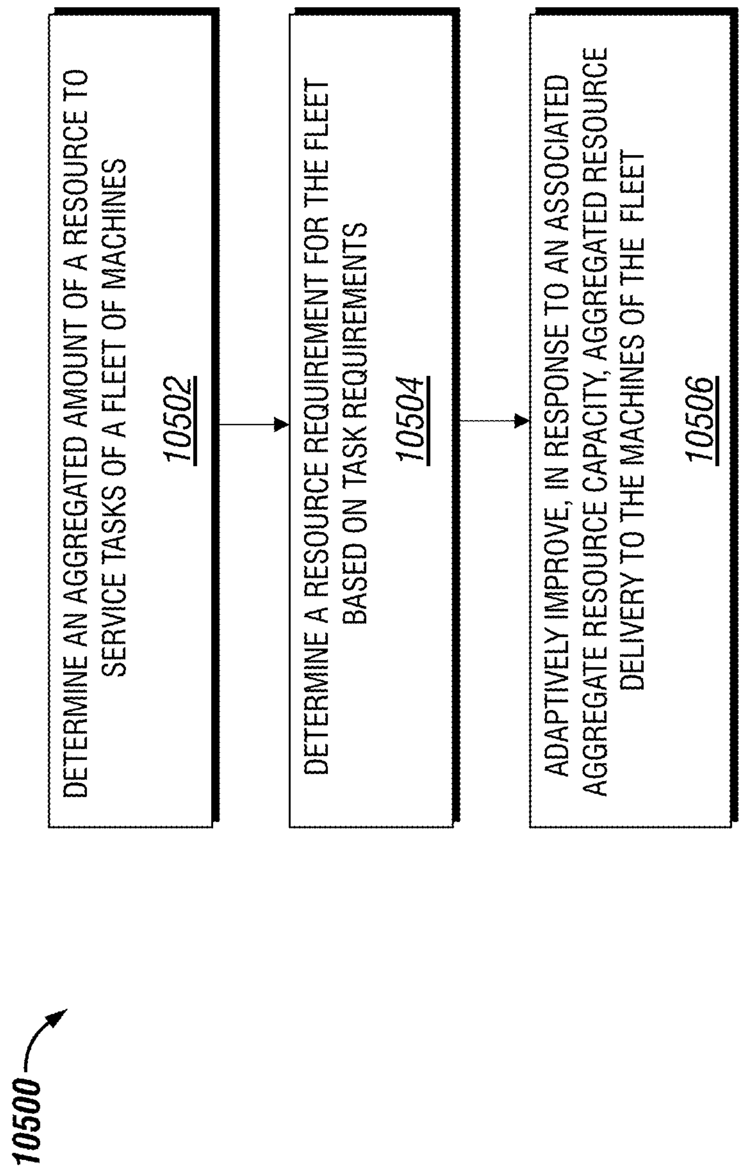
FIG. 105 is a schematic flow diagram of a method for improving aggregated resource delivery for a fleet of machines.

Referencing FIG. 105, an example procedure 10500 includes an operation 10502 to determine an aggregated amount of a resource to service a core task, a compute task, an energy storage task, a data storage task, and/or a networking task for each machine of a fleet of machines, and an operation 10504 to determine a resource requirement including at least one of a core task requirement, a compute task requirement, an energy storage task requirement, a data storage task requirement, and/or a networking task requirement for each machine of the fleet of machines. The example procedure 10500 further includes an operation 10506 to adaptively improve, in response to an aggregated associated resource capacity of the fleet of machines, an aggregated resource delivery of the resource between the core task, the compute task, the energy storage task, the data storage task, and/or the networking task for each machine of the fleet of machines.

Figure 106:
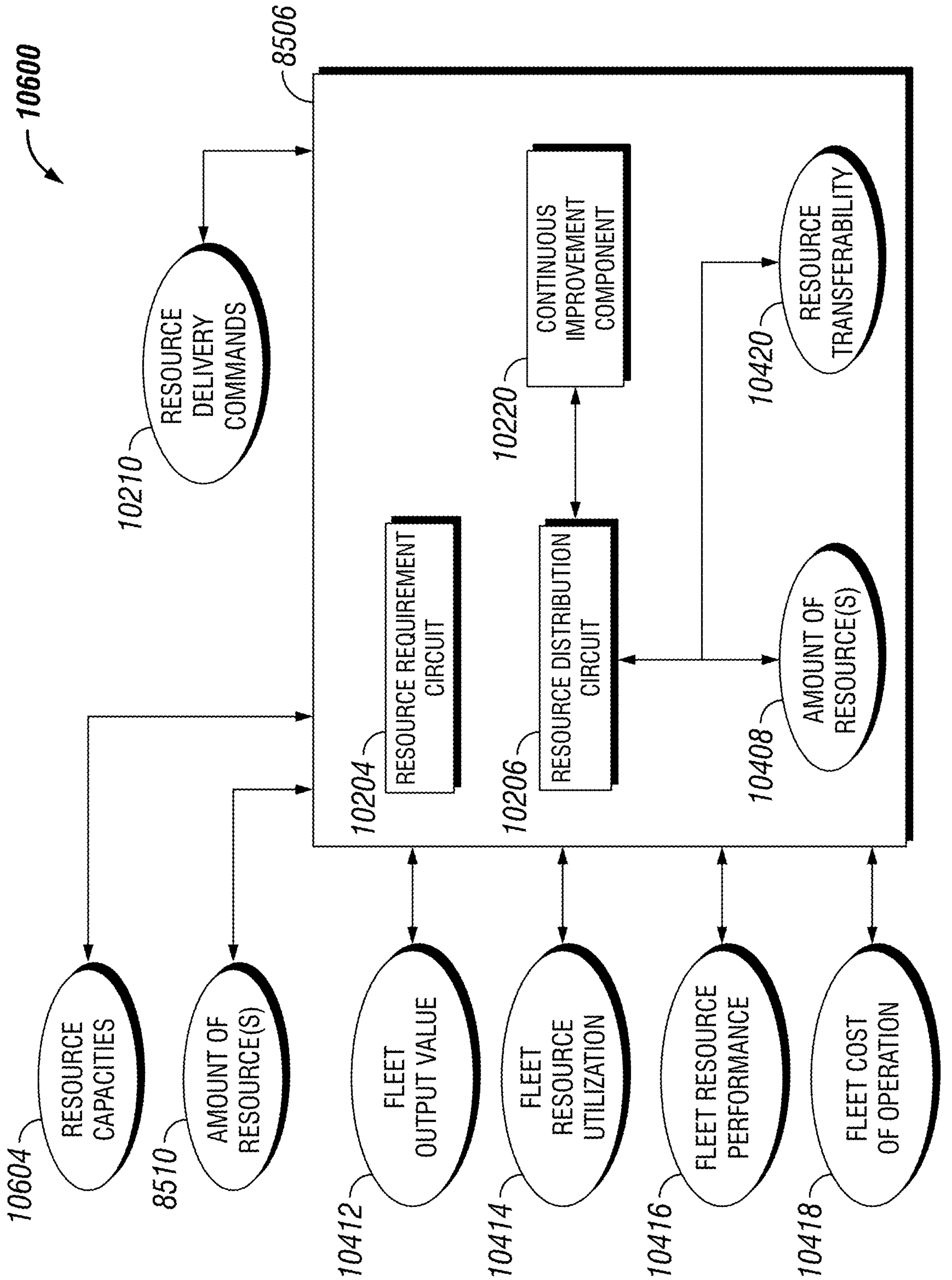
FIG. 106 is a schematic diagram of an apparatus for improving aggregated resource delivery for a fleet of machines.

Referencing FIG. 106, an example apparatus 10600 includes a controller 8506 having resource requirement circuit 10204 structured to determine an aggregated amount of a resource 8710 to service a core task, a compute task, an energy storage task, a data storage task, and/or a networking task for each machine of a fleet of machines in response to at least one of a core task requirement, a compute task requirement, an energy storage task requirement, a data storage task requirement, and/or a networking task requirement for each machine of the fleet of machines; and a resource distribution circuit 10206 structured to adaptively improve, in response to an aggregated associated resource capacity 10604 of the fleet of machines, an aggregated resource delivery 10408 of the resource between the core task, the compute task, the energy storage task, the data storage task, and/or the networking task for each machine of the fleet of machines. Example associated resource capacities 10604 include one or more of: a compute capacity for a compute resource; an energy capacity for an energy resource (including at least power, storage, regeneration, torque, and/or credits); a network bandwidth capacity for a networking resource; and/or a data storage capacity for a data storage resource. In certain embodiments, the resource distribution circuit 10206 provides commands to the fleet of machines 10402, and/or provides resource delivery commands 10210 to the associated resource capacity elements to implement the determination and/or improvement of the aggregated resource delivery 10408. In certain embodiments, the controller 8506 determines one or more of a fleet output value 10412, a fleet resource utilization 10414, a fleet resource performance 10416, and/or a fleet cost of operation 10418, and the resource distribution circuit 10206 further adaptively improves the aggregated resource delivery 10408 in response to one or more of these. An example resource distribution circuit 10206 includes a continuous improvement circuit 10220, which may include one or more of a machine learning component, an AI component, and/or a neural network component.

Figure 107:
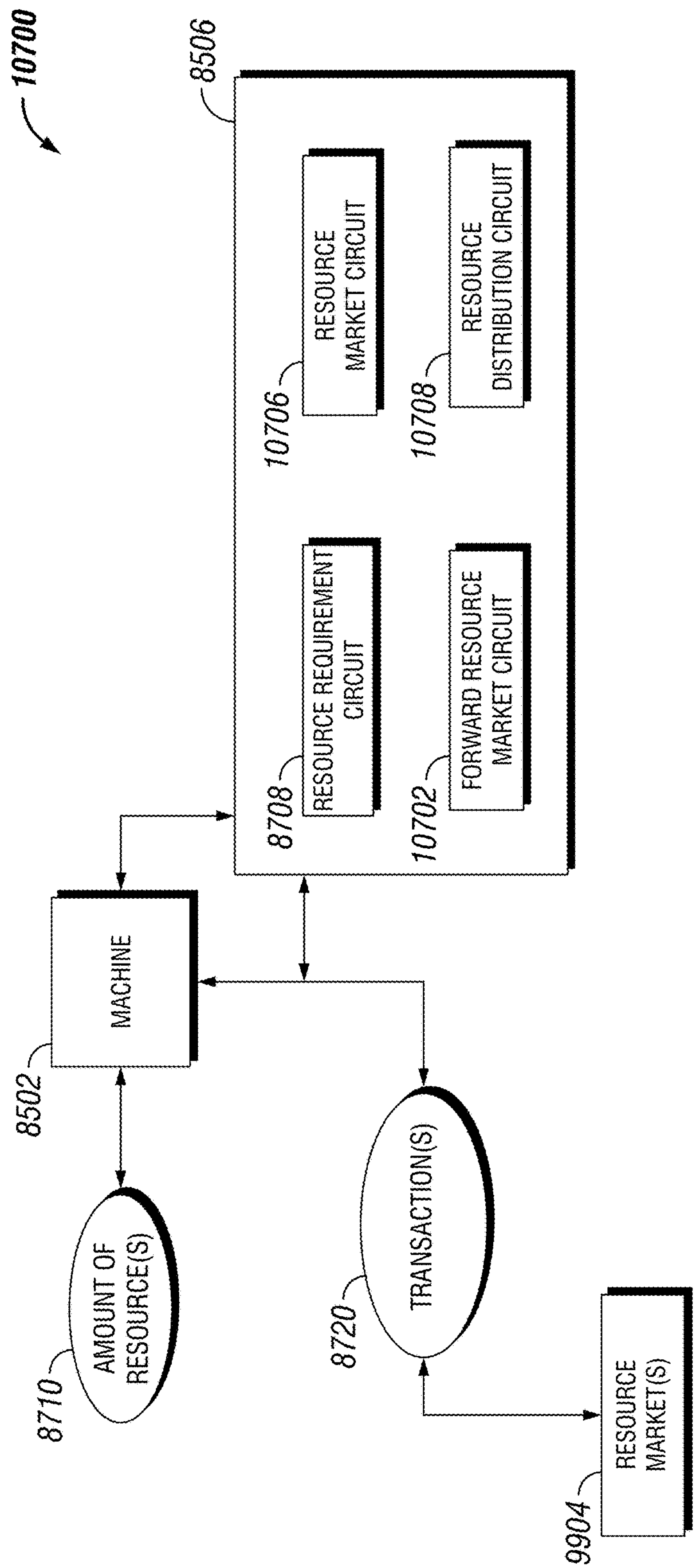
FIG. 107 is a schematic diagram of a system for improving resource delivery for a machine using a forward resource market.

Referencing FIG. 107, an example transaction-enabling system 10700 includes a machine 8502 having at least one task requirement, and controller 8506 having a resource requirement circuit 8708 structured to determine an amount of resource(s) 8710 for the machine 8502 to service the task requirement(s). The example controller 8506 further includes a forward resource market circuit 10702 structured to access a forward resource market (resource market(s) 9904), and a resource market circuit 10706 structured to access a resource market 9904 (e.g., a spot market, or a different forward market). The example controller 8506 further includes a resource distribution circuit 10708 structured to execute a transaction 8720 on the forward resource market and/or the resource market in response to the determined amount of the resource 8710. An example resource distribution circuit 10708 is further structured to adaptively improve at least one of: an output of the machine, a cost of operation of the machine, a resource utilization of the machine, and/or a resource performance of the machine using the transaction(s) 8720. In certain embodiments, the resource distribution circuit 10708 includes continuous improvement component, such as a machine learning component, an AI component, and/or a neural network component, to perform the adaptive improvement. In certain embodiments, the resource distribution circuit 10708 may determine a second amount of a second resource for the machine to service the task requirement(s), and may further execute a transaction 8720 of the first resource and/or the second resource to improve an aspect of the machine operation. The second resource may be a substitute resource for the first resource, and/or may be a corresponding resource to the first resource—for example a resource that is expected to make a corresponding or countering price move relative to the first resource. In certain embodiments, the forward resource market is a forward market for a first time scale (e.g., one month out) and the resource market is a forward market for a second time scale (e.g., two months out). In certain embodiments, the forward market is a forward market for the first resource or the second resource, and the resource market is a spot market either the first resource or the second resource (e.g., the same resource as for the forward market, or the other one of the first or second resource), and/or the resource market is a forward market for either the first resource or the second resource (e.g., the same resource as for the forward market but at a different time scale, or the other one of the first or second resource at the same or a different time scale). In certain embodiments, the transaction(s) 8720 may be one of: a sale of a resource, a purchase of a resource, a short sale of a resource, a call option for a resource, a put option for a resource, and/or any of the foregoing with relation to a substitute resource or a correlated resource. An example resource distribution circuit 10708 executes the transaction(s) 8720 using a substitute resource and/or a correlated resource as a substitute for a transaction of the to-be-traded resource. An example resource distribution circuit 10708 executes the transaction(s) 8720 using a substitute resource and/or a correlated resource as an economic offset of the to-be-traded resource. An example resource distribution circuit 10708 executes the transaction(s) 8720 using a substitute resource and/or a correlated resource in concert with a transaction of the to-be-traded resource.

Figure 108:
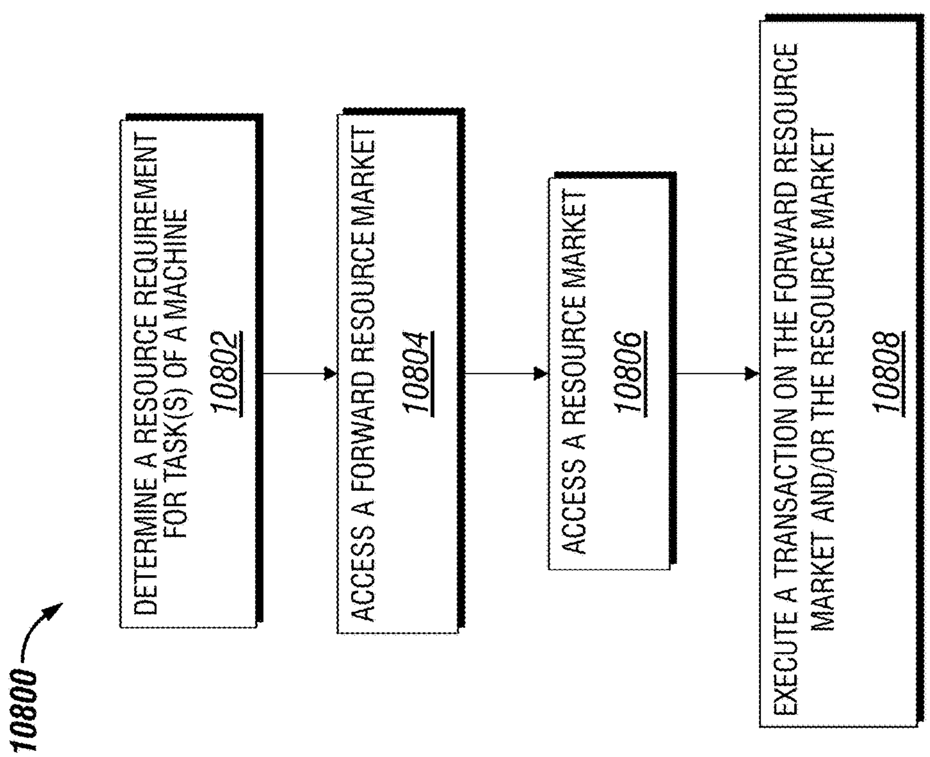
FIG. 108 is a schematic flow diagram of a method for improving resource delivery for a machine using a forward resource market.

Referencing FIG. 108, an example procedure 10800 includes an operation 10802 to determine a resource requirement for task(s) of a machine, and an operation 10804 to access a forward resource market for the resource, a substitute resource, and/or a correlated resource. The example procedure 10800 further includes an operation 10806 to access a resource market for the resource, a substitute resource, and/or a correlated resource. The resource market may be a spot market or a forward market. The example procedure 10800 further includes an operation 10808 to execute a transaction on the forward resource market and/or the resource market in response to the resource requirements. In certain embodiments, the operation 10808 is performed to improve, and/or to adaptively improve, an output value of the machine, a cost of operation of the machine, a resource utilization of the machine, and/or a resource performance of the machine.

Figure 109:
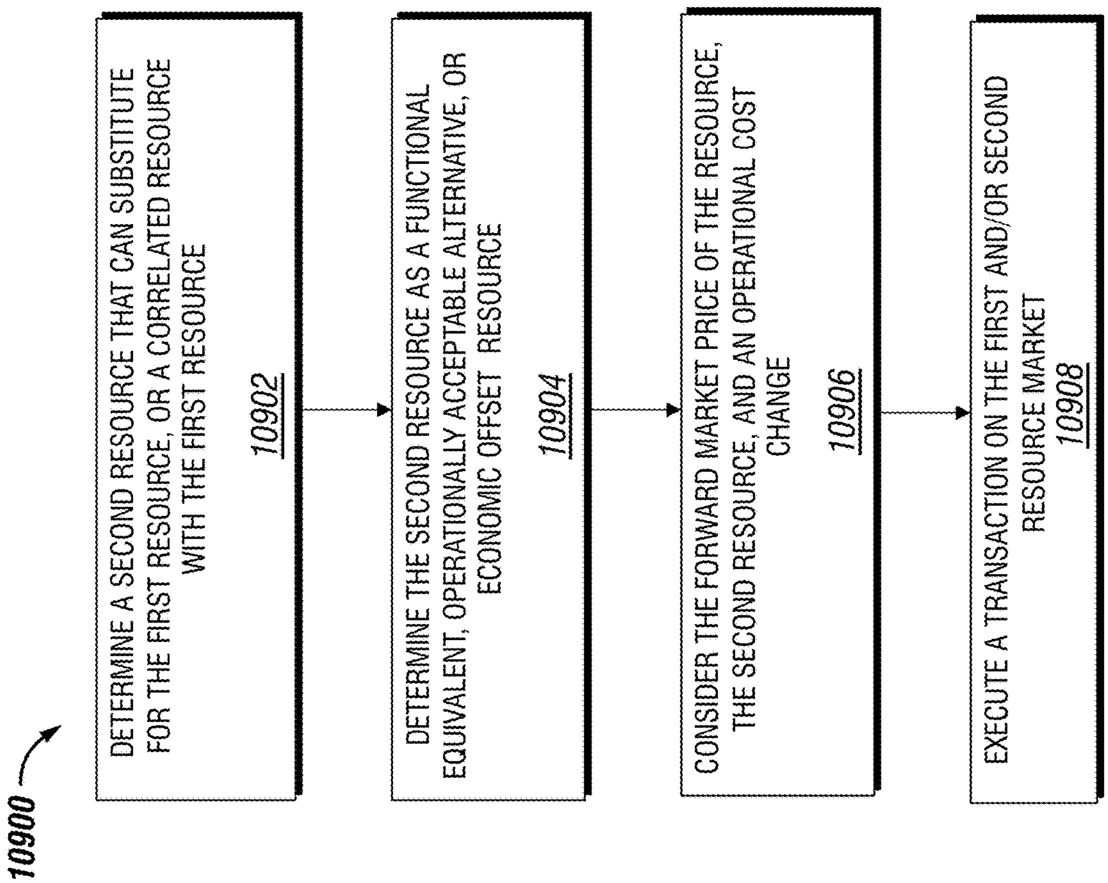
FIG. 109 is a schematic flow diagram of a method for improving resource delivery with a substitute resource.

Referencing FIG. 109, an example procedure 10900 includes an operation 10902 to determine a second resource that can substitute for a first resource, and/or that is correlated with the first resource and further includes an operation 10904 that determines that the second resource is a functionally equivalent, operationally acceptable alternative to the first resource or determines the second resource as an economic offset resource. Without limitation to any other aspect of the present disclosure, a correlated resource includes any resource that is expected to make a correlated price move (e.g., either with the first resource or opposite the first resource), and/or any resource that is expected to have correlated availability for purchase with the first resource (e.g., either availability that moves with the first resource or opposite the first resource). The example procedure 10900 further includes an operation 10906 to consider (e.g., to predict and/or adaptively predict using a machine learning, AI, or neural network component) a forward market price of the first resource and/or the second resource, and an operation 10908 to execute a transaction on a market (e.g., a spot market and/or a forward market) of the first resource and/or the second resource.

In embodiments, provided herein is a transaction-enabling system having a machine with a regenerative energy facility that optimizes allocation of delivery of energy produced among compute tasks, networking tasks and energy consumption tasks. In embodiments, provided herein is a transaction-enabling system having a machine with a regenerative energy facility that optimizes allocation of delivery of energy produced among compute tasks, networking tasks and energy consumption tasks and having a machine that automatically purchases its energy in a forward market for energy. In embodiments, provided herein is a transaction-enabling system having a machine with a regenerative energy facility that optimizes allocation of delivery of energy produced among compute tasks, networking tasks and energy consumption tasks and having a machine that automatically purchases energy credits in a forward market. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate purchasing in a forward market for energy. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate purchasing energy credits in a forward market. In embodiments, provided herein is a transaction-enabling system having a machine with a regenerative energy facility that optimizes allocation of delivery of energy produced among compute tasks, networking tasks and energy consumption tasks and having a machine that automatically purchases spectrum allocation in a forward market for network spectrum. In embodiments, provided herein is a transaction-enabling system having a machine with a regenerative energy facility that optimizes allocation of delivery of energy produced among compute tasks, networking tasks and energy consumption tasks and having a machine that automatically sells its compute capacity on a forward market for compute capacity. In embodiments, provided herein is a transaction-enabling system having a machine with a regenerative energy facility that optimizes allocation of delivery of energy produced among compute tasks, networking tasks and energy consumption tasks and having a machine that automatically sells its compute storage capacity on a forward market for storage capacity. In embodiments, provided herein is a transaction-enabling system having a machine with a regenerative energy facility that optimizes allocation of delivery of energy produced among compute tasks, networking tasks and energy consumption tasks and having a machine that automatically sells its energy storage capacity on a forward market for energy storage capacity. In embodiments, provided herein is a transaction-enabling system having a machine with a regenerative energy facility that optimizes allocation of delivery of energy produced among compute tasks, networking tasks and energy consumption tasks and having a machine that automatically sells its network bandwidth on a forward market for network capacity. In embodiments, provided herein is a transaction-enabling system having a machine with a regenerative energy facility that optimizes allocation of delivery of energy produced among compute tasks, networking tasks and energy consumption tasks and having a fleet of machines that automatically purchase spectrum allocation in a forward market for network spectrum. In embodiments, provided herein is a transaction-enabling system having a machine with a regenerative energy facility that optimizes allocation of delivery of energy produced among compute tasks, networking tasks and energy consumption tasks and having a fleet of machines that automatically optimize energy utilization for compute task allocation. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate data on collective optimization of forward market purchases of energy. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate data on collective optimization of forward market purchases of energy credits. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate data on collective optimization of forward market purchases of network spectrum. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate data on collective optimization of forward market sales of compute capacity. In embodiments, provided herein is a transaction-enabling system having a machine with a regenerative energy facility that optimizes allocation of delivery of energy produced among compute tasks, networking tasks and energy consumption tasks and having a machine that automatically purchases its energy in a spot market for energy. In embodiments, provided herein is a transaction-enabling system having a machine with a regenerative energy facility that optimizes allocation of delivery of energy produced among compute tasks, networking tasks and energy consumption tasks and having a machine that automatically purchases energy credits in a spot market. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate purchasing in a spot market for energy. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate purchasing energy credits in a spot market. In embodiments, provided herein is a transaction-enabling system having a machine with a regenerative energy facility that optimizes allocation of delivery of energy produced among compute tasks, networking tasks and energy consumption tasks and having a machine that automatically purchases spectrum allocation in a spot market for network spectrum. In embodiments, provided herein is a transaction-enabling system having a machine with a regenerative energy facility that optimizes allocation of delivery of energy produced among compute tasks, networking tasks and energy consumption tasks and having a fleet of machines that automatically purchase spectrum allocation in a spot market for network spectrum. In embodiments, provided herein is a transaction-enabling system having a machine with a regenerative energy facility that optimizes allocation of delivery of energy produced among compute tasks, networking tasks and energy consumption tasks and having a fleet of machines that automatically optimize energy utilization for compute task allocation. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate data on collective optimization of spot market purchases of energy. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate data on collective optimization of spot market purchases of energy credits. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate data on collective optimization of spot market purchases of network spectrum. In embodiments, provided herein is a transaction-enabling system having a machine with a regenerative energy facility that optimizes allocation of delivery of energy produced among compute tasks, networking tasks and energy consumption tasks and having a fleet of machines that automatically sell their aggregate compute capacity on a forward market for compute capacity. In embodiments, provided herein is a transaction-enabling system having a machine with a regenerative energy facility that optimizes allocation of delivery of energy produced among compute tasks, networking tasks and energy consumption tasks and having a fleet of machines that automatically sell their aggregate compute storage capacity on a forward market for storage capacity. In embodiments, provided herein is a transaction-enabling system having a machine with a regenerative energy facility that optimizes allocation of delivery of energy produced among compute tasks, networking tasks and energy consumption tasks and having a fleet of machines that automatically sell their aggregate energy storage capacity on a forward market for energy storage capacity. In embodiments, provided herein is a transaction-enabling system having a machine with a regenerative energy facility that optimizes allocation of delivery of energy produced among compute tasks, networking tasks and energy consumption tasks and having a fleet of machines that automatically sell their aggregate network bandwidth on a forward market for network capacity. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of energy prices based on information collected from social media data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of network spectrum based on information collected from social media data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of energy credits based on information collected from social media data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market value of compute capability based on information collected from social media data sources. In embodiments, provided herein is a transaction-enabling system having a machine with a regenerative energy facility that optimizes allocation of delivery of energy produced among compute tasks, networking tasks and energy consumption tasks and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine with a regenerative energy facility that optimizes allocation of delivery of energy produced among compute tasks, networking tasks and energy consumption tasks and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine with a regenerative energy facility that optimizes allocation of delivery of energy produced among compute tasks, networking tasks and energy consumption tasks and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine with a regenerative energy facility that optimizes allocation of delivery of energy produced among compute tasks, networking tasks and energy consumption tasks and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine with a regenerative energy facility that optimizes allocation of delivery of energy produced among compute tasks, networking tasks and energy consumption tasks and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine with a regenerative energy facility that optimizes allocation of delivery of energy produced among compute tasks, networking tasks and energy consumption tasks and having a machine that automatically allocates its energy capacity among a core task, a compute task, an energy storage task, a data storage task, and a networking task. In embodiments, provided herein is a transaction-enabling system having a machine with a regenerative energy facility that optimizes allocation of delivery of energy produced among compute tasks, networking tasks and energy consumption tasks and having a machine that automatically allocates its compute capacity among a core task, a compute task, an energy storage task, a data storage task, and a networking task. In embodiments, provided herein is a transaction-enabling system having a machine with a regenerative energy facility that optimizes allocation of delivery of energy produced among compute tasks, networking tasks and energy consumption tasks and having a machine that automatically allocates its networking capacity among a core task, a compute task, an energy storage task, a data storage task, and a networking task. In embodiments, provided herein is a transaction-enabling system having a machine with a regenerative energy facility that optimizes allocation of delivery of energy produced among compute tasks, networking tasks and energy consumption tasks and having a fleet of machines that automatically allocate collective energy capacity among a core task, a compute task, an energy storage task, a data storage task, and a networking task. In embodiments, provided herein is a transaction-enabling system having a machine with a regenerative energy facility that optimizes allocation of delivery of energy produced among compute tasks, networking tasks and energy consumption tasks and having a fleet of machines that automatically allocate collective compute capacity among a core task, a compute task, an energy storage task, a data storage task, and a networking task. In embodiments, provided herein is a transaction-enabling system having a machine with a regenerative energy facility that optimizes allocation of delivery of energy produced among compute tasks, networking tasks and energy consumption tasks and having a fleet of machines that automatically allocate collective networking capacity among a core task, a compute task, an energy storage task, a data storage task, and a networking task. In embodiments, provided herein is a transaction-enabling system having a machine with a regenerative energy facility that optimizes allocation of delivery of energy produced among compute tasks, networking tasks and energy consumption tasks and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine with a regenerative energy facility that optimizes allocation of delivery of energy produced among compute tasks, networking tasks and energy consumption tasks and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine with a regenerative energy facility that optimizes allocation of delivery of energy produced among compute tasks, networking tasks and energy consumption tasks and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine with a regenerative energy facility that optimizes allocation of delivery of energy produced among compute tasks, networking tasks and energy consumption tasks and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine with a regenerative energy facility that optimizes allocation of delivery of energy produced among compute tasks, networking tasks and energy consumption tasks and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine with a regenerative energy facility that optimizes allocation of delivery of energy produced among compute tasks, networking tasks and energy consumption tasks and having a distributed ledger that tokenizes an instruction set, such that operation on the distributed ledger provides provable access to the instruction set. In embodiments, provided herein is a transaction-enabling system having a machine with a regenerative energy facility that optimizes allocation of delivery of energy produced among compute tasks, networking tasks and energy consumption tasks and having a distributed ledger that tokenizes executable algorithmic logic, such that operation on the distributed ledger provides provable access to the executable algorithmic logic. In embodiments, provided herein is a transaction-enabling system having a machine with a regenerative energy facility that optimizes allocation of delivery of energy produced among compute tasks, networking tasks and energy consumption tasks and having a distributed ledger that tokenizes a 3D printer instruction set, such that operation on the distributed ledger provides provable access to the instruction set. In embodiments, provided herein is a transaction-enabling system having a machine with a regenerative energy facility that optimizes allocation of delivery of energy produced among compute tasks, networking tasks and energy consumption tasks and having a distributed ledger that tokenizes an instruction set for a coating process, such that operation on the distributed ledger provides provable access to the instruction set. In embodiments, provided herein is a transaction-enabling system having a machine with a regenerative energy facility that optimizes allocation of delivery of energy produced among compute tasks, networking tasks and energy consumption tasks and having a distributed ledger that tokenizes an instruction set for a semiconductor fabrication process, such that operation on the distributed ledger provides provable access to the fabrication process. In embodiments, provided herein is a transaction-enabling system having a machine with a regenerative energy facility that optimizes allocation of delivery of energy produced among compute tasks, networking tasks and energy consumption tasks and having a distributed ledger that tokenizes a firmware program, such that operation on the distributed ledger provides provable access to the firmware program. In embodiments, provided herein is a transaction-enabling system having a machine with a regenerative energy facility that optimizes allocation of delivery of energy produced among compute tasks, networking tasks and energy consumption tasks and having a distributed ledger that tokenizes an instruction set for an FPGA, such that operation on the distributed ledger provides provable access to the FPGA. In embodiments, provided herein is a transaction-enabling system having a machine with a regenerative energy facility that optimizes allocation of delivery of energy produced among compute tasks, networking tasks and energy consumption tasks and having a distributed ledger that tokenizes serverless code logic, such that operation on the distributed ledger provides provable access to the serverless code logic. In embodiments, provided herein is a transaction-enabling system having a machine with a regenerative energy facility that optimizes allocation of delivery of energy produced among compute tasks, networking tasks and energy consumption tasks and having a distributed ledger that tokenizes an instruction set for a crystal fabrication system, such that operation on the distributed ledger provides provable access to the instruction set. In embodiments, provided herein is a transaction-enabling system having a machine with a regenerative energy facility that optimizes allocation of delivery of energy produced among compute tasks, networking tasks and energy consumption tasks and having a distributed ledger that tokenizes an instruction set for a food preparation process, such that operation on the distributed ledger provides provable access to the instruction set. In embodiments, provided herein is a transaction-enabling system having a machine with a regenerative energy facility that optimizes allocation of delivery of energy produced among compute tasks, networking tasks and energy consumption tasks and having a distributed ledger that tokenizes an instruction set for a polymer production process, such that operation on the distributed ledger provides provable access to the instruction set. In embodiments, provided herein is a transaction-enabling system having a machine with a regenerative energy facility that optimizes allocation of delivery of energy produced among compute tasks, networking tasks and energy consumption tasks and having a distributed ledger that tokenizes an instruction set for chemical synthesis process, such that operation on the distributed ledger provides provable access to the instruction set. In embodiments, provided herein is a transaction-enabling system having a machine with a regenerative energy facility that optimizes allocation of delivery of energy produced among compute tasks, networking tasks and energy consumption tasks and having a distributed ledger that tokenizes an instruction set for a biological production process, such that operation on the distributed ledger provides provable access to the instruction set. In embodiments, provided herein is a transaction-enabling system having a machine with a regenerative energy facility that optimizes allocation of delivery of energy produced among compute tasks, networking tasks and energy consumption tasks and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine with a regenerative energy facility that optimizes allocation of delivery of energy produced among compute tasks, networking tasks and energy consumption tasks and having a distributed ledger that aggregates views of a trade secret into a chain that proves which and how many parties have viewed the trade secret. In embodiments, provided herein is a transaction-enabling system having a machine with a regenerative energy facility that optimizes allocation of delivery of energy produced among compute tasks, networking tasks and energy consumption tasks and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine with a regenerative energy facility that optimizes allocation of delivery of energy produced among compute tasks, networking tasks and energy consumption tasks and having a distributed ledger that tokenizes an item of intellectual property and a reporting system that reports an analytic result based on the operations performed on the distributed ledger or the intellectual property. In embodiments, provided herein is a transaction-enabling system having a machine with a regenerative energy facility that optimizes allocation of delivery of energy produced among compute tasks, networking tasks and energy consumption tasks and having a distributed ledger that aggregates a set of instructions, where an operation on the distributed ledger adds at least one instruction to a pre-existing set of instructions to provide a modified set of instructions. In embodiments, provided herein is a transaction-enabling system having a machine with a regenerative energy facility that optimizes allocation of delivery of energy produced among compute tasks, networking tasks and energy consumption tasks and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine with a regenerative energy facility that optimizes allocation of delivery of energy produced among compute tasks, networking tasks and energy consumption tasks and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine with a regenerative energy facility that optimizes allocation of delivery of energy produced among compute tasks, networking tasks and energy consumption tasks and having a self-executing cryptocurrency coin that commits a transaction upon recognizing a location-based parameter that provides favorable tax treatment. In embodiments, provided herein is a transaction-enabling system having a machine with a regenerative energy facility that optimizes allocation of delivery of energy produced among compute tasks, networking tasks and energy consumption tasks and having an expert system that uses machine learning to optimize the execution of cryptocurrency transactions based on tax status. In embodiments, provided herein is a transaction-enabling system having a machine with a regenerative energy facility that optimizes allocation of delivery of energy produced among compute tasks, networking tasks and energy consumption tasks and having an expert system that aggregates regulatory information covering cryptocurrency transactions and automatically selects a jurisdiction for an operation based on the regulatory information. In embodiments, provided herein is a transaction-enabling system having a machine with a regenerative energy facility that optimizes allocation of delivery of energy produced among compute tasks, networking tasks and energy consumption tasks and having an expert system that uses machine learning to optimize the execution of a cryptocurrency transaction based on real time energy price information for an available energy source. In embodiments, provided herein is a transaction-enabling system having a machine with a regenerative energy facility that optimizes allocation of delivery of energy produced among compute tasks, networking tasks and energy consumption tasks and having an expert system that uses machine learning to optimize the execution of a cryptocurrency transaction based on an understanding of available energy sources to power computing resources to execute the transaction. In embodiments, provided herein is a transaction-enabling system having a machine with a regenerative energy facility that optimizes allocation of delivery of energy produced among compute tasks, networking tasks and energy consumption tasks and having an expert system that uses machine learning to optimize charging and recharging cycle of a rechargeable battery system to provide energy for execution of a cryptocurrency transaction. In embodiments, provided herein is a transaction-enabling system having a machine with a regenerative energy facility that optimizes allocation of delivery of energy produced among compute tasks, networking tasks and energy consumption tasks and having an expert system that predicts a forward market price in a market based on an understanding obtained by analyzing Internet of Things data sources and executes a transaction based on the forward market prediction. In embodiments, provided herein is a transaction-enabling system having a machine with a regenerative energy facility that optimizes allocation of delivery of energy produced among compute tasks, networking tasks and energy consumption tasks and having an expert system that predicts a forward market price in a market based on an understanding obtained by analyzing social network data sources and executes a transaction based on the forward market prediction. In embodiments, provided herein is a transaction-enabling system having a machine with a regenerative energy facility that optimizes allocation of delivery of energy produced among compute tasks, networking tasks and energy consumption tasks and having an expert system that predicts a forward market price in a market based on an understanding obtained by analyzing Internet of Things data sources and executes a cryptocurrency transaction based on the forward market prediction. In embodiments, provided herein is a transaction-enabling system having a machine with a regenerative energy facility that optimizes allocation of delivery of energy produced among compute tasks, networking tasks and energy consumption tasks and having an expert system that predicts a forward market price in a market based on an understanding obtained by analyzing social network data sources and executes a cryptocurrency transaction based on the forward market prediction. In embodiments, provided herein is a transaction-enabling system having a machine with a regenerative energy facility that optimizes allocation of delivery of energy produced among compute tasks, networking tasks and energy consumption tasks and having an expert system that predicts a forward market price in an energy market based on an understanding obtained by analyzing Internet of Things data sources and executes a transaction based on the forward market prediction. In embodiments, provided herein is a transaction-enabling system having a machine with a regenerative energy facility that optimizes allocation of delivery of energy produced among compute tasks, networking tasks and energy consumption tasks and having an expert system that predicts a forward market price in an energy market based on an understanding obtained by analyzing social network data sources and executes a transaction based on the forward market prediction. In embodiments, provided herein is a transaction-enabling system having a machine with a regenerative energy facility that optimizes allocation of delivery of energy produced among compute tasks, networking tasks and energy consumption tasks and having an expert system that predicts a forward market price in a market for computing resources based on an understanding obtained by analyzing Internet of Things data sources and executes a transaction based on the forward market prediction. In embodiments, provided herein is a transaction-enabling system having a machine with a regenerative energy facility that optimizes allocation of delivery of energy produced among compute tasks, networking tasks and energy consumption tasks and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine with a regenerative energy facility that optimizes allocation of delivery of energy produced among compute tasks, networking tasks and energy consumption tasks and having an expert system that predicts a forward market price in a market for computing resources based on an understanding obtained by analyzing social network data sources and executes a transaction based on the forward market prediction. In embodiments, provided herein is a transaction-enabling system having a machine with a regenerative energy facility that optimizes allocation of delivery of energy produced among compute tasks, networking tasks and energy consumption tasks and having an expert system that predicts a forward market price in a market for advertising based on an understanding obtained by analyzing Internet of Things data sources and executes a transaction based on the forward market prediction. In embodiments, provided herein is a transaction-enabling system having a machine with a regenerative energy facility that optimizes allocation of delivery of energy produced among compute tasks, networking tasks and energy consumption tasks and having an expert system that predicts a forward market price in a market for advertising based on an understanding obtained by analyzing social network data sources and executes a transaction based on the forward market prediction. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of energy prices based on information collected from automated agent behavioral data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of network spectrum based on information collected from automated agent behavioral data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of energy credits based on information collected from automated agent behavioral data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market value of compute capability based on information collected from automated agent behavioral data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of energy prices based on information collected from business entity behavioral data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of network spectrum based on information collected from business entity behavioral data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of energy credits based on information collected from business entity behavioral data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market value of compute capability based on information collected from business entity behavioral data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of energy prices based on information collected from human behavioral data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of network spectrum based on information collected from human behavioral data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market pricing of energy credits based on information collected from human behavioral data sources. In embodiments, provided herein is a transaction-enabling system having a machine with a regenerative energy facility that optimizes allocation of delivery of energy produced among compute tasks, networking tasks and energy consumption tasks and having a machine that automatically forecasts forward market value of compute capability based on information collected from human behavioral data sources. In embodiments, provided herein is a transaction-enabling system having a machine with a regenerative energy facility that optimizes allocation of delivery of energy produced among compute tasks, networking tasks and energy consumption tasks and having an expert system that predicts a forward market price in a market for spectrum or network bandwidth based on an understanding obtained by analyzing social data sources and executes a transaction based on the forward market prediction. In embodiments, provided herein is a transaction-enabling system having a machine with a regenerative energy facility that optimizes allocation of delivery of energy produced among compute tasks, networking tasks and energy consumption tasks and having an intelligent agent that is configured to solicit the attention resources of another external intelligent agent. In embodiments, provided herein is a transaction-enabling system having a machine with a regenerative energy facility that optimizes allocation of delivery of energy produced among compute tasks, networking tasks and energy consumption tasks and having a machine that automatically purchases attention resources in a forward market for attention. In embodiments, provided herein is a transaction-enabling system having a machine with a regenerative energy facility that optimizes allocation of delivery of energy produced among compute tasks, networking tasks and energy consumption tasks and having a fleet of machines that automatically aggregate purchasing in a forward market for attention. In embodiments, provided herein is a transaction-enabling system having a machine with a regenerative energy facility that optimizes allocation of delivery of energy produced among compute tasks, networking tasks and energy consumption tasks and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine with a regenerative energy facility that optimizes allocation of delivery of energy produced among compute tasks, networking tasks and energy consumption tasks and having a system for learning on a training set of facility outcomes, facility parameters, and data collected from data sources to train an artificial intelligence/machine learning system to predict a facility production outcome. In embodiments, provided herein is a transaction-enabling system having a machine with a regenerative energy facility that optimizes allocation of delivery of energy produced among compute tasks, networking tasks and energy consumption tasks and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine with a regenerative energy facility that optimizes allocation of delivery of energy produced among compute tasks, networking tasks and energy consumption tasks and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine with a regenerative energy facility that optimizes allocation of delivery of energy produced among compute tasks, networking tasks and energy consumption tasks and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine with a regenerative energy facility that optimizes allocation of delivery of energy produced among compute tasks, networking tasks and energy consumption tasks and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine with a regenerative energy facility that optimizes allocation of delivery of energy produced among compute tasks, networking tasks and energy consumption tasks and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine with a regenerative energy facility that optimizes allocation of delivery of energy produced among compute tasks, networking tasks and energy consumption tasks and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine with a regenerative energy facility that optimizes allocation of delivery of energy produced among compute tasks, networking tasks and energy consumption tasks and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine with a regenerative energy facility that optimizes allocation of delivery of energy produced among compute tasks, networking tasks and energy consumption tasks and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine with a regenerative energy facility that optimizes allocation of delivery of energy produced among compute tasks, networking tasks and energy consumption tasks and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine with a regenerative energy facility that optimizes allocation of delivery of energy produced among compute tasks, networking tasks and energy consumption tasks and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine with a regenerative energy facility that optimizes allocation of delivery of energy produced among compute tasks, networking tasks and energy consumption tasks and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine with a regenerative energy facility that optimizes allocation of delivery of energy produced among compute tasks, networking tasks and energy consumption tasks and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically purchases its energy in a forward market for energy. In embodiments, provided herein is a transaction-enabling system having a machine that automatically purchases its energy in a forward market for energy and having a machine that automatically purchases energy credits in a forward market. In embodiments, provided herein is a transaction-enabling system having a machine that automatically purchases its energy in a forward market for energy and having a fleet of machines that automatically aggregate purchasing in a forward market for energy. In embodiments, provided herein is a transaction-enabling system having a machine that automatically purchases its energy in a forward market for energy and having a fleet of machines that automatically aggregate purchasing energy credits in a forward market. In embodiments, provided herein is a transaction-enabling system having a machine that automatically purchases its energy in a forward market for energy and having a machine that automatically purchases spectrum allocation in a forward market for network spectrum. In embodiments, provided herein is a transaction-enabling system having a machine that automatically purchases its energy in a forward market for energy and having a machine that automatically sells its compute capacity on a forward market for compute capacity. In embodiments, provided herein is a transaction-enabling system having a machine that automatically purchases its energy in a forward market for energy and having a machine that automatically sells its compute storage capacity on a forward market for storage capacity. In embodiments, provided herein is a transaction-enabling system having a machine that automatically purchases its energy in a forward market for energy and having a machine that automatically sells its energy storage capacity on a forward market for energy storage capacity. In embodiments, provided herein is a transaction-enabling system having a machine that automatically purchases its energy in a forward market for energy and having a machine that automatically sells its network bandwidth on a forward market for network capacity. In embodiments, provided herein is a transaction-enabling system having a machine that automatically purchases its energy in a forward market for energy and having a fleet of machines that automatically purchase spectrum allocation in a forward market for network spectrum. In embodiments, provided herein is a transaction-enabling system having a machine that automatically purchases its energy in a forward market for energy and having a fleet of machines that automatically optimize energy utilization for compute task allocation. In embodiments, provided herein is a transaction-enabling system having a machine that automatically purchases its energy in a forward market for energy and having a fleet of machines that automatically aggregate data on collective optimization of forward market purchases of energy. In embodiments, provided herein is a transaction-enabling system having a machine that automatically purchases its energy in a forward market for energy and having a fleet of machines that automatically aggregate data on collective optimization of forward market purchases of energy credits. In embodiments, provided herein is a transaction-enabling system having a machine that automatically purchases its energy in a forward market for energy and having a fleet of machines that automatically aggregate data on collective optimization of forward market purchases of network spectrum. In embodiments, provided herein is a transaction-enabling system having a machine that automatically purchases its energy in a forward market for energy and having a fleet of machines that automatically aggregate data on collective optimization of forward market sales of compute capacity. In embodiments, provided herein is a transaction-enabling system having a machine that automatically purchases its energy in a forward market for energy and having a machine that automatically purchases its energy in a spot market for energy. In embodiments, provided herein is a transaction-enabling system having a machine that automatically purchases its energy in a forward market for energy and having a machine that automatically purchases energy credits in a spot market. In embodiments, provided herein is a transaction-enabling system having a machine that automatically purchases its energy in a forward market for energy and having a fleet of machines that automatically aggregate purchasing in a spot market for energy. In embodiments, provided herein is a transaction-enabling system having a machine that automatically purchases its energy in a forward market for energy and having a fleet of machines that automatically aggregate purchasing energy credits in a spot market. In embodiments, provided herein is a transaction-enabling system having a machine that automatically purchases its energy in a forward market for energy and having a machine that automatically purchases spectrum allocation in a spot market for network spectrum. In embodiments, provided herein is a transaction-enabling system having a machine that automatically purchases its energy in a forward market for energy and having a fleet of machines that automatically purchase spectrum allocation in a spot market for network spectrum. In embodiments, provided herein is a transaction-enabling system having a machine that automatically purchases its energy in a forward market for energy and having a fleet of machines that automatically optimize energy utilization for compute task allocation. In embodiments, provided herein is a transaction-enabling system having a machine that automatically purchases its energy in a forward market for energy and having a fleet of machines that automatically aggregate data on collective optimization of spot market purchases of energy. In embodiments, provided herein is a transaction-enabling system having a machine that automatically purchases its energy in a forward market for energy and having a fleet of machines that automatically aggregate data on collective optimization of spot market purchases of energy credits. In embodiments, provided herein is a transaction-enabling system having a machine that automatically purchases its energy in a forward market for energy and having a fleet of machines that automatically aggregate data on collective optimization of spot market purchases of network spectrum. In embodiments, provided herein is a transaction-enabling system having a machine that automatically purchases its energy in a forward market for energy and having a fleet of machines that automatically sell their aggregate compute capacity on a forward market for compute capacity. In embodiments, provided herein is a transaction-enabling system having a machine that automatically purchases its energy in a forward market for energy and having a fleet of machines that automatically sell their aggregate compute storage capacity on a forward market for storage capacity. In embodiments, provided herein is a transaction-enabling system having a machine that automatically purchases its energy in a forward market for energy and having a fleet of machines that automatically sell their aggregate energy storage capacity on a forward market for energy storage capacity. In embodiments, provided herein is a transaction-enabling system having a machine that automatically purchases its energy in a forward market for energy and having a fleet of machines that automatically sell their aggregate network bandwidth on a forward market for network capacity. In embodiments, provided herein is a transaction-enabling system having a machine that automatically purchases its energy in a forward market for energy and having a machine that automatically forecasts forward market pricing of energy prices based on information collected from social media data sources. In embodiments, provided herein is a transaction-enabling system having a machine that automatically purchases its energy in a forward market for energy and having a machine that automatically forecasts forward market pricing of network spectrum based on information collected from social media data sources. In embodiments, provided herein is a transaction-enabling system having a machine that automatically purchases its energy in a forward market for energy and having a machine that automatically forecasts forward market pricing of energy credits based on information collected from social media data sources. In embodiments, provided herein is a transaction-enabling system having a machine that automatically purchases its energy in a forward market for energy and having a machine that automatically forecasts forward market value of compute capability based on information collected from social media data sources. In embodiments, provided herein is a transaction-enabling system having a machine that automatically purchases its energy in a forward market for energy and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically purchases its energy in a forward market for energy and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically purchases its energy in a forward market for energy and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically purchases its energy in a forward market for energy and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically purchases its energy in a forward market for energy and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically purchases its energy in a forward market for energy and having a machine that automatically allocates its energy capacity among a core task, a compute task, an energy storage task, a data storage task, and a networking task. In embodiments, provided herein is a transaction-enabling system having a machine that automatically purchases its energy in a forward market for energy and having a machine that automatically allocates its compute capacity among a core task, a compute task, an energy storage task, a data storage task, and a networking task. In embodiments, provided herein is a transaction-enabling system having a machine that automatically purchases its energy in a forward market for energy and having a machine that automatically allocates its networking capacity among a core task, a compute task, an energy storage task, a data storage task, and a networking task. In embodiments, provided herein is a transaction-enabling system having a machine that automatically purchases its energy in a forward market for energy and having a fleet of machines that automatically allocate collective energy capacity among a core task, a compute task, an energy storage task, a data storage task, and a networking task. In embodiments, provided herein is a transaction-enabling system having a machine that automatically purchases its energy in a forward market for energy and having a fleet of machines that automatically allocate collective compute capacity among a core task, a compute task, an energy storage task, a data storage task, and a networking task. In embodiments, provided herein is a transaction-enabling system having a machine that automatically purchases its energy in a forward market for energy and having a fleet of machines that automatically allocate collective networking capacity among a core task, a compute task, an energy storage task, a data storage task, and a networking task. In embodiments, provided herein is a transaction-enabling system having a machine that automatically purchases its energy in a forward market for energy and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically purchases its energy in a forward market for energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases its energy in a forward market for energy and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically purchases its energy in a forward market for energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases its energy in a forward market for energy and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically purchases its energy in a forward market for energy and having a distributed ledger that tokenizes an instruction set, such that operation on the distributed ledger provides provable access to the instruction set. In embodiments, provided herein is a transaction-enabling system having a machine that automatically purchases its energy in a forward market for energy and having a distributed ledger that tokenizes executable algorithmic logic, such that operation on the distributed ledger provides provable access to the executable algorithmic logic. In embodiments, provided herein is a transaction-enabling system having a machine that automatically purchases its energy in a forward market for energy and having a distributed ledger that tokenizes a 3D printer instruction set, such that operation on the distributed ledger provides provable access to the instruction set. In embodiments, provided herein is a transaction-enabling system having a machine that automatically purchases its energy in a forward market for energy and having a distributed ledger that tokenizes an instruction set for a coating process, such that operation on the distributed ledger provides provable access to the instruction set. In embodiments, provided herein is a transaction-enabling system having a machine that automatically purchases its energy in a forward market for energy and having a distributed ledger that tokenizes an instruction set for a semiconductor fabrication process, such that operation on the distributed ledger provides provable access to the fabrication process. In embodiments, provided herein is a transaction-enabling system having a machine that automatically purchases its energy in a forward market for energy and having a distributed ledger that tokenizes a firmware program, such that operation on the distributed ledger provides provable access to the firmware program. In embodiments, provided herein is a transaction-enabling system having a machine that automatically purchases its energy in a forward market for energy and having a distributed ledger that tokenizes an instruction set for an FPGA, such that operation on the distributed ledger provides provable access to the FPGA. In embodiments, provided herein is a transaction-enabling system having a machine that automatically purchases its energy in a forward market for energy and having a distributed ledger that tokenizes serverless code logic, such that operation on the distributed ledger provides provable access to the serverless code logic. In embodiments, provided herein is a transaction-enabling system having a machine that automatically purchases its energy in a forward market for energy and having a distributed ledger that tokenizes an instruction set for a crystal fabrication system, such that operation on the distributed ledger provides provable access to the instruction set. In embodiments, provided herein is a transaction-enabling system having a machine that automatically purchases its energy in a forward market for energy and having a distributed ledger that tokenizes an instruction set for a food preparation process, such that operation on the distributed ledger provides provable access to the instruction set. In embodiments, provided herein is a transaction-enabling system having a machine that automatically purchases its energy in a forward market for energy and having a distributed ledger that tokenizes an instruction set for a polymer production process, such that operation on the distributed ledger provides provable access to the instruction set. In embodiments, provided herein is a transaction-enabling system having a machine that automatically purchases its energy in a forward market for energy and having a distributed ledger that tokenizes an instruction set for chemical synthesis process, such that operation on the distributed ledger provides provable access to the instruction set. In embodiments, provided herein is a transaction-enabling system having a machine that automatically purchases its energy in a forward market for energy and having a distributed ledger that tokenizes an instruction set for a biological production process, such that operation on the distributed ledger provides provable access to the instruction set. In embodiments, provided herein is a transaction-enabling system having a machine that automatically purchases its energy in a forward market for energy and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically purchases its energy in a forward market for energy and having a distributed ledger that aggregates views of a trade secret into a chain that proves which and how many parties have viewed the trade secret. In embodiments, provided herein is a transaction-enabling system having a machine that automatically purchases its energy in a forward market for energy and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically purchases its energy in a forward market for energy and having a distributed ledger that tokenizes an item of intellectual property and a reporting system that reports an analytic result based on the operations performed on the distributed ledger or the intellectual property. In embodiments, provided herein is a transaction-enabling system having a machine that automatically purchases its energy in a forward market for energy and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically purchases its energy in a forward market for energy and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically purchases its energy in a forward market for energy and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically purchases its energy in a forward market for energy and having a self-executing cryptocurrency coin that commits a transaction upon recognizing a location-based parameter that provides favorable tax treatment. In embodiments, provided herein is a transaction-enabling system having a machine that automatically purchases its energy in a forward market for energy and having an expert system that uses machine learning to optimize the execution of cryptocurrency transactions based on tax status. In embodiments, provided herein is a transaction-enabling system having a machine that automatically purchases its energy in a forward market for energy and having an expert system that aggregates regulatory information covering cryptocurrency transactions and automatically selects a jurisdiction for an operation based on the regulatory information. In embodiments, provided herein is a transaction-enabling system having a machine that automatically purchases its energy in a forward market for energy and having an expert system that uses machine learning to optimize the execution of a cryptocurrency transaction based on real time energy price information for an available energy source. In embodiments, provided herein is a transaction-enabling system having a machine that automatically purchases its energy in a forward market for energy and having an expert system that uses machine learning to optimize the execution of a cryptocurrency transaction based on an understanding of available energy sources to power computing resources to execute the transaction. In embodiments, provided herein is a transaction-enabling system having a machine that automatically purchases its energy in a forward market for energy and having an expert system that uses machine learning to optimize charging and recharging cycle of a rechargeable battery system to provide energy for execution of a cryptocurrency transaction. In embodiments, provided herein is a transaction-enabling system having a machine that automatically purchases its energy in a forward market for energy and having an expert system that predicts a forward market price in a market based on an understanding obtained by analyzing Internet of Things data sources and executes a transaction based on the forward market prediction. In embodiments, provided herein is a transaction-enabling system having a machine that automatically purchases its energy in a forward market for energy and having an expert system that predicts a forward market price in a market based on an understanding obtained by analyzing social network data sources and executes a transaction based on the forward market prediction. In embodiments, provided herein is a transaction-enabling system having a machine that automatically purchases its energy in a forward market for energy and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically purchases its energy in a forward market for energy and having an expert system that predicts a forward market price in a market based on an understanding obtained by analyzing social network data sources and executes a cryptocurrency transaction based on the forward market prediction. In embodiments, provided herein is a transaction-enabling system having a machine that automatically purchases its energy in a forward market for energy and having an expert system that predicts a forward market price in an energy market based on an understanding obtained by analyzing Internet of Things data sources and executes a transaction based on the forward market prediction. In embodiments, provided herein is a transaction-enabling system having a machine that automatically purchases its energy in a forward market for energy and having an expert system that predicts a forward market price in an energy market based on an understanding obtained by analyzing social network data sources and executes a transaction based on the forward market prediction. In embodiments, provided herein is a transaction-enabling system having a machine that automatically purchases its energy in a forward market for energy and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically purchases its energy in a forward market for energy and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically purchases its energy in a forward market for energy and having an expert system that predicts a forward market price in a market for computing resources based on an understanding obtained by analyzing social network data sources and executes a transaction based on the forward market prediction. In embodiments, provided herein is a transaction-enabling system having a machine that automatically purchases its energy in a forward market for energy and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically purchases its energy in a forward market for energy and having an expert system that predicts a forward market price in a market for advertising based on an understanding obtained by analyzing social network data sources and executes a transaction based on the forward market prediction. In embodiments, provided herein is a transaction-enabling system having a machine that automatically purchases its energy in a forward market for energy and having a machine that automatically forecasts forward market pricing of energy prices based on information collected from automated agent behavioral data sources. In embodiments, provided herein is a transaction-enabling system having a machine that automatically purchases its energy in a forward market for energy and having a machine that automatically forecasts forward market pricing of network spectrum based on information collected from automated agent behavioral data sources. In embodiments, provided herein is a transaction-enabling system having a machine that automatically purchases its energy in a forward market for energy and having a machine that automatically forecasts forward market pricing of energy credits based on information collected from automated agent behavioral data sources. In embodiments, provided herein is a transaction-enabling system having a machine that automatically purchases its energy in a forward market for energy and having a machine that automatically forecasts forward market value of compute capability based on information collected from automated agent behavioral data sources. In embodiments, provided herein is a transaction-enabling system having a machine that automatically purchases its energy in a forward market for energy and having a machine that automatically forecasts forward market pricing of energy prices based on information collected from business entity behavioral data sources. In embodiments, provided herein is a transaction-enabling system having a machine that automatically purchases its energy in a forward market for energy and having a machine that automatically forecasts forward market pricing of network spectrum based on information collected from business entity behavioral data sources. In embodiments, provided herein is a transaction-enabling system having a machine that automatically purchases its energy in a forward market for energy and having a machine that automatically forecasts forward market pricing of energy credits based on information collected from business entity behavioral data sources. In embodiments, provided herein is a transaction-enabling system having a machine that automatically purchases its energy in a forward market for energy and having a machine that automatically forecasts forward market value of compute capability based on information collected from business entity behavioral data sources. In embodiments, provided herein is a transaction-enabling system having a machine that automatically purchases its energy in a forward market for energy and having a machine that automatically forecasts forward market pricing of energy prices based on information collected from human behavioral data sources. In embodiments, provided herein is a transaction-enabling system having a machine that automatically purchases its energy in a forward market for energy and having a machine that automatically forecasts forward market pricing of network spectrum based on information collected from human behavioral data sources. In embodiments, provided herein is a transaction-enabling system having a machine that automatically purchases its energy in a forward market for energy and having a machine that automatically forecasts forward market pricing of energy credits based on information collected from human behavioral data sources. In embodiments, provided herein is a transaction-enabling system having a machine that automatically purchases its energy in a forward market for energy and having a machine that automatically forecasts forward market value of compute capability based on information collected from human behavioral data sources. In embodiments, provided herein is a transaction-enabling system having a machine that automatically purchases its energy in a forward market for energy and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically purchases its energy in a forward market for energy and having an intelligent agent that is configured to solicit the attention resources of another external intelligent agent. In embodiments, provided herein is a transaction-enabling system having a machine that automatically purchases its energy in a forward market for energy and having a machine that automatically purchases attention resources in a forward market for attention. In embodiments, provided herein is a transaction-enabling system having a machine that automatically purchases its energy in a forward market for energy and having a fleet of machines that automatically aggregate purchasing in a forward market for attention. In embodiments, provided herein is a transaction-enabling system having a machine that automatically purchases its energy in a forward market for energy and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically purchases its energy in a forward market for energy and having a system for learning on a training set of facility outcomes, facility parameters, and data collected from data sources to train an artificial intelligence/machine learning system to predict a facility production outcome. In embodiments, provided herein is a transaction-enabling system having a machine that automatically purchases its energy in a forward market for energy and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically purchases its energy in a forward market for energy and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically purchases its energy in a forward market for energy and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically purchases its energy in a forward market for energy and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically purchases its energy in a forward market for energy and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically purchases its energy in a forward market for energy and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically purchases its energy in a forward market for energy and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically purchases its energy in a forward market for energy and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically purchases its energy in a forward market for energy and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically purchases its energy in a forward market for energy and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically purchases its energy in a forward market for energy and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically purchases its energy in a forward market for energy and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically purchases energy credits in a forward market. In embodiments, provided herein is a transaction-enabling system having a machine that automatically purchases energy credits in a forward market and having a fleet of machines that automatically aggregate purchasing in a forward market for energy. In embodiments, provided herein is a transaction-enabling system having a machine that automatically purchases energy credits in a forward market and having a fleet of machines that automatically aggregate purchasing energy credits in a forward market. In embodiments, provided herein is a transaction-enabling system having a machine that automatically purchases energy credits in a forward market and having a machine that automatically purchases spectrum allocation in a forward market for network spectrum. In embodiments, provided herein is a transaction-enabling system having a machine that automatically purchases energy credits in a forward market and having a machine that automatically sells its compute capacity on a forward market for compute capacity. In embodiments, provided herein is a transaction-enabling system having a machine that automatically purchases energy credits in a forward market and having a machine that automatically sells its compute storage capacity on a forward market for storage capacity. In embodiments, provided herein is a transaction-enabling system having a machine that automatically purchases energy credits in a forward market and having a machine that automatically sells its energy storage capacity on a forward market for energy storage capacity. In embodiments, provided herein is a transaction-enabling system having a machine that automatically purchases energy credits in a forward market and having a machine that automatically sells its network bandwidth on a forward market for network capacity. In embodiments, provided herein is a transaction-enabling system having a machine that automatically purchases energy credits in a forward market and having a fleet of machines that automatically purchase spectrum allocation in a forward market for network spectrum. In embodiments, provided herein is a transaction-enabling system having a machine that automatically purchases energy credits in a forward market and having a fleet of machines that automatically optimize energy utilization for compute task allocation. In embodiments, provided herein is a transaction-enabling system having a machine that automatically purchases energy credits in a forward market and having a fleet of machines that automatically aggregate data on collective optimization of forward market purchases of energy. In embodiments, provided herein is a transaction-enabling system having a machine that automatically purchases energy credits in a forward market and having a fleet of machines that automatically aggregate data on collective optimization of forward market purchases of energy credits. In embodiments, provided herein is a transaction-enabling system having a machine that automatically purchases energy credits in a forward market and having a fleet of machines that automatically aggregate data on collective optimization of forward market purchases of network spectrum. In embodiments, provided herein is a transaction-enabling system having a machine that automatically purchases energy credits in a forward market and having a fleet of machines that automatically aggregate data on collective optimization of forward market sales of compute capacity. In embodiments, provided herein is a transaction-enabling system having a machine that automatically purchases energy credits in a forward market and having a machine that automatically purchases its energy in a spot market for energy. In embodiments, provided herein is a transaction-enabling system having a machine that automatically purchases energy credits in a forward market and having a machine that automatically purchases energy credits in a spot market. In embodiments, provided herein is a transaction-enabling system having a machine that automatically purchases energy credits in a forward market and having a fleet of machines that automatically aggregate purchasing in a spot market for energy. In embodiments, provided herein is a transaction-enabling system having a machine that automatically purchases energy credits in a forward market and having a fleet of machines that automatically aggregate purchasing energy credits in a spot market. In embodiments, provided herein is a transaction-enabling system having a machine that automatically purchases energy credits in a forward market and having a machine that automatically purchases spectrum allocation in a spot market for network spectrum. In embodiments, provided herein is a transaction-enabling system having a machine that automatically purchases energy credits in a forward market and having a fleet of machines that automatically purchase spectrum allocation in a spot market for network spectrum. In embodiments, provided herein is a transaction-enabling system having a machine that automatically purchases energy credits in a forward market and having a fleet of machines that automatically optimize energy utilization for compute task allocation. In embodiments, provided herein is a transaction-enabling system having a machine that automatically purchases energy credits in a forward market and having a fleet of machines that automatically aggregate data on collective optimization of spot market purchases of energy. In embodiments, provided herein is a transaction-enabling system having a machine that automatically purchases energy credits in a forward market and having a fleet of machines that automatically aggregate data on collective optimization of spot market purchases of energy credits. In embodiments, provided herein is a transaction-enabling system having a machine that automatically purchases energy credits in a forward market and having a fleet of machines that automatically aggregate data on collective optimization of spot market purchases of network spectrum. In embodiments, provided herein is a transaction-enabling system having a machine that automatically purchases energy credits in a forward market and having a fleet of machines that automatically sell their aggregate compute capacity on a forward market for compute capacity. In embodiments, provided herein is a transaction-enabling system having a machine that automatically purchases energy credits in a forward market and having a fleet of machines that automatically sell their aggregate compute storage capacity on a forward market for storage capacity. In embodiments, provided herein is a transaction-enabling system having a machine that automatically purchases energy credits in a forward market and having a fleet of machines that automatically sell their aggregate energy storage capacity on a forward market for energy storage capacity. In embodiments, provided herein is a transaction-enabling system having a machine that automatically purchases energy credits in a forward market and having a fleet of machines that automatically sell their aggregate network bandwidth on a forward market for network capacity. In embodiments, provided herein is a transaction-enabling system having a machine that automatically purchases energy credits in a forward market and having a machine that automatically forecasts forward market pricing of energy prices based on information collected from social media data sources. In embodiments, provided herein is a transaction-enabling system having a machine that automatically purchases energy credits in a forward market and having a machine that automatically forecasts forward market pricing of network spectrum based on information collected from social media data sources. In embodiments, provided herein is a transaction-enabling system having a machine that automatically purchases energy credits in a forward market and having a machine that automatically forecasts forward market pricing of energy credits based on information collected from social media data sources. In embodiments, provided herein is a transaction-enabling system having a machine that automatically purchases energy credits in a forward market and having a machine that automatically forecasts forward market value of compute capability based on information collected from social media data sources. In embodiments, provided herein is a transaction-enabling system having a machine that automatically purchases energy credits in a forward market and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically purchases energy credits in a forward market and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically purchases energy credits in a forward market and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically purchases energy credits in a forward market and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically purchases energy credits in a forward market and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically purchases energy credits in a forward market and having a machine that automatically allocates its energy capacity among a core task, a compute task, an energy storage task, a data storage task, and a networking task. In embodiments, provided herein is a transaction-enabling system having a machine that automatically purchases energy credits in a forward market and having a machine that automatically allocates its compute capacity among a core task, a compute task, an energy storage task, a data storage task, and a networking task. In embodiments, provided herein is a transaction-enabling system having a machine that automatically purchases energy credits in a forward market and having a machine that automatically allocates its networking capacity among a core task, a compute task, an energy storage task, a data storage task, and a networking task. In embodiments, provided herein is a transaction-enabling system having a machine that automatically purchases energy credits in a forward market and having a fleet of machines that automatically allocate collective energy capacity among a core task, a compute task, an energy storage task, a data storage task, and a networking task. In embodiments, provided herein is a transaction-enabling system having a machine that automatically purchases energy credits in a forward market and having a fleet of machines that automatically allocate collective compute capacity among a core task, a compute task, an energy storage task, a data storage task, and a networking task. In embodiments, provided herein is a transaction-enabling system having a machine that automatically purchases energy credits in a forward market and having a fleet of machines that automatically allocate collective networking capacity among a core task, a compute task, an energy storage task, a data storage task, and a networking task. In embodiments, provided herein is a transaction-enabling system having a machine that automatically purchases energy credits in a forward market and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically purchases energy credits in a forward market and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases energy credits in a forward market and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically purchases energy credits in a forward market and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases energy credits in a forward market and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically purchases energy credits in a forward market and having a distributed ledger that tokenizes an instruction set, such that operation on the distributed ledger provides provable access to the instruction set. In embodiments, provided herein is a transaction-enabling system having a machine that automatically purchases energy credits in a forward market and having a distributed ledger that tokenizes executable algorithmic logic, such that operation on the distributed ledger provides provable access to the executable algorithmic logic. In embodiments, provided herein is a transaction-enabling system having a machine that automatically purchases energy credits in a forward market and having a distributed ledger that tokenizes a 3D printer instruction set, such that operation on the distributed ledger provides provable access to the instruction set. In embodiments, provided herein is a transaction-enabling system having a machine that automatically purchases energy credits in a forward market and having a distributed ledger that tokenizes an instruction set for a coating process, such that operation on the distributed ledger provides provable access to the instruction set. In embodiments, provided herein is a transaction-enabling system having a machine that automatically purchases energy credits in a forward market and having a distributed ledger that tokenizes an instruction set for a semiconductor fabrication process, such that operation on the distributed ledger provides provable access to the fabrication process. In embodiments, provided herein is a transaction-enabling system having a machine that automatically purchases energy credits in a forward market and having a distributed ledger that tokenizes a firmware program, such that operation on the distributed ledger provides provable access to the firmware program. In embodiments, provided herein is a transaction-enabling system having a machine that automatically purchases energy credits in a forward market and having a distributed ledger that tokenizes an instruction set for an FPGA, such that operation on the distributed ledger provides provable access to the FPGA. In embodiments, provided herein is a transaction-enabling system having a machine that automatically purchases energy credits in a forward market and having a distributed ledger that tokenizes serverless code logic, such that operation on the distributed ledger provides provable access to the serverless code logic. In embodiments, provided herein is a transaction-enabling system having a machine that automatically purchases energy credits in a forward market and having a distributed ledger that tokenizes an instruction set for a crystal fabrication system, such that operation on the distributed ledger provides provable access to the instruction set. In embodiments, provided herein is a transaction-enabling system having a machine that automatically purchases energy credits in a forward market and having a distributed ledger that tokenizes an instruction set for a food preparation process, such that operation on the distributed ledger provides provable access to the instruction set. In embodiments, provided herein is a transaction-enabling system having a machine that automatically purchases energy credits in a forward market and having a distributed ledger that tokenizes an instruction set for a polymer production process, such that operation on the distributed ledger provides provable access to the instruction set. In embodiments, provided herein is a transaction-enabling system having a machine that automatically purchases energy credits in a forward market and having a distributed ledger that tokenizes an instruction set for chemical synthesis process, such that operation on the distributed ledger provides provable access to the instruction set. In embodiments, provided herein is a transaction-enabling system having a machine that automatically purchases energy credits in a forward market and having a distributed ledger that tokenizes an instruction set for a biological production process, such that operation on the distributed ledger provides provable access to the instruction set. In embodiments, provided herein is a transaction-enabling system having a machine that automatically purchases energy credits in a forward market and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically purchases energy credits in a forward market and having a distributed ledger that aggregates views of a trade secret into a chain that proves which and how many parties have viewed the trade secret. In embodiments, provided herein is a transaction-enabling system having a machine that automatically purchases energy credits in a forward market and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically purchases energy credits in a forward market and having a distributed ledger that tokenizes an item of intellectual property and a reporting system that reports an analytic result based on the operations performed on the distributed ledger or the intellectual property. In embodiments, provided herein is a transaction-enabling system having a machine that automatically purchases energy credits in a forward market and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically purchases energy credits in a forward market and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically purchases energy credits in a forward market and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically purchases energy credits in a forward market and having a self-executing cryptocurrency coin that commits a transaction upon recognizing a location-based parameter that provides favorable tax treatment. In embodiments, provided herein is a transaction-enabling system having a machine that automatically purchases energy credits in a forward market and having an expert system that uses machine learning to optimize the execution of cryptocurrency transactions based on tax status. In embodiments, provided herein is a transaction-enabling system having a machine that automatically purchases energy credits in a forward market and having an expert system that aggregates regulatory information covering cryptocurrency transactions and automatically selects a jurisdiction for an operation based on the regulatory information. In embodiments, provided herein is a transaction-enabling system having a machine that automatically purchases energy credits in a forward market and having an expert system that uses machine learning to optimize the execution of a cryptocurrency transaction based on real time energy price information for an available energy source. In embodiments, provided herein is a transaction-enabling system having a machine that automatically purchases energy credits in a forward market and having an expert system that uses machine learning to optimize the execution of a cryptocurrency transaction based on an understanding of available energy sources to power computing resources to execute the transaction. In embodiments, provided herein is a transaction-enabling system having a machine that automatically purchases energy credits in a forward market and having an expert system that uses machine learning to optimize charging and recharging cycle of a rechargeable battery system to provide energy for execution of a cryptocurrency transaction. In embodiments, provided herein is a transaction-enabling system having a machine that automatically purchases energy credits in a forward market and having an expert system that predicts a forward market price in a market based on an understanding obtained by analyzing Internet of Things data sources and executes a transaction based on the forward market prediction. In embodiments, provided herein is a transaction-enabling system having a machine that automatically purchases energy credits in a forward market and having an expert system that predicts a forward market price in a market based on an understanding obtained by analyzing social network data sources and executes a transaction based on the forward market prediction. In embodiments, provided herein is a transaction-enabling system having a machine that automatically purchases energy credits in a forward market and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically purchases energy credits in a forward market and having an expert system that predicts a forward market price in a market based on an understanding obtained by analyzing social network data sources and executes a cryptocurrency transaction based on the forward market prediction. In embodiments, provided herein is a transaction-enabling system having a machine that automatically purchases energy credits in a forward market and having an expert system that predicts a forward market price in an energy market based on an understanding obtained by analyzing Internet of Things data sources and executes a transaction based on the forward market prediction. In embodiments, provided herein is a transaction-enabling system having a machine that automatically purchases energy credits in a forward market and having an expert system that predicts a forward market price in an energy market based on an understanding obtained by analyzing social network data sources and executes a transaction based on the forward market prediction. In embodiments, provided herein is a transaction-enabling system having a machine that automatically purchases energy credits in a forward market and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically purchases energy credits in a forward market and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically purchases energy credits in a forward market and having an expert system that predicts a forward market price in a market for computing resources based on an understanding obtained by analyzing social network data sources and executes a transaction based on the forward market prediction. In embodiments, provided herein is a transaction-enabling system having a machine that automatically purchases energy credits in a forward market and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically purchases energy credits in a forward market and having an expert system that predicts a forward market price in a market for advertising based on an understanding obtained by analyzing social network data sources and executes a transaction based on the forward market prediction. In embodiments, provided herein is a transaction-enabling system having a machine that automatically purchases energy credits in a forward market and having a machine that automatically forecasts forward market pricing of energy prices based on information collected from automated agent behavioral data sources. In embodiments, provided herein is a transaction-enabling system having a machine that automatically purchases energy credits in a forward market and having a machine that automatically forecasts forward market pricing of network spectrum based on information collected from automated agent behavioral data sources. In embodiments, provided herein is a transaction-enabling system having a machine that automatically purchases energy credits in a forward market and having a machine that automatically forecasts forward market pricing of energy credits based on information collected from automated agent behavioral data sources. In embodiments, provided herein is a transaction-enabling system having a machine that automatically purchases energy credits in a forward market and having a machine that automatically forecasts forward market value of compute capability based on information collected from automated agent behavioral data sources. In embodiments, provided herein is a transaction-enabling system having a machine that automatically purchases energy credits in a forward market and having a machine that automatically forecasts forward market pricing of energy prices based on information collected from business entity behavioral data sources. In embodiments, provided herein is a transaction-enabling system having a machine that automatically purchases energy credits in a forward market and having a machine that automatically forecasts forward market pricing of network spectrum based on information collected from business entity behavioral data sources. In embodiments, provided herein is a transaction-enabling system having a machine that automatically purchases energy credits in a forward market and having a machine that automatically forecasts forward market pricing of energy credits based on information collected from business entity behavioral data sources. In embodiments, provided herein is a transaction-enabling system having a machine that automatically purchases energy credits in a forward market and having a machine that automatically forecasts forward market value of compute capability based on information collected from business entity behavioral data sources. In embodiments, provided herein is a transaction-enabling system having a machine that automatically purchases energy credits in a forward market and having a machine that automatically forecasts forward market pricing of energy prices based on information collected from human behavioral data sources. In embodiments, provided herein is a transaction-enabling system having a machine that automatically purchases energy credits in a forward market and having a machine that automatically forecasts forward market pricing of network spectrum based on information collected from human behavioral data sources. In embodiments, provided herein is a transaction-enabling system having a machine that automatically purchases energy credits in a forward market and having a machine that automatically forecasts forward market pricing of energy credits based on information collected from human behavioral data sources. In embodiments, provided herein is a transaction-enabling system having a machine that automatically purchases energy credits in a forward market and having a machine that automatically forecasts forward market value of compute capability based on information collected from human behavioral data sources. In embodiments, provided herein is a transaction-enabling system having a machine that automatically purchases energy credits in a forward market and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically purchases energy credits in a forward market and having an intelligent agent that is configured to solicit the attention resources of another external intelligent agent. In embodiments, provided herein is a transaction-enabling system having a machine that automatically purchases energy credits in a forward market and having a machine that automatically purchases attention resources in a forward market for attention. In embodiments, provided herein is a transaction-enabling system having a machine that automatically purchases energy credits in a forward market and having a fleet of machines that automatically aggregate purchasing in a forward market for attention. In embodiments, provided herein is a transaction-enabling system having a machine that automatically purchases energy credits in a forward market and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically purchases energy credits in a forward market and having a system for learning on a training set of facility outcomes, facility parameters, and data collected from data sources to train an artificial intelligence/machine learning system to predict a facility production outcome. In embodiments, provided herein is a transaction-enabling system having a machine that automatically purchases energy credits in a forward market and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically purchases energy credits in a forward market and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically purchases energy credits in a forward market and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically purchases energy credits in a forward market and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically purchases energy credits in a forward market and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically purchases energy credits in a forward market and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically purchases energy credits in a forward market and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically purchases energy credits in a forward market and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically purchases energy credits in a forward market and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically purchases energy credits in a forward market and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically purchases energy credits in a forward market and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically purchases energy credits in a forward market and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate purchasing in a forward market for energy. In embodiments, provided herein is a transaction-enabling system having a fleet of machines that automatically aggregate purchasing in a forward market for energy and having a fleet of machines that automatically aggregate purchasing energy credits in a forward market. In embodiments, provided herein is a transaction-enabling system having a fleet of machines that automatically aggregate purchasing in a forward market for energy and having a machine that automatically purchases spectrum allocation in a forward market for network spectrum. In embodiments, provided herein is a transaction-enabling system having a fleet of machines that automatically aggregate purchasing in a forward market for energy and having a machine that automatically sells its compute capacity on a forward market for compute capacity. In embodiments, provided herein is a transaction-enabling system having a fleet of machines that automatically aggregate purchasing in a forward market for energy and having a machine that automatically sells its compute storage capacity on a forward market for storage capacity. In embodiments, provided herein is a transaction-enabling system having a fleet of machines that automatically aggregate purchasing in a forward market for energy and having a machine that automatically sells its energy storage capacity on a forward market for energy storage capacity. In embodiments, provided herein is a transaction-enabling system having a fleet of machines that automatically aggregate purchasing in a forward market for energy and having a machine that automatically sells its network bandwidth on a forward market for network capacity. In embodiments, provided herein is a transaction-enabling system having a fleet of machines that automatically aggregate purchasing in a forward market for energy and having a fleet of machines that automatically purchase spectrum allocation in a forward market for network spectrum. In embodiments, provided herein is a transaction-enabling system having a fleet of machines that automatically aggregate purchasing in a forward market for energy and having a fleet of machines that automatically optimize energy utilization for compute task allocation. In embodiments, provided herein is a transaction-enabling system having a fleet of machines that automatically aggregate purchasing in a forward market for energy and having a fleet of machines that automatically aggregate data on collective optimization of forward market purchases of energy. In embodiments, provided herein is a transaction-enabling system having a fleet of machines that automatically aggregate purchasing in a forward market for energy and having a fleet of machines that automatically aggregate data on collective optimization of forward market purchases of energy credits. In embodiments, provided herein is a transaction-enabling system having a fleet of machines that automatically aggregate purchasing in a forward market for energy and having a fleet of machines that automatically aggregate data on collective optimization of forward market purchases of network spectrum. In embodiments, provided herein is a transaction-enabling system having a fleet of machines that automatically aggregate purchasing in a forward market for energy and having a fleet of machines that automatically aggregate data on collective optimization of forward market sales of compute capacity. In embodiments, provided herein is a transaction-enabling system having a fleet of machines that automatically aggregate purchasing in a forward market for energy and having a machine that automatically purchases its energy in a spot market for energy. In embodiments, provided herein is a transaction-enabling system having a fleet of machines that automatically aggregate purchasing in a forward market for energy and having a machine that automatically purchases energy credits in a spot market. In embodiments, provided herein is a transaction-enabling system having a fleet of machines that automatically aggregate purchasing in a forward market for energy and having a fleet of machines that automatically aggregate purchasing in a spot market for energy. In embodiments, provided herein is a transaction-enabling system having a fleet of machines that automatically aggregate purchasing in a forward market for energy and having a fleet of machines that automatically aggregate purchasing energy credits in a spot market. In embodiments, provided herein is a transaction-enabling system having a fleet of machines that automatically aggregate purchasing in a forward market for energy and having a machine that automatically purchases spectrum allocation in a spot market for network spectrum. In embodiments, provided herein is a transaction-enabling system having a fleet of machines that automatically aggregate purchasing in a forward market for energy and having a fleet of machines that automatically purchase spectrum allocation in a spot market for network spectrum. In embodiments, provided herein is a transaction-enabling system having a fleet of machines that automatically aggregate purchasing in a forward market for energy and having a fleet of machines that automatically optimize energy utilization for compute task allocation. In embodiments, provided herein is a transaction-enabling system having a fleet of machines that automatically aggregate purchasing in a forward market for energy and having a fleet of machines that automatically aggregate data on collective optimization of spot market purchases of energy. In embodiments, provided herein is a transaction-enabling system having a fleet of machines that automatically aggregate purchasing in a forward market for energy and having a fleet of machines that automatically aggregate data on collective optimization of spot market purchases of energy credits. In embodiments, provided herein is a transaction-enabling system having a fleet of machines that automatically aggregate purchasing in a forward market for energy and having a fleet of machines that automatically aggregate data on collective optimization of spot market purchases of network spectrum. In embodiments, provided herein is a transaction-enabling system having a fleet of machines that automatically aggregate purchasing in a forward market for energy and having a fleet of machines that automatically sell their aggregate compute capacity on a forward market for compute capacity. In embodiments, provided herein is a transaction-enabling system having a fleet of machines that automatically aggregate purchasing in a forward market for energy and having a fleet of machines that automatically sell their aggregate compute storage capacity on a forward market for storage capacity. In embodiments, provided herein is a transaction-enabling system having a fleet of machines that automatically aggregate purchasing in a forward market for energy and having a fleet of machines that automatically sell their aggregate energy storage capacity on a forward market for energy storage capacity. In embodiments, provided herein is a transaction-enabling system having a fleet of machines that automatically aggregate purchasing in a forward market for energy and having a fleet of machines that automatically sell their aggregate network bandwidth on a forward market for network capacity. In embodiments, provided herein is a transaction-enabling system having a fleet of machines that automatically aggregate purchasing in a forward market for energy and having a machine that automatically forecasts forward market pricing of energy prices based on information collected from social media data sources. In embodiments, provided herein is a transaction-enabling system having a fleet of machines that automatically aggregate purchasing in a forward market for energy and having a machine that automatically forecasts forward market pricing of network spectrum based on information collected from social media data sources. In embodiments, provided herein is a transaction-enabling system having a fleet of machines that automatically aggregate purchasing in a forward market for energy and having a machine that automatically forecasts forward market pricing of energy credits based on information collected from social media data sources. In embodiments, provided herein is a transaction-enabling system having a fleet of machines that automatically aggregate purchasing in a forward market for energy and having a machine that automatically forecasts forward market value of compute capability based on information collected from social media data sources. In embodiments, provided herein is a transaction-enabling system having a fleet of machines that automatically aggregate purchasing in a forward market for energy and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically aggregate purchasing in a forward market for energy and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically aggregate purchasing in a forward market for energy and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically aggregate purchasing in a forward market for energy and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically aggregate purchasing in a forward market for energy and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically aggregate purchasing in a forward market for energy and having a machine that automatically allocates its energy capacity among a core task, a compute task, an energy storage task, a data storage task, and a networking task. In embodiments, provided herein is a transaction-enabling system having a fleet of machines that automatically aggregate purchasing in a forward market for energy and having a machine that automatically allocates its compute capacity among a core task, a compute task, an energy storage task, a data storage task, and a networking task. In embodiments, provided herein is a transaction-enabling system having a fleet of machines that automatically aggregate purchasing in a forward market for energy and having a machine that automatically allocates its networking capacity among a core task, a compute task, an energy storage task, a data storage task, and a networking task. In embodiments, provided herein is a transaction-enabling system having a fleet of machines that automatically aggregate purchasing in a forward market for energy and having a fleet of machines that automatically allocate collective energy capacity among a core task, a compute task, an energy storage task, a data storage task, and a networking task. In embodiments, provided herein is a transaction-enabling system having a fleet of machines that automatically aggregate purchasing in a forward market for energy and having a fleet of machines that automatically allocate collective compute capacity among a core task, a compute task, an energy storage task, a data storage task, and a networking task. In embodiments, provided herein is a transaction-enabling system having a fleet of machines that automatically aggregate purchasing in a forward market for energy and having a fleet of machines that automatically allocate collective networking capacity among a core task, a compute task, an energy storage task, a data storage task, and a networking task. In embodiments, provided herein is a transaction-enabling system having a fleet of machines that automatically aggregate purchasing in a forward market for energy and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically aggregate purchasing in a forward market for energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate purchasing in a forward market for energy and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically aggregate purchasing in a forward market for energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate purchasing in a forward market for energy and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically aggregate purchasing in a forward market for energy and having a distributed ledger that tokenizes an instruction set, such that operation on the distributed ledger provides provable access to the instruction set. In embodiments, provided herein is a transaction-enabling system having a fleet of machines that automatically aggregate purchasing in a forward market for energy and having a distributed ledger that tokenizes executable algorithmic logic, such that operation on the distributed ledger provides provable access to the executable algorithmic logic. In embodiments, provided herein is a transaction-enabling system having a fleet of machines that automatically aggregate purchasing in a forward market for energy and having a distributed ledger that tokenizes a 3D printer instruction set, such that operation on the distributed ledger provides provable access to the instruction set. In embodiments, provided herein is a transaction-enabling system having a fleet of machines that automatically aggregate purchasing in a forward market for energy and having a distributed ledger that tokenizes an instruction set for a coating process, such that operation on the distributed ledger provides provable access to the instruction set. In embodiments, automatically aggregate purchasing in a forward market for energy and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically aggregate purchasing in a forward market for energy and having a distributed ledger that tokenizes a firmware program, such that operation on the distributed ledger provides provable access to the firmware program. In embodiments, provided herein is a transaction-enabling system having a fleet of machines that automatically aggregate purchasing in a forward market for energy and having a distributed ledger that tokenizes an instruction set for an FPGA, such that operation on the distributed ledger provides provable access to the FPGA. In embodiments, provided herein is a transaction-enabling system having a fleet of machines that automatically aggregate purchasing in a forward market for energy and having a distributed ledger that tokenizes serverless code logic, such that operation on the distributed ledger provides provable access to the serverless code logic. In embodiments, provided herein is a transaction-enabling system having a fleet of machines that automatically aggregate purchasing in a forward market for energy and having a distributed ledger that tokenizes an instruction set for a crystal fabrication system, such that operation on the distributed ledger provides provable access to the instruction set. In embodiments, provided herein is a transaction-enabling system having a fleet of machines that automatically aggregate purchasing in a forward market for energy and having a distributed ledger that tokenizes an instruction set for a food preparation process, such that operation on the distributed ledger provides provable access to the instruction set. In embodiments, provided herein is a transaction-enabling system having a fleet of machines that automatically aggregate purchasing in a forward market for energy and having a distributed ledger that tokenizes an instruction set for a polymer production process, such that operation on the distributed ledger provides provable access to the instruction set. In embodiments, provided herein is a transaction-enabling system having a fleet of machines that automatically aggregate purchasing in a forward market for energy and having a distributed ledger that tokenizes an instruction set for chemical synthesis process, such that operation on the distributed ledger provides provable access to the instruction set. In embodiments, provided herein is a transaction-enabling system having a fleet of machines that automatically aggregate purchasing in a forward market for energy and having a distributed ledger that tokenizes an instruction set for a biological production process, such that operation on the distributed ledger provides provable access to the instruction set. In embodiments, provided herein is a transaction-enabling system having a fleet of machines that automatically aggregate purchasing in a forward market for energy and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically aggregate purchasing in a forward market for energy and having a distributed ledger that aggregates views of a trade secret into a chain that proves which and how many parties have viewed the trade secret. In embodiments, provided herein is a transaction-enabling system having a fleet of machines that automatically aggregate purchasing in a forward market for energy and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically aggregate purchasing in a forward market for energy and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically aggregate purchasing in a forward market for energy and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically aggregate purchasing in a forward market for energy and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically aggregate purchasing in a forward market for energy and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically aggregate purchasing in a forward market for energy and having a self-executing cryptocurrency coin that commits a transaction upon recognizing a location-based parameter that provides favorable tax treatment. In embodiments, provided herein is a transaction-enabling system having a fleet of machines that automatically aggregate purchasing in a forward market for energy and having an expert system that uses machine learning to optimize the execution of cryptocurrency transactions based on tax status. In embodiments, provided herein is a transaction-enabling system having a fleet of machines that automatically aggregate purchasing in a forward market for energy and having an expert system that aggregates regulatory information covering cryptocurrency transactions and automatically selects a jurisdiction for an operation based on the regulatory information. In embodiments, provided herein is a transaction-enabling system having a fleet of machines that automatically aggregate purchasing in a forward market for energy and having an expert system that uses machine learning to optimize the execution of a cryptocurrency transaction based on real time energy price information for an available energy source. In embodiments, provided herein is a transaction-enabling system having a fleet of machines that automatically aggregate purchasing in a forward market for energy and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically aggregate purchasing in a forward market for energy and having an expert system that uses machine learning to optimize charging and recharging cycle of a rechargeable battery system to provide energy for execution of a cryptocurrency transaction. In embodiments, provided herein is a transaction-enabling system having a fleet of machines that automatically aggregate purchasing in a forward market for energy and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically aggregate purchasing in a forward market for energy and having an expert system that predicts a forward market price in a market based on an understanding obtained by analyzing social network data sources and executes a transaction based on the forward market prediction. In embodiments, provided herein is a transaction-enabling system having a fleet of machines that automatically aggregate purchasing in a forward market for energy and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically aggregate purchasing in a forward market for energy and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically aggregate purchasing in a forward market for energy and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically aggregate purchasing in a forward market for energy and having an expert system that predicts a forward market price in an energy market based on an understanding obtained by analyzing social network data sources and executes a transaction based on the forward market prediction. In embodiments, provided herein is a transaction-enabling system having a fleet of machines that automatically aggregate purchasing in a forward market for energy and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically aggregate purchasing in a forward market for energy and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically aggregate purchasing in a forward market for energy and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically aggregate purchasing in a forward market for energy and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically aggregate purchasing in a forward market for energy and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically aggregate purchasing in a forward market for energy and having a machine that automatically forecasts forward market pricing of energy prices based on information collected from automated agent behavioral data sources. In embodiments, provided herein is a transaction-enabling system having a fleet of machines that automatically aggregate purchasing in a forward market for energy and having a machine that automatically forecasts forward market pricing of network spectrum based on information collected from automated agent behavioral data sources. In embodiments, provided herein is a transaction-enabling system having a fleet of machines that automatically aggregate purchasing in a forward market for energy and having a machine that automatically forecasts forward market pricing of energy credits based on information collected from automated agent behavioral data sources. In embodiments, provided herein is a transaction-enabling system having a fleet of machines that automatically aggregate purchasing in a forward market for energy and having a machine that automatically forecasts forward market value of compute capability based on information collected from automated agent behavioral data sources. In embodiments, provided herein is a transaction-enabling system having a fleet of machines that automatically aggregate purchasing in a forward market for energy and having a machine that automatically forecasts forward market pricing of energy prices based on information collected from business entity behavioral data sources. In embodiments, provided herein is a transaction-enabling system having a fleet of machines that automatically aggregate purchasing in a forward market for energy and having a machine that automatically forecasts forward market pricing of network spectrum based on information collected from business entity behavioral data sources. In embodiments, provided herein is a transaction-enabling system having a fleet of machines that automatically aggregate purchasing in a forward market for energy and having a machine that automatically forecasts forward market pricing of energy credits based on information collected from business entity behavioral data sources. In embodiments, provided herein is a transaction-enabling system having a fleet of machines that automatically aggregate purchasing in a forward market for energy and having a machine that automatically forecasts forward market value of compute capability based on information collected from business entity behavioral data sources. In embodiments, automatically aggregate purchasing in a forward market for energy and having a machine that automatically forecasts forward market pricing of energy prices based on information collected from human behavioral data sources. In embodiments, provided herein is a transaction-enabling system having a fleet of machines that automatically aggregate purchasing in a forward market for energy and having a machine that automatically forecasts forward market pricing of network spectrum based on information collected from human behavioral data sources. In embodiments, provided herein is a transaction-enabling system having a fleet of machines that automatically aggregate purchasing in a forward market for energy and having a machine that automatically forecasts forward market pricing of energy credits based on information collected from human behavioral data sources. In embodiments, provided herein is a transaction-enabling system having a fleet of machines that automatically aggregate purchasing in a forward market for energy and having a machine that automatically forecasts forward market value of compute capability based on information collected from human behavioral data sources. In embodiments, provided herein is a transaction-enabling system having a fleet of machines that automatically aggregate purchasing in a forward market for energy and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically aggregate purchasing in a forward market for energy and having an intelligent agent that is configured to solicit the attention resources of another external intelligent agent. In embodiments, provided herein is a transaction-enabling system having a fleet of machines that automatically aggregate purchasing in a forward market for energy and having a machine that automatically purchases attention resources in a forward market for attention. In embodiments, provided herein is a transaction-enabling system having a fleet of machines that automatically aggregate purchasing in a forward market for energy and having a fleet of machines that automatically aggregate purchasing in a forward market for attention. In embodiments, provided herein is a transaction-enabling system having a fleet of machines that automatically aggregate purchasing in a forward market for energy and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate purchasing in a forward market for energy and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate purchasing in a forward market for energy and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate purchasing in a forward market for energy and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate purchasing in a forward market for energy and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate purchasing in a forward market for energy and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate purchasing in a forward market for energy and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate purchasing in a forward market for energy and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate purchasing in a forward market for energy and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate purchasing in a forward market for energy and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate purchasing in a forward market for energy and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate purchasing in a forward market for energy and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate purchasing in a forward market for energy and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate purchasing in a forward market for energy and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate purchasing energy credits in a forward market. In embodiments, provided herein is a transaction-enabling system having a fleet of machines that automatically aggregate purchasing energy credits in a forward market and having a machine that automatically purchases spectrum allocation in a forward market for network spectrum. In embodiments, provided herein is a transaction-enabling system having a fleet of machines that automatically aggregate purchasing energy credits in a forward market and having a machine that automatically sells its compute capacity on a forward market for compute capacity. In embodiments, provided herein is a transaction-enabling system having a fleet of machines that automatically aggregate purchasing energy credits in a forward market and having a machine that automatically sells its compute storage capacity on a forward market for storage capacity. In embodiments, provided herein is a transaction-enabling system having a fleet of machines that automatically aggregate purchasing energy credits in a forward market and having a machine that automatically sells its energy storage capacity on a forward market for energy storage capacity. In embodiments, provided herein is a transaction-enabling system having a fleet of machines that automatically aggregate purchasing energy credits in a forward market and having a machine that automatically sells its network bandwidth on a forward market for network capacity. In embodiments, provided herein is a transaction-enabling system having a fleet of machines that automatically aggregate purchasing energy credits in a forward market and having a fleet of machines that automatically purchase spectrum allocation in a forward market for network spectrum. In embodiments, provided herein is a transaction-enabling system having a fleet of machines that automatically aggregate purchasing energy credits in a forward market and having a fleet of machines that automatically optimize energy utilization for compute task allocation. In embodiments, provided herein is a transaction-enabling system having a fleet of machines that automatically aggregate purchasing energy credits in a forward market and having a fleet of machines that automatically aggregate data on collective optimization of forward market purchases of energy. In embodiments, provided herein is a transaction-enabling system having a fleet of machines that automatically aggregate purchasing energy credits in a forward market and having a fleet of machines that automatically aggregate data on collective optimization of forward market purchases of energy credits. In embodiments, provided herein is a transaction-enabling system having a fleet of machines that automatically aggregate purchasing energy credits in a forward market and having a fleet of machines that automatically aggregate data on collective optimization of forward market purchases of network spectrum. In embodiments, provided herein is a transaction-enabling system having a fleet of machines that automatically aggregate purchasing energy credits in a forward market and having a fleet of machines that automatically aggregate data on collective optimization of forward market sales of compute capacity. In embodiments, provided herein is a transaction-enabling system having a fleet of machines that automatically aggregate purchasing energy credits in a forward market and having a machine that automatically purchases its energy in a spot market for energy. In embodiments, provided herein is a transaction-enabling system having a fleet of machines that automatically aggregate purchasing energy credits in a forward market and having a machine that automatically purchases energy credits in a spot market. In embodiments, provided herein is a transaction-enabling system having a fleet of machines that automatically aggregate purchasing energy credits in a forward market and having a fleet of machines that automatically aggregate purchasing in a spot market for energy. In embodiments, provided herein is a transaction-enabling system having a fleet of machines that automatically aggregate purchasing energy credits in a forward market and having a fleet of machines that automatically aggregate purchasing energy credits in a spot market. In embodiments, provided herein is a transaction-enabling system having a fleet of machines that automatically aggregate purchasing energy credits in a forward market and having a machine that automatically purchases spectrum allocation in a spot market for network spectrum. In embodiments, provided herein is a transaction-enabling system having a fleet of machines that automatically aggregate purchasing energy credits in a forward market and having a fleet of machines that automatically purchase spectrum allocation in a spot market for network spectrum. In embodiments, provided herein is a transaction-enabling system having a fleet of machines that automatically aggregate purchasing energy credits in a forward market and having a fleet of machines that automatically optimize energy utilization for compute task allocation. In embodiments, provided herein is a transaction-enabling system having a fleet of machines that automatically aggregate purchasing energy credits in a forward market and having a fleet of machines that automatically aggregate data on collective optimization of spot market purchases of energy. In embodiments, provided herein is a transaction-enabling system having a fleet of machines that automatically aggregate purchasing energy credits in a forward market and having a fleet of machines that automatically aggregate data on collective optimization of spot market purchases of energy credits. In embodiments, provided herein is a transaction-enabling system having a fleet of machines that automatically aggregate purchasing energy credits in a forward market and having a fleet of machines that automatically aggregate data on collective optimization of spot market purchases of network spectrum. In embodiments, provided herein is a transaction-enabling system having a fleet of machines that automatically aggregate purchasing energy credits in a forward market and having a fleet of machines that automatically sell their aggregate compute capacity on a forward market for compute capacity. In embodiments, provided herein is a transaction-enabling system having a fleet of machines that automatically aggregate purchasing energy credits in a forward market and having a fleet of machines that automatically sell their aggregate compute storage capacity on a forward market for storage capacity. In embodiments, provided herein is a transaction-enabling system having a fleet of machines that automatically aggregate purchasing energy credits in a forward market and having a fleet of machines that automatically sell their aggregate energy storage capacity on a forward market for energy storage capacity. In embodiments, provided herein is a transaction-enabling system having a fleet of machines that automatically aggregate purchasing energy credits in a forward market and having a fleet of machines that automatically sell their aggregate network bandwidth on a forward market for network capacity. In embodiments, provided herein is a transaction-enabling system having a fleet of machines that automatically aggregate purchasing energy credits in a forward market and having a machine that automatically forecasts forward market pricing of energy prices based on information collected from social media data sources. In embodiments, provided herein is a transaction-enabling system having a fleet of machines that automatically aggregate purchasing energy credits in a forward market and having a machine that automatically forecasts forward market pricing of network spectrum based on information collected from social media data sources. In embodiments, provided herein is a transaction-enabling system having a fleet of machines that automatically aggregate purchasing energy credits in a forward market and having a machine that automatically forecasts forward market pricing of energy credits based on information collected from social media data sources. In embodiments, provided herein is a transaction-enabling system having a fleet of machines that automatically aggregate purchasing energy credits in a forward market and having a machine that automatically forecasts forward market value of compute capability based on information collected from social media data sources. In embodiments, provided herein is a transaction-enabling system having a fleet of machines that automatically aggregate purchasing energy credits in a forward market and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically aggregate purchasing energy credits in a forward market and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically aggregate purchasing energy credits in a forward market and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically aggregate purchasing energy credits in a forward market and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically aggregate purchasing energy credits in a forward market and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically aggregate purchasing energy credits in a forward market and having a machine that automatically allocates its energy capacity among a core task, a compute task, an energy storage task, a data storage task, and a networking task. In embodiments, provided herein is a transaction-enabling system having a fleet of machines that automatically aggregate purchasing energy credits in a forward market and having a machine that automatically allocates its compute capacity among a core task, a compute task, an energy storage task, a data storage task, and a networking task. In embodiments, provided herein is a transaction-enabling system having a fleet of machines that automatically aggregate purchasing energy credits in a forward market and having a machine that automatically allocates its networking capacity among a core task, a compute task, an energy storage task, a data storage task, and a networking task. In embodiments, provided herein is a transaction-enabling system having a fleet of machines that automatically aggregate purchasing energy credits in a forward market and having a fleet of machines that automatically allocate collective energy capacity among a core task, a compute task, an energy storage task, a data storage task, and a networking task. In embodiments, provided herein is a transaction-enabling system having a fleet of machines that automatically aggregate purchasing energy credits in a forward market and having a fleet of machines that automatically allocate collective compute capacity among a core task, a compute task, an energy storage task, a data storage task, and a networking task. In embodiments, provided herein is a transaction-enabling system having a fleet of machines that automatically aggregate purchasing energy credits in a forward market and having a fleet of machines that automatically allocate collective networking capacity among a core task, a compute task, an energy storage task, a data storage task, and a networking task. In embodiments, provided herein is a transaction-enabling system having a fleet of machines that automatically aggregate purchasing energy credits in a forward market and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically aggregate purchasing energy credits in a forward market and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate purchasing energy credits in a forward market and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically aggregate purchasing energy credits in a forward market and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate purchasing energy credits in a forward market and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically aggregate purchasing energy credits in a forward market and having a distributed ledger that tokenizes an instruction set, such that operation on the distributed ledger provides provable access to the instruction set. In embodiments, provided herein is a transaction-enabling system having a fleet of machines that automatically aggregate purchasing energy credits in a forward market and having a distributed ledger that tokenizes executable algorithmic logic, such that operation on the distributed ledger provides provable access to the executable algorithmic logic. In embodiments, provided herein is a transaction-enabling system having a fleet of machines that automatically aggregate purchasing energy credits in a forward market and having a distributed ledger that tokenizes a 3D printer instruction set, such that operation on the distributed ledger provides provable access to the instruction set. In embodiments, provided herein is a transaction-enabling system having a fleet of machines that automatically aggregate purchasing energy credits in a forward market and having a distributed ledger that tokenizes an instruction set for a coating process, such that operation on the distributed ledger provides provable access to the instruction set. In embodiments, provided herein is a transaction-enabling system having a fleet of machines that automatically aggregate purchasing energy credits in a forward market and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically aggregate purchasing energy credits in a forward market and having a distributed ledger that tokenizes a firmware program, such that operation on the distributed ledger provides provable access to the firmware program. In embodiments, provided herein is a transaction-enabling system having a fleet of machines that automatically aggregate purchasing energy credits in a forward market and having a distributed ledger that tokenizes an instruction set for an FPGA, such that operation on the distributed ledger provides provable access to the FPGA. In embodiments, provided herein is a transaction-enabling system having a fleet of machines that automatically aggregate purchasing energy credits in a forward market and having a distributed ledger that tokenizes serverless code logic, such that operation on the distributed ledger provides provable access to the serverless code logic. In embodiments, provided herein is a transaction-enabling system having a fleet of machines that automatically aggregate purchasing energy credits in a forward market and having a distributed ledger that tokenizes an instruction set for a crystal fabrication system, such that operation on the distributed ledger provides provable access to the instruction set. In embodiments, provided herein is a transaction-enabling system having a fleet of machines that automatically aggregate purchasing energy credits in a forward market and having a distributed ledger that tokenizes an instruction set for a food preparation process, such that operation on the distributed ledger provides provable access to the instruction set. In embodiments, provided herein is a transaction-enabling system having a fleet of machines that automatically aggregate purchasing energy credits in a forward market and having a distributed ledger that tokenizes an instruction set for a polymer production process, such that operation on the distributed ledger provides provable access to the instruction set. In embodiments, provided herein is a transaction-enabling system having a fleet of machines that automatically aggregate purchasing energy credits in a forward market and having a distributed ledger that tokenizes an instruction set for chemical synthesis process, such that operation on the distributed ledger provides provable access to the instruction set. In embodiments, provided herein is a transaction-enabling system having a fleet of machines that automatically aggregate purchasing energy credits in a forward market and having a distributed ledger that tokenizes an instruction set for a biological production process, such that operation on the distributed ledger provides provable access to the instruction set. In embodiments, provided herein is a transaction-enabling system having a fleet of machines that automatically aggregate purchasing energy credits in a forward market and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically aggregate purchasing energy credits in a forward market and having a distributed ledger that aggregates views of a trade secret into a chain that proves which and how many parties have viewed the trade secret. In embodiments, provided herein is a transaction-enabling system having a fleet of machines that automatically aggregate purchasing energy credits in a forward market and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically aggregate purchasing energy credits in a forward market and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically aggregate purchasing energy credits in a forward market and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically aggregate purchasing energy credits in a forward market and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically aggregate purchasing energy credits in a forward market and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically aggregate purchasing energy credits in a forward market and having a self-executing cryptocurrency coin that commits a transaction upon recognizing a location-based parameter that provides favorable tax treatment. In embodiments, provided herein is a transaction-enabling system having a fleet of machines that automatically aggregate purchasing energy credits in a forward market and having an expert system that uses machine learning to optimize the execution of cryptocurrency transactions based on tax status. In embodiments, provided herein is a transaction-enabling system having a fleet of machines that automatically aggregate purchasing energy credits in a forward market and having an expert system that aggregates regulatory information covering cryptocurrency transactions and automatically selects a jurisdiction for an operation based on the regulatory information. In embodiments, provided herein is a transaction-enabling system having a fleet of machines that automatically aggregate purchasing energy credits in a forward market and having an expert system that uses machine learning to optimize the execution of a cryptocurrency transaction based on real time energy price information for an available energy source. In embodiments, provided herein is a transaction-enabling system having a fleet of machines that automatically aggregate purchasing energy credits in a forward market and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically aggregate purchasing energy credits in a forward market and having an expert system that uses machine learning to optimize charging and recharging cycle of a rechargeable battery system to provide energy for execution of a cryptocurrency transaction. In embodiments, provided herein is a transaction-enabling system having a fleet of machines that automatically aggregate purchasing energy credits in a forward market and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically aggregate purchasing energy credits in a forward market and having an expert system that predicts a forward market price in a market based on an understanding obtained by analyzing social network data sources and executes a transaction based on the forward market prediction. In embodiments, provided herein is a transaction-enabling system having a fleet of machines that automatically aggregate purchasing energy credits in a forward market and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically aggregate purchasing energy credits in a forward market and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically aggregate purchasing energy credits in a forward market and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically aggregate purchasing energy credits in a forward market and having an expert system that predicts a forward market price in an energy market based on an understanding obtained by analyzing social network data sources and executes a transaction based on the forward market prediction. In embodiments, provided herein is a transaction-enabling system having a fleet of machines that automatically aggregate purchasing energy credits in a forward market and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically aggregate purchasing energy credits in a forward market and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically aggregate purchasing energy credits in a forward market and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically aggregate purchasing energy credits in a forward market and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically aggregate purchasing energy credits in a forward market and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically aggregate purchasing energy credits in a forward market and having a machine that automatically forecasts forward market pricing of energy prices based on information collected from automated agent behavioral data sources. In embodiments, provided herein is a transaction-enabling system having a fleet of machines that automatically aggregate purchasing energy credits in a forward market and having a machine that automatically forecasts forward market pricing of network spectrum based on information collected from automated agent behavioral data sources. In embodiments, provided herein is a transaction-enabling system having a fleet of machines that automatically aggregate purchasing energy credits in a forward market and having a machine that automatically forecasts forward market pricing of energy credits based on information collected from automated agent behavioral data sources. In embodiments, provided herein is a transaction-enabling system having a fleet of machines that automatically aggregate purchasing energy credits in a forward market and having a machine that automatically forecasts forward market value of compute capability based on information collected from automated agent behavioral data sources. In embodiments, provided herein is a transaction-enabling system having a fleet of machines that automatically aggregate purchasing energy credits in a forward market and having a machine that automatically forecasts forward market pricing of energy prices based on information collected from business entity behavioral data sources. In embodiments, provided herein is a transaction-enabling system having a fleet of machines that automatically aggregate purchasing energy credits in a forward market and having a machine that automatically forecasts forward market pricing of network spectrum based on information collected from business entity behavioral data sources. In embodiments, provided herein is a transaction-enabling system having a fleet of machines that automatically aggregate purchasing energy credits in a forward market and having a machine that automatically forecasts forward market pricing of energy credits based on information collected from business entity behavioral data sources. In embodiments, provided herein is a transaction-enabling system having a fleet of machines that automatically aggregate purchasing energy credits in a forward market and having a machine that automatically forecasts forward market value of compute capability based on information collected from business entity behavioral data sources. In embodiments, provided herein is a transaction-enabling system having a fleet of machines that automatically aggregate purchasing energy credits in a forward market and having a machine that automatically forecasts forward market pricing of energy prices based on information collected from human behavioral data sources. In embodiments, provided herein is a transaction-enabling system having a fleet of machines that automatically aggregate purchasing energy credits in a forward market and having a machine that automatically forecasts forward market pricing of network spectrum based on information collected from human behavioral data sources. In embodiments, provided herein is a transaction-enabling system having a fleet of machines that automatically aggregate purchasing energy credits in a forward market and having a machine that automatically forecasts forward market pricing of energy credits based on information collected from human behavioral data sources. In embodiments, provided herein is a transaction-enabling system having a fleet of machines that automatically aggregate purchasing energy credits in a forward market and having a machine that automatically forecasts forward market value of compute capability based on information collected from human behavioral data sources. In embodiments, provided herein is a transaction-enabling system having a fleet of machines that automatically aggregate purchasing energy credits in a forward market and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically aggregate purchasing energy credits in a forward market and having an intelligent agent that is configured to solicit the attention resources of another external intelligent agent. In embodiments, provided herein is a transaction-enabling system having a fleet of machines that automatically aggregate purchasing energy credits in a forward market and having a machine that automatically purchases attention resources in a forward market for attention. In embodiments, provided herein is a transaction-enabling system having a fleet of machines that automatically aggregate purchasing energy credits in a forward market and having a fleet of machines that automatically aggregate purchasing in a forward market for attention. In embodiments, provided herein is a transaction-enabling system having a fleet of machines that automatically aggregate purchasing energy credits in a forward market and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate purchasing energy credits in a forward market and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate purchasing energy credits in a forward market and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate purchasing energy credits in a forward market and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate purchasing energy credits in a forward market and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate purchasing energy credits in a forward market and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate purchasing energy credits in a forward market and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate purchasing energy credits in a forward market and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate purchasing energy credits in a forward market and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate purchasing energy credits in a forward market and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate purchasing energy credits in a forward market and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate purchasing energy credits in a forward market and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate purchasing energy credits in a forward market and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate purchasing energy credits in a forward market and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically purchases spectrum allocation in a forward market for network spectrum. In embodiments, provided herein is a transaction-enabling system having a machine that automatically purchases spectrum allocation in a forward market for network spectrum and having a machine that automatically sells its compute capacity on a forward market for compute capacity. In embodiments, provided herein is a transaction-enabling system having a machine that automatically purchases spectrum allocation in a forward market for network spectrum and having a machine that automatically sells its compute storage capacity on a forward market for storage capacity. In embodiments, provided herein is a transaction-enabling system having a machine that automatically purchases spectrum allocation in a forward market for network spectrum and having a machine that automatically sells its energy storage capacity on a forward market for energy storage capacity. In embodiments, provided herein is a transaction-enabling system having a machine that automatically purchases spectrum allocation in a forward market for network spectrum and having a machine that automatically sells its network bandwidth on a forward market for network capacity. In embodiments, provided herein is a transaction-enabling system having a machine that automatically purchases spectrum allocation in a forward market for network spectrum and having a fleet of machines that automatically purchase spectrum allocation in a forward market for network spectrum. In embodiments, provided herein is a transaction-enabling system having a machine that automatically purchases spectrum allocation in a forward market for network spectrum and having a fleet of machines that automatically optimize energy utilization for compute task allocation. In embodiments, provided herein is a transaction-enabling system having a machine that automatically purchases spectrum allocation in a forward market for network spectrum and having a fleet of machines that automatically aggregate data on collective optimization of forward market purchases of energy. In embodiments, provided herein is a transaction-enabling system having a machine that automatically purchases spectrum allocation in a forward market for network spectrum and having a fleet of machines that automatically aggregate data on collective optimization of forward market purchases of energy credits. In embodiments, provided herein is a transaction-enabling system having a machine that automatically purchases spectrum allocation in a forward market for network spectrum and having a fleet of machines that automatically aggregate data on collective optimization of forward market purchases of network spectrum. In embodiments, provided herein is a transaction-enabling system having a machine that automatically purchases spectrum allocation in a forward market for network spectrum and having a fleet of machines that automatically aggregate data on collective optimization of forward market sales of compute capacity. In embodiments, provided herein is a transaction-enabling system having a machine that automatically purchases spectrum allocation in a forward market for network spectrum and having a machine that automatically purchases its energy in a spot market for energy. In embodiments, provided herein is a transaction-enabling system having a machine that automatically purchases spectrum allocation in a forward market for network spectrum and having a machine that automatically purchases energy credits in a spot market. In embodiments, provided herein is a transaction-enabling system having a machine that automatically purchases spectrum allocation in a forward market for network spectrum and having a fleet of machines that automatically aggregate purchasing in a spot market for energy. In embodiments, provided herein is a transaction-enabling system having a machine that automatically purchases spectrum allocation in a forward market for network spectrum and having a fleet of machines that automatically aggregate purchasing energy credits in a spot market. In embodiments, provided herein is a transaction-enabling system having a machine that automatically purchases spectrum allocation in a forward market for network spectrum and having a machine that automatically purchases spectrum allocation in a spot market for network spectrum. In embodiments, provided herein is a transaction-enabling system having a machine that automatically purchases spectrum allocation in a forward market for network spectrum and having a fleet of machines that automatically purchase spectrum allocation in a spot market for network spectrum. In embodiments, provided herein is a transaction-enabling system having a machine that automatically purchases spectrum allocation in a forward market for network spectrum and having a fleet of machines that automatically optimize energy utilization for compute task allocation. In embodiments, provided herein is a transaction-enabling system having a machine that automatically purchases spectrum allocation in a forward market for network spectrum and having a fleet of machines that automatically aggregate data on collective optimization of spot market purchases of energy. In embodiments, provided herein is a transaction-enabling system having a machine that automatically purchases spectrum allocation in a forward market for network spectrum and having a fleet of machines that automatically aggregate data on collective optimization of spot market purchases of energy credits. In embodiments, provided herein is a transaction-enabling system having a machine that automatically purchases spectrum allocation in a forward market for network spectrum and having a fleet of machines that automatically aggregate data on collective optimization of spot market purchases of network spectrum. In embodiments, provided herein is a transaction-enabling system having a machine that automatically purchases spectrum allocation in a forward market for network spectrum and having a fleet of machines that automatically sell their aggregate compute capacity on a forward market for compute capacity. In embodiments, provided herein is a transaction-enabling system having a machine that automatically purchases spectrum allocation in a forward market for network spectrum and having a fleet of machines that automatically sell their aggregate compute storage capacity on a forward market for storage capacity. In embodiments, provided herein is a transaction-enabling system having a machine that automatically purchases spectrum allocation in a forward market for network spectrum and having a fleet of machines that automatically sell their aggregate energy storage capacity on a forward market for energy storage capacity. In embodiments, provided herein is a transaction-enabling system having a machine that automatically purchases spectrum allocation in a forward market for network spectrum and having a fleet of machines that automatically sell their aggregate network bandwidth on a forward market for network capacity. In embodiments, provided herein is a transaction-enabling system having a machine that automatically purchases spectrum allocation in a forward market for network spectrum and having a machine that automatically forecasts forward market pricing of energy prices based on information collected from social media data sources. In embodiments, provided herein is a transaction-enabling system having a machine that automatically purchases spectrum allocation in a forward market for network spectrum and having a machine that automatically forecasts forward market pricing of network spectrum based on information collected from social media data sources. In embodiments, provided herein is a transaction-enabling system having a machine that automatically purchases spectrum allocation in a forward market for network spectrum and having a machine that automatically forecasts forward market pricing of energy credits based on information collected from social media data sources. In embodiments, provided herein is a transaction-enabling system having a machine that automatically purchases spectrum allocation in a forward market for network spectrum and having a machine that automatically forecasts forward market value of compute capability based on information collected from social media data sources. In embodiments, provided herein is a transaction-enabling system having a machine that automatically purchases spectrum allocation in a forward market for network spectrum and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically purchases spectrum allocation in a forward market for network spectrum and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically purchases spectrum allocation in a forward market for network spectrum and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically purchases spectrum allocation in a forward market for network spectrum and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically purchases spectrum allocation in a forward market for network spectrum and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically purchases spectrum allocation in a forward market for network spectrum and having a machine that automatically allocates its energy capacity among a core task, a compute task, an energy storage task, a data storage task, and a networking task. In embodiments, provided herein is a transaction-enabling system having a machine that automatically purchases spectrum allocation in a forward market for network spectrum and having a machine that automatically allocates its compute capacity among a core task, a compute task, an energy storage task, a data storage task, and a networking task. In embodiments, provided herein is a transaction-enabling system having a machine that automatically purchases spectrum allocation in a forward market for network spectrum and having a machine that automatically allocates its networking capacity among a core task, a compute task, an energy storage task, a data storage task, and a networking task. In embodiments, provided herein is a transaction-enabling system having a machine that automatically purchases spectrum allocation in a forward market for network spectrum and having a fleet of machines that automatically allocate collective energy capacity among a core task, a compute task, an energy storage task, a data storage task, and a networking task. In embodiments, provided herein is a transaction-enabling system having a machine that automatically purchases spectrum allocation in a forward market for network spectrum and having a fleet of machines that automatically allocate collective compute capacity among a core task, a compute task, an energy storage task, a data storage task, and a networking task. In embodiments, provided herein is a transaction-enabling system having a machine that automatically purchases spectrum allocation in a forward market for network spectrum and having a fleet of machines that automatically allocate collective networking capacity among a core task, a compute task, an energy storage task, a data storage task, and a networking task. In embodiments, provided herein is a transaction-enabling system having a machine that automatically purchases spectrum allocation in a forward market for network spectrum and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically purchases spectrum allocation in a forward market for network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases spectrum allocation in a forward market for network spectrum and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically purchases spectrum allocation in a forward market for network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases spectrum allocation in a forward market for network spectrum and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically purchases spectrum allocation in a forward market for network spectrum and having a distributed ledger that tokenizes an instruction set, such that operation on the distributed ledger provides provable access to the instruction set. In embodiments, provided herein is a transaction-enabling system having a machine that automatically purchases spectrum allocation in a forward market for network spectrum and having a distributed ledger that tokenizes executable algorithmic logic, such that operation on the distributed ledger provides provable access to the executable algorithmic logic. In embodiments, provided herein is a transaction-enabling system having a machine that automatically purchases spectrum allocation in a forward market for network spectrum and having a distributed ledger that tokenizes a 3D printer instruction set, such that operation on the distributed ledger provides provable access to the instruction set. In embodiments, provided herein is a transaction-enabling system having a machine that automatically purchases spectrum allocation in a forward market for network spectrum and having a distributed ledger that tokenizes an instruction set for a coating process, such that operation on the distributed ledger provides provable access to the instruction set. In embodiments, provided herein is a transaction-enabling system having a machine that automatically purchases spectrum allocation in a forward market for network spectrum and having a distributed ledger that tokenizes an instruction set for a semiconductor fabrication process, such that operation on the distributed ledger provides provable access to the fabrication process. In embodiments, provided herein is a transaction-enabling system having a machine that automatically purchases spectrum allocation in a forward market for network spectrum and having a distributed ledger that tokenizes a firmware program, such that operation on the distributed ledger provides provable access to the firmware program. In embodiments, provided herein is a transaction-enabling system having a machine that automatically purchases spectrum allocation in a forward market for network spectrum and having a distributed ledger that tokenizes an instruction set for an FPGA, such that operation on the distributed ledger provides provable access to the FPGA. In embodiments, provided herein is a transaction-enabling system having a machine that automatically purchases spectrum allocation in a forward market for network spectrum and having a distributed ledger that tokenizes serverless code logic, such that operation on the distributed ledger provides provable access to the serverless code logic. In embodiments, provided herein is a transaction-enabling system having a machine that automatically purchases spectrum allocation in a forward market for network spectrum and having a distributed ledger that tokenizes an instruction set for a crystal fabrication system, such that operation on the distributed ledger provides provable access to the instruction set. In embodiments, provided herein is a transaction-enabling system having a machine that automatically purchases spectrum allocation in a forward market for network spectrum and having a distributed ledger that tokenizes an instruction set for a food preparation process, such that operation on the distributed ledger provides provable access to the instruction set. In embodiments, provided herein is a transaction-enabling system having a machine that automatically purchases spectrum allocation in a forward market for network spectrum and having a distributed ledger that tokenizes an instruction set for a polymer production process, such that operation on the distributed ledger provides provable access to the instruction set. In embodiments, provided herein is a transaction-enabling system having a machine that automatically purchases spectrum allocation in a forward market for network spectrum and having a distributed ledger that tokenizes an instruction set for chemical synthesis process, such that operation on the distributed ledger provides provable access to the instruction set. In embodiments, provided herein is a transaction-enabling system having a machine that automatically purchases spectrum allocation in a forward market for network spectrum and having a distributed ledger that tokenizes an instruction set for a biological production process, such that operation on the distributed ledger provides provable access to the instruction set. In embodiments, provided herein is a transaction-enabling system having a machine that automatically purchases spectrum allocation in a forward market for network spectrum and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically purchases spectrum allocation in a forward market for network spectrum and having a distributed ledger that aggregates views of a trade secret into a chain that proves which and how many parties have viewed the trade secret. In embodiments, provided herein is a transaction-enabling system having a machine that automatically purchases spectrum allocation in a forward market for network spectrum and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically purchases spectrum allocation in a forward market for network spectrum and having a distributed ledger that tokenizes an item of intellectual property and a reporting system that reports an analytic result based on the operations performed on the distributed ledger or the intellectual property. In embodiments, provided herein is a transaction-enabling system having a machine that automatically purchases spectrum allocation in a forward market for network spectrum and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically purchases spectrum allocation in a forward market for network spectrum and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically purchases spectrum allocation in a forward market for network spectrum and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically purchases spectrum allocation in a forward market for network spectrum and having a self-executing cryptocurrency coin that commits a transaction upon recognizing a location-based parameter that provides favorable tax treatment. In embodiments, provided herein is a transaction-enabling system having a machine that automatically purchases spectrum allocation in a forward market for network spectrum and having an expert system that uses machine learning to optimize the execution of cryptocurrency transactions based on tax status. In embodiments, provided herein is a transaction-enabling system having a machine that automatically purchases spectrum allocation in a forward market for network spectrum and having an expert system that aggregates regulatory information covering cryptocurrency transactions and automatically selects a jurisdiction for an operation based on the regulatory information. In embodiments, provided herein is a transaction-enabling system having a machine that automatically purchases spectrum allocation in a forward market for network spectrum and having an expert system that uses machine learning to optimize the execution of a cryptocurrency transaction based on real time energy price information for an available energy source. In embodiments, provided herein is a transaction-enabling system having a machine that automatically purchases spectrum allocation in a forward market for network spectrum and having an expert system that uses machine learning to optimize the execution of a cryptocurrency transaction based on an understanding of available energy sources to power computing resources to execute the transaction. In embodiments, provided herein is a transaction-enabling system having a machine that automatically purchases spectrum allocation in a forward market for network spectrum and having an expert system that uses machine learning to optimize charging and recharging cycle of a rechargeable battery system to provide energy for execution of a cryptocurrency transaction. In embodiments, provided herein is a transaction-enabling system having a machine that automatically purchases spectrum allocation in a forward market for network spectrum and having an expert system that predicts a forward market price in a market based on an understanding obtained by analyzing Internet of Things data sources and executes a transaction based on the forward market prediction. In embodiments, provided herein is a transaction-enabling system having a machine that automatically purchases spectrum allocation in a forward market for network spectrum and having an expert system that predicts a forward market price in a market based on an understanding obtained by analyzing social network data sources and executes a transaction based on the forward market prediction. In embodiments, provided herein is a transaction-enabling system having a machine that automatically purchases spectrum allocation in a forward market for network spectrum and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically purchases spectrum allocation in a forward market for network spectrum and having an expert system that predicts a forward market price in a market based on an understanding obtained by analyzing social network data sources and executes a cryptocurrency transaction based on the forward market prediction. In embodiments, provided herein is a transaction-enabling system having a machine that automatically purchases spectrum allocation in a forward market for network spectrum and having an expert system that predicts a forward market price in an energy market based on an understanding obtained by analyzing Internet of Things data sources and executes a transaction based on the forward market prediction. In embodiments, provided herein is a transaction-enabling system having a machine that automatically purchases spectrum allocation in a forward market for network spectrum and having an expert system that predicts a forward market price in an energy market based on an understanding obtained by analyzing social network data sources and executes a transaction based on the forward market prediction. In embodiments, provided herein is a transaction-enabling system having a machine that automatically purchases spectrum allocation in a forward market for network spectrum and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically purchases spectrum allocation in a forward market for network spectrum and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically purchases spectrum allocation in a forward market for network spectrum and having an expert system that predicts a forward market price in a market for computing resources based on an understanding obtained by analyzing social network data sources and executes a transaction based on the forward market prediction. In embodiments, provided herein is a transaction-enabling system having a machine that automatically purchases spectrum allocation in a forward market for network spectrum and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically purchases spectrum allocation in a forward market for network spectrum and having an expert system that predicts a forward market price in a market for advertising based on an understanding obtained by analyzing social network data sources and executes a transaction based on the forward market prediction. In embodiments, provided herein is a transaction-enabling system having a machine that automatically purchases spectrum allocation in a forward market for network spectrum and having a machine that automatically forecasts forward market pricing of energy prices based on information collected from automated agent behavioral data sources. In embodiments, provided herein is a transaction-enabling system having a machine that automatically purchases spectrum allocation in a forward market for network spectrum and having a machine that automatically forecasts forward market pricing of network spectrum based on information collected from automated agent behavioral data sources. In embodiments, provided herein is a transaction-enabling system having a machine that automatically purchases spectrum allocation in a forward market for network spectrum and having a machine that automatically forecasts forward market pricing of energy credits based on information collected from automated agent behavioral data sources. In embodiments, provided herein is a transaction-enabling system having a machine that automatically purchases spectrum allocation in a forward market for network spectrum and having a machine that automatically forecasts forward market value of compute capability based on information collected from automated agent behavioral data sources. In embodiments, provided herein is a transaction-enabling system having a machine that automatically purchases spectrum allocation in a forward market for network spectrum and having a machine that automatically forecasts forward market pricing of energy prices based on information collected from business entity behavioral data sources. In embodiments, provided herein is a transaction-enabling system having a machine that automatically purchases spectrum allocation in a forward market for network spectrum and having a machine that automatically forecasts forward market pricing of network spectrum based on information collected from business entity behavioral data sources. In embodiments, provided herein is a transaction-enabling system having a machine that automatically purchases spectrum allocation in a forward market for network spectrum and having a machine that automatically forecasts forward market pricing of energy credits based on information collected from business entity behavioral data sources. In embodiments, provided herein is a transaction-enabling system having a machine that automatically purchases spectrum allocation in a forward market for network spectrum and having a machine that automatically forecasts forward market value of compute capability based on information collected from business entity behavioral data sources. In embodiments, provided herein is a transaction-enabling system having a machine that automatically purchases spectrum allocation in a forward market for network spectrum and having a machine that automatically forecasts forward market pricing of energy prices based on information collected from human behavioral data sources. In embodiments, provided herein is a transaction-enabling system having a machine that automatically purchases spectrum allocation in a forward market for network spectrum and having a machine that automatically forecasts forward market pricing of network spectrum based on information collected from human behavioral data sources. In embodiments, provided herein is a transaction-enabling system having a machine that automatically purchases spectrum allocation in a forward market for network spectrum and having a machine that automatically forecasts forward market pricing of energy credits based on information collected from human behavioral data sources. In embodiments, provided herein is a transaction-enabling system having a machine that automatically purchases spectrum allocation in a forward market for network spectrum and having a machine that automatically forecasts forward market value of compute capability based on information collected from human behavioral data sources. In embodiments, provided herein is a transaction-enabling system having a machine that automatically purchases spectrum allocation in a forward market for network spectrum and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically purchases spectrum allocation in a forward market for network spectrum and having an intelligent agent that is configured to solicit the attention resources of another external intelligent agent. In embodiments, provided herein is a transaction-enabling system having a machine that automatically purchases spectrum allocation in a forward market for network spectrum and having a machine that automatically purchases attention resources in a forward market for attention. In embodiments, provided herein is a transaction-enabling system having a machine that automatically purchases spectrum allocation in a forward market for network spectrum and having a fleet of machines that automatically aggregate purchasing in a forward market for attention. In embodiments, provided herein is a transaction-enabling system having a machine that automatically purchases spectrum allocation in a forward market for network spectrum and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically purchases spectrum allocation in a forward market for network spectrum and having a system for learning on a training set of facility outcomes, facility parameters, and data collected from data sources to train an artificial intelligence/machine learning system to predict a facility production outcome. In embodiments, provided herein is a transaction-enabling system having a machine that automatically purchases spectrum allocation in a forward market for network spectrum and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically purchases spectrum allocation in a forward market for network spectrum and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically purchases spectrum allocation in a forward market for network spectrum and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically purchases spectrum allocation in a forward market for network spectrum and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically purchases spectrum allocation in a forward market for network spectrum and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically purchases spectrum allocation in a forward market for network spectrum and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically purchases spectrum allocation in a forward market for network spectrum and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically purchases spectrum allocation in a forward market for network spectrum and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically purchases spectrum allocation in a forward market for network spectrum and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically purchases spectrum allocation in a forward market for network spectrum and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically purchases spectrum allocation in a forward market for network spectrum and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically purchases spectrum allocation in a forward market for network spectrum and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically sells its compute capacity on a forward market for compute capacity. In embodiments, provided herein is a transaction-enabling system having a machine that automatically sells its compute capacity on a forward market for compute capacity and having a machine that automatically sells its compute storage capacity on a forward market for storage capacity. In embodiments, provided herein is a transaction-enabling system having a machine that automatically sells its compute capacity on a forward market for compute capacity and having a machine that automatically sells its energy storage capacity on a forward market for energy storage capacity. In embodiments, provided herein is a transaction-enabling system having a machine that automatically sells its compute capacity on a forward market for compute capacity and having a machine that automatically sells its network bandwidth on a forward market for network capacity. In embodiments, provided herein is a transaction-enabling system having a machine that automatically sells its compute capacity on a forward market for compute capacity and having a fleet of machines that automatically purchase spectrum allocation in a forward market for network spectrum. In embodiments, provided herein is a transaction-enabling system having a machine that automatically sells its compute capacity on a forward market for compute capacity and having a fleet of machines that automatically optimize energy utilization for compute task allocation. In embodiments, provided herein is a transaction-enabling system having a machine that automatically sells its compute capacity on a forward market for compute capacity and having a fleet of machines that automatically aggregate data on collective optimization of forward market purchases of energy. In embodiments, provided herein is a transaction-enabling system having a machine that automatically sells its compute capacity on a forward market for compute capacity and having a fleet of machines that automatically aggregate data on collective optimization of forward market purchases of energy credits. In embodiments, provided herein is a transaction-enabling system having a machine that automatically sells its compute capacity on a forward market for compute capacity and having a fleet of machines that automatically aggregate data on collective optimization of forward market purchases of network spectrum. In embodiments, provided herein is a transaction-enabling system having a machine that automatically sells its compute capacity on a forward market for compute capacity and having a fleet of machines that automatically aggregate data on collective optimization of forward market sales of compute capacity. In embodiments, provided herein is a transaction-enabling system having a machine that automatically sells its compute capacity on a forward market for compute capacity and having a machine that automatically purchases its energy in a spot market for energy. In embodiments, provided herein is a transaction-enabling system having a machine that automatically sells its compute capacity on a forward market for compute capacity and having a machine that automatically purchases energy credits in a spot market. In embodiments, provided herein is a transaction-enabling system having a machine that automatically sells its compute capacity on a forward market for compute capacity and having a fleet of machines that automatically aggregate purchasing in a spot market for energy. In embodiments, provided herein is a transaction-enabling system having a machine that automatically sells its compute capacity on a forward market for compute capacity and having a fleet of machines that automatically aggregate purchasing energy credits in a spot market. In embodiments, provided herein is a transaction-enabling system having a machine that automatically sells its compute capacity on a forward market for compute capacity and having a machine that automatically purchases spectrum allocation in a spot market for network spectrum. In embodiments, provided herein is a transaction-enabling system having a machine that automatically sells its compute capacity on a forward market for compute capacity and having a fleet of machines that automatically purchase spectrum allocation in a spot market for network spectrum. In embodiments, provided herein is a transaction-enabling system having a machine that automatically sells its compute capacity on a forward market for compute capacity and having a fleet of machines that automatically optimize energy utilization for compute task allocation. In embodiments, provided herein is a transaction-enabling system having a machine that automatically sells its compute capacity on a forward market for compute capacity and having a fleet of machines that automatically aggregate data on collective optimization of spot market purchases of energy. In embodiments, provided herein is a transaction-enabling system having a machine that automatically sells its compute capacity on a forward market for compute capacity and having a fleet of machines that automatically aggregate data on collective optimization of spot market purchases of energy credits. In embodiments, provided herein is a transaction-enabling system having a machine that automatically sells its compute capacity on a forward market for compute capacity and having a fleet of machines that automatically aggregate data on collective optimization of spot market purchases of network spectrum. In embodiments, provided herein is a transaction-enabling system having a machine that automatically sells its compute capacity on a forward market for compute capacity and having a fleet of machines that automatically sell their aggregate compute capacity on a forward market for compute capacity. In embodiments, provided herein is a transaction-enabling system having a machine that automatically sells its compute capacity on a forward market for compute capacity and having a fleet of machines that automatically sell their aggregate compute storage capacity on a forward market for storage capacity. In embodiments, provided herein is a transaction-enabling system having a machine that automatically sells its compute capacity on a forward market for compute capacity and having a fleet of machines that automatically sell their aggregate energy storage capacity on a forward market for energy storage capacity. In embodiments, provided herein is a transaction-enabling system having a machine that automatically sells its compute capacity on a forward market for compute capacity and having a fleet of machines that automatically sell their aggregate network bandwidth on a forward market for network capacity. In embodiments, provided herein is a transaction-enabling system having a machine that automatically sells its compute capacity on a forward market for compute capacity and having a machine that automatically forecasts forward market pricing of energy prices based on information collected from social media data sources. In embodiments, provided herein is a transaction-enabling system having a machine that automatically sells its compute capacity on a forward market for compute capacity and having a machine that automatically forecasts forward market pricing of network spectrum based on information collected from social media data sources. In embodiments, provided herein is a transaction-enabling system having a machine that automatically sells its compute capacity on a forward market for compute capacity and having a machine that automatically forecasts forward market pricing of energy credits based on information collected from social media data sources. In embodiments, provided herein is a transaction-enabling system having a machine that automatically sells its compute capacity on a forward market for compute capacity and having a machine that automatically forecasts forward market value of compute capability based on information collected from social media data sources. In embodiments, provided herein is a transaction-enabling system having a machine that automatically sells its compute capacity on a forward market for compute capacity and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically sells its compute capacity on a forward market for compute capacity and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically sells its compute capacity on a forward market for compute capacity and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically sells its compute capacity on a forward market for compute capacity and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically sells its compute capacity on a forward market for compute capacity and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically sells its compute capacity on a forward market for compute capacity and having a machine that automatically allocates its energy capacity among a core task, a compute task, an energy storage task, a data storage task, and a networking task. In embodiments, provided herein is a transaction-enabling system having a machine that automatically sells its compute capacity on a forward market for compute capacity and having a machine that automatically allocates its compute capacity among a core task, a compute task, an energy storage task, a data storage task, and a networking task. In embodiments, provided herein is a transaction-enabling system having a machine that automatically sells its compute capacity on a forward market for compute capacity and having a machine that automatically allocates its networking capacity among a core task, a compute task, an energy storage task, a data storage task, and a networking task. In embodiments, provided herein is a transaction-enabling system having a machine that automatically sells its compute capacity on a forward market for compute capacity and having a fleet of machines that automatically allocate collective energy capacity among a core task, a compute task, an energy storage task, a data storage task, and a networking task. In embodiments, provided herein is a transaction-enabling system having a machine that automatically sells its compute capacity on a forward market for compute capacity and having a fleet of machines that automatically allocate collective compute capacity among a core task, a compute task, an energy storage task, a data storage task, and a networking task. In embodiments, provided herein is a transaction-enabling system having a machine that automatically sells its compute capacity on a forward market for compute capacity and having a fleet of machines that automatically allocate collective networking capacity among a core task, a compute task, an energy storage task, a data storage task, and a networking task. In embodiments, provided herein is a transaction-enabling system having a machine that automatically sells its compute capacity on a forward market for compute capacity and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically sells its compute capacity on a forward market for compute capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically sells its compute capacity on a forward market for compute capacity and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically sells its compute capacity on a forward market for compute capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically sells its compute capacity on a forward market for compute capacity and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically sells its compute capacity on a forward market for compute capacity and having a distributed ledger that tokenizes an instruction set, such that operation on the distributed ledger provides provable access to the instruction set. In embodiments, provided herein is a transaction-enabling system having a machine that automatically sells its compute capacity on a forward market for compute capacity and having a distributed ledger that tokenizes executable algorithmic logic, such that operation on the distributed ledger provides provable access to the executable algorithmic logic. In embodiments, provided herein is a transaction-enabling system having a machine that automatically sells its compute capacity on a forward market for compute capacity and having a distributed ledger that tokenizes a 3D printer instruction set, such that operation on the distributed ledger provides provable access to the instruction set. In embodiments, provided herein is a transaction-enabling system having a machine that automatically sells its compute capacity on a forward market for compute capacity and having a distributed ledger that tokenizes an instruction set for a coating process, such that operation on the distributed ledger provides provable access to the instruction set. In embodiments, provided herein is a transaction-enabling system having a machine that automatically sells its compute capacity on a forward market for compute capacity and having a distributed ledger that tokenizes an instruction set for a semiconductor fabrication process, such that operation on the distributed ledger provides provable access to the fabrication process. In embodiments, provided herein is a transaction-enabling system having a machine that automatically sells its compute capacity on a forward market for compute capacity and having a distributed ledger that tokenizes a firmware program, such that operation on the distributed ledger provides provable access to the firmware program. In embodiments, provided herein is a transaction-enabling system having a machine that automatically sells its compute capacity on a forward market for compute capacity and having a distributed ledger that tokenizes an instruction set for an FPGA, such that operation on the distributed ledger provides provable access to the FPGA. In embodiments, provided herein is a transaction-enabling system having a machine that automatically sells its compute capacity on a forward market for compute capacity and having a distributed ledger that tokenizes serverless code logic, such that operation on the distributed ledger provides provable access to the serverless code logic. In embodiments, provided herein is a transaction-enabling system having a machine that automatically sells its compute capacity on a forward market for compute capacity and having a distributed ledger that tokenizes an instruction set for a crystal fabrication system, such that operation on the distributed ledger provides provable access to the instruction set. In embodiments, provided herein is a transaction-enabling system having a machine that automatically sells its compute capacity on a forward market for compute capacity and having a distributed ledger that tokenizes an instruction set for a food preparation process, such that operation on the distributed ledger provides provable access to the instruction set. In embodiments, provided herein is a transaction-enabling system having a machine that automatically sells its compute capacity on a forward market for compute capacity and having a distributed ledger that tokenizes an instruction set for a polymer production process, such that operation on the distributed ledger provides provable access to the instruction set. In embodiments, provided herein is a transaction-enabling system having a machine that automatically sells its compute capacity on a forward market for compute capacity and having a distributed ledger that tokenizes an instruction set for chemical synthesis process, such that operation on the distributed ledger provides provable access to the instruction set. In embodiments, provided herein is a transaction-enabling system having a machine that automatically sells its compute capacity on a forward market for compute capacity and having a distributed ledger that tokenizes an instruction set for a biological production process, such that operation on the distributed ledger provides provable access to the instruction set. In embodiments, provided herein is a transaction-enabling system having a machine that automatically sells its compute capacity on a forward market for compute capacity and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically sells its compute capacity on a forward market for compute capacity and having a distributed ledger that aggregates views of a trade secret into a chain that proves which and how many parties have viewed the trade secret. In embodiments, provided herein is a transaction-enabling system having a machine that automatically sells its compute capacity on a forward market for compute capacity and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically sells its compute capacity on a forward market for compute capacity and having a distributed ledger that tokenizes an item of intellectual property and a reporting system that reports an analytic result based on the operations performed on the distributed ledger or the intellectual property. In embodiments, provided herein is a transaction-enabling system having a machine that automatically sells its compute capacity on a forward market for compute capacity and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically sells its compute capacity on a forward market for compute capacity and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically sells its compute capacity on a forward market for compute capacity and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically sells its compute capacity on a forward market for compute capacity and having a self-executing cryptocurrency coin that commits a transaction upon recognizing a location-based parameter that provides favorable tax treatment. In embodiments, provided herein is a transaction-enabling system having a machine that automatically sells its compute capacity on a forward market for compute capacity and having an expert system that uses machine learning to optimize the execution of cryptocurrency transactions based on tax status. In embodiments, provided herein is a transaction-enabling system having a machine that automatically sells its compute capacity on a forward market for compute capacity and having an expert system that aggregates regulatory information covering cryptocurrency transactions and automatically selects a jurisdiction for an operation based on the regulatory information. In embodiments, provided herein is a transaction-enabling system having a machine that automatically sells its compute capacity on a forward market for compute capacity and having an expert system that uses machine learning to optimize the execution of a cryptocurrency transaction based on real time energy price information for an available energy source. In embodiments, provided herein is a transaction-enabling system having a machine that automatically sells its compute capacity on a forward market for compute capacity and having an expert system that uses machine learning to optimize the execution of a cryptocurrency transaction based on an understanding of available energy sources to power computing resources to execute the transaction. In embodiments, provided herein is a transaction-enabling system having a machine that automatically sells its compute capacity on a forward market for compute capacity and having an expert system that uses machine learning to optimize charging and recharging cycle of a rechargeable battery system to provide energy for execution of a cryptocurrency transaction. In embodiments, provided herein is a transaction-enabling system having a machine that automatically sells its compute capacity on a forward market for compute capacity and having an expert system that predicts a forward market price in a market based on an understanding obtained by analyzing Internet of Things data sources and executes a transaction based on the forward market prediction. In embodiments, provided herein is a transaction-enabling system having a machine that automatically sells its compute capacity on a forward market for compute capacity and having an expert system that predicts a forward market price in a market based on an understanding obtained by analyzing social network data sources and executes a transaction based on the forward market prediction. In embodiments, provided herein is a transaction-enabling system having a machine that automatically sells its compute capacity on a forward market for compute capacity and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically sells its compute capacity on a forward market for compute capacity and having an expert system that predicts a forward market price in a market based on an understanding obtained by analyzing social network data sources and executes a cryptocurrency transaction based on the forward market prediction. In embodiments, provided herein is a transaction-enabling system having a machine that automatically sells its compute capacity on a forward market for compute capacity and having an expert system that predicts a forward market price in an energy market based on an understanding obtained by analyzing Internet of Things data sources and executes a transaction based on the forward market prediction. In embodiments, provided herein is a transaction-enabling system having a machine that automatically sells its compute capacity on a forward market for compute capacity and having an expert system that predicts a forward market price in an energy market based on an understanding obtained by analyzing social network data sources and executes a transaction based on the forward market prediction. In embodiments, provided herein is a transaction-enabling system having a machine that automatically sells its compute capacity on a forward market for compute capacity and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically sells its compute capacity on a forward market for compute capacity and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically sells its compute capacity on a forward market for compute capacity and having an expert system that predicts a forward market price in a market for computing resources based on an understanding obtained by analyzing social network data sources and executes a transaction based on the forward market prediction. In embodiments, provided herein is a transaction-enabling system having a machine that automatically sells its compute capacity on a forward market for compute capacity and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically sells its compute capacity on a forward market for compute capacity and having an expert system that predicts a forward market price in a market for advertising based on an understanding obtained by analyzing social network data sources and executes a transaction based on the forward market prediction. In embodiments, provided herein is a transaction-enabling system having a machine that automatically sells its compute capacity on a forward market for compute capacity and having a machine that automatically forecasts forward market pricing of energy prices based on information collected from automated agent behavioral data sources. In embodiments, provided herein is a transaction-enabling system having a machine that automatically sells its compute capacity on a forward market for compute capacity and having a machine that automatically forecasts forward market pricing of network spectrum based on information collected from automated agent behavioral data sources. In embodiments, provided herein is a transaction-enabling system having a machine that automatically sells its compute capacity on a forward market for compute capacity and having a machine that automatically forecasts forward market pricing of energy credits based on information collected from automated agent behavioral data sources. In embodiments, provided herein is a transaction-enabling system having a machine that automatically sells its compute capacity on a forward market for compute capacity and having a machine that automatically forecasts forward market value of compute capability based on information collected from automated agent behavioral data sources. In embodiments, provided herein is a transaction-enabling system having a machine that automatically sells its compute capacity on a forward market for compute capacity and having a machine that automatically forecasts forward market pricing of energy prices based on information collected from business entity behavioral data sources. In embodiments, provided herein is a transaction-enabling system having a machine that automatically sells its compute capacity on a forward market for compute capacity and having a machine that automatically forecasts forward market pricing of network spectrum based on information collected from business entity behavioral data sources. In embodiments, provided herein is a transaction-enabling system having a machine that automatically sells its compute capacity on a forward market for compute capacity and having a machine that automatically forecasts forward market pricing of energy credits based on information collected from business entity behavioral data sources. In embodiments, provided herein is a transaction-enabling system having a machine that automatically sells its compute capacity on a forward market for compute capacity and having a machine that automatically forecasts forward market value of compute capability based on information collected from business entity behavioral data sources. In embodiments, provided herein is a transaction-enabling system having a machine that automatically sells its compute capacity on a forward market for compute capacity and having a machine that automatically forecasts forward market pricing of energy prices based on information collected from human behavioral data sources. In embodiments, provided herein is a transaction-enabling system having a machine that automatically sells its compute capacity on a forward market for compute capacity and having a machine that automatically forecasts forward market pricing of network spectrum based on information collected from human behavioral data sources. In embodiments, provided herein is a transaction-enabling system having a machine that automatically sells its compute capacity on a forward market for compute capacity and having a machine that automatically forecasts forward market pricing of energy credits based on information collected from human behavioral data sources. In embodiments, provided herein is a transaction-enabling system having a machine that automatically sells its compute capacity on a forward market for compute capacity and having a machine that automatically forecasts forward market value of compute capability based on information collected from human behavioral data sources. In embodiments, provided herein is a transaction-enabling system having a machine that automatically sells its compute capacity on a forward market for compute capacity and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically sells its compute capacity on a forward market for compute capacity and having an intelligent agent that is configured to solicit the attention resources of another external intelligent agent. In embodiments, provided herein is a transaction-enabling system having a machine that automatically sells its compute capacity on a forward market for compute capacity and having a machine that automatically purchases attention resources in a forward market for attention. In embodiments, provided herein is a transaction-enabling system having a machine that automatically sells its compute capacity on a forward market for compute capacity and having a fleet of machines that automatically aggregate purchasing in a forward market for attention. In embodiments, provided herein is a transaction-enabling system having a machine that automatically sells its compute capacity on a forward market for compute capacity and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically sells its compute capacity on a forward market for compute capacity and having a system for learning on a training set of facility outcomes, facility parameters, and data collected from data sources to train an artificial intelligence/machine learning system to predict a facility production outcome. In embodiments, provided herein is a transaction-enabling system having a machine that automatically sells its compute capacity on a forward market for compute capacity and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically sells its compute capacity on a forward market for compute capacity and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically sells its compute capacity on a forward market for compute capacity and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically sells its compute capacity on a forward market for compute capacity and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically sells its compute capacity on a forward market for compute capacity and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically sells its compute capacity on a forward market for compute capacity and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically sells its compute capacity on a forward market for compute capacity and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically sells its compute capacity on a forward market for compute capacity and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically sells its compute capacity on a forward market for compute capacity and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically sells its compute capacity on a forward market for compute capacity and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically sells its compute capacity on a forward market for compute capacity and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically sells its compute capacity on a forward market for compute capacity and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically sells its compute storage capacity on a forward market for storage capacity. In embodiments, provided herein is a transaction-enabling system having a machine that automatically sells its compute storage capacity on a forward market for storage capacity and having a machine that automatically sells its energy storage capacity on a forward market for energy storage capacity. In embodiments, provided herein is a transaction-enabling system having a machine that automatically sells its compute storage capacity on a forward market for storage capacity and having a machine that automatically sells its network bandwidth on a forward market for network capacity. In embodiments, provided herein is a transaction-enabling system having a machine that automatically sells its compute storage capacity on a forward market for storage capacity and having a fleet of machines that automatically purchase spectrum allocation in a forward market for network spectrum. In embodiments, provided herein is a transaction-enabling system having a machine that automatically sells its compute storage capacity on a forward market for storage capacity and having a fleet of machines that automatically optimize energy utilization for compute task allocation. In embodiments, provided herein is a transaction-enabling system having a machine that automatically sells its compute storage capacity on a forward market for storage capacity and having a fleet of machines that automatically aggregate data on collective optimization of forward market purchases of energy. In embodiments, provided herein is a transaction-enabling system having a machine that automatically sells its compute storage capacity on a forward market for storage capacity and having a fleet of machines that automatically aggregate data on collective optimization of forward market purchases of energy credits. In embodiments, provided herein is a transaction-enabling system having a machine that automatically sells its compute storage capacity on a forward market for storage capacity and having a fleet of machines that automatically aggregate data on collective optimization of forward market purchases of network spectrum. In embodiments, provided herein is a transaction-enabling system having a machine that automatically sells its compute storage capacity on a forward market for storage capacity and having a fleet of machines that automatically aggregate data on collective optimization of forward market sales of compute capacity. In embodiments, provided herein is a transaction-enabling system having a machine that automatically sells its compute storage capacity on a forward market for storage capacity and having a machine that automatically purchases its energy in a spot market for energy. In embodiments, provided herein is a transaction-enabling system having a machine that automatically sells its compute storage capacity on a forward market for storage capacity and having a machine that automatically purchases energy credits in a spot market. In embodiments, provided herein is a transaction-enabling system having a machine that automatically sells its compute storage capacity on a forward market for storage capacity and having a fleet of machines that automatically aggregate purchasing in a spot market for energy. In embodiments, provided herein is a transaction-enabling system having a machine that automatically sells its compute storage capacity on a forward market for storage capacity and having a fleet of machines that automatically aggregate purchasing energy credits in a spot market. In embodiments, provided herein is a transaction-enabling system having a machine that automatically sells its compute storage capacity on a forward market for storage capacity and having a machine that automatically purchases spectrum allocation in a spot market for network spectrum. In embodiments, provided herein is a transaction-enabling system having a machine that automatically sells its compute storage capacity on a forward market for storage capacity and having a fleet of machines that automatically purchase spectrum allocation in a spot market for network spectrum. In embodiments, provided herein is a transaction-enabling system having a machine that automatically sells its compute storage capacity on a forward market for storage capacity and having a fleet of machines that automatically optimize energy utilization for compute task allocation. In embodiments, provided herein is a transaction-enabling system having a machine that automatically sells its compute storage capacity on a forward market for storage capacity and having a fleet of machines that automatically aggregate data on collective optimization of spot market purchases of energy. In embodiments, provided herein is a transaction-enabling system having a machine that automatically sells its compute storage capacity on a forward market for storage capacity and having a fleet of machines that automatically aggregate data on collective optimization of spot market purchases of energy credits. In embodiments, provided herein is a transaction-enabling system having a machine that automatically sells its compute storage capacity on a forward market for storage capacity and having a fleet of machines that automatically aggregate data on collective optimization of spot market purchases of network spectrum. In embodiments, provided herein is a transaction-enabling system having a machine that automatically sells its compute storage capacity on a forward market for storage capacity and having a fleet of machines that automatically sell their aggregate compute capacity on a forward market for compute capacity. In embodiments, provided herein is a transaction-enabling system having a machine that automatically sells its compute storage capacity on a forward market for storage capacity and having a fleet of machines that automatically sell their aggregate compute storage capacity on a forward market for storage capacity. In embodiments, provided herein is a transaction-enabling system having a machine that automatically sells its compute storage capacity on a forward market for storage capacity and having a fleet of machines that automatically sell their aggregate energy storage capacity on a forward market for energy storage capacity. In embodiments, provided herein is a transaction-enabling system having a machine that automatically sells its compute storage capacity on a forward market for storage capacity and having a fleet of machines that automatically sell their aggregate network bandwidth on a forward market for network capacity. In embodiments, provided herein is a transaction-enabling system having a machine that automatically sells its compute storage capacity on a forward market for storage capacity and having a machine that automatically forecasts forward market pricing of energy prices based on information collected from social media data sources. In embodiments, provided herein is a transaction-enabling system having a machine that automatically sells its compute storage capacity on a forward market for storage capacity and having a machine that automatically forecasts forward market pricing of network spectrum based on information collected from social media data sources. In embodiments, provided herein is a transaction-enabling system having a machine that automatically sells its compute storage capacity on a forward market for storage capacity and having a machine that automatically forecasts forward market pricing of energy credits based on information collected from social media data sources. In embodiments, provided herein is a transaction-enabling system having a machine that automatically sells its compute storage capacity on a forward market for storage capacity and having a machine that automatically forecasts forward market value of compute capability based on information collected from social media data sources. In embodiments, provided herein is a transaction-enabling system having a machine that automatically sells its compute storage capacity on a forward market for storage capacity and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically sells its compute storage capacity on a forward market for storage capacity and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically sells its compute storage capacity on a forward market for storage capacity and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically sells its compute storage capacity on a forward market for storage capacity and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically sells its compute storage capacity on a forward market for storage capacity and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically sells its compute storage capacity on a forward market for storage capacity and having a machine that automatically allocates its energy capacity among a core task, a compute task, an energy storage task, a data storage task, and a networking task. In embodiments, provided herein is a transaction-enabling system having a machine that automatically sells its compute storage capacity on a forward market for storage capacity and having a machine that automatically allocates its compute capacity among a core task, a compute task, an energy storage task, a data storage task, and a networking task. In embodiments, provided herein is a transaction-enabling system having a machine that automatically sells its compute storage capacity on a forward market for storage capacity and having a machine that automatically allocates its networking capacity among a core task, a compute task, an energy storage task, a data storage task, and a networking task. In embodiments, provided herein is a transaction-enabling system having a machine that automatically sells its compute storage capacity on a forward market for storage capacity and having a fleet of machines that automatically allocate collective energy capacity among a core task, a compute task, an energy storage task, a data storage task, and a networking task. In embodiments, provided herein is a transaction-enabling system having a machine that automatically sells its compute storage capacity on a forward market for storage capacity and having a fleet of machines that automatically allocate collective compute capacity among a core task, a compute task, an energy storage task, a data storage task, and a networking task. In embodiments, provided herein is a transaction-enabling system having a machine that automatically sells its compute storage capacity on a forward market for storage capacity and having a fleet of machines that automatically allocate collective networking capacity among a core task, a compute task, an energy storage task, a data storage task, and a networking task. In embodiments, provided herein is a transaction-enabling system having a machine that automatically sells its compute storage capacity on a forward market for storage capacity and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically sells its compute storage capacity on a forward market for storage capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically sells its compute storage capacity on a forward market for storage capacity and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically sells its compute storage capacity on a forward market for storage capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically sells its compute storage capacity on a forward market for storage capacity and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically sells its compute storage capacity on a forward market for storage capacity and having a distributed ledger that tokenizes an instruction set, such that operation on the distributed ledger provides provable access to the instruction set. In embodiments, provided herein is a transaction-enabling system having a machine that automatically sells its compute storage capacity on a forward market for storage capacity and having a distributed ledger that tokenizes executable algorithmic logic, such that operation on the distributed ledger provides provable access to the executable algorithmic logic. In embodiments, provided herein is a transaction-enabling system having a machine that automatically sells its compute storage capacity on a forward market for storage capacity and having a distributed ledger that tokenizes a 3D printer instruction set, such that operation on the distributed ledger provides provable access to the instruction set. In embodiments, provided herein is a transaction-enabling system having a machine that automatically sells its compute storage capacity on a forward market for storage capacity and having a distributed ledger that tokenizes an instruction set for a coating process, such that operation on the distributed ledger provides provable access to the instruction set. In embodiments, provided herein is a transaction-enabling system having a machine that automatically sells its compute storage capacity on a forward market for storage capacity and having a distributed ledger that tokenizes an instruction set for a semiconductor fabrication process, such that operation on the distributed ledger provides provable access to the fabrication process. In embodiments, provided herein is a transaction-enabling system having a machine that automatically sells its compute storage capacity on a forward market for storage capacity and having a distributed ledger that tokenizes a firmware program, such that operation on the distributed ledger provides provable access to the firmware program. In embodiments, provided herein is a transaction-enabling system having a machine that automatically sells its compute storage capacity on a forward market for storage capacity and having a distributed ledger that tokenizes an instruction set for an FPGA, such that operation on the distributed ledger provides provable access to the FPGA. In embodiments, provided herein is a transaction-enabling system having a machine that automatically sells its compute storage capacity on a forward market for storage capacity and having a distributed ledger that tokenizes serverless code logic, such that operation on the distributed ledger provides provable access to the serverless code logic. In embodiments, provided herein is a transaction-enabling system having a machine that automatically sells its compute storage capacity on a forward market for storage capacity and having a distributed ledger that tokenizes an instruction set for a crystal fabrication system, such that operation on the distributed ledger provides provable access to the instruction set. In embodiments, provided herein is a transaction-enabling system having a machine that automatically sells its compute storage capacity on a forward market for storage capacity and having a distributed ledger that tokenizes an instruction set for a food preparation process, such that operation on the distributed ledger provides provable access to the instruction set. In embodiments, provided herein is a transaction-enabling system having a machine that automatically sells its compute storage capacity on a forward market for storage capacity and having a distributed ledger that tokenizes an instruction set for a polymer production process, such that operation on the distributed ledger provides provable access to the instruction set. In embodiments, provided herein is a transaction-enabling system having a machine that automatically sells its compute storage capacity on a forward market for storage capacity and having a distributed ledger that tokenizes an instruction set for chemical synthesis process, such that operation on the distributed ledger provides provable access to the instruction set. In embodiments, provided herein is a transaction-enabling system having a machine that automatically sells its compute storage capacity on a forward market for storage capacity and having a distributed ledger that tokenizes an instruction set for a biological production process, such that operation on the distributed ledger provides provable access to the instruction set. In embodiments, provided herein is a transaction-enabling system having a machine that automatically sells its compute storage capacity on a forward market for storage capacity and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically sells its compute storage capacity on a forward market for storage capacity and having a distributed ledger that aggregates views of a trade secret into a chain that proves which and how many parties have viewed the trade secret. In embodiments, provided herein is a transaction-enabling system having a machine that automatically sells its compute storage capacity on a forward market for storage capacity and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically sells its compute storage capacity on a forward market for storage capacity and having a distributed ledger that tokenizes an item of intellectual property and a reporting system that reports an analytic result based on the operations performed on the distributed ledger or the intellectual property. In embodiments, provided herein is a transaction-enabling system having a machine that automatically sells its compute storage capacity on a forward market for storage capacity and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically sells its compute storage capacity on a forward market for storage capacity and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically sells its compute storage capacity on a forward market for storage capacity and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically sells its compute storage capacity on a forward market for storage capacity and having a self-executing cryptocurrency coin that commits a transaction upon recognizing a location-based parameter that provides favorable tax treatment. In embodiments, provided herein is a transaction-enabling system having a machine that automatically sells its compute storage capacity on a forward market for storage capacity and having an expert system that uses machine learning to optimize the execution of cryptocurrency transactions based on tax status. In embodiments, provided herein is a transaction-enabling system having a machine that automatically sells its compute storage capacity on a forward market for storage capacity and having an expert system that aggregates regulatory information covering cryptocurrency transactions and automatically selects a jurisdiction for an operation based on the regulatory information. In embodiments, provided herein is a transaction-enabling system having a machine that automatically sells its compute storage capacity on a forward market for storage capacity and having an expert system that uses machine learning to optimize the execution of a cryptocurrency transaction based on real time energy price information for an available energy source. In embodiments, provided herein is a transaction-enabling system having a machine that automatically sells its compute storage capacity on a forward market for storage capacity and having an expert system that uses machine learning to optimize the execution of a cryptocurrency transaction based on an understanding of available energy sources to power computing resources to execute the transaction. In embodiments, provided herein is a transaction-enabling system having a machine that automatically sells its compute storage capacity on a forward market for storage capacity and having an expert system that uses machine learning to optimize charging and recharging cycle of a rechargeable battery system to provide energy for execution of a cryptocurrency transaction. In embodiments, provided herein is a transaction-enabling system having a machine that automatically sells its compute storage capacity on a forward market for storage capacity and having an expert system that predicts a forward market price in a market based on an understanding obtained by analyzing Internet of Things data sources and executes a transaction based on the forward market prediction. In embodiments, provided herein is a transaction-enabling system having a machine that automatically sells its compute storage capacity on a forward market for storage capacity and having an expert system that predicts a forward market price in a market based on an understanding obtained by analyzing social network data sources and executes a transaction based on the forward market prediction. In embodiments, provided herein is a transaction-enabling system having a machine that automatically sells its compute storage capacity on a forward market for storage capacity and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically sells its compute storage capacity on a forward market for storage capacity and having an expert system that predicts a forward market price in a market based on an understanding obtained by analyzing social network data sources and executes a cryptocurrency transaction based on the forward market prediction. In embodiments, provided herein is a transaction-enabling system having a machine that automatically sells its compute storage capacity on a forward market for storage capacity and having an expert system that predicts a forward market price in an energy market based on an understanding obtained by analyzing Internet of Things data sources and executes a transaction based on the forward market prediction. In embodiments, provided herein is a transaction-enabling system having a machine that automatically sells its compute storage capacity on a forward market for storage capacity and having an expert system that predicts a forward market price in an energy market based on an understanding obtained by analyzing social network data sources and executes a transaction based on the forward market prediction. In embodiments, provided herein is a transaction-enabling system having a machine that automatically sells its compute storage capacity on a forward market for storage capacity and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically sells its compute storage capacity on a forward market for storage capacity and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically sells its compute storage capacity on a forward market for storage capacity and having an expert system that predicts a forward market price in a market for computing resources based on an understanding obtained by analyzing social network data sources and executes a transaction based on the forward market prediction. In embodiments, provided herein is a transaction-enabling system having a machine that automatically sells its compute storage capacity on a forward market for storage capacity and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically sells its compute storage capacity on a forward market for storage capacity and having an expert system that predicts a forward market price in a market for advertising based on an understanding obtained by analyzing social network data sources and executes a transaction based on the forward market prediction. In embodiments, provided herein is a transaction-enabling system having a machine that automatically sells its compute storage capacity on a forward market for storage capacity and having a machine that automatically forecasts forward market pricing of energy prices based on information collected from automated agent behavioral data sources. In embodiments, provided herein is a transaction-enabling system having a machine that automatically sells its compute storage capacity on a forward market for storage capacity and having a machine that automatically forecasts forward market pricing of network spectrum based on information collected from automated agent behavioral data sources. In embodiments, provided herein is a transaction-enabling system having a machine that automatically sells its compute storage capacity on a forward market for storage capacity and having a machine that automatically forecasts forward market pricing of energy credits based on information collected from automated agent behavioral data sources. In embodiments, provided herein is a transaction-enabling system having a machine that automatically sells its compute storage capacity on a forward market for storage capacity and having a machine that automatically forecasts forward market value of compute capability based on information collected from automated agent behavioral data sources. In embodiments, provided herein is a transaction-enabling system having a machine that automatically sells its compute storage capacity on a forward market for storage capacity and having a machine that automatically forecasts forward market pricing of energy prices based on information collected from business entity behavioral data sources. In embodiments, provided herein is a transaction-enabling system having a machine that automatically sells its compute storage capacity on a forward market for storage capacity and having a machine that automatically forecasts forward market pricing of network spectrum based on information collected from business entity behavioral data sources. In embodiments, provided herein is a transaction-enabling system having a machine that automatically sells its compute storage capacity on a forward market for storage capacity and having a machine that automatically forecasts forward market pricing of energy credits based on information collected from business entity behavioral data sources. In embodiments, provided herein is a transaction-enabling system having a machine that automatically sells its compute storage capacity on a forward market for storage capacity and having a machine that automatically forecasts forward market value of compute capability based on information collected from business entity behavioral data sources. In embodiments, provided herein is a transaction-enabling system having a machine that automatically sells its compute storage capacity on a forward market for storage capacity and having a machine that automatically forecasts forward market pricing of energy prices based on information collected from human behavioral data sources. In embodiments, provided herein is a transaction-enabling system having a machine that automatically sells its compute storage capacity on a forward market for storage capacity and having a machine that automatically forecasts forward market pricing of network spectrum based on information collected from human behavioral data sources. In embodiments, provided herein is a transaction-enabling system having a machine that automatically sells its compute storage capacity on a forward market for storage capacity and having a machine that automatically forecasts forward market pricing of energy credits based on information collected from human behavioral data sources. In embodiments, provided herein is a transaction-enabling system having a machine that automatically sells its compute storage capacity on a forward market for storage capacity and having a machine that automatically forecasts forward market value of compute capability based on information collected from human behavioral data sources. In embodiments, provided herein is a transaction-enabling system having a machine that automatically sells its compute storage capacity on a forward market for storage capacity and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically sells its compute storage capacity on a forward market for storage capacity and having an intelligent agent that is configured to solicit the attention resources of another external intelligent agent. In embodiments, provided herein is a transaction-enabling system having a machine that automatically sells its compute storage capacity on a forward market for storage capacity and having a machine that automatically purchases attention resources in a forward market for attention. In embodiments, provided herein is a transaction-enabling system having a machine that automatically sells its compute storage capacity on a forward market for storage capacity and having a fleet of machines that automatically aggregate purchasing in a forward market for attention. In embodiments, provided herein is a transaction-enabling system having a machine that automatically sells its compute storage capacity on a forward market for storage capacity and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically sells its compute storage capacity on a forward market for storage capacity and having a system for learning on a training set of facility outcomes, facility parameters, and data collected from data sources to train an artificial intelligence/machine learning system to predict a facility production outcome. In embodiments, provided herein is a transaction-enabling system having a machine that automatically sells its compute storage capacity on a forward market for storage capacity and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically sells its compute storage capacity on a forward market for storage capacity and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically sells its compute storage capacity on a forward market for storage capacity and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically sells its compute storage capacity on a forward market for storage capacity and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically sells its compute storage capacity on a forward market for storage capacity and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically sells its compute storage capacity on a forward market for storage capacity and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically sells its compute storage capacity on a forward market for storage capacity and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically sells its compute storage capacity on a forward market for storage capacity and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically sells its compute storage capacity on a forward market for storage capacity and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically sells its compute storage capacity on a forward market for storage capacity and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically sells its compute storage capacity on a forward market for storage capacity and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically sells its compute storage capacity on a forward market for storage capacity and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically sells its energy storage capacity on a forward market for energy storage capacity. In embodiments, provided herein is a transaction-enabling system having a machine that automatically sells its energy storage capacity on a forward market for energy storage capacity and having a machine that automatically sells its network bandwidth on a forward market for network capacity. In embodiments, provided herein is a transaction-enabling system having a machine that automatically sells its energy storage capacity on a forward market for energy storage capacity and having a fleet of machines that automatically purchase spectrum allocation in a forward market for network spectrum. In embodiments, provided herein is a transaction-enabling system having a machine that automatically sells its energy storage capacity on a forward market for energy storage capacity and having a fleet of machines that automatically optimize energy utilization for compute task allocation. In embodiments, provided herein is a transaction-enabling system having a machine that automatically sells its energy storage capacity on a forward market for energy storage capacity and having a fleet of machines that automatically aggregate data on collective optimization of forward market purchases of energy. In embodiments, provided herein is a transaction-enabling system having a machine that automatically sells its energy storage capacity on a forward market for energy storage capacity and having a fleet of machines that automatically aggregate data on collective optimization of forward market purchases of energy credits. In embodiments, provided herein is a transaction-enabling system having a machine that automatically sells its energy storage capacity on a forward market for energy storage capacity and having a fleet of machines that automatically aggregate data on collective optimization of forward market purchases of network spectrum. In embodiments, provided herein is a transaction-enabling system having a machine that automatically sells its energy storage capacity on a forward market for energy storage capacity and having a fleet of machines that automatically aggregate data on collective optimization of forward market sales of compute capacity. In embodiments, provided herein is a transaction-enabling system having a machine that automatically sells its energy storage capacity on a forward market for energy storage capacity and having a machine that automatically purchases its energy in a spot market for energy. In embodiments, provided herein is a transaction-enabling system having a machine that automatically sells its energy storage capacity on a forward market for energy storage capacity and having a machine that automatically purchases energy credits in a spot market. In embodiments, provided herein is a transaction-enabling system having a machine that automatically sells its energy storage capacity on a forward market for energy storage capacity and having a fleet of machines that automatically aggregate purchasing in a spot market for energy. In embodiments, provided herein is a transaction-enabling system having a machine that automatically sells its energy storage capacity on a forward market for energy storage capacity and having a fleet of machines that automatically aggregate purchasing energy credits in a spot market. In embodiments, provided herein is a transaction-enabling system having a machine that automatically sells its energy storage capacity on a forward market for energy storage capacity and having a machine that automatically purchases spectrum allocation in a spot market for network spectrum. In embodiments, provided herein is a transaction-enabling system having a machine that automatically sells its energy storage capacity on a forward market for energy storage capacity and having a fleet of machines that automatically purchase spectrum allocation in a spot market for network spectrum. In embodiments, provided herein is a transaction-enabling system having a machine that automatically sells its energy storage capacity on a forward market for energy storage capacity and having a fleet of machines that automatically optimize energy utilization for compute task allocation. In embodiments, provided herein is a transaction-enabling system having a machine that automatically sells its energy storage capacity on a forward market for energy storage capacity and having a fleet of machines that automatically aggregate data on collective optimization of spot market purchases of energy. In embodiments, provided herein is a transaction-enabling system having a machine that automatically sells its energy storage capacity on a forward market for energy storage capacity and having a fleet of machines that automatically aggregate data on collective optimization of spot market purchases of energy credits. In embodiments, provided herein is a transaction-enabling system having a machine that automatically sells its energy storage capacity on a forward market for energy storage capacity and having a fleet of machines that automatically aggregate data on collective optimization of spot market purchases of network spectrum. In embodiments, provided herein is a transaction-enabling system having a machine that automatically sells its energy storage capacity on a forward market for energy storage capacity and having a fleet of machines that automatically sell their aggregate compute capacity on a forward market for compute capacity. In embodiments, provided herein is a transaction-enabling system having a machine that automatically sells its energy storage capacity on a forward market for energy storage capacity and having a fleet of machines that automatically sell their aggregate compute storage capacity on a forward market for storage capacity. In embodiments, provided herein is a transaction-enabling system having a machine that automatically sells its energy storage capacity on a forward market for energy storage capacity and having a fleet of machines that automatically sell their aggregate energy storage capacity on a forward market for energy storage capacity. In embodiments, provided herein is a transaction-enabling system having a machine that automatically sells its energy storage capacity on a forward market for energy storage capacity and having a fleet of machines that automatically sell their aggregate network bandwidth on a forward market for network capacity. In embodiments, provided herein is a transaction-enabling system having a machine that automatically sells its energy storage capacity on a forward market for energy storage capacity and having a machine that automatically forecasts forward market pricing of energy prices based on information collected from social media data sources. In embodiments, provided herein is a transaction-enabling system having a machine that automatically sells its energy storage capacity on a forward market for energy storage capacity and having a machine that automatically forecasts forward market pricing of network spectrum based on information collected from social media data sources. In embodiments, provided herein is a transaction-enabling system having a machine that automatically sells its energy storage capacity on a forward market for energy storage capacity and having a machine that automatically forecasts forward market pricing of energy credits based on information collected from social media data sources. In embodiments, provided herein is a transaction-enabling system having a machine that automatically sells its energy storage capacity on a forward market for energy storage capacity and having a machine that automatically forecasts forward market value of compute capability based on information collected from social media data sources. In embodiments, provided herein is a transaction-enabling system having a machine that automatically sells its energy storage capacity on a forward market for energy storage capacity and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically sells its energy storage capacity on a forward market for energy storage capacity and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically sells its energy storage capacity on a forward market for energy storage capacity and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically sells its energy storage capacity on a forward market for energy storage capacity and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically sells its energy storage capacity on a forward market for energy storage capacity and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically sells its energy storage capacity on a forward market for energy storage capacity and having a machine that automatically allocates its energy capacity among a core task, a compute task, an energy storage task, a data storage task, and a networking task. In embodiments, provided herein is a transaction-enabling system having a machine that automatically sells its energy storage capacity on a forward market for energy storage capacity and having a machine that automatically allocates its compute capacity among a core task, a compute task, an energy storage task, a data storage task, and a networking task. In embodiments, provided herein is a transaction-enabling system having a machine that automatically sells its energy storage capacity on a forward market for energy storage capacity and having a machine that automatically allocates its networking capacity among a core task, a compute task, an energy storage task, a data storage task, and a networking task. In embodiments, provided herein is a transaction-enabling system having a machine that automatically sells its energy storage capacity on a forward market for energy storage capacity and having a fleet of machines that automatically allocate collective energy capacity among a core task, a compute task, an energy storage task, a data storage task, and a networking task. In embodiments, provided herein is a transaction-enabling system having a machine that automatically sells its energy storage capacity on a forward market for energy storage capacity and having a fleet of machines that automatically allocate collective compute capacity among a core task, a compute task, an energy storage task, a data storage task, and a networking task. In embodiments, provided herein is a transaction-enabling system having a machine that automatically sells its energy storage capacity on a forward market for energy storage capacity and having a fleet of machines that automatically allocate collective networking capacity among a core task, a compute task, an energy storage task, a data storage task, and a networking task. In embodiments, provided herein is a transaction-enabling system having a machine that automatically sells its energy storage capacity on a forward market for energy storage capacity and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically sells its energy storage capacity on a forward market for energy storage capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically sells its energy storage capacity on a forward market for energy storage capacity and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically sells its energy storage capacity on a forward market for energy storage capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically sells its energy storage capacity on a forward market for energy storage capacity and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically sells its energy storage capacity on a forward market for energy storage capacity and having a distributed ledger that tokenizes an instruction set, such that operation on the distributed ledger provides provable access to the instruction set. In embodiments, provided herein is a transaction-enabling system having a machine that automatically sells its energy storage capacity on a forward market for energy storage capacity and having a distributed ledger that tokenizes executable algorithmic logic, such that operation on the distributed ledger provides provable access to the executable algorithmic logic. In embodiments, provided herein is a transaction-enabling system having a machine that automatically sells its energy storage capacity on a forward market for energy storage capacity and having a distributed ledger that tokenizes a 3D printer instruction set, such that operation on the distributed ledger provides provable access to the instruction set. In embodiments, provided herein is a transaction-enabling system having a machine that automatically sells its energy storage capacity on a forward market for energy storage capacity and having a distributed ledger that tokenizes an instruction set for a coating process, such that operation on the distributed ledger provides provable access to the instruction set. In embodiments, provided herein is a transaction-enabling system having a machine that automatically sells its energy storage capacity on a forward market for energy storage capacity and having a distributed ledger that tokenizes an instruction set for a semiconductor fabrication process, such that operation on the distributed ledger provides provable access to the fabrication process. In embodiments, provided herein is a transaction-enabling system having a machine that automatically sells its energy storage capacity on a forward market for energy storage capacity and having a distributed ledger that tokenizes a firmware program, such that operation on the distributed ledger provides provable access to the firmware program. In embodiments, provided herein is a transaction-enabling system having a machine that automatically sells its energy storage capacity on a forward market for energy storage capacity and having a distributed ledger that tokenizes an instruction set for an FPGA, such that operation on the distributed ledger provides provable access to the FPGA. In embodiments, provided herein is a transaction-enabling system having a machine that automatically sells its energy storage capacity on a forward market for energy storage capacity and having a distributed ledger that tokenizes serverless code logic, such that operation on the distributed ledger provides provable access to the serverless code logic. In embodiments, provided herein is a transaction-enabling system having a machine that automatically sells its energy storage capacity on a forward market for energy storage capacity and having a distributed ledger that tokenizes an instruction set for a crystal fabrication system, such that operation on the distributed ledger provides provable access to the instruction set. In embodiments, provided herein is a transaction-enabling system having a machine that automatically sells its energy storage capacity on a forward market for energy storage capacity and having a distributed ledger that tokenizes an instruction set for a food preparation process, such that operation on the distributed ledger provides provable access to the instruction set. In embodiments, provided herein is a transaction-enabling system having a machine that automatically sells its energy storage capacity on a forward market for energy storage capacity and having a distributed ledger that tokenizes an instruction set for a polymer production process, such that operation on the distributed ledger provides provable access to the instruction set. In embodiments, provided herein is a transaction-enabling system having a machine that automatically sells its energy storage capacity on a forward market for energy storage capacity and having a distributed ledger that tokenizes an instruction set for chemical synthesis process, such that operation on the distributed ledger provides provable access to the instruction set. In embodiments, provided herein is a transaction-enabling system having a machine that automatically sells its energy storage capacity on a forward market for energy storage capacity and having a distributed ledger that tokenizes an instruction set for a biological production process, such that operation on the distributed ledger provides provable access to the instruction set. In embodiments, provided herein is a transaction-enabling system having a machine that automatically sells its energy storage capacity on a forward market for energy storage capacity and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically sells its energy storage capacity on a forward market for energy storage capacity and having a distributed ledger that aggregates views of a trade secret into a chain that proves which and how many parties have viewed the trade secret. In embodiments, provided herein is a transaction-enabling system having a machine that automatically sells its energy storage capacity on a forward market for energy storage capacity and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically sells its energy storage capacity on a forward market for energy storage capacity and having a distributed ledger that tokenizes an item of intellectual property and a reporting system that reports an analytic result based on the operations performed on the distributed ledger or the intellectual property. In embodiments, provided herein is a transaction-enabling system having a machine that automatically sells its energy storage capacity on a forward market for energy storage capacity and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically sells its energy storage capacity on a forward market for energy storage capacity and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically sells its energy storage capacity on a forward market for energy storage capacity and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically sells its energy storage capacity on a forward market for energy storage capacity and having a self-executing cryptocurrency coin that commits a transaction upon recognizing a location-based parameter that provides favorable tax treatment. In embodiments, provided herein is a transaction-enabling system having a machine that automatically sells its energy storage capacity on a forward market for energy storage capacity and having an expert system that uses machine learning to optimize the execution of cryptocurrency transactions based on tax status. In embodiments, provided herein is a transaction-enabling system having a machine that automatically sells its energy storage capacity on a forward market for energy storage capacity and having an expert system that aggregates regulatory information covering cryptocurrency transactions and automatically selects a jurisdiction for an operation based on the regulatory information. In embodiments, provided herein is a transaction-enabling system having a machine that automatically sells its energy storage capacity on a forward market for energy storage capacity and having an expert system that uses machine learning to optimize the execution of a cryptocurrency transaction based on real time energy price information for an available energy source. In embodiments, provided herein is a transaction-enabling system having a machine that automatically sells its energy storage capacity on a forward market for energy storage capacity and having an expert system that uses machine learning to optimize the execution of a cryptocurrency transaction based on an understanding of available energy sources to power computing resources to execute the transaction. In embodiments, provided herein is a transaction-enabling system having a machine that automatically sells its energy storage capacity on a forward market for energy storage capacity and having an expert system that uses machine learning to optimize charging and recharging cycle of a rechargeable battery system to provide energy for execution of a cryptocurrency transaction. In embodiments, provided herein is a transaction-enabling system having a machine that automatically sells its energy storage capacity on a forward market for energy storage capacity and having an expert system that predicts a forward market price in a market based on an understanding obtained by analyzing Internet of Things data sources and executes a transaction based on the forward market prediction. In embodiments, provided herein is a transaction-enabling system having a machine that automatically sells its energy storage capacity on a forward market for energy storage capacity and having an expert system that predicts a forward market price in a market based on an understanding obtained by analyzing social network data sources and executes a transaction based on the forward market prediction. In embodiments, provided herein is a transaction-enabling system having a machine that automatically sells its energy storage capacity on a forward market for energy storage capacity and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically sells its energy storage capacity on a forward market for energy storage capacity and having an expert system that predicts a forward market price in a market based on an understanding obtained by analyzing social network data sources and executes a cryptocurrency transaction based on the forward market prediction. In embodiments, provided herein is a transaction-enabling system having a machine that automatically sells its energy storage capacity on a forward market for energy storage capacity and having an expert system that predicts a forward market price in an energy market based on an understanding obtained by analyzing Internet of Things data sources and executes a transaction based on the forward market prediction. In embodiments, provided herein is a transaction-enabling system having a machine that automatically sells its energy storage capacity on a forward market for energy storage capacity and having an expert system that predicts a forward market price in an energy market based on an understanding obtained by analyzing social network data sources and executes a transaction based on the forward market prediction. In embodiments, provided herein is a transaction-enabling system having a machine that automatically sells its energy storage capacity on a forward market for energy storage capacity and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically sells its energy storage capacity on a forward market for energy storage capacity and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically sells its energy storage capacity on a forward market for energy storage capacity and having an expert system that predicts a forward market price in a market for computing resources based on an understanding obtained by analyzing social network data sources and executes a transaction based on the forward market prediction. In embodiments, provided herein is a transaction-enabling system having a machine that automatically sells its energy storage capacity on a forward market for energy storage capacity and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically sells its energy storage capacity on a forward market for energy storage capacity and having an expert system that predicts a forward market price in a market for advertising based on an understanding obtained by analyzing social network data sources and executes a transaction based on the forward market prediction. In embodiments, provided herein is a transaction-enabling system having a machine that automatically sells its energy storage capacity on a forward market for energy storage capacity and having a machine that automatically forecasts forward market pricing of energy prices based on information collected from automated agent behavioral data sources. In embodiments, provided herein is a transaction-enabling system having a machine that automatically sells its energy storage capacity on a forward market for energy storage capacity and having a machine that automatically forecasts forward market pricing of network spectrum based on information collected from automated agent behavioral data sources. In embodiments, provided herein is a transaction-enabling system having a machine that automatically sells its energy storage capacity on a forward market for energy storage capacity and having a machine that automatically forecasts forward market pricing of energy credits based on information collected from automated agent behavioral data sources. In embodiments, provided herein is a transaction-enabling system having a machine that automatically sells its energy storage capacity on a forward market for energy storage capacity and having a machine that automatically forecasts forward market value of compute capability based on information collected from automated agent behavioral data sources. In embodiments, provided herein is a transaction-enabling system having a machine that automatically sells its energy storage capacity on a forward market for energy storage capacity and having a machine that automatically forecasts forward market pricing of energy prices based on information collected from business entity behavioral data sources. In embodiments, provided herein is a transaction-enabling system having a machine that automatically sells its energy storage capacity on a forward market for energy storage capacity and having a machine that automatically forecasts forward market pricing of network spectrum based on information collected from business entity behavioral data sources. In embodiments, provided herein is a transaction-enabling system having a machine that automatically sells its energy storage capacity on a forward market for energy storage capacity and having a machine that automatically forecasts forward market pricing of energy credits based on information collected from business entity behavioral data sources. In embodiments, provided herein is a transaction-enabling system having a machine that automatically sells its energy storage capacity on a forward market for energy storage capacity and having a machine that automatically forecasts forward market value of compute capability based on information collected from business entity behavioral data sources. In embodiments, provided herein is a transaction-enabling system having a machine that automatically sells its energy storage capacity on a forward market for energy storage capacity and having a machine that automatically forecasts forward market pricing of energy prices based on information collected from human behavioral data sources. In embodiments, provided herein is a transaction-enabling system having a machine that automatically sells its energy storage capacity on a forward market for energy storage capacity and having a machine that automatically forecasts forward market pricing of network spectrum based on information collected from human behavioral data sources. In embodiments, provided herein is a transaction-enabling system having a machine that automatically sells its energy storage capacity on a forward market for energy storage capacity and having a machine that automatically forecasts forward market pricing of energy credits based on information collected from human behavioral data sources. In embodiments, provided herein is a transaction-enabling system having a machine that automatically sells its energy storage capacity on a forward market for energy storage capacity and having a machine that automatically forecasts forward market value of compute capability based on information collected from human behavioral data sources. In embodiments, provided herein is a transaction-enabling system having a machine that automatically sells its energy storage capacity on a forward market for energy storage capacity and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically sells its energy storage capacity on a forward market for energy storage capacity and having an intelligent agent that is configured to solicit the attention resources of another external intelligent agent. In embodiments, provided herein is a transaction-enabling system having a machine that automatically sells its energy storage capacity on a forward market for energy storage capacity and having a machine that automatically purchases attention resources in a forward market for attention. In embodiments, provided herein is a transaction-enabling system having a machine that automatically sells its energy storage capacity on a forward market for energy storage capacity and having a fleet of machines that automatically aggregate purchasing in a forward market for attention. In embodiments, provided herein is a transaction-enabling system having a machine that automatically sells its energy storage capacity on a forward market for energy storage capacity and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically sells its energy storage capacity on a forward market for energy storage capacity and having a system for learning on a training set of facility outcomes, facility parameters, and data collected from data sources to train an artificial intelligence/machine learning system to predict a facility production outcome. In embodiments, provided herein is a transaction-enabling system having a machine that automatically sells its energy storage capacity on a forward market for energy storage capacity and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically sells its energy storage capacity on a forward market for energy storage capacity and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically sells its energy storage capacity on a forward market for energy storage capacity and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically sells its energy storage capacity on a forward market for energy storage capacity and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically sells its energy storage capacity on a forward market for energy storage capacity and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically sells its energy storage capacity on a forward market for energy storage capacity and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically sells its energy storage capacity on a forward market for energy storage capacity and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically sells its energy storage capacity on a forward market for energy storage capacity and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically sells its energy storage capacity on a forward market for energy storage capacity and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically sells its energy storage capacity on a forward market for energy storage capacity and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically sells its energy storage capacity on a forward market for energy storage capacity and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically sells its energy storage capacity on a forward market for energy storage capacity and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically sells its network bandwidth on a forward market for network capacity. In embodiments, provided herein is a transaction-enabling system having a machine that automatically sells its network bandwidth on a forward market for network capacity and having a fleet of machines that automatically purchase spectrum allocation in a forward market for network spectrum. In embodiments, provided herein is a transaction-enabling system having a machine that automatically sells its network bandwidth on a forward market for network capacity and having a fleet of machines that automatically optimize energy utilization for compute task allocation. In embodiments, provided herein is a transaction-enabling system having a machine that automatically sells its network bandwidth on a forward market for network capacity and having a fleet of machines that automatically aggregate data on collective optimization of forward market purchases of energy. In embodiments, provided herein is a transaction-enabling system having a machine that automatically sells its network bandwidth on a forward market for network capacity and having a fleet of machines that automatically aggregate data on collective optimization of forward market purchases of energy credits. In embodiments, provided herein is a transaction-enabling system having a machine that automatically sells its network bandwidth on a forward market for network capacity and having a fleet of machines that automatically aggregate data on collective optimization of forward market purchases of network spectrum. In embodiments, provided herein is a transaction-enabling system having a machine that automatically sells its network bandwidth on a forward market for network capacity and having a fleet of machines that automatically aggregate data on collective optimization of forward market sales of compute capacity. In embodiments, provided herein is a transaction-enabling system having a machine that automatically sells its network bandwidth on a forward market for network capacity and having a machine that automatically purchases its energy in a spot market for energy. In embodiments, provided herein is a transaction-enabling system having a machine that automatically sells its network bandwidth on a forward market for network capacity and having a machine that automatically purchases energy credits in a spot market. In embodiments, provided herein is a transaction-enabling system having a machine that automatically sells its network bandwidth on a forward market for network capacity and having a fleet of machines that automatically aggregate purchasing in a spot market for energy. In embodiments, provided herein is a transaction-enabling system having a machine that automatically sells its network bandwidth on a forward market for network capacity and having a fleet of machines that automatically aggregate purchasing energy credits in a spot market. In embodiments, provided herein is a transaction-enabling system having a machine that automatically sells its network bandwidth on a forward market for network capacity and having a machine that automatically purchases spectrum allocation in a spot market for network spectrum. In embodiments, provided herein is a transaction-enabling system having a machine that automatically sells its network bandwidth on a forward market for network capacity and having a fleet of machines that automatically purchase spectrum allocation in a spot market for network spectrum. In embodiments, provided herein is a transaction-enabling system having a machine that automatically sells its network bandwidth on a forward market for network capacity and having a fleet of machines that automatically optimize energy utilization for compute task allocation. In embodiments, provided herein is a transaction-enabling system having a machine that automatically sells its network bandwidth on a forward market for network capacity and having a fleet of machines that automatically aggregate data on collective optimization of spot market purchases of energy. In embodiments, provided herein is a transaction-enabling system having a machine that automatically sells its network bandwidth on a forward market for network capacity and having a fleet of machines that automatically aggregate data on collective optimization of spot market purchases of energy credits. In embodiments, provided herein is a transaction-enabling system having a machine that automatically sells its network bandwidth on a forward market for network capacity and having a fleet of machines that automatically aggregate data on collective optimization of spot market purchases of network spectrum. In embodiments, provided herein is a transaction-enabling system having a machine that automatically sells its network bandwidth on a forward market for network capacity and having a fleet of machines that automatically sell their aggregate compute capacity on a forward market for compute capacity. In embodiments, provided herein is a transaction-enabling system having a machine that automatically sells its network bandwidth on a forward market for network capacity and having a fleet of machines that automatically sell their aggregate compute storage capacity on a forward market for storage capacity. In embodiments, provided herein is a transaction-enabling system having a machine that automatically sells its network bandwidth on a forward market for network capacity and having a fleet of machines that automatically sell their aggregate energy storage capacity on a forward market for energy storage capacity. In embodiments, provided herein is a transaction-enabling system having a machine that automatically sells its network bandwidth on a forward market for network capacity and having a fleet of machines that automatically sell their aggregate network bandwidth on a forward market for network capacity. In embodiments, provided herein is a transaction-enabling system having a machine that automatically sells its network bandwidth on a forward market for network capacity and having a machine that automatically forecasts forward market pricing of energy prices based on information collected from social media data sources. In embodiments, provided herein is a transaction-enabling system having a machine that automatically sells its network bandwidth on a forward market for network capacity and having a machine that automatically forecasts forward market pricing of network spectrum based on information collected from social media data sources. In embodiments, provided herein is a transaction-enabling system having a machine that automatically sells its network bandwidth on a forward market for network capacity and having a machine that automatically forecasts forward market pricing of energy credits based on information collected from social media data sources. In embodiments, provided herein is a transaction-enabling system having a machine that automatically sells its network bandwidth on a forward market for network capacity and having a machine that automatically forecasts forward market value of compute capability based on information collected from social media data sources. In embodiments, provided herein is a transaction-enabling system having a machine that automatically sells its network bandwidth on a forward market for network capacity and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically sells its network bandwidth on a forward market for network capacity and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically sells its network bandwidth on a forward market for network capacity and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically sells its network bandwidth on a forward market for network capacity and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically sells its network bandwidth on a forward market for network capacity and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically sells its network bandwidth on a forward market for network capacity and having a machine that automatically allocates its energy capacity among a core task, a compute task, an energy storage task, a data storage task, and a networking task. In embodiments, provided herein is a transaction-enabling system having a machine that automatically sells its network bandwidth on a forward market for network capacity and having a machine that automatically allocates its compute capacity among a core task, a compute task, an energy storage task, a data storage task, and a networking task. In embodiments, provided herein is a transaction-enabling system having a machine that automatically sells its network bandwidth on a forward market for network capacity and having a machine that automatically allocates its networking capacity among a core task, a compute task, an energy storage task, a data storage task, and a networking task. In embodiments, provided herein is a transaction-enabling system having a machine that automatically sells its network bandwidth on a forward market for network capacity and having a fleet of machines that automatically allocate collective energy capacity among a core task, a compute task, an energy storage task, a data storage task, and a networking task. In embodiments, provided herein is a transaction-enabling system having a machine that automatically sells its network bandwidth on a forward market for network capacity and having a fleet of machines that automatically allocate collective compute capacity among a core task, a compute task, an energy storage task, a data storage task, and a networking task. In embodiments, provided herein is a transaction-enabling system having a machine that automatically sells its network bandwidth on a forward market for network capacity and having a fleet of machines that automatically allocate collective networking capacity among a core task, a compute task, an energy storage task, a data storage task, and a networking task. In embodiments, provided herein is a transaction-enabling system having a machine that automatically sells its network bandwidth on a forward market for network capacity and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically sells its network bandwidth on a forward market for network capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically sells its network bandwidth on a forward market for network capacity and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically sells its network bandwidth on a forward market for network capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically sells its network bandwidth on a forward market for network capacity and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically sells its network bandwidth on a forward market for network capacity and having a distributed ledger that tokenizes an instruction set, such that operation on the distributed ledger provides provable access to the instruction set. In embodiments, provided herein is a transaction-enabling system having a machine that automatically sells its network bandwidth on a forward market for network capacity and having a distributed ledger that tokenizes executable algorithmic logic, such that operation on the distributed ledger provides provable access to the executable algorithmic logic. In embodiments, provided herein is a transaction-enabling system having a machine that automatically sells its network bandwidth on a forward market for network capacity and having a distributed ledger that tokenizes a 3D printer instruction set, such that operation on the distributed ledger provides provable access to the instruction set. In embodiments, provided herein is a transaction-enabling system having a machine that automatically sells its network bandwidth on a forward market for network capacity and having a distributed ledger that tokenizes an instruction set for a coating process, such that operation on the distributed ledger provides provable access to the instruction set. In embodiments, provided herein is a transaction-enabling system having a machine that automatically sells its network bandwidth on a forward market for network capacity and having a distributed ledger that tokenizes an instruction set for a semiconductor fabrication process, such that operation on the distributed ledger provides provable access to the fabrication process. In embodiments, provided herein is a transaction-enabling system having a machine that automatically sells its network bandwidth on a forward market for network capacity and having a distributed ledger that tokenizes a firmware program, such that operation on the distributed ledger provides provable access to the firmware program. In embodiments, provided herein is a transaction-enabling system having a machine that automatically sells its network bandwidth on a forward market for network capacity and having a distributed ledger that tokenizes an instruction set for an FPGA, such that operation on the distributed ledger provides provable access to the FPGA. In embodiments, provided herein is a transaction-enabling system having a machine that automatically sells its network bandwidth on a forward market for network capacity and having a distributed ledger that tokenizes serverless code logic, such that operation on the distributed ledger provides provable access to the serverless code logic. In embodiments, provided herein is a transaction-enabling system having a machine that automatically sells its network bandwidth on a forward market for network capacity and having a distributed ledger that tokenizes an instruction set for a crystal fabrication system, such that operation on the distributed ledger provides provable access to the instruction set. In embodiments, provided herein is a transaction-enabling system having a machine that automatically sells its network bandwidth on a forward market for network capacity and having a distributed ledger that tokenizes an instruction set for a food preparation process, such that operation on the distributed ledger provides provable access to the instruction set. In embodiments, provided herein is a transaction-enabling system having a machine that automatically sells its network bandwidth on a forward market for network capacity and having a distributed ledger that tokenizes an instruction set for a polymer production process, such that operation on the distributed ledger provides provable access to the instruction set. In embodiments, provided herein is a transaction-enabling system having a machine that automatically sells its network bandwidth on a forward market for network capacity and having a distributed ledger that tokenizes an instruction set for chemical synthesis process, such that operation on the distributed ledger provides provable access to the instruction set. In embodiments, provided herein is a transaction-enabling system having a machine that automatically sells its network bandwidth on a forward market for network capacity and having a distributed ledger that tokenizes an instruction set for a biological production process, such that operation on the distributed ledger provides provable access to the instruction set. In embodiments, provided herein is a transaction-enabling system having a machine that automatically sells its network bandwidth on a forward market for network capacity and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically sells its network bandwidth on a forward market for network capacity and having a distributed ledger that aggregates views of a trade secret into a chain that proves which and how many parties have viewed the trade secret. In embodiments, provided herein is a transaction-enabling system having a machine that automatically sells its network bandwidth on a forward market for network capacity and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically sells its network bandwidth on a forward market for network capacity and having a distributed ledger that tokenizes an item of intellectual property and a reporting system that reports an analytic result based on the operations performed on the distributed ledger or the intellectual property. In embodiments, provided herein is a transaction-enabling system having a machine that automatically sells its network bandwidth on a forward market for network capacity and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically sells its network bandwidth on a forward market for network capacity and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically sells its network bandwidth on a forward market for network capacity and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically sells its network bandwidth on a forward market for network capacity and having a self-executing cryptocurrency coin that commits a transaction upon recognizing a location-based parameter that provides favorable tax treatment. In embodiments, provided herein is a transaction-enabling system having a machine that automatically sells its network bandwidth on a forward market for network capacity and having an expert system that uses machine learning to optimize the execution of cryptocurrency transactions based on tax status. In embodiments, provided herein is a transaction-enabling system having a machine that automatically sells its network bandwidth on a forward market for network capacity and having an expert system that aggregates regulatory information covering cryptocurrency transactions and automatically selects a jurisdiction for an operation based on the regulatory information. In embodiments, provided herein is a transaction-enabling system having a machine that automatically sells its network bandwidth on a forward market for network capacity and having an expert system that uses machine learning to optimize the execution of a cryptocurrency transaction based on real time energy price information for an available energy source. In embodiments, provided herein is a transaction-enabling system having a machine that automatically sells its network bandwidth on a forward market for network capacity and having an expert system that uses machine learning to optimize the execution of a cryptocurrency transaction based on an understanding of available energy sources to power computing resources to execute the transaction. In embodiments, provided herein is a transaction-enabling system having a machine that automatically sells its network bandwidth on a forward market for network capacity and having an expert system that uses machine learning to optimize charging and recharging cycle of a rechargeable battery system to provide energy for execution of a cryptocurrency transaction. In embodiments, provided herein is a transaction-enabling system having a machine that automatically sells its network bandwidth on a forward market for network capacity and having an expert system that predicts a forward market price in a market based on an understanding obtained by analyzing Internet of Things data sources and executes a transaction based on the forward market prediction. In embodiments, provided herein is a transaction-enabling system having a machine that automatically sells its network bandwidth on a forward market for network capacity and having an expert system that predicts a forward market price in a market based on an understanding obtained by analyzing social network data sources and executes a transaction based on the forward market prediction. In embodiments, provided herein is a transaction-enabling system having a machine that automatically sells its network bandwidth on a forward market for network capacity and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically sells its network bandwidth on a forward market for network capacity and having an expert system that predicts a forward market price in a market based on an understanding obtained by analyzing social network data sources and executes a cryptocurrency transaction based on the forward market prediction. In embodiments, provided herein is a transaction-enabling system having a machine that automatically sells its network bandwidth on a forward market for network capacity and having an expert system that predicts a forward market price in an energy market based on an understanding obtained by analyzing Internet of Things data sources and executes a transaction based on the forward market prediction. In embodiments, provided herein is a transaction-enabling system having a machine that automatically sells its network bandwidth on a forward market for network capacity and having an expert system that predicts a forward market price in an energy market based on an understanding obtained by analyzing social network data sources and executes a transaction based on the forward market prediction. In embodiments, provided herein is a transaction-enabling system having a machine that automatically sells its network bandwidth on a forward market for network capacity and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically sells its network bandwidth on a forward market for network capacity and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically sells its network bandwidth on a forward market for network capacity and having an expert system that predicts a forward market price in a market for computing resources based on an understanding obtained by analyzing social network data sources and executes a transaction based on the forward market prediction. In embodiments, provided herein is a transaction-enabling system having a machine that automatically sells its network bandwidth on a forward market for network capacity and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically sells its network bandwidth on a forward market for network capacity and having an expert system that predicts a forward market price in a market for advertising based on an understanding obtained by analyzing social network data sources and executes a transaction based on the forward market prediction. In embodiments, provided herein is a transaction-enabling system having a machine that automatically sells its network bandwidth on a forward market for network capacity and having a machine that automatically forecasts forward market pricing of energy prices based on information collected from automated agent behavioral data sources. In embodiments, provided herein is a transaction-enabling system having a machine that automatically sells its network bandwidth on a forward market for network capacity and having a machine that automatically forecasts forward market pricing of network spectrum based on information collected from automated agent behavioral data sources. In embodiments, provided herein is a transaction-enabling system having a machine that automatically sells its network bandwidth on a forward market for network capacity and having a machine that automatically forecasts forward market pricing of energy credits based on information collected from automated agent behavioral data sources. In embodiments, provided herein is a transaction-enabling system having a machine that automatically sells its network bandwidth on a forward market for network capacity and having a machine that automatically forecasts forward market value of compute capability based on information collected from automated agent behavioral data sources. In embodiments, provided herein is a transaction-enabling system having a machine that automatically sells its network bandwidth on a forward market for network capacity and having a machine that automatically forecasts forward market pricing of energy prices based on information collected from business entity behavioral data sources. In embodiments, provided herein is a transaction-enabling system having a machine that automatically sells its network bandwidth on a forward market for network capacity and having a machine that automatically forecasts forward market pricing of network spectrum based on information collected from business entity behavioral data sources. In embodiments, provided herein is a transaction-enabling system having a machine that automatically sells its network bandwidth on a forward market for network capacity and having a machine that automatically forecasts forward market pricing of energy credits based on information collected from business entity behavioral data sources. In embodiments, provided herein is a transaction-enabling system having a machine that automatically sells its network bandwidth on a forward market for network capacity and having a machine that automatically forecasts forward market value of compute capability based on information collected from business entity behavioral data sources. In embodiments, provided herein is a transaction-enabling system having a machine that automatically sells its network bandwidth on a forward market for network capacity and having a machine that automatically forecasts forward market pricing of energy prices based on information collected from human behavioral data sources. In embodiments, provided herein is a transaction-enabling system having a machine that automatically sells its network bandwidth on a forward market for network capacity and having a machine that automatically forecasts forward market pricing of network spectrum based on information collected from human behavioral data sources. In embodiments, provided herein is a transaction-enabling system having a machine that automatically sells its network bandwidth on a forward market for network capacity and having a machine that automatically forecasts forward market pricing of energy credits based on information collected from human behavioral data sources. In embodiments, provided herein is a transaction-enabling system having a machine that automatically sells its network bandwidth on a forward market for network capacity and having a machine that automatically forecasts forward market value of compute capability based on information collected from human behavioral data sources. In embodiments, provided herein is a transaction-enabling system having a machine that automatically sells its network bandwidth on a forward market for network capacity and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically sells its network bandwidth on a forward market for network capacity and having an intelligent agent that is configured to solicit the attention resources of another external intelligent agent. In embodiments, provided herein is a transaction-enabling system having a machine that automatically sells its network bandwidth on a forward market for network capacity and having a machine that automatically purchases attention resources in a forward market for attention. In embodiments, provided herein is a transaction-enabling system having a machine that automatically sells its network bandwidth on a forward market for network capacity and having a fleet of machines that automatically aggregate purchasing in a forward market for attention. In embodiments, provided herein is a transaction-enabling system having a machine that automatically sells its network bandwidth on a forward market for network capacity and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically sells its network bandwidth on a forward market for network capacity and having a system for learning on a training set of facility outcomes, facility parameters, and data collected from data sources to train an artificial intelligence/machine learning system to predict a facility production outcome. In embodiments, provided herein is a transaction-enabling system having a machine that automatically sells its network bandwidth on a forward market for network capacity and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically sells its network bandwidth on a forward market for network capacity and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically sells its network bandwidth on a forward market for network capacity and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically sells its network bandwidth on a forward market for network capacity and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically sells its network bandwidth on a forward market for network capacity and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically sells its network bandwidth on a forward market for network capacity and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically sells its network bandwidth on a forward market for network capacity and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically sells its network bandwidth on a forward market for network capacity and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically sells its network bandwidth on a forward market for network capacity and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically sells its network bandwidth on a forward market for network capacity and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically sells its network bandwidth on a forward market for network capacity and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically sells its network bandwidth on a forward market for network capacity and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically purchase spectrum allocation in a forward market for network spectrum. In embodiments, provided herein is a transaction-enabling system having a fleet of machines that automatically purchase spectrum allocation in a forward market for network spectrum and having a fleet of machines that automatically optimize energy utilization for compute task allocation. In embodiments, provided herein is a transaction-enabling system having a fleet of machines that automatically purchase spectrum allocation in a forward market for network spectrum and having a fleet of machines that automatically aggregate data on collective optimization of forward market purchases of energy. In embodiments, provided herein is a transaction-enabling system having a fleet of machines that automatically purchase spectrum allocation in a forward market for network spectrum and having a fleet of machines that automatically aggregate data on collective optimization of forward market purchases of energy credits. In embodiments, provided herein is a transaction-enabling system having a fleet of machines that automatically purchase spectrum allocation in a forward market for network spectrum and having a fleet of machines that automatically aggregate data on collective optimization of forward market purchases of network spectrum. In embodiments, provided herein is a transaction-enabling system having a fleet of machines that automatically purchase spectrum allocation in a forward market for network spectrum and having a fleet of machines that automatically aggregate data on collective optimization of forward market sales of compute capacity. In embodiments, provided herein is a transaction-enabling system having a fleet of machines that automatically purchase spectrum allocation in a forward market for network spectrum and having a machine that automatically purchases its energy in a spot market for energy. In embodiments, provided herein is a transaction-enabling system having a fleet of machines that automatically purchase spectrum allocation in a forward market for network spectrum and having a machine that automatically purchases energy credits in a spot market. In embodiments, provided herein is a transaction-enabling system having a fleet of machines that automatically purchase spectrum allocation in a forward market for network spectrum and having a fleet of machines that automatically aggregate purchasing in a spot market for energy. In embodiments, provided herein is a transaction-enabling system having a fleet of machines that automatically purchase spectrum allocation in a forward market for network spectrum and having a fleet of machines that automatically aggregate purchasing energy credits in a spot market. In embodiments, provided herein is a transaction-enabling system having a fleet of machines that automatically purchase spectrum allocation in a forward market for network spectrum and having a machine that automatically purchases spectrum allocation in a spot market for network spectrum. In embodiments, provided herein is a transaction-enabling system having a fleet of machines that automatically purchase spectrum allocation in a forward market for network spectrum and having a fleet of machines that automatically purchase spectrum allocation in a spot market for network spectrum. In embodiments, provided herein is a transaction-enabling system having a fleet of machines that automatically purchase spectrum allocation in a forward market for network spectrum and having a fleet of machines that automatically optimize energy utilization for compute task allocation. In embodiments, provided herein is a transaction-enabling system having a fleet of machines that automatically purchase spectrum allocation in a forward market for network spectrum and having a fleet of machines that automatically aggregate data on collective optimization of spot market purchases of energy. In embodiments, provided herein is a transaction-enabling system having a fleet of machines that automatically purchase spectrum allocation in a forward market for network spectrum and having a fleet of machines that automatically aggregate data on collective optimization of spot market purchases of energy credits. In embodiments, provided herein is a transaction-enabling system having a fleet of machines that automatically purchase spectrum allocation in a forward market for network spectrum and having a fleet of machines that automatically aggregate data on collective optimization of spot market purchases of network spectrum. In embodiments, provided herein is a transaction-enabling system having a fleet of machines that automatically purchase spectrum allocation in a forward market for network spectrum and having a fleet of machines that automatically sell their aggregate compute capacity on a forward market for compute capacity. In embodiments, provided herein is a transaction-enabling system having a fleet of machines that automatically purchase spectrum allocation in a forward market for network spectrum and having a fleet of machines that automatically sell their aggregate compute storage capacity on a forward market for storage capacity. In embodiments, provided herein is a transaction-enabling system having a fleet of machines that automatically purchase spectrum allocation in a forward market for network spectrum and having a fleet of machines that automatically sell their aggregate energy storage capacity on a forward market for energy storage capacity. In embodiments, provided herein is a transaction-enabling system having a fleet of machines that automatically purchase spectrum allocation in a forward market for network spectrum and having a fleet of machines that automatically sell their aggregate network bandwidth on a forward market for network capacity. In embodiments, provided herein is a transaction-enabling system having a fleet of machines that automatically purchase spectrum allocation in a forward market for network spectrum and having a machine that automatically forecasts forward market pricing of energy prices based on information collected from social media data sources. In embodiments, provided herein is a transaction-enabling system having a fleet of machines that automatically purchase spectrum allocation in a forward market for network spectrum and having a machine that automatically forecasts forward market pricing of network spectrum based on information collected from social media data sources. In embodiments, provided herein is a transaction-enabling system having a fleet of machines that automatically purchase spectrum allocation in a forward market for network spectrum and having a machine that automatically forecasts forward market pricing of energy credits based on information collected from social media data sources. In embodiments, provided herein is a transaction-enabling system having a fleet of machines that automatically purchase spectrum allocation in a forward market for network spectrum and having a machine that automatically forecasts forward market value of compute capability based on information collected from social media data sources. In embodiments, provided herein is a transaction-enabling system having a fleet of machines that automatically purchase spectrum allocation in a forward market for network spectrum and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically purchase spectrum allocation in a forward market for network spectrum and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically purchase spectrum allocation in a forward market for network spectrum and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically purchase spectrum allocation in a forward market for network spectrum and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically purchase spectrum allocation in a forward market for network spectrum and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically purchase spectrum allocation in a forward market for network spectrum and having a machine that automatically allocates its energy capacity among a core task, a compute task, an energy storage task, a data storage task, and a networking task. In embodiments, provided herein is a transaction-enabling system having a fleet of machines that automatically purchase spectrum allocation in a forward market for network spectrum and having a machine that automatically allocates its compute capacity among a core task, a compute task, an energy storage task, a data storage task, and a networking task. In embodiments, provided herein is a transaction-enabling system having a fleet of machines that automatically purchase spectrum allocation in a forward market for network spectrum and having a machine that automatically allocates its networking capacity among a core task, a compute task, an energy storage task, a data storage task, and a networking task. In embodiments, provided herein is a transaction-enabling system having a fleet of machines that automatically purchase spectrum allocation in a forward market for network spectrum and having a fleet of machines that automatically allocate collective energy capacity among a core task, a compute task, an energy storage task, a data storage task, and a networking task. In embodiments, provided herein is a transaction-enabling system having a fleet of machines that automatically purchase spectrum allocation in a forward market for network spectrum and having a fleet of machines that automatically allocate collective compute capacity among a core task, a compute task, an energy storage task, a data storage task, and a networking task. In embodiments, provided herein is a transaction-enabling system having a fleet of machines that automatically purchase spectrum allocation in a forward market for network spectrum and having a fleet of machines that automatically allocate collective networking capacity among a core task, a compute task, an energy storage task, a data storage task, and a networking task. In embodiments, provided herein is a transaction-enabling system having a fleet of machines that automatically purchase spectrum allocation in a forward market for network spectrum and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically purchase spectrum allocation in a forward market for network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically purchase spectrum allocation in a forward market for network spectrum and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically purchase spectrum allocation in a forward market for network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically purchase spectrum allocation in a forward market for network spectrum and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically purchase spectrum allocation in a forward market for network spectrum and having a distributed ledger that tokenizes an instruction set, such that operation on the distributed ledger provides provable access to the instruction set. In embodiments, provided herein is a transaction-enabling system having a fleet of machines that automatically purchase spectrum allocation in a forward market for network spectrum and having a distributed ledger that tokenizes executable algorithmic logic, such that operation on the distributed ledger provides provable access to the executable algorithmic logic. In embodiments, provided herein is a transaction-enabling system having a fleet of machines that automatically purchase spectrum allocation in a forward market for network spectrum and having a distributed ledger that tokenizes a 3D printer instruction set, such that operation on the distributed ledger provides provable access to the instruction set. In embodiments, provided herein is a transaction-enabling system having a fleet of machines that automatically purchase spectrum allocation in a forward market for network spectrum and having a distributed ledger that tokenizes an instruction set for a coating process, such that operation on the distributed ledger provides provable access to the instruction set. In embodiments, provided herein is a transaction-enabling system having a fleet of machines that automatically purchase spectrum allocation in a forward market for network spectrum and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically purchase spectrum allocation in a forward market for network spectrum and having a distributed ledger that tokenizes a firmware program, such that operation on the distributed ledger provides provable access to the firmware program. In embodiments, provided herein is a transaction-enabling system having a fleet of machines that automatically purchase spectrum allocation in a forward market for network spectrum and having a distributed ledger that tokenizes an instruction set for an FPGA, such that operation on the distributed ledger provides provable access to the FPGA. In embodiments, provided herein is a transaction-enabling system having a fleet of machines that automatically purchase spectrum allocation in a forward market for network spectrum and having a distributed ledger that tokenizes serverless code logic, such that operation on the distributed ledger provides provable access to the serverless code logic. In embodiments, provided herein is a transaction-enabling system having a fleet of machines that automatically purchase spectrum allocation in a forward market for network spectrum and having a distributed ledger that tokenizes an instruction set for a crystal fabrication system, such that operation on the distributed ledger provides provable access to the instruction set. In embodiments, provided herein is a transaction-enabling system having a fleet of machines that automatically purchase spectrum allocation in a forward market for network spectrum and having a distributed ledger that tokenizes an instruction set for a food preparation process, such that operation on the distributed ledger provides provable access to the instruction set. In embodiments, provided herein is a transaction-enabling system having a fleet of machines that automatically purchase spectrum allocation in a forward market for network spectrum and having a distributed ledger that tokenizes an instruction set for a polymer production process, such that operation on the distributed ledger provides provable access to the instruction set. In embodiments, provided herein is a transaction-enabling system having a fleet of machines that automatically purchase spectrum allocation in a forward market for network spectrum and having a distributed ledger that tokenizes an instruction set for chemical synthesis process, such that operation on the distributed ledger provides provable access to the instruction set. In embodiments, provided herein is a transaction-enabling system having a fleet of machines that automatically purchase spectrum allocation in a forward market for network spectrum and having a distributed ledger that tokenizes an instruction set for a biological production process, such that operation on the distributed ledger provides provable access to the instruction set. In embodiments, provided herein is a transaction-enabling system having a fleet of machines that automatically purchase spectrum allocation in a forward market for network spectrum and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically purchase spectrum allocation in a forward market for network spectrum and having a distributed ledger that aggregates views of a trade secret into a chain that proves which and how many parties have viewed the trade secret. In embodiments, provided herein is a transaction-enabling system having a fleet of machines that automatically purchase spectrum allocation in a forward market for network spectrum and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically purchase spectrum allocation in a forward market for network spectrum and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically purchase spectrum allocation in a forward market for network spectrum and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically purchase spectrum allocation in a forward market for network spectrum and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically purchase spectrum allocation in a forward market for network spectrum and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically purchase spectrum allocation in a forward market for network spectrum and having a self-executing cryptocurrency coin that commits a transaction upon recognizing a location-based parameter that provides favorable tax treatment. In embodiments, provided herein is a transaction-enabling system having a fleet of machines that automatically purchase spectrum allocation in a forward market for network spectrum and having an expert system that uses machine learning to optimize the execution of cryptocurrency transactions based on tax status. In embodiments, provided herein is a transaction-enabling system having a fleet of machines that automatically purchase spectrum allocation in a forward market for network spectrum and having an expert system that aggregates regulatory information covering cryptocurrency transactions and automatically selects a jurisdiction for an operation based on the regulatory information. In embodiments, provided herein is a transaction-enabling system having a fleet of machines that automatically purchase spectrum allocation in a forward market for network spectrum and having an expert system that uses machine learning to optimize the execution of a cryptocurrency transaction based on real time energy price information for an available energy source. In embodiments, provided herein is a transaction-enabling system having a fleet of machines that automatically purchase spectrum allocation in a forward market for network spectrum and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically purchase spectrum allocation in a forward market for network spectrum and having an expert system that uses machine learning to optimize charging and recharging cycle of a rechargeable battery system to provide energy for execution of a cryptocurrency transaction. In embodiments, provided herein is a transaction-enabling system having a fleet of machines that automatically purchase spectrum allocation in a forward market for network spectrum and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically purchase spectrum allocation in a forward market for network spectrum and having an expert system that predicts a forward market price in a market based on an understanding obtained by analyzing social network data sources and executes a transaction based on the forward market prediction. In embodiments, provided herein is a transaction-enabling system having a fleet of machines that automatically purchase spectrum allocation in a forward market for network spectrum and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically purchase spectrum allocation in a forward market for network spectrum and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically purchase spectrum allocation in a forward market for network spectrum and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically purchase spectrum allocation in a forward market for network spectrum and having an expert system that predicts a forward market price in an energy market based on an understanding obtained by analyzing social network data sources and executes a transaction based on the forward market prediction. In embodiments, provided herein is a transaction-enabling system having a fleet of machines that automatically purchase spectrum allocation in a forward market for network spectrum and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically purchase spectrum allocation in a forward market for network spectrum and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically purchase spectrum allocation in a forward market for network spectrum and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically purchase spectrum allocation in a forward market for network spectrum and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically purchase spectrum allocation in a forward market for network spectrum and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically purchase spectrum allocation in a forward market for network spectrum and having a machine that automatically forecasts forward market pricing of energy prices based on information collected from automated agent behavioral data sources. In embodiments, provided herein is a transaction-enabling system having a fleet of machines that automatically purchase spectrum allocation in a forward market for network spectrum and having a machine that automatically forecasts forward market pricing of network spectrum based on information collected from automated agent behavioral data sources. In embodiments, provided herein is a transaction-enabling system having a fleet of machines that automatically purchase spectrum allocation in a forward market for network spectrum and having a machine that automatically forecasts forward market pricing of energy credits based on information collected from automated agent behavioral data sources. In embodiments, provided herein is a transaction-enabling system having a fleet of machines that automatically purchase spectrum allocation in a forward market for network spectrum and having a machine that automatically forecasts forward market value of compute capability based on information collected from automated agent behavioral data sources. In embodiments, provided herein is a transaction-enabling system having a fleet of machines that automatically purchase spectrum allocation in a forward market for network spectrum and having a machine that automatically forecasts forward market pricing of energy prices based on information collected from business entity behavioral data sources. In embodiments, provided herein is a transaction-enabling system having a fleet of machines that automatically purchase spectrum allocation in a forward market for network spectrum and having a machine that automatically forecasts forward market pricing of network spectrum based on information collected from business entity behavioral data sources. In embodiments, provided herein is a transaction-enabling system having a fleet of machines that automatically purchase spectrum allocation in a forward market for network spectrum and having a machine that automatically forecasts forward market pricing of energy credits based on information collected from business entity behavioral data sources. In embodiments, provided herein is a transaction-enabling system having a fleet of machines that automatically purchase spectrum allocation in a forward market for network spectrum and having a machine that automatically forecasts forward market value of compute capability based on information collected from business entity behavioral data sources. In embodiments, provided herein is a transaction-enabling system having a fleet of machines that automatically purchase spectrum allocation in a forward market for network spectrum and having a machine that automatically forecasts forward market pricing of energy prices based on information collected from human behavioral data sources. In embodiments, provided herein is a transaction-enabling system having a fleet of machines that automatically purchase spectrum allocation in a forward market for network spectrum and having a machine that automatically forecasts forward market pricing of network spectrum based on information collected from human behavioral data sources. In embodiments, provided herein is a transaction-enabling system having a fleet of machines that automatically purchase spectrum allocation in a forward market for network spectrum and having a machine that automatically forecasts forward market pricing of energy credits based on information collected from human behavioral data sources. In embodiments, provided herein is a transaction-enabling system having a fleet of machines that automatically purchase spectrum allocation in a forward market for network spectrum and having a machine that automatically forecasts forward market value of compute capability based on information collected from human behavioral data sources. In embodiments, provided herein is a transaction-enabling system having a fleet of machines that automatically purchase spectrum allocation in a forward market for network spectrum and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically purchase spectrum allocation in a forward market for network spectrum and having an intelligent agent that is configured to solicit the attention resources of another external intelligent agent. In embodiments, provided herein is a transaction-enabling system having a fleet of machines that automatically purchase spectrum allocation in a forward market for network spectrum and having a machine that automatically purchases attention resources in a forward market for attention. In embodiments, provided herein is a transaction-enabling system having a fleet of machines that automatically purchase spectrum allocation in a forward market for network spectrum and having a fleet of machines that automatically aggregate purchasing in a forward market for attention. In embodiments, provided herein is a transaction-enabling system having a fleet of machines that automatically purchase spectrum allocation in a forward market for network spectrum and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically purchase spectrum allocation in a forward market for network spectrum and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically purchase spectrum allocation in a forward market for network spectrum and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically purchase spectrum allocation in a forward market for network spectrum and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically purchase spectrum allocation in a forward market for network spectrum and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically purchase spectrum allocation in a forward market for network spectrum and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically purchase spectrum allocation in a forward market for network spectrum and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically purchase spectrum allocation in a forward market for network spectrum and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically purchase spectrum allocation in a forward market for network spectrum and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically purchase spectrum allocation in a forward market for network spectrum and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically purchase spectrum allocation in a forward market for network spectrum and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically purchase spectrum allocation in a forward market for network spectrum and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically purchase spectrum allocation in a forward market for network spectrum and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically purchase spectrum allocation in a forward market for network spectrum and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically optimize energy utilization for compute task allocation. In embodiments, provided herein is a transaction-enabling system having a fleet of machines that automatically optimize energy utilization for compute task allocation and having a fleet of machines that automatically aggregate data on collective optimization of forward market purchases of energy. In embodiments, provided herein is a transaction-enabling system having a fleet of machines that automatically optimize energy utilization for compute task allocation and having a fleet of machines that automatically aggregate data on collective optimization of forward market purchases of energy credits. In embodiments, provided herein is a transaction-enabling system having a fleet of machines that automatically optimize energy utilization for compute task allocation and having a fleet of machines that automatically aggregate data on collective optimization of forward market purchases of network spectrum. In embodiments, provided herein is a transaction-enabling system having a fleet of machines that automatically optimize energy utilization for compute task allocation and having a fleet of machines that automatically aggregate data on collective optimization of forward market sales of compute capacity. In embodiments, provided herein is a transaction-enabling system having a fleet of machines that automatically optimize energy utilization for compute task allocation and having a machine that automatically purchases its energy in a spot market for energy. In embodiments, provided herein is a transaction-enabling system having a fleet of machines that automatically optimize energy utilization for compute task allocation and having a machine that automatically purchases energy credits in a spot market. In embodiments, provided herein is a transaction-enabling system having a fleet of machines that automatically optimize energy utilization for compute task allocation and having a fleet of machines that automatically aggregate purchasing in a spot market for energy. In embodiments, provided herein is a transaction-enabling system having a fleet of machines that automatically optimize energy utilization for compute task allocation and having a fleet of machines that automatically aggregate purchasing energy credits in a spot market. In embodiments, provided herein is a transaction-enabling system having a fleet of machines that automatically optimize energy utilization for compute task allocation and having a machine that automatically purchases spectrum allocation in a spot market for network spectrum. In embodiments, provided herein is a transaction-enabling system having a fleet of machines that automatically optimize energy utilization for compute task allocation and having a fleet of machines that automatically purchase spectrum allocation in a spot market for network spectrum. In embodiments, provided herein is a transaction-enabling system having a fleet of machines that automatically optimize energy utilization for compute task allocation and having a fleet of machines that automatically optimize energy utilization for compute task allocation. In embodiments, provided herein is a transaction-enabling system having a fleet of machines that automatically optimize energy utilization for compute task allocation and having a fleet of machines that automatically aggregate data on collective optimization of spot market purchases of energy. In embodiments, provided herein is a transaction-enabling system having a fleet of machines that automatically optimize energy utilization for compute task allocation and having a fleet of machines that automatically aggregate data on collective optimization of spot market purchases of energy credits. In embodiments, provided herein is a transaction-enabling system having a fleet of machines that automatically optimize energy utilization for compute task allocation and having a fleet of machines that automatically aggregate data on collective optimization of spot market purchases of network spectrum. In embodiments, provided herein is a transaction-enabling system having a fleet of machines that automatically optimize energy utilization for compute task allocation and having a fleet of machines that automatically sell their aggregate compute capacity on a forward market for compute capacity. In embodiments, provided herein is a transaction-enabling system having a fleet of machines that automatically optimize energy utilization for compute task allocation and having a fleet of machines that automatically sell their aggregate compute storage capacity on a forward market for storage capacity. In embodiments, provided herein is a transaction-enabling system having a fleet of machines that automatically optimize energy utilization for compute task allocation and having a fleet of machines that automatically sell their aggregate energy storage capacity on a forward market for energy storage capacity. In embodiments, provided herein is a transaction-enabling system having a fleet of machines that automatically optimize energy utilization for compute task allocation and having a fleet of machines that automatically sell their aggregate network bandwidth on a forward market for network capacity. In embodiments, provided herein is a transaction-enabling system having a fleet of machines that automatically optimize energy utilization for compute task allocation and having a machine that automatically forecasts forward market pricing of energy prices based on information collected from social media data sources. In embodiments, provided herein is a transaction-enabling system having a fleet of machines that automatically optimize energy utilization for compute task allocation and having a machine that automatically forecasts forward market pricing of network spectrum based on information collected from social media data sources. In embodiments, provided herein is a transaction-enabling system having a fleet of machines that automatically optimize energy utilization for compute task allocation and having a machine that automatically forecasts forward market pricing of energy credits based on information collected from social media data sources. In embodiments, provided herein is a transaction-enabling system having a fleet of machines that automatically optimize energy utilization for compute task allocation and having a machine that automatically forecasts forward market value of compute capability based on information collected from social media data sources. In embodiments, provided herein is a transaction-enabling system having a fleet of machines that automatically optimize energy utilization for compute task allocation and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically optimize energy utilization for compute task allocation and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically optimize energy utilization for compute task allocation and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically optimize energy utilization for compute task allocation and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically optimize energy utilization for compute task allocation and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically optimize energy utilization for compute task allocation and having a machine that automatically allocates its energy capacity among a core task, a compute task, an energy storage task, a data storage task, and a networking task. In embodiments, provided herein is a transaction-enabling system having a fleet of machines that automatically optimize energy utilization for compute task allocation and having a machine that automatically allocates its compute capacity among a core task, a compute task, an energy storage task, a data storage task, and a networking task. In embodiments, provided herein is a transaction-enabling system having a fleet of machines that automatically optimize energy utilization for compute task allocation and having a machine that automatically allocates its networking capacity among a core task, a compute task, an energy storage task, a data storage task, and a networking task. In embodiments, provided herein is a transaction-enabling system having a fleet of machines that automatically optimize energy utilization for compute task allocation and having a fleet of machines that automatically allocate collective energy capacity among a core task, a compute task, an energy storage task, a data storage task, and a networking task. In embodiments, provided herein is a transaction-enabling system having a fleet of machines that automatically optimize energy utilization for compute task allocation and having a fleet of machines that automatically allocate collective compute capacity among a core task, a compute task, an energy storage task, a data storage task, and a networking task. In embodiments, provided herein is a transaction-enabling system having a fleet of machines that automatically optimize energy utilization for compute task allocation and having a fleet of machines that automatically allocate collective networking capacity among a core task, a compute task, an energy storage task, a data storage task, and a networking task. In embodiments, provided herein is a transaction-enabling system having a fleet of machines that automatically optimize energy utilization for compute task allocation and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically optimize energy utilization for compute task allocation and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically optimize energy utilization for compute task allocation and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically optimize energy utilization for compute task allocation and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically optimize energy utilization for compute task allocation and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically optimize energy utilization for compute task allocation and having a distributed ledger that tokenizes an instruction set, such that operation on the distributed ledger provides provable access to the instruction set. In embodiments, provided herein is a transaction-enabling system having a fleet of machines that automatically optimize energy utilization for compute task allocation and having a distributed ledger that tokenizes executable algorithmic logic, such that operation on the distributed ledger provides provable access to the executable algorithmic logic. In embodiments, provided herein is a transaction-enabling system having a fleet of machines that automatically optimize energy utilization for compute task allocation and having a distributed ledger that tokenizes a 3D printer instruction set, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for a coating process, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically optimize energy utilization for compute task allocation and having a distributed ledger that tokenizes a firmware program, such that operation on the distributed ledger provides provable access to the firmware program. In embodiments, provided herein is a transaction-enabling system having a fleet of machines that automatically optimize energy utilization for compute task allocation and having a distributed ledger that tokenizes an instruction set for an FPGA, such that operation on the distributed ledger provides provable access to the FPGA. In embodiments, provided herein is a transaction-enabling system having a fleet of machines that automatically optimize energy utilization for compute task allocation and having a distributed ledger that tokenizes serverless code logic, such that operation on the distributed ledger provides provable access to the serverless code logic. In embodiments, provided herein is a transaction-enabling system having a fleet of machines that automatically optimize energy utilization for compute task allocation and having a distributed ledger that tokenizes an instruction set for a crystal fabrication system, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for a food preparation process, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for a polymer production process, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for chemical synthesis process, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for a biological production process, such that operation on the distributed ledger provides provable access to the instruction set. In embodiments, provided herein is a transaction-enabling system having a fleet of machines that automatically optimize energy utilization for compute task allocation and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically optimize energy utilization for compute task allocation and having a distributed ledger that aggregates views of a trade secret into a chain that proves which and how many parties have viewed the trade secret. In embodiments, provided herein is a transaction-enabling system having a fleet of machines that automatically optimize energy utilization for compute task allocation and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically optimize energy utilization for compute task allocation and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically optimize energy utilization for compute task allocation and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically optimize energy utilization for compute task allocation and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically optimize energy utilization for compute task allocation and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically optimize energy utilization for compute task allocation and having a self-executing cryptocurrency coin that commits a transaction upon recognizing a location-based parameter that provides favorable tax treatment. In embodiments, provided herein is a transaction-enabling system having a fleet of machines that automatically optimize energy utilization for compute task allocation and having an expert system that uses machine learning to optimize the execution of cryptocurrency transactions based on tax status. In embodiments, provided herein is a transaction-enabling system having a fleet of machines that automatically optimize energy utilization for compute task allocation and having an expert system that aggregates regulatory information covering cryptocurrency transactions and automatically selects a jurisdiction for an operation based on the regulatory information. In embodiments, provided herein is a transaction-enabling system having a fleet of machines that automatically optimize energy utilization for compute task allocation and having an expert system that uses machine learning to optimize the execution of a cryptocurrency transaction based on real time energy price information for an available energy source. In embodiments, provided herein is a transaction-enabling system having a fleet of machines that automatically optimize energy utilization for compute task allocation and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically optimize energy utilization for compute task allocation and having an expert system that uses machine learning to optimize charging and recharging cycle of a rechargeable battery system to provide energy for execution of a cryptocurrency transaction. In embodiments, provided herein is a transaction-enabling system having a fleet of machines that automatically optimize energy utilization for compute task allocation and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically optimize energy utilization for compute task allocation and having an expert system that predicts a forward market price in a market based on an understanding obtained by analyzing social network data sources and executes a transaction based on the forward market prediction. In embodiments, provided herein is a transaction-enabling system having a fleet of machines that automatically optimize energy utilization for compute task allocation and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically optimize energy utilization for compute task allocation and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically optimize energy utilization for compute task allocation and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically optimize energy utilization for compute task allocation and having an expert system that predicts a forward market price in an energy market based on an understanding obtained by analyzing social network data sources and executes a transaction based on the forward market prediction. In embodiments, provided herein is a transaction-enabling system having a fleet of machines that automatically optimize energy utilization for compute task allocation and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically optimize energy utilization for compute task allocation and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically optimize energy utilization for compute task allocation and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically optimize energy utilization for compute task allocation and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically optimize energy utilization for compute task allocation and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically optimize energy utilization for compute task allocation and having a machine that automatically forecasts forward market pricing of energy prices based on information collected from automated agent behavioral data sources. In embodiments, provided herein is a transaction-enabling system having a fleet of machines that automatically optimize energy utilization for compute task allocation and having a machine that automatically forecasts forward market pricing of network spectrum based on information collected from automated agent behavioral data sources. In embodiments, provided herein is a transaction-enabling system having a fleet of machines that automatically optimize energy utilization for compute task allocation and having a machine that automatically forecasts forward market pricing of energy credits based on information collected from automated agent behavioral data sources. In embodiments, provided herein is a transaction-enabling system having a fleet of machines that automatically optimize energy utilization for compute task allocation and having a machine that automatically forecasts forward market value of compute capability based on information collected from automated agent behavioral data sources. In embodiments, provided herein is a transaction-enabling system having a fleet of machines that automatically optimize energy utilization for compute task allocation and having a machine that automatically forecasts forward market pricing of energy prices based on information collected from business entity behavioral data sources. In embodiments, provided herein is a transaction-enabling system having a fleet of machines that automatically optimize energy utilization for compute task allocation and having a machine that automatically forecasts forward market pricing of network spectrum based on information collected from business entity behavioral data sources. In embodiments, provided herein is a transaction-enabling system having a fleet of machines that automatically optimize energy utilization for compute task allocation and having a machine that automatically forecasts forward market pricing of energy credits based on information collected from business entity behavioral data sources. In embodiments, provided herein is a transaction-enabling system having a fleet of machines that automatically optimize energy utilization for compute task allocation and having a machine that automatically forecasts forward market value of compute capability based on information collected from business entity behavioral data sources. In embodiments, provided herein is a transaction-enabling system having a fleet of machines that automatically optimize energy utilization for compute task allocation and having a machine that automatically forecasts forward market pricing of energy prices based on information collected from human behavioral data sources. In embodiments, provided herein is a transaction-enabling system having a fleet of machines that automatically optimize energy utilization for compute task allocation and having a machine that automatically forecasts forward market pricing of network spectrum based on information collected from human behavioral data sources. In embodiments, provided herein is a transaction-enabling system having a fleet of machines that automatically optimize energy utilization for compute task allocation and having a machine that automatically forecasts forward market pricing of energy credits based on information collected from human behavioral data sources. In embodiments, provided herein is a transaction-enabling system having a fleet of machines that automatically optimize energy utilization for compute task allocation and having a machine that automatically forecasts forward market value of compute capability based on information collected from human behavioral data sources. In embodiments, provided herein is a transaction-enabling system having a fleet of machines that automatically optimize energy utilization for compute task allocation and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically optimize energy utilization for compute task allocation and having an intelligent agent that is configured to solicit the attention resources of another external intelligent agent. In embodiments, provided herein is a transaction-enabling system having a fleet of machines that automatically optimize energy utilization for compute task allocation and having a machine that automatically purchases attention resources in a forward market for attention. In embodiments, provided herein is a transaction-enabling system having a fleet of machines that automatically optimize energy utilization for compute task allocation and having a fleet of machines that automatically aggregate purchasing in a forward market for attention. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate data on collective optimization of forward market purchases of energy. In embodiments, provided herein is a transaction-enabling system having a fleet of machines that automatically aggregate data on collective optimization of forward market purchases of energy and having a fleet of machines that automatically aggregate data on collective optimization of forward market purchases of energy credits. In embodiments, provided herein is a transaction-enabling system having a fleet of machines that automatically aggregate data on collective optimization of forward market purchases of energy and having a fleet of machines that automatically aggregate data on collective optimization of forward market purchases of network spectrum. In embodiments, provided herein is a transaction-enabling system having a fleet of machines that automatically aggregate data on collective optimization of forward market purchases of energy and having a fleet of machines that automatically aggregate data on collective optimization of forward market sales of compute capacity. In embodiments, provided herein is a transaction-enabling system having a fleet of machines that automatically aggregate data on collective optimization of forward market purchases of energy and having a machine that automatically purchases its energy in a spot market for energy. In embodiments, provided herein is a transaction-enabling system having a fleet of machines that automatically aggregate data on collective optimization of forward market purchases of energy and having a machine that automatically purchases energy credits in a spot market. In embodiments, provided herein is a transaction-enabling system having a fleet of machines that automatically aggregate data on collective optimization of forward market purchases of energy and having a fleet of machines that automatically aggregate purchasing in a spot market for energy. In embodiments, provided herein is a transaction-enabling system having a fleet of machines that automatically aggregate data on collective optimization of forward market purchases of energy and having a fleet of machines that automatically aggregate purchasing energy credits in a spot market. In embodiments, provided herein is a transaction-enabling system having a fleet of machines that automatically aggregate data on collective optimization of forward market purchases of energy and having a machine that automatically purchases spectrum allocation in a spot market for network spectrum. In embodiments, provided herein is a transaction-enabling system having a fleet of machines that automatically aggregate data on collective optimization of forward market purchases of energy and having a fleet of machines that automatically purchase spectrum allocation in a spot market for network spectrum. In embodiments, provided herein is a transaction-enabling system having a fleet of machines that automatically aggregate data on collective optimization of forward market purchases of energy and having a fleet of machines that automatically optimize energy utilization for compute task allocation. In embodiments, automatically aggregate data on collective optimization of forward market purchases of energy and having a fleet of machines that automatically aggregate data on collective optimization of spot market purchases of energy. In embodiments, provided herein is a transaction-enabling system having a fleet of machines that automatically aggregate data on collective optimization of forward market purchases of energy and having a fleet of machines that automatically aggregate data on collective optimization of spot market purchases of energy credits. In embodiments, provided herein is a transaction-enabling system having a fleet of machines that automatically aggregate data on collective optimization of forward market purchases of energy and having a fleet of machines that automatically aggregate data on collective optimization of spot market purchases of network spectrum. In embodiments, provided herein is a transaction-enabling system having a fleet of machines that automatically aggregate data on collective optimization of forward market purchases of energy and having a fleet of machines that automatically sell their aggregate compute capacity on a forward market for compute capacity. In embodiments, provided herein is a transaction-enabling system having a fleet of machines that automatically aggregate data on collective optimization of forward market purchases of energy and having a fleet of machines that automatically sell their aggregate compute storage capacity on a forward market for storage capacity. In embodiments, provided herein is a transaction-enabling system having a fleet of machines that automatically aggregate data on collective optimization of forward market purchases of energy and having a fleet of machines that automatically sell their aggregate energy storage capacity on a forward market for energy storage capacity. In embodiments, provided herein is a transaction-enabling system having a fleet of machines that automatically aggregate data on collective optimization of forward market purchases of energy and having a fleet of machines that automatically sell their aggregate network bandwidth on a forward market for network capacity. In embodiments, provided herein is a transaction-enabling system having a fleet of machines that automatically aggregate data on collective optimization of forward market purchases of energy and having a machine that automatically forecasts forward market pricing of energy prices based on information collected from social media data sources. In embodiments, provided herein is a transaction-enabling system having a fleet of machines that automatically aggregate data on collective optimization of forward market purchases of energy and having a machine that automatically forecasts forward market pricing of network spectrum based on information collected from social media data sources. In embodiments, automatically aggregate data on collective optimization of forward market purchases of energy and having a machine that automatically forecasts forward market pricing of energy credits based on information collected from social media data sources. In embodiments, provided herein is a transaction-enabling system having a fleet of machines that automatically aggregate data on collective optimization of forward market purchases of energy and having a machine that automatically forecasts forward market value of compute capability based on information collected from social media data sources. In embodiments, provided herein is a transaction-enabling system having a fleet of machines that automatically aggregate data on collective optimization of forward market purchases of energy and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of energy and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of energy and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of energy and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of energy and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of energy and having a machine that automatically allocates its energy capacity among a core task, a compute task, an energy storage task, a data storage task, and a networking task. In embodiments, provided herein is a transaction-enabling system having a fleet of machines that automatically aggregate data on collective optimization of forward market purchases of energy and having a machine that automatically allocates its compute capacity among a core task, a compute task, an energy storage task, a data storage task, and a networking task. In embodiments, provided herein is a transaction-enabling system having a fleet of machines that automatically aggregate data on collective optimization of forward market purchases of energy and having a machine that automatically allocates its networking capacity among a core task, a compute task, an energy storage task, a data storage task, and a networking task. In embodiments, provided herein is a transaction-enabling system having a fleet of machines that automatically aggregate data on collective optimization of forward market purchases of energy and having a fleet of machines that automatically allocate collective energy capacity among a core task, a compute task, an energy storage task, a data storage task, and a networking task. In embodiments, provided herein is a transaction-enabling system having a fleet of machines that automatically aggregate data on collective optimization of forward market purchases of energy and having a fleet of machines that automatically allocate collective compute capacity among a core task, a compute task, an energy storage task, a data storage task, and a networking task. In embodiments, provided herein is a transaction-enabling system having a fleet of machines that automatically aggregate data on collective optimization of forward market purchases of energy and having a fleet of machines that automatically allocate collective networking capacity among a core task, a compute task, an energy storage task, a data storage task, and a networking task. In embodiments, provided herein is a transaction-enabling system having a fleet of machines that automatically aggregate data on collective optimization of forward market purchases of energy and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically aggregate data on collective optimization of forward market purchases of energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of forward market purchases of energy and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically aggregate data on collective optimization of forward market purchases of energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of forward market purchases of energy and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically aggregate data on collective optimization of forward market purchases of energy and having a distributed ledger that tokenizes an instruction set, such that operation on the distributed ledger provides provable access to the instruction set. In embodiments, provided herein is a transaction-enabling system having a fleet of machines that automatically aggregate data on collective optimization of forward market purchases of energy and having a distributed ledger that tokenizes executable algorithmic logic, such that operation on the distributed ledger provides provable access to the executable algorithmic logic. In embodiments, provided herein is a transaction-enabling system having a fleet of machines that automatically aggregate data on collective optimization of forward market purchases of energy and having a distributed ledger that tokenizes a 3D printer instruction set, such that operation on the distributed ledger provides provable access to the instruction set. In embodiments, provided herein is a transaction-enabling system having a fleet of machines that automatically aggregate data on collective optimization of forward market purchases of energy and having a distributed ledger that tokenizes an instruction set for a coating process, such that operation on the distributed ledger provides provable access to the instruction set. In embodiments, provided herein is a transaction-enabling system having a fleet of machines that automatically aggregate data on collective optimization of forward market purchases of energy and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically aggregate data on collective optimization of forward market purchases of energy and having a distributed ledger that tokenizes a firmware program, such that operation on the distributed ledger provides provable access to the firmware program. In embodiments, provided herein is a transaction-enabling system having a fleet of machines that automatically aggregate data on collective optimization of forward market purchases of energy and having a distributed ledger that tokenizes an instruction set for an FPGA, such that operation on the distributed ledger provides provable access to the FPGA. In embodiments, provided herein is a transaction-enabling system having a fleet of machines that automatically aggregate data on collective optimization of forward market purchases of energy and having a distributed ledger that tokenizes serverless code logic, such that operation on the distributed ledger provides provable access to the serverless code logic. In embodiments, provided herein is a transaction-enabling system having a fleet of machines that automatically aggregate data on collective optimization of forward market purchases of energy and having a distributed ledger that tokenizes an instruction set for a crystal fabrication system, such that operation on the distributed ledger provides provable access to the instruction set. In embodiments, provided herein is a transaction-enabling system having a fleet of machines that automatically aggregate data on collective optimization of forward market purchases of energy and having a distributed ledger that tokenizes an instruction set for a food preparation process, such that operation on the distributed ledger provides provable access to the instruction set. In embodiments, provided herein is a transaction-enabling system having a fleet of machines that automatically aggregate data on collective optimization of forward market purchases of energy and having a distributed ledger that tokenizes an instruction set for a polymer production process, such that operation on the distributed ledger provides provable access to the instruction set. In embodiments, provided herein is a transaction-enabling system having a fleet of machines that automatically aggregate data on collective optimization of forward market purchases of energy and having a distributed ledger that tokenizes an instruction set for chemical synthesis process, such that operation on the distributed ledger provides provable access to the instruction set. In embodiments, provided herein is a transaction-enabling system having a fleet of machines that automatically aggregate data on collective optimization of forward market purchases of energy and having a distributed ledger that tokenizes an instruction set for a biological production process, such that operation on the distributed ledger provides provable access to the instruction set. In embodiments, provided herein is a transaction-enabling system having a fleet of machines that automatically aggregate data on collective optimization of forward market purchases of energy and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically aggregate data on collective optimization of forward market purchases of energy and having a distributed ledger that aggregates views of a trade secret into a chain that proves which and how many parties have viewed the trade secret. In embodiments, provided herein is a transaction-enabling system having a fleet of machines that automatically aggregate data on collective optimization of forward market purchases of energy and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically aggregate data on collective optimization of forward market purchases of energy and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically aggregate data on collective optimization of forward market purchases of energy and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically aggregate data on collective optimization of forward market purchases of energy and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically aggregate data on collective optimization of forward market purchases of energy and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically aggregate data on collective optimization of forward market purchases of energy and having a self-executing cryptocurrency coin that commits a transaction upon recognizing a location-based parameter that provides favorable tax treatment. In embodiments, provided herein is a transaction-enabling system having a fleet of machines that automatically aggregate data on collective optimization of forward market purchases of energy and having an expert system that uses machine learning to optimize the execution of cryptocurrency transactions based on tax status. In embodiments, provided herein is a transaction-enabling system having a fleet of machines that automatically aggregate data on collective optimization of forward market purchases of energy and having an expert system that aggregates regulatory information covering cryptocurrency transactions and automatically selects a jurisdiction for an operation based on the regulatory information. In embodiments, provided herein is a transaction-enabling system having a fleet of machines that automatically aggregate data on collective optimization of forward market purchases of energy and having an expert system that uses machine learning to optimize the execution of a cryptocurrency transaction based on real time energy price information for an available energy source. In embodiments, provided herein is a transaction-enabling system having a fleet of machines that automatically aggregate data on collective optimization of forward market purchases of energy and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically aggregate data on collective optimization of forward market purchases of energy and having an expert system that uses machine learning to optimize charging and recharging cycle of a rechargeable battery system to provide energy for execution of a cryptocurrency transaction. In embodiments, provided herein is a transaction-enabling system having a fleet of machines that automatically aggregate data on collective optimization of forward market purchases of energy and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of energy and having an expert system that predicts a forward market price in a market based on an understanding obtained by analyzing social network data sources and executes a transaction based on the forward market prediction. In embodiments, provided herein is a transaction-enabling system having a fleet of machines that automatically aggregate data on collective optimization of forward market purchases of energy and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically aggregate data on collective optimization of forward market purchases of energy and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically aggregate data on collective optimization of forward market purchases of energy and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of energy and having an expert system that predicts a forward market price in an energy market based on an understanding obtained by analyzing social network data sources and executes a transaction based on the forward market prediction. In embodiments, provided herein is a transaction-enabling system having a fleet of machines that automatically aggregate data on collective optimization of forward market purchases of energy and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of energy and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of energy and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically aggregate data on collective optimization of forward market purchases of energy and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of energy and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically aggregate data on collective optimization of forward market purchases of energy and having a machine that automatically forecasts forward market pricing of energy prices based on information collected from automated agent behavioral data sources. In embodiments, provided herein is a transaction-enabling system having a fleet of machines that automatically aggregate data on collective optimization of forward market purchases of energy and having a machine that automatically forecasts forward market pricing of network spectrum based on information collected from automated agent behavioral data sources. In embodiments, provided herein is a transaction-enabling system having a fleet of machines that automatically aggregate data on collective optimization of forward market purchases of energy and having a machine that automatically forecasts forward market pricing of energy credits based on information collected from automated agent behavioral data sources. In embodiments, provided herein is a transaction-enabling system having a fleet of machines that automatically aggregate data on collective optimization of forward market purchases of energy and having a machine that automatically forecasts forward market value of compute capability based on information collected from automated agent behavioral data sources. In embodiments, provided herein is a transaction-enabling system having a fleet of machines that automatically aggregate data on collective optimization of forward market purchases of energy and having a machine that automatically forecasts forward market pricing of energy prices based on information collected from business entity behavioral data sources. In embodiments, provided herein is a transaction-enabling system having a fleet of machines that automatically aggregate data on collective optimization of forward market purchases of energy and having a machine that automatically forecasts forward market pricing of network spectrum based on information collected from business entity behavioral data sources. In embodiments, provided herein is a transaction-enabling system having a fleet of machines that automatically aggregate data on collective optimization of forward market purchases of energy and having a machine that automatically forecasts forward market pricing of energy credits based on information collected from business entity behavioral data sources. In embodiments, provided herein is a transaction-enabling system having a fleet of machines that automatically aggregate data on collective optimization of forward market purchases of energy and having a machine that automatically forecasts forward market value of compute capability based on information collected from business entity behavioral data sources. In embodiments, provided herein is a transaction-enabling system having a fleet of machines that automatically aggregate data on collective optimization of forward market purchases of energy and having a machine that automatically forecasts forward market pricing of energy prices based on information collected from human behavioral data sources. In embodiments, provided herein is a transaction-enabling system having a fleet of machines that automatically aggregate data on collective optimization of forward market purchases of energy and having a machine that automatically forecasts forward market pricing of network spectrum based on information collected from human behavioral data sources. In embodiments, provided herein is a transaction-enabling system having a fleet of machines that automatically aggregate data on collective optimization of forward market purchases of energy and having a machine that automatically forecasts forward market pricing of energy credits based on information collected from human behavioral data sources. In embodiments, provided herein is a transaction-enabling system having a fleet of machines that automatically aggregate data on collective optimization of forward market purchases of energy and having a machine that automatically forecasts forward market value of compute capability based on information collected from human behavioral data sources. In embodiments, provided herein is a transaction-enabling system having a fleet of machines that automatically aggregate data on collective optimization of forward market purchases of energy and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically aggregate data on collective optimization of forward market purchases of energy and having an intelligent agent that is configured to solicit the attention resources of another external intelligent agent. In embodiments, provided herein is a transaction-enabling system having a fleet of machines that automatically aggregate data on collective optimization of forward market purchases of energy and having a machine that automatically purchases attention resources in a forward market for attention. In embodiments, provided herein is a transaction-enabling system having a fleet of machines that automatically aggregate data on collective optimization of forward market purchases of energy and having a fleet of machines that automatically aggregate purchasing in a forward market for attention. In embodiments, provided herein is a transaction-enabling system having a fleet of machines that automatically aggregate data on collective optimization of forward market purchases of energy and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate data on collective optimization of forward market purchases of energy and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate data on collective optimization of forward market purchases of energy and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate data on collective optimization of forward market purchases of energy and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate data on collective optimization of forward market purchases of energy and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate data on collective optimization of forward market purchases of energy and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate data on collective optimization of forward market purchases of energy and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate data on collective optimization of forward market purchases of energy and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate data on collective optimization of forward market purchases of energy and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate data on collective optimization of forward market purchases of energy and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate data on collective optimization of forward market purchases of energy and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate data on collective optimization of forward market purchases of energy and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate data on collective optimization of forward market purchases of energy and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate data on collective optimization of forward market purchases of energy and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate data on collective optimization of forward market purchases of energy credits. In embodiments, provided herein is a transaction-enabling system having a fleet of machines that automatically aggregate data on collective optimization of forward market purchases of energy credits and having a fleet of machines that automatically aggregate data on collective optimization of forward market purchases of network spectrum. In embodiments, provided herein is a transaction-enabling system having a fleet of machines that automatically aggregate data on collective optimization of forward market purchases of energy credits and having a fleet of machines that automatically aggregate data on collective optimization of forward market sales of compute capacity. In embodiments, provided herein is a transaction-enabling system having a fleet of machines that automatically aggregate data on collective optimization of forward market purchases of energy credits and having a machine that automatically purchases its energy in a spot market for energy. In embodiments, provided herein is a transaction-enabling system having a fleet of machines that automatically aggregate data on collective optimization of forward market purchases of energy credits and having a machine that automatically purchases energy credits in a spot market. In embodiments, provided herein is a transaction-enabling system having a fleet of machines that automatically aggregate data on collective optimization of forward market purchases of energy credits and having a fleet of machines that automatically aggregate purchasing in a spot market for energy. In embodiments, provided herein is a transaction-enabling system having a fleet of machines that automatically aggregate data on collective optimization of forward market purchases of energy credits and having a fleet of machines that automatically aggregate purchasing energy credits in a spot market. In embodiments, provided herein is a transaction-enabling system having a fleet of machines that automatically aggregate data on collective optimization of forward market purchases of energy credits and having a machine that automatically purchases spectrum allocation in a spot market for network spectrum. In embodiments, provided herein is a transaction-enabling system having a fleet of machines that automatically aggregate data on collective optimization of forward market purchases of energy credits and having a fleet of machines that automatically purchase spectrum allocation in a spot market for network spectrum. In embodiments, provided herein is a transaction-enabling system having a fleet of machines that automatically aggregate data on collective optimization of forward market purchases of energy credits and having a fleet of machines that automatically optimize energy utilization for compute task allocation. In embodiments, provided herein is a transaction-enabling system having a fleet of machines that automatically aggregate data on collective optimization of forward market purchases of energy credits and having a fleet of machines that automatically aggregate data on collective optimization of spot market purchases of energy. In embodiments, provided herein is a transaction-enabling system having a fleet of machines that automatically aggregate data on collective optimization of forward market purchases of energy credits and having a fleet of machines that automatically aggregate data on collective optimization of spot market purchases of energy credits. In embodiments, provided herein is a transaction-enabling system having a fleet of machines that automatically aggregate data on collective optimization of forward market purchases of energy credits and having a fleet of machines that automatically aggregate data on collective optimization of spot market purchases of network spectrum. In embodiments, provided herein is a transaction-enabling system having a fleet of machines that automatically aggregate data on collective optimization of forward market purchases of energy credits and having a fleet of machines that automatically sell their aggregate compute capacity on a forward market for compute capacity. In embodiments, provided herein is a transaction-enabling system having a fleet of machines that automatically aggregate data on collective optimization of forward market purchases of energy credits and having a fleet of machines that automatically sell their aggregate compute storage capacity on a forward market for storage capacity. In embodiments, provided herein is a transaction-enabling system having a fleet of machines that automatically aggregate data on collective optimization of forward market purchases of energy credits and having a fleet of machines that automatically sell their aggregate energy storage capacity on a forward market for energy storage capacity. In embodiments, provided herein is a transaction-enabling system having a fleet of machines that automatically aggregate data on collective optimization of forward market purchases of energy credits and having a fleet of machines that automatically sell their aggregate network bandwidth on a forward market for network capacity. In embodiments, provided herein is a transaction-enabling system having a fleet of machines that automatically aggregate data on collective optimization of forward market purchases of energy credits and having a machine that automatically forecasts forward market pricing of energy prices based on information collected from social media data sources. In embodiments, provided herein is a transaction-enabling system having a fleet of machines that automatically aggregate data on collective optimization of forward market purchases of energy credits and having a machine that automatically forecasts forward market pricing of network spectrum based on information collected from social media data sources. In embodiments, provided herein is a transaction-enabling system having a fleet of machines that automatically aggregate data on collective optimization of forward market purchases of energy credits and having a machine that automatically forecasts forward market pricing of energy credits based on information collected from social media data sources. In embodiments, provided herein is a transaction-enabling system having a fleet of machines that automatically aggregate data on collective optimization of forward market purchases of energy credits and having a machine that automatically forecasts forward market value of compute capability based on information collected from social media data sources. In embodiments, provided herein is a transaction-enabling system having a fleet of machines that automatically aggregate data on collective optimization of forward market purchases of energy credits and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of energy credits and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of energy credits and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of energy credits and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of energy credits and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of energy credits and having a machine that automatically allocates its energy capacity among a core task, a compute task, an energy storage task, a data storage task, and a networking task. In embodiments, provided herein is a transaction-enabling system having a fleet of machines that automatically aggregate data on collective optimization of forward market purchases of energy credits and having a machine that automatically allocates its compute capacity among a core task, a compute task, an energy storage task, a data storage task, and a networking task. In embodiments, provided herein is a transaction-enabling system having a fleet of machines that automatically aggregate data on collective optimization of forward market purchases of energy credits and having a machine that automatically allocates its networking capacity among a core task, a compute task, an energy storage task, a data storage task, and a networking task. In embodiments, provided herein is a transaction-enabling system having a fleet of machines that automatically aggregate data on collective optimization of forward market purchases of energy credits and having a fleet of machines that automatically allocate collective energy capacity among a core task, a compute task, an energy storage task, a data storage task, and a networking task. In embodiments, provided herein is a transaction-enabling system having a fleet of machines that automatically aggregate data on collective optimization of forward market purchases of energy credits and having a fleet of machines that automatically allocate collective compute capacity among a core task, a compute task, an energy storage task, a data storage task, and a networking task. In embodiments, provided herein is a transaction-enabling system having a fleet of machines that automatically aggregate data on collective optimization of forward market purchases of energy credits and having a fleet of machines that automatically allocate collective networking capacity among a core task, a compute task, an energy storage task, a data storage task, and a networking task. In embodiments, provided herein is a transaction-enabling system having a fleet of machines that automatically aggregate data on collective optimization of forward market purchases of energy credits and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically aggregate data on collective optimization of forward market purchases of energy credits and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of forward market purchases of energy credits and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically aggregate data on collective optimization of forward market purchases of energy credits and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of forward market purchases of energy credits and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically aggregate data on collective optimization of forward market purchases of energy credits and having a distributed ledger that tokenizes an instruction set, such that operation on the distributed ledger provides provable access to the instruction set. In embodiments, provided herein is a transaction-enabling system having a fleet of machines that automatically aggregate data on collective optimization of forward market purchases of energy credits and having a distributed ledger that tokenizes executable algorithmic logic, such that operation on the distributed ledger provides provable access to the executable algorithmic logic. In embodiments, provided herein is a transaction-enabling system having a fleet of machines that automatically aggregate data on collective optimization of forward market purchases of energy credits and having a distributed ledger that tokenizes a 3D printer instruction set, such that operation on the distributed ledger provides provable access to the instruction set. In embodiments, provided herein is a transaction-enabling system having a fleet of machines that automatically aggregate data on collective optimization of forward market purchases of energy credits and having a distributed ledger that tokenizes an instruction set for a coating process, such that operation on the distributed ledger provides provable access to the instruction set. In embodiments, provided herein is a transaction-enabling system having a fleet of machines that automatically aggregate data on collective optimization of forward market purchases of energy credits and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically aggregate data on collective optimization of forward market purchases of energy credits and having a distributed ledger that tokenizes a firmware program, such that operation on the distributed ledger provides provable access to the firmware program. In embodiments, provided herein is a transaction-enabling system having a fleet of machines that automatically aggregate data on collective optimization of forward market purchases of energy credits and having a distributed ledger that tokenizes an instruction set for an FPGA, such that operation on the distributed ledger provides provable access to the FPGA. In embodiments, provided herein is a transaction-enabling system having a fleet of machines that automatically aggregate data on collective optimization of forward market purchases of energy credits and having a distributed ledger that tokenizes serverless code logic, such that operation on the distributed ledger provides provable access to the serverless code logic. In embodiments, provided herein is a transaction-enabling system having a fleet of machines that automatically aggregate data on collective optimization of forward market purchases of energy credits and having a distributed ledger that tokenizes an instruction set for a crystal fabrication system, such that operation on the distributed ledger provides provable access to the instruction set. In embodiments, provided herein is a transaction-enabling system having a fleet of machines that automatically aggregate data on collective optimization of forward market purchases of energy credits and having a distributed ledger that tokenizes an instruction set for a food preparation process, such that operation on the distributed ledger provides provable access to the instruction set. In embodiments, provided herein is a transaction-enabling system having a fleet of machines that automatically aggregate data on collective optimization of forward market purchases of energy credits and having a distributed ledger that tokenizes an instruction set for a polymer production process, such that operation on the distributed ledger provides provable access to the instruction set. In embodiments, provided herein is a transaction-enabling system having a fleet of machines that automatically aggregate data on collective optimization of forward market purchases of energy credits and having a distributed ledger that tokenizes an instruction set for chemical synthesis process, such that operation on the distributed ledger provides provable access to the instruction set. In embodiments, provided herein is a transaction-enabling system having a fleet of machines that automatically aggregate data on collective optimization of forward market purchases of energy credits and having a distributed ledger that tokenizes an instruction set for a biological production process, such that operation on the distributed ledger provides provable access to the instruction set. In embodiments, provided herein is a transaction-enabling system having a fleet of machines that automatically aggregate data on collective optimization of forward market purchases of energy credits and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically aggregate data on collective optimization of forward market purchases of energy credits and having a distributed ledger that aggregates views of a trade secret into a chain that proves which and how many parties have viewed the trade secret. In embodiments, provided herein is a transaction-enabling system having a fleet of machines that automatically aggregate data on collective optimization of forward market purchases of energy credits and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically aggregate data on collective optimization of forward market purchases of energy credits and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically aggregate data on collective optimization of forward market purchases of energy credits and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically aggregate data on collective optimization of forward market purchases of energy credits and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically aggregate data on collective optimization of forward market purchases of energy credits and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically aggregate data on collective optimization of forward market purchases of energy credits and having a self-executing cryptocurrency coin that commits a transaction upon recognizing a location-based parameter that provides favorable tax treatment. In embodiments, provided herein is a transaction-enabling system having a fleet of machines that automatically aggregate data on collective optimization of forward market purchases of energy credits and having an expert system that uses machine learning to optimize the execution of cryptocurrency transactions based on tax status. In embodiments, provided herein is a transaction-enabling system having a fleet of machines that automatically aggregate data on collective optimization of forward market purchases of energy credits and having an expert system that aggregates regulatory information covering cryptocurrency transactions and automatically selects a jurisdiction for an operation based on the regulatory information. In embodiments, provided herein is a transaction-enabling system having a fleet of machines that automatically aggregate data on collective optimization of forward market purchases of energy credits and having an expert system that uses machine learning to optimize the execution of a cryptocurrency transaction based on real time energy price information for an available energy source. In embodiments, provided herein is a transaction-enabling system having a fleet of machines that automatically aggregate data on collective optimization of forward market purchases of energy credits and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically aggregate data on collective optimization of forward market purchases of energy credits and having an expert system that uses machine learning to optimize charging and recharging cycle of a rechargeable battery system to provide energy for execution of a cryptocurrency transaction. In embodiments, provided herein is a transaction-enabling system having a fleet of machines that automatically aggregate data on collective optimization of forward market purchases of energy credits and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of energy credits and having an expert system that predicts a forward market price in a market based on an understanding obtained by analyzing social network data sources and executes a transaction based on the forward market prediction. In embodiments, provided herein is a transaction-enabling system having a fleet of machines that automatically aggregate data on collective optimization of forward market purchases of energy credits and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically aggregate data on collective optimization of forward market purchases of energy credits and having an expert system that predicts a forward market price in a market based on an understanding obtained by analyzing social network data sources and executes a cryptocurrency transaction based on the forward market prediction. In embodiments, automatically aggregate data on collective optimization of forward market purchases of energy credits and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of energy credits and having an expert system that predicts a forward market price in an energy market based on an understanding obtained by analyzing social network data sources and executes a transaction based on the forward market prediction. In embodiments, provided herein is a transaction-enabling system having a fleet of machines that automatically aggregate data on collective optimization of forward market purchases of energy credits and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of energy credits and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of energy credits and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically aggregate data on collective optimization of forward market purchases of energy credits and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of energy credits and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically aggregate data on collective optimization of forward market purchases of energy credits and having a machine that automatically forecasts forward market pricing of energy prices based on information collected from automated agent behavioral data sources. In embodiments, provided herein is a transaction-enabling system having a fleet of machines that automatically aggregate data on collective optimization of forward market purchases of energy credits and having a machine that automatically forecasts forward market pricing of network spectrum based on information collected from automated agent behavioral data sources. In embodiments, provided herein is a transaction-enabling system having a fleet of machines that automatically aggregate data on collective optimization of forward market purchases of energy credits and having a machine that automatically forecasts forward market pricing of energy credits based on information collected from automated agent behavioral data sources. In embodiments, provided herein is a transaction-enabling system having a fleet of machines that automatically aggregate data on collective optimization of forward market purchases of energy credits and having a machine that automatically forecasts forward market value of compute capability based on information collected from automated agent behavioral data sources. In embodiments, provided herein is a transaction-enabling system having a fleet of machines that automatically aggregate data on collective optimization of forward market purchases of energy credits and having a machine that automatically forecasts forward market pricing of energy prices based on information collected from business entity behavioral data sources. In embodiments, provided herein is a transaction-enabling system having a fleet of machines that automatically aggregate data on collective optimization of forward market purchases of energy credits and having a machine that automatically forecasts forward market pricing of network spectrum based on information collected from business entity behavioral data sources. In embodiments, provided herein is a transaction-enabling system having a fleet of machines that automatically aggregate data on collective optimization of forward market purchases of energy credits and having a machine that automatically forecasts forward market pricing of energy credits based on information collected from business entity behavioral data sources. In embodiments, provided herein is a transaction-enabling system having a fleet of machines that automatically aggregate data on collective optimization of forward market purchases of energy credits and having a machine that automatically forecasts forward market value of compute capability based on information collected from business entity behavioral data sources. In embodiments, automatically aggregate data on collective optimization of forward market purchases of energy credits and having a machine that automatically forecasts forward market pricing of energy prices based on information collected from human behavioral data sources. In embodiments, provided herein is a transaction-enabling system having a fleet of machines that automatically aggregate data on collective optimization of forward market purchases of energy credits and having a machine that automatically forecasts forward market pricing of network spectrum based on information collected from human behavioral data sources. In embodiments, provided herein is a transaction-enabling system having a fleet of machines that automatically aggregate data on collective optimization of forward market purchases of energy credits and having a machine that automatically forecasts forward market pricing of energy credits based on information collected from human behavioral data sources. In embodiments, provided herein is a transaction-enabling system having a fleet of machines that automatically aggregate data on collective optimization of forward market purchases of energy credits and having a machine that automatically forecasts forward market value of compute capability based on information collected from human behavioral data sources. In embodiments, provided herein is a transaction-enabling system having a fleet of machines that automatically aggregate data on collective optimization of forward market purchases of energy credits and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically aggregate data on collective optimization of forward market purchases of energy credits and having an intelligent agent that is configured to solicit the attention resources of another external intelligent agent. In embodiments, provided herein is a transaction-enabling system having a fleet of machines that automatically aggregate data on collective optimization of forward market purchases of energy credits and having a machine that automatically purchases attention resources in a forward market for attention. In embodiments, provided herein is a transaction-enabling system having a fleet of machines that automatically aggregate data on collective optimization of forward market purchases of energy credits and having a fleet of machines that automatically aggregate purchasing in a forward market for attention. In embodiments, provided herein is a transaction-enabling system having a fleet of machines that automatically aggregate data on collective optimization of forward market purchases of energy credits and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate data on collective optimization of forward market purchases of energy credits and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate data on collective optimization of forward market purchases of energy credits and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate data on collective optimization of forward market purchases of energy credits and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate data on collective optimization of forward market purchases of energy credits and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate data on collective optimization of forward market purchases of energy credits and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate data on collective optimization of forward market purchases of energy credits and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate data on collective optimization of forward market purchases of energy credits and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate data on collective optimization of forward market purchases of energy credits and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate data on collective optimization of forward market purchases of energy credits and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate data on collective optimization of forward market purchases of energy credits and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate data on collective optimization of forward market purchases of energy credits and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate data on collective optimization of forward market purchases of energy credits and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate data on collective optimization of forward market purchases of energy credits and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate data on collective optimization of forward market purchases of network spectrum. In embodiments, provided herein is a transaction-enabling system having a fleet of machines that automatically aggregate data on collective optimization of forward market purchases of network spectrum and having a fleet of machines that automatically aggregate data on collective optimization of forward market sales of compute capacity. In embodiments, provided herein is a transaction-enabling system having a fleet of machines that automatically aggregate data on collective optimization of forward market purchases of network spectrum and having a machine that automatically purchases its energy in a spot market for energy. In embodiments, provided herein is a transaction-enabling system having a fleet of machines that automatically aggregate data on collective optimization of forward market purchases of network spectrum and having a machine that automatically purchases energy credits in a spot market. In embodiments, provided herein is a transaction-enabling system having a fleet of machines that automatically aggregate data on collective optimization of forward market purchases of network spectrum and having a fleet of machines that automatically aggregate purchasing in a spot market for energy. In embodiments, provided herein is a transaction-enabling system having a fleet of machines that automatically aggregate data on collective optimization of forward market purchases of network spectrum and having a fleet of machines that automatically aggregate purchasing energy credits in a spot market. In embodiments, provided herein is a transaction-enabling system having a fleet of machines that automatically aggregate data on collective optimization of forward market purchases of network spectrum and having a machine that automatically purchases spectrum allocation in a spot market for network spectrum. In embodiments, provided herein is a transaction-enabling system having a fleet of machines that automatically aggregate data on collective optimization of forward market purchases of network spectrum and having a fleet of machines that automatically purchase spectrum allocation in a spot market for network spectrum. In embodiments, provided herein is a transaction-enabling system having a fleet of machines that automatically aggregate data on collective optimization of forward market purchases of network spectrum and having a fleet of machines that automatically optimize energy utilization for compute task allocation. In embodiments, provided herein is a transaction-enabling system having a fleet of machines that automatically aggregate data on collective optimization of forward market purchases of network spectrum and having a fleet of machines that automatically aggregate data on collective optimization of spot market purchases of energy. In embodiments, provided herein is a transaction-enabling system having a fleet of machines that automatically aggregate data on collective optimization of forward market purchases of network spectrum and having a fleet of machines that automatically aggregate data on collective optimization of spot market purchases of energy credits. In embodiments, provided herein is a transaction-enabling system having a fleet of machines that automatically aggregate data on collective optimization of forward market purchases of network spectrum and having a fleet of machines that automatically aggregate data on collective optimization of spot market purchases of network spectrum. In embodiments, provided herein is a transaction-enabling system having a fleet of machines that automatically aggregate data on collective optimization of forward market purchases of network spectrum and having a fleet of machines that automatically sell their aggregate compute capacity on a forward market for compute capacity. In embodiments, provided herein is a transaction-enabling system having a fleet of machines that automatically aggregate data on collective optimization of forward market purchases of network spectrum and having a fleet of machines that automatically sell their aggregate compute storage capacity on a forward market for storage capacity. In embodiments, provided herein is a transaction-enabling system having a fleet of machines that automatically aggregate data on collective optimization of forward market purchases of network spectrum and having a fleet of machines that automatically sell their aggregate energy storage capacity on a forward market for energy storage capacity. In embodiments, provided herein is a transaction-enabling system having a fleet of machines that automatically aggregate data on collective optimization of forward market purchases of network spectrum and having a fleet of machines that automatically sell their aggregate network bandwidth on a forward market for network capacity. In embodiments, provided herein is a transaction-enabling system having a fleet of machines that automatically aggregate data on collective optimization of forward market purchases of network spectrum and having a machine that automatically forecasts forward market pricing of energy prices based on information collected from social media data sources. In embodiments, provided herein is a transaction-enabling system having a fleet of machines that automatically aggregate data on collective optimization of forward market purchases of network spectrum and having a machine that automatically forecasts forward market pricing of network spectrum based on information collected from social media data sources. In embodiments, provided herein is a transaction-enabling system having a fleet of machines that automatically aggregate data on collective optimization of forward market purchases of network spectrum and having a machine that automatically forecasts forward market pricing of energy credits based on information collected from social media data sources. In embodiments, provided herein is a transaction-enabling system having a fleet of machines that automatically aggregate data on collective optimization of forward market purchases of network spectrum and having a machine that automatically forecasts forward market value of compute capability based on information collected from social media data sources. In embodiments, provided herein is a transaction-enabling system having a fleet of machines that automatically aggregate data on collective optimization of forward market purchases of network spectrum and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of network spectrum and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of network spectrum and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of network spectrum and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of network spectrum and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market purchases of network spectrum and having a machine that automatically allocates its energy capacity among a core task, a compute task, an energy storage task, a data storage task, and a networking task. In embodiments, provided herein is a transaction-enabling system having a fleet of machines that automatically aggregate data on collective optimization of forward market purchases of network spectrum and having a machine that automatically allocates its compute capacity among a core task, a compute task, an energy storage task, a data storage task, and a networking task. In embodiments, provided herein is a transaction-enabling system having a fleet of machines that automatically aggregate data on collective optimization of forward market purchases of network spectrum and having a machine that automatically allocates its networking capacity among a core task, a compute task, an energy storage task, a data storage task, and a networking task. In embodiments, provided herein is a transaction-enabling system having a fleet of machines that automatically aggregate data on collective optimization of forward market purchases of network spectrum and having a fleet of machines that automatically allocate collective energy capacity among a core task, a compute task, an energy storage task, a data storage task, and a networking task. In embodiments, provided herein is a transaction-enabling system having a fleet of machines that automatically aggregate data on collective optimization of forward market purchases of network spectrum and having a fleet of machines that automatically allocate collective compute capacity among a core task, a compute task, an energy storage task, a data storage task, and a networking task. In embodiments, provided herein is a transaction-enabling system having a fleet of machines that automatically aggregate data on collective optimization of forward market purchases of network spectrum and having a fleet of machines that automatically allocate collective networking capacity among a core task, a compute task, an energy storage task, a data storage task, and a networking task. In embodiments, provided herein is a transaction-enabling system having a fleet of machines that automatically aggregate data on collective optimization of forward market purchases of network spectrum and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically aggregate data on collective optimization of forward market purchases of network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of forward market purchases of network spectrum and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically aggregate data on collective optimization of forward market purchases of network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of forward market purchases of network spectrum and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically aggregate data on collective optimization of forward market purchases of network spectrum and having a distributed ledger that tokenizes an instruction set, such that operation on the distributed ledger provides provable access to the instruction set. In embodiments, provided herein is a transaction-enabling system having a fleet of machines that automatically aggregate data on collective optimization of forward market purchases of network spectrum and having a distributed ledger that tokenizes executable algorithmic logic, such that operation on the distributed ledger provides provable access to the executable algorithmic logic. In embodiments, provided herein is a transaction-enabling system having a fleet of machines that automatically aggregate data on collective optimization of forward market purchases of network spectrum and having a distributed ledger that tokenizes a 3D printer instruction set, such that operation on the distributed ledger provides provable access to the instruction set. In embodiments, provided herein is a transaction-enabling system having a fleet of machines that automatically aggregate data on collective optimization of forward market purchases of network spectrum and having a distributed ledger that tokenizes an instruction set for a coating process, such that operation on the distributed ledger provides provable access to the instruction set. In embodiments, provided herein is a transaction-enabling system having a fleet of machines that automatically aggregate data on collective optimization of forward market purchases of network spectrum and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically aggregate data on collective optimization of forward market purchases of network spectrum and having a distributed ledger that tokenizes a firmware program, such that operation on the distributed ledger provides provable access to the firmware program. In embodiments, provided herein is a transaction-enabling system having a fleet of machines that automatically aggregate data on collective optimization of forward market purchases of network spectrum and having a distributed ledger that tokenizes an instruction set for an FPGA, such that operation on the distributed ledger provides provable access to the FPGA. In embodiments, provided herein is a transaction-enabling system having a fleet of machines that automatically aggregate data on collective optimization of forward market purchases of network spectrum and having a distributed ledger that tokenizes serverless code logic, such that operation on the distributed ledger provides provable access to the serverless code logic. In embodiments, provided herein is a transaction-enabling system having a fleet of machines that automatically aggregate data on collective optimization of forward market purchases of network spectrum and having a distributed ledger that tokenizes an instruction set for a crystal fabrication system, such that operation on the distributed ledger provides provable access to the instruction set. In embodiments, provided herein is a transaction-enabling system having a fleet of machines that automatically aggregate data on collective optimization of forward market purchases of network spectrum and having a distributed ledger that tokenizes an instruction set for a food preparation process, such that operation on the distributed ledger provides provable access to the instruction set. In embodiments, provided herein is a transaction-enabling system having a fleet of machines that automatically aggregate data on collective optimization of forward market purchases of network spectrum and having a distributed ledger that tokenizes an instruction set for a polymer production process, such that operation on the distributed ledger provides provable access to the instruction set. In embodiments, provided herein is a transaction-enabling system having a fleet of machines that automatically aggregate data on collective optimization of forward market purchases of network spectrum and having a distributed ledger that tokenizes an instruction set for chemical synthesis process, such that operation on the distributed ledger provides provable access to the instruction set. In embodiments, provided herein is a transaction-enabling system having a fleet of machines that automatically aggregate data on collective optimization of forward market purchases of network spectrum and having a distributed ledger that tokenizes an instruction set for a biological production process, such that operation on the distributed ledger provides provable access to the instruction set. In embodiments, provided herein is a transaction-enabling system having a fleet of machines that automatically aggregate data on collective optimization of forward market purchases of network spectrum and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically aggregate data on collective optimization of forward market purchases of network spectrum and having a distributed ledger that aggregates views of a trade secret into a chain that proves which and how many parties have viewed the trade secret. In embodiments, provided herein is a transaction-enabling system having a fleet of machines that automatically aggregate data on collective optimization of forward market purchases of network spectrum and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically aggregate data on collective optimization of forward market purchases of network spectrum and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically aggregate data on collective optimization of forward market purchases of network spectrum and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically aggregate data on collective optimization of forward market purchases of network spectrum and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically aggregate data on collective optimization of forward market purchases of network spectrum and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically aggregate data on collective optimization of forward market purchases of network spectrum and having a self-executing cryptocurrency coin that commits a transaction upon recognizing a location-based parameter that provides favorable tax treatment. In embodiments, provided herein is a transaction-enabling system having a fleet of machines that automatically aggregate data on collective optimization of forward market purchases of network spectrum and having an expert system that uses machine learning to optimize the execution of cryptocurrency transactions based on tax status. In embodiments, provided herein is a transaction-enabling system having a fleet of machines that automatically aggregate data on collective optimization of forward market purchases of network spectrum and having an expert system that aggregates regulatory information covering cryptocurrency transactions and automatically selects a jurisdiction for an operation based on the regulatory information. In embodiments, provided herein is a transaction-enabling system having a fleet of machines that automatically aggregate data on collective optimization of forward market purchases of network spectrum and having an expert system that uses machine learning to optimize the execution of a cryptocurrency transaction based on real time energy price information for an available energy source. In embodiments, provided herein is a transaction-enabling system having a fleet of machines that automatically aggregate data on collective optimization of forward market purchases of network spectrum and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically aggregate data on collective optimization of forward market purchases of network spectrum and having an expert system that uses machine learning to optimize charging and recharging cycle of a rechargeable battery system to provide energy for execution of a cryptocurrency transaction. In embodiments, provided herein is a transaction-enabling system having a fleet of machines that automatically aggregate data on collective optimization of forward market purchases of network spectrum and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of network spectrum and having an expert system that predicts a forward market price in a market based on an understanding obtained by analyzing social network data sources and executes a transaction based on the forward market prediction. In embodiments, provided herein is a transaction-enabling system having a fleet of machines that automatically aggregate data on collective optimization of forward market purchases of network spectrum and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically aggregate data on collective optimization of forward market purchases of network spectrum and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically aggregate data on collective optimization of forward market purchases of network spectrum and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of network spectrum and having an expert system that predicts a forward market price in an energy market based on an understanding obtained by analyzing social network data sources and executes a transaction based on the forward market prediction. In embodiments, provided herein is a transaction-enabling system having a fleet of machines that automatically aggregate data on collective optimization of forward market purchases of network spectrum and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of network spectrum and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of network spectrum and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically aggregate data on collective optimization of forward market purchases of network spectrum and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically aggregate data on collective optimization of forward market purchases of network spectrum and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically aggregate data on collective optimization of forward market purchases of network spectrum and having a machine that automatically forecasts forward market pricing of energy prices based on information collected from automated agent behavioral data sources. In embodiments, provided herein is a transaction-enabling system having a fleet of machines that automatically aggregate data on collective optimization of forward market purchases of network spectrum and having a machine that automatically forecasts forward market pricing of network spectrum based on information collected from automated agent behavioral data sources. In embodiments, provided herein is a transaction-enabling system having a fleet of machines that automatically aggregate data on collective optimization of forward market purchases of network spectrum and having a machine that automatically forecasts forward market pricing of energy credits based on information collected from automated agent behavioral data sources. In embodiments, provided herein is a transaction-enabling system having a fleet of machines that automatically aggregate data on collective optimization of forward market purchases of network spectrum and having a machine that automatically forecasts forward market value of compute capability based on information collected from automated agent behavioral data sources. In embodiments, provided herein is a transaction-enabling system having a fleet of machines that automatically aggregate data on collective optimization of forward market purchases of network spectrum and having a machine that automatically forecasts forward market pricing of energy prices based on information collected from business entity behavioral data sources. In embodiments, provided herein is a transaction-enabling system having a fleet of machines that automatically aggregate data on collective optimization of forward market purchases of network spectrum and having a machine that automatically forecasts forward market pricing of network spectrum based on information collected from business entity behavioral data sources. In embodiments, provided herein is a transaction-enabling system having a fleet of machines that automatically aggregate data on collective optimization of forward market purchases of network spectrum and having a machine that automatically forecasts forward market pricing of energy credits based on information collected from business entity behavioral data sources. In embodiments, provided herein is a transaction-enabling system having a fleet of machines that automatically aggregate data on collective optimization of forward market purchases of network spectrum and having a machine that automatically forecasts forward market value of compute capability based on information collected from business entity behavioral data sources. In embodiments, provided herein is a transaction-enabling system having a fleet of machines that automatically aggregate data on collective optimization of forward market purchases of network spectrum and having a machine that automatically forecasts forward market pricing of energy prices based on information collected from human behavioral data sources. In embodiments, provided herein is a transaction-enabling system having a fleet of machines that automatically aggregate data on collective optimization of forward market purchases of network spectrum and having a machine that automatically forecasts forward market pricing of network spectrum based on information collected from human behavioral data sources. In embodiments, provided herein is a transaction-enabling system having a fleet of machines that automatically aggregate data on collective optimization of forward market purchases of network spectrum and having a machine that automatically forecasts forward market pricing of energy credits based on information collected from human behavioral data sources. In embodiments, provided herein is a transaction-enabling system having a fleet of machines that automatically aggregate data on collective optimization of forward market purchases of network spectrum and having a machine that automatically forecasts forward market value of compute capability based on information collected from human behavioral data sources. In embodiments, provided herein is a transaction-enabling system having a fleet of machines that automatically aggregate data on collective optimization of forward market purchases of network spectrum and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically aggregate data on collective optimization of forward market purchases of network spectrum and having an intelligent agent that is configured to solicit the attention resources of another external intelligent agent. In embodiments, provided herein is a transaction-enabling system having a fleet of machines that automatically aggregate data on collective optimization of forward market purchases of network spectrum and having a machine that automatically purchases attention resources in a forward market for attention. In embodiments, provided herein is a transaction-enabling system having a fleet of machines that automatically aggregate data on collective optimization of forward market purchases of network spectrum and having a fleet of machines that automatically aggregate purchasing in a forward market for attention. In embodiments, provided herein is a transaction-enabling system having a fleet of machines that automatically aggregate data on collective optimization of forward market purchases of network spectrum and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate data on collective optimization of forward market purchases of network spectrum and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate data on collective optimization of forward market purchases of network spectrum and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate data on collective optimization of forward market purchases of network spectrum and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate data on collective optimization of forward market purchases of network spectrum and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate data on collective optimization of forward market purchases of network spectrum and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate data on collective optimization of forward market purchases of network spectrum and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate data on collective optimization of forward market purchases of network spectrum and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate data on collective optimization of forward market purchases of network spectrum and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate data on collective optimization of forward market purchases of network spectrum and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate data on collective optimization of forward market purchases of network spectrum and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate data on collective optimization of forward market purchases of network spectrum and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate data on collective optimization of forward market purchases of network spectrum and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate data on collective optimization of forward market purchases of network spectrum and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate data on collective optimization of forward market sales of compute capacity. In embodiments, provided herein is a transaction-enabling system having a fleet of machines that automatically aggregate data on collective optimization of forward market sales of compute capacity and having a machine that automatically purchases its energy in a spot market for energy. In embodiments, provided herein is a transaction-enabling system having a fleet of machines that automatically aggregate data on collective optimization of forward market sales of compute capacity and having a machine that automatically purchases energy credits in a spot market. In embodiments, provided herein is a transaction-enabling system having a fleet of machines that automatically aggregate data on collective optimization of forward market sales of compute capacity and having a fleet of machines that automatically aggregate purchasing in a spot market for energy. In embodiments, provided herein is a transaction-enabling system having a fleet of machines that automatically aggregate data on collective optimization of forward market sales of compute capacity and having a fleet of machines that automatically aggregate purchasing energy credits in a spot market. In embodiments, provided herein is a transaction-enabling system having a fleet of machines that automatically aggregate data on collective optimization of forward market sales of compute capacity and having a machine that automatically purchases spectrum allocation in a spot market for network spectrum. In embodiments, provided herein is a transaction-enabling system having a fleet of machines that automatically aggregate data on collective optimization of forward market sales of compute capacity and having a fleet of machines that automatically purchase spectrum allocation in a spot market for network spectrum. In embodiments, provided herein is a transaction-enabling system having a fleet of machines that automatically aggregate data on collective optimization of forward market sales of compute capacity and having a fleet of machines that automatically optimize energy utilization for compute task allocation. In embodiments, provided herein is a transaction-enabling system having a fleet of machines that automatically aggregate data on collective optimization of forward market sales of compute capacity and having a fleet of machines that automatically aggregate data on collective optimization of spot market purchases of energy. In embodiments, provided herein is a transaction-enabling system having a fleet of machines that automatically aggregate data on collective optimization of forward market sales of compute capacity and having a fleet of machines that automatically aggregate data on collective optimization of spot market purchases of energy credits. In embodiments, provided herein is a transaction-enabling system having a fleet of machines that automatically aggregate data on collective optimization of forward market sales of compute capacity and having a fleet of machines that automatically aggregate data on collective optimization of spot market purchases of network spectrum. In embodiments, provided herein is a transaction-enabling system having a fleet of machines that automatically aggregate data on collective optimization of forward market sales of compute capacity and having a fleet of machines that automatically sell their aggregate compute capacity on a forward market for compute capacity. In embodiments, provided herein is a transaction-enabling system having a fleet of machines that automatically aggregate data on collective optimization of forward market sales of compute capacity and having a fleet of machines that automatically sell their aggregate compute storage capacity on a forward market for storage capacity. In embodiments, provided herein is a transaction-enabling system having a fleet of machines that automatically aggregate data on collective optimization of forward market sales of compute capacity and having a fleet of machines that automatically sell their aggregate energy storage capacity on a forward market for energy storage capacity. In embodiments, provided herein is a transaction-enabling system having a fleet of machines that automatically aggregate data on collective optimization of forward market sales of compute capacity and having a fleet of machines that automatically sell their aggregate network bandwidth on a forward market for network capacity. In embodiments, provided herein is a transaction-enabling system having a fleet of machines that automatically aggregate data on collective optimization of forward market sales of compute capacity and having a machine that automatically forecasts forward market pricing of energy prices based on information collected from social media data sources. In embodiments, provided herein is a transaction-enabling system having a fleet of machines that automatically aggregate data on collective optimization of forward market sales of compute capacity and having a machine that automatically forecasts forward market pricing of network spectrum based on information collected from social media data sources. In embodiments, provided herein is a transaction-enabling system having a fleet of machines that automatically aggregate data on collective optimization of forward market sales of compute capacity and having a machine that automatically forecasts forward market pricing of energy credits based on information collected from social media data sources. In embodiments, provided herein is a transaction-enabling system having a fleet of machines that automatically aggregate data on collective optimization of forward market sales of compute capacity and having a machine that automatically forecasts forward market value of compute capability based on information collected from social media data sources. In embodiments, provided herein is a transaction-enabling system having a fleet of machines that automatically aggregate data on collective optimization of forward market sales of compute capacity and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market sales of compute capacity and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market sales of compute capacity and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market sales of compute capacity and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market sales of compute capacity and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically aggregate data on collective optimization of forward market sales of compute capacity and having a machine that automatically allocates its energy capacity among a core task, a compute task, an energy storage task, a data storage task, and a networking task. In embodiments, provided herein is a transaction-enabling system having a fleet of machines that automatically aggregate data on collective optimization of forward market sales of compute capacity and having a machine that automatically allocates its compute capacity among a core task, a compute task, an energy storage task, a data storage task, and a networking task. In embodiments, provided herein is a transaction-enabling system having a fleet of machines that automatically aggregate data on collective optimization of forward market sales of compute capacity and having a machine that automatically allocates its networking capacity among a core task, a compute task, an energy storage task, a data storage task, and a networking task. In embodiments, provided herein is a transaction-enabling system having a fleet of machines that automatically aggregate data on collective optimization of forward market sales of compute capacity and having a fleet of machines that automatically allocate collective energy capacity among a core task, a compute task, an energy storage task, a data storage task, and a networking task. In embodiments, provided herein is a transaction-enabling system having a fleet of machines that automatically aggregate data on collective optimization of forward market sales of compute capacity and having a fleet of machines that automatically allocate collective compute capacity among a core task, a compute task, an energy storage task, a data storage task, and a networking task. In embodiments, provided herein is a transaction-enabling system having a fleet of machines that automatically aggregate data on collective optimization of forward market sales of compute capacity and having a fleet of machines that automatically allocate collective networking capacity among a core task, a compute task, an energy storage task, a data storage task, and a networking task. In embodiments, provided herein is a transaction-enabling system having a fleet of machines that automatically aggregate data on collective optimization of forward market sales of compute capacity and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically aggregate data on collective optimization of forward market sales of compute capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of forward market sales of compute capacity and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically aggregate data on collective optimization of forward market sales of compute capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of forward market sales of compute capacity and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically aggregate data on collective optimization of forward market sales of compute capacity and having a distributed ledger that tokenizes an instruction set, such that operation on the distributed ledger provides provable access to the instruction set. In embodiments, provided herein is a transaction-enabling system having a fleet of machines that automatically aggregate data on collective optimization of forward market sales of compute capacity and having a distributed ledger that tokenizes executable algorithmic logic, such that operation on the distributed ledger provides provable access to the executable algorithmic logic. In embodiments, provided herein is a transaction-enabling system having a fleet of machines that automatically aggregate data on collective optimization of forward market sales of compute capacity and having a distributed ledger that tokenizes a 3D printer instruction set, such that operation on the distributed ledger provides provable access to the instruction set. In embodiments, provided herein is a transaction-enabling system having a fleet of machines that automatically aggregate data on collective optimization of forward market sales of compute capacity and having a distributed ledger that tokenizes an instruction set for a coating process, such that operation on the distributed ledger provides provable access to the instruction set. In embodiments, provided herein is a transaction-enabling system having a fleet of machines that automatically aggregate data on collective optimization of forward market sales of compute capacity and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically aggregate data on collective optimization of forward market sales of compute capacity and having a distributed ledger that tokenizes a firmware program, such that operation on the distributed ledger provides provable access to the firmware program. In embodiments, provided herein is a transaction-enabling system having a fleet of machines that automatically aggregate data on collective optimization of forward market sales of compute capacity and having a distributed ledger that tokenizes an instruction set for an FPGA, such that operation on the distributed ledger provides provable access to the FPGA. In embodiments, provided herein is a transaction-enabling system having a fleet of machines that automatically aggregate data on collective optimization of forward market sales of compute capacity and having a distributed ledger that tokenizes serverless code logic, such that operation on the distributed ledger provides provable access to the serverless code logic. In embodiments, provided herein is a transaction-enabling system having a fleet of machines that automatically aggregate data on collective optimization of forward market sales of compute capacity and having a distributed ledger that tokenizes an instruction set for a crystal fabrication system, such that operation on the distributed ledger provides provable access to the instruction set. In embodiments, provided herein is a transaction-enabling system having a fleet of machines that automatically aggregate data on collective optimization of forward market sales of compute capacity and having a distributed ledger that tokenizes an instruction set for a food preparation process, such that operation on the distributed ledger provides provable access to the instruction set. In embodiments, provided herein is a transaction-enabling system having a fleet of machines that automatically aggregate data on collective optimization of forward market sales of compute capacity and having a distributed ledger that tokenizes an instruction set for a polymer production process, such that operation on the distributed ledger provides provable access to the instruction set. In embodiments, provided herein is a transaction-enabling system having a fleet of machines that automatically aggregate data on collective optimization of forward market sales of compute capacity and having a distributed ledger that tokenizes an instruction set for chemical synthesis process, such that operation on the distributed ledger provides provable access to the instruction set. In embodiments, provided herein is a transaction-enabling system having a fleet of machines that automatically aggregate data on collective optimization of forward market sales of compute capacity and having a distributed ledger that tokenizes an instruction set for a biological production process, such that operation on the distributed ledger provides provable access to the instruction set. In embodiments, provided herein is a transaction-enabling system having a fleet of machines that automatically aggregate data on collective optimization of forward market sales of compute capacity and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically aggregate data on collective optimization of forward market sales of compute capacity and having a distributed ledger that aggregates views of a trade secret into a chain that proves which and how many parties have viewed the trade secret. In embodiments, provided herein is a transaction-enabling system having a fleet of machines that automatically aggregate data on collective optimization of forward market sales of compute capacity and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically aggregate data on collective optimization of forward market sales of compute capacity and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically aggregate data on collective optimization of forward market sales of compute capacity and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically aggregate data on collective optimization of forward market sales of compute capacity and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically aggregate data on collective optimization of forward market sales of compute capacity and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically aggregate data on collective optimization of forward market sales of compute capacity and having a self-executing cryptocurrency coin that commits a transaction upon recognizing a location-based parameter that provides favorable tax treatment. In embodiments, provided herein is a transaction-enabling system having a fleet of machines that automatically aggregate data on collective optimization of forward market sales of compute capacity and having an expert system that uses machine learning to optimize the execution of cryptocurrency transactions based on tax status. In embodiments, provided herein is a transaction-enabling system having a fleet of machines that automatically aggregate data on collective optimization of forward market sales of compute capacity and having an expert system that aggregates regulatory information covering cryptocurrency transactions and automatically selects a jurisdiction for an operation based on the regulatory information. In embodiments, provided herein is a transaction-enabling system having a fleet of machines that automatically aggregate data on collective optimization of forward market sales of compute capacity and having an expert system that uses machine learning to optimize the execution of a cryptocurrency transaction based on real time energy price information for an available energy source. In embodiments, provided herein is a transaction-enabling system having a fleet of machines that automatically aggregate data on collective optimization of forward market sales of compute capacity and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically aggregate data on collective optimization of forward market sales of compute capacity and having an expert system that uses machine learning to optimize charging and recharging cycle of a rechargeable battery system to provide energy for execution of a cryptocurrency transaction. In embodiments, provided herein is a transaction-enabling system having a fleet of machines that automatically aggregate data on collective optimization of forward market sales of compute capacity and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically aggregate data on collective optimization of forward market sales of compute capacity and having an expert system that predicts a forward market price in a market based on an understanding obtained by analyzing social network data sources and executes a transaction based on the forward market prediction. In embodiments, provided herein is a transaction-enabling system having a fleet of machines that automatically aggregate data on collective optimization of forward market sales of compute capacity and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically aggregate data on collective optimization of forward market sales of compute capacity and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically aggregate data on collective optimization of forward market sales of compute capacity and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically aggregate data on collective optimization of forward market sales of compute capacity and having an expert system that predicts a forward market price in an energy market based on an understanding obtained by analyzing social network data sources and executes a transaction based on the forward market prediction. In embodiments, provided herein is a transaction-enabling system having a fleet of machines that automatically aggregate data on collective optimization of forward market sales of compute capacity and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically aggregate data on collective optimization of forward market sales of compute capacity and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically aggregate data on collective optimization of forward market sales of compute capacity and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically aggregate data on collective optimization of forward market sales of compute capacity and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically aggregate data on collective optimization of forward market sales of compute capacity and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically aggregate data on collective optimization of forward market sales of compute capacity and having a machine that automatically forecasts forward market pricing of energy prices based on information collected from automated agent behavioral data sources. In embodiments, provided herein is a transaction-enabling system having a fleet of machines that automatically aggregate data on collective optimization of forward market sales of compute capacity and having a machine that automatically forecasts forward market pricing of network spectrum based on information collected from automated agent behavioral data sources. In embodiments, provided herein is a transaction-enabling system having a fleet of machines that automatically aggregate data on collective optimization of forward market sales of compute capacity and having a machine that automatically forecasts forward market pricing of energy credits based on information collected from automated agent behavioral data sources. In embodiments, provided herein is a transaction-enabling system having a fleet of machines that automatically aggregate data on collective optimization of forward market sales of compute capacity and having a machine that automatically forecasts forward market value of compute capability based on information collected from automated agent behavioral data sources. In embodiments, provided herein is a transaction-enabling system having a fleet of machines that automatically aggregate data on collective optimization of forward market sales of compute capacity and having a machine that automatically forecasts forward market pricing of energy prices based on information collected from business entity behavioral data sources. In embodiments, provided herein is a transaction-enabling system having a fleet of machines that automatically aggregate data on collective optimization of forward market sales of compute capacity and having a machine that automatically forecasts forward market pricing of network spectrum based on information collected from business entity behavioral data sources. In embodiments, provided herein is a transaction-enabling system having a fleet of machines that automatically aggregate data on collective optimization of forward market sales of compute capacity and having a machine that automatically forecasts forward market pricing of energy credits based on information collected from business entity behavioral data sources. In embodiments, provided herein is a transaction-enabling system having a fleet of machines that automatically aggregate data on collective optimization of forward market sales of compute capacity and having a machine that automatically forecasts forward market value of compute capability based on information collected from business entity behavioral data sources. In embodiments, provided herein is a transaction-enabling system having a fleet of machines that automatically aggregate data on collective optimization of forward market sales of compute capacity and having a machine that automatically forecasts forward market pricing of energy prices based on information collected from human behavioral data sources. In embodiments, provided herein is a transaction-enabling system having a fleet of machines that automatically aggregate data on collective optimization of forward market sales of compute capacity and having a machine that automatically forecasts forward market pricing of network spectrum based on information collected from human behavioral data sources. In embodiments, provided herein is a transaction-enabling system having a fleet of machines that automatically aggregate data on collective optimization of forward market sales of compute capacity and having a machine that automatically forecasts forward market pricing of energy credits based on information collected from human behavioral data sources. In embodiments, provided herein is a transaction-enabling system having a fleet of machines that automatically aggregate data on collective optimization of forward market sales of compute capacity and having a machine that automatically forecasts forward market value of compute capability based on information collected from human behavioral data sources. In embodiments, provided herein is a transaction-enabling system having a fleet of machines that automatically aggregate data on collective optimization of forward market sales of compute capacity and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically aggregate data on collective optimization of forward market sales of compute capacity and having an intelligent agent that is configured to solicit the attention resources of another external intelligent agent. In embodiments, provided herein is a transaction-enabling system having a fleet of machines that automatically aggregate data on collective optimization of forward market sales of compute capacity and having a machine that automatically purchases attention resources in a forward market for attention. In embodiments, provided herein is a transaction-enabling system having a fleet of machines that automatically aggregate data on collective optimization of forward market sales of compute capacity and having a fleet of machines that automatically aggregate purchasing in a forward market for attention. In embodiments, provided herein is a transaction-enabling system having a fleet of machines that automatically aggregate data on collective optimization of forward market sales of compute capacity and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate data on collective optimization of forward market sales of compute capacity and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate data on collective optimization of forward market sales of compute capacity and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate data on collective optimization of forward market sales of compute capacity and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate data on collective optimization of forward market sales of compute capacity and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate data on collective optimization of forward market sales of compute capacity and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate data on collective optimization of forward market sales of compute capacity and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate data on collective optimization of forward market sales of compute capacity and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate data on collective optimization of forward market sales of compute capacity and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate data on collective optimization of forward market sales of compute capacity and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate data on collective optimization of forward market sales of compute capacity and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate data on collective optimization of forward market sales of compute capacity and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate data on collective optimization of forward market sales of compute capacity and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate data on collective optimization of forward market sales of compute capacity and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically purchases its energy in a spot market for energy. In embodiments, provided herein is a transaction-enabling system having a machine that automatically purchases its energy in a spot market for energy and having a machine that automatically purchases energy credits in a spot market. In embodiments, provided herein is a transaction-enabling system having a machine that automatically purchases its energy in a spot market for energy and having a fleet of machines that automatically aggregate purchasing in a spot market for energy. In embodiments, provided herein is a transaction-enabling system having a machine that automatically purchases its energy in a spot market for energy and having a fleet of machines that automatically aggregate purchasing energy credits in a spot market. In embodiments, provided herein is a transaction-enabling system having a machine that automatically purchases its energy in a spot market for energy and having a machine that automatically purchases spectrum allocation in a spot market for network spectrum. In embodiments, provided herein is a transaction-enabling system having a machine that automatically purchases its energy in a spot market for energy and having a fleet of machines that automatically purchase spectrum allocation in a spot market for network spectrum. In embodiments, provided herein is a transaction-enabling system having a machine that automatically purchases its energy in a spot market for energy and having a fleet of machines that automatically optimize energy utilization for compute task allocation. In embodiments, provided herein is a transaction-enabling system having a machine that automatically purchases its energy in a spot market for energy and having a fleet of machines that automatically aggregate data on collective optimization of spot market purchases of energy. In embodiments, provided herein is a transaction-enabling system having a machine that automatically purchases its energy in a spot market for energy and having a fleet of machines that automatically aggregate data on collective optimization of spot market purchases of energy credits. In embodiments, provided herein is a transaction-enabling system having a machine that automatically purchases its energy in a spot market for energy and having a fleet of machines that automatically aggregate data on collective optimization of spot market purchases of network spectrum. In embodiments, provided herein is a transaction-enabling system having a machine that automatically purchases its energy in a spot market for energy and having a fleet of machines that automatically sell their aggregate compute capacity on a forward market for compute capacity. In embodiments, provided herein is a transaction-enabling system having a machine that automatically purchases its energy in a spot market for energy and having a fleet of machines that automatically sell their aggregate compute storage capacity on a forward market for storage capacity. In embodiments, provided herein is a transaction-enabling system having a machine that automatically purchases its energy in a spot market for energy and having a fleet of machines that automatically sell their aggregate energy storage capacity on a forward market for energy storage capacity. In embodiments, provided herein is a transaction-enabling system having a machine that automatically purchases its energy in a spot market for energy and having a fleet of machines that automatically sell their aggregate network bandwidth on a forward market for network capacity. In embodiments, provided herein is a transaction-enabling system having a machine that automatically purchases its energy in a spot market for energy and having a machine that automatically forecasts forward market pricing of energy prices based on information collected from social media data sources. In embodiments, provided herein is a transaction-enabling system having a machine that automatically purchases its energy in a spot market for energy and having a machine that automatically forecasts forward market pricing of network spectrum based on information collected from social media data sources. In embodiments, provided herein is a transaction-enabling system having a machine that automatically purchases its energy in a spot market for energy and having a machine that automatically forecasts forward market pricing of energy credits based on information collected from social media data sources. In embodiments, provided herein is a transaction-enabling system having a machine that automatically purchases its energy in a spot market for energy and having a machine that automatically forecasts forward market value of compute capability based on information collected from social media data sources. In embodiments, provided herein is a transaction-enabling system having a machine that automatically purchases its energy in a spot market for energy and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically purchases its energy in a spot market for energy and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically purchases its energy in a spot market for energy and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically purchases its energy in a spot market for energy and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically purchases its energy in a spot market for energy and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically purchases its energy in a spot market for energy and having a machine that automatically allocates its energy capacity among a core task, a compute task, an energy storage task, a data storage task, and a networking task. In embodiments, provided herein is a transaction-enabling system having a machine that automatically purchases its energy in a spot market for energy and having a machine that automatically allocates its compute capacity among a core task, a compute task, an energy storage task, a data storage task, and a networking task. In embodiments, provided herein is a transaction-enabling system having a machine that automatically purchases its energy in a spot market for energy and having a machine that automatically allocates its networking capacity among a core task, a compute task, an energy storage task, a data storage task, and a networking task. In embodiments, provided herein is a transaction-enabling system having a machine that automatically purchases its energy in a spot market for energy and having a fleet of machines that automatically allocate collective energy capacity among a core task, a compute task, an energy storage task, a data storage task, and a networking task. In embodiments, provided herein is a transaction-enabling system having a machine that automatically purchases its energy in a spot market for energy and having a fleet of machines that automatically allocate collective compute capacity among a core task, a compute task, an energy storage task, a data storage task, and a networking task. In embodiments, provided herein is a transaction-enabling system having a machine that automatically purchases its energy in a spot market for energy and having a fleet of machines that automatically allocate collective networking capacity among a core task, a compute task, an energy storage task, a data storage task, and a networking task. In embodiments, provided herein is a transaction-enabling system having a machine that automatically purchases its energy in a spot market for energy and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically purchases its energy in a spot market for energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases its energy in a spot market for energy and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically purchases its energy in a spot market for energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases its energy in a spot market for energy and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically purchases its energy in a spot market for energy and having a distributed ledger that tokenizes an instruction set, such that operation on the distributed ledger provides provable access to the instruction set. In embodiments, provided herein is a transaction-enabling system having a machine that automatically purchases its energy in a spot market for energy and having a distributed ledger that tokenizes executable algorithmic logic, such that operation on the distributed ledger provides provable access to the executable algorithmic logic. In embodiments, provided herein is a transaction-enabling system having a machine that automatically purchases its energy in a spot market for energy and having a distributed ledger that tokenizes a 3D printer instruction set, such that operation on the distributed ledger provides provable access to the instruction set. In embodiments, provided herein is a transaction-enabling system having a machine that automatically purchases its energy in a spot market for energy and having a distributed ledger that tokenizes an instruction set for a coating process, such that operation on the distributed ledger provides provable access to the instruction set. In embodiments, provided herein is a transaction-enabling system having a machine that automatically purchases its energy in a spot market for energy and having a distributed ledger that tokenizes an instruction set for a semiconductor fabrication process, such that operation on the distributed ledger provides provable access to the fabrication process. In embodiments, provided herein is a transaction-enabling system having a machine that automatically purchases its energy in a spot market for energy and having a distributed ledger that tokenizes a firmware program, such that operation on the distributed ledger provides provable access to the firmware program. In embodiments, provided herein is a transaction-enabling system having a machine that automatically purchases its energy in a spot market for energy and having a distributed ledger that tokenizes an instruction set for an FPGA, such that operation on the distributed ledger provides provable access to the FPGA. In embodiments, provided herein is a transaction-enabling system having a machine that automatically purchases its energy in a spot market for energy and having a distributed ledger that tokenizes serverless code logic, such that operation on the distributed ledger provides provable access to the serverless code logic. In embodiments, provided herein is a transaction-enabling system having a machine that automatically purchases its energy in a spot market for energy and having a distributed ledger that tokenizes an instruction set for a crystal fabrication system, such that operation on the distributed ledger provides provable access to the instruction set. In embodiments, provided herein is a transaction-enabling system having a machine that automatically purchases its energy in a spot market for energy and having a distributed ledger that tokenizes an instruction set for a food preparation process, such that operation on the distributed ledger provides provable access to the instruction set. In embodiments, provided herein is a transaction-enabling system having a machine that automatically purchases its energy in a spot market for energy and having a distributed ledger that tokenizes an instruction set for a polymer production process, such that operation on the distributed ledger provides provable access to the instruction set. In embodiments, provided herein is a transaction-enabling system having a machine that automatically purchases its energy in a spot market for energy and having a distributed ledger that tokenizes an instruction set for chemical synthesis process, such that operation on the distributed ledger provides provable access to the instruction set. In embodiments, provided herein is a transaction-enabling system having a machine that automatically purchases its energy in a spot market for energy and having a distributed ledger that tokenizes an instruction set for a biological production process, such that operation on the distributed ledger provides provable access to the instruction set. In embodiments, provided herein is a transaction-enabling system having a machine that automatically purchases its energy in a spot market for energy and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically purchases its energy in a spot market for energy and having a distributed ledger that aggregates views of a trade secret into a chain that proves which and how many parties have viewed the trade secret. In embodiments, provided herein is a transaction-enabling system having a machine that automatically purchases its energy in a spot market for energy and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically purchases its energy in a spot market for energy and having a distributed ledger that tokenizes an item of intellectual property and a reporting system that reports an analytic result based on the operations performed on the distributed ledger or the intellectual property. In embodiments, provided herein is a transaction-enabling system having a machine that automatically purchases its energy in a spot market for energy and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically purchases its energy in a spot market for energy and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically purchases its energy in a spot market for energy and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically purchases its energy in a spot market for energy and having a self-executing cryptocurrency coin that commits a transaction upon recognizing a location-based parameter that provides favorable tax treatment. In embodiments, provided herein is a transaction-enabling system having a machine that automatically purchases its energy in a spot market for energy and having an expert system that uses machine learning to optimize the execution of cryptocurrency transactions based on tax status. In embodiments, provided herein is a transaction-enabling system having a machine that automatically purchases its energy in a spot market for energy and having an expert system that aggregates regulatory information covering cryptocurrency transactions and automatically selects a jurisdiction for an operation based on the regulatory information. In embodiments, provided herein is a transaction-enabling system having a machine that automatically purchases its energy in a spot market for energy and having an expert system that uses machine learning to optimize the execution of a cryptocurrency transaction based on real time energy price information for an available energy source. In embodiments, provided herein is a transaction-enabling system having a machine that automatically purchases its energy in a spot market for energy and having an expert system that uses machine learning to optimize the execution of a cryptocurrency transaction based on an understanding of available energy sources to power computing resources to execute the transaction. In embodiments, provided herein is a transaction-enabling system having a machine that automatically purchases its energy in a spot market for energy and having an expert system that uses machine learning to optimize charging and recharging cycle of a rechargeable battery system to provide energy for execution of a cryptocurrency transaction. In embodiments, provided herein is a transaction-enabling system having a machine that automatically purchases its energy in a spot market for energy and having an expert system that predicts a forward market price in a market based on an understanding obtained by analyzing Internet of Things data sources and executes a transaction based on the forward market prediction. In embodiments, provided herein is a transaction-enabling system having a machine that automatically purchases its energy in a spot market for energy and having an expert system that predicts a forward market price in a market based on an understanding obtained by analyzing social network data sources and executes a transaction based on the forward market prediction. In embodiments, provided herein is a transaction-enabling system having a machine that automatically purchases its energy in a spot market for energy and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically purchases its energy in a spot market for energy and having an expert system that predicts a forward market price in a market based on an understanding obtained by analyzing social network data sources and executes a cryptocurrency transaction based on the forward market prediction. In embodiments, provided herein is a transaction-enabling system having a machine that automatically purchases its energy in a spot market for energy and having an expert system that predicts a forward market price in an energy market based on an understanding obtained by analyzing Internet of Things data sources and executes a transaction based on the forward market prediction. In embodiments, provided herein is a transaction-enabling system having a machine that automatically purchases its energy in a spot market for energy and having an expert system that predicts a forward market price in an energy market based on an understanding obtained by analyzing social network data sources and executes a transaction based on the forward market prediction. In embodiments, provided herein is a transaction-enabling system having a machine that automatically purchases its energy in a spot market for energy and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically purchases its energy in a spot market for energy and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically purchases its energy in a spot market for energy and having an expert system that predicts a forward market price in a market for computing resources based on an understanding obtained by analyzing social network data sources and executes a transaction based on the forward market prediction. In embodiments, provided herein is a transaction-enabling system having a machine that automatically purchases its energy in a spot market for energy and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically purchases its energy in a spot market for energy and having an expert system that predicts a forward market price in a market for advertising based on an understanding obtained by analyzing social network data sources and executes a transaction based on the forward market prediction. In embodiments, provided herein is a transaction-enabling system having a machine that automatically purchases its energy in a spot market for energy and having a machine that automatically forecasts forward market pricing of energy prices based on information collected from automated agent behavioral data sources. In embodiments, provided herein is a transaction-enabling system having a machine that automatically purchases its energy in a spot market for energy and having a machine that automatically forecasts forward market pricing of network spectrum based on information collected from automated agent behavioral data sources. In embodiments, provided herein is a transaction-enabling system having a machine that automatically purchases its energy in a spot market for energy and having a machine that automatically forecasts forward market pricing of energy credits based on information collected from automated agent behavioral data sources. In embodiments, provided herein is a transaction-enabling system having a machine that automatically purchases its energy in a spot market for energy and having a machine that automatically forecasts forward market value of compute capability based on information collected from automated agent behavioral data sources. In embodiments, provided herein is a transaction-enabling system having a machine that automatically purchases its energy in a spot market for energy and having a machine that automatically forecasts forward market pricing of energy prices based on information collected from business entity behavioral data sources. In embodiments, provided herein is a transaction-enabling system having a machine that automatically purchases its energy in a spot market for energy and having a machine that automatically forecasts forward market pricing of network spectrum based on information collected from business entity behavioral data sources. In embodiments, provided herein is a transaction-enabling system having a machine that automatically purchases its energy in a spot market for energy and having a machine that automatically forecasts forward market pricing of energy credits based on information collected from business entity behavioral data sources. In embodiments, provided herein is a transaction-enabling system having a machine that automatically purchases its energy in a spot market for energy and having a machine that automatically forecasts forward market value of compute capability based on information collected from business entity behavioral data sources. In embodiments, provided herein is a transaction-enabling system having a machine that automatically purchases its energy in a spot market for energy and having a machine that automatically forecasts forward market pricing of energy prices based on information collected from human behavioral data sources. In embodiments, provided herein is a transaction-enabling system having a machine that automatically purchases its energy in a spot market for energy and having a machine that automatically forecasts forward market pricing of network spectrum based on information collected from human behavioral data sources. In embodiments, provided herein is a transaction-enabling system having a machine that automatically purchases its energy in a spot market for energy and having a machine that automatically forecasts forward market pricing of energy credits based on information collected from human behavioral data sources. In embodiments, provided herein is a transaction-enabling system having a machine that automatically purchases its energy in a spot market for energy and having a machine that automatically forecasts forward market value of compute capability based on information collected from human behavioral data sources. In embodiments, provided herein is a transaction-enabling system having a machine that automatically purchases its energy in a spot market for energy and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically purchases its energy in a spot market for energy and having an intelligent agent that is configured to solicit the attention resources of another external intelligent agent. In embodiments, provided herein is a transaction-enabling system having a machine that automatically purchases its energy in a spot market for energy and having a machine that automatically purchases attention resources in a forward market for attention. In embodiments, provided herein is a transaction-enabling system having a machine that automatically purchases its energy in a spot market for energy and having a fleet of machines that automatically aggregate purchasing in a forward market for attention. In embodiments, provided herein is a transaction-enabling system having a machine that automatically purchases its energy in a spot market for energy and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically purchases its energy in a spot market for energy and having a system for learning on a training set of facility outcomes, facility parameters, and data collected from data sources to train an artificial intelligence/machine learning system to predict a facility production outcome. In embodiments, provided herein is a transaction-enabling system having a machine that automatically purchases its energy in a spot market for energy and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically purchases its energy in a spot market for energy and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically purchases its energy in a spot market for energy and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically purchases its energy in a spot market for energy and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically purchases its energy in a spot market for energy and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically purchases its energy in a spot market for energy and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically purchases its energy in a spot market for energy and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically purchases its energy in a spot market for energy and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically purchases its energy in a spot market for energy and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically purchases its energy in a spot market for energy and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically purchases its energy in a spot market for energy and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically purchases its energy in a spot market for energy and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically purchases energy credits in a spot market. In embodiments, provided herein is a transaction-enabling system having a machine that automatically purchases energy credits in a spot market and having a fleet of machines that automatically aggregate purchasing in a spot market for energy. In embodiments, provided herein is a transaction-enabling system having a machine that automatically purchases energy credits in a spot market and having a fleet of machines that automatically aggregate purchasing energy credits in a spot market. In embodiments, provided herein is a transaction-enabling system having a machine that automatically purchases energy credits in a spot market and having a machine that automatically purchases spectrum allocation in a spot market for network spectrum. In embodiments, provided herein is a transaction-enabling system having a machine that automatically purchases energy credits in a spot market and having a fleet of machines that automatically purchase spectrum allocation in a spot market for network spectrum. In embodiments, provided herein is a transaction-enabling system having a machine that automatically purchases energy credits in a spot market and having a fleet of machines that automatically optimize energy utilization for compute task allocation. In embodiments, provided herein is a transaction-enabling system having a machine that automatically purchases energy credits in a spot market and having a fleet of machines that automatically aggregate data on collective optimization of spot market purchases of energy. In embodiments, provided herein is a transaction-enabling system having a machine that automatically purchases energy credits in a spot market and having a fleet of machines that automatically aggregate data on collective optimization of spot market purchases of energy credits. In embodiments, provided herein is a transaction-enabling system having a machine that automatically purchases energy credits in a spot market and having a fleet of machines that automatically aggregate data on collective optimization of spot market purchases of network spectrum. In embodiments, provided herein is a transaction-enabling system having a machine that automatically purchases energy credits in a spot market and having a fleet of machines that automatically sell their aggregate compute capacity on a forward market for compute capacity. In embodiments, provided herein is a transaction-enabling system having a machine that automatically purchases energy credits in a spot market and having a fleet of machines that automatically sell their aggregate compute storage capacity on a forward market for storage capacity. In embodiments, provided herein is a transaction-enabling system having a machine that automatically purchases energy credits in a spot market and having a fleet of machines that automatically sell their aggregate energy storage capacity on a forward market for energy storage capacity. In embodiments, provided herein is a transaction-enabling system having a machine that automatically purchases energy credits in a spot market and having a fleet of machines that automatically sell their aggregate network bandwidth on a forward market for network capacity. In embodiments, provided herein is a transaction-enabling system having a machine that automatically purchases energy credits in a spot market and having a machine that automatically forecasts forward market pricing of energy prices based on information collected from social media data sources. In embodiments, provided herein is a transaction-enabling system having a machine that automatically purchases energy credits in a spot market and having a machine that automatically forecasts forward market pricing of network spectrum based on information collected from social media data sources. In embodiments, provided herein is a transaction-enabling system having a machine that automatically purchases energy credits in a spot market and having a machine that automatically forecasts forward market pricing of energy credits based on information collected from social media data sources. In embodiments, provided herein is a transaction-enabling system having a machine that automatically purchases energy credits in a spot market and having a machine that automatically forecasts forward market value of compute capability based on information collected from social media data sources. In embodiments, provided herein is a transaction-enabling system having a machine that automatically purchases energy credits in a spot market and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically purchases energy credits in a spot market and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically purchases energy credits in a spot market and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically purchases energy credits in a spot market and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically purchases energy credits in a spot market and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically purchases energy credits in a spot market and having a machine that automatically allocates its energy capacity among a core task, a compute task, an energy storage task, a data storage task, and a networking task. In embodiments, provided herein is a transaction-enabling system having a machine that automatically purchases energy credits in a spot market and having a machine that automatically allocates its compute capacity among a core task, a compute task, an energy storage task, a data storage task, and a networking task. In embodiments, provided herein is a transaction-enabling system having a machine that automatically purchases energy credits in a spot market and having a machine that automatically allocates its networking capacity among a core task, a compute task, an energy storage task, a data storage task, and a networking task. In embodiments, provided herein is a transaction-enabling system having a machine that automatically purchases energy credits in a spot market and having a fleet of machines that automatically allocate collective energy capacity among a core task, a compute task, an energy storage task, a data storage task, and a networking task. In embodiments, provided herein is a transaction-enabling system having a machine that automatically purchases energy credits in a spot market and having a fleet of machines that automatically allocate collective compute capacity among a core task, a compute task, an energy storage task, a data storage task, and a networking task. In embodiments, provided herein is a transaction-enabling system having a machine that automatically purchases energy credits in a spot market and having a fleet of machines that automatically allocate collective networking capacity among a core task, a compute task, an energy storage task, a data storage task, and a networking task. In embodiments, provided herein is a transaction-enabling system having a machine that automatically purchases energy credits in a spot market and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically purchases energy credits in a spot market and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases energy credits in a spot market and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically purchases energy credits in a spot market and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases energy credits in a spot market and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically purchases energy credits in a spot market and having a distributed ledger that tokenizes an instruction set, such that operation on the distributed ledger provides provable access to the instruction set. In embodiments, provided herein is a transaction-enabling system having a machine that automatically purchases energy credits in a spot market and having a distributed ledger that tokenizes executable algorithmic logic, such that operation on the distributed ledger provides provable access to the executable algorithmic logic. In embodiments, provided herein is a transaction-enabling system having a machine that automatically purchases energy credits in a spot market and having a distributed ledger that tokenizes a 3D printer instruction set, such that operation on the distributed ledger provides provable access to the instruction set. In embodiments, provided herein is a transaction-enabling system having a machine that automatically purchases energy credits in a spot market and having a distributed ledger that tokenizes an instruction set for a coating process, such that operation on the distributed ledger provides provable access to the instruction set. In embodiments, provided herein is a transaction-enabling system having a machine that automatically purchases energy credits in a spot market and having a distributed ledger that tokenizes an instruction set for a semiconductor fabrication process, such that operation on the distributed ledger provides provable access to the fabrication process. In embodiments, provided herein is a transaction-enabling system having a machine that automatically purchases energy credits in a spot market and having a distributed ledger that tokenizes a firmware program, such that operation on the distributed ledger provides provable access to the firmware program. In embodiments, provided herein is a transaction-enabling system having a machine that automatically purchases energy credits in a spot market and having a distributed ledger that tokenizes an instruction set for an FPGA, such that operation on the distributed ledger provides provable access to the FPGA. In embodiments, provided herein is a transaction-enabling system having a machine that automatically purchases energy credits in a spot market and having a distributed ledger that tokenizes serverless code logic, such that operation on the distributed ledger provides provable access to the serverless code logic. In embodiments, provided herein is a transaction-enabling system having a machine that automatically purchases energy credits in a spot market and having a distributed ledger that tokenizes an instruction set for a crystal fabrication system, such that operation on the distributed ledger provides provable access to the instruction set. In embodiments, provided herein is a transaction-enabling system having a machine that automatically purchases energy credits in a spot market and having a distributed ledger that tokenizes an instruction set for a food preparation process, such that operation on the distributed ledger provides provable access to the instruction set. In embodiments, provided herein is a transaction-enabling system having a machine that automatically purchases energy credits in a spot market and having a distributed ledger that tokenizes an instruction set for a polymer production process, such that operation on the distributed ledger provides provable access to the instruction set. In embodiments, provided herein is a transaction-enabling system having a machine that automatically purchases energy credits in a spot market and having a distributed ledger that tokenizes an instruction set for chemical synthesis process, such that operation on the distributed ledger provides provable access to the instruction set. In embodiments, provided herein is a transaction-enabling system having a machine that automatically purchases energy credits in a spot market and having a distributed ledger that tokenizes an instruction set for a biological production process, such that operation on the distributed ledger provides provable access to the instruction set. In embodiments, provided herein is a transaction-enabling system having a machine that automatically purchases energy credits in a spot market and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically purchases energy credits in a spot market and having a distributed ledger that aggregates views of a trade secret into a chain that proves which and how many parties have viewed the trade secret. In embodiments, provided herein is a transaction-enabling system having a machine that automatically purchases energy credits in a spot market and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically purchases energy credits in a spot market and having a distributed ledger that tokenizes an item of intellectual property and a reporting system that reports an analytic result based on the operations performed on the distributed ledger or the intellectual property. In embodiments, provided herein is a transaction-enabling system having a machine that automatically purchases energy credits in a spot market and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically purchases energy credits in a spot market and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically purchases energy credits in a spot market and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically purchases energy credits in a spot market and having a self-executing cryptocurrency coin that commits a transaction upon recognizing a location-based parameter that provides favorable tax treatment. In embodiments, provided herein is a transaction-enabling system having a machine that automatically purchases energy credits in a spot market and having an expert system that uses machine learning to optimize the execution of cryptocurrency transactions based on tax status. In embodiments, provided herein is a transaction-enabling system having a machine that automatically purchases energy credits in a spot market and having an expert system that aggregates regulatory information covering cryptocurrency transactions and automatically selects a jurisdiction for an operation based on the regulatory information. In embodiments, provided herein is a transaction-enabling system having a machine that automatically purchases energy credits in a spot market and having an expert system that uses machine learning to optimize the execution of a cryptocurrency transaction based on real time energy price information for an available energy source. In embodiments, provided herein is a transaction-enabling system having a machine that automatically purchases energy credits in a spot market and having an expert system that uses machine learning to optimize the execution of a cryptocurrency transaction based on an understanding of available energy sources to power computing resources to execute the transaction. In embodiments, provided herein is a transaction-enabling system having a machine that automatically purchases energy credits in a spot market and having an expert system that uses machine learning to optimize charging and recharging cycle of a rechargeable battery system to provide energy for execution of a cryptocurrency transaction. In embodiments, provided herein is a transaction-enabling system having a machine that automatically purchases energy credits in a spot market and having an expert system that predicts a forward market price in a market based on an understanding obtained by analyzing Internet of Things data sources and executes a transaction based on the forward market prediction. In embodiments, provided herein is a transaction-enabling system having a machine that automatically purchases energy credits in a spot market and having an expert system that predicts a forward market price in a market based on an understanding obtained by analyzing social network data sources and executes a transaction based on the forward market prediction. In embodiments, provided herein is a transaction-enabling system having a machine that automatically purchases energy credits in a spot market and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically purchases energy credits in a spot market and having an expert system that predicts a forward market price in a market based on an understanding obtained by analyzing social network data sources and executes a cryptocurrency transaction based on the forward market prediction. In embodiments, provided herein is a transaction-enabling system having a machine that automatically purchases energy credits in a spot market and having an expert system that predicts a forward market price in an energy market based on an understanding obtained by analyzing Internet of Things data sources and executes a transaction based on the forward market prediction. In embodiments, provided herein is a transaction-enabling system having a machine that automatically purchases energy credits in a spot market and having an expert system that predicts a forward market price in an energy market based on an understanding obtained by analyzing social network data sources and executes a transaction based on the forward market prediction. In embodiments, provided herein is a transaction-enabling system having a machine that automatically purchases energy credits in a spot market and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically purchases energy credits in a spot market and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically purchases energy credits in a spot market and having an expert system that predicts a forward market price in a market for computing resources based on an understanding obtained by analyzing social network data sources and executes a transaction based on the forward market prediction. In embodiments, provided herein is a transaction-enabling system having a machine that automatically purchases energy credits in a spot market and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically purchases energy credits in a spot market and having an expert system that predicts a forward market price in a market for advertising based on an understanding obtained by analyzing social network data sources and executes a transaction based on the forward market prediction. In embodiments, provided herein is a transaction-enabling system having a machine that automatically purchases energy credits in a spot market and having a machine that automatically forecasts forward market pricing of energy prices based on information collected from automated agent behavioral data sources. In embodiments, provided herein is a transaction-enabling system having a machine that automatically purchases energy credits in a spot market and having a machine that automatically forecasts forward market pricing of network spectrum based on information collected from automated agent behavioral data sources. In embodiments, provided herein is a transaction-enabling system having a machine that automatically purchases energy credits in a spot market and having a machine that automatically forecasts forward market pricing of energy credits based on information collected from automated agent behavioral data sources. In embodiments, provided herein is a transaction-enabling system having a machine that automatically purchases energy credits in a spot market and having a machine that automatically forecasts forward market value of compute capability based on information collected from automated agent behavioral data sources. In embodiments, provided herein is a transaction-enabling system having a machine that automatically purchases energy credits in a spot market and having a machine that automatically forecasts forward market pricing of energy prices based on information collected from business entity behavioral data sources. In embodiments, provided herein is a transaction-enabling system having a machine that automatically purchases energy credits in a spot market and having a machine that automatically forecasts forward market pricing of network spectrum based on information collected from business entity behavioral data sources. In embodiments, provided herein is a transaction-enabling system having a machine that automatically purchases energy credits in a spot market and having a machine that automatically forecasts forward market pricing of energy credits based on information collected from business entity behavioral data sources. In embodiments, provided herein is a transaction-enabling system having a machine that automatically purchases energy credits in a spot market and having a machine that automatically forecasts forward market value of compute capability based on information collected from business entity behavioral data sources. In embodiments, provided herein is a transaction-enabling system having a machine that automatically purchases energy credits in a spot market and having a machine that automatically forecasts forward market pricing of energy prices based on information collected from human behavioral data sources. In embodiments, provided herein is a transaction-enabling system having a machine that automatically purchases energy credits in a spot market and having a machine that automatically forecasts forward market pricing of network spectrum based on information collected from human behavioral data sources. In embodiments, provided herein is a transaction-enabling system having a machine that automatically purchases energy credits in a spot market and having a machine that automatically forecasts forward market pricing of energy credits based on information collected from human behavioral data sources. In embodiments, provided herein is a transaction-enabling system having a machine that automatically purchases energy credits in a spot market and having a machine that automatically forecasts forward market value of compute capability based on information collected from human behavioral data sources. In embodiments, provided herein is a transaction-enabling system having a machine that automatically purchases energy credits in a spot market and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically purchases energy credits in a spot market and having an intelligent agent that is configured to solicit the attention resources of another external intelligent agent. In embodiments, provided herein is a transaction-enabling system having a machine that automatically purchases energy credits in a spot market and having a machine that automatically purchases attention resources in a forward market for attention. In embodiments, provided herein is a transaction-enabling system having a machine that automatically purchases energy credits in a spot market and having a fleet of machines that automatically aggregate purchasing in a forward market for attention. In embodiments, provided herein is a transaction-enabling system having a machine that automatically purchases energy credits in a spot market and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically purchases energy credits in a spot market and having a system for learning on a training set of facility outcomes, facility parameters, and data collected from data sources to train an artificial intelligence/machine learning system to predict a facility production outcome. In embodiments, provided herein is a transaction-enabling system having a machine that automatically purchases energy credits in a spot market and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically purchases energy credits in a spot market and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically purchases energy credits in a spot market and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically purchases energy credits in a spot market and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically purchases energy credits in a spot market and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically purchases energy credits in a spot market and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically purchases energy credits in a spot market and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically purchases energy credits in a spot market and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically purchases energy credits in a spot market and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically purchases energy credits in a spot market and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically purchases energy credits in a spot market and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically purchases energy credits in a spot market and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate purchasing in a spot market for energy. In embodiments, provided herein is a transaction-enabling system having a fleet of machines that automatically aggregate purchasing in a spot market for energy and having a fleet of machines that automatically aggregate purchasing energy credits in a spot market. In embodiments, provided herein is a transaction-enabling system having a fleet of machines that automatically aggregate purchasing in a spot market for energy and having a machine that automatically purchases spectrum allocation in a spot market for network spectrum. In embodiments, provided herein is a transaction-enabling system having a fleet of machines that automatically aggregate purchasing in a spot market for energy and having a fleet of machines that automatically purchase spectrum allocation in a spot market for network spectrum. In embodiments, provided herein is a transaction-enabling system having a fleet of machines that automatically aggregate purchasing in a spot market for energy and having a fleet of machines that automatically optimize energy utilization for compute task allocation. In embodiments, provided herein is a transaction-enabling system having a fleet of machines that automatically aggregate purchasing in a spot market for energy and having a fleet of machines that automatically aggregate data on collective optimization of spot market purchases of energy. In embodiments, provided herein is a transaction-enabling system having a fleet of machines that automatically aggregate purchasing in a spot market for energy and having a fleet of machines that automatically aggregate data on collective optimization of spot market purchases of energy credits. In embodiments, provided herein is a transaction-enabling system having a fleet of machines that automatically aggregate purchasing in a spot market for energy and having a fleet of machines that automatically aggregate data on collective optimization of spot market purchases of network spectrum. In embodiments, provided herein is a transaction-enabling system having a fleet of machines that automatically aggregate purchasing in a spot market for energy and having a fleet of machines that automatically sell their aggregate compute capacity on a forward market for compute capacity. In embodiments, provided herein is a transaction-enabling system having a fleet of machines that automatically aggregate purchasing in a spot market for energy and having a fleet of machines that automatically sell their aggregate compute storage capacity on a forward market for storage capacity. In embodiments, provided herein is a transaction-enabling system having a fleet of machines that automatically aggregate purchasing in a spot market for energy and having a fleet of machines that automatically sell their aggregate energy storage capacity on a forward market for energy storage capacity. In embodiments, provided herein is a transaction-enabling system having a fleet of machines that automatically aggregate purchasing in a spot market for energy and having a fleet of machines that automatically sell their aggregate network bandwidth on a forward market for network capacity. In embodiments, provided herein is a transaction-enabling system having a fleet of machines that automatically aggregate purchasing in a spot market for energy and having a machine that automatically forecasts forward market pricing of energy prices based on information collected from social media data sources. In embodiments, provided herein is a transaction-enabling system having a fleet of machines that automatically aggregate purchasing in a spot market for energy and having a machine that automatically forecasts forward market pricing of network spectrum based on information collected from social media data sources. In embodiments, provided herein is a transaction-enabling system having a fleet of machines that automatically aggregate purchasing in a spot market for energy and having a machine that automatically forecasts forward market pricing of energy credits based on information collected from social media data sources. In embodiments, provided herein is a transaction-enabling system having a fleet of machines that automatically aggregate purchasing in a spot market for energy and having a machine that automatically forecasts forward market value of compute capability based on information collected from social media data sources. In embodiments, provided herein is a transaction-enabling system having a fleet of machines that automatically aggregate purchasing in a spot market for energy and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically aggregate purchasing in a spot market for energy and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically aggregate purchasing in a spot market for energy and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically aggregate purchasing in a spot market for energy and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically aggregate purchasing in a spot market for energy and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically aggregate purchasing in a spot market for energy and having a machine that automatically allocates its energy capacity among a core task, a compute task, an energy storage task, a data storage task, and a networking task. In embodiments, provided herein is a transaction-enabling system having a fleet of machines that automatically aggregate purchasing in a spot market for energy and having a machine that automatically allocates its compute capacity among a core task, a compute task, an energy storage task, a data storage task, and a networking task. In embodiments, provided herein is a transaction-enabling system having a fleet of machines that automatically aggregate purchasing in a spot market for energy and having a machine that automatically allocates its networking capacity among a core task, a compute task, an energy storage task, a data storage task, and a networking task. In embodiments, provided herein is a transaction-enabling system having a fleet of machines that automatically aggregate purchasing in a spot market for energy and having a fleet of machines that automatically allocate collective energy capacity among a core task, a compute task, an energy storage task, a data storage task, and a networking task. In embodiments, provided herein is a transaction-enabling system having a fleet of machines that automatically aggregate purchasing in a spot market for energy and having a fleet of machines that automatically allocate collective compute capacity among a core task, a compute task, an energy storage task, a data storage task, and a networking task. In embodiments, provided herein is a transaction-enabling system having a fleet of machines that automatically aggregate purchasing in a spot market for energy and having a fleet of machines that automatically allocate collective networking capacity among a core task, a compute task, an energy storage task, a data storage task, and a networking task. In embodiments, provided herein is a transaction-enabling system having a fleet of machines that automatically aggregate purchasing in a spot market for energy and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically aggregate purchasing in a spot market for energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate purchasing in a spot market for energy and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically aggregate purchasing in a spot market for energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate purchasing in a spot market for energy and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically aggregate purchasing in a spot market for energy and having a distributed ledger that tokenizes an instruction set, such that operation on the distributed ledger provides provable access to the instruction set. In embodiments, provided herein is a transaction-enabling system having a fleet of machines that automatically aggregate purchasing in a spot market for energy and having a distributed ledger that tokenizes executable algorithmic logic, such that operation on the distributed ledger provides provable access to the executable algorithmic logic. In embodiments, provided herein is a transaction-enabling system having a fleet of machines that automatically aggregate purchasing in a spot market for energy and having a distributed ledger that tokenizes a 3D printer instruction set, such that operation on the distributed ledger provides provable access to the instruction set. In embodiments, provided herein is a transaction-enabling system having a fleet of machines that automatically aggregate purchasing in a spot market for energy and having a distributed ledger that tokenizes an instruction set for a coating process, such that operation on the distributed ledger provides provable access to the instruction set. In embodiments, provided herein is a transaction-enabling system having a fleet of machines that automatically aggregate purchasing in a spot market for energy and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically aggregate purchasing in a spot market for energy and having a distributed ledger that tokenizes a firmware program, such that operation on the distributed ledger provides provable access to the firmware program. In embodiments, provided herein is a transaction-enabling system having a fleet of machines that automatically aggregate purchasing in a spot market for energy and having a distributed ledger that tokenizes an instruction set for an FPGA, such that operation on the distributed ledger provides provable access to the FPGA. In embodiments, provided herein is a transaction-enabling system having a fleet of machines that automatically aggregate purchasing in a spot market for energy and having a distributed ledger that tokenizes serverless code logic, such that operation on the distributed ledger provides provable access to the serverless code logic. In embodiments, provided herein is a transaction-enabling system having a fleet of machines that automatically aggregate purchasing in a spot market for energy and having a distributed ledger that tokenizes an instruction set for a crystal fabrication system, such that operation on the distributed ledger provides provable access to the instruction set. In embodiments, provided herein is a transaction-enabling system having a fleet of machines that automatically aggregate purchasing in a spot market for energy and having a distributed ledger that tokenizes an instruction set for a food preparation process, such that operation on the distributed ledger provides provable access to the instruction set. In embodiments, provided herein is a transaction-enabling system having a fleet of machines that automatically aggregate purchasing in a spot market for energy and having a distributed ledger that tokenizes an instruction set for a polymer production process, such that operation on the distributed ledger provides provable access to the instruction set. In embodiments, provided herein is a transaction-enabling system having a fleet of machines that automatically aggregate purchasing in a spot market for energy and having a distributed ledger that tokenizes an instruction set for chemical synthesis process, such that operation on the distributed ledger provides provable access to the instruction set. In embodiments, automatically aggregate purchasing in a spot market for energy and having a distributed ledger that tokenizes an instruction set for a biological production process, such that operation on the distributed ledger provides provable access to the instruction set. In embodiments, provided herein is a transaction-enabling system having a fleet of machines that automatically aggregate purchasing in a spot market for energy and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically aggregate purchasing in a spot market for energy and having a distributed ledger that aggregates views of a trade secret into a chain that proves which and how many parties have viewed the trade secret. In embodiments, provided herein is a transaction-enabling system having a fleet of machines that automatically aggregate purchasing in a spot market for energy and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically aggregate purchasing in a spot market for energy and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically aggregate purchasing in a spot market for energy and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically aggregate purchasing in a spot market for energy and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically aggregate purchasing in a spot market for energy and having a smart wrapper for a cryptocurrency coin that directs execution of a transaction involving the coin to a geographic location based on tax treatment of at least one of the coin and the transaction in the geographic location. In embodiments, automatically aggregate purchasing in a spot market for energy and having a self-executing cryptocurrency coin that commits a transaction upon recognizing a location-based parameter that provides favorable tax treatment. In embodiments, provided herein is a transaction-enabling system having a fleet of machines that automatically aggregate purchasing in a spot market for energy and having an expert system that uses machine learning to optimize the execution of cryptocurrency transactions based on tax status. In embodiments, provided herein is a transaction-enabling system having a fleet of machines that automatically aggregate purchasing in a spot market for energy and having an expert system that aggregates regulatory information covering cryptocurrency transactions and automatically selects a jurisdiction for an operation based on the regulatory information. In embodiments, provided herein is a transaction-enabling system having a fleet of machines that automatically aggregate purchasing in a spot market for energy and having an expert system that uses machine learning to optimize the execution of a cryptocurrency transaction based on real time energy price information for an available energy source. In embodiments, provided herein is a transaction-enabling system having a fleet of machines that automatically aggregate purchasing in a spot market for energy and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically aggregate purchasing in a spot market for energy and having an expert system that uses machine learning to optimize charging and recharging cycle of a rechargeable battery system to provide energy for execution of a cryptocurrency transaction. In embodiments, provided herein is a transaction-enabling system having a fleet of machines that automatically aggregate purchasing in a spot market for energy and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically aggregate purchasing in a spot market for energy and having an expert system that predicts a forward market price in a market based on an understanding obtained by analyzing social network data sources and executes a transaction based on the forward market prediction. In embodiments, provided herein is a transaction-enabling system having a fleet of machines that automatically aggregate purchasing in a spot market for energy and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically aggregate purchasing in a spot market for energy and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically aggregate purchasing in a spot market for energy and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically aggregate purchasing in a spot market for energy and having an expert system that predicts a forward market price in an energy market based on an understanding obtained by analyzing social network data sources and executes a transaction based on the forward market prediction. In embodiments, provided herein is a transaction-enabling system having a fleet of machines that automatically aggregate purchasing in a spot market for energy and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically aggregate purchasing in a spot market for energy and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically aggregate purchasing in a spot market for energy and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically aggregate purchasing in a spot market for energy and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically aggregate purchasing in a spot market for energy and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically aggregate purchasing in a spot market for energy and having a machine that automatically forecasts forward market pricing of energy prices based on information collected from automated agent behavioral data sources. In embodiments, provided herein is a transaction-enabling system having a fleet of machines that automatically aggregate purchasing in a spot market for energy and having a machine that automatically forecasts forward market pricing of network spectrum based on information collected from automated agent behavioral data sources. In embodiments, provided herein is a transaction-enabling system having a fleet of machines that automatically aggregate purchasing in a spot market for energy and having a machine that automatically forecasts forward market pricing of energy credits based on information collected from automated agent behavioral data sources. In embodiments, provided herein is a transaction-enabling system having a fleet of machines that automatically aggregate purchasing in a spot market for energy and having a machine that automatically forecasts forward market value of compute capability based on information collected from automated agent behavioral data sources. In embodiments, provided herein is a transaction-enabling system having a fleet of machines that automatically aggregate purchasing in a spot market for energy and having a machine that automatically forecasts forward market pricing of energy prices based on information collected from business entity behavioral data sources. In embodiments, provided herein is a transaction-enabling system having a fleet of machines that automatically aggregate purchasing in a spot market for energy and having a machine that automatically forecasts forward market pricing of network spectrum based on information collected from business entity behavioral data sources. In embodiments, provided herein is a transaction-enabling system having a fleet of machines that automatically aggregate purchasing in a spot market for energy and having a machine that automatically forecasts forward market pricing of energy credits based on information collected from business entity behavioral data sources. In embodiments, provided herein is a transaction-enabling system having a fleet of machines that automatically aggregate purchasing in a spot market for energy and having a machine that automatically forecasts forward market value of compute capability based on information collected from business entity behavioral data sources. In embodiments, provided herein is a transaction-enabling system having a fleet of machines that automatically aggregate purchasing in a spot market for energy and having a machine that automatically forecasts forward market pricing of energy prices based on information collected from human behavioral data sources. In embodiments, provided herein is a transaction-enabling system having a fleet of machines that automatically aggregate purchasing in a spot market for energy and having a machine that automatically forecasts forward market pricing of network spectrum based on information collected from human behavioral data sources. In embodiments, provided herein is a transaction-enabling system having a fleet of machines that automatically aggregate purchasing in a spot market for energy and having a machine that automatically forecasts forward market pricing of energy credits based on information collected from human behavioral data sources. In embodiments, provided herein is a transaction-enabling system having a fleet of machines that automatically aggregate purchasing in a spot market for energy and having a machine that automatically forecasts forward market value of compute capability based on information collected from human behavioral data sources. In embodiments, provided herein is a transaction-enabling system having a fleet of machines that automatically aggregate purchasing in a spot market for energy and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically aggregate purchasing in a spot market for energy and having an intelligent agent that is configured to solicit the attention resources of another external intelligent agent. In embodiments, provided herein is a transaction-enabling system having a fleet of machines that automatically aggregate purchasing in a spot market for energy and having a machine that automatically purchases attention resources in a forward market for attention. In embodiments, provided herein is a transaction-enabling system having a fleet of machines that automatically aggregate purchasing in a spot market for energy and having a fleet of machines that automatically aggregate purchasing in a forward market for attention. In embodiments, provided herein is a transaction-enabling system having a fleet of machines that automatically aggregate purchasing in a spot market for energy and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate purchasing in a spot market for energy and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate purchasing in a spot market for energy and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate purchasing in a spot market for energy and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate purchasing in a spot market for energy and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate purchasing in a spot market for energy and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate purchasing in a spot market for energy and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate purchasing in a spot market for energy and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate purchasing in a spot market for energy and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate purchasing in a spot market for energy and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate purchasing in a spot market for energy and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate purchasing in a spot market for energy and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate purchasing in a spot market for energy and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate purchasing in a spot market for energy and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate purchasing energy credits in a spot market. In embodiments, provided herein is a transaction-enabling system having a fleet of machines that automatically aggregate purchasing energy credits in a spot market and having a machine that automatically purchases spectrum allocation in a spot market for network spectrum. In embodiments, provided herein is a transaction-enabling system having a fleet of machines that automatically aggregate purchasing energy credits in a spot market and having a fleet of machines that automatically purchase spectrum allocation in a spot market for network spectrum. In embodiments, provided herein is a transaction-enabling system having a fleet of machines that automatically aggregate purchasing energy credits in a spot market and having a fleet of machines that automatically optimize energy utilization for compute task allocation. In embodiments, provided herein is a transaction-enabling system having a fleet of machines that automatically aggregate purchasing energy credits in a spot market and having a fleet of machines that automatically aggregate data on collective optimization of spot market purchases of energy. In embodiments, provided herein is a transaction-enabling system having a fleet of machines that automatically aggregate purchasing energy credits in a spot market and having a fleet of machines that automatically aggregate data on collective optimization of spot market purchases of energy credits. In embodiments, provided herein is a transaction-enabling system having a fleet of machines that automatically aggregate purchasing energy credits in a spot market and having a fleet of machines that automatically aggregate data on collective optimization of spot market purchases of network spectrum. In embodiments, provided herein is a transaction-enabling system having a fleet of machines that automatically aggregate purchasing energy credits in a spot market and having a fleet of machines that automatically sell their aggregate compute capacity on a forward market for compute capacity. In embodiments, provided herein is a transaction-enabling system having a fleet of machines that automatically aggregate purchasing energy credits in a spot market and having a fleet of machines that automatically sell their aggregate compute storage capacity on a forward market for storage capacity. In embodiments, provided herein is a transaction-enabling system having a fleet of machines that automatically aggregate purchasing energy credits in a spot market and having a fleet of machines that automatically sell their aggregate energy storage capacity on a forward market for energy storage capacity. In embodiments, provided herein is a transaction-enabling system having a fleet of machines that automatically aggregate purchasing energy credits in a spot market and having a fleet of machines that automatically sell their aggregate network bandwidth on a forward market for network capacity. In embodiments, provided herein is a transaction-enabling system having a fleet of machines that automatically aggregate purchasing energy credits in a spot market and having a machine that automatically forecasts forward market pricing of energy prices based on information collected from social media data sources. In embodiments, provided herein is a transaction-enabling system having a fleet of machines that automatically aggregate purchasing energy credits in a spot market and having a machine that automatically forecasts forward market pricing of network spectrum based on information collected from social media data sources. In embodiments, provided herein is a transaction-enabling system having a fleet of machines that automatically aggregate purchasing energy credits in a spot market and having a machine that automatically forecasts forward market pricing of energy credits based on information collected from social media data sources. In embodiments, provided herein is a transaction-enabling system having a fleet of machines that automatically aggregate purchasing energy credits in a spot market and having a machine that automatically forecasts forward market value of compute capability based on information collected from social media data sources. In embodiments, provided herein is a transaction-enabling system having a fleet of machines that automatically aggregate purchasing energy credits in a spot market and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically aggregate purchasing energy credits in a spot market and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically aggregate purchasing energy credits in a spot market and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically aggregate purchasing energy credits in a spot market and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically aggregate purchasing energy credits in a spot market and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically aggregate purchasing energy credits in a spot market and having a machine that automatically allocates its energy capacity among a core task, a compute task, an energy storage task, a data storage task, and a networking task. In embodiments, provided herein is a transaction-enabling system having a fleet of machines that automatically aggregate purchasing energy credits in a spot market and having a machine that automatically allocates its compute capacity among a core task, a compute task, an energy storage task, a data storage task, and a networking task. In embodiments, provided herein is a transaction-enabling system having a fleet of machines that automatically aggregate purchasing energy credits in a spot market and having a machine that automatically allocates its networking capacity among a core task, a compute task, an energy storage task, a data storage task, and a networking task. In embodiments, provided herein is a transaction-enabling system having a fleet of machines that automatically aggregate purchasing energy credits in a spot market and having a fleet of machines that automatically allocate collective energy capacity among a core task, a compute task, an energy storage task, a data storage task, and a networking task. In embodiments, provided herein is a transaction-enabling system having a fleet of machines that automatically aggregate purchasing energy credits in a spot market and having a fleet of machines that automatically allocate collective compute capacity among a core task, a compute task, an energy storage task, a data storage task, and a networking task. In embodiments, provided herein is a transaction-enabling system having a fleet of machines that automatically aggregate purchasing energy credits in a spot market and having a fleet of machines that automatically allocate collective networking capacity among a core task, a compute task, an energy storage task, a data storage task, and a networking task. In embodiments, provided herein is a transaction-enabling system having a fleet of machines that automatically aggregate purchasing energy credits in a spot market and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically aggregate purchasing energy credits in a spot market and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate purchasing energy credits in a spot market and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically aggregate purchasing energy credits in a spot market and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate purchasing energy credits in a spot market and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically aggregate purchasing energy credits in a spot market and having a distributed ledger that tokenizes an instruction set, such that operation on the distributed ledger provides provable access to the instruction set. In embodiments, provided herein is a transaction-enabling system having a fleet of machines that automatically aggregate purchasing energy credits in a spot market and having a distributed ledger that tokenizes executable algorithmic logic, such that operation on the distributed ledger provides provable access to the executable algorithmic logic. In embodiments, provided herein is a transaction-enabling system having a fleet of machines that automatically aggregate purchasing energy credits in a spot market and having a distributed ledger that tokenizes a 3D printer instruction set, such that operation on the distributed ledger provides provable access to the instruction set. In embodiments, provided herein is a transaction-enabling system having a fleet of machines that automatically aggregate purchasing energy credits in a spot market and having a distributed ledger that tokenizes an instruction set for a coating process, such that operation on the distributed ledger provides provable access to the instruction set. In embodiments, provided herein is a transaction-enabling system having a fleet of machines that automatically aggregate purchasing energy credits in a spot market and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically aggregate purchasing energy credits in a spot market and having a distributed ledger that tokenizes a firmware program, such that operation on the distributed ledger provides provable access to the firmware program. In embodiments, provided herein is a transaction-enabling system having a fleet of machines that automatically aggregate purchasing energy credits in a spot market and having a distributed ledger that tokenizes an instruction set for an FPGA, such that operation on the distributed ledger provides provable access to the FPGA. In embodiments, provided herein is a transaction-enabling system having a fleet of machines that automatically aggregate purchasing energy credits in a spot market and having a distributed ledger that tokenizes serverless code logic, such that operation on the distributed ledger provides provable access to the serverless code logic. In embodiments, provided herein is a transaction-enabling system having a fleet of machines that automatically aggregate purchasing energy credits in a spot market and having a distributed ledger that tokenizes an instruction set for a crystal fabrication system, such that operation on the distributed ledger provides provable access to the instruction set. In embodiments, provided herein is a transaction-enabling system having a fleet of machines that automatically aggregate purchasing energy credits in a spot market and having a distributed ledger that tokenizes an instruction set for a food preparation process, such that operation on the distributed ledger provides provable access to the instruction set. In embodiments, provided herein is a transaction-enabling system having a fleet of machines that automatically aggregate purchasing energy credits in a spot market and having a distributed ledger that tokenizes an instruction set for a polymer production process, such that operation on the distributed ledger provides provable access to the instruction set. In embodiments, provided herein is a transaction-enabling system having a fleet of machines that automatically aggregate purchasing energy credits in a spot market and having a distributed ledger that tokenizes an instruction set for chemical synthesis process, such that operation on the distributed ledger provides provable access to the instruction set. In embodiments, provided herein is a transaction-enabling system having a fleet of machines that automatically aggregate purchasing energy credits in a spot market and having a distributed ledger that tokenizes an instruction set for a biological production process, such that operation on the distributed ledger provides provable access to the instruction set. In embodiments, provided herein is a transaction-enabling system having a fleet of machines that automatically aggregate purchasing energy credits in a spot market and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically aggregate purchasing energy credits in a spot market and having a distributed ledger that aggregates views of a trade secret into a chain that proves which and how many parties have viewed the trade secret. In embodiments, provided herein is a transaction-enabling system having a fleet of machines that automatically aggregate purchasing energy credits in a spot market and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically aggregate purchasing energy credits in a spot market and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically aggregate purchasing energy credits in a spot market and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically aggregate purchasing energy credits in a spot market and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically aggregate purchasing energy credits in a spot market and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically aggregate purchasing energy credits in a spot market and having a self-executing cryptocurrency coin that commits a transaction upon recognizing a location-based parameter that provides favorable tax treatment. In embodiments, provided herein is a transaction-enabling system having a fleet of machines that automatically aggregate purchasing energy credits in a spot market and having an expert system that uses machine learning to optimize the execution of cryptocurrency transactions based on tax status. In embodiments, provided herein is a transaction-enabling system having a fleet of machines that automatically aggregate purchasing energy credits in a spot market and having an expert system that aggregates regulatory information covering cryptocurrency transactions and automatically selects a jurisdiction for an operation based on the regulatory information. In embodiments, provided herein is a transaction-enabling system having a fleet of machines that automatically aggregate purchasing energy credits in a spot market and having an expert system that uses machine learning to optimize the execution of a cryptocurrency transaction based on real time energy price information for an available energy source. In embodiments, provided herein is a transaction-enabling system having a fleet of machines that automatically aggregate purchasing energy credits in a spot market and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically aggregate purchasing energy credits in a spot market and having an expert system that uses machine learning to optimize charging and recharging cycle of a rechargeable battery system to provide energy for execution of a cryptocurrency transaction. In embodiments, provided herein is a transaction-enabling system having a fleet of machines that automatically aggregate purchasing energy credits in a spot market and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically aggregate purchasing energy credits in a spot market and having an expert system that predicts a forward market price in a market based on an understanding obtained by analyzing social network data sources and executes a transaction based on the forward market prediction. In embodiments, provided herein is a transaction-enabling system having a fleet of machines that automatically aggregate purchasing energy credits in a spot market and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically aggregate purchasing energy credits in a spot market and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically aggregate purchasing energy credits in a spot market and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically aggregate purchasing energy credits in a spot market and having an expert system that predicts a forward market price in an energy market based on an understanding obtained by analyzing social network data sources and executes a transaction based on the forward market prediction. In embodiments, provided herein is a transaction-enabling system having a fleet of machines that automatically aggregate purchasing energy credits in a spot market and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically aggregate purchasing energy credits in a spot market and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically aggregate purchasing energy credits in a spot market and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically aggregate purchasing energy credits in a spot market and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically aggregate purchasing energy credits in a spot market and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically aggregate purchasing energy credits in a spot market and having a machine that automatically forecasts forward market pricing of energy prices based on information collected from automated agent behavioral data sources. In embodiments, provided herein is a transaction-enabling system having a fleet of machines that automatically aggregate purchasing energy credits in a spot market and having a machine that automatically forecasts forward market pricing of network spectrum based on information collected from automated agent behavioral data sources. In embodiments, provided herein is a transaction-enabling system having a fleet of machines that automatically aggregate purchasing energy credits in a spot market and having a machine that automatically forecasts forward market pricing of energy credits based on information collected from automated agent behavioral data sources. In embodiments, provided herein is a transaction-enabling system having a fleet of machines that automatically aggregate purchasing energy credits in a spot market and having a machine that automatically forecasts forward market value of compute capability based on information collected from automated agent behavioral data sources. In embodiments, provided herein is a transaction-enabling system having a fleet of machines that automatically aggregate purchasing energy credits in a spot market and having a machine that automatically forecasts forward market pricing of energy prices based on information collected from business entity behavioral data sources. In embodiments, provided herein is a transaction-enabling system having a fleet of machines that automatically aggregate purchasing energy credits in a spot market and having a machine that automatically forecasts forward market pricing of network spectrum based on information collected from business entity behavioral data sources. In embodiments, provided herein is a transaction-enabling system having a fleet of machines that automatically aggregate purchasing energy credits in a spot market and having a machine that automatically forecasts forward market pricing of energy credits based on information collected from business entity behavioral data sources. In embodiments, provided herein is a transaction-enabling system having a fleet of machines that automatically aggregate purchasing energy credits in a spot market and having a machine that automatically forecasts forward market value of compute capability based on information collected from business entity behavioral data sources. In embodiments, provided herein is a transaction-enabling system having a fleet of machines that automatically aggregate purchasing energy credits in a spot market and having a machine that automatically forecasts forward market pricing of energy prices based on information collected from human behavioral data sources. In embodiments, provided herein is a transaction-enabling system having a fleet of machines that automatically aggregate purchasing energy credits in a spot market and having a machine that automatically forecasts forward market pricing of network spectrum based on information collected from human behavioral data sources. In embodiments, provided herein is a transaction-enabling system having a fleet of machines that automatically aggregate purchasing energy credits in a spot market and having a machine that automatically forecasts forward market pricing of energy credits based on information collected from human behavioral data sources. In embodiments, provided herein is a transaction-enabling system having a fleet of machines that automatically aggregate purchasing energy credits in a spot market and having a machine that automatically forecasts forward market value of compute capability based on information collected from human behavioral data sources. In embodiments, provided herein is a transaction-enabling system having a fleet of machines that automatically aggregate purchasing energy credits in a spot market and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically aggregate purchasing energy credits in a spot market and having an intelligent agent that is configured to solicit the attention resources of another external intelligent agent. In embodiments, provided herein is a transaction-enabling system having a fleet of machines that automatically aggregate purchasing energy credits in a spot market and having a machine that automatically purchases attention resources in a forward market for attention. In embodiments, provided herein is a transaction-enabling system having a fleet of machines that automatically aggregate purchasing energy credits in a spot market and having a fleet of machines that automatically aggregate purchasing in a forward market for attention. In embodiments, provided herein is a transaction-enabling system having a fleet of machines that automatically aggregate purchasing energy credits in a spot market and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate purchasing energy credits in a spot market and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate purchasing energy credits in a spot market and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate purchasing energy credits in a spot market and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate purchasing energy credits in a spot market and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate purchasing energy credits in a spot market and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate purchasing energy credits in a spot market and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate purchasing energy credits in a spot market and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate purchasing energy credits in a spot market and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate purchasing energy credits in a spot market and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate purchasing energy credits in a spot market and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate purchasing energy credits in a spot market and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate purchasing energy credits in a spot market and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate purchasing energy credits in a spot market and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically purchases spectrum allocation in a spot market for network spectrum. In embodiments, provided herein is a transaction-enabling system having a machine that automatically purchases spectrum allocation in a spot market for network spectrum and having a fleet of machines that automatically purchase spectrum allocation in a spot market for network spectrum. In embodiments, provided herein is a transaction-enabling system having a machine that automatically purchases spectrum allocation in a spot market for network spectrum and having a fleet of machines that automatically optimize energy utilization for compute task allocation. In embodiments, provided herein is a transaction-enabling system having a machine that automatically purchases spectrum allocation in a spot market for network spectrum and having a fleet of machines that automatically aggregate data on collective optimization of spot market purchases of energy. In embodiments, provided herein is a transaction-enabling system having a machine that automatically purchases spectrum allocation in a spot market for network spectrum and having a fleet of machines that automatically aggregate data on collective optimization of spot market purchases of energy credits. In embodiments, provided herein is a transaction-enabling system having a machine that automatically purchases spectrum allocation in a spot market for network spectrum and having a fleet of machines that automatically aggregate data on collective optimization of spot market purchases of network spectrum. In embodiments, provided herein is a transaction-enabling system having a machine that automatically purchases spectrum allocation in a spot market for network spectrum and having a fleet of machines that automatically sell their aggregate compute capacity on a forward market for compute capacity. In embodiments, provided herein is a transaction-enabling system having a machine that automatically purchases spectrum allocation in a spot market for network spectrum and having a fleet of machines that automatically sell their aggregate compute storage capacity on a forward market for storage capacity. In embodiments, provided herein is a transaction-enabling system having a machine that automatically purchases spectrum allocation in a spot market for network spectrum and having a fleet of machines that automatically sell their aggregate energy storage capacity on a forward market for energy storage capacity. In embodiments, provided herein is a transaction-enabling system having a machine that automatically purchases spectrum allocation in a spot market for network spectrum and having a fleet of machines that automatically sell their aggregate network bandwidth on a forward market for network capacity. In embodiments, provided herein is a transaction-enabling system having a machine that automatically purchases spectrum allocation in a spot market for network spectrum and having a machine that automatically forecasts forward market pricing of energy prices based on information collected from social media data sources. In embodiments, provided herein is a transaction-enabling system having a machine that automatically purchases spectrum allocation in a spot market for network spectrum and having a machine that automatically forecasts forward market pricing of network spectrum based on information collected from social media data sources. In embodiments, provided herein is a transaction-enabling system having a machine that automatically purchases spectrum allocation in a spot market for network spectrum and having a machine that automatically forecasts forward market pricing of energy credits based on information collected from social media data sources. In embodiments, provided herein is a transaction-enabling system having a machine that automatically purchases spectrum allocation in a spot market for network spectrum and having a machine that automatically forecasts forward market value of compute capability based on information collected from social media data sources. In embodiments, provided herein is a transaction-enabling system having a machine that automatically purchases spectrum allocation in a spot market for network spectrum and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically purchases spectrum allocation in a spot market for network spectrum and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically purchases spectrum allocation in a spot market for network spectrum and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically purchases spectrum allocation in a spot market for network spectrum and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically purchases spectrum allocation in a spot market for network spectrum and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically purchases spectrum allocation in a spot market for network spectrum and having a machine that automatically allocates its energy capacity among a core task, a compute task, an energy storage task, a data storage task, and a networking task. In embodiments, provided herein is a transaction-enabling system having a machine that automatically purchases spectrum allocation in a spot market for network spectrum and having a machine that automatically allocates its compute capacity among a core task, a compute task, an energy storage task, a data storage task, and a networking task. In embodiments, provided herein is a transaction-enabling system having a machine that automatically purchases spectrum allocation in a spot market for network spectrum and having a machine that automatically allocates its networking capacity among a core task, a compute task, an energy storage task, a data storage task, and a networking task. In embodiments, provided herein is a transaction-enabling system having a machine that automatically purchases spectrum allocation in a spot market for network spectrum and having a fleet of machines that automatically allocate collective energy capacity among a core task, a compute task, an energy storage task, a data storage task, and a networking task. In embodiments, provided herein is a transaction-enabling system having a machine that automatically purchases spectrum allocation in a spot market for network spectrum and having a fleet of machines that automatically allocate collective compute capacity among a core task, a compute task, an energy storage task, a data storage task, and a networking task. In embodiments, provided herein is a transaction-enabling system having a machine that automatically purchases spectrum allocation in a spot market for network spectrum and having a fleet of machines that automatically allocate collective networking capacity among a core task, a compute task, an energy storage task, a data storage task, and a networking task. In embodiments, provided herein is a transaction-enabling system having a machine that automatically purchases spectrum allocation in a spot market for network spectrum and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically purchases spectrum allocation in a spot market for network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases spectrum allocation in a spot market for network spectrum and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically purchases spectrum allocation in a spot market for network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically purchases spectrum allocation in a spot market for network spectrum and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically purchases spectrum allocation in a spot market for network spectrum and having a distributed ledger that tokenizes an instruction set, such that operation on the distributed ledger provides provable access to the instruction set. In embodiments, provided herein is a transaction-enabling system having a machine that automatically purchases spectrum allocation in a spot market for network spectrum and having a distributed ledger that tokenizes executable algorithmic logic, such that operation on the distributed ledger provides provable access to the executable algorithmic logic. In embodiments, provided herein is a transaction-enabling system having a machine that automatically purchases spectrum allocation in a spot market for network spectrum and having a distributed ledger that tokenizes a 3D printer instruction set, such that operation on the distributed ledger provides provable access to the instruction set. In embodiments, provided herein is a transaction-enabling system having a machine that automatically purchases spectrum allocation in a spot market for network spectrum and having a distributed ledger that tokenizes an instruction set for a coating process, such that operation on the distributed ledger provides provable access to the instruction set. In embodiments, provided herein is a transaction-enabling system having a machine that automatically purchases spectrum allocation in a spot market for network spectrum and having a distributed ledger that tokenizes an instruction set for a semiconductor fabrication process, such that operation on the distributed ledger provides provable access to the fabrication process. In embodiments, provided herein is a transaction-enabling system having a machine that automatically purchases spectrum allocation in a spot market for network spectrum and having a distributed ledger that tokenizes a firmware program, such that operation on the distributed ledger provides provable access to the firmware program. In embodiments, provided herein is a transaction-enabling system having a machine that automatically purchases spectrum allocation in a spot market for network spectrum and having a distributed ledger that tokenizes an instruction set for an FPGA, such that operation on the distributed ledger provides provable access to the FPGA. In embodiments, provided herein is a transaction-enabling system having a machine that automatically purchases spectrum allocation in a spot market for network spectrum and having a distributed ledger that tokenizes serverless code logic, such that operation on the distributed ledger provides provable access to the serverless code logic. In embodiments, provided herein is a transaction-enabling system having a machine that automatically purchases spectrum allocation in a spot market for network spectrum and having a distributed ledger that tokenizes an instruction set for a crystal fabrication system, such that operation on the distributed ledger provides provable access to the instruction set. In embodiments, provided herein is a transaction-enabling system having a machine that automatically purchases spectrum allocation in a spot market for network spectrum and having a distributed ledger that tokenizes an instruction set for a food preparation process, such that operation on the distributed ledger provides provable access to the instruction set. In embodiments, provided herein is a transaction-enabling system having a machine that automatically purchases spectrum allocation in a spot market for network spectrum and having a distributed ledger that tokenizes an instruction set for a polymer production process, such that operation on the distributed ledger provides provable access to the instruction set. In embodiments, provided herein is a transaction-enabling system having a machine that automatically purchases spectrum allocation in a spot market for network spectrum and having a distributed ledger that tokenizes an instruction set for chemical synthesis process, such that operation on the distributed ledger provides provable access to the instruction set. In embodiments, provided herein is a transaction-enabling system having a machine that automatically purchases spectrum allocation in a spot market for network spectrum and having a distributed ledger that tokenizes an instruction set for a biological production process, such that operation on the distributed ledger provides provable access to the instruction set. In embodiments, provided herein is a transaction-enabling system having a machine that automatically purchases spectrum allocation in a spot market for network spectrum and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically purchases spectrum allocation in a spot market for network spectrum and having a distributed ledger that aggregates views of a trade secret into a chain that proves which and how many parties have viewed the trade secret. In embodiments, provided herein is a transaction-enabling system having a machine that automatically purchases spectrum allocation in a spot market for network spectrum and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically purchases spectrum allocation in a spot market for network spectrum and having a distributed ledger that tokenizes an item of intellectual property and a reporting system that reports an analytic result based on the operations performed on the distributed ledger or the intellectual property. In embodiments, provided herein is a transaction-enabling system having a machine that automatically purchases spectrum allocation in a spot market for network spectrum and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically purchases spectrum allocation in a spot market for network spectrum and having a smart wrapper for management of a distributed ledger that aggregates sets of instructions, where the smart wrapper manages allocation of instruction sub-sets to the distributed ledger and access to the instruction subsets. In embodiments, provided herein is a transaction-enabling system having a machine that automatically purchases spectrum allocation in a spot market for network spectrum and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically purchases spectrum allocation in a spot market for network spectrum and having a self-executing cryptocurrency coin that commits a transaction upon recognizing a location-based parameter that provides favorable tax treatment. In embodiments, provided herein is a transaction-enabling system having a machine that automatically purchases spectrum allocation in a spot market for network spectrum and having an expert system that uses machine learning to optimize the execution of cryptocurrency transactions based on tax status. In embodiments, provided herein is a transaction-enabling system having a machine that automatically purchases spectrum allocation in a spot market for network spectrum and having an expert system that aggregates regulatory information covering cryptocurrency transactions and automatically selects a jurisdiction for an operation based on the regulatory information. In embodiments, provided herein is a transaction-enabling system having a machine that automatically purchases spectrum allocation in a spot market for network spectrum and having an expert system that uses machine learning to optimize the execution of a cryptocurrency transaction based on real time energy price information for an available energy source. In embodiments, provided herein is a transaction-enabling system having a machine that automatically purchases spectrum allocation in a spot market for network spectrum and having an expert system that uses machine learning to optimize the execution of a cryptocurrency transaction based on an understanding of available energy sources to power computing resources to execute the transaction. In embodiments, provided herein is a transaction-enabling system having a machine that automatically purchases spectrum allocation in a spot market for network spectrum and having an expert system that uses machine learning to optimize charging and recharging cycle of a rechargeable battery system to provide energy for execution of a cryptocurrency transaction. In embodiments, provided herein is a transaction-enabling system having a machine that automatically purchases spectrum allocation in a spot market for network spectrum and having an expert system that predicts a forward market price in a market based on an understanding obtained by analyzing Internet of Things data sources and executes a transaction based on the forward market prediction. In embodiments, provided herein is a transaction-enabling system having a machine that automatically purchases spectrum allocation in a spot market for network spectrum and having an expert system that predicts a forward market price in a market based on an understanding obtained by analyzing social network data sources and executes a transaction based on the forward market prediction. In embodiments, provided herein is a transaction-enabling system having a machine that automatically purchases spectrum allocation in a spot market for network spectrum and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically purchases spectrum allocation in a spot market for network spectrum and having an expert system that predicts a forward market price in a market based on an understanding obtained by analyzing social network data sources and executes a cryptocurrency transaction based on the forward market prediction. In embodiments, provided herein is a transaction-enabling system having a machine that automatically purchases spectrum allocation in a spot market for network spectrum and having an expert system that predicts a forward market price in an energy market based on an understanding obtained by analyzing Internet of Things data sources and executes a transaction based on the forward market prediction. In embodiments, provided herein is a transaction-enabling system having a machine that automatically purchases spectrum allocation in a spot market for network spectrum and having an expert system that predicts a forward market price in an energy market based on an understanding obtained by analyzing social network data sources and executes a transaction based on the forward market prediction. In embodiments, provided herein is a transaction-enabling system having a machine that automatically purchases spectrum allocation in a spot market for network spectrum and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically purchases spectrum allocation in a spot market for network spectrum and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically purchases spectrum allocation in a spot market for network spectrum and having an expert system that predicts a forward market price in a market for computing resources based on an understanding obtained by analyzing social network data sources and executes a transaction based on the forward market prediction. In embodiments, provided herein is a transaction-enabling system having a machine that automatically purchases spectrum allocation in a spot market for network spectrum and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically purchases spectrum allocation in a spot market for network spectrum and having an expert system that predicts a forward market price in a market for advertising based on an understanding obtained by analyzing social network data sources and executes a transaction based on the forward market prediction. In embodiments, provided herein is a transaction-enabling system having a machine that automatically purchases spectrum allocation in a spot market for network spectrum and having a machine that automatically forecasts forward market pricing of energy prices based on information collected from automated agent behavioral data sources. In embodiments, provided herein is a transaction-enabling system having a machine that automatically purchases spectrum allocation in a spot market for network spectrum and having a machine that automatically forecasts forward market pricing of network spectrum based on information collected from automated agent behavioral data sources. In embodiments, provided herein is a transaction-enabling system having a machine that automatically purchases spectrum allocation in a spot market for network spectrum and having a machine that automatically forecasts forward market pricing of energy credits based on information collected from automated agent behavioral data sources. In embodiments, provided herein is a transaction-enabling system having a machine that automatically purchases spectrum allocation in a spot market for network spectrum and having a machine that automatically forecasts forward market value of compute capability based on information collected from automated agent behavioral data sources. In embodiments, provided herein is a transaction-enabling system having a machine that automatically purchases spectrum allocation in a spot market for network spectrum and having a machine that automatically forecasts forward market pricing of energy prices based on information collected from business entity behavioral data sources. In embodiments, provided herein is a transaction-enabling system having a machine that automatically purchases spectrum allocation in a spot market for network spectrum and having a machine that automatically forecasts forward market pricing of network spectrum based on information collected from business entity behavioral data sources. In embodiments, provided herein is a transaction-enabling system having a machine that automatically purchases spectrum allocation in a spot market for network spectrum and having a machine that automatically forecasts forward market pricing of energy credits based on information collected from business entity behavioral data sources. In embodiments, provided herein is a transaction-enabling system having a machine that automatically purchases spectrum allocation in a spot market for network spectrum and having a machine that automatically forecasts forward market value of compute capability based on information collected from business entity behavioral data sources. In embodiments, provided herein is a transaction-enabling system having a machine that automatically purchases spectrum allocation in a spot market for network spectrum and having a machine that automatically forecasts forward market pricing of energy prices based on information collected from human behavioral data sources. In embodiments, provided herein is a transaction-enabling system having a machine that automatically purchases spectrum allocation in a spot market for network spectrum and having a machine that automatically forecasts forward market pricing of network spectrum based on information collected from human behavioral data sources. In embodiments, provided herein is a transaction-enabling system having a machine that automatically purchases spectrum allocation in a spot market for network spectrum and having a machine that automatically forecasts forward market pricing of energy credits based on information collected from human behavioral data sources. In embodiments, provided herein is a transaction-enabling system having a machine that automatically purchases spectrum allocation in a spot market for network spectrum and having a machine that automatically forecasts forward market value of compute capability based on information collected from human behavioral data sources. In embodiments, provided herein is a transaction-enabling system having a machine that automatically purchases spectrum allocation in a spot market for network spectrum and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically purchases spectrum allocation in a spot market for network spectrum and having an intelligent agent that is configured to solicit the attention resources of another external intelligent agent. In embodiments, provided herein is a transaction-enabling system having a machine that automatically purchases spectrum allocation in a spot market for network spectrum and having a machine that automatically purchases attention resources in a forward market for attention. In embodiments, provided herein is a transaction-enabling system having a machine that automatically purchases spectrum allocation in a spot market for network spectrum and having a fleet of machines that automatically aggregate purchasing in a forward market for attention. In embodiments, provided herein is a transaction-enabling system having a machine that automatically purchases spectrum allocation in a spot market for network spectrum and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically purchases spectrum allocation in a spot market for network spectrum and having a system for learning on a training set of facility outcomes, facility parameters, and data collected from data sources to train an artificial intelligence/machine learning system to predict a facility production outcome. In embodiments, provided herein is a transaction-enabling system having a machine that automatically purchases spectrum allocation in a spot market for network spectrum and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically purchases spectrum allocation in a spot market for network spectrum and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically purchases spectrum allocation in a spot market for network spectrum and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically purchases spectrum allocation in a spot market for network spectrum and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically purchases spectrum allocation in a spot market for network spectrum and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically purchases spectrum allocation in a spot market for network spectrum and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically purchases spectrum allocation in a spot market for network spectrum and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically purchases spectrum allocation in a spot market for network spectrum and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically purchases spectrum allocation in a spot market for network spectrum and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically purchases spectrum allocation in a spot market for network spectrum and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically purchases spectrum allocation in a spot market for network spectrum and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically purchases spectrum allocation in a spot market for network spectrum and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically purchase spectrum allocation in a spot market for network spectrum. In embodiments, provided herein is a transaction-enabling system having a fleet of machines that automatically purchase spectrum allocation in a spot market for network spectrum and having a fleet of machines that automatically optimize energy utilization for compute task allocation. In embodiments, provided herein is a transaction-enabling system having a fleet of machines that automatically purchase spectrum allocation in a spot market for network spectrum and having a fleet of machines that automatically aggregate data on collective optimization of spot market purchases of energy. In embodiments, provided herein is a transaction-enabling system having a fleet of machines that automatically purchase spectrum allocation in a spot market for network spectrum and having a fleet of machines that automatically aggregate data on collective optimization of spot market purchases of energy credits. In embodiments, provided herein is a transaction-enabling system having a fleet of machines that automatically purchase spectrum allocation in a spot market for network spectrum and having a fleet of machines that automatically aggregate data on collective optimization of spot market purchases of network spectrum. In embodiments, provided herein is a transaction-enabling system having a fleet of machines that automatically purchase spectrum allocation in a spot market for network spectrum and having a fleet of machines that automatically sell their aggregate compute capacity on a forward market for compute capacity. In embodiments, provided herein is a transaction-enabling system having a fleet of machines that automatically purchase spectrum allocation in a spot market for network spectrum and having a fleet of machines that automatically sell their aggregate compute storage capacity on a forward market for storage capacity. In embodiments, provided herein is a transaction-enabling system having a fleet of machines that automatically purchase spectrum allocation in a spot market for network spectrum and having a fleet of machines that automatically sell their aggregate energy storage capacity on a forward market for energy storage capacity. In embodiments, provided herein is a transaction-enabling system having a fleet of machines that automatically purchase spectrum allocation in a spot market for network spectrum and having a fleet of machines that automatically sell their aggregate network bandwidth on a forward market for network capacity. In embodiments, provided herein is a transaction-enabling system having a fleet of machines that automatically purchase spectrum allocation in a spot market for network spectrum and having a machine that automatically forecasts forward market pricing of energy prices based on information collected from social media data sources. In embodiments, provided herein is a transaction-enabling system having a fleet of machines that automatically purchase spectrum allocation in a spot market for network spectrum and having a machine that automatically forecasts forward market pricing of network spectrum based on information collected from social media data sources. In embodiments, provided herein is a transaction-enabling system having a fleet of machines that automatically purchase spectrum allocation in a spot market for network spectrum and having a machine that automatically forecasts forward market pricing of energy credits based on information collected from social media data sources. In embodiments, provided herein is a transaction-enabling system having a fleet of machines that automatically purchase spectrum allocation in a spot market for network spectrum and having a machine that automatically forecasts forward market value of compute capability based on information collected from social media data sources. In embodiments, provided herein is a transaction-enabling system having a fleet of machines that automatically purchase spectrum allocation in a spot market for network spectrum and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically purchase spectrum allocation in a spot market for network spectrum and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically purchase spectrum allocation in a spot market for network spectrum and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically purchase spectrum allocation in a spot market for network spectrum and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically purchase spectrum allocation in a spot market for network spectrum and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically purchase spectrum allocation in a spot market for network spectrum and having a machine that automatically allocates its energy capacity among a core task, a compute task, an energy storage task, a data storage task, and a networking task. In embodiments, provided herein is a transaction-enabling system having a fleet of machines that automatically purchase spectrum allocation in a spot market for network spectrum and having a machine that automatically allocates its compute capacity among a core task, a compute task, an energy storage task, a data storage task, and a networking task. In embodiments, provided herein is a transaction-enabling system having a fleet of machines that automatically purchase spectrum allocation in a spot market for network spectrum and having a machine that automatically allocates its networking capacity among a core task, a compute task, an energy storage task, a data storage task, and a networking task. In embodiments, provided herein is a transaction-enabling system having a fleet of machines that automatically purchase spectrum allocation in a spot market for network spectrum and having a fleet of machines that automatically allocate collective energy capacity among a core task, a compute task, an energy storage task, a data storage task, and a networking task. In embodiments, provided herein is a transaction-enabling system having a fleet of machines that automatically purchase spectrum allocation in a spot market for network spectrum and having a fleet of machines that automatically allocate collective compute capacity among a core task, a compute task, an energy storage task, a data storage task, and a networking task. In embodiments, provided herein is a transaction-enabling system having a fleet of machines that automatically purchase spectrum allocation in a spot market for network spectrum and having a fleet of machines that automatically allocate collective networking capacity among a core task, a compute task, an energy storage task, a data storage task, and a networking task. In embodiments, provided herein is a transaction-enabling system having a fleet of machines that automatically purchase spectrum allocation in a spot market for network spectrum and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically purchase spectrum allocation in a spot market for network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically purchase spectrum allocation in a spot market for network spectrum and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically purchase spectrum allocation in a spot market for network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically purchase spectrum allocation in a spot market for network spectrum and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically purchase spectrum allocation in a spot market for network spectrum and having a distributed ledger that tokenizes an instruction set, such that operation on the distributed ledger provides provable access to the instruction set. In embodiments, provided herein is a transaction-enabling system having a fleet of machines that automatically purchase spectrum allocation in a spot market for network spectrum and having a distributed ledger that tokenizes executable algorithmic logic, such that operation on the distributed ledger provides provable access to the executable algorithmic logic. In embodiments, provided herein is a transaction-enabling system having a fleet of machines that automatically purchase spectrum allocation in a spot market for network spectrum and having a distributed ledger that tokenizes a 3D printer instruction set, such that operation on the distributed ledger provides provable access to the instruction set. In embodiments, provided herein is a transaction-enabling system having a fleet of machines that automatically purchase spectrum allocation in a spot market for network spectrum and having a distributed ledger that tokenizes an instruction set for a coating process, such that operation on the distributed ledger provides provable access to the instruction set. In embodiments, provided herein is a transaction-enabling system having a fleet of machines that automatically purchase spectrum allocation in a spot market for network spectrum and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically purchase spectrum allocation in a spot market for network spectrum and having a distributed ledger that tokenizes a firmware program, such that operation on the distributed ledger provides provable access to the firmware program. In embodiments, provided herein is a transaction-enabling system having a fleet of machines that automatically purchase spectrum allocation in a spot market for network spectrum and having a distributed ledger that tokenizes an instruction set for an FPGA, such that operation on the distributed ledger provides provable access to the FPGA. In embodiments, provided herein is a transaction-enabling system having a fleet of machines that automatically purchase spectrum allocation in a spot market for network spectrum and having a distributed ledger that tokenizes serverless code logic, such that operation on the distributed ledger provides provable access to the serverless code logic. In embodiments, provided herein is a transaction-enabling system having a fleet of machines that automatically purchase spectrum allocation in a spot market for network spectrum and having a distributed ledger that tokenizes an instruction set for a crystal fabrication system, such that operation on the distributed ledger provides provable access to the instruction set. In embodiments, provided herein is a transaction-enabling system having a fleet of machines that automatically purchase spectrum allocation in a spot market for network spectrum and having a distributed ledger that tokenizes an instruction set for a food preparation process, such that operation on the distributed ledger provides provable access to the instruction set. In embodiments, provided herein is a transaction-enabling system having a fleet of machines that automatically purchase spectrum allocation in a spot market for network spectrum and having a distributed ledger that tokenizes an instruction set for a polymer production process, such that operation on the distributed ledger provides provable access to the instruction set. In embodiments, provided herein is a transaction-enabling system having a fleet of machines that automatically purchase spectrum allocation in a spot market for network spectrum and having a distributed ledger that tokenizes an instruction set for chemical synthesis process, such that operation on the distributed ledger provides provable access to the instruction set. In embodiments, provided herein is a transaction-enabling system having a fleet of machines that automatically purchase spectrum allocation in a spot market for network spectrum and having a distributed ledger that tokenizes an instruction set for a biological production process, such that operation on the distributed ledger provides provable access to the instruction set. In embodiments, provided herein is a transaction-enabling system having a fleet of machines that automatically purchase spectrum allocation in a spot market for network spectrum and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically purchase spectrum allocation in a spot market for network spectrum and having a distributed ledger that aggregates views of a trade secret into a chain that proves which and how many parties have viewed the trade secret. In embodiments, provided herein is a transaction-enabling system having a fleet of machines that automatically purchase spectrum allocation in a spot market for network spectrum and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically purchase spectrum allocation in a spot market for network spectrum and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically purchase spectrum allocation in a spot market for network spectrum and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically purchase spectrum allocation in a spot market for network spectrum and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically purchase spectrum allocation in a spot market for network spectrum and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically purchase spectrum allocation in a spot market for network spectrum and having a self-executing cryptocurrency coin that commits a transaction upon recognizing a location-based parameter that provides favorable tax treatment. In embodiments, provided herein is a transaction-enabling system having a fleet of machines that automatically purchase spectrum allocation in a spot market for network spectrum and having an expert system that uses machine learning to optimize the execution of cryptocurrency transactions based on tax status. In embodiments, provided herein is a transaction-enabling system having a fleet of machines that automatically purchase spectrum allocation in a spot market for network spectrum and having an expert system that aggregates regulatory information covering cryptocurrency transactions and automatically selects a jurisdiction for an operation based on the regulatory information. In embodiments, provided herein is a transaction-enabling system having a fleet of machines that automatically purchase spectrum allocation in a spot market for network spectrum and having an expert system that uses machine learning to optimize the execution of a cryptocurrency transaction based on real time energy price information for an available energy source. In embodiments, provided herein is a transaction-enabling system having a fleet of machines that automatically purchase spectrum allocation in a spot market for network spectrum and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically purchase spectrum allocation in a spot market for network spectrum and having an expert system that uses machine learning to optimize charging and recharging cycle of a rechargeable battery system to provide energy for execution of a cryptocurrency transaction. In embodiments, provided herein is a transaction-enabling system having a fleet of machines that automatically purchase spectrum allocation in a spot market for network spectrum and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically purchase spectrum allocation in a spot market for network spectrum and having an expert system that predicts a forward market price in a market based on an understanding obtained by analyzing social network data sources and executes a transaction based on the forward market prediction. In embodiments, provided herein is a transaction-enabling system having a fleet of machines that automatically purchase spectrum allocation in a spot market for network spectrum and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically purchase spectrum allocation in a spot market for network spectrum and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically purchase spectrum allocation in a spot market for network spectrum and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically purchase spectrum allocation in a spot market for network spectrum and having an expert system that predicts a forward market price in an energy market based on an understanding obtained by analyzing social network data sources and executes a transaction based on the forward market prediction. In embodiments, provided herein is a transaction-enabling system having a fleet of machines that automatically purchase spectrum allocation in a spot market for network spectrum and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically purchase spectrum allocation in a spot market for network spectrum and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically purchase spectrum allocation in a spot market for network spectrum and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically purchase spectrum allocation in a spot market for network spectrum and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically purchase spectrum allocation in a spot market for network spectrum and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically purchase spectrum allocation in a spot market for network spectrum and having a machine that automatically forecasts forward market pricing of energy prices based on information collected from automated agent behavioral data sources. In embodiments, provided herein is a transaction-enabling system having a fleet of machines that automatically purchase spectrum allocation in a spot market for network spectrum and having a machine that automatically forecasts forward market pricing of network spectrum based on information collected from automated agent behavioral data sources. In embodiments, provided herein is a transaction-enabling system having a fleet of machines that automatically purchase spectrum allocation in a spot market for network spectrum and having a machine that automatically forecasts forward market pricing of energy credits based on information collected from automated agent behavioral data sources. In embodiments, provided herein is a transaction-enabling system having a fleet of machines that automatically purchase spectrum allocation in a spot market for network spectrum and having a machine that automatically forecasts forward market value of compute capability based on information collected from automated agent behavioral data sources. In embodiments, provided herein is a transaction-enabling system having a fleet of machines that automatically purchase spectrum allocation in a spot market for network spectrum and having a machine that automatically forecasts forward market pricing of energy prices based on information collected from business entity behavioral data sources. In embodiments, provided herein is a transaction-enabling system having a fleet of machines that automatically purchase spectrum allocation in a spot market for network spectrum and having a machine that automatically forecasts forward market pricing of network spectrum based on information collected from business entity behavioral data sources. In embodiments, provided herein is a transaction-enabling system having a fleet of machines that automatically purchase spectrum allocation in a spot market for network spectrum and having a machine that automatically forecasts forward market pricing of energy credits based on information collected from business entity behavioral data sources. In embodiments, provided herein is a transaction-enabling system having a fleet of machines that automatically purchase spectrum allocation in a spot market for network spectrum and having a machine that automatically forecasts forward market value of compute capability based on information collected from business entity behavioral data sources. In embodiments, provided herein is a transaction-enabling system having a fleet of machines that automatically purchase spectrum allocation in a spot market for network spectrum and having a machine that automatically forecasts forward market pricing of energy prices based on information collected from human behavioral data sources. In embodiments, provided herein is a transaction-enabling system having a fleet of machines that automatically purchase spectrum allocation in a spot market for network spectrum and having a machine that automatically forecasts forward market pricing of network spectrum based on information collected from human behavioral data sources. In embodiments, provided herein is a transaction-enabling system having a fleet of machines that automatically purchase spectrum allocation in a spot market for network spectrum and having a machine that automatically forecasts forward market pricing of energy credits based on information collected from human behavioral data sources. In embodiments, provided herein is a transaction-enabling system having a fleet of machines that automatically purchase spectrum allocation in a spot market for network spectrum and having a machine that automatically forecasts forward market value of compute capability based on information collected from human behavioral data sources. In embodiments, provided herein is a transaction-enabling system having a fleet of machines that automatically purchase spectrum allocation in a spot market for network spectrum and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically purchase spectrum allocation in a spot market for network spectrum and having an intelligent agent that is configured to solicit the attention resources of another external intelligent agent. In embodiments, provided herein is a transaction-enabling system having a fleet of machines that automatically purchase spectrum allocation in a spot market for network spectrum and having a machine that automatically purchases attention resources in a forward market for attention. In embodiments, provided herein is a transaction-enabling system having a fleet of machines that automatically purchase spectrum allocation in a spot market for network spectrum and having a fleet of machines that automatically aggregate purchasing in a forward market for attention. In embodiments, provided herein is a transaction-enabling system having a fleet of machines that automatically purchase spectrum allocation in a spot market for network spectrum and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically purchase spectrum allocation in a spot market for network spectrum and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically purchase spectrum allocation in a spot market for network spectrum and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically purchase spectrum allocation in a spot market for network spectrum and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically purchase spectrum allocation in a spot market for network spectrum and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically purchase spectrum allocation in a spot market for network spectrum and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically purchase spectrum allocation in a spot market for network spectrum and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically purchase spectrum allocation in a spot market for network spectrum and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically purchase spectrum allocation in a spot market for network spectrum and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically purchase spectrum allocation in a spot market for network spectrum and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically purchase spectrum allocation in a spot market for network spectrum and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically purchase spectrum allocation in a spot market for network spectrum and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically purchase spectrum allocation in a spot market for network spectrum and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically purchase spectrum allocation in a spot market for network spectrum and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically optimize energy utilization for compute task allocation. In embodiments, provided herein is a transaction-enabling system having a fleet of machines that automatically optimize energy utilization for compute task allocation and having a fleet of machines that automatically aggregate data on collective optimization of spot market purchases of energy. In embodiments, provided herein is a transaction-enabling system having a fleet of machines that automatically optimize energy utilization for compute task allocation and having a fleet of machines that automatically aggregate data on collective optimization of spot market purchases of energy credits. In embodiments, provided herein is a transaction-enabling system having a fleet of machines that automatically optimize energy utilization for compute task allocation and having a fleet of machines that automatically aggregate data on collective optimization of spot market purchases of network spectrum. In embodiments, provided herein is a transaction-enabling system having a fleet of machines that automatically optimize energy utilization for compute task allocation and having a fleet of machines that automatically sell their aggregate compute capacity on a forward market for compute capacity. In embodiments, provided herein is a transaction-enabling system having a fleet of machines that automatically optimize energy utilization for compute task allocation and having a fleet of machines that automatically sell their aggregate compute storage capacity on a forward market for storage capacity. In embodiments, provided herein is a transaction-enabling system having a fleet of machines that automatically optimize energy utilization for compute task allocation and having a fleet of machines that automatically sell their aggregate energy storage capacity on a forward market for energy storage capacity. In embodiments, provided herein is a transaction-enabling system having a fleet of machines that automatically optimize energy utilization for compute task allocation and having a fleet of machines that automatically sell their aggregate network bandwidth on a forward market for network capacity. In embodiments, provided herein is a transaction-enabling system having a fleet of machines that automatically optimize energy utilization for compute task allocation and having a machine that automatically forecasts forward market pricing of energy prices based on information collected from social media data sources. In embodiments, provided herein is a transaction-enabling system having a fleet of machines that automatically optimize energy utilization for compute task allocation and having a machine that automatically forecasts forward market pricing of network spectrum based on information collected from social media data sources. In embodiments, provided herein is a transaction-enabling system having a fleet of machines that automatically optimize energy utilization for compute task allocation and having a machine that automatically forecasts forward market pricing of energy credits based on information collected from social media data sources. In embodiments, provided herein is a transaction-enabling system having a fleet of machines that automatically optimize energy utilization for compute task allocation and having a machine that automatically forecasts forward market value of compute capability based on information collected from social media data sources. In embodiments, provided herein is a transaction-enabling system having a fleet of machines that automatically optimize energy utilization for compute task allocation and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically optimize energy utilization for compute task allocation and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically optimize energy utilization for compute task allocation and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically optimize energy utilization for compute task allocation and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically optimize energy utilization for compute task allocation and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically optimize energy utilization for compute task allocation and having a machine that automatically allocates its energy capacity among a core task, a compute task, an energy storage task, a data storage task, and a networking task. In embodiments, provided herein is a transaction-enabling system having a fleet of machines that automatically optimize energy utilization for compute task allocation and having a machine that automatically allocates its compute capacity among a core task, a compute task, an energy storage task, a data storage task, and a networking task. In embodiments, provided herein is a transaction-enabling system having a fleet of machines that automatically optimize energy utilization for compute task allocation and having a machine that automatically allocates its networking capacity among a core task, a compute task, an energy storage task, a data storage task, and a networking task. In embodiments, provided herein is a transaction-enabling system having a fleet of machines that automatically optimize energy utilization for compute task allocation and having a fleet of machines that automatically allocate collective energy capacity among a core task, a compute task, an energy storage task, a data storage task, and a networking task. In embodiments, provided herein is a transaction-enabling system having a fleet of machines that automatically optimize energy utilization for compute task allocation and having a fleet of machines that automatically allocate collective compute capacity among a core task, a compute task, an energy storage task, a data storage task, and a networking task. In embodiments, provided herein is a transaction-enabling system having a fleet of machines that automatically optimize energy utilization for compute task allocation and having a fleet of machines that automatically allocate collective networking capacity among a core task, a compute task, an energy storage task, a data storage task, and a networking task. In embodiments, provided herein is a transaction-enabling system having a fleet of machines that automatically optimize energy utilization for compute task allocation and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically optimize energy utilization for compute task allocation and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically optimize energy utilization for compute task allocation and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically optimize energy utilization for compute task allocation and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically optimize energy utilization for compute task allocation and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically optimize energy utilization for compute task allocation and having a distributed ledger that tokenizes an instruction set, such that operation on the distributed ledger provides provable access to the instruction set. In embodiments, provided herein is a transaction-enabling system having a fleet of machines that automatically optimize energy utilization for compute task allocation and having a distributed ledger that tokenizes executable algorithmic logic, such that operation on the distributed ledger provides provable access to the executable algorithmic logic. In embodiments, provided herein is a transaction-enabling system having a fleet of machines that automatically optimize energy utilization for compute task allocation and having a distributed ledger that tokenizes a 3D printer instruction set, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for a coating process, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically optimize energy utilization for compute task allocation and having a distributed ledger that tokenizes a firmware program, such that operation on the distributed ledger provides provable access to the firmware program. In embodiments, provided herein is a transaction-enabling system having a fleet of machines that automatically optimize energy utilization for compute task allocation and having a distributed ledger that tokenizes an instruction set for an FPGA, such that operation on the distributed ledger provides provable access to the FPGA. In embodiments, provided herein is a transaction-enabling system having a fleet of machines that automatically optimize energy utilization for compute task allocation and having a distributed ledger that tokenizes serverless code logic, such that operation on the distributed ledger provides provable access to the serverless code logic. In embodiments, provided herein is a transaction-enabling system having a fleet of machines that automatically optimize energy utilization for compute task allocation and having a distributed ledger that tokenizes an instruction set for a crystal fabrication system, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for a food preparation process, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for a polymer production process, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for chemical synthesis process, such that operation on the distributed ledger provides provable access to the instruction set. In embodiments, provided herein is a transaction-enabling system having a fleet of machines that automatically optimize energy utilization for compute task allocation and having a distributed ledger that tokenizes an instruction set for a biological production process, such that operation on the distributed ledger provides provable access to the instruction set. In embodiments, provided herein is a transaction-enabling system having a fleet of machines that automatically optimize energy utilization for compute task allocation and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically optimize energy utilization for compute task allocation and having a distributed ledger that aggregates views of a trade secret into a chain that proves which and how many parties have viewed the trade secret. In embodiments, provided herein is a transaction-enabling system having a fleet of machines that automatically optimize energy utilization for compute task allocation and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically optimize energy utilization for compute task allocation and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically optimize energy utilization for compute task allocation and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically optimize energy utilization for compute task allocation and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically optimize energy utilization for compute task allocation and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically optimize energy utilization for compute task allocation and having a self-executing cryptocurrency coin that commits a transaction upon recognizing a location-based parameter that provides favorable tax treatment. In embodiments, provided herein is a transaction-enabling system having a fleet of machines that automatically optimize energy utilization for compute task allocation and having an expert system that uses machine learning to optimize the execution of cryptocurrency transactions based on tax status. In embodiments, provided herein is a transaction-enabling system having a fleet of machines that automatically optimize energy utilization for compute task allocation and having an expert system that aggregates regulatory information covering cryptocurrency transactions and automatically selects a jurisdiction for an operation based on the regulatory information. In embodiments, provided herein is a transaction-enabling system having a fleet of machines that automatically optimize energy utilization for compute task allocation and having an expert system that uses machine learning to optimize the execution of a cryptocurrency transaction based on real time energy price information for an available energy source. In embodiments, provided herein is a transaction-enabling system having a fleet of machines that automatically optimize energy utilization for compute task allocation and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically optimize energy utilization for compute task allocation and having an expert system that uses machine learning to optimize charging and recharging cycle of a rechargeable battery system to provide energy for execution of a cryptocurrency transaction. In embodiments, provided herein is a transaction-enabling system having a fleet of machines that automatically optimize energy utilization for compute task allocation and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically optimize energy utilization for compute task allocation and having an expert system that predicts a forward market price in a market based on an understanding obtained by analyzing social network data sources and executes a transaction based on the forward market prediction. In embodiments, provided herein is a transaction-enabling system having a fleet of machines that automatically optimize energy utilization for compute task allocation and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically optimize energy utilization for compute task allocation and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically optimize energy utilization for compute task allocation and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically optimize energy utilization for compute task allocation and having an expert system that predicts a forward market price in an energy market based on an understanding obtained by analyzing social network data sources and executes a transaction based on the forward market prediction. In embodiments, provided herein is a transaction-enabling system having a fleet of machines that automatically optimize energy utilization for compute task allocation and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically optimize energy utilization for compute task allocation and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically optimize energy utilization for compute task allocation and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically optimize energy utilization for compute task allocation and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically optimize energy utilization for compute task allocation and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically optimize energy utilization for compute task allocation and having a machine that automatically forecasts forward market pricing of energy prices based on information collected from automated agent behavioral data sources. In embodiments, provided herein is a transaction-enabling system having a fleet of machines that automatically optimize energy utilization for compute task allocation and having a machine that automatically forecasts forward market pricing of network spectrum based on information collected from automated agent behavioral data sources. In embodiments, provided herein is a transaction-enabling system having a fleet of machines that automatically optimize energy utilization for compute task allocation and having a machine that automatically forecasts forward market pricing of energy credits based on information collected from automated agent behavioral data sources. In embodiments, provided herein is a transaction-enabling system having a fleet of machines that automatically optimize energy utilization for compute task allocation and having a machine that automatically forecasts forward market value of compute capability based on information collected from automated agent behavioral data sources. In embodiments, provided herein is a transaction-enabling system having a fleet of machines that automatically optimize energy utilization for compute task allocation and having a machine that automatically forecasts forward market pricing of energy prices based on information collected from business entity behavioral data sources. In embodiments, provided herein is a transaction-enabling system having a fleet of machines that automatically optimize energy utilization for compute task allocation and having a machine that automatically forecasts forward market pricing of network spectrum based on information collected from business entity behavioral data sources. In embodiments, provided herein is a transaction-enabling system having a fleet of machines that automatically optimize energy utilization for compute task allocation and having a machine that automatically forecasts forward market pricing of energy credits based on information collected from business entity behavioral data sources. In embodiments, provided herein is a transaction-enabling system having a fleet of machines that automatically optimize energy utilization for compute task allocation and having a machine that automatically forecasts forward market value of compute capability based on information collected from business entity behavioral data sources. In embodiments, provided herein is a transaction-enabling system having a fleet of machines that automatically optimize energy utilization for compute task allocation and having a machine that automatically forecasts forward market pricing of energy prices based on information collected from human behavioral data sources. In embodiments, provided herein is a transaction-enabling system having a fleet of machines that automatically optimize energy utilization for compute task allocation and having a machine that automatically forecasts forward market pricing of network spectrum based on information collected from human behavioral data sources. In embodiments, provided herein is a transaction-enabling system having a fleet of machines that automatically optimize energy utilization for compute task allocation and having a machine that automatically forecasts forward market pricing of energy credits based on information collected from human behavioral data sources. In embodiments, provided herein is a transaction-enabling system having a fleet of machines that automatically optimize energy utilization for compute task allocation and having a machine that automatically forecasts forward market value of compute capability based on information collected from human behavioral data sources. In embodiments, provided herein is a transaction-enabling system having a fleet of machines that automatically optimize energy utilization for compute task allocation and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically optimize energy utilization for compute task allocation and having an intelligent agent that is configured to solicit the attention resources of another external intelligent agent. In embodiments, provided herein is a transaction-enabling system having a fleet of machines that automatically optimize energy utilization for compute task allocation and having a machine that automatically purchases attention resources in a forward market for attention. In embodiments, provided herein is a transaction-enabling system having a fleet of machines that automatically optimize energy utilization for compute task allocation and having a fleet of machines that automatically aggregate purchasing in a forward market for attention. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically optimize energy utilization for compute task allocation and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically optimize energy utilization for compute task allocation and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate data on collective optimization of spot market purchases of energy. In embodiments, provided herein is a transaction-enabling system having a fleet of machines that automatically aggregate data on collective optimization of spot market purchases of energy and having a fleet of machines that automatically aggregate data on collective optimization of spot market purchases of energy credits. In embodiments, provided herein is a transaction-enabling system having a fleet of machines that automatically aggregate data on collective optimization of spot market purchases of energy and having a fleet of machines that automatically aggregate data on collective optimization of spot market purchases of network spectrum. In embodiments, provided herein is a transaction-enabling system having a fleet of machines that automatically aggregate data on collective optimization of spot market purchases of energy and having a fleet of machines that automatically sell their aggregate compute capacity on a forward market for compute capacity. In embodiments, provided herein is a transaction-enabling system having a fleet of machines that automatically aggregate data on collective optimization of spot market purchases of energy and having a fleet of machines that automatically sell their aggregate compute storage capacity on a forward market for storage capacity. In embodiments, automatically aggregate data on collective optimization of spot market purchases of energy and having a fleet of machines that automatically sell their aggregate energy storage capacity on a forward market for energy storage capacity. In embodiments, provided herein is a transaction-enabling system having a fleet of machines that automatically aggregate data on collective optimization of spot market purchases of energy and having a fleet of machines that automatically sell their aggregate network bandwidth on a forward market for network capacity. In embodiments, provided herein is a transaction-enabling system having a fleet of machines that automatically aggregate data on collective optimization of spot market purchases of energy and having a machine that automatically forecasts forward market pricing of energy prices based on information collected from social media data sources. In embodiments, provided herein is a transaction-enabling system having a fleet of machines that automatically aggregate data on collective optimization of spot market purchases of energy and having a machine that automatically forecasts forward market pricing of network spectrum based on information collected from social media data sources. In embodiments, provided herein is a transaction-enabling system having a fleet of machines that automatically aggregate data on collective optimization of spot market purchases of energy and having a machine that automatically forecasts forward market pricing of energy credits based on information collected from social media data sources. In embodiments, provided herein is a transaction-enabling system having a fleet of machines that automatically aggregate data on collective optimization of spot market purchases of energy and having a machine that automatically forecasts forward market value of compute capability based on information collected from social media data sources. In embodiments, provided herein is a transaction-enabling system having a fleet of machines that automatically aggregate data on collective optimization of spot market purchases of energy and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of energy and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of energy and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of energy and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of energy and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of energy and having a machine that automatically allocates its energy capacity among a core task, a compute task, an energy storage task, a data storage task, and a networking task. In embodiments, provided herein is a transaction-enabling system having a fleet of machines that automatically aggregate data on collective optimization of spot market purchases of energy and having a machine that automatically allocates its compute capacity among a core task, a compute task, an energy storage task, a data storage task, and a networking task. In embodiments, provided herein is a transaction-enabling system having a fleet of machines that automatically aggregate data on collective optimization of spot market purchases of energy and having a machine that automatically allocates its networking capacity among a core task, a compute task, an energy storage task, a data storage task, and a networking task. In embodiments, provided herein is a transaction-enabling system having a fleet of machines that automatically aggregate data on collective optimization of spot market purchases of energy and having a fleet of machines that automatically allocate collective energy capacity among a core task, a compute task, an energy storage task, a data storage task, and a networking task. In embodiments, provided herein is a transaction-enabling system having a fleet of machines that automatically aggregate data on collective optimization of spot market purchases of energy and having a fleet of machines that automatically allocate collective compute capacity among a core task, a compute task, an energy storage task, a data storage task, and a networking task. In embodiments, provided herein is a transaction-enabling system having a fleet of machines that automatically aggregate data on collective optimization of spot market purchases of energy and having a fleet of machines that automatically allocate collective networking capacity among a core task, a compute task, an energy storage task, a data storage task, and a networking task. In embodiments, provided herein is a transaction-enabling system having a fleet of machines that automatically aggregate data on collective optimization of spot market purchases of energy and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically aggregate data on collective optimization of spot market purchases of energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of spot market purchases of energy and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically aggregate data on collective optimization of spot market purchases of energy and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of spot market purchases of energy and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically aggregate data on collective optimization of spot market purchases of energy and having a distributed ledger that tokenizes an instruction set, such that operation on the distributed ledger provides provable access to the instruction set. In embodiments, provided herein is a transaction-enabling system having a fleet of machines that automatically aggregate data on collective optimization of spot market purchases of energy and having a distributed ledger that tokenizes executable algorithmic logic, such that operation on the distributed ledger provides provable access to the executable algorithmic logic. In embodiments, provided herein is a transaction-enabling system having a fleet of machines that automatically aggregate data on collective optimization of spot market purchases of energy and having a distributed ledger that tokenizes a 3D printer instruction set, such that operation on the distributed ledger provides provable access to the instruction set. In embodiments, provided herein is a transaction-enabling system having a fleet of machines that automatically aggregate data on collective optimization of spot market purchases of energy and having a distributed ledger that tokenizes an instruction set for a coating process, such that operation on the distributed ledger provides provable access to the instruction set. In embodiments, provided herein is a transaction-enabling system having a fleet of machines that automatically aggregate data on collective optimization of spot market purchases of energy and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically aggregate data on collective optimization of spot market purchases of energy and having a distributed ledger that tokenizes a firmware program, such that operation on the distributed ledger provides provable access to the firmware program. In embodiments, provided herein is a transaction-enabling system having a fleet of machines that automatically aggregate data on collective optimization of spot market purchases of energy and having a distributed ledger that tokenizes an instruction set for an FPGA, such that operation on the distributed ledger provides provable access to the FPGA. In embodiments, provided herein is a transaction-enabling system having a fleet of machines that automatically aggregate data on collective optimization of spot market purchases of energy and having a distributed ledger that tokenizes serverless code logic, such that operation on the distributed ledger provides provable access to the serverless code logic. In embodiments, provided herein is a transaction-enabling system having a fleet of machines that automatically aggregate data on collective optimization of spot market purchases of energy and having a distributed ledger that tokenizes an instruction set for a crystal fabrication system, such that operation on the distributed ledger provides provable access to the instruction set. In embodiments, provided herein is a transaction-enabling system having a fleet of machines that automatically aggregate data on collective optimization of spot market purchases of energy and having a distributed ledger that tokenizes an instruction set for a food preparation process, such that operation on the distributed ledger provides provable access to the instruction set. In embodiments, provided herein is a transaction-enabling system having a fleet of machines that automatically aggregate data on collective optimization of spot market purchases of energy and having a distributed ledger that tokenizes an instruction set for a polymer production process, such that operation on the distributed ledger provides provable access to the instruction set. In embodiments, provided herein is a transaction-enabling system having a fleet of machines that automatically aggregate data on collective optimization of spot market purchases of energy and having a distributed ledger that tokenizes an instruction set for chemical synthesis process, such that operation on the distributed ledger provides provable access to the instruction set. In embodiments, provided herein is a transaction-enabling system having a fleet of machines that automatically aggregate data on collective optimization of spot market purchases of energy and having a distributed ledger that tokenizes an instruction set for a biological production process, such that operation on the distributed ledger provides provable access to the instruction set. In embodiments, provided herein is a transaction-enabling system having a fleet of machines that automatically aggregate data on collective optimization of spot market purchases of energy and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically aggregate data on collective optimization of spot market purchases of energy and having a distributed ledger that aggregates views of a trade secret into a chain that proves which and how many parties have viewed the trade secret. In embodiments, provided herein is a transaction-enabling system having a fleet of machines that automatically aggregate data on collective optimization of spot market purchases of energy and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically aggregate data on collective optimization of spot market purchases of energy and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically aggregate data on collective optimization of spot market purchases of energy and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically aggregate data on collective optimization of spot market purchases of energy and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically aggregate data on collective optimization of spot market purchases of energy and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically aggregate data on collective optimization of spot market purchases of energy and having a self-executing cryptocurrency coin that commits a transaction upon recognizing a location-based parameter that provides favorable tax treatment. In embodiments, provided herein is a transaction-enabling system having a fleet of machines that automatically aggregate data on collective optimization of spot market purchases of energy and having an expert system that uses machine learning to optimize the execution of cryptocurrency transactions based on tax status. In embodiments, provided herein is a transaction-enabling system having a fleet of machines that automatically aggregate data on collective optimization of spot market purchases of energy and having an expert system that aggregates regulatory information covering cryptocurrency transactions and automatically selects a jurisdiction for an operation based on the regulatory information. In embodiments, provided herein is a transaction-enabling system having a fleet of machines that automatically aggregate data on collective optimization of spot market purchases of energy and having an expert system that uses machine learning to optimize the execution of a cryptocurrency transaction based on real time energy price information for an available energy source. In embodiments, provided herein is a transaction-enabling system having a fleet of machines that automatically aggregate data on collective optimization of spot market purchases of energy and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically aggregate data on collective optimization of spot market purchases of energy and having an expert system that uses machine learning to optimize charging and recharging cycle of a rechargeable battery system to provide energy for execution of a cryptocurrency transaction. In embodiments, provided herein is a transaction-enabling system having a fleet of machines that automatically aggregate data on collective optimization of spot market purchases of energy and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of energy and having an expert system that predicts a forward market price in a market based on an understanding obtained by analyzing social network data sources and executes a transaction based on the forward market prediction. In embodiments, provided herein is a transaction-enabling system having a fleet of machines that automatically aggregate data on collective optimization of spot market purchases of energy and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically aggregate data on collective optimization of spot market purchases of energy and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically aggregate data on collective optimization of spot market purchases of energy and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of energy and having an expert system that predicts a forward market price in an energy market based on an understanding obtained by analyzing social network data sources and executes a transaction based on the forward market prediction. In embodiments, provided herein is a transaction-enabling system having a fleet of machines that automatically aggregate data on collective optimization of spot market purchases of energy and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of energy and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of energy and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically aggregate data on collective optimization of spot market purchases of energy and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of energy and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically aggregate data on collective optimization of spot market purchases of energy and having a machine that automatically forecasts forward market pricing of energy prices based on information collected from automated agent behavioral data sources. In embodiments, provided herein is a transaction-enabling system having a fleet of machines that automatically aggregate data on collective optimization of spot market purchases of energy and having a machine that automatically forecasts forward market pricing of network spectrum based on information collected from automated agent behavioral data sources. In embodiments, provided herein is a transaction-enabling system having a fleet of machines that automatically aggregate data on collective optimization of spot market purchases of energy and having a machine that automatically forecasts forward market pricing of energy credits based on information collected from automated agent behavioral data sources. In embodiments, provided herein is a transaction-enabling system having a fleet of machines that automatically aggregate data on collective optimization of spot market purchases of energy and having a machine that automatically forecasts forward market value of compute capability based on information collected from automated agent behavioral data sources. In embodiments, provided herein is a transaction-enabling system having a fleet of machines that automatically aggregate data on collective optimization of spot market purchases of energy and having a machine that automatically forecasts forward market pricing of energy prices based on information collected from business entity behavioral data sources. In embodiments, provided herein is a transaction-enabling system having a fleet of machines that automatically aggregate data on collective optimization of spot market purchases of energy and having a machine that automatically forecasts forward market pricing of network spectrum based on information collected from business entity behavioral data sources. In embodiments, provided herein is a transaction-enabling system having a fleet of machines that automatically aggregate data on collective optimization of spot market purchases of energy and having a machine that automatically forecasts forward market pricing of energy credits based on information collected from business entity behavioral data sources. In embodiments, provided herein is a transaction-enabling system having a fleet of machines that automatically aggregate data on collective optimization of spot market purchases of energy and having a machine that automatically forecasts forward market value of compute capability based on information collected from business entity behavioral data sources. In embodiments, provided herein is a transaction-enabling system having a fleet of machines that automatically aggregate data on collective optimization of spot market purchases of energy and having a machine that automatically forecasts forward market pricing of energy prices based on information collected from human behavioral data sources. In embodiments, provided herein is a transaction-enabling system having a fleet of machines that automatically aggregate data on collective optimization of spot market purchases of energy and having a machine that automatically forecasts forward market pricing of network spectrum based on information collected from human behavioral data sources. In embodiments, provided herein is a transaction-enabling system having a fleet of machines that automatically aggregate data on collective optimization of spot market purchases of energy and having a machine that automatically forecasts forward market pricing of energy credits based on information collected from human behavioral data sources. In embodiments, provided herein is a transaction-enabling system having a fleet of machines that automatically aggregate data on collective optimization of spot market purchases of energy and having a machine that automatically forecasts forward market value of compute capability based on information collected from human behavioral data sources. In embodiments, provided herein is a transaction-enabling system having a fleet of machines that automatically aggregate data on collective optimization of spot market purchases of energy and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically aggregate data on collective optimization of spot market purchases of energy and having an intelligent agent that is configured to solicit the attention resources of another external intelligent agent. In embodiments, provided herein is a transaction-enabling system having a fleet of machines that automatically aggregate data on collective optimization of spot market purchases of energy and having a machine that automatically purchases attention resources in a forward market for attention. In embodiments, provided herein is a transaction-enabling system having a fleet of machines that automatically aggregate data on collective optimization of spot market purchases of energy and having a fleet of machines that automatically aggregate purchasing in a forward market for attention. In embodiments, provided herein is a transaction-enabling system having a fleet of machines that automatically aggregate data on collective optimization of spot market purchases of energy and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate data on collective optimization of spot market purchases of energy and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate data on collective optimization of spot market purchases of energy and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate data on collective optimization of spot market purchases of energy and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate data on collective optimization of spot market purchases of energy and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate data on collective optimization of spot market purchases of energy and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate data on collective optimization of spot market purchases of energy and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate data on collective optimization of spot market purchases of energy and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate data on collective optimization of spot market purchases of energy and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate data on collective optimization of spot market purchases of energy and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate data on collective optimization of spot market purchases of energy and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate data on collective optimization of spot market purchases of energy and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate data on collective optimization of spot market purchases of energy and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate data on collective optimization of spot market purchases of energy and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate data on collective optimization of spot market purchases of energy credits. In embodiments, provided herein is a transaction-enabling system having a fleet of machines that automatically aggregate data on collective optimization of spot market purchases of energy credits and having a fleet of machines that automatically aggregate data on collective optimization of spot market purchases of network spectrum. In embodiments, provided herein is a transaction-enabling system having a fleet of machines that automatically aggregate data on collective optimization of spot market purchases of energy credits and having a fleet of machines that automatically sell their aggregate compute capacity on a forward market for compute capacity. In embodiments, provided herein is a transaction-enabling system having a fleet of machines that automatically aggregate data on collective optimization of spot market purchases of energy credits and having a fleet of machines that automatically sell their aggregate compute storage capacity on a forward market for storage capacity. In embodiments, provided herein is a transaction-enabling system having a fleet of machines that automatically aggregate data on collective optimization of spot market purchases of energy credits and having a fleet of machines that automatically sell their aggregate energy storage capacity on a forward market for energy storage capacity. In embodiments, provided herein is a transaction-enabling system having a fleet of machines that automatically aggregate data on collective optimization of spot market purchases of energy credits and having a fleet of machines that automatically sell their aggregate network bandwidth on a forward market for network capacity. In embodiments, provided herein is a transaction-enabling system having a fleet of machines that automatically aggregate data on collective optimization of spot market purchases of energy credits and having a machine that automatically forecasts forward market pricing of energy prices based on information collected from social media data sources. In embodiments, provided herein is a transaction-enabling system having a fleet of machines that automatically aggregate data on collective optimization of spot market purchases of energy credits and having a machine that automatically forecasts forward market pricing of network spectrum based on information collected from social media data sources. In embodiments, provided herein is a transaction-enabling system having a fleet of machines that automatically aggregate data on collective optimization of spot market purchases of energy credits and having a machine that automatically forecasts forward market pricing of energy credits based on information collected from social media data sources. In embodiments, provided herein is a transaction-enabling system having a fleet of machines that automatically aggregate data on collective optimization of spot market purchases of energy credits and having a machine that automatically forecasts forward market value of compute capability based on information collected from social media data sources. In embodiments, provided herein is a transaction-enabling system having a fleet of machines that automatically aggregate data on collective optimization of spot market purchases of energy credits and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of energy credits and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of energy credits and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of energy credits and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of energy credits and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of energy credits and having a machine that automatically allocates its energy capacity among a core task, a compute task, an energy storage task, a data storage task, and a networking task. In embodiments, provided herein is a transaction-enabling system having a fleet of machines that automatically aggregate data on collective optimization of spot market purchases of energy credits and having a machine that automatically allocates its compute capacity among a core task, a compute task, an energy storage task, a data storage task, and a networking task. In embodiments, provided herein is a transaction-enabling system having a fleet of machines that automatically aggregate data on collective optimization of spot market purchases of energy credits and having a machine that automatically allocates its networking capacity among a core task, a compute task, an energy storage task, a data storage task, and a networking task. In embodiments, provided herein is a transaction-enabling system having a fleet of machines that automatically aggregate data on collective optimization of spot market purchases of energy credits and having a fleet of machines that automatically allocate collective energy capacity among a core task, a compute task, an energy storage task, a data storage task, and a networking task. In embodiments, provided herein is a transaction-enabling system having a fleet of machines that automatically aggregate data on collective optimization of spot market purchases of energy credits and having a fleet of machines that automatically allocate collective compute capacity among a core task, a compute task, an energy storage task, a data storage task, and a networking task. In embodiments, provided herein is a transaction-enabling system having a fleet of machines that automatically aggregate data on collective optimization of spot market purchases of energy credits and having a fleet of machines that automatically allocate collective networking capacity among a core task, a compute task, an energy storage task, a data storage task, and a networking task. In embodiments, provided herein is a transaction-enabling system having a fleet of machines that automatically aggregate data on collective optimization of spot market purchases of energy credits and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically aggregate data on collective optimization of spot market purchases of energy credits and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of spot market purchases of energy credits and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically aggregate data on collective optimization of spot market purchases of energy credits and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of spot market purchases of energy credits and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically aggregate data on collective optimization of spot market purchases of energy credits and having a distributed ledger that tokenizes an instruction set, such that operation on the distributed ledger provides provable access to the instruction set. In embodiments, provided herein is a transaction-enabling system having a fleet of machines that automatically aggregate data on collective optimization of spot market purchases of energy credits and having a distributed ledger that tokenizes executable algorithmic logic, such that operation on the distributed ledger provides provable access to the executable algorithmic logic. In embodiments, provided herein is a transaction-enabling system having a fleet of machines that automatically aggregate data on collective optimization of spot market purchases of energy credits and having a distributed ledger that tokenizes a 3D printer instruction set, such that operation on the distributed ledger provides provable access to the instruction set. In embodiments, provided herein is a transaction-enabling system having a fleet of machines that automatically aggregate data on collective optimization of spot market purchases of energy credits and having a distributed ledger that tokenizes an instruction set for a coating process, such that operation on the distributed ledger provides provable access to the instruction set. In embodiments, provided herein is a transaction-enabling system having a fleet of machines that automatically aggregate data on collective optimization of spot market purchases of energy credits and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically aggregate data on collective optimization of spot market purchases of energy credits and having a distributed ledger that tokenizes a firmware program, such that operation on the distributed ledger provides provable access to the firmware program. In embodiments, provided herein is a transaction-enabling system having a fleet of machines that automatically aggregate data on collective optimization of spot market purchases of energy credits and having a distributed ledger that tokenizes an instruction set for an FPGA, such that operation on the distributed ledger provides provable access to the FPGA. In embodiments, provided herein is a transaction-enabling system having a fleet of machines that automatically aggregate data on collective optimization of spot market purchases of energy credits and having a distributed ledger that tokenizes serverless code logic, such that operation on the distributed ledger provides provable access to the serverless code logic. In embodiments, provided herein is a transaction-enabling system having a fleet of machines that automatically aggregate data on collective optimization of spot market purchases of energy credits and having a distributed ledger that tokenizes an instruction set for a crystal fabrication system, such that operation on the distributed ledger provides provable access to the instruction set. In embodiments, provided herein is a transaction-enabling system having a fleet of machines that automatically aggregate data on collective optimization of spot market purchases of energy credits and having a distributed ledger that tokenizes an instruction set for a food preparation process, such that operation on the distributed ledger provides provable access to the instruction set. In embodiments, provided herein is a transaction-enabling system having a fleet of machines that automatically aggregate data on collective optimization of spot market purchases of energy credits and having a distributed ledger that tokenizes an instruction set for a polymer production process, such that operation on the distributed ledger provides provable access to the instruction set. In embodiments, provided herein is a transaction-enabling system having a fleet of machines that automatically aggregate data on collective optimization of spot market purchases of energy credits and having a distributed ledger that tokenizes an instruction set for chemical synthesis process, such that operation on the distributed ledger provides provable access to the instruction set. In embodiments, provided herein is a transaction-enabling system having a fleet of machines that automatically aggregate data on collective optimization of spot market purchases of energy credits and having a distributed ledger that tokenizes an instruction set for a biological production process, such that operation on the distributed ledger provides provable access to the instruction set. In embodiments, provided herein is a transaction-enabling system having a fleet of machines that automatically aggregate data on collective optimization of spot market purchases of energy credits and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically aggregate data on collective optimization of spot market purchases of energy credits and having a distributed ledger that aggregates views of a trade secret into a chain that proves which and how many parties have viewed the trade secret. In embodiments, provided herein is a transaction-enabling system having a fleet of machines that automatically aggregate data on collective optimization of spot market purchases of energy credits and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically aggregate data on collective optimization of spot market purchases of energy credits and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically aggregate data on collective optimization of spot market purchases of energy credits and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically aggregate data on collective optimization of spot market purchases of energy credits and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically aggregate data on collective optimization of spot market purchases of energy credits and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically aggregate data on collective optimization of spot market purchases of energy credits and having a self-executing cryptocurrency coin that commits a transaction upon recognizing a location-based parameter that provides favorable tax treatment. In embodiments, provided herein is a transaction-enabling system having a fleet of machines that automatically aggregate data on collective optimization of spot market purchases of energy credits and having an expert system that uses machine learning to optimize the execution of cryptocurrency transactions based on tax status. In embodiments, provided herein is a transaction-enabling system having a fleet of machines that automatically aggregate data on collective optimization of spot market purchases of energy credits and having an expert system that aggregates regulatory information covering cryptocurrency transactions and automatically selects a jurisdiction for an operation based on the regulatory information. In embodiments, provided herein is a transaction-enabling system having a fleet of machines that automatically aggregate data on collective optimization of spot market purchases of energy credits and having an expert system that uses machine learning to optimize the execution of a cryptocurrency transaction based on real time energy price information for an available energy source. In embodiments, provided herein is a transaction-enabling system having a fleet of machines that automatically aggregate data on collective optimization of spot market purchases of energy credits and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically aggregate data on collective optimization of spot market purchases of energy credits and having an expert system that uses machine learning to optimize charging and recharging cycle of a rechargeable battery system to provide energy for execution of a cryptocurrency transaction. In embodiments, provided herein is a transaction-enabling system having a fleet of machines that automatically aggregate data on collective optimization of spot market purchases of energy credits and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of energy credits and having an expert system that predicts a forward market price in a market based on an understanding obtained by analyzing social network data sources and executes a transaction based on the forward market prediction. In embodiments, provided herein is a transaction-enabling system having a fleet of machines that automatically aggregate data on collective optimization of spot market purchases of energy credits and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically aggregate data on collective optimization of spot market purchases of energy credits and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically aggregate data on collective optimization of spot market purchases of energy credits and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of energy credits and having an expert system that predicts a forward market price in an energy market based on an understanding obtained by analyzing social network data sources and executes a transaction based on the forward market prediction. In embodiments, provided herein is a transaction-enabling system having a fleet of machines that automatically aggregate data on collective optimization of spot market purchases of energy credits and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of energy credits and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of energy credits and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically aggregate data on collective optimization of spot market purchases of energy credits and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of energy credits and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically aggregate data on collective optimization of spot market purchases of energy credits and having a machine that automatically forecasts forward market pricing of energy prices based on information collected from automated agent behavioral data sources. In embodiments, provided herein is a transaction-enabling system having a fleet of machines that automatically aggregate data on collective optimization of spot market purchases of energy credits and having a machine that automatically forecasts forward market pricing of network spectrum based on information collected from automated agent behavioral data sources. In embodiments, provided herein is a transaction-enabling system having a fleet of machines that automatically aggregate data on collective optimization of spot market purchases of energy credits and having a machine that automatically forecasts forward market pricing of energy credits based on information collected from automated agent behavioral data sources. In embodiments, provided herein is a transaction-enabling system having a fleet of machines that automatically aggregate data on collective optimization of spot market purchases of energy credits and having a machine that automatically forecasts forward market value of compute capability based on information collected from automated agent behavioral data sources. In embodiments, provided herein is a transaction-enabling system having a fleet of machines that automatically aggregate data on collective optimization of spot market purchases of energy credits and having a machine that automatically forecasts forward market pricing of energy prices based on information collected from business entity behavioral data sources. In embodiments, provided herein is a transaction-enabling system having a fleet of machines that automatically aggregate data on collective optimization of spot market purchases of energy credits and having a machine that automatically forecasts forward market pricing of network spectrum based on information collected from business entity behavioral data sources. In embodiments, provided herein is a transaction-enabling system having a fleet of machines that automatically aggregate data on collective optimization of spot market purchases of energy credits and having a machine that automatically forecasts forward market pricing of energy credits based on information collected from business entity behavioral data sources. In embodiments, provided herein is a transaction-enabling system having a fleet of machines that automatically aggregate data on collective optimization of spot market purchases of energy credits and having a machine that automatically forecasts forward market value of compute capability based on information collected from business entity behavioral data sources. In embodiments, provided herein is a transaction-enabling system having a fleet of machines that automatically aggregate data on collective optimization of spot market purchases of energy credits and having a machine that automatically forecasts forward market pricing of energy prices based on information collected from human behavioral data sources. In embodiments, provided herein is a transaction-enabling system having a fleet of machines that automatically aggregate data on collective optimization of spot market purchases of energy credits and having a machine that automatically forecasts forward market pricing of network spectrum based on information collected from human behavioral data sources. In embodiments, provided herein is a transaction-enabling system having a fleet of machines that automatically aggregate data on collective optimization of spot market purchases of energy credits and having a machine that automatically forecasts forward market pricing of energy credits based on information collected from human behavioral data sources. In embodiments, provided herein is a transaction-enabling system having a fleet of machines that automatically aggregate data on collective optimization of spot market purchases of energy credits and having a machine that automatically forecasts forward market value of compute capability based on information collected from human behavioral data sources. In embodiments, provided herein is a transaction-enabling system having a fleet of machines that automatically aggregate data on collective optimization of spot market purchases of energy credits and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically aggregate data on collective optimization of spot market purchases of energy credits and having an intelligent agent that is configured to solicit the attention resources of another external intelligent agent. In embodiments, provided herein is a transaction-enabling system having a fleet of machines that automatically aggregate data on collective optimization of spot market purchases of energy credits and having a machine that automatically purchases attention resources in a forward market for attention. In embodiments, provided herein is a transaction-enabling system having a fleet of machines that automatically aggregate data on collective optimization of spot market purchases of energy credits and having a fleet of machines that automatically aggregate purchasing in a forward market for attention. In embodiments, provided herein is a transaction-enabling system having a fleet of machines that automatically aggregate data on collective optimization of spot market purchases of energy credits and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate data on collective optimization of spot market purchases of energy credits and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate data on collective optimization of spot market purchases of energy credits and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate data on collective optimization of spot market purchases of energy credits and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate data on collective optimization of spot market purchases of energy credits and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate data on collective optimization of spot market purchases of energy credits and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate data on collective optimization of spot market purchases of energy credits and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate data on collective optimization of spot market purchases of energy credits and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate data on collective optimization of spot market purchases of energy credits and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate data on collective optimization of spot market purchases of energy credits and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate data on collective optimization of spot market purchases of energy credits and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate data on collective optimization of spot market purchases of energy credits and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate data on collective optimization of spot market purchases of energy credits and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate data on collective optimization of spot market purchases of energy credits and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically aggregate data on collective optimization of spot market purchases of network spectrum. In embodiments, provided herein is a transaction-enabling system having a fleet of machines that automatically aggregate data on collective optimization of spot market purchases of network spectrum and having a fleet of machines that automatically sell their aggregate compute capacity on a forward market for compute capacity. In embodiments, provided herein is a transaction-enabling system having a fleet of machines that automatically aggregate data on collective optimization of spot market purchases of network spectrum and having a fleet of machines that automatically sell their aggregate compute storage capacity on a forward market for storage capacity. In embodiments, provided herein is a transaction-enabling system having a fleet of machines that automatically aggregate data on collective optimization of spot market purchases of network spectrum and having a fleet of machines that automatically sell their aggregate energy storage capacity on a forward market for energy storage capacity. In embodiments, provided herein is a transaction-enabling system having a fleet of machines that automatically aggregate data on collective optimization of spot market purchases of network spectrum and having a fleet of machines that automatically sell their aggregate network bandwidth on a forward market for network capacity. In embodiments, provided herein is a transaction-enabling system having a fleet of machines that automatically aggregate data on collective optimization of spot market purchases of network spectrum and having a machine that automatically forecasts forward market pricing of energy prices based on information collected from social media data sources. In embodiments, provided herein is a transaction-enabling system having a fleet of machines that automatically aggregate data on collective optimization of spot market purchases of network spectrum and having a machine that automatically forecasts forward market pricing of network spectrum based on information collected from social media data sources. In embodiments, provided herein is a transaction-enabling system having a fleet of machines that automatically aggregate data on collective optimization of spot market purchases of network spectrum and having a machine that automatically forecasts forward market pricing of energy credits based on information collected from social media data sources. In embodiments, provided herein is a transaction-enabling system having a fleet of machines that automatically aggregate data on collective optimization of spot market purchases of network spectrum and having a machine that automatically forecasts forward market value of compute capability based on information collected from social media data sources. In embodiments, provided herein is a transaction-enabling system having a fleet of machines that automatically aggregate data on collective optimization of spot market purchases of network spectrum and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of network spectrum and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of network spectrum and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of network spectrum and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of network spectrum and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically aggregate data on collective optimization of spot market purchases of network spectrum and having a machine that automatically allocates its energy capacity among a core task, a compute task, an energy storage task, a data storage task, and a networking task. In embodiments, provided herein is a transaction-enabling system having a fleet of machines that automatically aggregate data on collective optimization of spot market purchases of network spectrum and having a machine that automatically allocates its compute capacity among a core task, a compute task, an energy storage task, a data storage task, and a networking task. In embodiments, provided herein is a transaction-enabling system having a fleet of machines that automatically aggregate data on collective optimization of spot market purchases of network spectrum and having a machine that automatically allocates its networking capacity among a core task, a compute task, an energy storage task, a data storage task, and a networking task. In embodiments, provided herein is a transaction-enabling system having a fleet of machines that automatically aggregate data on collective optimization of spot market purchases of network spectrum and having a fleet of machines that automatically allocate collective energy capacity among a core task, a compute task, an energy storage task, a data storage task, and a networking task. In embodiments, provided herein is a transaction-enabling system having a fleet of machines that automatically aggregate data on collective optimization of spot market purchases of network spectrum and having a fleet of machines that automatically allocate collective compute capacity among a core task, a compute task, an energy storage task, a data storage task, and a networking task. In embodiments, provided herein is a transaction-enabling system having a fleet of machines that automatically aggregate data on collective optimization of spot market purchases of network spectrum and having a fleet of machines that automatically allocate collective networking capacity among a core task, a compute task, an energy storage task, a data storage task, and a networking task. In embodiments, provided herein is a transaction-enabling system having a fleet of machines that automatically aggregate data on collective optimization of spot market purchases of network spectrum and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically aggregate data on collective optimization of spot market purchases of network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of spot market purchases of network spectrum and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically aggregate data on collective optimization of spot market purchases of network spectrum and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically aggregate data on collective optimization of spot market purchases of network spectrum and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically aggregate data on collective optimization of spot market purchases of network spectrum and having a distributed ledger that tokenizes an instruction set, such that operation on the distributed ledger provides provable access to the instruction set. In embodiments, provided herein is a transaction-enabling system having a fleet of machines that automatically aggregate data on collective optimization of spot market purchases of network spectrum and having a distributed ledger that tokenizes executable algorithmic logic, such that operation on the distributed ledger provides provable access to the executable algorithmic logic. In embodiments, provided herein is a transaction-enabling system having a fleet of machines that automatically aggregate data on collective optimization of spot market purchases of network spectrum and having a distributed ledger that tokenizes a 3D printer instruction set, such that operation on the distributed ledger provides provable access to the instruction set. In embodiments, provided herein is a transaction-enabling system having a fleet of machines that automatically aggregate data on collective optimization of spot market purchases of network spectrum and having a distributed ledger that tokenizes an instruction set for a coating process, such that operation on the distributed ledger provides provable access to the instruction set. In embodiments, provided herein is a transaction-enabling system having a fleet of machines that automatically aggregate data on collective optimization of spot market purchases of network spectrum and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically aggregate data on collective optimization of spot market purchases of network spectrum and having a distributed ledger that tokenizes a firmware program, such that operation on the distributed ledger provides provable access to the firmware program. In embodiments, provided herein is a transaction-enabling system having a fleet of machines that automatically aggregate data on collective optimization of spot market purchases of network spectrum and having a distributed ledger that tokenizes an instruction set for an FPGA, such that operation on the distributed ledger provides provable access to the FPGA. In embodiments, provided herein is a transaction-enabling system having a fleet of machines that automatically aggregate data on collective optimization of spot market purchases of network spectrum and having a distributed ledger that tokenizes serverless code logic, such that operation on the distributed ledger provides provable access to the serverless code logic. In embodiments, provided herein is a transaction-enabling system having a fleet of machines that automatically aggregate data on collective optimization of spot market purchases of network spectrum and having a distributed ledger that tokenizes an instruction set for a crystal fabrication system, such that operation on the distributed ledger provides provable access to the instruction set. In embodiments, provided herein is a transaction-enabling system having a fleet of machines that automatically aggregate data on collective optimization of spot market purchases of network spectrum and having a distributed ledger that tokenizes an instruction set for a food preparation process, such that operation on the distributed ledger provides provable access to the instruction set. In embodiments, provided herein is a transaction-enabling system having a fleet of machines that automatically aggregate data on collective optimization of spot market purchases of network spectrum and having a distributed ledger that tokenizes an instruction set for a polymer production process, such that operation on the distributed ledger provides provable access to the instruction set. In embodiments, provided herein is a transaction-enabling system having a fleet of machines that automatically aggregate data on collective optimization of spot market purchases of network spectrum and having a distributed ledger that tokenizes an instruction set for chemical synthesis process, such that operation on the distributed ledger provides provable access to the instruction set. In embodiments, provided herein is a transaction-enabling system having a fleet of machines that automatically aggregate data on collective optimization of spot market purchases of network spectrum and having a distributed ledger that tokenizes an instruction set for a biological production process, such that operation on the distributed ledger provides provable access to the instruction set. In embodiments, provided herein is a transaction-enabling system having a fleet of machines that automatically aggregate data on collective optimization of spot market purchases of network spectrum and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically aggregate data on collective optimization of spot market purchases of network spectrum and having a distributed ledger that aggregates views of a trade secret into a chain that proves which and how many parties have viewed the trade secret. In embodiments, provided herein is a transaction-enabling system having a fleet of machines that automatically aggregate data on collective optimization of spot market purchases of network spectrum and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically aggregate data on collective optimization of spot market purchases of network spectrum and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically aggregate data on collective optimization of spot market purchases of network spectrum and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically aggregate data on collective optimization of spot market purchases of network spectrum and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically aggregate data on collective optimization of spot market purchases of network spectrum and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically aggregate data on collective optimization of spot market purchases of network spectrum and having a self-executing cryptocurrency coin that commits a transaction upon recognizing a location-based parameter that provides favorable tax treatment. In embodiments, provided herein is a transaction-enabling system having a fleet of machines that automatically aggregate data on collective optimization of spot market purchases of network spectrum and having an expert system that uses machine learning to optimize the execution of cryptocurrency transactions based on tax status. In embodiments, provided herein is a transaction-enabling system having a fleet of machines that automatically aggregate data on collective optimization of spot market purchases of network spectrum and having an expert system that aggregates regulatory information covering cryptocurrency transactions and automatically selects a jurisdiction for an operation based on the regulatory information. In embodiments, provided herein is a transaction-enabling system having a fleet of machines that automatically aggregate data on collective optimization of spot market purchases of network spectrum and having an expert system that uses machine learning to optimize the execution of a cryptocurrency transaction based on real time energy price information for an available energy source. In embodiments, provided herein is a transaction-enabling system having a fleet of machines that automatically aggregate data on collective optimization of spot market purchases of network spectrum and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically aggregate data on collective optimization of spot market purchases of network spectrum and having an expert system that uses machine learning to optimize charging and recharging cycle of a rechargeable battery system to provide energy for execution of a cryptocurrency transaction. In embodiments, provided herein is a transaction-enabling system having a fleet of machines that automatically aggregate data on collective optimization of spot market purchases of network spectrum and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of network spectrum and having an expert system that predicts a forward market price in a market based on an understanding obtained by analyzing social network data sources and executes a transaction based on the forward market prediction. In embodiments, provided herein is a transaction-enabling system having a fleet of machines that automatically aggregate data on collective optimization of spot market purchases of network spectrum and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically aggregate data on collective optimization of spot market purchases of network spectrum and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically aggregate data on collective optimization of spot market purchases of network spectrum and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of network spectrum and having an expert system that predicts a forward market price in an energy market based on an understanding obtained by analyzing social network data sources and executes a transaction based on the forward market prediction. In embodiments, provided herein is a transaction-enabling system having a fleet of machines that automatically aggregate data on collective optimization of spot market purchases of network spectrum and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of network spectrum and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of network spectrum and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically aggregate data on collective optimization of spot market purchases of network spectrum and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically aggregate data on collective optimization of spot market purchases of network spectrum and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically aggregate data on collective optimization of spot market purchases of network spectrum and having a machine that automatically forecasts forward market pricing of energy prices based on information collected from automated agent behavioral data sources. In embodiments, provided herein is a transaction-enabling system having a fleet of machines that automatically aggregate data on collective optimization of spot market purchases of network spectrum and having a machine that automatically forecasts forward market pricing of network spectrum based on information collected from automated agent behavioral data sources. In embodiments, provided herein is a transaction-enabling system having a fleet of machines that automatically aggregate data on collective optimization of spot market purchases of network spectrum and having a machine that automatically forecasts forward market pricing of energy credits based on information collected from automated agent behavioral data sources. In embodiments, provided herein is a transaction-enabling system having a fleet of machines that automatically aggregate data on collective optimization of spot market purchases of network spectrum and having a machine that automatically forecasts forward market value of compute capability based on information collected from automated agent behavioral data sources. In embodiments, provided herein is a transaction-enabling system having a fleet of machines that automatically aggregate data on collective optimization of spot market purchases of network spectrum and having a machine that automatically forecasts forward market pricing of energy prices based on information collected from business entity behavioral data sources. In embodiments, provided herein is a transaction-enabling system having a fleet of machines that automatically aggregate data on collective optimization of spot market purchases of network spectrum and having a machine that automatically forecasts forward market pricing of network spectrum based on information collected from business entity behavioral data sources. In embodiments, provided herein is a transaction-enabling system having a fleet of machines that automatically aggregate data on collective optimization of spot market purchases of network spectrum and having a machine that automatically forecasts forward market pricing of energy credits based on information collected from business entity behavioral data sources. In embodiments, provided herein is a transaction-enabling system having a fleet of machines that automatically aggregate data on collective optimization of spot market purchases of network spectrum and having a machine that automatically forecasts forward market value of compute capability based on information collected from business entity behavioral data sources. In embodiments, provided herein is a transaction-enabling system having a fleet of machines that automatically aggregate data on collective optimization of spot market purchases of network spectrum and having a machine that automatically forecasts forward market pricing of energy prices based on information collected from human behavioral data sources. In embodiments, provided herein is a transaction-enabling system having a fleet of machines that automatically aggregate data on collective optimization of spot market purchases of network spectrum and having a machine that automatically forecasts forward market pricing of network spectrum based on information collected from human behavioral data sources. In embodiments, provided herein is a transaction-enabling system having a fleet of machines that automatically aggregate data on collective optimization of spot market purchases of network spectrum and having a machine that automatically forecasts forward market pricing of energy credits based on information collected from human behavioral data sources. In embodiments, provided herein is a transaction-enabling system having a fleet of machines that automatically aggregate data on collective optimization of spot market purchases of network spectrum and having a machine that automatically forecasts forward market value of compute capability based on information collected from human behavioral data sources. In embodiments, provided herein is a transaction-enabling system having a fleet of machines that automatically aggregate data on collective optimization of spot market purchases of network spectrum and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically aggregate data on collective optimization of spot market purchases of network spectrum and having an intelligent agent that is configured to solicit the attention resources of another external intelligent agent. In embodiments, provided herein is a transaction-enabling system having a fleet of machines that automatically aggregate data on collective optimization of spot market purchases of network spectrum and having a machine that automatically purchases attention resources in a forward market for attention. In embodiments, provided herein is a transaction-enabling system having a fleet of machines that automatically aggregate data on collective optimization of spot market purchases of network spectrum and having a fleet of machines that automatically aggregate purchasing in a forward market for attention. In embodiments, provided herein is a transaction-enabling system having a fleet of machines that automatically aggregate data on collective optimization of spot market purchases of network spectrum and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically aggregate data on collective optimization of spot market purchases of network spectrum and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically aggregate data on collective optimization of spot market purchases of network spectrum and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically aggregate data on collective optimization of spot market purchases of network spectrum and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically aggregate data on collective optimization of spot market purchases of network spectrum and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically aggregate data on collective optimization of spot market purchases of network spectrum and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically aggregate data on collective optimization of spot market purchases of network spectrum and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically aggregate data on collective optimization of spot market purchases of network spectrum and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically aggregate data on collective optimization of spot market purchases of network spectrum and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically aggregate data on collective optimization of spot market purchases of network spectrum and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically aggregate data on collective optimization of spot market purchases of network spectrum and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically aggregate data on collective optimization of spot market purchases of network spectrum and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically aggregate data on collective optimization of spot market purchases of network spectrum and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically aggregate data on collective optimization of spot market purchases of network spectrum and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically sell their aggregate compute capacity on a forward market for compute capacity. In embodiments, provided herein is a transaction-enabling system having a fleet of machines that automatically sell their aggregate compute capacity on a forward market for compute capacity and having a fleet of machines that automatically sell their aggregate compute storage capacity on a forward market for storage capacity. In embodiments, provided herein is a transaction-enabling system having a fleet of machines that automatically sell their aggregate compute capacity on a forward market for compute capacity and having a fleet of machines that automatically sell their aggregate energy storage capacity on a forward market for energy storage capacity. In embodiments, provided herein is a transaction-enabling system having a fleet of machines that automatically sell their aggregate compute capacity on a forward market for compute capacity and having a fleet of machines that automatically sell their aggregate network bandwidth on a forward market for network capacity. In embodiments, provided herein is a transaction-enabling system having a fleet of machines that automatically sell their aggregate compute capacity on a forward market for compute capacity and having a machine that automatically forecasts forward market pricing of energy prices based on information collected from social media data sources. In embodiments, provided herein is a transaction-enabling system having a fleet of machines that automatically sell their aggregate compute capacity on a forward market for compute capacity and having a machine that automatically forecasts forward market pricing of network spectrum based on information collected from social media data sources. In embodiments, provided herein is a transaction-enabling system having a fleet of machines that automatically sell their aggregate compute capacity on a forward market for compute capacity and having a machine that automatically forecasts forward market pricing of energy credits based on information collected from social media data sources. In embodiments, provided herein is a transaction-enabling system having a fleet of machines that automatically sell their aggregate compute capacity on a forward market for compute capacity and having a machine that automatically forecasts forward market value of compute capability based on information collected from social media data sources. In embodiments, provided herein is a transaction-enabling system having a fleet of machines that automatically sell their aggregate compute capacity on a forward market for compute capacity and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically sell their aggregate compute capacity on a forward market for compute capacity and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically sell their aggregate compute capacity on a forward market for compute capacity and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically sell their aggregate compute capacity on a forward market for compute capacity and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically sell their aggregate compute capacity on a forward market for compute capacity and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically sell their aggregate compute capacity on a forward market for compute capacity and having a machine that automatically allocates its energy capacity among a core task, a compute task, an energy storage task, a data storage task, and a networking task. In embodiments, provided herein is a transaction-enabling system having a fleet of machines that automatically sell their aggregate compute capacity on a forward market for compute capacity and having a machine that automatically allocates its compute capacity among a core task, a compute task, an energy storage task, a data storage task, and a networking task. In embodiments, provided herein is a transaction-enabling system having a fleet of machines that automatically sell their aggregate compute capacity on a forward market for compute capacity and having a machine that automatically allocates its networking capacity among a core task, a compute task, an energy storage task, a data storage task, and a networking task. In embodiments, provided herein is a transaction-enabling system having a fleet of machines that automatically sell their aggregate compute capacity on a forward market for compute capacity and having a fleet of machines that automatically allocate collective energy capacity among a core task, a compute task, an energy storage task, a data storage task, and a networking task. In embodiments, provided herein is a transaction-enabling system having a fleet of machines that automatically sell their aggregate compute capacity on a forward market for compute capacity and having a fleet of machines that automatically allocate collective compute capacity among a core task, a compute task, an energy storage task, a data storage task, and a networking task. In embodiments, provided herein is a transaction-enabling system having a fleet of machines that automatically sell their aggregate compute capacity on a forward market for compute capacity and having a fleet of machines that automatically allocate collective networking capacity among a core task, a compute task, an energy storage task, a data storage task, and a networking task. In embodiments, provided herein is a transaction-enabling system having a fleet of machines that automatically sell their aggregate compute capacity on a forward market for compute capacity and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically sell their aggregate compute capacity on a forward market for compute capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically sell their aggregate compute capacity on a forward market for compute capacity and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically sell their aggregate compute capacity on a forward market for compute capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically sell their aggregate compute capacity on a forward market for compute capacity and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically sell their aggregate compute capacity on a forward market for compute capacity and having a distributed ledger that tokenizes an instruction set, such that operation on the distributed ledger provides provable access to the instruction set. In embodiments, provided herein is a transaction-enabling system having a fleet of machines that automatically sell their aggregate compute capacity on a forward market for compute capacity and having a distributed ledger that tokenizes executable algorithmic logic, such that operation on the distributed ledger provides provable access to the executable algorithmic logic. In embodiments, provided herein is a transaction-enabling system having a fleet of machines that automatically sell their aggregate compute capacity on a forward market for compute capacity and having a distributed ledger that tokenizes a 3D printer instruction set, such that operation on the distributed ledger provides provable access to the instruction set. In embodiments, provided herein is a transaction-enabling system having a fleet of machines that automatically sell their aggregate compute capacity on a forward market for compute capacity and having a distributed ledger that tokenizes an instruction set for a coating process, such that operation on the distributed ledger provides provable access to the instruction set. In embodiments, provided herein is a transaction-enabling system having a fleet of machines that automatically sell their aggregate compute capacity on a forward market for compute capacity and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically sell their aggregate compute capacity on a forward market for compute capacity and having a distributed ledger that tokenizes a firmware program, such that operation on the distributed ledger provides provable access to the firmware program. In embodiments, provided herein is a transaction-enabling system having a fleet of machines that automatically sell their aggregate compute capacity on a forward market for compute capacity and having a distributed ledger that tokenizes an instruction set for an FPGA, such that operation on the distributed ledger provides provable access to the FPGA. In embodiments, provided herein is a transaction-enabling system having a fleet of machines that automatically sell their aggregate compute capacity on a forward market for compute capacity and having a distributed ledger that tokenizes serverless code logic, such that operation on the distributed ledger provides provable access to the serverless code logic. In embodiments, provided herein is a transaction-enabling system having a fleet of machines that automatically sell their aggregate compute capacity on a forward market for compute capacity and having a distributed ledger that tokenizes an instruction set for a crystal fabrication system, such that operation on the distributed ledger provides provable access to the instruction set. In embodiments, provided herein is a transaction-enabling system having a fleet of machines that automatically sell their aggregate compute capacity on a forward market for compute capacity and having a distributed ledger that tokenizes an instruction set for a food preparation process, such that operation on the distributed ledger provides provable access to the instruction set. In embodiments, provided herein is a transaction-enabling system having a fleet of machines that automatically sell their aggregate compute capacity on a forward market for compute capacity and having a distributed ledger that tokenizes an instruction set for a polymer production process, such that operation on the distributed ledger provides provable access to the instruction set. In embodiments, provided herein is a transaction-enabling system having a fleet of machines that automatically sell their aggregate compute capacity on a forward market for compute capacity and having a distributed ledger that tokenizes an instruction set for chemical synthesis process, such that operation on the distributed ledger provides provable access to the instruction set. In embodiments, provided herein is a transaction-enabling system having a fleet of machines that automatically sell their aggregate compute capacity on a forward market for compute capacity and having a distributed ledger that tokenizes an instruction set for a biological production process, such that operation on the distributed ledger provides provable access to the instruction set. In embodiments, provided herein is a transaction-enabling system having a fleet of machines that automatically sell their aggregate compute capacity on a forward market for compute capacity and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically sell their aggregate compute capacity on a forward market for compute capacity and having a distributed ledger that aggregates views of a trade secret into a chain that proves which and how many parties have viewed the trade secret. In embodiments, provided herein is a transaction-enabling system having a fleet of machines that automatically sell their aggregate compute capacity on a forward market for compute capacity and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically sell their aggregate compute capacity on a forward market for compute capacity and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically sell their aggregate compute capacity on a forward market for compute capacity and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically sell their aggregate compute capacity on a forward market for compute capacity and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically sell their aggregate compute capacity on a forward market for compute capacity and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically sell their aggregate compute capacity on a forward market for compute capacity and having a self-executing cryptocurrency coin that commits a transaction upon recognizing a location-based parameter that provides favorable tax treatment. In embodiments, provided herein is a transaction-enabling system having a fleet of machines that automatically sell their aggregate compute capacity on a forward market for compute capacity and having an expert system that uses machine learning to optimize the execution of cryptocurrency transactions based on tax status. In embodiments, provided herein is a transaction-enabling system having a fleet of machines that automatically sell their aggregate compute capacity on a forward market for compute capacity and having an expert system that aggregates regulatory information covering cryptocurrency transactions and automatically selects a jurisdiction for an operation based on the regulatory information. In embodiments, provided herein is a transaction-enabling system having a fleet of machines that automatically sell their aggregate compute capacity on a forward market for compute capacity and having an expert system that uses machine learning to optimize the execution of a cryptocurrency transaction based on real time energy price information for an available energy source. In embodiments, provided herein is a transaction-enabling system having a fleet of machines that automatically sell their aggregate compute capacity on a forward market for compute capacity and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically sell their aggregate compute capacity on a forward market for compute capacity and having an expert system that uses machine learning to optimize charging and recharging cycle of a rechargeable battery system to provide energy for execution of a cryptocurrency transaction. In embodiments, provided herein is a transaction-enabling system having a fleet of machines that automatically sell their aggregate compute capacity on a forward market for compute capacity and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically sell their aggregate compute capacity on a forward market for compute capacity and having an expert system that predicts a forward market price in a market based on an understanding obtained by analyzing social network data sources and executes a transaction based on the forward market prediction. In embodiments, provided herein is a transaction-enabling system having a fleet of machines that automatically sell their aggregate compute capacity on a forward market for compute capacity and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically sell their aggregate compute capacity on a forward market for compute capacity and having an expert system that predicts a forward market price in a market based on an understanding obtained by analyzing social network data sources and executes a cryptocurrency transaction based on the forward market prediction. In embodiments, automatically sell their aggregate compute capacity on a forward market for compute capacity and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically sell their aggregate compute capacity on a forward market for compute capacity and having an expert system that predicts a forward market price in an energy market based on an understanding obtained by analyzing social network data sources and executes a transaction based on the forward market prediction. In embodiments, provided herein is a transaction-enabling system having a fleet of machines that automatically sell their aggregate compute capacity on a forward market for compute capacity and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically sell their aggregate compute capacity on a forward market for compute capacity and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically sell their aggregate compute capacity on a forward market for compute capacity and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically sell their aggregate compute capacity on a forward market for compute capacity and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically sell their aggregate compute capacity on a forward market for compute capacity and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically sell their aggregate compute capacity on a forward market for compute capacity and having a machine that automatically forecasts forward market pricing of energy prices based on information collected from automated agent behavioral data sources. In embodiments, provided herein is a transaction-enabling system having a fleet of machines that automatically sell their aggregate compute capacity on a forward market for compute capacity and having a machine that automatically forecasts forward market pricing of network spectrum based on information collected from automated agent behavioral data sources. In embodiments, provided herein is a transaction-enabling system having a fleet of machines that automatically sell their aggregate compute capacity on a forward market for compute capacity and having a machine that automatically forecasts forward market pricing of energy credits based on information collected from automated agent behavioral data sources. In embodiments, provided herein is a transaction-enabling system having a fleet of machines that automatically sell their aggregate compute capacity on a forward market for compute capacity and having a machine that automatically forecasts forward market value of compute capability based on information collected from automated agent behavioral data sources. In embodiments, provided herein is a transaction-enabling system having a fleet of machines that automatically sell their aggregate compute capacity on a forward market for compute capacity and having a machine that automatically forecasts forward market pricing of energy prices based on information collected from business entity behavioral data sources. In embodiments, provided herein is a transaction-enabling system having a fleet of machines that automatically sell their aggregate compute capacity on a forward market for compute capacity and having a machine that automatically forecasts forward market pricing of network spectrum based on information collected from business entity behavioral data sources. In embodiments, provided herein is a transaction-enabling system having a fleet of machines that automatically sell their aggregate compute capacity on a forward market for compute capacity and having a machine that automatically forecasts forward market pricing of energy credits based on information collected from business entity behavioral data sources. In embodiments, provided herein is a transaction-enabling system having a fleet of machines that automatically sell their aggregate compute capacity on a forward market for compute capacity and having a machine that automatically forecasts forward market value of compute capability based on information collected from business entity behavioral data sources. In embodiments, provided herein is a transaction-enabling system having a fleet of machines that automatically sell their aggregate compute capacity on a forward market for compute capacity and having a machine that automatically forecasts forward market pricing of energy prices based on information collected from human behavioral data sources. In embodiments, provided herein is a transaction-enabling system having a fleet of machines that automatically sell their aggregate compute capacity on a forward market for compute capacity and having a machine that automatically forecasts forward market pricing of network spectrum based on information collected from human behavioral data sources. In embodiments, provided herein is a transaction-enabling system having a fleet of machines that automatically sell their aggregate compute capacity on a forward market for compute capacity and having a machine that automatically forecasts forward market pricing of energy credits based on information collected from human behavioral data sources. In embodiments, provided herein is a transaction-enabling system having a fleet of machines that automatically sell their aggregate compute capacity on a forward market for compute capacity and having a machine that automatically forecasts forward market value of compute capability based on information collected from human behavioral data sources. In embodiments, provided herein is a transaction-enabling system having a fleet of machines that automatically sell their aggregate compute capacity on a forward market for compute capacity and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically sell their aggregate compute capacity on a forward market for compute capacity and having an intelligent agent that is configured to solicit the attention resources of another external intelligent agent. In embodiments, provided herein is a transaction-enabling system having a fleet of machines that automatically sell their aggregate compute capacity on a forward market for compute capacity and having a machine that automatically purchases attention resources in a forward market for attention. In embodiments, provided herein is a transaction-enabling system having a fleet of machines that automatically sell their aggregate compute capacity on a forward market for compute capacity and having a fleet of machines that automatically aggregate purchasing in a forward market for attention. In embodiments, provided herein is a transaction-enabling system having a fleet of machines that automatically sell their aggregate compute capacity on a forward market for compute capacity and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically sell their aggregate compute capacity on a forward market for compute capacity and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically sell their aggregate compute capacity on a forward market for compute capacity and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically sell their aggregate compute capacity on a forward market for compute capacity and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically sell their aggregate compute capacity on a forward market for compute capacity and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically sell their aggregate compute capacity on a forward market for compute capacity and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically sell their aggregate compute capacity on a forward market for compute capacity and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically sell their aggregate compute capacity on a forward market for compute capacity and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically sell their aggregate compute capacity on a forward market for compute capacity and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically sell their aggregate compute capacity on a forward market for compute capacity and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically sell their aggregate compute capacity on a forward market for compute capacity and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically sell their aggregate compute capacity on a forward market for compute capacity and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically sell their aggregate compute capacity on a forward market for compute capacity and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically sell their aggregate compute capacity on a forward market for compute capacity and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically sell their aggregate compute storage capacity on a forward market for storage capacity. In embodiments, provided herein is a transaction-enabling system having a fleet of machines that automatically sell their aggregate compute storage capacity on a forward market for storage capacity and having a fleet of machines that automatically sell their aggregate energy storage capacity on a forward market for energy storage capacity. In embodiments, provided herein is a transaction-enabling system having a fleet of machines that automatically sell their aggregate compute storage capacity on a forward market for storage capacity and having a fleet of machines that automatically sell their aggregate network bandwidth on a forward market for network capacity. In embodiments, provided herein is a transaction-enabling system having a fleet of machines that automatically sell their aggregate compute storage capacity on a forward market for storage capacity and having a machine that automatically forecasts forward market pricing of energy prices based on information collected from social media data sources. In embodiments, provided herein is a transaction-enabling system having a fleet of machines that automatically sell their aggregate compute storage capacity on a forward market for storage capacity and having a machine that automatically forecasts forward market pricing of network spectrum based on information collected from social media data sources. In embodiments, provided herein is a transaction-enabling system having a fleet of machines that automatically sell their aggregate compute storage capacity on a forward market for storage capacity and having a machine that automatically forecasts forward market pricing of energy credits based on information collected from social media data sources. In embodiments, provided herein is a transaction-enabling system having a fleet of machines that automatically sell their aggregate compute storage capacity on a forward market for storage capacity and having a machine that automatically forecasts forward market value of compute capability based on information collected from social media data sources. In embodiments, provided herein is a transaction-enabling system having a fleet of machines that automatically sell their aggregate compute storage capacity on a forward market for storage capacity and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically sell their aggregate compute storage capacity on a forward market for storage capacity and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically sell their aggregate compute storage capacity on a forward market for storage capacity and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically sell their aggregate compute storage capacity on a forward market for storage capacity and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically sell their aggregate compute storage capacity on a forward market for storage capacity and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically sell their aggregate compute storage capacity on a forward market for storage capacity and having a machine that automatically allocates its energy capacity among a core task, a compute task, an energy storage task, a data storage task, and a networking task. In embodiments, provided herein is a transaction-enabling system having a fleet of machines that automatically sell their aggregate compute storage capacity on a forward market for storage capacity and having a machine that automatically allocates its compute capacity among a core task, a compute task, an energy storage task, a data storage task, and a networking task. In embodiments, provided herein is a transaction-enabling system having a fleet of machines that automatically sell their aggregate compute storage capacity on a forward market for storage capacity and having a machine that automatically allocates its networking capacity among a core task, a compute task, an energy storage task, a data storage task, and a networking task. In embodiments, provided herein is a transaction-enabling system having a fleet of machines that automatically sell their aggregate compute storage capacity on a forward market for storage capacity and having a fleet of machines that automatically allocate collective energy capacity among a core task, a compute task, an energy storage task, a data storage task, and a networking task. In embodiments, provided herein is a transaction-enabling system having a fleet of machines that automatically sell their aggregate compute storage capacity on a forward market for storage capacity and having a fleet of machines that automatically allocate collective compute capacity among a core task, a compute task, an energy storage task, a data storage task, and a networking task. In embodiments, provided herein is a transaction-enabling system having a fleet of machines that automatically sell their aggregate compute storage capacity on a forward market for storage capacity and having a fleet of machines that automatically allocate collective networking capacity among a core task, a compute task, an energy storage task, a data storage task, and a networking task. In embodiments, provided herein is a transaction-enabling system having a fleet of machines that automatically sell their aggregate compute storage capacity on a forward market for storage capacity and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically sell their aggregate compute storage capacity on a forward market for storage capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically sell their aggregate compute storage capacity on a forward market for storage capacity and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically sell their aggregate compute storage capacity on a forward market for storage capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically sell their aggregate compute storage capacity on a forward market for storage capacity and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically sell their aggregate compute storage capacity on a forward market for storage capacity and having a distributed ledger that tokenizes an instruction set, such that operation on the distributed ledger provides provable access to the instruction set. In embodiments, provided herein is a transaction-enabling system having a fleet of machines that automatically sell their aggregate compute storage capacity on a forward market for storage capacity and having a distributed ledger that tokenizes executable algorithmic logic, such that operation on the distributed ledger provides provable access to the executable algorithmic logic. In embodiments, provided herein is a transaction-enabling system having a fleet of machines that automatically sell their aggregate compute storage capacity on a forward market for storage capacity and having a distributed ledger that tokenizes a 3D printer instruction set, such that operation on the distributed ledger provides provable access to the instruction set. In embodiments, provided herein is a transaction-enabling system having a fleet of machines that automatically sell their aggregate compute storage capacity on a forward market for storage capacity and having a distributed ledger that tokenizes an instruction set for a coating process, such that operation on the distributed ledger provides provable access to the instruction set. In embodiments, provided herein is a transaction-enabling system having a fleet of machines that automatically sell their aggregate compute storage capacity on a forward market for storage capacity and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically sell their aggregate compute storage capacity on a forward market for storage capacity and having a distributed ledger that tokenizes a firmware program, such that operation on the distributed ledger provides provable access to the firmware program. In embodiments, provided herein is a transaction-enabling system having a fleet of machines that automatically sell their aggregate compute storage capacity on a forward market for storage capacity and having a distributed ledger that tokenizes an instruction set for an FPGA, such that operation on the distributed ledger provides provable access to the FPGA. In embodiments, provided herein is a transaction-enabling system having a fleet of machines that automatically sell their aggregate compute storage capacity on a forward market for storage capacity and having a distributed ledger that tokenizes serverless code logic, such that operation on the distributed ledger provides provable access to the serverless code logic. In embodiments, provided herein is a transaction-enabling system having a fleet of machines that automatically sell their aggregate compute storage capacity on a forward market for storage capacity and having a distributed ledger that tokenizes an instruction set for a crystal fabrication system, such that operation on the distributed ledger provides provable access to the instruction set. In embodiments, provided herein is a transaction-enabling system having a fleet of machines that automatically sell their aggregate compute storage capacity on a forward market for storage capacity and having a distributed ledger that tokenizes an instruction set for a food preparation process, such that operation on the distributed ledger provides provable access to the instruction set. In embodiments, provided herein is a transaction-enabling system having a fleet of machines that automatically sell their aggregate compute storage capacity on a forward market for storage capacity and having a distributed ledger that tokenizes an instruction set for a polymer production process, such that operation on the distributed ledger provides provable access to the instruction set. In embodiments, provided herein is a transaction-enabling system having a fleet of machines that automatically sell their aggregate compute storage capacity on a forward market for storage capacity and having a distributed ledger that tokenizes an instruction set for chemical synthesis process, such that operation on the distributed ledger provides provable access to the instruction set. In embodiments, provided herein is a transaction-enabling system having a fleet of machines that automatically sell their aggregate compute storage capacity on a forward market for storage capacity and having a distributed ledger that tokenizes an instruction set for a biological production process, such that operation on the distributed ledger provides provable access to the instruction set. In embodiments, provided herein is a transaction-enabling system having a fleet of machines that automatically sell their aggregate compute storage capacity on a forward market for storage capacity and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically sell their aggregate compute storage capacity on a forward market for storage capacity and having a distributed ledger that aggregates views of a trade secret into a chain that proves which and how many parties have viewed the trade secret. In embodiments, provided herein is a transaction-enabling system having a fleet of machines that automatically sell their aggregate compute storage capacity on a forward market for storage capacity and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically sell their aggregate compute storage capacity on a forward market for storage capacity and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically sell their aggregate compute storage capacity on a forward market for storage capacity and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically sell their aggregate compute storage capacity on a forward market for storage capacity and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically sell their aggregate compute storage capacity on a forward market for storage capacity and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically sell their aggregate compute storage capacity on a forward market for storage capacity and having a self-executing cryptocurrency coin that commits a transaction upon recognizing a location-based parameter that provides favorable tax treatment. In embodiments, provided herein is a transaction-enabling system having a fleet of machines that automatically sell their aggregate compute storage capacity on a forward market for storage capacity and having an expert system that uses machine learning to optimize the execution of cryptocurrency transactions based on tax status. In embodiments, provided herein is a transaction-enabling system having a fleet of machines that automatically sell their aggregate compute storage capacity on a forward market for storage capacity and having an expert system that aggregates regulatory information covering cryptocurrency transactions and automatically selects a jurisdiction for an operation based on the regulatory information. In embodiments, provided herein is a transaction-enabling system having a fleet of machines that automatically sell their aggregate compute storage capacity on a forward market for storage capacity and having an expert system that uses machine learning to optimize the execution of a cryptocurrency transaction based on real time energy price information for an available energy source. In embodiments, provided herein is a transaction-enabling system having a fleet of machines that automatically sell their aggregate compute storage capacity on a forward market for storage capacity and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically sell their aggregate compute storage capacity on a forward market for storage capacity and having an expert system that uses machine learning to optimize charging and recharging cycle of a rechargeable battery system to provide energy for execution of a cryptocurrency transaction. In embodiments, provided herein is a transaction-enabling system having a fleet of machines that automatically sell their aggregate compute storage capacity on a forward market for storage capacity and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically sell their aggregate compute storage capacity on a forward market for storage capacity and having an expert system that predicts a forward market price in a market based on an understanding obtained by analyzing social network data sources and executes a transaction based on the forward market prediction. In embodiments, provided herein is a transaction-enabling system having a fleet of machines that automatically sell their aggregate compute storage capacity on a forward market for storage capacity and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically sell their aggregate compute storage capacity on a forward market for storage capacity and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically sell their aggregate compute storage capacity on a forward market for storage capacity and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically sell their aggregate compute storage capacity on a forward market for storage capacity and having an expert system that predicts a forward market price in an energy market based on an understanding obtained by analyzing social network data sources and executes a transaction based on the forward market prediction. In embodiments, provided herein is a transaction-enabling system having a fleet of machines that automatically sell their aggregate compute storage capacity on a forward market for storage capacity and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically sell their aggregate compute storage capacity on a forward market for storage capacity and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically sell their aggregate compute storage capacity on a forward market for storage capacity and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically sell their aggregate compute storage capacity on a forward market for storage capacity and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically sell their aggregate compute storage capacity on a forward market for storage capacity and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically sell their aggregate compute storage capacity on a forward market for storage capacity and having a machine that automatically forecasts forward market pricing of energy prices based on information collected from automated agent behavioral data sources. In embodiments, provided herein is a transaction-enabling system having a fleet of machines that automatically sell their aggregate compute storage capacity on a forward market for storage capacity and having a machine that automatically forecasts forward market pricing of network spectrum based on information collected from automated agent behavioral data sources. In embodiments, provided herein is a transaction-enabling system having a fleet of machines that automatically sell their aggregate compute storage capacity on a forward market for storage capacity and having a machine that automatically forecasts forward market pricing of energy credits based on information collected from automated agent behavioral data sources. In embodiments, provided herein is a transaction-enabling system having a fleet of machines that automatically sell their aggregate compute storage capacity on a forward market for storage capacity and having a machine that automatically forecasts forward market value of compute capability based on information collected from automated agent behavioral data sources. In embodiments, provided herein is a transaction-enabling system having a fleet of machines that automatically sell their aggregate compute storage capacity on a forward market for storage capacity and having a machine that automatically forecasts forward market pricing of energy prices based on information collected from business entity behavioral data sources. In embodiments, provided herein is a transaction-enabling system having a fleet of machines that automatically sell their aggregate compute storage capacity on a forward market for storage capacity and having a machine that automatically forecasts forward market pricing of network spectrum based on information collected from business entity behavioral data sources. In embodiments, provided herein is a transaction-enabling system having a fleet of machines that automatically sell their aggregate compute storage capacity on a forward market for storage capacity and having a machine that automatically forecasts forward market pricing of energy credits based on information collected from business entity behavioral data sources. In embodiments, provided herein is a transaction-enabling system having a fleet of machines that automatically sell their aggregate compute storage capacity on a forward market for storage capacity and having a machine that automatically forecasts forward market value of compute capability based on information collected from business entity behavioral data sources. In embodiments, provided herein is a transaction-enabling system having a fleet of machines that automatically sell their aggregate compute storage capacity on a forward market for storage capacity and having a machine that automatically forecasts forward market pricing of energy prices based on information collected from human behavioral data sources. In embodiments, provided herein is a transaction-enabling system having a fleet of machines that automatically sell their aggregate compute storage capacity on a forward market for storage capacity and having a machine that automatically forecasts forward market pricing of network spectrum based on information collected from human behavioral data sources. In embodiments, provided herein is a transaction-enabling system having a fleet of machines that automatically sell their aggregate compute storage capacity on a forward market for storage capacity and having a machine that automatically forecasts forward market pricing of energy credits based on information collected from human behavioral data sources. In embodiments, provided herein is a transaction-enabling system having a fleet of machines that automatically sell their aggregate compute storage capacity on a forward market for storage capacity and having a machine that automatically forecasts forward market value of compute capability based on information collected from human behavioral data sources. In embodiments, provided herein is a transaction-enabling system having a fleet of machines that automatically sell their aggregate compute storage capacity on a forward market for storage capacity and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically sell their aggregate compute storage capacity on a forward market for storage capacity and having an intelligent agent that is configured to solicit the attention resources of another external intelligent agent. In embodiments, provided herein is a transaction-enabling system having a fleet of machines that automatically sell their aggregate compute storage capacity on a forward market for storage capacity and having a machine that automatically purchases attention resources in a forward market for attention. In embodiments, provided herein is a transaction-enabling system having a fleet of machines that automatically sell their aggregate compute storage capacity on a forward market for storage capacity and having a fleet of machines that automatically aggregate purchasing in a forward market for attention. In embodiments, provided herein is a transaction-enabling system having a fleet of machines that automatically sell their aggregate compute storage capacity on a forward market for storage capacity and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically sell their aggregate compute storage capacity on a forward market for storage capacity and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically sell their aggregate compute storage capacity on a forward market for storage capacity and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically sell their aggregate compute storage capacity on a forward market for storage capacity and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically sell their aggregate compute storage capacity on a forward market for storage capacity and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically sell their aggregate compute storage capacity on a forward market for storage capacity and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically sell their aggregate compute storage capacity on a forward market for storage capacity and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically sell their aggregate compute storage capacity on a forward market for storage capacity and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically sell their aggregate compute storage capacity on a forward market for storage capacity and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically sell their aggregate compute storage capacity on a forward market for storage capacity and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically sell their aggregate compute storage capacity on a forward market for storage capacity and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically sell their aggregate compute storage capacity on a forward market for storage capacity and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically sell their aggregate compute storage capacity on a forward market for storage capacity and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically sell their aggregate compute storage capacity on a forward market for storage capacity and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically sell their aggregate energy storage capacity on a forward market for energy storage capacity. In embodiments, provided herein is a transaction-enabling system having a fleet of machines that automatically sell their aggregate energy storage capacity on a forward market for energy storage capacity and having a fleet of machines that automatically sell their aggregate network bandwidth on a forward market for network capacity. In embodiments, provided herein is a transaction-enabling system having a fleet of machines that automatically sell their aggregate energy storage capacity on a forward market for energy storage capacity and having a machine that automatically forecasts forward market pricing of energy prices based on information collected from social media data sources. In embodiments, provided herein is a transaction-enabling system having a fleet of machines that automatically sell their aggregate energy storage capacity on a forward market for energy storage capacity and having a machine that automatically forecasts forward market pricing of network spectrum based on information collected from social media data sources. In embodiments, provided herein is a transaction-enabling system having a fleet of machines that automatically sell their aggregate energy storage capacity on a forward market for energy storage capacity and having a machine that automatically forecasts forward market pricing of energy credits based on information collected from social media data sources. In embodiments, provided herein is a transaction-enabling system having a fleet of machines that automatically sell their aggregate energy storage capacity on a forward market for energy storage capacity and having a machine that automatically forecasts forward market value of compute capability based on information collected from social media data sources. In embodiments, provided herein is a transaction-enabling system having a fleet of machines that automatically sell their aggregate energy storage capacity on a forward market for energy storage capacity and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically sell their aggregate energy storage capacity on a forward market for energy storage capacity and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically sell their aggregate energy storage capacity on a forward market for energy storage capacity and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically sell their aggregate energy storage capacity on a forward market for energy storage capacity and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically sell their aggregate energy storage capacity on a forward market for energy storage capacity and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically sell their aggregate energy storage capacity on a forward market for energy storage capacity and having a machine that automatically allocates its energy capacity among a core task, a compute task, an energy storage task, a data storage task, and a networking task. In embodiments, provided herein is a transaction-enabling system having a fleet of machines that automatically sell their aggregate energy storage capacity on a forward market for energy storage capacity and having a machine that automatically allocates its compute capacity among a core task, a compute task, an energy storage task, a data storage task, and a networking task. In embodiments, provided herein is a transaction-enabling system having a fleet of machines that automatically sell their aggregate energy storage capacity on a forward market for energy storage capacity and having a machine that automatically allocates its networking capacity among a core task, a compute task, an energy storage task, a data storage task, and a networking task. In embodiments, provided herein is a transaction-enabling system having a fleet of machines that automatically sell their aggregate energy storage capacity on a forward market for energy storage capacity and having a fleet of machines that automatically allocate collective energy capacity among a core task, a compute task, an energy storage task, a data storage task, and a networking task. In embodiments, provided herein is a transaction-enabling system having a fleet of machines that automatically sell their aggregate energy storage capacity on a forward market for energy storage capacity and having a fleet of machines that automatically allocate collective compute capacity among a core task, a compute task, an energy storage task, a data storage task, and a networking task. In embodiments, provided herein is a transaction-enabling system having a fleet of machines that automatically sell their aggregate energy storage capacity on a forward market for energy storage capacity and having a fleet of machines that automatically allocate collective networking capacity among a core task, a compute task, an energy storage task, a data storage task, and a networking task. In embodiments, provided herein is a transaction-enabling system having a fleet of machines that automatically sell their aggregate energy storage capacity on a forward market for energy storage capacity and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically sell their aggregate energy storage capacity on a forward market for energy storage capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically sell their aggregate energy storage capacity on a forward market for energy storage capacity and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically sell their aggregate energy storage capacity on a forward market for energy storage capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically sell their aggregate energy storage capacity on a forward market for energy storage capacity and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically sell their aggregate energy storage capacity on a forward market for energy storage capacity and having a distributed ledger that tokenizes an instruction set, such that operation on the distributed ledger provides provable access to the instruction set. In embodiments, provided herein is a transaction-enabling system having a fleet of machines that automatically sell their aggregate energy storage capacity on a forward market for energy storage capacity and having a distributed ledger that tokenizes executable algorithmic logic, such that operation on the distributed ledger provides provable access to the executable algorithmic logic. In embodiments, provided herein is a transaction-enabling system having a fleet of machines that automatically sell their aggregate energy storage capacity on a forward market for energy storage capacity and having a distributed ledger that tokenizes a 3D printer instruction set, such that operation on the distributed ledger provides provable access to the instruction set. In embodiments, provided herein is a transaction-enabling system having a fleet of machines that automatically sell their aggregate energy storage capacity on a forward market for energy storage capacity and having a distributed ledger that tokenizes an instruction set for a coating process, such that operation on the distributed ledger provides provable access to the instruction set. In embodiments, provided herein is a transaction-enabling system having a fleet of machines that automatically sell their aggregate energy storage capacity on a forward market for energy storage capacity and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically sell their aggregate energy storage capacity on a forward market for energy storage capacity and having a distributed ledger that tokenizes a firmware program, such that operation on the distributed ledger provides provable access to the firmware program. In embodiments, provided herein is a transaction-enabling system having a fleet of machines that automatically sell their aggregate energy storage capacity on a forward market for energy storage capacity and having a distributed ledger that tokenizes an instruction set for an FPGA, such that operation on the distributed ledger provides provable access to the FPGA. In embodiments, provided herein is a transaction-enabling system having a fleet of machines that automatically sell their aggregate energy storage capacity on a forward market for energy storage capacity and having a distributed ledger that tokenizes serverless code logic, such that operation on the distributed ledger provides provable access to the serverless code logic. In embodiments, provided herein is a transaction-enabling system having a fleet of machines that automatically sell their aggregate energy storage capacity on a forward market for energy storage capacity and having a distributed ledger that tokenizes an instruction set for a crystal fabrication system, such that operation on the distributed ledger provides provable access to the instruction set. In embodiments, provided herein is a transaction-enabling system having a fleet of machines that automatically sell their aggregate energy storage capacity on a forward market for energy storage capacity and having a distributed ledger that tokenizes an instruction set for a food preparation process, such that operation on the distributed ledger provides provable access to the instruction set. In embodiments, provided herein is a transaction-enabling system having a fleet of machines that automatically sell their aggregate energy storage capacity on a forward market for energy storage capacity and having a distributed ledger that tokenizes an instruction set for a polymer production process, such that operation on the distributed ledger provides provable access to the instruction set. In embodiments, provided herein is a transaction-enabling system having a fleet of machines that automatically sell their aggregate energy storage capacity on a forward market for energy storage capacity and having a distributed ledger that tokenizes an instruction set for chemical synthesis process, such that operation on the distributed ledger provides provable access to the instruction set. In embodiments, provided herein is a transaction-enabling system having a fleet of machines that automatically sell their aggregate energy storage capacity on a forward market for energy storage capacity and having a distributed ledger that tokenizes an instruction set for a biological production process, such that operation on the distributed ledger provides provable access to the instruction set. In embodiments, provided herein is a transaction-enabling system having a fleet of machines that automatically sell their aggregate energy storage capacity on a forward market for energy storage capacity and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically sell their aggregate energy storage capacity on a forward market for energy storage capacity and having a distributed ledger that aggregates views of a trade secret into a chain that proves which and how many parties have viewed the trade secret. In embodiments, provided herein is a transaction-enabling system having a fleet of machines that automatically sell their aggregate energy storage capacity on a forward market for energy storage capacity and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically sell their aggregate energy storage capacity on a forward market for energy storage capacity and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically sell their aggregate energy storage capacity on a forward market for energy storage capacity and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically sell their aggregate energy storage capacity on a forward market for energy storage capacity and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically sell their aggregate energy storage capacity on a forward market for energy storage capacity and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically sell their aggregate energy storage capacity on a forward market for energy storage capacity and having a self-executing cryptocurrency coin that commits a transaction upon recognizing a location-based parameter that provides favorable tax treatment. In embodiments, provided herein is a transaction-enabling system having a fleet of machines that automatically sell their aggregate energy storage capacity on a forward market for energy storage capacity and having an expert system that uses machine learning to optimize the execution of cryptocurrency transactions based on tax status. In embodiments, provided herein is a transaction-enabling system having a fleet of machines that automatically sell their aggregate energy storage capacity on a forward market for energy storage capacity and having an expert system that aggregates regulatory information covering cryptocurrency transactions and automatically selects a jurisdiction for an operation based on the regulatory information. In embodiments, provided herein is a transaction-enabling system having a fleet of machines that automatically sell their aggregate energy storage capacity on a forward market for energy storage capacity and having an expert system that uses machine learning to optimize the execution of a cryptocurrency transaction based on real time energy price information for an available energy source. In embodiments, provided herein is a transaction-enabling system having a fleet of machines that automatically sell their aggregate energy storage capacity on a forward market for energy storage capacity and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically sell their aggregate energy storage capacity on a forward market for energy storage capacity and having an expert system that uses machine learning to optimize charging and recharging cycle of a rechargeable battery system to provide energy for execution of a cryptocurrency transaction. In embodiments, provided herein is a transaction-enabling system having a fleet of machines that automatically sell their aggregate energy storage capacity on a forward market for energy storage capacity and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically sell their aggregate energy storage capacity on a forward market for energy storage capacity and having an expert system that predicts a forward market price in a market based on an understanding obtained by analyzing social network data sources and executes a transaction based on the forward market prediction. In embodiments, provided herein is a transaction-enabling system having a fleet of machines that automatically sell their aggregate energy storage capacity on a forward market for energy storage capacity and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically sell their aggregate energy storage capacity on a forward market for energy storage capacity and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically sell their aggregate energy storage capacity on a forward market for energy storage capacity and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically sell their aggregate energy storage capacity on a forward market for energy storage capacity and having an expert system that predicts a forward market price in an energy market based on an understanding obtained by analyzing social network data sources and executes a transaction based on the forward market prediction. In embodiments, provided herein is a transaction-enabling system having a fleet of machines that automatically sell their aggregate energy storage capacity on a forward market for energy storage capacity and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically sell their aggregate energy storage capacity on a forward market for energy storage capacity and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically sell their aggregate energy storage capacity on a forward market for energy storage capacity and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically sell their aggregate energy storage capacity on a forward market for energy storage capacity and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically sell their aggregate energy storage capacity on a forward market for energy storage capacity and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically sell their aggregate energy storage capacity on a forward market for energy storage capacity and having a machine that automatically forecasts forward market pricing of energy prices based on information collected from automated agent behavioral data sources. In embodiments, provided herein is a transaction-enabling system having a fleet of machines that automatically sell their aggregate energy storage capacity on a forward market for energy storage capacity and having a machine that automatically forecasts forward market pricing of network spectrum based on information collected from automated agent behavioral data sources. In embodiments, provided herein is a transaction-enabling system having a fleet of machines that automatically sell their aggregate energy storage capacity on a forward market for energy storage capacity and having a machine that automatically forecasts forward market pricing of energy credits based on information collected from automated agent behavioral data sources. In embodiments, provided herein is a transaction-enabling system having a fleet of machines that automatically sell their aggregate energy storage capacity on a forward market for energy storage capacity and having a machine that automatically forecasts forward market value of compute capability based on information collected from automated agent behavioral data sources. In embodiments, provided herein is a transaction-enabling system having a fleet of machines that automatically sell their aggregate energy storage capacity on a forward market for energy storage capacity and having a machine that automatically forecasts forward market pricing of energy prices based on information collected from business entity behavioral data sources. In embodiments, provided herein is a transaction-enabling system having a fleet of machines that automatically sell their aggregate energy storage capacity on a forward market for energy storage capacity and having a machine that automatically forecasts forward market pricing of network spectrum based on information collected from business entity behavioral data sources. In embodiments, provided herein is a transaction-enabling system having a fleet of machines that automatically sell their aggregate energy storage capacity on a forward market for energy storage capacity and having a machine that automatically forecasts forward market pricing of energy credits based on information collected from business entity behavioral data sources. In embodiments, provided herein is a transaction-enabling system having a fleet of machines that automatically sell their aggregate energy storage capacity on a forward market for energy storage capacity and having a machine that automatically forecasts forward market value of compute capability based on information collected from business entity behavioral data sources. In embodiments, provided herein is a transaction-enabling system having a fleet of machines that automatically sell their aggregate energy storage capacity on a forward market for energy storage capacity and having a machine that automatically forecasts forward market pricing of energy prices based on information collected from human behavioral data sources. In embodiments, provided herein is a transaction-enabling system having a fleet of machines that automatically sell their aggregate energy storage capacity on a forward market for energy storage capacity and having a machine that automatically forecasts forward market pricing of network spectrum based on information collected from human behavioral data sources. In embodiments, provided herein is a transaction-enabling system having a fleet of machines that automatically sell their aggregate energy storage capacity on a forward market for energy storage capacity and having a machine that automatically forecasts forward market pricing of energy credits based on information collected from human behavioral data sources. In embodiments, provided herein is a transaction-enabling system having a fleet of machines that automatically sell their aggregate energy storage capacity on a forward market for energy storage capacity and having a machine that automatically forecasts forward market value of compute capability based on information collected from human behavioral data sources. In embodiments, provided herein is a transaction-enabling system having a fleet of machines that automatically sell their aggregate energy storage capacity on a forward market for energy storage capacity and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically sell their aggregate energy storage capacity on a forward market for energy storage capacity and having an intelligent agent that is configured to solicit the attention resources of another external intelligent agent. In embodiments, provided herein is a transaction-enabling system having a fleet of machines that automatically sell their aggregate energy storage capacity on a forward market for energy storage capacity and having a machine that automatically purchases attention resources in a forward market for attention. In embodiments, provided herein is a transaction-enabling system having a fleet of machines that automatically sell their aggregate energy storage capacity on a forward market for energy storage capacity and having a fleet of machines that automatically aggregate purchasing in a forward market for attention. In embodiments, provided herein is a transaction-enabling system having a fleet of machines that automatically sell their aggregate energy storage capacity on a forward market for energy storage capacity and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically sell their aggregate energy storage capacity on a forward market for energy storage capacity and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically sell their aggregate energy storage capacity on a forward market for energy storage capacity and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically sell their aggregate energy storage capacity on a forward market for energy storage capacity and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically sell their aggregate energy storage capacity on a forward market for energy storage capacity and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically sell their aggregate energy storage capacity on a forward market for energy storage capacity and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically sell their aggregate energy storage capacity on a forward market for energy storage capacity and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically sell their aggregate energy storage capacity on a forward market for energy storage capacity and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically sell their aggregate energy storage capacity on a forward market for energy storage capacity and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically sell their aggregate energy storage capacity on a forward market for energy storage capacity and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically sell their aggregate energy storage capacity on a forward market for energy storage capacity and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically sell their aggregate energy storage capacity on a forward market for energy storage capacity and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically sell their aggregate energy storage capacity on a forward market for energy storage capacity and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically sell their aggregate energy storage capacity on a forward market for energy storage capacity and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically sell their aggregate network bandwidth on a forward market for network capacity. In embodiments, provided herein is a transaction-enabling system having a fleet of machines that automatically sell their aggregate network bandwidth on a forward market for network capacity and having a machine that automatically forecasts forward market pricing of energy prices based on information collected from social media data sources. In embodiments, provided herein is a transaction-enabling system having a fleet of machines that automatically sell their aggregate network bandwidth on a forward market for network capacity and having a machine that automatically forecasts forward market pricing of network spectrum based on information collected from social media data sources. In embodiments, provided herein is a transaction-enabling system having a fleet of machines that automatically sell their aggregate network bandwidth on a forward market for network capacity and having a machine that automatically forecasts forward market pricing of energy credits based on information collected from social media data sources. In embodiments, provided herein is a transaction-enabling system having a fleet of machines that automatically sell their aggregate network bandwidth on a forward market for network capacity and having a machine that automatically forecasts forward market value of compute capability based on information collected from social media data sources. In embodiments, provided herein is a transaction-enabling system having a fleet of machines that automatically sell their aggregate network bandwidth on a forward market for network capacity and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a fleet of machines that automatically sell their aggregate network bandwidth on a forward market for network capacity and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a fleet of machines that automatically sell their aggregate network bandwidth on a forward market for network capacity and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a fleet of machines that automatically sell their aggregate network bandwidth on a forward market for network capacity and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a fleet of machines that automatically sell their aggregate network bandwidth on a forward market for network capacity and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a fleet of machines that automatically sell their aggregate network bandwidth on a forward market for network capacity and having a machine that automatically allocates its energy capacity among a core task, a compute task, an energy storage task, a data storage task, and a networking task. In embodiments, provided herein is a transaction-enabling system having a fleet of machines that automatically sell their aggregate network bandwidth on a forward market for network capacity and having a machine that automatically allocates its compute capacity among a core task, a compute task, an energy storage task, a data storage task, and a networking task. In embodiments, provided herein is a transaction-enabling system having a fleet of machines that automatically sell their aggregate network bandwidth on a forward market for network capacity and having a machine that automatically allocates its networking capacity among a core task, a compute task, an energy storage task, a data storage task, and a networking task. In embodiments, provided herein is a transaction-enabling system having a fleet of machines that automatically sell their aggregate network bandwidth on a forward market for network capacity and having a fleet of machines that automatically allocate collective energy capacity among a core task, a compute task, an energy storage task, a data storage task, and a networking task. In embodiments, provided herein is a transaction-enabling system having a fleet of machines that automatically sell their aggregate network bandwidth on a forward market for network capacity and having a fleet of machines that automatically allocate collective compute capacity among a core task, a compute task, an energy storage task, a data storage task, and a networking task. In embodiments, provided herein is a transaction-enabling system having a fleet of machines that automatically sell their aggregate network bandwidth on a forward market for network capacity and having a fleet of machines that automatically allocate collective networking capacity among a core task, a compute task, an energy storage task, a data storage task, and a networking task. In embodiments, provided herein is a transaction-enabling system having a fleet of machines that automatically sell their aggregate network bandwidth on a forward market for network capacity and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically sell their aggregate network bandwidth on a forward market for network capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically sell their aggregate network bandwidth on a forward market for network capacity and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically sell their aggregate network bandwidth on a forward market for network capacity and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically sell their aggregate network bandwidth on a forward market for network capacity and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically sell their aggregate network bandwidth on a forward market for network capacity and having a distributed ledger that tokenizes an instruction set, such that operation on the distributed ledger provides provable access to the instruction set. In embodiments, provided herein is a transaction-enabling system having a fleet of machines that automatically sell their aggregate network bandwidth on a forward market for network capacity and having a distributed ledger that tokenizes executable algorithmic logic, such that operation on the distributed ledger provides provable access to the executable algorithmic logic. In embodiments, provided herein is a transaction-enabling system having a fleet of machines that automatically sell their aggregate network bandwidth on a forward market for network capacity and having a distributed ledger that tokenizes a 3D printer instruction set, such that operation on the distributed ledger provides provable access to the instruction set. In embodiments, provided herein is a transaction-enabling system having a fleet of machines that automatically sell their aggregate network bandwidth on a forward market for network capacity and having a distributed ledger that tokenizes an instruction set for a coating process, such that operation on the distributed ledger provides provable access to the instruction set. In embodiments, provided herein is a transaction-enabling system having a fleet of machines that automatically sell their aggregate network bandwidth on a forward market for network capacity and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically sell their aggregate network bandwidth on a forward market for network capacity and having a distributed ledger that tokenizes a firmware program, such that operation on the distributed ledger provides provable access to the firmware program. In embodiments, provided herein is a transaction-enabling system having a fleet of machines that automatically sell their aggregate network bandwidth on a forward market for network capacity and having a distributed ledger that tokenizes an instruction set for an FPGA, such that operation on the distributed ledger provides provable access to the FPGA. In embodiments, provided herein is a transaction-enabling system having a fleet of machines that automatically sell their aggregate network bandwidth on a forward market for network capacity and having a distributed ledger that tokenizes serverless code logic, such that operation on the distributed ledger provides provable access to the serverless code logic. In embodiments, provided herein is a transaction-enabling system having a fleet of machines that automatically sell their aggregate network bandwidth on a forward market for network capacity and having a distributed ledger that tokenizes an instruction set for a crystal fabrication system, such that operation on the distributed ledger provides provable access to the instruction set. In embodiments, provided herein is a transaction-enabling system having a fleet of machines that automatically sell their aggregate network bandwidth on a forward market for network capacity and having a distributed ledger that tokenizes an instruction set for a food preparation process, such that operation on the distributed ledger provides provable access to the instruction set. In embodiments, provided herein is a transaction-enabling system having a fleet of machines that automatically sell their aggregate network bandwidth on a forward market for network capacity and having a distributed ledger that tokenizes an instruction set for a polymer production process, such that operation on the distributed ledger provides provable access to the instruction set. In embodiments, provided herein is a transaction-enabling system having a fleet of machines that automatically sell their aggregate network bandwidth on a forward market for network capacity and having a distributed ledger that tokenizes an instruction set for chemical synthesis process, such that operation on the distributed ledger provides provable access to the instruction set. In embodiments, provided herein is a transaction-enabling system having a fleet of machines that automatically sell their aggregate network bandwidth on a forward market for network capacity and having a distributed ledger that tokenizes an instruction set for a biological production process, such that operation on the distributed ledger provides provable access to the instruction set. In embodiments, provided herein is a transaction-enabling system having a fleet of machines that automatically sell their aggregate network bandwidth on a forward market for network capacity and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically sell their aggregate network bandwidth on a forward market for network capacity and having a distributed ledger that aggregates views of a trade secret into a chain that proves which and how many parties have viewed the trade secret. In embodiments, provided herein is a transaction-enabling system having a fleet of machines that automatically sell their aggregate network bandwidth on a forward market for network capacity and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically sell their aggregate network bandwidth on a forward market for network capacity and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically sell their aggregate network bandwidth on a forward market for network capacity and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically sell their aggregate network bandwidth on a forward market for network capacity and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically sell their aggregate network bandwidth on a forward market for network capacity and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically sell their aggregate network bandwidth on a forward market for network capacity and having a self-executing cryptocurrency coin that commits a transaction upon recognizing a location-based parameter that provides favorable tax treatment. In embodiments, provided herein is a transaction-enabling system having a fleet of machines that automatically sell their aggregate network bandwidth on a forward market for network capacity and having an expert system that uses machine learning to optimize the execution of cryptocurrency transactions based on tax status. In embodiments, provided herein is a transaction-enabling system having a fleet of machines that automatically sell their aggregate network bandwidth on a forward market for network capacity and having an expert system that aggregates regulatory information covering cryptocurrency transactions and automatically selects a jurisdiction for an operation based on the regulatory information. In embodiments, provided herein is a transaction-enabling system having a fleet of machines that automatically sell their aggregate network bandwidth on a forward market for network capacity and having an expert system that uses machine learning to optimize the execution of a cryptocurrency transaction based on real time energy price information for an available energy source. In embodiments, provided herein is a transaction-enabling system having a fleet of machines that automatically sell their aggregate network bandwidth on a forward market for network capacity and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically sell their aggregate network bandwidth on a forward market for network capacity and having an expert system that uses machine learning to optimize charging and recharging cycle of a rechargeable battery system to provide energy for execution of a cryptocurrency transaction. In embodiments, provided herein is a transaction-enabling system having a fleet of machines that automatically sell their aggregate network bandwidth on a forward market for network capacity and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically sell their aggregate network bandwidth on a forward market for network capacity and having an expert system that predicts a forward market price in a market based on an understanding obtained by analyzing social network data sources and executes a transaction based on the forward market prediction. In embodiments, provided herein is a transaction-enabling system having a fleet of machines that automatically sell their aggregate network bandwidth on a forward market for network capacity and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically sell their aggregate network bandwidth on a forward market for network capacity and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically sell their aggregate network bandwidth on a forward market for network capacity and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically sell their aggregate network bandwidth on a forward market for network capacity and having an expert system that predicts a forward market price in an energy market based on an understanding obtained by analyzing social network data sources and executes a transaction based on the forward market prediction. In embodiments, provided herein is a transaction-enabling system having a fleet of machines that automatically sell their aggregate network bandwidth on a forward market for network capacity and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically sell their aggregate network bandwidth on a forward market for network capacity and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically sell their aggregate network bandwidth on a forward market for network capacity and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically sell their aggregate network bandwidth on a forward market for network capacity and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically sell their aggregate network bandwidth on a forward market for network capacity and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically sell their aggregate network bandwidth on a forward market for network capacity and having a machine that automatically forecasts forward market pricing of energy prices based on information collected from automated agent behavioral data sources. In embodiments, provided herein is a transaction-enabling system having a fleet of machines that automatically sell their aggregate network bandwidth on a forward market for network capacity and having a machine that automatically forecasts forward market pricing of network spectrum based on information collected from automated agent behavioral data sources. In embodiments, provided herein is a transaction-enabling system having a fleet of machines that automatically sell their aggregate network bandwidth on a forward market for network capacity and having a machine that automatically forecasts forward market pricing of energy credits based on information collected from automated agent behavioral data sources. In embodiments, provided herein is a transaction-enabling system having a fleet of machines that automatically sell their aggregate network bandwidth on a forward market for network capacity and having a machine that automatically forecasts forward market value of compute capability based on information collected from automated agent behavioral data sources. In embodiments, provided herein is a transaction-enabling system having a fleet of machines that automatically sell their aggregate network bandwidth on a forward market for network capacity and having a machine that automatically forecasts forward market pricing of energy prices based on information collected from business entity behavioral data sources. In embodiments, provided herein is a transaction-enabling system having a fleet of machines that automatically sell their aggregate network bandwidth on a forward market for network capacity and having a machine that automatically forecasts forward market pricing of network spectrum based on information collected from business entity behavioral data sources. In embodiments, provided herein is a transaction-enabling system having a fleet of machines that automatically sell their aggregate network bandwidth on a forward market for network capacity and having a machine that automatically forecasts forward market pricing of energy credits based on information collected from business entity behavioral data sources. In embodiments, provided herein is a transaction-enabling system having a fleet of machines that automatically sell their aggregate network bandwidth on a forward market for network capacity and having a machine that automatically forecasts forward market value of compute capability based on information collected from business entity behavioral data sources. In embodiments, provided herein is a transaction-enabling system having a fleet of machines that automatically sell their aggregate network bandwidth on a forward market for network capacity and having a machine that automatically forecasts forward market pricing of energy prices based on information collected from human behavioral data sources. In embodiments, provided herein is a transaction-enabling system having a fleet of machines that automatically sell their aggregate network bandwidth on a forward market for network capacity and having a machine that automatically forecasts forward market pricing of network spectrum based on information collected from human behavioral data sources. In embodiments, provided herein is a transaction-enabling system having a fleet of machines that automatically sell their aggregate network bandwidth on a forward market for network capacity and having a machine that automatically forecasts forward market pricing of energy credits based on information collected from human behavioral data sources. In embodiments, provided herein is a transaction-enabling system having a fleet of machines that automatically sell their aggregate network bandwidth on a forward market for network capacity and having a machine that automatically forecasts forward market value of compute capability based on information collected from human behavioral data sources. In embodiments, provided herein is a transaction-enabling system having a fleet of machines that automatically sell their aggregate network bandwidth on a forward market for network capacity and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically sell their aggregate network bandwidth on a forward market for network capacity and having an intelligent agent that is configured to solicit the attention resources of another external intelligent agent. In embodiments, provided herein is a transaction-enabling system having a fleet of machines that automatically sell their aggregate network bandwidth on a forward market for network capacity and having a machine that automatically purchases attention resources in a forward market for attention. In embodiments, provided herein is a transaction-enabling system having a fleet of machines that automatically sell their aggregate network bandwidth on a forward market for network capacity and having a fleet of machines that automatically aggregate purchasing in a forward market for attention. In embodiments, provided herein is a transaction-enabling system having a fleet of machines that automatically sell their aggregate network bandwidth on a forward market for network capacity and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically sell their aggregate network bandwidth on a forward market for network capacity and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically sell their aggregate network bandwidth on a forward market for network capacity and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically sell their aggregate network bandwidth on a forward market for network capacity and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically sell their aggregate network bandwidth on a forward market for network capacity and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically sell their aggregate network bandwidth on a forward market for network capacity and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically sell their aggregate network bandwidth on a forward market for network capacity and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically sell their aggregate network bandwidth on a forward market for network capacity and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically sell their aggregate network bandwidth on a forward market for network capacity and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically sell their aggregate network bandwidth on a forward market for network capacity and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically sell their aggregate network bandwidth on a forward market for network capacity and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically sell their aggregate network bandwidth on a forward market for network capacity and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically sell their aggregate network bandwidth on a forward market for network capacity and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically sell their aggregate network bandwidth on a forward market for network capacity and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of energy prices based on information collected from social media data sources. In embodiments, provided herein is a transaction-enabling system having a machine that automatically forecasts forward market pricing of energy prices based on information collected from social media data sources and having a machine that automatically forecasts forward market pricing of network spectrum based on information collected from social media data sources. In embodiments, provided herein is a transaction-enabling system having a machine that automatically forecasts forward market pricing of energy prices based on information collected from social media data sources and having a machine that automatically forecasts forward market pricing of energy credits based on information collected from social media data sources. In embodiments, provided herein is a transaction-enabling system having a machine that automatically forecasts forward market pricing of energy prices based on information collected from social media data sources and having a machine that automatically forecasts forward market value of compute capability based on information collected from social media data sources. In embodiments, provided herein is a transaction-enabling system having a machine that automatically forecasts forward market pricing of energy prices based on information collected from social media data sources and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically forecasts forward market pricing of energy prices based on information collected from social media data sources and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically forecasts forward market pricing of energy prices based on information collected from social media data sources and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically forecasts forward market pricing of energy prices based on information collected from social media data sources and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically forecasts forward market pricing of energy prices based on information collected from social media data sources and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically forecasts forward market pricing of energy prices based on information collected from social media data sources and having a machine that automatically allocates its energy capacity among a core task, a compute task, an energy storage task, a data storage task, and a networking task. In embodiments, provided herein is a transaction-enabling system having a machine that automatically forecasts forward market pricing of energy prices based on information collected from social media data sources and having a machine that automatically allocates its compute capacity among a core task, a compute task, an energy storage task, a data storage task, and a networking task. In embodiments, provided herein is a transaction-enabling system having a machine that automatically forecasts forward market pricing of energy prices based on information collected from social media data sources and having a machine that automatically allocates its networking capacity among a core task, a compute task, an energy storage task, a data storage task, and a networking task. In embodiments, provided herein is a transaction-enabling system having a machine that automatically forecasts forward market pricing of energy prices based on information collected from social media data sources and having a fleet of machines that automatically allocate collective energy capacity among a core task, a compute task, an energy storage task, a data storage task, and a networking task. In embodiments, provided herein is a transaction-enabling system having a machine that automatically forecasts forward market pricing of energy prices based on information collected from social media data sources and having a fleet of machines that automatically allocate collective compute capacity among a core task, a compute task, an energy storage task, a data storage task, and a networking task. In embodiments, provided herein is a transaction-enabling system having a machine that automatically forecasts forward market pricing of energy prices based on information collected from social media data sources and having a fleet of machines that automatically allocate collective networking capacity among a core task, a compute task, an energy storage task, a data storage task, and a networking task. In embodiments, provided herein is a transaction-enabling system having a machine that automatically forecasts forward market pricing of energy prices based on information collected from social media data sources and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically forecasts forward market pricing of energy prices based on information collected from social media data sources and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically forecasts forward market pricing of energy prices based on information collected from social media data sources and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically forecasts forward market pricing of energy prices based on information collected from social media data sources and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically forecasts forward market pricing of energy prices based on information collected from social media data sources and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically forecasts forward market pricing of energy prices based on information collected from social media data sources and having a distributed ledger that tokenizes an instruction set, such that operation on the distributed ledger provides provable access to the instruction set. In embodiments, provided herein is a transaction-enabling system having a machine that automatically forecasts forward market pricing of energy prices based on information collected from social media data sources and having a distributed ledger that tokenizes executable algorithmic logic, such that operation on the distributed ledger provides provable access to the executable algorithmic logic. In embodiments, provided herein is a transaction-enabling system having a machine that automatically forecasts forward market pricing of energy prices based on information collected from social media data sources and having a distributed ledger that tokenizes a 3D printer instruction set, such that operation on the distributed ledger provides provable access to the instruction set. In embodiments, provided herein is a transaction-enabling system having a machine that automatically forecasts forward market pricing of energy prices based on information collected from social media data sources and having a distributed ledger that tokenizes an instruction set for a coating process, such that operation on the distributed ledger provides provable access to the instruction set. In embodiments, provided herein is a transaction-enabling system having a machine that automatically forecasts forward market pricing of energy prices based on information collected from social media data sources and having a distributed ledger that tokenizes an instruction set for a semiconductor fabrication process, such that operation on the distributed ledger provides provable access to the fabrication process. In embodiments, provided herein is a transaction-enabling system having a machine that automatically forecasts forward market pricing of energy prices based on information collected from social media data sources and having a distributed ledger that tokenizes a firmware program, such that operation on the distributed ledger provides provable access to the firmware program. In embodiments, provided herein is a transaction-enabling system having a machine that automatically forecasts forward market pricing of energy prices based on information collected from social media data sources and having a distributed ledger that tokenizes an instruction set for an FPGA, such that operation on the distributed ledger provides provable access to the FPGA. In embodiments, provided herein is a transaction-enabling system having a machine that automatically forecasts forward market pricing of energy prices based on information collected from social media data sources and having a distributed ledger that tokenizes serverless code logic, such that operation on the distributed ledger provides provable access to the serverless code logic. In embodiments, provided herein is a transaction-enabling system having a machine that automatically forecasts forward market pricing of energy prices based on information collected from social media data sources and having a distributed ledger that tokenizes an instruction set for a crystal fabrication system, such that operation on the distributed ledger provides provable access to the instruction set. In embodiments, provided herein is a transaction-enabling system having a machine that automatically forecasts forward market pricing of energy prices based on information collected from social media data sources and having a distributed ledger that tokenizes an instruction set for a food preparation process, such that operation on the distributed ledger provides provable access to the instruction set. In embodiments, provided herein is a transaction-enabling system having a machine that automatically forecasts forward market pricing of energy prices based on information collected from social media data sources and having a distributed ledger that tokenizes an instruction set for a polymer production process, such that operation on the distributed ledger provides provable access to the instruction set. In embodiments, provided herein is a transaction-enabling system having a machine that automatically forecasts forward market pricing of energy prices based on information collected from social media data sources and having a distributed ledger that tokenizes an instruction set for chemical synthesis process, such that operation on the distributed ledger provides provable access to the instruction set. In embodiments, provided herein is a transaction-enabling system having a machine that automatically forecasts forward market pricing of energy prices based on information collected from social media data sources and having a distributed ledger that tokenizes an instruction set for a biological production process, such that operation on the distributed ledger provides provable access to the instruction set. In embodiments, provided herein is a transaction-enabling system having a machine that automatically forecasts forward market pricing of energy prices based on information collected from social media data sources and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically forecasts forward market pricing of energy prices based on information collected from social media data sources and having a distributed ledger that aggregates views of a trade secret into a chain that proves which and how many parties have viewed the trade secret. In embodiments, provided herein is a transaction-enabling system having a machine that automatically forecasts forward market pricing of energy prices based on information collected from social media data sources and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically forecasts forward market pricing of energy prices based on information collected from social media data sources and having a distributed ledger that tokenizes an item of intellectual property and a reporting system that reports an analytic result based on the operations performed on the distributed ledger or the intellectual property. In embodiments, provided herein is a transaction-enabling system having a machine that automatically forecasts forward market pricing of energy prices based on information collected from social media data sources and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically forecasts forward market pricing of energy prices based on information collected from social media data sources and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically forecasts forward market pricing of energy prices based on information collected from social media data sources and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically forecasts forward market pricing of energy prices based on information collected from social media data sources and having a self-executing cryptocurrency coin that commits a transaction upon recognizing a location-based parameter that provides favorable tax treatment. In embodiments, provided herein is a transaction-enabling system having a machine that automatically forecasts forward market pricing of energy prices based on information collected from social media data sources and having an expert system that uses machine learning to optimize the execution of cryptocurrency transactions based on tax status. In embodiments, provided herein is a transaction-enabling system having a machine that automatically forecasts forward market pricing of energy prices based on information collected from social media data sources and having an expert system that aggregates regulatory information covering cryptocurrency transactions and automatically selects a jurisdiction for an operation based on the regulatory information. In embodiments, provided herein is a transaction-enabling system having a machine that automatically forecasts forward market pricing of energy prices based on information collected from social media data sources and having an expert system that uses machine learning to optimize the execution of a cryptocurrency transaction based on real time energy price information for an available energy source. In embodiments, provided herein is a transaction-enabling system having a machine that automatically forecasts forward market pricing of energy prices based on information collected from social media data sources and having an expert system that uses machine learning to optimize the execution of a cryptocurrency transaction based on an understanding of available energy sources to power computing resources to execute the transaction. In embodiments, provided herein is a transaction-enabling system having a machine that automatically forecasts forward market pricing of energy prices based on information collected from social media data sources and having an expert system that uses machine learning to optimize charging and recharging cycle of a rechargeable battery system to provide energy for execution of a cryptocurrency transaction. In embodiments, provided herein is a transaction-enabling system having a machine that automatically forecasts forward market pricing of energy prices based on information collected from social media data sources and having an expert system that predicts a forward market price in a market based on an understanding obtained by analyzing Internet of Things data sources and executes a transaction based on the forward market prediction. In embodiments, provided herein is a transaction-enabling system having a machine that automatically forecasts forward market pricing of energy prices based on information collected from social media data sources and having an expert system that predicts a forward market price in a market based on an understanding obtained by analyzing social network data sources and executes a transaction based on the forward market prediction. In embodiments, provided herein is a transaction-enabling system having a machine that automatically forecasts forward market pricing of energy prices based on information collected from social media data sources and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically forecasts forward market pricing of energy prices based on information collected from social media data sources and having an expert system that predicts a forward market price in a market based on an understanding obtained by analyzing social network data sources and executes a cryptocurrency transaction based on the forward market prediction. In embodiments, provided herein is a transaction-enabling system having a machine that automatically forecasts forward market pricing of energy prices based on information collected from social media data sources and having an expert system that predicts a forward market price in an energy market based on an understanding obtained by analyzing Internet of Things data sources and executes a transaction based on the forward market prediction. In embodiments, provided herein is a transaction-enabling system having a machine that automatically forecasts forward market pricing of energy prices based on information collected from social media data sources and having an expert system that predicts a forward market price in an energy market based on an understanding obtained by analyzing social network data sources and executes a transaction based on the forward market prediction. In embodiments, provided herein is a transaction-enabling system having a machine that automatically forecasts forward market pricing of energy prices based on information collected from social media data sources and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically forecasts forward market pricing of energy prices based on information collected from social media data sources and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically forecasts forward market pricing of energy prices based on information collected from social media data sources and having an expert system that predicts a forward market price in a market for computing resources based on an understanding obtained by analyzing social network data sources and executes a transaction based on the forward market prediction. In embodiments, provided herein is a transaction-enabling system having a machine that automatically forecasts forward market pricing of energy prices based on information collected from social media data sources and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically forecasts forward market pricing of energy prices based on information collected from social media data sources and having an expert system that predicts a forward market price in a market for advertising based on an understanding obtained by analyzing social network data sources and executes a transaction based on the forward market prediction. In embodiments, provided herein is a transaction-enabling system having a machine that automatically forecasts forward market pricing of energy prices based on information collected from social media data sources and having a machine that automatically forecasts forward market pricing of energy prices based on information collected from automated agent behavioral data sources. In embodiments, provided herein is a transaction-enabling system having a machine that automatically forecasts forward market pricing of energy prices based on information collected from social media data sources and having a machine that automatically forecasts forward market pricing of network spectrum based on information collected from automated agent behavioral data sources. In embodiments, provided herein is a transaction-enabling system having a machine that automatically forecasts forward market pricing of energy prices based on information collected from social media data sources and having a machine that automatically forecasts forward market pricing of energy credits based on information collected from automated agent behavioral data sources. In embodiments, provided herein is a transaction-enabling system having a machine that automatically forecasts forward market pricing of energy prices based on information collected from social media data sources and having a machine that automatically forecasts forward market value of compute capability based on information collected from automated agent behavioral data sources. In embodiments, provided herein is a transaction-enabling system having a machine that automatically forecasts forward market pricing of energy prices based on information collected from social media data sources and having a machine that automatically forecasts forward market pricing of energy prices based on information collected from business entity behavioral data sources. In embodiments, provided herein is a transaction-enabling system having a machine that automatically forecasts forward market pricing of energy prices based on information collected from social media data sources and having a machine that automatically forecasts forward market pricing of network spectrum based on information collected from business entity behavioral data sources. In embodiments, provided herein is a transaction-enabling system having a machine that automatically forecasts forward market pricing of energy prices based on information collected from social media data sources and having a machine that automatically forecasts forward market pricing of energy credits based on information collected from business entity behavioral data sources. In embodiments, provided herein is a transaction-enabling system having a machine that automatically forecasts forward market pricing of energy prices based on information collected from social media data sources and having a machine that automatically forecasts forward market value of compute capability based on information collected from business entity behavioral data sources. In embodiments, provided herein is a transaction-enabling system having a machine that automatically forecasts forward market pricing of energy prices based on information collected from social media data sources and having a machine that automatically forecasts forward market pricing of energy prices based on information collected from human behavioral data sources. In embodiments, provided herein is a transaction-enabling system having a machine that automatically forecasts forward market pricing of energy prices based on information collected from social media data sources and having a machine that automatically forecasts forward market pricing of network spectrum based on information collected from human behavioral data sources. In embodiments, provided herein is a transaction-enabling system having a machine that automatically forecasts forward market pricing of energy prices based on information collected from social media data sources and having a machine that automatically forecasts forward market pricing of energy credits based on information collected from human behavioral data sources. In embodiments, provided herein is a transaction-enabling system having a machine that automatically forecasts forward market pricing of energy prices based on information collected from social media data sources and having a machine that automatically forecasts forward market value of compute capability based on information collected from human behavioral data sources. In embodiments, provided herein is a transaction-enabling system having a machine that automatically forecasts forward market pricing of energy prices based on information collected from social media data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of energy prices based on information collected from social media data sources and having an intelligent agent that is configured to solicit the attention resources of another external intelligent agent. In embodiments, provided herein is a transaction-enabling system having a machine that automatically forecasts forward market pricing of energy prices based on information collected from social media data sources and having a machine that automatically purchases attention resources in a forward market for attention. In embodiments, provided herein is a transaction-enabling system having a machine that automatically forecasts forward market pricing of energy prices based on information collected from social media data sources and having a fleet of machines that automatically aggregate purchasing in a forward market for attention. In embodiments, provided herein is a transaction-enabling system having a machine that automatically forecasts forward market pricing of energy prices based on information collected from social media data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of energy prices based on information collected from social media data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of energy prices based on information collected from social media data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of energy prices based on information collected from social media data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of energy prices based on information collected from social media data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of energy prices based on information collected from social media data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of energy prices based on information collected from social media data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of energy prices based on information collected from social media data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of energy prices based on information collected from social media data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of energy prices based on information collected from social media data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of energy prices based on information collected from social media data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of energy prices based on information collected from social media data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of energy prices based on information collected from social media data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of energy prices based on information collected from social media data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of network spectrum based on information collected from social media data sources. In embodiments, provided herein is a transaction-enabling system having a machine that automatically forecasts forward market pricing of network spectrum based on information collected from social media data sources and having a machine that automatically forecasts forward market pricing of energy credits based on information collected from social media data sources. In embodiments, provided herein is a transaction-enabling system having a machine that automatically forecasts forward market pricing of network spectrum based on information collected from social media data sources and having a machine that automatically forecasts forward market value of compute capability based on information collected from social media data sources. In embodiments, provided herein is a transaction-enabling system having a machine that automatically forecasts forward market pricing of network spectrum based on information collected from social media data sources and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically forecasts forward market pricing of network spectrum based on information collected from social media data sources and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically forecasts forward market pricing of network spectrum based on information collected from social media data sources and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically forecasts forward market pricing of network spectrum based on information collected from social media data sources and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically forecasts forward market pricing of network spectrum based on information collected from social media data sources and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically forecasts forward market pricing of network spectrum based on information collected from social media data sources and having a machine that automatically allocates its energy capacity among a core task, a compute task, an energy storage task, a data storage task, and a networking task. In embodiments, provided herein is a transaction-enabling system having a machine that automatically forecasts forward market pricing of network spectrum based on information collected from social media data sources and having a machine that automatically allocates its compute capacity among a core task, a compute task, an energy storage task, a data storage task, and a networking task. In embodiments, provided herein is a transaction-enabling system having a machine that automatically forecasts forward market pricing of network spectrum based on information collected from social media data sources and having a machine that automatically allocates its networking capacity among a core task, a compute task, an energy storage task, a data storage task, and a networking task. In embodiments, provided herein is a transaction-enabling system having a machine that automatically forecasts forward market pricing of network spectrum based on information collected from social media data sources and having a fleet of machines that automatically allocate collective energy capacity among a core task, a compute task, an energy storage task, a data storage task, and a networking task. In embodiments, provided herein is a transaction-enabling system having a machine that automatically forecasts forward market pricing of network spectrum based on information collected from social media data sources and having a fleet of machines that automatically allocate collective compute capacity among a core task, a compute task, an energy storage task, a data storage task, and a networking task. In embodiments, provided herein is a transaction-enabling system having a machine that automatically forecasts forward market pricing of network spectrum based on information collected from social media data sources and having a fleet of machines that automatically allocate collective networking capacity among a core task, a compute task, an energy storage task, a data storage task, and a networking task. In embodiments, provided herein is a transaction-enabling system having a machine that automatically forecasts forward market pricing of network spectrum based on information collected from social media data sources and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically forecasts forward market pricing of network spectrum based on information collected from social media data sources and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically forecasts forward market pricing of network spectrum based on information collected from social media data sources and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically forecasts forward market pricing of network spectrum based on information collected from social media data sources and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically forecasts forward market pricing of network spectrum based on information collected from social media data sources and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically forecasts forward market pricing of network spectrum based on information collected from social media data sources and having a distributed ledger that tokenizes an instruction set, such that operation on the distributed ledger provides provable access to the instruction set. In embodiments, provided herein is a transaction-enabling system having a machine that automatically forecasts forward market pricing of network spectrum based on information collected from social media data sources and having a distributed ledger that tokenizes executable algorithmic logic, such that operation on the distributed ledger provides provable access to the executable algorithmic logic. In embodiments, provided herein is a transaction-enabling system having a machine that automatically forecasts forward market pricing of network spectrum based on information collected from social media data sources and having a distributed ledger that tokenizes a 3D printer instruction set, such that operation on the distributed ledger provides provable access to the instruction set. In embodiments, provided herein is a transaction-enabling system having a machine that automatically forecasts forward market pricing of network spectrum based on information collected from social media data sources and having a distributed ledger that tokenizes an instruction set for a coating process, such that operation on the distributed ledger provides provable access to the instruction set. In embodiments, provided herein is a transaction-enabling system having a machine that automatically forecasts forward market pricing of network spectrum based on information collected from social media data sources and having a distributed ledger that tokenizes an instruction set for a semiconductor fabrication process, such that operation on the distributed ledger provides provable access to the fabrication process. In embodiments, provided herein is a transaction-enabling system having a machine that automatically forecasts forward market pricing of network spectrum based on information collected from social media data sources and having a distributed ledger that tokenizes a firmware program, such that operation on the distributed ledger provides provable access to the firmware program. In embodiments, provided herein is a transaction-enabling system having a machine that automatically forecasts forward market pricing of network spectrum based on information collected from social media data sources and having a distributed ledger that tokenizes an instruction set for an FPGA, such that operation on the distributed ledger provides provable access to the FPGA. In embodiments, provided herein is a transaction-enabling system having a machine that automatically forecasts forward market pricing of network spectrum based on information collected from social media data sources and having a distributed ledger that tokenizes serverless code logic, such that operation on the distributed ledger provides provable access to the serverless code logic. In embodiments, provided herein is a transaction-enabling system having a machine that automatically forecasts forward market pricing of network spectrum based on information collected from social media data sources and having a distributed ledger that tokenizes an instruction set for a crystal fabrication system, such that operation on the distributed ledger provides provable access to the instruction set. In embodiments, provided herein is a transaction-enabling system having a machine that automatically forecasts forward market pricing of network spectrum based on information collected from social media data sources and having a distributed ledger that tokenizes an instruction set for a food preparation process, such that operation on the distributed ledger provides provable access to the instruction set. In embodiments, provided herein is a transaction-enabling system having a machine that automatically forecasts forward market pricing of network spectrum based on information collected from social media data sources and having a distributed ledger that tokenizes an instruction set for a polymer production process, such that operation on the distributed ledger provides provable access to the instruction set. In embodiments, provided herein is a transaction-enabling system having a machine that automatically forecasts forward market pricing of network spectrum based on information collected from social media data sources and having a distributed ledger that tokenizes an instruction set for chemical synthesis process, such that operation on the distributed ledger provides provable access to the instruction set. In embodiments, provided herein is a transaction-enabling system having a machine that automatically forecasts forward market pricing of network spectrum based on information collected from social media data sources and having a distributed ledger that tokenizes an instruction set for a biological production process, such that operation on the distributed ledger provides provable access to the instruction set. In embodiments, provided herein is a transaction-enabling system having a machine that automatically forecasts forward market pricing of network spectrum based on information collected from social media data sources and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically forecasts forward market pricing of network spectrum based on information collected from social media data sources and having a distributed ledger that aggregates views of a trade secret into a chain that proves which and how many parties have viewed the trade secret. In embodiments, provided herein is a transaction-enabling system having a machine that automatically forecasts forward market pricing of network spectrum based on information collected from social media data sources and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically forecasts forward market pricing of network spectrum based on information collected from social media data sources and having a distributed ledger that tokenizes an item of intellectual property and a reporting system that reports an analytic result based on the operations performed on the distributed ledger or the intellectual property. In embodiments, provided herein is a transaction-enabling system having a machine that automatically forecasts forward market pricing of network spectrum based on information collected from social media data sources and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically forecasts forward market pricing of network spectrum based on information collected from social media data sources and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically forecasts forward market pricing of network spectrum based on information collected from social media data sources and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically forecasts forward market pricing of network spectrum based on information collected from social media data sources and having a self-executing cryptocurrency coin that commits a transaction upon recognizing a location-based parameter that provides favorable tax treatment. In embodiments, provided herein is a transaction-enabling system having a machine that automatically forecasts forward market pricing of network spectrum based on information collected from social media data sources and having an expert system that uses machine learning to optimize the execution of cryptocurrency transactions based on tax status. In embodiments, provided herein is a transaction-enabling system having a machine that automatically forecasts forward market pricing of network spectrum based on information collected from social media data sources and having an expert system that aggregates regulatory information covering cryptocurrency transactions and automatically selects a jurisdiction for an operation based on the regulatory information. In embodiments, provided herein is a transaction-enabling system having a machine that automatically forecasts forward market pricing of network spectrum based on information collected from social media data sources and having an expert system that uses machine learning to optimize the execution of a cryptocurrency transaction based on real time energy price information for an available energy source. In embodiments, provided herein is a transaction-enabling system having a machine that automatically forecasts forward market pricing of network spectrum based on information collected from social media data sources and having an expert system that uses machine learning to optimize the execution of a cryptocurrency transaction based on an understanding of available energy sources to power computing resources to execute the transaction. In embodiments, provided herein is a transaction-enabling system having a machine that automatically forecasts forward market pricing of network spectrum based on information collected from social media data sources and having an expert system that uses machine learning to optimize charging and recharging cycle of a rechargeable battery system to provide energy for execution of a cryptocurrency transaction. In embodiments, provided herein is a transaction-enabling system having a machine that automatically forecasts forward market pricing of network spectrum based on information collected from social media data sources and having an expert system that predicts a forward market price in a market based on an understanding obtained by analyzing Internet of Things data sources and executes a transaction based on the forward market prediction. In embodiments, provided herein is a transaction-enabling system having a machine that automatically forecasts forward market pricing of network spectrum based on information collected from social media data sources and having an expert system that predicts a forward market price in a market based on an understanding obtained by analyzing social network data sources and executes a transaction based on the forward market prediction. In embodiments, provided herein is a transaction-enabling system having a machine that automatically forecasts forward market pricing of network spectrum based on information collected from social media data sources and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically forecasts forward market pricing of network spectrum based on information collected from social media data sources and having an expert system that predicts a forward market price in a market based on an understanding obtained by analyzing social network data sources and executes a cryptocurrency transaction based on the forward market prediction. In embodiments, provided herein is a transaction-enabling system having a machine that automatically forecasts forward market pricing of network spectrum based on information collected from social media data sources and having an expert system that predicts a forward market price in an energy market based on an understanding obtained by analyzing Internet of Things data sources and executes a transaction based on the forward market prediction. In embodiments, provided herein is a transaction-enabling system having a machine that automatically forecasts forward market pricing of network spectrum based on information collected from social media data sources and having an expert system that predicts a forward market price in an energy market based on an understanding obtained by analyzing social network data sources and executes a transaction based on the forward market prediction. In embodiments, provided herein is a transaction-enabling system having a machine that automatically forecasts forward market pricing of network spectrum based on information collected from social media data sources and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically forecasts forward market pricing of network spectrum based on information collected from social media data sources and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically forecasts forward market pricing of network spectrum based on information collected from social media data sources and having an expert system that predicts a forward market price in a market for computing resources based on an understanding obtained by analyzing social network data sources and executes a transaction based on the forward market prediction. In embodiments, provided herein is a transaction-enabling system having a machine that automatically forecasts forward market pricing of network spectrum based on information collected from social media data sources and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically forecasts forward market pricing of network spectrum based on information collected from social media data sources and having an expert system that predicts a forward market price in a market for advertising based on an understanding obtained by analyzing social network data sources and executes a transaction based on the forward market prediction. In embodiments, provided herein is a transaction-enabling system having a machine that automatically forecasts forward market pricing of network spectrum based on information collected from social media data sources and having a machine that automatically forecasts forward market pricing of energy prices based on information collected from automated agent behavioral data sources. In embodiments, provided herein is a transaction-enabling system having a machine that automatically forecasts forward market pricing of network spectrum based on information collected from social media data sources and having a machine that automatically forecasts forward market pricing of network spectrum based on information collected from automated agent behavioral data sources. In embodiments, provided herein is a transaction-enabling system having a machine that automatically forecasts forward market pricing of network spectrum based on information collected from social media data sources and having a machine that automatically forecasts forward market pricing of energy credits based on information collected from automated agent behavioral data sources. In embodiments, provided herein is a transaction-enabling system having a machine that automatically forecasts forward market pricing of network spectrum based on information collected from social media data sources and having a machine that automatically forecasts forward market value of compute capability based on information collected from automated agent behavioral data sources. In embodiments, provided herein is a transaction-enabling system having a machine that automatically forecasts forward market pricing of network spectrum based on information collected from social media data sources and having a machine that automatically forecasts forward market pricing of energy prices based on information collected from business entity behavioral data sources. In embodiments, provided herein is a transaction-enabling system having a machine that automatically forecasts forward market pricing of network spectrum based on information collected from social media data sources and having a machine that automatically forecasts forward market pricing of network spectrum based on information collected from business entity behavioral data sources. In embodiments, provided herein is a transaction-enabling system having a machine that automatically forecasts forward market pricing of network spectrum based on information collected from social media data sources and having a machine that automatically forecasts forward market pricing of energy credits based on information collected from business entity behavioral data sources. In embodiments, provided herein is a transaction-enabling system having a machine that automatically forecasts forward market pricing of network spectrum based on information collected from social media data sources and having a machine that automatically forecasts forward market value of compute capability based on information collected from business entity behavioral data sources. In embodiments, provided herein is a transaction-enabling system having a machine that automatically forecasts forward market pricing of network spectrum based on information collected from social media data sources and having a machine that automatically forecasts forward market pricing of energy prices based on information collected from human behavioral data sources. In embodiments, provided herein is a transaction-enabling system having a machine that automatically forecasts forward market pricing of network spectrum based on information collected from social media data sources and having a machine that automatically forecasts forward market pricing of network spectrum based on information collected from human behavioral data sources. In embodiments, provided herein is a transaction-enabling system having a machine that automatically forecasts forward market pricing of network spectrum based on information collected from social media data sources and having a machine that automatically forecasts forward market pricing of energy credits based on information collected from human behavioral data sources. In embodiments, provided herein is a transaction-enabling system having a machine that automatically forecasts forward market pricing of network spectrum based on information collected from social media data sources and having a machine that automatically forecasts forward market value of compute capability based on information collected from human behavioral data sources. In embodiments, provided herein is a transaction-enabling system having a machine that automatically forecasts forward market pricing of network spectrum based on information collected from social media data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of network spectrum based on information collected from social media data sources and having an intelligent agent that is configured to solicit the attention resources of another external intelligent agent. In embodiments, provided herein is a transaction-enabling system having a machine that automatically forecasts forward market pricing of network spectrum based on information collected from social media data sources and having a machine that automatically purchases attention resources in a forward market for attention. In embodiments, provided herein is a transaction-enabling system having a machine that automatically forecasts forward market pricing of network spectrum based on information collected from social media data sources and having a fleet of machines that automatically aggregate purchasing in a forward market for attention. In embodiments, provided herein is a transaction-enabling system having a machine that automatically forecasts forward market pricing of network spectrum based on information collected from social media data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of network spectrum based on information collected from social media data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of network spectrum based on information collected from social media data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of network spectrum based on information collected from social media data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of network spectrum based on information collected from social media data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of network spectrum based on information collected from social media data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of network spectrum based on information collected from social media data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of network spectrum based on information collected from social media data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of network spectrum based on information collected from social media data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of network spectrum based on information collected from social media data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of network spectrum based on information collected from social media data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of network spectrum based on information collected from social media data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of network spectrum based on information collected from social media data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of network spectrum based on information collected from social media data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market pricing of energy credits based on information collected from social media data sources. In embodiments, provided herein is a transaction-enabling system having a machine that automatically forecasts forward market pricing of energy credits based on information collected from social media data sources and having a machine that automatically forecasts forward market value of compute capability based on information collected from social media data sources. In embodiments, provided herein is a transaction-enabling system having a machine that automatically forecasts forward market pricing of energy credits based on information collected from social media data sources and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically forecasts forward market pricing of energy credits based on information collected from social media data sources and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically forecasts forward market pricing of energy credits based on information collected from social media data sources and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically forecasts forward market pricing of energy credits based on information collected from social media data sources and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically forecasts forward market pricing of energy credits based on information collected from social media data sources and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically forecasts forward market pricing of energy credits based on information collected from social media data sources and having a machine that automatically allocates its energy capacity among a core task, a compute task, an energy storage task, a data storage task, and a networking task. In embodiments, provided herein is a transaction-enabling system having a machine that automatically forecasts forward market pricing of energy credits based on information collected from social media data sources and having a machine that automatically allocates its compute capacity among a core task, a compute task, an energy storage task, a data storage task, and a networking task. In embodiments, provided herein is a transaction-enabling system having a machine that automatically forecasts forward market pricing of energy credits based on information collected from social media data sources and having a machine that automatically allocates its networking capacity among a core task, a compute task, an energy storage task, a data storage task, and a networking task. In embodiments, provided herein is a transaction-enabling system having a machine that automatically forecasts forward market pricing of energy credits based on information collected from social media data sources and having a fleet of machines that automatically allocate collective energy capacity among a core task, a compute task, an energy storage task, a data storage task, and a networking task. In embodiments, provided herein is a transaction-enabling system having a machine that automatically forecasts forward market pricing of energy credits based on information collected from social media data sources and having a fleet of machines that automatically allocate collective compute capacity among a core task, a compute task, an energy storage task, a data storage task, and a networking task. In embodiments, provided herein is a transaction-enabling system having a machine that automatically forecasts forward market pricing of energy credits based on information collected from social media data sources and having a fleet of machines that automatically allocate collective networking capacity among a core task, a compute task, an energy storage task, a data storage task, and a networking task. In embodiments, provided herein is a transaction-enabling system having a machine that automatically forecasts forward market pricing of energy credits based on information collected from social media data sources and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically forecasts forward market pricing of energy credits based on information collected from social media data sources and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically forecasts forward market pricing of energy credits based on information collected from social media data sources and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically forecasts forward market pricing of energy credits based on information collected from social media data sources and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically forecasts forward market pricing of energy credits based on information collected from social media data sources and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically forecasts forward market pricing of energy credits based on information collected from social media data sources and having a distributed ledger that tokenizes an instruction set, such that operation on the distributed ledger provides provable access to the instruction set. In embodiments, provided herein is a transaction-enabling system having a machine that automatically forecasts forward market pricing of energy credits based on information collected from social media data sources and having a distributed ledger that tokenizes executable algorithmic logic, such that operation on the distributed ledger provides provable access to the executable algorithmic logic. In embodiments, provided herein is a transaction-enabling system having a machine that automatically forecasts forward market pricing of energy credits based on information collected from social media data sources and having a distributed ledger that tokenizes a 3D printer instruction set, such that operation on the distributed ledger provides provable access to the instruction set. In embodiments, provided herein is a transaction-enabling system having a machine that automatically forecasts forward market pricing of energy credits based on information collected from social media data sources and having a distributed ledger that tokenizes an instruction set for a coating process, such that operation on the distributed ledger provides provable access to the instruction set. In embodiments, provided herein is a transaction-enabling system having a machine that automatically forecasts forward market pricing of energy credits based on information collected from social media data sources and having a distributed ledger that tokenizes an instruction set for a semiconductor fabrication process, such that operation on the distributed ledger provides provable access to the fabrication process. In embodiments, provided herein is a transaction-enabling system having a machine that automatically forecasts forward market pricing of energy credits based on information collected from social media data sources and having a distributed ledger that tokenizes a firmware program, such that operation on the distributed ledger provides provable access to the firmware program. In embodiments, provided herein is a transaction-enabling system having a machine that automatically forecasts forward market pricing of energy credits based on information collected from social media data sources and having a distributed ledger that tokenizes an instruction set for an FPGA, such that operation on the distributed ledger provides provable access to the FPGA. In embodiments, provided herein is a transaction-enabling system having a machine that automatically forecasts forward market pricing of energy credits based on information collected from social media data sources and having a distributed ledger that tokenizes serverless code logic, such that operation on the distributed ledger provides provable access to the serverless code logic. In embodiments, provided herein is a transaction-enabling system having a machine that automatically forecasts forward market pricing of energy credits based on information collected from social media data sources and having a distributed ledger that tokenizes an instruction set for a crystal fabrication system, such that operation on the distributed ledger provides provable access to the instruction set. In embodiments, provided herein is a transaction-enabling system having a machine that automatically forecasts forward market pricing of energy credits based on information collected from social media data sources and having a distributed ledger that tokenizes an instruction set for a food preparation process, such that operation on the distributed ledger provides provable access to the instruction set. In embodiments, provided herein is a transaction-enabling system having a machine that automatically forecasts forward market pricing of energy credits based on information collected from social media data sources and having a distributed ledger that tokenizes an instruction set for a polymer production process, such that operation on the distributed ledger provides provable access to the instruction set. In embodiments, provided herein is a transaction-enabling system having a machine that automatically forecasts forward market pricing of energy credits based on information collected from social media data sources and having a distributed ledger that tokenizes an instruction set for chemical synthesis process, such that operation on the distributed ledger provides provable access to the instruction set. In embodiments, provided herein is a transaction-enabling system having a machine that automatically forecasts forward market pricing of energy credits based on information collected from social media data sources and having a distributed ledger that tokenizes an instruction set for a biological production process, such that operation on the distributed ledger provides provable access to the instruction set. In embodiments, provided herein is a transaction-enabling system having a machine that automatically forecasts forward market pricing of energy credits based on information collected from social media data sources and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically forecasts forward market pricing of energy credits based on information collected from social media data sources and having a distributed ledger that aggregates views of a trade secret into a chain that proves which and how many parties have viewed the trade secret. In embodiments, provided herein is a transaction-enabling system having a machine that automatically forecasts forward market pricing of energy credits based on information collected from social media data sources and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically forecasts forward market pricing of energy credits based on information collected from social media data sources and having a distributed ledger that tokenizes an item of intellectual property and a reporting system that reports an analytic result based on the operations performed on the distributed ledger or the intellectual property. In embodiments, provided herein is a transaction-enabling system having a machine that automatically forecasts forward market pricing of energy credits based on information collected from social media data sources and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically forecasts forward market pricing of energy credits based on information collected from social media data sources and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically forecasts forward market pricing of energy credits based on information collected from social media data sources and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically forecasts forward market pricing of energy credits based on information collected from social media data sources and having a self-executing cryptocurrency coin that commits a transaction upon recognizing a location-based parameter that provides favorable tax treatment. In embodiments, provided herein is a transaction-enabling system having a machine that automatically forecasts forward market pricing of energy credits based on information collected from social media data sources and having an expert system that uses machine learning to optimize the execution of cryptocurrency transactions based on tax status. In embodiments, provided herein is a transaction-enabling system having a machine that automatically forecasts forward market pricing of energy credits based on information collected from social media data sources and having an expert system that aggregates regulatory information covering cryptocurrency transactions and automatically selects a jurisdiction for an operation based on the regulatory information. In embodiments, provided herein is a transaction-enabling system having a machine that automatically forecasts forward market pricing of energy credits based on information collected from social media data sources and having an expert system that uses machine learning to optimize the execution of a cryptocurrency transaction based on real time energy price information for an available energy source. In embodiments, provided herein is a transaction-enabling system having a machine that automatically forecasts forward market pricing of energy credits based on information collected from social media data sources and having an expert system that uses machine learning to optimize the execution of a cryptocurrency transaction based on an understanding of available energy sources to power computing resources to execute the transaction. In embodiments, provided herein is a transaction-enabling system having a machine that automatically forecasts forward market pricing of energy credits based on information collected from social media data sources and having an expert system that uses machine learning to optimize charging and recharging cycle of a rechargeable battery system to provide energy for execution of a cryptocurrency transaction. In embodiments, provided herein is a transaction-enabling system having a machine that automatically forecasts forward market pricing of energy credits based on information collected from social media data sources and having an expert system that predicts a forward market price in a market based on an understanding obtained by analyzing Internet of Things data sources and executes a transaction based on the forward market prediction. In embodiments, provided herein is a transaction-enabling system having a machine that automatically forecasts forward market pricing of energy credits based on information collected from social media data sources and having an expert system that predicts a forward market price in a market based on an understanding obtained by analyzing social network data sources and executes a transaction based on the forward market prediction. In embodiments, provided herein is a transaction-enabling system having a machine that automatically forecasts forward market pricing of energy credits based on information collected from social media data sources and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically forecasts forward market pricing of energy credits based on information collected from social media data sources and having an expert system that predicts a forward market price in a market based on an understanding obtained by analyzing social network data sources and executes a cryptocurrency transaction based on the forward market prediction. In embodiments, provided herein is a transaction-enabling system having a machine that automatically forecasts forward market pricing of energy credits based on information collected from social media data sources and having an expert system that predicts a forward market price in an energy market based on an understanding obtained by analyzing Internet of Things data sources and executes a transaction based on the forward market prediction. In embodiments, provided herein is a transaction-enabling system having a machine that automatically forecasts forward market pricing of energy credits based on information collected from social media data sources and having an expert system that predicts a forward market price in an energy market based on an understanding obtained by analyzing social network data sources and executes a transaction based on the forward market prediction. In embodiments, provided herein is a transaction-enabling system having a machine that automatically forecasts forward market pricing of energy credits based on information collected from social media data sources and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically forecasts forward market pricing of energy credits based on information collected from social media data sources and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically forecasts forward market pricing of energy credits based on information collected from social media data sources and having an expert system that predicts a forward market price in a market for computing resources based on an understanding obtained by analyzing social network data sources and executes a transaction based on the forward market prediction. In embodiments, provided herein is a transaction-enabling system having a machine that automatically forecasts forward market pricing of energy credits based on information collected from social media data sources and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically forecasts forward market pricing of energy credits based on information collected from social media data sources and having an expert system that predicts a forward market price in a market for advertising based on an understanding obtained by analyzing social network data sources and executes a transaction based on the forward market prediction. In embodiments, provided herein is a transaction-enabling system having a machine that automatically forecasts forward market pricing of energy credits based on information collected from social media data sources and having a machine that automatically forecasts forward market pricing of energy prices based on information collected from automated agent behavioral data sources. In embodiments, provided herein is a transaction-enabling system having a machine that automatically forecasts forward market pricing of energy credits based on information collected from social media data sources and having a machine that automatically forecasts forward market pricing of network spectrum based on information collected from automated agent behavioral data sources. In embodiments, provided herein is a transaction-enabling system having a machine that automatically forecasts forward market pricing of energy credits based on information collected from social media data sources and having a machine that automatically forecasts forward market pricing of energy credits based on information collected from automated agent behavioral data sources. In embodiments, provided herein is a transaction-enabling system having a machine that automatically forecasts forward market pricing of energy credits based on information collected from social media data sources and having a machine that automatically forecasts forward market value of compute capability based on information collected from automated agent behavioral data sources. In embodiments, provided herein is a transaction-enabling system having a machine that automatically forecasts forward market pricing of energy credits based on information collected from social media data sources and having a machine that automatically forecasts forward market pricing of energy prices based on information collected from business entity behavioral data sources. In embodiments, provided herein is a transaction-enabling system having a machine that automatically forecasts forward market pricing of energy credits based on information collected from social media data sources and having a machine that automatically forecasts forward market pricing of network spectrum based on information collected from business entity behavioral data sources. In embodiments, provided herein is a transaction-enabling system having a machine that automatically forecasts forward market pricing of energy credits based on information collected from social media data sources and having a machine that automatically forecasts forward market pricing of energy credits based on information collected from business entity behavioral data sources. In embodiments, provided herein is a transaction-enabling system having a machine that automatically forecasts forward market pricing of energy credits based on information collected from social media data sources and having a machine that automatically forecasts forward market value of compute capability based on information collected from business entity behavioral data sources. In embodiments, provided herein is a transaction-enabling system having a machine that automatically forecasts forward market pricing of energy credits based on information collected from social media data sources and having a machine that automatically forecasts forward market pricing of energy prices based on information collected from human behavioral data sources. In embodiments, provided herein is a transaction-enabling system having a machine that automatically forecasts forward market pricing of energy credits based on information collected from social media data sources and having a machine that automatically forecasts forward market pricing of network spectrum based on information collected from human behavioral data sources. In embodiments, provided herein is a transaction-enabling system having a machine that automatically forecasts forward market pricing of energy credits based on information collected from social media data sources and having a machine that automatically forecasts forward market pricing of energy credits based on information collected from human behavioral data sources. In embodiments, provided herein is a transaction-enabling system having a machine that automatically forecasts forward market pricing of energy credits based on information collected from social media data sources and having a machine that automatically forecasts forward market value of compute capability based on information collected from human behavioral data sources. In embodiments, provided herein is a transaction-enabling system having a machine that automatically forecasts forward market pricing of energy credits based on information collected from social media data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market pricing of energy credits based on information collected from social media data sources and having an intelligent agent that is configured to solicit the attention resources of another external intelligent agent. In embodiments, provided herein is a transaction-enabling system having a machine that automatically forecasts forward market pricing of energy credits based on information collected from social media data sources and having a machine that automatically purchases attention resources in a forward market for attention. In embodiments, provided herein is a transaction-enabling system having a machine that automatically forecasts forward market pricing of energy credits based on information collected from social media data sources and having a fleet of machines that automatically aggregate purchasing in a forward market for attention. In embodiments, provided herein is a transaction-enabling system having a machine that automatically forecasts forward market pricing of energy credits based on information collected from social media data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market pricing of energy credits based on information collected from social media data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market pricing of energy credits based on information collected from social media data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market pricing of energy credits based on information collected from social media data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market pricing of energy credits based on information collected from social media data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market pricing of energy credits based on information collected from social media data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market pricing of energy credits based on information collected from social media data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market pricing of energy credits based on information collected from social media data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market pricing of energy credits based on information collected from social media data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market pricing of energy credits based on information collected from social media data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market pricing of energy credits based on information collected from social media data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market pricing of energy credits based on information collected from social media data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market pricing of energy credits based on information collected from social media data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market pricing of energy credits based on information collected from social media data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically forecasts forward market value of compute capability based on information collected from social media data sources. In embodiments, provided herein is a transaction-enabling system having a machine that automatically forecasts forward market value of compute capability based on information collected from social media data sources and having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically forecasts forward market value of compute capability based on information collected from social media data sources and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically forecasts forward market value of compute capability based on information collected from social media data sources and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically forecasts forward market value of compute capability based on information collected from social media data sources and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically forecasts forward market value of compute capability based on information collected from social media data sources and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically forecasts forward market value of compute capability based on information collected from social media data sources and having a machine that automatically allocates its energy capacity among a core task, a compute task, an energy storage task, a data storage task, and a networking task. In embodiments, provided herein is a transaction-enabling system having a machine that automatically forecasts forward market value of compute capability based on information collected from social media data sources and having a machine that automatically allocates its compute capacity among a core task, a compute task, an energy storage task, a data storage task, and a networking task. In embodiments, provided herein is a transaction-enabling system having a machine that automatically forecasts forward market value of compute capability based on information collected from social media data sources and having a machine that automatically allocates its networking capacity among a core task, a compute task, an energy storage task, a data storage task, and a networking task. In embodiments, provided herein is a transaction-enabling system having a machine that automatically forecasts forward market value of compute capability based on information collected from social media data sources and having a fleet of machines that automatically allocate collective energy capacity among a core task, a compute task, an energy storage task, a data storage task, and a networking task. In embodiments, provided herein is a transaction-enabling system having a machine that automatically forecasts forward market value of compute capability based on information collected from social media data sources and having a fleet of machines that automatically allocate collective compute capacity among a core task, a compute task, an energy storage task, a data storage task, and a networking task. In embodiments, provided herein is a transaction-enabling system having a machine that automatically forecasts forward market value of compute capability based on information collected from social media data sources and having a fleet of machines that automatically allocate collective networking capacity among a core task, a compute task, an energy storage task, a data storage task, and a networking task. In embodiments, provided herein is a transaction-enabling system having a machine that automatically forecasts forward market value of compute capability based on information collected from social media data sources and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically forecasts forward market value of compute capability based on information collected from social media data sources and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically forecasts forward market value of compute capability based on information collected from social media data sources and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically forecasts forward market value of compute capability based on information collected from social media data sources and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically forecasts forward market value of compute capability based on information collected from social media data sources and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically forecasts forward market value of compute capability based on information collected from social media data sources and having a distributed ledger that tokenizes an instruction set, such that operation on the distributed ledger provides provable access to the instruction set. In embodiments, provided herein is a transaction-enabling system having a machine that automatically forecasts forward market value of compute capability based on information collected from social media data sources and having a distributed ledger that tokenizes executable algorithmic logic, such that operation on the distributed ledger provides provable access to the executable algorithmic logic. In embodiments, provided herein is a transaction-enabling system having a machine that automatically forecasts forward market value of compute capability based on information collected from social media data sources and having a distributed ledger that tokenizes a 3D printer instruction set, such that operation on the distributed ledger provides provable access to the instruction set. In embodiments, provided herein is a transaction-enabling system having a machine that automatically forecasts forward market value of compute capability based on information collected from social media data sources and having a distributed ledger that tokenizes an instruction set for a coating process, such that operation on the distributed ledger provides provable access to the instruction set. In embodiments, provided herein is a transaction-enabling system having a machine that automatically forecasts forward market value of compute capability based on information collected from social media data sources and having a distributed ledger that tokenizes an instruction set for a semiconductor fabrication process, such that operation on the distributed ledger provides provable access to the fabrication process. In embodiments, provided herein is a transaction-enabling system having a machine that automatically forecasts forward market value of compute capability based on information collected from social media data sources and having a distributed ledger that tokenizes a firmware program, such that operation on the distributed ledger provides provable access to the firmware program. In embodiments, provided herein is a transaction-enabling system having a machine that automatically forecasts forward market value of compute capability based on information collected from social media data sources and having a distributed ledger that tokenizes an instruction set for an FPGA, such that operation on the distributed ledger provides provable access to the FPGA. In embodiments, provided herein is a transaction-enabling system having a machine that automatically forecasts forward market value of compute capability based on information collected from social media data sources and having a distributed ledger that tokenizes serverless code logic, such that operation on the distributed ledger provides provable access to the serverless code logic. In embodiments, provided herein is a transaction-enabling system having a machine that automatically forecasts forward market value of compute capability based on information collected from social media data sources and having a distributed ledger that tokenizes an instruction set for a crystal fabrication system, such that operation on the distributed ledger provides provable access to the instruction set. In embodiments, provided herein is a transaction-enabling system having a machine that automatically forecasts forward market value of compute capability based on information collected from social media data sources and having a distributed ledger that tokenizes an instruction set for a food preparation process, such that operation on the distributed ledger provides provable access to the instruction set. In embodiments, provided herein is a transaction-enabling system having a machine that automatically forecasts forward market value of compute capability based on information collected from social media data sources and having a distributed ledger that tokenizes an instruction set for a polymer production process, such that operation on the distributed ledger provides provable access to the instruction set. In embodiments, provided herein is a transaction-enabling system having a machine that automatically forecasts forward market value of compute capability based on information collected from social media data sources and having a distributed ledger that tokenizes an instruction set for chemical synthesis process, such that operation on the distributed ledger provides provable access to the instruction set. In embodiments, provided herein is a transaction-enabling system having a machine that automatically forecasts forward market value of compute capability based on information collected from social media data sources and having a distributed ledger that tokenizes an instruction set for a biological production process, such that operation on the distributed ledger provides provable access to the instruction set. In embodiments, provided herein is a transaction-enabling system having a machine that automatically forecasts forward market value of compute capability based on information collected from social media data sources and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically forecasts forward market value of compute capability based on information collected from social media data sources and having a distributed ledger that aggregates views of a trade secret into a chain that proves which and how many parties have viewed the trade secret. In embodiments, provided herein is a transaction-enabling system having a machine that automatically forecasts forward market value of compute capability based on information collected from social media data sources and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically forecasts forward market value of compute capability based on information collected from social media data sources and having a distributed ledger that tokenizes an item of intellectual property and a reporting system that reports an analytic result based on the operations performed on the distributed ledger or the intellectual property. In embodiments, provided herein is a transaction-enabling system having a machine that automatically forecasts forward market value of compute capability based on information collected from social media data sources and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically forecasts forward market value of compute capability based on information collected from social media data sources and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically forecasts forward market value of compute capability based on information collected from social media data sources and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically forecasts forward market value of compute capability based on information collected from social media data sources and having a self-executing cryptocurrency coin that commits a transaction upon recognizing a location-based parameter that provides favorable tax treatment. In embodiments, provided herein is a transaction-enabling system having a machine that automatically forecasts forward market value of compute capability based on information collected from social media data sources and having an expert system that uses machine learning to optimize the execution of cryptocurrency transactions based on tax status. In embodiments, provided herein is a transaction-enabling system having a machine that automatically forecasts forward market value of compute capability based on information collected from social media data sources and having an expert system that aggregates regulatory information covering cryptocurrency transactions and automatically selects a jurisdiction for an operation based on the regulatory information. In embodiments, provided herein is a transaction-enabling system having a machine that automatically forecasts forward market value of compute capability based on information collected from social media data sources and having an expert system that uses machine learning to optimize the execution of a cryptocurrency transaction based on real time energy price information for an available energy source. In embodiments, provided herein is a transaction-enabling system having a machine that automatically forecasts forward market value of compute capability based on information collected from social media data sources and having an expert system that uses machine learning to optimize the execution of a cryptocurrency transaction based on an understanding of available energy sources to power computing resources to execute the transaction. In embodiments, provided herein is a transaction-enabling system having a machine that automatically forecasts forward market value of compute capability based on information collected from social media data sources and having an expert system that uses machine learning to optimize charging and recharging cycle of a rechargeable battery system to provide energy for execution of a cryptocurrency transaction. In embodiments, provided herein is a transaction-enabling system having a machine that automatically forecasts forward market value of compute capability based on information collected from social media data sources and having an expert system that predicts a forward market price in a market based on an understanding obtained by analyzing Internet of Things data sources and executes a transaction based on the forward market prediction. In embodiments, provided herein is a transaction-enabling system having a machine that automatically forecasts forward market value of compute capability based on information collected from social media data sources and having an expert system that predicts a forward market price in a market based on an understanding obtained by analyzing social network data sources and executes a transaction based on the forward market prediction. In embodiments, provided herein is a transaction-enabling system having a machine that automatically forecasts forward market value of compute capability based on information collected from social media data sources and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically forecasts forward market value of compute capability based on information collected from social media data sources and having an expert system that predicts a forward market price in a market based on an understanding obtained by analyzing social network data sources and executes a cryptocurrency transaction based on the forward market prediction. In embodiments, provided herein is a transaction-enabling system having a machine that automatically forecasts forward market value of compute capability based on information collected from social media data sources and having an expert system that predicts a forward market price in an energy market based on an understanding obtained by analyzing Internet of Things data sources and executes a transaction based on the forward market prediction. In embodiments, provided herein is a transaction-enabling system having a machine that automatically forecasts forward market value of compute capability based on information collected from social media data sources and having an expert system that predicts a forward market price in an energy market based on an understanding obtained by analyzing social network data sources and executes a transaction based on the forward market prediction. In embodiments, provided herein is a transaction-enabling system having a machine that automatically forecasts forward market value of compute capability based on information collected from social media data sources and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically forecasts forward market value of compute capability based on information collected from social media data sources and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically forecasts forward market value of compute capability based on information collected from social media data sources and having an expert system that predicts a forward market price in a market for computing resources based on an understanding obtained by analyzing social network data sources and executes a transaction based on the forward market prediction. In embodiments, provided herein is a transaction-enabling system having a machine that automatically forecasts forward market value of compute capability based on information collected from social media data sources and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically forecasts forward market value of compute capability based on information collected from social media data sources and having an expert system that predicts a forward market price in a market for advertising based on an understanding obtained by analyzing social network data sources and executes a transaction based on the forward market prediction. In embodiments, provided herein is a transaction-enabling system having a machine that automatically forecasts forward market value of compute capability based on information collected from social media data sources and having a machine that automatically forecasts forward market pricing of energy prices based on information collected from automated agent behavioral data sources. In embodiments, provided herein is a transaction-enabling system having a machine that automatically forecasts forward market value of compute capability based on information collected from social media data sources and having a machine that automatically forecasts forward market pricing of network spectrum based on information collected from automated agent behavioral data sources. In embodiments, provided herein is a transaction-enabling system having a machine that automatically forecasts forward market value of compute capability based on information collected from social media data sources and having a machine that automatically forecasts forward market pricing of energy credits based on information collected from automated agent behavioral data sources. In embodiments, provided herein is a transaction-enabling system having a machine that automatically forecasts forward market value of compute capability based on information collected from social media data sources and having a machine that automatically forecasts forward market value of compute capability based on information collected from automated agent behavioral data sources. In embodiments, provided herein is a transaction-enabling system having a machine that automatically forecasts forward market value of compute capability based on information collected from social media data sources and having a machine that automatically forecasts forward market pricing of energy prices based on information collected from business entity behavioral data sources. In embodiments, provided herein is a transaction-enabling system having a machine that automatically forecasts forward market value of compute capability based on information collected from social media data sources and having a machine that automatically forecasts forward market pricing of network spectrum based on information collected from business entity behavioral data sources. In embodiments, provided herein is a transaction-enabling system having a machine that automatically forecasts forward market value of compute capability based on information collected from social media data sources and having a machine that automatically forecasts forward market pricing of energy credits based on information collected from business entity behavioral data sources. In embodiments, provided herein is a transaction-enabling system having a machine that automatically forecasts forward market value of compute capability based on information collected from social media data sources and having a machine that automatically forecasts forward market value of compute capability based on information collected from business entity behavioral data sources. In embodiments, provided herein is a transaction-enabling system having a machine that automatically forecasts forward market value of compute capability based on information collected from social media data sources and having a machine that automatically forecasts forward market pricing of energy prices based on information collected from human behavioral data sources. In embodiments, provided herein is a transaction-enabling system having a machine that automatically forecasts forward market value of compute capability based on information collected from social media data sources and having a machine that automatically forecasts forward market pricing of network spectrum based on information collected from human behavioral data sources. In embodiments, provided herein is a transaction-enabling system having a machine that automatically forecasts forward market value of compute capability based on information collected from social media data sources and having a machine that automatically forecasts forward market pricing of energy credits based on information collected from human behavioral data sources. In embodiments, provided herein is a transaction-enabling system having a machine that automatically forecasts forward market value of compute capability based on information collected from social media data sources and having a machine that automatically forecasts forward market value of compute capability based on information collected from human behavioral data sources. In embodiments, provided herein is a transaction-enabling system having a machine that automatically forecasts forward market value of compute capability based on information collected from social media data sources and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically forecasts forward market value of compute capability based on information collected from social media data sources and having an intelligent agent that is configured to solicit the attention resources of another external intelligent agent. In embodiments, provided herein is a transaction-enabling system having a machine that automatically forecasts forward market value of compute capability based on information collected from social media data sources and having a machine that automatically purchases attention resources in a forward market for attention. In embodiments, provided herein is a transaction-enabling system having a machine that automatically forecasts forward market value of compute capability based on information collected from social media data sources and having a fleet of machines that automatically aggregate purchasing in a forward market for attention. In embodiments, provided herein is a transaction-enabling system having a machine that automatically forecasts forward market value of compute capability based on information collected from social media data sources and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically forecasts forward market value of compute capability based on information collected from social media data sources and having a system for learning on a training set of facility outcomes, facility parameters, and data collected from data sources to train an artificial intelligence/machine learning system to predict a facility production outcome. In embodiments, provided herein is a transaction-enabling system having a machine that automatically forecasts forward market value of compute capability based on information collected from social media data sources and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically forecasts forward market value of compute capability based on information collected from social media data sources and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically forecasts forward market value of compute capability based on information collected from social media data sources and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically forecasts forward market value of compute capability based on information collected from social media data sources and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically forecasts forward market value of compute capability based on information collected from social media data sources and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically forecasts forward market value of compute capability based on information collected from social media data sources and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically forecasts forward market value of compute capability based on information collected from social media data sources and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically forecasts forward market value of compute capability based on information collected from social media data sources and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically forecasts forward market value of compute capability based on information collected from social media data sources and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically forecasts forward market value of compute capability based on information collected from social media data sources and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically forecasts forward market value of compute capability based on information collected from social media data sources and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically forecasts forward market value of compute capability based on information collected from social media data sources and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically allocates its energy capacity among a core task, a compute task, an energy storage task, a data storage task and a networking task. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically allocates its compute capacity among a core task, a compute task, an energy storage task, a data storage task and a networking task. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically allocates its networking capacity among a core task, a compute task, an energy storage task, a data storage task and a networking task. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a fleet of machines that automatically allocate collective energy capacity among a core task, a compute task, an energy storage task, a data storage task and a networking task. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a fleet of machines that automatically allocate collective compute capacity among a core task, a compute task, an energy storage task, a data storage task and a networking task. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a fleet of machines that automatically allocate collective networking capacity among a core task, a compute task, an energy storage task, a data storage task and a networking task. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes an instruction set, such that operation on the distributed ledger provides provable access to the instruction set. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes executable algorithmic logic, such that operation on the distributed ledger provides provable access to the executable algorithmic logic. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes a 3D printer instruction set, such that operation on the distributed ledger provides provable access to the instruction set. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes an instruction set for a coating process, such that operation on the distributed ledger provides provable access to the instruction set. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes an instruction set for a semiconductor fabrication process, such that operation on the distributed ledger provides provable access to the fabrication process. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes a firmware program, such that operation on the distributed ledger provides provable access to the firmware program. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes an instruction set for an FPGA, such that operation on the distributed ledger provides provable access to the FPGA. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes serverless code logic, such that operation on the distributed ledger provides provable access to the serverless code logic. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes an instruction set for a crystal fabrication system, such that operation on the distributed ledger provides provable access to the instruction set. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes an instruction set for a food preparation process, such that operation on the distributed ledger provides provable access to the instruction set. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes an instruction set for a polymer production process, such that operation on the distributed ledger provides provable access to the instruction set. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes an instruction set for chemical synthesis process, such that operation on the distributed ledger provides provable access to the instruction set. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes an instruction set for a biological production process, such that operation on the distributed ledger provides provable access to the instruction set. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that aggregates views of a trade secret into a chain that proves which and how many parties have viewed the trade secret. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that tokenizes an item of intellectual property and a reporting system that reports an analytic result based on the operations performed on the distributed ledger or the intellectual property. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a self-executing cryptocurrency coin that commits a transaction upon recognizing a location-based parameter that provides favorable tax treatment. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that uses machine learning to optimize the execution of cryptocurrency transactions based on tax status. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that aggregates regulatory information covering cryptocurrency transactions and automatically selects a jurisdiction for an operation based on the regulatory information. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that uses machine learning to optimize the execution of a cryptocurrency transaction based on real time energy price information for an available energy source. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that uses machine learning to optimize the execution of a cryptocurrency transaction based on an understanding of available energy sources to power computing resources to execute the transaction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that uses machine learning to optimize charging and recharging cycle of a rechargeable battery system to provide energy for execution of a cryptocurrency transaction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in a market based on an understanding obtained by analyzing Internet of Things data sources and executes a transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in a market based on an understanding obtained by analyzing social network data sources and executes a transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in a market based on an understanding obtained by analyzing social network data sources and executes a cryptocurrency transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in an energy market based on an understanding obtained by analyzing Internet of Things data sources and executes a transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in an energy market based on an understanding obtained by analyzing social network data sources and executes a transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in a market for computing resources based on an understanding obtained by analyzing social network data sources and executes a transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in a market for advertising based on an understanding obtained by analyzing social network data sources and executes a transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market pricing of energy prices based on information collected from automated agent behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market pricing of network spectrum based on information collected from automated agent behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market pricing of energy credits based on information collected from automated agent behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market value of compute capability based on information collected from automated agent behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market pricing of energy prices based on information collected from business entity behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market pricing of network spectrum based on information collected from business entity behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market pricing of energy credits based on information collected from business entity behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market value of compute capability based on information collected from business entity behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market pricing of energy prices based on information collected from human behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market pricing of network spectrum based on information collected from human behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market pricing of energy credits based on information collected from human behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically forecasts forward market value of compute capability based on information collected from human behavioral data sources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an intelligent agent that is configured to solicit the attention resources of another external intelligent agent. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a machine that automatically purchases attention resources in a forward market for attention. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a fleet of machines that automatically aggregate purchasing in a forward market for attention. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to predict a facility production outcome. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically executes an arbitrage strategy for purchase or sale of compute capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically allocates its energy capacity among a core task, a compute task, an energy storage task, a data storage task and a networking task. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically allocates its compute capacity among a core task, a compute task, an energy storage task, a data storage task and a networking task. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically allocates its networking capacity among a core task, a compute task, an energy storage task, a data storage task and a networking task. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a fleet of machines that automatically allocate collective energy capacity among a core task, a compute task, an energy storage task, a data storage task and a networking task. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a fleet of machines that automatically allocate collective compute capacity among a core task, a compute task, an energy storage task, a data storage task and a networking task. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a fleet of machines that automatically allocate collective networking capacity among a core task, a compute task, an energy storage task, a data storage task and a networking task. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes an instruction set, such that operation on the distributed ledger provides provable access to the instruction set. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes executable algorithmic logic, such that operation on the distributed ledger provides provable access to the executable algorithmic logic. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes a 3D printer instruction set, such that operation on the distributed ledger provides provable access to the instruction set. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes an instruction set for a coating process, such that operation on the distributed ledger provides provable access to the instruction set. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes an instruction set for a semiconductor fabrication process, such that operation on the distributed ledger provides provable access to the fabrication process. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes a firmware program, such that operation on the distributed ledger provides provable access to the firmware program. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes an instruction set for an FPGA, such that operation on the distributed ledger provides provable access to the FPGA. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes serverless code logic, such that operation on the distributed ledger provides provable access to the serverless code logic. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes an instruction set for a crystal fabrication system, such that operation on the distributed ledger provides provable access to the instruction set. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes an instruction set for a food preparation process, such that operation on the distributed ledger provides provable access to the instruction set. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes an instruction set for a polymer production process, such that operation on the distributed ledger provides provable access to the instruction set. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes an instruction set for chemical synthesis process, such that operation on the distributed ledger provides provable access to the instruction set. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes an instruction set for a biological production process, such that operation on the distributed ledger provides provable access to the instruction set. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that aggregates views of a trade secret into a chain that proves which and how many parties have viewed the trade secret. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that tokenizes an item of intellectual property and a reporting system that reports an analytic result based on the operations performed on the distributed ledger or the intellectual property. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a self-executing cryptocurrency coin that commits a transaction upon recognizing a location-based parameter that provides favorable tax treatment. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that uses machine learning to optimize the execution of cryptocurrency transactions based on tax status. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that aggregates regulatory information covering cryptocurrency transactions and automatically selects a jurisdiction for an operation based on the regulatory information. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that uses machine learning to optimize the execution of a cryptocurrency transaction based on real time energy price information for an available energy source. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that uses machine learning to optimize the execution of a cryptocurrency transaction based on an understanding of available energy sources to power computing resources to execute the transaction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that uses machine learning to optimize charging and recharging cycle of a rechargeable battery system to provide energy for execution of a cryptocurrency transaction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in a market based on an understanding obtained by analyzing Internet of Things data sources and executes a transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in a market based on an understanding obtained by analyzing social network data sources and executes a transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in a market based on an understanding obtained by analyzing social network data sources and executes a cryptocurrency transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in an energy market based on an understanding obtained by analyzing Internet of Things data sources and executes a transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in an energy market based on an understanding obtained by analyzing social network data sources and executes a transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in a market for computing resources based on an understanding obtained by analyzing social network data sources and executes a transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in a market for advertising based on an understanding obtained by analyzing social network data sources and executes a transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market pricing of energy prices based on information collected from automated agent behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market pricing of network spectrum based on information collected from automated agent behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market pricing of energy credits based on information collected from automated agent behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market value of compute capability based on information collected from automated agent behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market pricing of energy prices based on information collected from business entity behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market pricing of network spectrum based on information collected from business entity behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market pricing of energy credits based on information collected from business entity behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market value of compute capability based on information collected from business entity behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market pricing of energy prices based on information collected from human behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market pricing of network spectrum based on information collected from human behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market pricing of energy credits based on information collected from human behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically forecasts forward market value of compute capability based on information collected from human behavioral data sources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an intelligent agent that is configured to solicit the attention resources of another external intelligent agent. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a machine that automatically purchases attention resources in a forward market for attention. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a fleet of machines that automatically aggregate purchasing in a forward market for attention. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to predict a facility production outcome. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically executes an arbitrage strategy for purchase or sale of energy storage capacity by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically allocates its energy capacity among a core task, a compute task, an energy storage task, a data storage task and a networking task. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically allocates its compute capacity among a core task, a compute task, an energy storage task, a data storage task and a networking task. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically allocates its networking capacity among a core task, a compute task, an energy storage task, a data storage task and a networking task. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a fleet of machines that automatically allocate collective energy capacity among a core task, a compute task, an energy storage task, a data storage task and a networking task. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a fleet of machines that automatically allocate collective compute capacity among a core task, a compute task, an energy storage task, a data storage task and a networking task. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a fleet of machines that automatically allocate collective networking capacity among a core task, a compute task, an energy storage task, a data storage task and a networking task. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes an instruction set, such that operation on the distributed ledger provides provable access to the instruction set. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes executable algorithmic logic, such that operation on the distributed ledger provides provable access to the executable algorithmic logic. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes a 3D printer instruction set, such that operation on the distributed ledger provides provable access to the instruction set. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes an instruction set for a coating process, such that operation on the distributed ledger provides provable access to the instruction set. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes an instruction set for a semiconductor fabrication process, such that operation on the distributed ledger provides provable access to the fabrication process. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes a firmware program, such that operation on the distributed ledger provides provable access to the firmware program. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes an instruction set for an FPGA, such that operation on the distributed ledger provides provable access to the FPGA. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes serverless code logic, such that operation on the distributed ledger provides provable access to the serverless code logic. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes an instruction set for a crystal fabrication system, such that operation on the distributed ledger provides provable access to the instruction set. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes an instruction set for a food preparation process, such that operation on the distributed ledger provides provable access to the instruction set. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes an instruction set for a polymer production process, such that operation on the distributed ledger provides provable access to the instruction set. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes an instruction set for chemical synthesis process, such that operation on the distributed ledger provides provable access to the instruction set. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes an instruction set for a biological production process, such that operation on the distributed ledger provides provable access to the instruction set. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that aggregates views of a trade secret into a chain that proves which and how many parties have viewed the trade secret. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that tokenizes an item of intellectual property and a reporting system that reports an analytic result based on the operations performed on the distributed ledger or the intellectual property. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a self-executing cryptocurrency coin that commits a transaction upon recognizing a location-based parameter that provides favorable tax treatment. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that uses machine learning to optimize the execution of cryptocurrency transactions based on tax status. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that aggregates regulatory information covering cryptocurrency transactions and automatically selects a jurisdiction for an operation based on the regulatory information. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that uses machine learning to optimize the execution of a cryptocurrency transaction based on real time energy price information for an available energy source. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that uses machine learning to optimize the execution of a cryptocurrency transaction based on an understanding of available energy sources to power computing resources to execute the transaction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that uses machine learning to optimize charging and recharging cycle of a rechargeable battery system to provide energy for execution of a cryptocurrency transaction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in a market based on an understanding obtained by analyzing Internet of Things data sources and executes a transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in a market based on an understanding obtained by analyzing social network data sources and executes a transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in a market based on an understanding obtained by analyzing social network data sources and executes a cryptocurrency transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in an energy market based on an understanding obtained by analyzing Internet of Things data sources and executes a transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in an energy market based on an understanding obtained by analyzing social network data sources and executes a transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in a market for computing resources based on an understanding obtained by analyzing social network data sources and executes a transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in a market for advertising based on an understanding obtained by analyzing social network data sources and executes a transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market pricing of energy prices based on information collected from automated agent behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market pricing of network spectrum based on information collected from automated agent behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market pricing of energy credits based on information collected from automated agent behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market value of compute capability based on information collected from automated agent behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market pricing of energy prices based on information collected from business entity behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market pricing of network spectrum based on information collected from business entity behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market pricing of energy credits based on information collected from business entity behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market value of compute capability based on information collected from business entity behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market pricing of energy prices based on information collected from human behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market pricing of network spectrum based on information collected from human behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market pricing of energy credits based on information collected from human behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically forecasts forward market value of compute capability based on information collected from human behavioral data sources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an intelligent agent that is configured to solicit the attention resources of another external intelligent agent. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a machine that automatically purchases attention resources in a forward market for attention. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a fleet of machines that automatically aggregate purchasing in a forward market for attention. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to predict a facility production outcome. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically executes an arbitrage strategy for purchase or sale of network spectrum or bandwidth by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically allocates its energy capacity among a core task, a compute task, an energy storage task, a data storage task and a networking task. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically allocates its compute capacity among a core task, a compute task, an energy storage task, a data storage task and a networking task. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically allocates its networking capacity among a core task, a compute task, an energy storage task, a data storage task and a networking task. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a fleet of machines that automatically allocate collective energy capacity among a core task, a compute task, an energy storage task, a data storage task and a networking task. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a fleet of machines that automatically allocate collective compute capacity among a core task, a compute task, an energy storage task, a data storage task and a networking task. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a fleet of machines that automatically allocate collective networking capacity among a core task, a compute task, an energy storage task, a data storage task and a networking task. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes an instruction set, such that operation on the distributed ledger provides provable access to the instruction set. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes executable algorithmic logic, such that operation on the distributed ledger provides provable access to the executable algorithmic logic. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes a 3D printer instruction set, such that operation on the distributed ledger provides provable access to the instruction set. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes an instruction set for a coating process, such that operation on the distributed ledger provides provable access to the instruction set. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes an instruction set for a semiconductor fabrication process, such that operation on the distributed ledger provides provable access to the fabrication process. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes a firmware program, such that operation on the distributed ledger provides provable access to the firmware program. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes an instruction set for an FPGA, such that operation on the distributed ledger provides provable access to the FPGA. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes serverless code logic, such that operation on the distributed ledger provides provable access to the serverless code logic. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes an instruction set for a crystal fabrication system, such that operation on the distributed ledger provides provable access to the instruction set. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes an instruction set for a food preparation process, such that operation on the distributed ledger provides provable access to the instruction set. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes an instruction set for a polymer production process, such that operation on the distributed ledger provides provable access to the instruction set. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes an instruction set for chemical synthesis process, such that operation on the distributed ledger provides provable access to the instruction set. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes an instruction set for a biological production process, such that operation on the distributed ledger provides provable access to the instruction set. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that aggregates views of a trade secret into a chain that proves which and how many parties have viewed the trade secret. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that tokenizes an item of intellectual property and a reporting system that reports an analytic result based on the operations performed on the distributed ledger or the intellectual property. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a self-executing cryptocurrency coin that commits a transaction upon recognizing a location-based parameter that provides favorable tax treatment. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that uses machine learning to optimize the execution of cryptocurrency transactions based on tax status. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that aggregates regulatory information covering cryptocurrency transactions and automatically selects a jurisdiction for an operation based on the regulatory information. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that uses machine learning to optimize the execution of a cryptocurrency transaction based on real time energy price information for an available energy source. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that uses machine learning to optimize the execution of a cryptocurrency transaction based on an understanding of available energy sources to power computing resources to execute the transaction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that uses machine learning to optimize charging and recharging cycle of a rechargeable battery system to provide energy for execution of a cryptocurrency transaction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in a market based on an understanding obtained by analyzing Internet of Things data sources and executes a transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in a market based on an understanding obtained by analyzing social network data sources and executes a transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in a market based on an understanding obtained by analyzing social network data sources and executes a cryptocurrency transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in an energy market based on an understanding obtained by analyzing Internet of Things data sources and executes a transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in an energy market based on an understanding obtained by analyzing social network data sources and executes a transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in a market for computing resources based on an understanding obtained by analyzing social network data sources and executes a transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in a market for advertising based on an understanding obtained by analyzing social network data sources and executes a transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market pricing of energy prices based on information collected from automated agent behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market pricing of network spectrum based on information collected from automated agent behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market pricing of energy credits based on information collected from automated agent behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market value of compute capability based on information collected from automated agent behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market pricing of energy prices based on information collected from business entity behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market pricing of network spectrum based on information collected from business entity behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market pricing of energy credits based on information collected from business entity behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market value of compute capability based on information collected from business entity behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market pricing of energy prices based on information collected from human behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market pricing of network spectrum based on information collected from human behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market pricing of energy credits based on information collected from human behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically forecasts forward market value of compute capability based on information collected from human behavioral data sources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an intelligent agent that is configured to solicit the attention resources of another external intelligent agent. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a machine that automatically purchases attention resources in a forward market for attention. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a fleet of machines that automatically aggregate purchasing in a forward market for attention. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to predict a facility production outcome. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically executes an arbitrage strategy for purchase or sale of energy by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically allocates its energy capacity among a core task, a compute task, an energy storage task, a data storage task and a networking task. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically allocates its compute capacity among a core task, a compute task, an energy storage task, a data storage task and a networking task. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically allocates its networking capacity among a core task, a compute task, an energy storage task, a data storage task and a networking task. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a fleet of machines that automatically allocate collective energy capacity among a core task, a compute task, an energy storage task, a data storage task and a networking task. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a fleet of machines that automatically allocate collective compute capacity among a core task, a compute task, an energy storage task, a data storage task and a networking task. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a fleet of machines that automatically allocate collective networking capacity among a core task, a compute task, an energy storage task, a data storage task and a networking task. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes an instruction set, such that operation on the distributed ledger provides provable access to the instruction set. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes executable algorithmic logic, such that operation on the distributed ledger provides provable access to the executable algorithmic logic. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes a 3D printer instruction set, such that operation on the distributed ledger provides provable access to the instruction set. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes an instruction set for a coating process, such that operation on the distributed ledger provides provable access to the instruction set. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes an instruction set for a semiconductor fabrication process, such that operation on the distributed ledger provides provable access to the fabrication process. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes a firmware program, such that operation on the distributed ledger provides provable access to the firmware program. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes an instruction set for an FPGA, such that operation on the distributed ledger provides provable access to the FPGA. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes serverless code logic, such that operation on the distributed ledger provides provable access to the serverless code logic. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes an instruction set for a crystal fabrication system, such that operation on the distributed ledger provides provable access to the instruction set. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes an instruction set for a food preparation process, such that operation on the distributed ledger provides provable access to the instruction set. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes an instruction set for a polymer production process, such that operation on the distributed ledger provides provable access to the instruction set. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes an instruction set for chemical synthesis process, such that operation on the distributed ledger provides provable access to the instruction set. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes an instruction set for a biological production process, such that operation on the distributed ledger provides provable access to the instruction set. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that aggregates views of a trade secret into a chain that proves which and how many parties have viewed the trade secret. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that tokenizes an item of intellectual property and a reporting system that reports an analytic result based on the operations performed on the distributed ledger or the intellectual property. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a self-executing cryptocurrency coin that commits a transaction upon recognizing a location-based parameter that provides favorable tax treatment. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that uses machine learning to optimize the execution of cryptocurrency transactions based on tax status. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that aggregates regulatory information covering cryptocurrency transactions and automatically selects a jurisdiction for an operation based on the regulatory information. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that uses machine learning to optimize the execution of a cryptocurrency transaction based on real time energy price information for an available energy source. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that uses machine learning to optimize the execution of a cryptocurrency transaction based on an understanding of available energy sources to power computing resources to execute the transaction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that uses machine learning to optimize charging and recharging cycle of a rechargeable battery system to provide energy for execution of a cryptocurrency transaction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in a market based on an understanding obtained by analyzing Internet of Things data sources and executes a transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in a market based on an understanding obtained by analyzing social network data sources and executes a transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in a market based on an understanding obtained by analyzing social network data sources and executes a cryptocurrency transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in an energy market based on an understanding obtained by analyzing Internet of Things data sources and executes a transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in an energy market based on an understanding obtained by analyzing social network data sources and executes a transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in a market for computing resources based on an understanding obtained by analyzing social network data sources and executes a transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in a market for advertising based on an understanding obtained by analyzing social network data sources and executes a transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market pricing of energy prices based on information collected from automated agent behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market pricing of network spectrum based on information collected from automated agent behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market pricing of energy credits based on information collected from automated agent behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market value of compute capability based on information collected from automated agent behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market pricing of energy prices based on information collected from business entity behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market pricing of network spectrum based on information collected from business entity behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market pricing of energy credits based on information collected from business entity behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market value of compute capability based on information collected from business entity behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market pricing of energy prices based on information collected from human behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market pricing of network spectrum based on information collected from human behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market pricing of energy credits based on information collected from human behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically forecasts forward market value of compute capability based on information collected from human behavioral data sources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an intelligent agent that is configured to solicit the attention resources of another external intelligent agent. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a machine that automatically purchases attention resources in a forward market for attention. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a fleet of machines that automatically aggregate purchasing in a forward market for attention. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to predict a facility production outcome. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically executes an arbitrage strategy for purchase or sale of energy credits by testing a spot market for compute capacity with a small transaction and rapidly executing a larger transaction based on the outcome of the small transaction and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically allocates its energy capacity among a core task, a compute task, an energy storage task, a data storage task, and a networking task. In embodiments, provided herein is a transaction-enabling system having a machine that automatically allocates its energy capacity among a core task, a compute task, an energy storage task, a data storage task, and a networking task and having a machine that automatically allocates its compute capacity among a core task, a compute task, an energy storage task, a data storage task, and a networking task. In embodiments, provided herein is a transaction-enabling system having a machine that automatically allocates its energy capacity among a core task, a compute task, an energy storage task, a data storage task, and a networking task and having a machine that automatically allocates its networking capacity among a core task, a compute task, an energy storage task, a data storage task, and a networking task. In embodiments, provided herein is a transaction-enabling system having a machine that automatically allocates its energy capacity among a core task, a compute task, an energy storage task, a data storage task and a networking task and having a fleet of machines that automatically allocate collective energy capacity among a core task, a compute task, an energy storage task, a data storage task and a networking task. In embodiments, provided herein is a transaction-enabling system having a machine that automatically allocates its energy capacity among a core task, a compute task, an energy storage task, a data storage task and a networking task and having a fleet of machines that automatically allocate collective compute capacity among a core task, a compute task, an energy storage task, a data storage task and a networking task. In embodiments, provided herein is a transaction-enabling system having a machine that automatically allocates its energy capacity among a core task, a compute task, an energy storage task, a data storage task and a networking task and having a fleet of machines that automatically allocate collective networking capacity among a core task, a compute task, an energy storage task, a data storage task and a networking task. In embodiments, provided herein is a transaction-enabling system having a machine that automatically allocates its energy capacity among a core task, a compute task, an energy storage task, a data storage task and a networking task and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically allocates its energy capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically allocates its energy capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically allocates its energy capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically allocates its energy capacity among a core task, a compute task, an energy storage task, a data storage task and a networking task and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically allocates its energy capacity among a core task, a compute task, an energy storage task, a data storage task, and a networking task and having a distributed ledger that tokenizes an instruction set, such that operation on the distributed ledger provides provable access to the instruction set. In embodiments, provided herein is a transaction-enabling system having a machine that automatically allocates its energy capacity among a core task, a compute task, an energy storage task, a data storage task, and a networking task and having a distributed ledger that tokenizes executable algorithmic logic, such that operation on the distributed ledger provides provable access to the executable algorithmic logic. In embodiments, provided herein is a transaction-enabling system having a machine that automatically allocates its energy capacity among a core task, a compute task, an energy storage task, a data storage task, and a networking task and having a distributed ledger that tokenizes a 3D printer instruction set, such that operation on the distributed ledger provides provable access to the instruction set. In embodiments, provided herein is a transaction-enabling system having a machine that automatically allocates its energy capacity among a core task, a compute task, an energy storage task, a data storage task and a networking task and having a distributed ledger that tokenizes an instruction set for a coating process, such that operation on the distributed ledger provides provable access to the instruction set. In embodiments, provided herein is a transaction-enabling system having a machine that automatically allocates its energy capacity among a core task, a compute task, an energy storage task, a data storage task and a networking task and having a distributed ledger that tokenizes an instruction set for a semiconductor fabrication process, such that operation on the distributed ledger provides provable access to the fabrication process. In embodiments, provided herein is a transaction-enabling system having a machine that automatically allocates its energy capacity among a core task, a compute task, an energy storage task, a data storage task, and a networking task and having a distributed ledger that tokenizes a firmware program, such that operation on the distributed ledger provides provable access to the firmware program. In embodiments, provided herein is a transaction-enabling system having a machine that automatically allocates its energy capacity among a core task, a compute task, an energy storage task, a data storage task, and a networking task and having a distributed ledger that tokenizes an instruction set for an FPGA, such that operation on the distributed ledger provides provable access to the FPGA. In embodiments, provided herein is a transaction-enabling system having a machine that automatically allocates its energy capacity among a core task, a compute task, an energy storage task, a data storage task, and a networking task and having a distributed ledger that tokenizes serverless code logic, such that operation on the distributed ledger provides provable access to the serverless code logic. In embodiments, provided herein is a transaction-enabling system having a machine that automatically allocates its energy capacity among a core task, a compute task, an energy storage task, a data storage task and a networking task and having a distributed ledger that tokenizes an instruction set for a crystal fabrication system, such that operation on the distributed ledger provides provable access to the instruction set. In embodiments, provided herein is a transaction-enabling system having a machine that automatically allocates its energy capacity among a core task, a compute task, an energy storage task, a data storage task and a networking task and having a distributed ledger that tokenizes an instruction set for a food preparation process, such that operation on the distributed ledger provides provable access to the instruction set. In embodiments, provided herein is a transaction-enabling system having a machine that automatically allocates its energy capacity among a core task, a compute task, an energy storage task, a data storage task and a networking task and having a distributed ledger that tokenizes an instruction set for a polymer production process, such that operation on the distributed ledger provides provable access to the instruction set. In embodiments, provided herein is a transaction-enabling system having a machine that automatically allocates its energy capacity among a core task, a compute task, an energy storage task, a data storage task and a networking task and having a distributed ledger that tokenizes an instruction set for chemical synthesis process, such that operation on the distributed ledger provides provable access to the instruction set. In embodiments, provided herein is a transaction-enabling system having a machine that automatically allocates its energy capacity among a core task, a compute task, an energy storage task, a data storage task and a networking task and having a distributed ledger that tokenizes an instruction set for a biological production process, such that operation on the distributed ledger provides provable access to the instruction set. In embodiments, provided herein is a transaction-enabling system having a machine that automatically allocates its energy capacity among a core task, a compute task, an energy storage task, a data storage task and a networking task and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically allocates its energy capacity among a core task, a compute task, an energy storage task, a data storage task, and a networking task and having a distributed ledger that aggregates views of a trade secret into a chain that proves which and how many parties have viewed the trade secret. In embodiments, provided herein is a transaction-enabling system having a machine that automatically allocates its energy capacity among a core task, a compute task, an energy storage task, a data storage task and a networking task and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically allocates its energy capacity among a core task, a compute task, an energy storage task, a data storage task and a networking task and having a distributed ledger that tokenizes an item of intellectual property and a reporting system that reports an analytic result based on the operations performed on the distributed ledger or the intellectual property. In embodiments, provided herein is a transaction-enabling system having a machine that automatically allocates its energy capacity among a core task, a compute task, an energy storage task, a data storage task and a networking task and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically allocates its energy capacity among a core task, a compute task, an energy storage task, a data storage task and a networking task and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically allocates its energy capacity among a core task, a compute task, an energy storage task, a data storage task and a networking task and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically allocates its energy capacity among a core task, a compute task, an energy storage task, a data storage task, and a networking task and having a self-executing cryptocurrency coin that commits a transaction upon recognizing a location-based parameter that provides favorable tax treatment. In embodiments, provided herein is a transaction-enabling system having a machine that automatically allocates its energy capacity among a core task, a compute task, an energy storage task, a data storage task, and a networking task and having an expert system that uses machine learning to optimize the execution of cryptocurrency transactions based on tax status. In embodiments, provided herein is a transaction-enabling system having a machine that automatically allocates its energy capacity among a core task, a compute task, an energy storage task, a data storage task, and a networking task and having an expert system that aggregates regulatory information covering cryptocurrency transactions and automatically selects a jurisdiction for an operation based on the regulatory information. In embodiments, provided herein is a transaction-enabling system having a machine that automatically allocates its energy capacity among a core task, a compute task, an energy storage task, a data storage task and a networking task and having an expert system that uses machine learning to optimize the execution of a cryptocurrency transaction based on real time energy price information for an available energy source. In embodiments, provided herein is a transaction-enabling system having a machine that automatically allocates its energy capacity among a core task, a compute task, an energy storage task, a data storage task and a networking task and having an expert system that uses machine learning to optimize the execution of a cryptocurrency transaction based on an understanding of available energy sources to power computing resources to execute the transaction. In embodiments, provided herein is a transaction-enabling system having a machine that automatically allocates its energy capacity among a core task, a compute task, an energy storage task, a data storage task, and a networking task and having an expert system that uses machine learning to optimize charging and recharging cycle of a rechargeable battery system to provide energy for execution of a cryptocurrency transaction. In embodiments, provided herein is a transaction-enabling system having a machine that automatically allocates its energy capacity among a core task, a compute task, an energy storage task, a data storage task and a networking task and having an expert system that predicts a forward market price in a market based on an understanding obtained by analyzing Internet of Things data sources and executes a transaction based on the forward market prediction. In embodiments, provided herein is a transaction-enabling system having a machine that automatically allocates its energy capacity among a core task, a compute task, an energy storage task, a data storage task and a networking task and having an expert system that predicts a forward market price in a market based on an understanding obtained by analyzing social network data sources and executes a transaction based on the forward market prediction. In embodiments, provided herein is a transaction-enabling system having a machine that automatically allocates its energy capacity among a core task, a compute task, an energy storage task, a data storage task and a networking task and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically allocates its energy capacity among a core task, a compute task, an energy storage task, a data storage task and a networking task and having an expert system that predicts a forward market price in a market based on an understanding obtained by analyzing social network data sources and executes a cryptocurrency transaction based on the forward market prediction. In embodiments, provided herein is a transaction-enabling system having a machine that automatically allocates its energy capacity among a core task, a compute task, an energy storage task, a data storage task and a networking task and having an expert system that predicts a forward market price in an energy market based on an understanding obtained by analyzing Internet of Things data sources and executes a transaction based on the forward market prediction. In embodiments, provided herein is a transaction-enabling system having a machine that automatically allocates its energy capacity among a core task, a compute task, an energy storage task, a data storage task and a networking task and having an expert system that predicts a forward market price in an energy market based on an understanding obtained by analyzing social network data sources and executes a transaction based on the forward market prediction. In embodiments, provided herein is a transaction-enabling system having a machine that automatically allocates its energy capacity among a core task, a compute task, an energy storage task, a data storage task and a networking task and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically allocates its energy capacity among a core task, a compute task, an energy storage task, a data storage task and a networking task and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically allocates its energy capacity among a core task, a compute task, an energy storage task, a data storage task and a networking task and having an expert system that predicts a forward market price in a market for computing resources based on an understanding obtained by analyzing social network data sources and executes a transaction based on the forward market prediction. In embodiments, provided herein is a transaction-enabling system having a machine that automatically allocates its energy capacity among a core task, a compute task, an energy storage task, a data storage task and a networking task and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically allocates its energy capacity among a core task, a compute task, an energy storage task, a data storage task and a networking task and having an expert system that predicts a forward market price in a market for advertising based on an understanding obtained by analyzing social network data sources and executes a transaction based on the forward market prediction. In embodiments, provided herein is a transaction-enabling system having a machine that automatically allocates its energy capacity among a core task, a compute task, an energy storage task, a data storage task, and a networking task and having a machine that automatically forecasts forward market pricing of energy prices based on information collected from automated agent behavioral data sources. In embodiments, provided herein is a transaction-enabling system having a machine that automatically allocates its energy capacity among a core task, a compute task, an energy storage task, a data storage task, and a networking task and having a machine that automatically forecasts forward market pricing of network spectrum based on information collected from automated agent behavioral data sources. In embodiments, provided herein is a transaction-enabling system having a machine that automatically allocates its energy capacity among a core task, a compute task, an energy storage task, a data storage task, and a networking task and having a machine that automatically forecasts forward market pricing of energy credits based on information collected from automated agent behavioral data sources. In embodiments, provided herein is a transaction-enabling system having a machine that automatically allocates its energy capacity among a core task, a compute task, an energy storage task, a data storage task, and a networking task and having a machine that automatically forecasts forward market value of compute capability based on information collected from automated agent behavioral data sources. In embodiments, provided herein is a transaction-enabling system having a machine that automatically allocates its energy capacity among a core task, a compute task, an energy storage task, a data storage task, and a networking task and having a machine that automatically forecasts forward market pricing of energy prices based on information collected from business entity behavioral data sources. In embodiments, provided herein is a transaction-enabling system having a machine that automatically allocates its energy capacity among a core task, a compute task, an energy storage task, a data storage task, and a networking task and having a machine that automatically forecasts forward market pricing of network spectrum based on information collected from business entity behavioral data sources. In embodiments, provided herein is a transaction-enabling system having a machine that automatically allocates its energy capacity among a core task, a compute task, an energy storage task, a data storage task, and a networking task and having a machine that automatically forecasts forward market pricing of energy credits based on information collected from business entity behavioral data sources. In embodiments, provided herein is a transaction-enabling system having a machine that automatically allocates its energy capacity among a core task, a compute task, an energy storage task, a data storage task, and a networking task and having a machine that automatically forecasts forward market value of compute capability based on information collected from business entity behavioral data sources. In embodiments, provided herein is a transaction-enabling system having a machine that automatically allocates its energy capacity among a core task, a compute task, an energy storage task, a data storage task, and a networking task and having a machine that automatically forecasts forward market pricing of energy prices based on information collected from human behavioral data sources. In embodiments, provided herein is a transaction-enabling system having a machine that automatically allocates its energy capacity among a core task, a compute task, an energy storage task, a data storage task, and a networking task and having a machine that automatically forecasts forward market pricing of network spectrum based on information collected from human behavioral data sources. In embodiments, provided herein is a transaction-enabling system having a machine that automatically allocates its energy capacity among a core task, a compute task, an energy storage task, a data storage task, and a networking task and having a machine that automatically forecasts forward market pricing of energy credits based on information collected from human behavioral data sources. In embodiments, provided herein is a transaction-enabling system having a machine that automatically allocates its energy capacity among a core task, a compute task, an energy storage task, a data storage task, and a networking task and having a machine that automatically forecasts forward market value of compute capability based on information collected from human behavioral data sources. In embodiments, provided herein is a transaction-enabling system having a machine that automatically allocates its energy capacity among a core task, a compute task, an energy storage task, a data storage task and a networking task and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically allocates its energy capacity among a core task, a compute task, an energy storage task, a data storage task, and a networking task and having an intelligent agent that is configured to solicit the attention resources of another external intelligent agent. In embodiments, provided herein is a transaction-enabling system having a machine that automatically allocates its energy capacity among a core task, a compute task, an energy storage task, a data storage task, and a networking task and having a machine that automatically purchases attention resources in a forward market for attention. In embodiments, provided herein is a transaction-enabling system having a machine that automatically allocates its energy capacity among a core task, a compute task, an energy storage task, a data storage task, and a networking task and having a fleet of machines that automatically aggregate purchasing in a forward market for attention. In embodiments, provided herein is a transaction-enabling system having a machine that automatically allocates its energy capacity among a core task, a compute task, an energy storage task, a data storage task and a networking task and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically allocates its energy capacity among a core task, a compute task, an energy storage task, a data storage task and a networking task and having a system for learning on a training set of facility outcomes, facility parameters, and data collected from data sources to train an artificial intelligence/machine learning system to predict a facility production outcome. In embodiments, provided herein is a transaction-enabling system having a machine that automatically allocates its energy capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically allocates its energy capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically allocates its energy capacity among a core task, a compute task, an energy storage task, a data storage task and a networking task and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically allocates its energy capacity among a core task, a compute task, an energy storage task, a data storage task and a networking task and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically allocates its energy capacity among a core task, a compute task, an energy storage task, a data storage task and a networking task and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically allocates its energy capacity among a core task, a compute task, an energy storage task, a data storage task and a networking task and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically allocates its energy capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically allocates its energy capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically allocates its energy capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically allocates its energy capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically allocates its energy capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically allocates its energy capacity among a core task, a compute task, an energy storage task, a data storage task and a networking task and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically allocates its compute capacity among a core task, a compute task, an energy storage task, a data storage task, and a networking task. In embodiments, provided herein is a transaction-enabling system having a machine that automatically allocates its compute capacity among a core task, a compute task, an energy storage task, a data storage task, and a networking task and having a machine that automatically allocates its networking capacity among a core task, a compute task, an energy storage task, a data storage task, and a networking task. In embodiments, provided herein is a transaction-enabling system having a machine that automatically allocates its compute capacity among a core task, a compute task, an energy storage task, a data storage task and a networking task and having a fleet of machines that automatically allocate collective energy capacity among a core task, a compute task, an energy storage task, a data storage task and a networking task. In embodiments, provided herein is a transaction-enabling system having a machine that automatically allocates its compute capacity among a core task, a compute task, an energy storage task, a data storage task and a networking task and having a fleet of machines that automatically allocate collective compute capacity among a core task, a compute task, an energy storage task, a data storage task and a networking task. In embodiments, provided herein is a transaction-enabling system having a machine that automatically allocates its compute capacity among a core task, a compute task, an energy storage task, a data storage task and a networking task and having a fleet of machines that automatically allocate collective networking capacity among a core task, a compute task, an energy storage task, a data storage task and a networking task. In embodiments, provided herein is a transaction-enabling system having a machine that automatically allocates its compute capacity among a core task, a compute task, an energy storage task, a data storage task and a networking task and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically allocates its compute capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically allocates its compute capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically allocates its compute capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically allocates its compute capacity among a core task, a compute task, an energy storage task, a data storage task and a networking task and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically allocates its compute capacity among a core task, a compute task, an energy storage task, a data storage task, and a networking task and having a distributed ledger that tokenizes an instruction set, such that operation on the distributed ledger provides provable access to the instruction set. In embodiments, provided herein is a transaction-enabling system having a machine that automatically allocates its compute capacity among a core task, a compute task, an energy storage task, a data storage task, and a networking task and having a distributed ledger that tokenizes executable algorithmic logic, such that operation on the distributed ledger provides provable access to the executable algorithmic logic. In embodiments, provided herein is a transaction-enabling system having a machine that automatically allocates its compute capacity among a core task, a compute task, an energy storage task, a data storage task, and a networking task and having a distributed ledger that tokenizes a 3D printer instruction set, such that operation on the distributed ledger provides provable access to the instruction set. In embodiments, provided herein is a transaction-enabling system having a machine that automatically allocates its compute capacity among a core task, a compute task, an energy storage task, a data storage task and a networking task and having a distributed ledger that tokenizes an instruction set for a coating process, such that operation on the distributed ledger provides provable access to the instruction set. In embodiments, provided herein is a transaction-enabling system having a machine that automatically allocates its compute capacity among a core task, a compute task, an energy storage task, a data storage task and a networking task and having a distributed ledger that tokenizes an instruction set for a semiconductor fabrication process, such that operation on the distributed ledger provides provable access to the fabrication process. In embodiments, provided herein is a transaction-enabling system having a machine that automatically allocates its compute capacity among a core task, a compute task, an energy storage task, a data storage task, and a networking task and having a distributed ledger that tokenizes a firmware program, such that operation on the distributed ledger provides provable access to the firmware program. In embodiments, provided herein is a transaction-enabling system having a machine that automatically allocates its compute capacity among a core task, a compute task, an energy storage task, a data storage task, and a networking task and having a distributed ledger that tokenizes an instruction set for an FPGA, such that operation on the distributed ledger provides provable access to the FPGA. In embodiments, provided herein is a transaction-enabling system having a machine that automatically allocates its compute capacity among a core task, a compute task, an energy storage task, a data storage task, and a networking task and having a distributed ledger that tokenizes serverless code logic, such that operation on the distributed ledger provides provable access to the serverless code logic. In embodiments, provided herein is a transaction-enabling system having a machine that automatically allocates its compute capacity among a core task, a compute task, an energy storage task, a data storage task and a networking task and having a distributed ledger that tokenizes an instruction set for a crystal fabrication system, such that operation on the distributed ledger provides provable access to the instruction set. In embodiments, provided herein is a transaction-enabling system having a machine that automatically allocates its compute capacity among a core task, a compute task, an energy storage task, a data storage task and a networking task and having a distributed ledger that tokenizes an instruction set for a food preparation process, such that operation on the distributed ledger provides provable access to the instruction set. In embodiments, provided herein is a transaction-enabling system having a machine that automatically allocates its compute capacity among a core task, a compute task, an energy storage task, a data storage task and a networking task and having a distributed ledger that tokenizes an instruction set for a polymer production process, such that operation on the distributed ledger provides provable access to the instruction set. In embodiments, provided herein is a transaction-enabling system having a machine that automatically allocates its compute capacity among a core task, a compute task, an energy storage task, a data storage task and a networking task and having a distributed ledger that tokenizes an instruction set for chemical synthesis process, such that operation on the distributed ledger provides provable access to the instruction set. In embodiments, provided herein is a transaction-enabling system having a machine that automatically allocates its compute capacity among a core task, a compute task, an energy storage task, a data storage task and a networking task and having a distributed ledger that tokenizes an instruction set for a biological production process, such that operation on the distributed ledger provides provable access to the instruction set. In embodiments, provided herein is a transaction-enabling system having a machine that automatically allocates its compute capacity among a core task, a compute task, an energy storage task, a data storage task and a networking task and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically allocates its compute capacity among a core task, a compute task, an energy storage task, a data storage task, and a networking task and having a distributed ledger that aggregates views of a trade secret into a chain that proves which and how many parties have viewed the trade secret. In embodiments, provided herein is a transaction-enabling system having a machine that automatically allocates its compute capacity among a core task, a compute task, an energy storage task, a data storage task and a networking task and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically allocates its compute capacity among a core task, a compute task, an energy storage task, a data storage task and a networking task and having a distributed ledger that tokenizes an item of intellectual property and a reporting system that reports an analytic result based on the operations performed on the distributed ledger or the intellectual property. In embodiments, provided herein is a transaction-enabling system having a machine that automatically allocates its compute capacity among a core task, a compute task, an energy storage task, a data storage task and a networking task and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically allocates its compute capacity among a core task, a compute task, an energy storage task, a data storage task and a networking task and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically allocates its compute capacity among a core task, a compute task, an energy storage task, a data storage task and a networking task and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically allocates its compute capacity among a core task, a compute task, an energy storage task, a data storage task, and a networking task and having a self-executing cryptocurrency coin that commits a transaction upon recognizing a location-based parameter that provides favorable tax treatment. In embodiments, provided herein is a transaction-enabling system having a machine that automatically allocates its compute capacity among a core task, a compute task, an energy storage task, a data storage task, and a networking task and having an expert system that uses machine learning to optimize the execution of cryptocurrency transactions based on tax status. In embodiments, provided herein is a transaction-enabling system having a machine that automatically allocates its compute capacity among a core task, a compute task, an energy storage task, a data storage task, and a networking task and having an expert system that aggregates regulatory information covering cryptocurrency transactions and automatically selects a jurisdiction for an operation based on the regulatory information. In embodiments, provided herein is a transaction-enabling system having a machine that automatically allocates its compute capacity among a core task, a compute task, an energy storage task, a data storage task and a networking task and having an expert system that uses machine learning to optimize the execution of a cryptocurrency transaction based on real time energy price information for an available energy source. In embodiments, provided herein is a transaction-enabling system having a machine that automatically allocates its compute capacity among a core task, a compute task, an energy storage task, a data storage task and a networking task and having an expert system that uses machine learning to optimize the execution of a cryptocurrency transaction based on an understanding of available energy sources to power computing resources to execute the transaction. In embodiments, provided herein is a transaction-enabling system having a machine that automatically allocates its compute capacity among a core task, a compute task, an energy storage task, a data storage task, and a networking task and having an expert system that uses machine learning to optimize charging and recharging cycle of a rechargeable battery system to provide energy for execution of a cryptocurrency transaction. In embodiments, provided herein is a transaction-enabling system having a machine that automatically allocates its compute capacity among a core task, a compute task, an energy storage task, a data storage task and a networking task and having an expert system that predicts a forward market price in a market based on an understanding obtained by analyzing Internet of Things data sources and executes a transaction based on the forward market prediction. In embodiments, provided herein is a transaction-enabling system having a machine that automatically allocates its compute capacity among a core task, a compute task, an energy storage task, a data storage task and a networking task and having an expert system that predicts a forward market price in a market based on an understanding obtained by analyzing social network data sources and executes a transaction based on the forward market prediction. In embodiments, provided herein is a transaction-enabling system having a machine that automatically allocates its compute capacity among a core task, a compute task, an energy storage task, a data storage task and a networking task and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically allocates its compute capacity among a core task, a compute task, an energy storage task, a data storage task and a networking task and having an expert system that predicts a forward market price in a market based on an understanding obtained by analyzing social network data sources and executes a cryptocurrency transaction based on the forward market prediction. In embodiments, provided herein is a transaction-enabling system having a machine that automatically allocates its compute capacity among a core task, a compute task, an energy storage task, a data storage task and a networking task and having an expert system that predicts a forward market price in an energy market based on an understanding obtained by analyzing Internet of Things data sources and executes a transaction based on the forward market prediction. In embodiments, provided herein is a transaction-enabling system having a machine that automatically allocates its compute capacity among a core task, a compute task, an energy storage task, a data storage task and a networking task and having an expert system that predicts a forward market price in an energy market based on an understanding obtained by analyzing social network data sources and executes a transaction based on the forward market prediction. In embodiments, provided herein is a transaction-enabling system having a machine that automatically allocates its compute capacity among a core task, a compute task, an energy storage task, a data storage task and a networking task and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically allocates its compute capacity among a core task, a compute task, an energy storage task, a data storage task and a networking task and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically allocates its compute capacity among a core task, a compute task, an energy storage task, a data storage task and a networking task and having an expert system that predicts a forward market price in a market for computing resources based on an understanding obtained by analyzing social network data sources and executes a transaction based on the forward market prediction. In embodiments, provided herein is a transaction-enabling system having a machine that automatically allocates its compute capacity among a core task, a compute task, an energy storage task, a data storage task and a networking task and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically allocates its compute capacity among a core task, a compute task, an energy storage task, a data storage task and a networking task and having an expert system that predicts a forward market price in a market for advertising based on an understanding obtained by analyzing social network data sources and executes a transaction based on the forward market prediction. In embodiments, provided herein is a transaction-enabling system having a machine that automatically allocates its compute capacity among a core task, a compute task, an energy storage task, a data storage task, and a networking task and having a machine that automatically forecasts forward market pricing of energy prices based on information collected from automated agent behavioral data sources. In embodiments, provided herein is a transaction-enabling system having a machine that automatically allocates its compute capacity among a core task, a compute task, an energy storage task, a data storage task, and a networking task and having a machine that automatically forecasts forward market pricing of network spectrum based on information collected from automated agent behavioral data sources. In embodiments, provided herein is a transaction-enabling system having a machine that automatically allocates its compute capacity among a core task, a compute task, an energy storage task, a data storage task, and a networking task and having a machine that automatically forecasts forward market pricing of energy credits based on information collected from automated agent behavioral data sources. In embodiments, provided herein is a transaction-enabling system having a machine that automatically allocates its compute capacity among a core task, a compute task, an energy storage task, a data storage task, and a networking task and having a machine that automatically forecasts forward market value of compute capability based on information collected from automated agent behavioral data sources. In embodiments, provided herein is a transaction-enabling system having a machine that automatically allocates its compute capacity among a core task, a compute task, an energy storage task, a data storage task, and a networking task and having a machine that automatically forecasts forward market pricing of energy prices based on information collected from business entity behavioral data sources. In embodiments, provided herein is a transaction-enabling system having a machine that automatically allocates its compute capacity among a core task, a compute task, an energy storage task, a data storage task, and a networking task and having a machine that automatically forecasts forward market pricing of network spectrum based on information collected from business entity behavioral data sources. In embodiments, provided herein is a transaction-enabling system having a machine that automatically allocates its compute capacity among a core task, a compute task, an energy storage task, a data storage task, and a networking task and having a machine that automatically forecasts forward market pricing of energy credits based on information collected from business entity behavioral data sources. In embodiments, provided herein is a transaction-enabling system having a machine that automatically allocates its compute capacity among a core task, a compute task, an energy storage task, a data storage task, and a networking task and having a machine that automatically forecasts forward market value of compute capability based on information collected from business entity behavioral data sources. In embodiments, provided herein is a transaction-enabling system having a machine that automatically allocates its compute capacity among a core task, a compute task, an energy storage task, a data storage task, and a networking task and having a machine that automatically forecasts forward market pricing of energy prices based on information collected from human behavioral data sources. In embodiments, provided herein is a transaction-enabling system having a machine that automatically allocates its compute capacity among a core task, a compute task, an energy storage task, a data storage task, and a networking task and having a machine that automatically forecasts forward market pricing of network spectrum based on information collected from human behavioral data sources. In embodiments, provided herein is a transaction-enabling system having a machine that automatically allocates its compute capacity among a core task, a compute task, an energy storage task, a data storage task, and a networking task and having a machine that automatically forecasts forward market pricing of energy credits based on information collected from human behavioral data sources. In embodiments, provided herein is a transaction-enabling system having a machine that automatically allocates its compute capacity among a core task, a compute task, an energy storage task, a data storage task, and a networking task and having a machine that automatically forecasts forward market value of compute capability based on information collected from human behavioral data sources. In embodiments, provided herein is a transaction-enabling system having a machine that automatically allocates its compute capacity among a core task, a compute task, an energy storage task, a data storage task and a networking task and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically allocates its compute capacity among a core task, a compute task, an energy storage task, a data storage task, and a networking task and having an intelligent agent that is configured to solicit the attention resources of another external intelligent agent. In embodiments, provided herein is a transaction-enabling system having a machine that automatically allocates its compute capacity among a core task, a compute task, an energy storage task, a data storage task, and a networking task and having a machine that automatically purchases attention resources in a forward market for attention. In embodiments, provided herein is a transaction-enabling system having a machine that automatically allocates its compute capacity among a core task, a compute task, an energy storage task, a data storage task, and a networking task and having a fleet of machines that automatically aggregate purchasing in a forward market for attention. In embodiments, provided herein is a transaction-enabling system having a machine that automatically allocates its compute capacity among a core task, a compute task, an energy storage task, a data storage task and a networking task and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically allocates its compute capacity among a core task, a compute task, an energy storage task, a data storage task and a networking task and having a system for learning on a training set of facility outcomes, facility parameters, and data collected from data sources to train an artificial intelligence/machine learning system to predict a facility production outcome. In embodiments, provided herein is a transaction-enabling system having a machine that automatically allocates its compute capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically allocates its compute capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically allocates its compute capacity among a core task, a compute task, an energy storage task, a data storage task and a networking task and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically allocates its compute capacity among a core task, a compute task, an energy storage task, a data storage task and a networking task and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically allocates its compute capacity among a core task, a compute task, an energy storage task, a data storage task and a networking task and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically allocates its compute capacity among a core task, a compute task, an energy storage task, a data storage task and a networking task and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically allocates its compute capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically allocates its compute capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically allocates its compute capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically allocates its compute capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically allocates its compute capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically allocates its compute capacity among a core task, a compute task, an energy storage task, a data storage task and a networking task and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a machine that automatically allocates its networking capacity among a core task, a compute task, an energy storage task, a data storage task, and a networking task. In embodiments, provided herein is a transaction-enabling system having a machine that automatically allocates its networking capacity among a core task, a compute task, an energy storage task, a data storage task and a networking task and having a fleet of machines that automatically allocate collective energy capacity among a core task, a compute task, an energy storage task, a data storage task and a networking task. In embodiments, provided herein is a transaction-enabling system having a machine that automatically allocates its networking capacity among a core task, a compute task, an energy storage task, a data storage task and a networking task and having a fleet of machines that automatically allocate collective compute capacity among a core task, a compute task, an energy storage task, a data storage task and a networking task. In embodiments, provided herein is a transaction-enabling system having a machine that automatically allocates its networking capacity among a core task, a compute task, an energy storage task, a data storage task and a networking task and having a fleet of machines that automatically allocate collective networking capacity among a core task, a compute task, an energy storage task, a data storage task and a networking task. In embodiments, provided herein is a transaction-enabling system having a machine that automatically allocates its networking capacity among a core task, a compute task, an energy storage task, a data storage task and a networking task and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a machine that automatically allocates its networking capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically allocates its networking capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a machine that automatically allocates its networking capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a machine that automatically allocates its networking capacity among a core task, a compute task, an energy storage task, a data storage task and a networking task and having a distributed ledger for aggregating intellectual property licensing terms, wherein a smart contract wrapper on the distributed ledger allows an operation on the ledger to commit a party to a contract term. In embodiments, provided herein is a transaction-enabling system having a machine that automatically allocates its networking capacity among a core task, a compute task, an energy storage task, a data storage task, and a networking task and having a distributed ledger that tokenizes an instruction set, such that operation on the distributed ledger provides provable access to the instruction set. In embodiments, provided herein is a transaction-enabling system having a machine that automatically allocates its networking capacity among a core task, a compute task, an energy storage task, a data storage task, and a networking task and having a distributed ledger that tokenizes executable algorithmic logic, such that operation on the distributed ledger provides provable access to the executable algorithmic logic. In embodiments, provided herein is a transaction-enabling system having a machine that automatically allocates its networking capacity among a core task, a compute task, an energy storage task, a data storage task, and a networking task and having a distributed ledger that tokenizes a 3D printer instruction set, such that operation on the distributed ledger provides provable access to the instruction set. In embodiments, provided herein is a transaction-enabling system having a machine that automatically allocates its networking capacity among a core task, a compute task, an energy storage task, a data storage task and a networking task and having a distributed ledger that tokenizes an instruction set for a coating process, such that operation on the distributed ledger provides provable access to the instruction set. In embodiments, provided herein is a transaction-enabling system having a machine that automatically allocates its networking capacity among a core task, a compute task, an energy storage task, a data storage task and a networking task and having a distributed ledger that tokenizes an instruction set for a semiconductor fabrication process, such that operation on the distributed ledger provides provable access to the fabrication process. In embodiments, provided herein is a transaction-enabling system having a machine that automatically allocates its networking capacity among a core task, a compute task, an energy storage task, a data storage task, and a networking task and having a distributed ledger that tokenizes a firmware program, such that operation on the distributed ledger provides provable access to the firmware program. In embodiments, provided herein is a transaction-enabling system having a machine that automatically allocates its networking capacity among a core task, a compute task, an energy storage task, a data storage task, and a networking task and having a distributed ledger that tokenizes an instruction set for an FPGA, such that operation on the distributed ledger provides provable access to the FPGA. In embodiments, provided herein is a transaction-enabling system having a machine that automatically allocates its networking capacity among a core task, a compute task, an energy storage task, a data storage task, and a networking task and having a distributed ledger that tokenizes serverless code logic, such that operation on the distributed ledger provides provable access to the serverless code logic. In embodiments, provided herein is a transaction-enabling system having a machine that automatically allocates its networking capacity among a core task, a compute task, an energy storage task, a data storage task and a networking task and having a distributed ledger that tokenizes an instruction set for a crystal fabrication system, such that operation on the distributed ledger provides provable access to the instruction set. In embodiments, provided herein is a transaction-enabling system having a machine that automatically allocates its networking capacity among a core task, a compute task, an energy storage task, a data storage task and a networking task and having a distributed ledger that tokenizes an instruction set for a food preparation process, such that operation on the distributed ledger provides provable access to the instruction set. In embodiments, provided herein is a transaction-enabling system having a machine that automatically allocates its networking capacity among a core task, a compute task, an energy storage task, a data storage task and a networking task and having a distributed ledger that tokenizes an instruction set for a polymer production process, such that operation on the distributed ledger provides provable access to the instruction set. In embodiments, provided herein is a transaction-enabling system having a machine that automatically allocates its networking capacity among a core task, a compute task, an energy storage task, a data storage task and a networking task and having a distributed ledger that tokenizes an instruction set for chemical synthesis process, such that operation on the distributed ledger provides provable access to the instruction set. In embodiments, provided herein is a transaction-enabling system having a machine that automatically allocates its networking capacity among a core task, a compute task, an energy storage task, a data storage task and a networking task and having a distributed ledger that tokenizes an instruction set for a biological production process, such that operation on the distributed ledger provides provable access to the instruction set. In embodiments, provided herein is a transaction-enabling system having a machine that automatically allocates its networking capacity among a core task, a compute task, an energy storage task, a data storage task and a networking task and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a machine that automatically allocates its networking capacity among a core task, a compute task, an energy storage task, a data storage task, and a networking task and having a distributed ledger that aggregates views of a trade secret into a chain that proves which and how many parties have viewed the trade secret. In embodiments, provided herein is a transaction-enabling system having a machine that automatically allocates its networking capacity among a core task, a compute task, an energy storage task, a data storage task and a networking task and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a machine that automatically allocates its networking capacity among a core task, a compute task, an energy storage task, a data storage task and a networking task and having a distributed ledger that tokenizes an item of intellectual property and a reporting system that reports an analytic result based on the operations performed on the distributed ledger or the intellectual property. In embodiments, provided herein is a transaction-enabling system having a machine that automatically allocates its networking capacity among a core task, a compute task, an energy storage task, a data storage task and a networking task and having a distributed ledger that aggregates a set of instructions, where an operation on the distributed ledger adds at least one instruction to a pre-existing set of instructions to provide a modified set of instructions. In embodiments, provided herein is a transaction-enabling system having a machine that automatically allocates its networking capacity among a core task, a compute task, an energy storage task, a data storage task and a networking task and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a machine that automatically allocates its networking capacity among a core task, a compute task, an energy storage task, a data storage task and a networking task and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a machine that automatically allocates its networking capacity among a core task, a compute task, an energy storage task, a data storage task, and a networking task and having a self-executing cryptocurrency coin that commits a transaction upon recognizing a location-based parameter that provides favorable tax treatment. In embodiments, provided herein is a transaction-enabling system having a machine that automatically allocates its networking capacity among a core task, a compute task, an energy storage task, a data storage task, and a networking task and having an expert system that uses machine learning to optimize the execution of cryptocurrency transactions based on tax status. In embodiments, provided herein is a transaction-enabling system having a machine that automatically allocates its networking capacity among a core task, a compute task, an energy storage task, a data storage task, and a networking task and having an expert system that aggregates regulatory information covering cryptocurrency transactions and automatically selects a jurisdiction for an operation based on the regulatory information. In embodiments, provided herein is a transaction-enabling system having a machine that automatically allocates its networking capacity among a core task, a compute task, an energy storage task, a data storage task and a networking task and having an expert system that uses machine learning to optimize the execution of a cryptocurrency transaction based on real time energy price information for an available energy source. In embodiments, provided herein is a transaction-enabling system having a machine that automatically allocates its networking capacity among a core task, a compute task, an energy storage task, a data storage task and a networking task and having an expert system that uses machine learning to optimize the execution of a cryptocurrency transaction based on an understanding of available energy sources to power computing resources to execute the transaction. In embodiments, provided herein is a transaction-enabling system having a machine that automatically allocates its networking capacity among a core task, a compute task, an energy storage task, a data storage task, and a networking task and having an expert system that uses machine learning to optimize charging and recharging cycle of a rechargeable battery system to provide energy for execution of a cryptocurrency transaction. In embodiments, provided herein is a transaction-enabling system having a machine that automatically allocates its networking capacity among a core task, a compute task, an energy storage task, a data storage task and a networking task and having an expert system that predicts a forward market price in a market based on an understanding obtained by analyzing Internet of Things data sources and executes a transaction based on the forward market prediction. In embodiments, provided herein is a transaction-enabling system having a machine that automatically allocates its networking capacity among a core task, a compute task, an energy storage task, a data storage task and a networking task and having an expert system that predicts a forward market price in a market based on an understanding obtained by analyzing social network data sources and executes a transaction based on the forward market prediction. In embodiments, provided herein is a transaction-enabling system having a machine that automatically allocates its networking capacity among a core task, a compute task, an energy storage task, a data storage task and a networking task and having an expert system that predicts a forward market price in a market based on an understanding obtained by analyzing Internet of Things data sources and executes a cryptocurrency transaction based on the forward market prediction. In embodiments, provided herein is a transaction-enabling system having a machine that automatically allocates its networking capacity among a core task, a compute task, an energy storage task, a data storage task and a networking task and having an expert system that predicts a forward market price in a market based on an understanding obtained by analyzing social network data sources and executes a cryptocurrency transaction based on the forward market prediction. In embodiments, provided herein is a transaction-enabling system having a machine that automatically allocates its networking capacity among a core task, a compute task, an energy storage task, a data storage task and a networking task and having an expert system that predicts a forward market price in an energy market based on an understanding obtained by analyzing Internet of Things data sources and executes a transaction based on the forward market prediction. In embodiments, provided herein is a transaction-enabling system having a machine that automatically allocates its networking capacity among a core task, a compute task, an energy storage task, a data storage task and a networking task and having an expert system that predicts a forward market price in an energy market based on an understanding obtained by analyzing social network data sources and executes a transaction based on the forward market prediction. In embodiments, provided herein is a transaction-enabling system having a machine that automatically allocates its networking capacity among a core task, a compute task, an energy storage task, a data storage task and a networking task and having an expert system that predicts a forward market price in a market for computing resources based on an understanding obtained by analyzing Internet of Things data sources and executes a transaction based on the forward market prediction. In embodiments, provided herein is a transaction-enabling system having a machine that automatically allocates its networking capacity among a core task, a compute task, an energy storage task, a data storage task and a networking task and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a machine that automatically allocates its networking capacity among a core task, a compute task, an energy storage task, a data storage task and a networking task and having an expert system that predicts a forward market price in a market for computing resources based on an understanding obtained by analyzing social network data sources and executes a transaction based on the forward market prediction. In embodiments, provided herein is a transaction-enabling system having a machine that automatically allocates its networking capacity among a core task, a compute task, an energy storage task, a data storage task and a networking task and having an expert system that predicts a forward market price in a market for advertising based on an understanding obtained by analyzing Internet of Things data sources and executes a transaction based on the forward market prediction. In embodiments, provided herein is a transaction-enabling system having a machine that automatically allocates its networking capacity among a core task, a compute task, an energy storage task, a data storage task and a networking task and having an expert system that predicts a forward market price in a market for advertising based on an understanding obtained by analyzing social network data sources and executes a transaction based on the forward market prediction. In embodiments, provided herein is a transaction-enabling system having a machine that automatically allocates its networking capacity among a core task, a compute task, an energy storage task, a data storage task, and a networking task and having a machine that automatically forecasts forward market pricing of energy prices based on information collected from automated agent behavioral data sources. In embodiments, provided herein is a transaction-enabling system having a machine that automatically allocates its networking capacity among a core task, a compute task, an energy storage task, a data storage task, and a networking task and having a machine that automatically forecasts forward market pricing of network spectrum based on information collected from automated agent behavioral data sources. In embodiments, provided herein is a transaction-enabling system having a machine that automatically allocates its networking capacity among a core task, a compute task, an energy storage task, a data storage task, and a networking task and having a machine that automatically forecasts forward market pricing of energy credits based on information collected from automated agent behavioral data sources. In embodiments, provided herein is a transaction-enabling system having a machine that automatically allocates its networking capacity among a core task, a compute task, an energy storage task, a data storage task, and a networking task and having a machine that automatically forecasts forward market value of compute capability based on information collected from automated agent behavioral data sources. In embodiments, provided herein is a transaction-enabling system having a machine that automatically allocates its networking capacity among a core task, a compute task, an energy storage task, a data storage task, and a networking task and having a machine that automatically forecasts forward market pricing of energy prices based on information collected from business entity behavioral data sources. In embodiments, provided herein is a transaction-enabling system having a machine that automatically allocates its networking capacity among a core task, a compute task, an energy storage task, a data storage task, and a networking task and having a machine that automatically forecasts forward market pricing of network spectrum based on information collected from business entity behavioral data sources. In embodiments, provided herein is a transaction-enabling system having a machine that automatically allocates its networking capacity among a core task, a compute task, an energy storage task, a data storage task, and a networking task and having a machine that automatically forecasts forward market pricing of energy credits based on information collected from business entity behavioral data sources. In embodiments, provided herein is a transaction-enabling system having a machine that automatically allocates its networking capacity among a core task, a compute task, an energy storage task, a data storage task, and a networking task and having a machine that automatically forecasts forward market value of compute capability based on information collected from business entity behavioral data sources. In embodiments, provided herein is a transaction-enabling system having a machine that automatically allocates its networking capacity among a core task, a compute task, an energy storage task, a data storage task, and a networking task and having a machine that automatically forecasts forward market pricing of energy prices based on information collected from human behavioral data sources. In embodiments, provided herein is a transaction-enabling system having a machine that automatically allocates its networking capacity among a core task, a compute task, an energy storage task, a data storage task, and a networking task and having a machine that automatically forecasts forward market pricing of network spectrum based on information collected from human behavioral data sources. In embodiments, provided herein is a transaction-enabling system having a machine that automatically allocates its networking capacity among a core task, a compute task, an energy storage task, a data storage task, and a networking task and having a machine that automatically forecasts forward market pricing of energy credits based on information collected from human behavioral data sources. In embodiments, provided herein is a transaction-enabling system having a machine that automatically allocates its networking capacity among a core task, a compute task, an energy storage task, a data storage task, and a networking task and having a machine that automatically forecasts forward market value of compute capability based on information collected from human behavioral data sources. In embodiments, provided herein is a transaction-enabling system having a machine that automatically allocates its networking capacity among a core task, a compute task, an energy storage task, a data storage task and a networking task and having an expert system that predicts a forward market price in a market for spectrum or network bandwidth based on an understanding obtained by analyzing social data sources and executes a transaction based on the forward market prediction. In embodiments, provided herein is a transaction-enabling system having a machine that automatically allocates its networking capacity among a core task, a compute task, an energy storage task, a data storage task, and a networking task and having an intelligent agent that is configured to solicit the attention resources of another external intelligent agent. In embodiments, provided herein is a transaction-enabling system having a machine that automatically allocates its networking capacity among a core task, a compute task, an energy storage task, a data storage task, and a networking task and having a machine that automatically purchases attention resources in a forward market for attention. In embodiments, provided herein is a transaction-enabling system having a machine that automatically allocates its networking capacity among a core task, a compute task, an energy storage task, a data storage task, and a networking task and having a fleet of machines that automatically aggregate purchasing in a forward market for attention. In embodiments, provided herein is a transaction-enabling system having a machine that automatically allocates its networking capacity among a core task, a compute task, an energy storage task, a data storage task and a networking task and having a system for learning on a training set of facility outcomes, facility parameters, and data collected from data sources to train an artificial intelligence/machine learning system to predict a likelihood of a facility production outcome. In embodiments, provided herein is a transaction-enabling system having a machine that automatically allocates its networking capacity among a core task, a compute task, an energy storage task, a data storage task and a networking task and having a system for learning on a training set of facility outcomes, facility parameters, and data collected from data sources to train an artificial intelligence/machine learning system to predict a facility production outcome. In embodiments, provided herein is a transaction-enabling system having a machine that automatically allocates its networking capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a machine that automatically allocates its networking capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a machine that automatically allocates its networking capacity among a core task, a compute task, an energy storage task, a data storage task and a networking task and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a machine that automatically allocates its networking capacity among a core task, a compute task, an energy storage task, a data storage task and a networking task and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a machine that automatically allocates its networking capacity among a core task, a compute task, an energy storage task, a data storage task and a networking task and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a machine that automatically allocates its networking capacity among a core task, a compute task, an energy storage task, a data storage task and a networking task and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a machine that automatically allocates its networking capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a machine that automatically allocates its networking capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a machine that automatically allocates its networking capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a machine that automatically allocates its networking capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to an output parameter. In embodiments, provided herein is a transaction-enabling system having a machine that automatically allocates its networking capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a machine that automatically allocates its networking capacity among a core task, a compute task, an energy storage task, a data storage task and a networking task and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically allocate collective energy capacity among a core task, a compute task, an energy storage task, a data storage task, and a networking task. In embodiments, provided herein is a transaction-enabling system having a fleet of machines that automatically allocate collective energy capacity among a core task, a compute task, an energy storage task, a data storage task and a networking task and having a fleet of machines that automatically allocate collective compute capacity among a core task, a compute task, an energy storage task, a data storage task and a networking task. In embodiments, provided herein is a transaction-enabling system having a fleet of machines that automatically allocate collective energy capacity among a core task, a compute task, an energy storage task, a data storage task and a networking task and having a fleet of machines that automatically allocate collective networking capacity among a core task, a compute task, an energy storage task, a data storage task and a networking task. In embodiments, provided herein is a transaction-enabling system having a fleet of machines that automatically allocate collective energy capacity among a core task, a compute task, an energy storage task, a data storage task and a networking task and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically allocate collective energy capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically allocate collective energy capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically allocate collective energy capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically allocate collective energy capacity among a core task, a compute task, an energy storage task, a data storage task and a networking task and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically allocate collective energy capacity among a core task, a compute task, an energy storage task, a data storage task, and a networking task and having a distributed ledger that tokenizes an instruction set, such that operation on the distributed ledger provides provable access to the instruction set. In embodiments, provided herein is a transaction-enabling system having a fleet of machines that automatically allocate collective energy capacity among a core task, a compute task, an energy storage task, a data storage task, and a networking task and having a distributed ledger that tokenizes executable algorithmic logic, such that operation on the distributed ledger provides provable access to the executable algorithmic logic. In embodiments, provided herein is a transaction-enabling system having a fleet of machines that automatically allocate collective energy capacity among a core task, a compute task, an energy storage task, a data storage task and a networking task and having a distributed ledger that tokenizes a 3D printer instruction set, such that operation on the distributed ledger provides provable access to the instruction set. In embodiments, provided herein is a transaction-enabling system having a fleet of machines that automatically allocate collective energy capacity among a core task, a compute task, an energy storage task, a data storage task and a networking task and having a distributed ledger that tokenizes an instruction set for a coating process, such that operation on the distributed ledger provides provable access to the instruction set. In embodiments, provided herein is a transaction-enabling system having a fleet of machines that automatically allocate collective energy capacity among a core task, a compute task, an energy storage task, a data storage task and a networking task and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically allocate collective energy capacity among a core task, a compute task, an energy storage task, a data storage task, and a networking task and having a distributed ledger that tokenizes a firmware program, such that operation on the distributed ledger provides provable access to the firmware program. In embodiments, provided herein is a transaction-enabling system having a fleet of machines that automatically allocate collective energy capacity among a core task, a compute task, an energy storage task, a data storage task and a networking task and having a distributed ledger that tokenizes an instruction set for an FPGA, such that operation on the distributed ledger provides provable access to the FPGA. In embodiments, provided herein is a transaction-enabling system having a fleet of machines that automatically allocate collective energy capacity among a core task, a compute task, an energy storage task, a data storage task, and a networking task and having a distributed ledger that tokenizes serverless code logic, such that operation on the distributed ledger provides provable access to the serverless code logic. In embodiments, provided herein is a transaction-enabling system having a fleet of machines that automatically allocate collective energy capacity among a core task, a compute task, an energy storage task, a data storage task and a networking task and having a distributed ledger that tokenizes an instruction set for a crystal fabrication system, such that operation on the distributed ledger provides provable access to the instruction set. In embodiments, provided herein is a transaction-enabling system having a fleet of machines that automatically allocate collective energy capacity among a core task, a compute task, an energy storage task, a data storage task and a networking task and having a distributed ledger that tokenizes an instruction set for a food preparation process, such that operation on the distributed ledger provides provable access to the instruction set. In embodiments, provided herein is a transaction-enabling system having a fleet of machines that automatically allocate collective energy capacity among a core task, a compute task, an energy storage task, a data storage task and a networking task and having a distributed ledger that tokenizes an instruction set for a polymer production process, such that operation on the distributed ledger provides provable access to the instruction set. In embodiments, provided herein is a transaction-enabling system having a fleet of machines that automatically allocate collective energy capacity among a core task, a compute task, an energy storage task, a data storage task and a networking task and having a distributed ledger that tokenizes an instruction set for chemical synthesis process, such that operation on the distributed ledger provides provable access to the instruction set. In embodiments, provided herein is a transaction-enabling system having a fleet of machines that automatically allocate collective energy capacity among a core task, a compute task, an energy storage task, a data storage task and a networking task and having a distributed ledger that tokenizes an instruction set for a biological production process, such that operation on the distributed ledger provides provable access to the instruction set. In embodiments, provided herein is a transaction-enabling system having a fleet of machines that automatically allocate collective energy capacity among a core task, a compute task, an energy storage task, a data storage task and a networking task and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically allocate collective energy capacity among a core task, a compute task, an energy storage task, a data storage task and a networking task and having a distributed ledger that aggregates views of a trade secret into a chain that proves which and how many parties have viewed the trade secret. In embodiments, provided herein is a transaction-enabling system having a fleet of machines that automatically allocate collective energy capacity among a core task, a compute task, an energy storage task, a data storage task and a networking task and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically allocate collective energy capacity among a core task, a compute task, an energy storage task, a data storage task and a networking task and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically allocate collective energy capacity among a core task, a compute task, an energy storage task, a data storage task and a networking task and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically allocate collective energy capacity among a core task, a compute task, an energy storage task, a data storage task and a networking task and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically allocate collective energy capacity among a core task, a compute task, an energy storage task, a data storage task and a networking task and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically allocate collective energy capacity among a core task, a compute task, an energy storage task, a data storage task, and a networking task and having a self-executing cryptocurrency coin that commits a transaction upon recognizing a location-based parameter that provides favorable tax treatment. In embodiments, provided herein is a transaction-enabling system having a fleet of machines that automatically allocate collective energy capacity among a core task, a compute task, an energy storage task, a data storage task, and a networking task and having an expert system that uses machine learning to optimize the execution of cryptocurrency transactions based on tax status. In embodiments, provided herein is a transaction-enabling system having a fleet of machines that automatically allocate collective energy capacity among a core task, a compute task, an energy storage task, a data storage task, and a networking task and having an expert system that aggregates regulatory information covering cryptocurrency transactions and automatically selects a jurisdiction for an operation based on the regulatory information. In embodiments, provided herein is a transaction-enabling system having a fleet of machines that automatically allocate collective energy capacity among a core task, a compute task, an energy storage task, a data storage task and a networking task and having an expert system that uses machine learning to optimize the execution of a cryptocurrency transaction based on real time energy price information for an available energy source. In embodiments, provided herein is a transaction-enabling system having a fleet of machines that automatically allocate collective energy capacity among a core task, a compute task, an energy storage task, a data storage task and a networking task and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically allocate collective energy capacity among a core task, a compute task, an energy storage task, a data storage task and a networking task and having an expert system that uses machine learning to optimize charging and recharging cycle of a rechargeable battery system to provide energy for execution of a cryptocurrency transaction. In embodiments, provided herein is a transaction-enabling system having a fleet of machines that automatically allocate collective energy capacity among a core task, a compute task, an energy storage task, a data storage task and a networking task and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically allocate collective energy capacity among a core task, a compute task, an energy storage task, a data storage task and a networking task and having an expert system that predicts a forward market price in a market based on an understanding obtained by analyzing social network data sources and executes a transaction based on the forward market prediction. In embodiments, provided herein is a transaction-enabling system having a fleet of machines that automatically allocate collective energy capacity among a core task, a compute task, an energy storage task, a data storage task and a networking task and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically allocate collective energy capacity among a core task, a compute task, an energy storage task, a data storage task and a networking task and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically allocate collective energy capacity among a core task, a compute task, an energy storage task, a data storage task and a networking task and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically allocate collective energy capacity among a core task, a compute task, an energy storage task, a data storage task and a networking task and having an expert system that predicts a forward market price in an energy market based on an understanding obtained by analyzing social network data sources and executes a transaction based on the forward market prediction. In embodiments, provided herein is a transaction-enabling system having a fleet of machines that automatically allocate collective energy capacity among a core task, a compute task, an energy storage task, a data storage task and a networking task and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically allocate collective energy capacity among a core task, a compute task, an energy storage task, a data storage task and a networking task and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically allocate collective energy capacity among a core task, a compute task, an energy storage task, a data storage task and a networking task and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically allocate collective energy capacity among a core task, a compute task, an energy storage task, a data storage task and a networking task and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically allocate collective energy capacity among a core task, a compute task, an energy storage task, a data storage task and a networking task and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically allocate collective energy capacity among a core task, a compute task, an energy storage task, a data storage task, and a networking task and having a machine that automatically forecasts forward market pricing of energy prices based on information collected from automated agent behavioral data sources. In embodiments, provided herein is a transaction-enabling system having a fleet of machines that automatically allocate collective energy capacity among a core task, a compute task, an energy storage task, a data storage task, and a networking task and having a machine that automatically forecasts forward market pricing of network spectrum based on information collected from automated agent behavioral data sources. In embodiments, provided herein is a transaction-enabling system having a fleet of machines that automatically allocate collective energy capacity among a core task, a compute task, an energy storage task, a data storage task, and a networking task and having a machine that automatically forecasts forward market pricing of energy credits based on information collected from automated agent behavioral data sources. In embodiments, provided herein is a transaction-enabling system having a fleet of machines that automatically allocate collective energy capacity among a core task, a compute task, an energy storage task, a data storage task, and a networking task and having a machine that automatically forecasts forward market value of compute capability based on information collected from automated agent behavioral data sources. In embodiments, provided herein is a transaction-enabling system having a fleet of machines that automatically allocate collective energy capacity among a core task, a compute task, an energy storage task, a data storage task, and a networking task and having a machine that automatically forecasts forward market pricing of energy prices based on information collected from business entity behavioral data sources. In embodiments, provided herein is a transaction-enabling system having a fleet of machines that automatically allocate collective energy capacity among a core task, a compute task, an energy storage task, a data storage task, and a networking task and having a machine that automatically forecasts forward market pricing of network spectrum based on information collected from business entity behavioral data sources. In embodiments, provided herein is a transaction-enabling system having a fleet of machines that automatically allocate collective energy capacity among a core task, a compute task, an energy storage task, a data storage task, and a networking task and having a machine that automatically forecasts forward market pricing of energy credits based on information collected from business entity behavioral data sources. In embodiments, provided herein is a transaction-enabling system having a fleet of machines that automatically allocate collective energy capacity among a core task, a compute task, an energy storage task, a data storage task, and a networking task and having a machine that automatically forecasts forward market value of compute capability based on information collected from business entity behavioral data sources. In embodiments, provided herein is a transaction-enabling system having a fleet of machines that automatically allocate collective energy capacity among a core task, a compute task, an energy storage task, a data storage task, and a networking task and having a machine that automatically forecasts forward market pricing of energy prices based on information collected from human behavioral data sources. In embodiments, provided herein is a transaction-enabling system having a fleet of machines that automatically allocate collective energy capacity among a core task, a compute task, an energy storage task, a data storage task, and a networking task and having a machine that automatically forecasts forward market pricing of network spectrum based on information collected from human behavioral data sources. In embodiments, provided herein is a transaction-enabling system having a fleet of machines that automatically allocate collective energy capacity among a core task, a compute task, an energy storage task, a data storage task, and a networking task and having a machine that automatically forecasts forward market pricing of energy credits based on information collected from human behavioral data sources. In embodiments, provided herein is a transaction-enabling system having a fleet of machines that automatically allocate collective energy capacity among a core task, a compute task, an energy storage task, a data storage task, and a networking task and having a machine that automatically forecasts forward market value of compute capability based on information collected from human behavioral data sources. In embodiments, provided herein is a transaction-enabling system having a fleet of machines that automatically allocate collective energy capacity among a core task, a compute task, an energy storage task, a data storage task and a networking task and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically allocate collective energy capacity among a core task, a compute task, an energy storage task, a data storage task, and a networking task and having an intelligent agent that is configured to solicit the attention resources of another external intelligent agent. In embodiments, provided herein is a transaction-enabling system having a fleet of machines that automatically allocate collective energy capacity among a core task, a compute task, an energy storage task, a data storage task, and a networking task and having a machine that automatically purchases attention resources in a forward market for attention. In embodiments, provided herein is a transaction-enabling system having a fleet of machines that automatically allocate collective energy capacity among a core task, a compute task, an energy storage task, a data storage task, and a networking task and having a fleet of machines that automatically aggregate purchasing in a forward market for attention. In embodiments, provided herein is a transaction-enabling system having a fleet of machines that automatically allocate collective energy capacity among a core task, a compute task, an energy storage task, a data storage task and a networking task and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically allocate collective energy capacity among a core task, a compute task, an energy storage task, a data storage task and a networking task and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically allocate collective energy capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically allocate collective energy capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically allocate collective energy capacity among a core task, a compute task, an energy storage task, a data storage task and a networking task and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically allocate collective energy capacity among a core task, a compute task, an energy storage task, a data storage task and a networking task and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically allocate collective energy capacity among a core task, a compute task, an energy storage task, a data storage task and a networking task and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically allocate collective energy capacity among a core task, a compute task, an energy storage task, a data storage task and a networking task and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically allocate collective energy capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically allocate collective energy capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically allocate collective energy capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically allocate collective energy capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically allocate collective energy capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically allocate collective energy capacity among a core task, a compute task, an energy storage task, a data storage task and a networking task and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically allocate collective compute capacity among a core task, a compute task, an energy storage task, a data storage task, and a networking task. In embodiments, provided herein is a transaction-enabling system having a fleet of machines that automatically allocate collective compute capacity among a core task, a compute task, an energy storage task, a data storage task and a networking task and having a fleet of machines that automatically allocate collective networking capacity among a core task, a compute task, an energy storage task, a data storage task and a networking task. In embodiments, provided herein is a transaction-enabling system having a fleet of machines that automatically allocate collective compute capacity among a core task, a compute task, an energy storage task, a data storage task and a networking task and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically allocate collective compute capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically allocate collective compute capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically allocate collective compute capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically allocate collective compute capacity among a core task, a compute task, an energy storage task, a data storage task and a networking task and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically allocate collective compute capacity among a core task, a compute task, an energy storage task, a data storage task, and a networking task and having a distributed ledger that tokenizes an instruction set, such that operation on the distributed ledger provides provable access to the instruction set. In embodiments, provided herein is a transaction-enabling system having a fleet of machines that automatically allocate collective compute capacity among a core task, a compute task, an energy storage task, a data storage task, and a networking task and having a distributed ledger that tokenizes executable algorithmic logic, such that operation on the distributed ledger provides provable access to the executable algorithmic logic. In embodiments, provided herein is a transaction-enabling system having a fleet of machines that automatically allocate collective compute capacity among a core task, a compute task, an energy storage task, a data storage task and a networking task and having a distributed ledger that tokenizes a 3D printer instruction set, such that operation on the distributed ledger provides provable access to the instruction set. In embodiments, provided herein is a transaction-enabling system having a fleet of machines that automatically allocate collective compute capacity among a core task, a compute task, an energy storage task, a data storage task and a networking task and having a distributed ledger that tokenizes an instruction set for a coating process, such that operation on the distributed ledger provides provable access to the instruction set. In embodiments, provided herein is a transaction-enabling system having a fleet of machines that automatically allocate collective compute capacity among a core task, a compute task, an energy storage task, a data storage task and a networking task and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically allocate collective compute capacity among a core task, a compute task, an energy storage task, a data storage task, and a networking task and having a distributed ledger that tokenizes a firmware program, such that operation on the distributed ledger provides provable access to the firmware program. In embodiments, provided herein is a transaction-enabling system having a fleet of machines that automatically allocate collective compute capacity among a core task, a compute task, an energy storage task, a data storage task and a networking task and having a distributed ledger that tokenizes an instruction set for an FPGA, such that operation on the distributed ledger provides provable access to the FPGA. In embodiments, provided herein is a transaction-enabling system having a fleet of machines that automatically allocate collective compute capacity among a core task, a compute task, an energy storage task, a data storage task, and a networking task and having a distributed ledger that tokenizes serverless code logic, such that operation on the distributed ledger provides provable access to the serverless code logic. In embodiments, provided herein is a transaction-enabling system having a fleet of machines that automatically allocate collective compute capacity among a core task, a compute task, an energy storage task, a data storage task and a networking task and having a distributed ledger that tokenizes an instruction set for a crystal fabrication system, such that operation on the distributed ledger provides provable access to the instruction set. In embodiments, provided herein is a transaction-enabling system having a fleet of machines that automatically allocate collective compute capacity among a core task, a compute task, an energy storage task, a data storage task and a networking task and having a distributed ledger that tokenizes an instruction set for a food preparation process, such that operation on the distributed ledger provides provable access to the instruction set. In embodiments, provided herein is a transaction-enabling system having a fleet of machines that automatically allocate collective compute capacity among a core task, a compute task, an energy storage task, a data storage task and a networking task and having a distributed ledger that tokenizes an instruction set for a polymer production process, such that operation on the distributed ledger provides provable access to the instruction set. In embodiments, provided herein is a transaction-enabling system having a fleet of machines that automatically allocate collective compute capacity among a core task, a compute task, an energy storage task, a data storage task and a networking task and having a distributed ledger that tokenizes an instruction set for chemical synthesis process, such that operation on the distributed ledger provides provable access to the instruction set. In embodiments, provided herein is a transaction-enabling system having a fleet of machines that automatically allocate collective compute capacity among a core task, a compute task, an energy storage task, a data storage task and a networking task and having a distributed ledger that tokenizes an instruction set for a biological production process, such that operation on the distributed ledger provides provable access to the instruction set. In embodiments, provided herein is a transaction-enabling system having a fleet of machines that automatically allocate collective compute capacity among a core task, a compute task, an energy storage task, a data storage task and a networking task and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically allocate collective compute capacity among a core task, a compute task, an energy storage task, a data storage task and a networking task and having a distributed ledger that aggregates views of a trade secret into a chain that proves which and how many parties have viewed the trade secret. In embodiments, provided herein is a transaction-enabling system having a fleet of machines that automatically allocate collective compute capacity among a core task, a compute task, an energy storage task, a data storage task and a networking task and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically allocate collective compute capacity among a core task, a compute task, an energy storage task, a data storage task and a networking task and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically allocate collective compute capacity among a core task, a compute task, an energy storage task, a data storage task and a networking task and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically allocate collective compute capacity among a core task, a compute task, an energy storage task, a data storage task and a networking task and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically allocate collective compute capacity among a core task, a compute task, an energy storage task, a data storage task and a networking task and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically allocate collective compute capacity among a core task, a compute task, an energy storage task, a data storage task, and a networking task and having a self-executing cryptocurrency coin that commits a transaction upon recognizing a location-based parameter that provides favorable tax treatment. In embodiments, provided herein is a transaction-enabling system having a fleet of machines that automatically allocate collective compute capacity among a core task, a compute task, an energy storage task, a data storage task, and a networking task and having an expert system that uses machine learning to optimize the execution of cryptocurrency transactions based on tax status. In embodiments, provided herein is a transaction-enabling system having a fleet of machines that automatically allocate collective compute capacity among a core task, a compute task, an energy storage task, a data storage task, and a networking task and having an expert system that aggregates regulatory information covering cryptocurrency transactions and automatically selects a jurisdiction for an operation based on the regulatory information. In embodiments, provided herein is a transaction-enabling system having a fleet of machines that automatically allocate collective compute capacity among a core task, a compute task, an energy storage task, a data storage task and a networking task and having an expert system that uses machine learning to optimize the execution of a cryptocurrency transaction based on real time energy price information for an available energy source. In embodiments, provided herein is a transaction-enabling system having a fleet of machines that automatically allocate collective compute capacity among a core task, a compute task, an energy storage task, a data storage task and a networking task and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically allocate collective compute capacity among a core task, a compute task, an energy storage task, a data storage task and a networking task and having an expert system that uses machine learning to optimize charging and recharging cycle of a rechargeable battery system to provide energy for execution of a cryptocurrency transaction. In embodiments, provided herein is a transaction-enabling system having a fleet of machines that automatically allocate collective compute capacity among a core task, a compute task, an energy storage task, a data storage task and a networking task and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically allocate collective compute capacity among a core task, a compute task, an energy storage task, a data storage task and a networking task and having an expert system that predicts a forward market price in a market based on an understanding obtained by analyzing social network data sources and executes a transaction based on the forward market prediction. In embodiments, provided herein is a transaction-enabling system having a fleet of machines that automatically allocate collective compute capacity among a core task, a compute task, an energy storage task, a data storage task and a networking task and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically allocate collective compute capacity among a core task, a compute task, an energy storage task, a data storage task and a networking task and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically allocate collective compute capacity among a core task, a compute task, an energy storage task, a data storage task and a networking task and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically allocate collective compute capacity among a core task, a compute task, an energy storage task, a data storage task and a networking task and having an expert system that predicts a forward market price in an energy market based on an understanding obtained by analyzing social network data sources and executes a transaction based on the forward market prediction. In embodiments, provided herein is a transaction-enabling system having a fleet of machines that automatically allocate collective compute capacity among a core task, a compute task, an energy storage task, a data storage task and a networking task and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically allocate collective compute capacity among a core task, a compute task, an energy storage task, a data storage task and a networking task and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically allocate collective compute capacity among a core task, a compute task, an energy storage task, a data storage task and a networking task and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically allocate collective compute capacity among a core task, a compute task, an energy storage task, a data storage task and a networking task and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically allocate collective compute capacity among a core task, a compute task, an energy storage task, a data storage task and a networking task and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically allocate collective compute capacity among a core task, a compute task, an energy storage task, a data storage task, and a networking task and having a machine that automatically forecasts forward market pricing of energy prices based on information collected from automated agent behavioral data sources. In embodiments, provided herein is a transaction-enabling system having a fleet of machines that automatically allocate collective compute capacity among a core task, a compute task, an energy storage task, a data storage task, and a networking task and having a machine that automatically forecasts forward market pricing of network spectrum based on information collected from automated agent behavioral data sources. In embodiments, provided herein is a transaction-enabling system having a fleet of machines that automatically allocate collective compute capacity among a core task, a compute task, an energy storage task, a data storage task, and a networking task and having a machine that automatically forecasts forward market pricing of energy credits based on information collected from automated agent behavioral data sources. In embodiments, provided herein is a transaction-enabling system having a fleet of machines that automatically allocate collective compute capacity among a core task, a compute task, an energy storage task, a data storage task, and a networking task and having a machine that automatically forecasts forward market value of compute capability based on information collected from automated agent behavioral data sources. In embodiments, provided herein is a transaction-enabling system having a fleet of machines that automatically allocate collective compute capacity among a core task, a compute task, an energy storage task, a data storage task, and a networking task and having a machine that automatically forecasts forward market pricing of energy prices based on information collected from business entity behavioral data sources. In embodiments, provided herein is a transaction-enabling system having a fleet of machines that automatically allocate collective compute capacity among a core task, a compute task, an energy storage task, a data storage task, and a networking task and having a machine that automatically forecasts forward market pricing of network spectrum based on information collected from business entity behavioral data sources. In embodiments, provided herein is a transaction-enabling system having a fleet of machines that automatically allocate collective compute capacity among a core task, a compute task, an energy storage task, a data storage task, and a networking task and having a machine that automatically forecasts forward market pricing of energy credits based on information collected from business entity behavioral data sources. In embodiments, provided herein is a transaction-enabling system having a fleet of machines that automatically allocate collective compute capacity among a core task, a compute task, an energy storage task, a data storage task, and a networking task and having a machine that automatically forecasts forward market value of compute capability based on information collected from business entity behavioral data sources. In embodiments, provided herein is a transaction-enabling system having a fleet of machines that automatically allocate collective compute capacity among a core task, a compute task, an energy storage task, a data storage task, and a networking task and having a machine that automatically forecasts forward market pricing of energy prices based on information collected from human behavioral data sources. In embodiments, provided herein is a transaction-enabling system having a fleet of machines that automatically allocate collective compute capacity among a core task, a compute task, an energy storage task, a data storage task, and a networking task and having a machine that automatically forecasts forward market pricing of network spectrum based on information collected from human behavioral data sources. In embodiments, provided herein is a transaction-enabling system having a fleet of machines that automatically allocate collective compute capacity among a core task, a compute task, an energy storage task, a data storage task, and a networking task and having a machine that automatically forecasts forward market pricing of energy credits based on information collected from human behavioral data sources. In embodiments, provided herein is a transaction-enabling system having a fleet of machines that automatically allocate collective compute capacity among a core task, a compute task, an energy storage task, a data storage task, and a networking task and having a machine that automatically forecasts forward market value of compute capability based on information collected from human behavioral data sources. In embodiments, provided herein is a transaction-enabling system having a fleet of machines that automatically allocate collective compute capacity among a core task, a compute task, an energy storage task, a data storage task and a networking task and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically allocate collective compute capacity among a core task, a compute task, an energy storage task, a data storage task, and a networking task and having an intelligent agent that is configured to solicit the attention resources of another external intelligent agent. In embodiments, provided herein is a transaction-enabling system having a fleet of machines that automatically allocate collective compute capacity among a core task, a compute task, an energy storage task, a data storage task, and a networking task and having a machine that automatically purchases attention resources in a forward market for attention. In embodiments, provided herein is a transaction-enabling system having a fleet of machines that automatically allocate collective compute capacity among a core task, a compute task, an energy storage task, a data storage task, and a networking task and having a fleet of machines that automatically aggregate purchasing in a forward market for attention. In embodiments, provided herein is a transaction-enabling system having a fleet of machines that automatically allocate collective compute capacity among a core task, a compute task, an energy storage task, a data storage task and a networking task and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically allocate collective compute capacity among a core task, a compute task, an energy storage task, a data storage task and a networking task and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically allocate collective compute capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically allocate collective compute capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically allocate collective compute capacity among a core task, a compute task, an energy storage task, a data storage task and a networking task and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically allocate collective compute capacity among a core task, a compute task, an energy storage task, a data storage task and a networking task and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically allocate collective compute capacity among a core task, a compute task, an energy storage task, a data storage task and a networking task and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically allocate collective compute capacity among a core task, a compute task, an energy storage task, a data storage task and a networking task and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically allocate collective compute capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically allocate collective compute capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically allocate collective compute capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically allocate collective compute capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically allocate collective compute capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically allocate collective compute capacity among a core task, a compute task, an energy storage task, a data storage task and a networking task and having an intelligent, flexible energy and compute facility whereby an artificial intelligence/machine learning system configures the facility among a set of available configurations based on a set of parameters received from a digital twin for the facility.

In embodiments, provided herein is a transaction-enabling system having a fleet of machines that automatically allocate collective networking capacity among a core task, a compute task, an energy storage task, a data storage task, and a networking task. In embodiments, provided herein is a transaction-enabling system having a fleet of machines that automatically allocate collective networking capacity among a core task, a compute task, an energy storage task, a data storage task and a networking task and having a smart contract wrapper using a distributed ledger wherein the smart contract embeds IP licensing terms for intellectual property embedded in the distributed ledger and wherein executing an operation on the distributed ledger provides access to the intellectual property and commits the executing party to the IP licensing terms. In embodiments, provided herein is a transaction-enabling system having a fleet of machines that automatically allocate collective networking capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically allocate collective networking capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to agree to an apportionment of royalties among the parties in the ledger. In embodiments, provided herein is a transaction-enabling system having a fleet of machines that automatically allocate collective networking capacity among a core task, a compute task, an energy storage task, a data storage task and a networking task and having a distributed ledger for aggregating intellectual property licensing terms, wherein a smart contract wrapper on the distributed ledger allows an operation on the ledger to add intellectual property to an aggregate stack of intellectual property. In embodiments, provided herein is a transaction-enabling system having a fleet of machines that automatically allocate collective networking capacity among a core task, a compute task, an energy storage task, a data storage task and a networking task and having a distributed ledger for aggregating intellectual property licensing terms, wherein a smart contract wrapper on the distributed ledger allows an operation on the ledger to commit a party to a contract term. In embodiments, provided herein is a transaction-enabling system having a fleet of machines that automatically allocate collective networking capacity among a core task, a compute task, an energy storage task, a data storage task, and a networking task and having a distributed ledger that tokenizes an instruction set, such that operation on the distributed ledger provides provable access to the instruction set. In embodiments, provided herein is a transaction-enabling system having a fleet of machines that automatically allocate collective networking capacity among a core task, a compute task, an energy storage task, a data storage task, and a networking task and having a distributed ledger that tokenizes executable algorithmic logic, such that operation on the distributed ledger provides provable access to the executable algorithmic logic. In embodiments, provided herein is a transaction-enabling system having a fleet of machines that automatically allocate collective networking capacity among a core task, a compute task, an energy storage task, a data storage task and a networking task and having a distributed ledger that tokenizes a 3D printer instruction set, such that operation on the distributed ledger provides provable access to the instruction set. In embodiments, provided herein is a transaction-enabling system having a fleet of machines that automatically allocate collective networking capacity among a core task, a compute task, an energy storage task, a data storage task and a networking task and having a distributed ledger that tokenizes an instruction set for a coating process, such that operation on the distributed ledger provides provable access to the instruction set. In embodiments, provided herein is a transaction-enabling system having a fleet of machines that automatically allocate collective networking capacity among a core task, a compute task, an energy storage task, a data storage task and a networking task and having a distributed ledger that tokenizes an instruction set for a semiconductor fabrication process, such that operation on the distributed ledger provides provable access to the fabrication process. In embodiments, provided herein is a transaction-enabling system having a fleet of machines that automatically allocate collective networking capacity among a core task, a compute task, an energy storage task, a data storage task, and a networking task and having a distributed ledger that tokenizes a firmware program, such that operation on the distributed ledger provides provable access to the firmware program. In embodiments, provided herein is a transaction-enabling system having a fleet of machines that automatically allocate collective networking capacity among a core task, a compute task, an energy storage task, a data storage task and a networking task and having a distributed ledger that tokenizes an instruction set for an FPGA, such that operation on the distributed ledger provides provable access to the FPGA. In embodiments, provided herein is a transaction-enabling system having a fleet of machines that automatically allocate collective networking capacity among a core task, a compute task, an energy storage task, a data storage task, and a networking task and having a distributed ledger that tokenizes serverless code logic, such that operation on the distributed ledger provides provable access to the serverless code logic. In embodiments, provided herein is a transaction-enabling system having a fleet of machines that automatically allocate collective networking capacity among a core task, a compute task, an energy storage task, a data storage task and a networking task and having a distributed ledger that tokenizes an instruction set for a crystal fabrication system, such that operation on the distributed ledger provides provable access to the instruction set. In embodiments, provided herein is a transaction-enabling system having a fleet of machines that automatically allocate collective networking capacity among a core task, a compute task, an energy storage task, a data storage task and a networking task and having a distributed ledger that tokenizes an instruction set for a food preparation process, such that operation on the distributed ledger provides provable access to the instruction set. In embodiments, provided herein is a transaction-enabling system having a fleet of machines that automatically allocate collective networking capacity among a core task, a compute task, an energy storage task, a data storage task and a networking task and having a distributed ledger that tokenizes an instruction set for a polymer production process, such that operation on the distributed ledger provides provable access to the instruction set. In embodiments, provided herein is a transaction-enabling system having a fleet of machines that automatically allocate collective networking capacity among a core task, a compute task, an energy storage task, a data storage task and a networking task and having a distributed ledger that tokenizes an instruction set for chemical synthesis process, such that operation on the distributed ledger provides provable access to the instruction set. In embodiments, provided herein is a transaction-enabling system having a fleet of machines that automatically allocate collective networking capacity among a core task, a compute task, an energy storage task, a data storage task and a networking task and having a distributed ledger that tokenizes an instruction set for a biological production process, such that operation on the distributed ledger provides provable access to the instruction set. In embodiments, provided herein is a transaction-enabling system having a fleet of machines that automatically allocate collective networking capacity among a core task, a compute task, an energy storage task, a data storage task and a networking task and having a distributed ledger that tokenizes a trade secret with an expert wrapper, such that operation on the distributed ledger provides provable access to the trade secret and the wrapper provides validation of the trade secret by the expert. In embodiments, provided herein is a transaction-enabling system having a fleet of machines that automatically allocate collective networking capacity among a core task, a compute task, an energy storage task, a data storage task and a networking task and having a distributed ledger that aggregates views of a trade secret into a chain that proves which and how many parties have viewed the trade secret. In embodiments, provided herein is a transaction-enabling system having a fleet of machines that automatically allocate collective networking capacity among a core task, a compute task, an energy storage task, a data storage task and a networking task and having a distributed ledger that tokenizes an instruction set, such that operation on the distributed ledger provides provable access to the instruction set and execution of the instruction set on a system results in recording a transaction in the distributed ledger. In embodiments, provided herein is a transaction-enabling system having a fleet of machines that automatically allocate collective networking capacity among a core task, a compute task, an energy storage task, a data storage task and a networking task and having a distributed ledger that tokenizes an item of intellectual property and a reporting system that reports an analytic result based on the operations performed on the distributed ledger or the intellectual property. In embodiments, provided herein is a transaction-enabling system having a fleet of machines that automatically allocate collective networking capacity among a core task, a compute task, an energy storage task, a data storage task and a networking task and having a distributed ledger that aggregates a set of instructions, where an operation on the distributed ledger adds at least one instruction to a pre-existing set of instructions to provide a modified set of instructions. In embodiments, provided herein is a transaction-enabling system having a fleet of machines that automatically allocate collective networking capacity among a core task, a compute task, an energy storage task, a data storage task and a networking task and having a smart wrapper for management of a distributed ledger that aggregates sets of instructions, where the smart wrapper manages allocation of instruction sub-sets to the distributed ledger and access to the instruction sub-sets. In embodiments, provided herein is a transaction-enabling system having a fleet of machines that automatically allocate collective networking capacity among a core task, a compute task, an energy storage task, a data storage task and a networking task and having a smart wrapper for a cryptocurrency coin that directs execution of a transaction involving the coin to a geographic location based on tax treatment of at least one of the coin and the transaction in the geographic location. In embodiments, provided herein is a transaction-enabling system having a fleet of machines that automatically allocate collective networking capacity among a core task, a compute task, an energy storage task, a data storage task, and a networking task and having a self-executing cryptocurrency coin that commits a transaction upon recognizing a location-based parameter that provides favorable tax treatment. In embodiments, provided herein is a transaction-enabling system having a fleet of machines that automatically allocate collective networking capacity among a core task, a compute task, an energy storage task, a data storage task, and a networking task and having an expert system that uses machine learning to optimize the execution of cryptocurrency transactions based on tax status. In embodiments, provided herein is a transaction-enabling system having a fleet of machines that automatically allocate collective networking capacity among a core task, a compute task, an energy storage task, a data storage task, and a networking task and having an expert system that aggregates regulatory information covering cryptocurrency transactions and automatically selects a jurisdiction for an operation based on the regulatory information. In embodiments, provided herein is a transaction-enabling system having a fleet of machines that automatically allocate collective networking capacity among a core task, a compute task, an energy storage task, a data storage task and a networking task and having an expert system that uses machine learning to optimize the execution of a cryptocurrency transaction based on real time energy price information for an available energy source. In embodiments, provided herein is a transaction-enabling system having a fleet of machines that automatically allocate collective networking capacity among a core task, a compute task, an energy storage task, a data storage task and a networking task and having an expert system that uses machine learning to optimize the execution of a cryptocurrency transaction based on an understanding of available energy sources to power computing resources to execute the transaction. In embodiments, provided herein is a transaction-enabling system having a fleet of machines that automatically allocate collective networking capacity among a core task, a compute task, an energy storage task, a data storage task and a networking task and having an expert system that uses machine learning to optimize charging and recharging cycle of a rechargeable battery system to provide energy for execution of a cryptocurrency transaction. In embodiments, provided herein is a transaction-enabling system having a fleet of machines that automatically allocate collective networking capacity among a core task, a compute task, an energy storage task, a data storage task and a networking task and having an expert system that predicts a forward market price in a market based on an understanding obtained by analyzing Internet of Things data sources and executes a transaction based on the forward market prediction. In embodiments, provided herein is a transaction-enabling system having a fleet of machines that automatically allocate collective networking capacity among a core task, a compute task, an energy storage task, a data storage task and a networking task and having an expert system that predicts a forward market price in a market based on an understanding obtained by analyzing social network data sources and executes a transaction based on the forward market prediction. In embodiments, provided herein is a transaction-enabling system having a fleet of machines that automatically allocate collective networking capacity among a core task, a compute task, an energy storage task, a data storage task and a networking task and having an expert system that predicts a forward market price in a market based on an understanding obtained by analyzing Internet of Things data sources and executes a cryptocurrency transaction based on the forward market prediction. In embodiments, provided herein is a transaction-enabling system having a fleet of machines that automatically allocate collective networking capacity among a core task, a compute task, an energy storage task, a data storage task and a networking task and having an expert system that predicts a forward market price in a market based on an understanding obtained by analyzing social network data sources and executes a cryptocurrency transaction based on the forward market prediction. In embodiments, provided herein is a transaction-enabling system having a fleet of machines that automatically allocate collective networking capacity among a core task, a compute task, an energy storage task, a data storage task and a networking task and having an expert system that predicts a forward market price in an energy market based on an understanding obtained by analyzing Internet of Things data sources and executes a transaction based on the forward market prediction. In embodiments, provided herein is a transaction-enabling system having a fleet of machines that automatically allocate collective networking capacity among a core task, a compute task, an energy storage task, a data storage task and a networking task and having an expert system that predicts a forward market price in an energy market based on an understanding obtained by analyzing social network data sources and executes a transaction based on the forward market prediction. In embodiments, provided herein is a transaction-enabling system having a fleet of machines that automatically allocate collective networking capacity among a core task, a compute task, an energy storage task, a data storage task and a networking task and having an expert system that predicts a forward market price in a market for computing resources based on an understanding obtained by analyzing Internet of Things data sources and executes a transaction based on the forward market prediction. In embodiments, provided herein is a transaction-enabling system having a fleet of machines that automatically allocate collective networking capacity among a core task, a compute task, an energy storage task, a data storage task and a networking task and having an expert system that predicts a forward market price in a market for spectrum or network bandwidth based on an understanding obtained by analyzing Internet of Things data sources and executes a transaction based on the forward market prediction. In embodiments, provided herein is a transaction-enabling system having a fleet of machines that automatically allocate collective networking capacity among a core task, a compute task, an energy storage task, a data storage task and a networking task and having an expert system that predicts a forward market price in a market for computing resources based on an understanding obtained by analyzing social network data sources and executes a transaction based on the forward market prediction. In embodiments, provided herein is a transaction-enabling system having a fleet of machines that automatically allocate collective networking capacity among a core task, a compute task, an energy storage task, a data storage task and a networking task and having an expert system that predicts a forward market price in a market for advertising based on an understanding obtained by analyzing Internet of Things data sources and executes a transaction based on the forward market prediction. In embodiments, provided herein is a transaction-enabling system having a fleet of machines that automatically allocate collective networking capacity among a core task, a compute task, an energy storage task, a data storage task and a networking task and having an expert system that predicts a forward market price in a market for advertising based on an understanding obtained by analyzing social network data sources and executes a transaction based on the forward market prediction. In embodiments, provided herein is a transaction-enabling system having a fleet of machines that automatically allocate collective networking capacity among a core task, a compute task, an energy storage task, a data storage task, and a networking task and having a machine that automatically forecasts forward market pricing of energy prices based on information collected from automated agent behavioral data sources. In embodiments, provided herein is a transaction-enabling system having a fleet of machines that automatically allocate collective networking capacity among a core task, a compute task, an energy storage task, a data storage task, and a networking task and having a machine that automatically forecasts forward market pricing of network spectrum based on information collected from automated agent behavioral data sources. In embodiments, provided herein is a transaction-enabling system having a fleet of machines that automatically allocate collective networking capacity among a core task, a compute task, an energy storage task, a data storage task, and a networking task and having a machine that automatically forecasts forward market pricing of energy credits based on information collected from automated agent behavioral data sources. In embodiments, provided herein is a transaction-enabling system having a fleet of machines that automatically allocate collective networking capacity among a core task, a compute task, an energy storage task, a data storage task, and a networking task and having a machine that automatically forecasts forward market value of compute capability based on information collected from automated agent behavioral data sources. In embodiments, provided herein is a transaction-enabling system having a fleet of machines that automatically allocate collective networking capacity among a core task, a compute task, an energy storage task, a data storage task, and a networking task and having a machine that automatically forecasts forward market pricing of energy prices based on information collected from business entity behavioral data sources. In embodiments, provided herein is a transaction-enabling system having a fleet of machines that automatically allocate collective networking capacity among a core task, a compute task, an energy storage task, a data storage task, and a networking task and having a machine that automatically forecasts forward market pricing of network spectrum based on information collected from business entity behavioral data sources. In embodiments, provided herein is a transaction-enabling system having a fleet of machines that automatically allocate collective networking capacity among a core task, a compute task, an energy storage task, a data storage task, and a networking task and having a machine that automatically forecasts forward market pricing of energy credits based on information collected from business entity behavioral data sources. In embodiments, provided herein is a transaction-enabling system having a fleet of machines that automatically allocate collective networking capacity among a core task, a compute task, an energy storage task, a data storage task, and a networking task and having a machine that automatically forecasts forward market value of compute capability based on information collected from business entity behavioral data sources. In embodiments, provided herein is a transaction-enabling system having a fleet of machines that automatically allocate collective networking capacity among a core task, a compute task, an energy storage task, a data storage task, and a networking task and having a machine that automatically forecasts forward market pricing of energy prices based on information collected from human behavioral data sources. In embodiments, provided herein is a transaction-enabling system having a fleet of machines that automatically allocate collective networking capacity among a core task, a compute task, an energy storage task, a data storage task, and a networking task and having a machine that automatically forecasts forward market pricing of network spectrum based on information collected from human behavioral data sources. In embodiments, provided herein is a transaction-enabling system having a fleet of machines that automatically allocate collective networking capacity among a core task, a compute task, an energy storage task, a data storage task, and a networking task and having a machine that automatically forecasts forward market pricing of energy credits based on information collected from human behavioral data sources. In embodiments, provided herein is a transaction-enabling system having a fleet of machines that automatically allocate collective networking capacity among a core task, a compute task, an energy storage task, a data storage task, and a networking task and having a machine that automatically forecasts forward market value of compute capability based on information collected from human behavioral data sources. In embodiments, provided herein is a transaction-enabling system having a fleet of machines that automatically allocate collective networking capacity among a core task, a compute task, an energy storage task, a data storage task and a networking task and having an expert system that predicts a forward market price in a market for spectrum or network bandwidth based on an understanding obtained by analyzing social data sources and executes a transaction based on the forward market prediction. In embodiments, provided herein is a transaction-enabling system having a fleet of machines that automatically allocate collective networking capacity among a core task, a compute task, an energy storage task, a data storage task, and a networking task and having an intelligent agent that is configured to solicit the attention resources of another external intelligent agent. In embodiments, provided herein is a transaction-enabling system having a fleet of machines that automatically allocate collective networking capacity among a core task, a compute task, an energy storage task, a data storage task, and a networking task and having a machine that automatically purchases attention resources in a forward market for attention. In embodiments, provided herein is a transaction-enabling system having a fleet of machines that automatically allocate collective networking capacity among a core task, a compute task, an energy storage task, a data storage task, and a networking task and having a fleet of machines that automatically aggregate purchasing in a forward market for attention. In embodiments, provided herein is a transaction-enabling system having a fleet of machines that automatically allocate collective networking capacity among a core task, a compute task, an energy storage task, a data storage task and a networking task and having a system for learning on a training set of facility outcomes, facility parameters, and data collected from data sources to train an artificial intelligence/machine learning system to predict a likelihood of a facility production outcome. In embodiments, provided herein is a transaction-enabling system having a fleet of machines that automatically allocate collective networking capacity among a core task, a compute task, an energy storage task, a data storage task and a networking task and having a system for learning on a training set of facility outcomes, facility parameters, and data collected from data sources to train an artificial intelligence/machine learning system to predict a facility production outcome. In embodiments, provided herein is a transaction-enabling system having a fleet of machines that automatically allocate collective networking capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource utilization profile among a set of available profiles. In embodiments, provided herein is a transaction-enabling system having a fleet of machines that automatically allocate collective networking capacity among a core task, a compute task, an energy storage task, a data storage task and a networking task and having a system for learning on a training set of facility outcomes, facility parameters, and data collected from data sources to train an artificial intelligence/machine learning system to optimize provisioning and allocation of energy and compute resources to produce a favorable facility resource output selection among a set of available outputs. In embodiments, provided herein is a transaction-enabling system having a fleet of machines that automatically allocate collective networking capacity among a core task, a compute task, an energy storage task, a data storage task and a networking task and having a system for learning on a training set of facility outcomes, facility parameters, and data collected from data sources to train an artificial intelligence/machine learning system to optimize requisition and provisioning of available energy and compute resources to produce a favorable facility input resource profile among a set of available profiles. In embodiments, provided herein is a transaction-enabling system having a fleet of machines that automatically allocate collective networking capacity among a core task, a compute task, an energy storage task, a data storage task and a networking task and having a system for learning on a training set of facility outcomes, facility parameters, and data collected from data sources to train an artificial intelligence/machine learning system to optimize configuration of available energy and compute resources to produce a favorable facility resource configuration profile among a set of available profiles. In embodiments, provided herein is a transaction-enabling system having a fleet of machines that automatically allocate collective networking capacity among a core task, a compute task, an energy storage task, a data storage task and a networking task and having a system for learning on a training set of facility outcomes, facility parameters, and data collected from data sources to train an artificial intelligence/machine learning system to optimize selection and configuration of an artificial intelligence system to produce a favorable facility output profile among a set of available artificial intelligence systems and configurations. In embodiments, provided herein is a transaction-enabling system having a fleet of machines that automatically allocate collective networking capacity among a core task, a compute task, an energy storage task, a data storage task and a networking task and having a system for learning on a training set of facility outcomes, facility parameters, and data collected from data sources to train an artificial intelligence/machine learning system to generate an indication that a current or prospective customer should be contacted about an output that can be provided by the facility. In embodiments, provided herein is a transaction-enabling system having a fleet of machines that automatically allocate collective networking capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to at least one of an input resource, a facility resource, an output parameter and an external condition related to the output of the facility. In embodiments, provided herein is a transaction-enabling system having a fleet of machines that automatically allocate collective networking capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of input resources. In embodiments, provided herein is a transaction-enabling system having a fleet of machines that automatically allocate collective networking capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a set of facility resources. In embodiments, provided herein is a transaction-enabling system having a fleet of machines that automatically allocate collective networking capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to an output parameter. In embodiments, provided herein is a transaction-enabling system having a fleet of machines that automatically allocate collective networking capacity among a core task, a compute task, an energy storage task, a data storage task and a networking task and having an intelligent, flexible energy and compute facility whereby an artificial intelligence/machine learning system configures the facility among a set of available configurations based on a set of detected conditions relating to a utilization parameter for the output of the facility. In embodiments, provided herein is a transaction-enabling system having a fleet of machines that automatically allocate collective networking capacity among a core task, a compute task, an energy storage task, a data storage task and a networking task and having an intelligent, flexible energy and compute facility whereby an artificial intelligence/machine learning system configures the facility among a set of available configurations based on a set of parameters received from a digital twin for the facility.

An example transaction-enabling system includes a machine having a task requirement includes a compute task requirement, a networking task requirement, and/or an energy consumption task requirement, and a controller having a number of circuits configured to functionally execute certain operations to execute a transaction of a resource for the machine. The example controller includes a resource requirement circuit structured to determine an amount of a resource for the machine to service the task requirement(s), a forward resource market circuit structured to access a forward resource market, a resource market circuit structured to access a resource market, and a resource distribution circuit structured to execute a transaction of the resource on the resource market and/or the forward resource market in response to the determined amount of the resource.

Certain further aspects of an example system are described following, any one or more of which may be present in certain embodiments. An example system includes where the resource distribution circuit is further structured to adaptively improve at least one of an output of the machine or a resource utilization of the machine, and/or where the resource distribution circuit further includes at least one of a machine learning component, an artificial intelligence component, or a neural network component. An example embodiment includes the resource as one or more of a compute resource, an energy resource, and/or an energy credit resource. An example system includes where the resource requirement circuit is further structured to determine a second amount of a second resource for the machine to the task requirement(s), and where the resource distribution circuit is further structured to execute a first transaction of the first resource on one of the resource market or the forward resource market, and to execute a second transaction of the second resource on the other one of the resource market or the forward resource market. An example embodiment further includes where the second resource is a substitute resource for the first resource during at least a portion of the operating conditions for the machine. An example system includes where the forward resource market includes a futures market for the resource at a first time scale, and where the resource market includes a spot market for the resource and/or a futures market for the resource at a second time scale. An example system includes the transaction having a transaction type such as: a sale of the resource; a purchase of the resource; a short sale of the resource; a call option for the resource; a put option for the resource; and/or any of the foregoing with regard to at least one of a substitute resource or a correlated resource. An example system includes where the resource distribution circuit is further structured to determine at least one of a substitute resource or a correlated resource, and to further execute at least one transaction of the at least one of the substitute resource or the correlated resource. An example system includes where the resource distribution circuit is further structured to execute the at least one transaction of the at least one of the substitute resource or the correlated resource as a replacement for the transaction of the resource. An example system includes where the resource distribution circuit is further structured to execute the at least one transaction of the at least one of the substitute resource or the correlated resource in concert with the transaction of the resource.

An example procedure includes an operation to determine an amount of a resource for a machine to service at least one task requirement such as a compute task requirement, a networking task requirement, and/or an energy consumption task requirement. The example procedure further includes an operation to access a forward resource market and a resource market, and an operation to execute a transaction of the resource on at least one of the forward resource market or the resource market in response to the determined amount of the resource.

Certain further aspects of an example procedure are described following, any one or more of which may be present in certain embodiments. An example procedure further includes an operation to determine a second amount of a second resource for the machine to service at least one of the task requirement(s), an operation to execute a first transaction of the first resource on one of the resource market or the forward resource market, and an operation to execute a second transaction of the second resource on the other one of the resource market or the forward resource market. An example procedure further includes an operation to determine a substitute resource and/or a correlated resource, and an operation to execute at least one transaction of the substitute resource and/or the correlated resource. An example procedure further includes an operation to execute the transaction of the substitute resource and/or the correlated resource as a replacement for the transaction of the resource. An example procedure further includes an operation to execute the transaction of the substitute resource and/or the correlated resource in concert with the transaction of the resource. An example procedure includes determining the substitute resource and/or the correlated resource by performing at least one operation such as: determining the correlated resource for the machine as a resource to service alternate tasks that provide acceptable functionality for the machine; determining the correlated resource as a resource that is expected to be correlated with the resource in regard to at least one of a price or an availability; and/or determining the correlated resource as a resource that is expected to have a corresponding price change with the resource, such that a subsequent sale of the correlated resource combined with a spot market purchase of the resource provides for a planned economic outcome.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure.

Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the FIGURES, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f). The term "set" as used herein refers to a group having one or more members.

Persons skilled in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A transaction-enabling system, comprising:

an interface configured to communicate with a fleet of machines, each one of the fleet of machines having a resource requirement comprising a plurality of machine-related resources, the plurality of machine-related resources comprising at least two of: a compute resource, a spectrum resource, or a network bandwidth resource, the resource requirement including a first resource among the plurality of machine-related resources; and a controller in communication with the fleet of machines via the interface, the controller comprising:

an intelligent agent circuit structured to aggregate data corresponding to the plurality of machine-related resources from a plurality of data sources comprising at least an external data source, the external data source comprising at least a behavioral data source;

an expert system circuit structured to configure a purchase of at least one of the plurality of machine-related resources, the configuring the purchase comprising:

maintaining a training data set comprising feedback data indicating respective outcomes of previous purchases and, for each respective outcome, at least one of: a facility parameter, a yield parameter, a profit parameter, a resource optimization parameter, a user satisfaction parameter, or an operator satisfaction parameter;

training an artificial intelligence system based on the training data set to self-adjust forecasts for a forward market price of the at least one of the plurality of machine-related resources based on the training data set that includes the feedback data, the forward market price being for at least one of:

the first resource; and a second resource, among the at least one of the plurality of machine-related resources, that can be substituted for the first resource, wherein the first resource and the second resource are distinct instances of the same type of resource; and determining a substitution cost of the second resource; and a machine resource acquisition circuit structured to:

determine a machine-related resource acquisition value; and automatically solicit the configured purchase of the at least one of the first resource or the second resource in a forward market for the at least one of the first resource or the second resource based on the machine-related resource acquisition value and the substitution cost of the second resource, wherein the expert system circuit is further structured to update the training data set with additional feedback data corresponding to the configured purchase and reinforce the artificial intelligence system based on the additional feedback data.

2. The system of claim 1, wherein:

the expert system circuit is further configured to identify a timing of the configured purchase; and the timing is based at least in part on the aggregated data.

3. The system of claim 2, wherein the machine resource acquisition circuit is further structured to automatically solicit the configured purchase based on the identified timing.

4. The system of claim 1, wherein the expert system circuit is further configured to determine at least a portion of the substitution cost of the second resource as an operational change cost for at least one of the fleet of machines.

5. The system of claim 1, wherein the intelligent agent circuit comprises a system comprising at least one of: a simple reflex system, a model-based reflex system, a goal-based system, a utility-based system, a learning system, an embodied system, a fuzzy system, or a data mining system.

6. The system of claim 1, wherein the external data source further comprises at least one of: a market condition data source, an agent data source, or a historical outcome data source.

7. The system of claim 1, wherein the determination of the machine-related resource acquisition value is based in part on at least one of: an expected cost range, a cost parameter of a machine resource, an effectiveness parameter of a machine resource, or a future predicted cost of one of the machine-related resource.

8. The system of claim 1, wherein the machine resource acquisition circuit is further structured to determine the machine-related resource acquisition value in response to a comparison of a first cost of the machine-related resource on a spot market of the machine-related resource with a cost parameter of the machine-related resource.

9. The system of claim 1, wherein the expert system circuit is further structured to improve a future purchase configuration or timing identification based on a data set comprising outcomes resulting from purchases made under historical input conditions.

10. The system of claim 1, wherein:

the external data source comprises at least one of a bot, a crawler, or a dialog manager.

11. A method, comprising:

interpreting, by a controller, a resource requirement for a fleet of machines, each machine of the fleet of machines requiring a plurality of machine-related resources, the plurality of machine-related resources comprising at least two of: a compute resource, a spectrum resource, or a network bandwidth resource, the resource requirement including a first resource among the plurality of machine-related resources;

aggregating, by the controller, data from a plurality of data sources comprising at least an external data source, the aggregated data comprising data related to at least one of the plurality of machine-related resources, the external data source comprising at least a behavioral data source;

operating, by the controller, an intelligent agent to configure a purchase of the at least one of the plurality of machine-related resources in response to the resource requirement and the aggregated data, the configuring the purchase comprising:

maintaining a training data set comprising feedback data indicating respective outcomes of previous purchases and, for each respective outcome, at least one of a facility parameter, a resource optimizing parameter, a user satisfaction parameter, or an operator satisfaction parameter;

training an artificial intelligence system based on the training data set to self-adjust forecasts for a forward market price of the at least one of the plurality of machine-related resources based on the training data set that includes the feedback data, the forward market price being for at least one of:

the first resource; and a second resource, among the at least one of the plurality of machine-related resources, that can be substituted for the first resource, wherein the first resource and the second resource are distinct instances of the same type of resource;

determining a substitution cost of the second resource; and determining a machine-related resource acquisition value;

soliciting, by the controller, the configured purchase of the first resource or the second resource, such that a selection of at least one of the first resource or the second resource is based on a comparison of a cost of the first resource and on the machine-related resource acquisition value;

updating the training data set with additional feedback data corresponding to the configured purchase and reinforced the artificial intelligence system based on the additional feedback data; and reinforcing the artificial intelligence system based on the feedback data.

12. The method of claim 11, further comprising identifying a timing of the configured purchase.

13. The method of claim 12, wherein soliciting the configured purchase comprises soliciting based on the identified timing.

14. The method of claim 13, wherein identifying the timing of the configured purchase comprises determining a supply of and a demand for the machine-related resource, based at least in part on the aggregated data.

15. The method of claim 11, wherein determining the machine-related resource acquisition value comprises comparing a first cost of the machine-related resource on a spot market for the resource with a cost parameter of the machine-related resource.

16. The method of claim 11, further comprising performing a machine-related resource transaction in response to the machine-related resource acquisition value.

17. The method of claim 16, wherein performing the machine-related resource transaction comprises an operation comprising at least one of: purchasing the machine-related resource, selling the machine-related resource, making an offer to sell the machine-related resource, or making an offer to purchase the machine-related resource.

18. The method of claim 11, wherein determining the machine-related resource acquisition value is based in part on at least one of: an expected cost range, a cost parameter of a machine-related resource, an effectiveness parameter of a machine-related resource, or a future predicted cost of at least one of the plurality of machine-related resources.

19. The method of claim 11, further comprising improving the configuring the purchase based on a data set comprising outcomes resulting from purchases made under historical input conditions.

20. The method of claim 11, further comprising determining at least a portion of the substitution cost of the second resource as an operational change cost for at least one of the fleet of machines.

* * * * *

UNITED STATES PATENT AND TRADEMARK OFFICE

CERTIFICATE OF CORRECTION

PATENT NO. : 12,254,427 B2
APPLICATION NO. : 18/203725
DATED : March 18, 2025
INVENTOR(S) : Charles Howard Cella It is certified that error appears in the above-identified patent and that said Letters Patent is hereby corrected as shown below:

In the Drawings

On sheet 22 of 72, Fig. 51, the instance where “serverless code logic” is coupled with reference numeral “4116”, delete “serverless code logic” and insert --separate data store-- as well as delete reference numeral “4116” and insert --5116-- therefor.

In the Specification

In Column 432, Line 16, delete “8516” and insert --8512-- therefor.

In Column 432, Lines 26, delete “further 8516” and insert --8512 further-- therefor.

In Column 481, Lines 64-65, after “embodiments,”, insert --provided herein is a transaction-enabling system having a fleet of machines that-- therefor.

In Column 485, Line 54, after “embodiments,”, insert --provided herein is a transaction-enabling system having a fleet of machines that-- therefor.

In Column 572, Lines 41-42, after “embodiments,”, insert --provided herein is a transaction-enabling system having a fleet of machines that-- therefor.

In Column 573, Line 25, after “embodiments,”, insert --provided herein is a transaction-enabling system having a fleet of machines that-- therefor.

In Column 588, Line 60, after “embodiments,”, insert --provided herein is a transaction-enabling system having a fleet of machines that-- therefor.

Signed and Sealed this
Eighteenth Day of November, 2025

John A. Squires
*Director of the United States Patent and Trademark Office*

In Column 590, Line 29, after “embodiments,”, insert --provided herein is a transaction-enabling system having a fleet of machines that-- therefor.

In Column 636, Line 14, after “embodiments,”, insert --provided herein is a transaction-enabling system having a fleet of machines that-- therefor.

In Column 636, Line 65, after “embodiments,”, insert --provided herein is a transaction-enabling system having a fleet of machines that-- therefor.

In Column 679, Line 30, after “embodiments,”, insert --provided herein is a transaction-enabling system having a fleet of machines that-- therefor.

In Column 713, Line 37, after “embodiments,”, insert --provided herein is a transaction-enabling system having a fleet of machines that-- therefor.

In the Claims

In Column 903, Line 65, in Claim 11, delete “optimizing” and insert --optimization-- therefor.

In Column 904, Lines 18-19, in Claim 11, delete “resource, such that a selection of” and insert --resource in a forward market for the-- therefor.

In Column 904, Line 20, in Claim 11, delete “is based on a comparison of a” and insert --based on the substitution-- therefor.

In Column 904, Line 21, in Claim 11, delete “first” and insert --second-- therefor.

In Column 904, Line 25, in Claim 11, delete “reinforced” and insert --reinforce-- therefor.

In Column 904, Line 28, in Claim 11, after “the”, insert --additional-- therefor.